United States Patent [19]

Walden et al.

[11] 4,180,854

[45] Dec. 25, 1979

[54] PROGRAMMABLE CALCULATOR HAVING STRING VARIABLE EDITING CAPABILITY

[75] Inventors: Jack M. Walden; William D. Eads; Ray J. Cozzens; John L. Bidwell; Robert A. Jewett; Martin S. Wilson; Daniel J. Griffin; Robert E. Kuseski; Louis T. Schulte, all of Loveland, Colo.

[73] Assignee: Hewlett-Packard Company, Palo Alto, Calif.

[21] Appl. No.: 837,771

[22] Filed: Sep. 29, 1977

[51] Int. Cl.[2] .......................... G06F 3/02; G06F 3/14

[52] U.S. Cl. .................................................... 364/200

[58] Field of Search ... 364/200 MS File, 900 MS File

[56] References Cited

U.S. PATENT DOCUMENTS

| | | | |
|---|---|---|---|
| 3,495,222 | 2/1970 | Perotto et al. | 364/200 |
| 3,533,076 | 10/1970 | Perins et al. | 364/200 |
| 3,546,677 | 12/1970 | Barton et al. | 364/200 |
| 3,593,313 | 7/1971 | Tomaszewski et al. | 364/200 |
| 3,665,487 | 5/1972 | Campbell et al. | 364/200 |
| 3,769,621 | 10/1973 | Osborne | 364/200 |
| 3,778,776 | 12/1973 | Hakozaki | 364/200 |
| 3,839,630 | 10/1974 | Olander et al. | 364/200 |
| 4,015,245 | 3/1977 | Mercurio et al. | 364/200 |
| 4,075,679 | 2/1978 | Christopher et al. | 364/900 |

*Primary Examiner*—Harvey E. Springborn

*Attorney, Agent, or Firm*—William E. Hein

[57] ABSTRACT

A programmable calculator employs modular read-write and read-only memories separately expandable to provide additional program and data storage functions within the calculator oriented toward the environment of the user and two sixteen bit LSI NMOS central processing units. One of the central processing units (LPU) is employed to perform language syntaxing, arithmetic, and general supervision of program execution. The second central processing unit (PPU) is employed for managing input/output operations. Communication between the two central processing units is accomplished by an arrangement through which the two central processing units share a common portion of memory. The calculator also includes a keyboard having a full complement of alphanumeric keys for entering programs and data into the calculator and for otherwise allowing the user to control operation of the calculator. The calculator further includes a CRT that can be operated in either an alphanumeric mode or a graphics mode, two magnetic tape transports that permit the user to store information into and to retrieve information from the user portion of the calculator read-write memory, and an 80-column thermal printer utilizing a print head that includes 560 thermal print resistors arranged in a single horizontal row.

2 Claims, 470 Drawing Figures

CRT DUAL RASTER

| | FOR ALPHA RASTER | FOR GRAPHICS RASTER |
|---|---|---|
| MATRIX | 720 DOTS PER LINE X 375 LINES | 560 DOTS X 455 DOTS |
| CLOCK FREQUENCY | 20.85MHz | 20.85MHz |
| HORIZONTAL SCAN FREQUENCY | 23.4KHz | 28.7KHz |
| HORIZONTAL RETRACE TIME | 8.2μs | 8.0μs |
| FRAME FREQUENCY | 60 Hz | 60Hz |
| VERTICAL RETRACE TIME | 641μs | 800μs |

NOTE: SLANTED LETTERING DENOTES LABELING ON THE FRONT SURFACE OF THE KEY. WHEN SUCH KEYS ARE USED IN CONJUNCTION WITH CONTROL THEY REPRESENT THE SECONDARY, YET PERMANENT DEFINITION DENOTED BY THE SLANTED LETTERING.

KEYBOARD INPUT UNIT

NON-SLANTED LETTERING ABOVE OR BELOW KEYS DENOTES ENGRAVING ON THE KEYBOARD BEZEL. SUCH LETTERING BENEATH $K_6$ THROUGH $K_{15}$ DENOTES THE SEMI-PERMANENT, YET CHANGEABLE, TYPING-AIDS ASSOCIATED WITH THOSE KEYS BY DEFAULT AT TURN-ON.

```
KEY 0-Undefined
KEY 1-Undefined
KEY 2-Undefined
KEY 3-Undefined    (IF THE TAPE TRANSPORT
KEY 4-Undefined    12 IS INSTALLED)
KEY 5-Undefined
KEY 6
   -Clear line
    REWIND ":T14"  (IMMEDIATE-EXECUTE UDK)
   -Execute

KEY 7
   -Clear line
    REWIND ":T15"  (IMMEDIATE-EXECUTE)
   -Execute

KEY 8
   -Clear line     (PRINT-AID ONLY)
    GET

KEY 9
   -Clear line     (PRINT-AID)
    LOAD

KEY10
   -Clear line     (PRINT-AID)
    SAVE

KEY11
   -Clear line     (PRINT-AID)
    STORE
```

FIG 12A

```
KEY12
   -Clear line        (PRINT-AID)
    EDIT

KEY13
   -Clear line        (PRINT-AID)
    EDIT LINE

KEY14
   -Clear line        (PRINT-AID)
    LIST

KEY15
   -Clear line        (PRINT-AID)
    SCRATCH

KEY16-Undefined
KEY17-Undefined
KEY18-Undefined
KEY19-Undefined
KEY20-Undefined
KEY21-Undefined
KEY22-Undefined
KEY23-Undefined
KEY24-Undefined
KEY25-Undefined
KEY26-Undefined
KEY27-Undefined
KEY28-Undefined
KEY29-Undefined
KEY30-Undefined
KEY31-Undefined
```

ONLY LETTERING DEPICTED BY DOT MATRIX IS ACTUALLY LISTED. ALL OTHER LETTERING IS EXPLANATORY MATERIAL CONCERING THE LISTING.

FIG 12B

CONTROL FUNCTIONS USING CHR$(n)
POSSIBLE CONTROL FUNCTION COMBINATIONS

DECIMAL ARGUMENT VALUES OF CHR$

| CLR | IV | BL | IV/BL | UL | IV/UL | BL/UL | IV/BL UL | AC | IV/AC | BL/AC | IV/BL AC | UL/AC | IV/UL AC | BL/UL AC | IV/BL UL/AC |
|---|---|---|---|---|---|---|---|---|---|---|---|---|---|---|---|
| 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 |
| 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 |
| 208 | 209 | 210 | 211 | 212 | 213 | 214 | 215 | 216 | 217 | 218 | 219 | 220 | 221 | 222 | 223 |
| 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 |

CLR - CLEAR ALL CONTROL CHARACTERS (IV, BL, ETC.)
IV - INVERSE VIDEO
BL - BLINKING
UL - UNDERLINE
AC - ALTERNATE CHARACTER SET

THESE CONTROL FUNCTIONS REMAIN IN EFFECT UNTIL A NEW ONE IS PRINTED OR UNTIL A CR/LF.

FIG 13

FOR THE LANGUAGES LISTED BELOW, THESE ASCII CHARACTERS, WHEN FOLLOWING A SHIFT OUT, PRODUCE THE CORRESPONDING CHARACTERS IN THE TABLE BELOW

| | # | $ | @ | [ | \ | ] | ^ | ` | { | \| | } | ~ |
|---|---|---|---|---|---|---|---|---|---|---|---|---|
| FRENCH | | | à | ° | ç | | | | é | ù | è | ¨ |
| GERMAN | | | | Ä | Ö | Ü | | | ä | ö | ü | ß |
| SWEDISH/FINNISH | | ¤ | | Ä | Ö | Å | Ü | é | ä | ö | å | ü |
| DANISH/NORWEGIAN | | | | Æ | Ø | Å | | | æ | | å | |
| SPANISH | | | | ¡ | Ñ | ¿ | ° | | | ñ | | |
| BRITISH | £ | | | | | | ↑ | | | | | |

FIG 14

IDEALIZED SERIAL MODE EXAMPLE ASSUMING:

1. ALL DEVICE TRANSFERS ARE OF EQUAL LENGTH, X.
2. LPU PROCESSING TIMES TOTAL TO ONE TRANSFER TIME, X. FOR SIMPLICITY, THE N INDIVIDUAL LPU PROCESSING TIMES ARE ALSO MADE EQUAL.

TOTAL TIME = $N(X+\frac{X}{N}) = N(X+1)$ SECONDS

IDEALIZED OVERLAPPED MODE EXAMPLE ASSUMING:

1. ALL DEVICE TRANSFERS ARE OF EQUAL LENGTH, X.

2. LPU PROCESSING TIMES TOTAL TO ONE TRANSFER TIME, X. FOR SIMPLICITY, THE N INDIVIDUAL LPU PROCESSING TIMES ARE ALSO MADE EQUAL.

TOTAL TIME = X SECONDS

| DEC | OCT | 0 | DEC | OCT | 1 | DEC | OCT | 2 |
|---|---|---|---|---|---|---|---|---|
| 0 | 0 | [illegible] | 16 | 20 | [illegible] | 32 | 40 | |
| 1 | 1 | [illegible] | 17 | 21 | [illegible] | 33 | 41 | ! |
| 2 | 2 | [illegible] | 18 | 22 | [illegible] | 34 | 42 | " |
| 3 | 3 | [illegible] | 19 | 23 | [illegible] | 35 | 43 | # |
| 4 | 4 | [illegible] | 20 | 24 | [illegible] | 36 | 44 | $ |
| 5 | 5 | [illegible] | 21 | 25 | [illegible] | 37 | 45 | % |
| 6 | 6 | [illegible] | 22 | 26 | [illegible] | 38 | 46 | & |
| 7 | 7 | [illegible] | 23 | 27 | [illegible] | 39 | 47 | ' |
| 8 | 10 | [illegible] | 24 | 30 | [illegible] | 40 | 50 | ( |
| 9 | 11 | [illegible] | 25 | 31 | [illegible] | 41 | 51 | ) |
| 10 | 12 | [illegible] | 26 | 32 | [illegible] | 42 | 52 | * |
| 11 | 13 | [illegible] | 27 | 33 | [illegible] | 43 | 53 | + |
| 12 | 14 | [illegible] | 28 | 34 | [illegible] | 44 | 54 | , |
| 13 | 15 | [illegible] | 29 | 35 | [illegible] | 45 | 55 | - |
| 14 | 16 | [illegible] | 30 | 36 | [illegible] | 46 | 56 | . |
| 15 | 17 | [illegible] | 31 | 37 | [illegible] | 47 | 57 | / |

PRIMARY CHARACTER SET

FIG 25A

| DEC | OCT | 3 | DEC | OCT | 4 | DEC | OCT | 5 |
|---|---|---|---|---|---|---|---|---|
| 48 | 60 | 0 | 64 | 100 | @ | 80 | 120 | P |
| 49 | 61 | 1 | 65 | 101 | A | 81 | 121 | Q |
| 50 | 62 | 2 | 66 | 102 | B | 82 | 122 | R |
| 51 | 63 | 3 | 67 | 103 | C | 83 | 123 | S |
| 52 | 64 | 4 | 68 | 104 | D | 84 | 124 | T |
| 53 | 65 | 5 | 69 | 105 | E | 85 | 125 | U |
| 54 | 66 | 6 | 70 | 106 | F | 86 | 126 | V |
| 55 | 67 | 7 | 71 | 107 | G | 87 | 127 | W |
| 56 | 70 | 8 | 72 | 110 | H | 88 | 130 | X |
| 57 | 71 | 9 | 73 | 111 | I | 89 | 131 | Y |
| 58 | 72 | : | 74 | 112 | J | 90 | 132 | Z |
| 59 | 73 | ; | 75 | 113 | K | 91 | 133 | [ |
| 60 | 74 | < | 76 | 114 | L | 92 | 134 | \ |
| 61 | 75 | = | 77 | 115 | M | 93 | 135 | ] |
| 62 | 76 | > | 78 | 116 | N | 94 | 136 | ^ |
| 63 | 77 | ? | 79 | 117 | O | 95 | 137 | _ |

FIG 25B

| DEC | OCT | 6 | DEC | OCT | 7 |
|---|---|---|---|---|---|
| 96 | 140 | ` | 112 | 160 | p |
| 97 | 141 | a | 113 | 161 | q |
| 98 | 142 | b | 114 | 162 | r |
| 99 | 143 | c | 115 | 163 | s |
| 100 | 144 | d | 116 | 164 | t |
| 101 | 145 | e | 117 | 165 | u |
| 102 | 146 | f | 118 | 166 | v |
| 103 | 147 | g | 119 | 167 | w |
| 104 | 150 | h | 120 | 170 | x |
| 105 | 151 | i | 121 | 171 | y |
| 106 | 152 | j | 122 | 172 | z |
| 107 | 153 | k | 123 | 173 | { |
| 108 | 154 | l | 124 | 174 | \| |
| 109 | 155 | m | 125 | 175 | } |
| 110 | 156 | n | 126 | 176 | ~ |
| 111 | 157 | o | 127 | 177 | ▒ |

OCTAL AND DECIMAL CHARACTER CODES SHOWN ARE TRUE PROVIDED THEY ARE NOT SUBSEQUENT TO A "SHIFT OUT". THAT IS, THAT THEY ARE EMPLOYED DURING THE "SHIFTED-IN" CONDITION.

FIG 25C

| DEC | OCT | 0 | DEC | OCT | 1 | DEC | OCT | 2 |
|---|---|---|---|---|---|---|---|---|
| 0 | 0 | [illegible] | 16 | 20 | [illegible] | 32 | 40 | |
| 1 | 1 | [illegible] | 17 | 21 | [illegible] | 33 | 41 | ! |
| 2 | 2 | [illegible] | 18 | 22 | [illegible] | 34 | 42 | " |
| 3 | 3 | [illegible] | 19 | 23 | [illegible] | 35 | 43 | # |
| 4 | 4 | [illegible] | 20 | 24 | [illegible] | 36 | 44 | $ |
| 5 | 5 | [illegible] | 21 | 25 | [illegible] | 37 | 45 | % |
| 6 | 6 | [illegible] | 22 | 26 | [illegible] | 38 | 46 | & |
| 7 | 7 | [illegible] | 23 | 27 | [illegible] | 39 | 47 | ´ |
| 8 | 10 | [illegible] | 24 | 30 | [illegible] | 40 | 50 | ( |
| 9 | 11 | [illegible] | 25 | 31 | [illegible] | 41 | 51 | ) |
| 10 | 12 | [illegible] | 26 | 32 | [illegible] | 42 | 52 | * |
| 11 | 13 | [illegible] | 27 | 33 | [illegible] | 43 | 53 | + |
| 12 | 14 | [illegible] | 28 | 34 | [illegible] | 44 | 54 | , |
| 13 | 15 | [illegible] | 29 | 35 | [illegible] | 45 | 55 | - |
| 14 | 16 | [illegible] | 30 | 36 | [illegible] | 46 | 56 | . |
| 15 | 17 | [illegible] | 31 | 37 | [illegible] | 47 | 57 | / |

FIG 26A

GERMAN ALTERNATE CHARACTER SET

| DEC | OCT | 3 | DEC | OCT | 4 | DEC | OCT | 5 |
|---|---|---|---|---|---|---|---|---|
| 48 | 60 | 0 | 64 | 100 | @ | 80 | 120 | P |
| 49 | 61 | 1 | 65 | 101 | A | 81 | 121 | Q |
| 50 | 62 | 2 | 66 | 102 | B | 82 | 122 | R |
| 51 | 63 | 3 | 67 | 103 | C | 83 | 123 | S |
| 52 | 64 | 4 | 68 | 104 | D | 84 | 124 | T |
| 53 | 65 | 5 | 69 | 105 | E | 85 | 125 | U |
| 54 | 66 | 6 | 70 | 106 | F | 86 | 126 | V |
| 55 | 67 | 7 | 71 | 107 | G | 87 | 127 | W |
| 56 | 70 | 8 | 72 | 110 | H | 88 | 130 | X |
| 57 | 71 | 9 | 73 | 111 | I | 89 | 131 | Y |
| 58 | 72 | : | 74 | 112 | J | 90 | 132 | Z |
| 59 | 73 | ; | 75 | 113 | K | 91 | 133 | Ä |
| 60 | 74 | < | 76 | 114 | L | 92 | 134 | Ö |
| 61 | 75 | = | 77 | 115 | M | 93 | 135 | Ü |
| 62 | 76 | > | 78 | 116 | N | 94 | 136 | ^ |
| 63 | 77 | ? | 79 | 117 | O | 95 | 137 | _ |

FIG 26B

| DEC | OCT | 6 | DEC | OCT | 7 |
|---|---|---|---|---|---|
| 96 | 140 | ` | 112 | 160 | p |
| 97 | 141 | a | 113 | 161 | q |
| 98 | 142 | b | 114 | 162 | r |
| 99 | 143 | c | 115 | 163 | s |
| 100 | 144 | d | 116 | 164 | t |
| 101 | 145 | e | 117 | 165 | u |
| 102 | 146 | f | 118 | 166 | v |
| 103 | 147 | g | 119 | 167 | w |
| 104 | 150 | h | 120 | 170 | x |
| 105 | 151 | i | 121 | 171 | y |
| 106 | 152 | j | 122 | 172 | z |
| 107 | 153 | k | 123 | 173 | ä |
| 108 | 154 | l | 124 | 174 | ö |
| 109 | 155 | m | 125 | 175 | ü |
| 110 | 156 | n | 126 | 176 | ß |
| 111 | 157 | o | 127 | 177 | ▒ |

FIG 26 C

OCTAL AND DECIMAL CHARACTER CODES SHOWN ASSUME THAT THEY ARE ISSUED SUBSEQUENT TO A "SHIFT OUT". THAT IS, THEY ARE NOT EMPLOYED DURING A "SHIFTED-IN" CONDITION.

THESE SAME CHARACTERS MAY ALSO BE ACCESSED BY SETTING THE LEFT-MOST BIT OF THEIR 8-BIT ASCII REPRESENTATION. THUS AN UMLOUTTED A CAN BE OBTAINED BY USE OF THE OCTAL CHARACTER CODE 333. HOWEVER, THIS DOES NOT APPLY TO THE FIRST $32_{10}$ CONTROL CODES.

WITH THE HIGH ORDER BIT SET, THOSE CODES CONTROL UNDERLINING UNLESS THE DISPLAY CONTROL CODES MODE IS IN EFFECT, IN WHICH CASE THE ASSOCIATED CONTROL CODE MNEMONIC IS PRINTED.

| DEC | OCT | 0 | DEC | OCT | 1 | DEC | OCT | 2 |
|---|---|---|---|---|---|---|---|---|
| 0 | 0 | NU | 16 | 20 | DL | 32 | 40 | |
| 1 | 1 | SH | 17 | 21 | D1 | 33 | 41 | ! |
| 2 | 2 | SX | 18 | 22 | D2 | 34 | 42 | " |
| 3 | 3 | EX | 19 | 23 | D3 | 35 | 43 | # |
| 4 | 4 | ET | 20 | 24 | D4 | 36 | 44 | $ |
| 5 | 5 | EQ | 21 | 25 | NK | 37 | 45 | % |
| 6 | 6 | AK | 22 | 26 | SY | 38 | 46 | & |
| 7 | 7 | BL | 23 | 27 | EB | 39 | 47 | ' |
| 8 | 10 | BS | 24 | 30 | CN | 40 | 50 | ( |
| 9 | 11 | HT | 25 | 31 | EM | 41 | 51 | ) |
| 10 | 12 | LF | 26 | 32 | SB | 42 | 52 | * |
| 11 | 13 | VT | 27 | 33 | EC | 43 | 53 | + |
| 12 | 14 | FF | 28 | 34 | FS | 44 | 54 | , |
| 13 | 15 | CR | 29 | 35 | GS | 45 | 55 | - |
| 14 | 16 | SO | 30 | 36 | RS | 46 | 56 | . |
| 15 | 17 | SI | 31 | 37 | US | 47 | 57 | / |

FIG 27A

FRENCH ALTERNATE CHARACTER SET

| DEC | OCT | 3 | DEC | OCT | 4 | DEC | OCT | 5 |
|---|---|---|---|---|---|---|---|---|
| 48 | 60 | 0 | 64 | 100 | à | 80 | 120 | P |
| 49 | 61 | 1 | 65 | 101 | A | 81 | 121 | Q |
| 50 | 62 | 2 | 66 | 102 | B | 82 | 122 | R |
| 51 | 63 | 3 | 67 | 103 | C | 83 | 123 | S |
| 52 | 64 | 4 | 68 | 104 | D | 84 | 124 | T |
| 53 | 65 | 5 | 69 | 105 | E | 85 | 125 | U |
| 54 | 66 | 6 | 70 | 106 | F | 86 | 126 | V |
| 55 | 67 | 7 | 71 | 107 | G | 87 | 127 | W |
| 56 | 70 | 8 | 72 | 110 | H | 88 | 130 | X |
| 57 | 71 | 9 | 73 | 111 | I | 89 | 131 | Y |
| 58 | 72 | : | 74 | 112 | J | 90 | 132 | Z |
| 59 | 73 | ; | 75 | 113 | K | 91 | 133 | ° |
| 60 | 74 | < | 76 | 114 | L | 92 | 134 | ç |
| 61 | 75 | = | 77 | 115 | M | 93 | 135 | ] |
| 62 | 76 | > | 78 | 116 | N | 94 | 136 | ^ |
| 63 | 77 | ? | 79 | 117 | O | 95 | 137 | _ |

FIG 27B

| DEC | OCT | 6 | DEC | OCT | 7 |
|---|---|---|---|---|---|
| 96 | 140 | ` | 112 | 160 | p |
| 97 | 141 | a | 113 | 161 | q |
| 98 | 142 | b | 114 | 162 | r |
| 99 | 143 | c | 115 | 163 | s |
| 100 | 144 | d | 116 | 164 | t |
| 101 | 145 | e | 117 | 165 | u |
| 102 | 146 | f | 118 | 166 | v |
| 103 | 147 | g | 119 | 167 | w |
| 104 | 150 | h | 120 | 170 | x |
| 105 | 151 | i | 121 | 171 | y |
| 106 | 152 | j | 122 | 172 | z |
| 107 | 153 | k | 123 | 173 | é |
| 108 | 154 | l | 124 | 174 | ù |
| 109 | 155 | m | 125 | 175 | è |
| 110 | 156 | n | 126 | 176 | ¨ |
| 111 | 157 | o | 127 | 177 | ▒ |

FIG 27C

OCTAL AND DECIMAL CHARACTER CODES SHOWN ASSUME THAT THEY ARE ISSUED SUBSEQUENT TO A "SHIFT OUT". THAT IS, THAT THEY ARE NOT EMPLOYED DURING A "SHIFTED-IN" CONDITION.

THESE SAME CHARACTERS MAY ALSO BE ACCESSED BY SETTING THE LEFT-MOST BIT OF THEIR 8-BIT ASCII REPRESENTATION. THUS AN ACCENTED U CAN BE OBTAINED BY USE OF THE OCTAL CHARACTER CODE 374. HOWEVER, THIS DOES NOT APPLY TO THE FIRST $32_{10}$ CONTROL CODES. WITH THE HIGH ORDER BIT SET, THOSE CODES CONTROL UNDERLINING UNLESS THE DISPLAY CONTROL CODES MODE IS IN EFFECT, IN WHICH CASE THE ASSOCIATED CONTROL CODE MNEMONIC IS PRINTED.

| DEC | OCT | 0 | DEC | OCT | 1 | DEC | OCT | 2 |
|---|---|---|---|---|---|---|---|---|
| 0 | 0 | NU | 16 | 20 | DL | 32 | 40 | |
| 1 | 1 | SH | 17 | 21 | D1 | 33 | 41 | ! |
| 2 | 2 | SX | 18 | 22 | D2 | 34 | 42 | " |
| 3 | 3 | EX | 19 | 23 | D3 | 35 | 43 | # |
| 4 | 4 | ET | 20 | 24 | D4 | 36 | 44 | $ |
| 5 | 5 | EQ | 21 | 25 | NK | 37 | 45 | % |
| 6 | 6 | AK | 22 | 26 | SY | 38 | 46 | & |
| 7 | 7 | BL | 23 | 27 | EB | 39 | 47 | ' |
| 8 | 10 | BS | 24 | 30 | CN | 40 | 50 | ( |
| 9 | 11 | HT | 25 | 31 | EM | 41 | 51 | ) |
| 10 | 12 | LF | 26 | 32 | SB | 42 | 52 | * |
| 11 | 13 | VT | 27 | 33 | EC | 43 | 53 | + |
| 12 | 14 | FF | 28 | 34 | FS | 44 | 54 | , |
| 13 | 15 | CR | 29 | 35 | GS | 45 | 55 | - |
| 14 | 16 | SO | 30 | 36 | RS | 46 | 56 | . |
| 15 | 17 | SI | 31 | 37 | US | 47 | 57 | / |

SPANISH ALTERNATE CHARACTER SET

FIG 28A

| DEC | OCT | 3 | DEC | OCT | 4 | DEC | OCT | 5 |
|---|---|---|---|---|---|---|---|---|
| 48 | 60 | 0 | 64 | 100 | @ | 80 | 120 | P |
| 49 | 61 | 1 | 65 | 101 | A | 81 | 121 | Q |
| 50 | 62 | 2 | 66 | 102 | B | 82 | 122 | R |
| 51 | 63 | 3 | 67 | 103 | C | 83 | 123 | S |
| 52 | 64 | 4 | 68 | 104 | D | 84 | 124 | T |
| 53 | 65 | 5 | 69 | 105 | E | 85 | 125 | U |
| 54 | 66 | 6 | 70 | 106 | F | 86 | 126 | V |
| 55 | 67 | 7 | 71 | 107 | G | 87 | 127 | W |
| 56 | 70 | 8 | 72 | 110 | H | 88 | 130 | X |
| 57 | 71 | 9 | 73 | 111 | I | 89 | 131 | Y |
| 58 | 72 | : | 74 | 112 | J | 90 | 132 | Z |
| 59 | 73 | ; | 75 | 113 | K | 91 | 133 | ¡ |
| 60 | 74 | < | 76 | 114 | L | 92 | 134 | Ñ |
| 61 | 75 | = | 77 | 115 | M | 93 | 135 | ¿ |
| 62 | 76 | > | 78 | 116 | N | 94 | 136 | ° |
| 63 | 77 | ? | 79 | 117 | O | 95 | 137 | _ |

FIG 28B

| DEC | OCT | 6 | DEC | OCT | 7 |
|---|---|---|---|---|---|
| 96 | 140 | ` | 112 | 160 | p |
| 97 | 141 | a | 113 | 161 | q |
| 98 | 142 | b | 114 | 162 | r |
| 99 | 143 | c | 115 | 163 | s |
| 100 | 144 | d | 116 | 164 | t |
| 101 | 145 | e | 117 | 165 | u |
| 102 | 146 | f | 118 | 166 | v |
| 103 | 147 | g | 119 | 167 | w |
| 104 | 150 | h | 120 | 170 | x |
| 105 | 151 | i | 121 | 171 | y |
| 106 | 152 | j | 122 | 172 | z |
| 107 | 153 | k | 123 | 173 | { |
| 108 | 154 | l | 124 | 174 | n̄ |
| 109 | 155 | m | 125 | 175 | } |
| 110 | 156 | n | 126 | 176 | ~ |
| 111 | 157 | o | 127 | 177 | ▒ |

FIG 28C

OCTAL AND DECIMAL CHARACTER CODES SHOWN ASSUME THAT THEY ARE ISSUED SUBSEQUENT TO A "SHIFT OUT". THAT IS, THAT THEY ARE NOT EMPLOYED DURING A "SHIFTED-IN CONDITION.

THESE SAME CHARACTERS MAY ALSO BE ACCESSED BY SETTING THE LEFT-MOST BIT OF THEIR 8-BIT ASCII REPRESENTATION. THUS A ROTATED QUESTION MARK CAN BE OBTAINED BY USE OF THE OCTAL CHARACTER CODE 335. HOWEVER THIS DOES NOT APPLY TO THE FIRST $32_{10}$ CONTROL CODES. WITH THE HIGH ORDER BIT SET, THOSE CODES CONTROL UNDERLINING UNLESS THE DISPLAY CONTROL CODES MODE IS IN EFFECT, IN WHICH CASE THE ASSOCIATED CONTROL CODE MNEMONIC IS PRINTED.

| DEC | OCT | 0 | DEC | OCT | 1 | DEC | OCT | 2 |
|---|---|---|---|---|---|---|---|---|
| 0 | 0 | [illegible] | 16 | 20 | [illegible] | 32 | 40 | |
| 1 | 1 | [illegible] | 17 | 21 | [illegible] | 33 | 41 | ｡ |
| 2 | 2 | [illegible] | 18 | 22 | [illegible] | 34 | 42 | ｢ |
| 3 | 3 | [illegible] | 19 | 23 | [illegible] | 35 | 43 | ｣ |
| 4 | 4 | [illegible] | 20 | 24 | [illegible] | 36 | 44 | ､ |
| 5 | 5 | [illegible] | 21 | 25 | [illegible] | 37 | 45 | ･ |
| 6 | 6 | [illegible] | 22 | 26 | [illegible] | 38 | 46 | ｦ |
| 7 | 7 | [illegible] | 23 | 27 | [illegible] | 39 | 47 | ｧ |
| 8 | 10 | [illegible] | 24 | 30 | [illegible] | 40 | 50 | ｨ |
| 9 | 11 | [illegible] | 25 | 31 | [illegible] | 41 | 51 | ｩ |
| 10 | 12 | [illegible] | 26 | 32 | [illegible] | 42 | 52 | ｪ |
| 11 | 13 | [illegible] | 27 | 33 | [illegible] | 43 | 53 | ｫ |
| 12 | 14 | [illegible] | 28 | 34 | [illegible] | 44 | 54 | ｬ |
| 13 | 15 | [illegible] | 29 | 35 | [illegible] | 45 | 55 | ｭ |
| 14 | 16 | [illegible] | 30 | 36 | [illegible] | 46 | 56 | ｮ |
| 15 | 17 | [illegible] | 31 | 37 | [illegible] | 47 | 57 | ｯ |

FIG 29 A

KATAKANA ALTERNATE CHARACTER SET

| DEC | OCT | 3 | DEC | OCT | 4 | DEC | OCT | 5 |
|---|---|---|---|---|---|---|---|---|
| 48 | 60 | - | 64 | 100 | ﾀ | 80 | 120 | ﾐ |
| 49 | 61 | ｱ | 65 | 101 | ﾁ | 81 | 121 | ﾑ |
| 50 | 62 | ｲ | 66 | 102 | ﾂ | 82 | 122 | ﾒ |
| 51 | 63 | ｳ | 67 | 103 | ﾃ | 83 | 123 | ﾓ |
| 52 | 64 | ｴ | 68 | 104 | ﾄ | 84 | 124 | ﾔ |
| 53 | 65 | ｵ | 69 | 105 | ﾅ | 85 | 125 | ﾕ |
| 54 | 66 | ｶ | 70 | 106 | ﾆ | 86 | 126 | ﾖ |
| 55 | 67 | ｷ | 71 | 107 | ﾇ | 87 | 127 | ﾗ |
| 56 | 70 | ｸ | 72 | 110 | ﾈ | 88 | 130 | ﾘ |
| 57 | 71 | ｹ | 73 | 111 | ﾉ | 89 | 131 | ﾙ |
| 58 | 72 | ｺ | 74 | 112 | ﾊ | 90 | 132 | ﾚ |
| 59 | 73 | ｻ | 75 | 113 | ﾋ | 91 | 133 | ﾛ |
| 60 | 74 | ｼ | 76 | 114 | ﾌ | 92 | 134 | ﾜ |
| 61 | 75 | ｽ | 77 | 115 | ﾍ | 93 | 135 | ﾝ |
| 62 | 76 | ｾ | 78 | 116 | ﾎ | 94 | 136 | ﾞ |
| 63 | 77 | ｿ | 79 | 117 | ﾏ | 95 | 137 | ﾟ |

FIG 29B

| DEC | OCT | 6 | DEC | OCT | 7 |
|---|---|---|---|---|---|
| 96 | 140 | ¥ | 112 | 160 | |
| 97 | 141 | | 113 | 161 | |
| 98 | 142 | | 114 | 162 | |
| 99 | 143 | | 115 | 163 | |
| 100 | 144 | | 116 | 164 | |
| 101 | 145 | | 117 | 165 | |
| 102 | 146 | | 118 | 166 | |
| 103 | 147 | | 119 | 167 | |
| 104 | 150 | | 120 | 170 | |
| 105 | 151 | | 121 | 171 | |
| 106 | 152 | | 122 | 172 | |
| 107 | 153 | | 123 | 173 | |
| 108 | 154 | | 124 | 174 | |
| 109 | 155 | | 125 | 175 | |
| 110 | 156 | | 126 | 176 | |
| 111 | 157 | | 127 | 177 | ▒ |

FIG 29C

OCTAL AND DECIMAL CHARACTER CODES SHOWN ASSUME THAT THEY ARE ISSUED SUBSEQUENT TO A "SHIFT OUT". THAT IS, THAT THEY ARE NOT EMPLOYED DURING A "SHIFTED-IN" CONDITION.

THESE SAME CHARACTERS MAY ALSO BE ACCESSED BY SETTING THE LEFT-MOST BIT OF THEIR 8-BIT ASCII REPRESENTATION. THUS A "CAPITAL I" CAN BE OBTAINED BY USE OF THE OCTAL CHARACTER CODE 264. HOWEVER, THIS DOES NOT APPLY TO THE FIRST $32_{10}$ CONTROL CODES.

WITH THE HIGH ORDER BIT SET, THOSE CODES CONTROL UNDERLINING UNLESS THE DISPLAY CONTROL CODES MODE IS IN EFFECT, IN WHICH CASE THE ASSOCIATED CONTROL CODE MNEMONIC IS PRINTED.

| | ADDRESS | WORDS OR BYTES IN RAM | | | | | |
|---|---|---|---|---|---|---|---|
| WORD 1 | N | | | | | | $X_1$ |
| WORD 2 | N+1 | 1 | 1 | 1 | 1 | | $X_2$ |
| • | N+2 | | 1 | | | 1 | $X_3$ |
| • | N+3 | | 1 | | | 1 | $X_4$ |
| • | N+4 | | 1 | 1 | 1 | | $X_5$ |
| • | N+5 | | 1 | | | 1 | $X_6$ |
| • | N+6 | | 1 | | | 1 | $X_7$ |
| WORD 8 | N+7 | 1 | 1 | 1 | 1 | | $X_8$ |

← ADDITIONAL DATA BYTE.

$X_1$ THRU $X_8$ ARE EIGHT FLAG BITS WHICH CAN BE USED TO DESCRIBE HOW THE BITS IN THE RAM ARE TO BE USED TO REPRESENT THE GIVEN CHARACTER.

FIG 32

THIS PROGRAM

```
10   OPTION BASE 1
20   PRINTER IS 0
30   DEG
40   DIM A$(360)[72],Char$(0:6)
41   FOR I=0 TO 6
42   Char$(I)=CHR$(2^(7-I))
43   NEXT I
90   FOR I=1 TO 360
100  I1=175*SIN(I)  ! CALCULATE FUNCTION
110  I2=264+INT(I1)
111  A$(I)=CHR$(27)&"?"&RPT$(CHR$(0),70)
120  A$(I)[I2 DIV 7;1]=Char$(I2 MOD 7)
130  PRINT USING "#,K";A$(I)
150  NEXT I
151  BEEP
152  PAUSE
160  PRINT USING "#,K";A$(*) ! DUMP GRAPH
170  PRINT USING "#,K";A$(*) ! DUMP GRAPH AGAIN
180  STOP
190  END
```

PRODUCES THIS PLOTTED OUTPUT

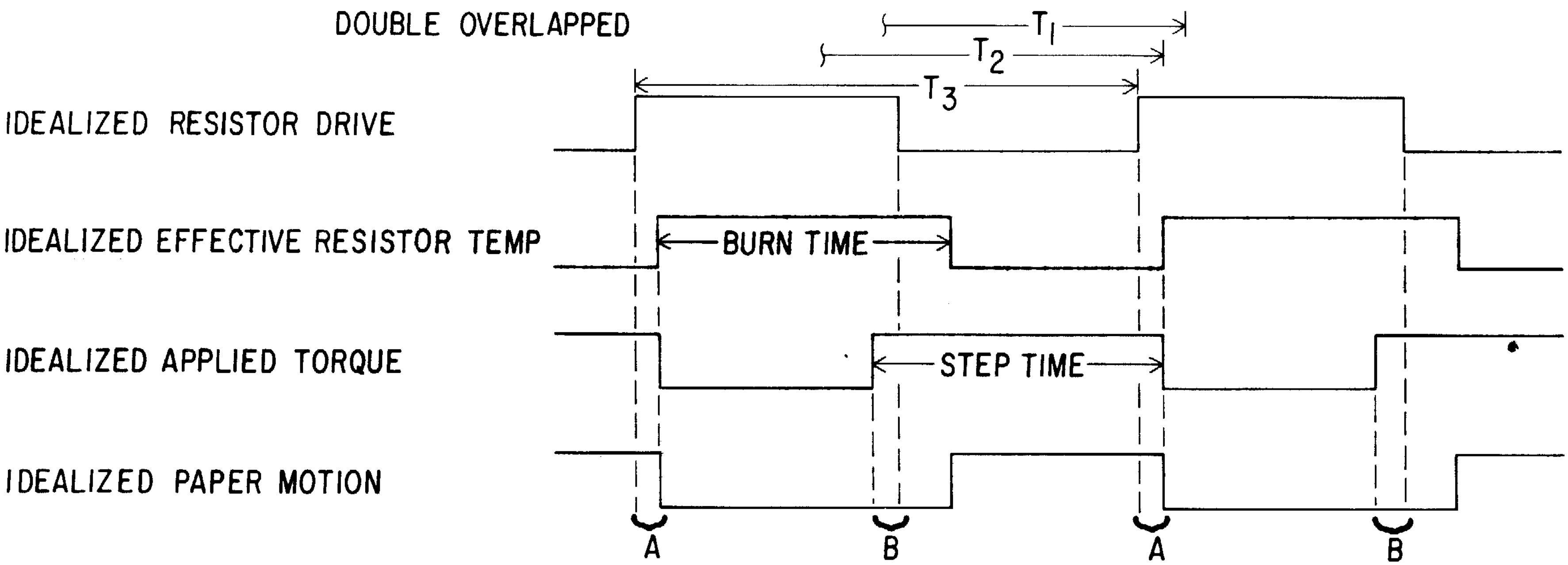

A= HEAD DRIVE OVERLAPS END OF PAPER DRIVE AT START OF BURN CYCLE. THIS IS POSSIBLE BECAUSE OF THERMAL INERTIA IN HEAD.

B= PAPER DRIVE OVERLAPS END OF HEAD DRIVE AT END OF BURN CYCLE. THIS IS POSSIBLE BECAUSE "EFFECTIVE COOL-OFF" TIME IN HEAD IS SHORTER THAN COMPLIANCE TIME IN PAPER DRIVE MECHANISM.

EVEN THOUGH THE BURN TIME AND THE STEP TIME ARE THE SAME IN ALL CASES, THE TOTAL TIME FOR AN OVERLAPPED BURN IS LESS THAN FOR A NON OVERLAPPED BURN: $T_3 < T_2 < T_1$.

FIG 37C

THIS PROGRAM

```
10   PLOTTER IS 13,"GRAPHICS"
20   GRAPHICS
30   LOCATE 10,95*RATIO,20,95
40   SCALE 0,6*PI,-.3,1
50   AXES .5*PI,.1,0,0,2,1
60   LORG 8
70   LDIR PI/2
80   FOR X=1 TO 6
90       MOVE X*PI,-.35
100      LABEL USING 110;X
110      IMAGE  D,"*PI"
120      NEXT X
130  LDIR 0
140  FOR Y=-.2 TO 1 STEP .1
150      MOVE -.3,Y
160      LABEL USING "MZ.D";Y
170      NEXT Y
180  PENUP
190  FOR X=.01 TO 6*PI STEP PI/20
200      PLOT X,SIN(X)/X
210      NEXT X
220  MOVE 3*PI,.8
230  LORG 4
240  CSIZE 5
250  LABEL USING "K";"PLOT OF SIN(X)/X"
260  LABEL USING "K";"FROM 0 TO 6*PI"
270  DUMP GRAPHICS
280  END
```

PRODUCES THIS CRT-TO-PRINTER DUMP

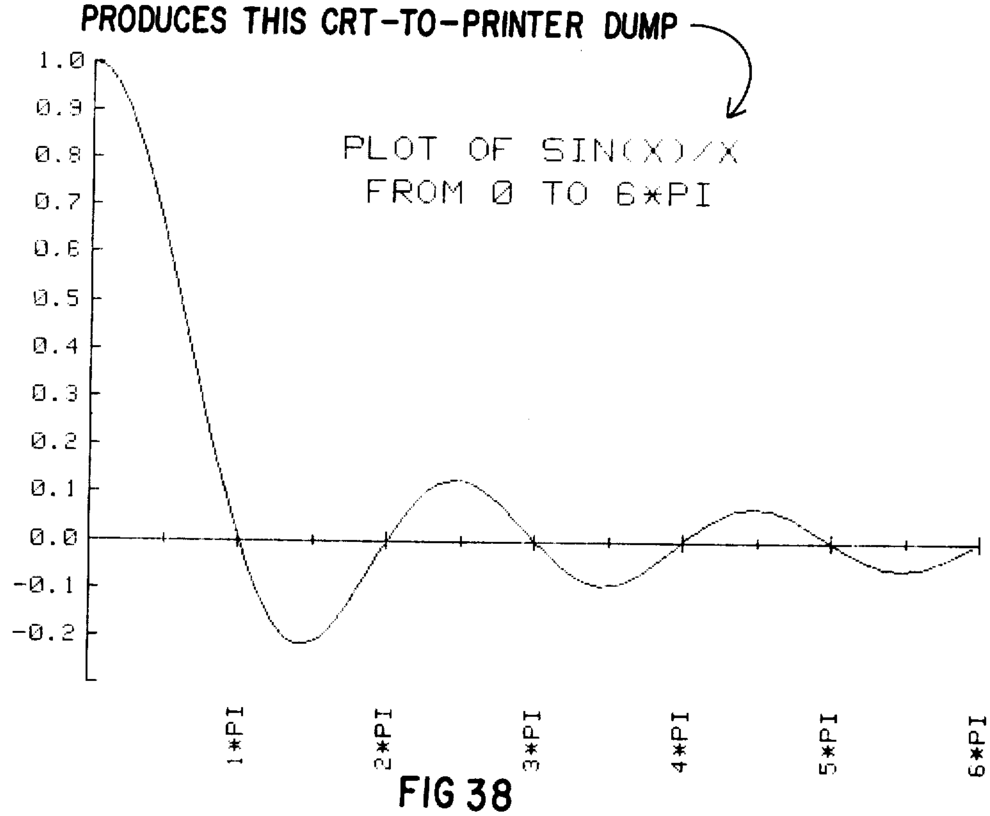

FIG 38

| | Octal Address | Name | Location | Description (# of Bits) |
|---|---|---|---|---|
| | 0 | A | BPC | Arithmetic Accumulator (16) |
| | 1 | B | BPC | Arithmetic Accumulator (16) |
| | 2 | P | BPC | Program Location Counter (least 15 of 16) |
| | 3 | R | BPC | Return Stack Pointer (least 15 of 16) |
| | 4 | R4 | IOC | Peripheral Activity Designator (—) |
| | 5 | R5 | IOC | Peripheral Activity Designation (—) |
| | 6 | R6 | IOC | Peripheral Activity Designator (—) |
| | 7 | R7 | IOC | Peripheral Activity Designator (—) |
| | 10 | IV | IOC | Interrupt Vector (upper 12 of 16) |
| * → | 11 | PA | IOC | Peripheral Address Register (least 4 of 16) |
| | 12 | W | IOC | Working Register (16) |
| † → | 13 | DMAPA | IOC | 2 MSB = CB & DB; 4 LSB = DMA Periph. Add. Reg. |
| | 14 | DMAMA | IOC | DMA Memory Address & Direction Register (16) |
| | 15 | DMAC | IOC | DMA Count Register (16) |
| | 16 | C | IOC | Stack Pointer (16) |
| | 7 | D | IOC | Stack Pointer (16) |
| | 20-23 | AR2 | EMC | BCD Arithmetic Accumulator (4 x 16) |
| | 24 | SE | EMC | Shift Extend Register (least 4 of 16) |
| * → | 25-27 | X | EMC | Internal Arithmetic Register (3 X 16) |
| | 30-37 | UNASSIGNED | | |
| | 77770/ 177770 | AR1 | R/W | BCD Arithmetic Register (4 x 16) |

* Not available for general use. Part of processes internal to a chip.

† Read register $13_8$ produces:

CB and DB are actually discrete registers, and while they can only be read by reading R13, storinging into R13 will not alter their values. Use the CBL, CBU, DBL and DBU machine instructions for that purpose.

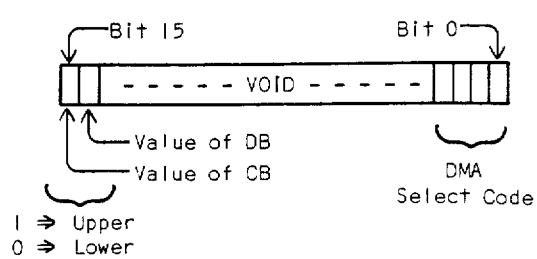

FIG 48

NOTES

1. THIS I/O BUS CYCLE WAS INITIATED BY ANY WRITE-INTO-MEMORY INSTRUCTION WHICH REFERENCED ONE OF R4 THRU R7.
2. CONTROL INFORMATION IS VALID ON BOTH EDGES OF IOSB.
3. DATA IS LATCHED INTO THE INTERFACE ON THE TRAILING EDGE OF IOSB.

WRITE I/O BUS CYCLE

1. THIS I/O BUS CYCLE WAS INITIATED BY ANY READ-FROM-MEMORY INSTRUCTION WHICH REFERENCED ONE OF R4 THRU R7.
2. CONTROL INFORMATION IS VALID ON BOTH EDGES OF IOSB.
3. DATA FROM THE INTERFACE IS LATCHED INTO THE BPC DURING T4.

READ I/O BUS CYCLE

JSM,I THROUGH THE INTERRUPT TABLE WITH "FORCED" MULTI-LEVEL INDIRECT ADDRESSING

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| M | $E_s$ | TWO'S COMPLEMENT EXPONENT | | | | | | | | | EMPTY | | | | | $M_s$ |
| M + 1 | $D_1$ | | | | $D_2$ | | | | $D_3$ | | | | $D_4$ | | | |
| M + 2 | $D_5$ | | | | $D_6$ | | | | $D_7$ | | | | $D_8$ | | | |
| M + 3 | $D_9$ | | | | $D_{10}$ | | | | $D_{11}$ | | | | $D_{12}$ | | | |

| THE BCD DIGITS | | | |
|---|---|---|---|
| 0 | 0000 | 5 | 0101 |
| 1 | 0001 | 6 | 0110 |
| 2 | 0010 | 7 | 0111 |
| 3 | 0011 | 8 | 1000 |
| 4 | 0100 | 9 | 1001 |

THE INTERNAL FLOATING POINT REPRESENTATION OF

.003587219 ($=3.587219 \times 10^{-3}$)

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| M | 1 | 1 | 1 | 1 | 1 | 1 | 1 | 1 | 0 | 1 | 0 | 0 | 0 | 0 | 0 | 0 |
| M + 1 | 0011 | | | | 0101 | | | | 1000 | | | | 0111 | | | |
| M + 2 | 0010 | | | | 0001 | | | | 1001 | | | | 0000 | | | |
| M + 3 | 0000 | | | | 0000 | | | | 0000 | | | | 0000 | | | |

FIG 58

(1) $480/15 = 32$ (2) THEN $(32)\cdot(15) = 480$ (3) $(32)\cdot(15) = (30+2)\cdot(15) = (30)\cdot(15) + (2)\cdot(15)$ (4) $= (3)\cdot(150) + (2)\cdot(15)$ $$Q_n = (<B_{0-3}> +1) + (<B_{0-3}> +1) + <B_{0-3}>$$

AFTER 1st USE OF FDV

AFTER 2nd USE OF FDV

AFTER FINAL USE OF FDV $$Q_n = (<B_{0-3}> +1) + (<B_{0-3}> +1) + (<B_{0-3}> +1)$$

AFTER 1st USE OF FDV

AFTER 2nd USE OF FDV

AFTER FINAL USE OF FDV

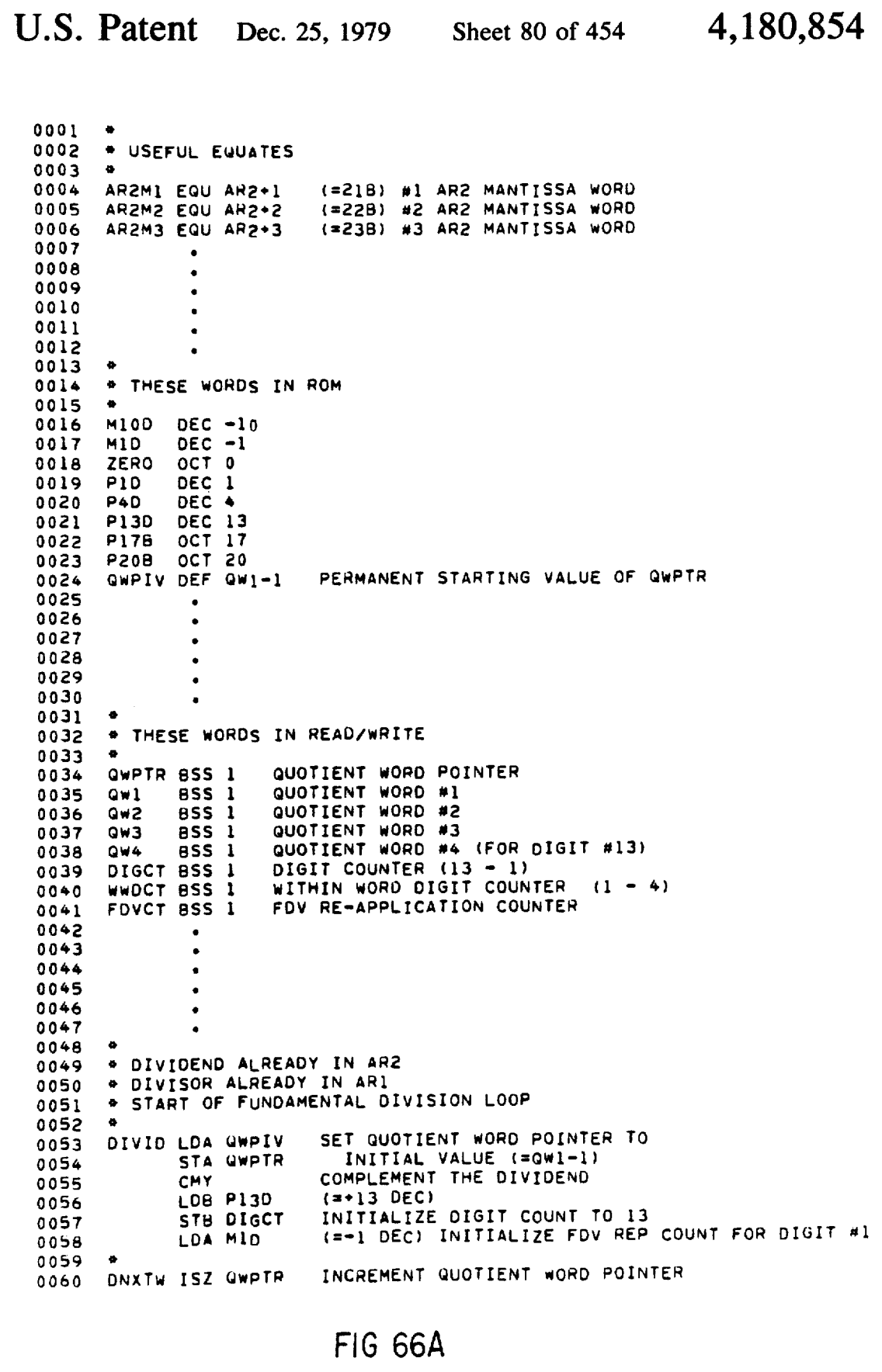

```
*
* USEFUL EQUATES
*
AR2M1 EQU AR2+1     (=21B) #1 AR2 MANTISSA WORD
AR2M2 EQU AR2+2     (=22B) #2 AR2 MANTISSA WORD
AR2M3 EQU AR2+3     (=23B) #3 AR2 MANTISSA WORD
            .
            .
            .
            .
            .
            .
*
* THESE WORDS IN ROM
*
M10D   DEC -10
M1D    DEC -1
ZERO   OCT 0
P1D    DEC 1
P4D    DEC 4
P13D   DEC 13
P17B   OCT 17
P20B   OCT 20
QWPIV  DEF QW1-1    PERMANENT STARTING VALUE OF QWPTR
            .
            .
            .
            .
            .
            .
*
* THESE WORDS IN READ/WRITE
*
QWPTR BSS 1    QUOTIENT WORD POINTER
QW1   BSS 1    QUOTIENT WORD #1
QW2   BSS 1    QUOTIENT WORD #2
QW3   BSS 1    QUOTIENT WORD #3
QW4   BSS 1    QUOTIENT WORD #4 (FOR DIGIT #13)
DIGCT BSS 1    DIGIT COUNTER (13 - 1)
WWDCT BSS 1    WITHIN WORD DIGIT COUNTER  (1 - 4)
FDVCT BSS 1    FDV RE-APPLICATION COUNTER
            .
            .
            .
            .
            .
            .
*
* DIVIDEND ALREADY IN AR2
* DIVISOR ALREADY IN AR1
* START OF FUNDAMENTAL DIVISION LOOP
*
DIVID LDA QWPIV    SET QUOTIENT WORD POINTER TO
      STA QWPTR      INITIAL VALUE (=QW1-1)
      CMY          COMPLEMENT THE DIVIDEND
      LDB P13D     (=+13 DEC)
      STB DIGCT    INITIALIZE DIGIT COUNT TO 13
      LDA M1D      (=-1 DEC) INITIALIZE FDV REP COUNT FOR DIGIT #1
*
DNXTW ISZ QWPTR    INCREMENT QUOTIENT WORD POINTER
```

FIG 66A

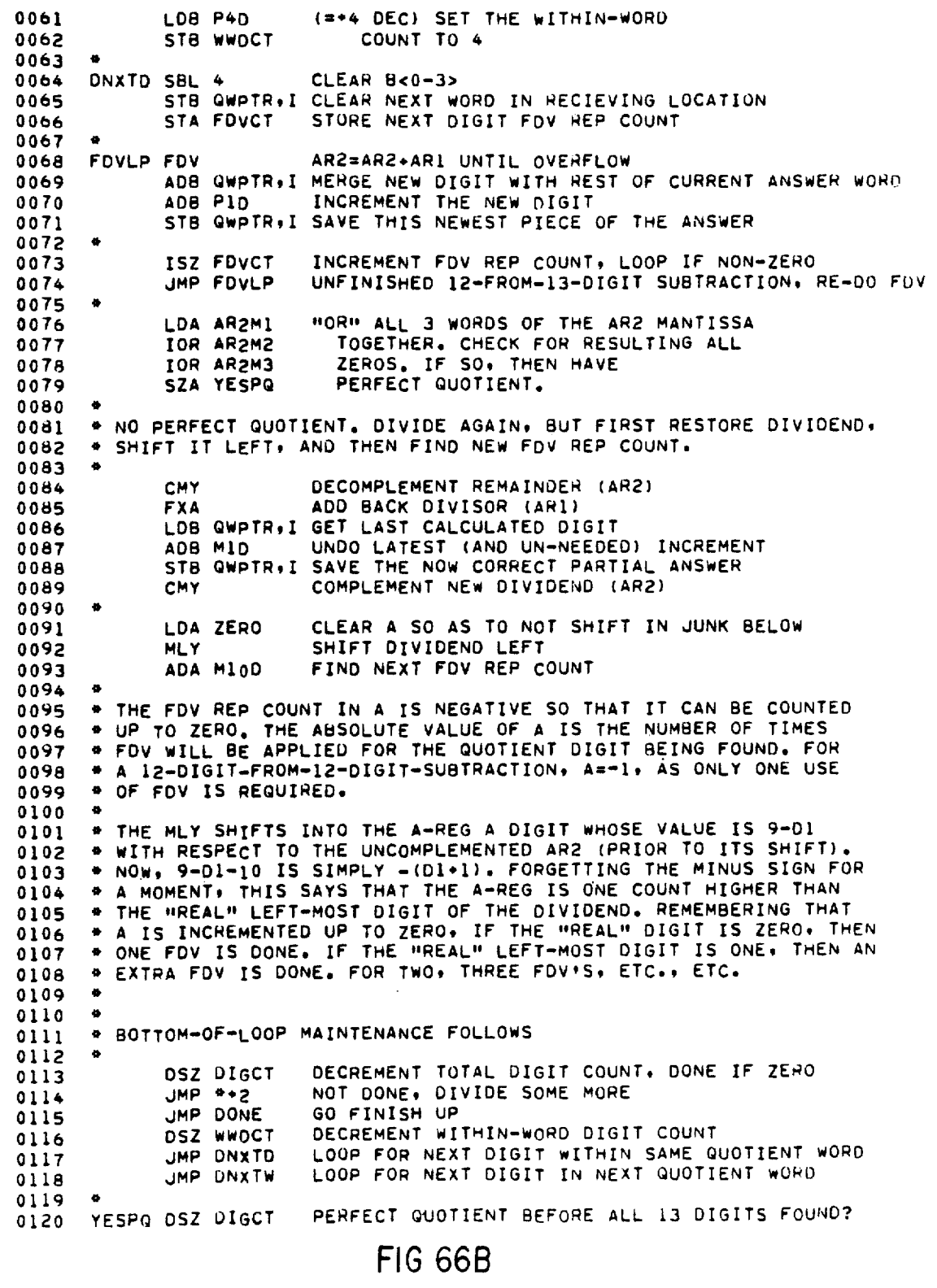

```
      LDB P4D     (=+4 DEC) SET THE WITHIN-WORD
      STB WWDCT       COUNT TO 4
*
DNXTD SBL 4       CLEAR B<0-3>
      STB QWPTR,I CLEAR NEXT WORD IN RECIEVING LOCATION
      STA FDVCT   STORE NEXT DIGIT FDV REP COUNT
*
FDVLP FDV         AR2=AR2+AR1 UNTIL OVERFLOW
      ADB QWPTR,I MERGE NEW DIGIT WITH REST OF CURRENT ANSWER WORD
      ADB P1D     INCREMENT THE NEW DIGIT
      STB QWPTR,I SAVE THIS NEWEST PIECE OF THE ANSWER
*
      ISZ FDVCT   INCREMENT FDV REP COUNT, LOOP IF NON-ZERO
      JMP FDVLP   UNFINISHED 12-FROM-13-DIGIT SUBTRACTION, RE-DO FDV
*
      LDA AR2M1   "OR" ALL 3 WORDS OF THE AR2 MANTISSA
      IOR AR2M2     TOGETHER. CHECK FOR RESULTING ALL
      IOR AR2M3     ZEROS. IF SO, THEN HAVE
      SZA YESPQ     PERFECT QUOTIENT.
*
* NO PERFECT QUOTIENT. DIVIDE AGAIN, BUT FIRST RESTORE DIVIDEND,
* SHIFT IT LEFT, AND THEN FIND NEW FDV REP COUNT.
*
      CMY         DECOMPLEMENT REMAINDER (AR2)
      FXA         ADD BACK DIVISOR (AR1)
      LDB QWPTR,I GET LAST CALCULATED DIGIT
      ADB M1D     UNDO LATEST (AND UN-NEEDED) INCREMENT
      STB QWPTR,I SAVE THE NOW CORRECT PARTIAL ANSWER
      CMY         COMPLEMENT NEW DIVIDEND (AR2)
*
      LDA ZERO    CLEAR A SO AS TO NOT SHIFT IN JUNK BELOW
      MLY         SHIFT DIVIDEND LEFT
      ADA M10D    FIND NEXT FDV REP COUNT
*
* THE FDV REP COUNT IN A IS NEGATIVE SO THAT IT CAN BE COUNTED
* UP TO ZERO. THE ABSOLUTE VALUE OF A IS THE NUMBER OF TIMES
* FDV WILL BE APPLIED FOR THE QUOTIENT DIGIT BEING FOUND. FOR
* A 12-DIGIT-FROM-12-DIGIT-SUBTRACTION, A=-1, AS ONLY ONE USE
* OF FDV IS REQUIRED.
*
* THE MLY SHIFTS INTO THE A-REG A DIGIT WHOSE VALUE IS 9-D1
* WITH RESPECT TO THE UNCOMPLEMENTED AR2 (PRIOR TO ITS SHIFT).
* NOW, 9-D1-10 IS SIMPLY -(D1+1). FORGETTING THE MINUS SIGN FOR
* A MOMENT, THIS SAYS THAT THE A-REG IS ONE COUNT HIGHER THAN
* THE "REAL" LEFT-MOST DIGIT OF THE DIVIDEND. REMEMBERING THAT
* A IS INCREMENTED UP TO ZERO, IF THE "REAL" DIGIT IS ZERO, THEN
* ONE FDV IS DONE. IF THE "REAL" LEFT-MOST DIGIT IS ONE, THEN AN
* EXTRA FDV IS DONE. FOR TWO, THREE FDV'S, ETC., ETC.
*
*
* BOTTOM-OF-LOOP MAINTENANCE FOLLOWS
*
      DSZ DIGCT   DECREMENT TOTAL DIGIT COUNT, DONE IF ZERO
      JMP *+2     NOT DONE, DIVIDE SOME MORE
      JMP DONE    GO FINISH UP
      DSZ WWDCT   DECREMENT WITHIN-WORD DIGIT COUNT
      JMP DNXTD   LOOP FOR NEXT DIGIT WITHIN SAME QUOTIENT WORD
      JMP DNXTW   LOOP FOR NEXT DIGIT IN NEXT QUOTIENT WORD
*
YESPQ DSZ DIGCT   PERFECT QUOTIENT BEFORE ALL 13 DIGITS FOUND?
```

FIG 66B

```
      JMP YES
      JMP DONE    NO, PERFECT QUOTIENT ON DIGIT #13
*
      SBL 4
YES   DSZ WWDCT   SHIFT LATEST DIGITS TO LEFT AS NECESSARY
      JMP *-2
*
DONE  STB QWPTR,I STORE LAST DIGITS OF QUOTIENT
      LDA QWPIV   SET "FROM" X-FER ADDRESS
      ADA P1D
      LDB P20B    SET "TO" X-FER ADDRESS
      XFR 4       X-FER QUOTIENT TO AR2
*
      NRM         NORMALIZE THE QUOTIENT IF NEEDED
      SZB GO.ON   GO ON IF IT WAS ALREADY OK, JOE
*
* HERE, THE FIRST DIGIT OF THE QUOTIENT WAS A ZERO. NRM GOT RID
* OF THAT AND NOW WE PUT THE OLD DIGIT #13 IN AS THE NEW DIGIT #12.
*
      LDA QW4     GET DIGIT #13
      AND P17B    RESTRICT IT TO 4 BITS
* ABOVE INST NEEDED ONLY IF QW4 USED ELSEWHERE FOR OTHER THINGS
      ADA QW3     PUT IT IN AS NEW DIGIT #12 (OLD DIGIT #12=0)
      STA QW3     RESTORE THIRD WORD OF QUOTIENT
      LDB         SET EXPONENT ADJUST FLAG
       .
       .
       .
       .
       .
       .
       .
GO.ON .............
       .
       .
       .
       .
       .
       .
```

FIG 66C

INTRODUCTION TO THE MACHINE INSTRUCTIONS

NOTATION

Assembly language machine instructions are three-letter mnemonics. Each machine instruction source statement corresponds to a machine-operation in the object program produced by the assembler. Notation used in representing source statements is explained below:

| | |
|---|---|
| label | Optional statement label. Labels must begin with an alphabetic character, period, or certain other non-numeric characters. Labels may be one through five characters in length. If present, a label must begin in column 1. A space terminates a label. If a statement does not have label, then column 1 must be a blank. |
| m | Memory location. This can be an octal or decimal integer, a symbol used as a label elsewhere, or, an expression composed of a combination of these combined through + and - operators. Parentheses are not permitted in expressions. |
| n (lower case) | Numerical quantity. A numeric value that is not an address, but represents a shift or skip amount. |
| N (upper case) | Octal or decimal constant whose value is restricted to the range: $1 \leq N \leq 20_8 = 16_{10}$<br>ASMA allows N to also be any expression, provided that the value of the expression is within the stated range. |
| I | Indirect addressing indicator for memory reference instructions. Also indicates an automatic increment for place and withdraw instructions. |
| D | Decrement indicator for place and withdraw instructions. |
| P | Indicator used in Return instructions to instruct the IOC to pop its peripheral address stack. |
| reg. 0-7 | Register location. This can be an octal or decimal integer, or an assembler-pre-defined symbol. It might even be an expression. Regardless of what it is, it must have a value of $0_8$ through $7_8$, inclusive. |
| reg. 4-7 | Register location. Same rules as for reg. 0-7 above, except the value must be $4_8$ - $7_8$, inclusive. |
| .../... | The slash indicates the item on either side (but not both) may be used at this place in the source statement. |
| comments | Optional comments. Comments must be separated by at least one space from the material to the left of the comment. |
| [ ] | Brackets indicate that the item contained within them is optional. |

FIG 67

BPC MACHINE INSTRUCTIONS

MEMORY REFERENCE GROUP

```
label | LDA | m [ ,I ] | comments
Load A from m.

label | LDB | m [ ,I ] | comments
Load B from m.

label | CPA | m [ ,I ] | comments
Compare the contents of m with the contents of A;
skip if unequal.

label | CPB | m [ ,I ] | comments
Compare the contents of m with the contents of B;
skip if unequal.

label | ADA | m [ ,I ] | comments
Add the contents of m to A.

label | ADB | m [ ,I ] | comments
Add the contents of m to B.

label | STA | m [ ,I ] | comments
Store the contents of A in m.

label | STB | m [ ,I ] | comments
Store the contents of B in m.
```

MEMORY REFERENCE GROUP (CONT.)

```
label | JSM | m [ ,I ] | comments
Jump to subroutine.

label | JMP | m [ ,I ] | comments
Jump to m.

label | ISZ | m [ ,I ] | comments
Increment m; skip if zero.

label | DSZ | m [ ,I ] | comments
Decrement m; skip if zero.

label | AND | m [ ,I ] | comments
Logical "and" of A and m; the result is left in A.

label | IOR | m [ ,I ] | comments
Inclusive (ordinary) "or" of A and m; the result is
left in A.

label | RET | m [ ,P ] | comments
Return.
```

FIG 68A

BPC MACHINE INSTRUCTIONS

SHIFT-ROTATE GROUP

| | | | |
|---|---|---|---|
| label | AAR | n | comments |

Arithmetic right shift of A.

| | | | |
|---|---|---|---|
| label | ABR | n | comments |

Arithmetic right shift of B.

| | | | |
|---|---|---|---|
| label | SAR | n | comments |

Shift A right.

| | | | |
|---|---|---|---|
| label | SBR | n | comments |

Shift B right.

| | | | |
|---|---|---|---|
| label | SAL | n | comments |

Shift A left.

| | | | |
|---|---|---|---|
| label | SBL | n | comments |

Shift B left.

| | | | |
|---|---|---|---|
| label | RAR | n | comments |

Rotate A right.

| | | | |
|---|---|---|---|
| label | RBR | n | comments |

Rotate B right.

ALTER GROUP

| | | | |
|---|---|---|---|
| label | SLA | * ± n/m [ ,S/,C ] | comments |

Skip if the least significant bit of A is zero.

| | | | |
|---|---|---|---|
| label | SLB | * ± n/m [ ,S/,C ] | comments |

Skip if the least significant bit of B is zero.

| | | | |
|---|---|---|---|
| label | RLA | * ± n/m [ ,S/,C ] | comments |

Skip if the least significant bit of A is non-zero.

| | | | |
|---|---|---|---|
| label | RLB | * ± n/m [ ,S/,C ] | comments |

Skip if the least significant bit of B is non-zero.

| | | | |
|---|---|---|---|
| label | SAP | * ± n/m [ ,S/,C ] | comments |

Skip if A positive.

| | | | |
|---|---|---|---|
| label | SBP | * ± n/m [ ,S/,C ] | comments |

Skip if B positive.

| | | | |
|---|---|---|---|
| label | SAM | * ± n/m [ ,S/,C ] | comments |

Skip if A minus.

| | | | |
|---|---|---|---|
| label | SBM | * ± n/m [ ,S/,C ] | comments |

Skip if B minus.

FIG 68B

BPC MACHINE INSTRUCTIONS

ALTER GROUP (CONT.)

| | | | |
|---|---|---|---|
| label | SOS | * ± n/m [ ,S/,C ] | comments |

Skip if overflow set.

| | | | |
|---|---|---|---|
| label | SOC | * ± n/m [ ,S/,C ] | comments |

Skip if overflow clear.

| | | | |
|---|---|---|---|
| label | SES | * ± n/m [ ,S/,C ] | comments |

Skip if extend set.

| | | | |
|---|---|---|---|
| label | SEC | * ± n/m [ ,S/,C ] | comments |

Skip if extend clear.

SKIP GROUP

| | | | |
|---|---|---|---|
| label | SZA | * ± n/m | comments |

Skip if A zero.

| | | | |
|---|---|---|---|
| label | SZB | * ± n/m | comments |

Skip if B zero.

| | | | |
|---|---|---|---|
| label | RZA | * ± n/m | comments |

Skip if A not zero.

| | | | |
|---|---|---|---|
| label | RZB | * ± n/m | comments |

Skip if B not zero.

SKIP GROUP (CONT.)

| | | | |
|---|---|---|---|
| label | SIA | * ± n/m | comments |

Skip if A zero, and then increment A.

| | | | |
|---|---|---|---|
| label | SIB | * ± n/m | comments |

Skip if B zero, and then increment B.

| | | | |
|---|---|---|---|
| label | RIA | * ± n/m | comments |

Skip if A not zero, and then increment A.

| | | | |
|---|---|---|---|
| label | RIB | * ± n/m | comments |

Skip if B not zero, and then increment B.

| | | | |
|---|---|---|---|
| label | SFS | * ± n/m | comments |

Skip if Flag line set.

| | | | |
|---|---|---|---|
| label | SFC | * ± n/m | comments |

Skip if Flag line clear.

| | | | |
|---|---|---|---|
| label | SSS | * ± n/m | comments |

Skip if Status line set.

| | | | |
|---|---|---|---|
| label | SSC | * ± n/m | comments |

Skip if Status line clear.

| | | | |
|---|---|---|---|
| label | SDS | * ± n/m | comments |

Skip if Decimal Carry set.

FIG 68C

BPC MACHINE INSTRUCTIONS

SKIP GROUP (CONT.)

| | | | |
|---|---|---|---|
| label | SDC | * ± n/m | comments |

Skip if Decimal Carry clear.

| | | | |
|---|---|---|---|
| label | SHS | * ± n/m | comments |

Skip if Halt line set.

| | | | |
|---|---|---|---|
| label | SHC | * ± n/m | comments |

Skip if Halt line clear.

COMPLEMENT-EXECUTE GROUP

| | | |
|---|---|---|
| label | CMA | comments |

Complement A.

| | | |
|---|---|---|
| label | CMB | comments |

Complement B.

| | | |
|---|---|---|
| label | TCA | comments |

Two's complement A.

| | | |
|---|---|---|
| label | TCB | comments |

Two's complement B.

| | | | |
|---|---|---|---|
| label | EXE | $0 \leq m \leq 37_8$ [ ,I ] | comments |

Execute register m.

FIG 68D

IOC MACHINE INSTRUCTIONS

STACK GROUP

| label | PWC | reg. 0-7 [,I/,D] | comments |
|---|---|---|---|

Place the entire word of reg. into the stack pointed at by C.

| label | PWD | reg. 0-7 [,I/,D] | comments |
|---|---|---|---|

Place the entire word of reg. into the stack pointed at by D.

| label | PBC | reg. 0-7 [,I/,D] | comments |
|---|---|---|---|

Place the right half of reg. into the stack pointed at by C.

| label | PBD | reg. 0-7 [,I/,D] | comments |
|---|---|---|---|

Place the right half of reg. into the stack pointed at by D.

| label | WWC | reg. 0-7 [,I/,D] | comments |
|---|---|---|---|

Withdraw an entire word from the stack pointed at by C, and put it into reg.

| label | WWD | reg. 0-7 [,I/,D] | comments |
|---|---|---|---|

Withdraw an entire word from the stack pointed at by D, and put it into reg.

| label | WBC | reg. 0-7 [,I/,D] | comments |
|---|---|---|---|

Withdraw a byte from the stack pointed at by C, and put it into the right half of reg.

STACK GROUP (CONT.)

| label | WBD | reg. 0-7 [,I/,D] | comments |
|---|---|---|---|

Withdraw a byte from the stack pointed at by D, and put it into the right half of reg.

| label | CBL | comments |
|---|---|---|

C Block Lower. Clears the CB register.

| label | CBU | comments |
|---|---|---|

C Block Upper. Sets the CB register.

| label | DBL | comments |
|---|---|---|

D Block Lower. Clears the DB register.

| label | DBU | comments |
|---|---|---|

D Block Upper. Sets the DB register.

I/O GROUP

| label | mem. ref. inst. | reg. 4-7 [,I] | comments |
|---|---|---|---|

Initiate an I/O Bus Cycle.

| label | stack inst. | reg. 4-7 [,I/,D] | comments |
|---|---|---|---|

Initiate an I/O Bus Cycle.

FIG 69A

IOC MACHINE INSTRUCTIONS

INTERRUPT GROUP

| label | EIR | comments |
|---|---|---|

Enable the interrupt system, cancels DIR.

| label | DIR | comments |
|---|---|---|

Disable the interrupt system, cancels EIR.

DMA GROUP

| label | SDO | comments |
|---|---|---|

Set DMA outwards.

| label | SDI | comments |
|---|---|---|

Set DMA inwards.

| label | DMA | comments |
|---|---|---|

Enable the DMA mode, cancels PCM and DDR.

| label | PCM | comments |
|---|---|---|

Enable the Pulse Count Mode, cancels DMA and DDR.

| label | DDR | comments |
|---|---|---|

Disable Data Request, cancels DMA and PCM.

FIG 69B

EMC MACHINE INSTRUCTIONS

THE FOUR-WORD GROUP

| label | CLR | N | comments |
|---|---|---|---|

Clear N words. This instruction clears N consecutive words, beginning with location < A >. $1 \leq N \leq 16_{10}$.

$$0 \rightarrow \text{location} < A >$$
$$0 \rightarrow \text{location} < A > + 1$$
$$\circ$$
$$\circ$$
$$\circ$$
$$0 \rightarrow \text{location} < A > + N - 1$$

| label | XFR | N | comments |
|---|---|---|---|

Transfer N words. This instruction transfers the N consecutive words beginning at location < A > to those beginning at < B >. $1 \leq N \leq 16_{10}$.

$$\text{location} < A > \rightarrow \text{location} < B >$$
$$\text{location} < A > + 1 \rightarrow \text{location} < B > + 1$$
$$\circ$$
$$\circ$$
$$\circ$$
$$\text{location} < A > + N - 1 \rightarrow \text{location} < B > + N - 1$$

THE MANTISSA SHIFT GROUP

| label | MRX | comments |
|---|---|---|

Mantissa right shift of ARl r-times, $r = < B_{0-3} >$, and $0 \leq r \leq 17_8 = 15_{10}$.

1st shift: $< A_{0-3} > \rightarrow D_1; \ldots . < D_j > \rightarrow D_{j+1}; \ldots .\ D_{12}$ is lost
jth shift: $0 \rightarrow D_1; \ldots . < D_j > \rightarrow D_{j+1}; \ldots .\ D_{12}$ is lost
rth shift: $0 \rightarrow D_1; \ldots . < D_j > \rightarrow D_{j+1}; \ldots . < D_{12} > \rightarrow A_{0-3};\ 0 \rightarrow DC;\ 0 \rightarrow A_{4-15}$ Notice:

1) The first shift does not necessarily shift in a zero; the first shift shifts in $< A_{0-3} >$.
2) The last digit shifted out ends up as $< A_{0-3} >$.
3) If only one digit-shift is done, (1) and (2) happen together.
4) After (2), SE is the same as $< A_{0-3} >$.
5) Any more than eleven shifts is wasteful.

FIG 70A

EMC MACHINE INSTRUCTIONS

THE MANTISSA SHIFT GROUP (CONT.)

| label | MRY | comments |
|---|---|---|

Mantissa right shift of AR2 $< B_{0-3} >$ -times. Otherwise identical to MRX.

| label | MLY | comments |
|---|---|---|

Mantissa left shift of AR2 one time.
$< A_{0-3} > \rightarrow D_{12};\ldots< D_i > \rightarrow D_{i-1};\ldots.< D_1 > \rightarrow A_{0-3};\ 0 \rightarrow DC;\ 0 \rightarrow A_{4-15}$ At the conclusion of the operation SE equals $< A_{0-3} >$.

| label | DRS | comments |
|---|---|---|

Mantissa right shift of ARl one time.
$0 \rightarrow D_1;\ldots.< D_i > \rightarrow D_{i+1};\ldots.< D_{12} > \rightarrow A_{0-3};\ 0 \rightarrow DC;\ 0 \rightarrow A_{4-15}$ At the conclusion of the operation SE equals $< A_{0-3} >$.

| label | NRM | comments |
|---|---|---|

Normalize AR2. The mantissa digits of AR2 are shifted left until $D_1 \neq 0$. If the original $D_1$ is non-zero, no shifts occur. If twelve shifts occur, then AR2 equals zero, and no further shifts are done. The number of shifts is stored as a binary number in B .

i. $0 \rightarrow B_{4-15}$; # of shifts $\rightarrow B_{0-3}$
ii. For $0 \leq < B_{0-3} > \leq 11;\ 0 \rightarrow DC$
iii. If $< B_{0-3} > = 12;\ 1 \rightarrow DC$

THE ARITHMETIC GROUP

| label | CMX | comments |
|---|---|---|

Ten's complement of ARl. The mantissa of ARl is replaced with its ten's complement, and DC is set to zero.

FIG 70B

EMC MACHINE INSTRUCTIONS

THE ARITHMETIC GROUP (CONT.)

| label | CMY | comments |
|---|---|---|

Ten's complement of AR2. The mantissa of AR2 is replaced with it ten's complement, and DC is set to zero.

| label | CDC | comments |
|---|---|---|

Clear Decimal Carry. Clears the DC register; 0 → DC.

| label | FXA | comments |
|---|---|---|

Fixed-point addition. The mantissas of ARI and AR2 are added together, along with DC (as a $D_{12}$ -digit), and the result is placed in AR2. If an overflow occurs, DC is set to one, otherwise, DC is set to zero at the completion of the addition.

During the addition the exponents are not considered, and are left strictly alone. The signs are also left completely alone.

< ARI > = $D_1$ $D_2$ $D_3$--------$D_{12}$
< AR2 > = $D_1$ $D_2$ $D_3$--------$D_{12}$
\+ < DC > ← initial value of DC (overflow) → "$D_0$" $D_1$ $D_2$ $D_3$--------$D_{12}$ → AR2
→ DC (final value of DC)

| label | MWA | comments |
|---|---|---|

Mantissa Word Add. < B > is taken as four BCD digits, and added, as $D_9$ through $D_{12}$, to AR2. DC is also added in as a $D_{12}$. The result is left in AR2. If an overflow occurs, DC is set to one, otherwise, DC is set to zero at the completion of the addition.

During the addition the exponents are not considered, and are left strictly alone, as are the signs. MWA is intended primarily for use in rounding routines.

< B > = --------$D_9$ $D_{10}$ $D_{11}$ $D_{12}$
< AR2 > = $D_1$------$D_9$ $D_{10}$ $D_{11}$ $D_{12}$
\+ < DC > ← initial value of DC (overflow) → "$D_0$" $D_1$------$D_9$ $D_{10}$ $D_{11}$ $D_{12}$ → AR2
→ DC (final value of DC)

FIG 70C

EMC MACHINE INSTRUCTIONS

THE ARITHMETIC GROUP (CONT.)

| label | FMP | comments |
|---|---|---|

Fast multiply. The mantissas of AR1 and AR2 are added together (along with DC as $D_{12}$) $< B_{0-3} >$-times; the result accumulates in AR2.

The repeated additions are likely to cause some unknown number of overflows to occur. The number of overflows that occurs is returned in $A_{0-3}$.

FMP is used repeatedly to accumulate partial products during BCD multiplication. FMP operates strictly upon mantissa portions; signs and exponents are left strictly alone.

$$\langle AR2 \rangle + ((\langle AR1 \rangle) \cdot (\langle B_{0-3} \rangle)) + DC \rightarrow AR2$$

DC doesn't enter into these repeated additions except for the first one as shown at right. 0 → DC immediately after each overflow.

Represents the initial value of DC.

$0 \rightarrow DC$, $0 \rightarrow A_{4-15}$ # of overflows $\rightarrow A_{0-3}$

| label | MPY | comments |
|---|---|---|

Binary Multiply Using Booth's Algorithm. The (binary) signed two's complement contents of the A and B registers are multiplied together. The thirty-two bit product is also a signed two's complement number, and is stored back into A and B. B receives the sign and most-significant bits, and A the least-significant bits:

$$\langle A \rangle \cdot \langle B \rangle \rightarrow \langle \overset{\frown}{B \rangle \langle A} \rangle$$

| label | FDV | comments |
|---|---|---|

Fast Divide. The mantissas of AR1 and AR2 are added together until the first decimal overflow occurs. The result of these additions accumulates into AR2. The number of additions without overflow (n) is placed into B.

$$\langle AR2 \rangle + \langle AR1 \rangle + \langle DC \rangle \rightarrow AR2 \quad \text{(repeatedly until overflow)}$$

then $$0 \rightarrow DC, \quad 0 \rightarrow B_{4-15}, \quad n \rightarrow B_{0-3}$$

FDV is used in floating-point division to find the quotient digits of a division. In general, more than one application of FDV is needed to find each digit of the quotient.

As with the other BCD instructions, the signs and exponents of AR1 and AR2 are left strictly alone.

FIG 70D

BPC CONSOLIDATED CODING SHEET

| Group | Instruction | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| MEMORY REFERENCE | L D A/B | D/I | 0 | 0 | 0 | A/B | B/C | -10-BIT ADDRESS FIELD | | | | | | | | | |
| | C P A/B | ↑ | 0 | 0 | 1 | ↑ | ↑ | -0-$37_8$ ARE REGISTERS | | | | | | | | | |
| | A D A/B | | 0 | 1 | 0 | ↓ | | -IF BIT 9=0, BITS 0-8 ARE POSITIVE ADDRESS | | | | | | | | | |
| | S T A/B | | 0 | 1 | 1 | A/B | | | | | | | | | | | |
| | J S M | | 1 | 0 | 0 | 0 | | -IF BIT 9=1, BITS 0-8 ARE NEGATIVE ADDRESS; COMPLEMENT BITS 0-8 THEN ADD 1 | | | | | | | | | |
| | I S Z | | 1 | 0 | 0 | 1 | | | | | | | | | | | |
| | A N D | | 1 | 0 | 1 | 0 | | | | | | | | | | | |
| | D S Z | | 1 | 0 | 1 | 1 | | | | | | | | | | | |
| | I O R | | 1 | 1 | 0 | 0 | ↓ | | | | | | | | | | |
| | J M P | ↓ | 1 | 1 | 0 | 1 | B/C | | | | | | | | | | |
| | E X E | D/I | 1 | 1 | 1 | 0 | 0 | 0 | 0 | 0 | 0 | 0 | REGISTER ADD. | | | | |
| SKIP | R Z A/B | 0 | 1 | 1 | 1 | A/B | 1 | 0 | 0 | 0 | 0 | -6-BIT SKIP FIELD +31,-32 | | | | | |
| | R I A/B | 0 | 1 | 1 | 1 | ↑ | 1 | 0 | 0 | 0 | 1 | -IF BIT 5=0, SKIP TO (P+N), N= BITS 0-4 | | | | | |
| | S Z A/B | 0 | 1 | 1 | 1 | ↓ | 1 | 0 | 1 | 0 | 0 | -IF BIT 5=1, SKIP TO (P-N), N=1+ COMPLEMENT OF BITS 0-4 | | | | | |
| | S I A/B | 0 | 1 | 1 | 1 | A/B | 1 | 0 | 1 | 0 | 1 | | | | | | |
| | S F S/C | 0 | 1 | 1 | 1 | 0 | 1 | 0 | S/C | 1 | 0 | | | | | | |
| | S D S/C | 0 | 1 | 1 | 1 | 0 | 1 | 0 | ↑ | 1 | 1 | | | | | | |
| | S S S/C | 0 | 1 | 1 | 1 | 1 | 1 | 0 | ↓ | 1 | 0 | | | | | | |
| | S H S/C | 0 | 1 | 1 | 1 | 1 | 1 | 0 | S/C | 1 | 1 | | | | | | |
| ALTER | S L A/B | 0 | 1 | 1 | 1 | A/B | 1 | 1 | 0 | H/H̄ | C/S | | | | | | |
| | R L A/B | 0 | 1 | 1 | 1 | ↑ | 1 | 1 | 1 | ↑ | ↑ | | | | | | |
| | S A/B P | 1 | 1 | 1 | 1 | ↓ | 1 | 0 | 0 | | | | | | | | |
| | S A/B M | 1 | 1 | 1 | 1 | A/B | 1 | 0 | 1 | | | | | | | | |
| | S O C/S | 1 | 1 | 1 | 1 | 0 | 1 | 1 | C/S | ↓ | ↓ | | | | | | |
| | S E C/S | 1 | 1 | 1 | 1 | 1 | 1 | 1 | C/S | H/H̄ | C/S | | | | | | |
| COMPLE-MENT | T C A/B | 1 | 1 | 1 | 1 | A/B | 0 | 0 | 0 | 0 | 0 | 1 | 0 | 0 | 0 | 0 | 0 |
| | C M A/B | 1 | 1 | 1 | 1 | A/B | 0 | 0 | 0 | 0 | 1 | 1 | 0 | 0 | 0 | 0 | 0 |
| | R E T | 1 | 1 | 1 | 1 | 0 | 0 | 0 | 0 | 1 | P̄/P | 2'S COMP. SKIP FIELD | | | | | |
| SHIFT-ROTATE | A A/B R | 1 | 1 | 1 | 1 | A/B | 0 | 0 | 1 | 0 | 0 | 0 | 0 | 4-BIT SHIFT FIELD, N=1-16 IN SOURCE, BINARY=(N-1) | | | |
| | S A/B R | 1 | 1 | 1 | 1 | ↑ | 0 | 0 | 1 | 0 | 1 | 0 | 0 | | | | |
| | S A/B L | 1 | 1 | 1 | 1 | ↓ | 0 | 0 | 1 | 1 | 0 | 0 | 0 | | | | |
| | R A/B R | 1 | 1 | 1 | 1 | A/B | 0 | 0 | 1 | 1 | 1 | 0 | 0 | | | | |

—NOTES—

1 D/I ALWAYS REPRESENTS D/I
2 A/B DENOTES THE A OR B REGISTER
3 D/I DENOTES DIRECT OR INDIRECT
4 B/C DENOTES BASE PAGE OR CURRENT PAGE
5 P̄/P DENOTES DON'T POP OR POP THE IOC'S PA STACK
6 S/C DENOTES "SET" OR "CLEAR" IN AN INSTRUCTION MNEMONIC
7 H/H̄ DENOTES HOLD OR CHANGE THE TESTED BIT
8 C/S DENOTES CLEAR OR SET (,C OR ,S) THE TESTED BIT

IOC CONSOLIDATED CODING SHEET

| Group | Instruction | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| INTERRUPT | E I R | 0 | 1 | 1 | 1 | 0 | 0 | 0 | 1 | 0 | 0 | 0 | 1 | 0 | 0 | 0 | 0 |
| | D I R | 0 | 1 | 1 | 1 | 0 | 0 | 0 | 1 | 0 | 0 | 0 | 1 | 1 | 0 | 0 | 0 |
| DMA | S D O | 0 | 1 | 1 | 1 | 0 | 0 | 0 | 1 | 0 | 0 | 0 | 0 | 0 | 0 | 0 | 0 |
| | S D I | 0 | 1 | 1 | 1 | 0 | 0 | 0 | 1 | 0 | 0 | 0 | 0 | 1 | 0 | 0 | 0 |
| | D M A | 0 | 1 | 1 | 1 | 0 | 0 | 0 | 1 | 0 | 0 | 1 | 0 | 0 | 0 | 0 | 0 |
| | P C M | 0 | 1 | 1 | 1 | 0 | 0 | 0 | 1 | 0 | 0 | 1 | 0 | 1 | 0 | 0 | 0 |
| | D D R | 0 | 1 | 1 | 1 | 0 | 0 | 0 | 1 | 0 | 0 | 1 | 1 | 1 | 0 | 0 | 0 |
| STACK | D B L | 0 | 1 | 1 | 1 | 0 | 0 | 0 | 1 | 0 | 1 | 0 | 0 | 0 | 0 | 0 | 0 |
| | C B L | 0 | 1 | 1 | 1 | 0 | 0 | 0 | 1 | 0 | 1 | 0 | 0 | 1 | 0 | 0 | 0 |
| | D B U | 0 | 1 | 1 | 1 | 0 | 0 | 0 | 1 | 0 | 1 | 0 | 1 | 0 | 0 | 0 | 0 |
| | C B U | 0 | 1 | 1 | 1 | 0 | 0 | 0 | 1 | 0 | 1 | 0 | 1 | 1 | 0 | 0 | 0 |
| | P W/B C/D | 0 | 1 | 1 | 1 | W/B | 0 | 0 | 1 | I/D | 1 | 1 | 0 | C/D | 3-BIT REG. ADD | | |
| | W W/B C/D | 0 | 1 | 1 | 1 | W/B | 0 | 0 | 1 | I/D | 1 | 1 | 1 | C/D | | | |

—NOTES—

1 C/D ALWAYS ENCODED AS C/D
2 W/B DENOTES WORD/BYTE
3 I/D DENOTES INCREMENT/DECREMENT
4 C/D DENOTES THE C OR D REGISTERS
5 PLACE INST'S INC/DEC THE STACK POINTER BEFORE THE OPERATION
6 WITHDRAW INST'S INC/DEC THE STACK POINTER AFTERWARDS

EMC CONSOLIDATED CODING SHEET

| Group | Instruction | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| FOUR WORD | C L R | 0 | 1 | 1 | 1 | 0 | 0 | 1 | 1 | 1 | 0 | 0 | 0 | N=# OF WORDS BINARY=(N-1) | | | |
| | X F R | 0 | 1 | 1 | 1 | 0 | 0 | 1 | 1 | 0 | 0 | 0 | 0 | | | | |
| MANTISSA SHIFT | M R X | 0 | 1 | 1 | 1 | 1 | 0 | 1 | 1 | 0 | 0 | 0 | 0 | 0 | 0 | 0 | 0 |
| | D R S | 0 | 1 | 1 | 1 | 1 | 0 | 1 | 1 | 0 | 0 | 1 | 0 | 0 | 0 | 0 | 1 |
| | M L Y | 0 | 1 | 1 | 1 | 1 | 0 | 1 | 1 | 0 | 1 | 1 | 0 | 0 | 0 | 0 | 1 |
| | M R Y | 0 | 1 | 1 | 1 | 1 | 0 | 1 | 1 | 0 | 1 | 0 | 0 | 0 | 0 | 0 | 0 |
| | N R M | 0 | 1 | 1 | 1 | 0 | 0 | 1 | 1 | 0 | 1 | 0 | 0 | 0 | 0 | 0 | 0 |
| ARITHMETIC | F X A | 0 | 1 | 1 | 1 | 0 | 0 | 1 | 0 | 1 | 0 | 0 | 0 | 0 | 0 | 0 | 0 |
| | M W A | 0 | 1 | 1 | 1 | 0 | 0 | 1 | 0 | 0 | 0 | 0 | 0 | 0 | 0 | 0 | 0 |
| | C M X | 0 | 1 | 1 | 1 | 0 | 0 | 1 | 0 | 0 | 1 | 1 | 0 | 0 | 0 | 0 | 0 |
| | C M Y | 0 | 1 | 1 | 1 | 0 | 0 | 1 | 0 | 0 | 0 | 1 | 0 | 0 | 0 | 0 | 0 |
| | F M P | 0 | 1 | 1 | 1 | 1 | 0 | 1 | 0 | 0 | 0 | 0 | 0 | 0 | 0 | 0 | 0 |
| | F D V | 0 | 1 | 1 | 1 | 1 | 0 | 1 | 0 | 0 | 0 | 1 | 0 | 0 | 0 | 0 | 1 |
| | M P Y | 0 | 1 | 1 | 1 | 1 | 0 | 1 | 1 | 1 | 0 | 0 | 0 | 1 | 1 | 1 | 1 |
| | C D C | 0 | 1 | 1 | 1 | 0 | 0 | 1 | 1 | 1 | 1 | 0 | 0 | 0 | 0 | 0 | 0 |

FIG 71

NOTES:

1.  DENOTES A MICRO-INSTRUCTION DECODED IN THE ROM.

2.  AND  DENOTE ONE- AND TWO-WAY INTERCONNECTIONS TO A BUS; ALWAYS CONTROLLED BY A ROM MICRO-INSTRUCTION.

3. 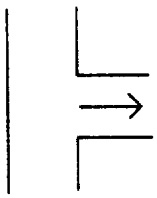 DENOTES A DIRECT CONNECTION BETWEEN TWO ITEMS.

4. 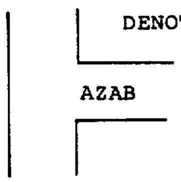

DENOTES A CONNECTION BETWEEN TWO ITEMS THAT IS ACTIVE ONLY WHEN THE STATED SIGNAL IS GIVEN. SUCH SIGNALS ARE NOT ROM DECODED MICRO-INSTRUCTIONS. SOME ARE PRESENT THROUGHOUT AN ENTIRE EXECUTION CYCLE, WHILE OTHERS REFLECT MORE TEMPORARY CONDITIONS.

OR

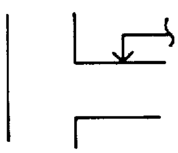

5. 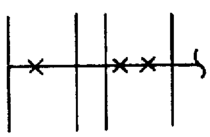 DENOTES THAT THE STATED LINE REPRESENTS A DECODED CONDITION.

6. 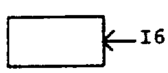

REPRESENTS A NON-MICRO-INSTRUCTION CONTROL LINE OR SOME OTHER SIGNAL.

7. 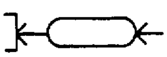 REPRESENTS AN INPUT TERMINAL TO THE BPC

8.  REPRESENTS AN OUTPUT TERMINAL FROM THE BPC

9. 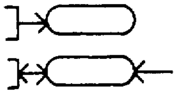 REPRESENTS A TERMINAL THAT IS BOTH AN INPUT AND AN OUTPUT.

10. NUMBERS IN PARENTHESES INDICATE THE NUMBER OF BITS A MECHANISM HANDLES.

11. THE LOGICAL SENSE (XXX VERSUS $\overline{XXX}$) OF THE I/O TERMINALS IS CORRECTLY INDICATED. HOWEVER, THE DRAWING IS NOT A RELIABLE INDICATOR OF THE EXACT SENSE OF THE INTERNAL SIGNALS. TYPICALLY BOTH SENSES EXIST, AND FREQUENTLY THE PHYSICAL PROXIMITY OF SIGNALS TO THEIR DESTINATIONS WAS MORE IMPORTANT IN DECIDING WHICH SENSE TO USE, RATHER THAN AGREEMENT OF LOGICAL SENSE.
BECAUSE STRICT ACCURACY IN REPORTING SIGNAL SENSES ON SUCH A GENERAL LEVEL DRAWING WOULD SHARPLY INCREASE THE NUMBER OF INTER-CONNECTIONS, WITH ONLY A SLIGHT INCREASE IN USEFULNESS, WE USUALLY SHOW ONLY THE NAME OF THE SIGNAL.

FIG 72C

HOW TO INTERPRET THE BPC ASM CHART

1. What we usually refer to simply as a state ("state 4 for LOAD A") is generally a coincidence of that particular state-count and some group encoding qualifier pattern (representing a particular group). The most precise way to refer to a location on the ASM chart is indicate both the group and state-counts, (say, B4). Some states (0,1,and 14) are completely group independent. States are indicated by circles with numbers in them: (4). Group information is prominently displayed next to sections to which it pertains.

2. Each state represents a Ø2 pre-charge and Ø1 decode in the ROM. The ASM chart represents what is decoded from the ROM in the various states; it does not necessarily represent end-results that occur simultaneously. If, for instance, two instructions decoded in the same state have different delays coming from the ROM, then they do not result in simultaneous activity, even though they are drawn as being in the same state.

3. Rectangular boxes ( [SET A] ) denote micro-instructions. Diamonds ( <MEC=1?> ) denote qualifiers affecting the decoding of micro-instructions. Ovals ( (STM) ) denote micro-instructions that are actually decoded and given, but that are "don't-cares". That is, they are present but do not affect the algorithmic process. Sometimes these don't-cares are the result of minimization, and sometimes they are a result of the way the flow charts have been drawn (in an attempt to make them more easily understood).

4. All activity within a state is decoded and initiated (its delay is begun) at the same time. The fact that a state is shown as a sequential arrangement of boxes and diamonds does not imply sequential activity; the entire state is decoded simultaneously. For example, state 0 is represented below:

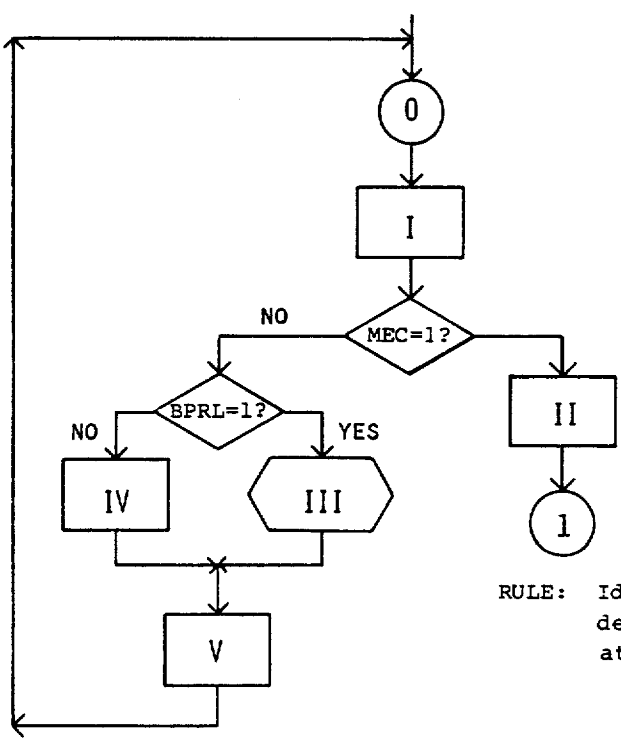

RULE: Identify the path, then decode all instructions at once.

FIG 73A

HOW TO INTERPRET THE BPC ASM CHART, CONT.

Another way to represent the same activity is illustrated below. We don't draw the ASM chart that way because of the increased size and because of problems in achieving connectedness. Also, overall algorithmic process would be hard to see; the more compact notation results in a more effective visual outline. Within a state however, the expanded notation is often less confusing as it more closely represents the actual way things are done.

If MEC=1, then: | If MEC=0, and BPRL=0, then: | If MEC=0 and BPRL=1, then:

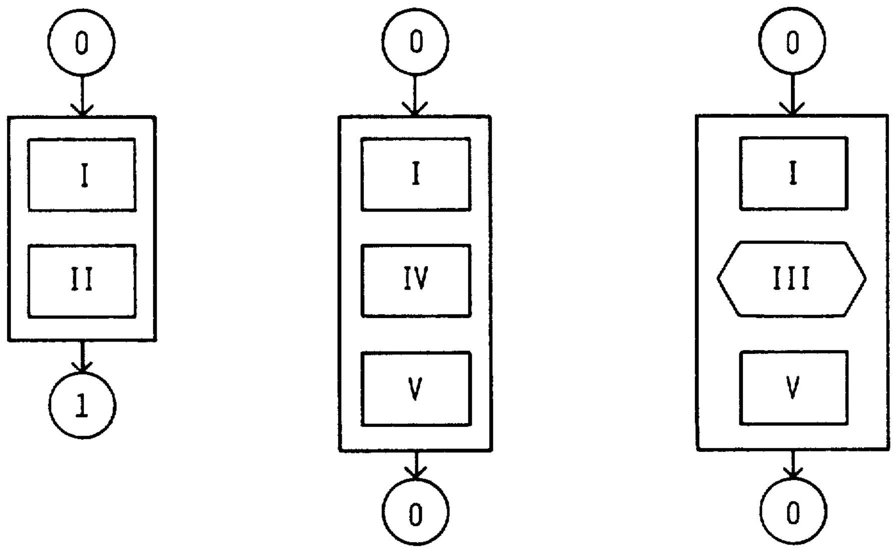

5. Within a state, related instructions are grouped together in the same box solely for the sake of algorithmic clarity.

6. Because of limitations on transistor device size, and the large capacitances of the IDA lines, two consecutive SET IDA's are required to ensure that IDA lines assume their proper final values. If what is being transmitted with the SET IDA is an address for Memory, the STM will accompany the second SET IDA. If data is being written to Memory, DVAL will accompany the second and all subsequent SET IDA's until Memory Complete is received. In either case, the IDA lines will be stable before the start of the second SET IDA.

7. The symbol 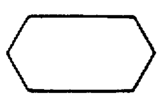 represents activity controlled by the M-Section. The micro-instructions shown inside are encoded in the ROM, just as are any other micro-instructions. However, these particular instances of decoding those micro-instructions are independent of all group and state-count qualifier lines in the ROM. They are decoded against qualifiers generated by the M-Section and Address Decode. ($\overline{RDR}$, $\overline{WTR}$, $\overline{DRQ}$, M00-M03).

8. The qualifiers that enable such M-Section activity are generated when STM occurs in conjuction with an address on the IDA lines that specifies a register within the BPC. These qualifiers are not always generated immediately, nor are they necessarily co-incident with one another.

FIG 73B

HOW TO INTERPRET THE BPC ASM CHART, CONT.

9. Consider the following typical situation:

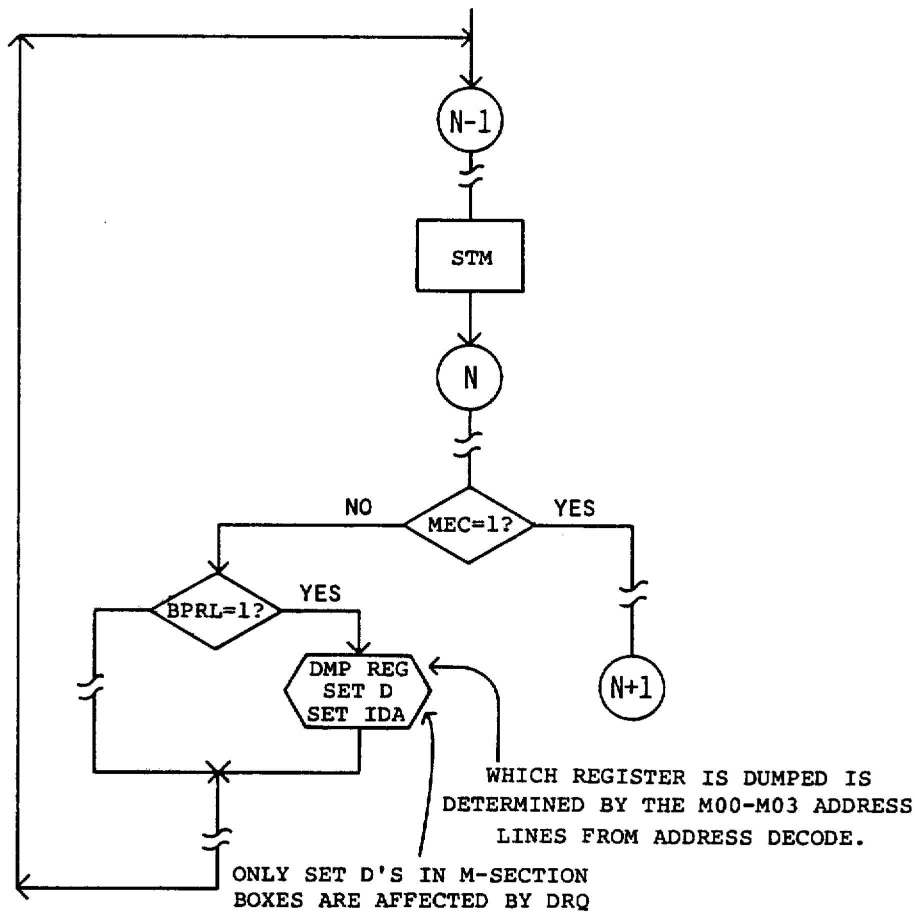

In this example the STM occurs in the state prior to the one with the M-Section activity. The machine will stay in state N for 4 consecutive state-times: 3 "no's" and a "yes" for the MEC qualifier. The BPRL qualifier (from Address Decode) will be met each time, but due to delays in the M-Section the first pass through state N generates none of the M-Section activity. The second and third passes do perform the indicated activity, except for the SET D. It is done during the second pass, but not during the third. This is a result of $\overline{DRQ}$, and prevents D from tracking the pre-charge of the $\overline{IDB}$ Bus which follows the execution of the SET D. This prevents the second SET IDA from producing a glitch on the IDA lines.

Sometimes the STM is given in state N-2. In such a case the one state of M-Section delay is spent while in state N-1, and only three state-times are spent in state N. When this happens the M-Section activity occurs immediately on the first and second of these; the third meets the MEC qualifier. As before, the SET D is done only once.

Such an instance occurs between states C2 and C9. There are several others.

FIG 73C

HOW TO INTERPRET THE BPC ASM CHART, CONT.

10. Sometimes, as in state C9, the BPRL qualifier is shown by a dotted line: <BPRL=1?> This occurs only when the machine represented by the ASM chart has no activity in that state that is conditional upon BPRL. Therefore, BPRL is a don't-care for the ASM chart at that state, and indeed is not used in the ROM there. However, it still initiates M-Section activity when met. And when it is met no externally caused MEC will be forthcoming, since no memory external to the BPC is involved. The MEC will be supplied by the M-Section itself, as soon as its activity is finished. In these cases the timing is as outlined in 9 above, and we show a BPRL qualifier that affects the M-Section, but not that point in the ROM, to remind the reader of what's happening.

11. Finally, a word about the correspondence between what's in the ROM and how the flow charts are drawn. The flow charts have been "de-minimized" to promote their ease of understanding. For instance, state A5 is shown as:

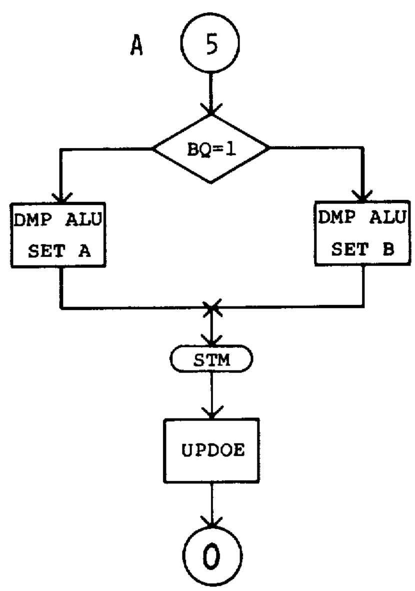

There are not two instances of decoding DMP ALU for state A5. The decoding of DMP ALU in that state is independent of the BQ qualifier, as it is done regardless of that qualifiers outcome.

State A5 could just as easily be drawn with a single DMP ALU in the same box as the UPDOE, or in a separate box of its own, ahead of the BQ qualifier.

Such redrawing often adds a welcome measure of clarity in loops involving repeated SET IDA's and multiple qualifiers. It lets us indicate what's in D at the time a SET IDA is given after certain qualifiers have been met or failed.

FIG 73D

HOW TO INTERPRET THE BPC ASM CHART, CONT.

Not all instances of the same instruction appearing twice in the same state are the result of de-minimization, however. The two SET D's in state A/B3 represent separate instances of decoding that instruction. The partial structure of the state is shown below:

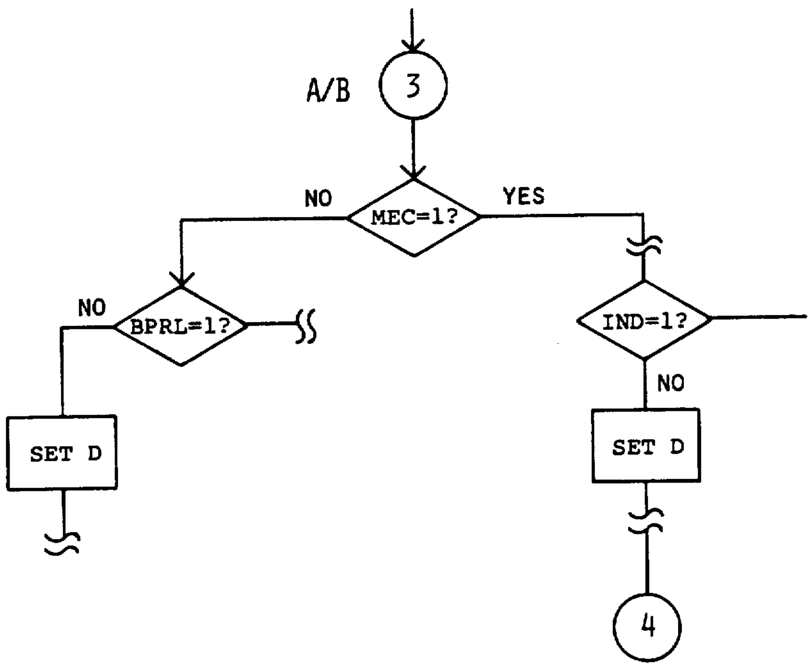

Here each SET D is conditional upon a different qualifier. Because of the way the ROM is organized, an instance of an instruction being decoded represents the "AND" of selected conditions:

IF STATE 3 AND GROUP A/B AND NOT BPRL, THEN SET D $GP1 \cdot GP2 \cdot \overline{GP3}$ ⟵ (GP0=1 for A, 0 for B)

The other instance of decoding SET D in that state is:

IF STATE 3 AND GROUP A/B AND NOT IND, THEN SET D

The combination:

THE CONDITION OR CONDITION, THEN SET D does not exist as a single encoding. It is simply the "OR" (during fan-in) of the two separate "AND's" as shown above.

FIG 73E

OVERVIEW OF THE ASM CHART, AND DETAILS OF THE START-UP SEQUENCE

BPC ASM CHART-INSTRUCTION FETCH AND INTERRUPT ENABLE

BPC ASM CHART-LOAD, ADD, AND, OR, AND COMPARE INSTRUCTIONS

BPC ASM CHART-STORE A AND STORE B INSTRUCTIONS

BPC ASM CHART - ISZ AND DSZ INSTRUCTIONS

NOTE 1: REG IS DETERMINED IN THE ROM BY M00-M03 FROM ADDRESS DECODE.

NOTE 2: STM IS FIRST GIVEN TWO STATES BEFORE, IN STATE 7.

NOTE 3: FOR 15-BIT VERSION ONLY, DVAL ALSO INCLUDED IN THIS LOCATION.

BPC ASM CHART-JUMP AND JUMP TO SUBROUTINE INSTRUCTIONS

BPC ASM CHART-EXECUTE INSTRUCTION

GROUP H: RETURN

RET N, P

SOURCE: $-32_{10} \leq N \leq 31_{10}$

BINARY: 6-BIT 2'S COMPLEMENT

IGNORED BY THE BPC, OF INTEREST TO THE IOC

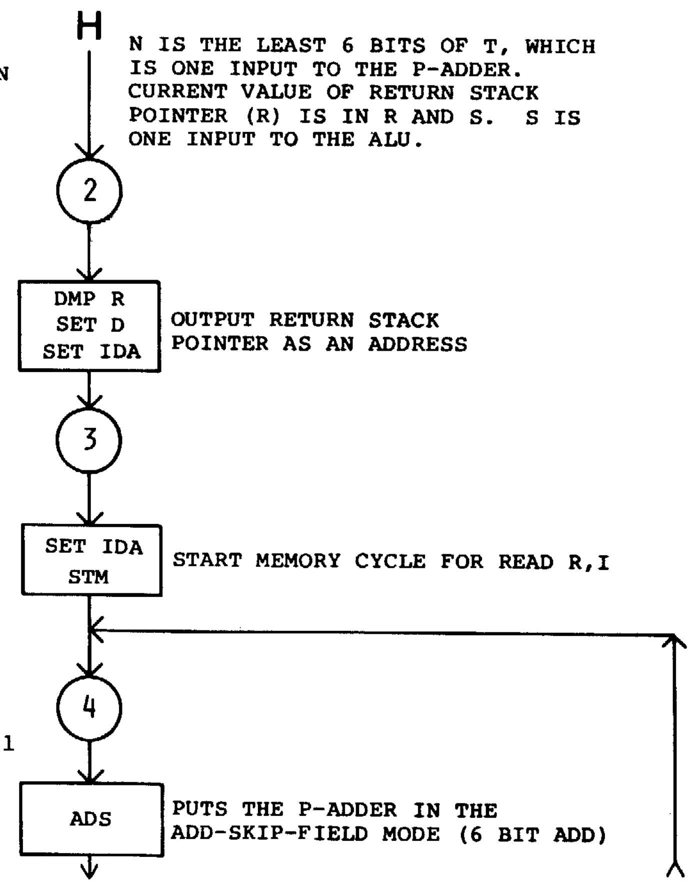

ASYNCHRONOUS INSTRUCTIONS TO ALU FROM INSTRUCTION DECODE, DURING A RET:

1. ZZAB — ZEROS THE $\overline{ZAB}$ BUS (ONE INPUT TO THE ALU)
2. $\overline{CM}$ — BIT-BY-BIT COMPLEMENTS THE $\overline{ZAB}$ INPUT AT THE ALU. RESULTS IN 2'S COMPLEMENT OF -1 AS ONE INPUT.

1 AND 2 TOGETHER RESULT IN S-1 FROM ALU.

BPC ASM CHART-THE RETURN INSTRUCTION

FIG 75Ga

BPC ASM CHART - ALTER-SKIP GROUP INSTRUCTIONS

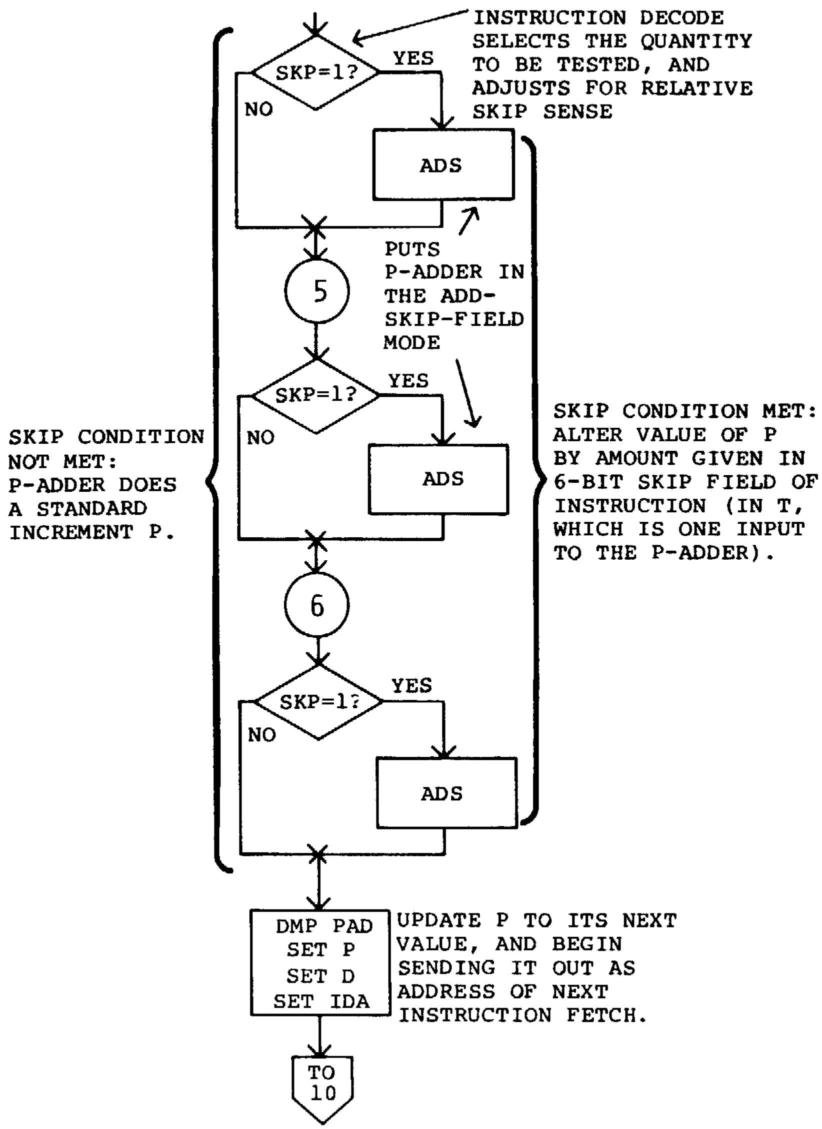

NOTE 1:
THE ALU HAS BEEN ADDING S (ALL ZEROS) TO THE $\overline{ZAB}$ BUS, WHICH IS EITHER A OR B, AS DETERMINED BY I11 (GENERATES AZAB OR BZAB). BITS 0 AND 15 OF THE ALU OUTPUT CAN BE LEFT ALONE (NO S, NO C), FORCED TO REPRESENT A ONE WITH SMS OR SLS (S), OR, FORCED TO REPRESENT A ZERO WITH CMS OR CLS (C). I6 AND I7 CONTROL S/C ACTIVITY DIRECTLY AT THE ALU, IN CONJUNCTION WITH LSC AND MSC FROM INSTRUCTION DECODE.

NOTE 2:
THE ALU HAS BEEN ADDING S (ALL ZEROS) TO THE $\overline{ZAB}$ BUS, WHICH IS ALSO ALL ZEROS, EXCEPT FOR $\overline{ZAB}_{15}$ (EQUALS EX OR OV). THE RESULTING SUM (ON $\overline{IDB}_{15}$) IS JUST THE CURRENT STATE OF EX OR OV. AS IN NOTE 1, BIT 15 OF THE ALU OUTPUT CAN BE LEFT ALONE, OR FORCED WITH SMS OR CMS, ACCORDING TO I6 AND I7. EX OR OV IS THEN SET FROM $\overline{IDB}_{15}$.

NOTE 3:
NOT ALL ALTER-SKIP GROUP INSTRUCTIONS ALLOW AN ALTER OPERATION. THOSE INSTRUCTIONS DO NOT GENERATE EITHER LSC OR MSC. THAT PREVENTS THE ALU FROM ALTERING ITS OUTPUT.

NOTE 4:
HALF OF THE ALTER-SKIP INSTRUCTIONS PERTAINING TO NOTE 3 DO NOT INVOLVE ANY OF A,B,EX OR OV. EQ AND OQ WILL BOTH BE FALSE, AND THE INSTRUCTIONS WILL FOLLOW AN A OR B PATH, AS DETERMINED BY I11. THIS SIMPLY RESULTS IN AN UNNEEDED SET A WITH A, OR SET B WITH B.

FIG 75Hb

BPC ASM CHART-SHIFT-ROTATE GROUP INSTRUCTIONS

FOR TCA/B ONLY, TC* GENERATES A CI (CARRY IN), WHICH, WHEN COMBINED WITH THE ABOVE ADDITION, PRODUCES A TWO's COMPLEMENT.

BPC ASM CHART-COMPLEMENT GROUP INSTRUCTIONS

BPC ASM CHART - NON-BPC INSTRUCTION

BPC FLOWCHART FOR THE M-SECTION STATE MACHINE

BPC ERA ADDRESSING

| IDA ADDRESS (OCTAL) | READ/WRITE | RESULTING u-INSTRUCTION (S) |
|---|---|---|
| (NOTE 1) | | |
| 40 | R | DMP PAD (,INC P) (NOTE 2) |
| 41 | R | DMP PAD, ADS (NOTE 2) |
| 42 | R | DMP PAD, ADM (NOTE 2) |
| 42 | R | DMP PAD (,INC P) (NOTE 2) |
| 44 | R | DMP EX |
| 44 | W | SET EX |
| 45 | R | DMP OV |
| 45 | W | SET OV |
| 46 | R | DMP T |
| 46 | W | SET T |
| 47 | W | SET D |
| 51 | R | DMP ALU (NOTE 3) |
| 52 | W | SET S |
| 53 | R | DMP ST |
| 53 | W | SET I |
| 54 | R | DMP A |
| 54 | W | SET A |
| 55 | R | DMP B |
| 55 | W | SET B |
| 56 | R | DMP P |
| 56 | W | SET P |
| 57 | R | DMP R |
| 57 | W | SET R |

NOTES

1. IN THE ERA MODE, THE BPC REGISTER ADDRESS DETECTOR RESPONDS TO IDA BUS ADDRESSES, AS SHOWN. HOWEVER, ONLY THE FOUR LEAST SIGNIFICANT BITS OF THAT ADDRESS ARE USED AS QUALIFIERS IN THE ROM. HENCE, WHILE $57_8$ IS DECODED (FOR R), THE SET R AND DMP R IN THE ROM RESPOND TO $17_8$ ON THE M-ADDRESS LINES.
2. INC P (P-ADDER OUTPUT = P+1) IS THE NOR OF ADM AND ADS. IN GENERAL, THE RESULT OF A DUM PAD IS DIFFICULT TO PREDICT, AS IT DEPENDS UPON WHERE IN ITS FLOW CHART THE BPC IS STOPPED.
3. IN GENERAL, THE RESULT OF A DMP ALU IS DIFFICULT TO PREDICT. IT DEPENDS UPON WHAT IS IN THE I, A, AND B REGISTERS.

FIG 76B

1. 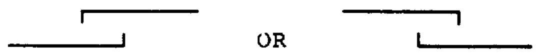

TRANSITION UP OR TRANSITION DOWN CAN OCCUR ANYTIME WITHIN THE INDICATED INTERVAL. USED TO INDICATE TIME-WINDOWS WITHIN WHICH EXTERNALLY ORIGINATED EVENTS CAN HAPPEN. REPRESENTS IDEALIZED LOGICAL ACTIVITY; RISE TIMES AND DELAYS ARE TAKEN INTO CONSIDERATION ONLY IN A GENERAL WAY.

2. 

REPRESENTS THE SET-UP TIME OF A SIGNAL BEING DRIVEN.

3. 

REPRESENTS A LINE THAT IS EITHER UNDEFINED OR A DON'T CARE.

4. 

REPRESENTS A LINE THAT IS ACTIVELY PULLED-UP.

5. CAPITAL LETTERS FROM THE START OF THE ALPHABET REPRESENT EXPLANATORY NOTES. LETTERS FROM THE END OF ALPHABET ARE SOMETIMES USED TO DENOTE DIFFERENT STATES (IN THE ROM).

6. NUMERALS IN THE Ø2-Ø1 WAVEFORMS ARE STRICTLY FOR REFERENCE WITHIN ANY PARTICULAR SET OF WAVEFORMS, AND HAVE NO SIGNIFICANCE OUTSIDE THAT SET.

7. IN GENERAL, THE WAVEFORMS ARE QUITE IDEALIZED. THEY EXPLAIN THE LOGICAL RELATIONSHIPS BETWEEN SIGNALS, BUT ACTUAL DELAYS, RISE TIMES, SIGNAL LEVELS AND THRESHOLDS ARE NOT INDICATED.

8. ⟨F⟩ DENOTES THAT A SIGNAL OCCURS IN THE 15-BIT VERSION ONLY. DELETE THE SIGNAL FOR THE 16-BIT VERSION.

9. ⟨S⟩ DENOTES THAT A SIGNAL OCCURS IN THE 16-BIT VERSION ONLY. DELETE THE SIGNAL FOR THE 15-BIT VERSION.

CONVENTIONS USED IN THE WAVEFORMS

FIG 77

READ A BPC REGISTER

READ A BPC REGISTER

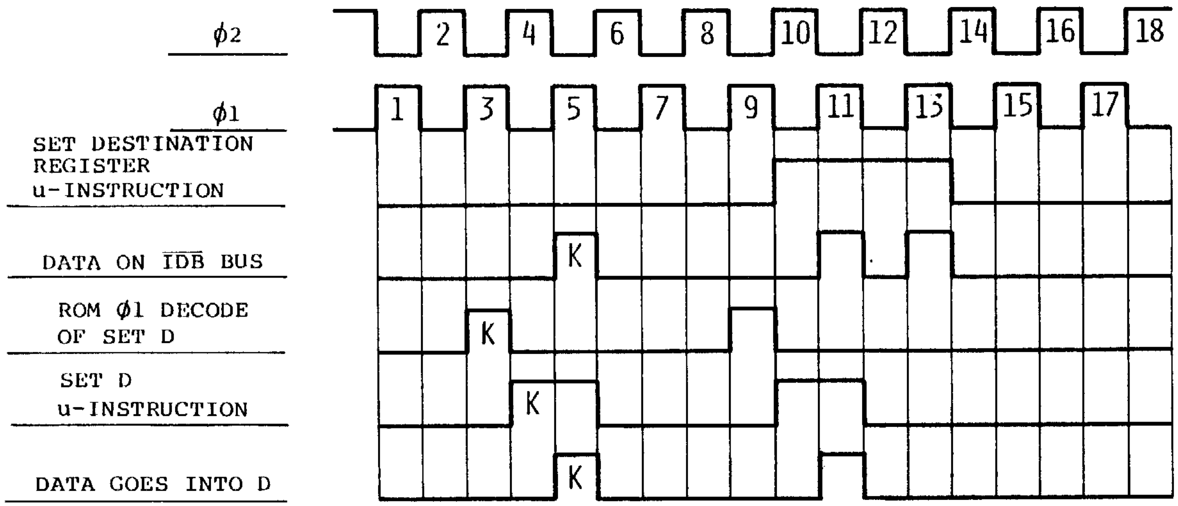

NOTES

A. PRESENT ONLY IF THE BPC IS THE ORIGINATOR OF THE MEMORY CYCLE.

B. DEPENDS UPON WHEN THE ADDRESS ON THE IDA BUS STABILIZES.

C. LATCHED WHEN STMA IS TRUE.

D. IF THIS READ MEMORY CYCLE IMMEDIATELY FOLLOWS A PREVIOUS WRITE CYCLE, THE START OF THIS $\phi 2$ IS WHEN RDW WILL GO HIGH.

E. ACTIVE PULL-UP OF RDW, $\overline{\text{STM}}$ AND $\overline{\text{DSTM}}$ DURING MECD.

F. THIS NOTE HAS BEEN DELETED.

G. LATCHED WHEN STMP IS FALSE.

H. TRANSITIONS AT THE START OF $\phi 1$ IF THE BPC IS THE ORIGINATOR. AN EXTERNAL AGENCY HAS UNTIL PRIOR TO $\phi 2$.

I. EARLIEST NEXT STM.

J. FOLLOWS STM.

K. PRESENT ONLY IF THE BPC IS THE ORIGINATOR OF THE MEMORY CYCLE. PART OF SENDING OUT THE ADDRESS AND THE DATA ON THE IDA BUS TO PRESERVE THE BUS CONVENTIONS.

READ A BPC REGISTER

FIG 78C

BPC READS MEMORY (TWO CONSECUTIVE FASTEST CYCLES SHOWN)

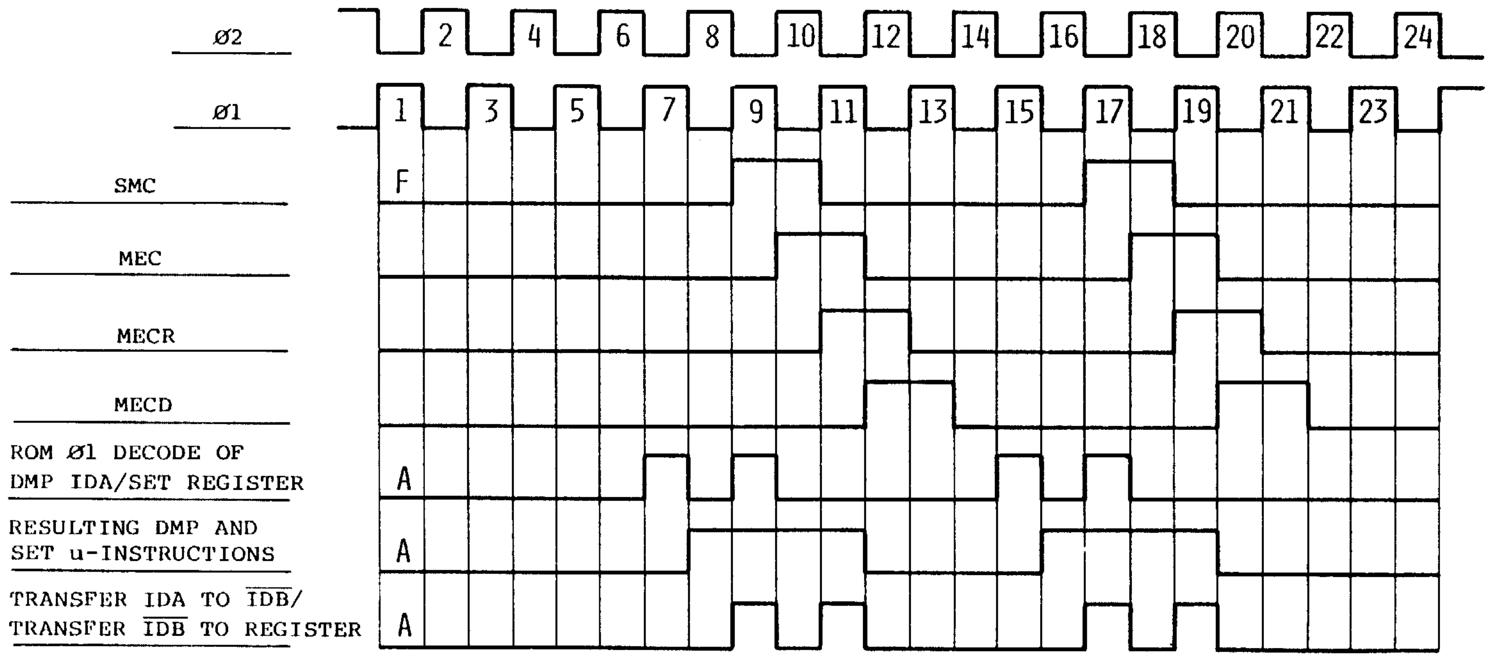

NOTES

A. PRESENT ONLY IF THE BPC IS THE ORIGINATOR OF THE MEMORY CYCLE. (SOME OTHER ENTITY ON THE BUS COULD BE READING MEMORY)

B. MEANINGFUL DURING THIS TIME, BUT LATCHED DURING STMA ONLY. SHOULD BE LOOKED AT DURING STM ONLY.

C. SOONEST POSSIBLE TRANSITION TO WRITE IF NEXT MEMORY CYCLE WERE A WRITE INSTEAD OF A READ.

D. TRANSITIONS IMMEDIATELY AT THE START OF Ø1 IF THE BPC IS THE ORIGINATOR OF THE MEMORY CYCLE.

E. ACTIVE PULL-UP ON $\overline{STM}$ AND $\overline{DSTM}$.

F. FOLLOWS STM.

G. UMC NEED NOT BE USED IF SMC IS GIVEN BY THE ORIGINATOR EXACTLY AS SHOWN, INSTEAD. HOWEVER, IF UMC IS GIVEN AS SHOWN, IT WILL ALSO RESULT IN SMC AS SHOWN.
UMC IS IDLE IF THE BPC ITSELF IS THE DESTINATION.

BPC READS MEMORY (TWO CONSECUTIVE FASTEST CYCLES SHOWN)

FIG 79B

NOTES

A. ACTIVE PULL UP DURING MECD.
B. DOTTED LINES REPRESENT ZERO OR ANY INTEGRAL NUMBER OF Ø1-Ø2 PAIRS.
C. NOTE THAT UMC COULD EQUAL STM.

GENERALIZED 4-STATE BPC READ MEMORY CYCLE (WITH IMPLICIT HANDSHAKE BASED ON UMC AND SMC)

WRITE TO A BPC REGISTER

WRITE TO A BPC REGISTER

WRITE TO A BPC REGISTER

NOTES

A. PRESENT ONLY IF THE BPC IS THE ORIGINATOR OF THE MEMORY CYCLE.

B. ACTIVE PULL-UP OF $\overline{\text{DVAL}}$, $\overline{\text{DSTM}}$, RDW AND $\overline{\text{STM}}$ DURING MECD.

C. DEPENDS UPON WHEN THE ADDRESS ON THE IDA BUS STABILIZES.

D. LATCHED WHEN STMA GOES TRUE.

E. IF THE BPC IS THE ORIGINATOR, RDW WILL TRANSITION AT THE START OF Ø2. AN EXTERNAL AGENCY HAS UNTIL THE END OF Ø2.

F. EARLIEST RELEASE OF RDW IF AN EXTERNAL AGENCY WERE THE ORIGINATOR OF THE MEMORY CYCLE.

G. THIS NOTE HAS BEEN DELETED.

H. LATCHED WHEN STMP GOES FALSE.

I. TRANSITIONS AT THE START OF Ø1 IF THE BPC IS THE ORIGINATOR. AN EXTERNAL AGENCY HAS UNTIL PRIOR TO Ø2.

J. FOLLOWS STM.

K. FOR THE ADDRESS.

L. FOR THE DATA.

M. FOR THE ADDRESS. SEE NOTE N.

N. FOR THE DATA. ADDRESS AND DATA TYPICALLY INVOLVE DIFFERENT REGISTERS.

WRITE TO A BPC REGISTER

FIG 81D

WRITE MEMORY (TWO CONSECUTIVE FASTEST CYCLES SHOWN)

WRITE MEMORY (TWO CONSECUTIVE FASTEST CYCLES SHOWN)

NOTES

A. THIS WAVE FORM PRESENT ONLY IF THE BPC IS THE ORIGINATOR OF THE MEMORY CYCLE.

B. ACTIVE PULL-UP DURING MECD ON $\overline{DVAL}$, RDW, $\overline{STM}$ AND $\overline{DSTM}$.

C. MEANING DURING THIS TIME, BUT LATCHED DURING STMA ONLY. SHOULD BE LOOKED AT DURING STM ONLY.

D. WAVEFORM SHOWN ASSUMES BPC AS THE ORIGINATOR OF THE MEMORY CYCLE. IF THE ORIGINATOR WERE AN EXTERNAL AGENCY, RDW COULD TRANSITION TOGETHER WITH STM.

E. EARLIEST RELEASE OF RDW IF AN EXTERNAL AGENCY WERE THE ORIGINATOR OF THE MEMORY CYCLE.

F. TRANSITIONS IMMEDIATELY AT THE START OF Ø1 IF THE BPC IS THE ORIGINATOR OF THE MEMORY CYCLE.

G. FOLLOWS STM.

H. UMC NEED NOT BE USED IF SMC IS GIVEN BY THE ORIGINATOR EXACTLY AS SHOWN, INSTEAD. HOWEVER, IF UMC IS GIVEN AS SHOWN, IT WILL RESULT IN SMC AS SHOWN.

UMC IS IDLE IF THE BPC IS THE ORIGINATOR.

I. FOR ADDRESS.

J. FOR DATA.

WRITE MEMORY (TWO CONSECUTIVE FASTEST CYCLES SHOWN)

FIG 82C

NOTES

A. ACTIVE PULL-UP DURING MECD.

B. DOTTED LINES REPRESENT ZERO OR ANY INTEGRAL NUMBER OF Ø1-Ø2 PAIRS.

C. NOTE THAT $\overline{UMC}$ COULD EQUAL $\overline{STM}$.

GENERALIZED 4-STATE BPC WRITE MEMORY CYCLE WITHOUT HANDSHAKE

NOTES

A. ACTIVE PULL-UP DURING MECD.

B. DOTTED LINES REPRESENT ZERO OR ANY INTEGRAL NUMBER OF Ø1-Ø2 PAIRS.

C. NOTE THAT $\overline{SMC}$ CANNOT EQUAL $\overline{DVAL}$; $\overline{DVAL}$ LASTS TOO LONG.

GENERALIZED 5-STATE BPC WRITE MEMORY CYCLE WITH HANDSHAKE (LEADING EDGE OF DVAL USED TO INITIATE SMC)

A. ACTIVE PULL-UP DURING MECD.

B. DOTTED LINES REPRESENT ZERO OR ANY INTEGRAL NUMBER OF Ø1-Ø2 PAIRS.

C. NOTE THAT $\overline{\text{UMC}}$ COULD EQUAL $\overline{\text{DVAL}}$.

GENERALIZED 6-STATE BPC WRITE MEMORY CYCLE WITH HANDSHAKE (LEADING EDGE OF DVAL USED TO INITIATE UMC)

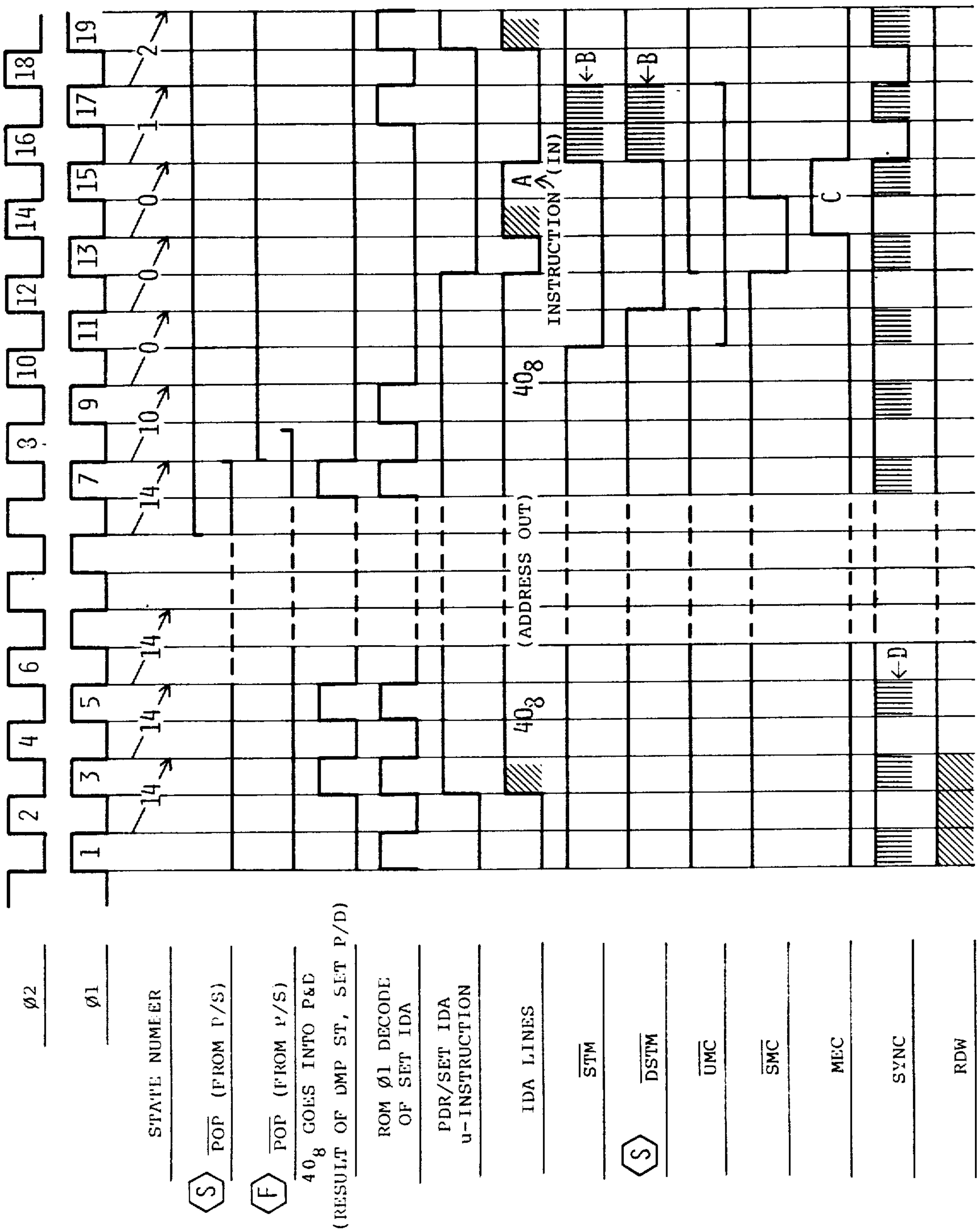
BPC START-UP AND FIRST INSTRUCTION FETCH SEQUENCE FIG 86A

BPC START-UP AND FIRST INSTRUCTION FETCH SEQUENCE

NOTES

A. IDA EQUALS THE INSTRUCTION FETCHED FROM LOCATION $40_8$. IN THIS EXAMPLE WE ASSUME THAT IT IS JMP $41_8$, I.

B. ACTIVE PULL-UP ON $\overline{STM}$ AND $\overline{DSTM}$ DURING MECD.

C. MEC RESETS THE LATCHED ROM OUTPUT FOR SYNC.

D. POP FORCES AN INITIAL SYNC. SYNC IS ALWAYS PRE-CHARGED ON Ø1.

E. DOTTED LINES REPRESENT AN INDEFINITE DELAY.

BPC START-UP AND FIRST INSTRUCTION FETCH SEQUENCE

FIG 86C

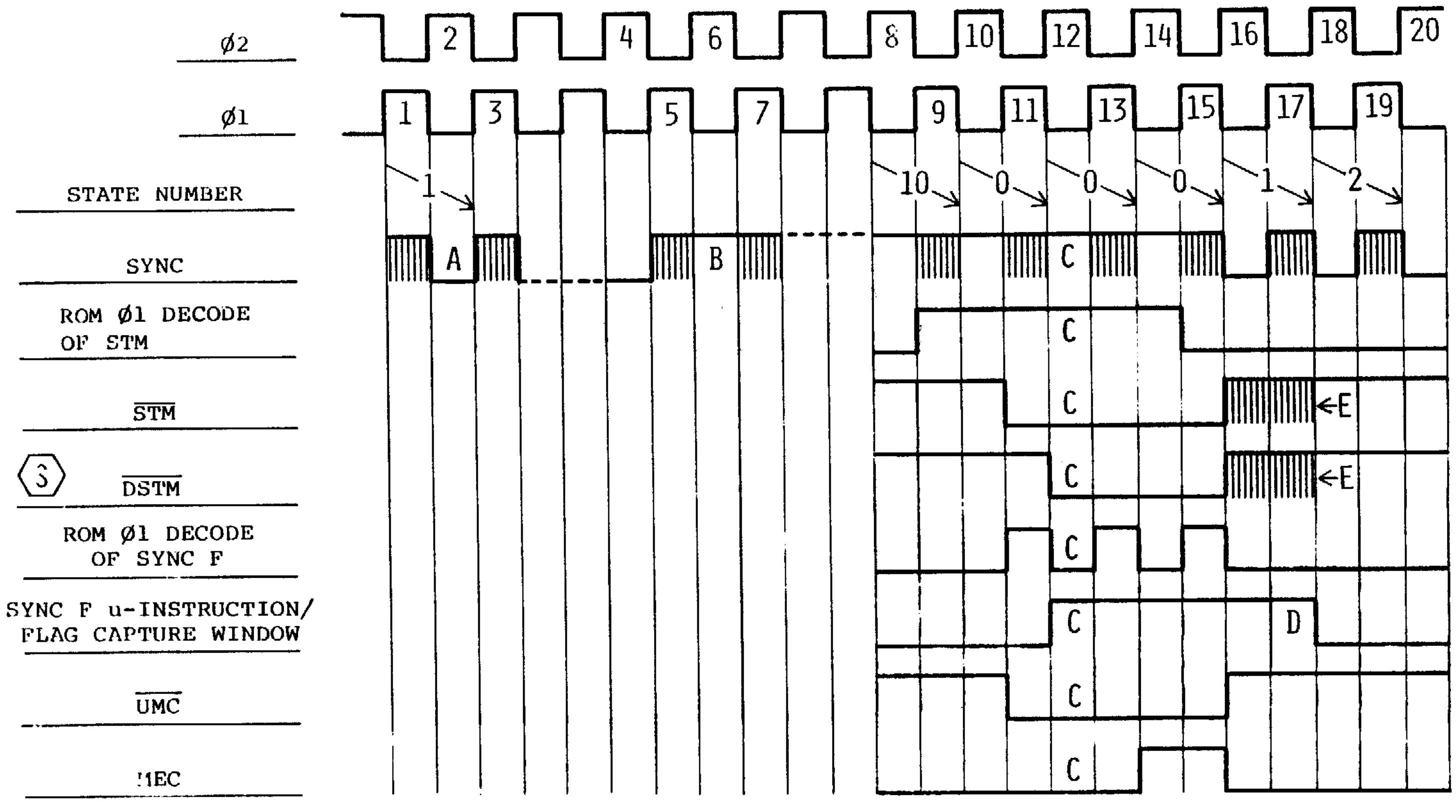

NOTES

A. SYNC IS FALSE AT THE END OF THE PREVIOUS INSTRUCTION FETCH.

B. DURING THE EXECUTION OF THE PREVIOUS INSTRUCTION, SYNC GOES TRUE ON OR BEFORE STATE 10.

C. CAN BE IN STATE 0 FOR 2, 3, OR 4 STATES. TYPICALLY IT IS 3. THE EXACT NUMBER DEPENDS UPON WHEN STM WAS GIVEN, AND WHETHER OR NOT THE FETCH IS FROM A BPC REGISTER.

D. AT VERY LEAST, FLAGS MUST BE TRUE DURING THIS Ø2.

E. ACTIVE PULL-UP DURING MECD.

CAPTURE OF FLAGS DURING BPC INSTRUCTION FETCH FIG 87

INTERRUPT DURING A BPC INSTRUCTION FETCH

NOTES

A. $\overline{INT}$ MUST NOT BE PULLED BEFORE SYNC IS GIVEN.

B. IF THE PREVIOUS INSTRUCTION WAS A GROUP A INSTRUCTION, ONE LESS STATE-TIME IS SPENT IN STATE 0, AND THIS PULSE DOES NOT OCCUR. ALSO, THE STATE NUMBERS CHANGE AS INDICATED IN THE PARENTHESIS.

C. DEPENDS UPON $\overline{INT}$. IF NOTE B APPLIES, YINT'S EARLIEST TRANSITION IS A STATE LATER THAN CLOCKTIME #10.

D. FETCHED INSTRUCTION THAT IS ABORTED AND REPLACED INTERNALLY BY JSM $10_8$, I.

E. $\overline{INT}$ MUST BE RELEASED PRIOR TO CLOCKTIME #35.

F. PRESENT VERSION OF THE BPC DOES NOT ALLOW AN INSTRUCTION FETCH FROM A BPC REGISTER TO BE INTERRUPTED.

INTERRUPT DURING A BPC INSTRUCTION FETCH

FIG 88B

BUS REQUEST AND BUS GRANT DURING MEMORY CYCLES

BUS REQUEST AND BUS GRANT DURING MEMORY CYCLES

NOTES

A. THIS IS THE FIRST OF TWO SET IDA'S. THE SECOND ONE IS NOT DECODED DUE TO THE GRANTING OF THE BUS. NOTE THAT EXTERNAL USE OF THE BUS MUST WAIT UNTIL THE EFFECT OF THIS SET IDA IS OVER.

B. THIS IS A RE-DECODING OF THE SAME SET IDA MENTIONED IN NOTE A. IN THIS WAY THE SET IDA/SET IDA-STM SEQUENCE IS PRESERVED.

C. MEMORY DATA. IT SO HAPPENS WE SHOW DATA FOR A READ CYCLE, AS OPPOSED TO THAT FOR A WRITE CYCLE. IT DOESN'T MATTER.

D. EARLIEST POSSIBLE USE OF THE BUS.

E. ACTIVE PULL-UP ON $\overline{STM}$ AND $\overline{DSTM}$ DURING MECD.

F. DOTTED LINES REPRESENT AN INDEFINITE INTERRUPTION.

G. IF AN IOC IS IN THE SYSTEM, IT WILL PRE-CHARGE $\overline{BR}$ DURING $\phi 2$.

H. ACTIVE PULL-UP OF BG DURING $\phi 1$.

I. SSTP ENDS SOONER THAN STP. THIS ALLOWS A POSSIBLE SET IDA TO BE RE-DECODED 1 STATE PRIOR TO ALL OTHER RESUMED ROM ACTIVITY.

BUS REQUEST AND BUS GRANT DURING MEMORY CYCLES

FIG 89C

NOTES:

1. 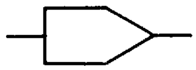 DENOTES A MICRO-INSTRUCTION DECODED IN THE ROM.

2.  AND  DENOTE ONE- AND TWO-WAY INTERCONNECTIONS TO A BUS; ALWAYS CONTROLLED BY A ROM MICRO-INSTRUCTION.

3. 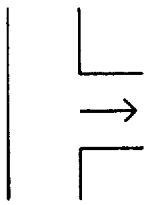 DENOTES A DIRECT CONNECTION BETWEEN TWO ITEMS.

4. 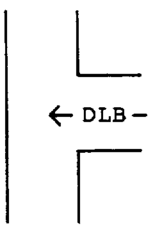

DENOTES A CONNECTION BETWEEN TWO ITEMS THAT IS ACTIVE ONLY WHEN THE STATED SIGNAL IS GIVEN. SOME SUCH SIGNALS ARE ROM DECODED MICRO-INSTRUCTIONS, WHILE OTHERS ARE PRESENT THROUGHOUT AN ENTIRE EXECUTION CYCLE.

5. 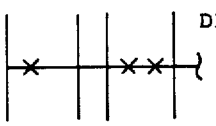 DENOTES THAT THE STATED LINE REPRESENTS A DECODED CONDITION.

6. 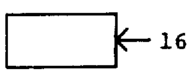

REPRESENTS A NON-MICRO-INSTRUCTION CONTROL LINE OR SOME OTHER SIGNAL.

7. 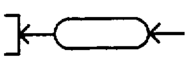 REPRESENTS AN INPUT TERMINAL TO THE IOC.

8.  REPRESENTS AN OUTPUT TERMINAL FROM THE IOC.

9.  REPRESENTS A TERMINAL THAT IS BOTH AN INPUT AND AN OUTPUT.

10. NUMBERS IN PARENTHESES INDICATE THE NUMBER OF BITS A MECHANISM HANDLES.

11. THE LOGICAL SENSE (XXX VERSUS $\overline{XXX}$) OF THE I/O TERMINALS IS CORRECTLY INDICATED. HOWEVER, THE DRAWING IS NOT A RELIABLE INDICATOR OF THE EXACT SENSE OF THE INTERNAL SIGNALS. TYPICALLY BOTH SENSES EXIST, AND FREQUENTLY THE PHYSICAL PROXIMITY OF SIGNALS TO THEIR DESTINATIONS WAS MORE IMPORTANT IN DECIDING WHICH SENSE TO USE, RATHER THAN AGREEMENT OF LOGICAL SENSE.
BECAUSE STRICT ACCURACY IN REPORTING SIGNAL SENSES ON SUCH A GENERAL LEVEL DRAWING WOULD SHARPLY INCREASE THE NUMBER OF INTERCONNECTIONS, WITH ONLY A SLIGHT INCREASE IN USEFULNESS, WE USUALLY SHOW ONLY THE NAME OF THE SIGNAL.

FIG 90 C

HOW TO INTERPRET THE IOC ASM CHARTS

1. What we usually refer to simply as a state ("state 2 for a PLACE instruction") is generally a coincidence of that particular state-count and some other qualifiers (each state machine has its own collection). The most precise way to refer to a location on an ASM chart is to indicate which state machine, and which instruction or operation. Some states (0) within a particular machine are completely independent of all qualifiers except the state count itself and those particular qualifiers that effect the specific instructions decoded within the state. States are indicated by circles with numbers in them: (1). Instruction group information is prominently displayed next to sections to which it pertains.

2. Each state represents a Ø2 pre-charge and Ø1 decode in the ROM. The ASM chart represents what is decoded from the ROM in the various states; it does not necessarily represent end-results that occur simultaneously. If, for instance, two instructions decoded in the same state have different delays coming from the ROM, then they do not result in simultaneous activity, even though they are drawn as being in the same state.

3. Rectangular boxes ( [DMP C] ) denote micro-instructions. Diamonds ( <MECQ=1?> ) denote qualifiers affecting the decoding of micro-instructions within a state.

Some micro-instructions are accompanied by a vertical bar to the right of their enclosing rectangle:

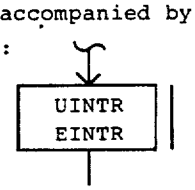

This is a short hand notation for denoting that (all) the micro-instructions in that rectangle are conditional upon STOPQ, thus:

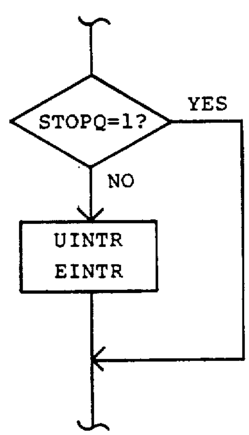

INTERPRETING THE IOC ASM CHART

FIG 91A

HOW TO INTERPRET THE IOC ASM CHARTS, CONT.

The symbol

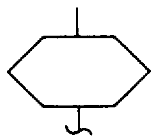

is used to denote various different things, depending upon the flow chart. In each instance a note on the flow chart indicates the meaning. The symbol is most widely used to denote activity controlled be a different state-machine, or, as a shorthand notation to denote an often used but awkwardly drawn segment of flow chart.

4. All activity within a state is decoded and initiated (its delay is begun) at the same time. The fact that a state is shown as a sequential arrangement of boxes and diamonds does not imply sequential activity; the entire state is deocoded simultaneously. For example, state 0 of the Instruction Controller is represented below:

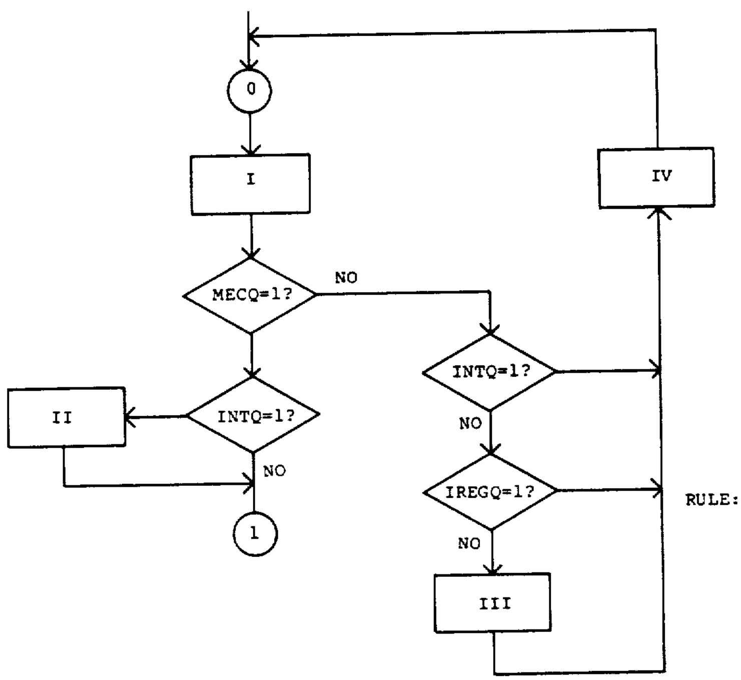

RULE: IDENTIFY THE PATH, THEN DECODE ALL INSTRUCTIONS AT ONCE.

INTERPRETING THE IOC ASM CHART

FIG 91 B

HOW TO INTERPRET THE IOC ASM CHARTS, CONT.

Another way to represent the same activity is illustrated below. We don't draw the ASM chart that way because of the increased size and because of problems in achieving connectedness. Also, overall algorithmic process would be hard to see; the more compact notation results in a more effective visual outline. Within a state however, the expanded notation is often less confusing as it more closely represents the actual way things are done.

If MECQ=1 and INTQ=0, then:

If MECQ=1 and INTQ=1, then,

If MECQ=0, INTQ=0 and IREGQ=0, then:

If MECQ=0, and either of INTQ or IREGQ=1, then:

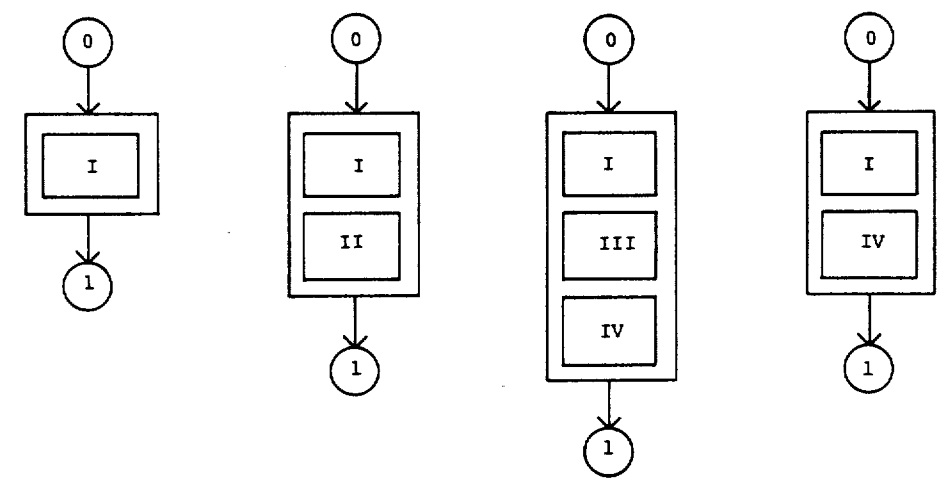

5. Within a state, related instructions are grouped together in the same box solely for the sake of algorithmic clarity.
6. Because of limitations on transistor device size, and the large capacitances of the IDA lines, two consecutive SET IDA'S are required to ensure that IDA lines assume their proper final values.

INTERPRETING THE IOC ASM CHART

FIG 91C

OVERVIEW OF THE INSTRUCTION CONTROLLER ASM CHART

"INST. FETCH AND INTERRUPT DETECTION" SEGMENT OF THE INST. CONTROLLER

"NOT IOC INSTRUCTION" SEGMENT OF THE INST. CONTROLLER ASM CHART

"RET,P" SEGMENT OF THE INST. CONTROLLER ASM CHART

"EIR" SEGMENT OF THE INST. CONTROLLER
ASM CHART

"DIR" SEGMENT OF THE INST. CONTROLLER ASM CHART

"DMA MODE" OF THE INST. CONTROLLER ASM CHART

"DDR" SEGMENT OF THE INST. CONTROLLER ASM CHART

"PLACE" SEGMENT OF THE INST. CONTROLLER ASM CHART

"WITHDRAW" SEGMENT OF THE INST. CONTROLLER ASM CHART

"INTERRUPT" SEGMENT OF THE INST. CONTROLLER ASM CHART

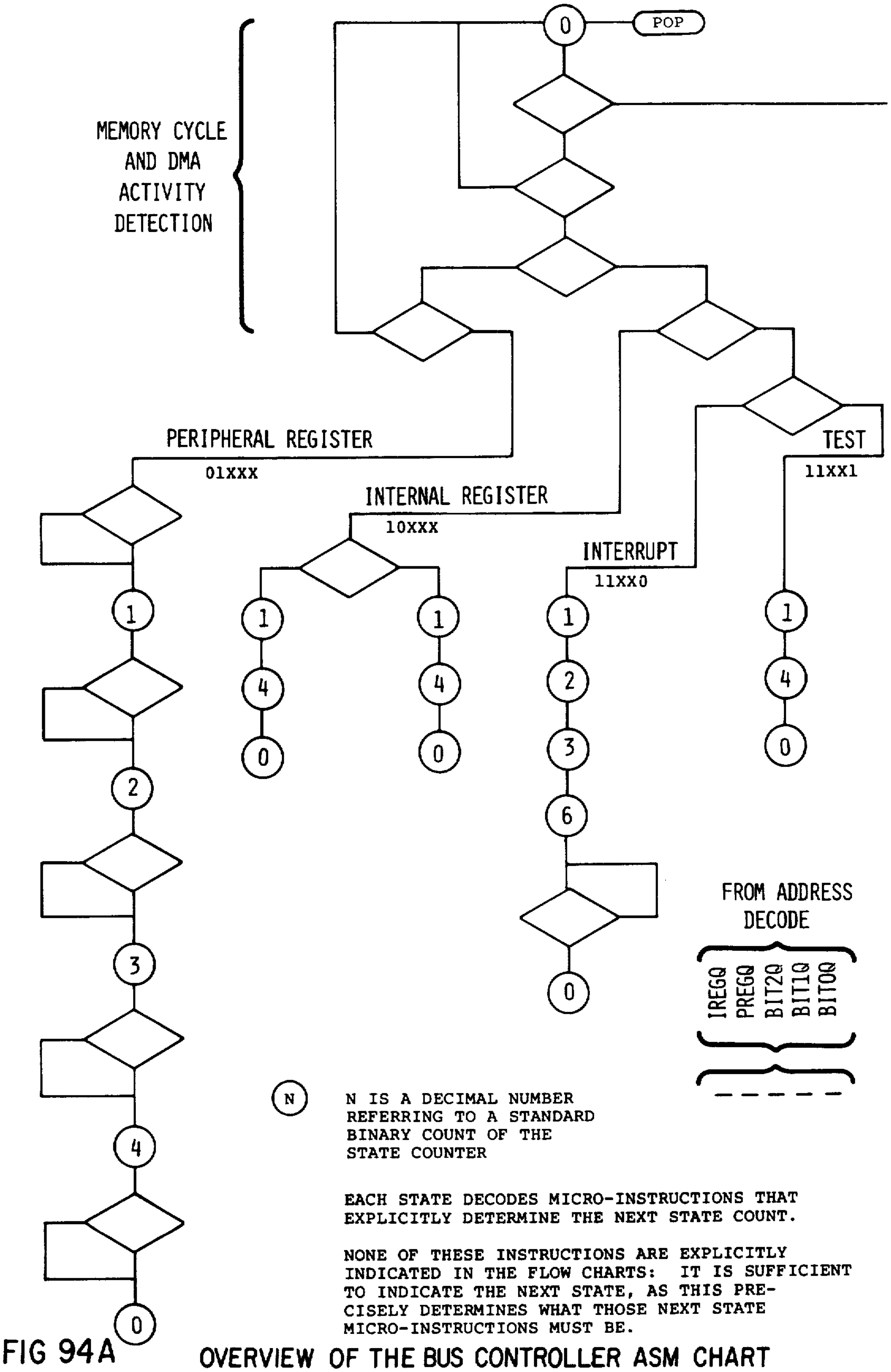

N IS A DECIMAL NUMBER REFERRING TO A STANDARD BINARY COUNT OF THE STATE COUNTER

EACH STATE DECODES MICRO-INSTRUCTIONS THAT EXPLICITLY DETERMINE THE NEXT STATE COUNT.

NONE OF THESE INSTRUCTIONS ARE EXPLICITLY INDICATED IN THE FLOW CHARTS: IT IS SUFFICIENT TO INDICATE THE NEXT STATE, AS THIS PRECISELY DETERMINES WHAT THOSE NEXT STATE MICRO-INSTRUCTIONS MUST BE.

FIG 94A OVERVIEW OF THE BUS CONTROLLER ASM CHART

"MEMORY CYCLE DETECTION" SEGMENT OF
THE BUS CONTROLLER ASM CHART

"PERIPHERAL REGISTER" SEGMENT OF THE BUS CONTROLLER ASM CHART

NOTE: DMP & SET INTERNAL REGISTER DEPEND UPON THE OUTPUT OF ADDRESS·DECODE

| ADB0Q | ADB1Q | ADB2Q | DMP INTERNAL REG. | SET INTERNAL REG. |
|---|---|---|---|---|
| 0 | 0 | 0 | DMP IV | SET IV |
| 0 | 0 | 1 | DMP PA | SET PA |
| 0 | 1 | 0 | DMP W | SET W |
| 0 | 1 | 1 | DMP DMAPA | SET DMAPA |
| 1 | 0 | 0 | DMP DMAMA | SET DMAMA |
| 1 | 0 | 1 | DMP DMAC | SET DMAC |
| 1 | 1 | 0 | DMP C | SET C |
| 1 | 1 | 1 | DMP D | SET D |

"INTERNAL REGISTER" SEGMENT OF THE BUS CONTROLLER ASM CHART

INTERRUPT POLL SEGMENT OF THE BUS CONTROLLER ASM CHART

THE TEST FUNCTION EXISTS TO ALLOW THE I REGISTER TO BE THE DESTINATION OF A WRITE MEMORY CYCLE. THIS IS ALLOWED ONLY UNDER THE ERA MODE OF ADDRESSING.

WRITE TO I VIA ERA SEGMENT OF THE BUS CONTROLLER ASM CHART.

WAIT FOR MEMORY COMPLETE. THE PERIPHERAL HAS BEEN PUTTING THE DATA ONTO THE IOD BUS. BUT THE PERIPHERAL BIB'S HAVE BEEN CONNECTING THE IOD BUS TO THE IDA BUS. HENCE, THE PERIPHERAL HAS BEEN SENDING ITS DATA TO THE MEMORY.

"DMA" SEGMENT OF BUS CONTROLLER ASM CHART

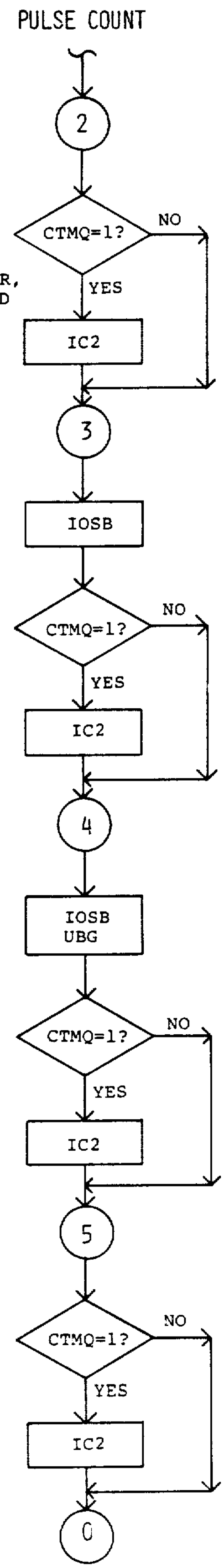

PULSE COUNT MODE OPERATION INITIATES DUMMY I/O BUS CYCLES. IC2, CTM, AND ISOB ARE AS USUAL. HOWEVER, THERE IS NO STM OR SMC, AND NO BE. NO DATA APPEARS ON THE IDA BUS, EVEN THOUGH FOR A BRIEF PERIOD THE ADDRESS DOES.

GIVE IC2 IF COUNT IN DMAC IS NEGATIVE.

GIVE "DUMMY" IOSB

UBG ALLOWS THE DMA CONTROLLER STATE MACHINE TO DETERMINE ITS NEXT CHANGE OF STATE ON THE BASIS OF THE CURRENT STATUS OF DMA REQUEST ($\overline{DMAR}$).

"PULSE COUNT" SEGMENT OF THE BUS CONTROLLER ASM CHART

FIG 95G

1.  OR 

TRANSITION UP OR TRANSITION DOWN CAN OCCUR ANYTIME WITHIN THE INDICATED INTERVAL. USED TO INDICATE TIME-WINDOWS WITHIN WHICH EXTERNALLY ORIGINATED EVENTS CAN HAPPEN. REPRESENTS IDEALIZED LOGICAL ACTIVITY; RISE TIMES AND DELAYS ARE TAKEN INTO CONSIDERATION ONLY IN A GENERAL WAY.

2.  OR 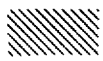

REPRESENTS THE SET-UP TIME OF A SIGNAL BEING DRIVEN.

3. REPRESENTS A LINE THAT IS EITHER UNDEFINED OR A DON'T CARE.

4. 

REPRESENTS A LINE THAT IS ACTIVELY PULLED-UP.

5. CAPITAL LETTERS FROM THE START OF THE ALPHABET REPRESENT EXPLANATORY NOTES.

6. NUMERALS IN THE Ø2-Ø1 WAVEFORMS ARE STRICTLY FOR REFERENCE WITHIN THAT PARTICULAR SET OF WAVEFORMS, AND HAVE NO SIGNIFICANCE OUTSIDE THAT SET.

7. DOTTED LINES INDICATE ZERO OR MORE COMPLETE STATE TIMES THAT OCCUR AS A FUNCTION OF SOME EXTERNAL CONDITION (SUCH AS WAITING FOR MEMORY COMPLETE).

8. IN GENERAL, THE WAVEFORMS ARE QUITE IDEALIZED. THEY EXPLAIN THE LOGICAL RELATIONSHIPS BETWEEN SIGNALS, BUT ACTUAL DELAYS, RISE TIMES, SIGNAL LEVELS AND THRESHOLDS ARE NOT INDICATED.

CONVENTIONS USED IN THE WAVEFORMS

FIG 96

RESPONSE TO A READ MEMORY CYCLE REFERENCING AN INTERNAL IOC REGISTER

NOTES

A. ASSUMES THE BPC IS THE ORIGINATOR OF THE MEMORY CYCLE. THE IOC LOOKS AT R/WQ DURING CLOCKTIMES 4 AND 6 ONLY.

B. ACTIVE PULL-UP ON RDW AND $\overline{STM}$ BY THE BPC, (FOR RDW ONLY -- NOT FOR R/WQ).

C. LATCHED BY SAQL (FIRST Ø2 FOLLOWING STM). REMAINS LATCHED UNTIL END OF STM.

RESPONSE TO A READ MEMORY CYCLE REFERENCING AN INTERNAL IOC REGISTER, CONT.

RESPONSE TO A WRITE MEMORY CYCLE REFERENCING AN INTERNAL IOC REGISTER

NOTES

A. ASSUME THE BPC IS THE ORIGINATOR OF THE MEMORY CYCLE. THE IOC LOOKS AT R/WQ DURING CLOCKTIMES 4 AND 6 ONLY.

B. ACTIVE·PULL-UP ON RDW AND $\overline{STM}$ BY THE BPC, (FOR RDW ONLY -- NOT FOR R/WQ).

C. LATCHED BY SAQL (FIRST Ø2 FOLLOWING STM). REMAINS LATCHED UNTIL END OF STM.

RESPONSE TO A WRITE MEMORY CYCLE REFERENCING AN INTERNAL IOC REGISTER, CONT.

READ I/O BUS CYCLE

NOTES

A. ASSUMES THE BPC IS THE ORIGINATOR OF THE MEMORY CYCLE. THE IOC LOOKS AT R/WQ DURING CLOCKTIMES 4,6,8,10&12 ONLY.

B. ACTIVE PULL-UP ON RDW AND STM BY THE BPC, (FOR RDW ONLY -- NOT FOR R/WQ).

C. LATCHED BY SAQL (FIRST Ø2 FOLLOWING STM). REMAINS LATCHED UNTIL END OF STM.

D. WHICH ONES ARE DECODED DEPENDS UPON WHICH OF R4-R7 WAS REFERENCED.

READ I/O BUS CYCLE, CONT.

WRITE I/O BUS CYCLE

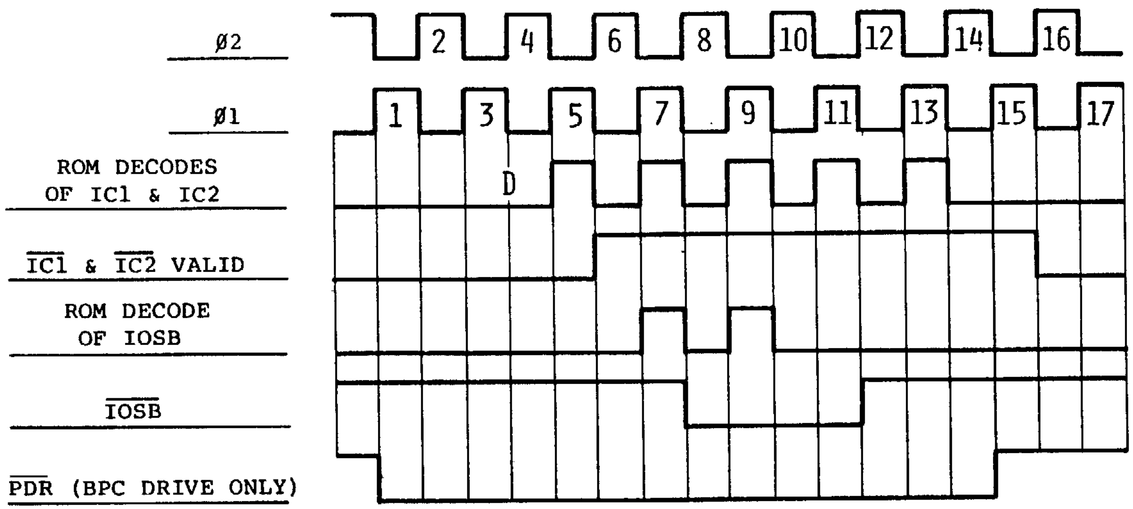
—— NOTES ——
A. ASSUMES THE BPC IS THE ORIGINATOR OF THE MEMORY CYCLE. THE IOC LOOKS AT R/WQ DURING CLOCKTIMES 4,6,8,10&12 ONLY.
B. ACTIVE PULL-UP ON RDW AND $\overline{STM}$ BY THE BPC, (FOR RDW ONLY -- NOT FOR R/WQ).
C. LATCHED BY SAQL (FIRST Ø2 FOLLOWING STM). REMAINS LATCHED UNTIL END OF STM.
D. WHICH ONES ARE DECODED DEPENDS UPON WHICH OF R4-R7 WAS REFERENCED.
WRITE I/O BUS CYCLE, CONT. FIG 100B GENERATION BY THE IOC OF $\overline{INT}$ FROM AN INTERRUPT REQUEST; EFFECT OF $\overline{INT}$ UPON THE BPC

NOTES

A. THE DOTTED LINE REPRESENTS A VARIABLE NUMBER OF STATE-TIMES. THIS COMES ABOUT BECAUSE THE BPC ALLOWS SYNC AT VARYING INTERVALS BEFORE REACHING ITS INSTRUCTION FETCH SEQUENCE. THE OTHER CHIPS IN THE SYSTEM ALSO HAVE VARIABILITY IN THE MANNER IN WHICH THEY ALLOW SYNC.

B. WHEN SYNC RESUMES DEPENDS UPON THE NUMBER OF INDIRECT ADDRESS ENCOUNTERED WHILE USING THE INTERRUPT TABLE. CLOCKTIME 40 WOULD BE THE EARLIEST SYNC COULD AGAIN GO HIGH; THAT WOULD BE FOR ONE LEVEL OF INDIRECT.

C. DEPENDS UPON SYNC.

D. HELD UNTIL THERE IS AN IOSB WITH THE PROPER SELECT CODE FOR THE INTERRUPTING PERIPHERAL (OCCURS DURING THE INTERRUPT SERVICE ROUTING--NO IOSB OCCURS DURING THE INTERRUPT POLL).

E. FOLLOWS THE INTERRUPT REQUESTS.

F. COMES BACK UP IN CLOCKTIME 37.

G. GOES BACK DOWN IN CLOCKTIME 38.

H. A RESULT OF CHANGE IN ONE OF PHIG OR PLIG IN CLOCKTIME 36, AS A RESULT OF UIGD IN 34-35.

I. NUMBERS IN PARENTHESES REPRESENT OTHER POSSIBLE STATE COUNTS.

J. THIS SEQUENCE OF ACTIVITY IS REFERENCED TO THE COMPLETION OF THE INSTRUCTION FETCH. STRICTLY SPEAKING, WE OUGHT TO SHOW DOTTED LINE INTERVAL BETWEEN CLOCKTIMES 10 AND 11. IN THE INTERESTS OF REDUCING COMPLEXITY, WE ASSUME A SPECIFIC (AND TYPICAL) MEMORY CYCLE FOR THAT INSTRUCTION FETCH. REMEMBER, INTERRUPT RELATED ACTIVITY IN THE BPC (AND SUBSEQUENTLY THAT OF THE INSTRUCTION AND BUS CONTROLLERS) STARTS AT THE END OF THE INSTRUCTION FETCH.

K. THIS IS THE ABORTED INSTRUCTION.

L. ANOTHER SMC IS GIVEN BY THE IOC IN CLOCKTIMES 33-34.

GENERATION BY THE IOC OF $\overline{INT}$ FROM AN INTERRUPT REQUEST; EFFECT OF $\overline{INT}$ UPON THE BPC, CONT.

FIG 101B

GENERATION OF THE INTERRUPT VECTOR BY THE INSTRUCTION CONTROLLER

GENERATION OF THE INTERRUPT VECTOR BY THE INSTRUCTION CONTROLLER, CONT.

NOTES

A. THIS STATE CHANGE AWAITS SYNC, WHICH IS NOT GIVEN BY THE BPC (JSM SEGMENT OF ASM CHART) UNTIL THE JSM-INDIRECT IS COMPLETED. ASSUMING MINIMUM LENGTH MEMORY CYCLES, THE FIRST STATE 0 WOULD BE CLOCK-TIMES 64-65.

B. THE WORD IN THE INTERRUPT TABLE (ACCESSED BY DOING A JSM $10_8$, I) MUST BE THE ADDRESS OF THE DESTINATION AND NOT ANOTHER INDIRECT ADDRESS.

C. PREVIOUS SELECT CODE.

D. PA(3) IS SET AGAIN BY THE HIGH-LOW INTERRUPT VECTOR GENERATOR.

E. EARLIEST THAT SYNC CAN GO HIGH IS IN CLOCK TIME 62.

GENERATION OF THE INTERRUPT VECTOR BY THE INSTRUCTION CONTROLLER, CONT.

FIG 101E

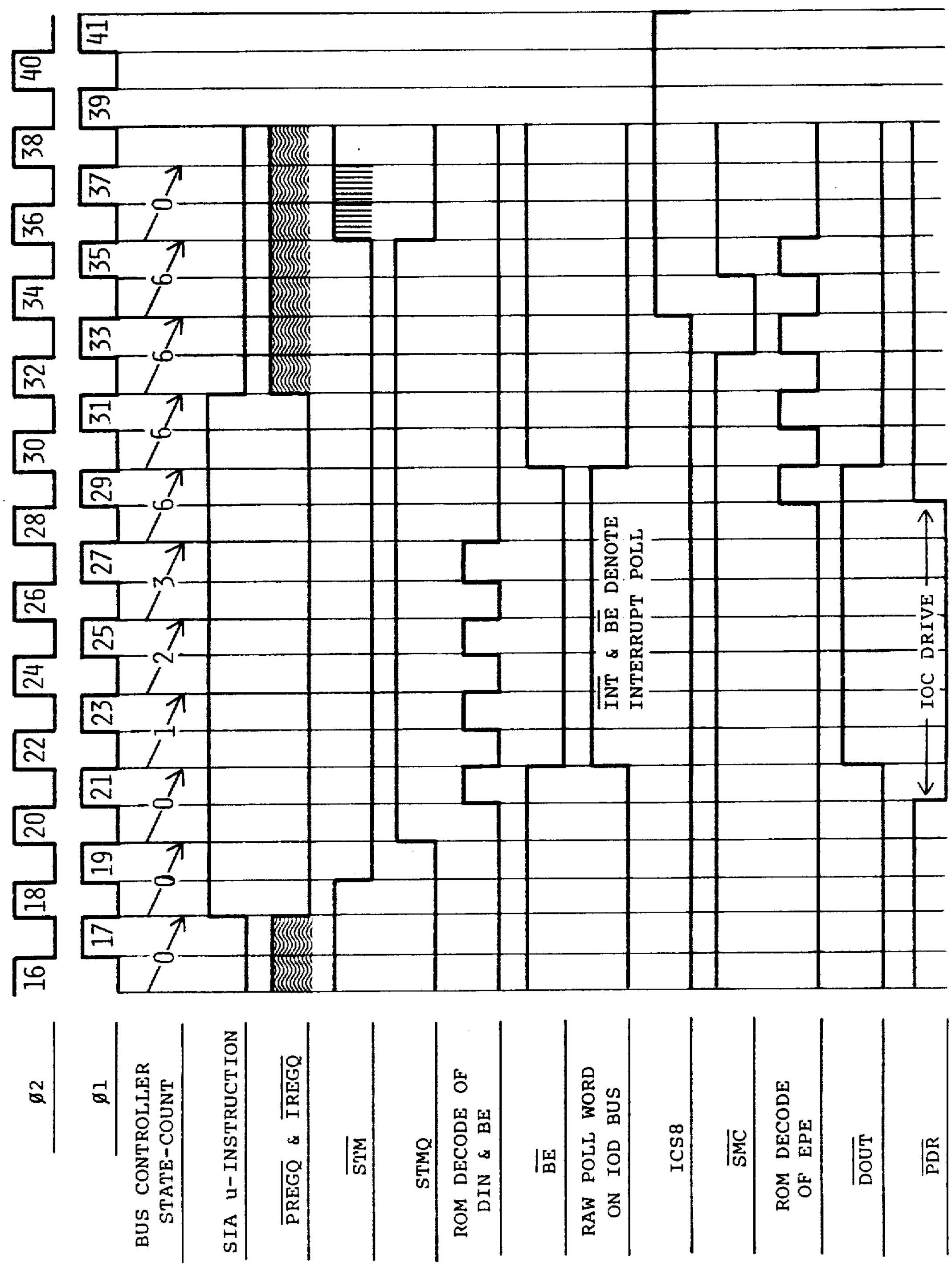
PERFORMANCE OF THE INTERRUPT POLL BY THE BUS CONTROLLER FIG 102

— NOTES —

A. DOTTED LINE REPRESENTS POSSIBLE WAIT UNTIL ABG IS GIVEN BY THE INSTRUCTION CONTROLLER, AND BG IS GIVEN BY THE BPC.

B. FOLLOWS $\overline{\text{DMAR}}$.

GENERATION OF BUS GRANT AND DMAGQ FROM DMA REQUEST (EITHER DMA OR PCM MODE)

DMA READ FROM MEMORY

DMA READ FROM MEMORY, CONT.

DMA READ FROM MEMORY, CONT.

NOTES

A. THE DOTTED LINE REPRESENTS A VARIABLE NUMBER OF STATE-TIMES. THIS COMES ABOUT BECAUSE OF POSSIBLE VARIATIONS IN MEMORY CYCLE TIMING.

B. ASSUMES NO CONSECUTIVELY FOLLOWING DMA CYCLE. HAD THERE BEEN, THIS STATE-COUNT WOULD REMAIN 1 FOR ANOTHER COMPLETE CYCLE.

C. IT IS AT THIS TIME THAT $\overline{\text{DMAR}}$ MUST REFLECT WHETHER OR NOT THERE IS TO BE A CONSECUTIVELY FOLLOWING DMA CYCLE.

D. INDICATED TRANSITION ASSUMES THERE IS TO BE NO CONSECUTIVELY FOLLOWING DMA CYCLE.

E. $\overline{\text{DMAR}}$ AFFECTS THE DMA CONTROLLER STATE COUNT (AND THUS DMAGQ AND BRHLD).

F. IF THERE WERE A CONSECUTIVELY FOLLOWING DMA CYCLE THIS STATE-COUNT WOULD BE 1, OTHERWISE THIS STATE-COUNT WOULD REMAIN 0 UNTIL THE NEXT IOC-RELATED MEMORY CYCLE.

G. NON-DMA PERIPHERAL ADDRESS IS ON THE PERIPHERAL ADDRESS BUS.

H. DMA MEMORY ADDRESS GOES INTO 0; IT IS SUBSEQUENTLY SENT OUT AS AN ADDRESS.

I. MEMORY DATA GOES INTO O; IT IS SUBSEQUENTLY SENT AS DATA TO THE PERIPHERAL.

J. EARLIEST NEXT ROM DECODE OF STM FOR A CONSECUTIVELY FOLLOWING DMA CYCLE.

K. ACTIVE PULL-UP BY THE BPC.

L. EARLIEST NEXT START MEMORY FOR A CONSECUTIVELY FOLLOWING DMA CYCLE.

M. INDICATED TRANSITION ASSUMES THE COUNT IN DMAC GOES NEGATIVE DURING THE CURRENT DMA CYCLE.

N. NOT DECODED IF CTMQ IS FALSE.

DMA READ FROM MEMORY, CONT.

FIG 104D

DMA WRITE INTO MEMORY

DMA WRITE INTO MEMORY, CONT.

DMA WRITE INTO MEMORY, CONT.

NOTES

A. THE DOTTED LINE REPRESENTS A VARIABLE NUMBER OF STATE-TIMES. THIS COMES ABOUT BECAUSE OF POSSIBLE VARIATIONS IN MEMORY CYCLE TIMING.

B. ASSUMES NO CONSECUTIVELY FOLLOWING DMA CYCLE. HAD THERE BEEN, THIS STATE-COUNT WOULD REMAIN 1 FOR ANOTHER COMPLETE CYCLE.

C. IT IS AT THIS TIME THAT $\overline{\text{DMAR}}$ MUST REFLECT WHETHER OR NOT THERE IS TO BE A CONSECUTIVELY FOLLOWING DMA CYCLE.

D. INDICATED TRANSITION ASSUMES THERE IS TO BE NO CONSECUTIVELY FOLLOWING DMA CYCLE.

E. $\overline{\text{DMAR}}$ AFFECTS THE DMA CONTROLLER STATE-COUNT (AND THUS DMAGQ AND BRHLD).

F. IF THERE WERE A CONSECUTIVELY FOLLOWING DMA CYCLE THIS STATE-COUNT WOULD BE A 1. OTHERWISE THIS STATE-COUNT WOULD REMAIN 0 UNTIL THE NEXT IOC-RELATED MEMORY CYCLE.

G. NON-DMA PERIPHERAL ADDRESS IS ON THE PERIPHERAL ADDRESS BUS.

H. DMA MEMORY ADDRESS GOES INTO O; IT IS SUBSEQUENTLY SENT OUT AS AN ADDRESS.

I. CLOCKTIME 16 REPRESENTS A CONFLICT. BOTH THE IOC AND THE PERIPHERAL ARE DRIVING THE IDA BUS. THIS CAUSES NO KNOWN PROBLEMS.

J. EARLIEST NEXT ROM DECODE OF STM FOR A CONSECUTIVELY FOLLOWING DMA CYCLE.

K. ACTIVE PULL-UP BY THE BPC.

L. EARLIEST NEXT START MEMORY FOR A CONSECUTIVELY FOLLOW DMA CYCLE.

M. INDICATED TRANSITION ASSUMES THE COUNT IN DMAC GOES NEGATIVE DURING THE CURRENT DMA CYCLE.

N. NOT DECODED IF CTMQ IS FALSE.

DMA WRITE INTO MEMORY, CONT.

FIG 105D

PULSE COUNT CYCLE

NOTES

A. ASSUMES NO CONSECUTIVELY FOLLOWING PULSE COUNT CYCLE. HAD THERE BEEN, THIS STATE-COUNT WOULD REMAIN 1 FOR ANOTHER COMPLETE CYCLE.

B. IT IS AT THIS TIME THAT $\overline{DMAR}$ MUST REFLECT WHETHER OR NOT THERE IS TO BE A CONSECUTIVELY FOLLOWING PULSE COUNT CYCLE.

C. INDICATED TRANSITION ASSUMES THERE IS TO BE NO CONSECUTIVELY FOLLOWING PULSE COUNT CYCLE.

D. $\overline{DMAR}$ AFFECTS THE DMA CONTROLLER STATE-COUNT (AND THUS DMAGQ AND BRHLD).

E. IF THERE WERE A CONSECUTIVELY FOLLOWING PULSE COUNT CYCLE THIS STATE-COUNT WOULD BE 1. OTHERWISE IT REMAINS A 0 UNTIL THE NEXT IOC-RELATED MEMORY CYCLE.

PULSE COUNT CYCLE, CONT.

FIG 106B

TWO CONSECUTIVE EXTENDED BUS GRANT CYCLES

NOTES

A. THE IOC PRE-CHARGES BUS REQUEST EACH Ø2.

B. MUST BE WELL GROUNDED SOME MINIMUM TIME BEFORE THE END OF Ø1.

C. THIS INTERVAL REPRESENTS A WAIT UNTIL THE "AND" OF TWO CONDITIONS IS TRUE. THESE CONDITIONS ARE: (1) THE BPC ALLOWS BUS GRANT, AND (2) ALLOW BUS GRANT (ABG) IS GIVEN. THE WAVE FORMS SHOW THE BPC ALLOWING BUS GRANT PRIOR TO ABG'S BEING GIVEN. THERE ARE OTHER POSSIBILITIES: THE ORDER COULD BE REVERSED, THEY COULD BE CO-INCIDENT, OR, ABG COULD HAVE ALREADY BEEN TRUE FOR A LONG TIME.

D. REPRESENTS AN INDEFINITE WAIT FOR THE COMPLETION OF THE MEMORY (BUS) CYCLE.

E. EARLIEST POINT FOR THE AGENCY REQUESTING THE BUS TO CEASE REQUESTING THE BUS, AND STILL INITIATE THE LAST CYCLE.

F. LATEST POINT FOR THE AGENCY REQUESTING THE BUS TO CEASE RE-QUESTING THE BUS, WITHOUT INITIATING A SUBSEQUENT CYCLE.

G. EARLIEST POSSIBLE INSTANCE OF THE BPC'S ALLOWING BUS GRANT IS THE FIRST Ø2 AFTER THE Ø1 WHEN THE BUS IS REQUESTED.

H. YBR STAYS HIGH HERE BECAUSE $\overline{\text{BUS}}$ $\overline{\text{REQUEST}}$ IS STILL HELD BY THE REQUESTING AGENCY.

TWO CONSECUTIVE EXTENDED BUS GRANT CYCLES, CONT.

FIG 107 B

NOTES

I. ALLOW BUS GRANT (ABG) COULD HAVE BEEN TRUE DURING THE INDEFINITE FUTURE.

J. START MEMORY (STM) NEEDN'T BE GIVEN RIGHT AWAY, SOONEST STM FOLLOWING EXTENDED BUS GRANT IS SHOWN. THERE REALLY OUGHT TO BE ANOTHER DOTTED LINE SEGMENT BETWEEN CLOCK-TIMES 7 AND 8, AND BETWEEN 17 AND 18.

K. ACTIVE PULL UP BY THE BPC.

L. FOLLOWS $\overline{\text{BUS}}$ $\overline{\text{REQUEST}}$ AND GROUNDED BY THE REQUESTING AGENCY.

M. FOLLOWS THE RESULTING EFFECTIVE BUS REQUEST.

N. PRE-CHARGED ON Ø1 BY THE BPC.

TWO CONSECUTIVE EXTENDED BUS GRANT CYCLES, CONT.

FIG 107 C

PLACE WORD OR PLACE BYTE

NOTES

A. INSTRUCTION FETCH BY THE BPC.

B. ADDRESS OF THE SOURCE REGISTER (0-7) CONTAINING THE DATA TO BE TRANSFERRED.

C. THIS IS THE DATA TO BE TRANSFERRED.

D. ADDRESS OF THE DESTINATION (STACK LOCATION) OF THE DATA, (CONTENTS OF C OR D REGISTER).

E. DOTTED LINES REPRESENT POSSIBLE TIMING VARIATIONS.

F. $\overline{\text{BYTE}}$ GOES LOW AS SHOWN ONLY IF THE PLACE INSTRUCTION IS A PLACE-BYTE INSTRUCTION. ALSO, THAT IS THE ONLY TIME THE IOC GROUNDS $\overline{\text{BYTE}}$.

G. ACTIVE PULL-UP BY BPC.

PLACE WORD OR PLACE BYTE

FIG 108 B

WITHDRAW WORD OR WITHDRAW BYTE

NOTES

A. INSTRUCTION FETCH BY THE BPC.
B. ADDRESS OF THE SOURCE (STACK LOCATION) OF THE DATA TO BE TRANSFERRED (CONTENTS OF THE COR D REGISTER).
C. THIS IS THE DATA TO BE TRANSFERRED.
D. ADDRESS OF THE DESTINATION REGISTER (0-7).
E. DOTTED LINES REPRESENT POSSIBLE TIMING VARIATIONS
F. ACTIVE PULL-UP BY BPC.

NOTES

A. ACTIVE PULL-UP BY BPC.

CONDENSED RESPONSE TO MEMORY CYCLES REFERENCING AN INTERNAL IOC REGISTER

— NOTES —

A. ACTIVE PULL-UP BY BPC.

CONDENSED READ I/O BUS CYCLE

CONDENSED WRITE I/O BUS CYCLE

OVERVIEW OF THE INTERRUPT PROCESS

NOTES

A. DOTTED LINE REPRESENTS VARIABLE LENGTH DELAY UNTIL AN INTERRUPT REQUEST CAN BE GRANTED BY THE IOC.

B. ACTIVE PULL-UP BY THE BPC.

C. EARLIEST POSSIBLE UNGROUNDING OF SYNC DURING Ø2 BY THE BPC IS DURING CLOCK TIME 62; ASSUMING THAT BIT 15 OF THE IV REGISTER IS A ONE, THAT THE MEMORY CYCLE TO STORE THE NEWEST VALUE IN THE RETURN STACK IS A MINIMUM MEMORY CYCLE, AND THAT THERE ARE NO INTERVENING BUS REQUESTS.

OVERVIEW OF THE INTERRUPT PROCESS, CONT.

FIG 113B

CONDENSED DMA READ FROM MEMORY

NOTES

A. POSSIBLE WAIT UNTIL THE IOC ALLOWS BUS GRANT, AND THE BPC GIVES A BUS GRANT.
B. VARIABLE TIMING FOR MEMORY CYCLE-POSSIBLE WAIT FOR SMC.
C. AT CLOCK TIME 21 DMA REQUEST MUST REFLECT WHETHER OR NOT THERE IS TO BE A CONSECUTIVELY FOLLOWING DMA CYCLE.
D. WAVEFORM SHOWN ASSUMES NO CONSECUTIVELY FOLLOWING DMA CYCLE.
E. ACTIVE PULL-UP BY BPC
F. EARLIEST TRANSITION IF THERE WERE A CONSECUTIVELY FOLLOWING DMA CYCLE.
G. NON-DMA PERIPHERAL ADDRESS IS ON THE BUS.
H. ASSUMING THE COUNT IN DMAC GOES NEGATIVE.

CONDENSED DMA READ FROM MEMORY, CONT.

FIG 114B

CONDENSED DMA WRITE INTO MEMORY

NOTES

A. POSSIBLE WAIT UNTIL THE IOC ALLOWS BUS GRANT, AND THE BPC GIVES A BUS GRANT.

B. VARIABLE TIMING FOR MEMORY CYCLE-POSSIBLE WAIT FOR SMC.

C. AT CLOCK TIME 21 DMA REQUEST MUST REFLECT WHETHER OR NOT THERE IS TO BE A CONSECUTIVELY FOLLOWING DMA CYCLE.

D. WAVEFORM SHOWN ASSUMES NO CONSECUTIVELY FOLLOWING DMA CYCLE.

E. CLOCK TIME 16 IS A CONFLICT: BOTH THE IOC AND THE PERIPHERAL ARE DRIVING THE BUS.

F. ACTIVE PULL-UP BY THE BPC.

G. EARLIEST TRANSITION IF THERE WERE A CONSECUTIVELY FOLLOWING DMA CYCLE.

H. NON-DMA PERIPHERAL ADDRESS IS ON THE BUS.

I. ASSUMING THE COUNT IN DMAC GOES NEGATIVE.

J. THE 16-BIT IOC'S PDR IS THE "OR" OF THE IOC'S SET IDA AND DATA IN.

CONDENSED DMA WRITE INTO MEMORY (CONT.)

FIG 115B

NOTES:

1.  DENOTES A MICRO-INSTRUCTION DECODED IN THE ROM.

2.  AND  DENOTE ONE- AND TWO-WAY INTERCONNECTIONS TO A BUS; ALWAYS CONTROLLED BY A ROM MICRO-INSTRUCTION.

3. 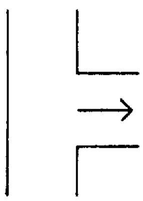 DENOTES A DIRECT CONNECTION BETWEEN TWO ITEMS.

4. 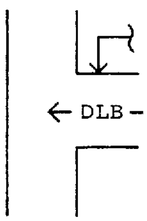

DENOTES A CONNECTION BETWEEN TWO ITEMS THAT IS ACTIVE ONLY WHEN THE STATED SIGNAL IS GIVEN. SOME SUCH SIGNALS ARE ROM DECODED MICRO-INSTRUCTIONS, WHILE OTHERS ARE PRESENT THROUGHOUT AN ENTIRE EXECUTION CYCLE.

5. 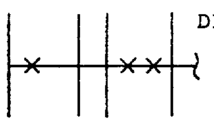 DENOTES THAT THE STATED LINE REPRESENTS A DECODED CONDITION.

6. 

REPRESENTS A NON-MICRO-INSTRUCTION CONTROL LINE OR SOME OTHER SIGNAL.

7. 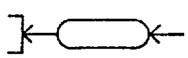 REPRESENTS AN INPUT TERMINAL TO THE EMC.

8. 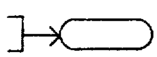 REPRESENTS AN OUTPUT TERMINAL FROM THE EMC.

9. 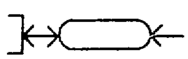 REPRESENTS A TERMINAL THAT IS BOTH AN INPUT AND AN OUTPUT.

10. NUMBERS IN PARENTHESES INDICATE THE NUMBER OF BITS A MECHANISM HANDLES.

11. THE LOGICAL SENSE (XXX VERSUS $\overline{XXX}$) OF THE I/O TERMINALS IS CORRECTLY INDICATED. HOWEVER, THE DRAWING IS NOT A RELIABLE INDICATOR OF THE EXACT SENSE OF THE INTERNAL SIGNALS. TYPICALLY BOTH SENSES EXIST, AND FREQUENTLY THE PHYSICAL PROXIMITY OF SIGNALS TO THEIR DESTINATIONS WAS MORE IMPORTANT IN DECIDING WHICH SENSE TO USE, RATHER THAN AGREEMENT OF LOGICAL SENSE.

BECAUSE STRICT ACCURACY IN REPORTING SIGNAL SENSES ON SUCH A GENERAL LEVEL DRAWING WOULD SHARPLY INCREASE THE NUMBER OF INTERCONNECTIONS, WITH ONLY A SLIGHT INCREASE IN USEFULNESS, WE USUALLY SHOW ONLY THE NAME OF THE SIGNAL.

FIG 116C

HOW TO INTERPRET THE EMC ASM CHART

1. What we usually refer to simply as a state ("state 2 for FXA") is generally a coincidence of that particular state-count and some group qualifier encoding pattern (representing a particular group). The most precise way to refer to a location on the ASM chart is indicate both the group and state-counts, (say, B4). Some states (0 and 1) are completely group independent. States are indicated by circles with numbers in them: (4). Group information is prominently displayed next to sections to which it pertains.

2. Each state represents a Ø2 pre-charge and Ø1 decode in the ROM. The ASM chart represents what is decoded from the ROM in the various states; it does not necessarily represent end-results that occur simultaneously. If, for instance, two instructions decoded in the same state have different delays between the ROM and the using agency, then they do not result in simultaneous activity, even though they are drawn as being in the same state.

3. Rectangular boxes ( [SET N] ) denote micro-instructions. Diamonds ( <MEC=1?> ) denote qualifiers affecting the decoding of micro-instructions. Ovals ( (STM) ) denote micro-instructions that are actually decoded and given, but that are "don't-cares". That is, they are present but do not affect the algorithmic process. These don't-cares are the result of minimizing the number of qualifiers used in the ROM.
   It is frquently the case that a don't-care instruction is conditional upon one or more qualifiers. For instance, the following notation means that if both D1ZQ and AERQ are true, then INC AE is decoded:
   (D1ZQ·AE1ZQ:INC AE)
   It is also frequently the case that several don't-care items occur (unconditionally) in a state. In such an instance the various don't-care micro-instructions are separated by semicolons, thus:
   (DMP ADD;DMP ADR1)
   A single instance of using a qualifier or combination of qualifiers can result in but a single instruction. But sometimes a state incorporates two separate uses of the same qualifier in order to decode two instructions. When these instructions are don't-cares, we employ a short-hand notation for this wherein the qualifier is shown once and the

INTERPRETING THE EMC ASM CHART

FIG 117Aa instructions are separated by commas, rather than semicolons, thus:

```
-----;
MEC:SET X,DMP ADD;-----
```

rather than:

```
-----;MEC:SET X;
MEC:DMP ADD;-----
```

4. All activity within a state is decoded and initiated (its delay is begun) at the same time. The fact that a state is shown as a sequential arrangement of boxes and diamonds does not imply sequential activity; the entire state is decoded simultaneously. For example, state 4 of group B is represented below:

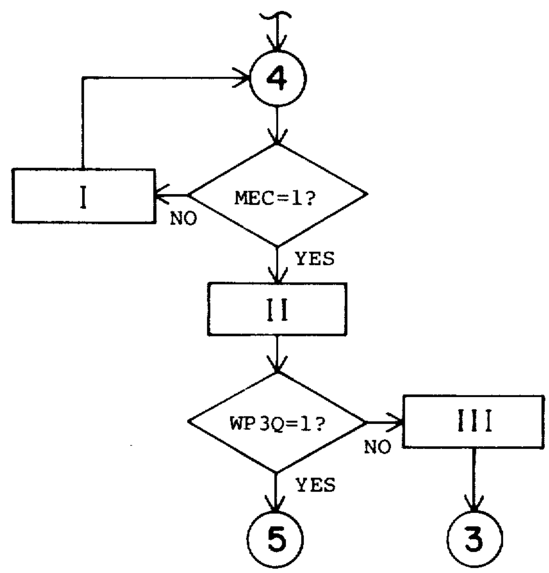

FIG 117Ab

HOW TO INTERPRET THE EMC ASM CHART, CONT.

Another way to represent the same activity is illustrated below. We don't draw the ASM chart that way because of the increased size and because of problems in achieving connectedness. Also, overall algorithmic process would be hard to see; the more compact notation results in a more effective visual outline. Within a state however, the expanded notation is often less confusing as it more closely represents the actual way things are done.

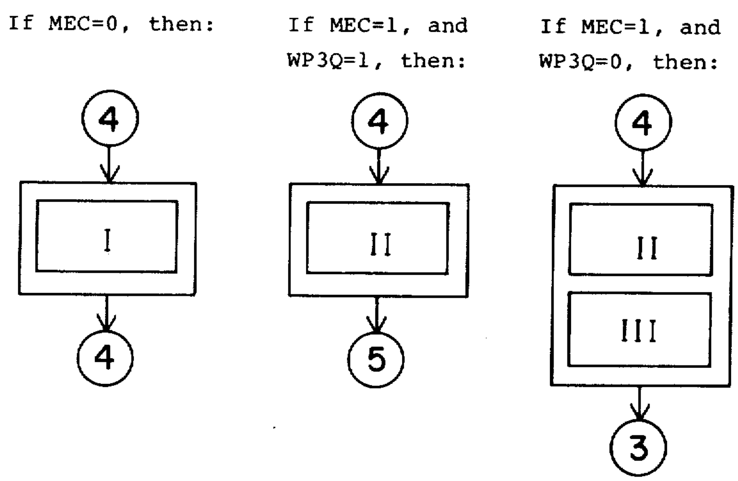

5. Within a state, related instructions are grouped together in the same box solely for the sake of algorithmic clarity.

6. Because of limitations on transistor device size, and the large capacitances of the IDA lines, two consecutive SET IDA's are required to ensure that IDA lines assume their proper final values. If what is being transmitted with the SET IDA is an address for Memory, the STM will accompany the second SET IDA.

INTERPRETING THE EMC ASM CHART

FIG 117Ba

7. Most micro-instructions are accompanied by a vertical bar on either side of their enclosing rectangle:
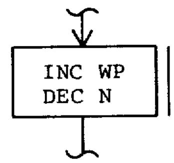
This is a short hand notation for denoting that (all) the micro-instructions in that rectangle are conditional upon STP (or SSTP), thus:
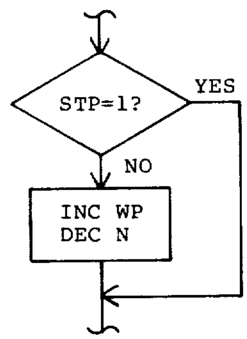
FIG 117Bb

HOW TO INTERPRET THE EMC ASM CHART, CONT.

8. Occasionally the following non-standard flowcharting notation is employed:

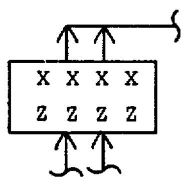

THIS IS A SPACE SAVING WAY TO INDICATE

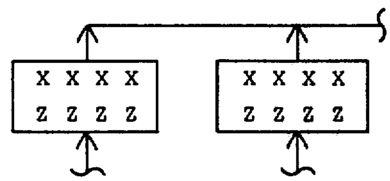

This is significant because in this case the flowcharting represents two instances of decoding XXXX and two instances of decoding ZZZZ. That is, four rom output lines are involved. A close examination of the state in which this occurs reveals that the two instance of XXXX are decoded against different qualifiers:

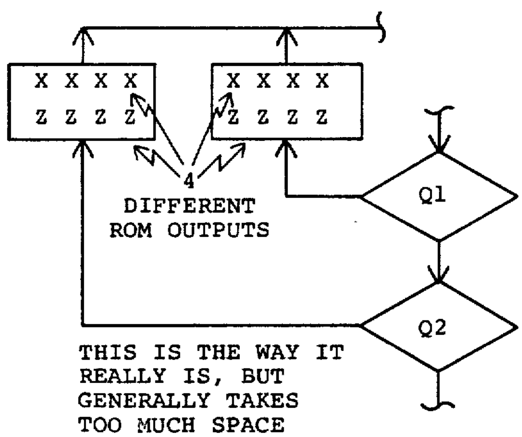

Thus, the following compact representation would be somewhat misleading, and is therefore not used.

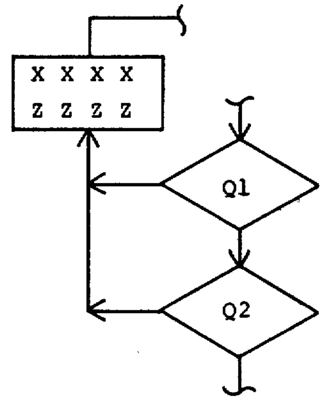

INTERPRETING THE EMC ASM CHART

FIG 117C

OVERVIEW OF THE EMC ASM CHART

INSTRUCTION FETCH PORTION OF THE EMC ASM CHART

| INSTRUCTION BIT | GROUP QUALIFIER |
|---|---|
| 11 | IL4Q |
| 8 | IL3Q |
| 7 | IL2Q |
| 6 | IL1Q |
| 5 | IL0Q |

CLR SEGMENT OF THE EMC ASM CHART

XFR SEGMENT OF THE EMC ASM CHART

MRX AND DRS SEGMENTS OF THE EMC ASM CHART

MLY AND MRY SEGMENTS OF THE EMC ASM CHART

TRANSFER THE MANTISSA DIGITS OF AR2(THE Y REGISTERS) INTO THE X REGISTERS SO THAT THEY CAN BE SHIFTED.

Y3→X3
Y2→X2
Y1→X1

Y0 IS NOT ALTERED AND IS LEFT ALONE.

DMP Y AND SET X EACH OPERATE ON THE Y & X REGISTER SPECIFIED BY WP. WP=3,2, THEN 1.

THE EXIT QUALIFIER FOR THIS LOOP IS WP=2 RATHER THAN WP=1, BECAUSE THE QUALIFIER IS BASED ON RESULTS IN WP HAVING THE STANDARD AMOUNT OF DELAY. HOWEVER, DMP Y AND SET X INCORPORATE IMMEDIATE NON-DELAYED RESULTS OF THE DEC WP. THE NET EFFECT IS THAT THE QUALIFIER LAGS WHAT HAS ALREADY HAPPENED BY ONE COUNT IN WP. WP WILL EQUAL 1 AT THE START OF STATE 6.

DISALLOW BUS GRANT EXCEPT AT VERY START OF LOOP. SIMILAR TO THE BGI IN STATE 8.

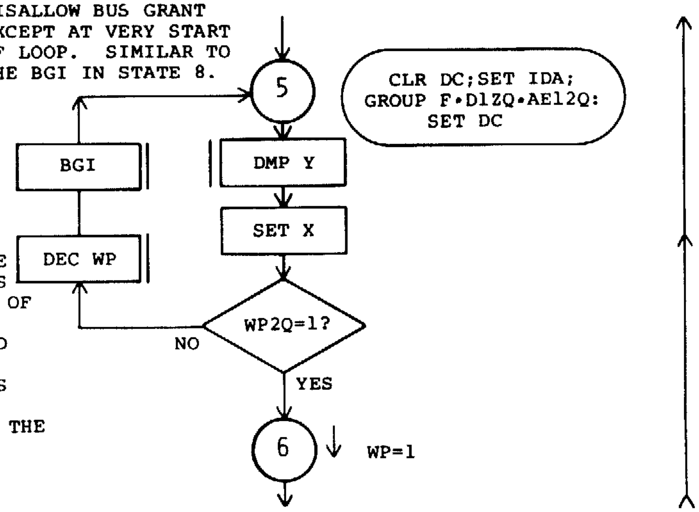

FIG 119Ed

TRANSFER THE SHIFTED DIGITS BACK INTO AR2 (THE Y REGISTERS).

X1→Y1
X2→Y2
X3→Y3

DMP X AND SET Y EACH OPERATE ON THE X & Y REGISTER SPECIFIED BY WP.

WP=1,2, THEN 3.

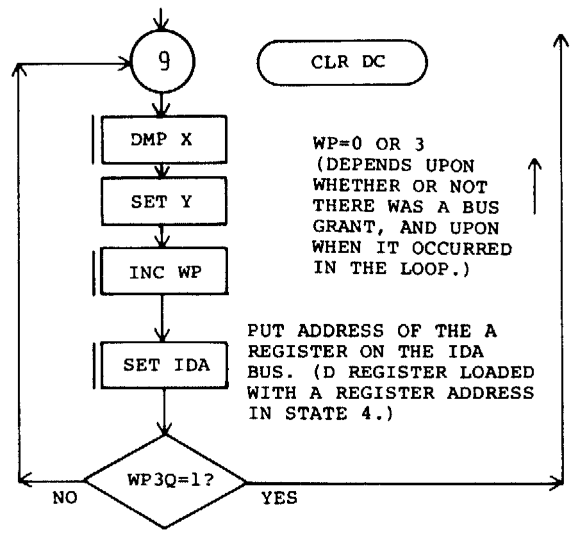

THE QUALIFIER IN STATE 9 COULD HAVE BEEN WP2Q=1? EXCEPT THAT IF A BUS GRANT OCCURRED ON THE NEXT TO LAST PASS THE QUALIFIER WOULD "CATCH UP" DUE TO THE LATEST INC WP'S TAKING EFFECT. THIS WOULD RESULT IN PREMATURE EXIT OF THE STATE AT THE CONCLUSION OF THE BUS GRANT. BY MAKING THE QUALIFIER BE WP3Q=1?, AN "EXTRA" INC WP AND DMP X/SET Y PAIR OCCURS. IN THE EVENT OF THE ABOVE DESCRIBED BUS GRANT THIS EXTRA OPERATION PROPERLY COMPLETES THE TRANSFER CYCLE. IN THE ABSENCE OF SUCH A BUS GRANT NO HARM IS DONE. BECAUSE THE EXTRA DMP X/SET Y IS DONE WITH WP=0 — AND THAT LITERALLY DOES NOTHING AS DMP X & SET Y ONLY OPERATE WHEN WP=1,2 OR 3. ALSO, AFTER LEAVING STATE 9 THE VALUE OF WP IS OF NO INTEREST.

FIG 119Ef

NRM SEGMENT OF THE EMC ASM CHART

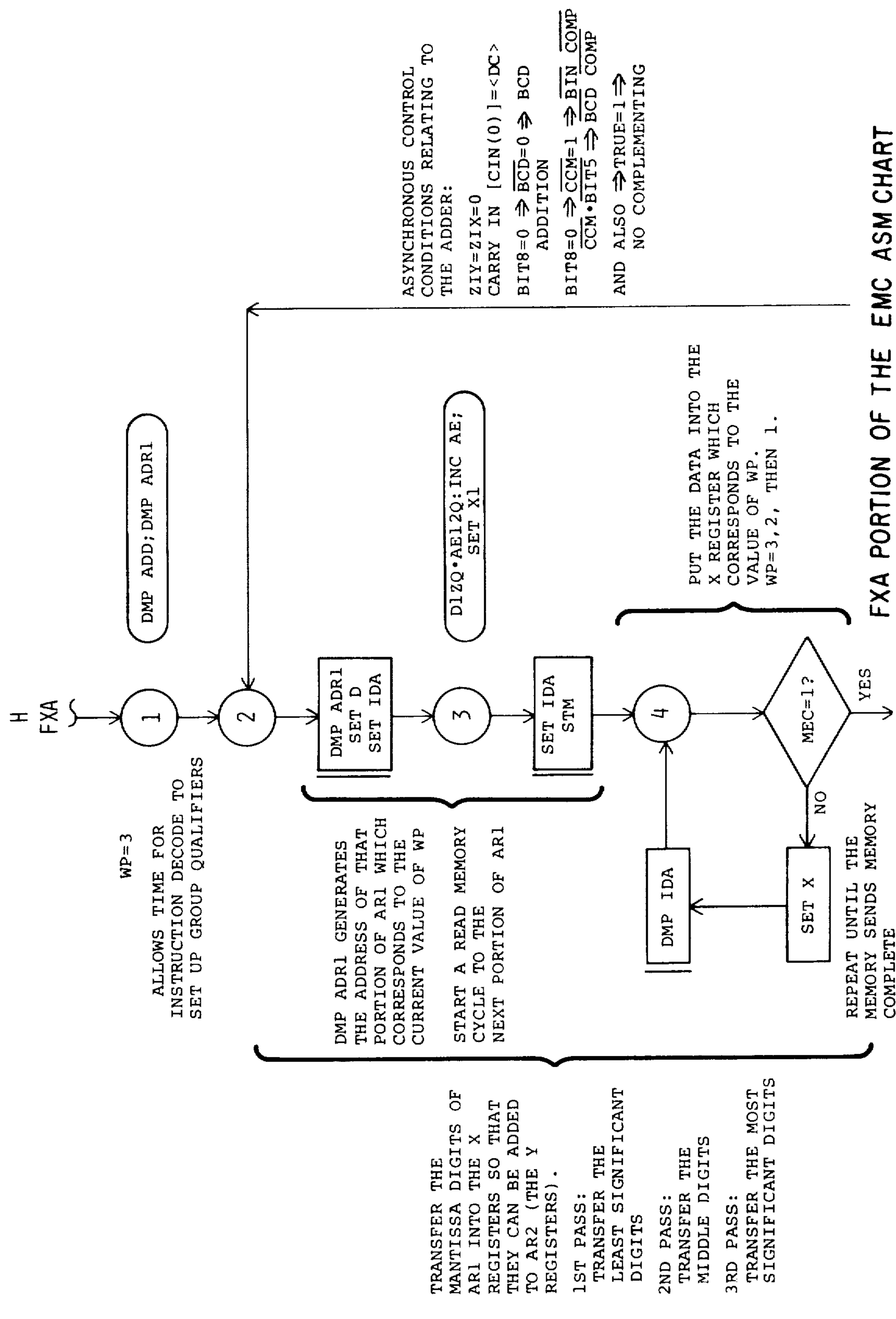
FIG 119Ga FXA PORTION OF THE EMC ASM CHART

MWA SEGMENT OF THE EMC ASM CHART

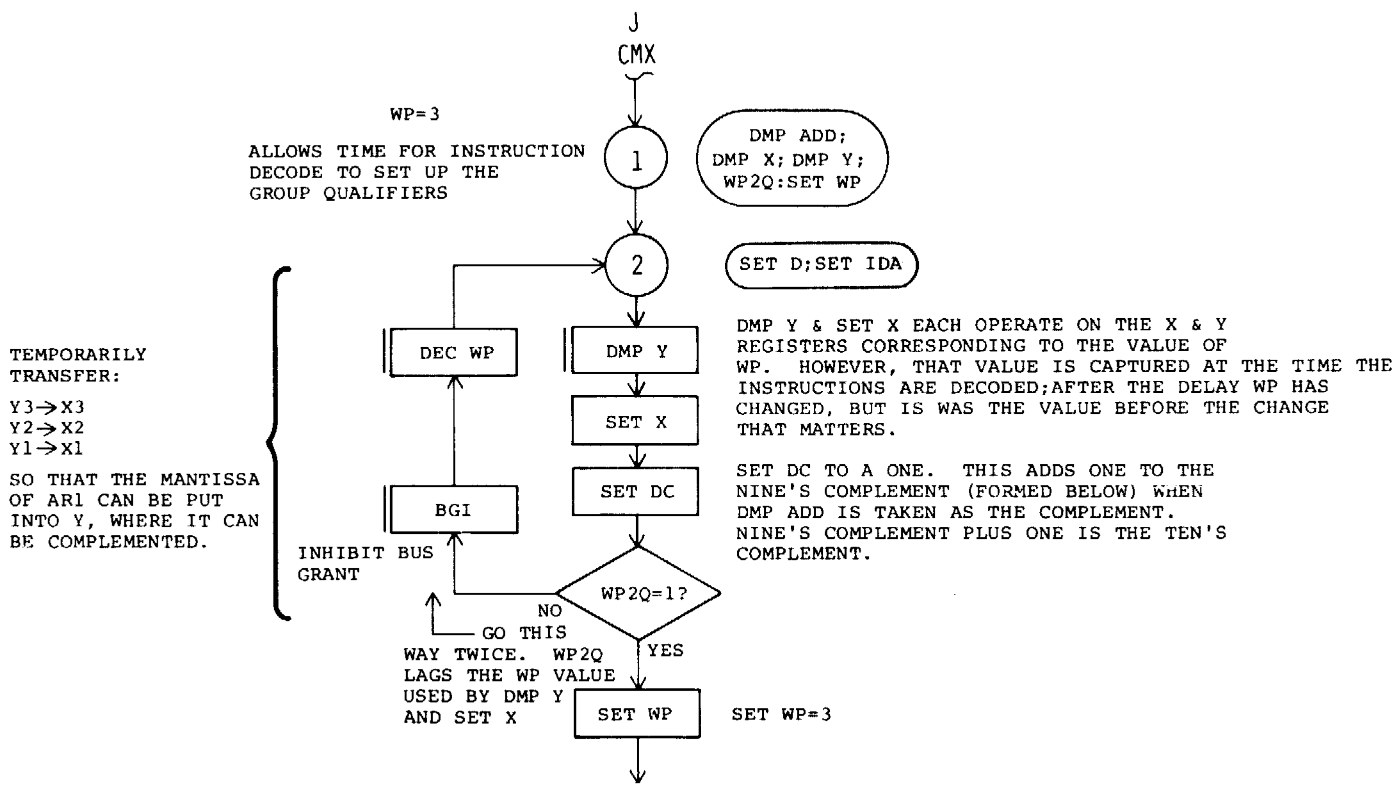
CMX PORTION OF THE EMC ASM CHART
FIG 1191a

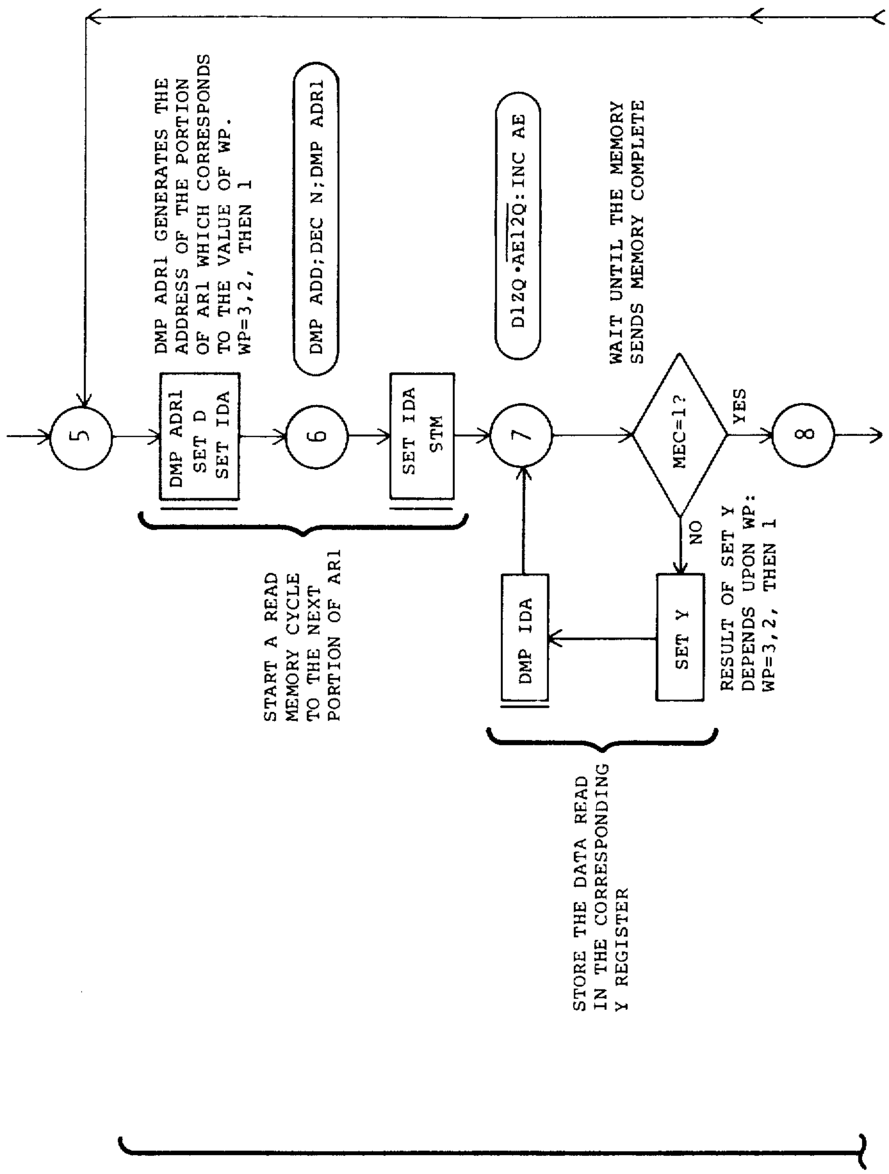
FIG 1191b

READ, COMPLEMENT AND RESTORE EACH PORTION OF AR1. RESTORE EACH PORTION OF AR2.

START A WRITE MEMORY CYCLE BACK TO THE SAME SEGMENT OF AR1 THAT WAS JUST READ. D STILL CONTAINS THE ADDRESS OF THAT WORD.

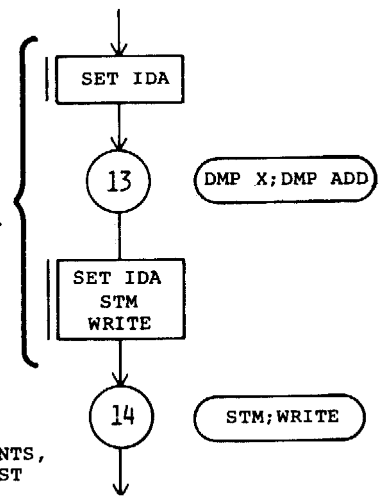

TEN'S COMP. [<AR1>] =NINE'S COMP [<AR1>]+1

NINE'S COMP. [<AR1>] IS DONE IN THREE SEGMENTS, ONE AFTER THE OTHER, BEGINNING WITH THE LEAST SIGNIFICANT PORTION OF THE MANTISSA. EACH RESULTING NINE'S COMPLEMENT IS ADDED TO ZERO, EXCEPT:

1. FOR THE LEAST SIGNIFICANT PORTION DC IS SET TO CREATE THE "+1" IN THE ABOVE FORMULA.
2. DC IS UPDATED PRIOR TO THE ADDITIONS OF EACH OF THE SUBSEQUENT SEGMENTS IN CASE THERE IS A CARRY OUT FROM THE PREVIOUS ADDITION.

FROM THE ASYNCHRONOUS CONTROL LINES:

$\overline{\text{BIT 11}}\cdot\text{BIT 5} \Rightarrow$ BCD COMP, AND ALSO $\Rightarrow$ ZIX $\overline{\text{BIT 8}} \Rightarrow \overline{\text{BCD}}=0 \Rightarrow$ BCD ADDITION

ALSO, CIN(0) = DC
(CIN = CARRY IN)

FIG 119Ic

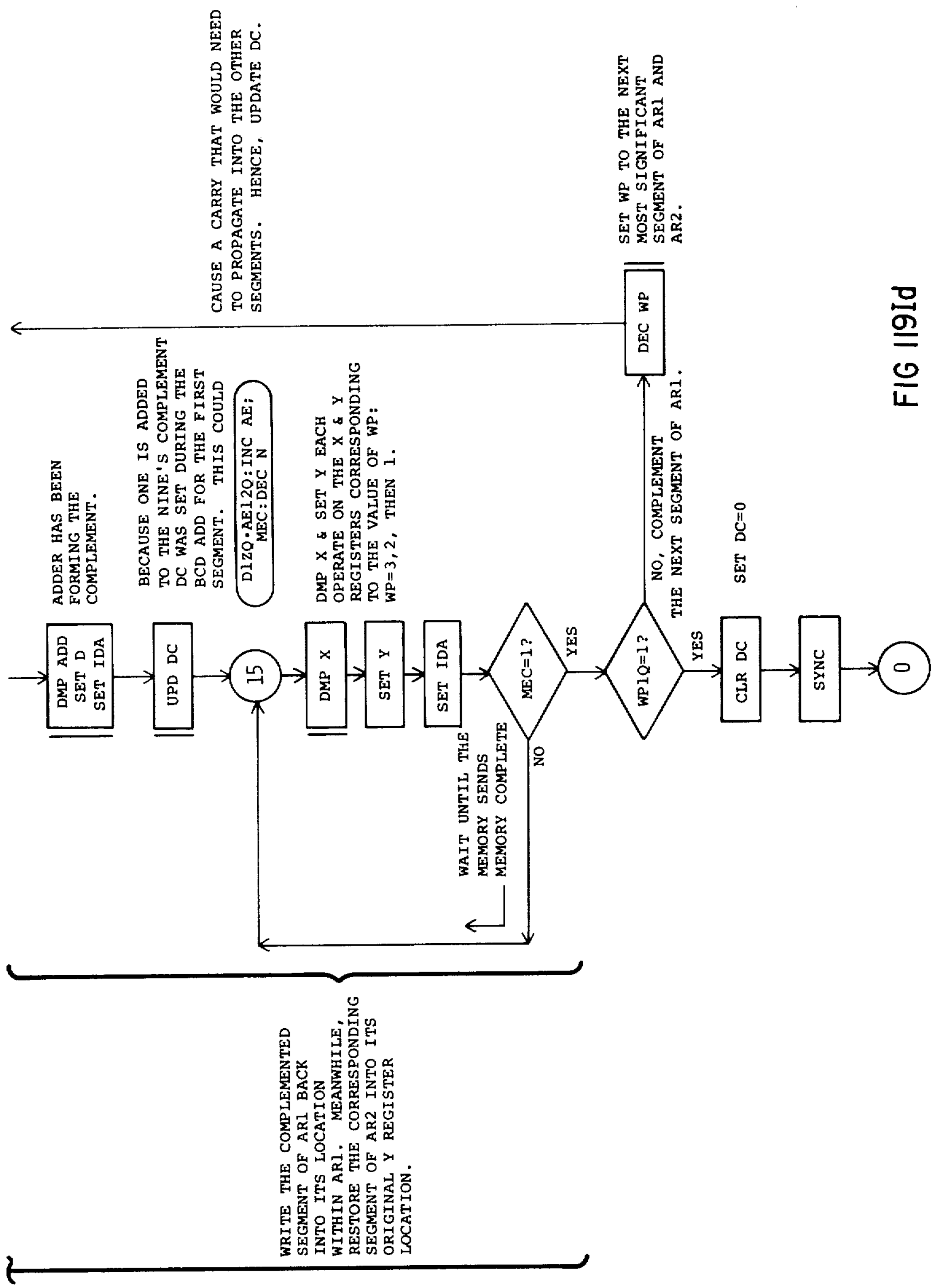
FIG 1191d

CMY SEGMENT OF THE EMC ASM CHART

FMP AND FDV SEGMENTS OF THE EMC ASM CHART

MPY SEGMENT OF THE EMC ASM CHART

CDC SEGMENT OF THE EMC ASM CHART

"NON-EMC INSTRUCTION" SEGMENT OF THE EMC ASM CHART

TIMING OF DIGIT-SHIFT GEARWORKS COMPRISING STATES 7-8-9 OF THE MRX AND DRS PORTIONS OF THE EMC ASM CHART

TIMING OF DIGIT-SHIFT COMPRISING STATES 7-8-9 OF THE MRX AND DRS PORTIONS OF THE EMC ASM CHART

— NOTES —

A. ALL OF THIS PARTICULAR STATE 8 REPRESENTS AN EXTERNALLY ORIGINATED BUS REQUEST/ BUS GRANT OF INDEFINITE LENGTH.

B. CLOCK-TIMES 29 THROUGH 36 (INCLUSIVE) REPRESENT ONE OF N-MANY DIGIT SHIFTS.

C. THIS IS THE FINAL VALUE OF THE WORD POINTER AND IS THE VALUE IN EFFECT WHEN DMP ADR1 IS GIVEN.

D. NOTICE HOW THE WORD POINTER "CATCHES UP". IF A BUS GRANT WERE ALLOWED SUCH THAT THE CAUGHT-UP VALUE MET THE EXIT QUALIFIER, THE RESULT WOULD BE ONE LESS SRE THAN NECESSARY. HENCE BUS GRANTS ARE ALLOWED ONLY IN A WAY THAT PERMITS THE QUALIFIER LAG TO BE RE-ESTABLISHED WELL BEFORE THE EXIT QUALIFIER CAN BE MET.

E. NOTICE THAT SSTP (SHORT STOP) ENDS ONE STATE SOONER THAN STP. THIS ALLOWS AN EXISTING SET IDA TO BE DECODED ONE EXTRA TIME PRIOR TO WHEN THE REST OF THE INSTRUCTIONS IN THAT STATE ARE. THIS IS TO RESTORE A SET IDA DIRECTLY AHEAD OF A SET IDA/STM IN THE EVENT THE INTERRUPTED STATE IS THE PART OF A MEMORY CYCLE THAT ISSUES THE SET IDA/STM.

F. THIS IS THE EXTRA SET IDA DESCRIBED IN E.

NOTES FOR THE TIMING OF DIGIT-SHIFT COMPRISING STATES 7-8-9 OF THE MRX AND DRS PORTIONS OF THE EMC ASM CHART

FIG 12OC

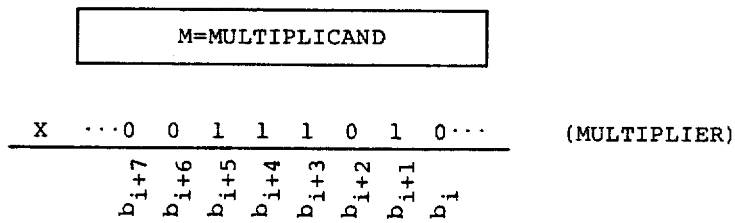
$$\text{PRODUCT} = \sum_{i=0}^{n-1} b_i 2^i M$$ WHERE n=NUMBER OF BITS IN THE MULTIPLIER
NOTICE THAT ONE ADDITION IS REQUIRED FOR EVERY ONE IN THE MULTIPLIER.
SUCH MULTIPLICATION ALSO REQUIRES EXTERNAL INSPECTION OF SIGNS AND SUBSEQUENT COMPLIMENTING TO ALLOW MULTIPLICATION OF NUMBERS WITH DIFFERING SIGNS.
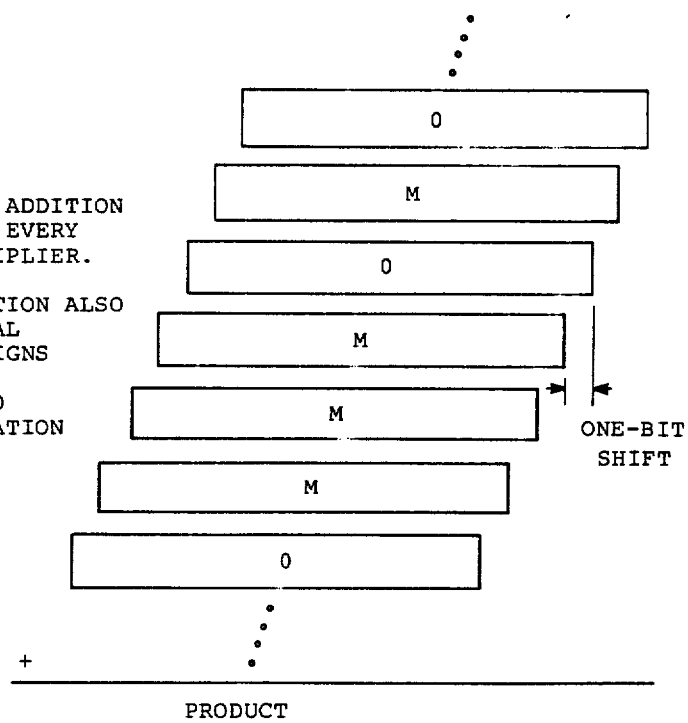
THE PRINCIPLE OF "STANDARD" BINARY MULTIPLICATION
FIG 121A

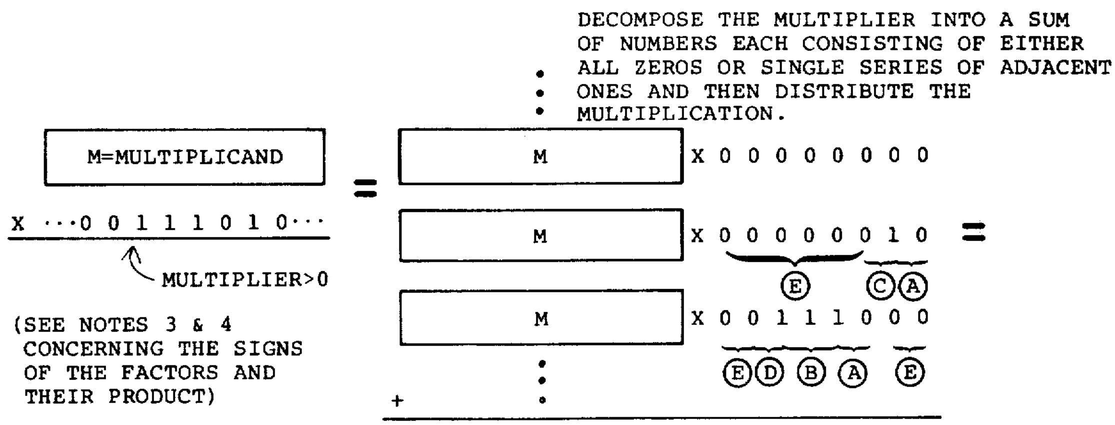

HOW THE MULTIPLIER IS USED AS IT IS SCANNED, RIGHT-TO-LEFT, ONE BIT AT A TIME:

(A) A ZERO-TO-ONE TRANSITION REQUIRES AN IMMEDIATE SUBTRACTION, FOLLOWED BY A SHIFT.

(B) SUBSEQUENT ONE-TO-ONE TRANSITIONS THEN REQUIRE ONLY WHAT WOULD NORMALLY BE REQUIRED FOR ZERO-TO-ZERO TRANSITIONS, i.e., ONE SHIFT EACH.

(C) (D) THESE ONE-TO-ZERO TRANSITIONS CORRESPOND TO ONES (F) AND (G), RESPECTIVELY, AND EACH REQUIRES AN ADDITION, FOLLOWED BY A SHIFT.

(E) A ZERO-TO-ZERO TRANSITION REQUIRES ONLY A SHIFT.

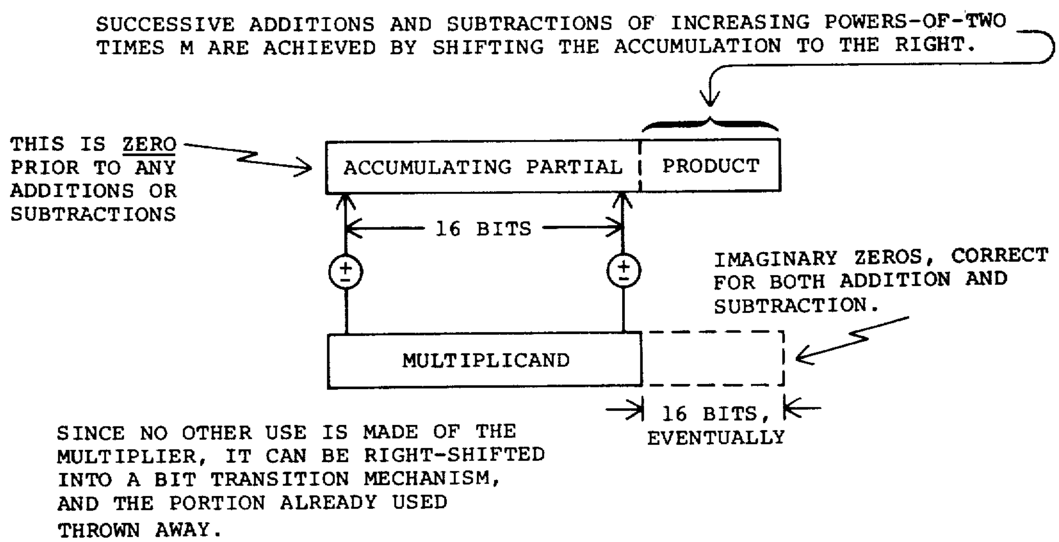

*NOT TRUE IN 16-BIT COMPLEMENT ARITHMETIC IF THE MULTIPLICAND IS 1 000 000 000 000 000 (±32768). THE ALGORITHM FAILS WITH THAT MULTIPLICAND FOR THIS REASON. SEE THE BUG DESCRIPTION AT THE END OF THIS SECTION.

FIG 121Ba

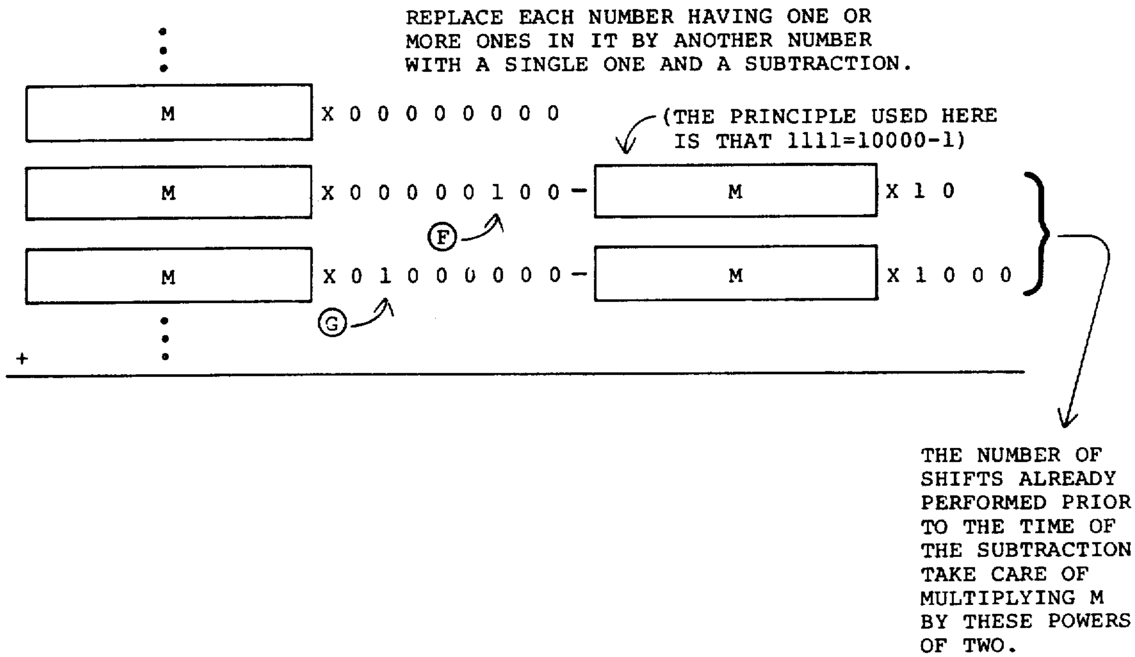

NOTES:

1. FOR PURPOSES OF DETERMINING A TRANSITION ASSOCIATED WITH THE RIGHT-MOST BIT OF THE MULTIPLIER, A ZERO IS ASSUMED TO LIE TO THE RIGHT OF THAT BIT.

2. NOTICE THAT THERE CANNOT BE A ONE-TO-ZERO TRANSITION WITHOUT PRECEEDING ZERO-TO-ONE TRANSITION. THUS, A SUBTRACTION PRECEEDS EACH ADDITION.

3. ASSUMING THE SIGN OF THE MULTIPLIER IS POSITIVE, THE SIGN OF THE PRODUCT IS THE SAME AS THE SIGN OF THE MULTIPLICAND. BUT THIS IS GUARANTEED BY THE ALGORITHM BECAUSE THE PRODUCT IS FORMED SOLELY THROUGH OPERATIONS EXACTLY EQUIVALENT TO ADDITIONS, AND BY ARITHMETIC SHIFTS. NEITHER OF THOSE CAN CREATE A RESULT HAVING A SIGN OPPOSITE THAT OF THE MULTIPLICAND.*

4. MULTIPLICATION BY A NEGATIVE MULTIPLIER IS CONSIDERED IN ANOTHER DRAWING.

5. MULTIPLICATION WITH A MULTIPLICAND OF ZERO WORKS BECAUSE, NO MATTER HOW IT IS DONE, ZERO, ADDED TO OR SUBTRACTED FROM ITSELF, IS STILL ZERO.

6. MULTIPLICATION BY A MULTIPLIER OF ZERO WORKS BECAUSE THEN THERE ARE NEVER ANY TRANSITIONS TO CAUSE ANY ADDITIONS OR SUBTRACTIONS. SINCE THE PARTIAL PRODUCT STARTS OUT ZERO, IT STAYS ZERO.

OPERATION OF BOOTH'S ALGORITH WHEN THE MULTIPLIER IS POSITIVE, OR WHEN ONE OF THE FACTORS IS ZERO.

FIG 121Bb

1. IN THE EVENT THAT THE MULTIPLIER IS NEGATIVE, THE SIGN OF THE PRODUCT IS OPPOSITE THE SIGN OF MULTIPLICAND. WE SHALL DIVIDE THE POSSIBLE INSTANCES OF MULTIPLYING BY A NEGATIVE MULTIPLIER INTO THREE CATEGORIES AND SHOW THAT PROPER RESULTS ARE OBTAINED IN EACH CASE.

2. CASE I  PRODUCT=-1·M

LET M=MULTIPLICAND
LET MULTIPLIER=-1=1111111111111111
(← 16 BITS →)

THIS CASE WORKS BECAUSE THERE IS AN IMMEDIATE ZERO-TO-ONE TRANSITION, CAUSING A SUBTRACTION FROM ZERO (WHICH GIVES THE PARTIAL PRODUCT A SIGN OPPOSITE THAT OF THE MULTIPLICAND). BUT SINCE THE REST OF THE MULTIPLIER IS ALL ONES, ONLY ARITHMETIC SHIFTS FOLLOW THIS SUBTRACTION.

THE COMPLEMENTED MULTIPLICAND IS SHIFTED TO FAR RIGHT OF THE 32-BIT ANSWER, THUS ITS MAGNITUDE (ABSOLUTE VALUE) REMAINS UNCHANGED, AND SINCE THE SHIFTS ARE ARITHMETIC SHIFTS, THE SIGN IS PRESERVED.

3. CASE II  PRODUCT=$-2^P \cdot M$

LET M=MULTIPLICAND

LET MULTIPLIER=$-2^P$=1111$\overbrace{00 \cdots 0}^{\text{P ZEROS}}$
(← 16 BITS →)

IN THIS CASE THERE ARE P LEADING ZERO-TO-ZERO TRANSITIONS, EACH OF WHICH SHIFTS A PARTIAL PRODUCT WHICH IS ZERO, AS NOTHING HAS BEEN ACCUMULATED YET. SO THOSE SHIFTS HAVE ABSOLUTELY NO EFFECT.

THE SINGLE ZERO-TO-ONE TRANSITION CAUSES A SUBTRACTION FROM ZERO, WHICH ESTABLISHES THE SIGN OF THE PRODUCT AS OPPOSITE THAT OF THE MULTIPLICAND. THE REMAINING ONES IN THE MULTIPLIER CAUSE 16-P ARITHMETIC SHIFTS, WHICH PRESERVE THE SIGN. BUT THESE SHIFTS FALL P SHIFTS SHORT OF FULLY SHIFTING THE COMPLEMENTED MULTIPLICAND TO THE RIGHT IN THE 32-BIT ANSWER SPACE. THIS IS AN EFFECTIVE LEFT-SHIFT OF P PLACES IN THAT 32-BIT SPACE. HENCE THE PRODUCT IS THE COMPLEMENT OF THE MULTIPLICAND, MULTIPLIED BY $2^P$.

4. CASE III  PRODUCT=-Y·M

LET M=MULTIPLICAND
LET -Y REPRESENT A NEGATIVE NUMBER DIFFERENT THAN -1 OR THE NEGATIVE OF A POWER OF 2:

$$-Y \neq -1$$

$$-Y \neq -2^K$$

THEN -Y CAN BE DECOMPOSED INTO THE SUM OF SOME X>0 AND $-2^P$ FOR SOME P:

$$-Y = 111010110\cdots = \begin{array}{r} 111000000\cdots = -2^P \\ +\quad 010110\cdots = X \\ \hline 111010110\cdots = -Y \end{array}$$

THEN, $-Y \cdot M = (-2^P + X) \cdot M = -2^P \cdot M + X \cdot M$

AS THE MULTIPLIER IS SCANNED, X·M IS FORMED IN THE FASHION FOR POSITIVE MULTIPLIERS. THEN THE PRODUCT FOR $-2^P \cdot M$ IS ACCUMULATED TO IT. THE PROCEDURE OF THE ALGORITHM IS SUCH THAT THE FORMING OF X·M IS INDEPENDENT OF, AND DOES NOT INTERFERE WITH, THE SUBSEQUENT FORMATION OF $-2^P \cdot M$. IT IS, SO TO SPEAK, AS IF THE FORMATION OF $-2^P \cdot M$ PICKS UP WHERE FORMING X·M LEAVES OFF. THE ONLY DIFFERENCE IS THAT IN THE FORMATION OF $-2^P \cdot M$ THE MULTIPLICAND IS NOT SUBTRACTED FROM ZERO, BUT FROM X·M. THE SIGN OF THE RESULT OF THAT SUBTRACTION WILL BE OPPOSITE THE SIGN OF X·M, SINCE $2^P > X$. SINCE X·M HAS THE SIGN OF THE MULTIPLICAND, THIS MEANS THE FINAL PRODUCT HAS THE SIGN OPPOSITE THAT OF THE MULTIPLICAND, WHICH IS CORRECT.

OPERATION OF BOOTH'S ALGORITHM WHEN THE MULTIPLIER IS NEG. FIG 121C

BLOCK DIAGRAM OF THE HARDWARE CONTROLLED BY THE FLOW CHART WHICH DOES THE BOOTH'S MULTIPLY

I

READ (P/O EMC MAIN ASM CHART ENCODING)

RELATIONSHIP OF M-SECTION ACTIVITY TO THE MAIN EMC STATE MACHINE, OR TO THE OUTSIDE WORLD.

CHOOSE ONE OF THE FOLLOWING POSSIBILITIES:

1. EMC ORIGINATES A READ TO ITSELF: USE I AND II } EMC WILL INFORM THE EXTERNAL BUS OF THE ADDRESS AND DATA.
2. EMC ORIGINATES A WRITE TO ITSELF: USE II AND III } EMC WILL INFORM THE EXTERNAL BUS OF THE ADDRESS AND DATA.
3. EXTERNAL AGENCY ORIGINATES A READ OF AN EMC REGISTER: USE II (SOMETHING IN THE EXTERNAL AGENCY CORRESPONDS TO I)
4. EXTERNAL AGENCY ORIGINATES A WRITE TO AN EMC REGISTER: USE II (SOMETHING IN THE EXTERNAL AGENCY CORRESPONDS TO III)

II
M-SECTION (M-SECTION ROM)

ACTIVITY REPRESENTED ON THIS FLOW CHART IS EXECUTABLE INDEPENDENTLY OF THE REST OF THE MACHINE. THE REST OF THE MACHINE COULD BE WAITING FOR AN MEC GENERATED BY THIS FLOW CHART'S SMC, OR, IT COULD BE STOPPED BY A BUS GRANT, AND NEVER INTERACT WITH THIS FLOW CHART.

T IS THE STATE-TIME WITHIN WHICH $\overline{STM}$ GOES TO GROUND. T IS NOT A STATE-NUMBER, PER SE. THINK OF T+1 AS "ONE STATE-TIME LATER", AS THE ACTUAL STATE COUNT ITSELF MIGHT NOT CHANGE.

FIG 122 C

III
WRITE
(P/O EMC MAIN ASM CHART ENCODING)

1.  OR 

TRANSITION UP OR TRANSITION DOWN CAN OCCUR ANYTIME WITHIN THE INDICATED INTERVAL. USED TO INDICATE TIME-WINDOWS WITHIN WHICH EXTERNALLY ORIGINATED EVENTS CAN HAPPEN. REPRESENTS IDEALIZED LOGICAL ACTIVITY; RISE TIMES AND DELAYS ARE TAKEN INTO CONSIDERATION ONLY IN A GENERAL WAY.

2. 

REPRESENTS THE SET-UP TIME OF A SIGNAL BEING DRIVEN.

3. 

REPRESENTS A LINE THAT IS EITHER UNDEFINED OR A DON'T CARE.

4. 

REPRESENTS A LINE THAT IS ACTIVELY PULLED-UP.

5.

CAPITAL LETTERS FROM THE START OF THE ALPHABET REPRESENT EXPLANATORY NOTES.

6. NUMERALS IN THE Ø2-Ø1 WAVEFORMS ARE STRICTLY FOR REFERENCE WITHIN THAT PARTICULAR SET OF WAVEFORMS, AND HAVE NO SIGNIFICANCE OUTSIDE THAT SET.

7. DOTTED LINES INDICATE ZERO OR MORE COMPLETE STATE TIMES THAT OCCUR AS A FUNCTION OF SOME EXTERNAL CONDITION (SUCH AS WAITING FOR MEMORY COMPLETE).

8. IN GENERAL, THE WAVEFORMS ARE QUITE IDEALIZED. THEY EXPLAIN THE LOGICAL RELATIONSHIPS BETWEEN SIGNALS. BUT ACTUAL DELAYS, RISE TIMES, SIGNAL LEVELS AND THRESHOLDS ARE NOT INDICATED.

CONVENTIONS USED IN THE WAVEFORMS

FIG 123

READ FROM AN EMC REGISTER

READ FROM AN EMC REGISTER

— NOTES —

A. PRESENT ONLY IF THE EMC IS THE ORIGINATOR OF THE MEMORY CYCLE.

B. IF THIS READ MEMORY CYCLE IMMEDIATELY FOLLOWS A PREVIOUS WRITE CYCLE, THE START OF THIS Ø2 IS WHEN RDW WILL GO HIGH.

C. ACTIVE PULL-UP BY THE BPC, IN RESPONSE TO SMC.

D. TRANSITIONS AT THE START OF Ø1 IF THE EMC IS THE ORIGINATOR. AN EXTERNAL AGENCY HAS UNTIL PRIOR TO Ø2.

E. EARLIEST NEXT STM.

F. DEPENDS UPON WHEN THE ADDRESS ON THE IDA BUS STABILIZES.

G. FOLLOWS STM.

H. RESET BY SMC.

I. REFLECTS THE PREVIOUS LATCHED ADDRESS.

J. A RESULT OF YSDR.

K. CAUSED BY RDR.

L. RDR DISABLES DMP IDA, DURING ITS DELAY, TO PREVENT INTERFERENCE WITH THE DMP REGISTER INSTRUCTION ISSUED BY THE ADDRESS DECODE ROM

M. SELF-LATCHING ROM OUTPUT RESET BY MEC.

READ FROM AN EMC REGISTER

FIG 124C

WRITE TO AN EMC REGISTER

WRITE TO AN EMC REGISTER

— NOTES —

A. PRESENT ONLY IF THE EMC IS THE ORIGINATOR OF THE MEMORY CYCLE.

B. TRANSITIONS AT THE START OF Ø1 IF THE EMC IS THE ORIGINATOR. AN EXTERNAL AGENCY HAS UNTIL PRIOR TO Ø2.

C. ACTIVE PULL-UP BY THE BPC, IN RESPONSE TO SMC.

D. EARLIEST RELEASE OF RDW IF AN EXTERNAL AGENCY IS ORIGINATING THE MEMORY CYCLE.

E. EARLIEST NEXT STM.

F. DEPENDS UPON WHEN THE ADDRESS ON THE IDA BUS STABILIZES.

G. FOLLOWS STM.

H. RESET BY SMC.

I. REFLECTS THE PREVIOUS LATCHED ADDRESS.

J. CAUSED BY WTR.

K. SELF-LATCHING ROM OUTPUT RESET BY MEC.

L. WAVEFORM DEPICTED ILLUSTRATES THE EMC AS AN ORIGINATOR. IF AN EXTERNAL AGENCY WERE THE ORIGINATOR IT MUST PRESENT ROCK-SOLID DATA ALL DURING CLOCK-TIME 13, WHICH IS WHEN THE DATA IS LATCHED FOR THE FINAL TIME.

M. IF THE EMC IS THE ORIGINATOR OF A WRITE MEMORY CYCLE, ONE EXTRA SET IDA IS GIVEN, BECAUSE THE ONLY STATES DOING SUCH MEMORY CYCLES LOOK

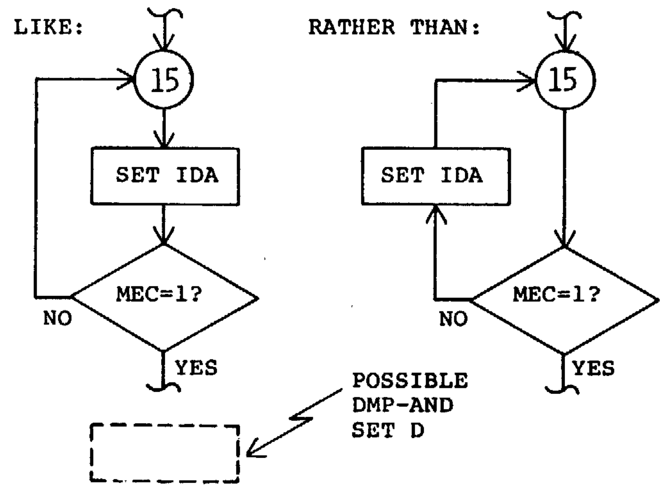

THE INFORMATION PLACED ON THE IDA BUS BY THIS LAST SET IDA MAY BE DIFFERENT THAN THE DATA SENT AS PART OF THE MEMORY CYCLE. FOR INSTANCE, IT MAY BE AN ADDRESS FOR ANOTHER MEMORY CYCLE.

FIG 125C WRITE TO AN EMC REGISTER

EMC READS FROM MEMORY

—— NOTES ——

A. ACTIVE PULL-UP BY THE BPC, IN RESPONSE TO SMC.

B. DATA IS LATCHED FOR THE FINAL TIME DURING THIS CLOCK-TIME.

C. EARLIEST NEXT STM.

D. USE OF UMC IS OPTIONAL. MEMORY MAY ISSUE SMC EXACTLY AS SHOWN, IF DESIRED.

E. SMC IS GENERATED EITHER BY THE BPC (AS A SERVICE FUNCTION IN RESPONSE TO UMC), OR DIRECTLY BY THE MEMORY ITSELF.

F. SELF-LATCHING ROM OUTPUT RESET BY MEC.

EMC READS FROM MEMORY

FIG 126B

EMC WRITES TO MEMORY

— NOTES —

A. ACTIVE PULL-UP BY THE BPC, IN RESPONSE TO SMC.

B. EARLIEST NEXT STM.

C. USE OF UMC IS OPTIONAL. MEMORY MAY ISSUE SMC EXACTLY AS SHOWN, IF DESIRED.

D. SMC IS GENERATED EITHER BY THE BPC (AS A SERVICE FUNCTION IN RESPONSE TO UMC), OR DIRECTLY BY THE MEMORY ITSELF.

E. SELF-LATCHING ROM OUTPUT RESET BY MEC.

F. IF THE EMC IS THE ORIGINATOR OF A WRITE MEMORY CYCLE, ONE EXTRA SET IDA IS GIVEN, BECAUSE THE ONLY STATES DOING SUCH MEMORY CYCLES LOOK

LIKE: RATHER THAN:

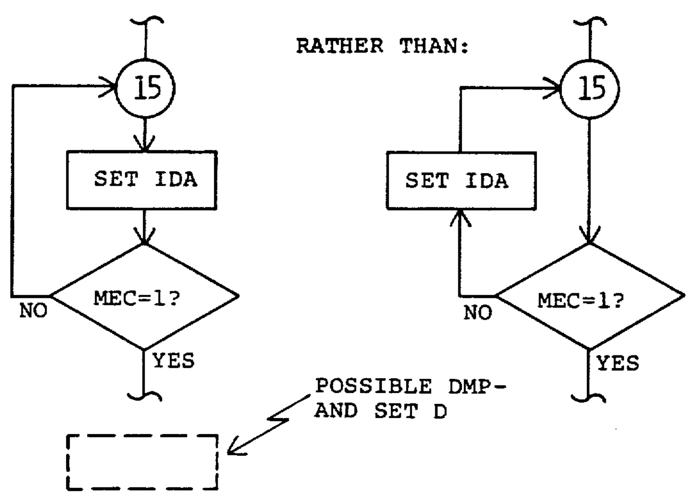

THE INFORMATION PLACED ON THE IDA BUS BY THIS LAST SET IDA MAY BE DIFFERENT THAN THE DATA SENT AS PART OF THE MEMORY CYCLE. FOR INSTANCE, IT MAY BE AN ADDRESS FOR ANOTHER MEMORY CYCLE.

EMC WRITES TO MEMORY

FIG 127B

TABLE OF SIMPLIFIED MAE OPERATION

| FOR THESE TYPES OF MEMORY CYCLES: / THESE CONDITIONS PREVAIL: | THE MAE LISTENS TO THE NATURE OF THE MEMORY CYCLE TRAFFIC AND IMPLEMENTS THESE BLOCK ALLOCATIONS: | | |
|---|---|---|---|
| | HOME BLOCK IS DESIGNATED BY: | HOME BLOCK IS: | WORKING BLOCK IS DESIGNATED BY: |
| ALL INSTRUCTION FETCHES, ALL LINK-POINTER FETCHES FOR INDIRECT REFERENCES, AND ALL BPC DIRECT REFERENCES | ADDRESS BIT 15=0 | 3<br>LOWER 1/2 BASE PAGE IN BLOCK 3 | UPPER 1/2 BASE PAGE AUTOMATICALLY IN BLOCK 0<br>R34 |
| IOC AND EMC MEMORY REFERENCES, AND BPC INDIRECT FINAL DESTINATION FETCHES | ADDRESS BIT 15=1 | 0 | R35 |
| BUS GRANT (TESTER) | ADDRESS BIT 15=1 | 0 | R37 |

FIG 129

NOTE 1: ANY LPU CODE TO BE EXECUTED FROM THIS PORTION OF THIS WORKING BLOCK MUST NOT CREATE BASE PAGE REFERENCES SIMPLY BECAUSE THE CURRENT PAGE OPERAND LIES WITHIN THE RANGE 177000-177777. TO DO SO WOULD FORCE A REFERENCE TO THE LPU BASE PAGE IN BLOCK 0. REALLY ONLY A PROBLEM FOR BLOCK 2.

NOTE 2: LPU INDIRECT ADDRESSING CANNOT ACCESS THESE LOCATIONS BECAUSE LRAL DISABLES THEM. ALL REFERENCE TO THESE LOCATIONS ARE MAPPED ONTO THE LPU REGISTERS IN THE PROCESSOR.

NOTE 3: THE RETURN STACK <u>MUST</u> BE LOCATED IN BLOCK 0, WHICH ALSO CONTAINS USER R/W MEMORY. PROPER ACCESS TO THE RETURN STACK IS GUARANTEED BY THE HARDWARE PROVIDED BIT 15 OF THE R REGISTER IS SET.

NOTE 4: REGARDLESS OF WHICH BLOCK AN LPU INSTRUCTION IS FETCHED FROM, IF IT REFERENCES THE TOP 1/2 OF THE BASE PAGE, THE REFERENCE IS MAPPED INTO THESE LOCATIONS

NOTE 5: REGARDLESS OF WHICH BLOCK AN LPU INSTRUCTION IS FETCHED FROM, IF IT REFERENCES THE BOTTOM 1/2 OF THE BASE PAGE, THE REFERENCE IS MAPPED INTO THESE LOCATIONS

FIG 130Ab

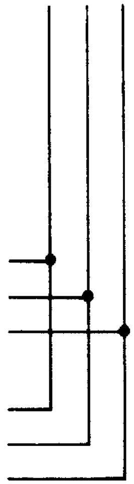

NOTE 1: ADDRESSES 0-37 OF LPU HOME BLOCK 3 OVERLAP LPU REGISTER ADDRESS AND ARE DISABLED BY LRAL, AS IT IS DESIGNATED WITH LIDA(15)=0. THOSE ADDRESSES CAN BE ACCESSED BY THE LPU ONLY IF BLOCK 3 IS ALSO DESIGNATED THE WORKING BLOCK, AND A CURRENT PAGE REFERENCE IS USED.

NOTE 2: ADDRESSES 0-37 OF BLOCK 1 OVERLAP PPU REGISTER ADDRESS, AND CANNOT BE ACCESSED BY THE PPU SINCE THEY WILL BE DISABLED BY PRAL.

NOTE 3: FOR FETCHES OF FINAL DESTINATIONS THAT ARE OBJECTS OF LPU INDIRECT ADDRESSING, BLOCK 0 IS HOME BLOCK. IR IS DESIGNATED WITH LIDA(15)=1. THUS, THE WORKING BLOCKS ARE ALL REFERENCED WITH LIDA(15)=0 AND LRAL DISABLES INDIRECT ACCESS TO LOCATIONS 0-37 IN EACH OF THE WORKING BLOCKS.

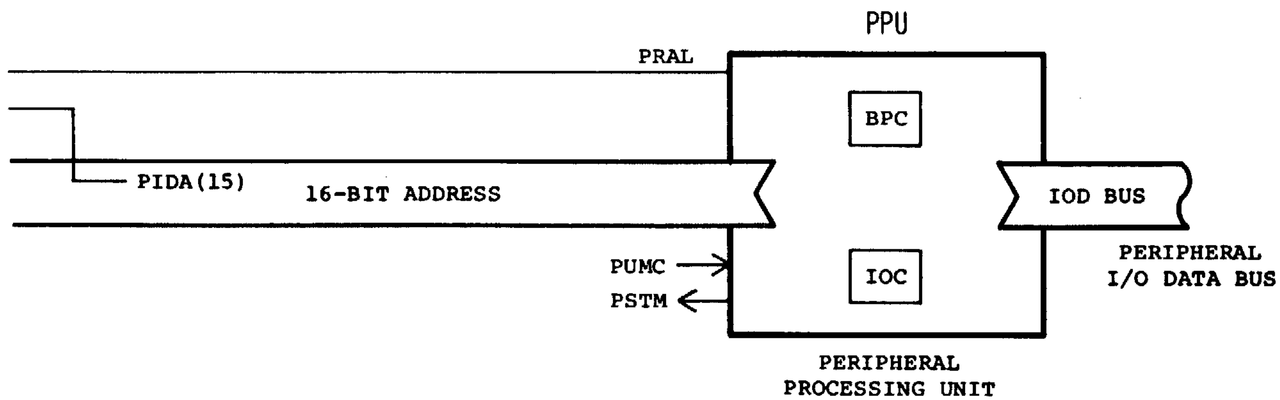

DATA PATHS NOT SHOWN: THIS DRAWING REFECTS ONLY THE ADDRESSING SCHEME

EACH WORD = 2 BYTES STM = START MEMORY

LXXX = AN LPU SIGNAL UMC = UNSYNCHRONIZED MEMORY COMPLETE

PXXX = A PPU SIGNAL

FIG 131Bb

FORCE BLOCK 0: { MAE0=0, MAE1=0 }

FORCE BLOCK 3: { MAE0=1, MAE1=1 }

R34 SELECTS WORKING BLOCK: { MAE0=R34(0), MAE1=R34(1) }

R35 SELECTS WORKING BLOCK: { MAE0=R35(0), MAE1=R35(1) }

THIS FLOWCHART DOES NOT REFLECT THE INTERNAL OPERATION OF ANY SINGLE AGENCY. INSTEAD, IT REFLECTS THE COMBINED RESULTS OF LPU/MAE OPERATION—THERE IS NO ROM WHERIN THIS FLOWCHART IS EXPLICITLY ENCODED. THIS IS AN EQUIVALENT PROCESS FLOWCHART DEPICTING THE SEQUENCE OF ADDRESS EVENTS FOR THE VARIOUS MEMORY CYCLES ORIGINATING IN THE LPU. THE MAIN PURPOSE IS TO SHOW WHICH BLOCKS THESE MEMORY CYCLES ARE DIRECTED TOWARDS.

FIG 132 Ac

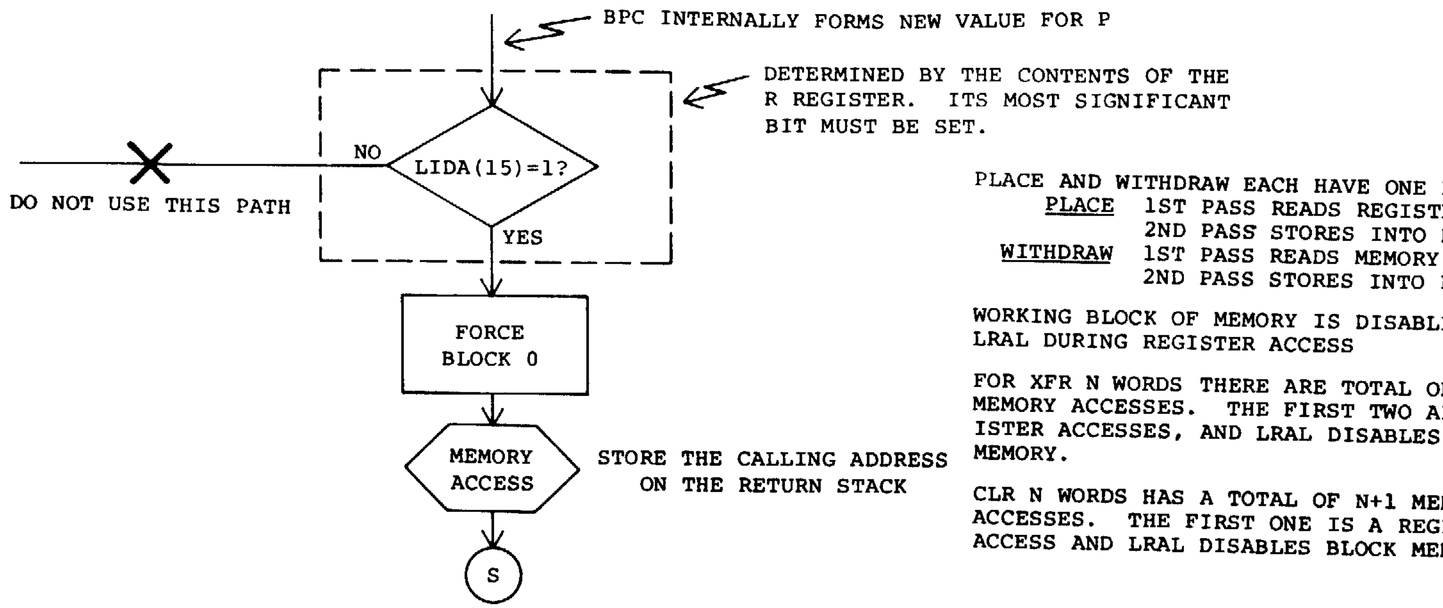

PLACE AND WITHDRAW EACH HAVE ONE EXTRA PASS:

<u>PLACE</u> 1ST PASS READS REGISTER
2ND PASS STORES INTO MEMORY

<u>WITHDRAW</u> 1ST PASS READS MEMORY
2ND PASS STORES INTO REGISTER

WORKING BLOCK OF MEMORY IS DISABLED BY LRAL DURING REGISTER ACCESS

FOR XFR N WORDS THERE ARE TOTAL OF 2N+2 MEMORY ACCESSES. THE FIRST TWO ARE REGISTER ACCESSES, AND LRAL DISABLES BLOCK MEMORY.

CLR N WORDS HAS A TOTAL OF N+1 MEMORY ACCESSES. THE FIRST ONE IS A REGISTER ACCESS AND LRAL DISABLES BLOCK MEMORY.

FIG 132Cc

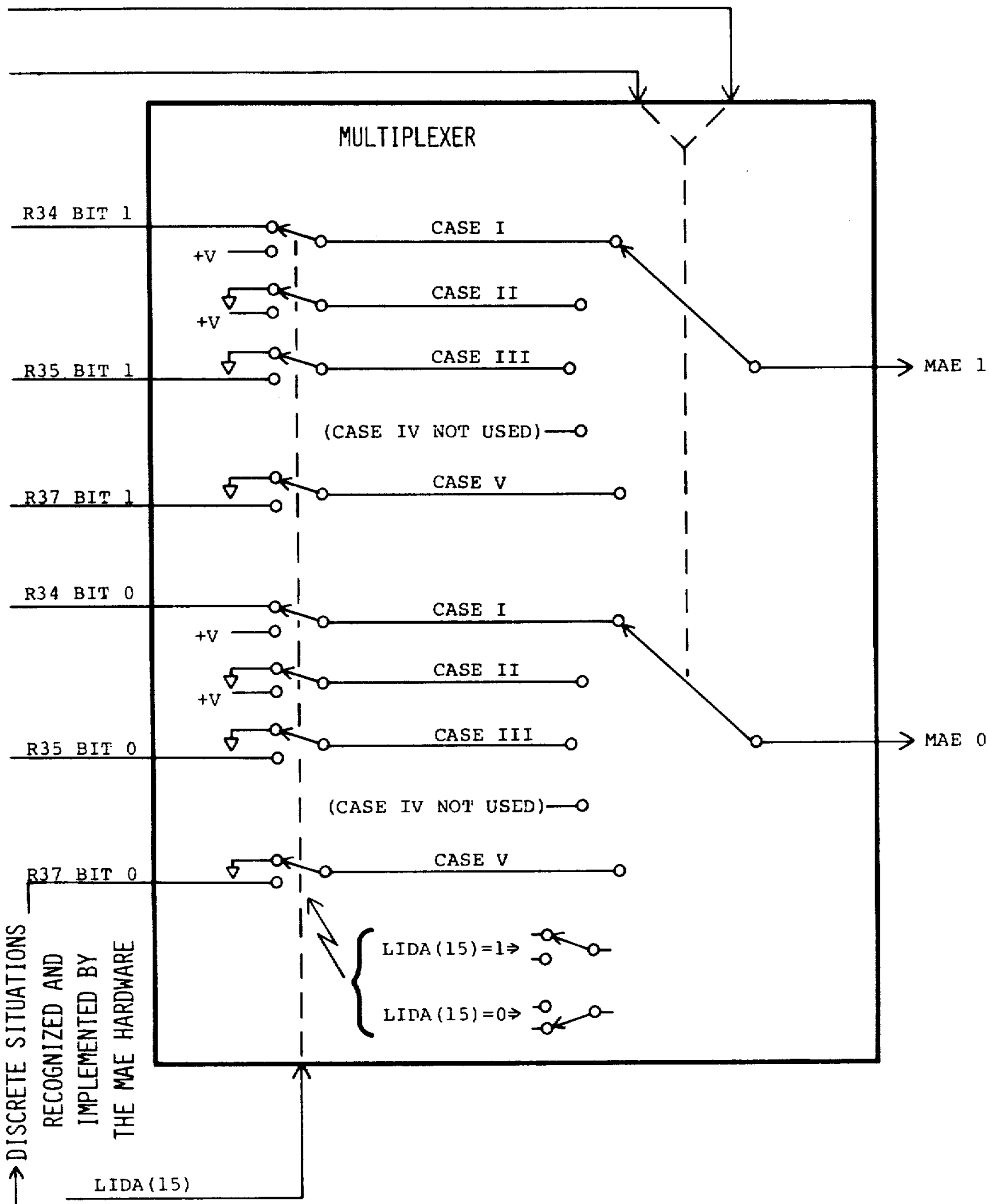

CASE I-ALL INSTRUCTION FETCHES, ALL NON-BASE PAGE REFERENCES FOR LINK-POINTER FETCHES, AND ALL BPC NON-BASE PAGE DIRECT REFERENCES

CASE II-BASE PAGE LINK-POINTER FETCHES AND BPC BASE PAGE DIRECT REFERENCES

CASE III-IOC AND EMC MEMORY REFERENCES, AND BPC INDIRECT FINAL DESTINATION FETCHES

UNUSED CASE IV-BLOCK ASSIGNMENTS MADE IN ACCORDANCE WITH R36. NOT IMPLEMENTED

CASE V-BUS GRANT

FIG 133B

CRT CHARACTER MATRIX

CRT ASC II CHARACTER SET

ASC II CHARACTERS

| CHAR | BYTE POSITION LEFT | BYTE POSITION RIGHT |
|---|---|---|
| NUL | 000000 | 000000 |
| SOH | 000400 | 000001 |
| STX | 001000 | 000002 |
| ETX | 001400 | 000003 |
| EOT | 002000 | 000004 |
| ENQ | 002400 | 000005 |
| ACK | 003000 | 000006 |
| BEL | 003400 | 000007 |
| BS | 004000 | 000010 |
| HT | 004400 | 000011 |
| LF | 005000 | 000012 |
| VT | 005400 | 000013 |
| FF | 006000 | 000014 |
| CR | 006400 | 000015 |
| SO | 007000 | 000016 |
| SI | 007400 | 000017 |
| DLE | 010000 | 000020 |
| DC1 | 010400 | 000021 |
| DC2 | 011000 | 000022 |
| DC3 | 011400 | 000023 |
| DC4 | 012000 | 000024 |
| NAK | 012400 | 000025 |
| SYN | 013000 | 000026 |
| ETB | 013400 | 000027 |
| CAN | 014000 | 000030 |
| EM | 014400 | 000031 |
| SUB | 015000 | 000032 |
| ESC | 015400 | 000033 |
| FS | 016000 | 000034 |
| GS | 016400 | 000035 |
| RS | 017000 | 000036 |
| US | 017400 | 000037 |

| CHAR | BYTE POSITION LEFT | BYTE POSITION RIGHT |
|---|---|---|
| SPACE | 020000 | 000040 |
| ! | 020400 | 000041 |
| " | 021000 | 000042 |
| # | 021400 | 000043 |
| $ | 022000 | 000044 |
| % | 022400 | 000045 |
| & | 023000 | 000046 |
| ' | 023400 | 000047 |
| ( | 024000 | 000050 |
| ) | 024400 | 000051 |
| * | 025000 | 000052 |
| + | 025400 | 000053 |
| , | 026000 | 000054 |
| - | 026400 | 000055 |
| . | 027000 | 000056 |
| / | 027400 | 000057 |
| | | |
| 0 | 030000 | 000060 |
| 1 | 030400 | 000061 |
| 2 | 031000 | 000062 |
| 3 | 031400 | 000063 |
| 4 | 032000 | 000064 |
| 5 | 032400 | 000065 |
| 6 | 033000 | 000066 |
| 7 | 033400 | 000067 |
| 8 | 034000 | 000070 |
| 9 | 034400 | 000071 |
| | | |
| : | 035000 | 000072 |
| ; | 035400 | 000073 |
| < | 036000 | 000074 |
| = | 036400 | 000075 |
| > | 037000 | 000076 |
| ? | 037400 | 000077 |
| @ | 040000 | 000100 |

| CHAR | BYTE POSITION LEFT | BYTE POSITION RIGHT |
|---|---|---|
| A | 040400 | 000101 |
| B | 041000 | 000102 |
| C | 041400 | 000103 |
| D | 042000 | 000104 |
| E | 042400 | 000105 |
| F | 043000 | 000106 |
| G | 043400 | 000107 |
| H | 044000 | 000110 |
| I | 044400 | 000111 |
| J | 045000 | 000112 |
| K | 045400 | 000113 |
| L | 046000 | 000114 |
| M | 046400 | 000115 |
| N | 047000 | 000116 |
| O | 047400 | 000117 |
| P | 050000 | 000120 |
| Q | 050400 | 000121 |
| R | 051000 | 000122 |
| S | 051400 | 000123 |
| T | 052000 | 000124 |
| U | 052400 | 000125 |
| V | 053000 | 000126 |
| W | 053400 | 000127 |
| X | 054000 | 000130 |
| Y | 054400 | 000131 |
| Z | 055000 | 000132 |
| | | |
| [ | 055400 | 000133 |
| \ | 056000 | 000134 |
| ] | 056400 | 000135 |
| ^ | 057000 | 000136 |
| _ | 057400 | 000137 |
| ` | 060000 | 000140 |

| CHAR | BYTE POSITION LEFT | BYTE POSITION RIGHT |
|---|---|---|
| a | 060400 | 000141 |
| b | 061000 | 000142 |
| c | 061400 | 000143 |
| d | 062000 | 000144 |
| e | 062400 | 000145 |
| f | 063000 | 000146 |
| g | 063400 | 000147 |
| h | 064000 | 000150 |
| i | 064400 | 000151 |
| j | 065000 | 000152 |
| k | 065400 | 000153 |
| l | 066000 | 000154 |
| m | 066400 | 000155 |
| n | 067000 | 000156 |
| o | 067400 | 000157 |
| p | 070000 | 000160 |
| q | 070400 | 000161 |
| r | 071000 | 000162 |
| s | 071400 | 000163 |
| t | 072000 | 000164 |
| u | 072400 | 000165 |
| v | 073000 | 000166 |
| w | 073400 | 000167 |
| x | 074000 | 000170 |
| y | 074400 | 000171 |
| z | 075000 | 000172 |
| | | |
| { | 075400 | 000173 |
| \| | 076000 | 000174 |
| } | 076400 | 000175 |
| ~ | 077000 | 000176 |
| DEL | 077400 | 000177 |

FIG 138

BLOCK DIAGRAM OF CALCULATOR'S DISPLAY SYSTEM AND THE MAINFRAME INTERFACE

THE CRT CONTROL LOGIC IS PART OF THE DISPLAY, BUT IS LOCATED IN THE MAINFRAME.

THIS IS WHAT IS REFERRED TO AS THE CRT MEMORY ACCESS PORT IN FIGURE 43.

ALPHA MODE
DATA PATTERN EXAMPLE

| MEMORY ADDRESS | MEMORY DATA | FUNCTION |
|---|---|---|
| 70000 | 107776 | ALPHA, FIRST ADDRESS=70001 |
| 70001 | 140000 | NWA, $N_u$ (IGNORED) |
| 70002 | 107770 | NEXT ADDRESS=70007 |
| 70007 | 100040 | CLEAR, BLANK |
| 70010 | 031053 | 2, + |
| 70011 | 031301 | 2, EOL |
| 70012 | 140000 | NWA, $N_u$ (IGNORED) |
| 70013 | 107757 | NEXT ADDRESS=70020 |
| 70020 | 140701 | EOL, EOL |
| 70021 | 140701 | EOL, EOL |
| • | • | • |
| • | • | • |
| • | • | • |
| • | • | • |
| • | • | • |
| • | • | • |
| 70032 | 140701 | EOL, EOL |
| 70033 | 140440 | EOL, BLANK |
| 70034 | 032301 | 4, EOL |

TOTAL=20 WORDS

NOTES:

(1) SIGNALS THAT INTERFACE TO GRAPHICS (2) SIGNALS FROM CL TO MONITOR (3) SIGNAL THAT IS GROUNDED ON THE CRT MOTHER BOARD (4) THE MONITOR CONSISTS OF 3 PC BOARDS. NO INDICATION IS GIVEN AS TO WHICH BOARD THE CIRCUITS ARE LOCATED (5) [ ] INDICATES MONITOR PARTS NOT LOCATED ON PC BOARDS

CONTROL LOGIC BLOCK DIAGRAM

CRT STATE MACHINE OUTPUT PATTERN

| STATE \ OUTPUT | 15 | 14 | 13 | 12 | 11 | 10 | 9 | 8 | 7 | 6 | 5 | 4 | 3 | 2 | 1 | 0 | STATE FUNCTIONS |
|---|---|---|---|---|---|---|---|---|---|---|---|---|---|---|---|---|---|
| 00 | 1 | 1 | 0 | 0 | 0 | 1 | 0 | 0 | 0 | 0 | 1 | 1 | 1 | 1 | 1 | 0 | START |
| 01 | 1 | 1 | 0 | 0 | 0 | 1 | 0 | 0 | 0 | 0 | 1 | 1 | 0 | 1 | 0 | 0 | STOP |
| 02 | 1 | 1 | 0 | 0 | 0 | 1 | 1 | 1 | 0 | 0 | 1 | 1 | 0 | 1 | 1 | 0 | BR, WAIT FOR EBG |
| 03 | 1 | 1 | 0 | 0 | 0 | 0 | 0 | 1 | 0 | 0 | 1 | 1 | 1 | 1 | 1 | 0 | MAR OUT |
| 04 | 1 | 1 | 1 | 0 | 0 | 0 | 0 | 1 | 0 | 0 | 1 | 0 | 1 | 1 | 0 | 0 | STM, STOP |
| 05 | 1 | 1 | 0 | 1 | 0 | 1 | 0 | 1 | 0 | 0 | 1 | 0 | 1 | 1 | 1 | 0 | WAIT FOR SMC |
| 06 | 1 | 1 | 0 | 0 | 0 | 1 | 0 | 0 | 1 | 0 | 1 | 1 | 1 | 0 | 1 | 0 | JMP TO 36 ON NP, RESET NP F-F |
| 07 | 0 | 1 | 0 | 0 | 1 | 1 | 0 | 0 | 0 | 0 | 1 | 1 | 1 | 1 | 1 | 0 | INCR. MAR, ENABLE BYTE 1 |
| 10 | 0 | 1 | 0 | 0 | 0 | 1 | 0 | 0 | 0 | 0 | 1 | 1 | 1 | 1 | 1 | 0 | LATCH DECODER |
| 11 | 0 | 1 | 0 | 0 | 0 | 1 | 0 | 0 | 1 | 0 | 1 | 1 | 1 | 1 | 1 | 0 | JMP TO 36 ON NWA |
| 12 | 0 | 1 | 0 | 0 | 0 | 1 | 0 | 0 | 0 | 0 | 1 | 1 | 1 | 1 | 1 | 1 | JMP TO 16 ON EOL |
| 13 | 0 | 1 | 0 | 0 | 0 | 1 | 0 | 0 | 0 | 0 | 0 | 1 | 1 | 1 | 1 | 0 | LINE BUFF. LOAD |
| 14 | 0 | 1 | 0 | 0 | 0 | 1 | 0 | 0 | 0 | 0 | 0 | 1 | 1 | 1 | 1 | 0 | LINE BUFF. LOAD |
| 15 | 0 | 1 | 0 | 0 | 0 | 1 | 0 | 0 | 0 | 0 | 1 | 1 | 1 | 1 | 1 | 0 | INCR. 80 CHAR COUNTER |
| 16 | 1 | 1 | 0 | 0 | 0 | 1 | 0 | 0 | 0 | 0 | 1 | 0 | 0 | 1 | 0 | 0 | TARGET, STOP |
| 17 | 1 | 1 | 0 | 0 | 0 | 1 | 0 | 0 | 1 | 0 | 1 | 0 | 0 | 1 | 1 | 0 | WAIT FOR NL OR EOL |
| 20 | 1 | 0 | 0 | 0 | 0 | 1 | 0 | 0 | 0 | 0 | 1 | 1 | 1 | 1 | 1 | 0 | ENABLE BYTE 2 |
| 21 | 1 | 0 | 0 | 0 | 0 | 1 | 0 | 0 | 0 | 0 | 1 | 1 | 1 | 1 | 1 | 0 | LATCH DECODER |
| 22 | 1 | 0 | 0 | 0 | 0 | 1 | 0 | 0 | 1 | 0 | 1 | 1 | 1 | 1 | 1 | 1 | JMP TO 36 ON NWA OR EOL |
| 23 | 1 | 0 | 0 | 0 | 0 | 1 | 0 | 0 | 0 | 0 | 0 | 1 | 1 | 1 | 1 | 0 | LINE BUFF. LOAD |
| 24 | 1 | 0 | 0 | 0 | 0 | 1 | 0 | 0 | 0 | 0 | 0 | 1 | 1 | 1 | 1 | 0 | LINE BUFF. LOAD |
| 25 | 1 | 0 | 0 | 0 | 0 | 1 | 0 | 0 | 1 | 1 | 1 | 1 | 1 | 1 | 1 | 1 | JMP TO 36, INCR. 80 CHAR. COUNTER |
| 26 | 1 | 1 | 1 | 1 | 1 | 1 | 1 | 1 | 1 | 1 | 1 | 1 | 1 | 1 | 1 | 1 | NOP |
| 27 | 1 | 1 | 1 | 1 | 1 | 1 | 1 | 1 | 1 | 1 | 1 | 1 | 1 | 1 | 1 | 1 | NOP |
| 30 | 1 | 1 | 1 | 1 | 1 | 1 | 1 | 1 | 1 | 1 | 1 | 1 | 1 | 1 | 1 | 1 | NOP |
| 31 | 1 | 1 | 1 | 1 | 1 | 1 | 1 | 1 | 1 | 1 | 1 | 1 | 1 | 1 | 1 | 1 | NOP |
| 32 | 1 | 1 | 1 | 1 | 1 | 1 | 1 | 1 | 1 | 1 | 1 | 1 | 1 | 1 | 1 | 1 | NOP |
| 33 | 1 | 1 | 1 | 1 | 1 | 1 | 1 | 1 | 1 | 1 | 1 | 1 | 1 | 1 | 1 | 1 | NOP |
| 34 | 1 | 1 | 1 | 1 | 1 | 1 | 1 | 1 | 1 | 1 | 1 | 1 | 1 | 1 | 1 | 1 | NOP |
| 35 | 1 | 1 | 1 | 1 | 1 | 1 | 1 | 1 | 1 | 1 | 1 | 1 | 1 | 1 | 1 | 1 | NOP |
| 36 | 1 | 1 | 0 | 0 | 0 | 1 | 0 | 0 | 0 | 0 | 1 | 0 | 0 | 1 | 0 | 0 | TARGET STOP |
| 37 | 1 | 1 | 0 | 0 | 0 | 1 | 0 | 0 | 0 | 0 | 1 | 0 | 0 | 1 | 1 | 0 | WAIT FOR NL OR EOL |
| OUTPUT FUNCTIONS | BYTE 1 ENABLE | BYTE 2 ENABLE | STM | SMC | CLOCK MAR | MAR ENABLE | BR | MEMORY CYCLE | JMP FOR NP | JMP UNCONDITIONAL | CLOCK 80 CHAR. | START MUX ADDRESS | START MUX ADDRESS | NP F-F RESET | STOP | JMP FOR EOL | |

FIG 143

CRT STATE MACHINE FLOW DIAGRAM

CRT BUS CYCLE

| | MIN | TYP | MAX |
|---|---|---|---|
| $t_{D1}$ | — | 30 | 45 |
| $t_{D2}$ | — | 17 | 28 |
| $t_{D3}$ | — | 30 | 45 |
| $t_{D4}$ | — | 51 | 77 |
| $t_{D5}$ | — | 8 | 12 |
| $t_{D6}$ | — | 43 | 67 |
| $t_{D7}$ | — | 7 | 12 |
| $t_{D8}$ | — | 22 | 34 |

| | MIN | TYP | MAX |
|---|---|---|---|
| $t_{H1}$ | 35 | — | — |
| $t_{H2}$ | 35 | — | — |
| $t_{S1}$ | 66 | — | — |
| $t_{S2}$ | 42 | — | — |
| $t_{S3}$ | 67 | — | — |
| $t_{S4}$ | 25 | — | — |

MONITOR DRIVE SIGNALS

RELATIONSHIP OF THE CONTROL LOGIC/DISPLAY LOGIC INTERFACE SIGNALS

DISPLAY LOGIC BLOCK DIAGRAM

VIDEO WAVEFORMS

*OPERATION OF V1 IS IDENTICAL EXCEPT: a) V2 MUST BE "HIGH" AND b) $\overline{FB}$ FUNCTION IS NOT AVAILABLE TO ALPHANUMERICS AND IS LEFT "HIGH".

HORIZONTAL SWEEP CIRCUIT WAVEFORMS

VERTICAL SWEEP CIRCUIT WAVEFORMS

ASSEMBLER PSEUDO INSTRUCTIONS

ASSEMBLER CONTROL

| | ORG | m | comments |
|---|---|---|---|

Defines the origin of a program, or the origins of subsequent sections of programming.

| | ORR | comments |
|---|---|---|

Automatic reset of the value of the program location counter.

EXAMPLE:

```
ASMB.A.L.C
         HED ORR TEST
         ORG 100B    INITIAL VALUE OF PLC
         NOP
         NOP
         ORR         NO EFFECT, NO SECOND ORIGIN
         NOP
         NOP
         SPC 1
         ORG 200B    SECOND OR LATER ORIGIN
         NOP
         NOP
         SPC 1
         ORG 300B
         NOP
         NOP
         SPC 1
         ORR         RESET ORIGIN
         NOP
         NOP
         ORR         NO EFFECT ON PIC
         NOP
         NOP
         SPC 1
         ORG 400B
         NOP
         NOP
         SPC 1
         ORR         RESET ORIGIN AGAIN
         NOP
         NOP
         END
**** LIST END ****
```

| | IFN | comments |
|---|---|---|

```
IFN
.
.
.
XIF
```

Source language statements after IFN and before the next XIF are included in the program if the character "N" is specified in the ASMB control statement.

FIG 153A

ASSEMBLER PSEUDO INSTRUCTIONS

ASSEMBLER CONTROL (CONT.)

| | IFZ | comments |
|---|---|---|

```
        .
        .
        .
       XIF
```

Source language statements after the IFZ and before the next XIF pseudo instructions are included in the program if the character "Z" is specified in the ASMB control statement.

| label | REP | n | comments |
|---|---|---|---|

Causes the repetition of the next statement a specified number of times.

EXAMPLE:

```
            CLA
    TRIPL   REP       3
            ADA       DATA
```

The above source code would generate the following:

```
            CLA                 Clear the A-Register;
TRIPL       ADA       DATA      the contents of DATA
            ADA       DATA      is tripled and stored in
            ADA       DATA      the A-Register.
```

Example:

```
    FILL    REP       100B
            NOP
```

The example above loads $100_8$ memory locations with the NOP instruction. The first location is labeled FILL.

| | END | comments |
|---|---|---|

Terminates the program; marks the physical end of the source language statements.

FIG 153B

ASSEMBLER PSEUDO INSTRUCTIONS

ADDRESS AND SYMBOL DEFINITION

| label | DEF | m [,I ] | comments |
|---|---|---|---|

Generates one word of memory as an address which may be used as the object of an indirect address found elsewhere in the source program.

EXAMPLES:

```
      LDA INST     A IS LOADED WITH ADDRESS OF BUFFR+3
       .
       .
       .
LABEL DEF BUFFR
INST  DEF BUFFR+3
       .
       .
       .
      ORG 77000B
BUFFR BSS 40
       .
       .
       .
**** LIST END ****
```

```
      LDA HOOK,I     A GETS LOADED WITH 171717
       .
       .
       .
HOOK  DEF ROOK,I     THE ,I SETS BIT 15 OF HOOK
       .
       .
       .
ROOK  DEF ZIPPR
       .
       .
       .
ZIPPR OCT 171717
       .
       .
       .
```

FIG 153C

ASSEMBLER PSEUDO INSTRUCTIONS

ADDRESS AND SYMBOL DEFINITION (CONT.)

| label | ABS | m | comments |
|---|---|---|---|

Defines a 16-bit value to be stored at the location represented by the label.

EXAMPLE:

```
AB     EQU  35         ASSIGNS THE VALUE OF 35
                       TO THE SYMBOL AB

M35    ABS  -AB        M35 CONTAINS -35.
P35    ABS  AB         P35 CONTAINS 35.
P70    ABS  AB+AB      P70 CONTAINS 70.
P30    ABS  AB-5       P30 CONTAINS 30.
```

| label | EQU | m | comments |
|---|---|---|---|

Assigns to a symbol a value other than the one normally assigned by the program location counter.

EXAMPLE:

```
        .
        .
        .
J3     DEF
        .
        .
        .
       LDA  J3         THE SYMBOLS JFOUR AND J3+1 BOTH
       ADA  ONE        IDENTIFY THE SAME LOCATION. THE
       STA  J3+1       AND OPERATION IS PERFORMED ON
JFOUR  EQU  J3+1       THIS LOCATION.
        .
        .
        .
MWH    AND  JFOUR
        .
```

FIG 153D

ASSEMBLER PSEUDO INSTRUCTIONS

CONSTANT DEFINITION

| label | ASC | n, <2n characters> | comments |
|---|---|---|---|

Converts a string of 2n alphanumeric characters in ASCII code into n consecutive words.

EXAMPLE:

```
TTYP  ASC 3,ABCDE
```

CAUSES THE FOLLOWING:

ALPHABETIC

| | 15 | 14 … 8 | 7 | 6 … 0 |
|---|---|---|---|---|
| TTYP | | A | | B |
| | | C | | D |
| | | E | | Λ |

EQUIVALENT IN OCTAL NOTATION

| | 15 | 14 … 8 | | | 7 | 6 … 0 | | |
|---|---|---|---|---|---|---|---|---|
| TTYP | | 1 | 0 | 1 | | 1 | 0 | 2 |
| | | 1 | 0 | 3 | | 1 | 0 | 4 |
| | | 1 | 0 | 5 | | 0 | 4 | 0 |

| label | DEC | $d_1[,d_2,\ldots,d_n]$ | comments |
|---|---|---|---|

Records a string of integer decimal constants into consecutive words.

| | 15 | 14 … 0 |
|---|---|---|
| SIGN → | s | number |

EXAMPLE:

```
INT  DEC 50,+328,-300
```

CAUSES THE FOLLOWING (OCTAL REPRESENTATION):

| | 15 | 14 … 0 | | | | |
|---|---|---|---|---|---|---|
| INT | 0 | 0 | 0 | 0 | 6 | 2 |
| | 0 | 0 | 0 | 5 | 1 | 0 |
| | 1 | 7 | 7 | 3 | 2 | 4 |

FIG 153E

ASSEMBLER PSEUDO INSTRUCTIONS

CONSTANT DEFINITION (CONT.)

| label | OCT | $o_1[,o_2,\ldots,o_n]$ | comments |
|---|---|---|---|

Stores one or more integer octal constants in consecutive words of the object program.

EXAMPLE:

| Label | Operation | Operand | Comments |
|---|---|---|---|
| | OCT | +Ø | |
| | OCT | -2 | |
| NUM | OCT | 177,2Ø4Ø5,-36 | |
| | OCT | 51,77777,-1,1Ø1Ø1 | |
| | OCT | 1Ø7642,177Ø77 | |
| | OCT | 1976 | ILLEGAL: CONTAINS |
| | OCT | -177777 | DIGIT 9 |
| | OCT | 1778 | ILLEGAL: CONTAINS |
| | | | CHARACTER B |

THE PREVIOUS STATEMENTS ARE STORED AS FOLLOWS:

| | 15 | 14 | | | | 0 |
|---|---|---|---|---|---|---|
| | 0 | 0 | 0 | 0 | 0 | 0 |
| | 1 | 7 | 7 | 7 | 7 | 6 |
| NUM | 0 | 0 | 0 | 1 | 7 | 7 |
| | 0 | 2 | 0 | 4 | 0 | 5 |
| | 1 | 7 | 7 | 7 | 4 | 2 |
| | 0 | 0 | 0 | 0 | 5 | 1 |
| | 0 | 7 | 7 | 7 | 7 | 7 |
| | 1 | 7 | 7 | 7 | 7 | 7 |
| | 0 | 1 | 0 | 1 | 0 | 1 |
| | 1 | 0 | 7 | 6 | 4 | 2 |
| | 1 | 7 | 7 | 0 | 7 | 7 |
| | X | X | X | X | X | X |
| | 0 | 0 | 0 | 0 | 0 | 1 |
| | X | X | X | X | X | X |

THE RESULT OF ATTEMPTING TO DEFINE AN ILLEGAL CONSTANT IS UNPREDICTABLE

STORAGE ALLOCATION

| label | BSS | m | comments |
|---|---|---|---|

FIG 153F

Advances the program location counter according to the value of the operand.

ASSEMBLER PSEUDO INSTRUCTIONS

ASSEMBLY LISTING CONTROL

| | | |
|---|---|---|
| | UNL | comments |

Output is suppressed from the assembly listing for all subsequent instructions and comments until either an LST or END is encountered.

| | | |
|---|---|---|
| | LST | comments |

Causes the source program listing, terminated by a UNL, to be resumed.

| | | |
|---|---|---|
| | SUP | comments |

Suppresses the output of additional code lines from the source program listing.

| | | |
|---|---|---|
| | UNS | comments |

Causes the printing of additional coding lines, terminated by a SUP, to be resumed.

| | | |
|---|---|---|
| | SKP | comments |

Causes the source program listing to be skipped to the top of the next page.

| | | |
|---|---|---|
| | SPC | n |

Causes the source program listing to be skipped a specified number of lines.

| | | |
|---|---|---|
| | HED | <heading> |

Allows the programmer to specify a heading to be printed at the top of each page of the source program listing.

FIG 153G

OBJECT TAPE FORMAT

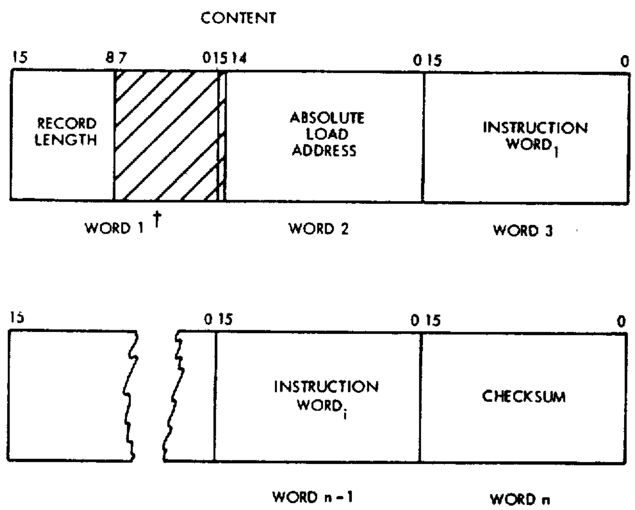

EXPLANATION

RECORD LENGTH = NUMBER OF WORDS IN RECORD EXCLUDING WORDS 1 AND 2 AND THE LAST WORD.

ABSOLUTE LOAD ADDRESS: STARTING ADDRESS FOR LOADING THE INSTRUCTIONS WHICH FOLLOW

INSTRUCTION WORDS: ABSOLUTE INSTRUCTIONS OR DATA

CHECKSUM: ARITHMETIC TOTAL OF ALL WORDS EXCEPT FIRST AND LAST

†Each word represents two frames arranged as follows:

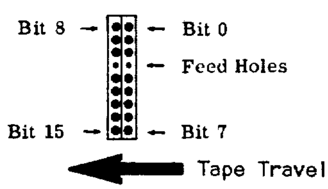

FIG 154 label 1, label 2, AND label 3 REPRESENT VALID ASSEMBLY LANGUAGE LABELS. SAMx REPRESENTS A VALID TEMPORARY OPERAND GENERATED BY THE SPASTIC PROGRAM.

| INPUT | OPCODE INDENTIFIER | | OUTPUT | |
|---|---|---|---|---|
| TCA | (20) | * | TCA | |
| TCA | (20) | * | TCA | |
| STA label1 | (9) | | STA label1 | |
| LDA label1 | (1) | * | LDA label1 | |
| LDA label1 | (1) | | LDA label1 | |
| STA label1 | (9) | * | STA label1 | |
| LDA label1 | (1) | * | LDA label1 | |
| TCA | (20) | * | TCA | |
| ADA label2 | (5) | * | ADA label2 | |
| TCA | (20) | * | TCA | |
| | | | LDA label 2 | * |
| | | | TCA | * |
| | | | ADA label 1 | * |
| STA label 1 | (9) | | STA label 1 | |
| LDA label 2 | (1) | * | LDA label 2 | |
| CPA label 1 | (93) | * | CPA label 1 | |
| | | | CPA label 2 | * |
| STA label 1 | (9) | | STA label 1 | |
| LDA label2 | (1) | * | LDA label 2 | |
| ADA label 1 | (5) | * | ADA label 1 | |
| | | | ADA label 2 | * |
| STA label1 | (9) | * | STA label 1 | |
| LDA PØ | (1) | * | LDA PØ | |
| TCA | (20) | * | TCA | |
| ADA label 1 | (5) | * | ADA label1 | |
| LDA label1 | (1) | | LDA label 1 | |
| ADA label2 | (5) | | ADA label2 | |
| STA label 3 | (9) | | STA label3 | |
| LDA label 1 | (1) | * | LDA label1 | |
| ADA label2 | (5) | * | ADA label 2 | |

FIG 155A

| | INPUT | OPCODE INDENTIFIER | | OUTPUT | |
|---|---|---|---|---|---|
| | JMP label1 | (56) | * | JMP label1 | |
| label 2 | EQU * | (71) | label 2 | EQU * | |
| label 1 | EQU * | (71) | *abel1 | EQU * | |
| | JMP *+2 | (105) | * | JMP *+2 | |
| | JMP label1 | (56) | * | JMP label1 | |
| | JMP label2 | (56) | | JMP label 2 | |
| label1 | EQU * | (71) | *abel1 | EQU * | |
| | JMP *+2 | (105) | * | JMP *+2 | |
| | JMP label 1 | (56) | | RET n | * |
| | RET n | (60) | | JMP label1 | |
| | | | * | RET n | |
| | STA label1 | (9) | | STA label1 | |
| | STA SAMx | (9) | * | STA SAMx | |
| | LDA label 2 | (1) | | LDA label 2 | |
| | TCA | (20) | | TCA | |
| | ADA SAMx | (5) | * | ADA SAMx | |
| | | | | ADA label 1 | * |
| | STA SAMx | (9) | * | STA SAMx | |
| | LDA SAMx,I | (1) | * | LDA SAMx,I | |
| | | | | LDA A,I | * |

FIG 155B label1 AND label2 REPRESENT VALID ASSEMBLY LANGUAGE LABELS. SAMx REPRESENTS A VALID TEMPORARY OPERAND GENERATED BY THE SPASTIC PROGRAM. THESE OPTIMIZATIONS AFFECT THE CONTENTS OF THE A-REGISTER.

| INPUT | OPCODE INDENTIFIER | | OUTPUT | |
|---|---|---|---|---|
| LDA B | (1) | * | LDA B | |
| STA label1 | (9) | * | STA label1 | |
| | | | STB label1 | * |
| LDA label1 | (1) | * | LDA label1 | |
| STA B | (9) | * | STA B | |
| | | | LDB label1 | * |
| LDA B | (1) | * | LDA B | |
| CPA label1 | (93) | * | CPA label1 | |
| | | | CPB label1 | * |

FIG 156A

| INPUT | OPCODE INDENTIFIER | | OUTPUT | |
|---|---|---|---|---|
| LDA label1 | (1) | * | LDA label1 | |
| CPA B | (93) | * | CPA B | |
| | | | CPB label1 | * |
| LDA label1 | (1) | * | LDA label1 | |
| SAR label2 | (116) | * | SAR label2 | |
| STA B | (9) | * | STA B | |
| | | | LDB label1 | * |
| | | | SBR label2 | * |
| LDA label1 | (1) | * | LDA label1 | |
| SAL label2 | (112) | * | SAR label2 | |
| STA B | (9) | * | STA B | |
| | | | LDB label1 | * |
| | | | SBL label2 | * |
| LDA label1 | (1) | * | LDA label1 | |
| AAR label2 | (120) | * | SAR label2 | |
| STA B | (9) | * | STA B | |
| | | | LDB label1 | * |
| | | | ABR label2 | * |
| LDA label1 | (1) | * | LDA label1 | |
| RAR label2 | (40) | * | SAR label2 | |
| STA B | (9) | * | STA B | |
| | | | LDB label1 | * |
| | | | RBR label2 | * |
| LDA B | (1) | * | LDA B | |
| SAR label1 | (116) | * | SAR label1 | |
| STA B | (9) | * | STA B | |
| | | | SBR label1 | * |
| LDA B | (1) | * | LDA B | |
| SAL label1 | (112) | * | SAR label1 | |
| STA B | (9) | * | STA B | |
| | | | SBL label1 | * |
| LDA B | (1) | * | LDA B | |
| AAR label1 | (120) | * | SAR label1 | |
| STA B | (9) | * | STA B | |
| | | | ABR label1 | |
| LDA B | (1) | * | LDA B | |
| RAR label1 | (40) | * | SAR label1 | |
| STA B | (9) | * | STA B | |
| | | | RBR label1 | * |

FIG 156B

| INPUT | OPCODE INDENTIFIER | | OUTPUT | |
|---|---|---|---|---|
| LDA label 1 | (1) | * | LDA label 1 | |
| ADA M1 | (5) | * | ADA M1 | |
| STA label1 | (9) | * | STA label 1 | |
| | | | DSZ label 1 | * |
| | | | JMP *+1 | * |
| LDA label 1 | (1) | * | LDA label 1 | |
| ADA P1 | (5) | * | APA P1 | |
| STA label 1 | (9) | * | STA label 1 | |
| | | | ISZ label 1 | * |
| | | | JMP *+1 | * |
| LDA B | (1) | * | LDA B | |
| ADA P1 | (5) | * | ADA P1 | |
| STA B | (9) | * | STA B | |
| | | | SIB *+1 | * |
| STA SAMx | (9) | * | STA SAMx | |
| LDA label 2 | (1) | * | LDA label2 | |
| CPA SAMx | (93) | * | CPA SAMx | |
| | | | CPA label 2 | * |

THIS OPTIMIZATION AFFECTS THE CONTENTS OF THE A-REGISTER AND B-REGISTER.

| | | | | |
|---|---|---|---|---|
| STA SAMx | (9) | * | STA SAMx | |
| LDA label 2 | (1) | * | LDA label 2 | |
| STA SAMx,I | (9) | * | STA SAMx,I | |
| | | | LDB label 2 | * |
| | | | STB A,I | * |

FIG 156C label1 AND label2 REPRESENT VALID ASSEMBLY LANGUAGE LABELS.

| | INPUT | | OPCODE INDENTIFIER | | OUTPUT | | |
|---|---|---|---|---|---|---|---|
| | SAM | *+2 | (86) | * | SAM | *+2 | |
| | JMP | label1 | (56) | * | JMP | label1 | |
| | | | | | SAP | label1 | * |
| | SAP | *+2 | (33) | * | SAP | *+2 | |
| | JMP | label1 | (56) | * | JMP | label1 | |
| | | | | | SAM | label1 | * |
| | RZA | *+2 | (124) | * | RZA | *+2 | |
| | JMP | label1 | (56) | * | JMP | label1 | |
| | | | | | SZA | label1 | * |
| | RLA | *+2 | (131) | * | RLA | *+2 | |
| | JMP | label1 | (56) | * | JMP | label1 | |
| | | | | | SLA | label1 | * |
| | SAP | *+2 | (33) | * | SAP | *+2 | |
| | JMP | label1 | (56) | * | JMP | label1 | |
| | JMP | label2 | (56) | | SAM | *+2 | * |
| | JMP | label3 | (56) | | JMP | label2 | |
| label1 | EQU | * | (71) | * | JMP | label3 | |
| | | | | *abel1 | EQU | * | |
| | SAM | *+2 | (86) | * | SAM | *+2 | |
| | JMP | label1 | (56) | * | JMP | label1 | |
| | JMP | label2 | (56) | | SAP | *+2 | * |
| | JMP | label3 | (56) | | JMP | label2 | |
| label1 | EQU | * | (71) | * | JMP | label3 | |
| | | | | *abel1 | EQU | * | |
| | RZA | *+2 | (124) | * | RZA | *+2 | |
| | JMP | label1 | (56) | * | JMP | label1 | |
| | JMP | label2 | (56) | | SZA | *+2 | * |
| | JMP | label3 | (56) | | JMP | label2 | |
| label1 | EQU | * | (71) | * | JMP | label3 | |
| | | | | *abel1 | EQU | * | |
| | RLA | *+2 | (131) | * | RLA | *+2 | |
| | JMP | label1 | (56) | * | JMP | label1 | |
| | JMP | label2 | (56) | | SLA | *+2 | * |
| | JMP | label3 | (56) | | JMP | label2 | |
| label1 | EQU | * | (71) | * | JMP | label3 | |
| | | | | *abel1 | EQU | * | |

FIG 157A

| INPUT | OPCODE INDENTIFIER | | OUTPUT | |
|---|---|---|---|---|
| LDA PØ | (1) | * | LDA PØ | |
| CPA label1 | (93) | * | CPA label 1 | |
| JMP label2 | (56) | * | JMP label 2 | |
| label 2 IN RANGE | | | { LDA label 1 | * |
| | | | SZA label 2 | * |
| LDA label 1 | (1) | * | LDA label 1 | |
| CPA PØ | (93) | * | CPA PØ | |
| JMP label 2 | (56) | * | JMP label 2 | |
| label 2 IN RANGE | | | { LDA label 1 | * |
| | | | SZA label 2 | * |

FIG 157B label1 AND label2 REPRESENT VALID ASSEMBLY LANGUAGE LABELS.

```
                     OPCODE
INPUT              INDENTIFIER          OUTPUT

LDA label1            (1)        *      LDA label1
TCA                   (20)       *      TCA
ADA PØ                (5)        *      ADA PØ
SAM *+2               (86)       *      SAM *+2
JMP label2            (56)       *      JMP label2
                                      { LDA label1     *
             label2 IN RANGE          { SZA label2     *
                                      { SAM label2     *

                                      { LDA label1     *
             label2 OUT OF RANGE      { SZA *+2        *
                                      { SAP *+2        *
                                      { JMP label2     *

LDA label1            (1)        *      LDA label1
CPA PØ                (93)       *      CPA PØ
JMP *+2               (105)      *      JMP *+2
JMP label2            (56)       *      JMP label2
             label2 IN RANGE          { LDA label1     *
                                      { RZA label2     *

                                      { LDA label1     *
             label2 OUT OF RANGE      { SZA *+2        *
                                      { JMP label2     *

LDA PØ                (1)        *      LDA PØ
TCA                   (20)       *      TCA
ADA label1            (5)        *      ADA label1
SAP *+2               (33)       *      SAP *+2
JMP label2            (56)       *      JMP label2
             label2 IN RANGE          { LDA label1     *
                                      { SAM label2     *

                                      { LDA label1     *
             label2 OUT OF RANGE      { SAP *+2        *
                                      { JMP label2     *
```

FIG 158A

```
                          OPCODE
          INPUT         INDENTIFIER            OUTPUT

          LDA  label 1      (1)        *       LDA  label 1
          CMA               (23)       *       CMA
          ADA  P0           (5)        *       ADA  P0
          SAM  *+2          (86)       *       SAM  *+2
          JMP  label 2      (56)       *       JMP  label 2
                label 2 IN RANGE             { LDA  label 1    *
                                             { SAM  label 2    *

                                             { LDA  label 1    *
                label 2 OUT OF RANGE         { SAP  *+2        *
                                             { JMP  label 2    *

          LDA  P0           (1)        *       LDA  P0
          CMA               (23)       *       CMA
          ADA  label 1      (5)        *       ADA  label 1
          SAP  *+2          (33)       *       SAP  *+2
          JMP  label 2      (56)       *       JMP  label 2
                                             { LDA  label 1    *
                label 2 IN RANGE             { SZA  label 2    *
                                             { SAM  label 2    *

                                             { LDA  label 1    *
                                             { SZA  *+2        *
                label 2 OUT OF RANGE         { SAP  *+2        *
                                             { JMP  label 2    *

          SAP  *+2          (33)       *       SAP  *+2
          JMP  label 1      (56)       *       JMP  label 1
          JMP  label 2      (56)       *       JMP  label 2
label 1   EQU  *            (71)     *abel 1   EQU  *
                label 2 IN RANGE               SAP  label 2    *

          SAM  *+2          (86)       *       SAM  *+2
          JMP  label 1      (56)       *       JMP  label 1
          JMP  label 2      (56)       *       JMP  label 2
label 1   EQU  *            (71)     *abel 1   EQU  *
                label 2 IN RANGE               SAM  label 2    *

          RZA  *+2          (124)      *       RZA  *+2
          JMP  label 1      (56)       *       JMP  label 1
          JMP  label 2      (56)       *       JMP  label 2
label 1   EQU  *            (71)     *abel 1   EQU  *
                label 2 IN RANGE               RZA  label 2    *
```

FIG 158B

```
                                  OPCODE
            INPUT              INDENTIFIER              OUTPUT

             RLA  *+2             (131)          *        RLA  *+2
             JMP  label1          (56)           *        JMP  label1
             JMP  label 2         (56)           *        JMP  label 2
     label1  EQU  *               (71)           *abel1   EQU  *
                      label 2 IN RANGE                    RLA  label 2   *

             SAP  *+2             (33)           *        SAP  *+2
             JMP  label1          (56)           *        JMP  label1
             JMP  label 2         (56)           *        JMP  label 2
     label1  EQU  *               (71)                    SAM  *+2       *
                                                          JMP  label 2
                  label 2  OUT OF RANGE          *abel1   EQU  *

             SAM  *+2             (86)           *        SAM  *+2
             JMP  label1          (56)           *        JMP  label1
             JMP  label 2         (56)           *        JMP  label 2
     label1  EQU  *               (71)                    SAP  *+2       *
                                                          JMP  label 2
                  label 2  OUT OF RANGE          *abel1   EQU  *

             RZA  *+2             (124)          *        RZA  *+2
             JMP  label1          (56)           *        JMP  label1
             JMP  label 2         (56)           *        JMP  label 2
     label1  EQU  *               (71)                    SZA  *+2       *
                                                          JMP  label 2
                  label 2  OUT OF RANGE          *abel1   EQU  *

             RLA  *+2             (131)          *        RLA  *+2
             JMP  label1          (56)           *        JMP  label1
             JMP  label2          (56)           *        JMP  label 2
     label1  EQU  *               (71)                    SLA  *+2       *
                                                          JMP  label 2
                  label 2  OUT OF RANGE          *abel1   EQU  *

             LDA  label1          (1)            *        LDA  label1
             CMA                  (23)           *        CMA
             ADA  PØ              (5)            *        ADA  PØ
             SAP  *+2             (33)           *        SAP  *+2
             JMP  label 2         (56)           *        JMP  label 2
                      label 2  IN RANGE                 { LDA  label1    *
                                                        { SAP  label 2   *

                                                        { LDA  label1    *
                      label 2  OUT OF RANGE             { SAM  *+2       *
                                                        { JMP  label 2   *
```

FIG 158C

| INPUT | OPCODE INDENTIFIER | | OUTPUT | |
|---|---|---|---|---|
| LDA PØ | (1) | * | LDA PØ | |
| CMA | (23) | * | CMA | |
| ADA label 1 | (5) | * | ADA label 1 | |
| SAM *+2 | (86) | * | SAM *+2 | |
| JMP label 2 | (56) | * | JMP label 2 | |
| | label 2 IN RANGE | | LDA label 1 | * |
| | | | SZA label 2 | * |
| | | | SAP label 2 | |
| | label 2 OUT OF RANGE | | LDA label 1 | * |
| | | | SZA *+3 | * |
| | | | SAM *+2 | * |
| | | | JMP label 2 | * |
| LDA label 1 | (1) | * | LDA label 1 | |
| TCA | (20) | * | TCA | |
| ADA PØ | (5) | * | ADA PØ | |
| SAP *+2 | (33) | * | SAP *+2 | |
| JMP label 2 | (56) | * | JMP label 2 | |
| | label 2 IN RANGE | | LDA label 1 | * |
| | | | SZA *+2 | * |
| | | | SAP label 2 | * |
| | label 2 OUT OF RANGE | | LDA label 1 | * |
| | | | SZA *+3 | * |
| | | | SAM *+2 | * |
| | | | JMP label 2 | * |
| LDA PØ | (1) | * | LDA PØ | |
| TCA | (20) | * | TCA | |
| ADA label 1 | (5) | * | ADA label 1 | |
| SAM *+2 | (86) | * | SAM *+2 | |
| JMP label 2 | (56) | * | JMP label 2 | |
| | label 2 IN RANGE | | LDA label 1 | * |
| | | | SAP label 2 | * |
| | label 2 OUT OF RANGE | | LDA label 1 | * |
| | | | SAM *+2 | * |
| | | | JMP label 2 | * |

FIG 158D

```
                          OPCODE
  INPUT                 INDENTIFIER              OUTPUT

     LDA  PØ                (1)          *        LDA  PØ
     CPA  label1            (93)         *        CPA  label1
     JMP  *+2               (105)        *        JMP  *+2
     JMP  label 2           (56)         *        JMP  label 2
                                                { LDA  label 1   *
                  label 2 IN RANGE              { RZA  label 2   *

                                                { LDA  label 1   *
                  label 2 OUT OF RANGE          { SZA  * +2      *
                                                { JMP  label 2   *

THESE OPTIMIZATIONS AFFECT THE CONTENTS OF THE A-REGISTER.

     LDA  B                 (1)          *        LDA  B
     RZA  *+2               (124)        *        RZA  *+2
     JMP  label1            (56)         *        JMP  label1
     JMP  label 2           (56)         *        JMP  label 2
label1  EQU *               (71)         *abel1   EQU  *
                  label 2 IN RANGE                RZB  label 2   *

     LDA  B                 (1)          *        LDA  B
     RLA  *+2               (131)        *        RLA  *+2
     JMP  label1            (56)         *        JMP  label1
     JMP  label 2           (56)         *        JMP  label 2
label 1 EQU *               (71)         *abel1   EQU  *
                  label 2 IN RANGE                RLB  label2    *
```

FIG 158E

| | INPUT | OPCODE INDENTIFIER | | | OUTPUT | |
|---|---|---|---|---|---|---|
| | LDA B | (1) | * | | LDA B | |
| | RZA *+2 | (124) | * | | RZA *+2 | |
| | JMP label1 | (56) | * | | JMP label1 | |
| | JMP label 2 | (56) | * | | JMP label 2 | |
| label1 | EQU * | (71) | | | | |
| | | | | | SZB *+2 | * |
| | | label 2 OUT OF RANGE | | | JMP label 2 | * |
| | | | | *abel 1 | EQU * | |
| | LDA B | (1) | * | | LDA B | |
| | RLA *+2 | (131) | * | | RLA *+2 | |
| | JMP label1 | (56) | * | | JMP label1 | |
| | JMP label 2 | (56) | * | | JMP label 2 | |
| label1 | EQU * | (71) | | *abel 1 | EQU * | |
| | | label 2 OUT OF RANGE | | { | SLB *+2 | * |
| | | | | | JMP label 2 | * |
| | LDA B | (1) | * | | LDA B | |
| | RZA *+2 | (124) | * | | RZA *+2 | |
| | JMP label 1 | (56) | * | | JMP label1 | |
| | | label 1 IN RANGE | | | SZB label 1 | * |
| | LDA B | (1) | * | | LDA B | |
| | RLA *+2 | (131) | * | | RLA *+2 | |
| | JMP label1 | (56) | * | | JMP label 1 | |
| | | label 1 IN RANGE | | | SLB label 1 | * |

FIG 158F

| BLOCK 1 ADDRESS | |
|---|---|
| 40 | BPAG2 |
| 1000 | OS |
| 4400 | USERP |
| 12000 | STDKYBD |
| 12524 | CRTL1C |
| 13001 | CRTL2C |
| 15113 | CRTL3C |
| 15541 | CRTL4C |
| 15700 | UDKL1C |
| 16217 | UDKL2C |
| 17442 | UDKL3C |
| 20576 | UDKL4C |
| 21147 | SLKEY |
| 21623 | PPOUT |
| 24352 | PPUMM |
| 33461 | TACO |
| 35646 | PRINT |
| 40051 | PUSG |
| 42524 | UTIL |
| 43334 | MMSAVE |
| 45436 | GPIODMA |
| 46000 | |
| 66000 | UTIL |
| 67543 | USERP |
| 67000 | OS |
| 67777 | |

BLOCK 1 ROM MAP

FIG 159

| | CODE | LISTING REFERENCE |
|---|---|---|
| SYNTAX & EXECUTE | 160XXX | SEXID |
| INPUT | 110XXX | INPID |
| KEYBOARD COMMAND | 100XXX | CMTYP |
| RUN | 170XXX | RUNID |
| PROGRAM I/O | 120XXX | PIOID |
| MESSAGE | 20XXX | MGTYP |
| KEYBOARD PRINT ALL | 140XXX | KBPAL |

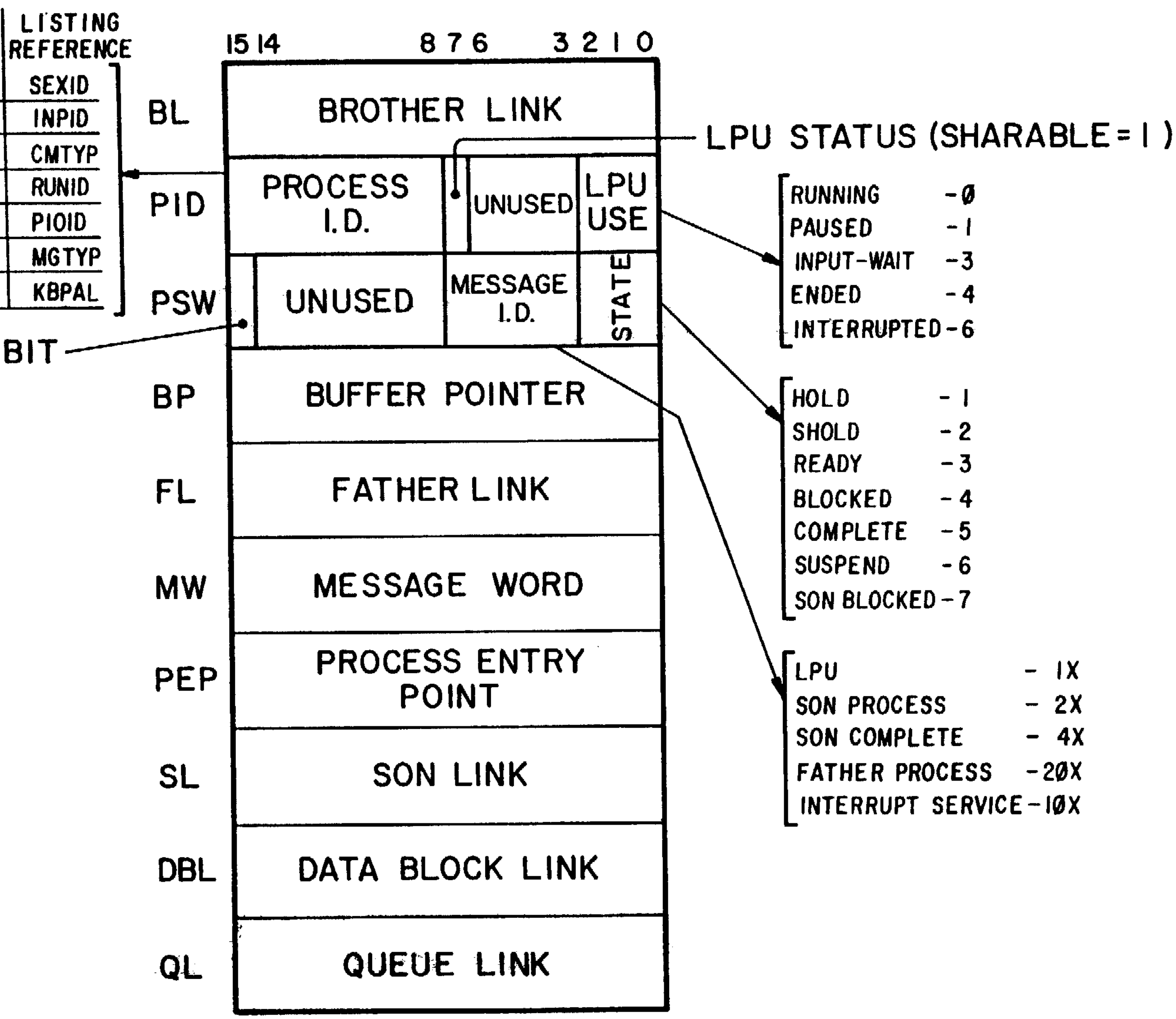

PROCESS CONTROL BLOCK (PCB)

LISTING REFERENCE

PCB(BL) OR $PCB
PCB(PID) OR $IDPTR
PCB(PSW) OR $SWPTR
PCB(BP) OR $BPPTR
PCB(FL) OR $FLPTR
PCB(MW) OR $MWPTR
PCB(PEP) OR $EPPTR
PCB(SL) OR $SLPTR
PCB(DBL) OR $DLPTR
PCB(QL) OR $QLPTR

FIG 160

PROCESS TREE EXAMPLE

| KEYBOARD ENTRY | PPU TO LPU MESSAGES | LPU TO PPU MESSAGES(CODE) |
|---|---|---|
| 2+2-EXECUTE | SYNTAX & EXECUTE (5) | RUNNING (2)<br>START COMMAND (5)<br>ENDED (-2) |
| 1/-EXECUTE | SYNTAX & EXECUTE (5) | MESSAGE (1)<br>ERROR (-1) |
| RUN 1Ø-EXECUTE | SYNTAX & EXECUTE (5) | RUNNING (2)<br>START COMMAND(5)<br>ENDED (-2) |

THIS IS A FUNCTIONAL DESCRIPTION OF LINES 309 THROUGH 586 OF THE LPU FILE KNOWN AS LPUEX

THIS FIGURE SHOWS THE RELATIVE LOCATIONS IN BLOCK Ø R/W MEMORY OF ITS MAJOR SUBDIVISIONS. MEMORY USAGE IS NOT DEPICTED IN ACCURATE PROPORTION.

THIS FIGURE SHOWS THE MAJOR AREAS OF SYSTEM STOLEN R/W MEMORY. MEMORY USAGE IS NOT DEPICTED IN ACCURATE PROPORTION.

THIS FIGURE SHOWS THE RELATION BETWEEN LPU SOURCE FILE NAMES AND THE BLOCK 3 ROM ADDRESS SPACE WHICH THEY REPRESENT. MEMORY USAGE IS NOT DEPICTED IN ACCURATE PROPORTION.

PRIMARY KEYWORD FORMAT

| | | |
|---|---|---|
| A PRERUN BIT | Ø | NO PRERUN |
| | 1 | HAS PRERUN |
| B STATEMENT BIT | Ø | CAN BE A STATEMENT |
| | 1 | CANNOT BE A STATEMENT |
| C COMMAND BIT | Ø | CAN BE A COMMAND |
| | 1 | CANNOT BE A COMMAND |
| D IF BIT | Ø | CAN BE IN THE THEN PART OF IF |
| | 1 | CANNOT BE IN THE THEN PART OF IF |

LINE FORMATS (EXAMPLES)

MAIN SYSTEM, NO LABEL, COMMENT

| | | |
|---|---|---|
| A | LINE # | |
| B | | C |
| Ø | EXECUTION ADDRESS OF STATEMENT | |
| DATA FOR STATEMENT | | |
| EOL EXECUTION ADDRESS | | |
| COMMENT IN REM FORMAT | | |

OPTION, LABEL, NO COMMENT

| | | |
|---|---|---|
| A | LINE # | |
| B | | C |
| I | SYMBOL TABLE OFFSET OF LABEL | |
| Ø | STATEMENT POLICEMAN | |
| Ø | EXECUTION ADDRESS OF STATEMENT | |
| DATA FOR STATEMENT | | |
| EOL EXECUTION ADDRESS | | |

A-SECURE BIT
Ø-LINE NOT SECURED
I-LINE SECURED

B-(8 BITS)-COLUMN POSITION IN SOURCE OF FIRST CHAR OF PRIMARY KEYWORD

C-(8 BITS)-# WORDS IN LINE

FIG 179

EDIT STATEMENT EXECUTION

THIS IS A FUNCTIONAL DESCRIPTION OF LINES 242 THROUGH 815 OF THE LPU FILE KNOWN AS INPUT AS IT RELATES SPECIFICALLY TO THE EDIT STATEMENT.

INTERNAL CODE FOR EXPRESSIONS (EXAMPLE)

A=B+C

| | |
|---|---|
| Ø | ADDRESS OF ADDITION ROUTINE |
| 1 | SYMBOL TABLE OFFSET OF B |
| 1 | SYMBOL TABLE OFFSET OF C |
| Ø | ADDRESS OF NUMERIC ASSIGNMENT ROUTINE |
| 1 | SYMBOL TABLE OFFSET OF A |
| Ø | POINTER TO FIRST TEMP ON TEMP STACK |
| Ø | ADDRESS OF EOL ROUTINE |

FIG 183

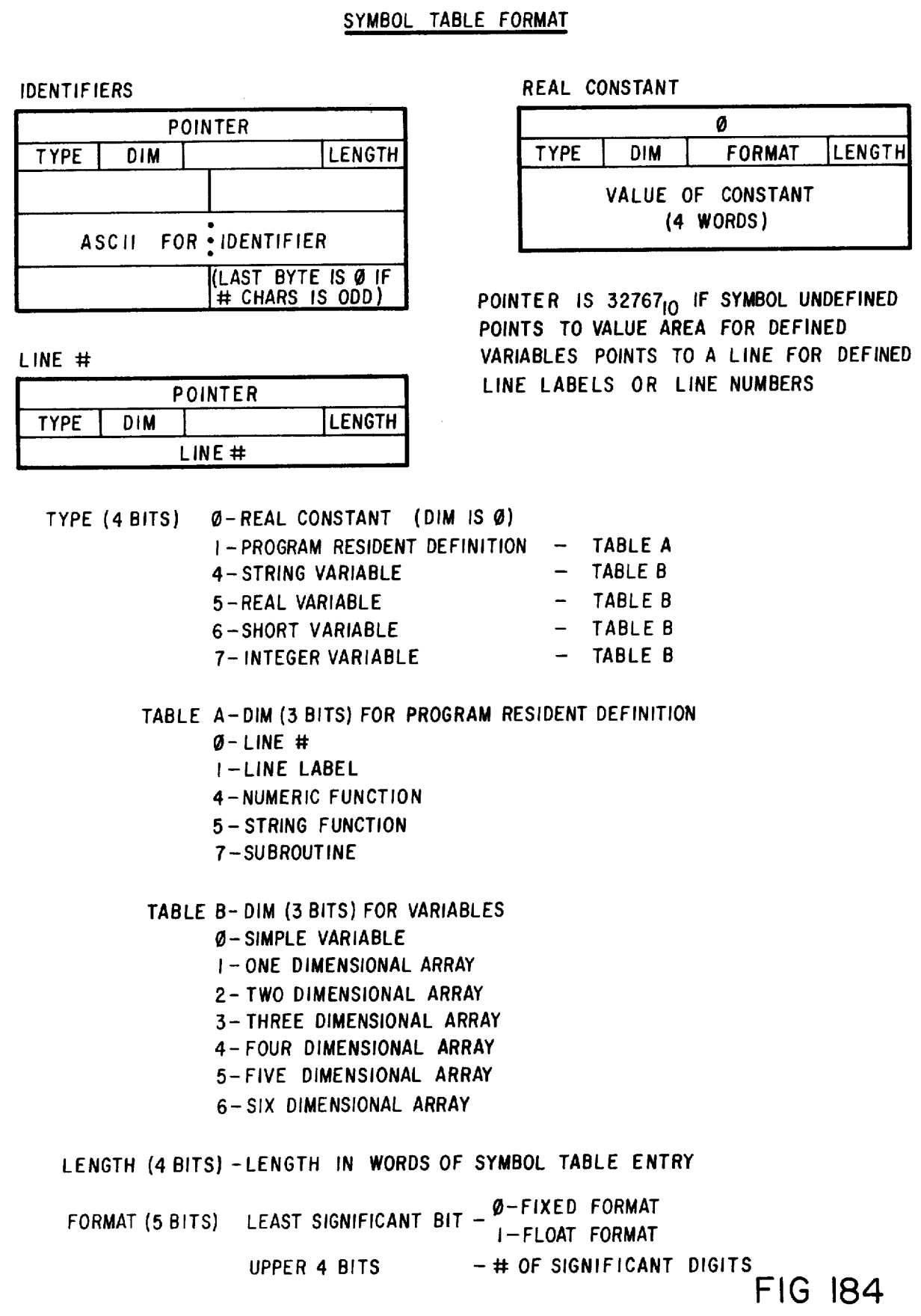

SYMBOL TABLE FORMAT

IDENTIFIERS

| | | | |
|---|---|---|---|
| POINTER | | | |
| TYPE | DIM | | LENGTH |
| | | | |
| ASCII FOR : IDENTIFIER | | | |
| | | (LAST BYTE IS Ø IF # CHARS IS ODD) | |

LINE #

| | | | |
|---|---|---|---|
| POINTER | | | |
| TYPE | DIM | | LENGTH |
| LINE # | | | |

REAL CONSTANT

| | | | |
|---|---|---|---|
| Ø | | | |
| TYPE | DIM | FORMAT | LENGTH |
| VALUE OF CONSTANT (4 WORDS) | | | |

POINTER IS $32767_{10}$ IF SYMBOL UNDEFINED POINTS TO VALUE AREA FOR DEFINED VARIABLES POINTS TO A LINE FOR DEFINED LINE LABELS OR LINE NUMBERS

TYPE (4 BITS)
- Ø-REAL CONSTANT (DIM IS Ø)
- 1-PROGRAM RESIDENT DEFINITION — TABLE A
- 4-STRING VARIABLE — TABLE B
- 5-REAL VARIABLE — TABLE B
- 6-SHORT VARIABLE — TABLE B
- 7-INTEGER VARIABLE — TABLE B

TABLE A-DIM (3 BITS) FOR PROGRAM RESIDENT DEFINITION
- Ø-LINE #
- 1-LINE LABEL
- 4-NUMERIC FUNCTION
- 5-STRING FUNCTION
- 7-SUBROUTINE

TABLE B-DIM (3 BITS) FOR VARIABLES
- Ø-SIMPLE VARIABLE
- 1-ONE DIMENSIONAL ARRAY
- 2-TWO DIMENSIONAL ARRAY
- 3-THREE DIMENSIONAL ARRAY
- 4-FOUR DIMENSIONAL ARRAY
- 5-FIVE DIMENSIONAL ARRAY
- 6-SIX DIMENSIONAL ARRAY

LENGTH (4 BITS) - LENGTH IN WORDS OF SYMBOL TABLE ENTRY

FORMAT (5 BITS)
- LEAST SIGNIFICANT BIT — Ø-FIXED FORMAT / 1-FLOAT FORMAT
- UPPER 4 BITS — # OF SIGNIFICANT DIGITS

FIG 184

"ON" STATEMENT TABLE STRUCTURE

*OFFSET FROM BEGINNING OF TABLE (IN WORDS)

ALLOCATION OF ENTRIES

| TYPE | WORDS |
|---|---|
| ON KEY# (32) | 0-63 |
| ON INT# (15) | 64-93 |
| ON END# (10) | 94-113 |

UNDEF/GOTO/GOSUB/CALL FIELD

| | |
|---|---|
| 00 | UNDEFINED (NEVER DEFINED) |
| 01 | CALL |
| 10 | GOTO |
| 11 | GOSUB |

THERMAL PRINTER PAPER TRANSPORT AND PRINTHEAD ASSEMBLIES

SECTIONAL VIEW OF THE PRINTER MECHANISM

EXPLODED VIEW OF THE PRINTHEAD

THIS IMPLEMENTATION ALLOWS THE CONTROLLER TO CAUSE THE HEATER TO GET TO 340°C USING ALL AVAILABLE POWER AND TO KEEP IT THERE TO WITHIN 5°C FOR 4MS.

WORKABLE IMPLEMENTATION OF THE BURN MODULATOR

EXAGGERATED WAVEFORMS INDICATING THE VARYING DUTY CYCLE.

NANO PROCESSOR BLOCK DIAGRAM

DIRECT CONTROL I/O STRUCTURE

NANO PROCESSOR PIN OUT

| PAPER ROW | ROM ROW |
|---|---|
| 1,2,10,11,12 | Ø |
| 3,10 | 1 |
| 4,11 | 3 |
| 5 | 2 |
| 6 | 6 |
| 7 | 7 |
| 8 | 5 |
| 9 | 4 |

RAM STORAGE ALLOCATION

TIME INTERRUPT SERVICE SUBROUTINE "STATE" DIAGRAM

THE TIME ARROWS TA, TB, TC, ETC. SHOWN AT RIGHT REPRESENT THE PHYSICAL TIME BETWEEN INTERRUPTS FROM THE TIMER WHICH IS TIMING THE DESIRED TIME INTERVAL, OF COURSE, THE MAIN PROGRAM IS RUNNING AND IS CONTINUING TO PROCESS DATA DURING THESE TIME INTERVALS.

IF 32<R5<48 THEN
TJ=6.464 ms

IF R5>48 THEN
TK=6.976 ms

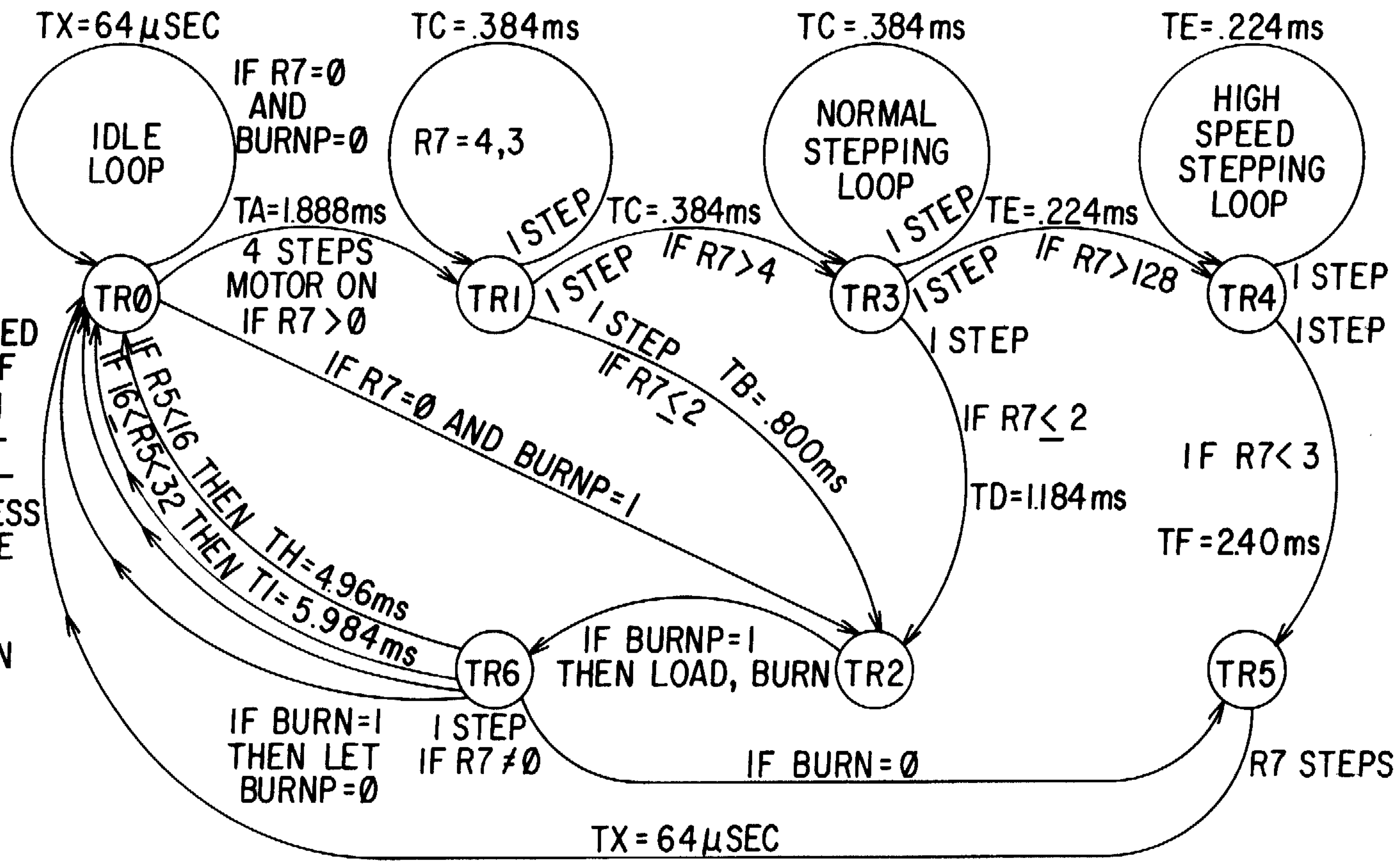

BURNP=BURN PENDING BIT WHICH IS SET BY MAIN PROGRAM WHEN DOTS ARE READY TO BURN
BURN=BURN SIGNAL TO HEAD LOAD=LOAD SIGNAL TO HEAD TO LATCH DOTS
R7=REGISTER USED TO STORE NUMBER OF STEPS TO TAKE, IS INCREMENTED BY ROWS SUBROUTINE AND DECREMENTED BY THIS TIME SUBROUTINE
R5=REGISTER USED TO COUNT THE NUMBER OF DOTS TO BE BURNED

FIG 209

THE BITS SHOWN IN WORD 0 CORRESPOND TO THE BIT ADDRESS USED FOR GRAPHIC LOAD OPERATIONS. FOR MASS TRANSFER OPERATIONS THE LEFT MOST DOT IS THE MSB OF THE DATA WORD, AND THE RIGHT MOST DOT IS IN THE LSB.

GRAPHIC MEMORY ADDRESS MAPPING ONTO THE CRT

D = DATA VALUE (1 ILLUMINATES, 0 ERASES)

WA RANGE: 0-16,383

BA RANGE: 0-15

GRAPHIC LOAD DATA FORMAT

PROGRAMMABLE CALCULATOR HAVING STRING VARIABLE EDITING CAPABILITY

BACKGROUND AND SUMMARY OF THE INVENTION

This invention relates generally to calculators and more particularly to programmable calculators that may be controlled both manually from the keyboard and automatically by means of a stored program.

Calculators constructed according to the prior art have generally been limited in functional capability due to restrictions imposed on the size of memory. To insulate the user from the complexities of standard computer operating systems that embody compile and load techniques, desk-top calculators have generally employed interpreters. While these calculators result in simplifying the user/machine interface, that result is achieved at the expense of increased memory consumption because the interpreter, the user's program, and the user's data must all occupy the same address space. This condition is aggravated by attempted language enhancements that require additional address space, thus robbing the user of more and more of his memory space. Various proposed solutions to this general problem of insufficient memory space, such as the use of virtual memory, have generally been expensive and complex and thus have not proven practical for incorporation in desk-top calculators. The calculator constructed according to the present invention solves this problem by employing a memory address extension scheme that provides a tremendous increment in available memory address space while permitting the use of standard off-the-shelf processors and memory components. This arrangement is advantageous over the mere expedient of increasing the number of address bits by some small number. Memory address extension, as employed in the present calculator, utterly removes the upper limit on the amount of available address space. This is accomplished by dividing the memory into a plurality of 32K word fifteen-bit address spaces called blocks, of which there may be as many as 64K. The calculator includes an operating system that automatically controls a memory address extension circuit to arbitrarily determine which two blocks represent the processor's native sixteen-bit address space. By that arrangement, those blocks of memory that are intended for storage of the user's program and data are preserved exclusively for the user in spite of the fact that additional memory is required to implement desired language enhancements.

Conventional calculators have also proven disadvantageous due to their relatively slow program execution. Attempts at solving this problem by merely increasing the speed of the processor have been met with various practical limitations such as memory cycle time. In order to increase program execution speed the present calculator employs direct memory addressing (DMA), an operating system that is structured to accomodate an interrupt system, I/O buffering, and a dual processor architecture that divides the operations performed by the calculator between two processors. As a result, the present calculator provides a high-speed Basic language interpreter that includes desirable language enhancements while providing the user with more read-write memory than heretofore available in desk-top calculators.

Among the language enhancement features made possible by the expanded memory of the present calculator are an editline mode capability for enhancing, particularly in conjunction with a CRT, editing and program entry operations, an edit statement that permits the editing of string variables under program control, a CRT display mode that is segmented in a manner which organizes the displayed information more usefully, program selectable serial and overlap modes of I/O operation, a group of control keys that enable the user to generate a pseudo-interrupt incorporating a priority scheme, program control of a live keyboard, multiple nondestructive, bidirectional recall of information entered from the keyboard, a CRT-to-printer dump mode that permits a dot-for-dot transfer of a graphics image appearing on the CRT to the printer, and the ability to modify stored programs during execution.

In addition, the calculator provides a number of advanced features that involve the thermal printer located within the calculator mainframe. A number of these features combine to provide quiet, high-speed printer operation while minimizing power consumption. For example, a single monolithic print head enhances dot-for-dot CRT-to-printer dump capability by providing printable dot positions within the normally blank space between adjacent characters.

Many other features of this invention will become apparent to those persons skilled in the art from an examination of the following detailed description and drawings.

DESCRIPTION OF THE DRAWINGS

A number of the drawing figures described below incorporate three levels of identification. Arabic numerals are used to indicate the figure number at the first level of identification, while the next level is indicated by upper case Roman letters. The third level of identification is indicated by lower case Roman letters. For example, the ninetieth figure comprises FIGS. 90A and 90B, while FIG. 90A is so partitioned. In the above example, note that since FIG. 90A comprises FIGS. 90A*a* and 90A*b*, there is no figure labelled as 90A** only.

In those more complex drawing figures wherein it is not obvious how the partitioning on a given level is assembled, a figure map is provided to indicate how the partitioned figures are spatially related. In the example cited above, it is not altogether obvious how FIGS. **90A*a* and 90A*b* are spatially related, so a figure map labelled as FIG. 90 has been provided to illustrate that relationship. Some figure maps relate only to a portion of the partitioned figures, as is the case in FIG. 95B. That figure is a map relating FIGS. 95B*a*, 95B*b*, 95B*c*, and 95B*d***.

Certain ones of the following figures are skeletal outlines of information presented in subsequent figures. These skeletal outlines are not to be confused with the conventional figure maps mentioned above. Each skeletal outline has its own figure number, and in some cases is itself partitioned. The content of each such skeletal figure represents an abstraction of the material in subsequent figures, rather than spatial placement data as to how those subsequent figures are to be assembled.

Finally, in many instances, both in this Description of the Drawings, as well as in the remainder of the specification, a reference to a given figure should be construed to pertain to the referenced level of identification, as well as to any levels into which that level has been partitioned. For example, a reference to FIG. 8 should be considered the same as a reference to FIGS. 8A and 8B, or to whatever other partitioned figures may be involved. References should not be generalized to adjacent segments of partitioning at the same level, nor should they be generalized to include higher levels. That is, a reference to FIG. 90B may be taken as a reference to FIGS. 90Ba and 90Bb, but not as a reference to FIG. 90A or to any of its partitioned segments, nor as a reference to FIG. 90.

Figure 1:
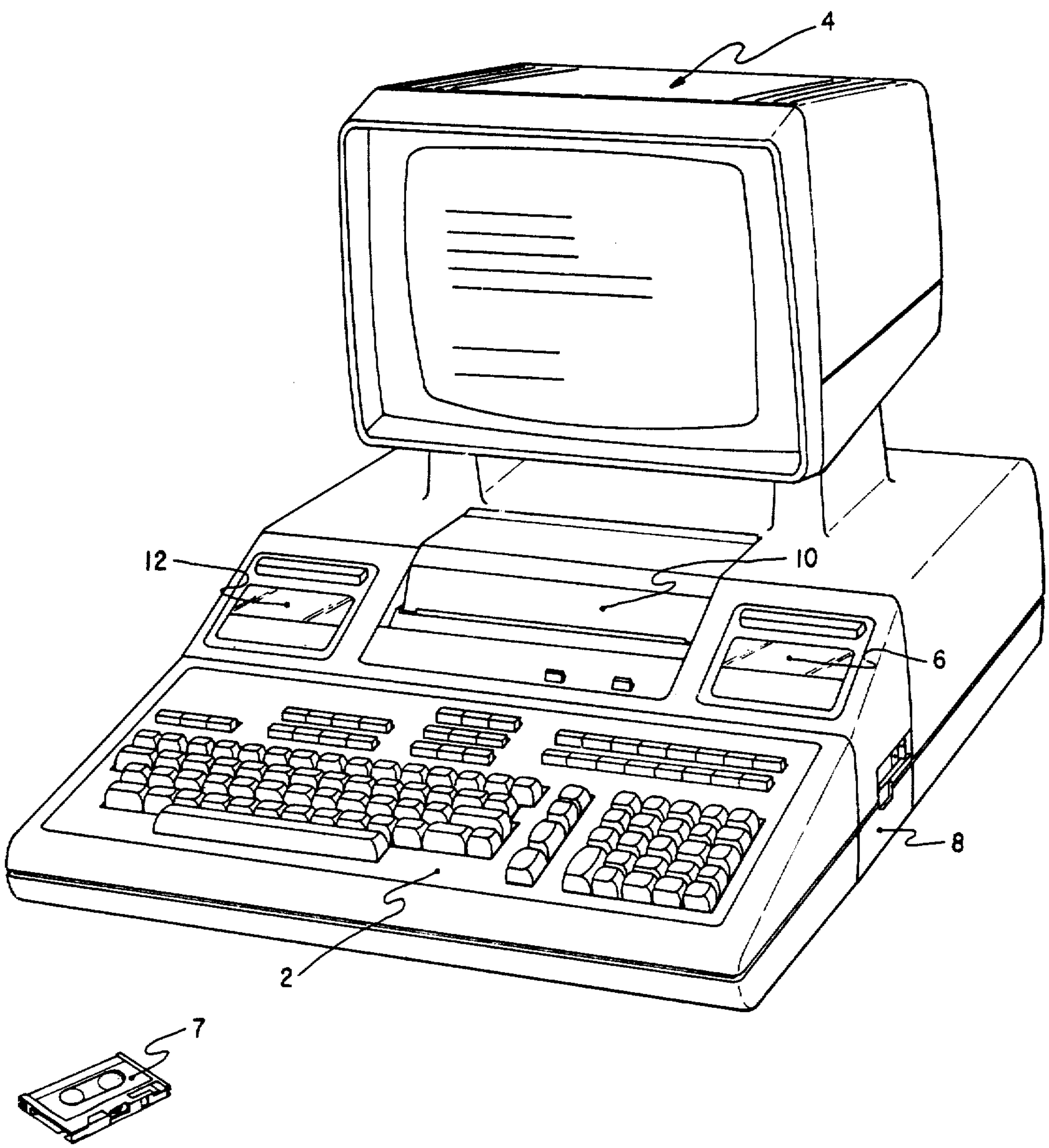

FIG. 1 is a front perspective view of a programmable calculator constructed according to the preferred embodiment of this invention.

Figure 2:
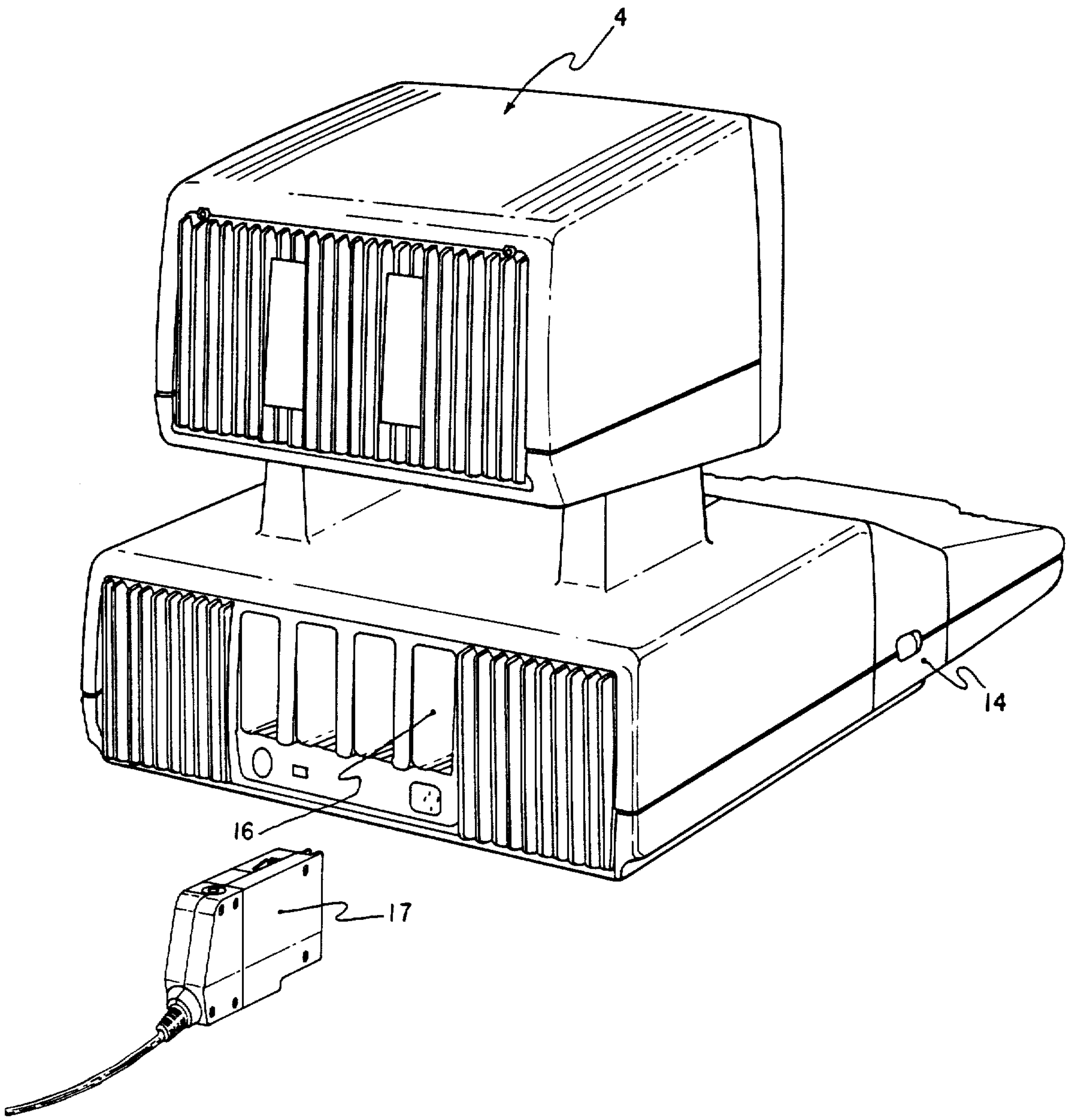

FIG. 2 is a rear perspective view of the programmabie calculator of FIG. 1.

Figure 3:
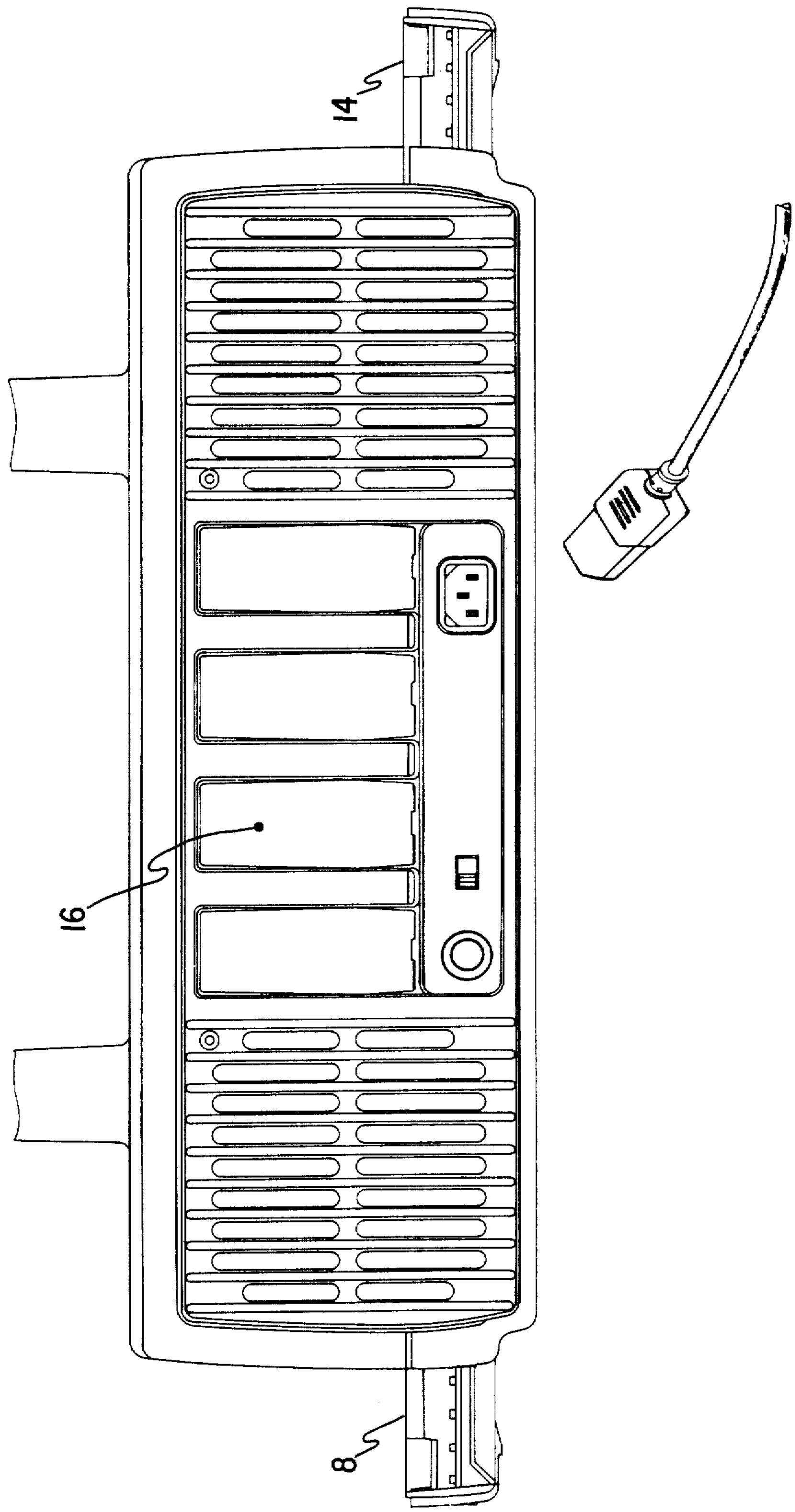

FIG. 3 is a rear elevational view of the programmable calculator of FIGS. 1 and 2.

Figure 4:
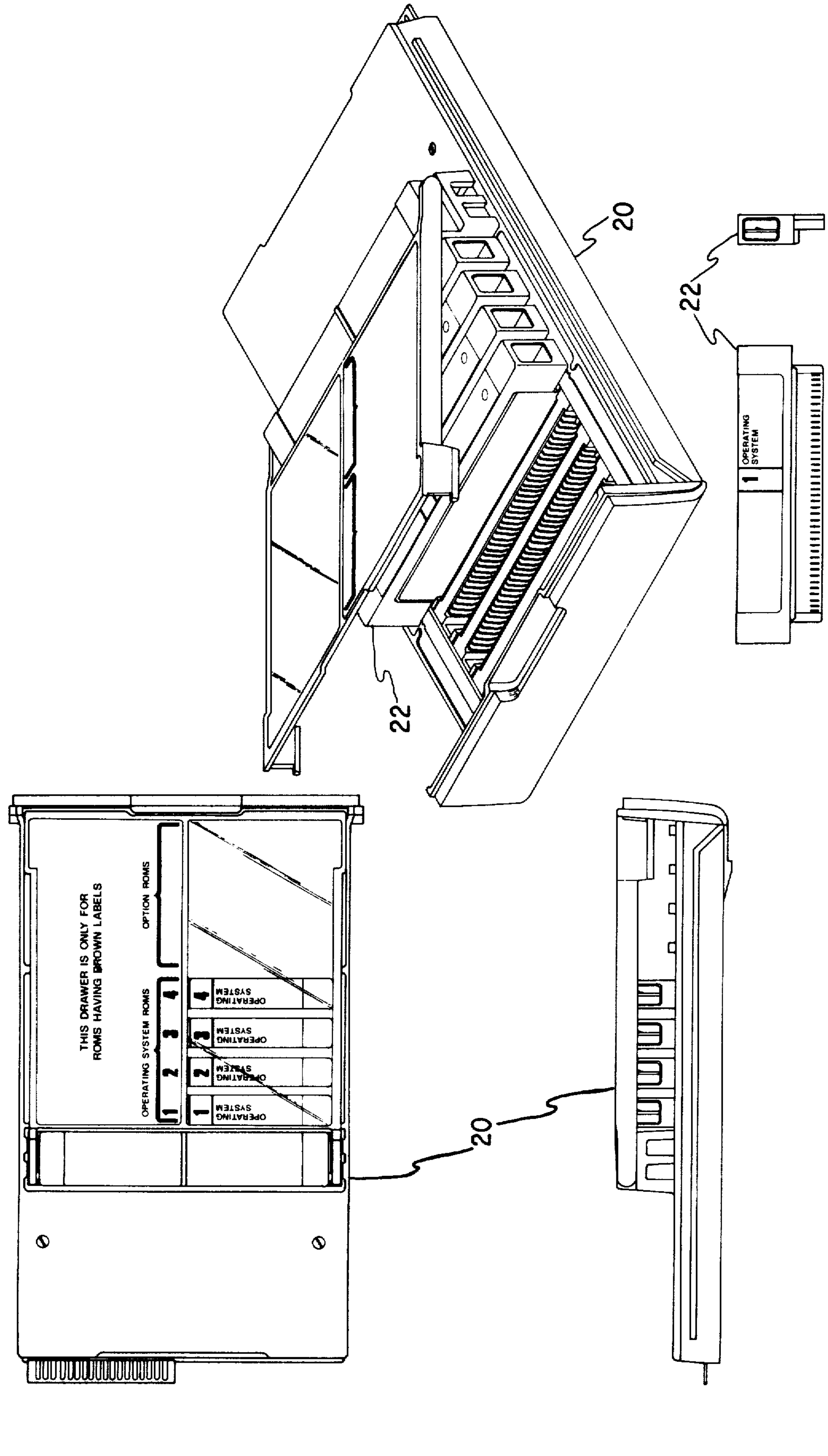

FIG. 4 is an illustration of the plug-in ROM drawers that may be employed in the calculator of FIGS. 1-3.

Figure 5:
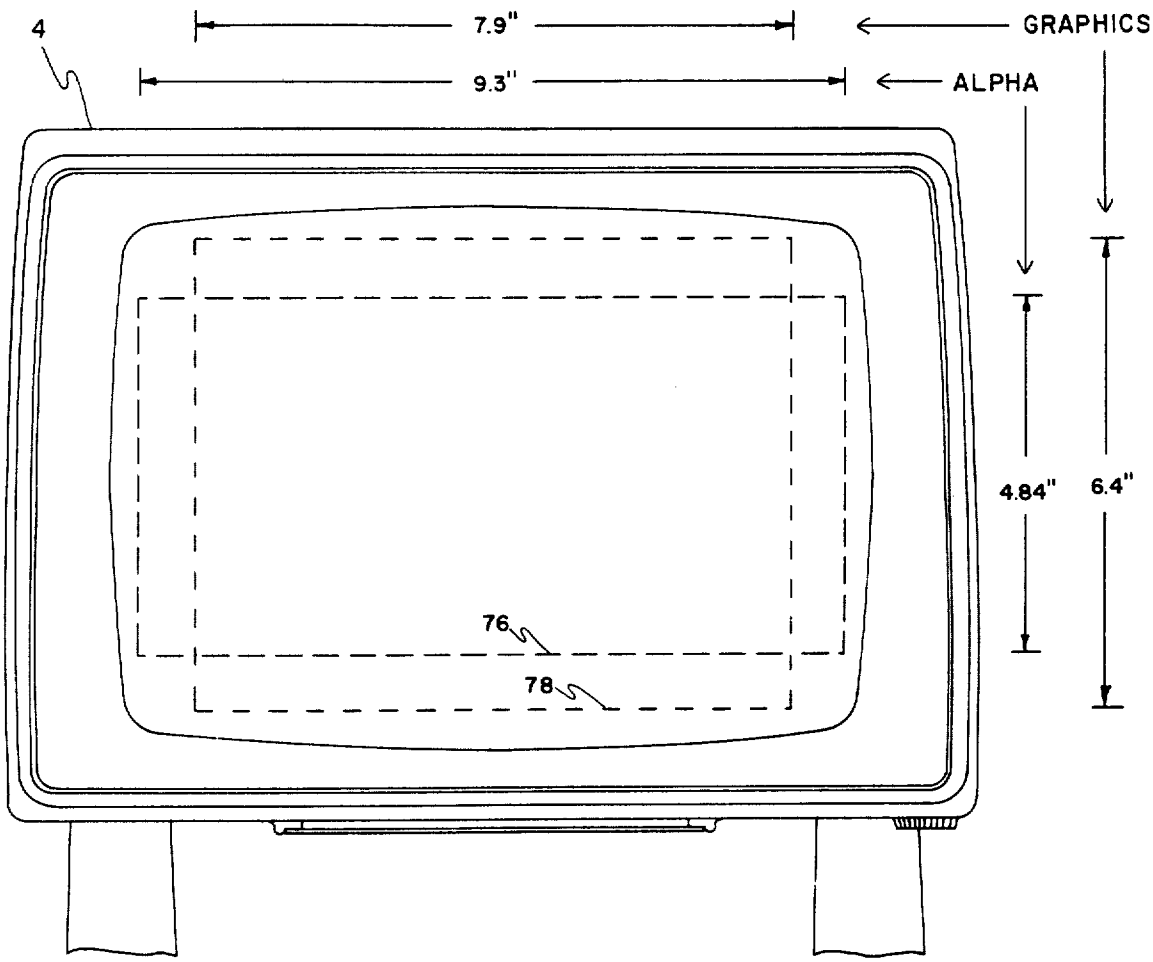

FIG. 5 is a diagram depicting the alpha mode and graphics mode rasters generated by the CRT in the calculator of FIG. 1.

Figure 6:
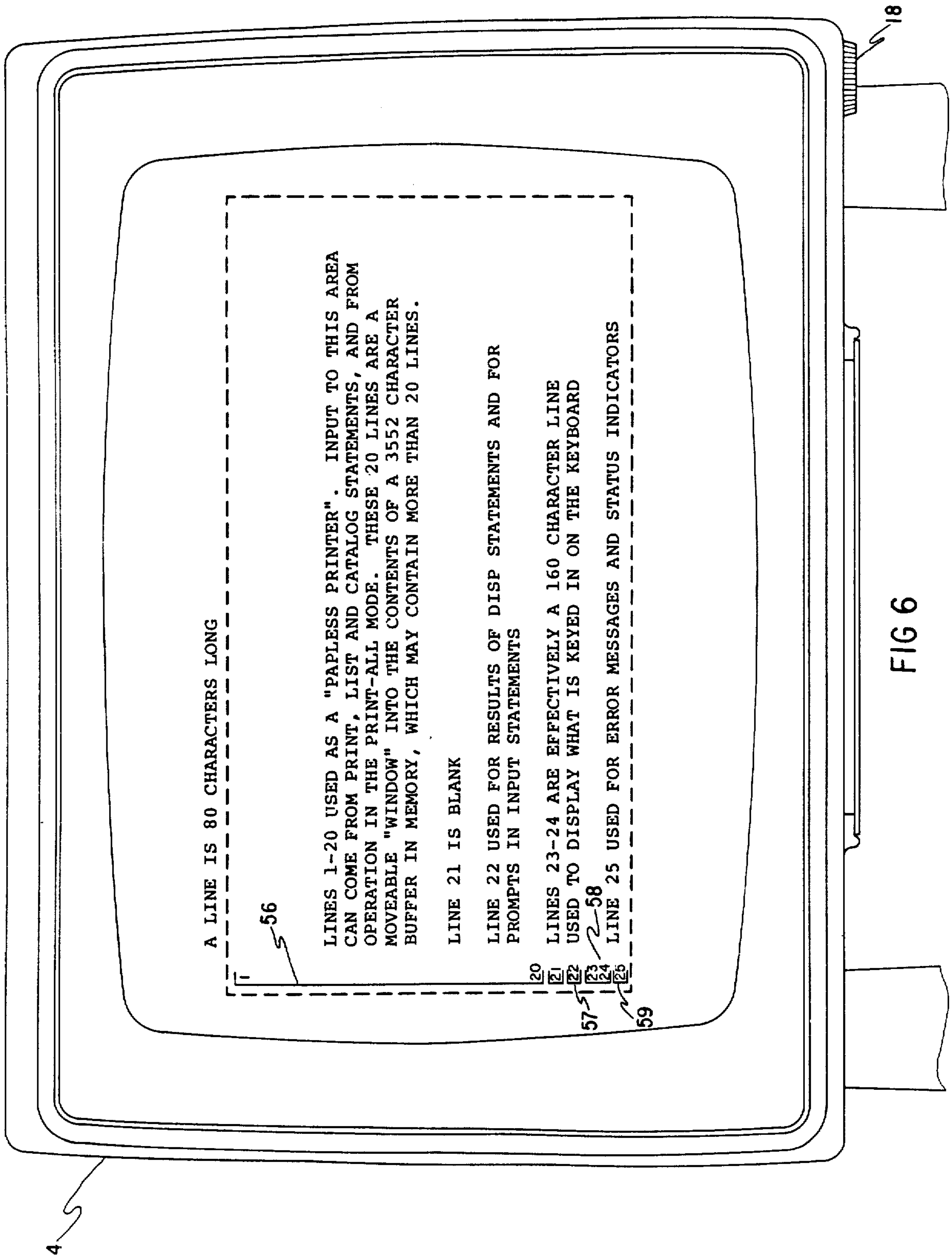

FIG. 6 is a diagram illustrating the normal information format within the alpha mode raster of FIG. 5.

Figure 7:
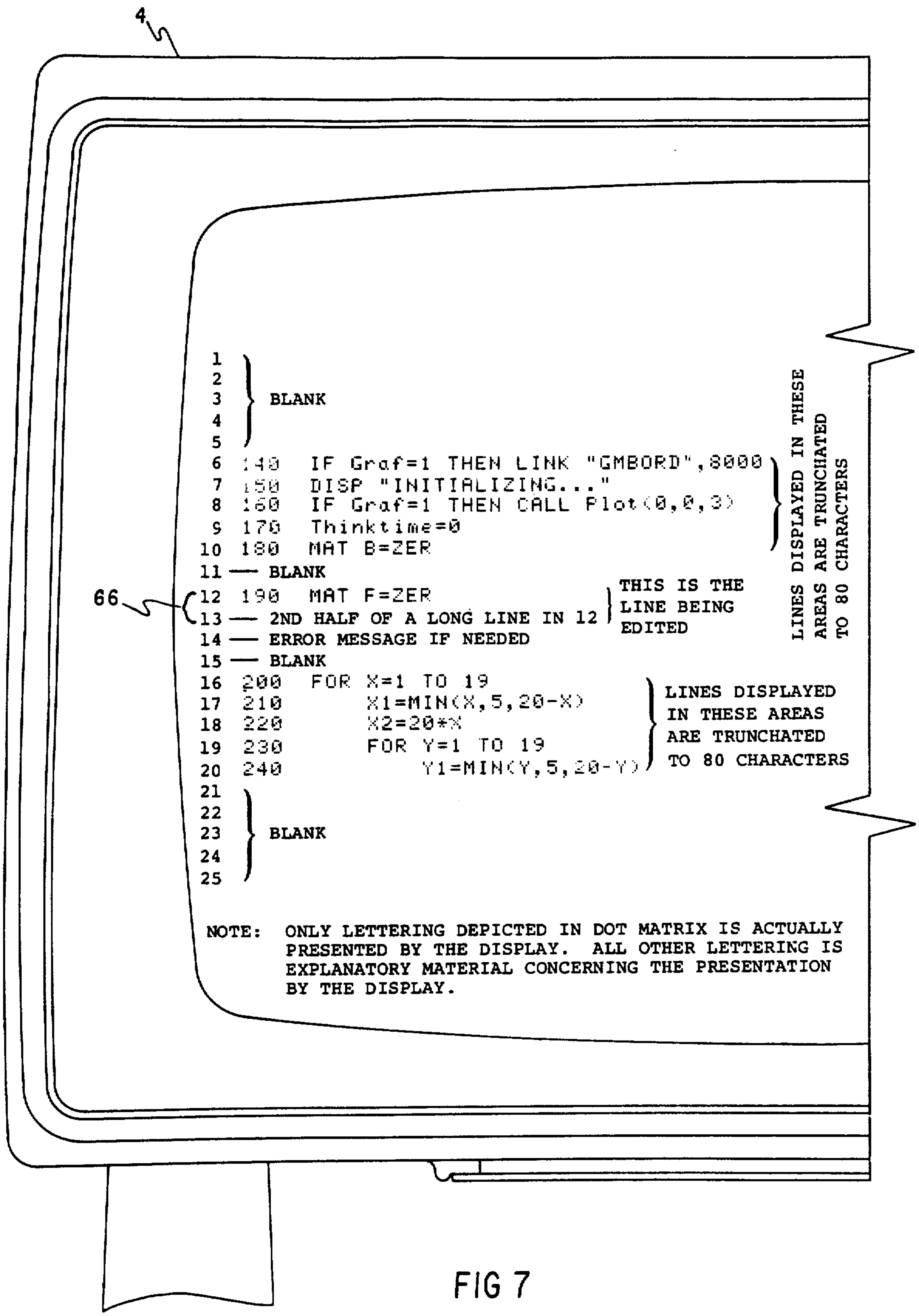

FIG. 7 is a diagram illustrating an alpha information format employed in the edit line sub-mode.

Figure 8A:
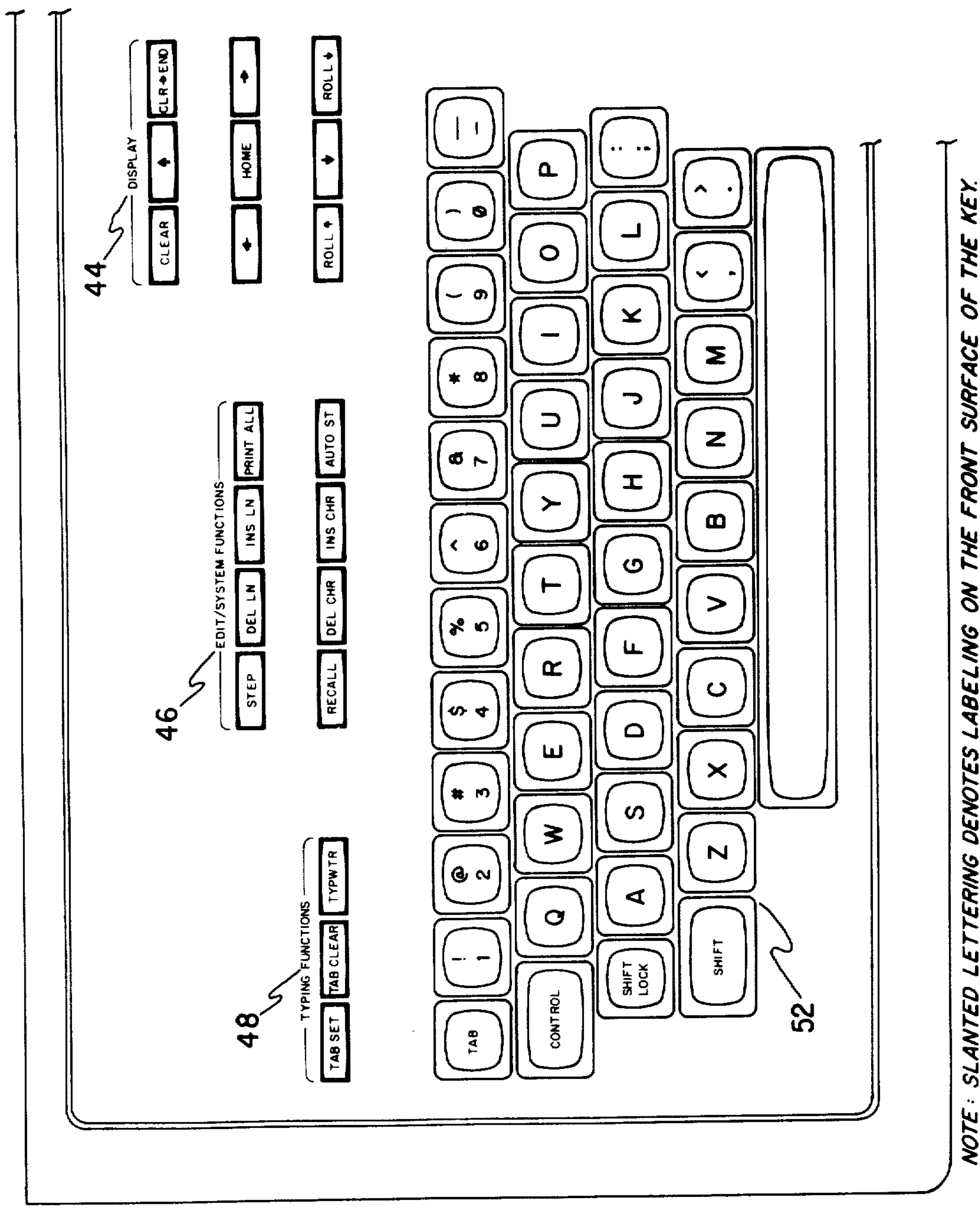
Figure 8B:
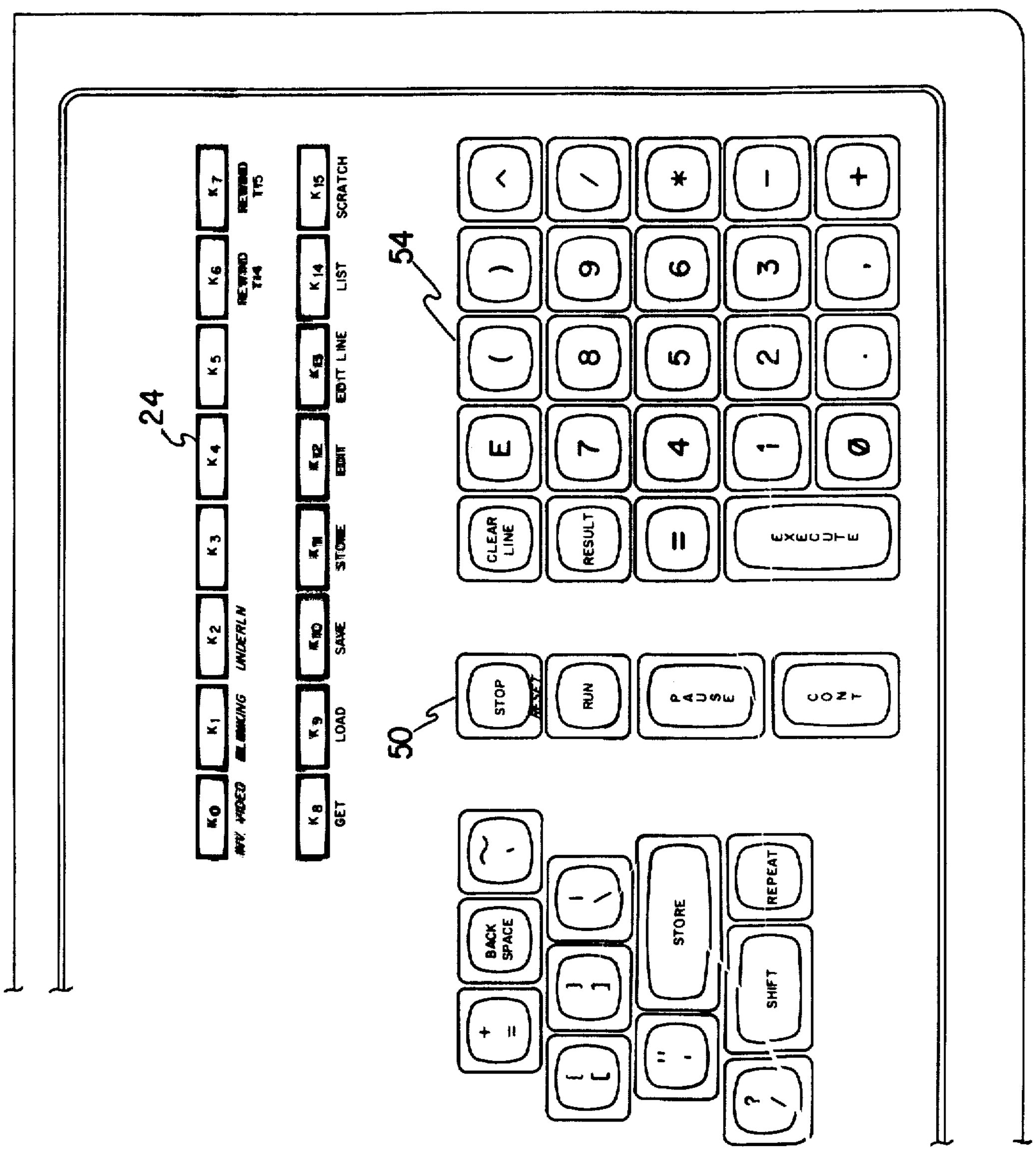

FIGS. 8A and 8B show a plan view of the keyboard input unit of the programmable calculator of FIG. 1.

Figure 9:
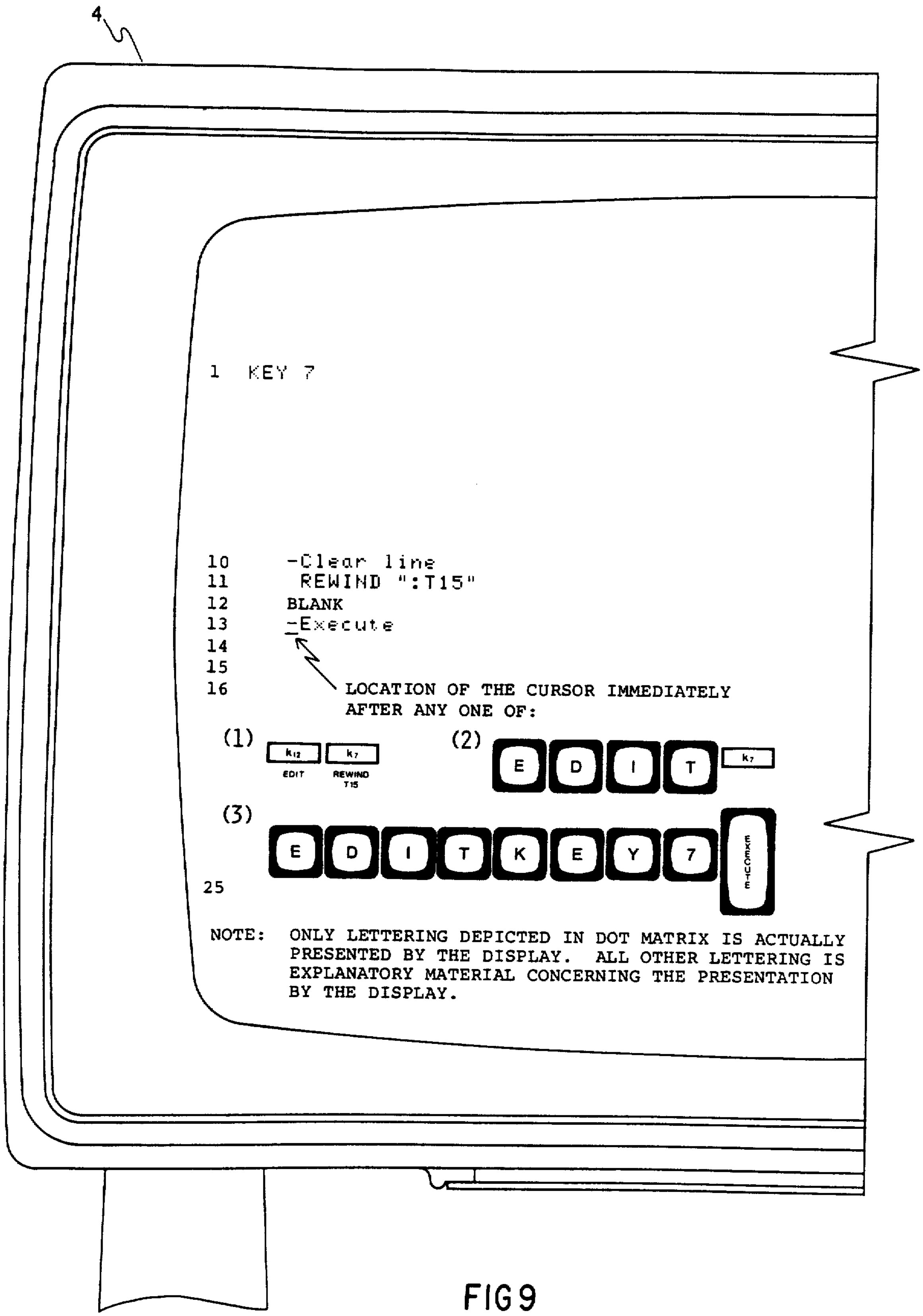

FIG. 9 is a diagram illustrating an alpha raster information format employed in connection with edit key operation.

Figure 10:
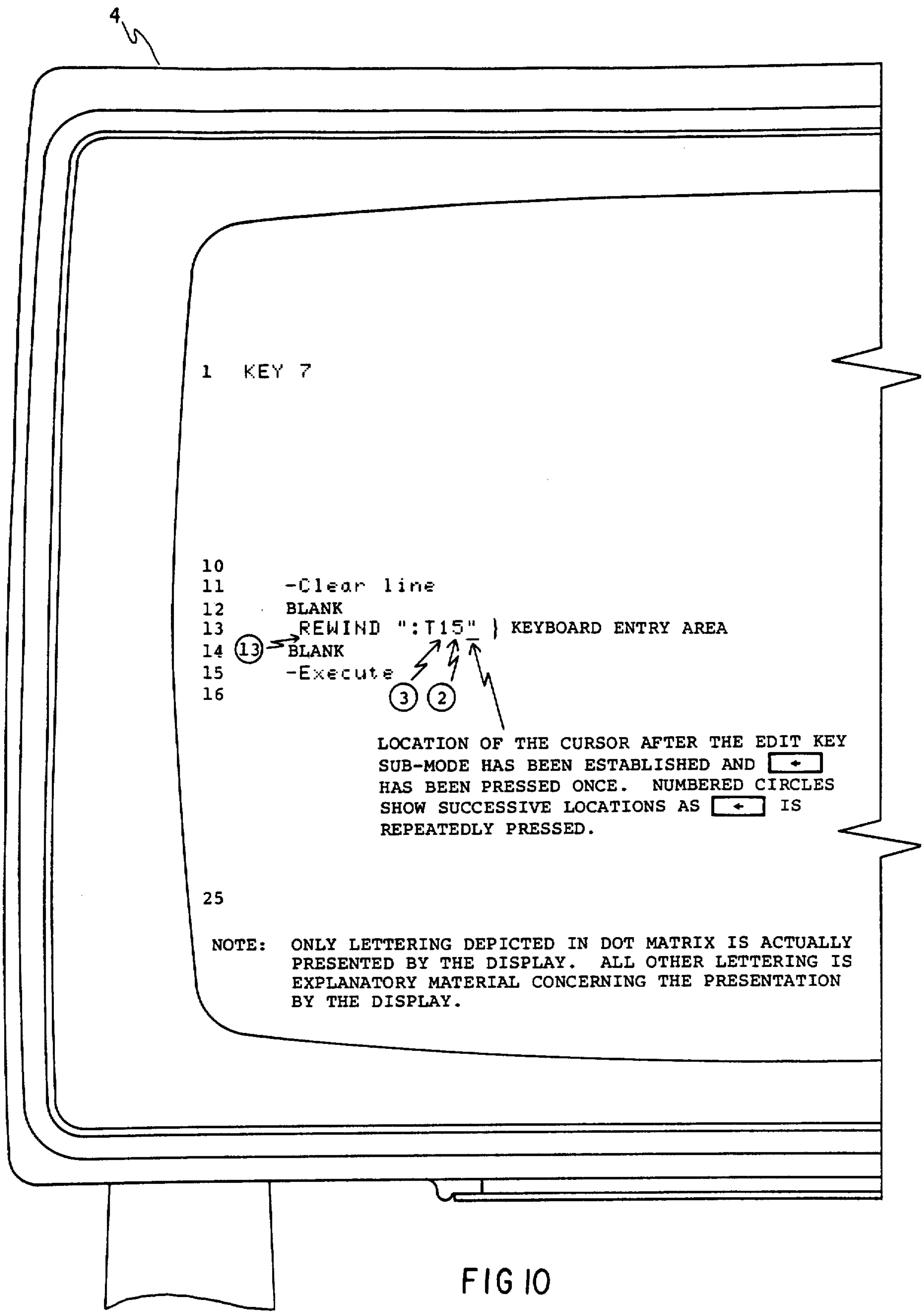
Figure 11:
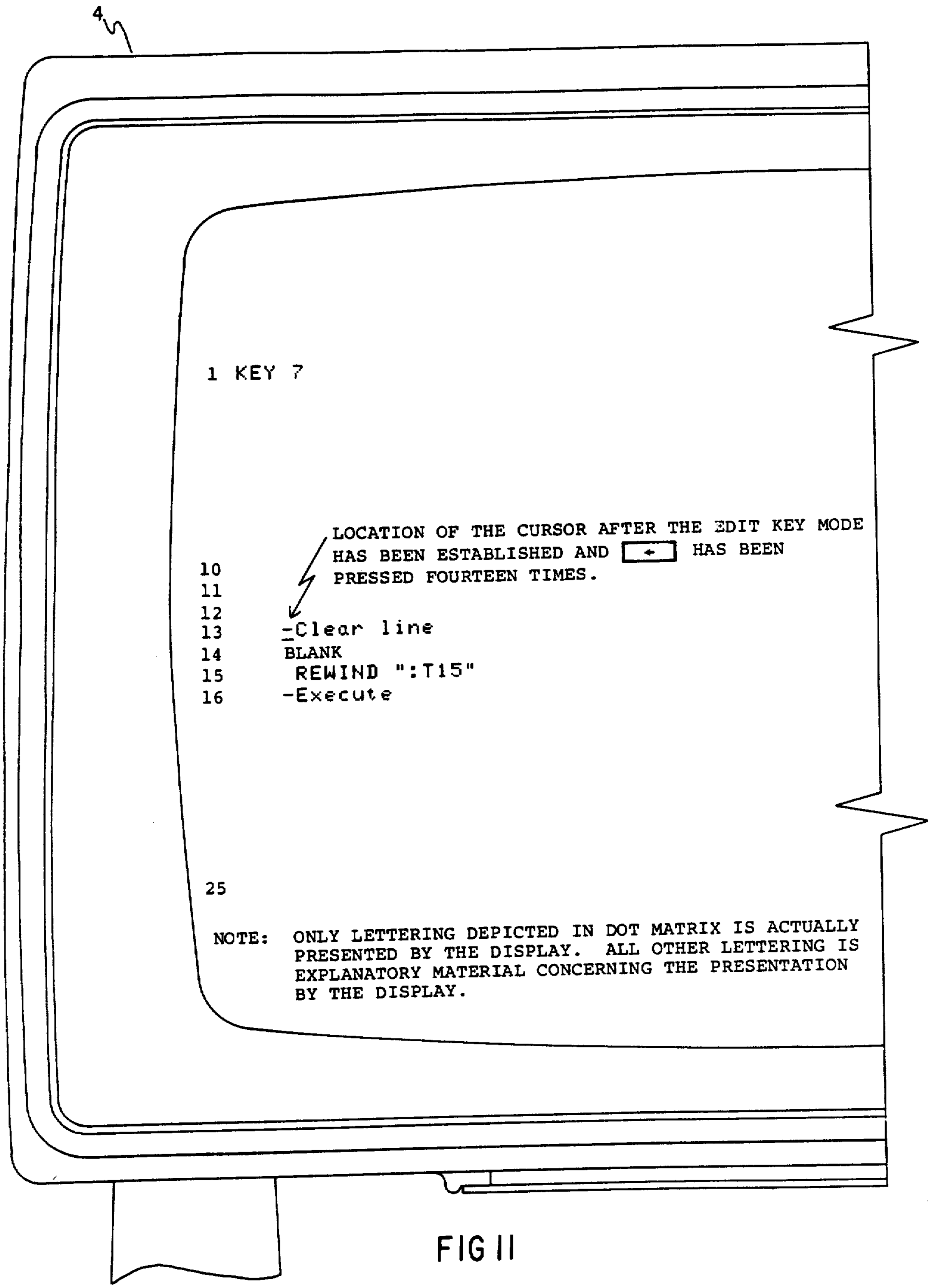

FIGS. 10 and 11 are diagrams illustrating additional aspects of the alpha raster information format depicted in FIG. 9.

FIGS. 12A and B show a listing of the initial definitions associated with the user-definable keys included in the keyboard of FIG. 8.

FIG. 13 is a tabular diagram of selected control codes associated with CRT character enhancement.

FIG. 14 is a tabular diagram illustrating selected characters of various alternate character sets obtained through use of a shift out control code.

FIGS. 15-21 are diagrams that illustrate various aspects of the file structure associated with the user of mass memory devices in connection with calculator operation.

Figure 22:
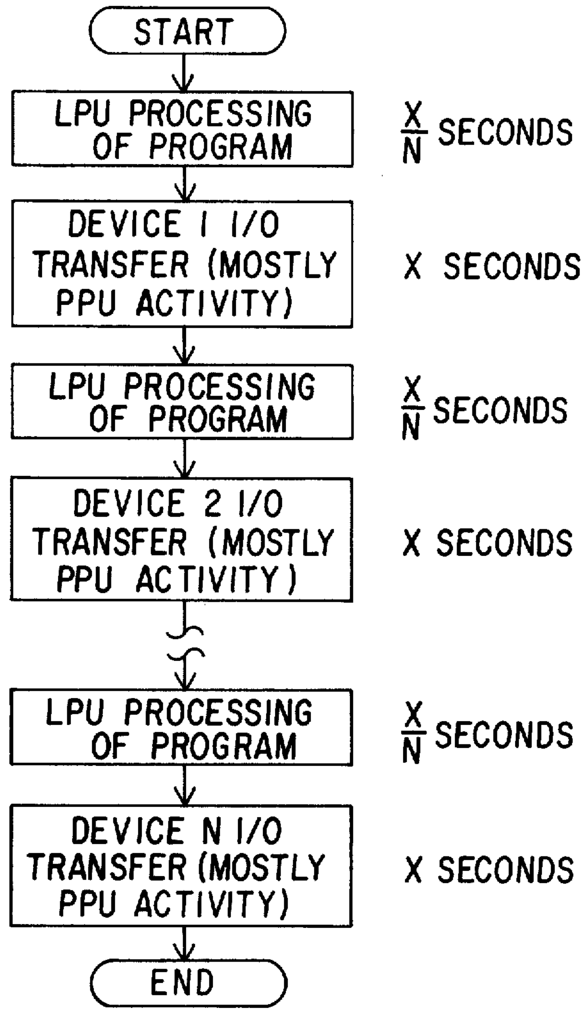

FIG. 22 is a flow chart illustrating the serial mode of I/O operation performed by the calculator of FIG. 1.

Figure 23:
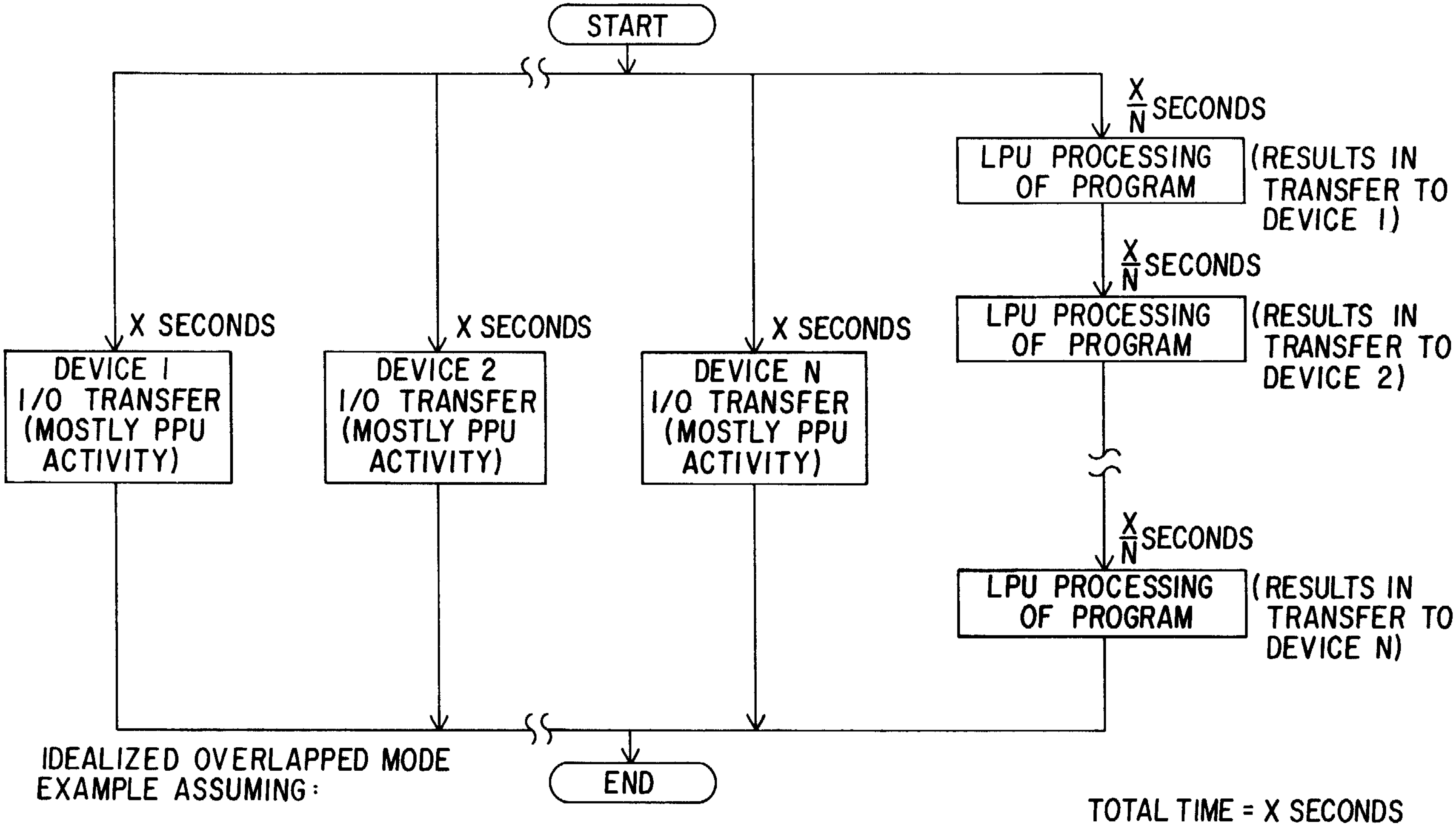

FIG. 23 is a flow chart illustrating the overlapped mode of I/O operation performed by the calculator of FIG. 1.

Figure 24:
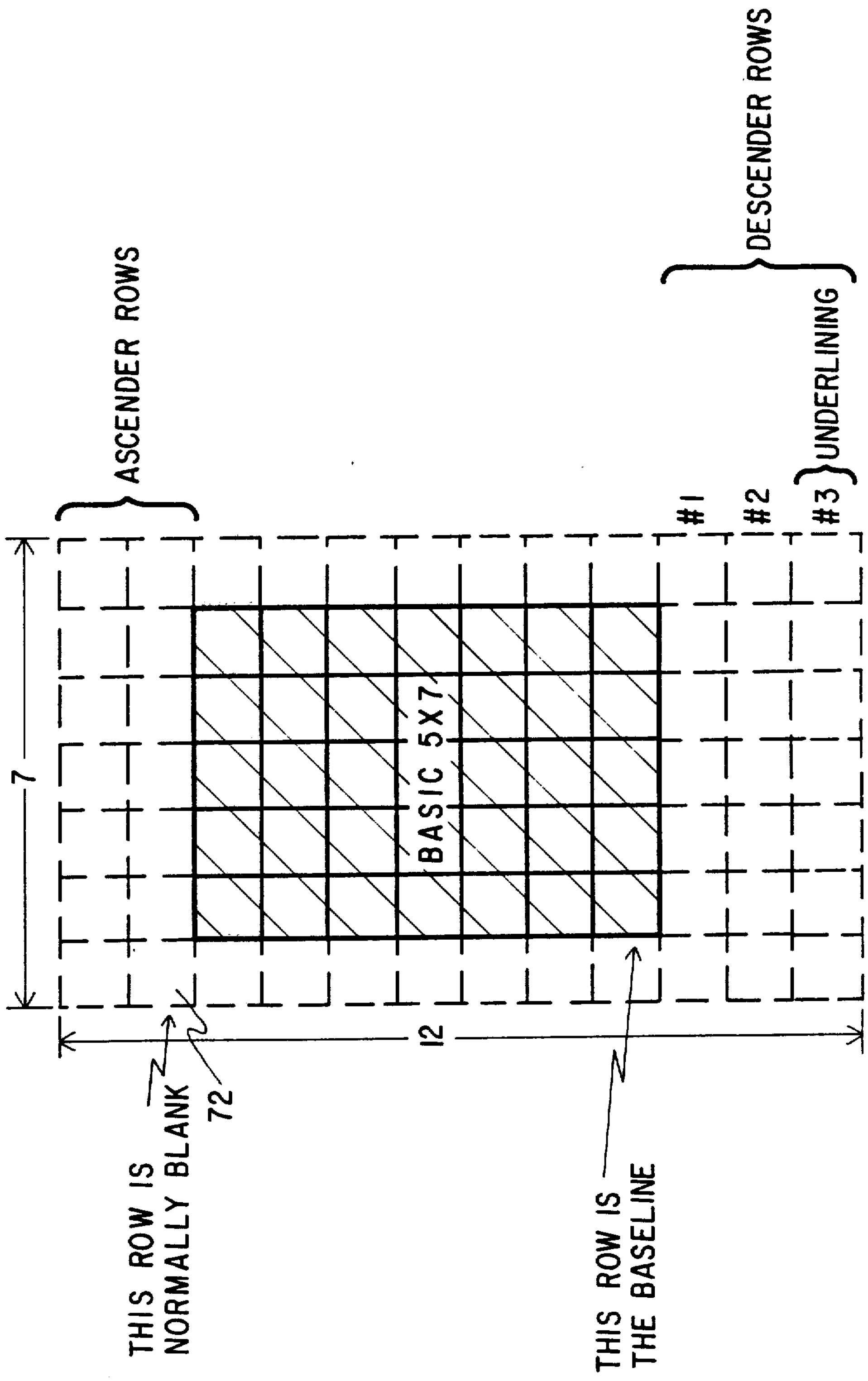

FIG. 24 is a diagram illustrating the basic character format associated with the operation of the internal thermal printer employed in the calculator of FIG. 1.

FIGS. 25A-C constitute a tabular diagram of the primary character set of the internal thermal printer employed in the calculator of FIG. 1.

FIGS. 26A-C constitute a tabular diagram illustrating the alternate German character set associated wih the internal thermal printer employed in the calculator of FIG. 1.

FIGS. 27A-C constitute a tabular diagram illustrating the alternate French character set associated with the internal thermal printer employed in the calculator of FIG. 1.

FIGS. 28A-C constitute a tabular diagram illustrating the alternate Spanish character set associated with the internal thermal printer employed in the calculator of FIG. 1.

FIGS. 29A-C constitute a tabular diagram illustrating the alternate Katakana character set associated with the internal thermal printer employed in the calculator of FIG. 1.

Figure 30A:
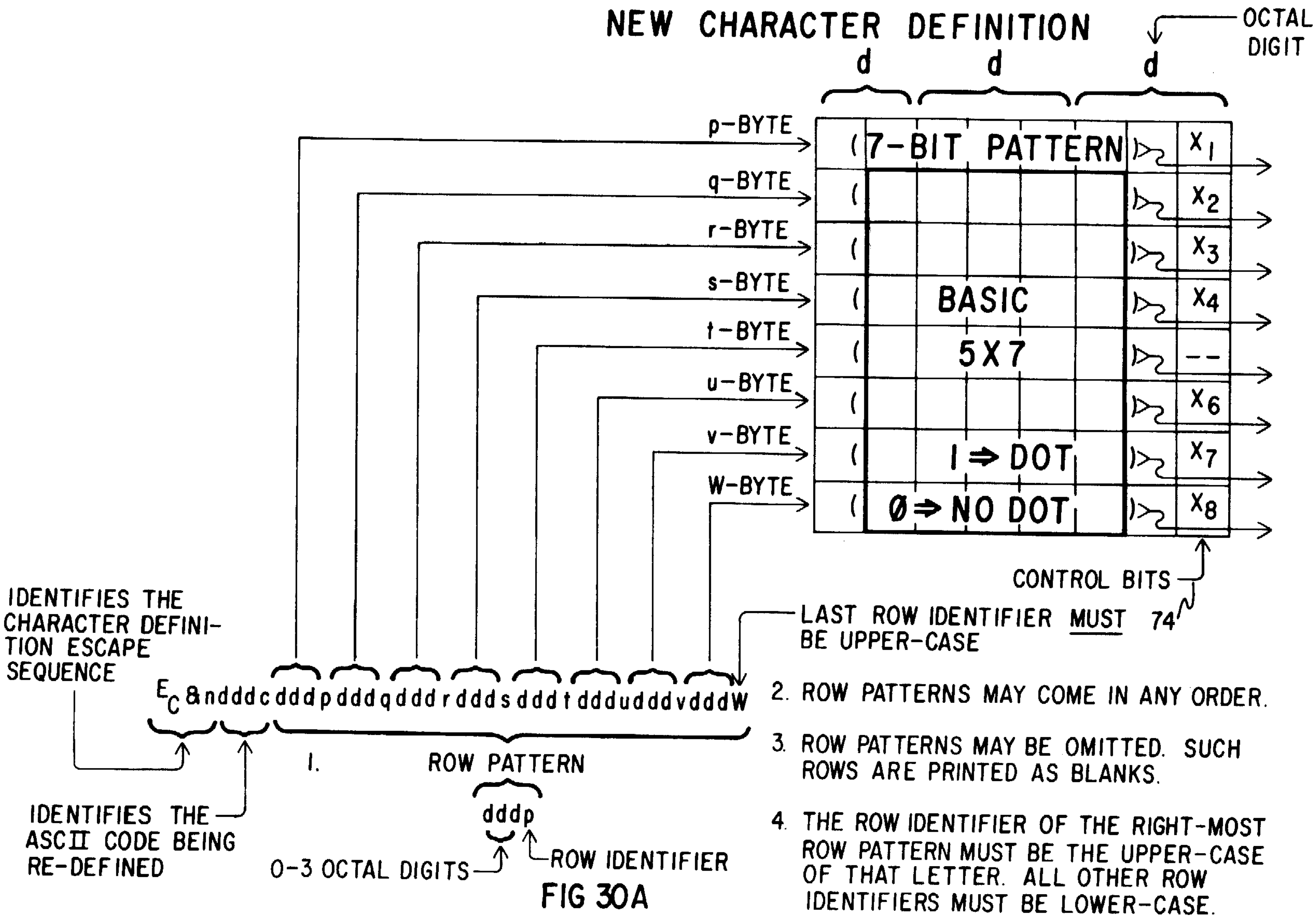

FIGS. 30A and B show a schematized illustration of the new character definition capability of the internal thermal printer employed in the calculator of FIG. 1.

Figure 30B:
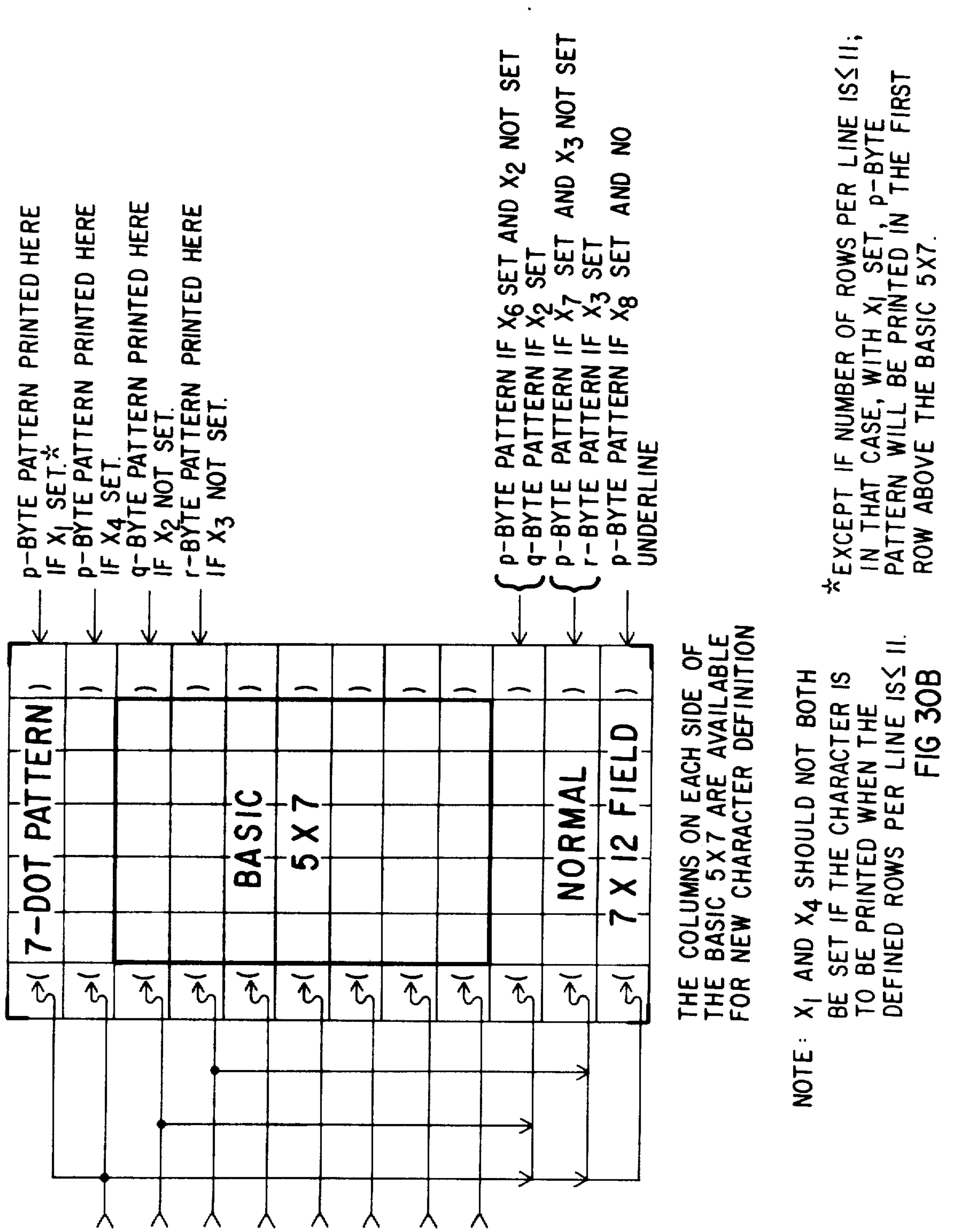
Figure 31:
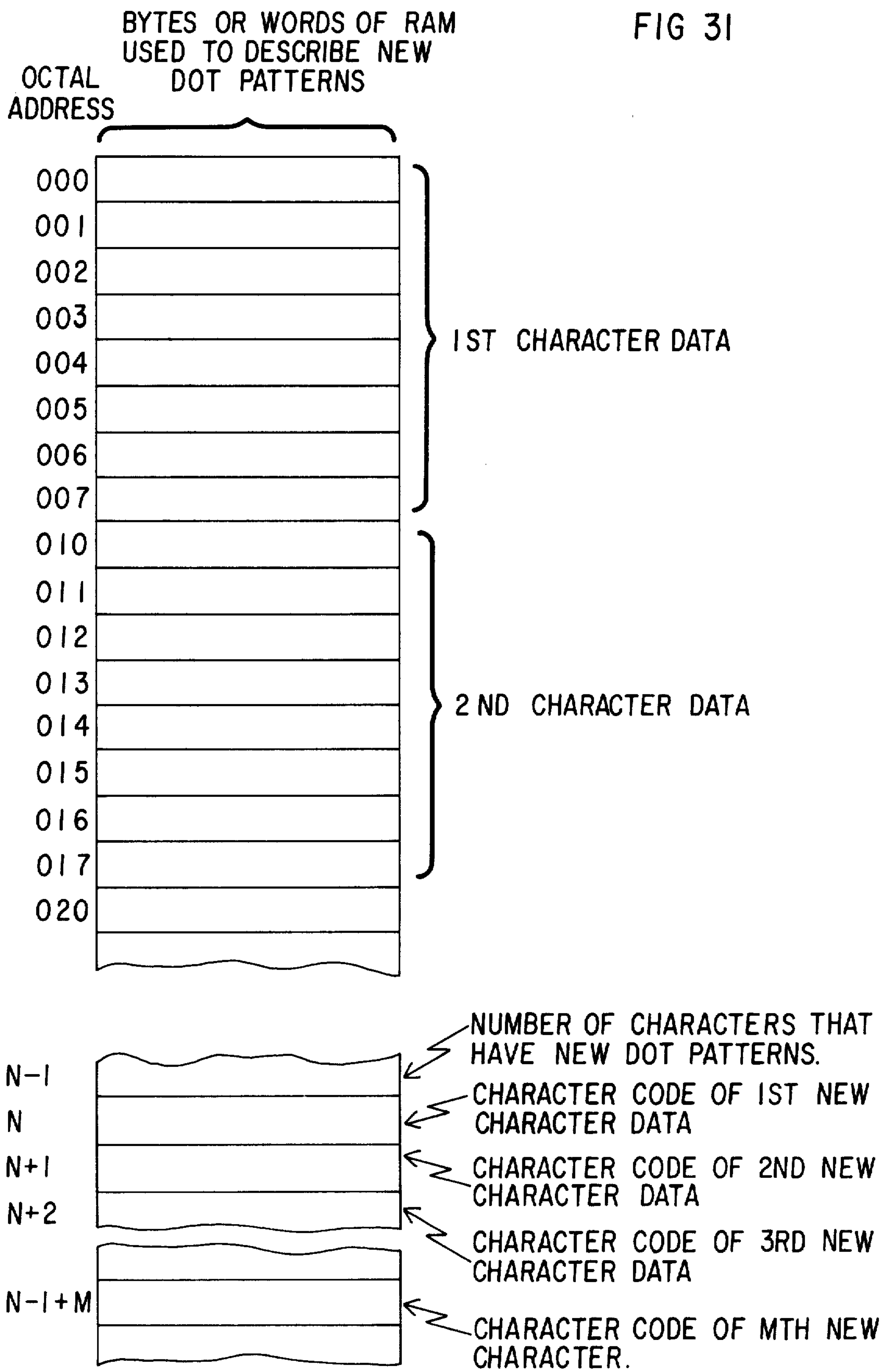

FIG. 31 is a memory map illustrating the way in which random access memory is partitioned to accomplish the new character definition capability shown in FIG. 30.

FIG. 32 is an illustration of a portion of a character expansion technique embodied in the new character definition capability illustrated in FIG. 30.

Figure 33A:
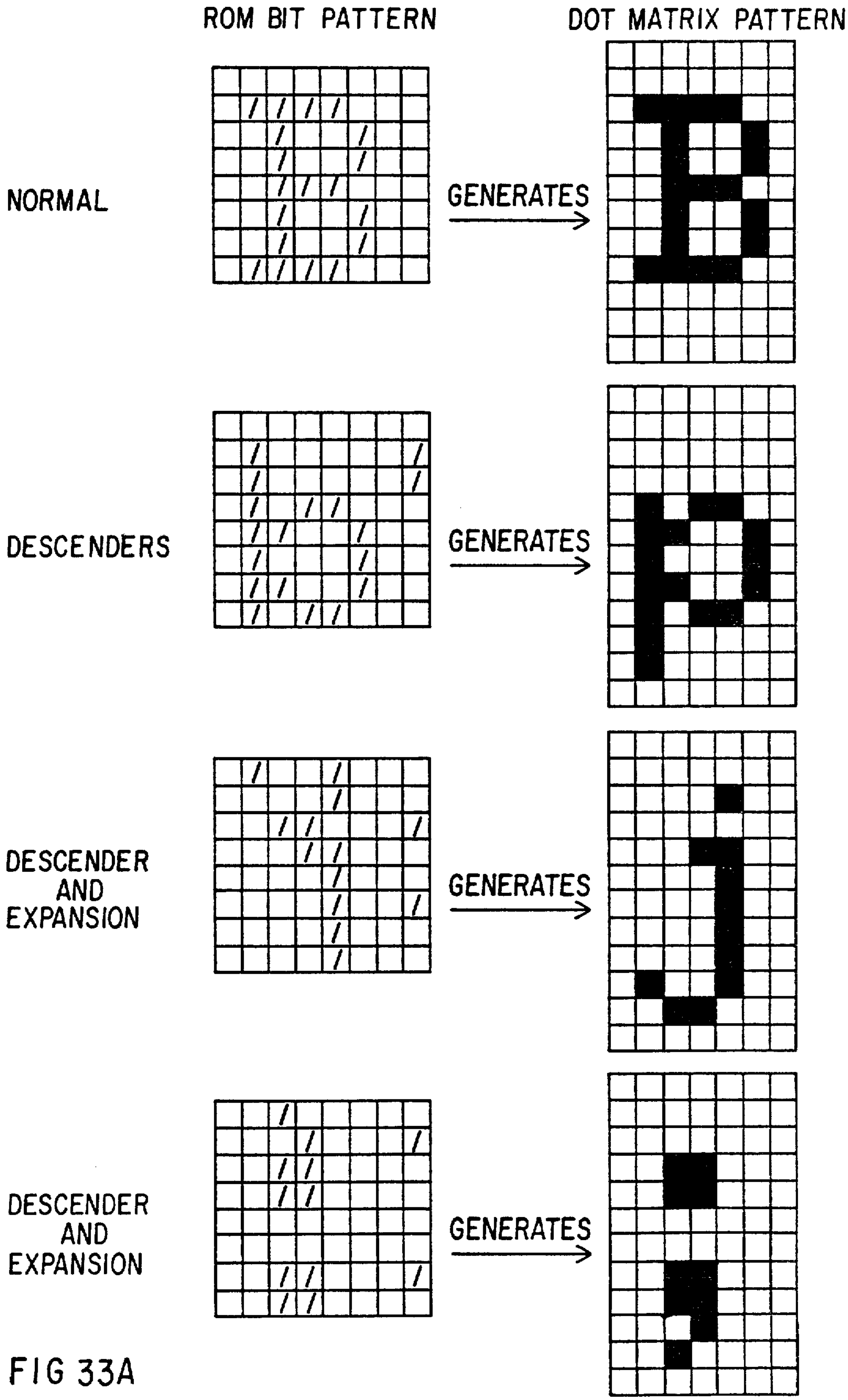
Figure 33B:
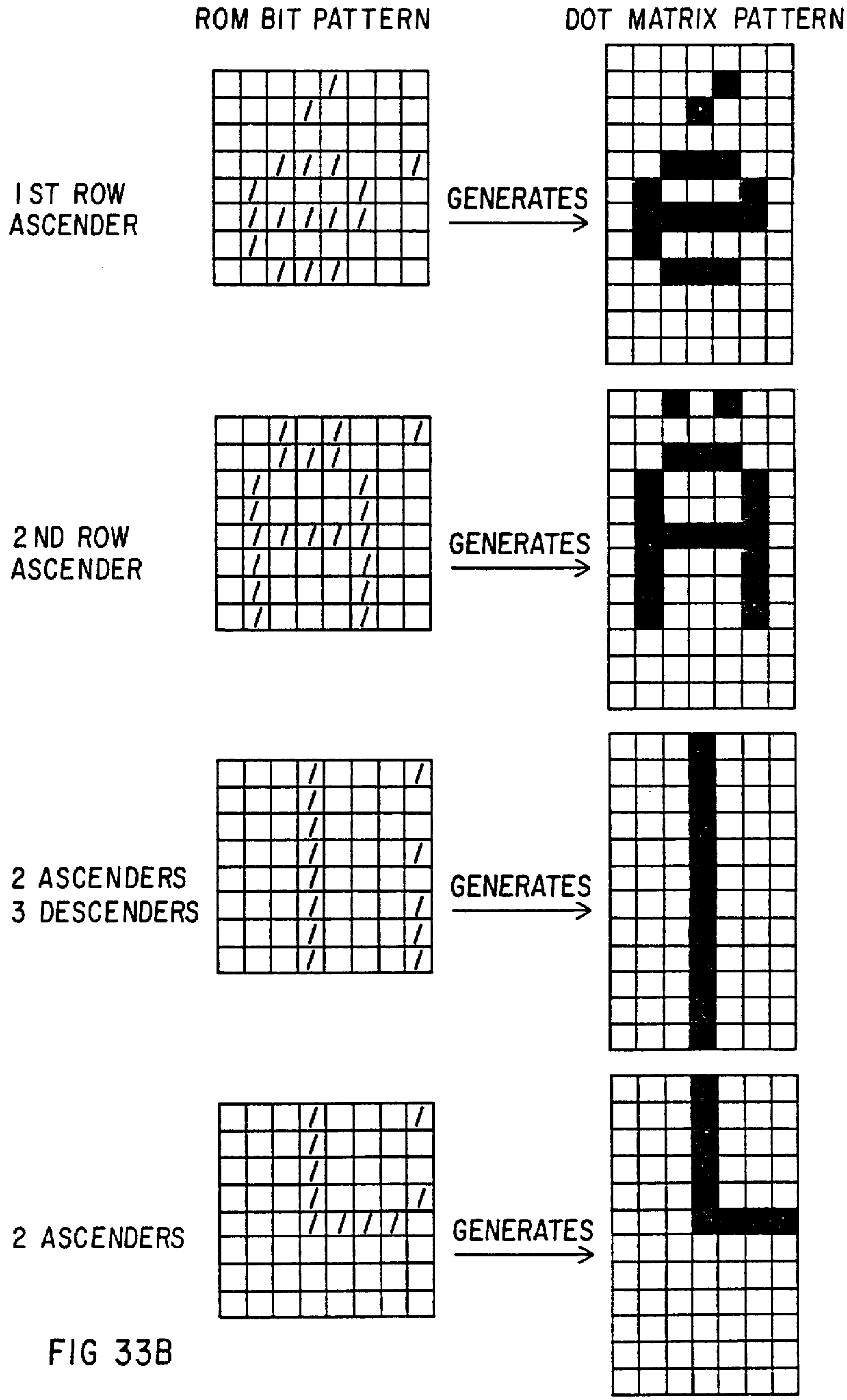

FIGS. 33A-B are illustrative examples of the character expansion technique shown in FIGS. 30 and 32.

Figure 34:
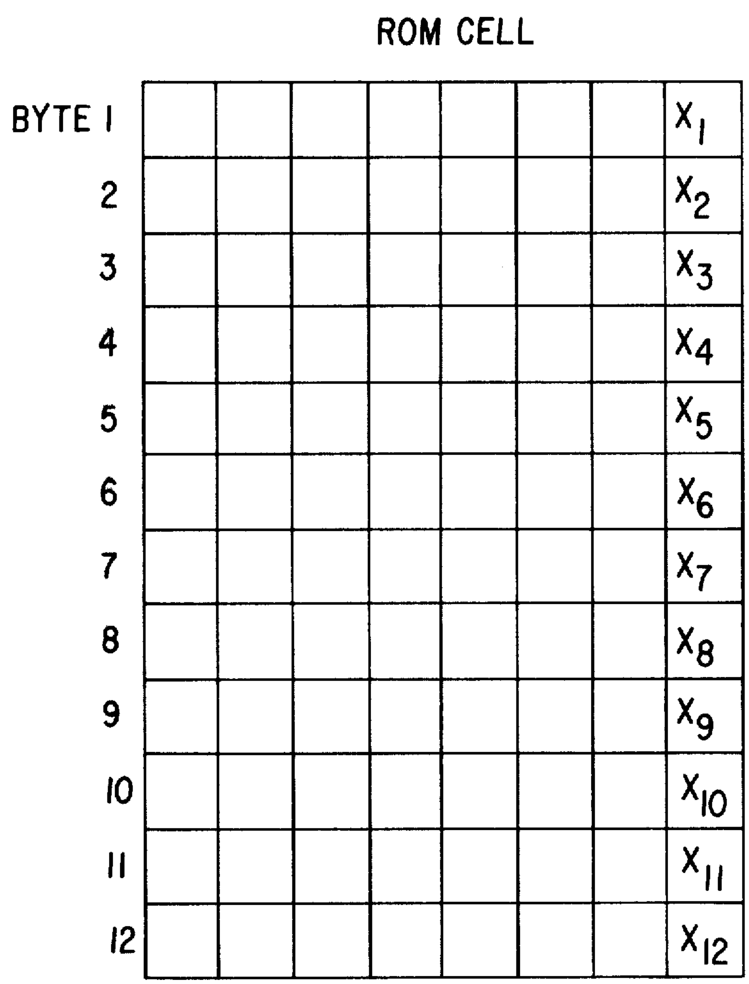
Figure 35A:
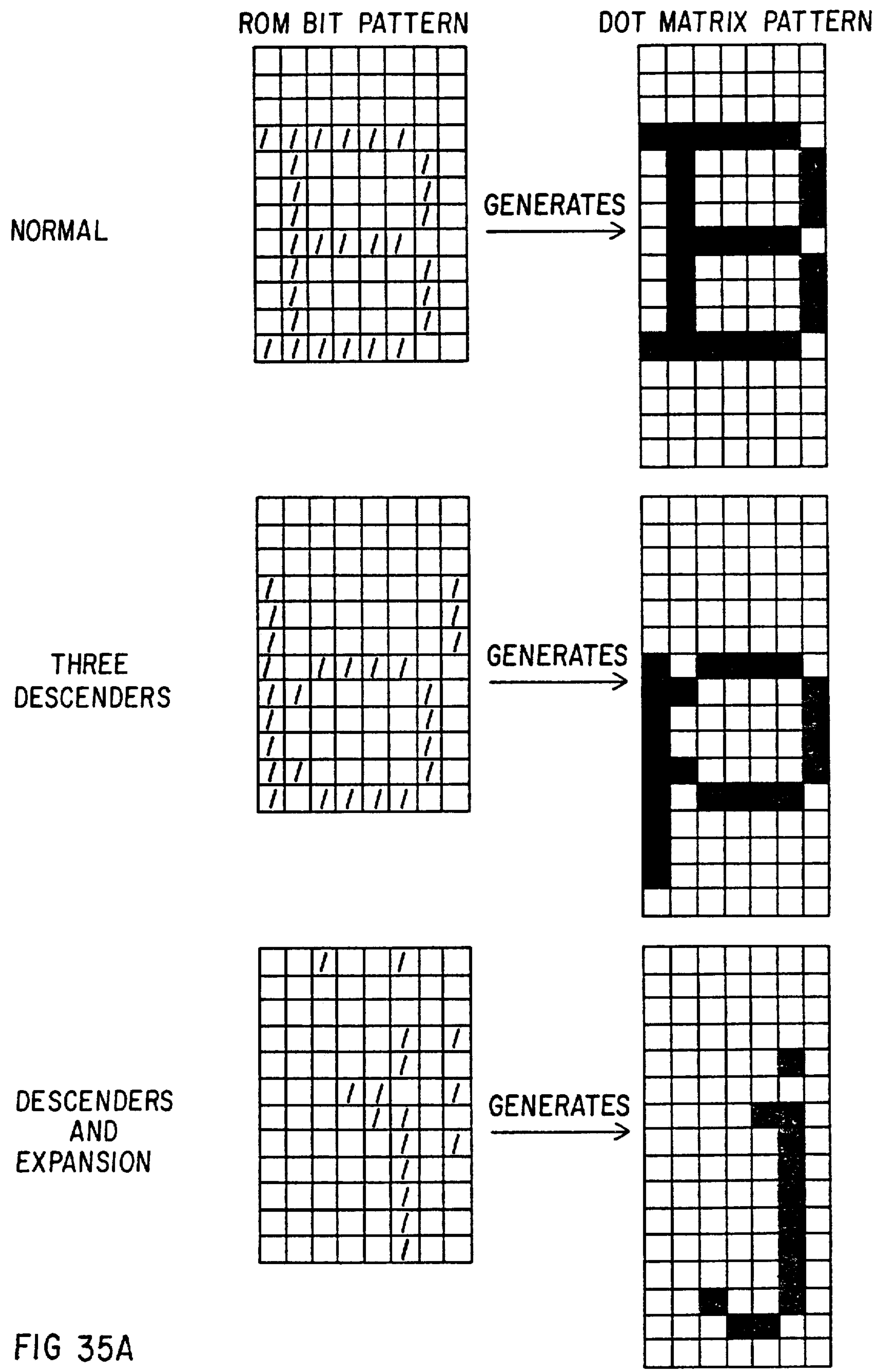
Figure 35B:
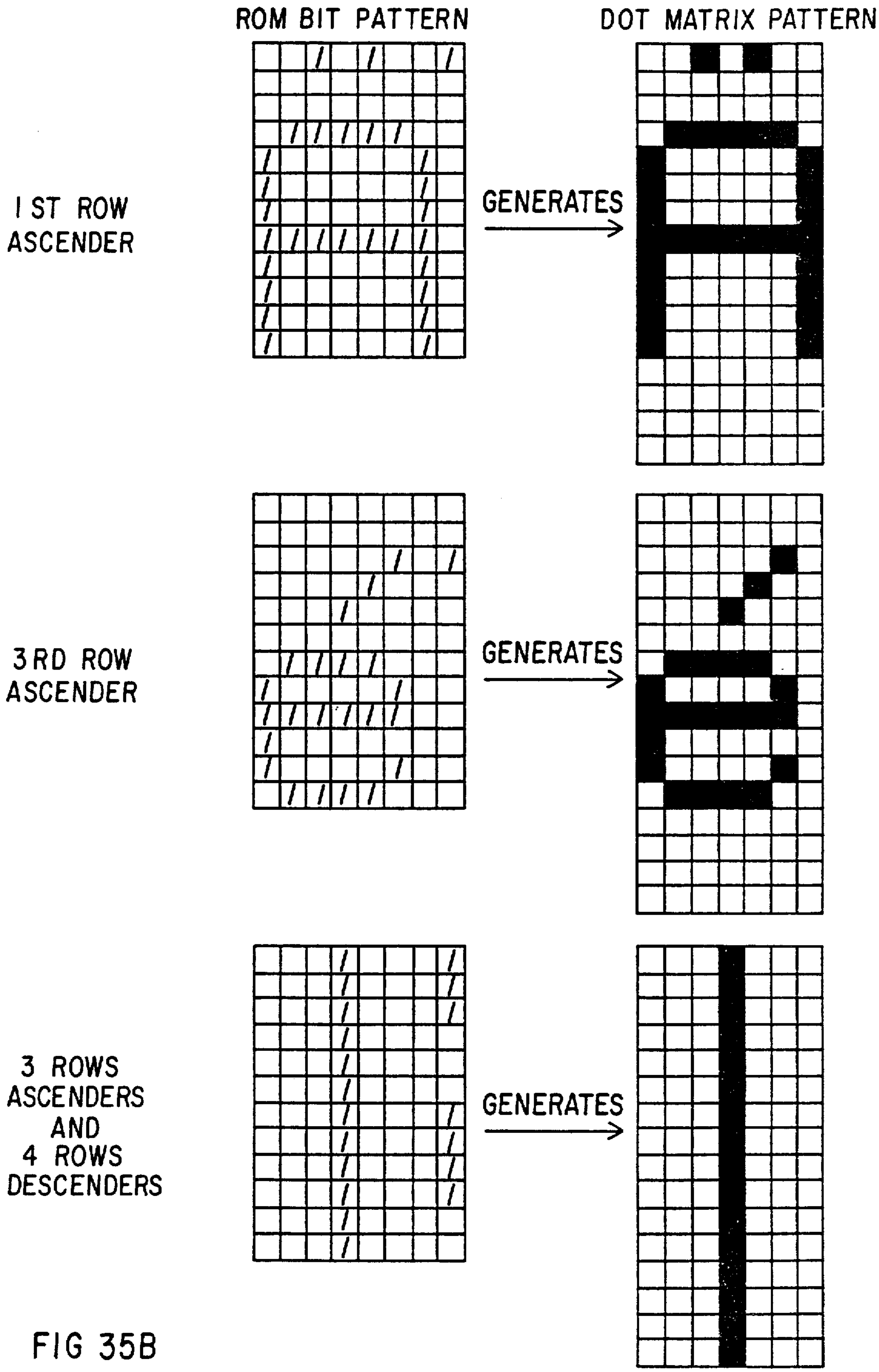
Figure 35C:
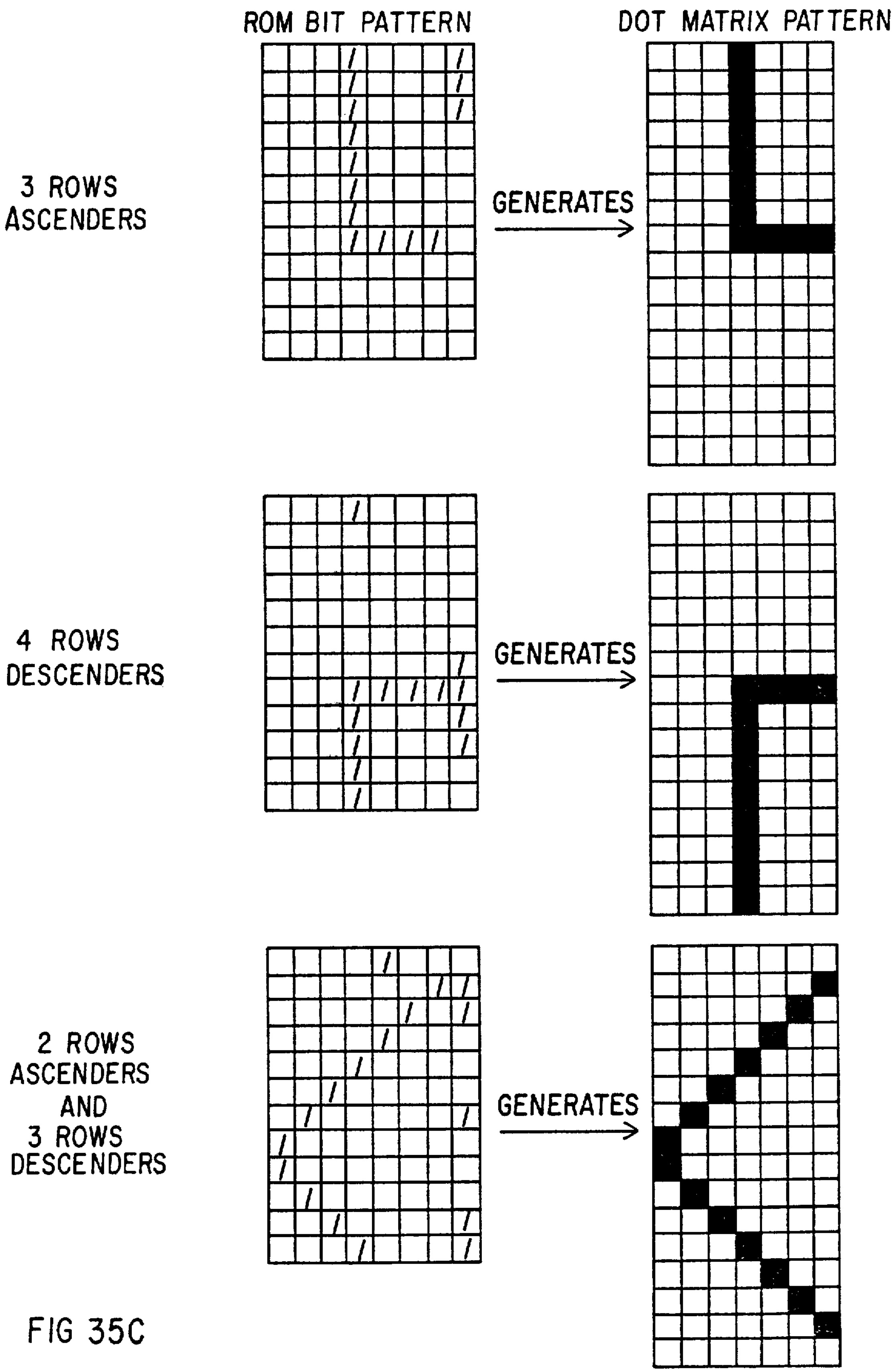
Figure 35D:
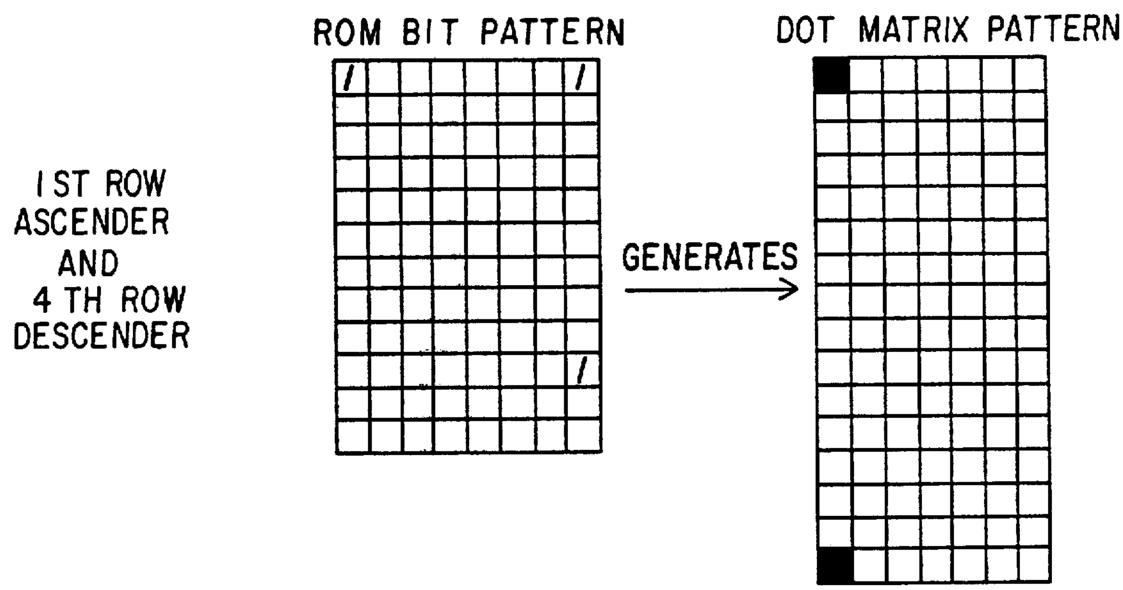

FIG. 34 is an illustration of the character expansion technique of FIG. 32 generalized to the case of a $7\times9$ character matrix.

FIGS. 35A-D are illustrative examples of the generalized character expansion technique shown in FIG. 34.

Figure 36:
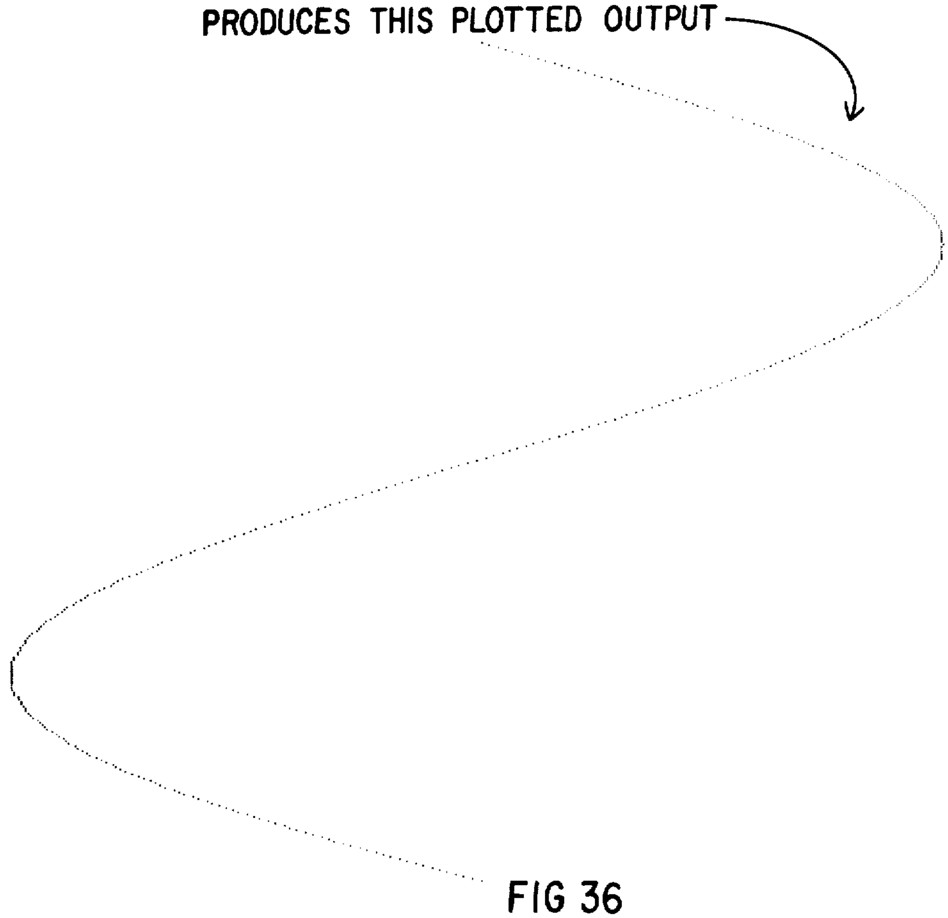

FIG. 36 is a listing of a program and its resultant output illustrating the ability of the internal thermal printer employed in the calculator of FIG. 1 to plot in the alphanumeric mode of operation.

Figure 37A:
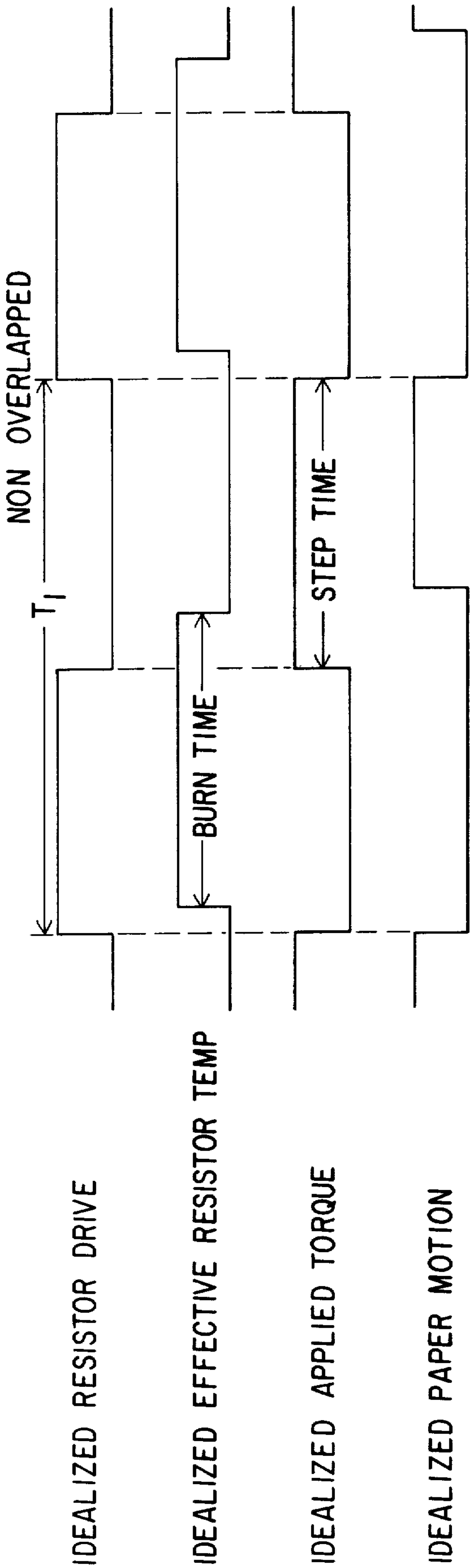

FIG. 37A is a waveform diagram illustrating the absence of overlap of paper motion and thermal print element energization in connection with thermal printing.

Figure 37B:
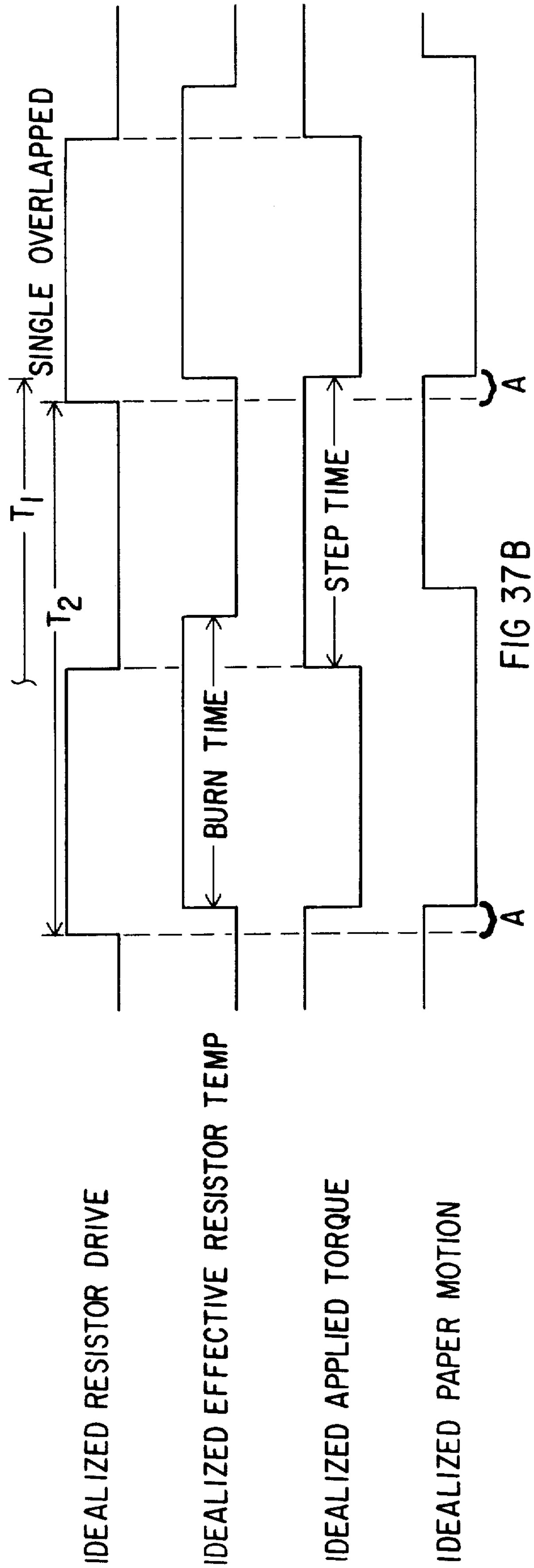

FIGS. 37B-C are waveform diagrams illustrating two techniques for overlapping of paper motion and thermal print element energization in connection with thermal printing.

FIG. 38 is a listing of a program and its resultant output illustrating the ability of the internal thermal printer employed in the calculator of FIG. 1 to plot in the graphics mode of operation.

Figure 39:
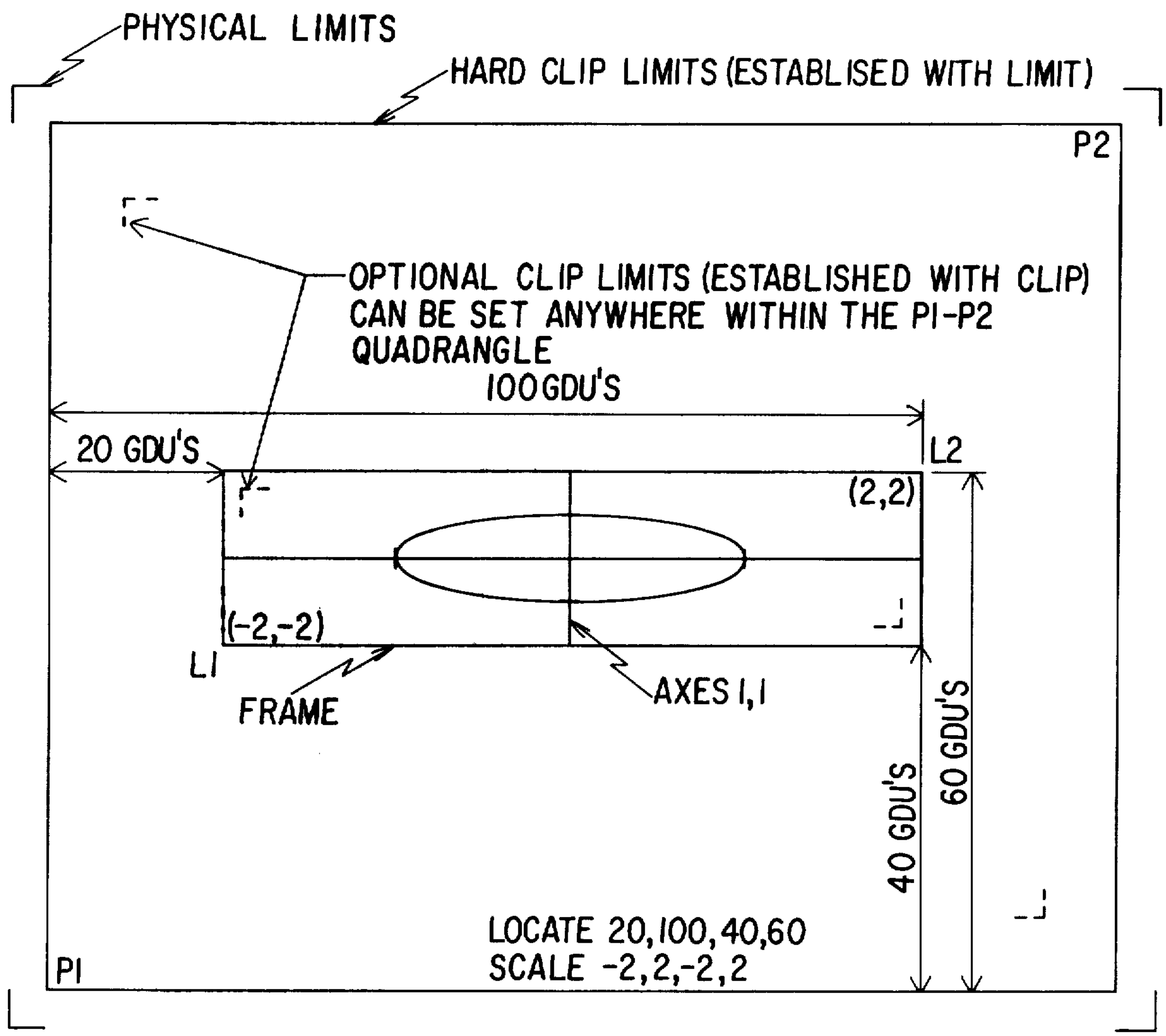

FIG. 39 is a diagram illustrating the relationship between the SCALE statement and the plotting space associated with the graphics mode of calculator operation.

Figure 40:
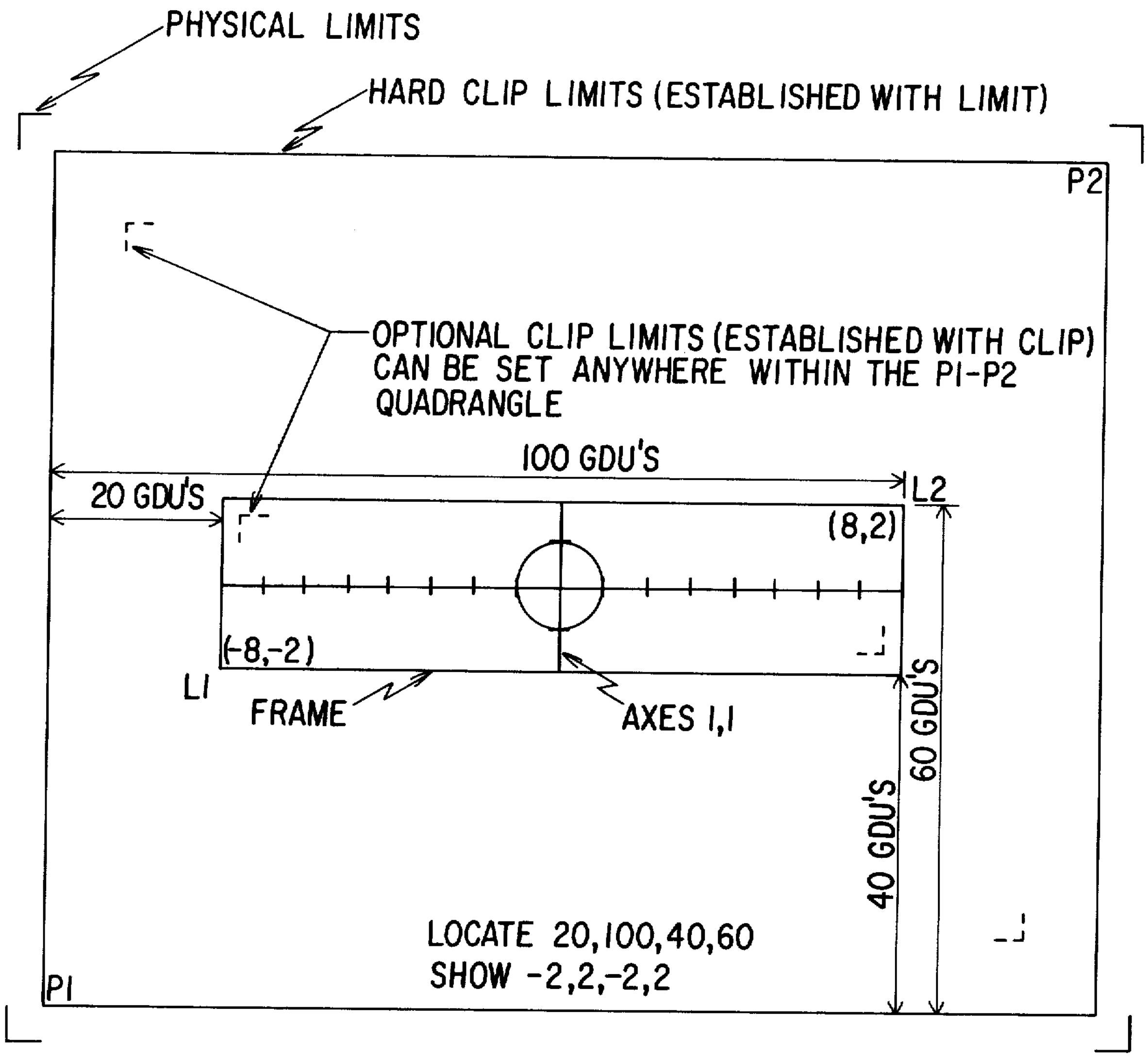

FIG. 40 is a diagram illustrating the relationship between the SHOW statement and the plotting space associated with the graphics mode of calculator operation.

Figure 41:
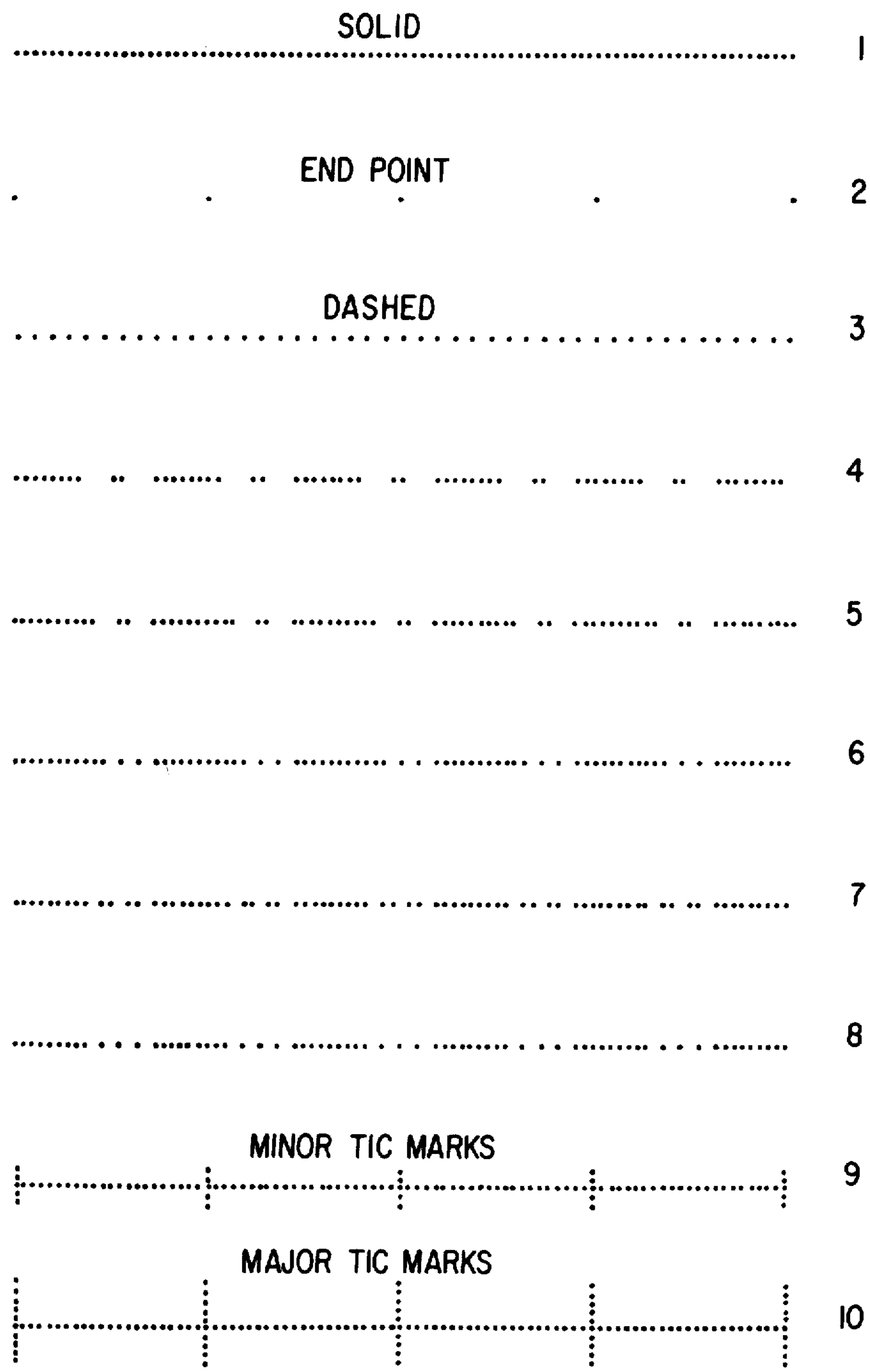

FIG. 41 is a diagram of the various line types available in the graphics mode of calculator operation illustrated in connection with the internal thermal printer.

Figure 42:
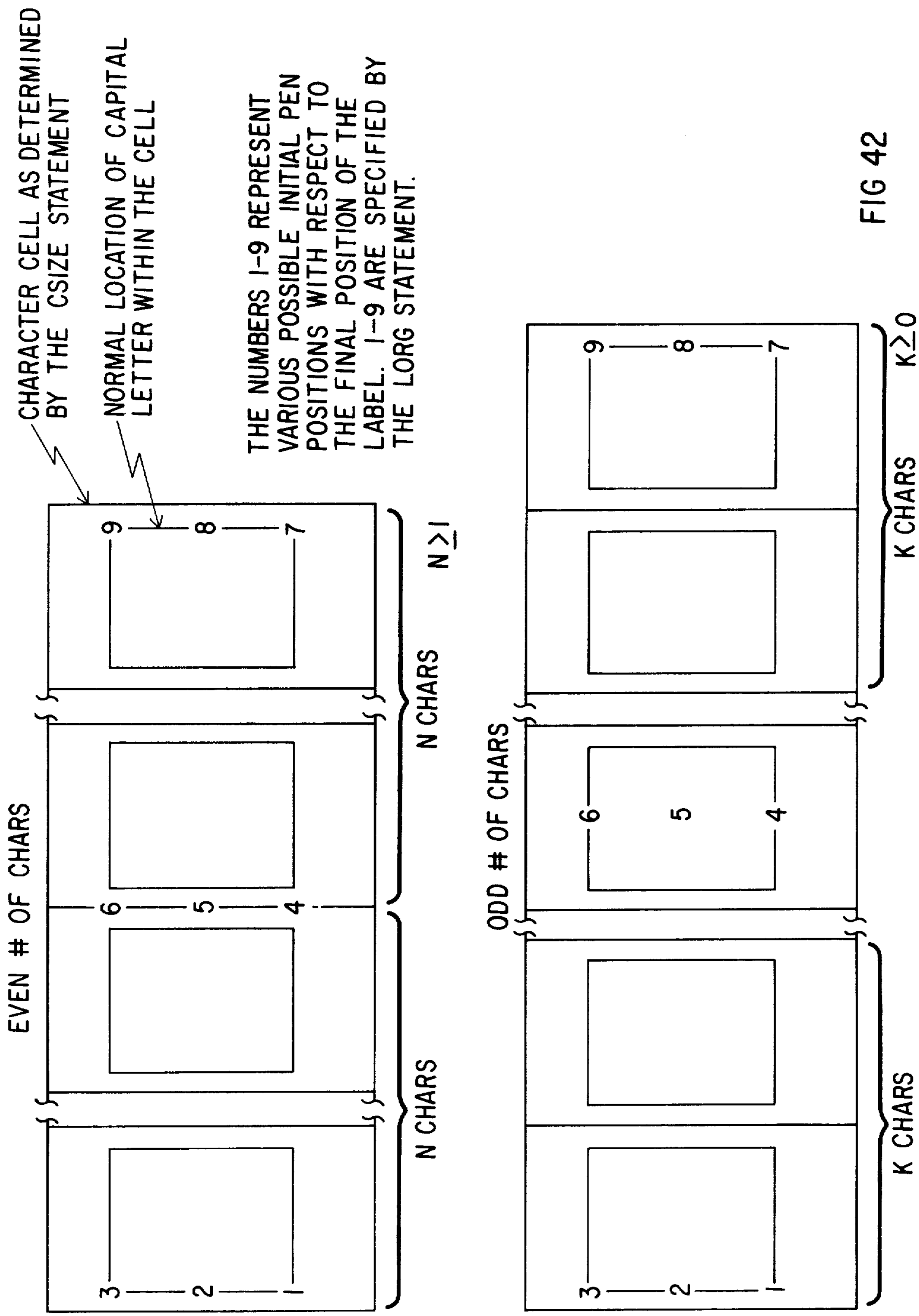

FIG. 42 is an illustration of the operation of the LORG statement associated with the graphics mode of calculator operation.

Figure 43:
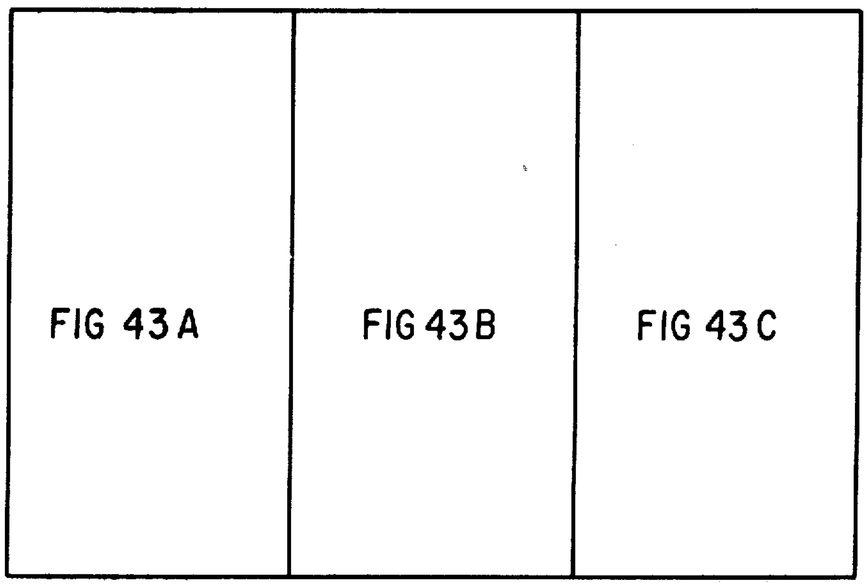
Figure 43A:
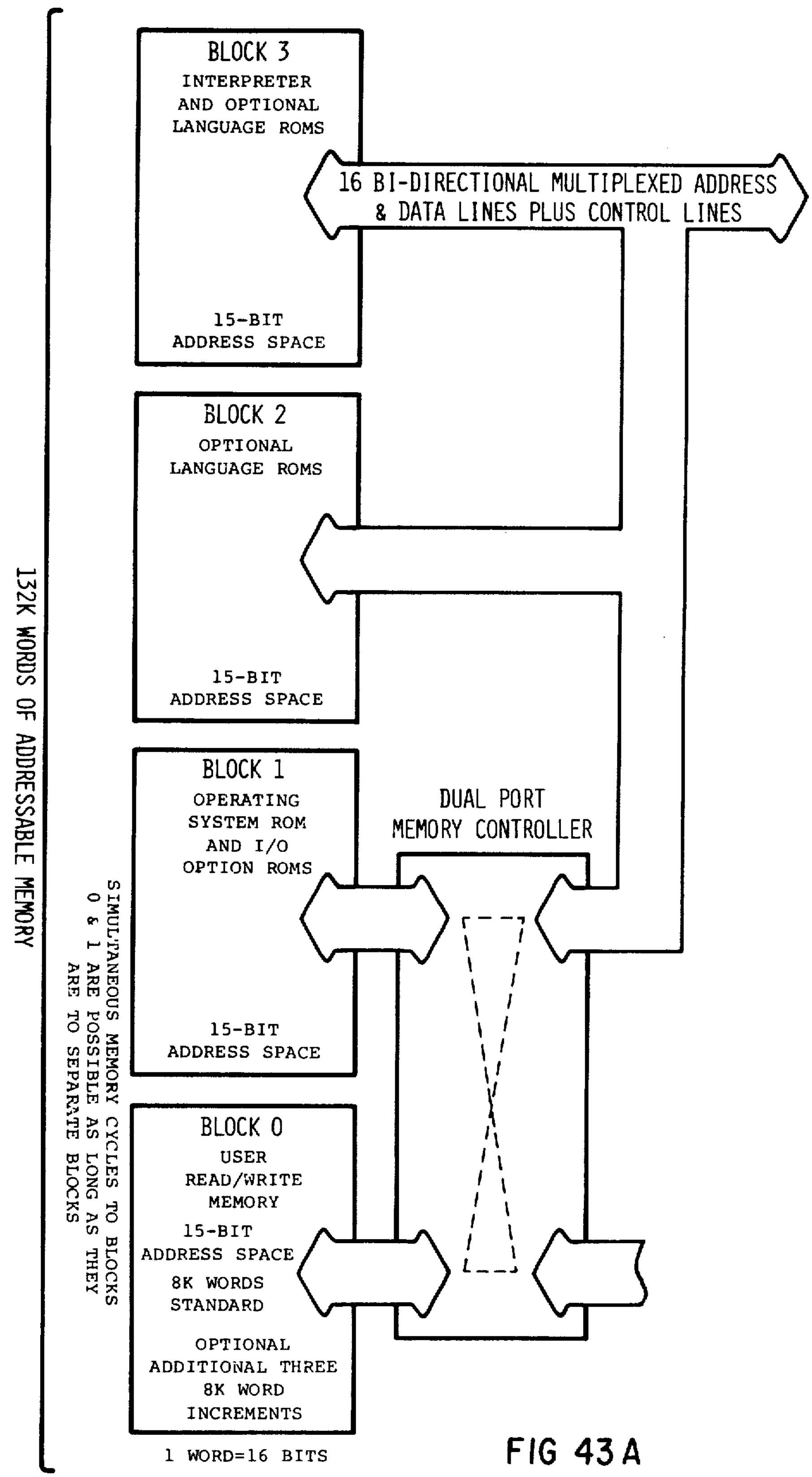
Figure 43B:
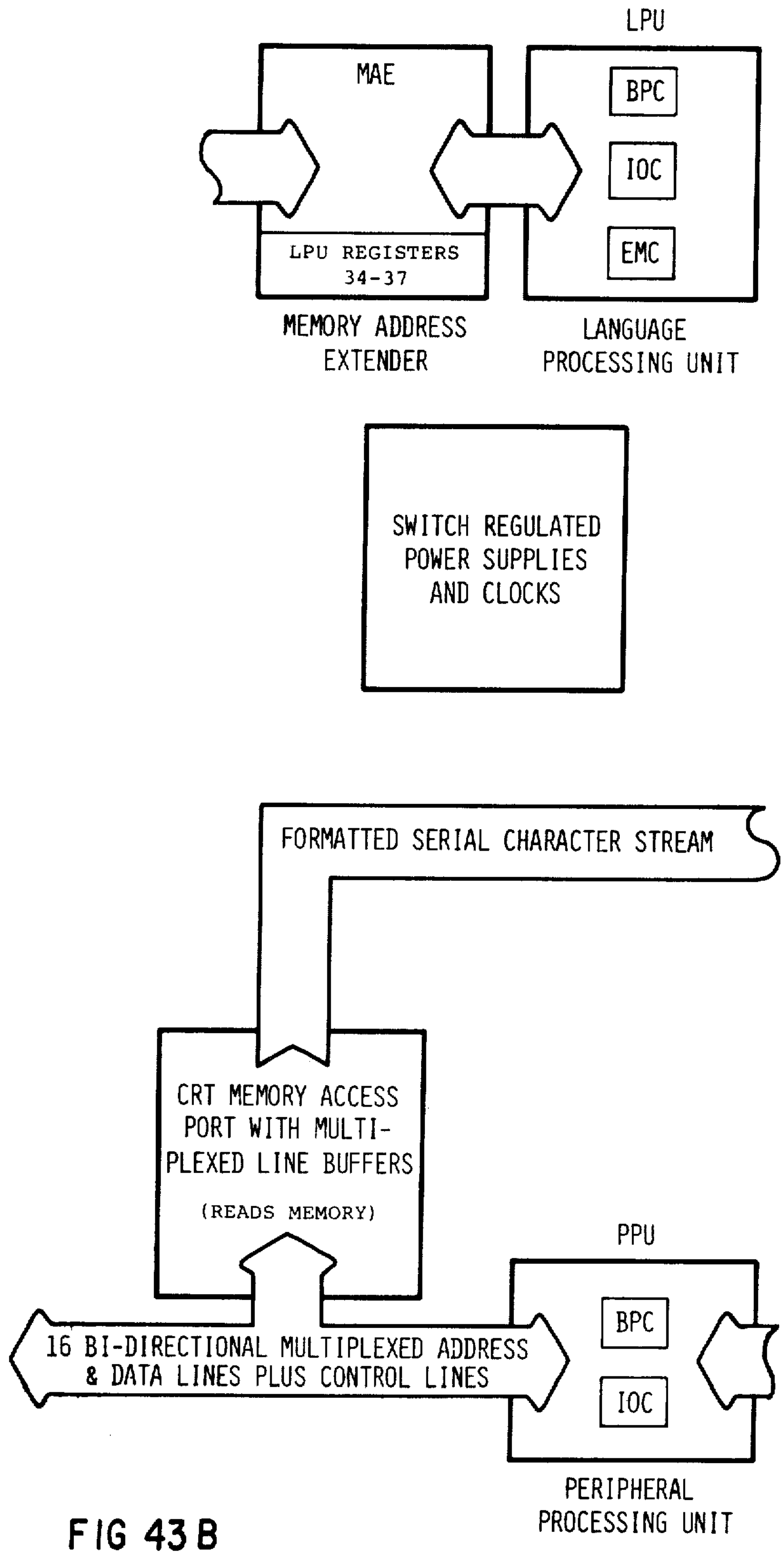
Figure 43:
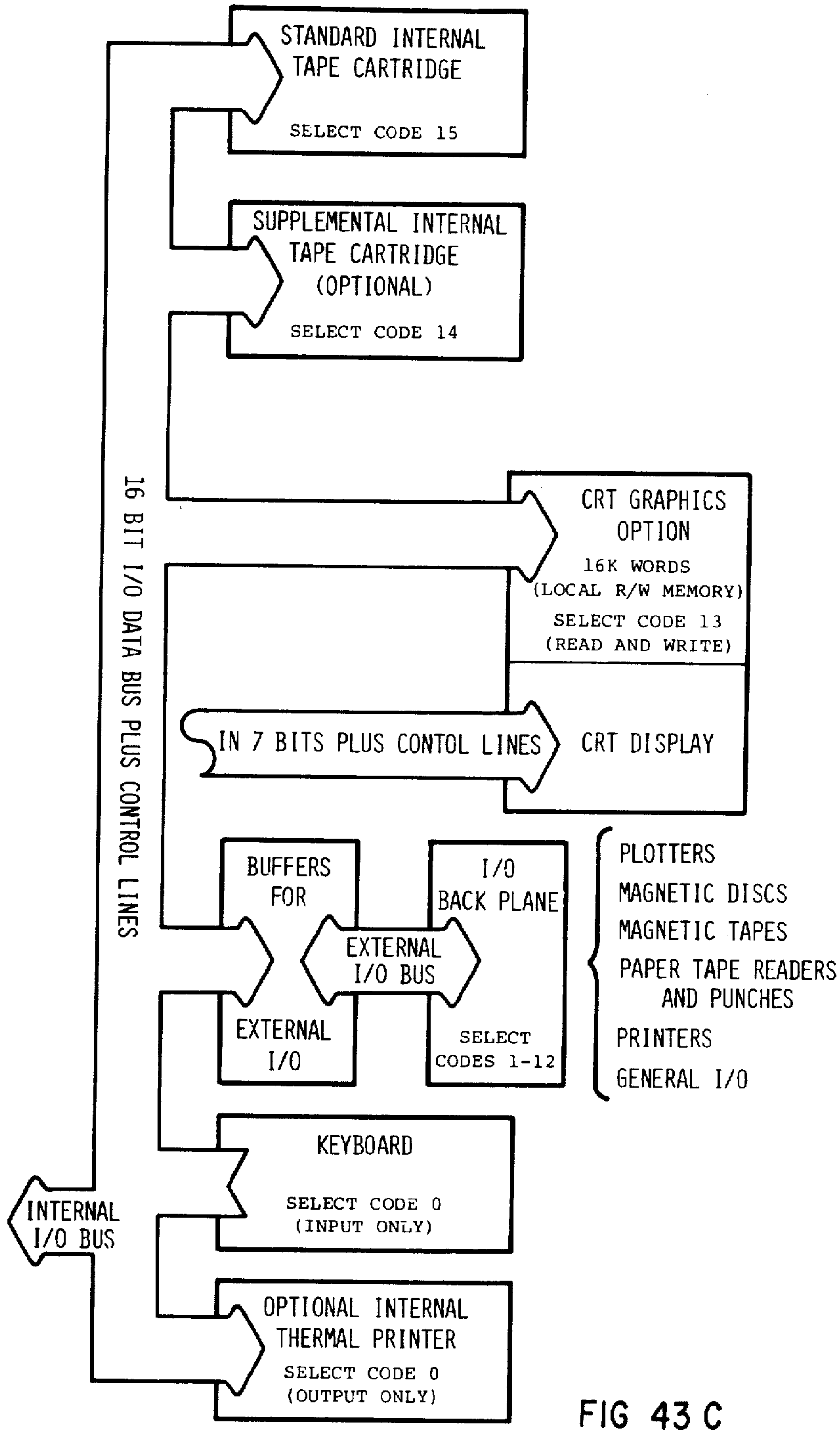

FIG. 43 is a representation of the relationship of FIGS. 43A-C which shows a simplified hardware block diagram of the calculator of FIG. 1.

Figure 44:
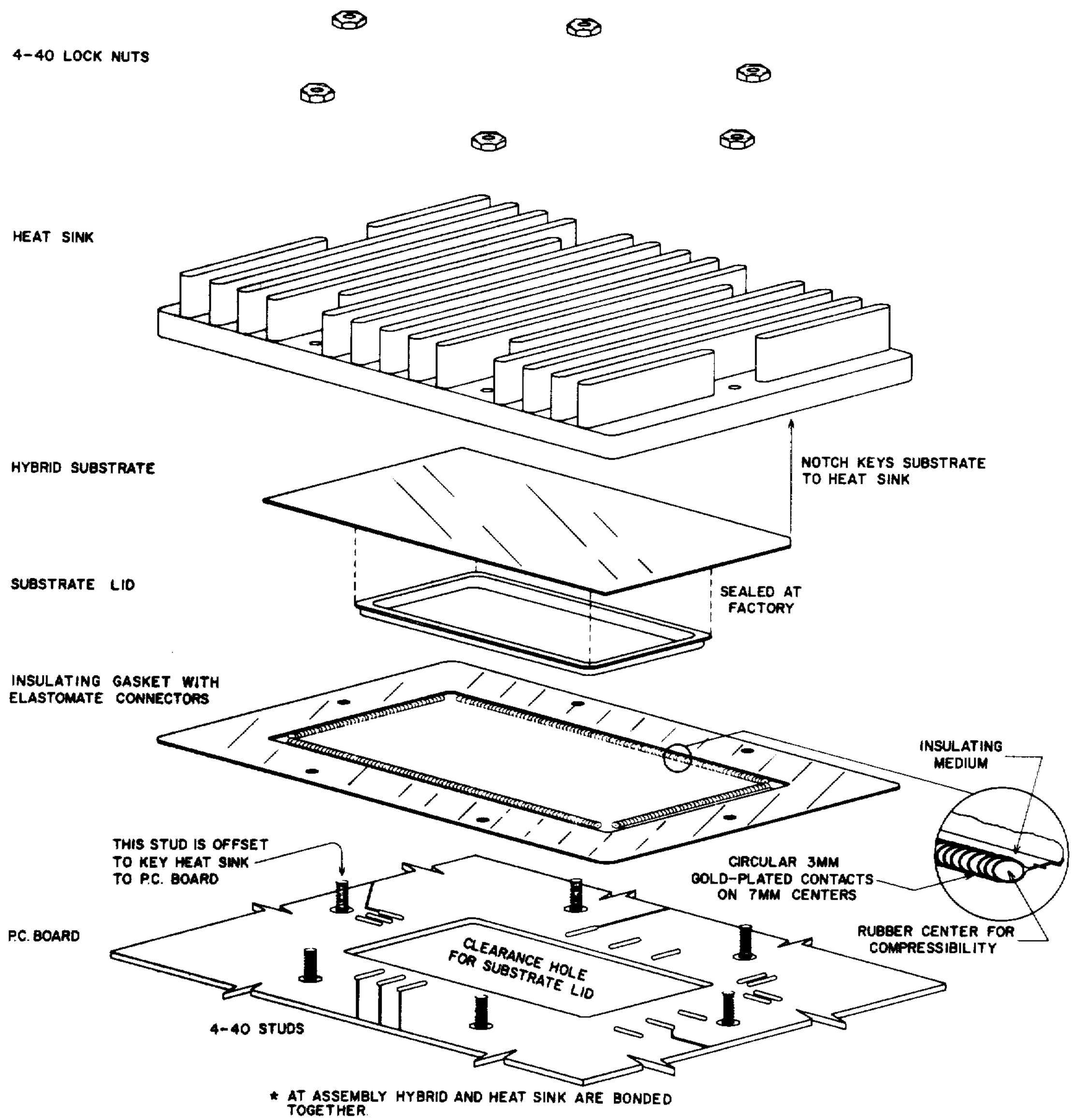

FIG. 44 is an illustration of the way in which the LPU and PPU of FIG. 43 are mounted for operation in the calculator.

Figure 45A:
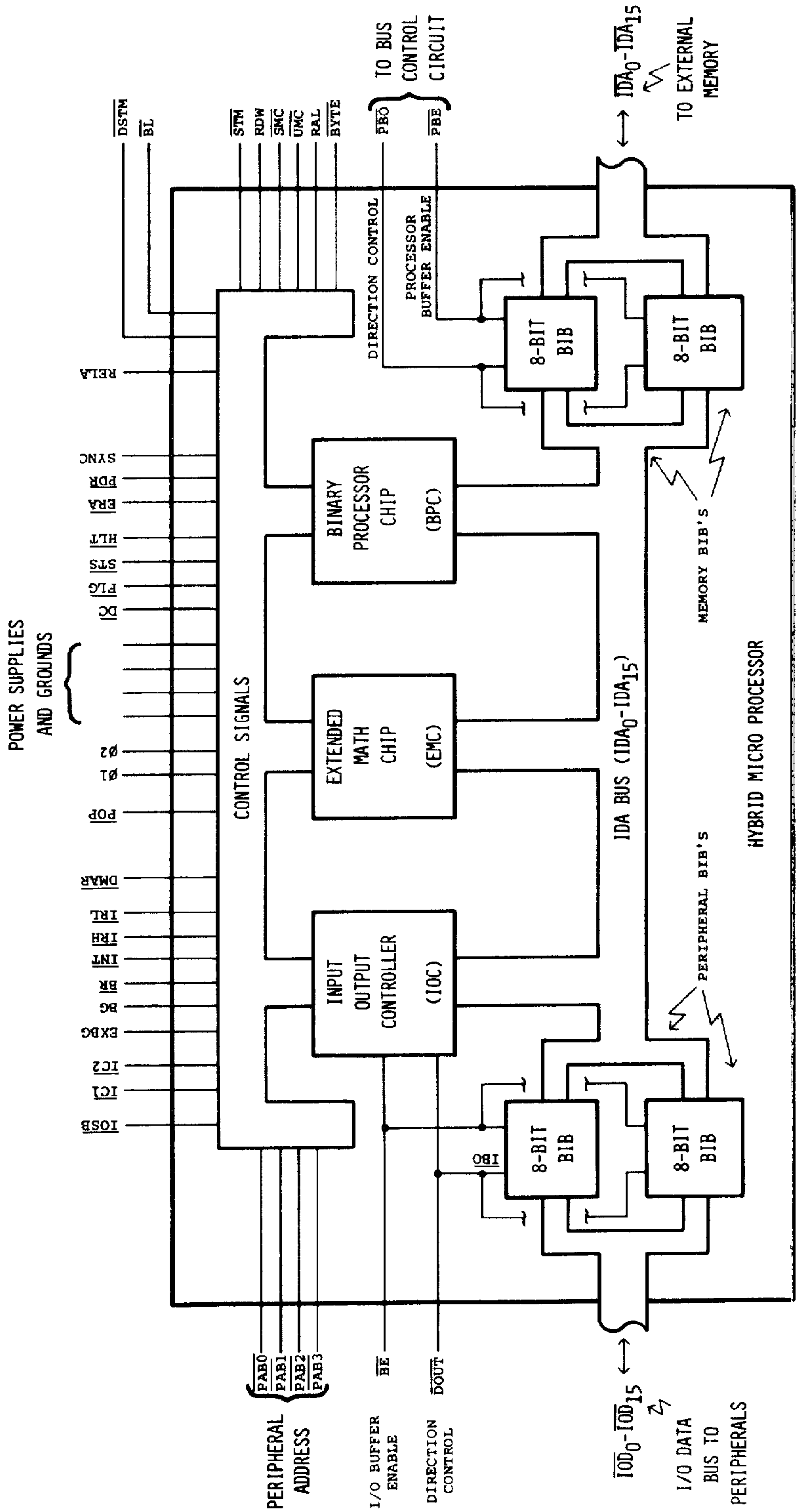

FIG. 45A is a simplified block diagram of the LPU of FIG. 43.

Figure 45B:
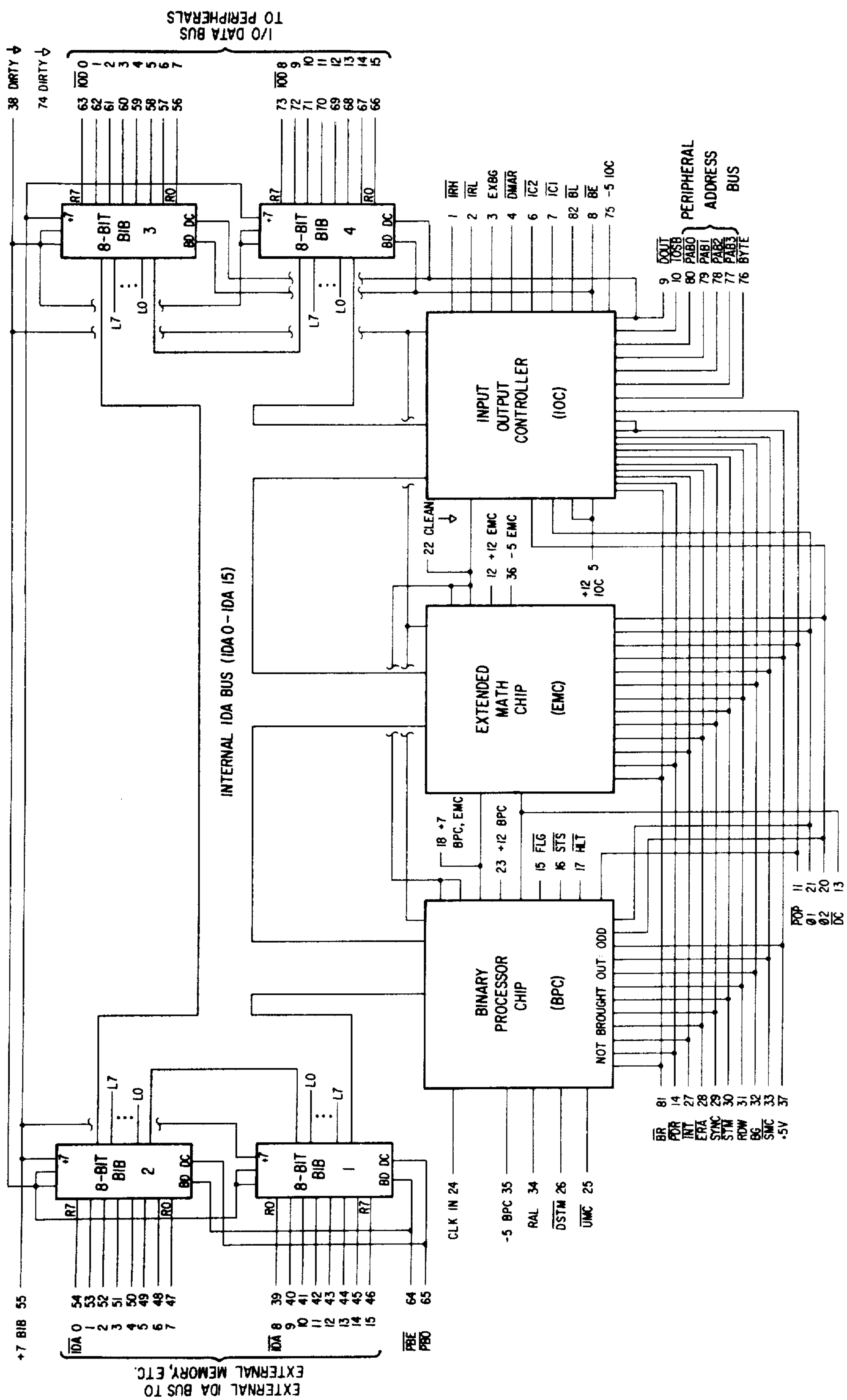

FIG. 45B is a detailed block diagram of the LPU of FIG. 43.

Figure 46A:
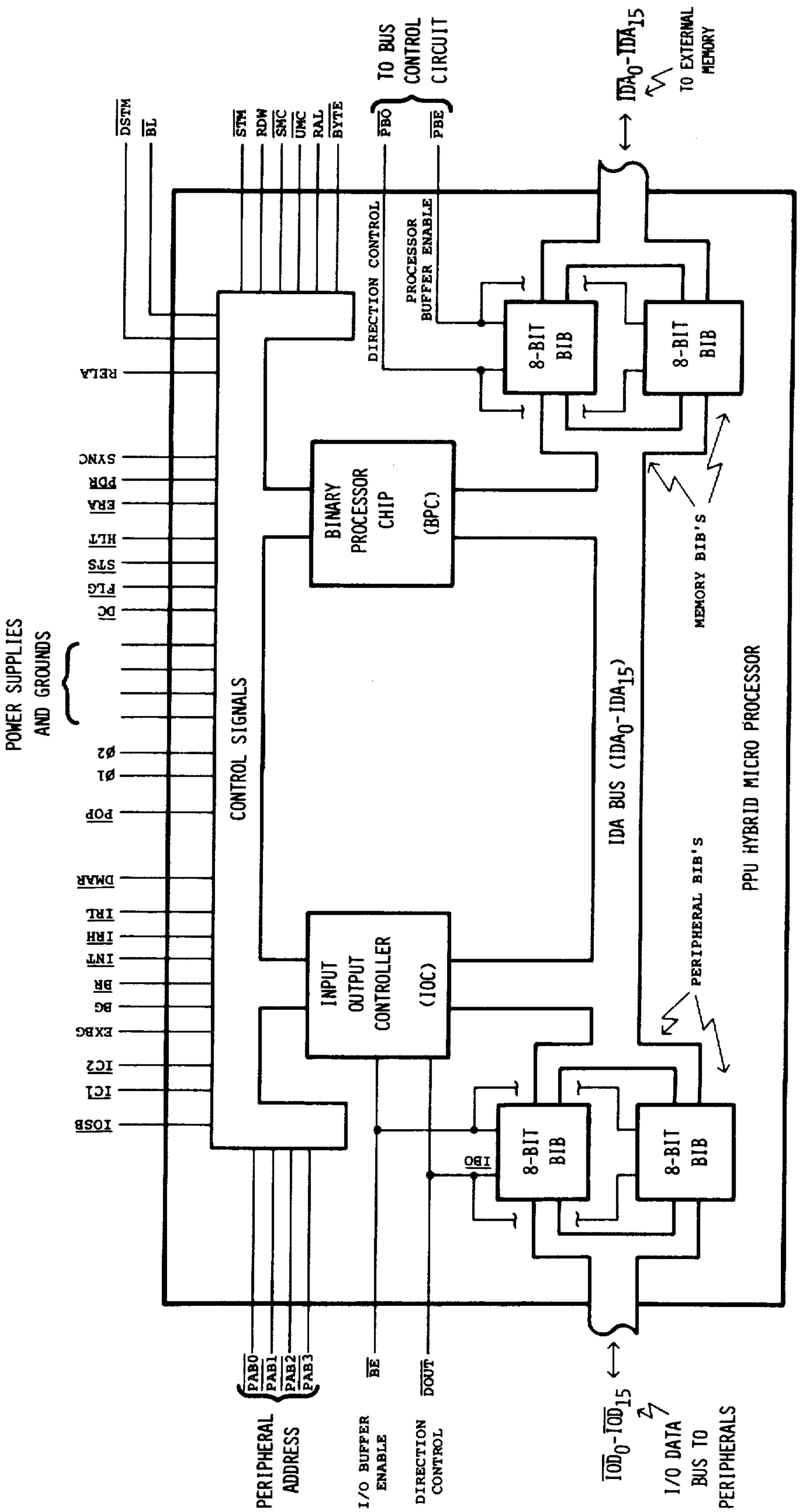

FIG. 46A is a simplified block diagram of the PPU of FIG. 43.

Figure 46B:
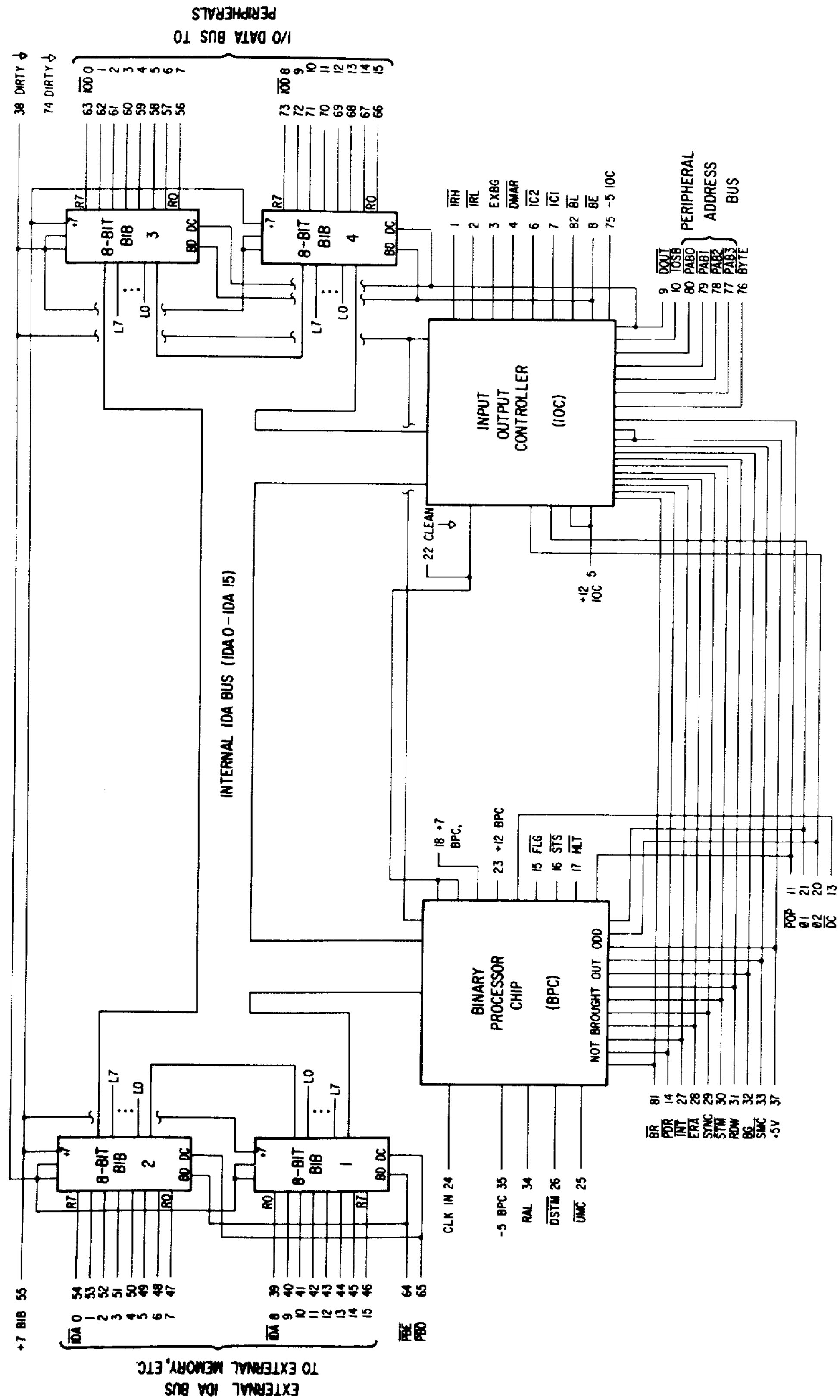

FIG. 46B is a detailed block diagram of the PPU of FIG. 43.

Figure 47:
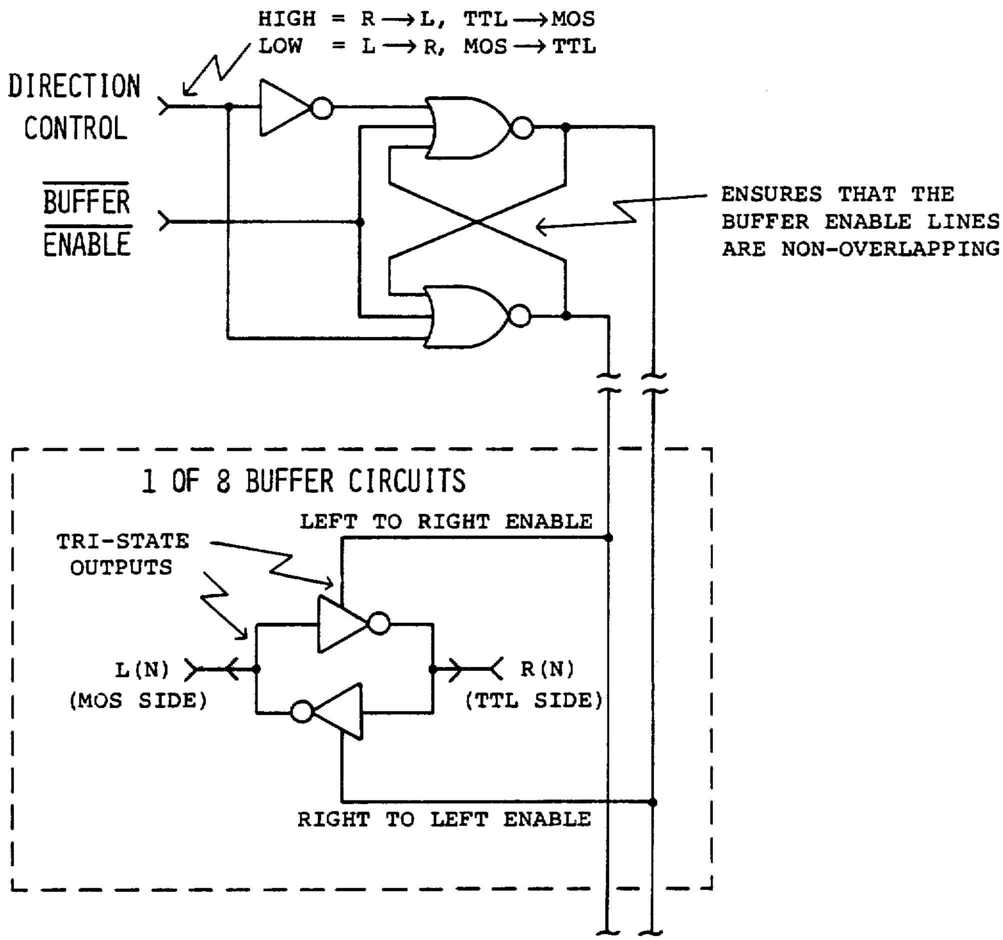

FIG. 47 is a partial block diagram of the BIB's of FIGS. 45A-B and 46A-B.

FIG. 48 is a list of the internal registers and their addresses located within the LPU and PPU of FIG. 43.

Figure 49:
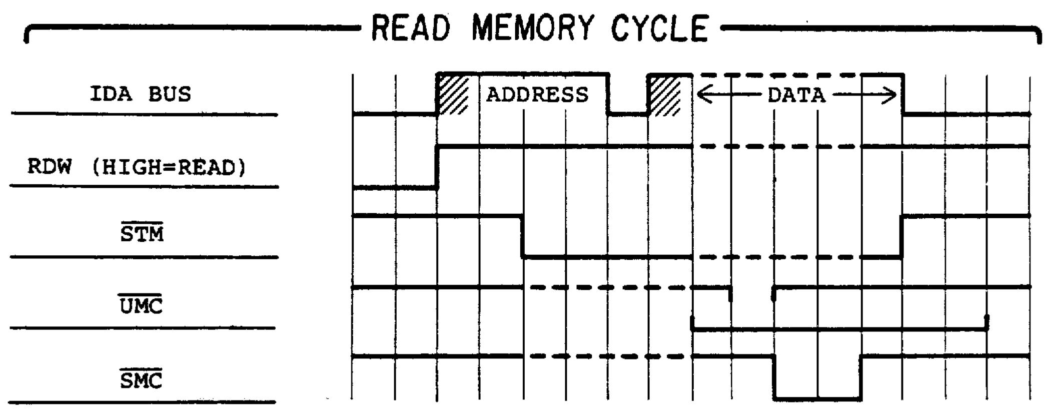

FIG. 49 is a simplified waveform diagram illustrating a read memory cycle performed by the LPU and PPU of FIG. 43.

Figure 50:
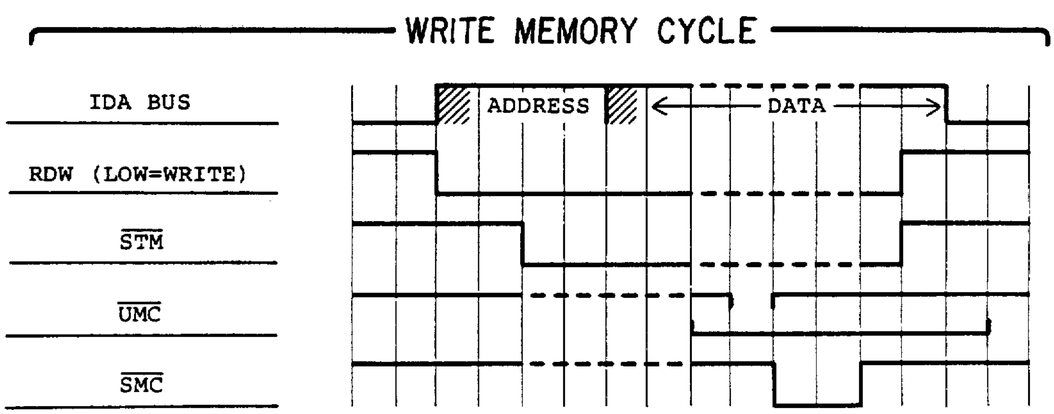

FIG. 50 is a simplified waveform diagram illustrating a write cycle performed by the LPU and PPU of FIG. 43.

Figure 51:
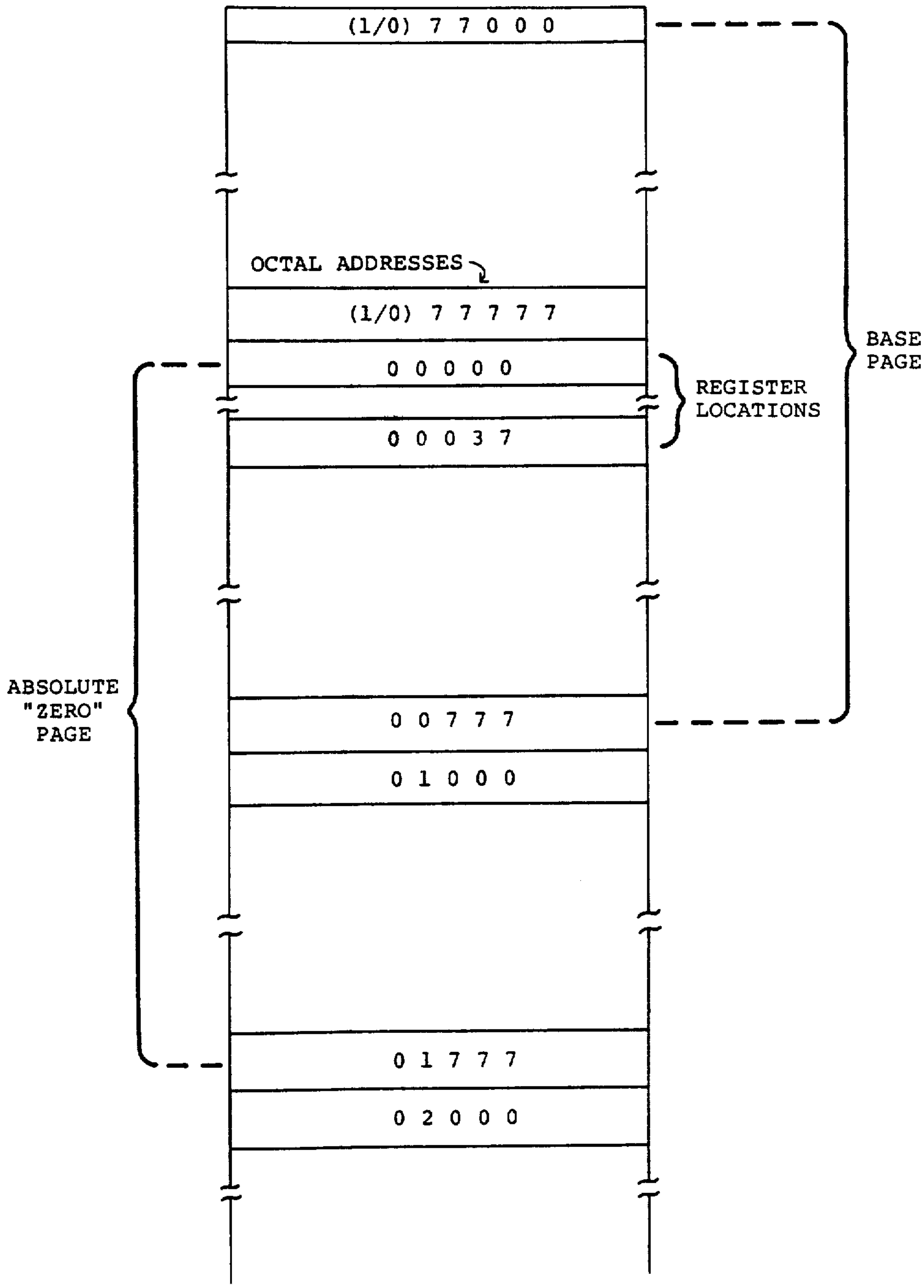

FIG. 51 is a memory map illustrating the memory location of the base page for each of the LPU and PPU of FIG. 43.

Figure 52:
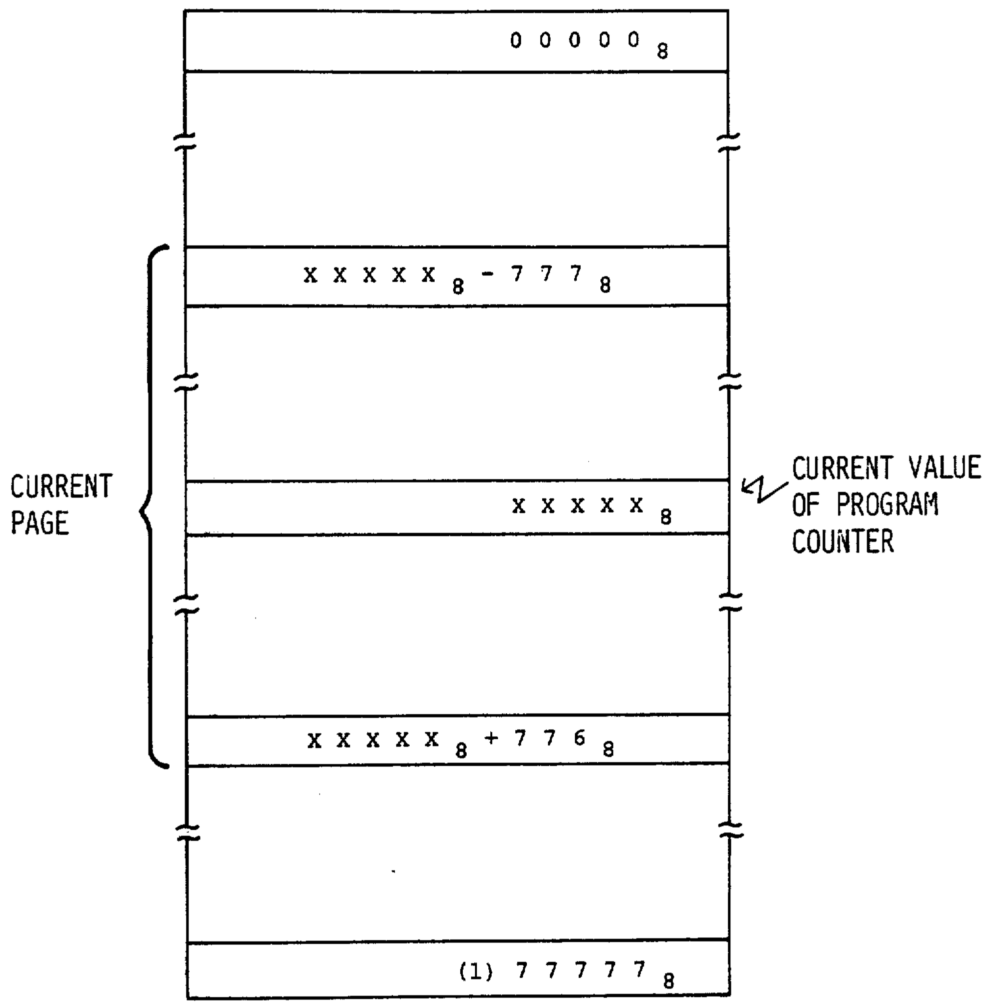

FIG. 52 is a diagram illustrating the manner in which the LPU and PPU of FIG. 43 perform current page memory references.

Figure 53:
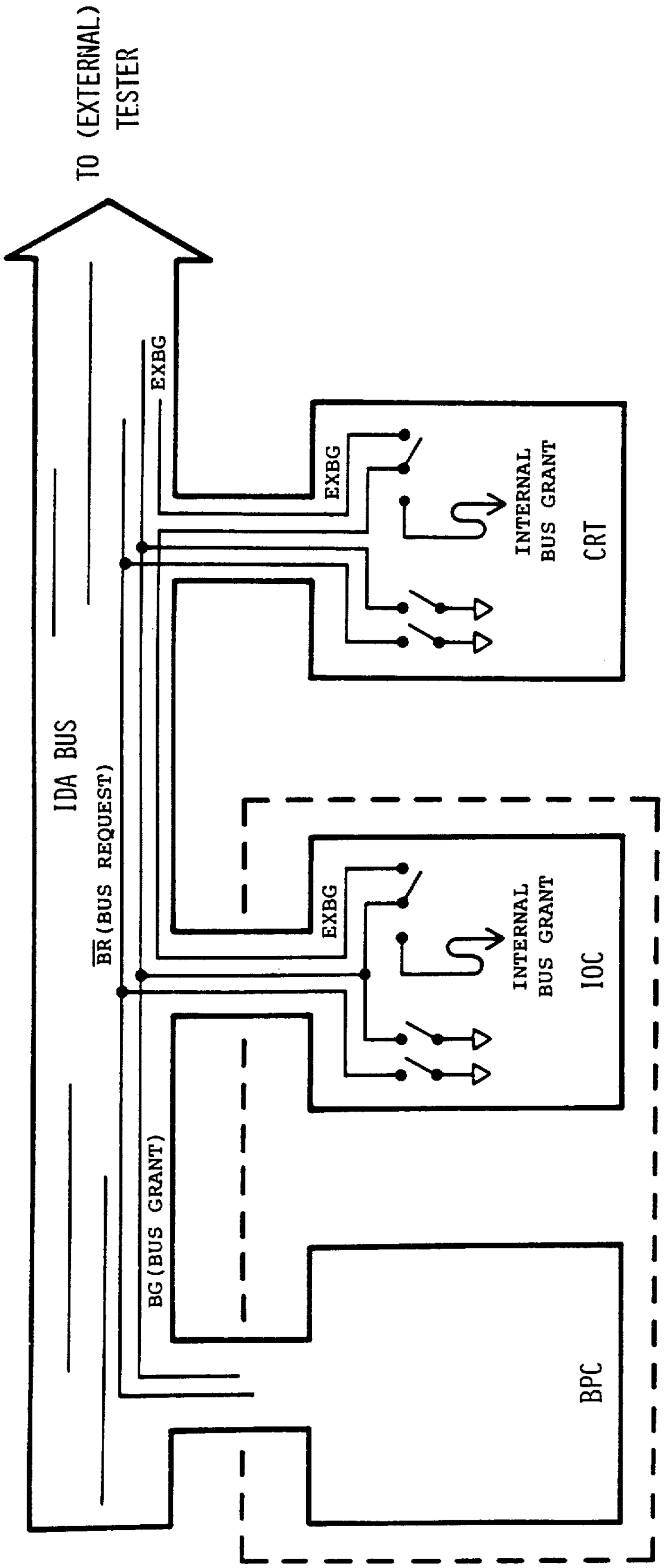

FIG. 53 is a diagram illustrating the use of the bus request, bus grant, and extended bus grant signals associated with the PPU of FIG. 43.

Figure 54:
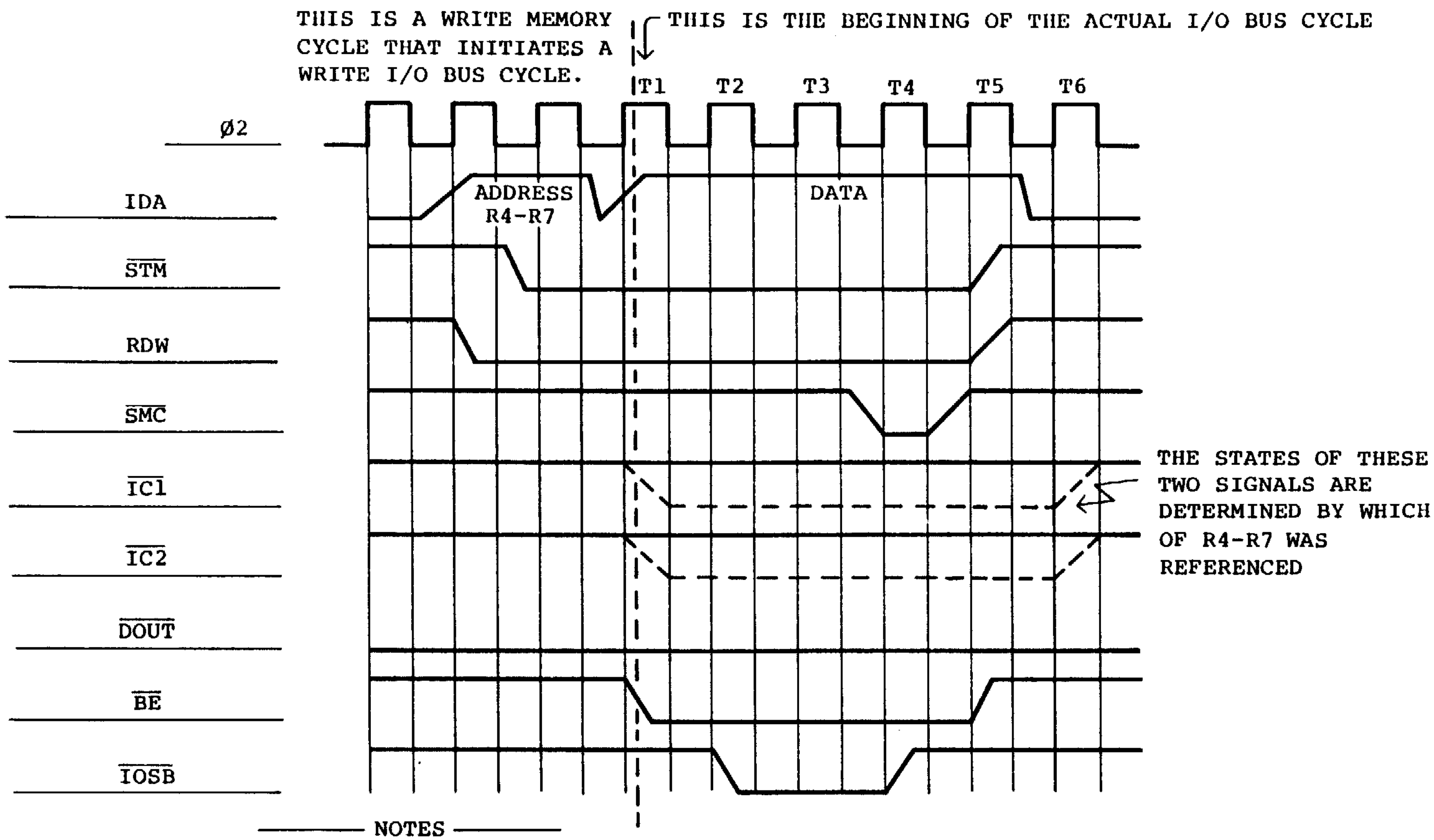

FIG. 54 is a simplified waveform diagram illustrating a write I/O bus cycle associated with the PPU of FIG. 43.

Figure 55:
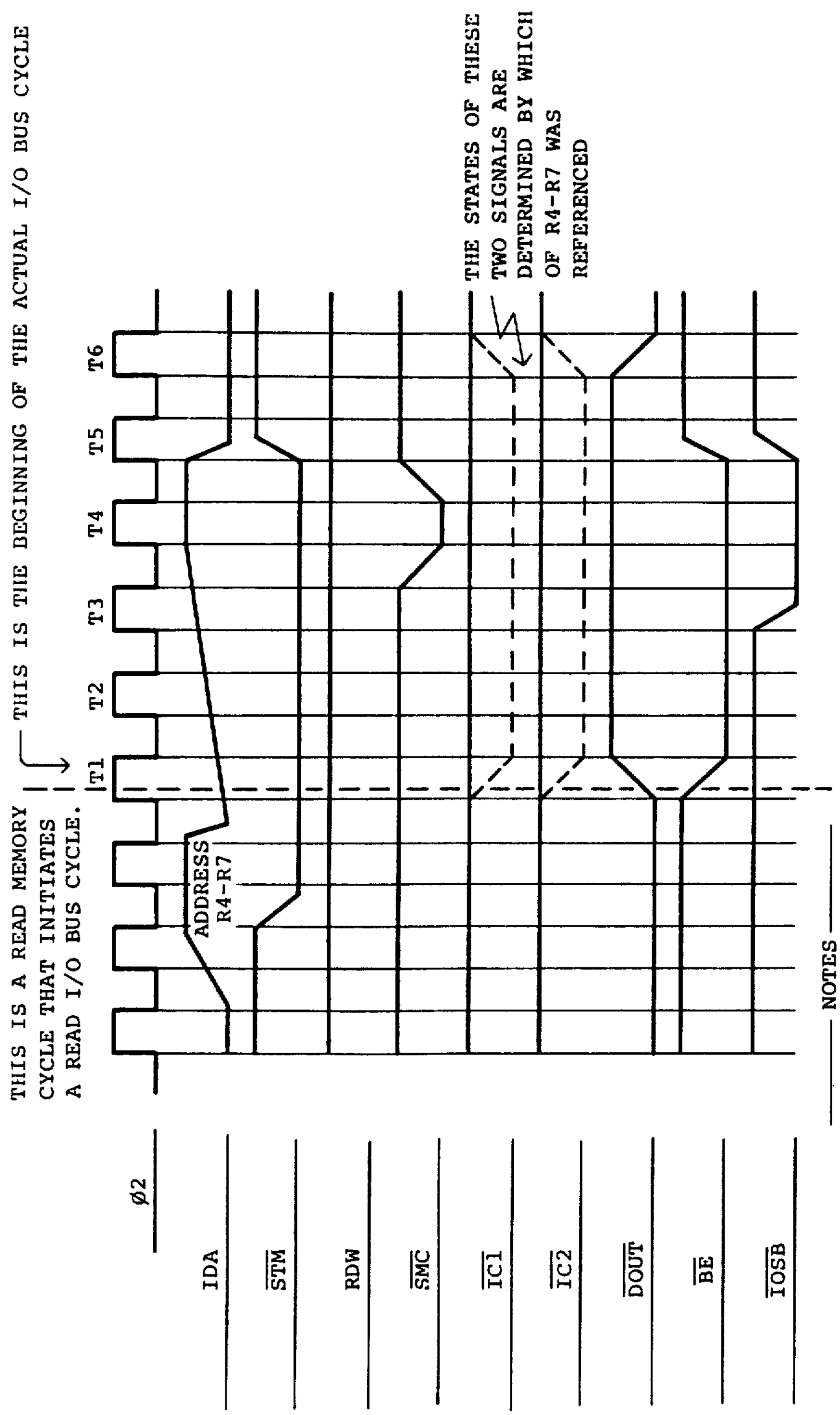

FIG. 55 is a simplified waveform diagram illustrating a read I/O bus cycle associated with the PPU of FIG. 43.

Figure 56:
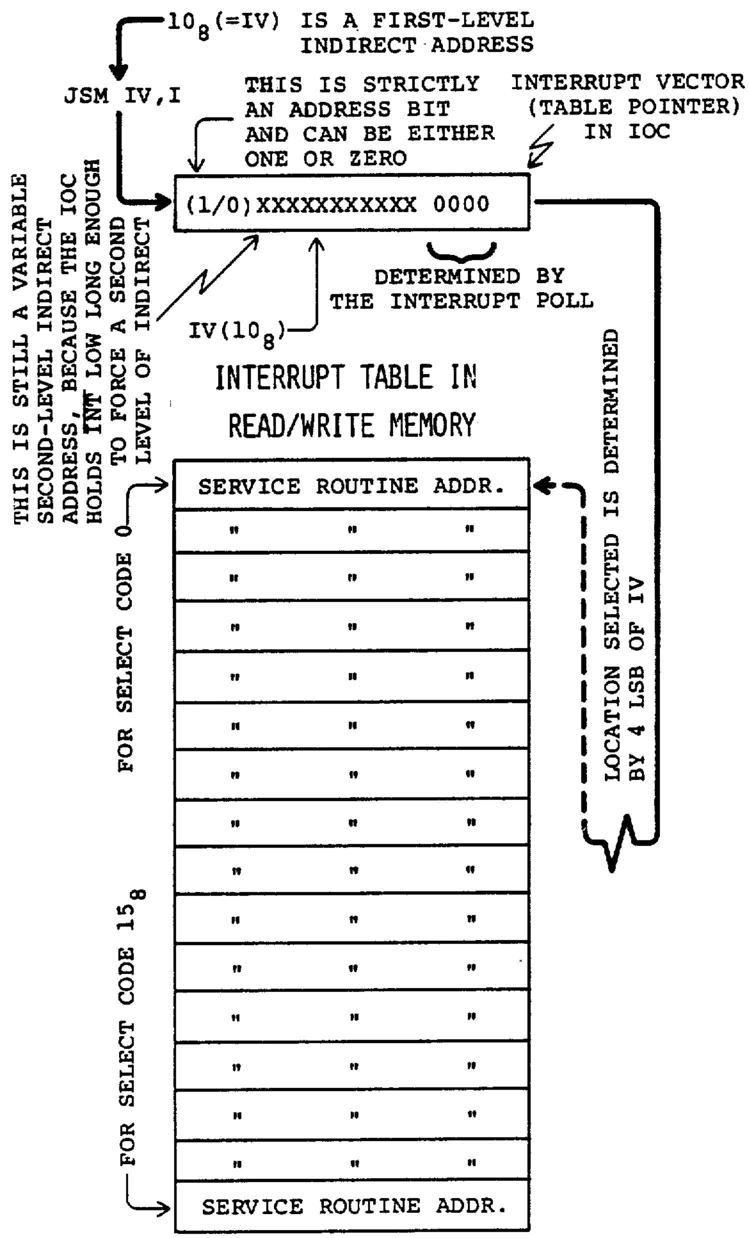

FIG. 56 is a diagram illustrating the connection between the interrupt vector and the interrupt table associated with the PPU of FIG. 43.

Figure 57:
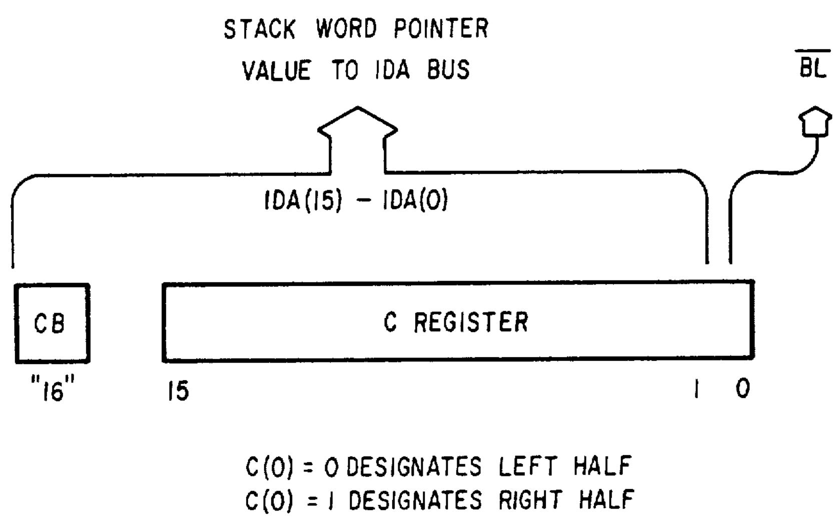

FIG. 57 is a diagram illustrating the way in which memory may be addressed on a byte-by-byte basis in connection with operation of the IOC's of FIG. 43.

FIG. 58 is an illustration of the format used within the calculator to encode full precision floating point numbers.

Figure 59:
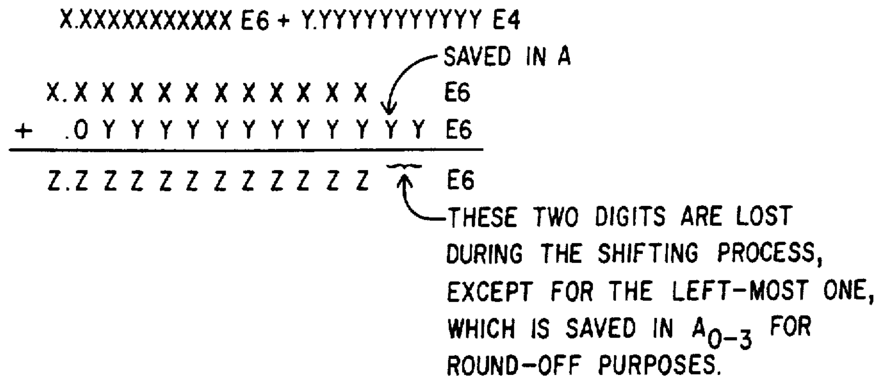

FIG. 59 is a diagram illustrating the function of the MRX and MRY machine instructions of the EMC associated with the LPU of FIG. 43.

Figure 60:
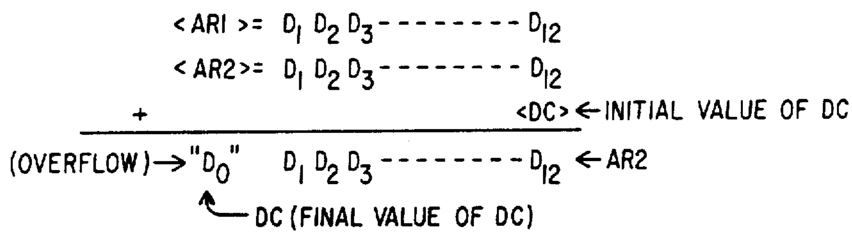

FIG. 60 is a diagram illustrating the function of the FXA machine instructions of the EMC associated with the LPU of FIG. 43.

Figure 61:
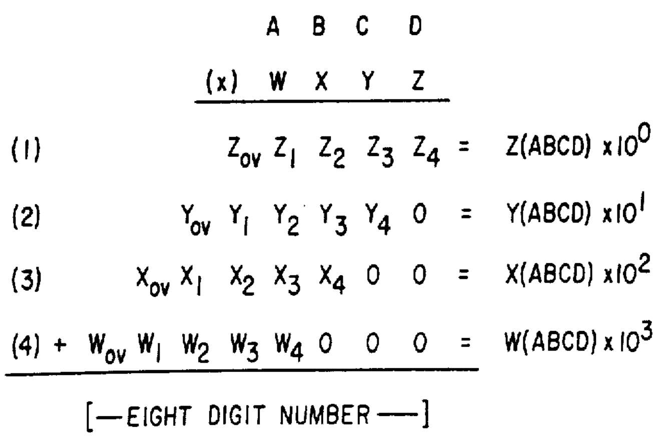

FIG. 61 is a diagram illustrating the general manner in which floating point multiplication is performed using the FMP machine instruction of the EMC associated with the LPU of FIG. 43.

Figures 62, 63, 64, 65:
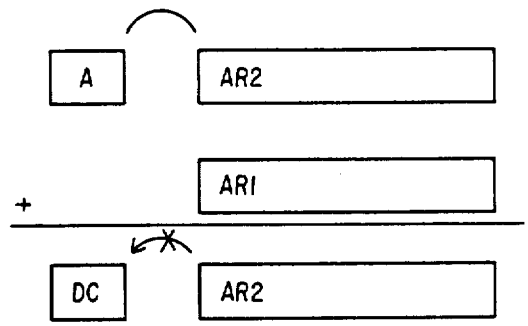

FIG. 62 is a diagram illustrating the general type of procedure employed in conjunction with the FDV machine instruction of the EMC associated with the LPU of FIG. 43 to perform floating point division.

FIG. 63 is a diagram illustrating a condition encountered during the performance of floating point division in accordance with FIG. 62.

FIGS. 64 and 65 are diagrams illustrating the procedure for dealing with the condition illustrated in FIG. 63.

FIGS. 66A-C are an example listing of a floating point divide routine in accordance with FIGS. 62-65.

FIG. 67 explains the conventions used in FIGS. 68A-C, 69A-B, and 70A-D.

FIGS. 68A-D are diagrams depicting the machine instruction set employed by the BPC's of FIG. 43.

FIGS. 69A-B are diagrams depicting the machine instruction set employed by the IOC's of FIG. 43.

FIGS. 70A-D are diagrams depicting the machine instruction set employed in the EMC of FIG. 43.

FIG. 71 is a tabular diagram illustrating the bit patterns for the machine instruction sets of FIGS. 68A-D, 69A-B, and 70A-D.

Figure 72:
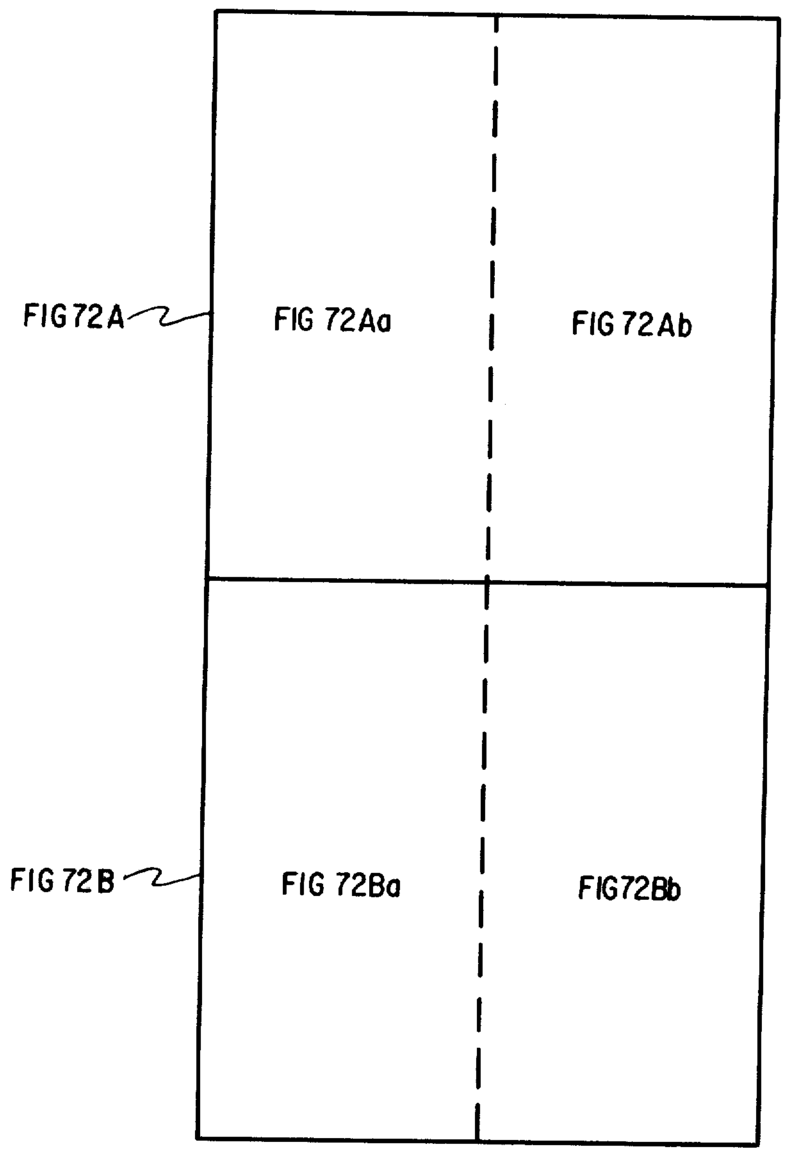
Figure 72A:
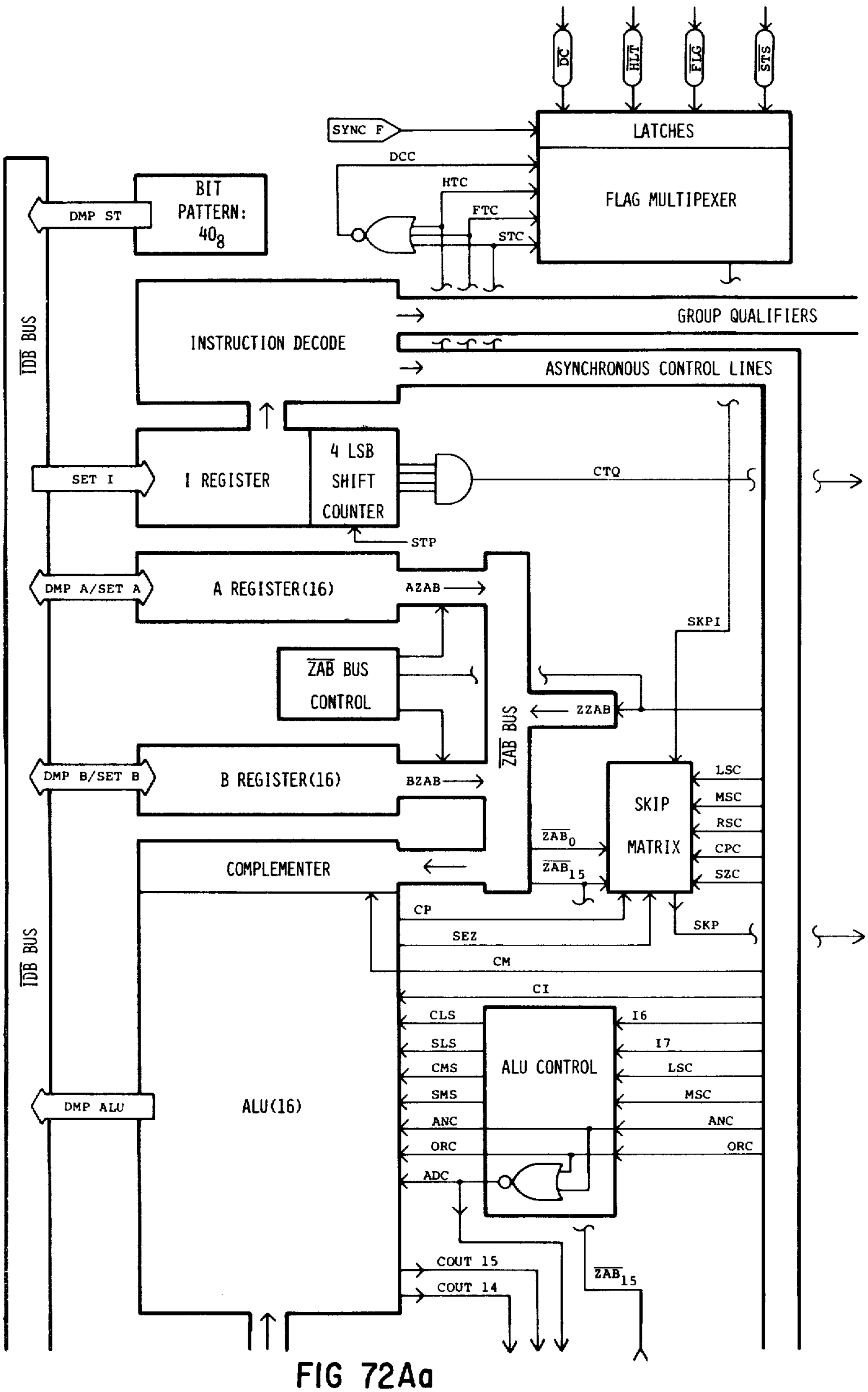
Figure 72A:
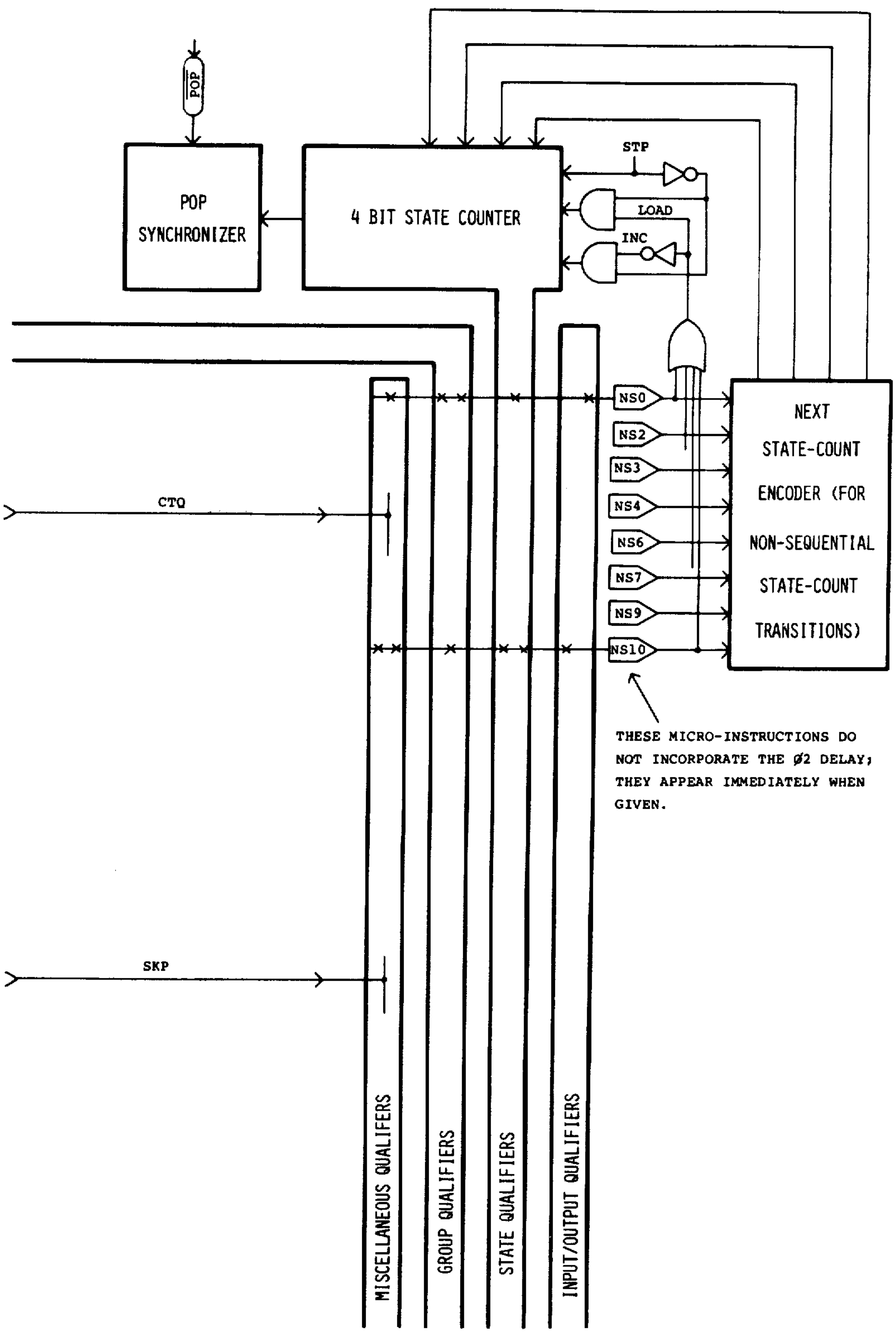
Figure 72B:
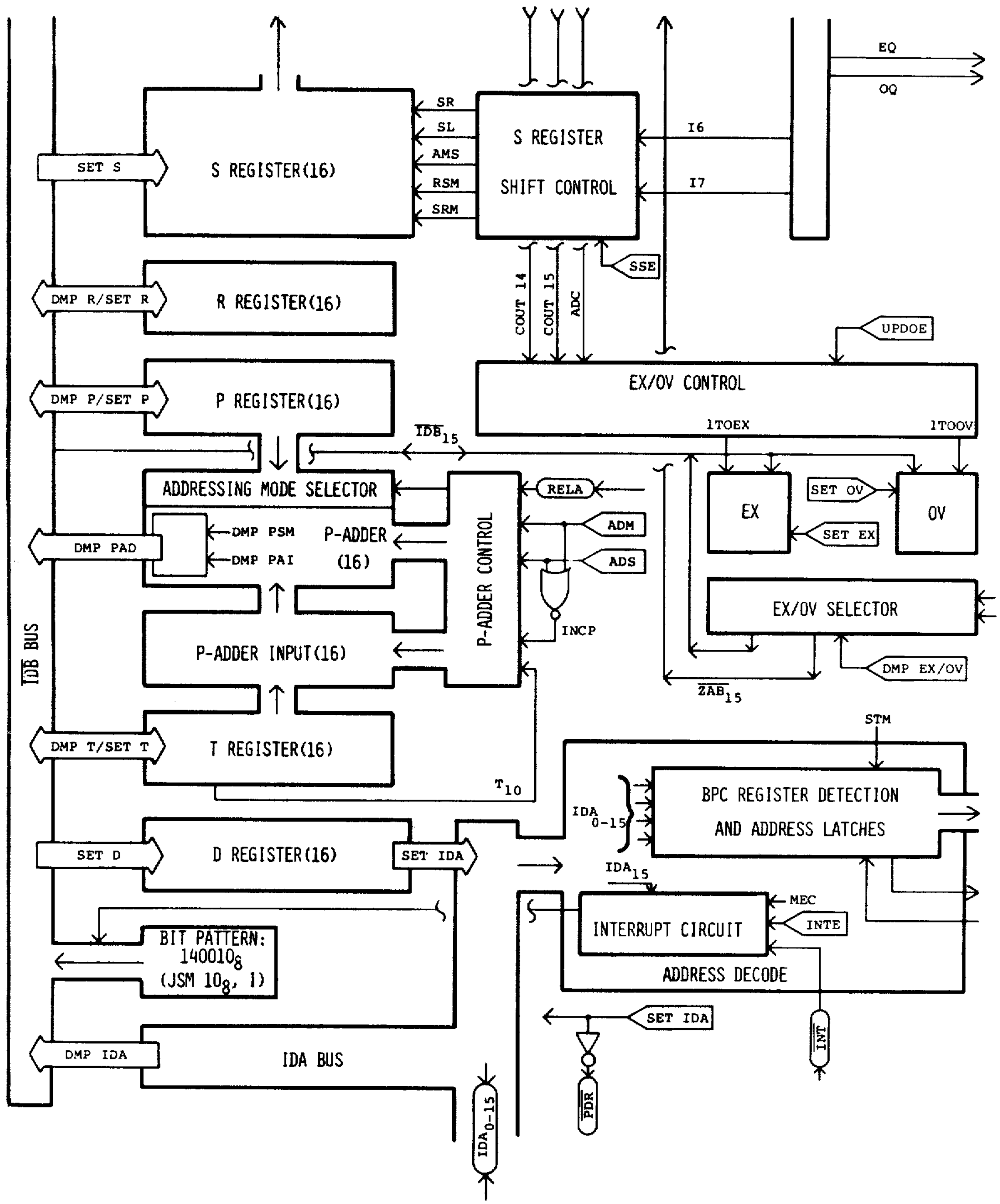
Figure 72B:
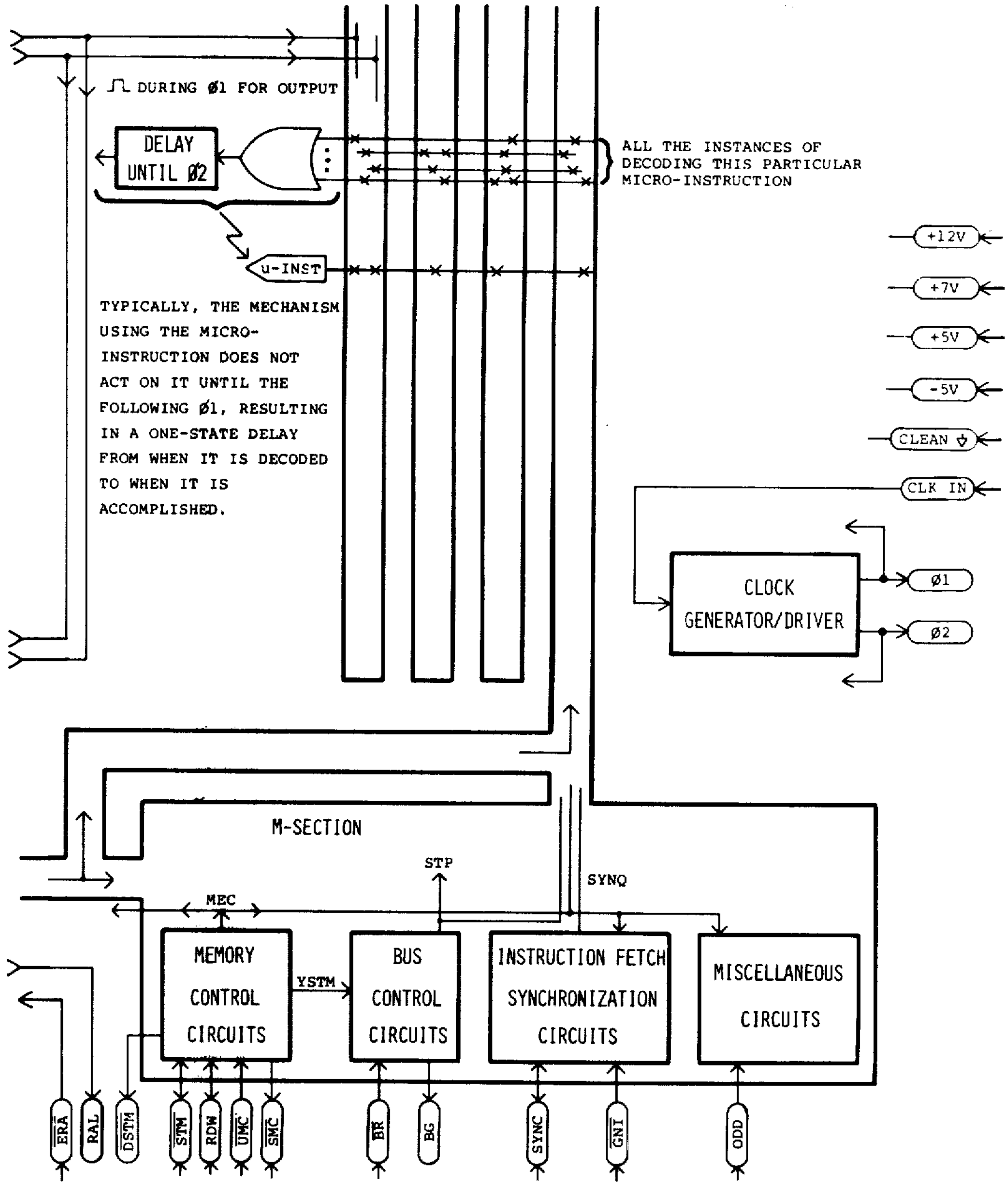

FIG. 72 shows the relationship of FIGS. 72A-B (consisting of FIGS. 72A*a*, 72A*b*, 72B*a* and 72B*b*) which with FIG. 72C represent a block diagram of the BPC's of FIG. 43.

FIGS. 73A-E explain the conventions used in FIGS. 75A-K.

Figure 74:
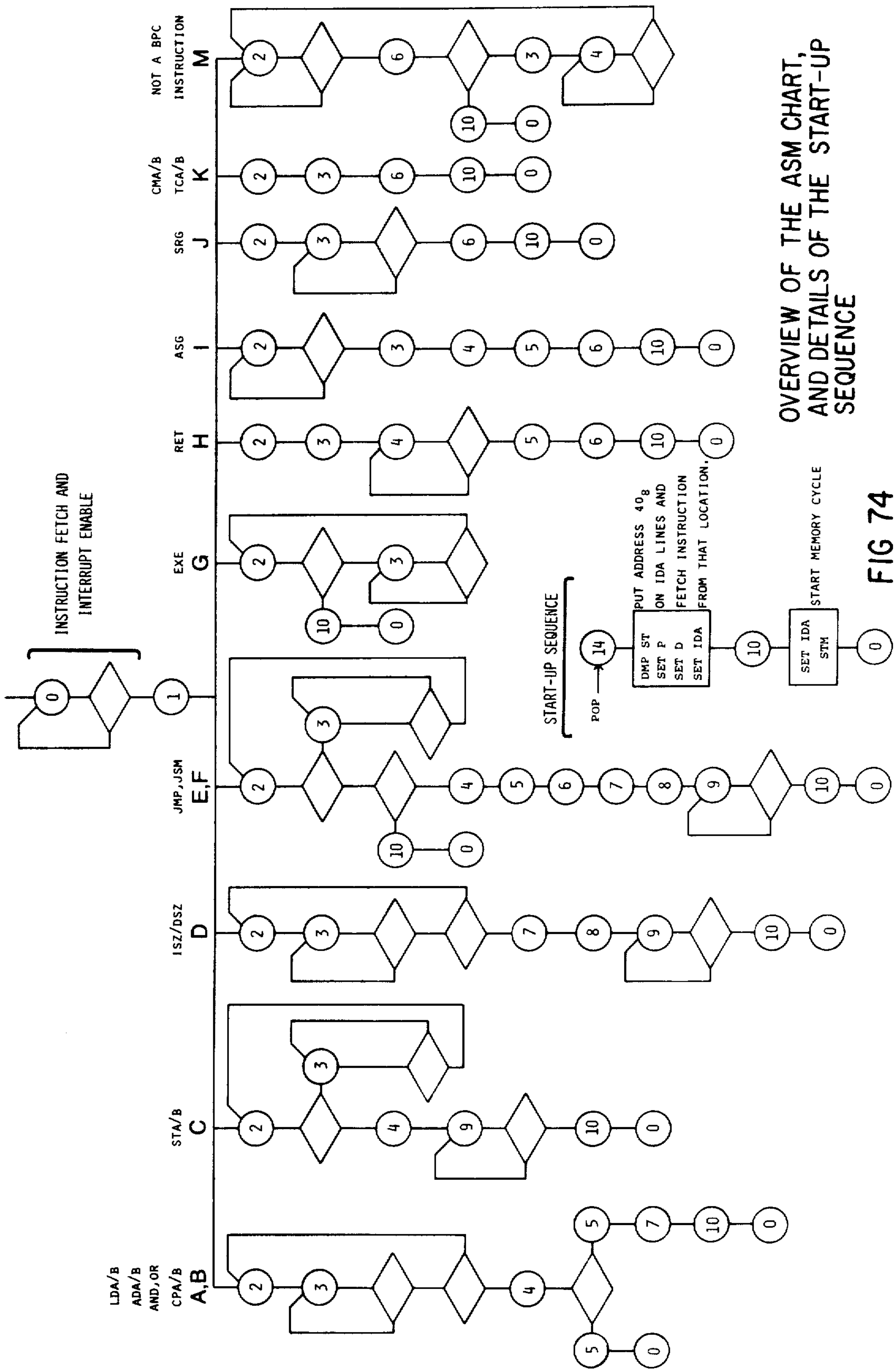
Figure 75A:
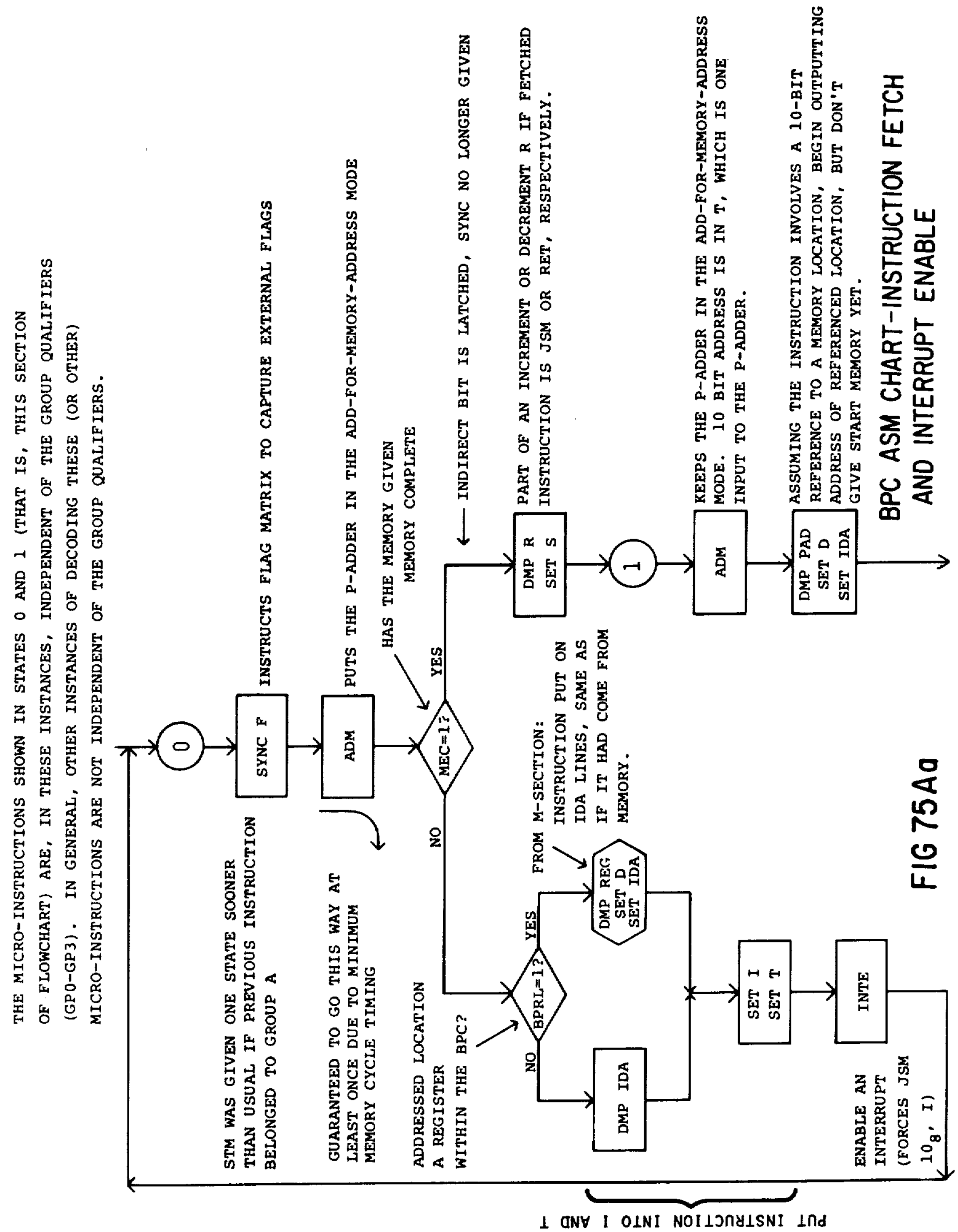
Figure 75A:
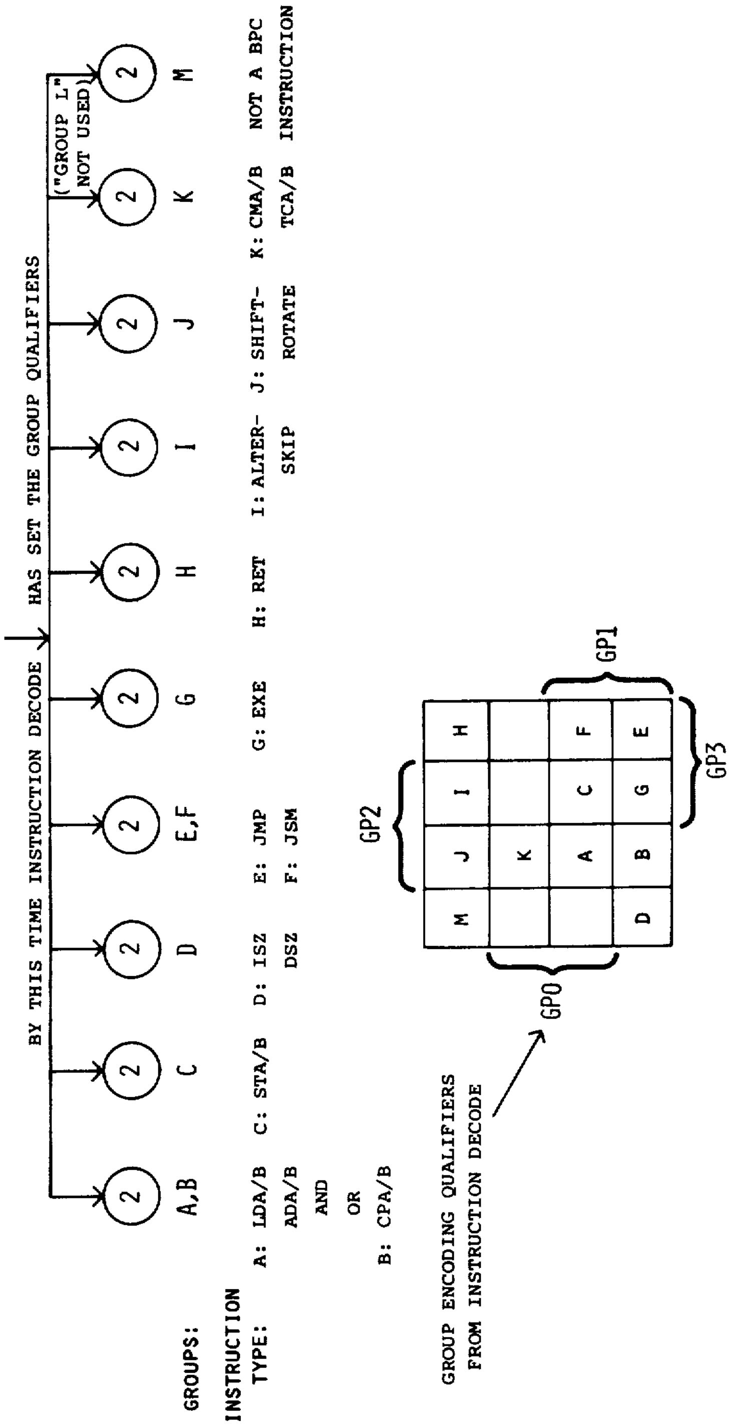
Figure 75B:
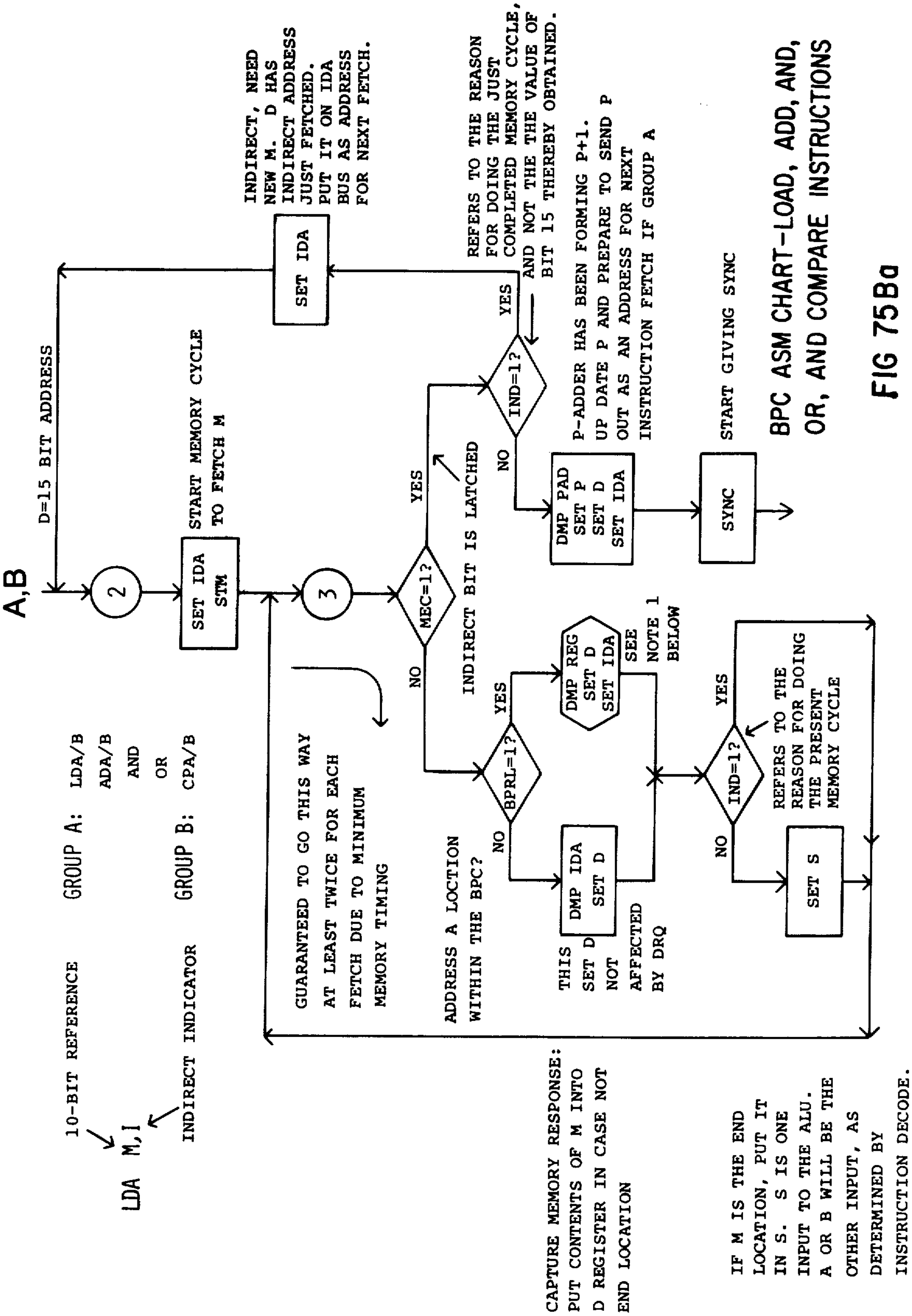
Figure 75B:
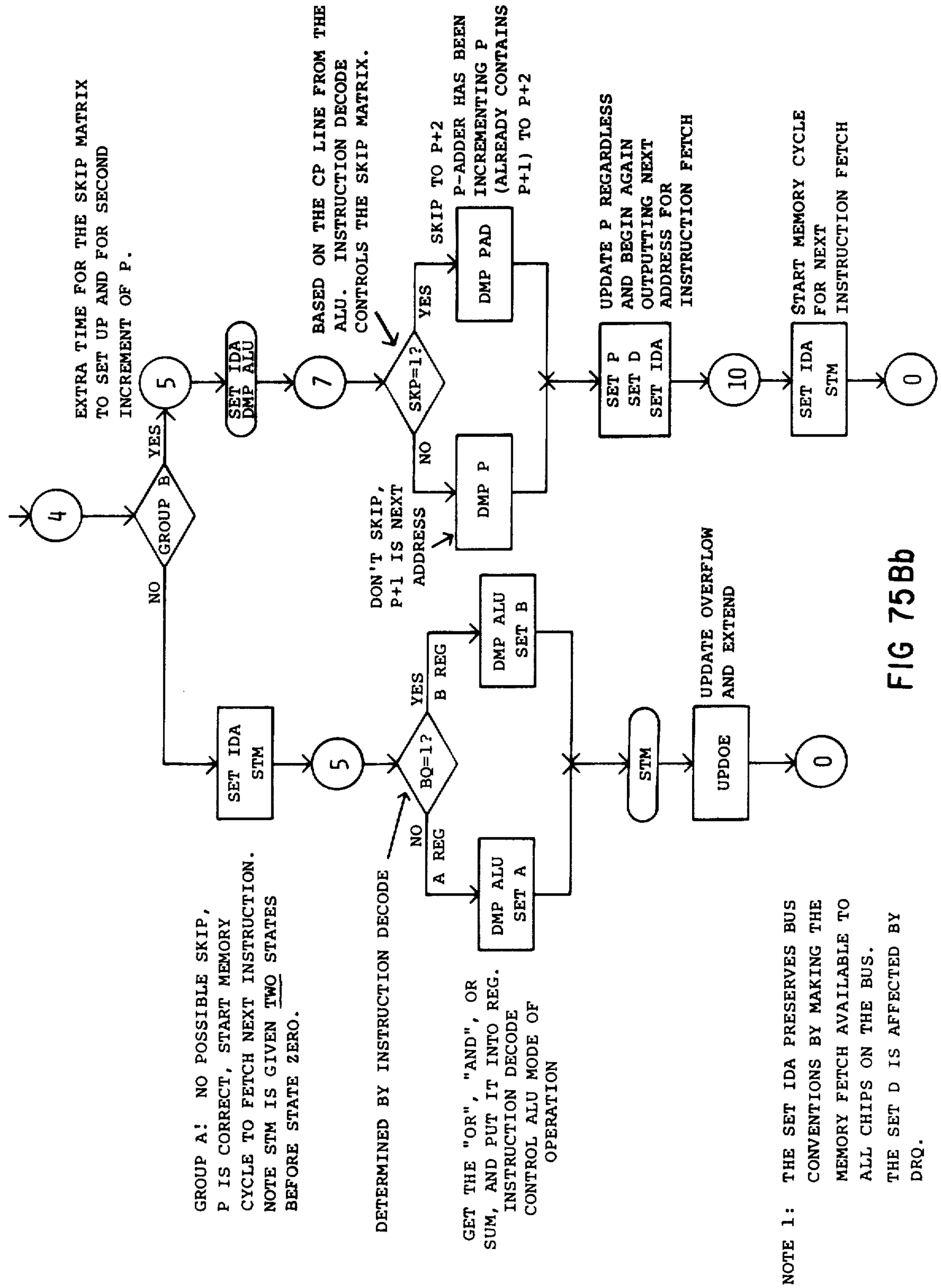
Figure 75C:
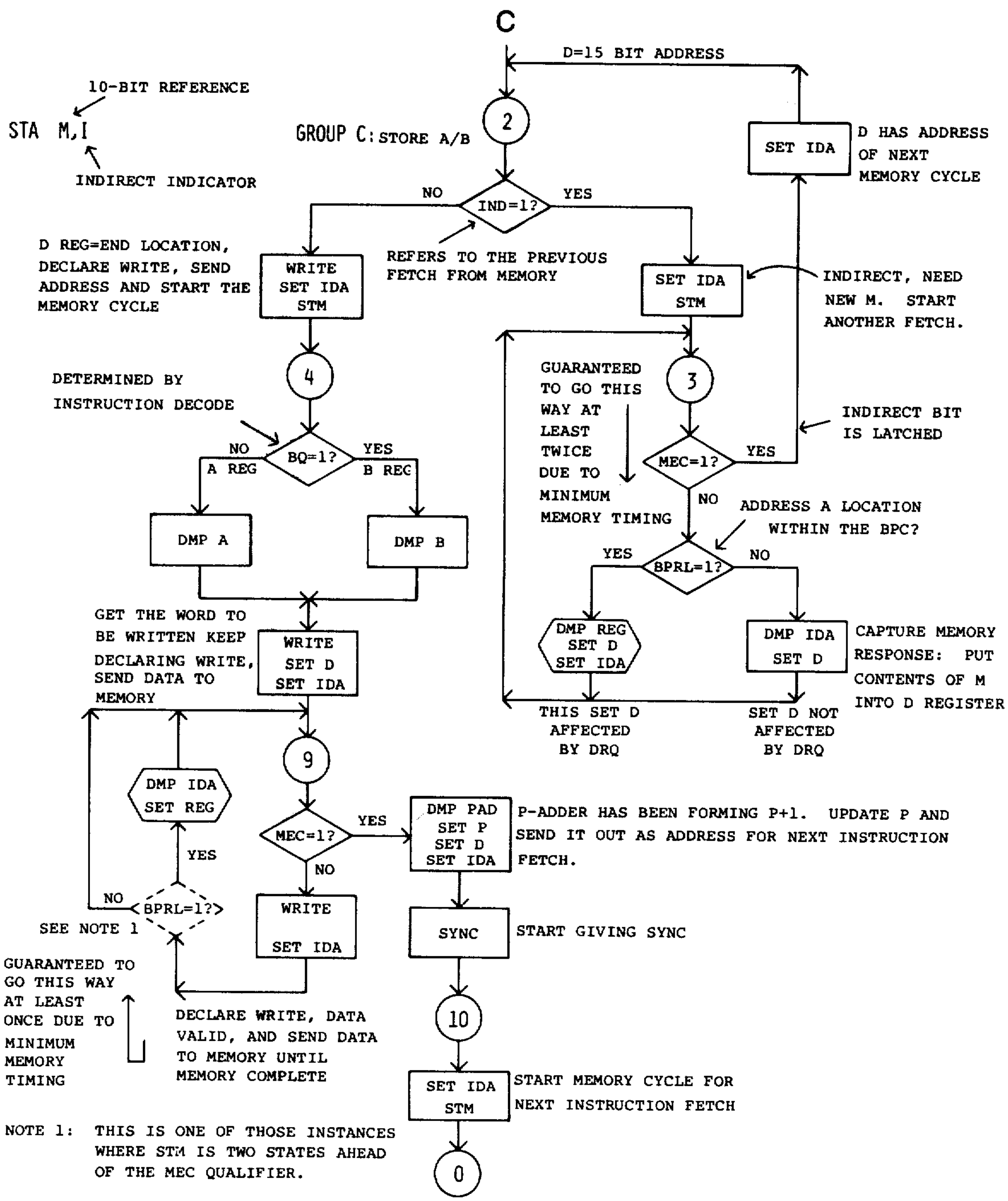
Figure 75D:
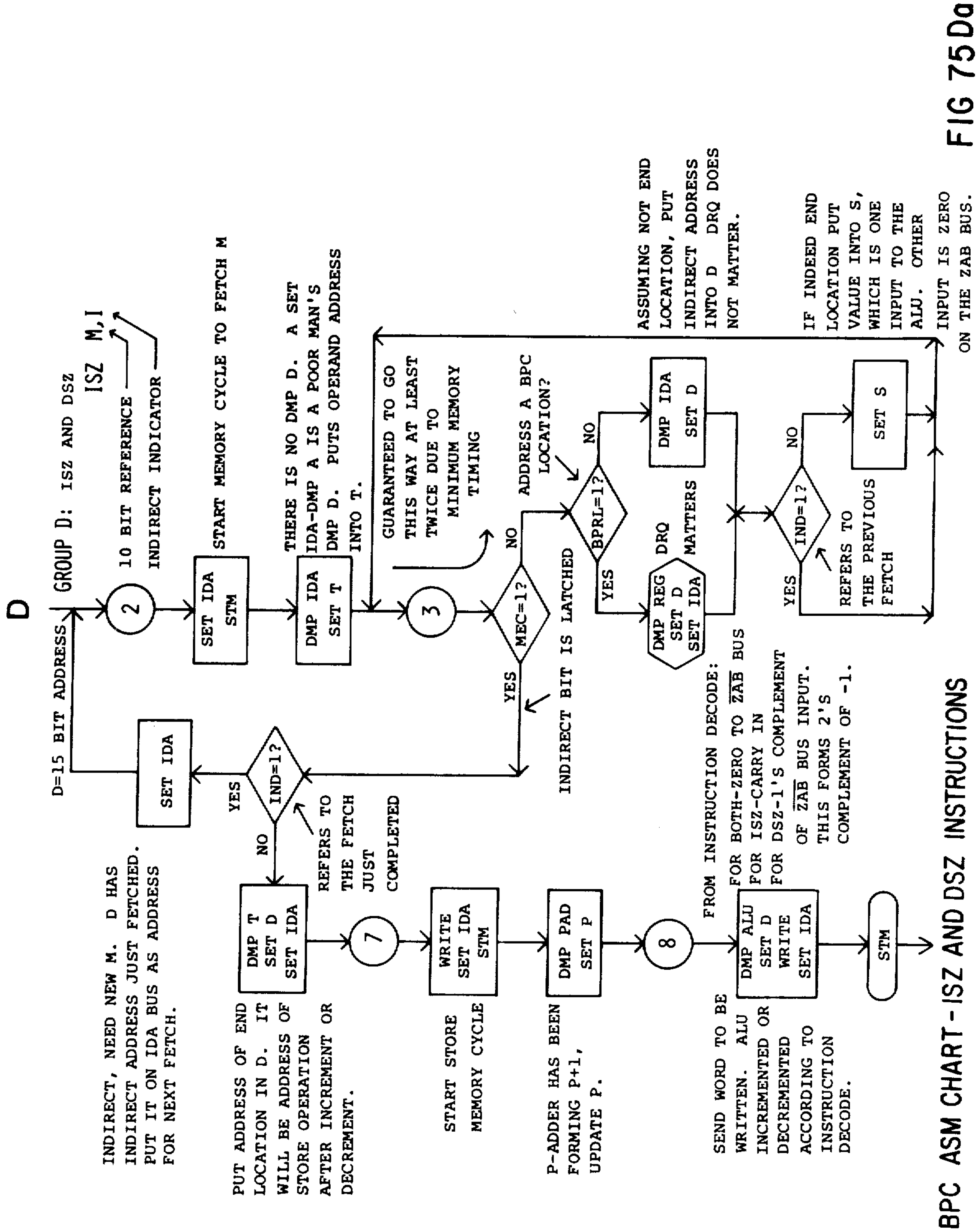
Figure 75D:
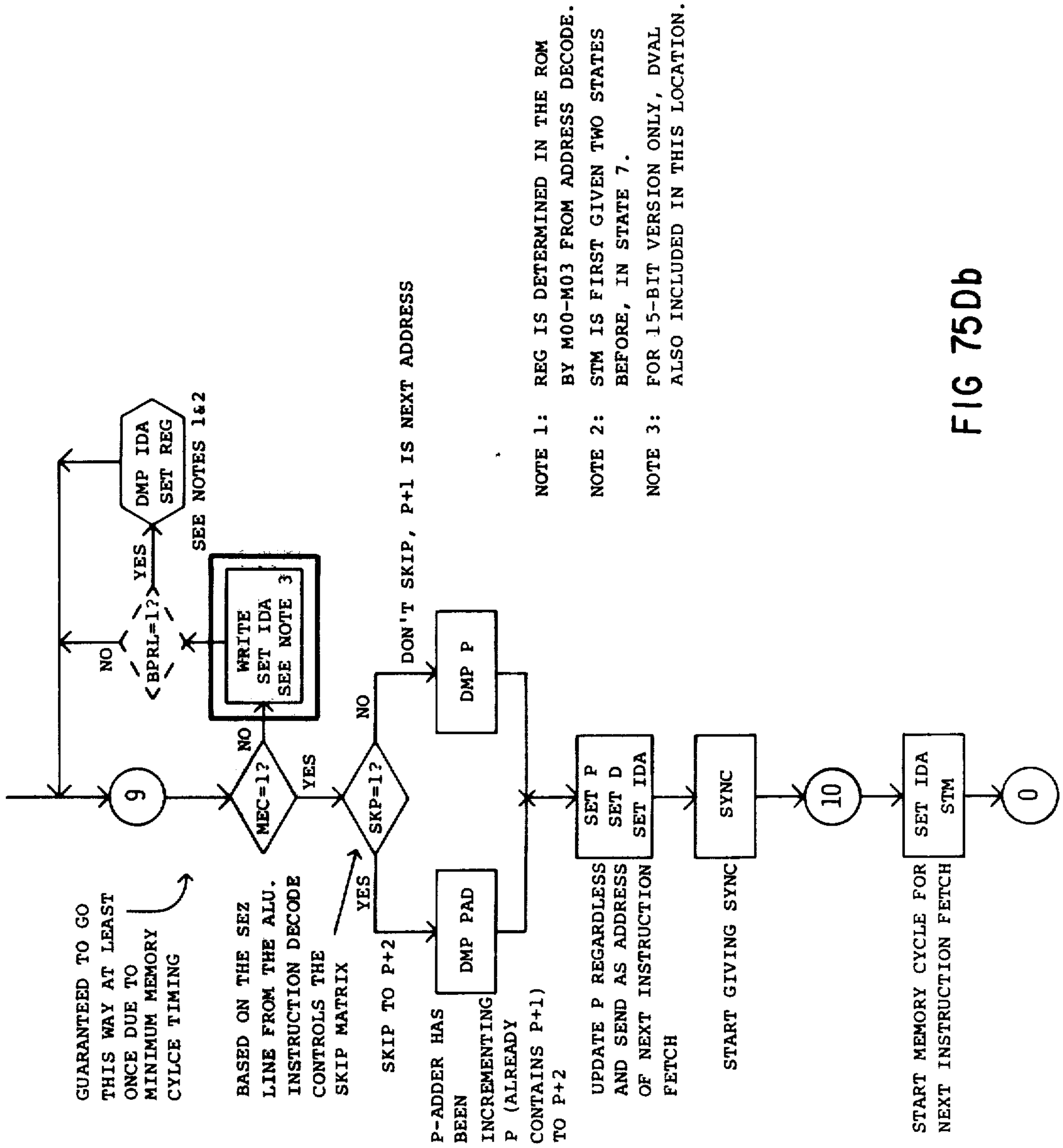
Figure 75E:
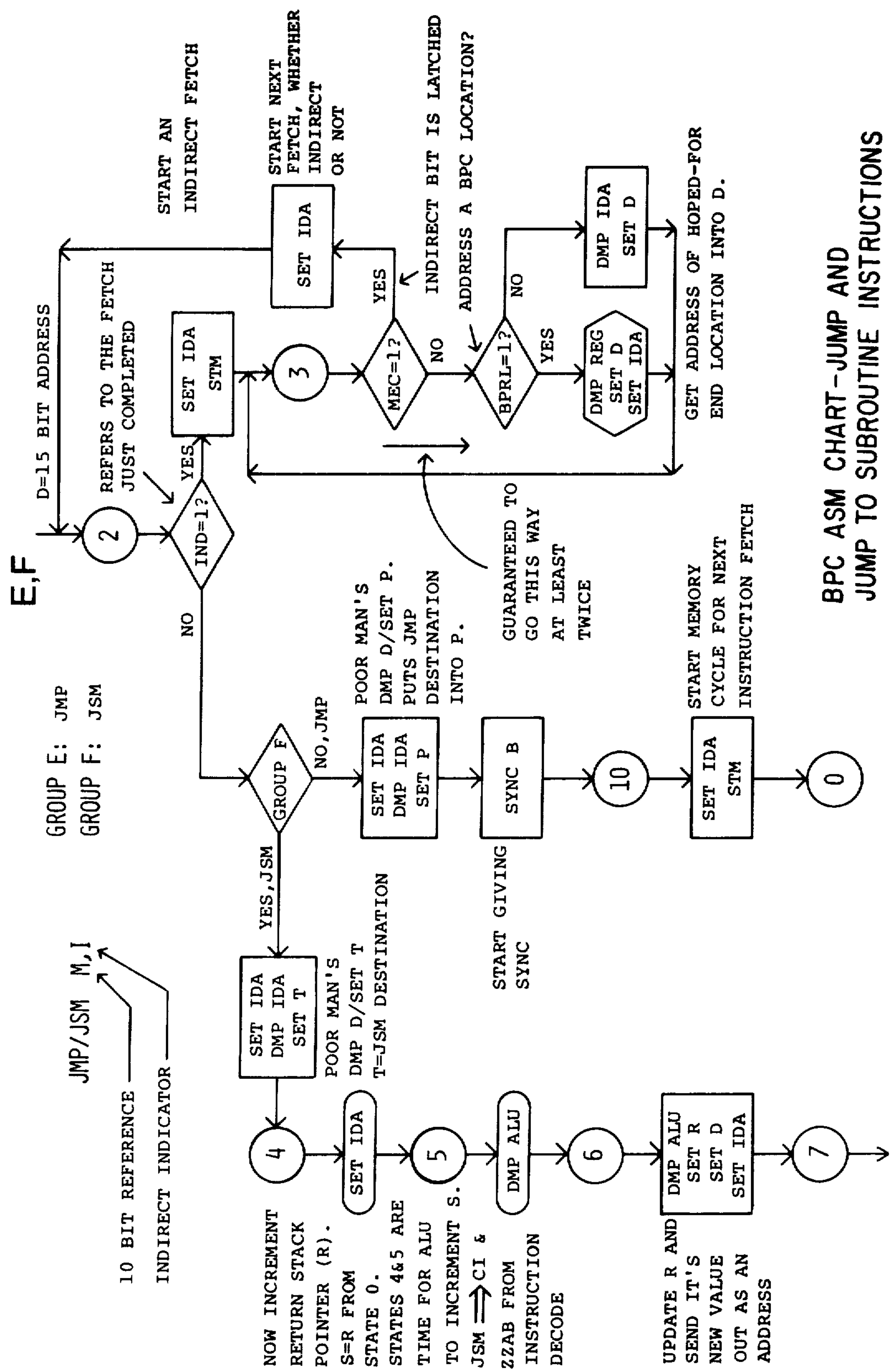
Figure 75E:
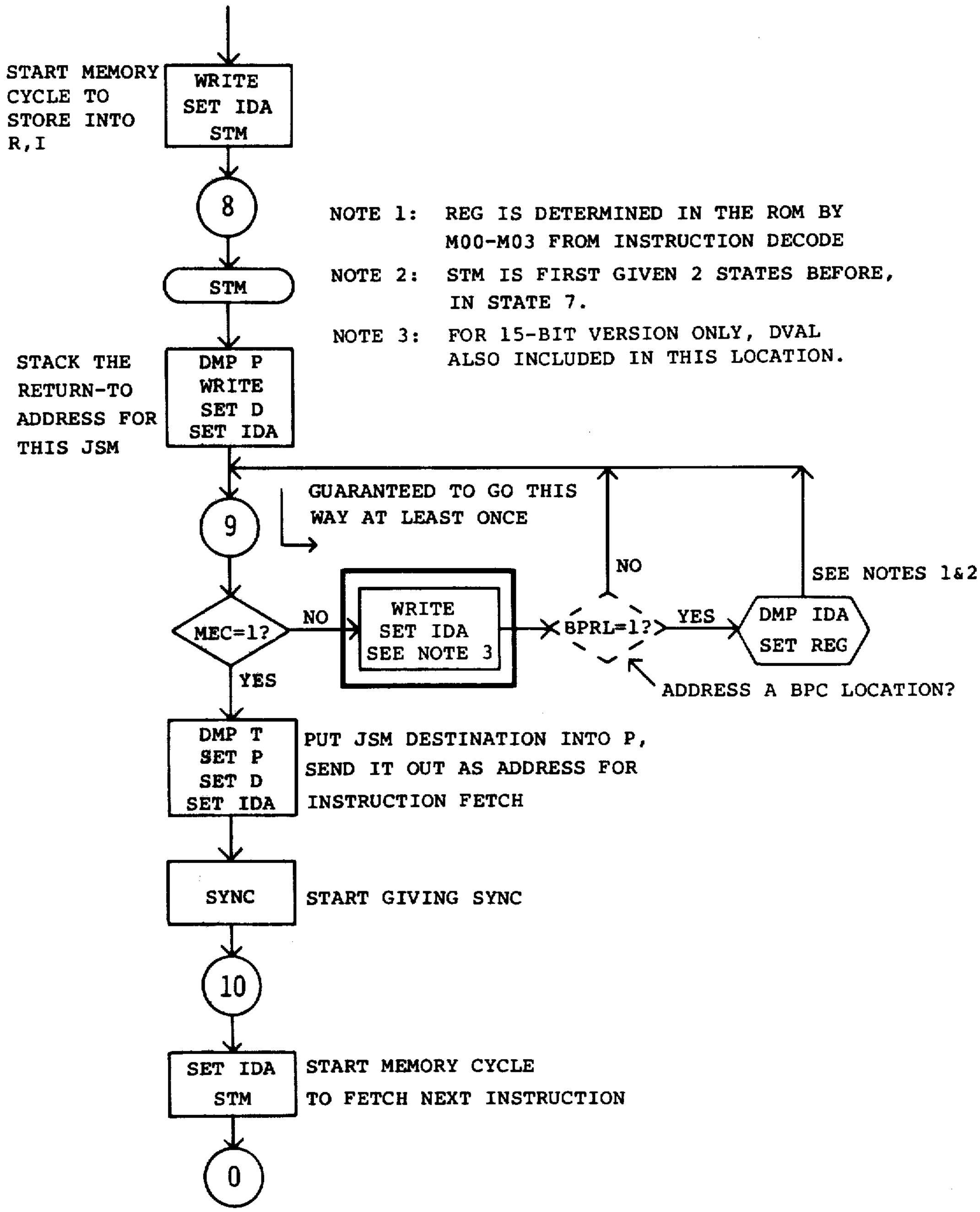
Figure 75F:
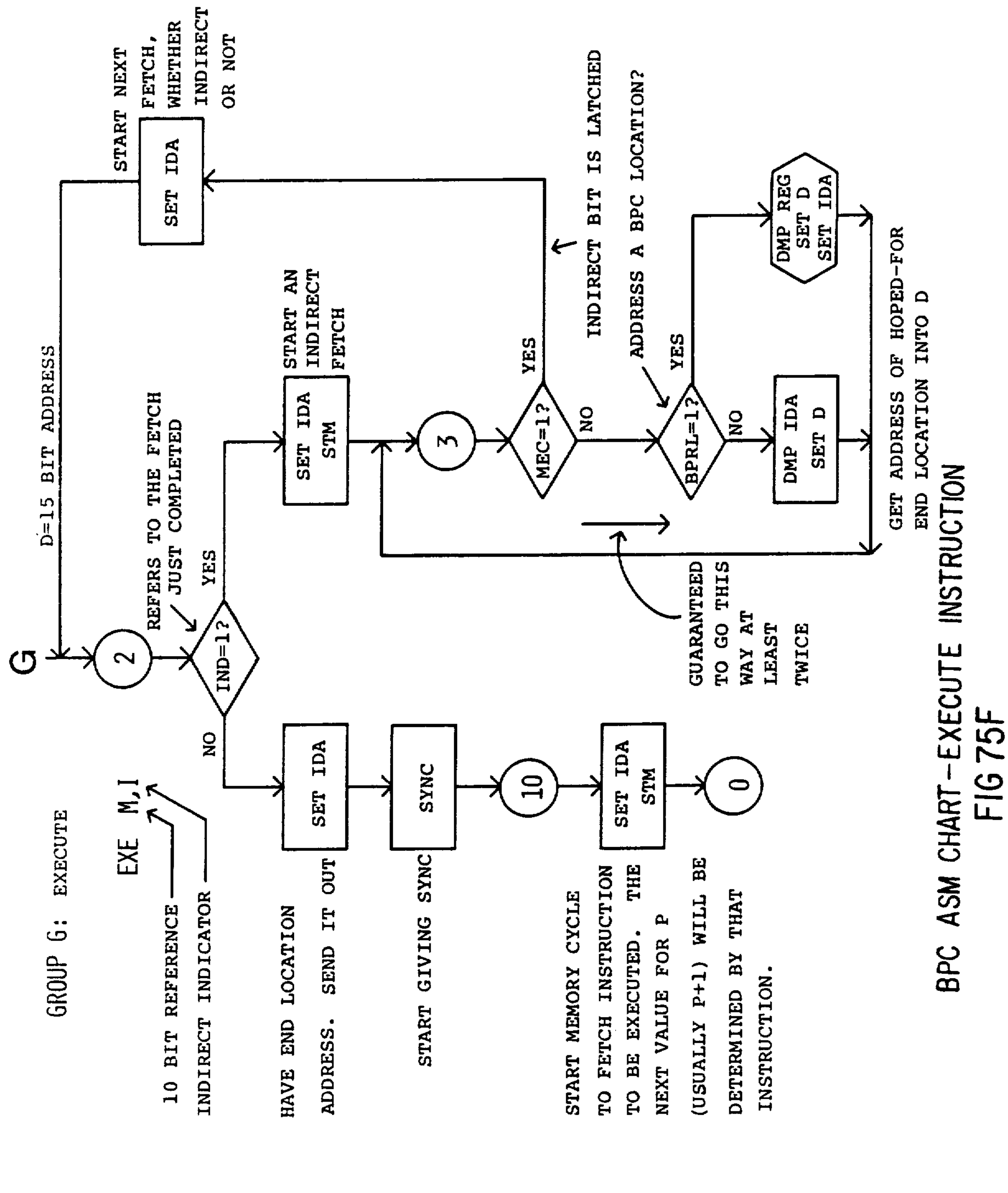
Figure 75G:
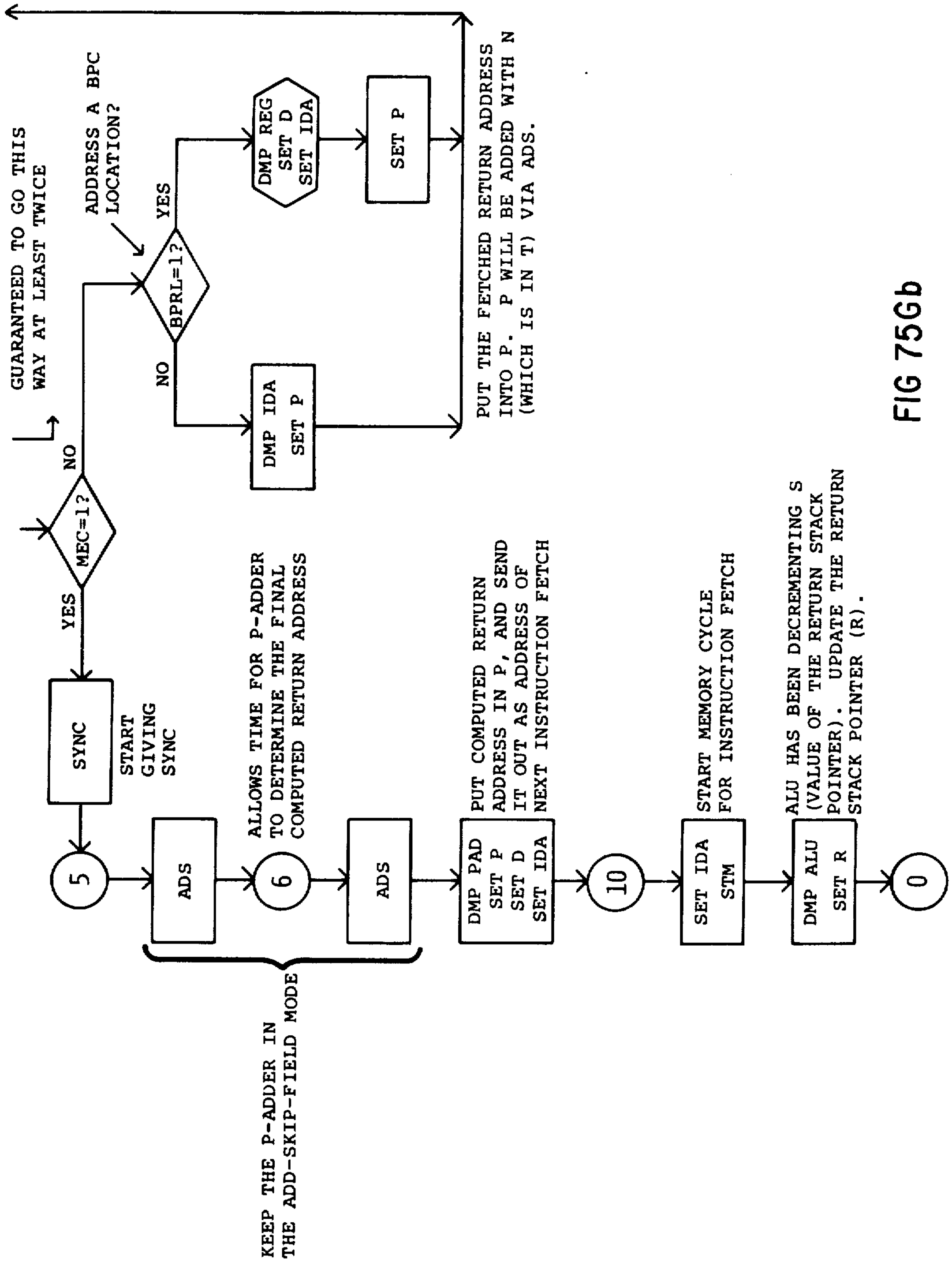
Figure 75H:
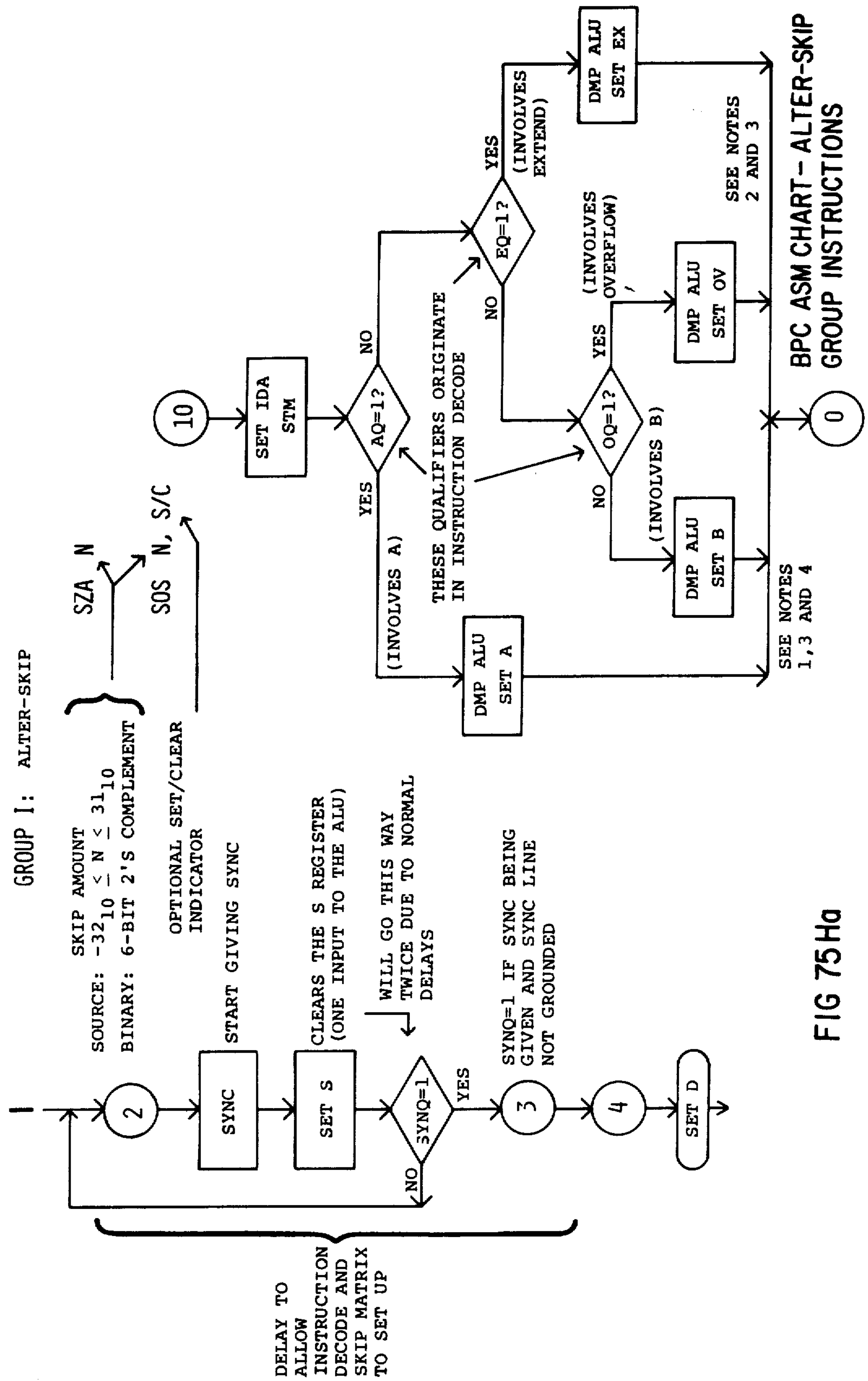
Figure 75I:
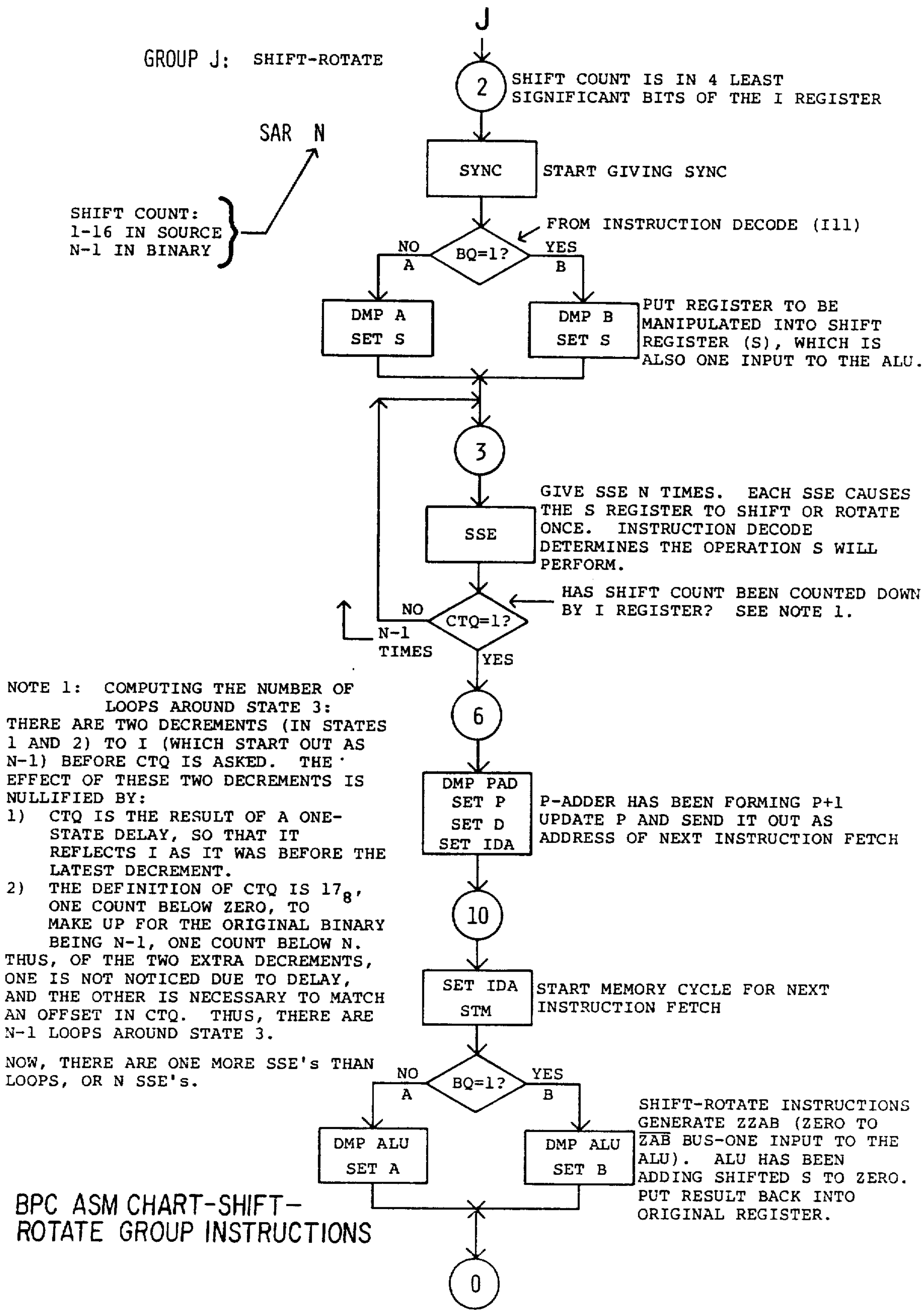
Figure 75:
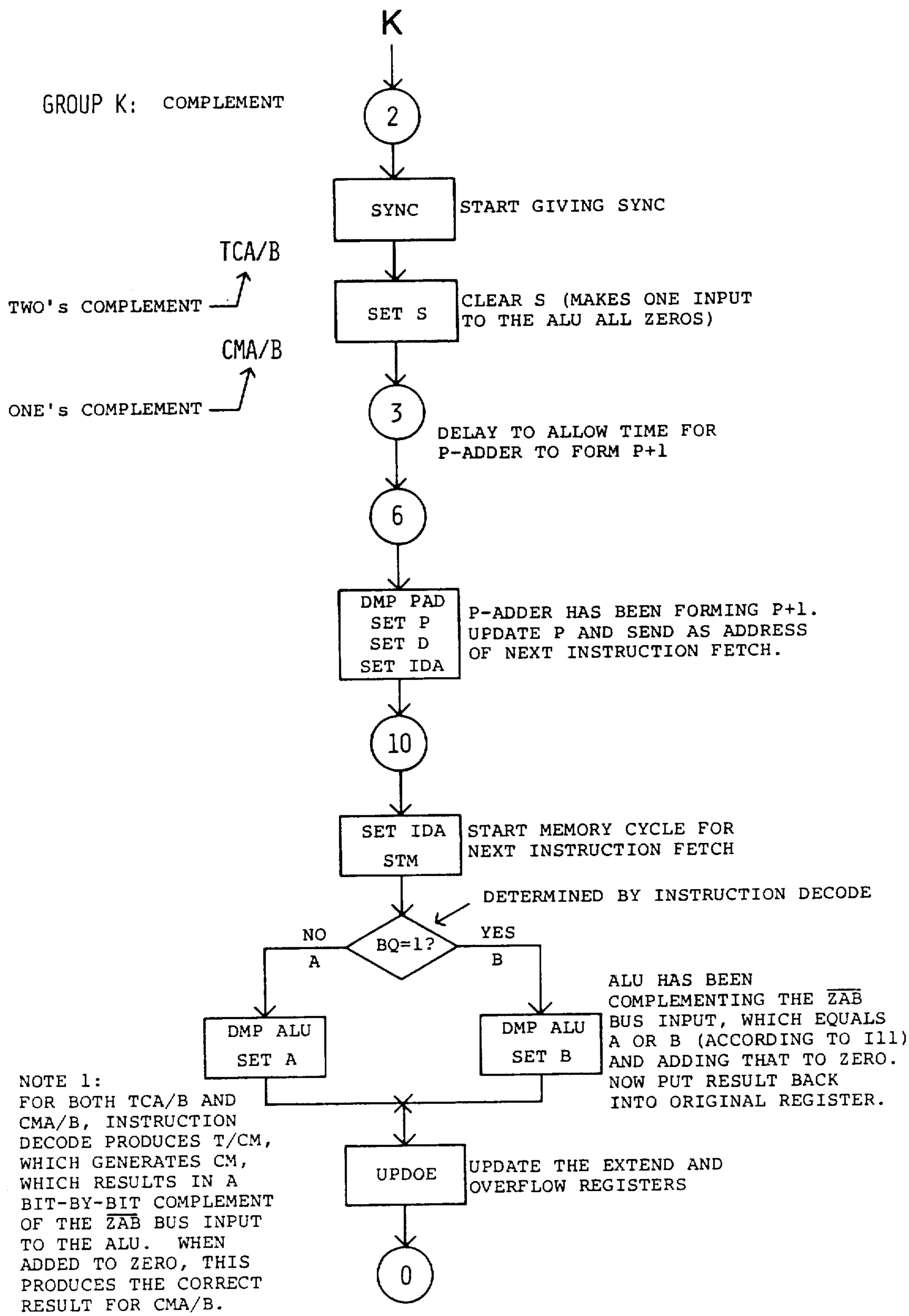
Figure 75K:
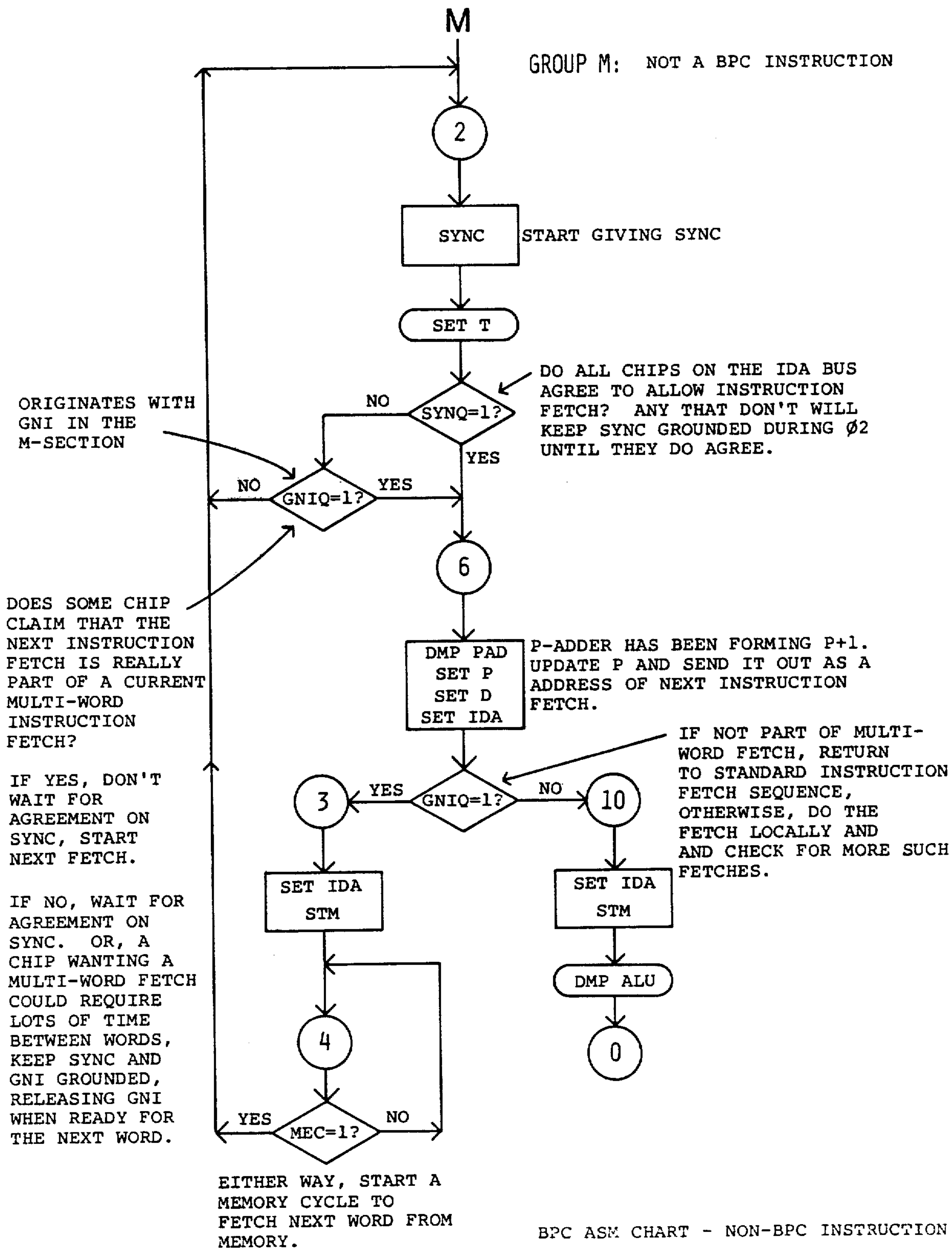

FIG. 74 is a flow chart overview summarizing the information presented in FIGS. 75A-K.

FIGS. 75A-K are flow charts illustrating the operation of the BPC's of FIG. 43.

Figure 76A:
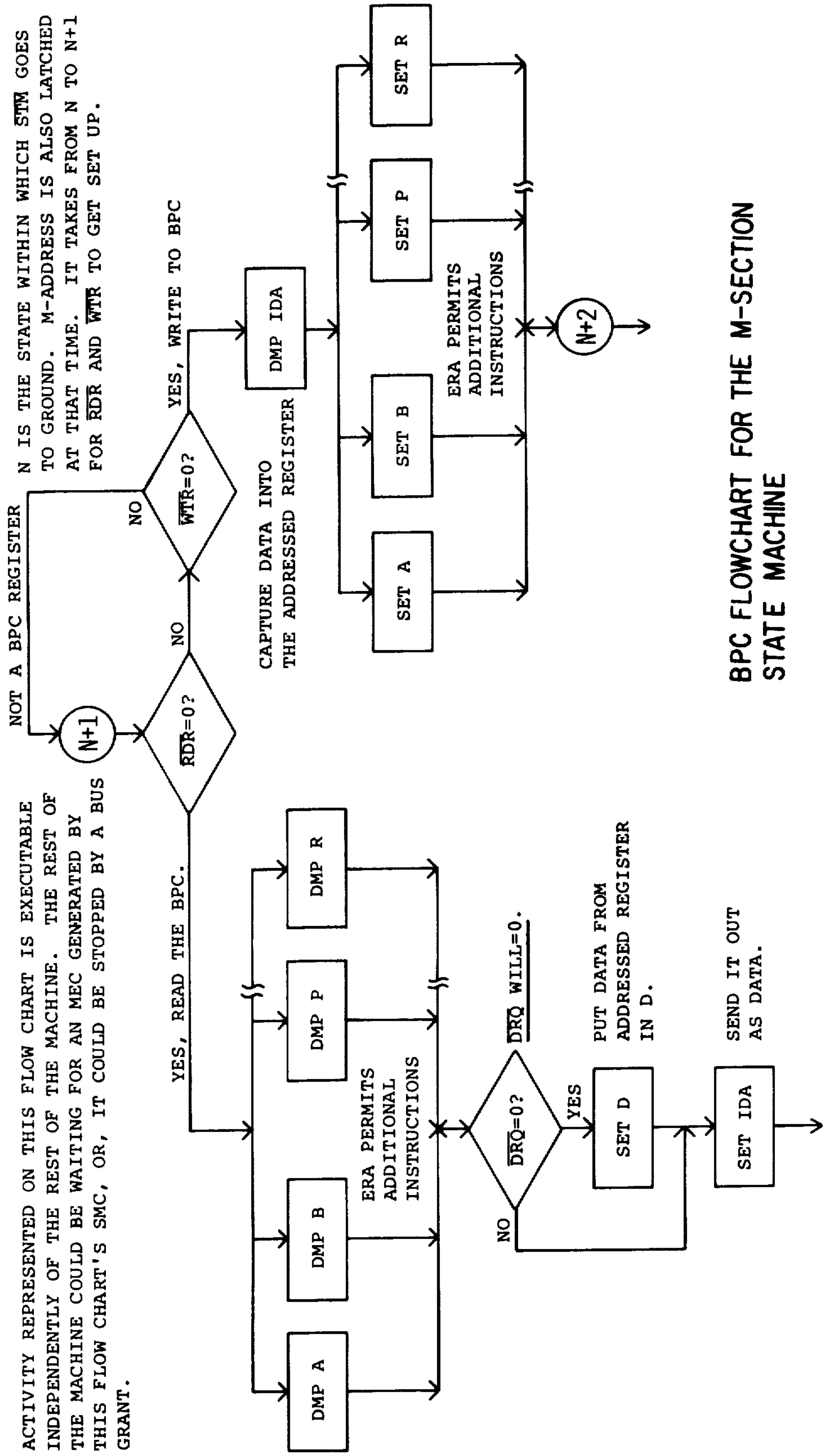
Figure 76A:
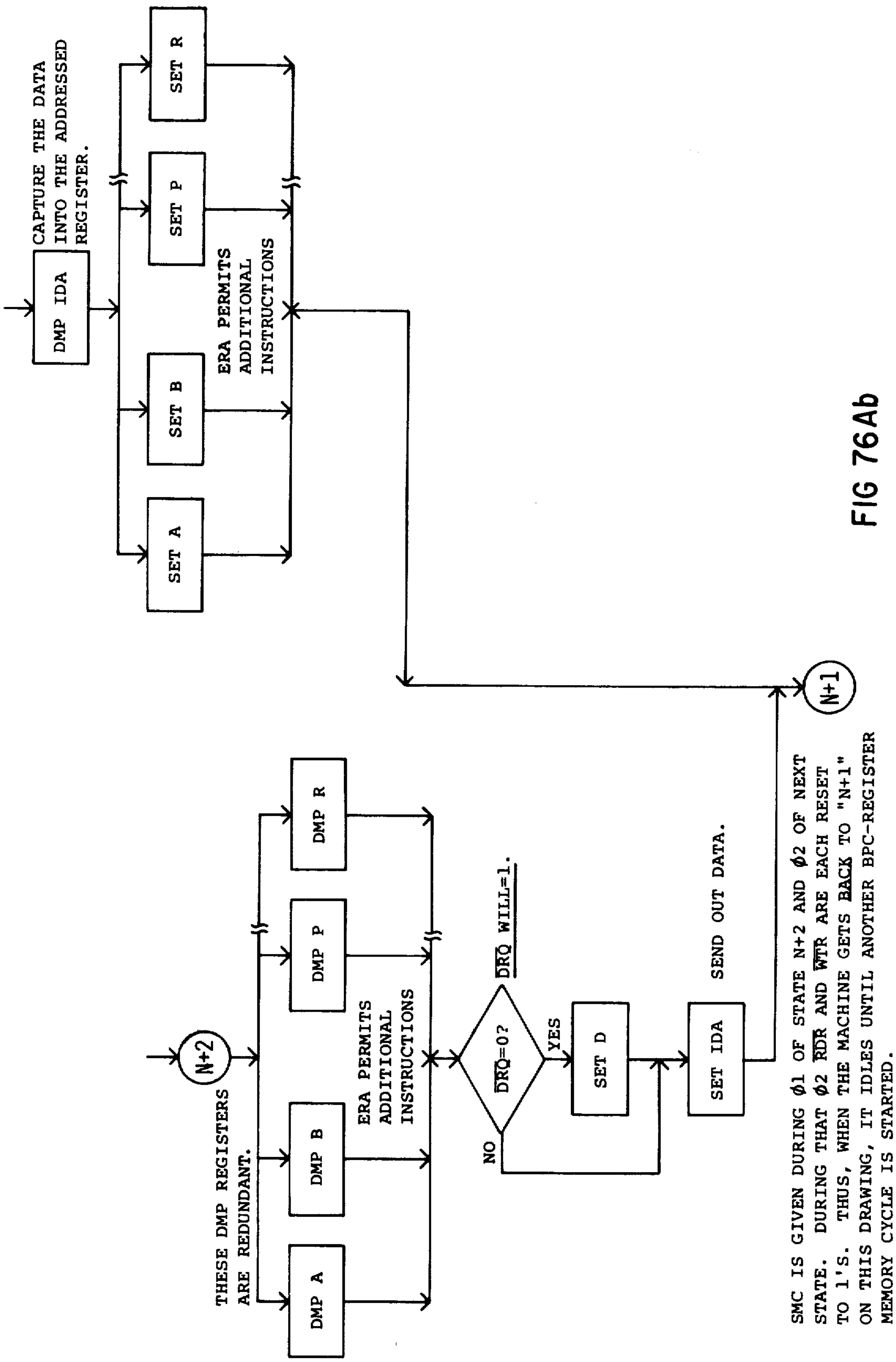

FIGS. 76A*a*, A*b* and B are a flow chart and tabular diagram illustrating the operation of the M-section and the extended register access mode within the BPC's of FIG. 43.

FIG. 77 explains the conventions used in the waveform diagrams of FIGS. 78A-89C.

Figure 78A:
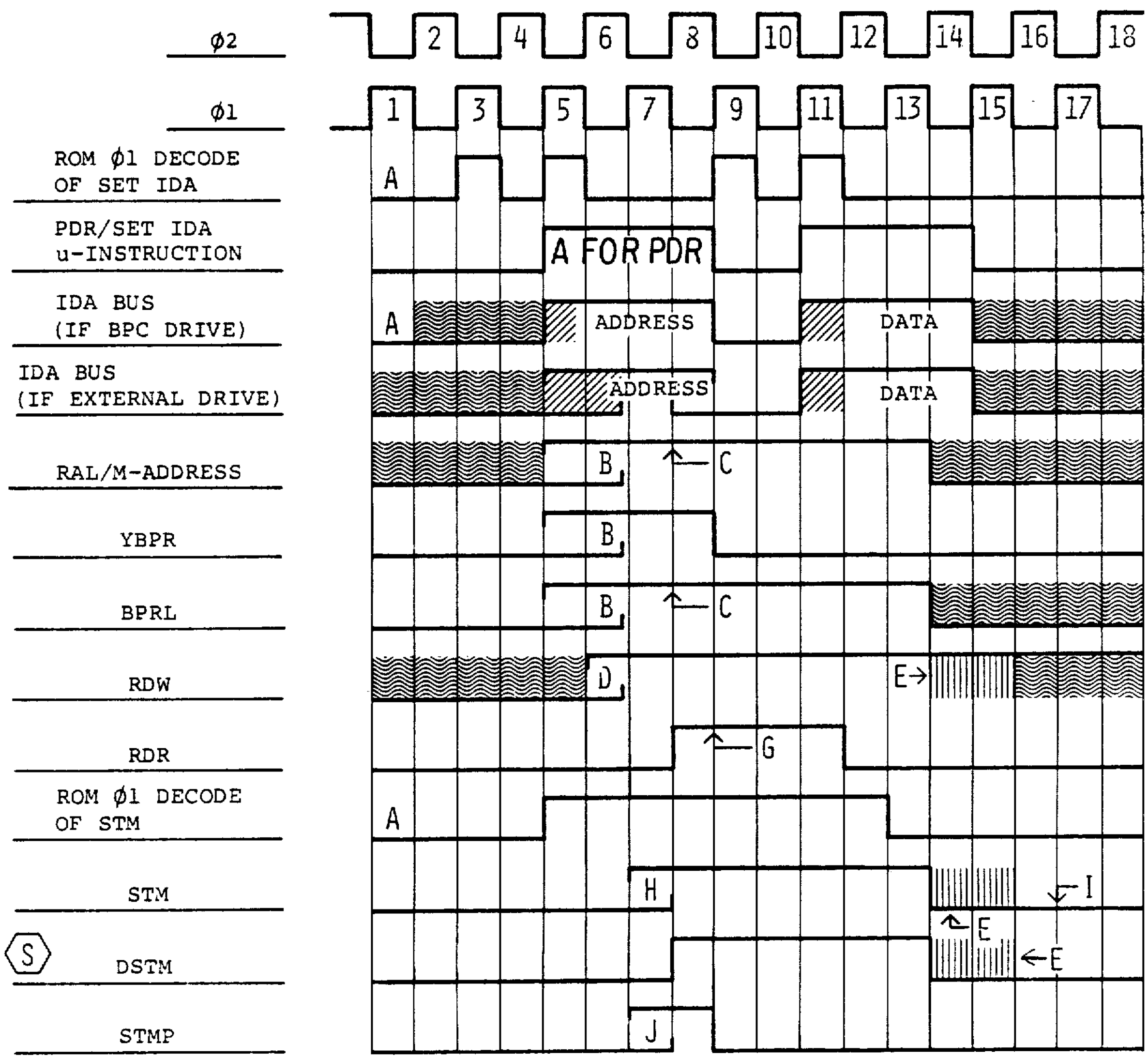
Figure 78B:
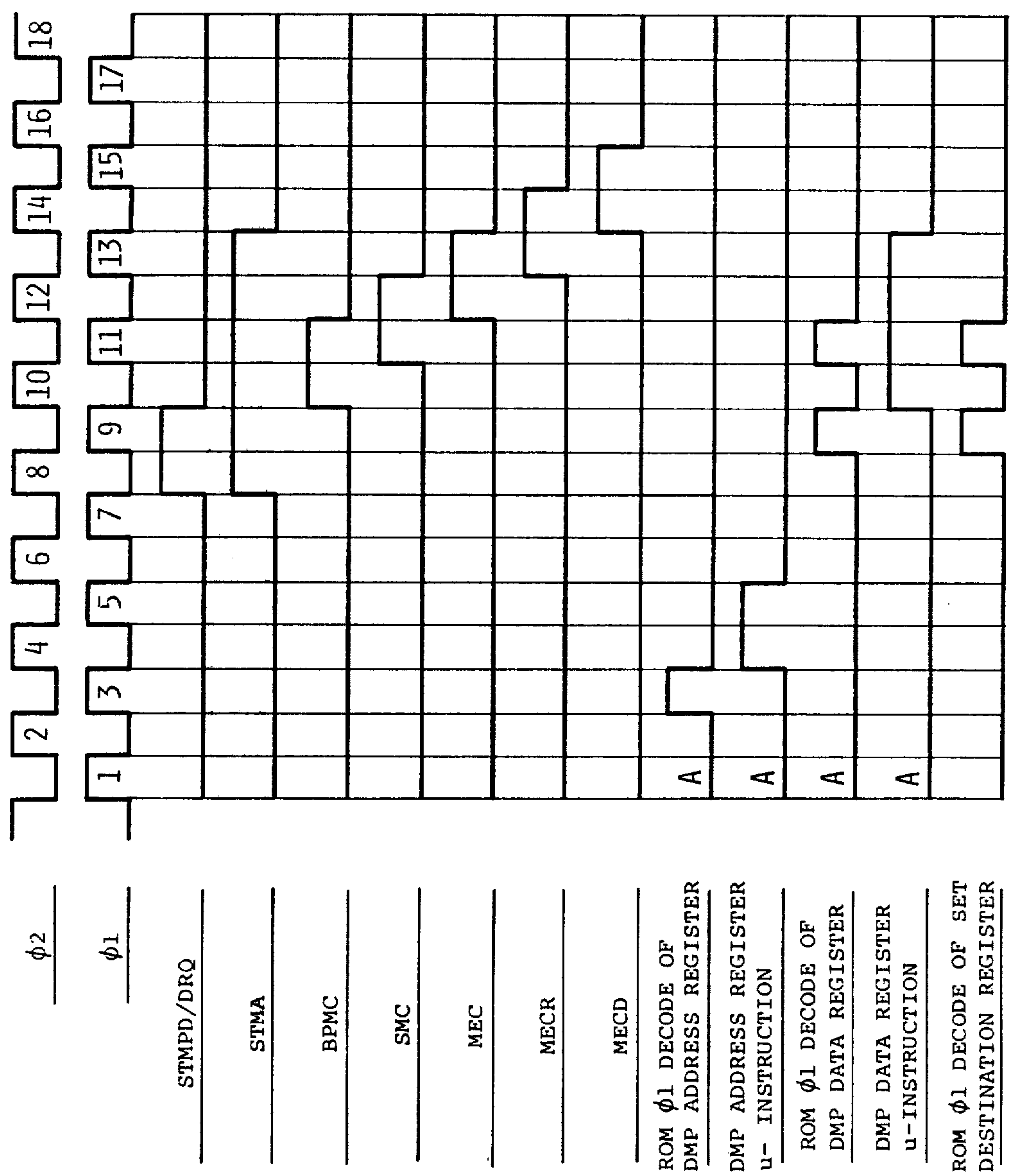

FIGS. 78A-C are waveform diagrams illustrating a read memory cycle directed to a register within the BPC's of FIG. 43.

Figure 79A:
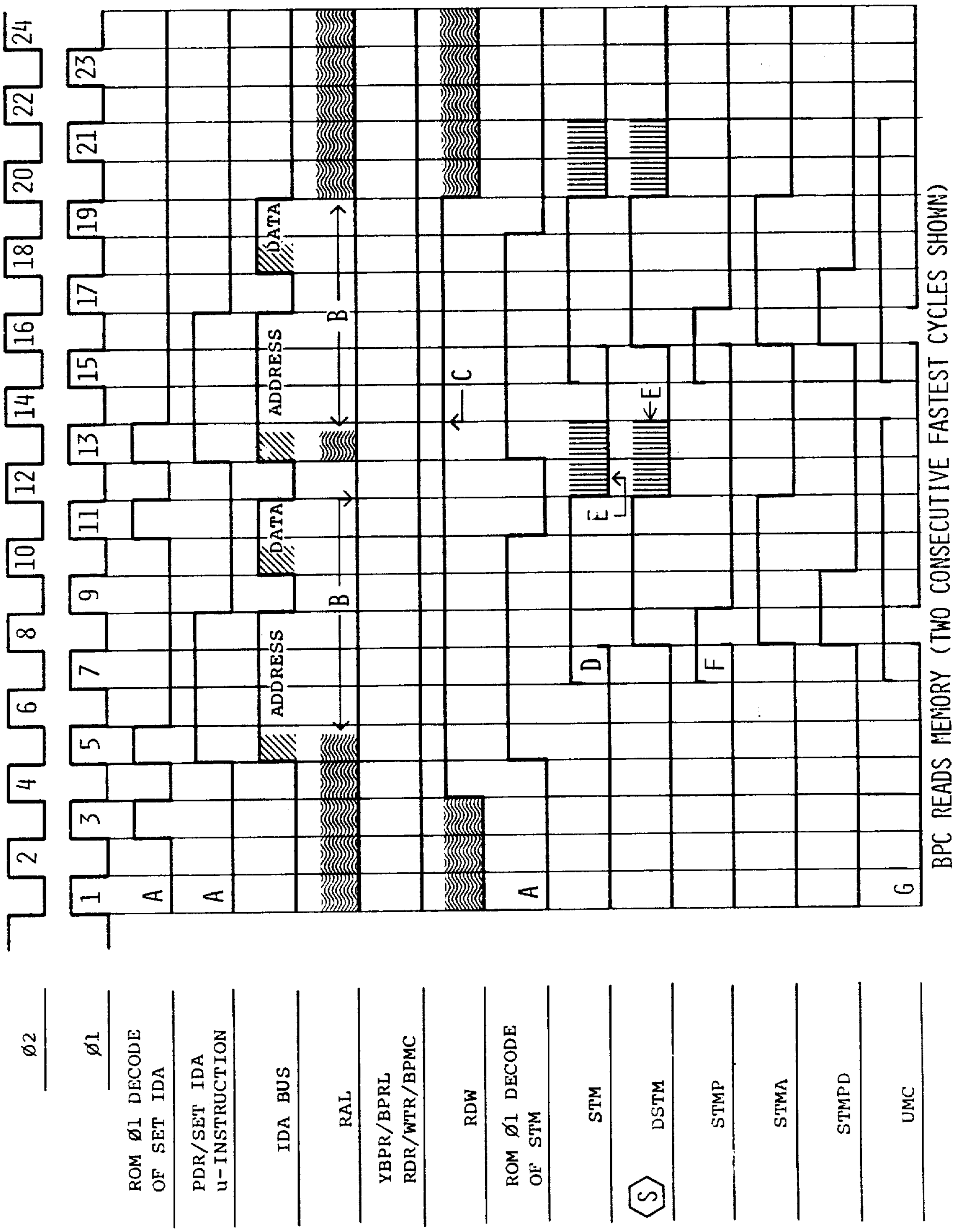

FIGS. 79A-B are waveform diagrams illustrating two consecutive fastest read memory cycles originating with the BPC's of FIG. 43.

Figure 80:
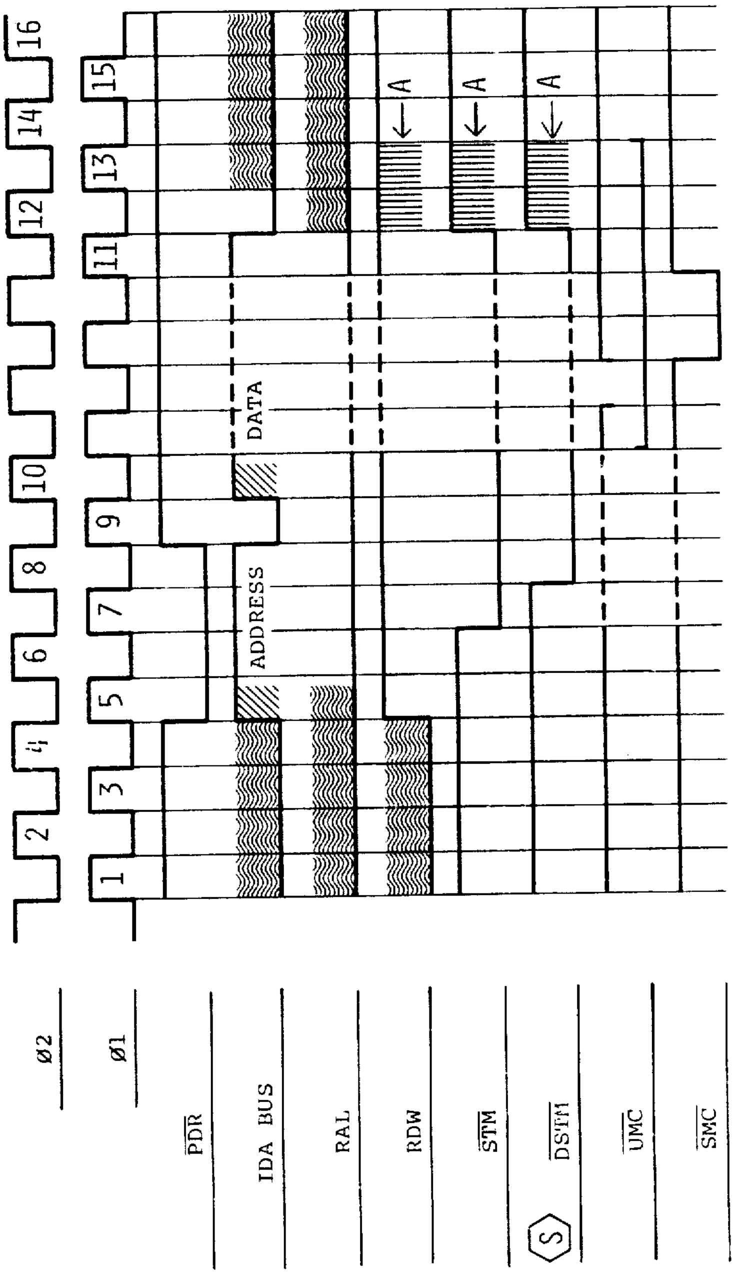
Figure 81A:
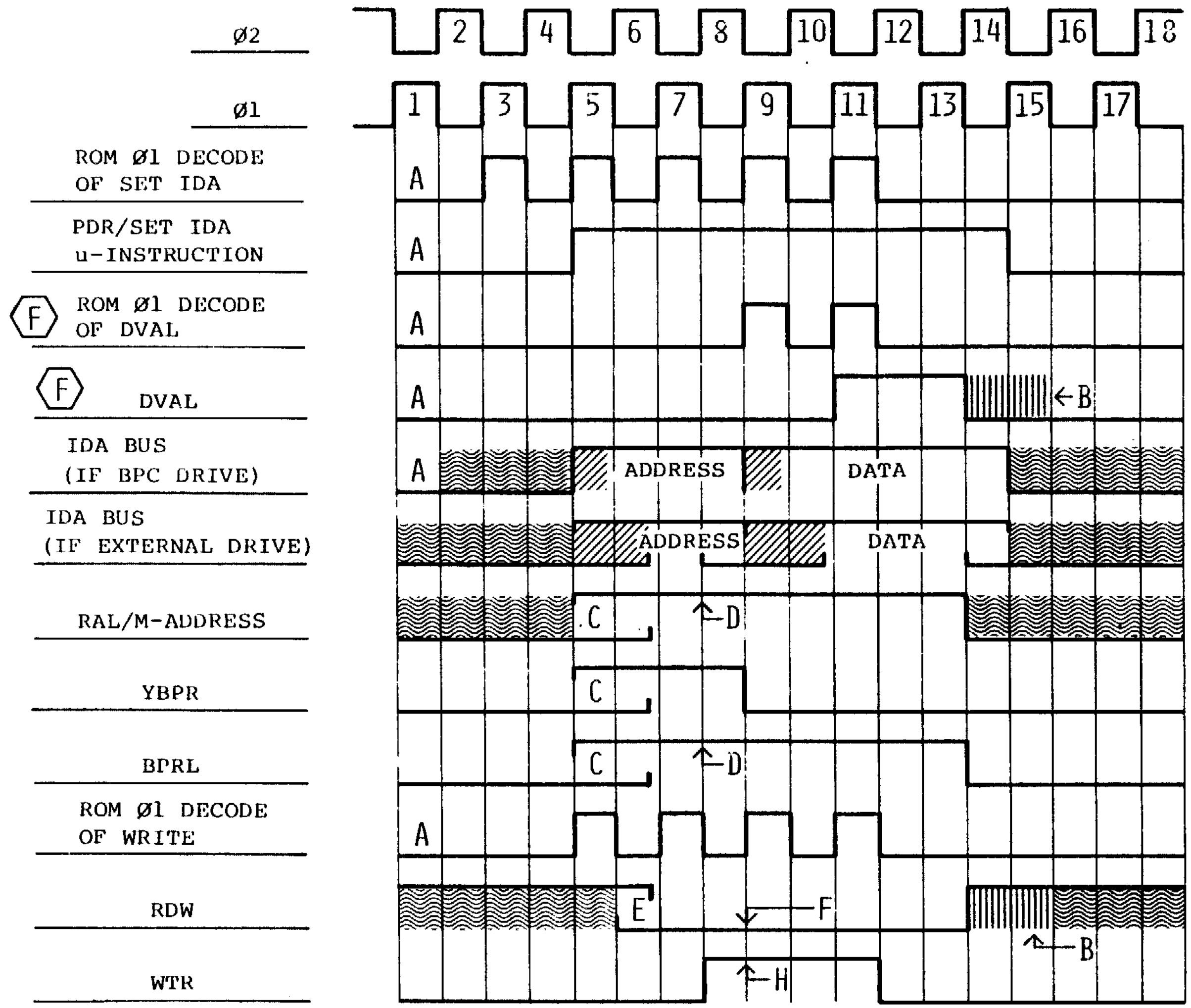
Figure 81B:
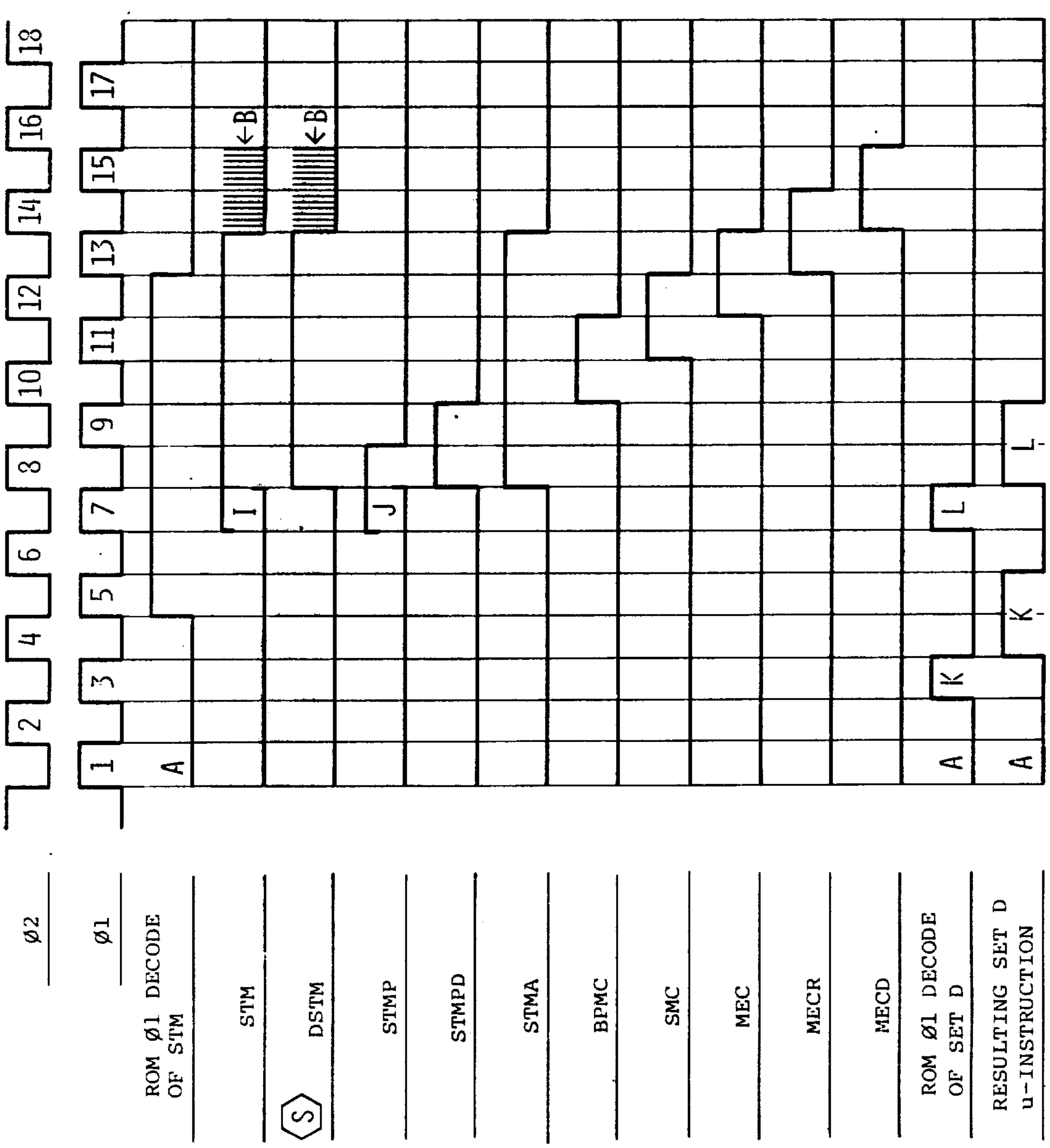
Figure 81C:
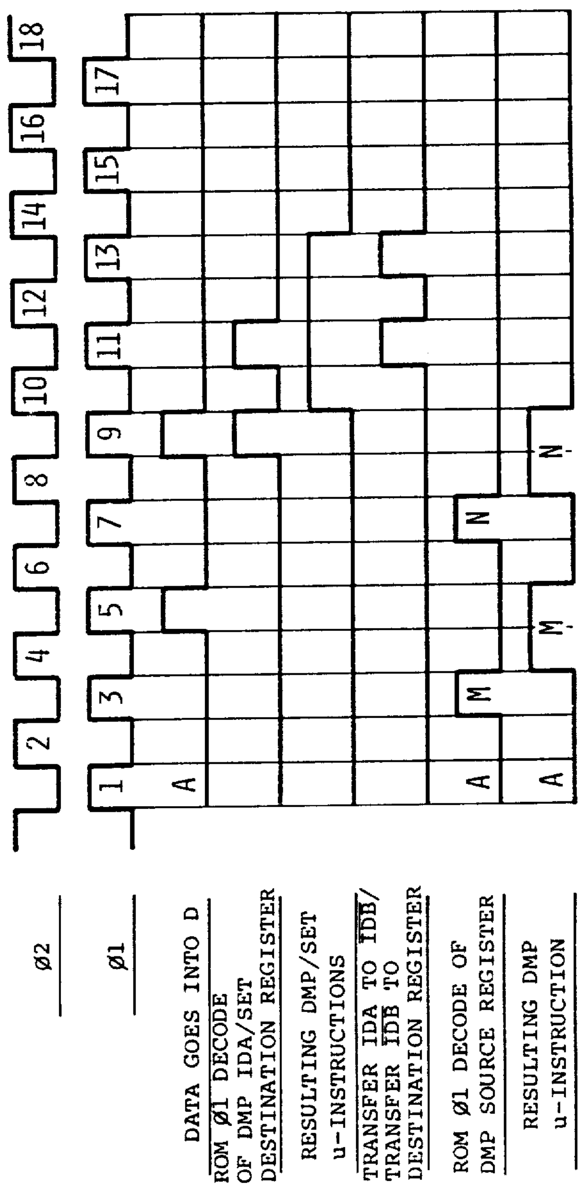

FIG. 80 is a waveform diagram illustrating a generalized read memory cycle originating in the BPC's of FIG. 43.

FIGS. 81A-D are a waveform diagram illustrating a write memory cycle in which the destination address is a register within the BPC's of FIG. 43.

Figure 82A:
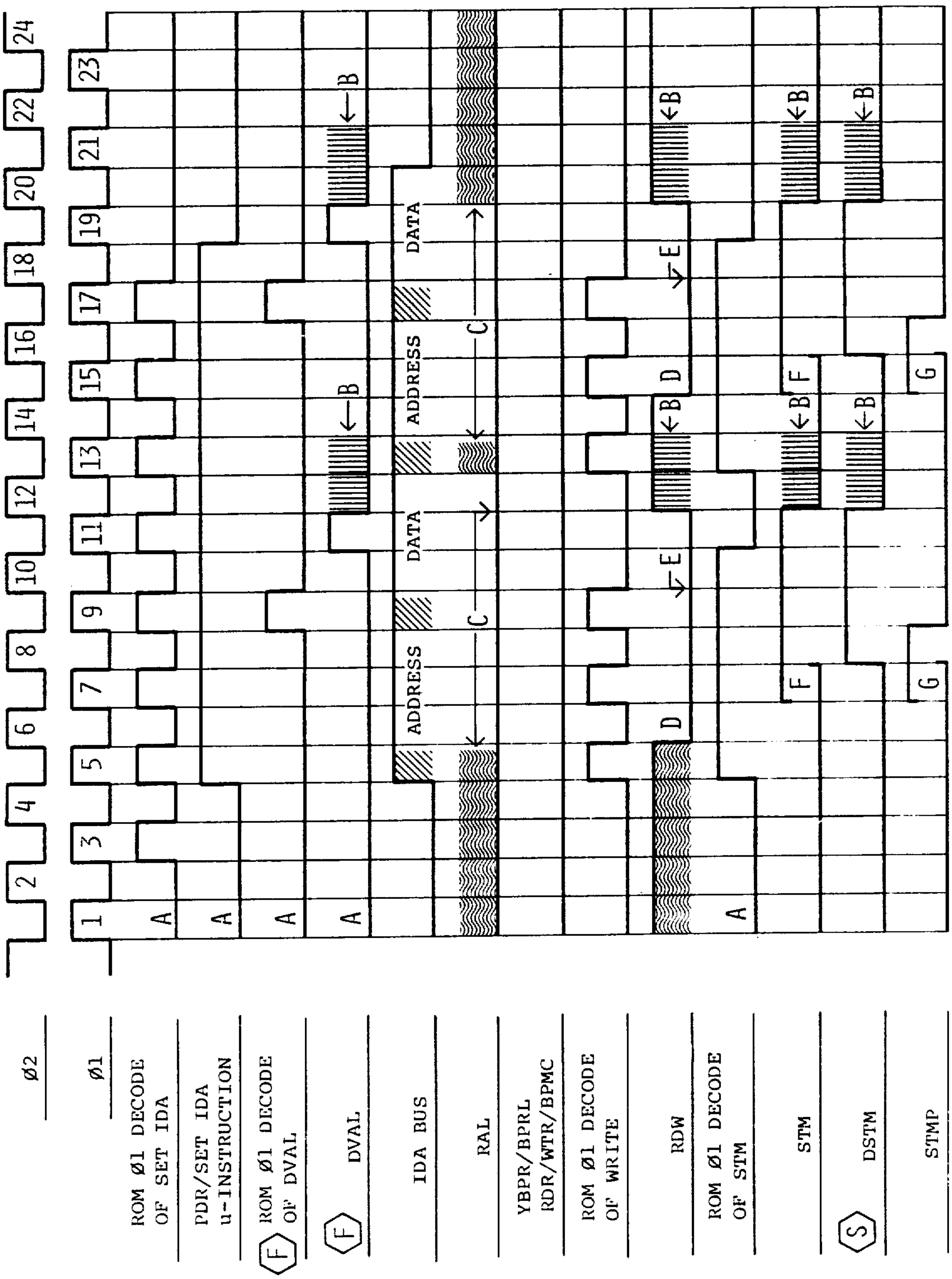
Figure 82B:
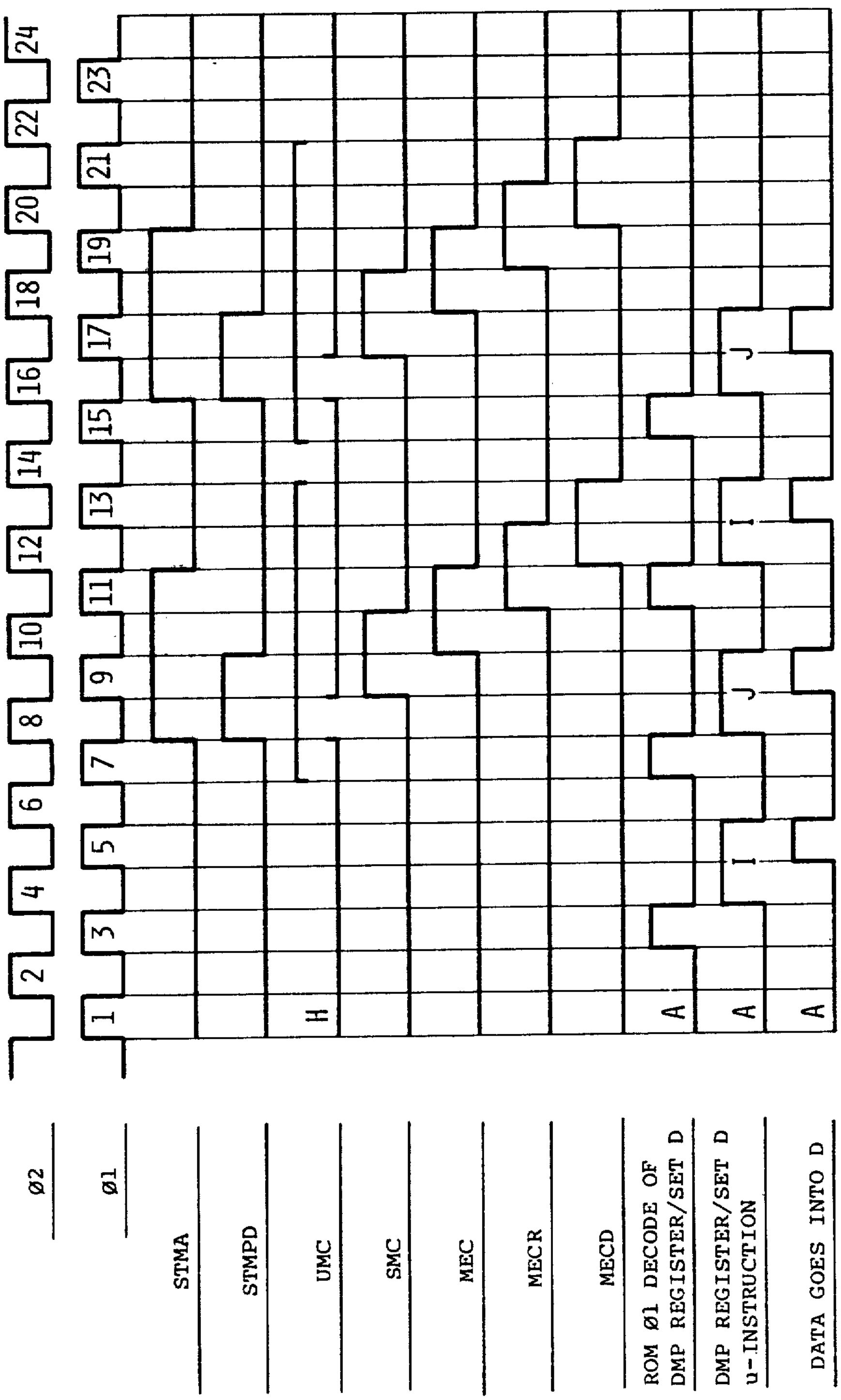

FIGS. 82A-C are a waveform diagram illustrating two consecutive write memory cycles originating within the BPC's of FIG. 43 in which the destination addresses are in memory external to the BPC's.

Figure 83:
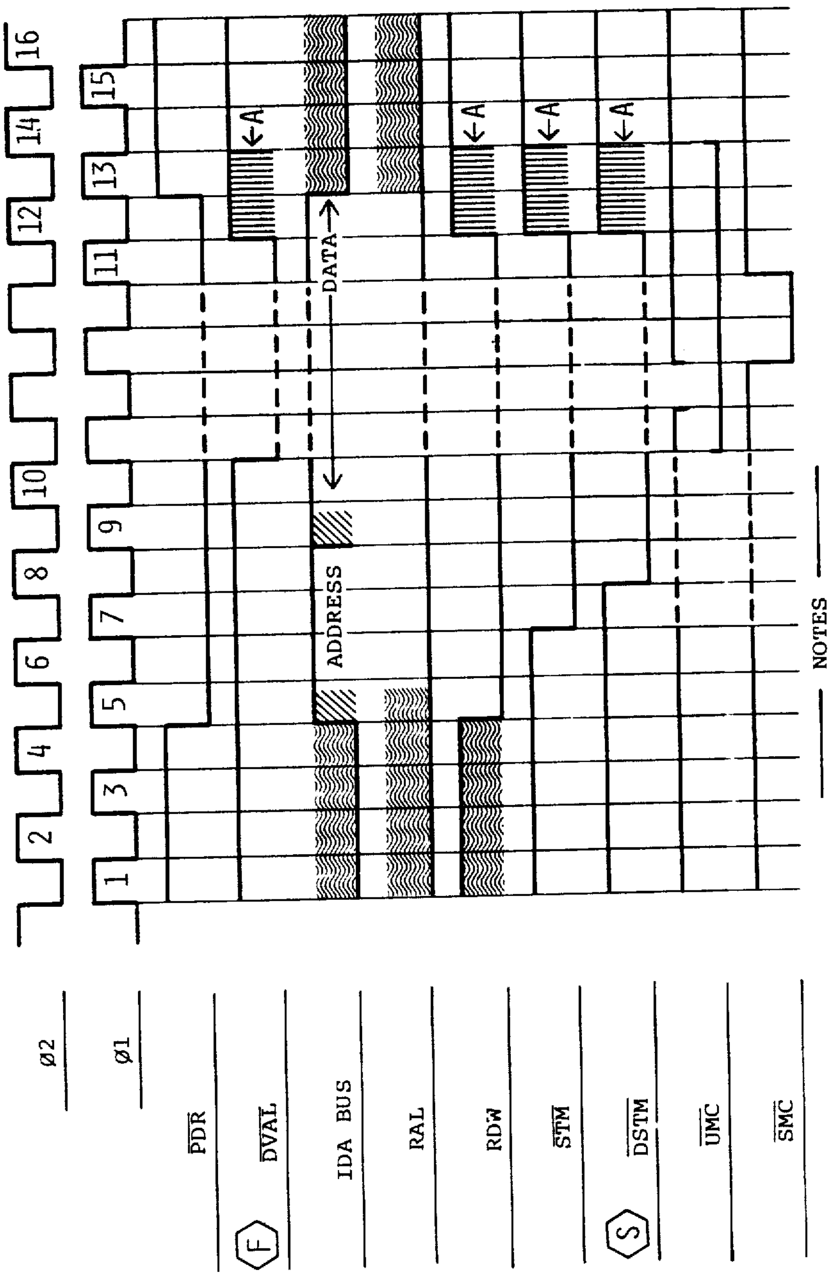

FIG. 83 is a waveform diagram illustrating a generalized write memory cycle originating in the BPC's of FIG. 43 not involving handshake.

Figure 84:
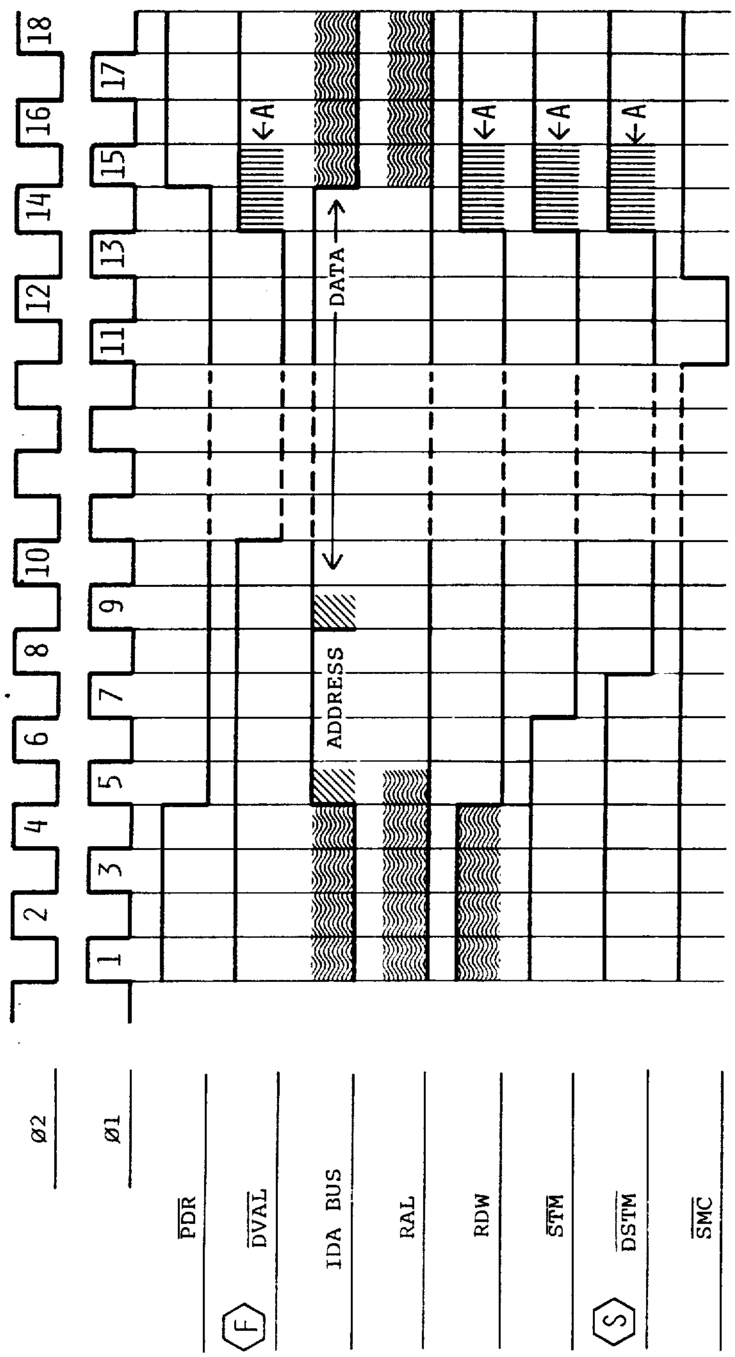

FIG. 84 is a waveform diagram illustrating a generalized 5-state write memory cycle originating in the BPC's of FIG. 43 involving handshake.

Figure 85:
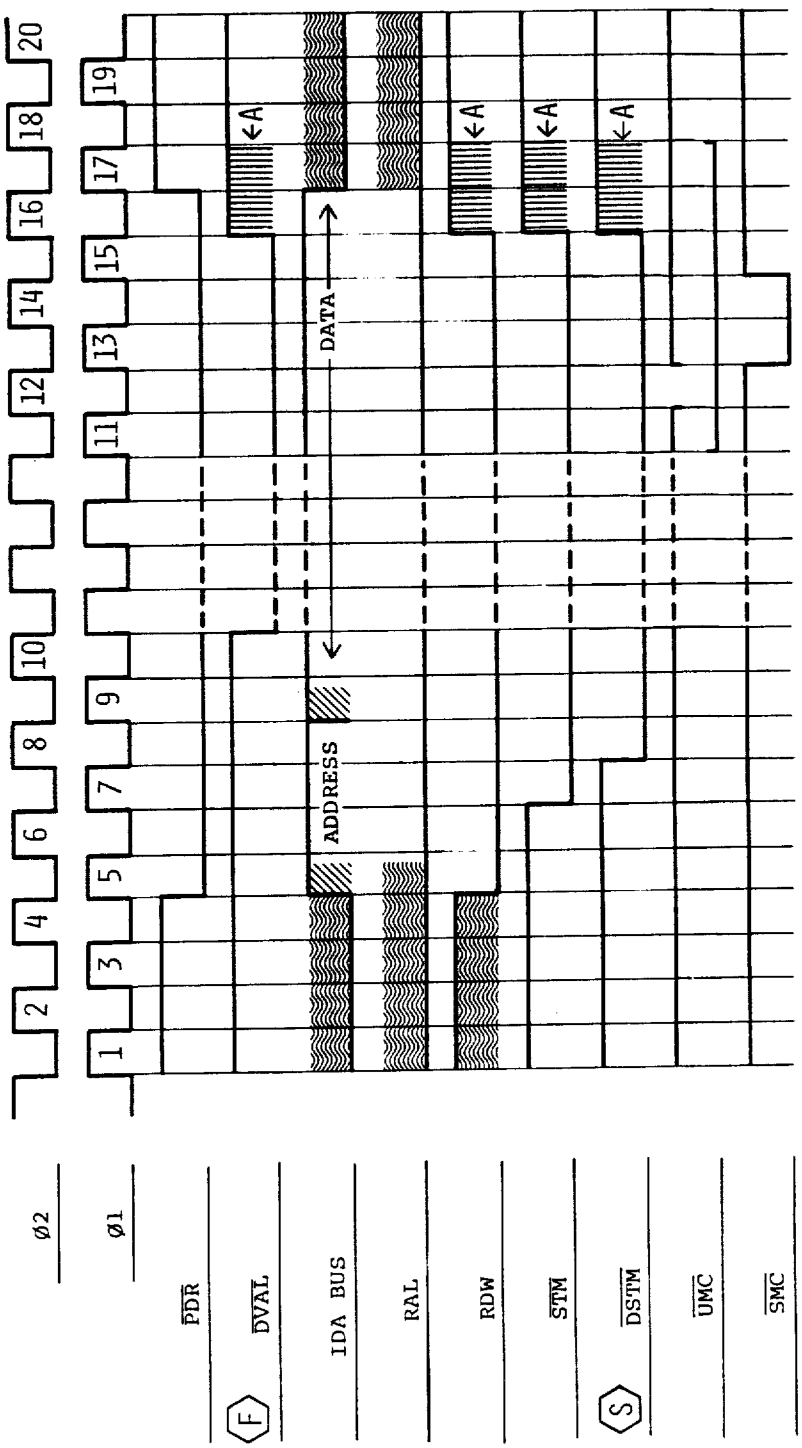

FIG. 85 is a waveform diagram illustrating a generalized 6-state write memory cycle originating in the BPC's of FIG. 43 involving handshake.

Figure 86B:
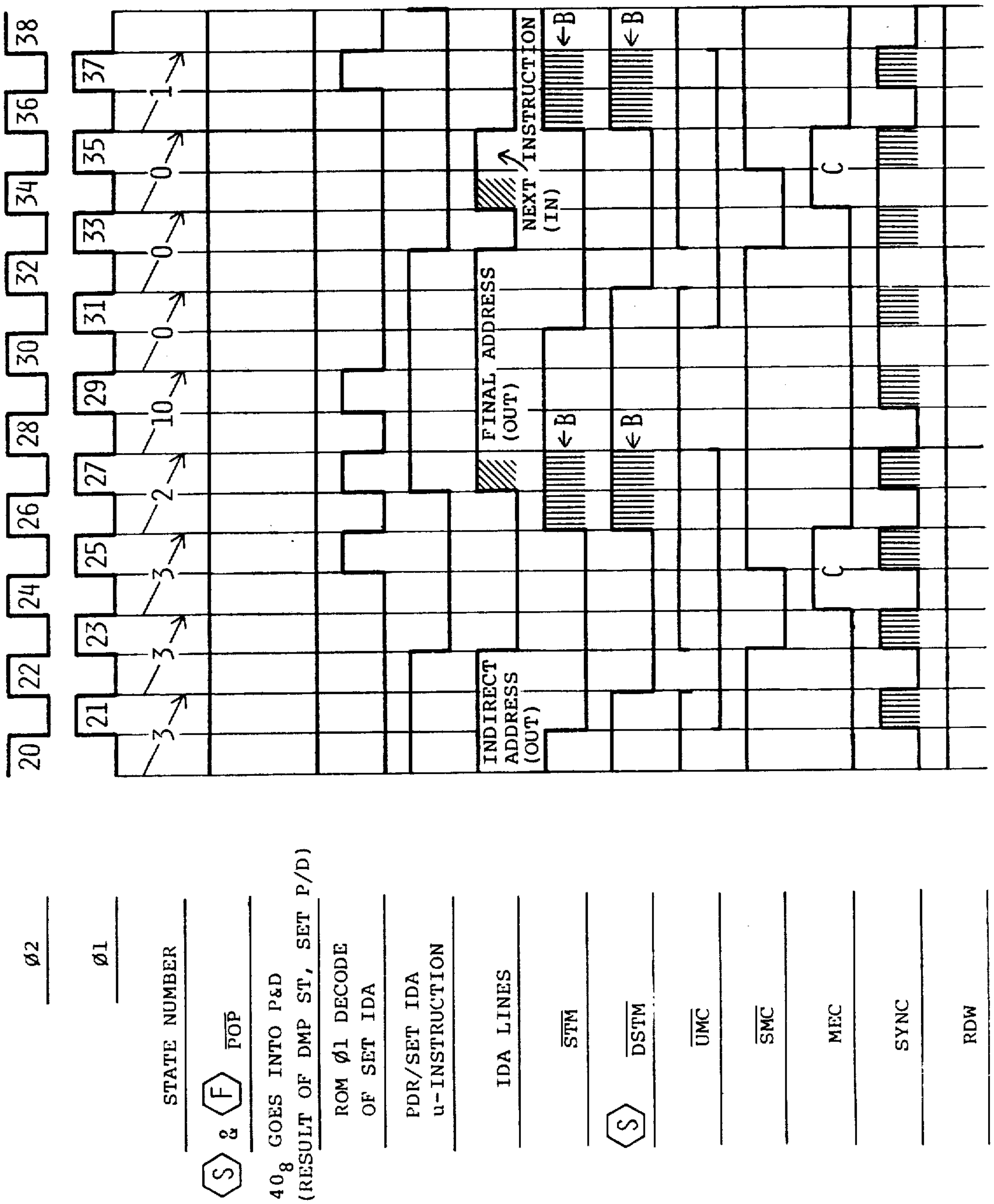

FIGS. 86A-C are a waveform diagram illustrating the initial start up and first instruction fetch of the BPC's of FIG. 43.

FIG. 87 is a waveform diagram illustrating the capture of external flags during a BPC instruction fetch.

Figure 88A:
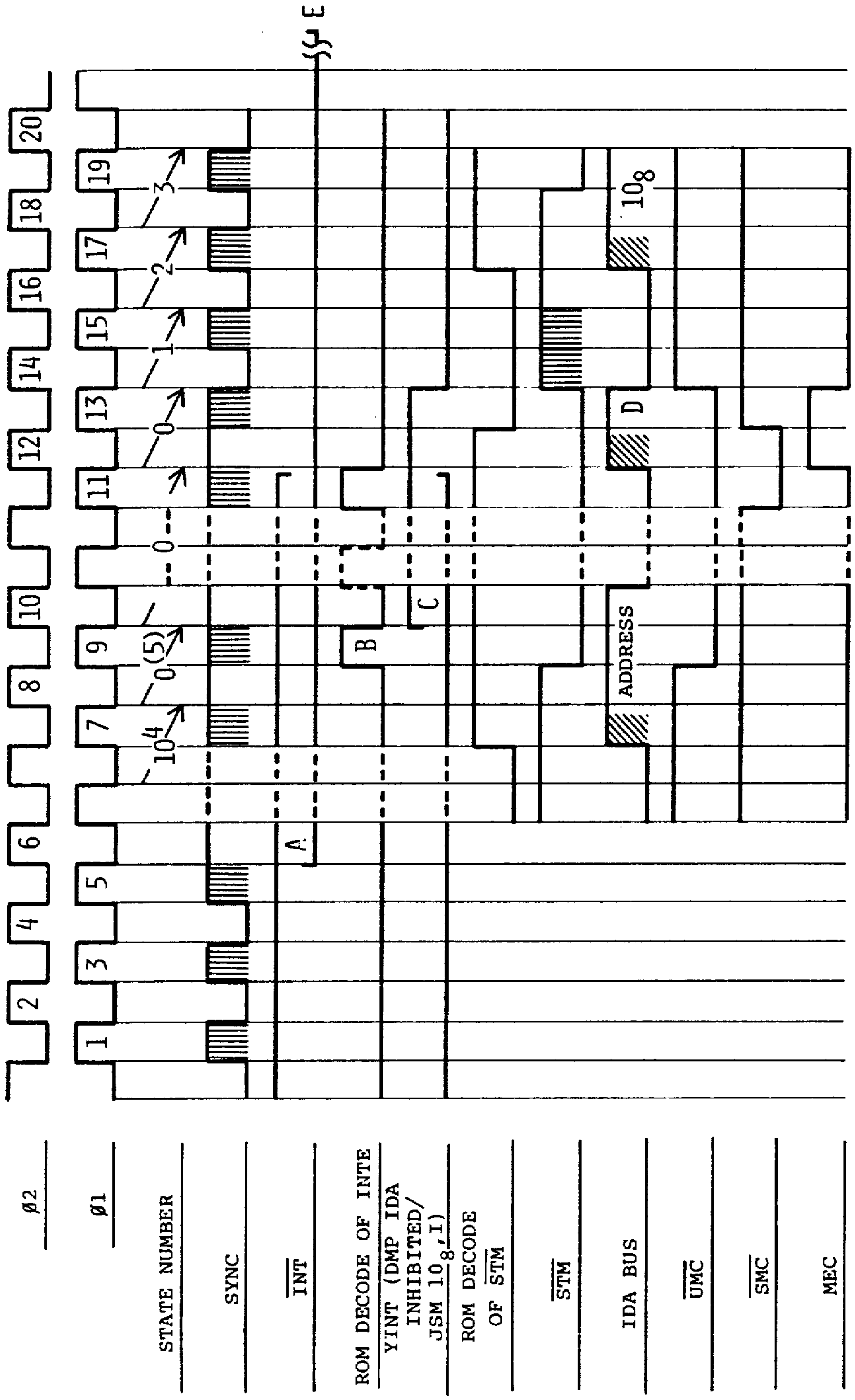

FIGS. 88A-B are a waveform diagram illustrating an interrupt of the BPC's of FIG. 43 that may occur during an instruction fetch.

Figure 89A:
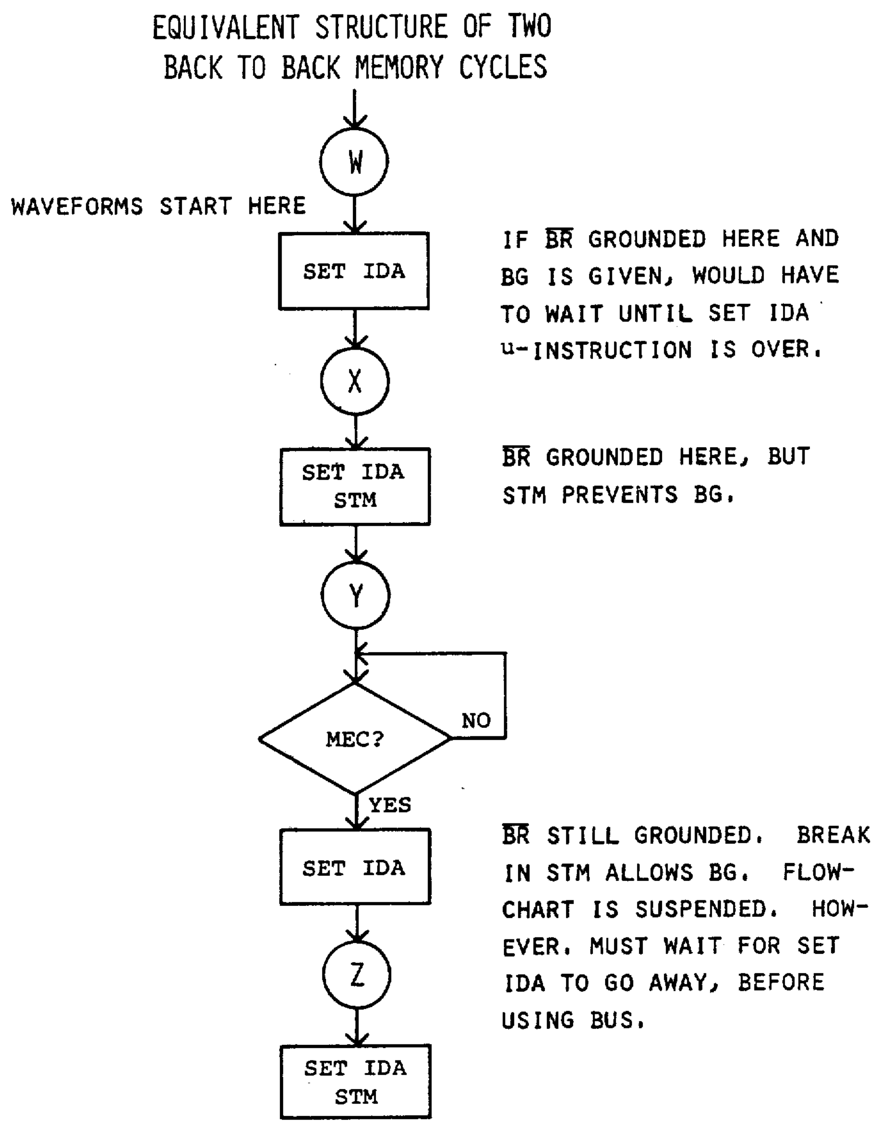
Figure 89B:
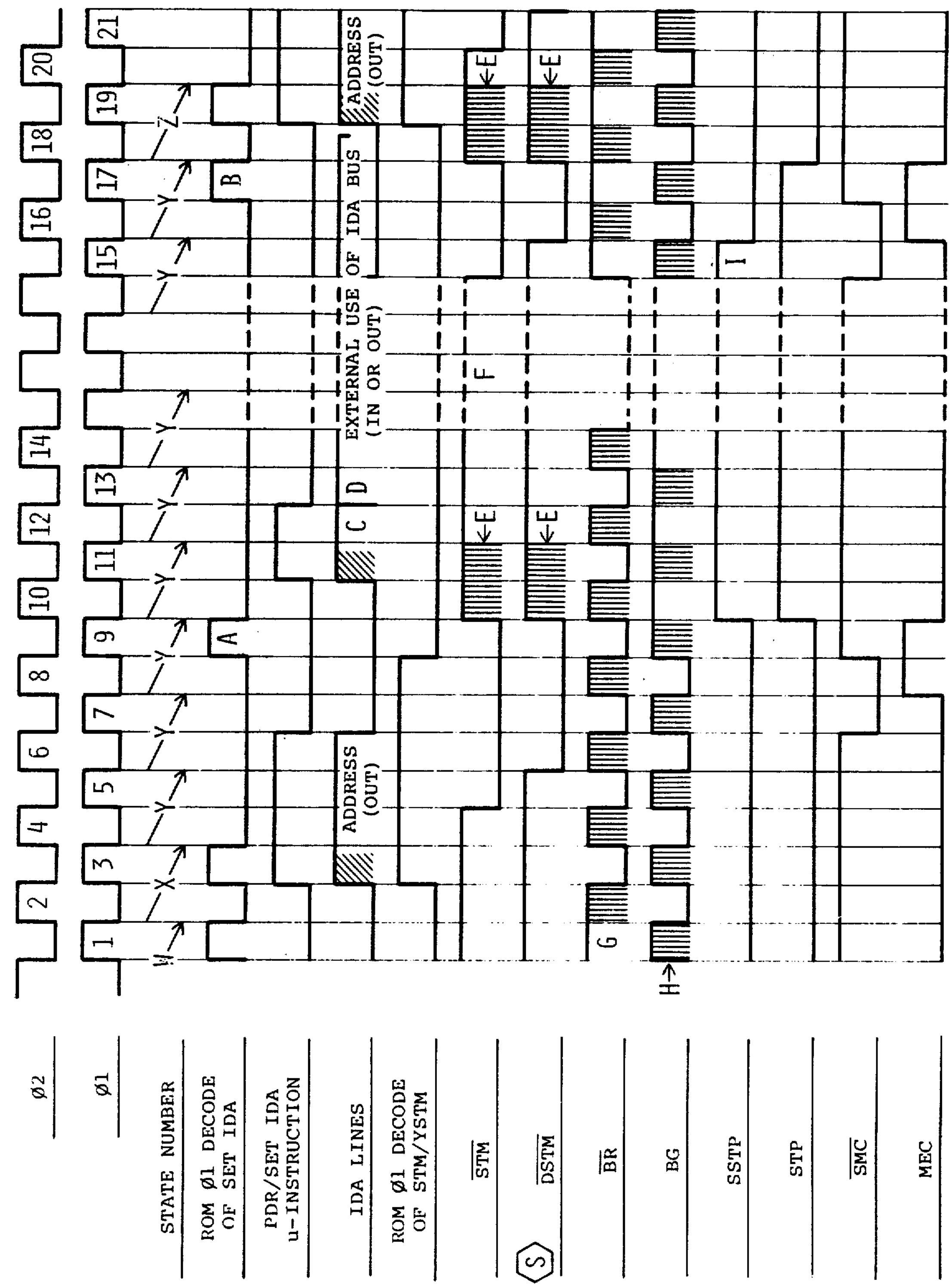

FIGS. 89A-C are a flow chart and waveform diagram illustrating the logic and timing relationships between a bus request and a bus grant.

Figure 90:
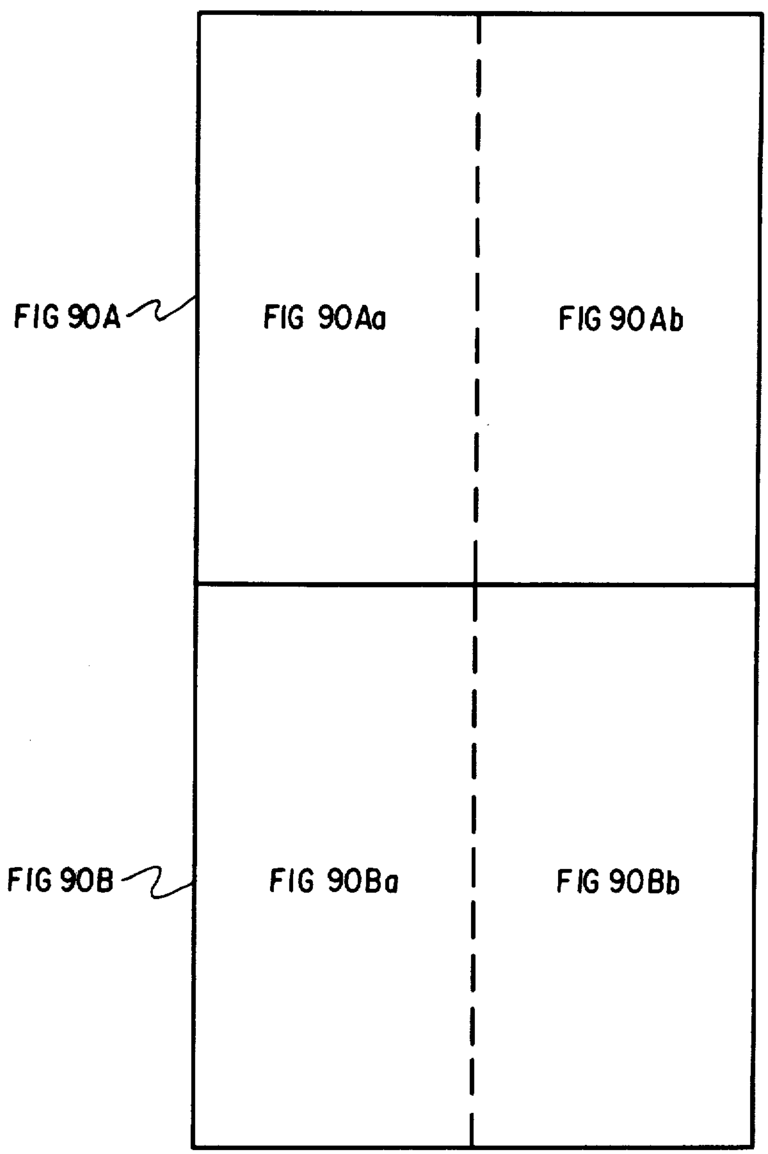
FIG. 90A is itself partitioned into FIGS. **90A*a* and 90A*b*.
FIG. 90B is similarly partitioned, although not simply because
Figure 90A:
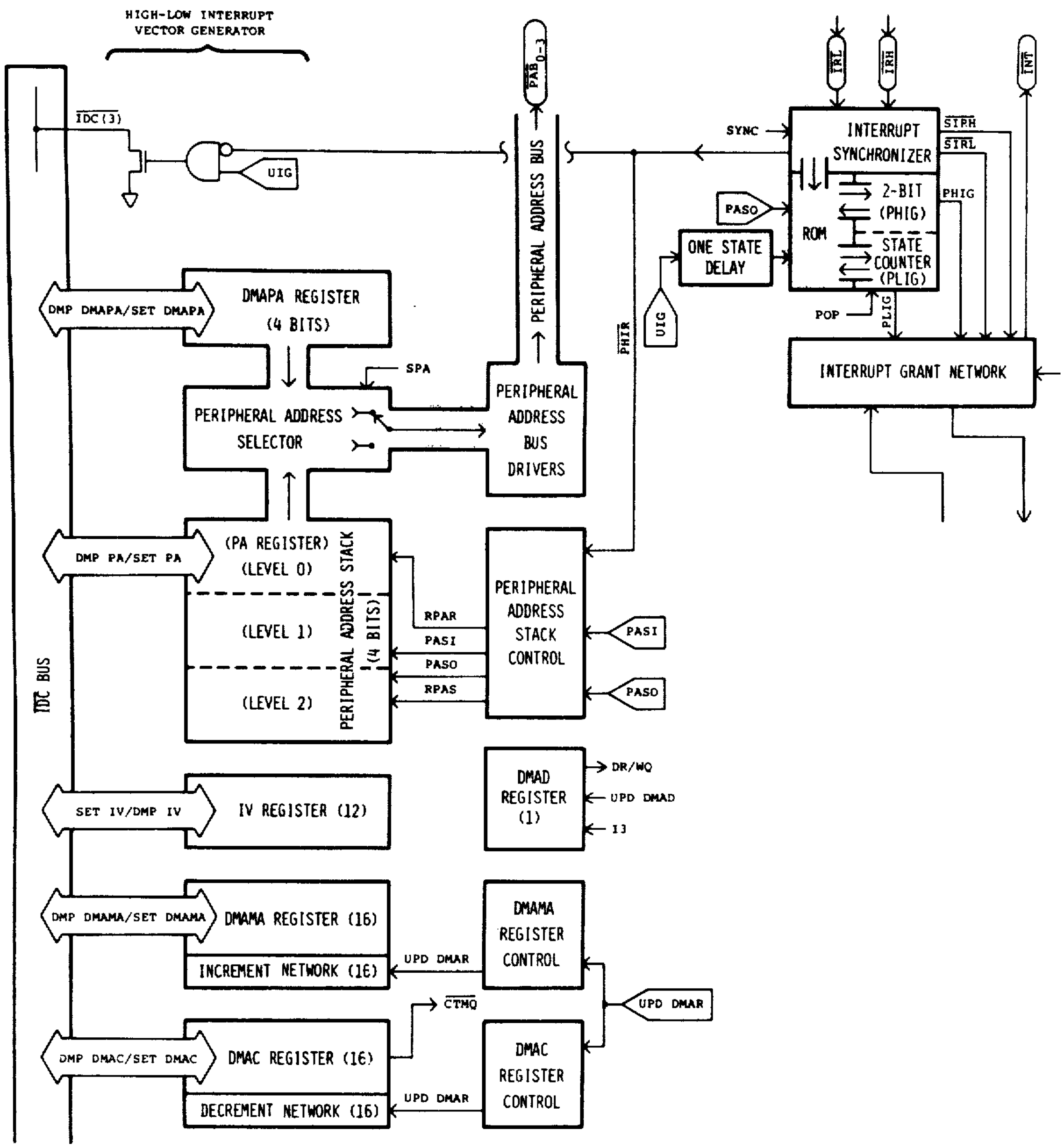
Figure 90A:
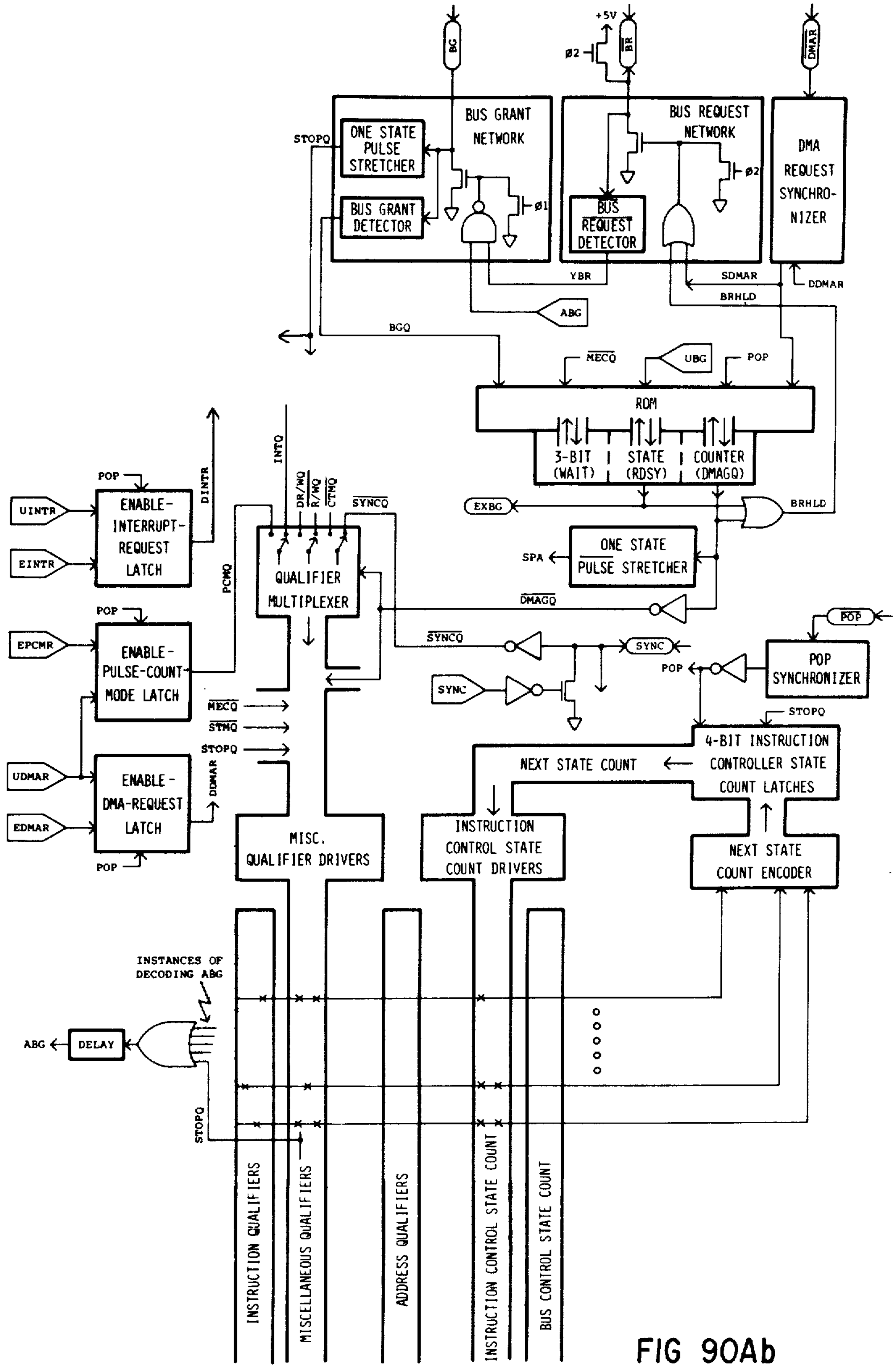
Figure 90B:
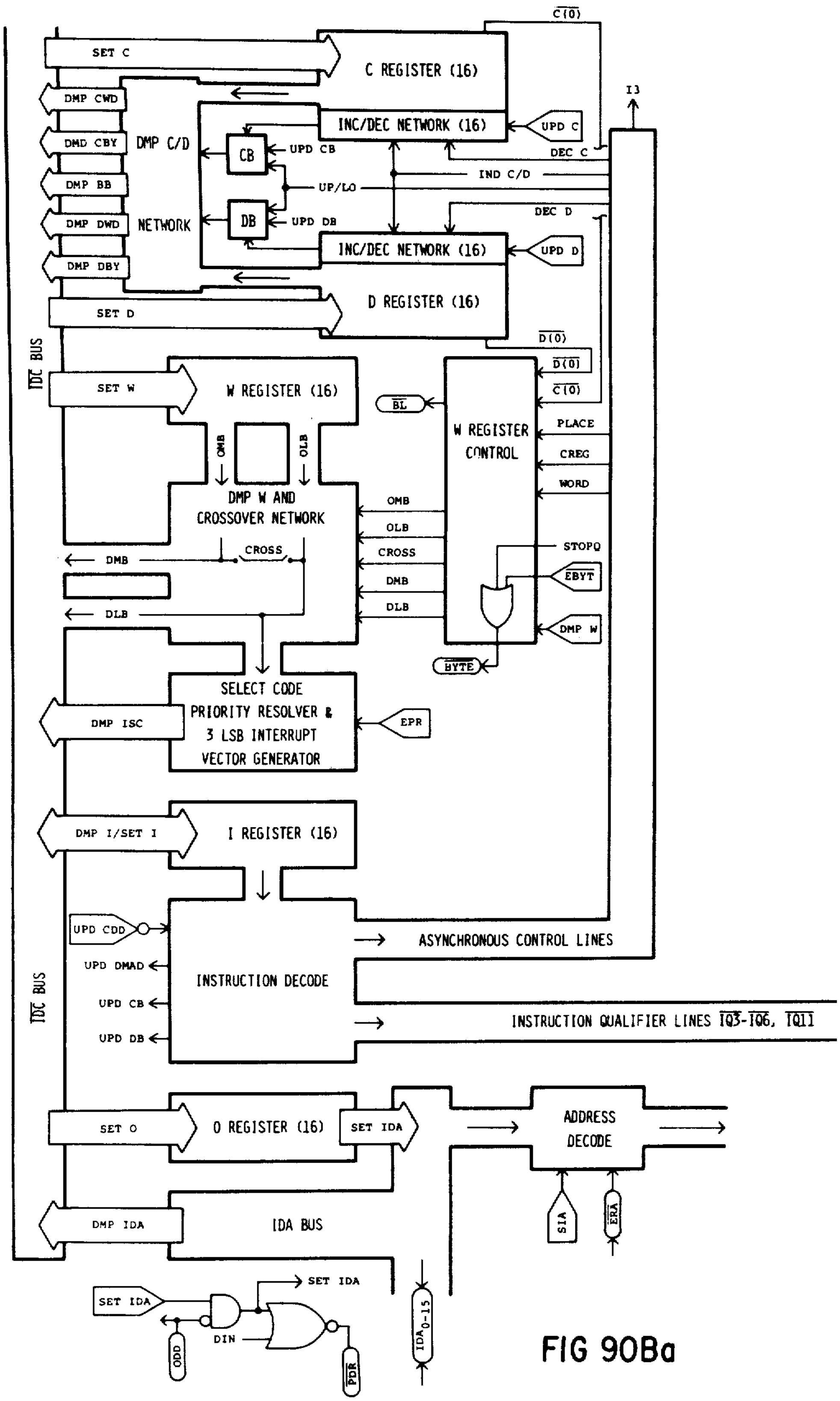
Figure 90:
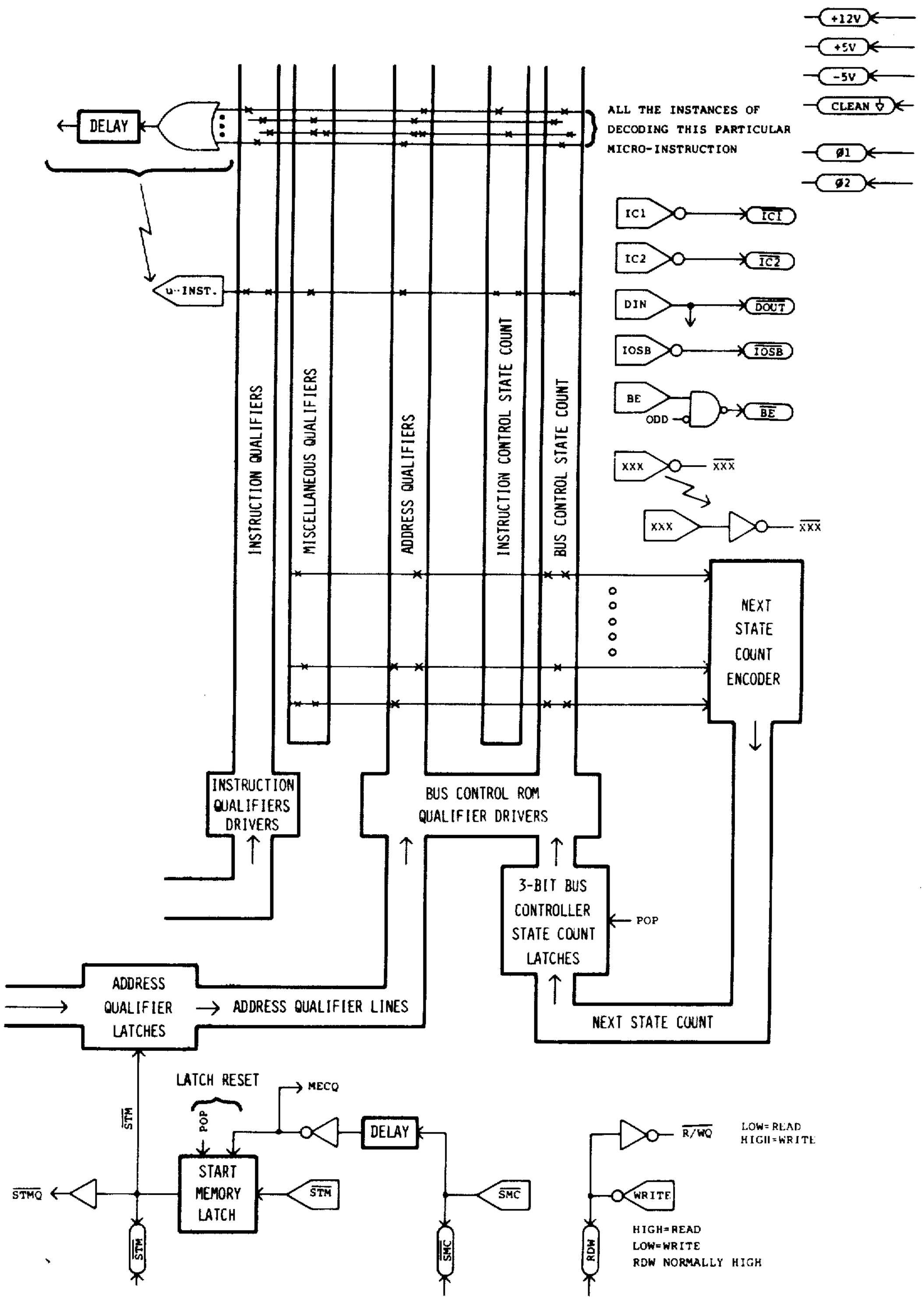

FIGS. 90A-B (consisting of FIGS. 90A*a*, 90A*b*, 90B*a* and 90B*b*) shown in block form by FIG. 90, and FIG. 90C are block diagrams of the IOC's of FIG. 43.

Figure 93A:
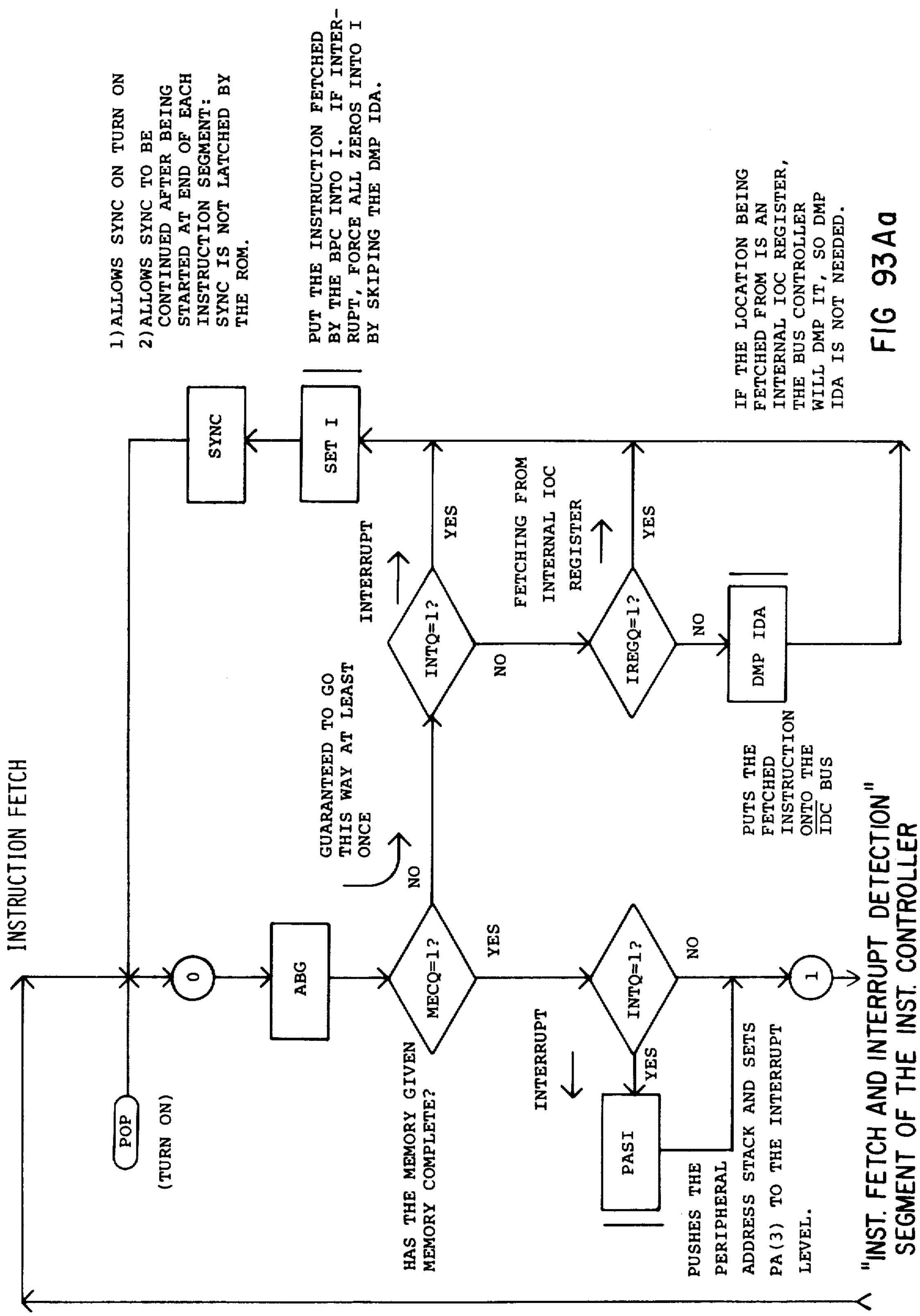
Figure 93A:
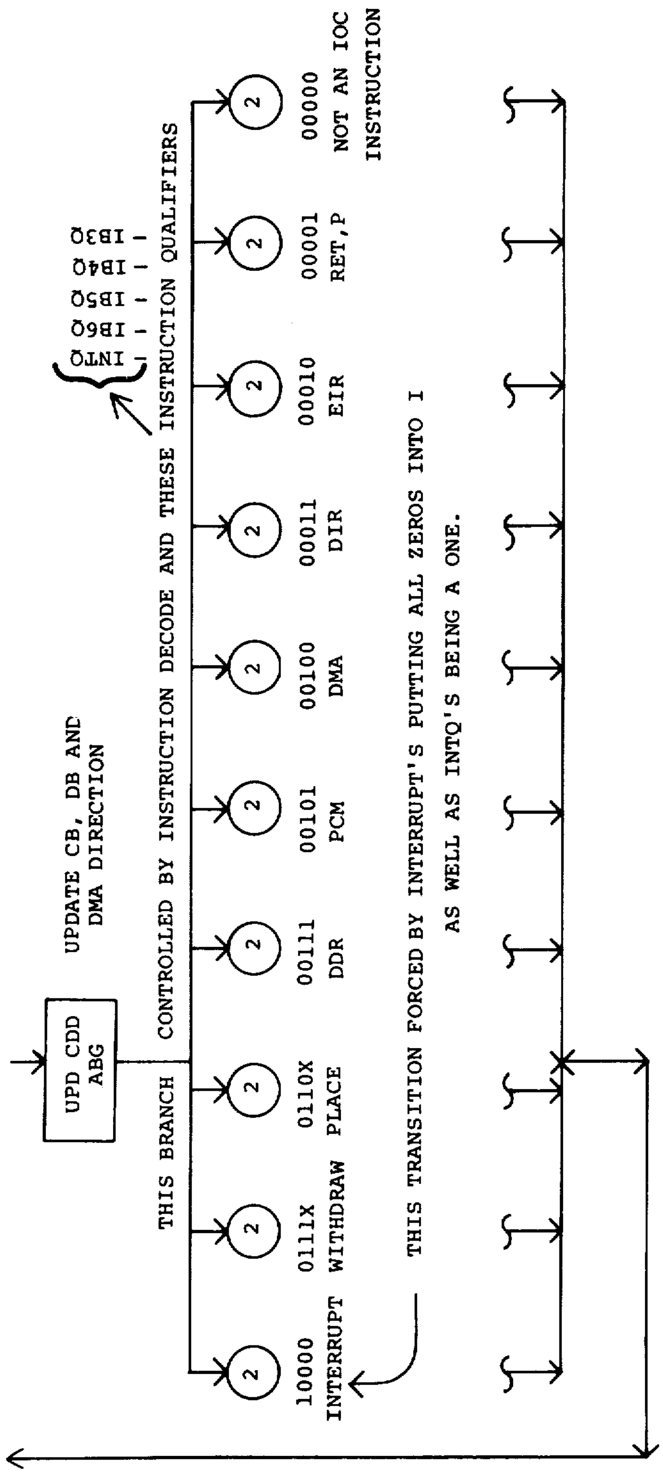
Figure 93B:
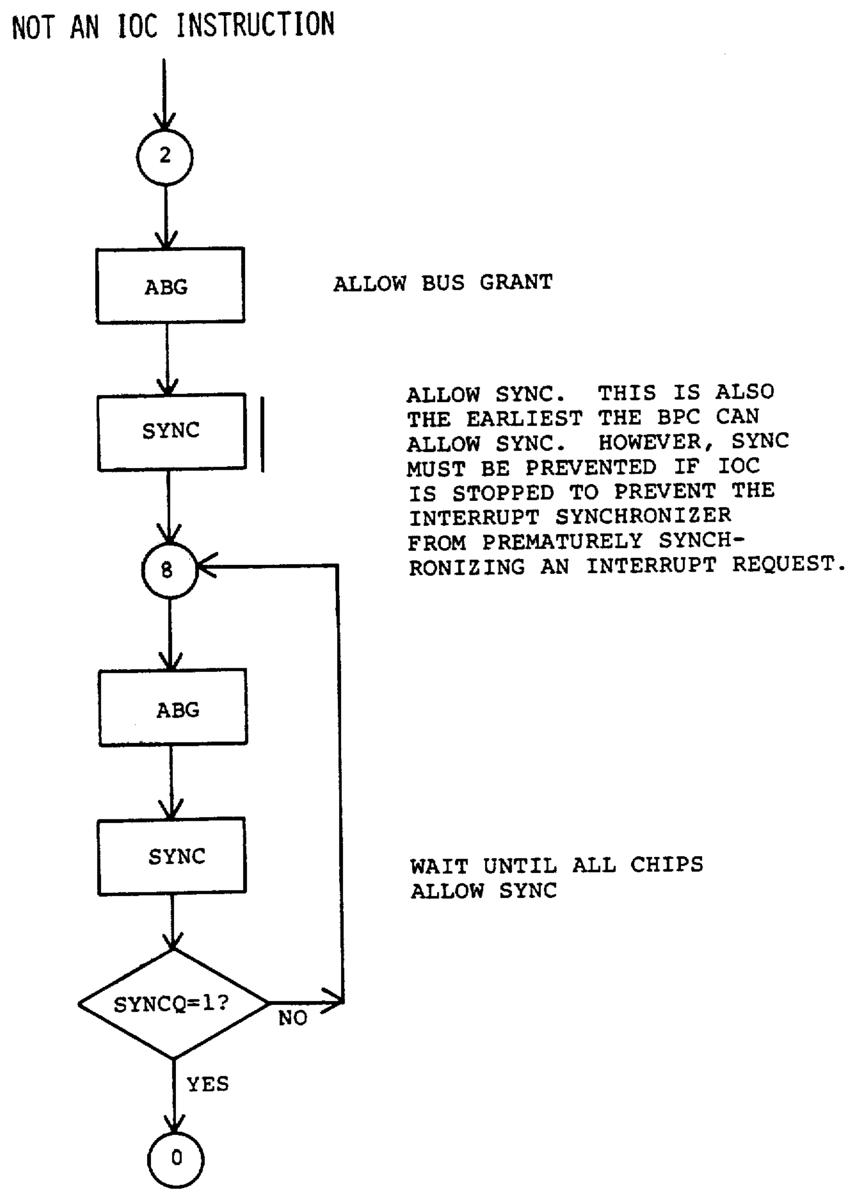
Figure 93C:
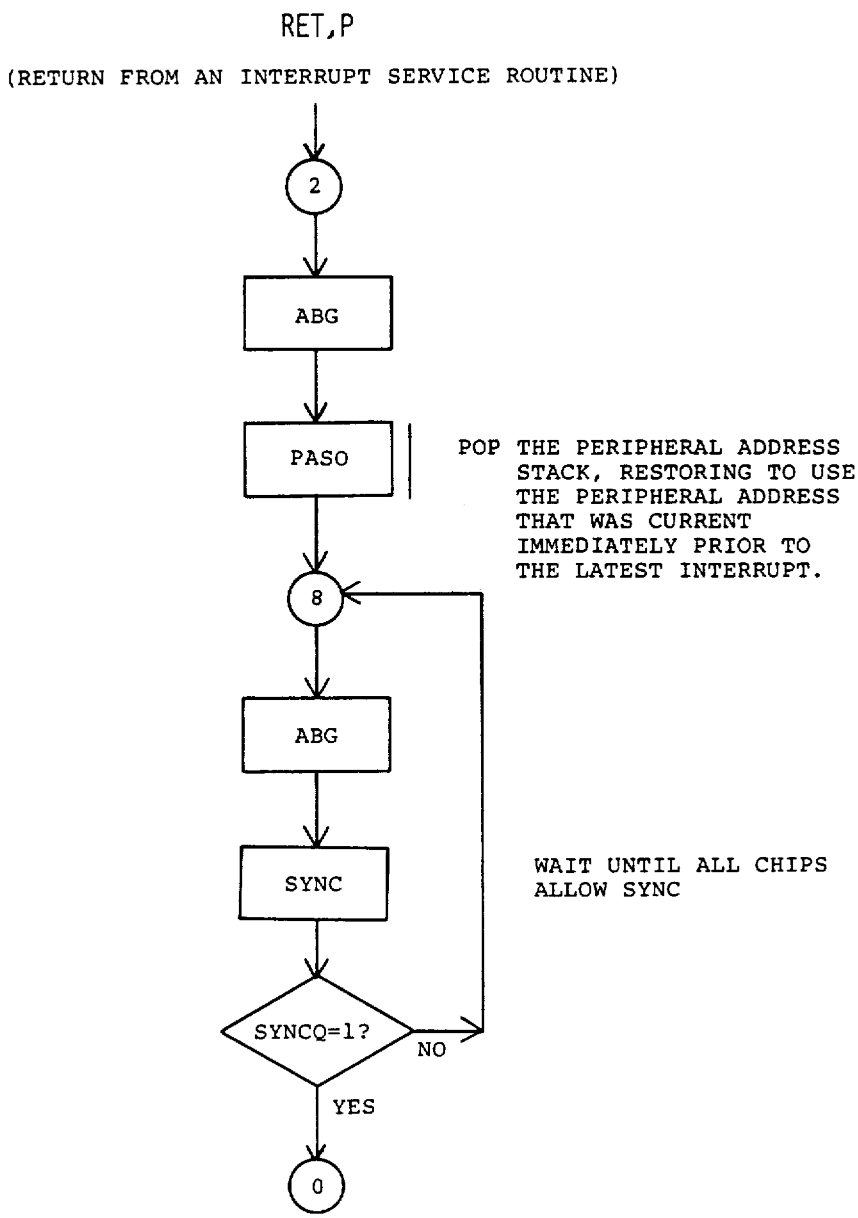
Figure 93D:
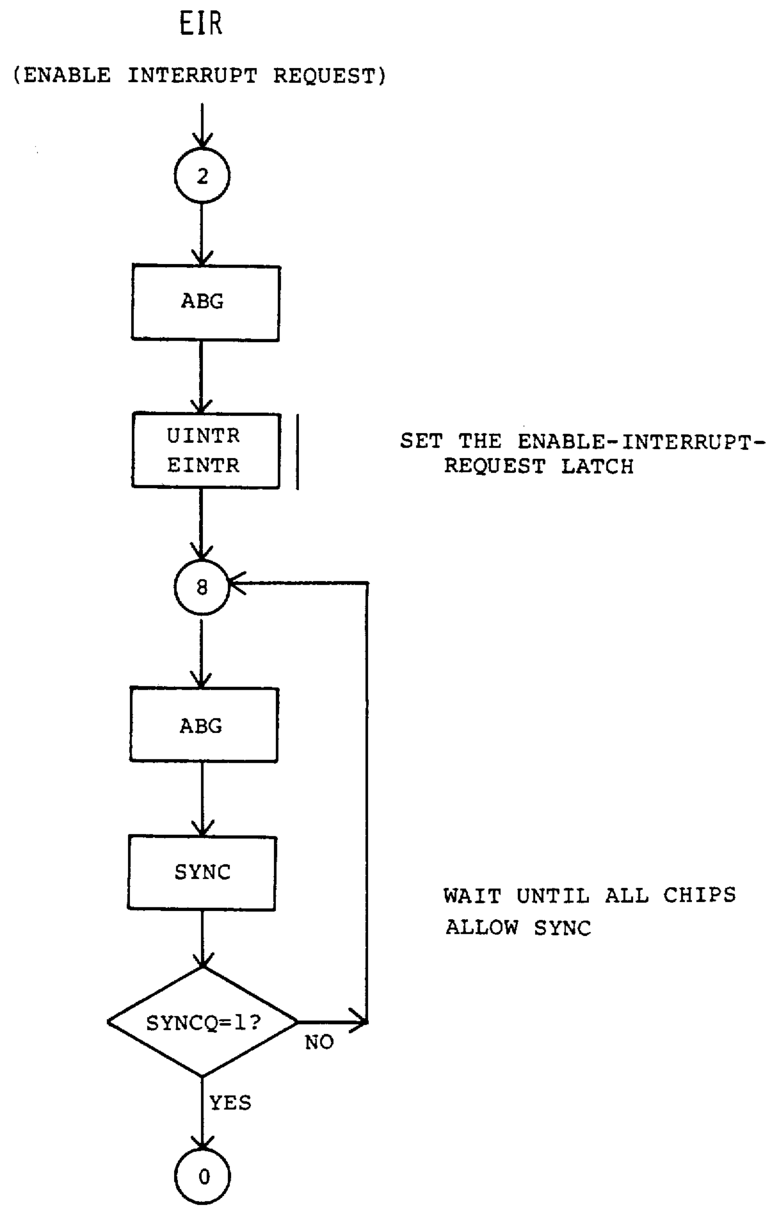
Figure 93E:
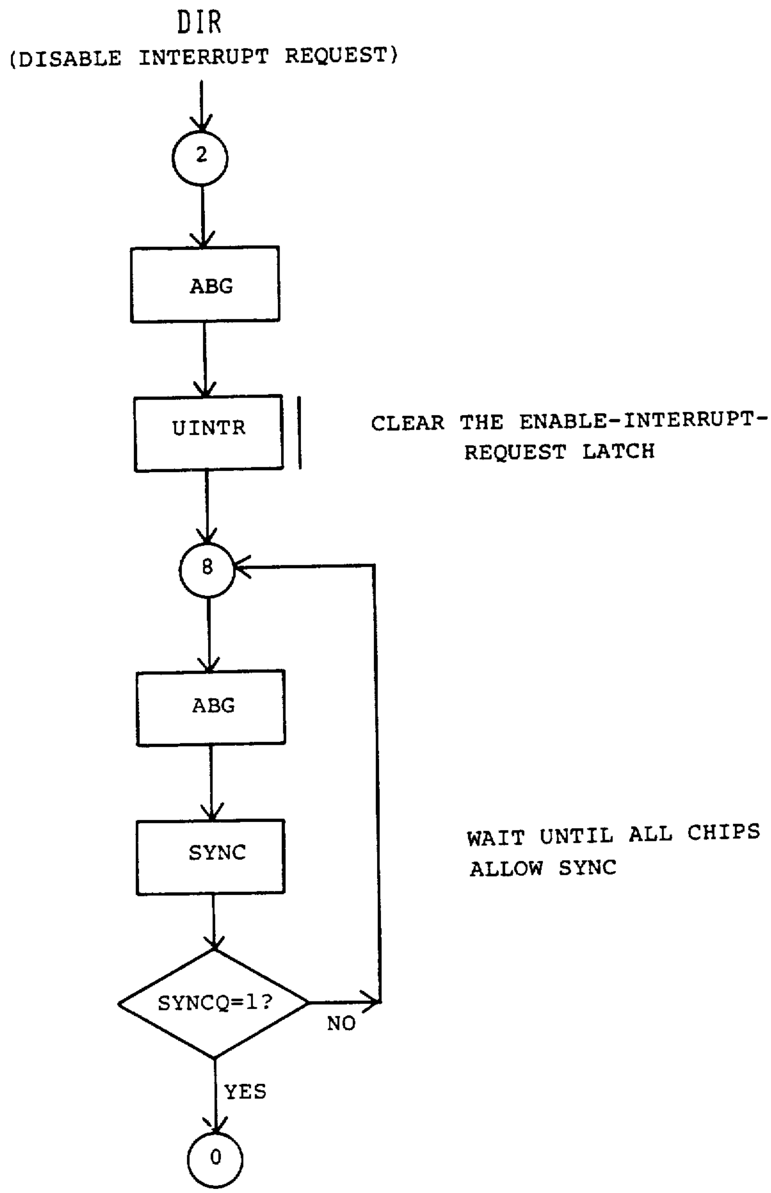
Figure 93F:
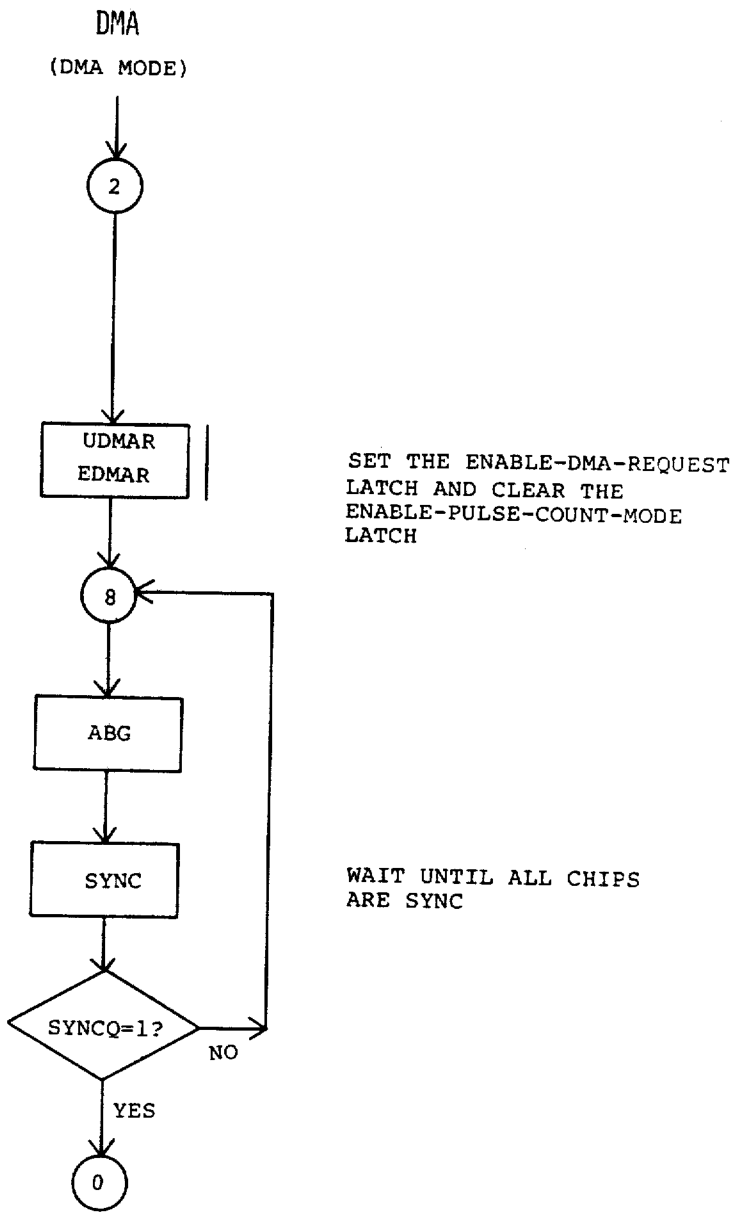
Figure 93G:
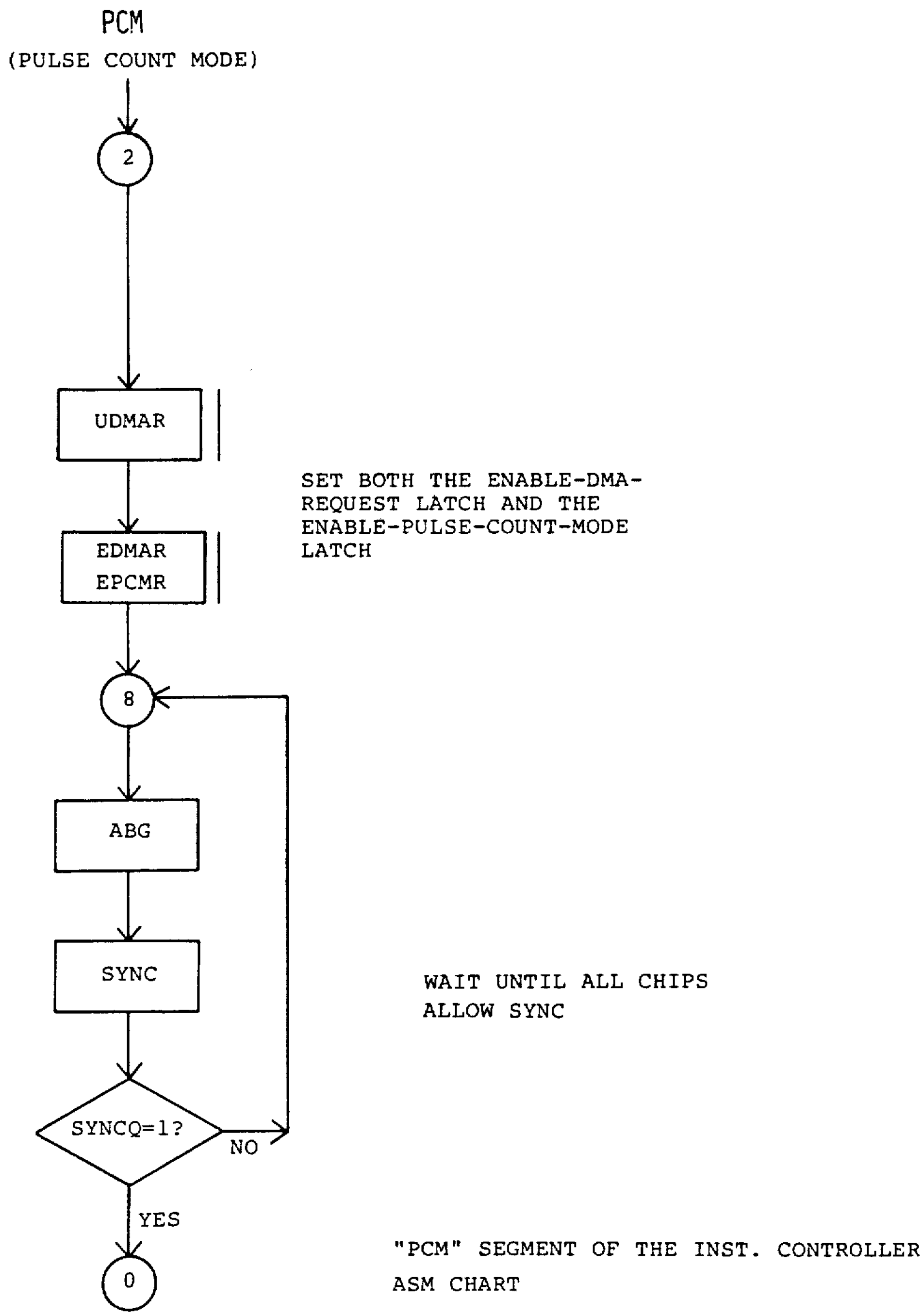
Figure 93H:
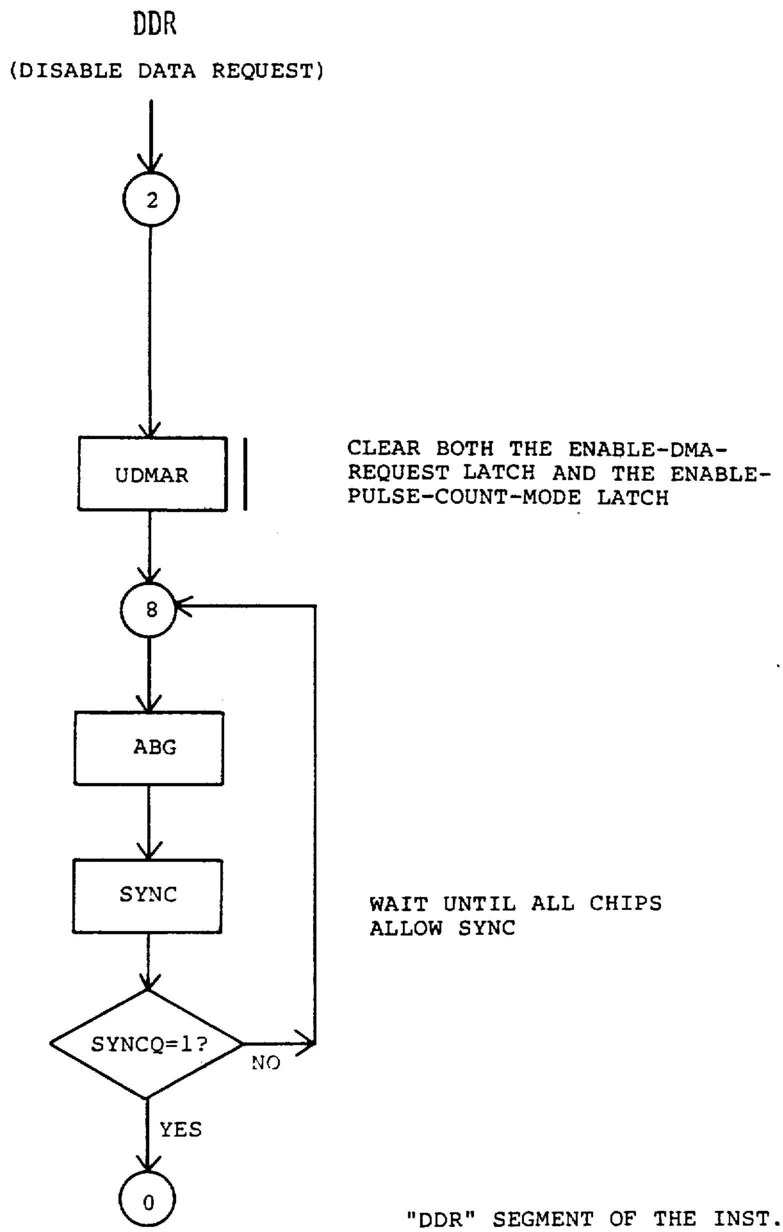
Figure 93I:
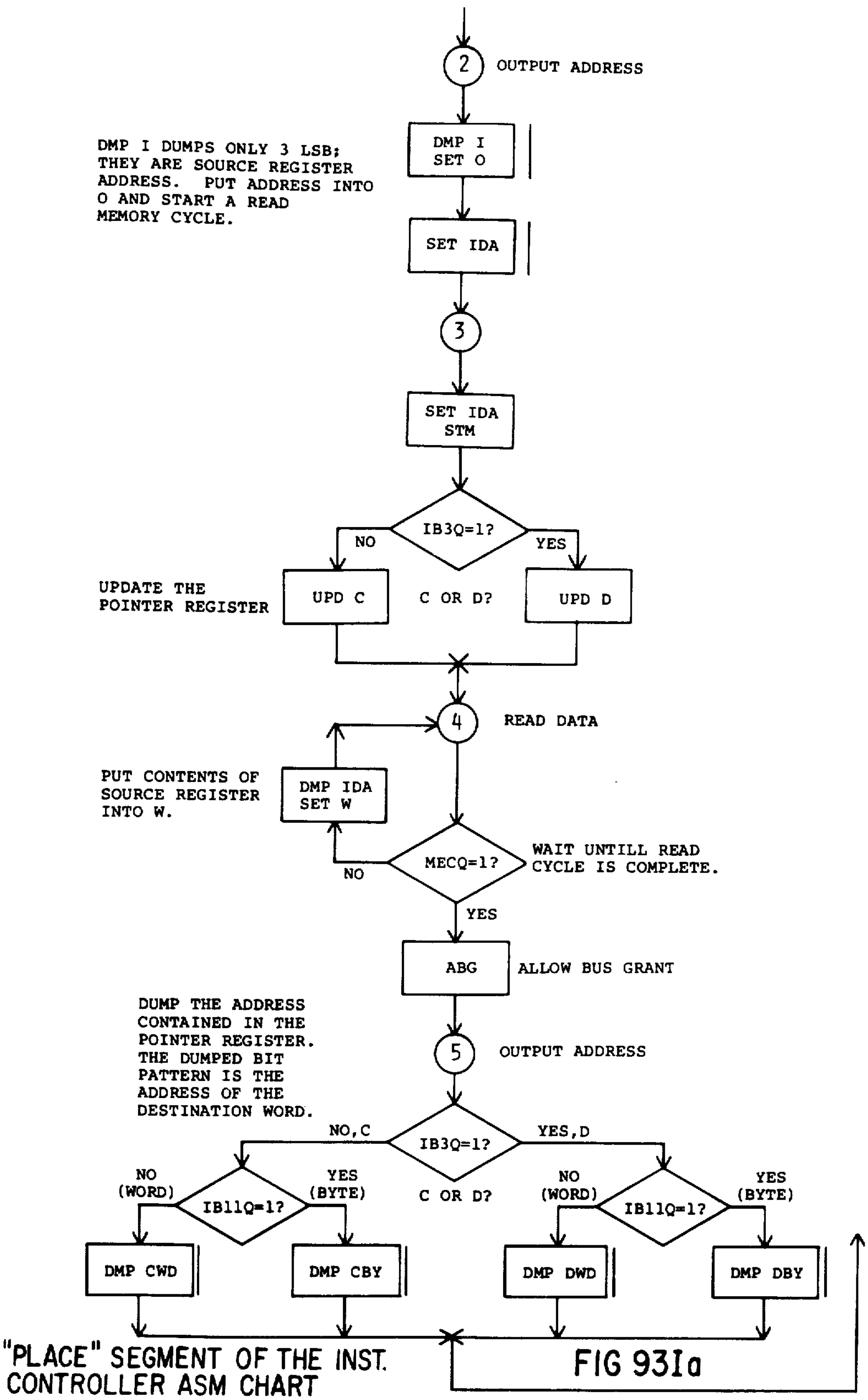
Figure 93I:
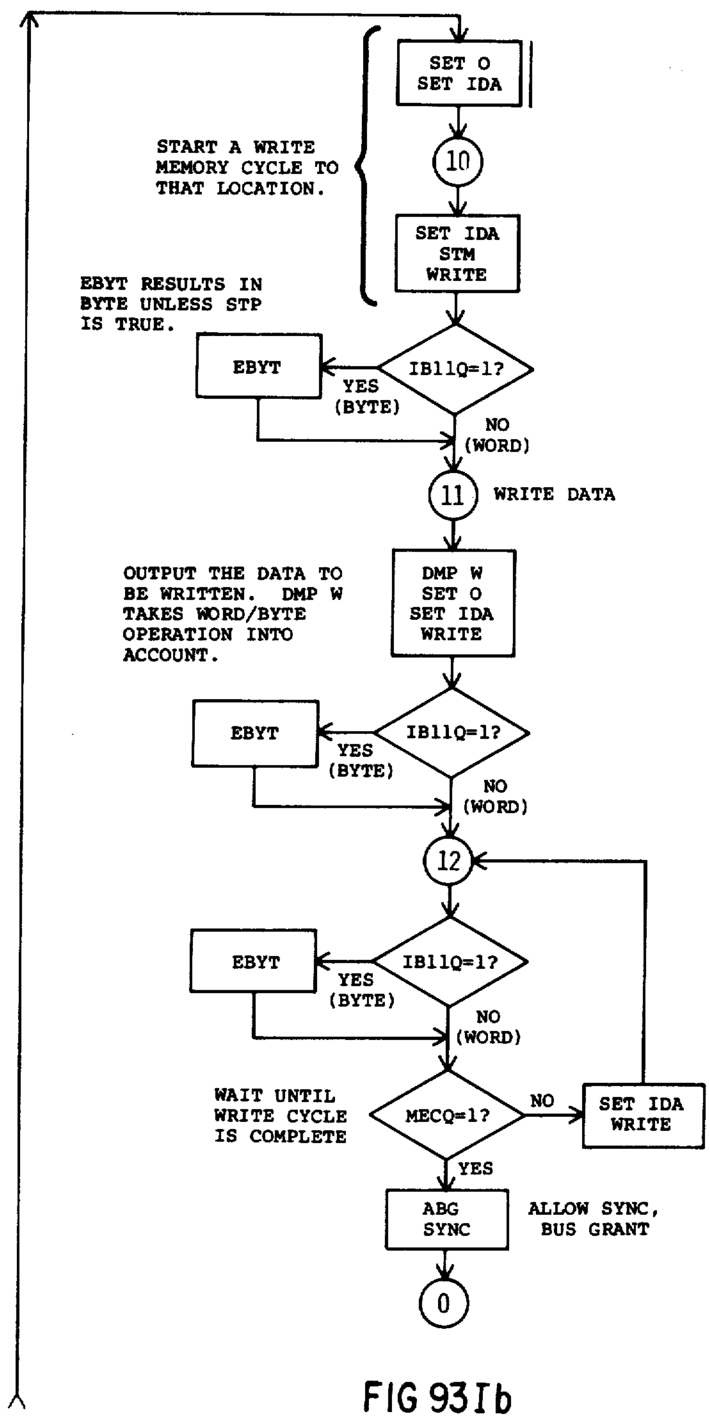
Figure 93J:
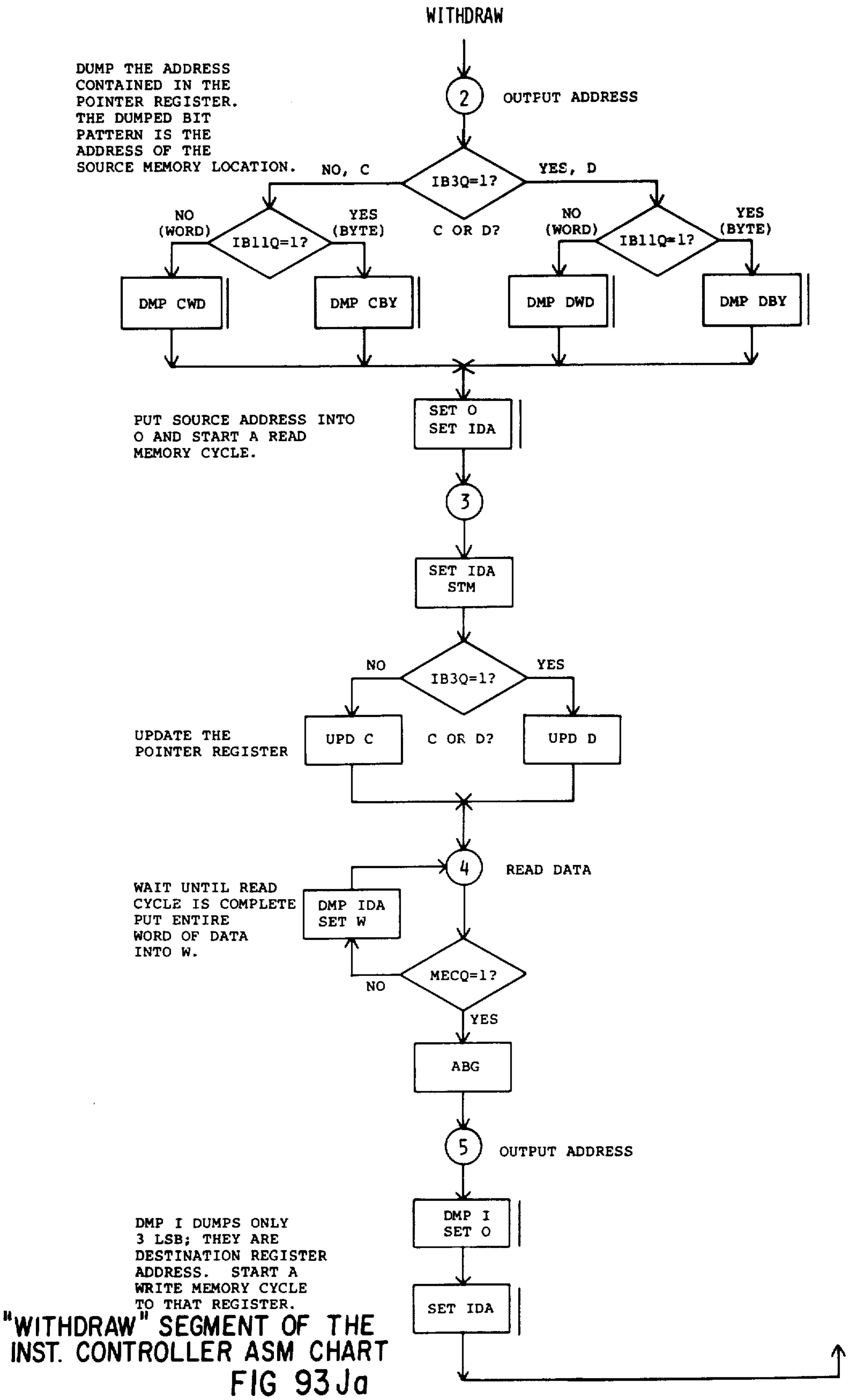
Figure 93J:
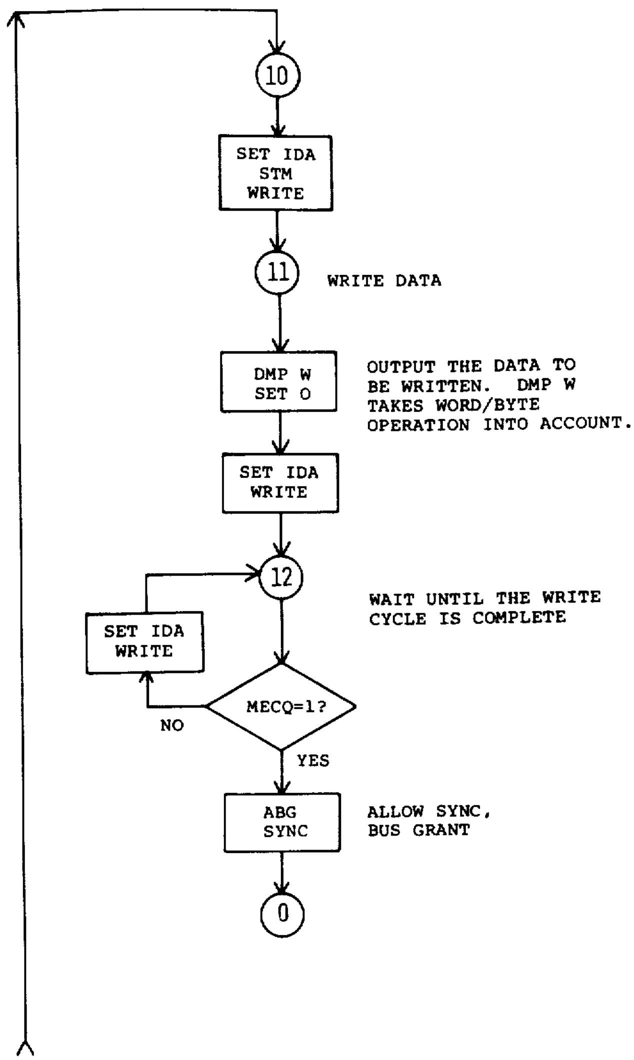
Figure 93K:
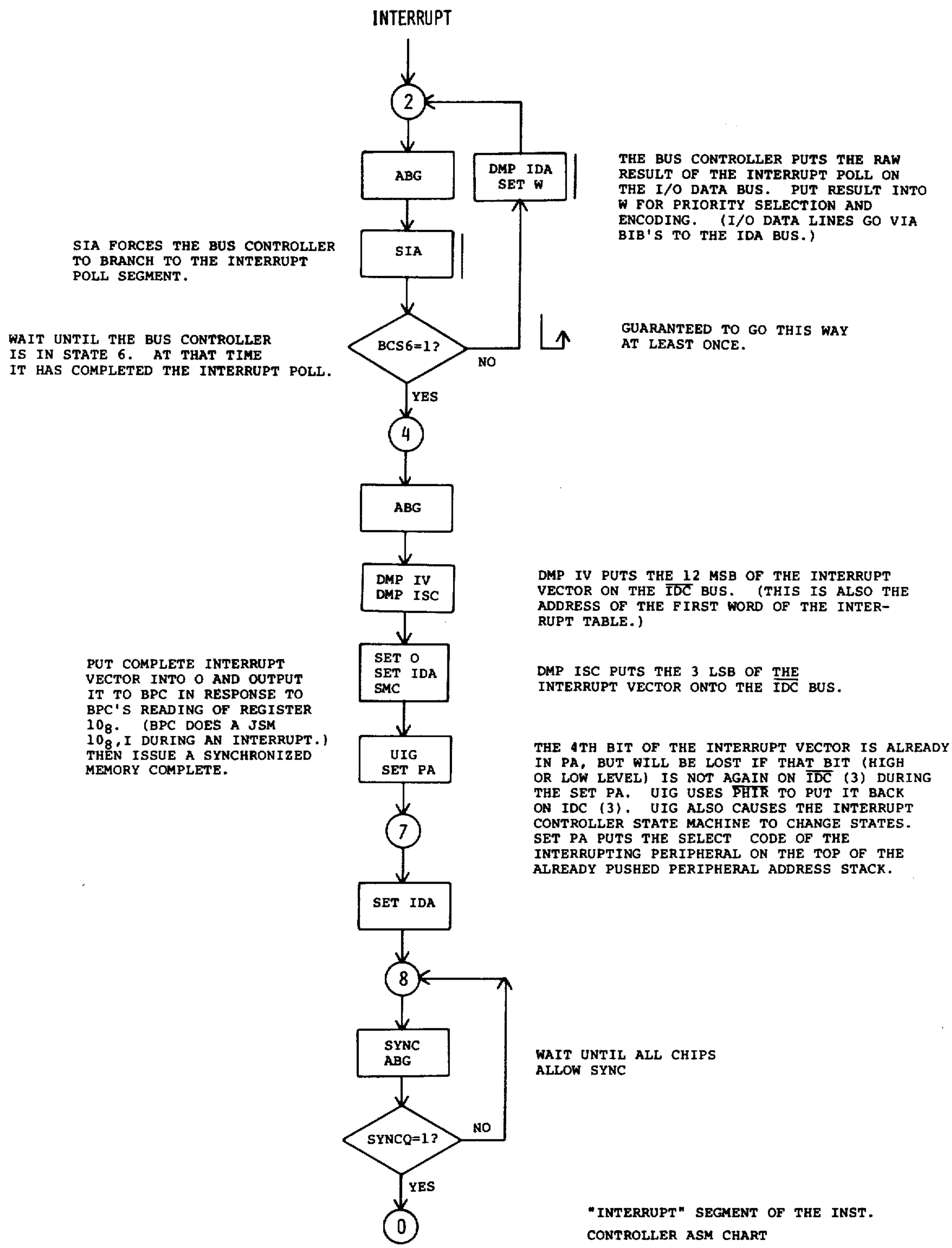

FIGS. 91A-C explain the conventions used in FIGS. 93*a*, 93A*b*-H, 93I*a*, 93I*b*, 93J*a*, and 93J*b*-K.

Figure 92A:
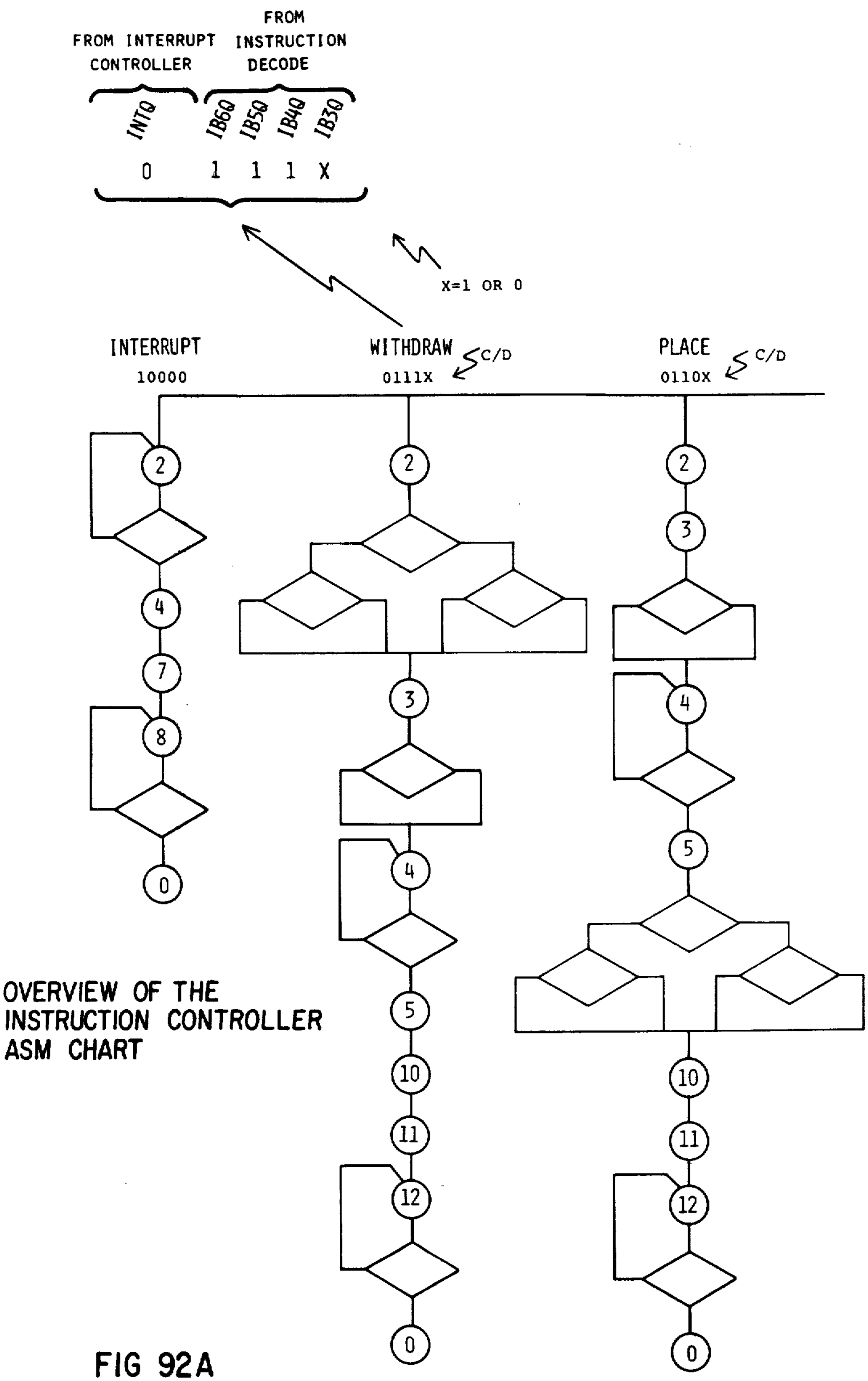

FIGS. 92A-B represent a flow chart overview summarizing the information presented in FIGS. 93A*a*-93A*b*-H, 93I*a*, 93I*b*, 93J*a*, and 93J*b*-K.

FIGS. 93A*a*-93A*b*-H, 93I*a*, 93I*b*, 93J*a*, and 93J*b*-K are flow charts illustrating the operation of the instruction controller portions of the IOC's of FIG. 43.

Figure 94B:
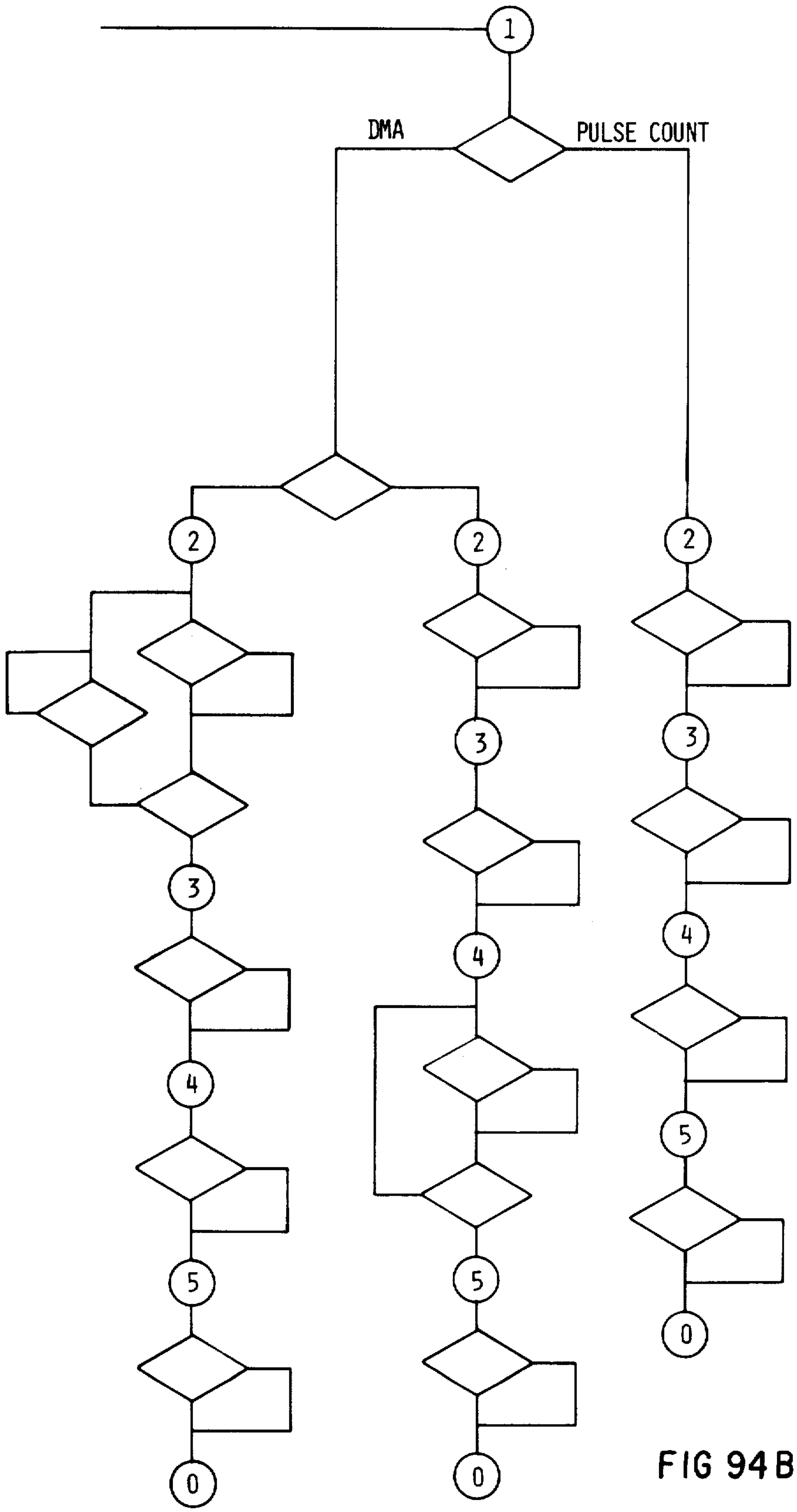
Figure 95A:
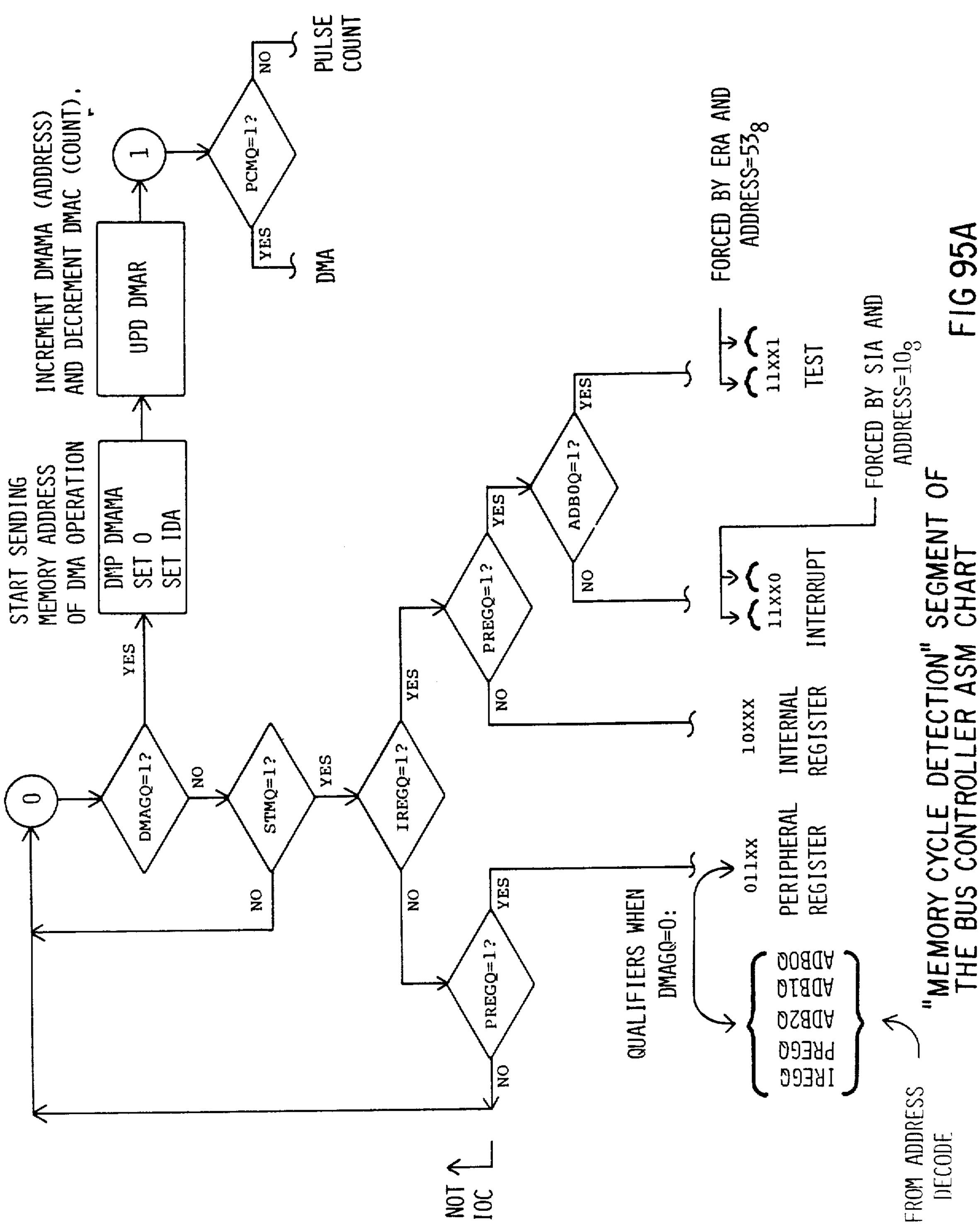
Figure 95B:
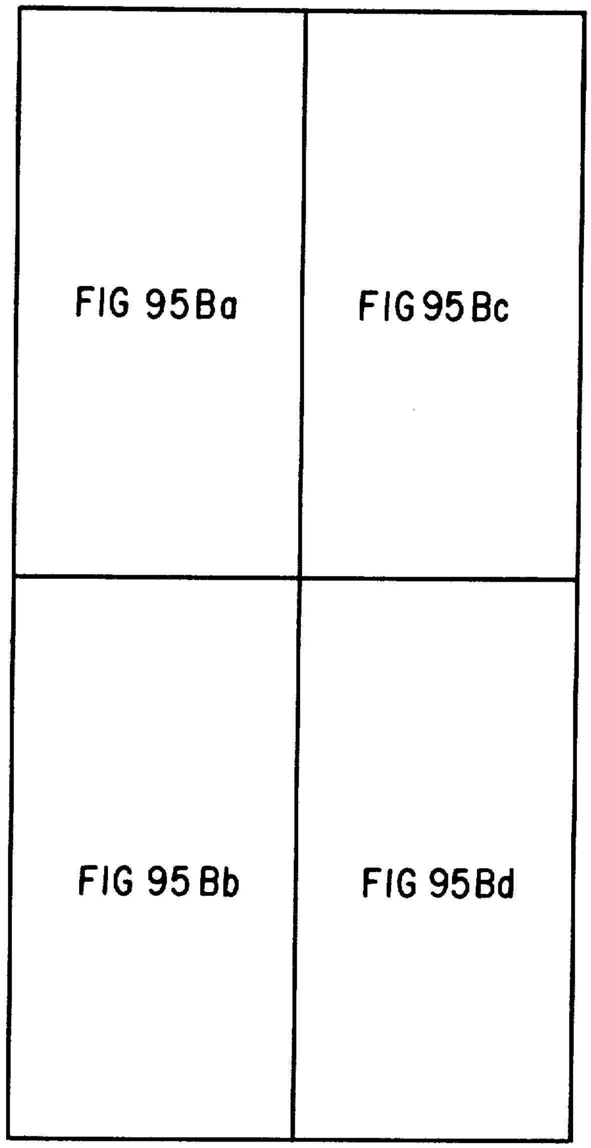
Figure 95B:
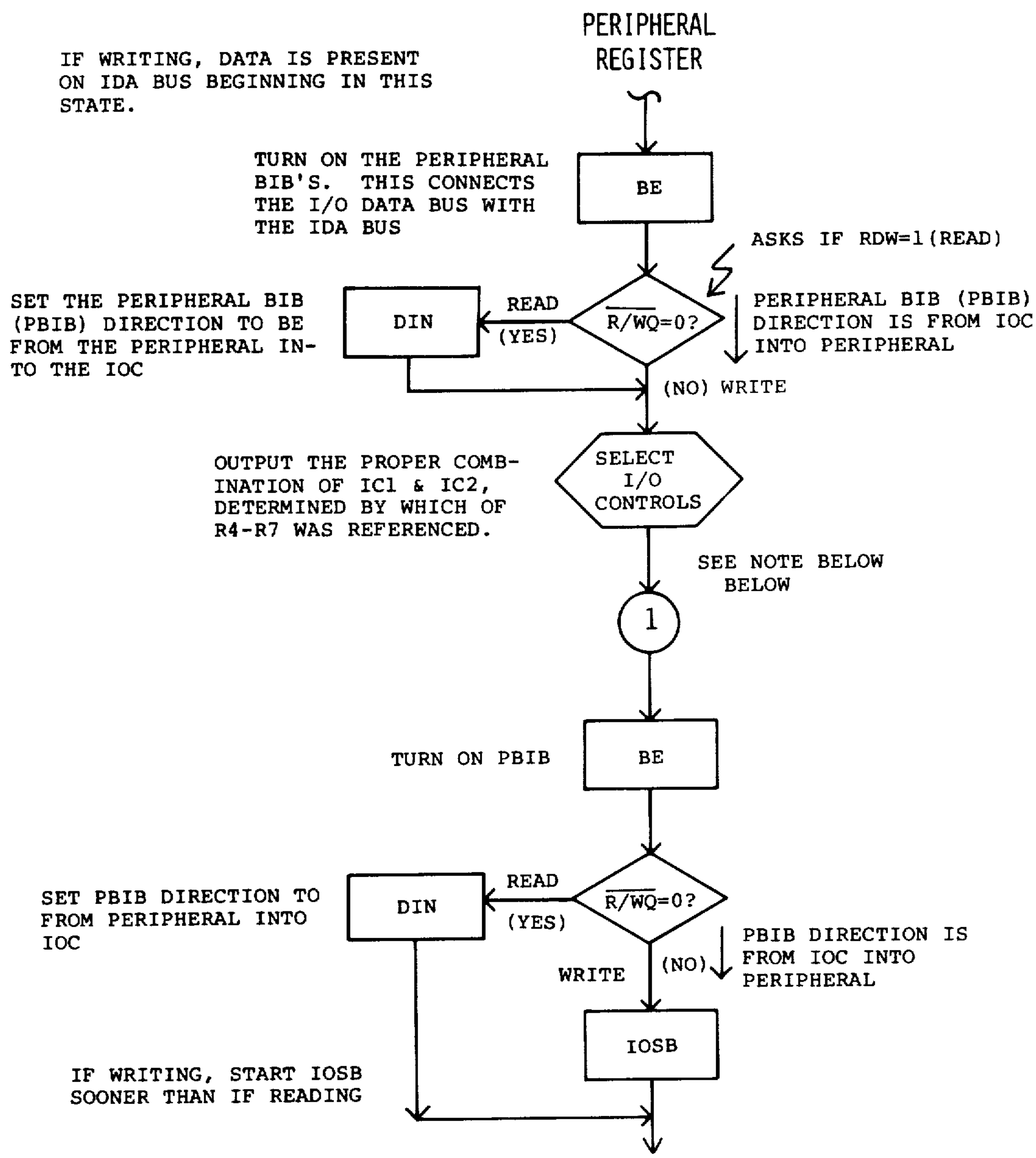
Figure 95B:
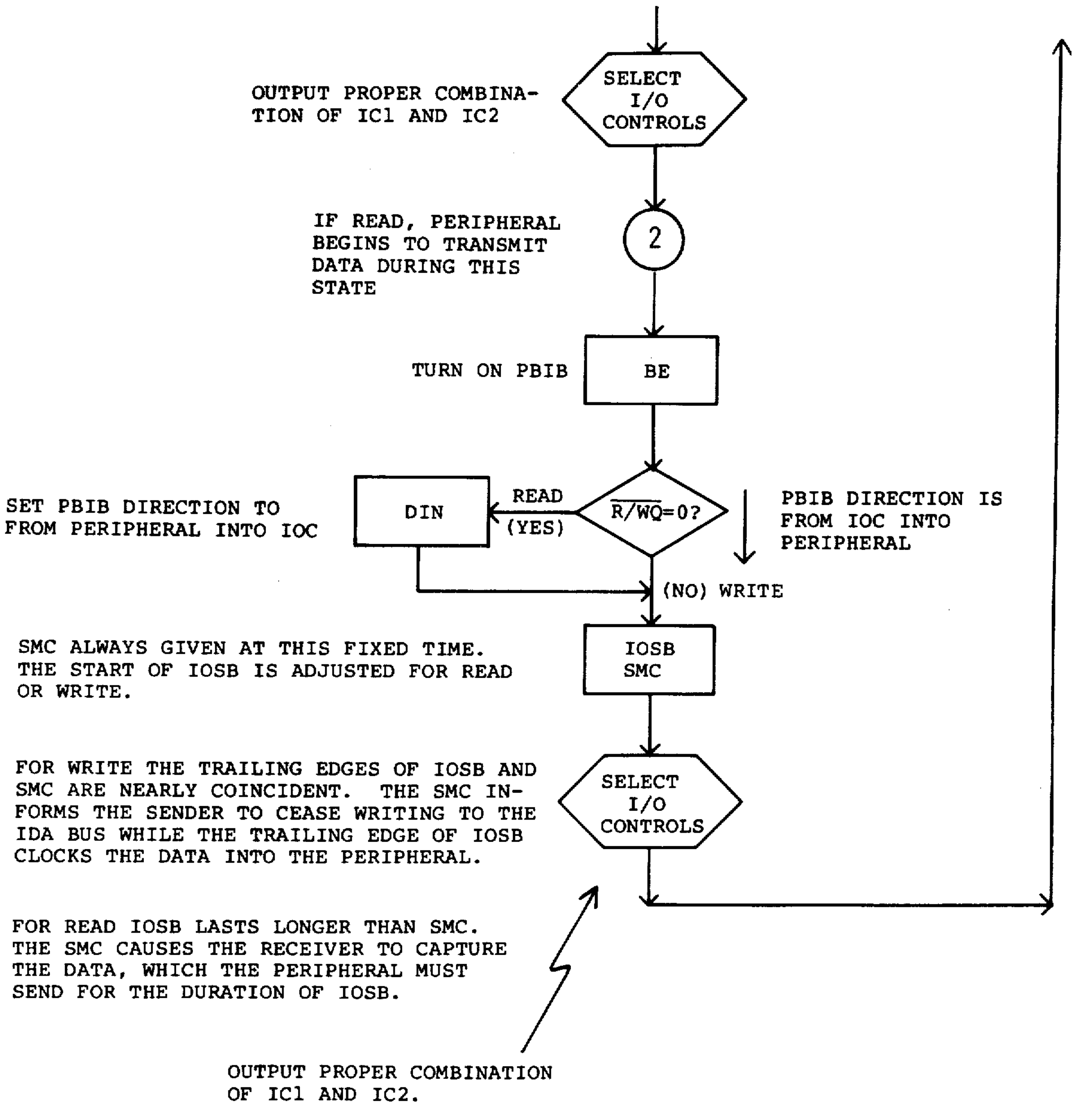
Figure 95B:
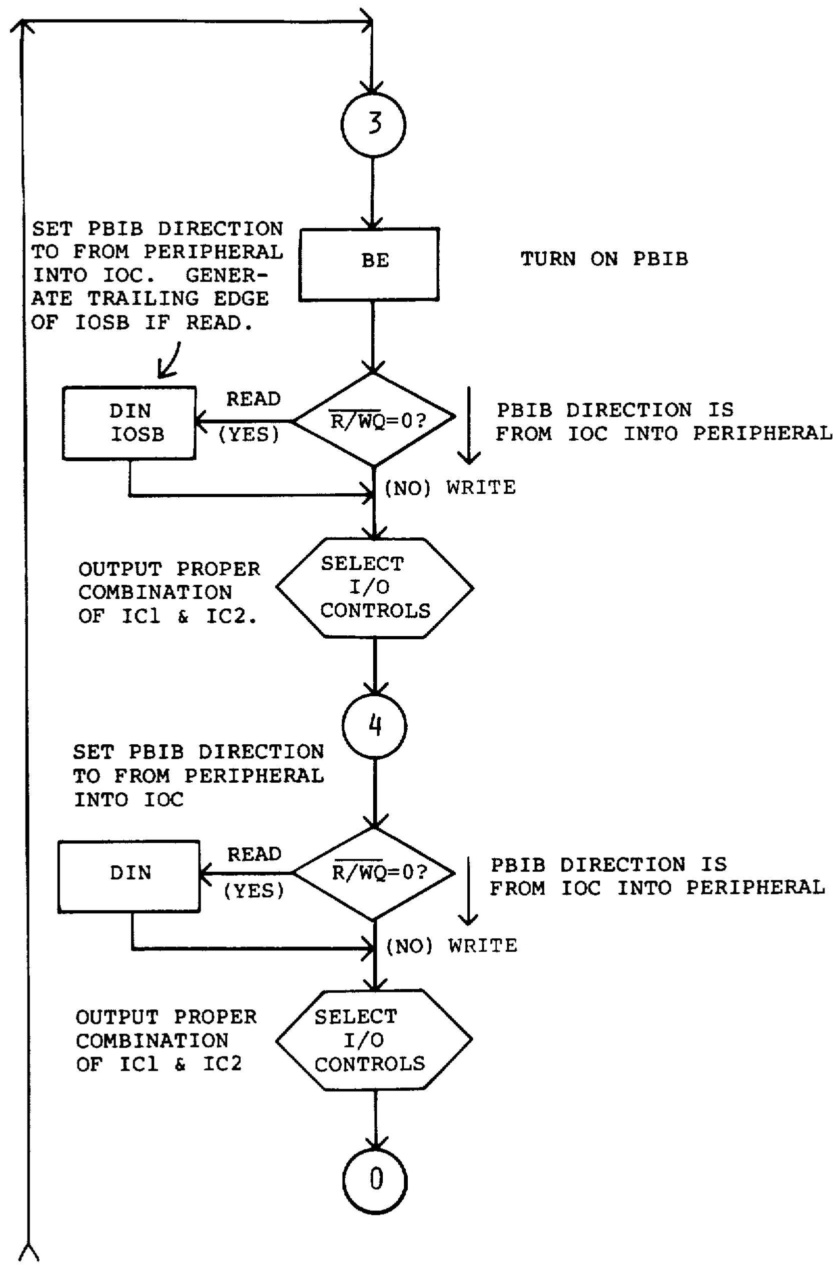
Figure 95:
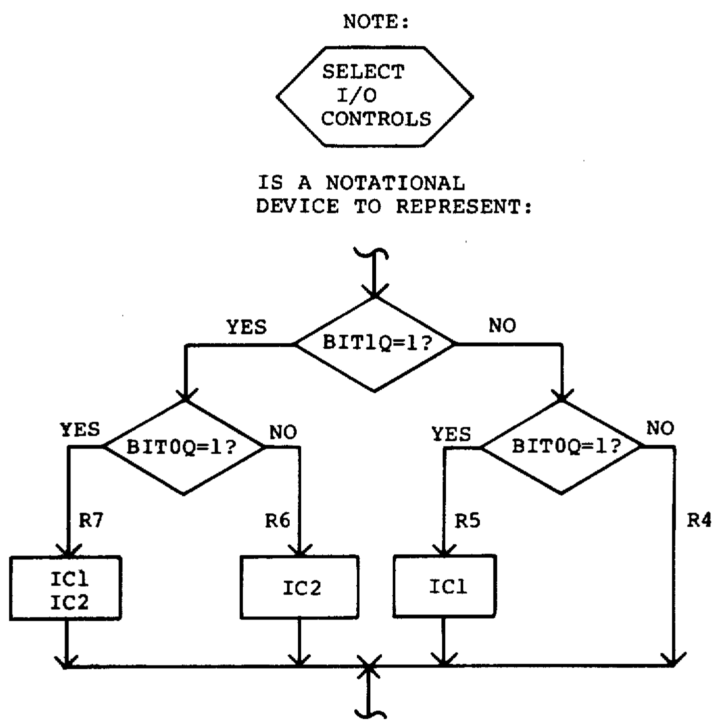
Figure 95C:
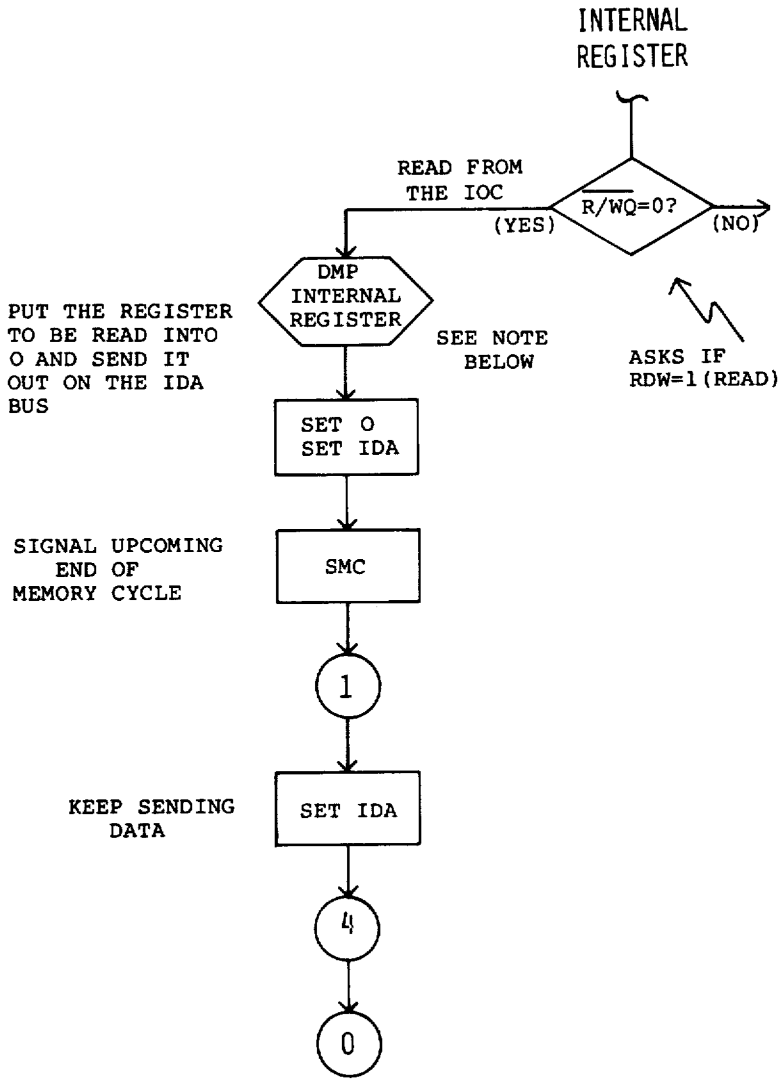
Figure 95C:
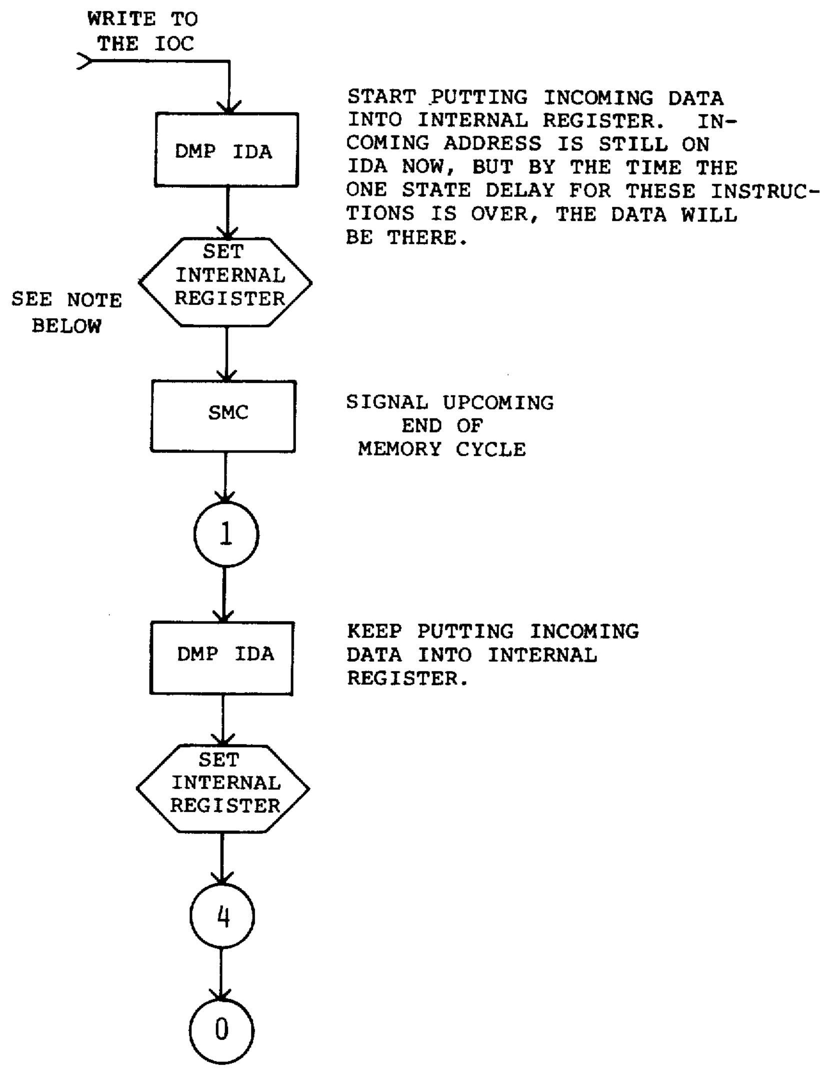
Figure 95D:
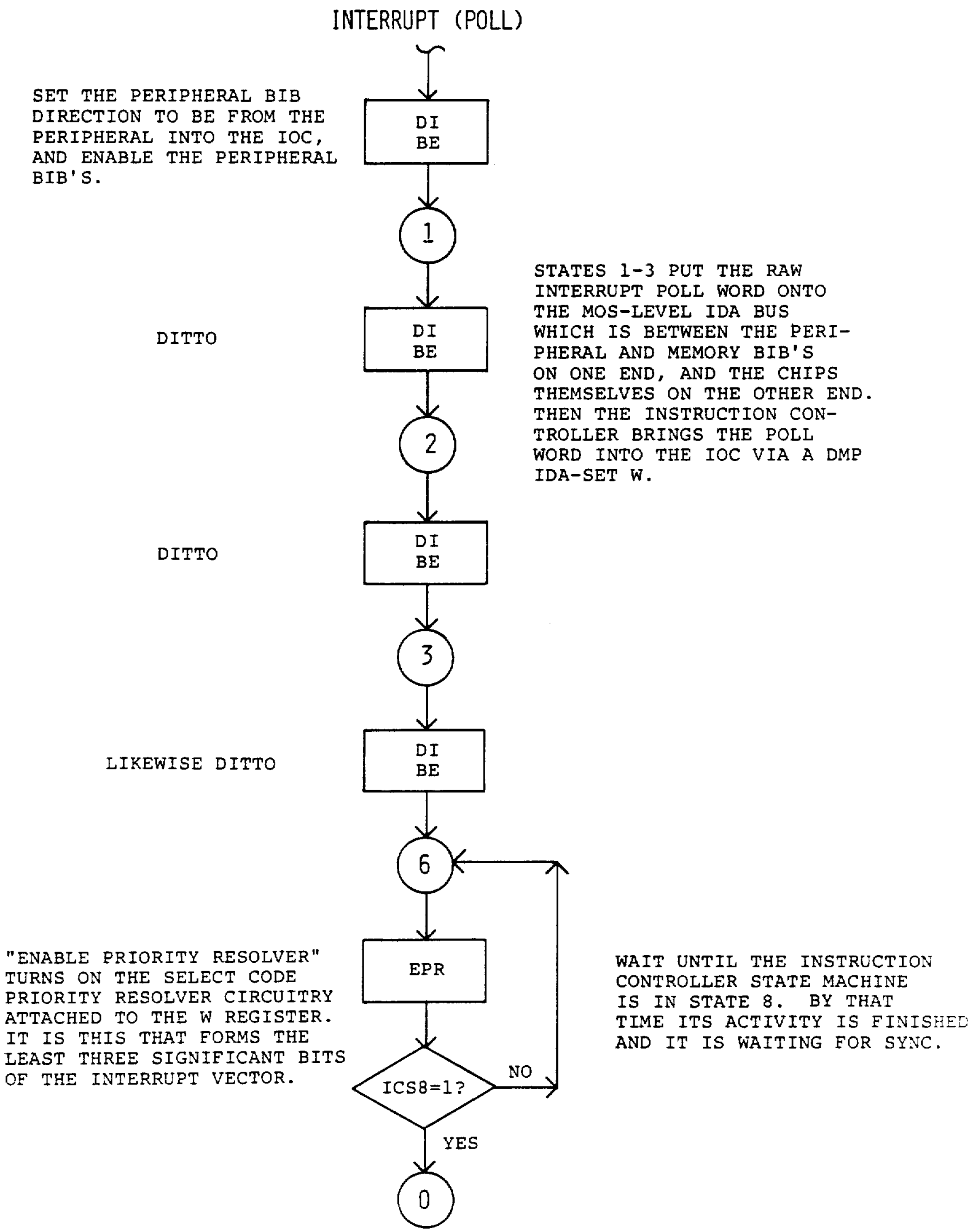
Figure 95E:
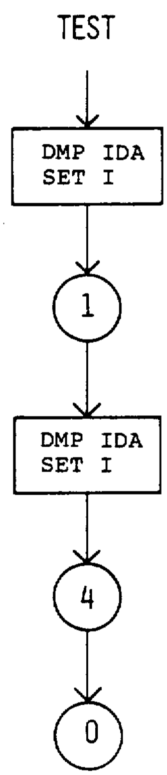
Figure 95F:
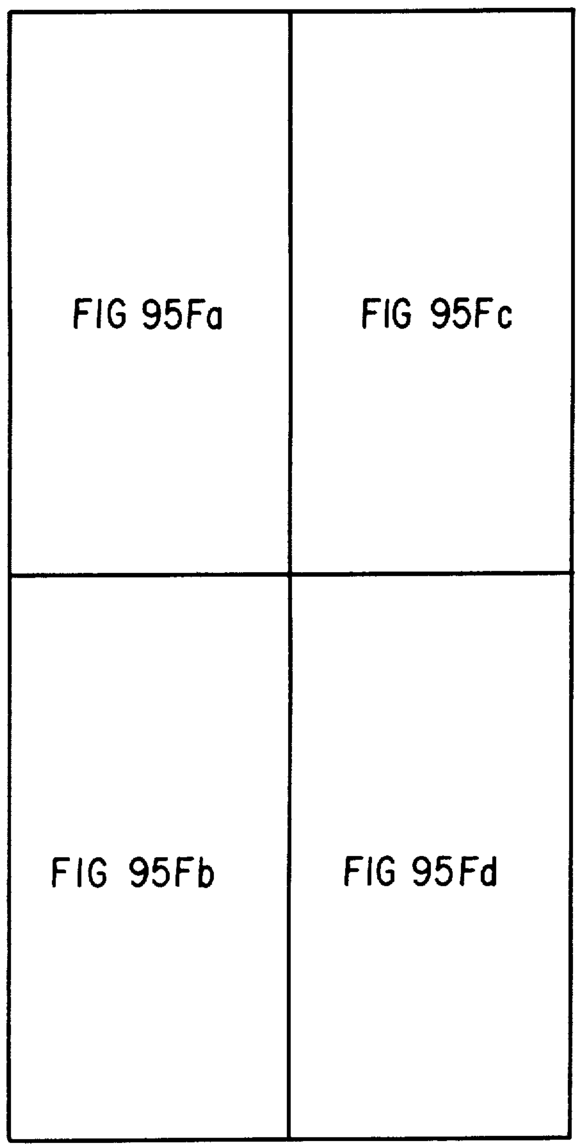
Figure 95F:
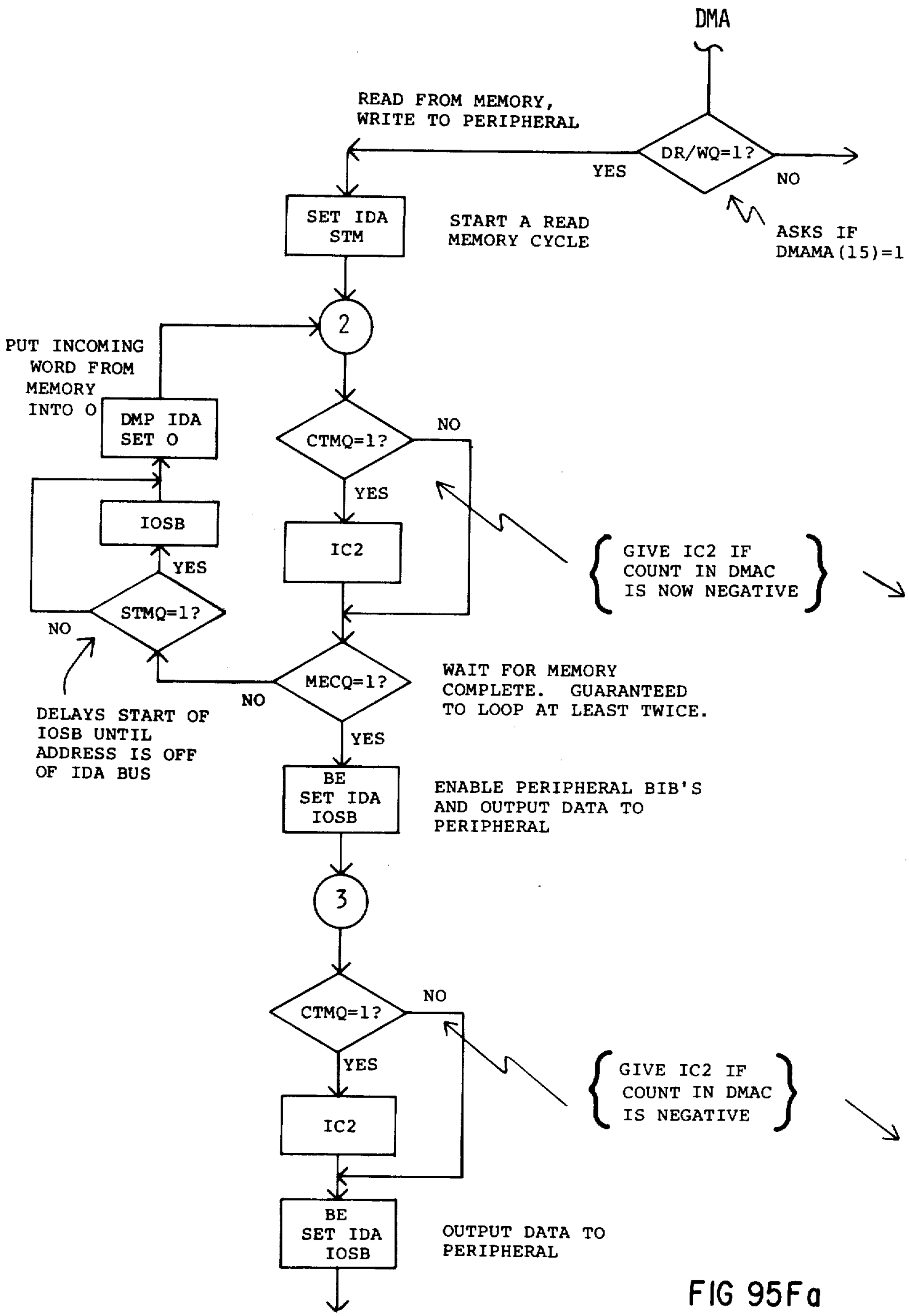
Figure 95F:
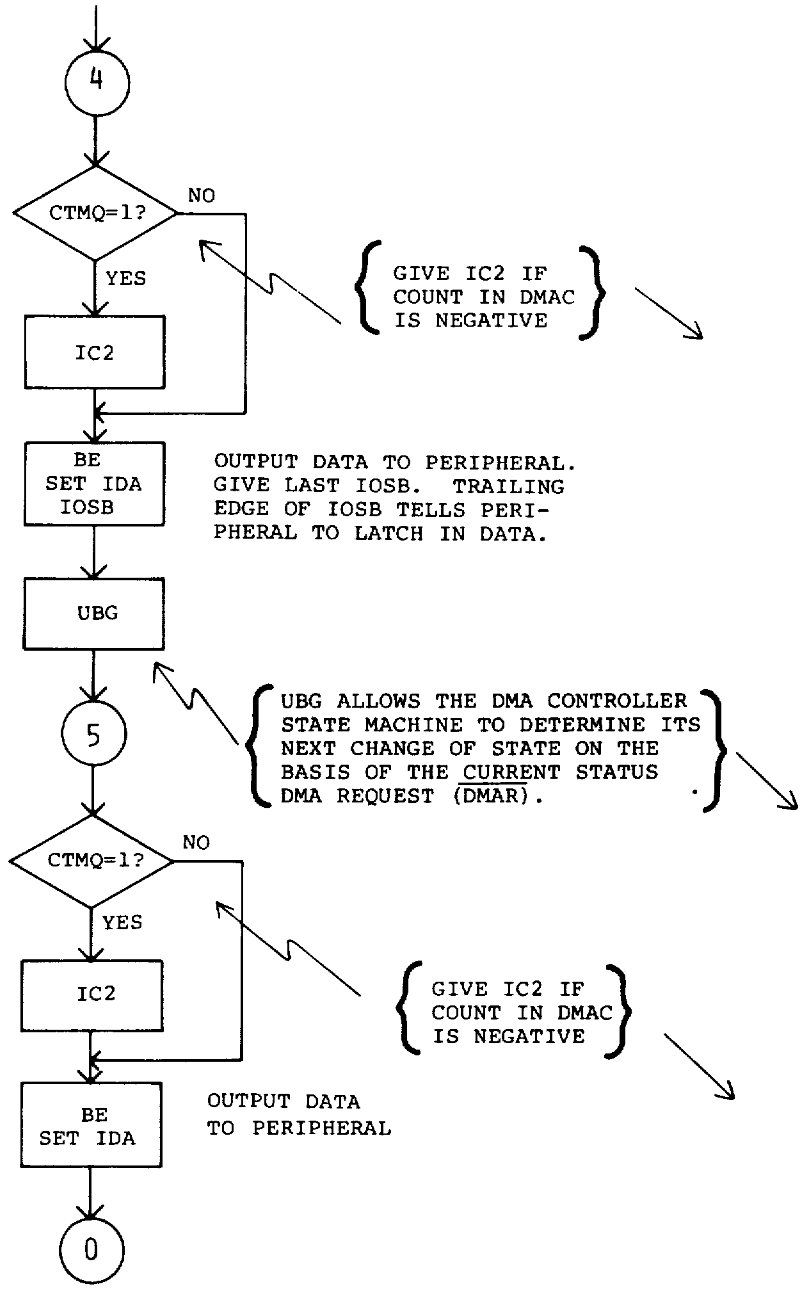
Figure 95F:
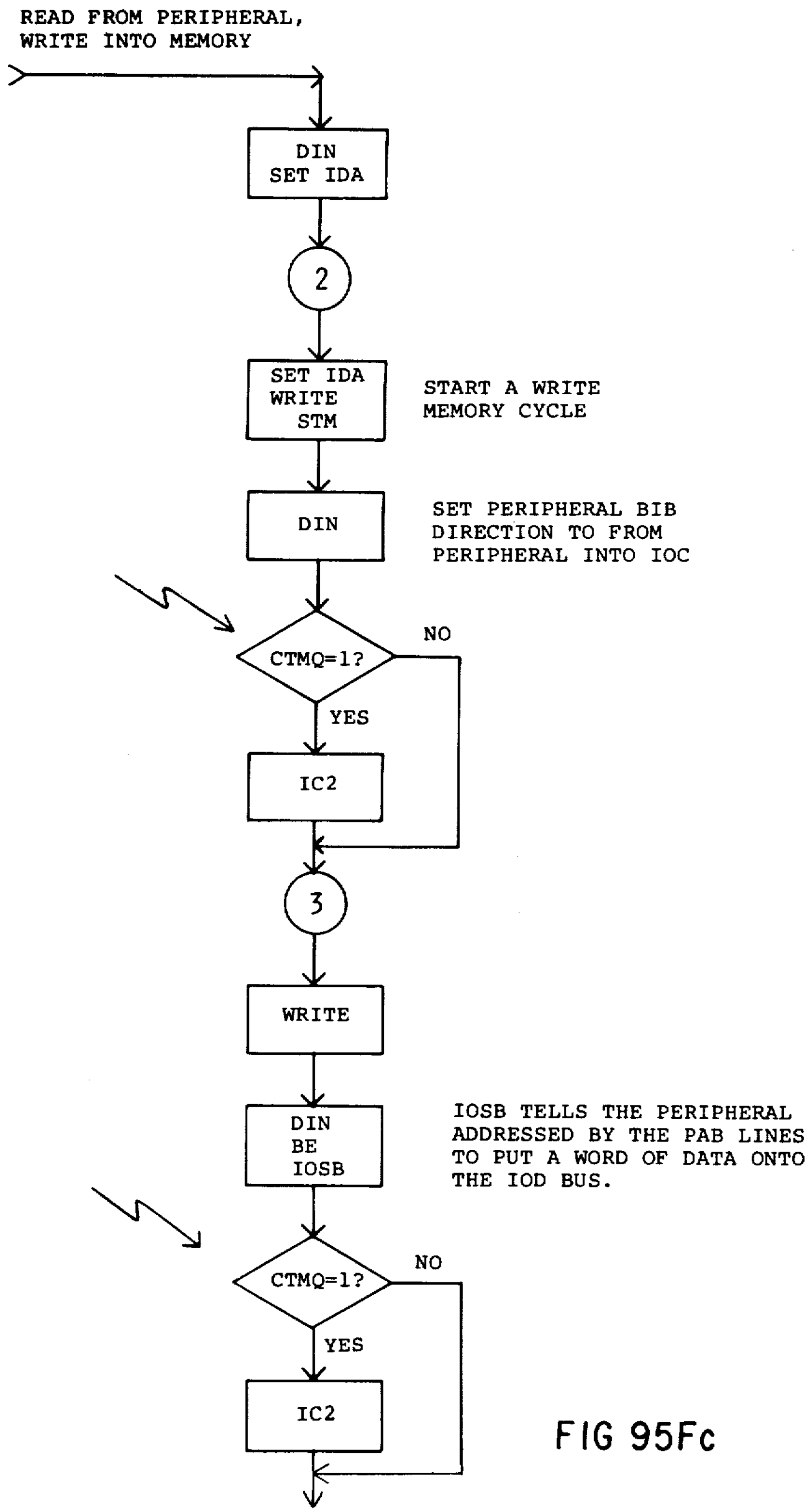
Figure 95F:
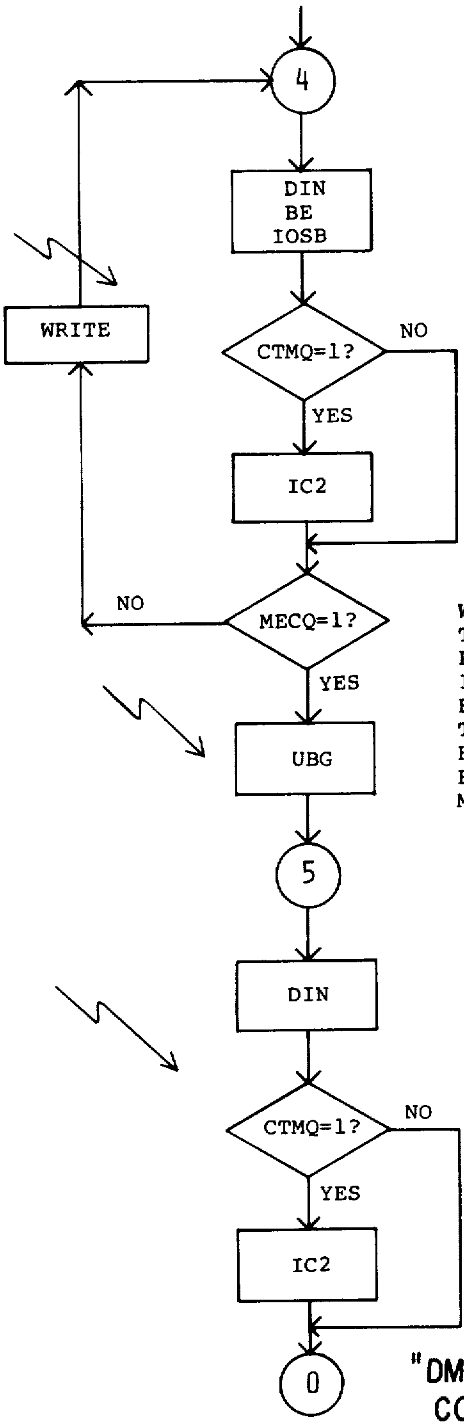

FIGS. 94A-B represent a flow chart overview summarizing the information presented in FIGS. 95A, 95B (showing the relationship of 95B*a*-B*d*), 95C*a* and 95C*b*-G, with FIG. 95F showing the relationship of FIGS. 95F*a*-*d*.

FIGS. 95A, 95*b* (showing the relationship of FIGS. 95B*a*–B*d*), 95C*a*, 95C*b*–G, with FIG. 95F showing the relationship of FIGS. 95F*a*–*d* are flow charts illustrating the operation of the bus controller portions of the IOC's of FIG. 43.

FIG. 96 explains the conventions used in the waveform diagrams of FIGS. 97A–115B.

Figure 97A:
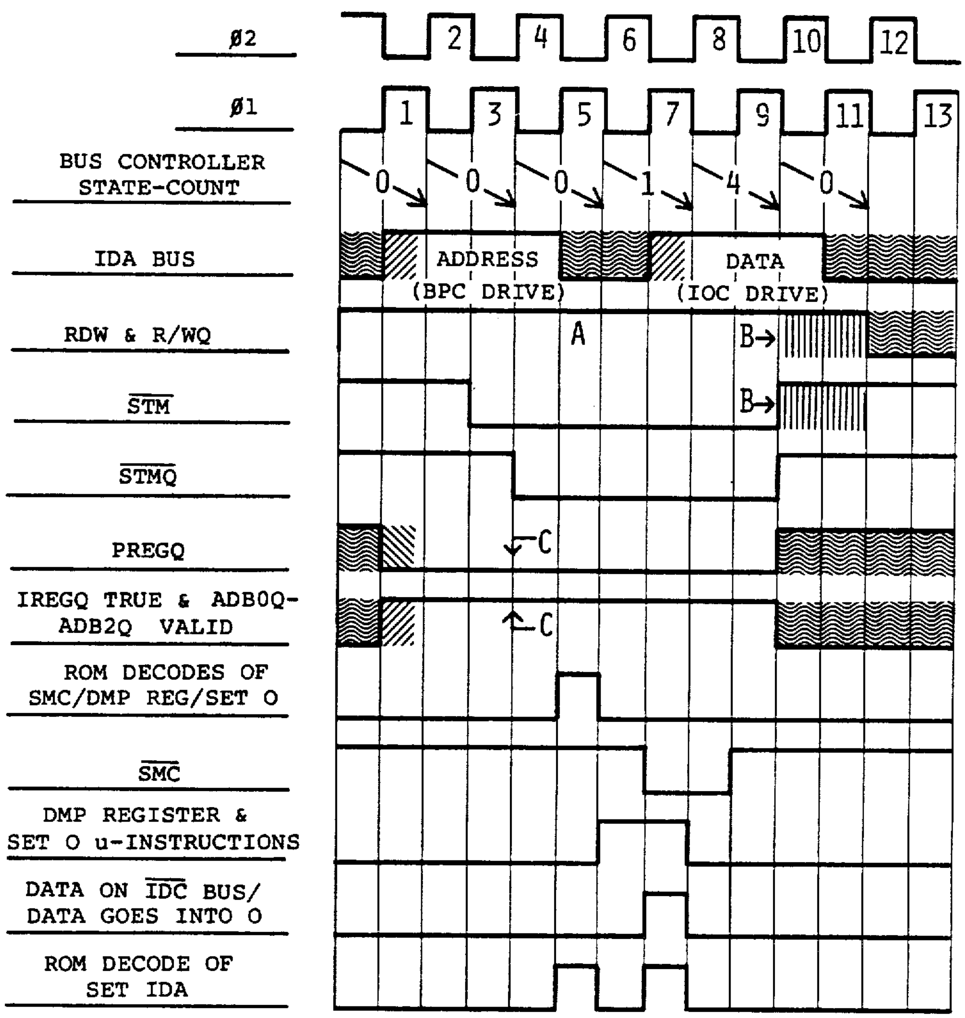
Figure 97B:
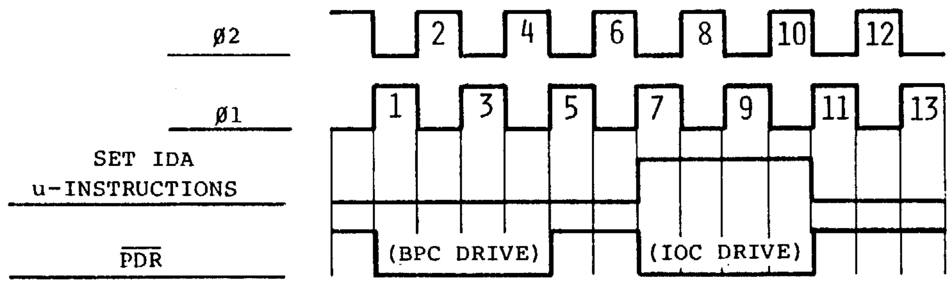

FIGS. 97A–B are a waveform diagram illustrating a read memory cycle directed to a register within an IOC of FIG. 43.

Figure 98A:
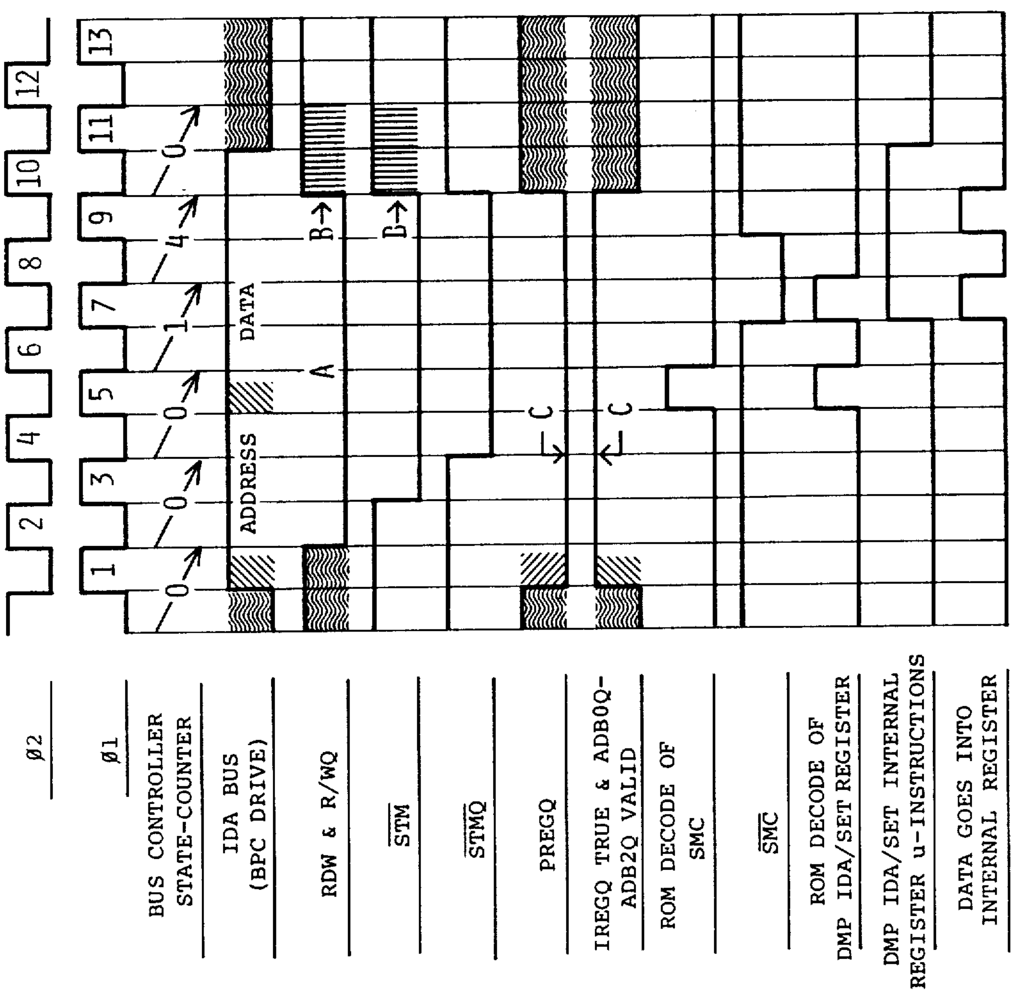
Figure 98B:
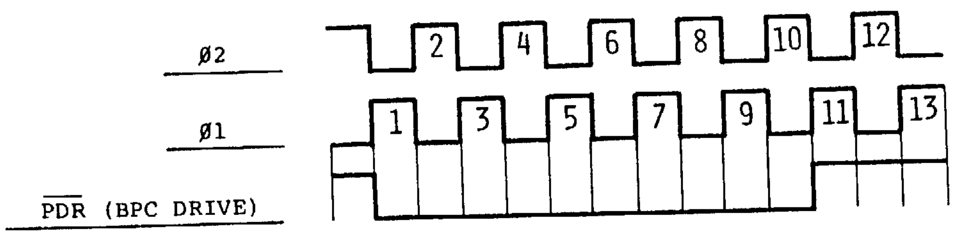

FIGS. 98A–B are a waveform diagram illustrating a write memory cycle in which the destination address is a register within an IOC of FIG. 43.

Figure 99A:
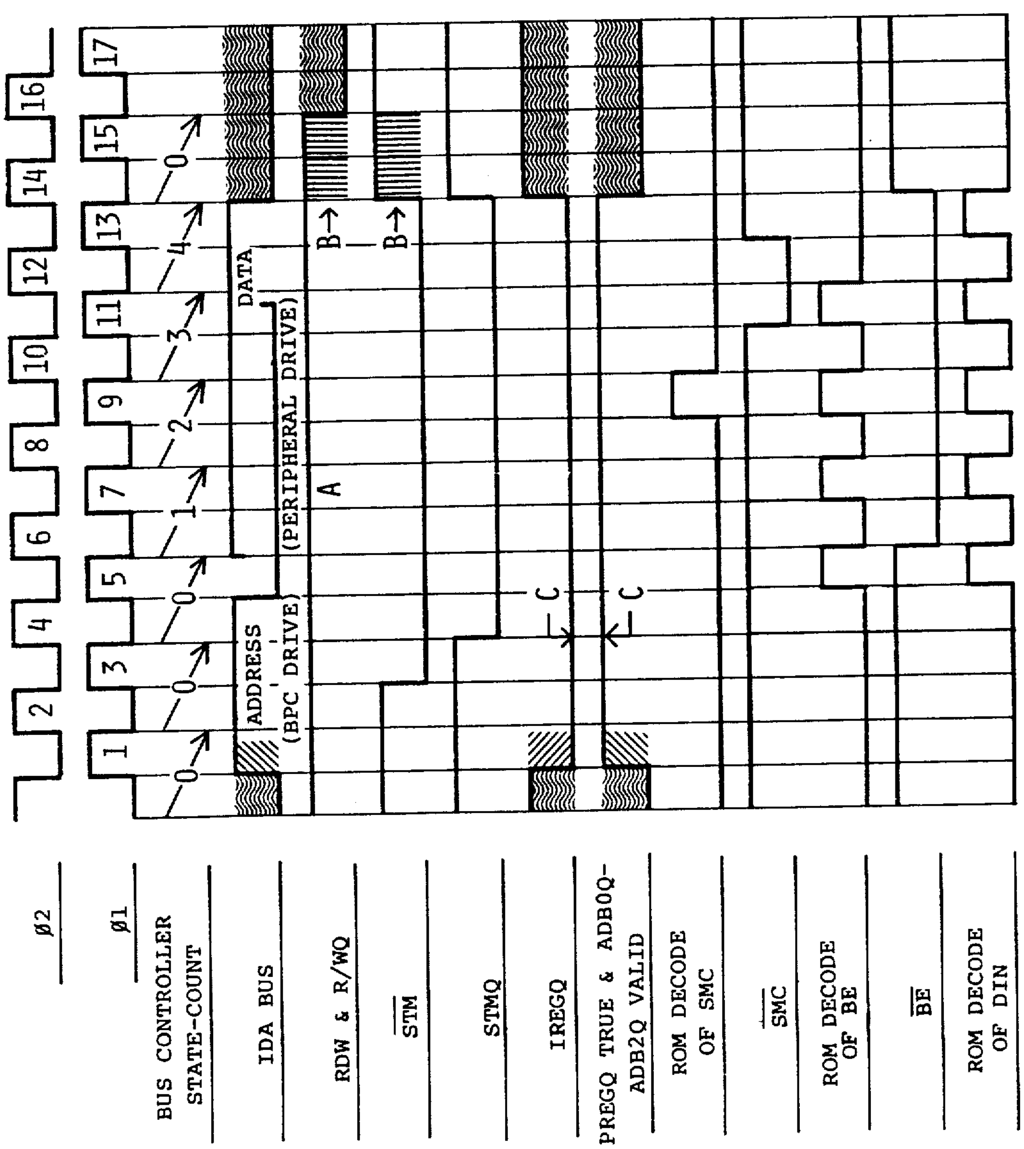
Figure 99B:
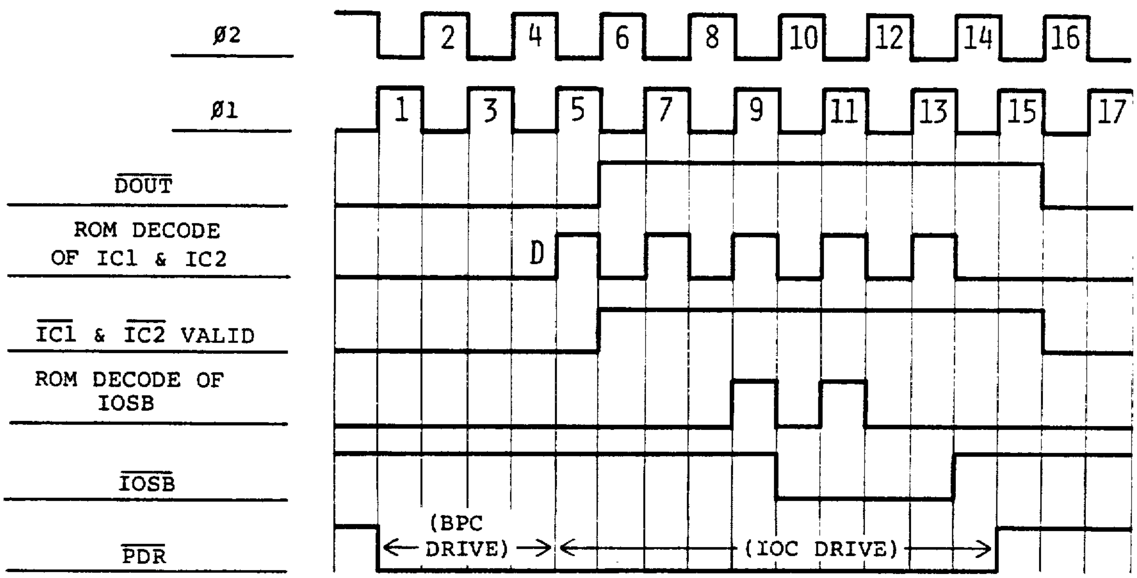

FIGS. 99A–B are a detailed waveform diagram illustrating a read I/O bus cycle in connection with IOC operation.

Figure 100A:
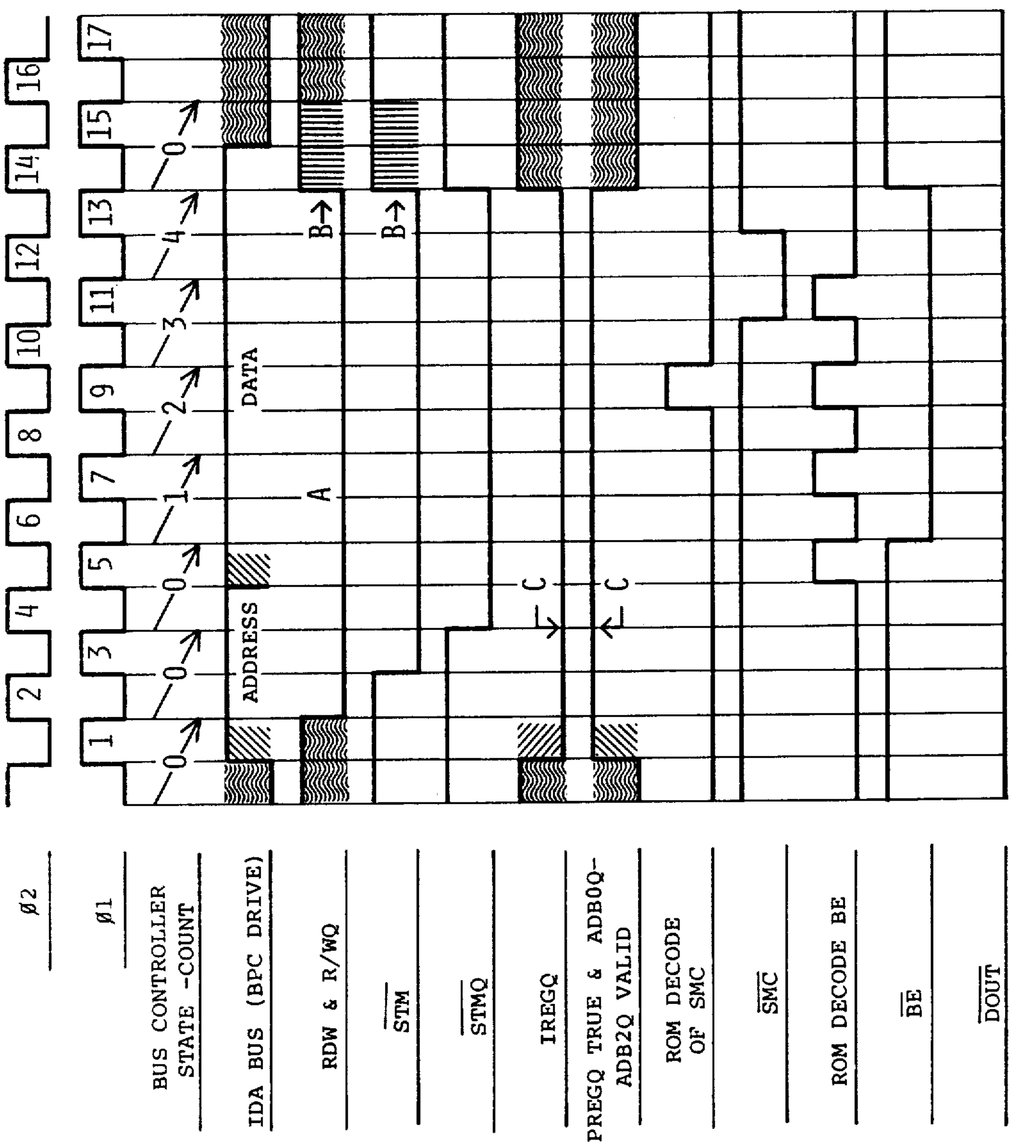
Figure 101A:
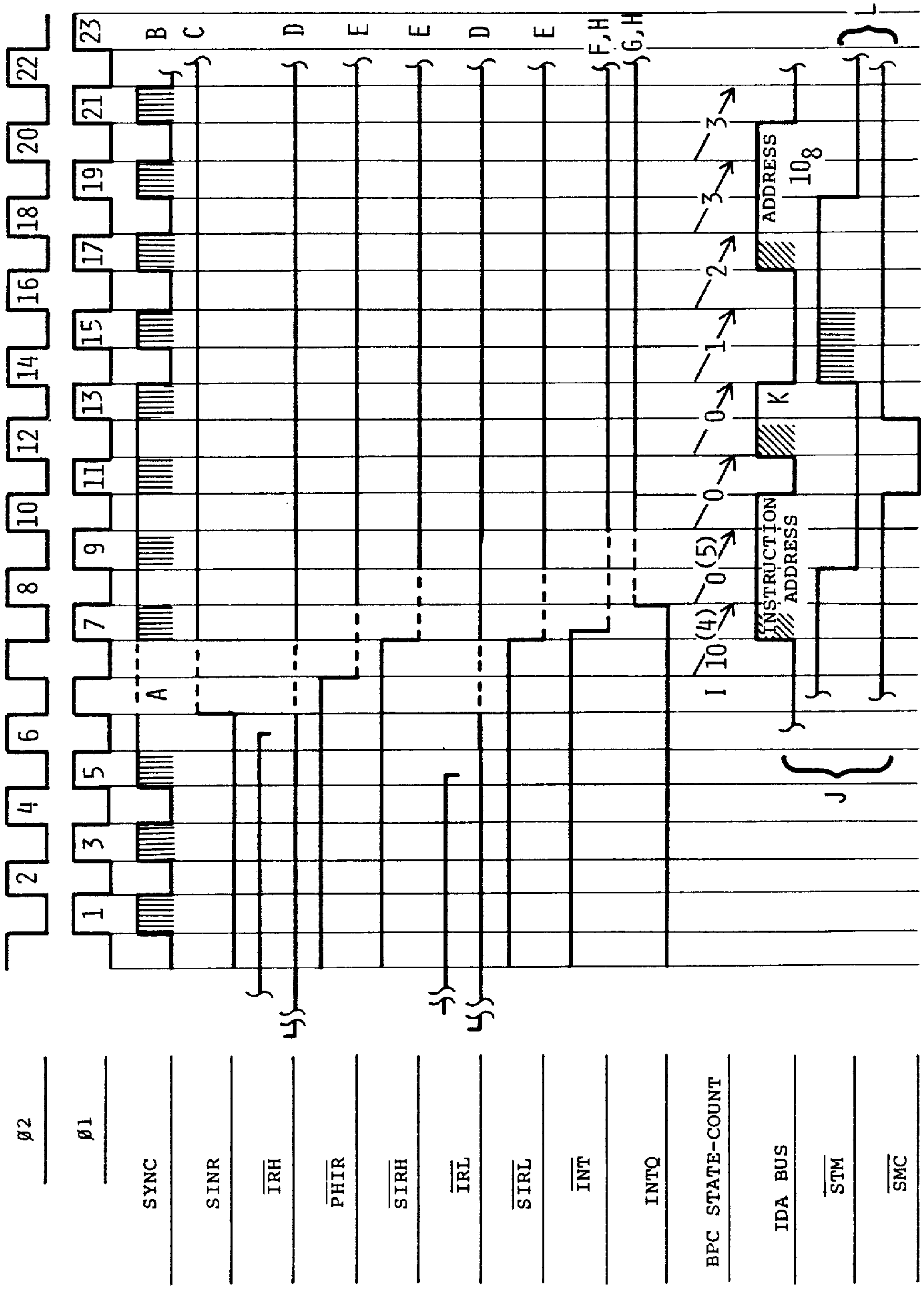
Figure 101C:
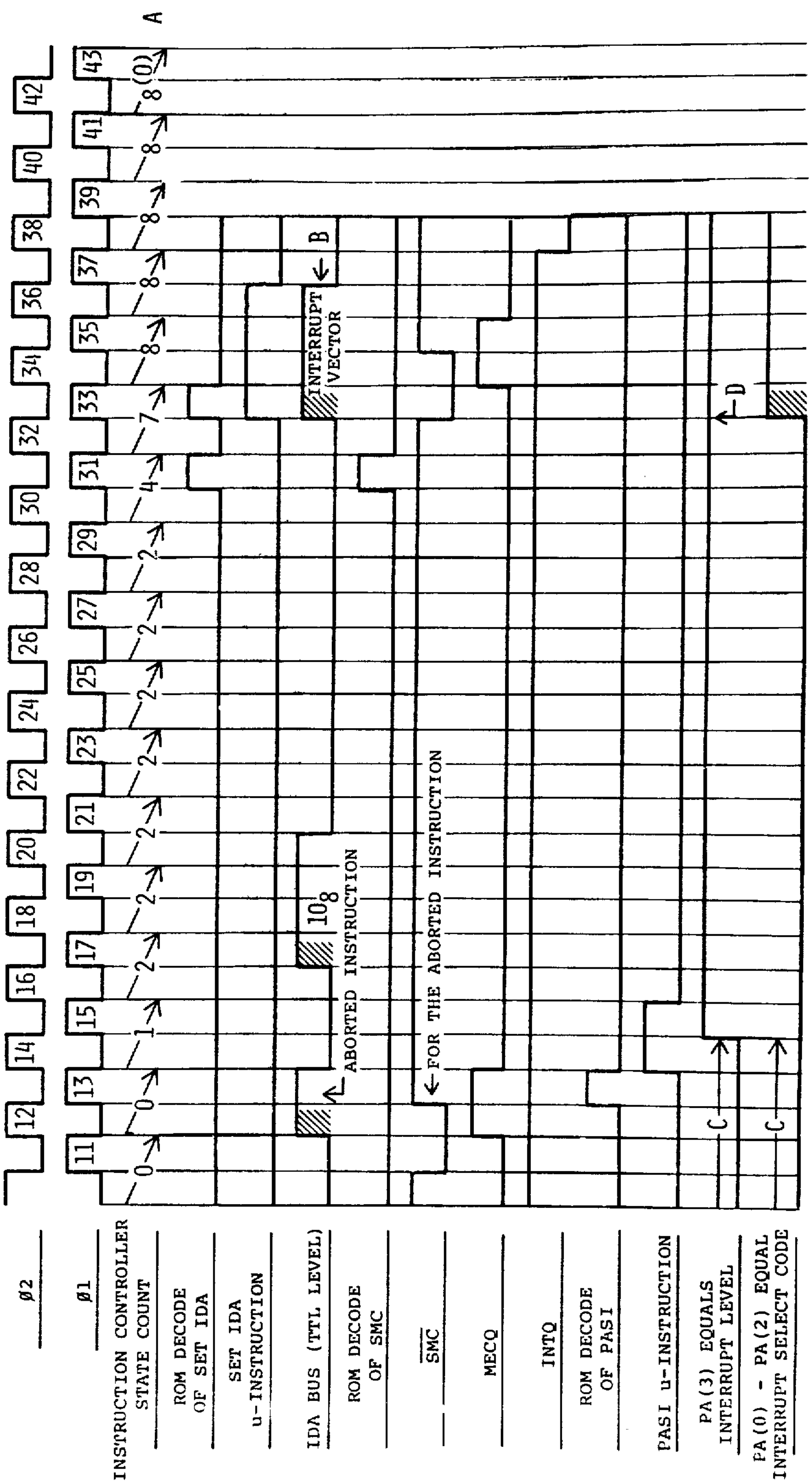
Figure 10D:
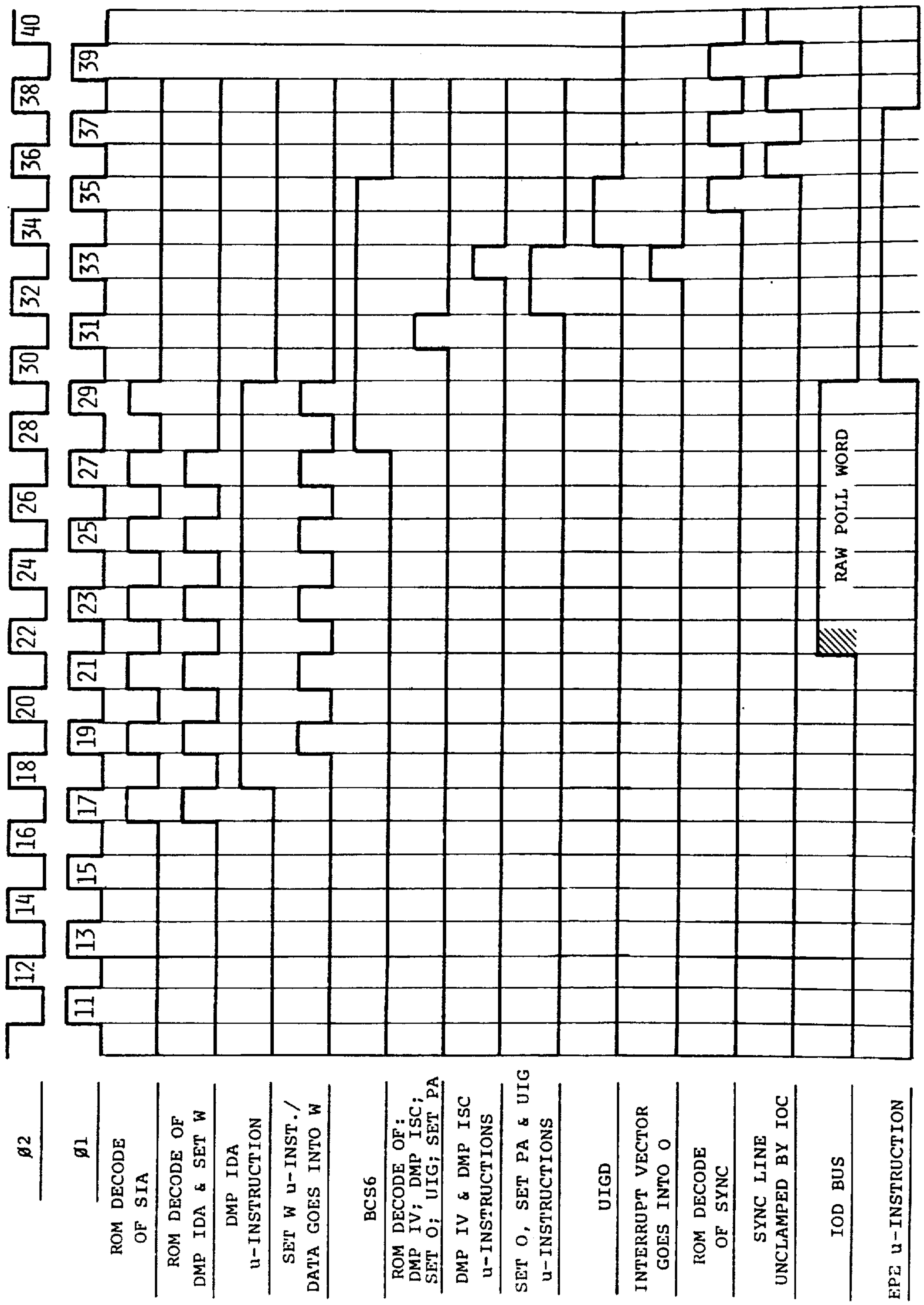

FIGS. 100A–B are a detailed waveform diagram illustrating a write I/O bus cycle in connection with IOC operation.

FIGS. 101A–E are a waveform diagram illustrating the generation by an IOC of FIG. 43 of $\overline{INT}$ from an interrupt request, the effect of $\overline{INT}$ upon a BPC, and the generation of the interrupt vector by the instruction controller within that IOC.

FIG. 102 is a waveform diagram illustrating the performance of an interrupt poll by the bus controller of an IOC of FIG. 43.

Figure 103:
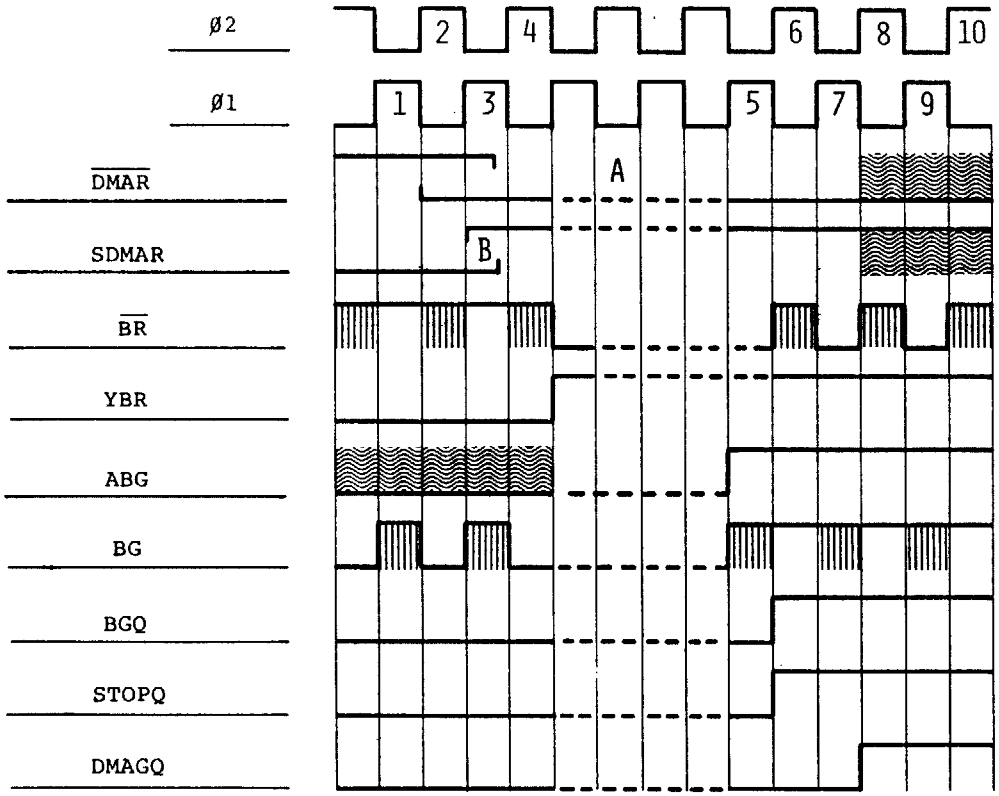
Figure 104A:
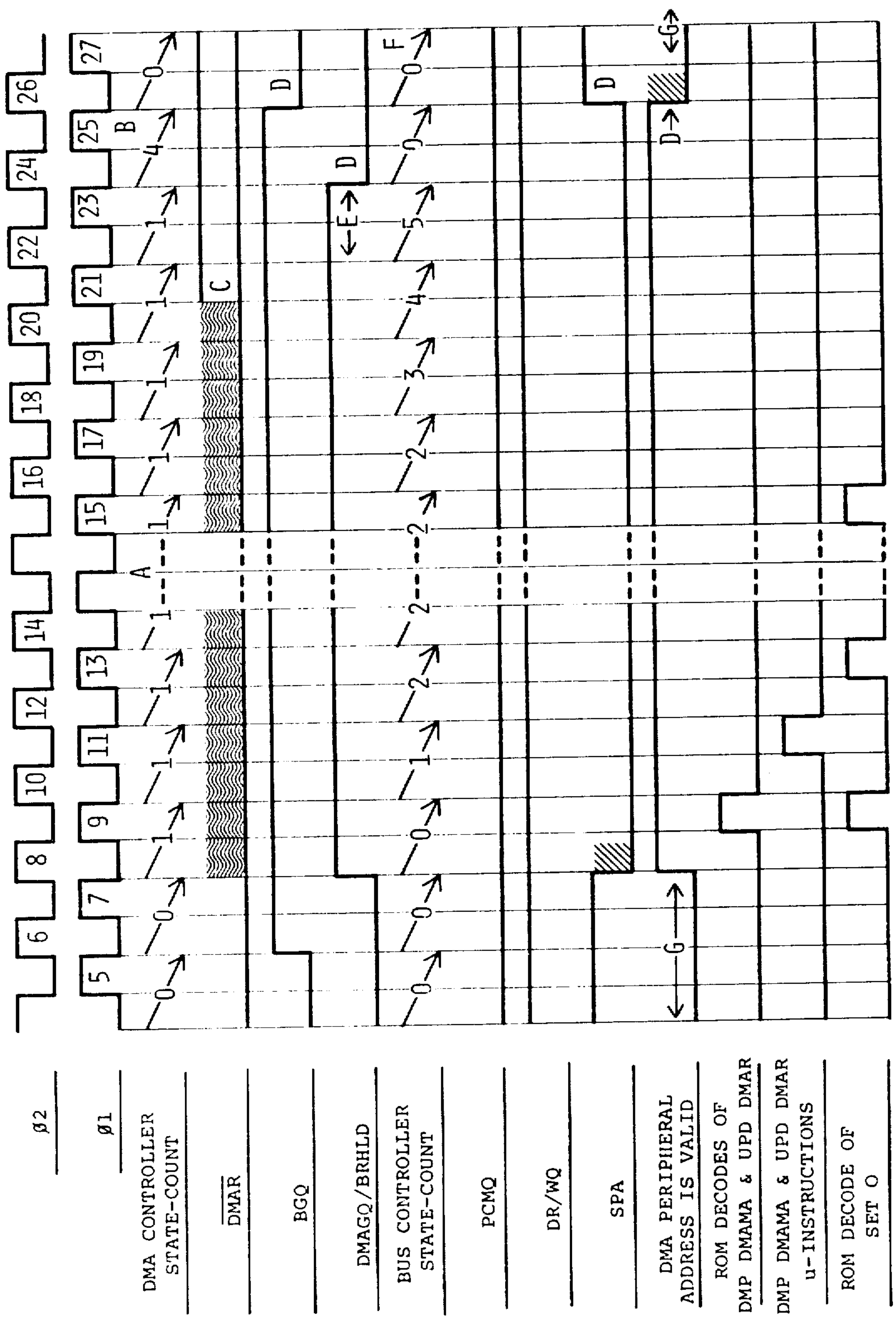
Figure 104B:
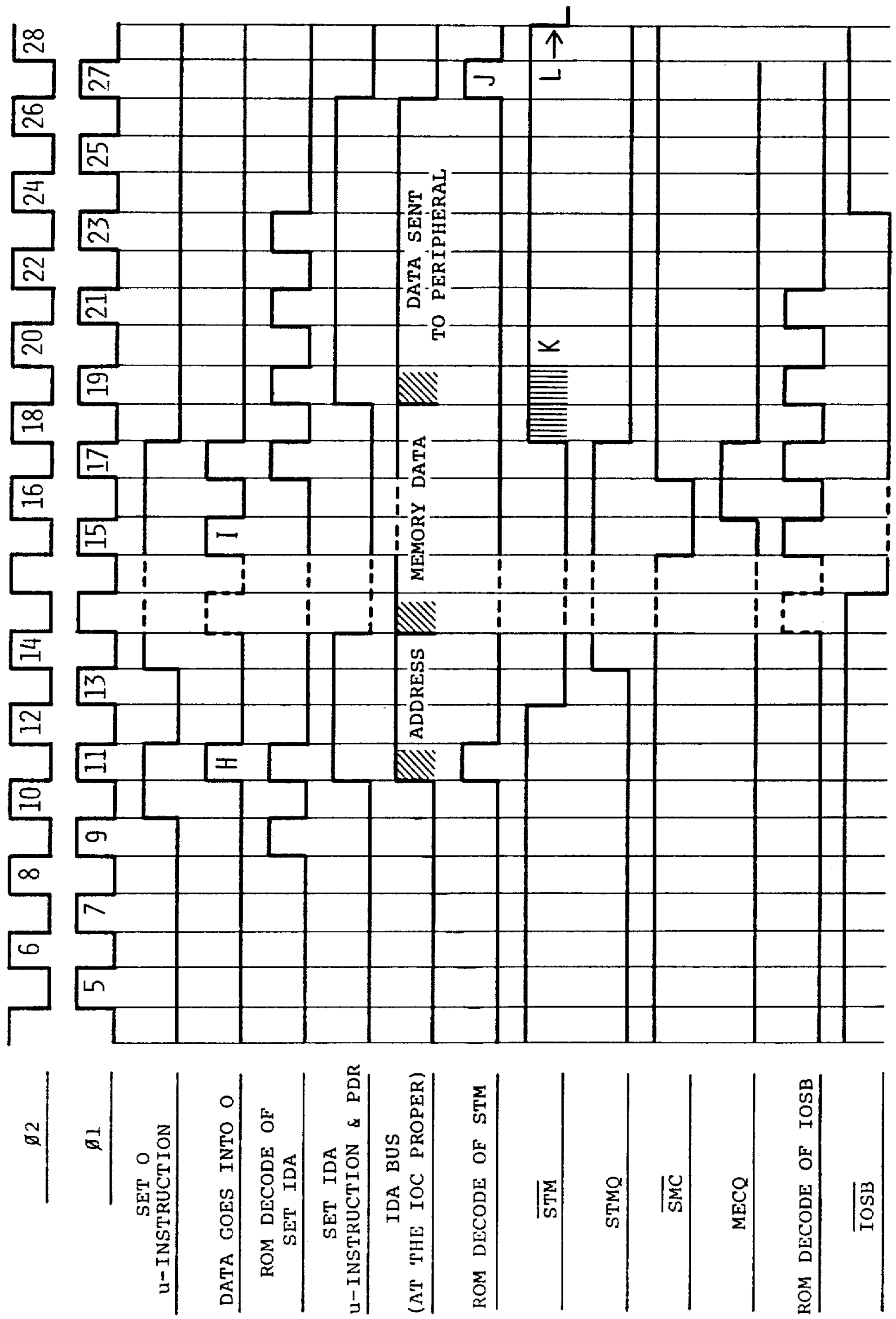
Figure 104C:
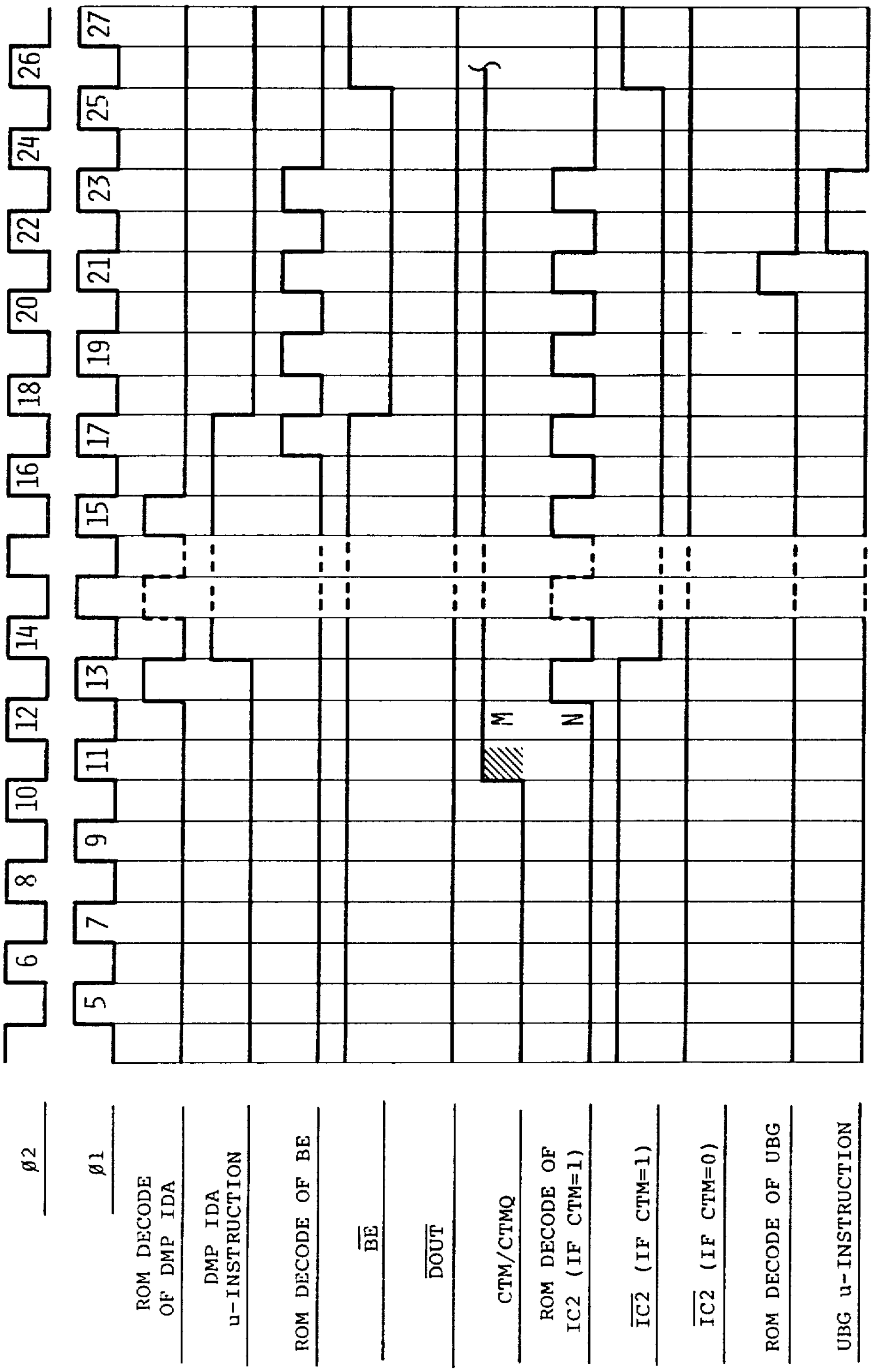
Figure 105A:
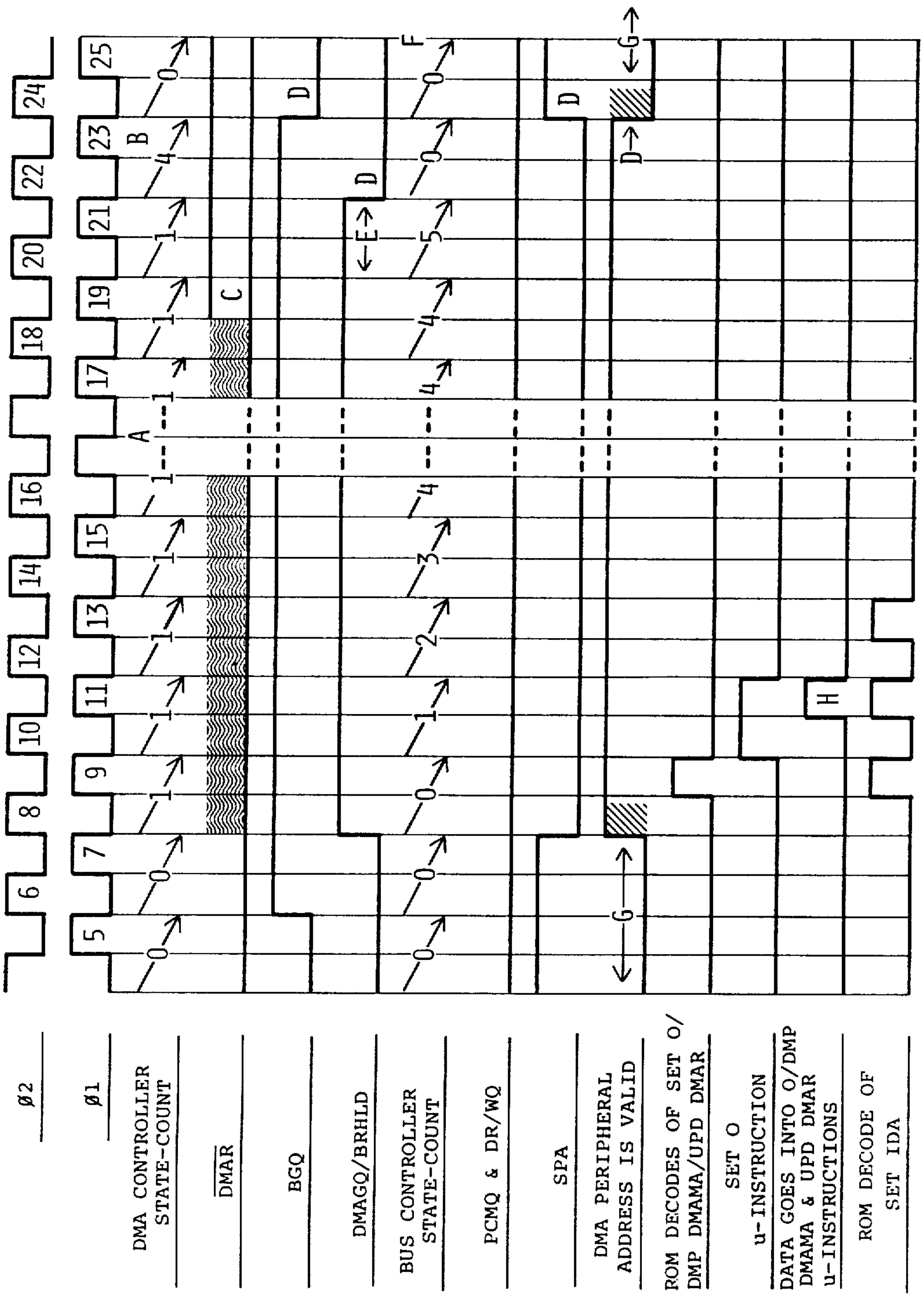
Figure 105B:
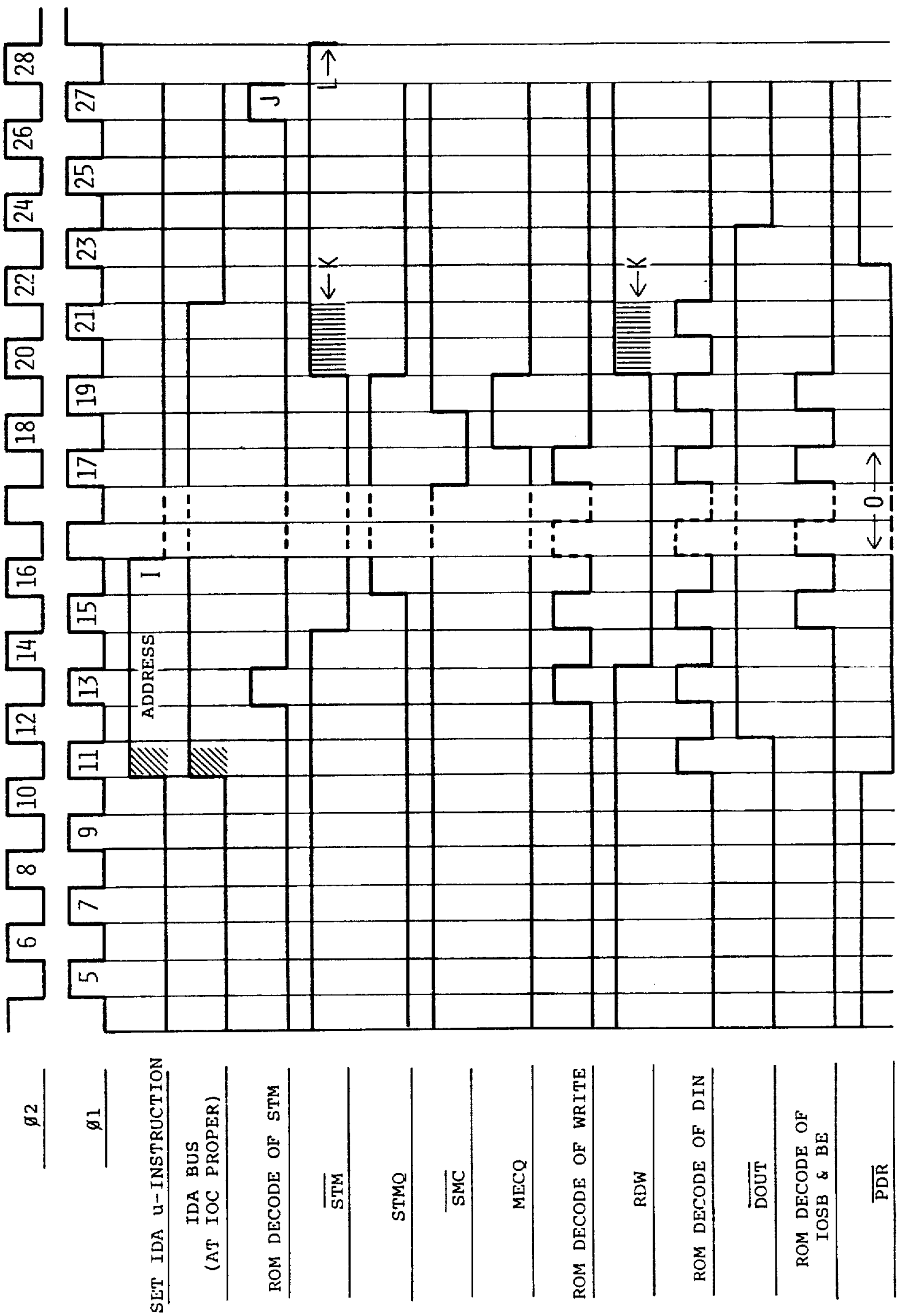
Figure 105C:
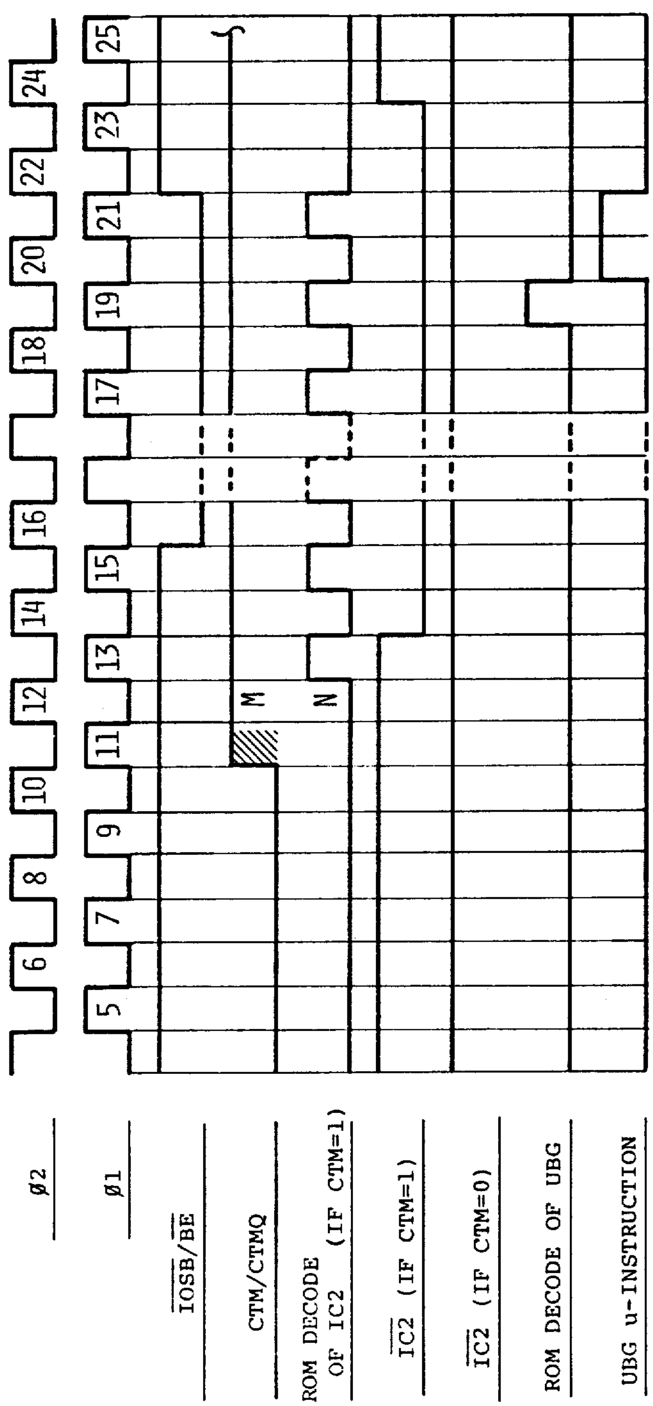
Figure 106:
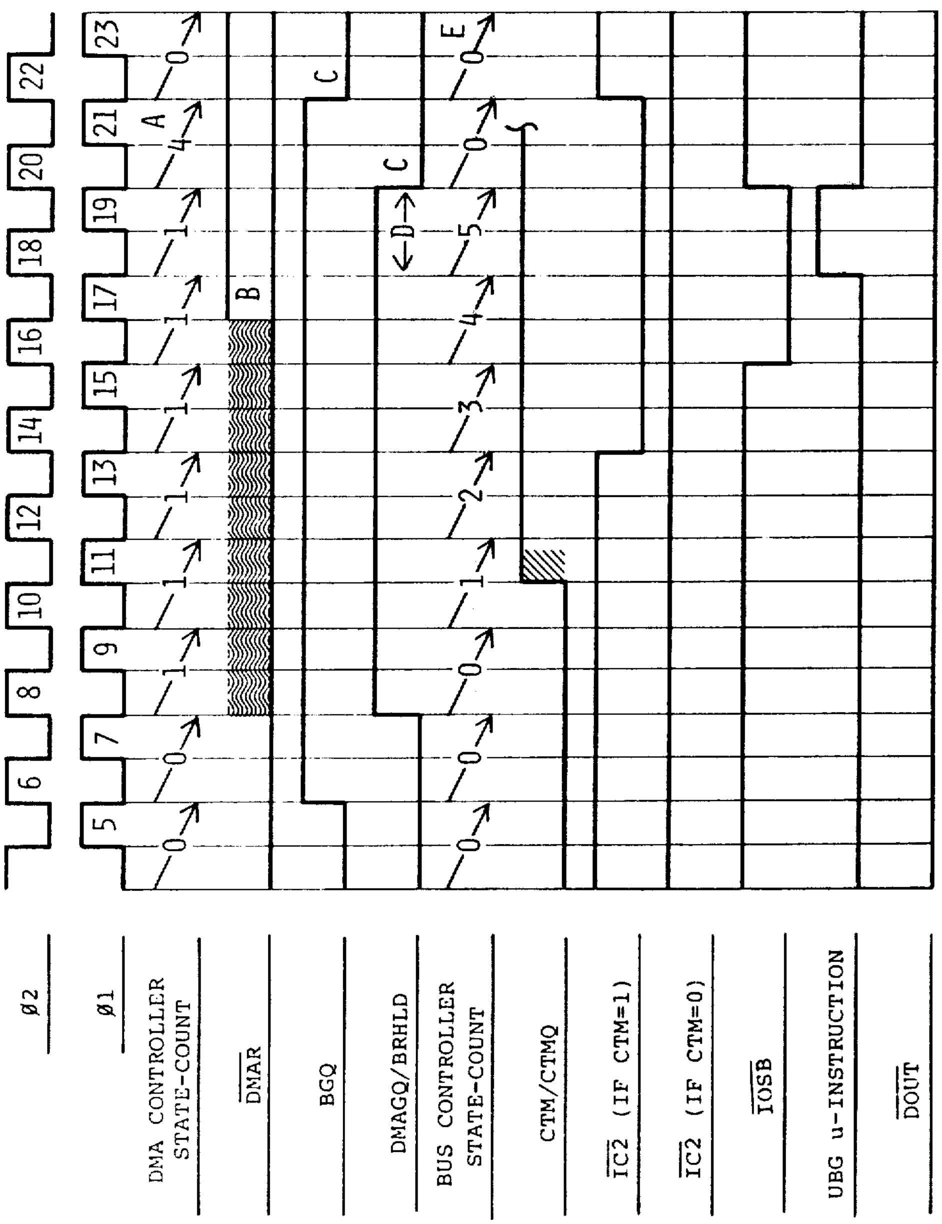

FIG. 103 is a waveform diagram illustrating generation of bus grant from a DMA request to an IOC of FIG. 43.

FIGS. 104A–D are a waveform diagram illustrating a DMA read cycle performed by an IOC of FIG. 43.

FIGS. 105A–D are a waveform diagram illustrating a DMA write cycle performed by an IOC of FIG. 43.

FIGS. 106A–B are a waveform diagram illustrating a pluse count cycle associated with an IOC of FIG. 43.

Figure 107A:
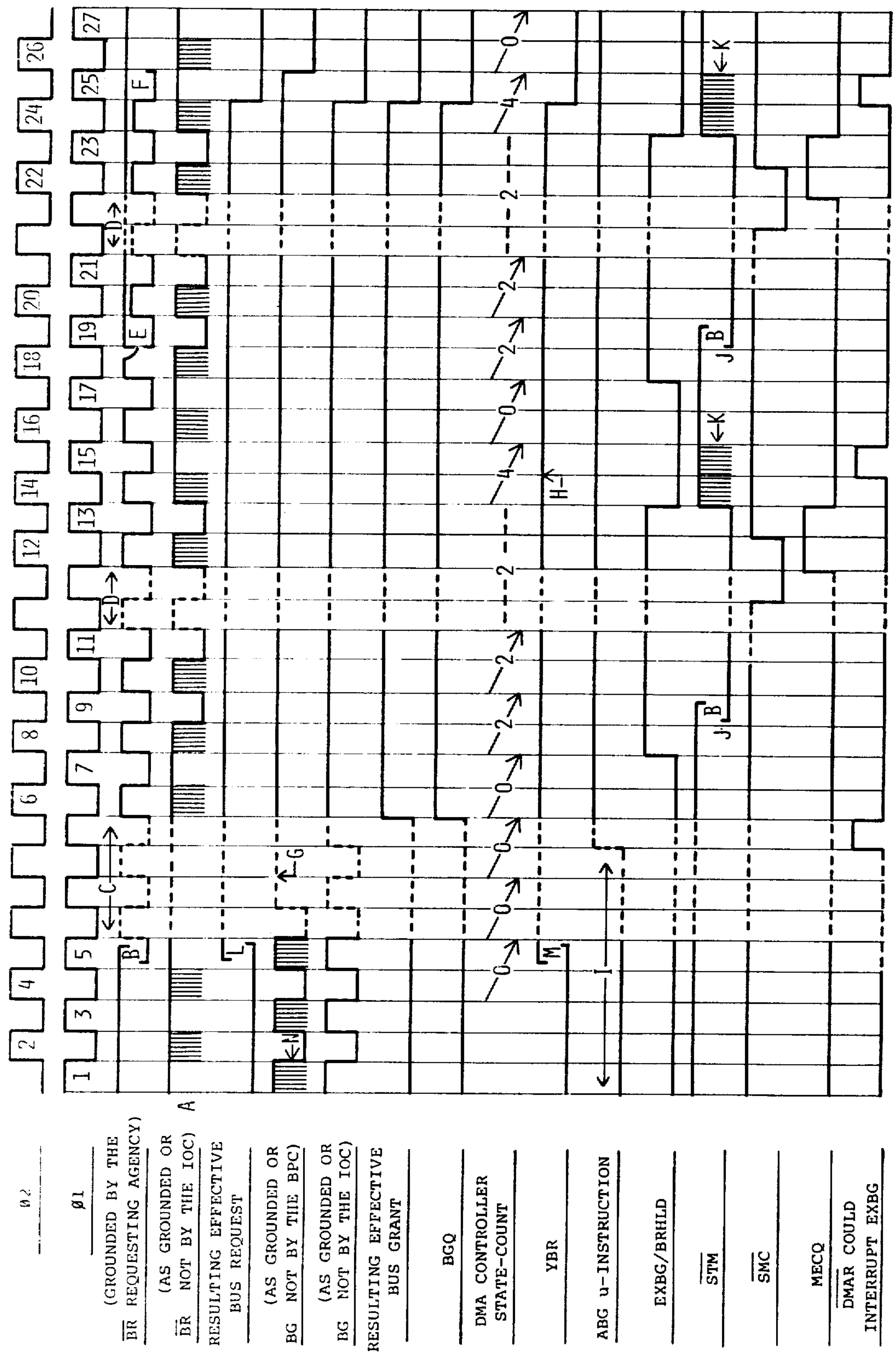
Figure 108:
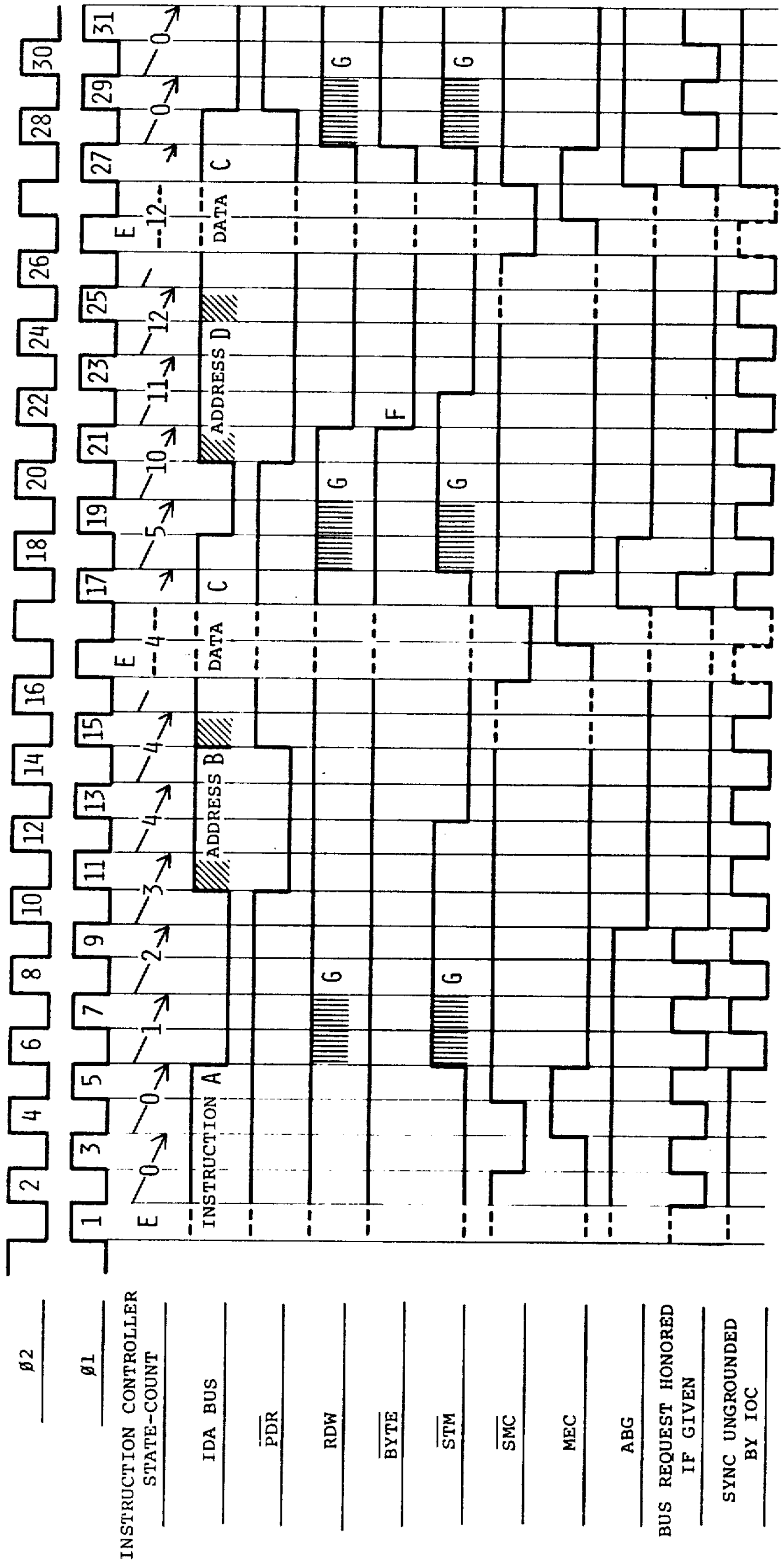

FIGS. 107A–C are a waveform diagram illustrating two consecutive extended bus grant cycles involving an IOC of FIG. 43.

FIGS. 108A–B are a waveform diagram illustrating place word or place byte memory operations performed by an IOC of FIG. 43.

Figure 109:
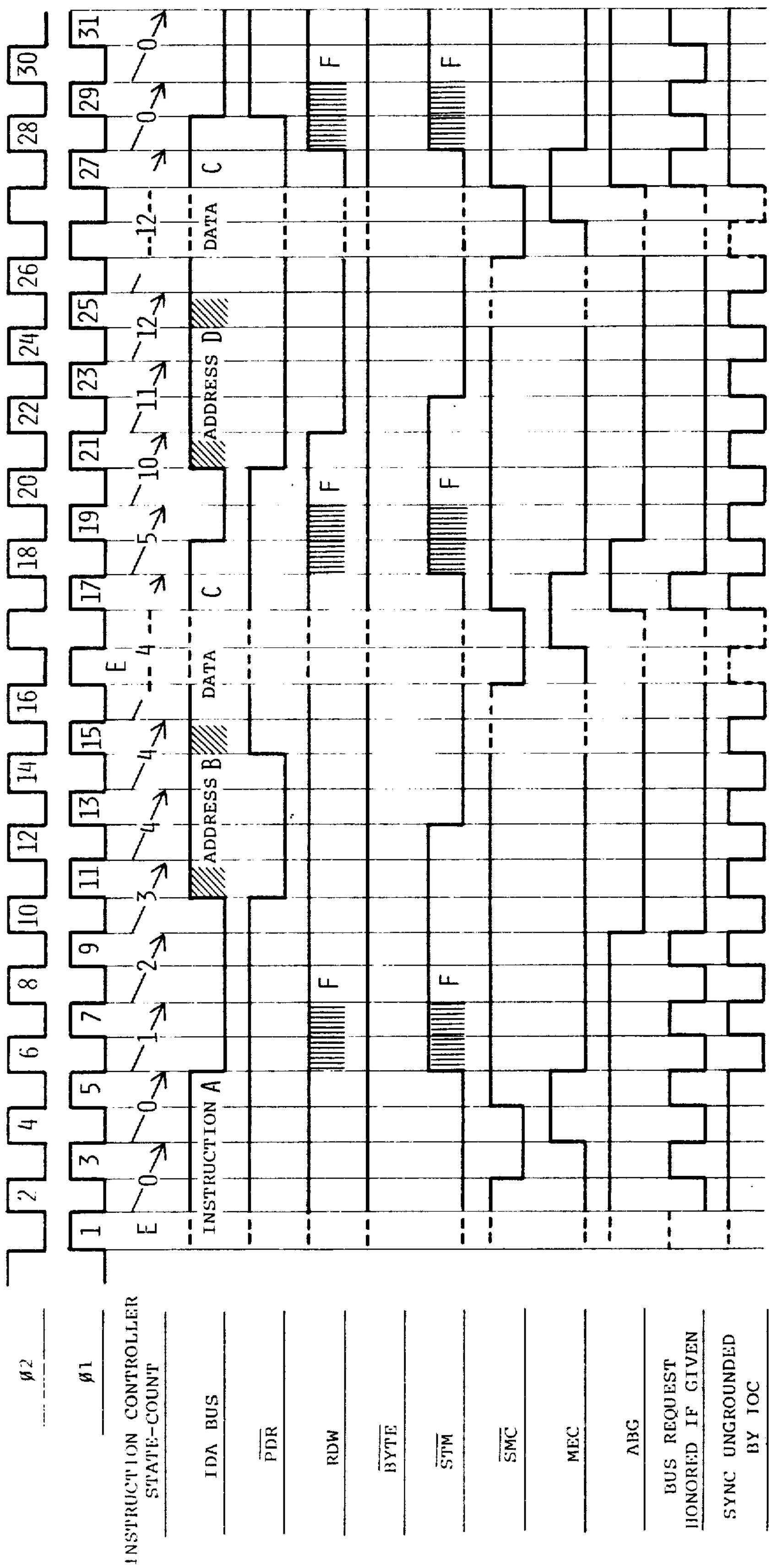

FIG. 109 is a waveform diagram illustrating withdraw word and withdraw byte operations performed by an IOC of FIG. 43.

Figure 110:
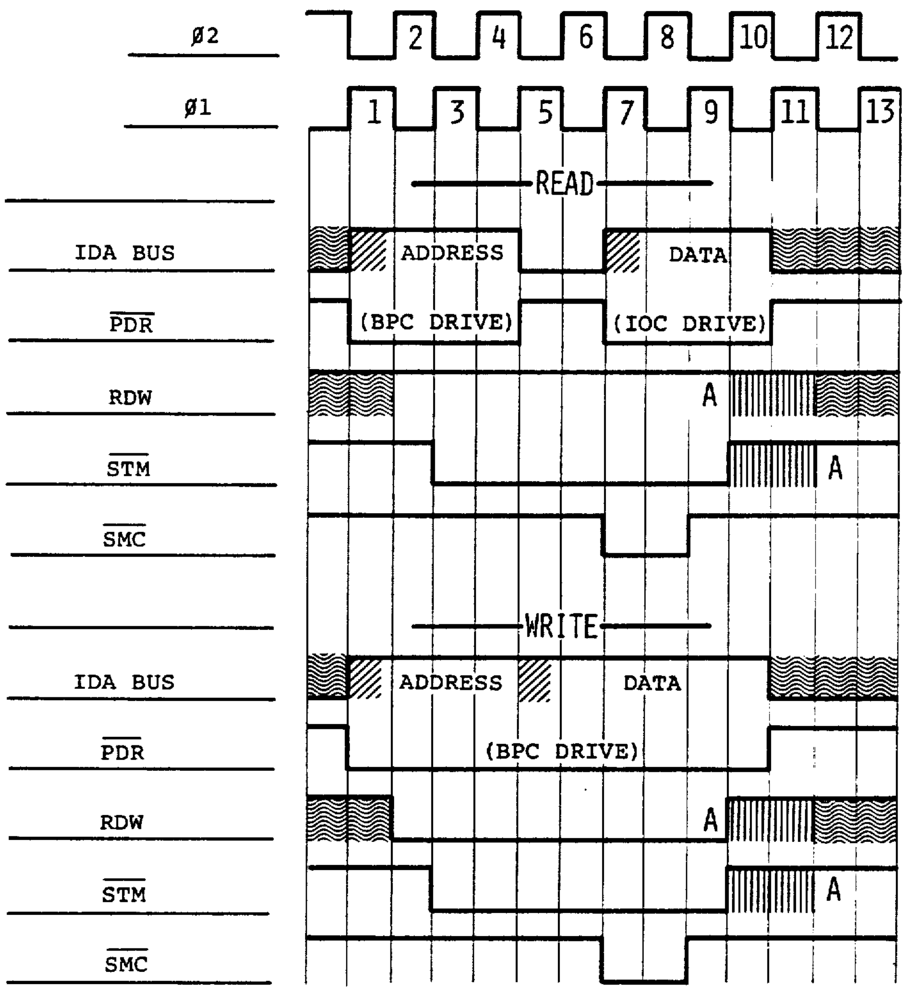

FIG. 110 is a simplified waveform diagram illustrating responses to memory cycles referencing a register internal to an IOC of FIG. 43.

Figure 111:
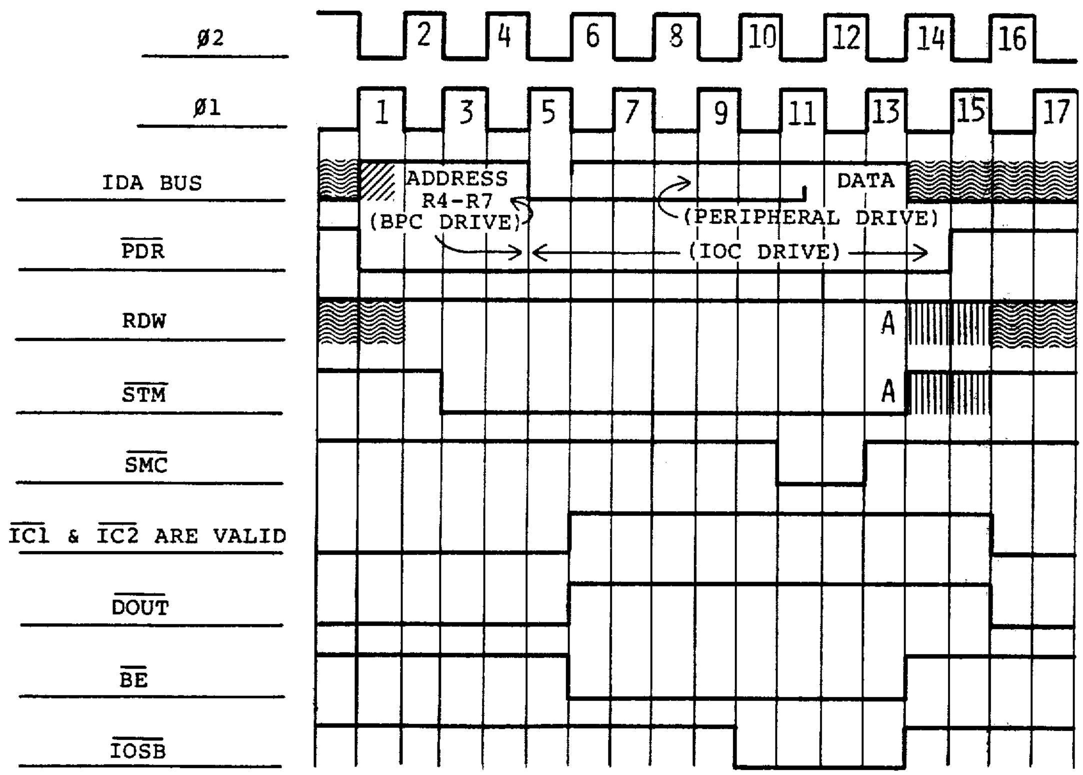

FIG. 111 is a simplified waveform diagram illustrating a read I/O bus cycle performed in connection with IOC operation.

Figure 112:
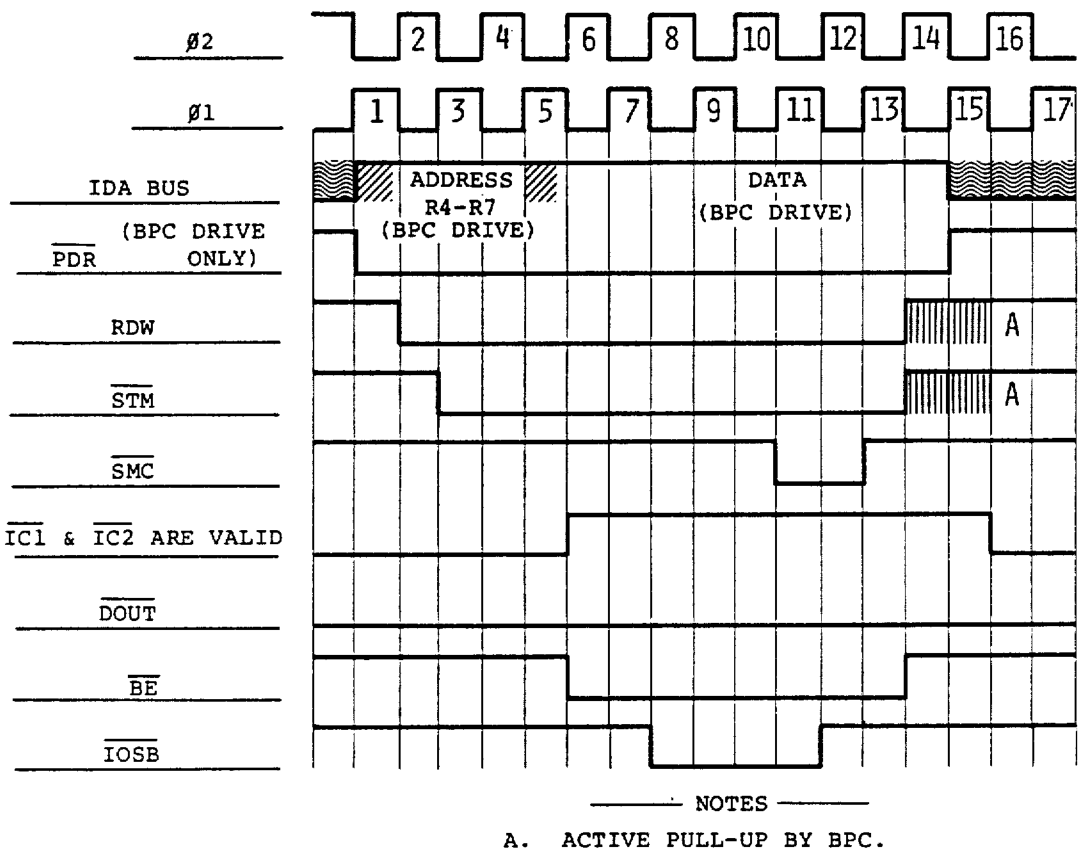

FIG. 112 is a simplified waveform diagram illustrating a write I/O bus cycle performed in connection with IOC operation.

Figure 113A:
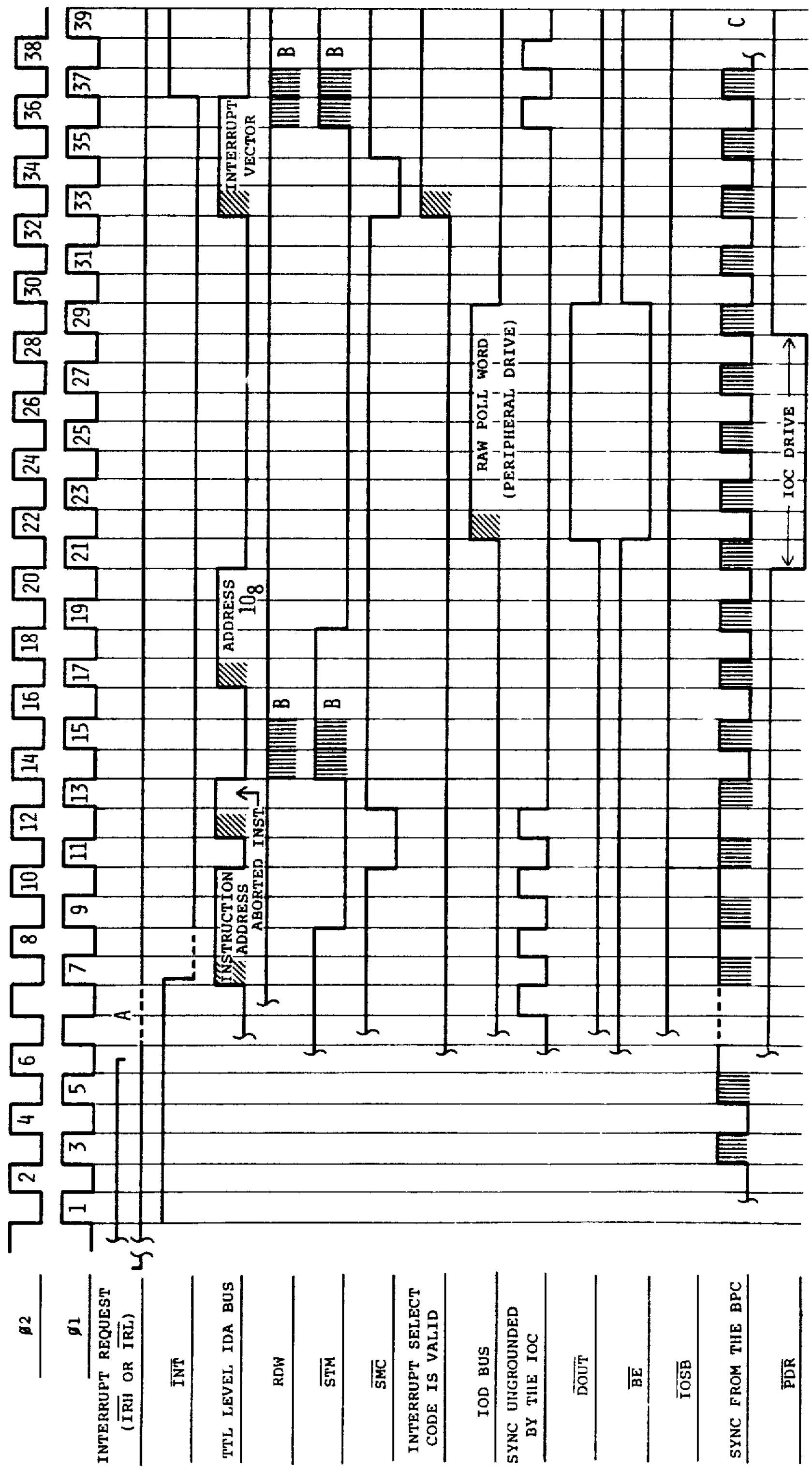

FIGS. 113A–B are a waveform diagram illustrating the interrupt process that occurs between a peripheral, an IOC, and a BPC.

Figure 114A:
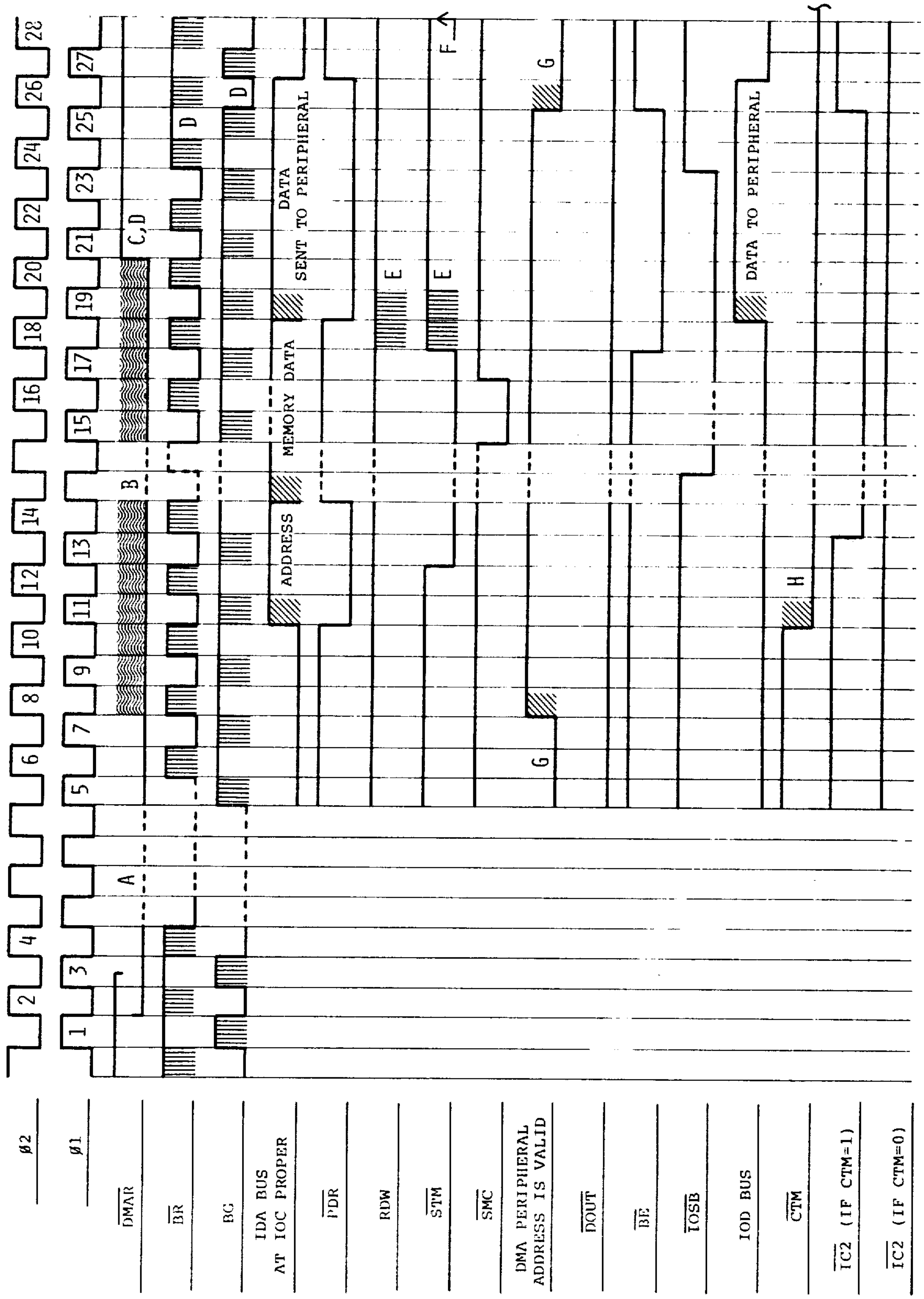

FIGS. 114A–B are a waveform diagram illustrating a DMA read operation performed by an IOC and a peripheral.

Figure 115A:
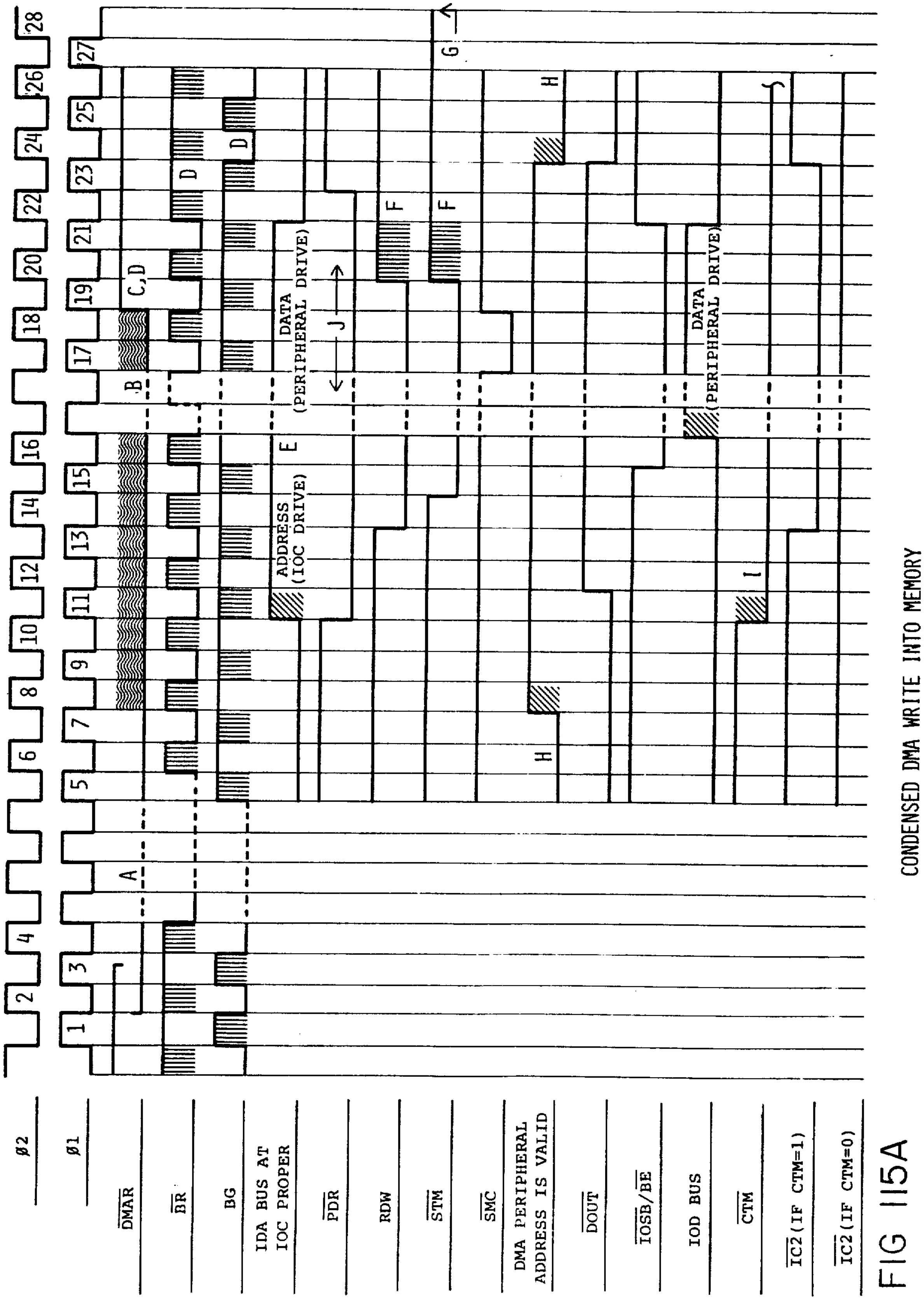

FIGS. 115A–B are a waveform diagram illustrating a DMA write operation performed by an IOC and a peripheral.

Figure 116:
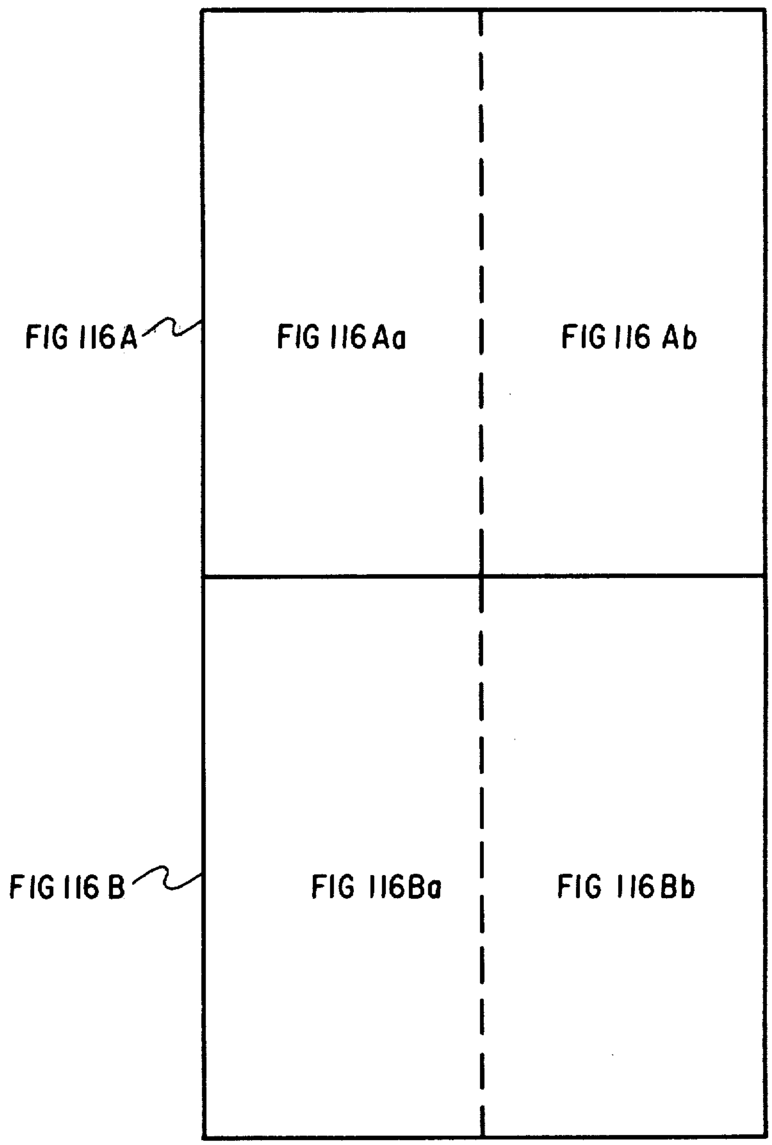
Figure 116A:
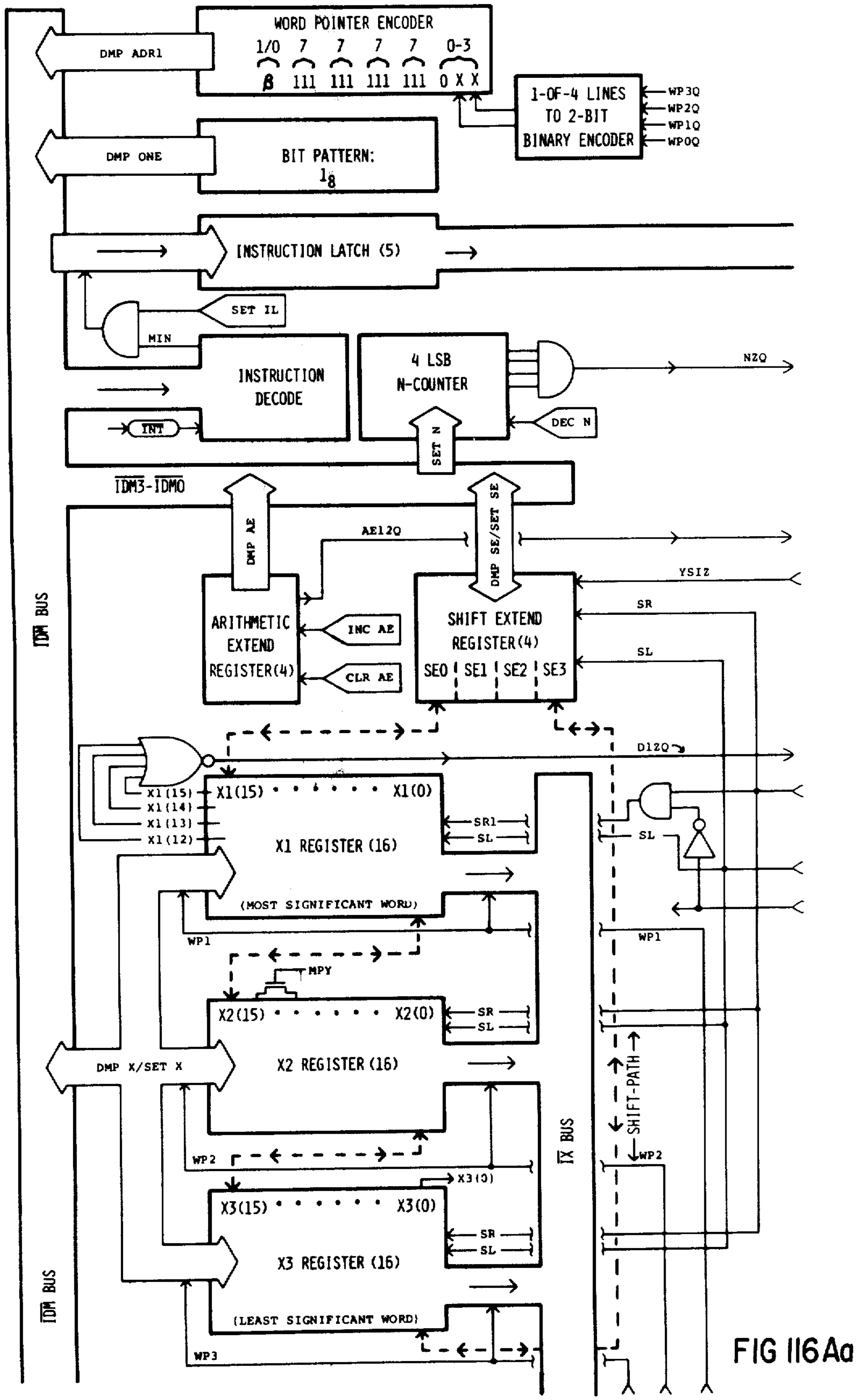
Figure 116:
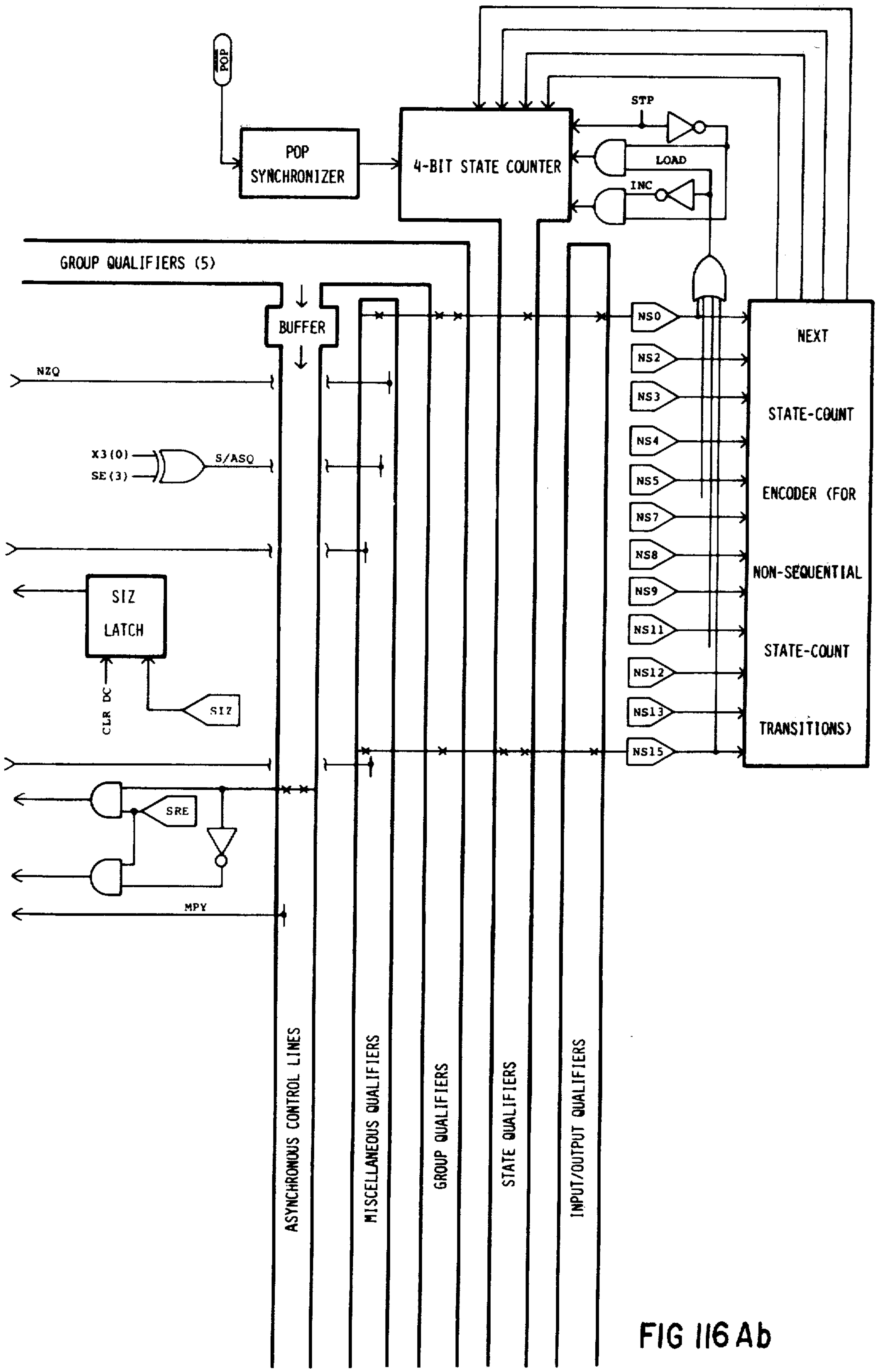
Figure 116B:
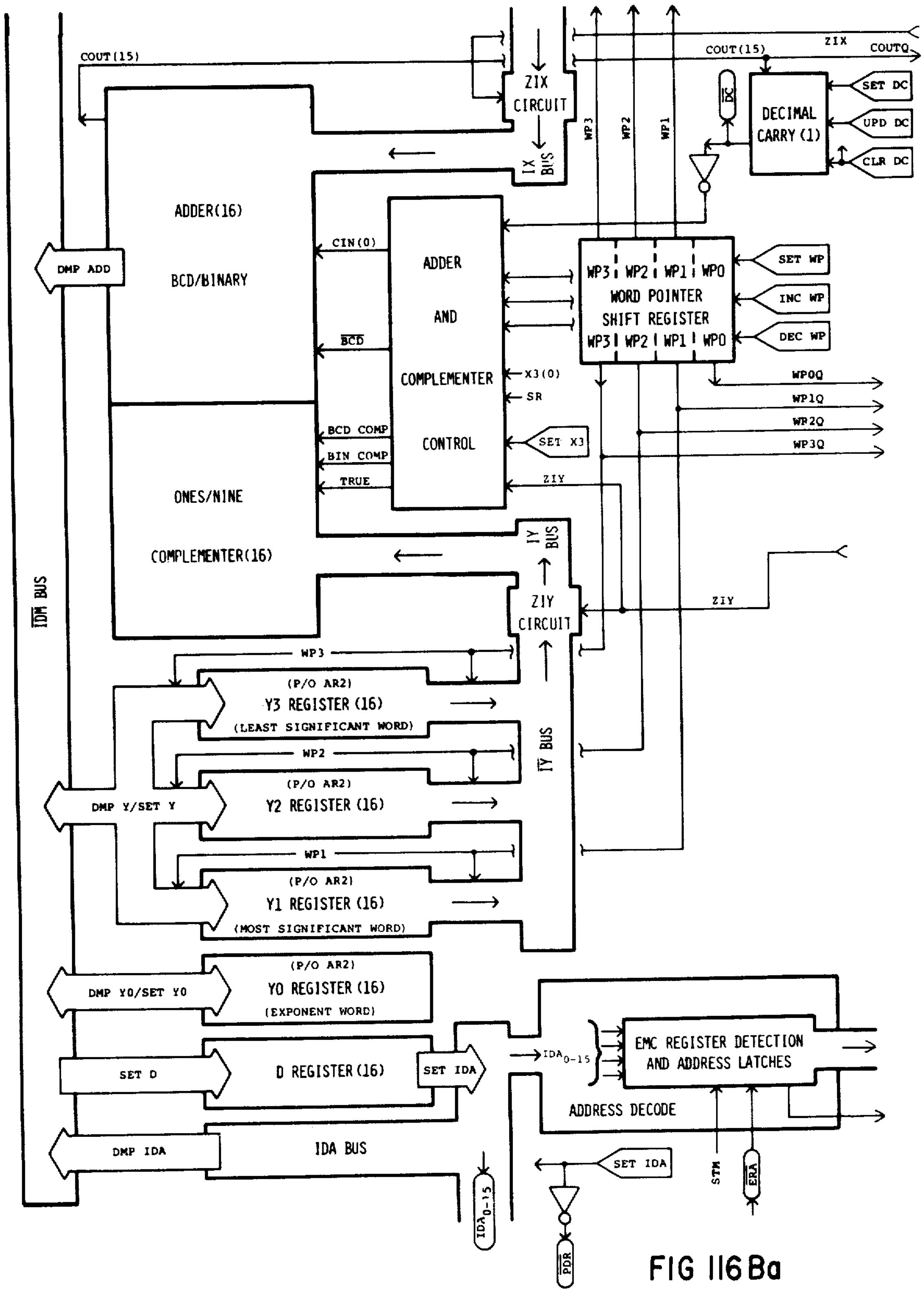
Figure 116B:
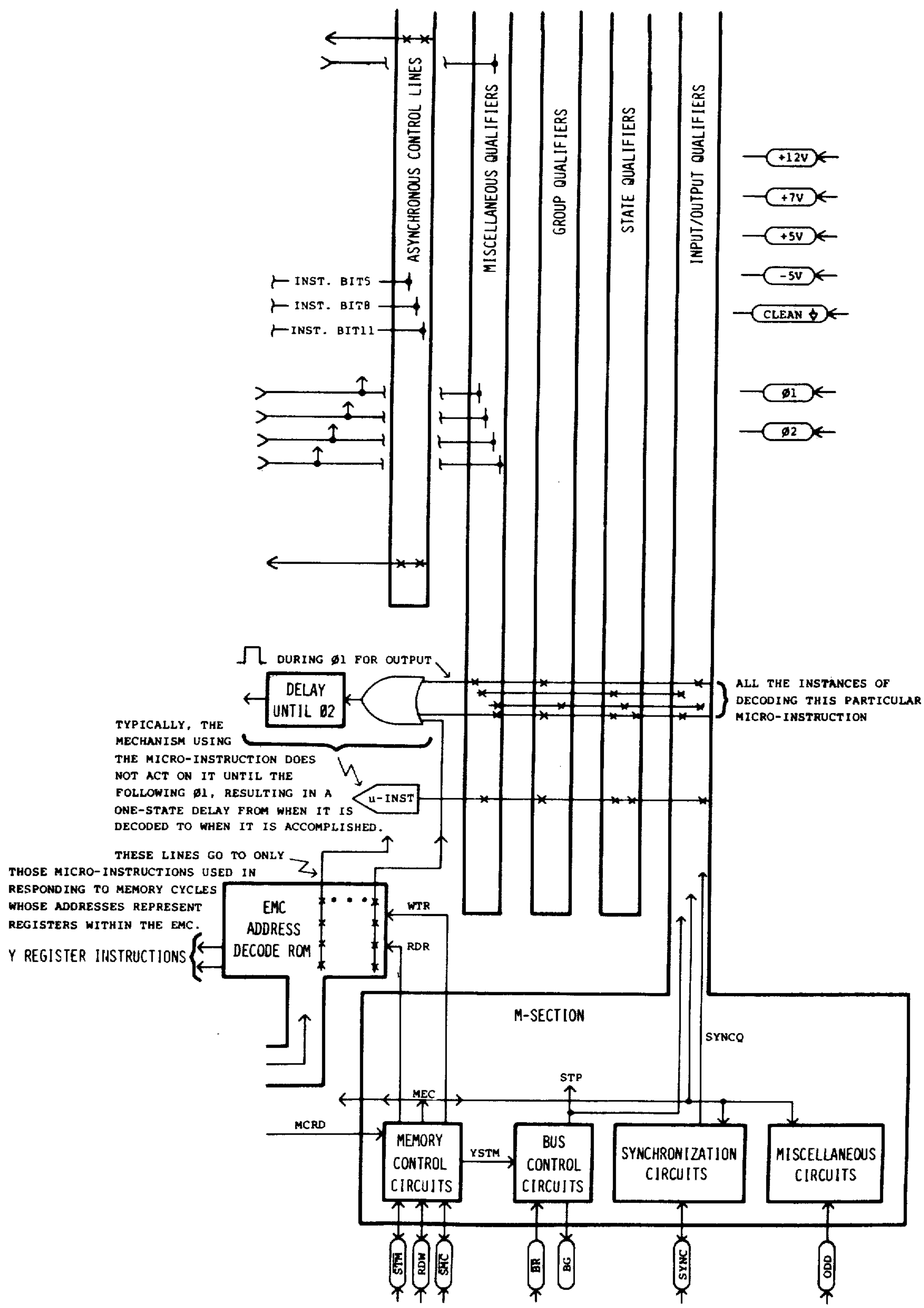

FIGS. 116A–C with FIG. 116 showing the relationship of FIGS. 116A*a*–*b* and 116B*a*–*b* constitute a block diagram of the EMC located within the LPU of FIG. 43.

Figure 119A:
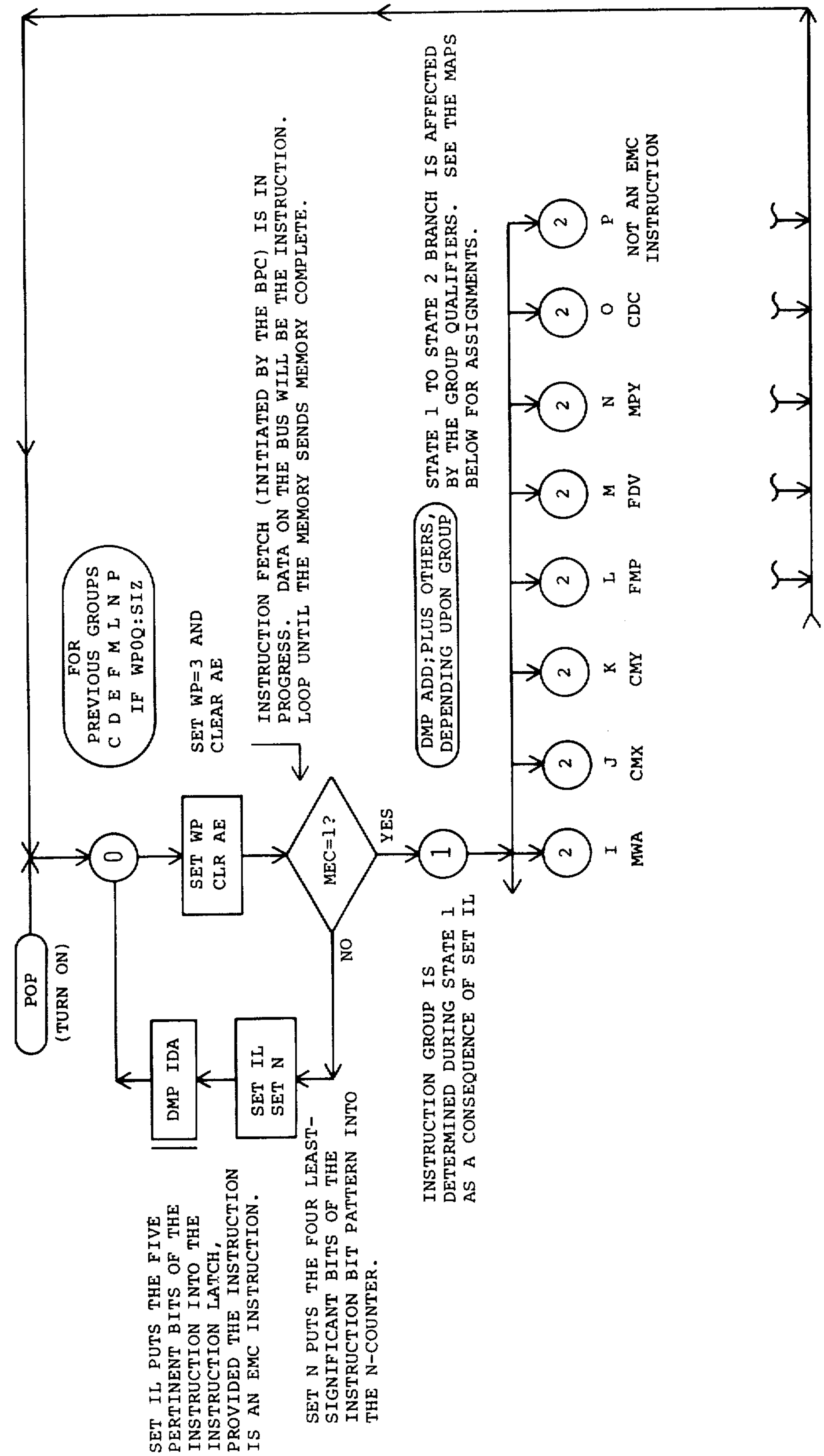
Figure 119A:
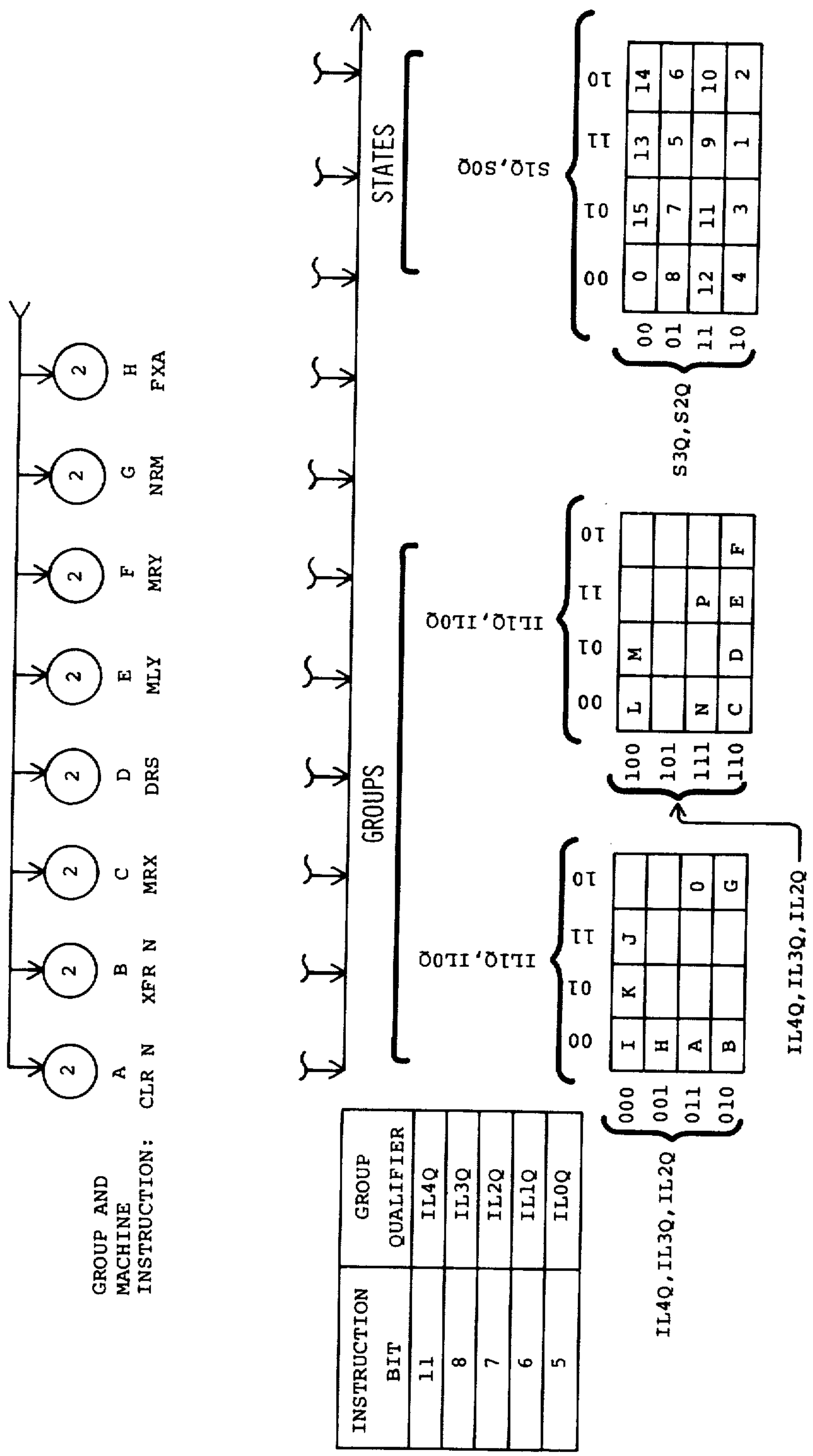
Figure 119B:
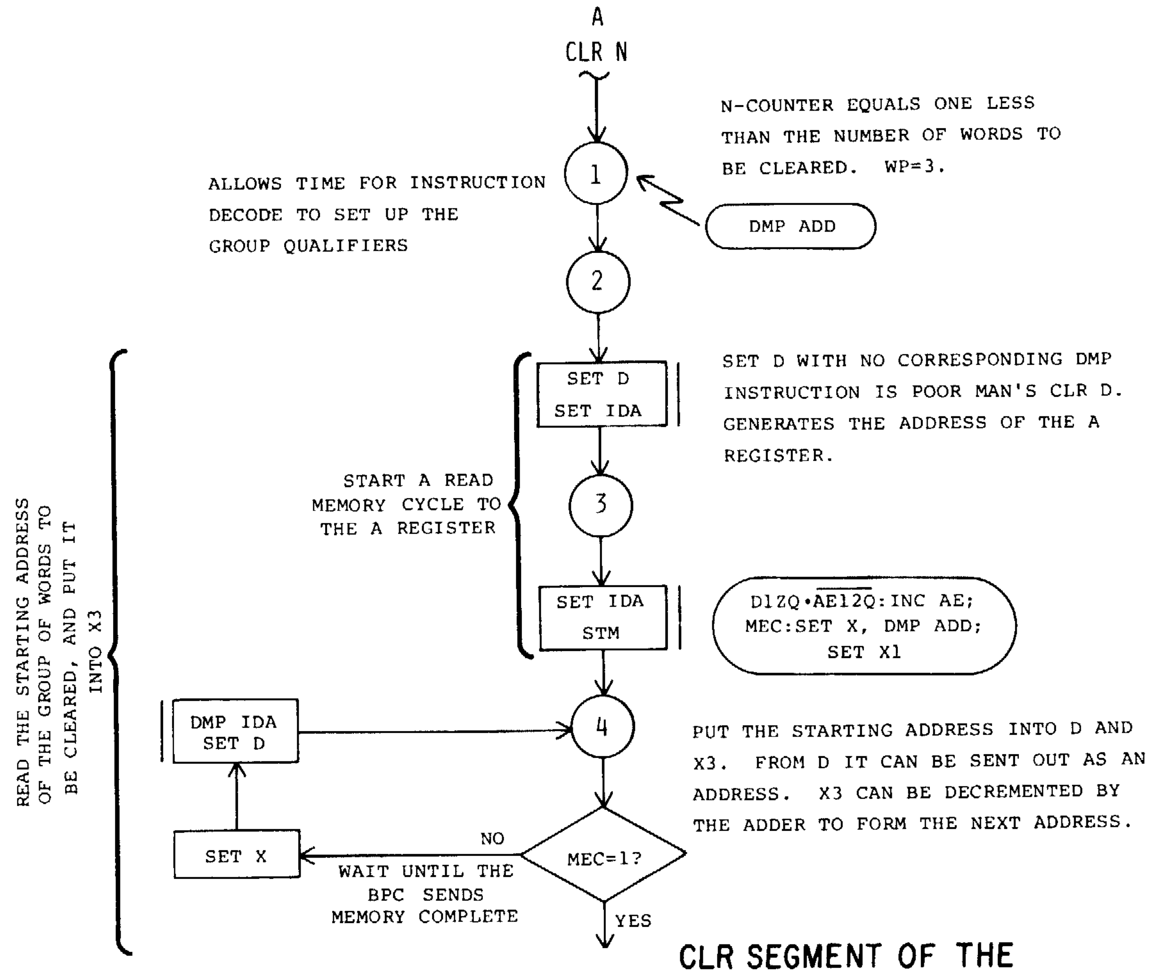
Figure 119B:
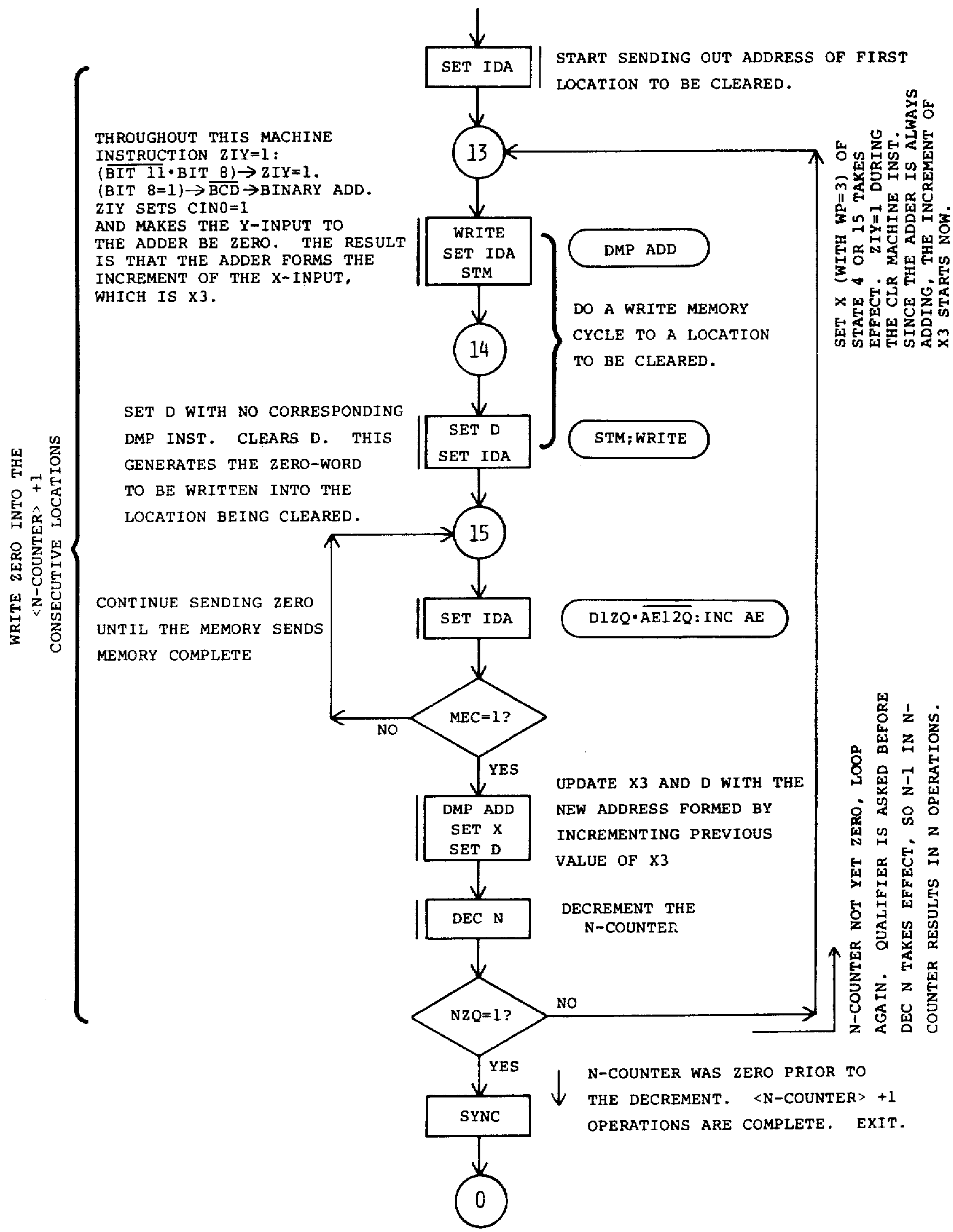
Figure 119C:
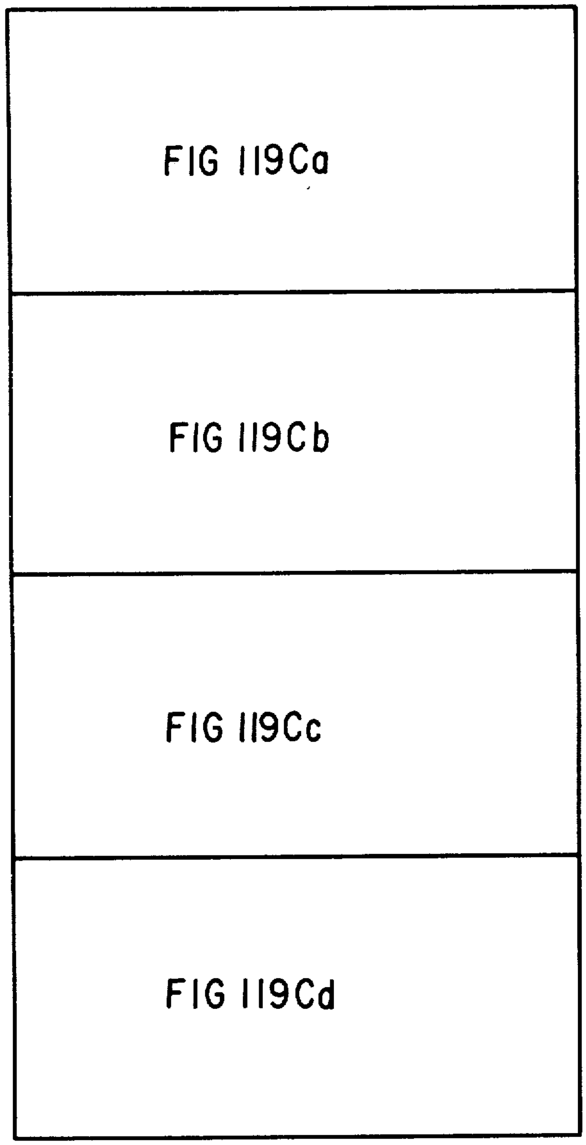
Figure 119C:
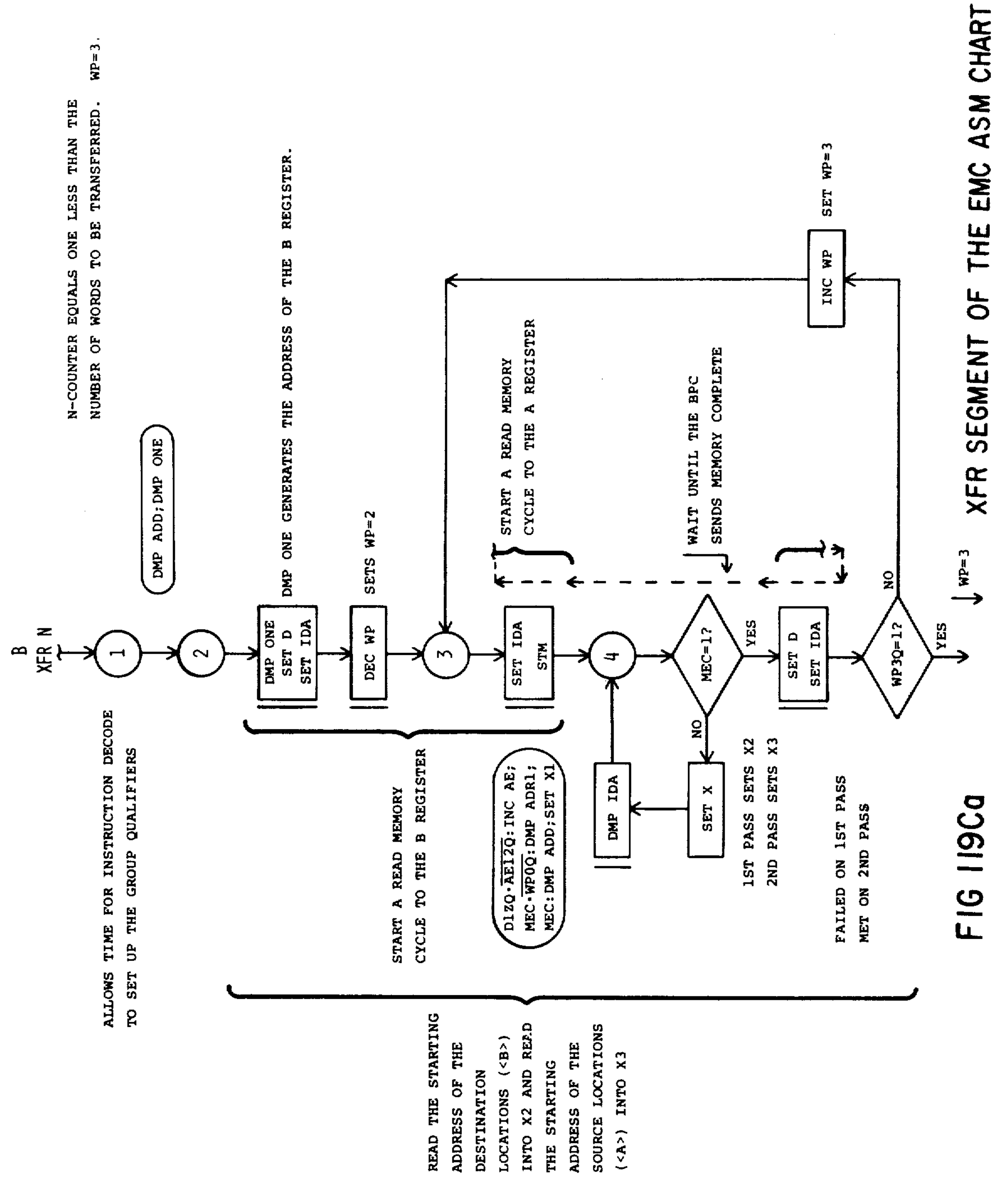
Figure 119C:
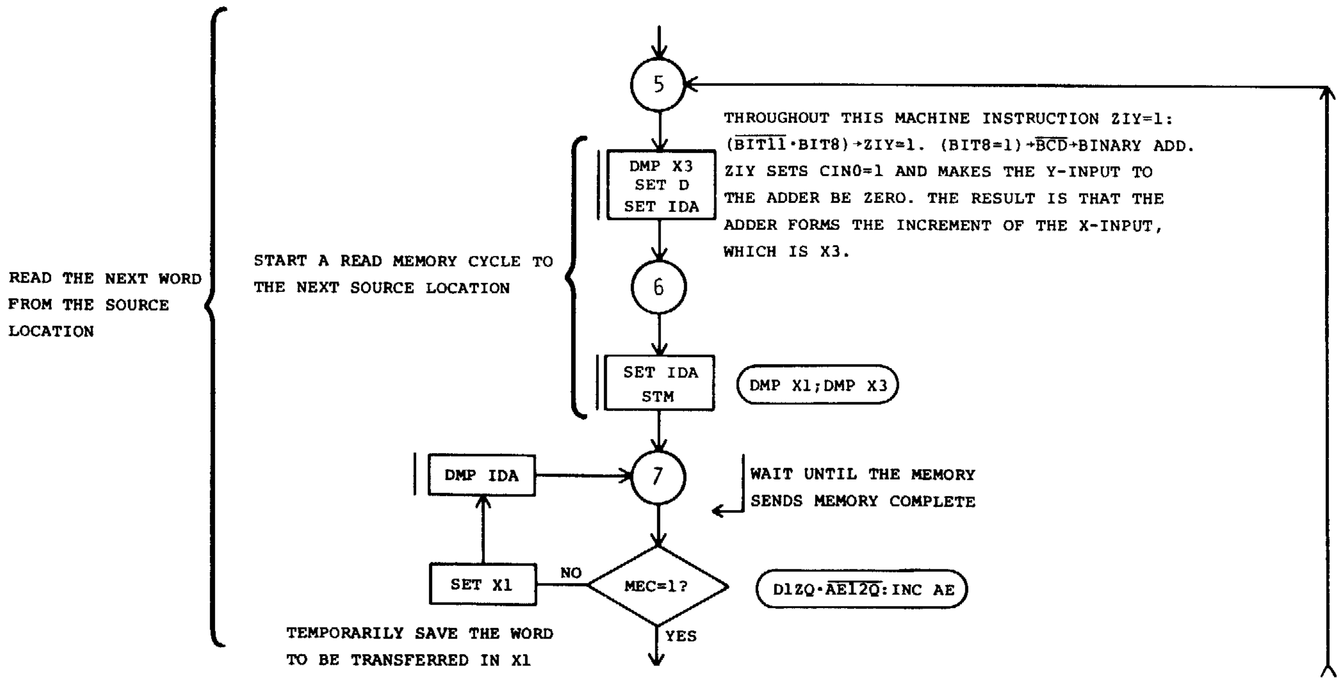
Figure 119C:
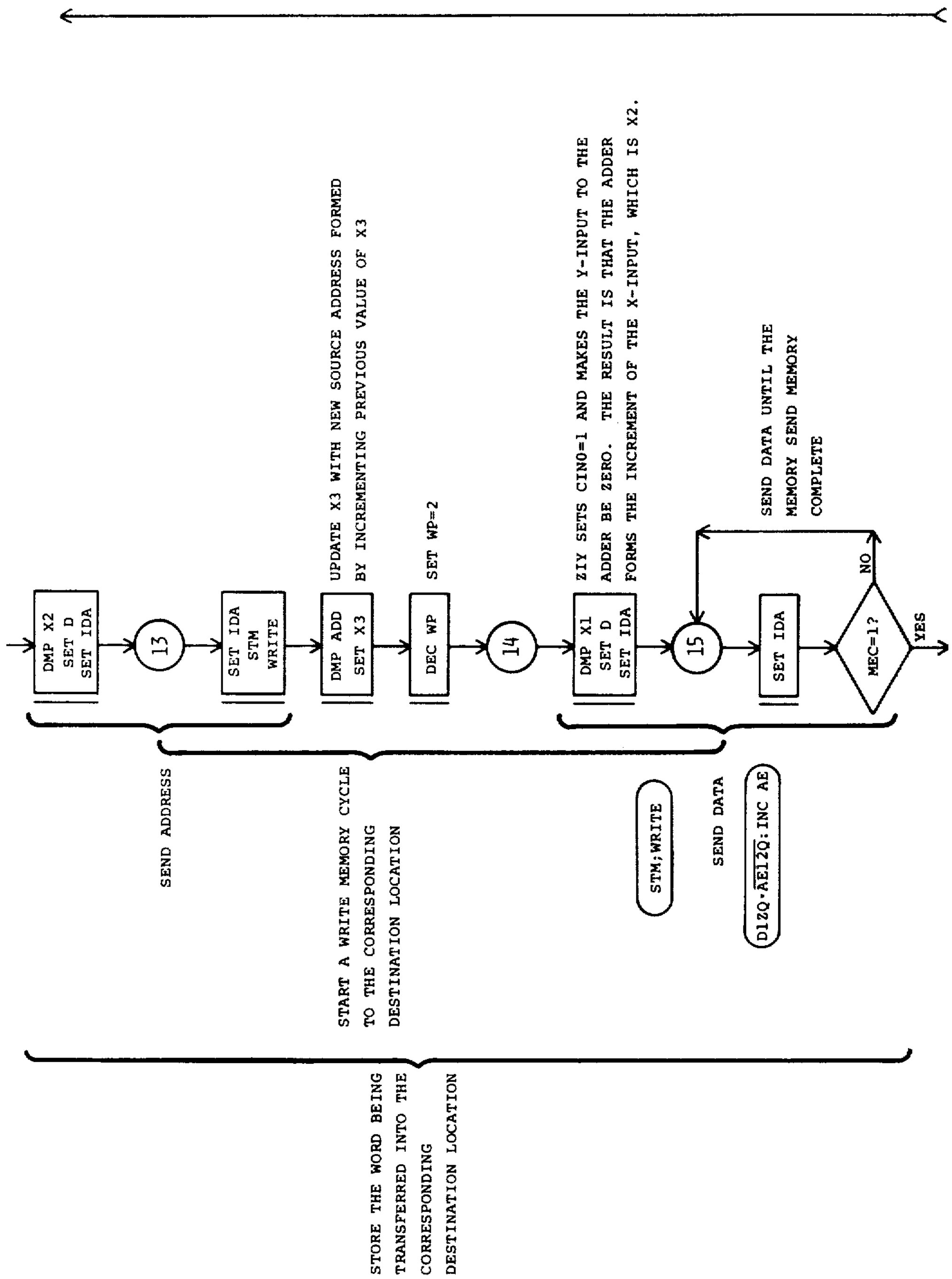
Figure 119C:
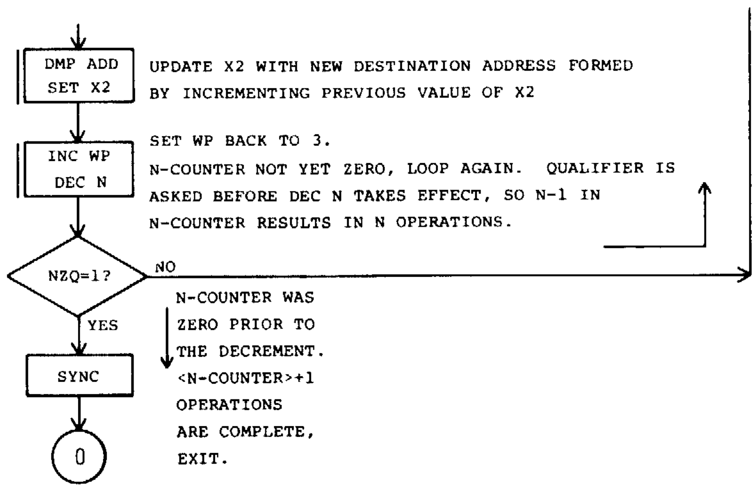
Figure 119D:
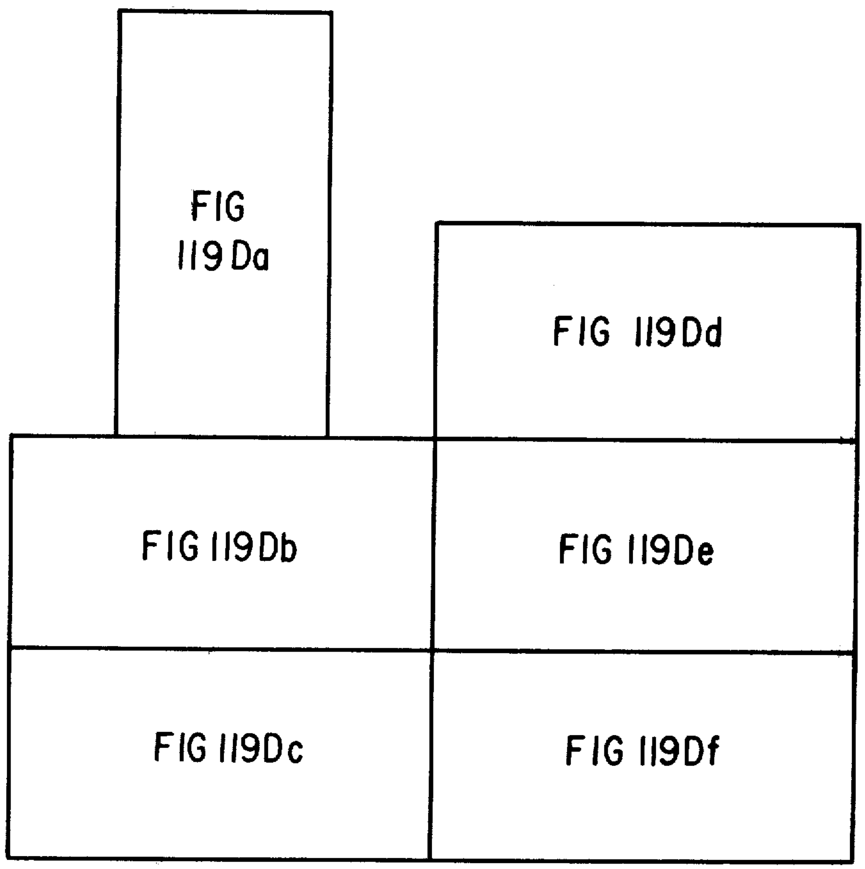
Figure 119D:
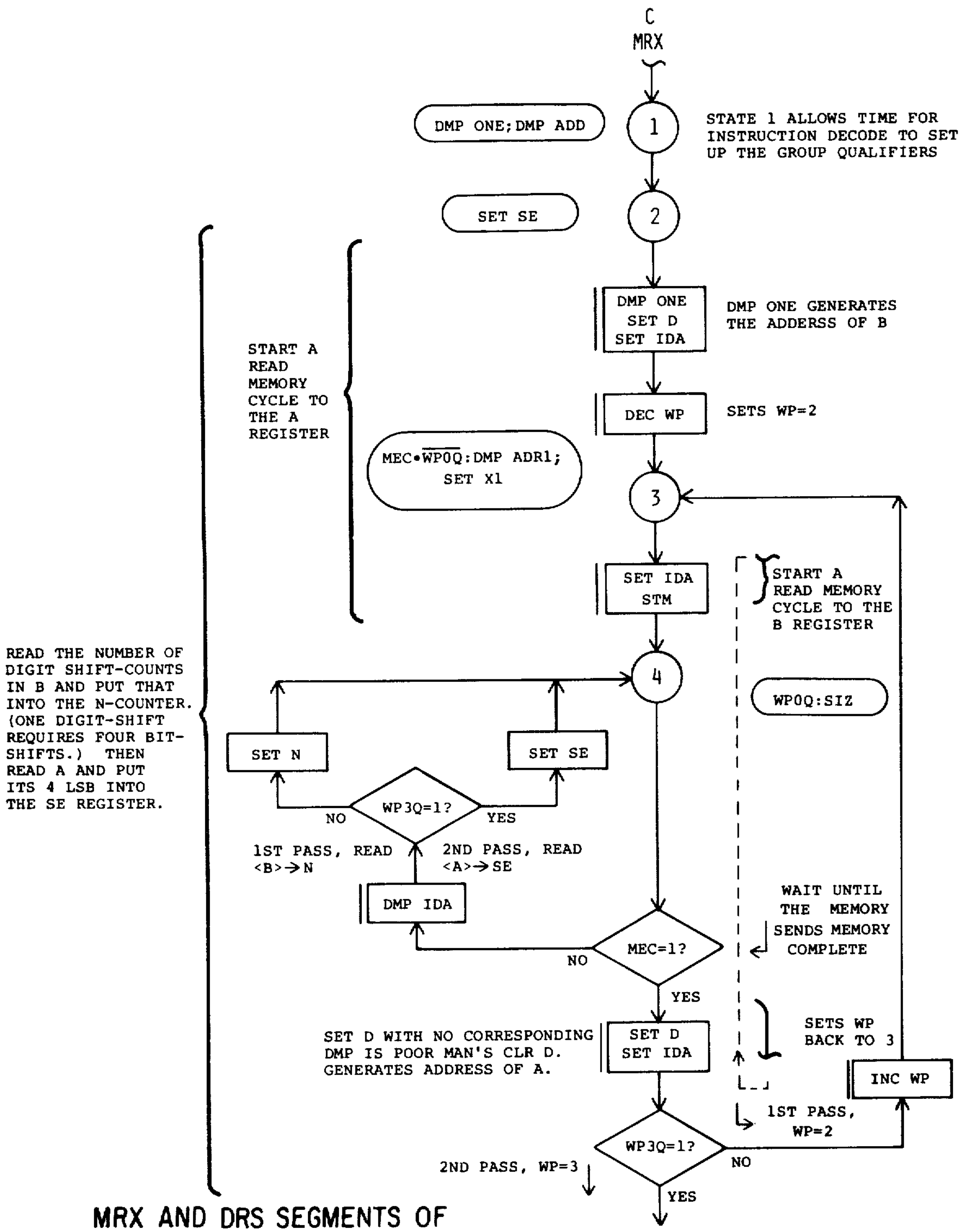
Figure 119D:
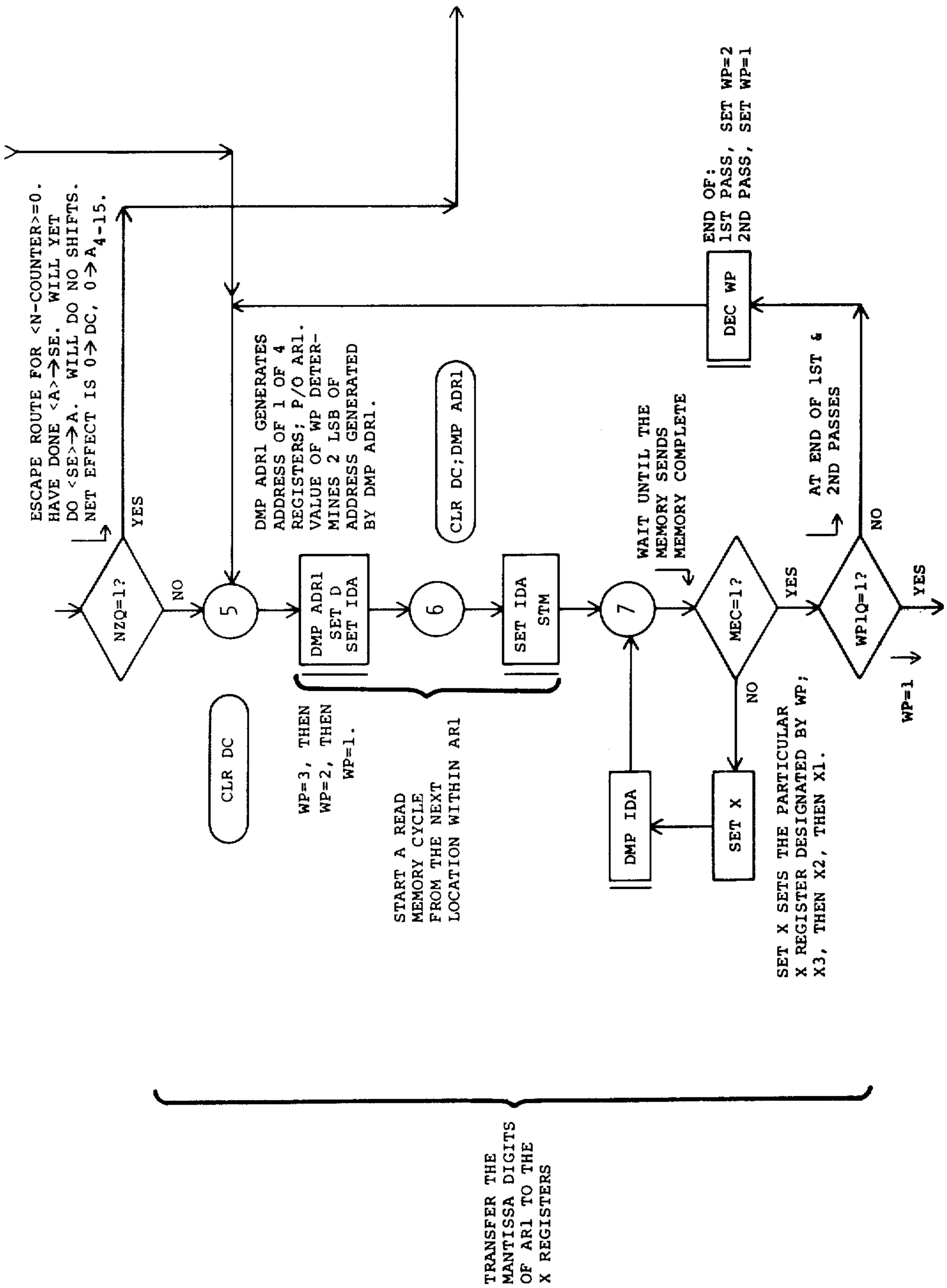
Figure 119D:
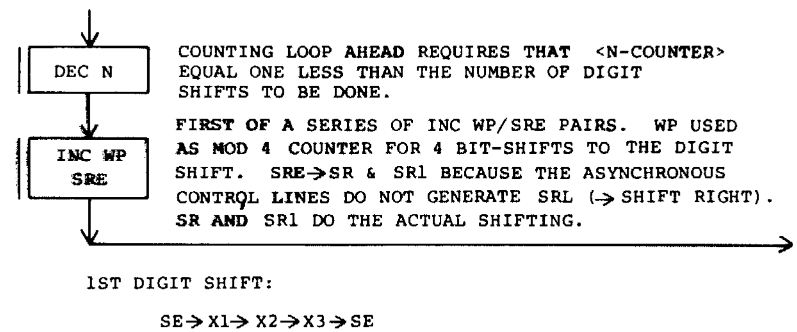
Figure 119D:
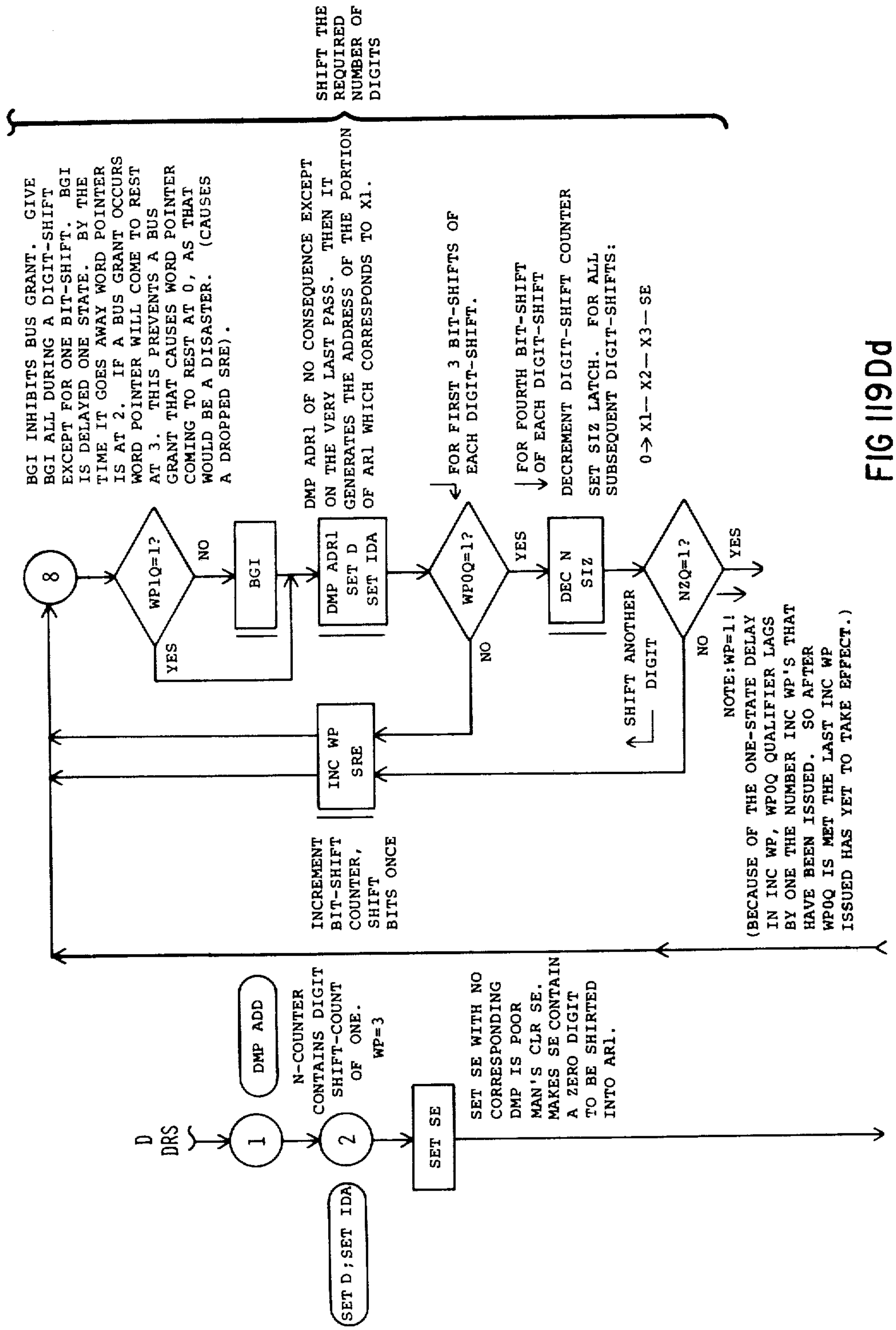
Figure 119D:
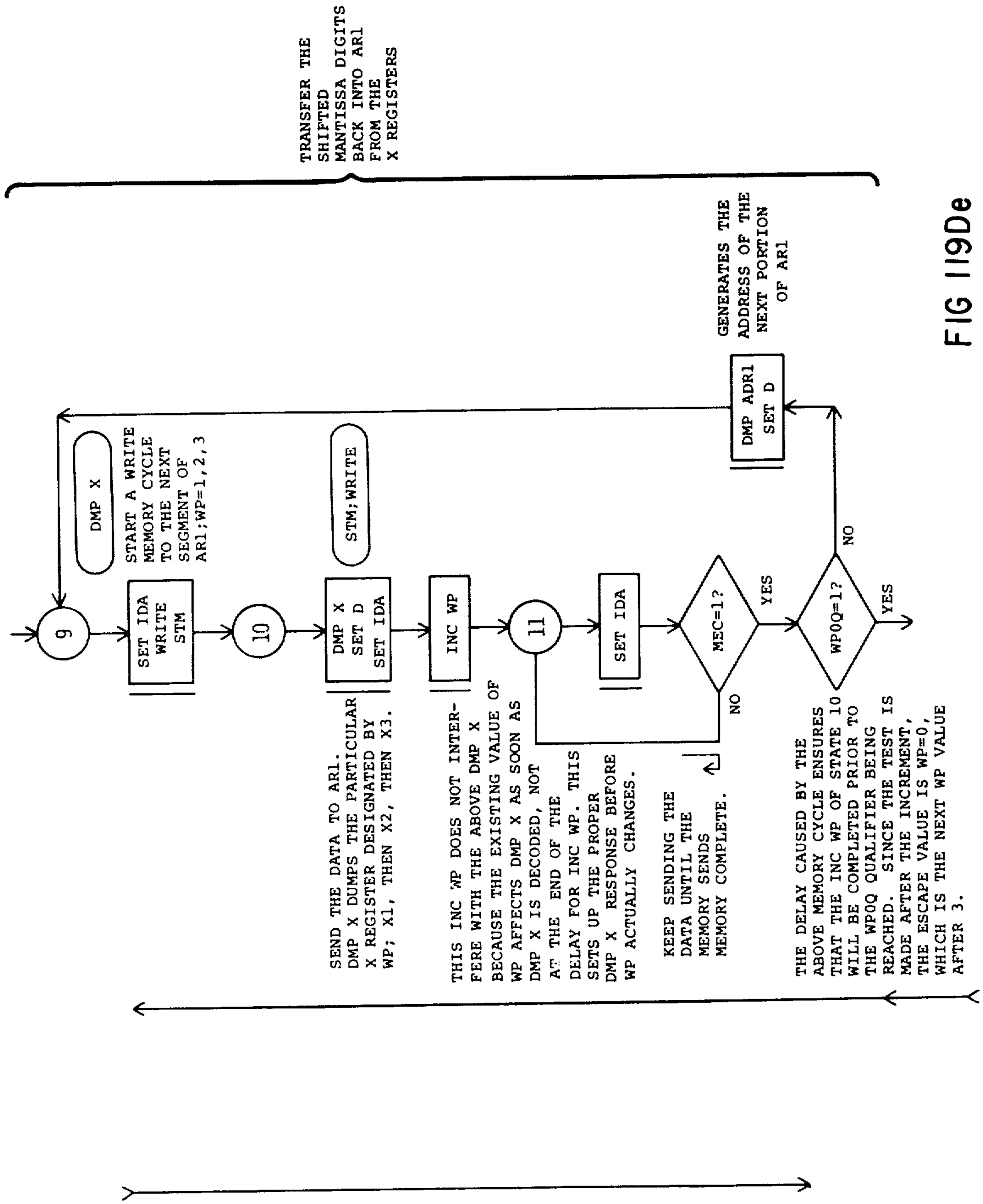
Figure 119D:
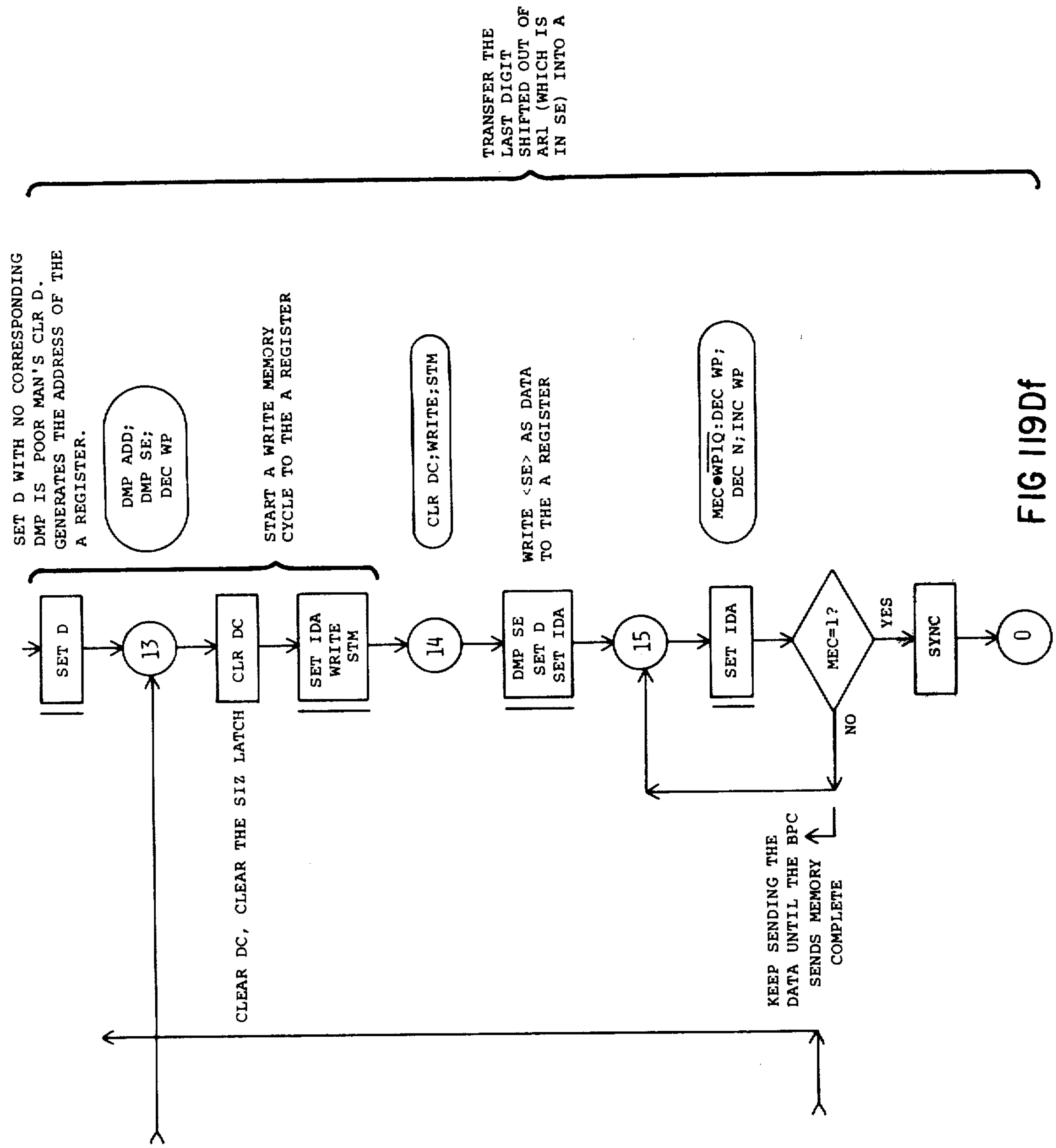
Figure 119E:
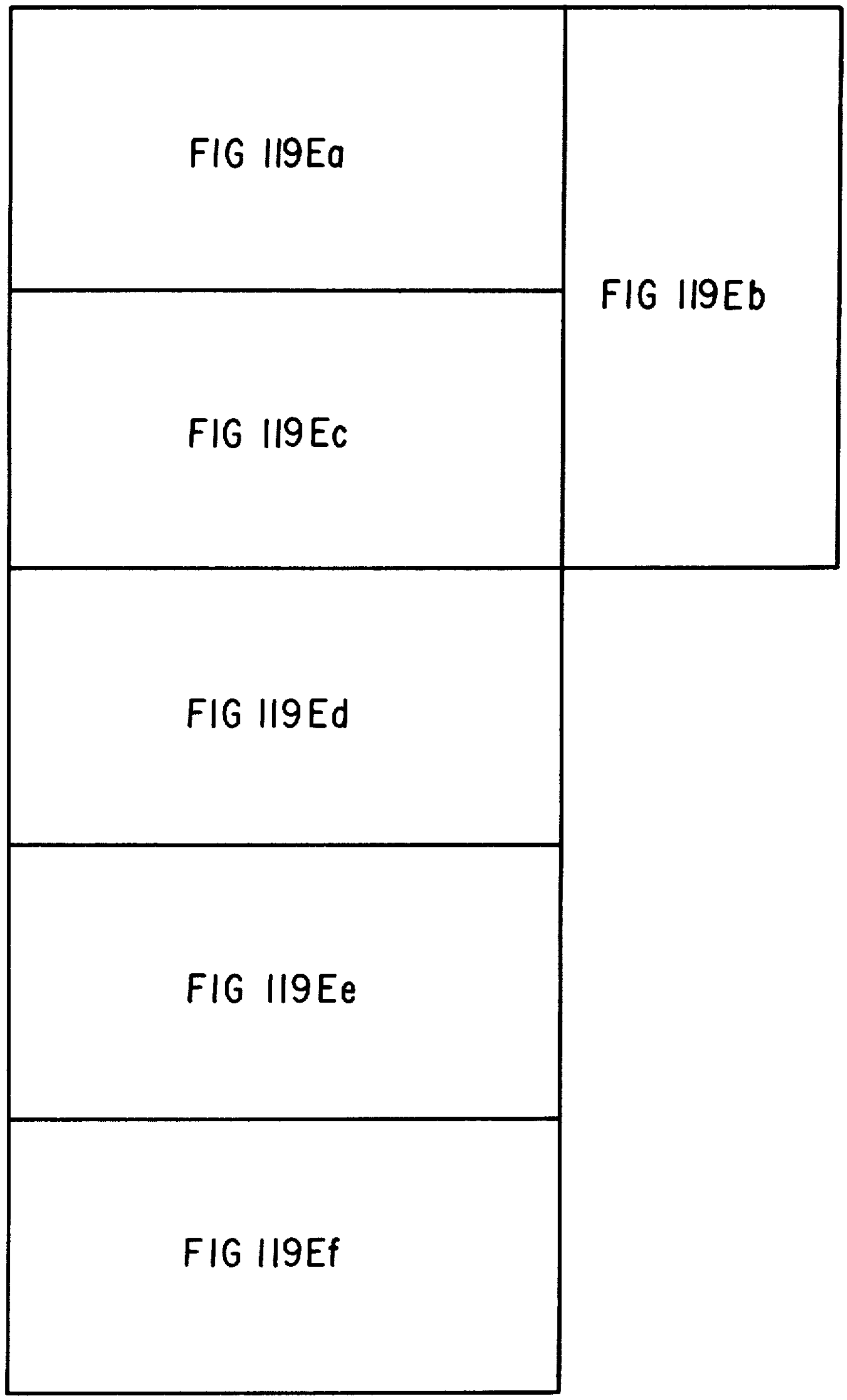
Figure 119E:
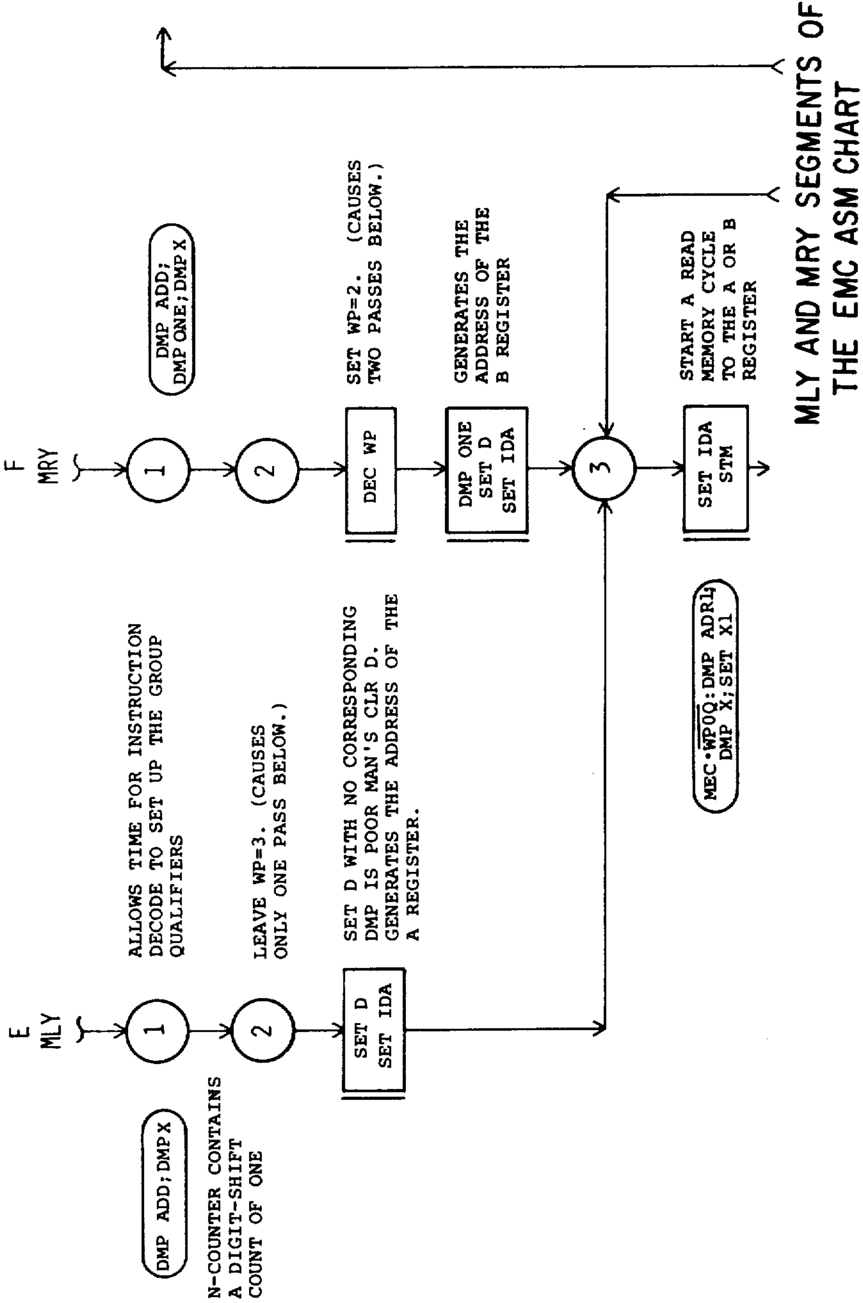
Figure 119E:
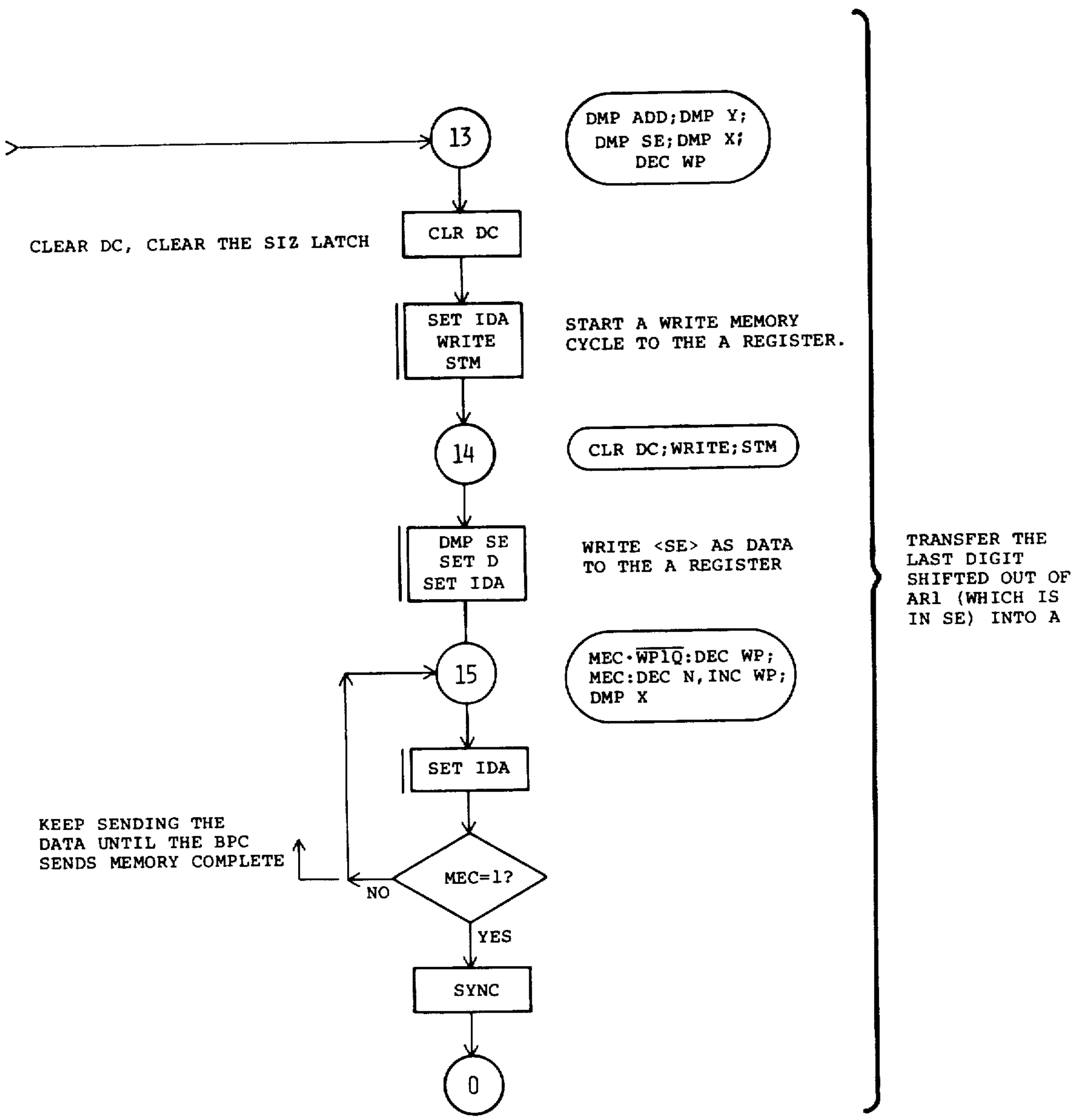
Figure 119E:
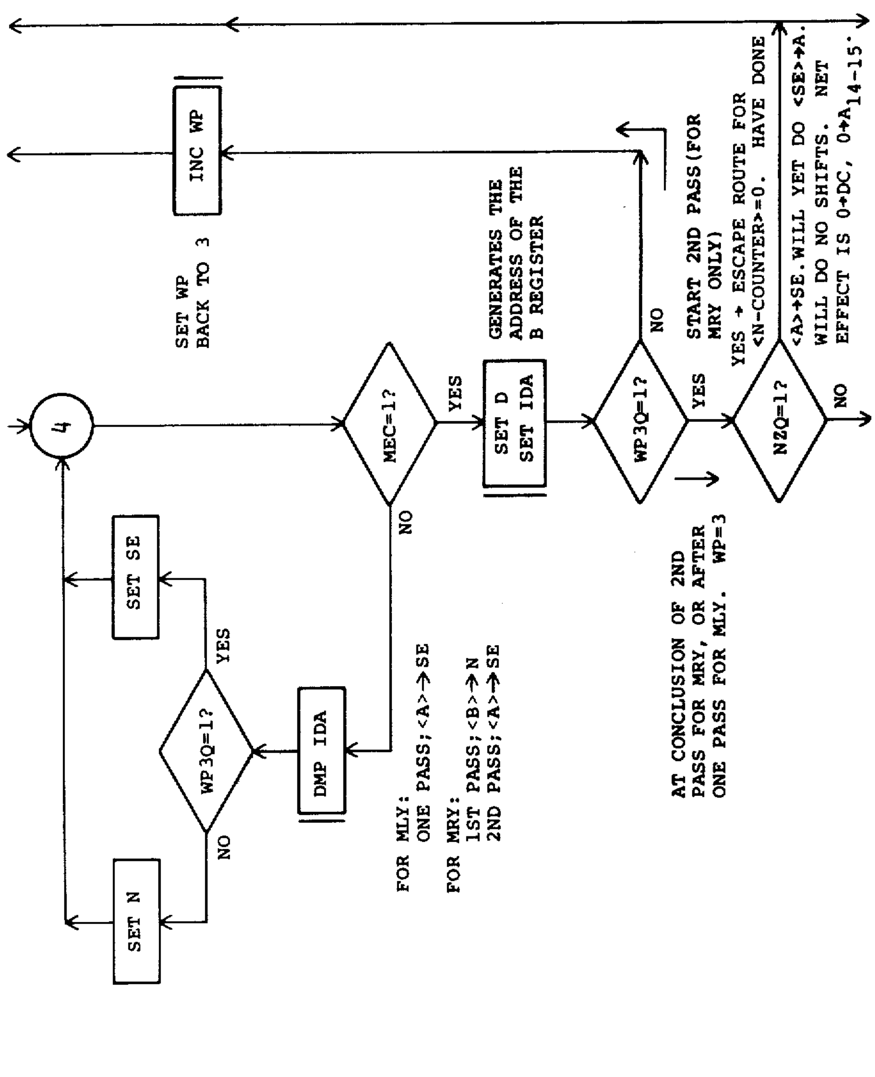
Figure 119E:
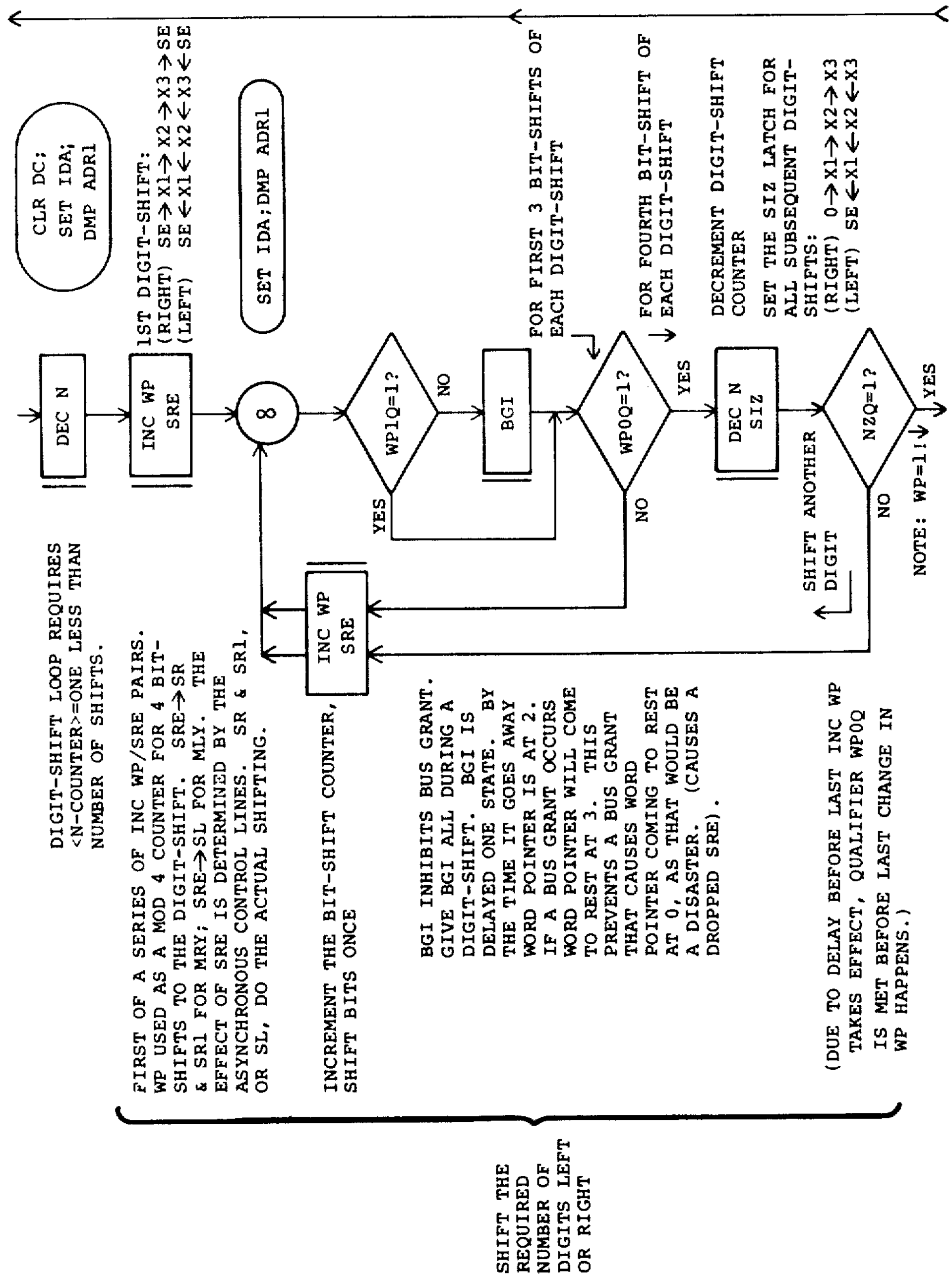
Figure 119F:
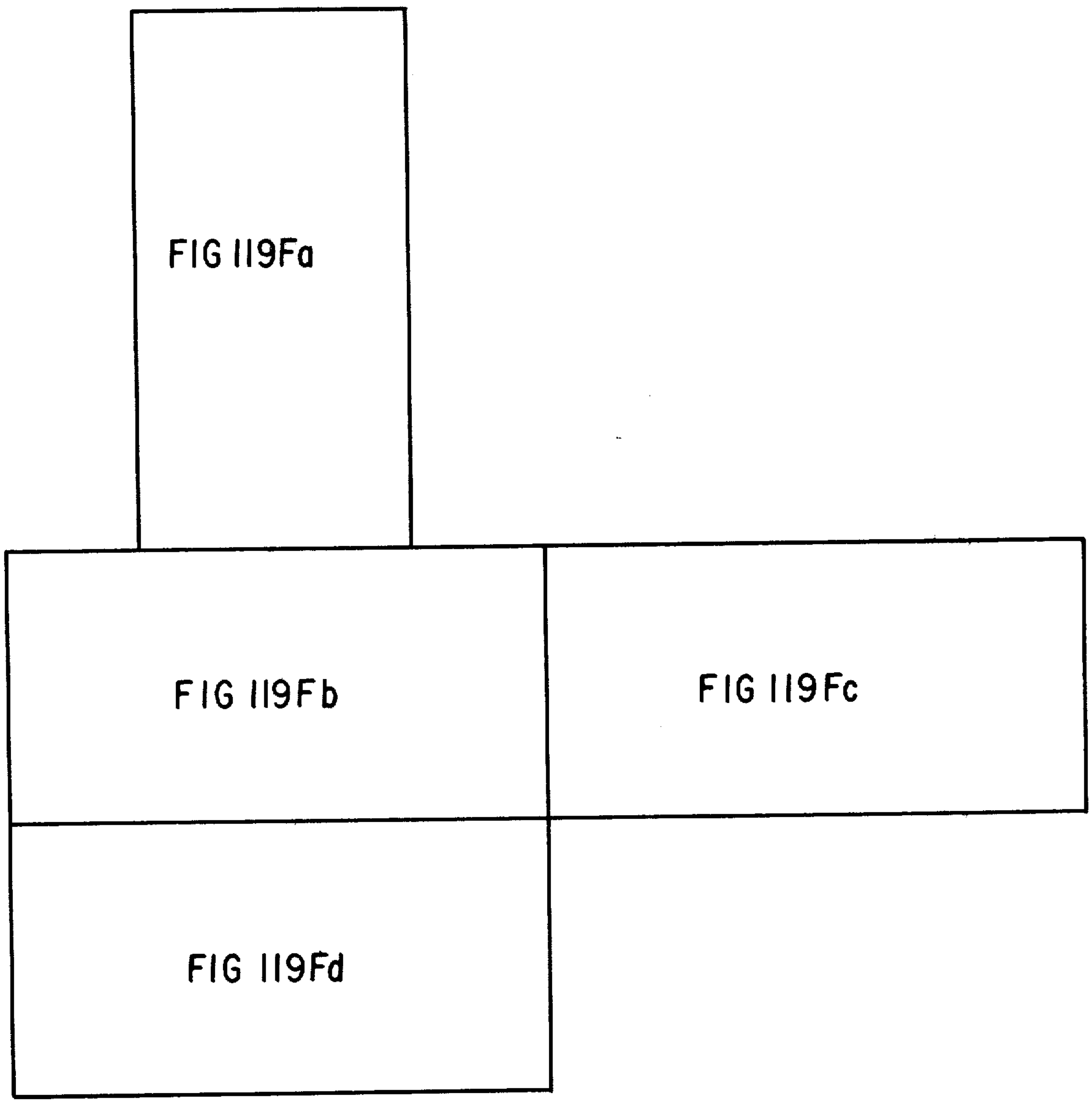
Figure 119F:
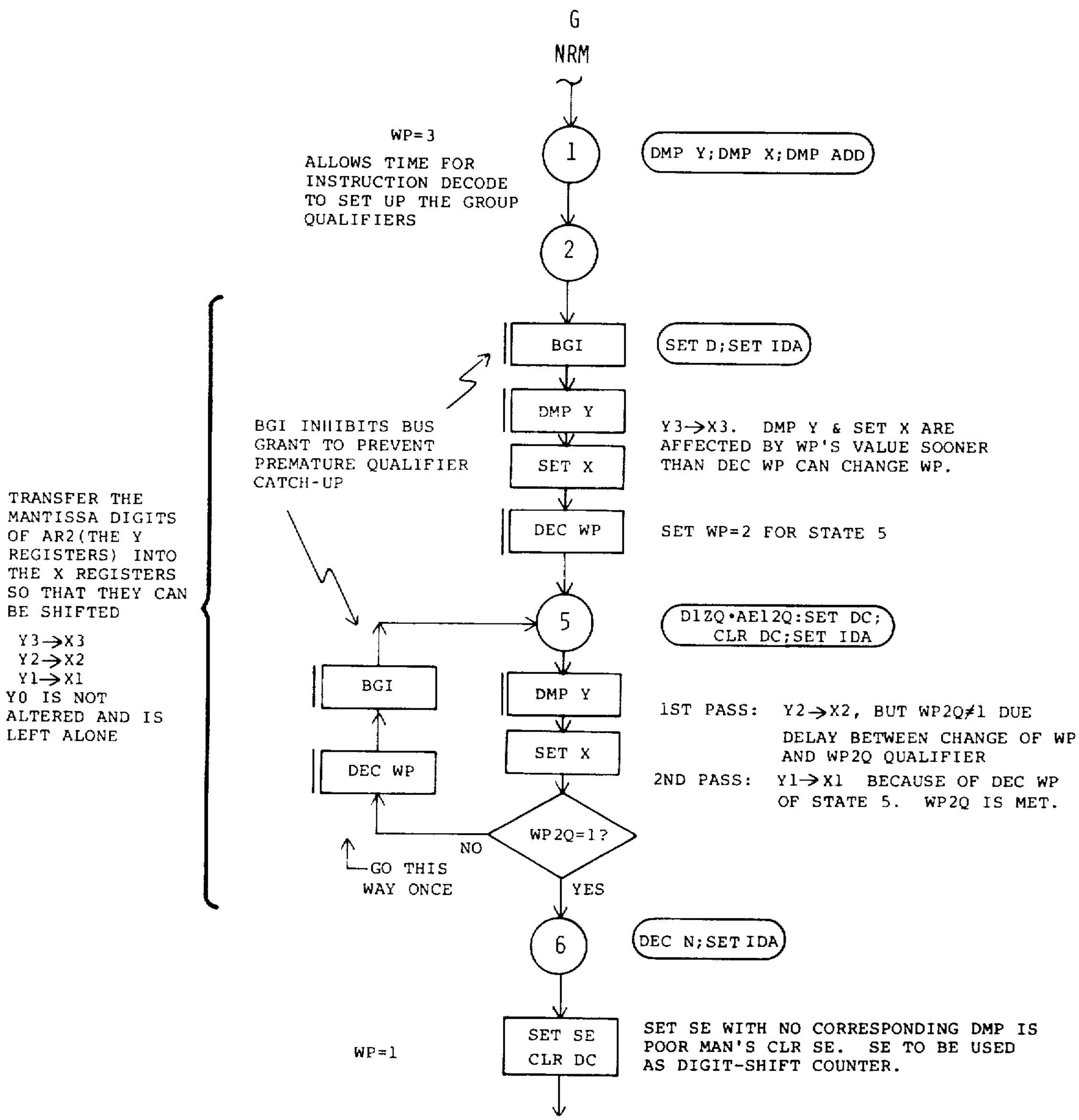
Figure 119F:
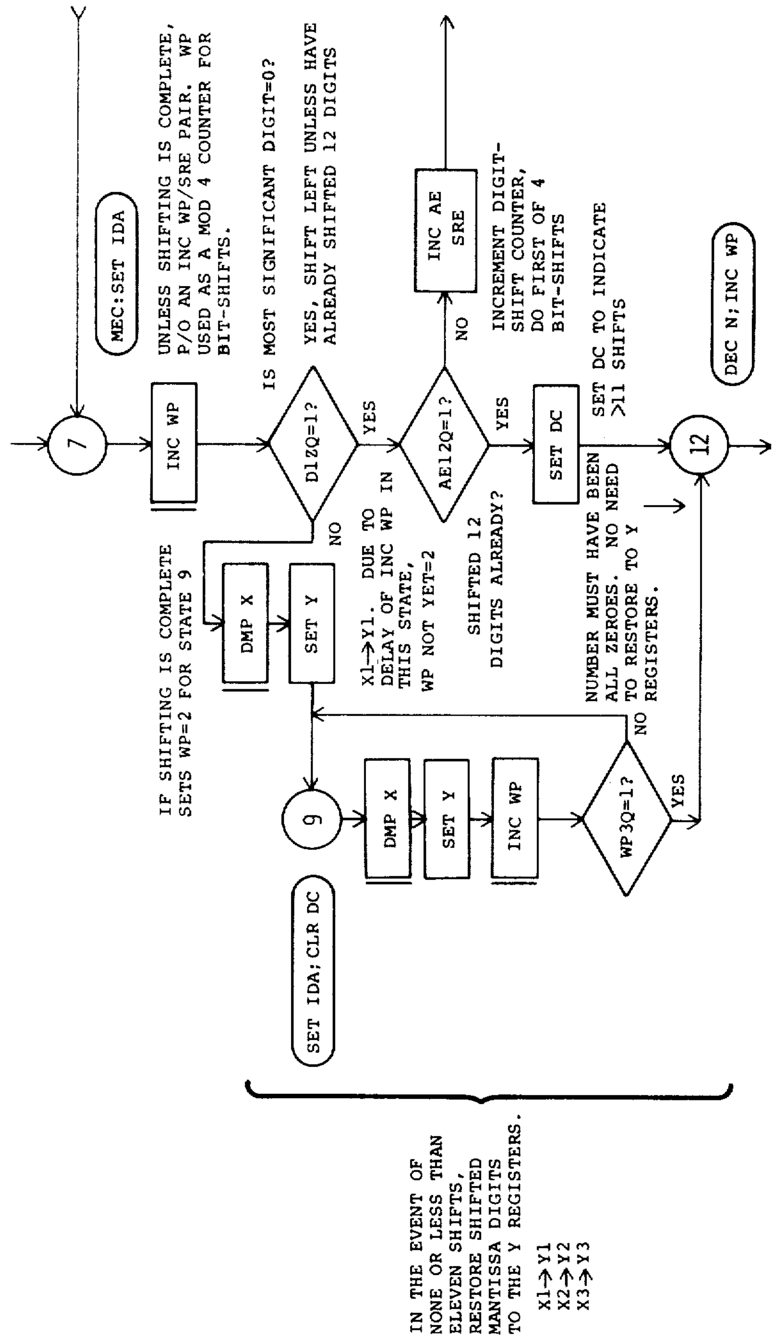
Figure 119F:
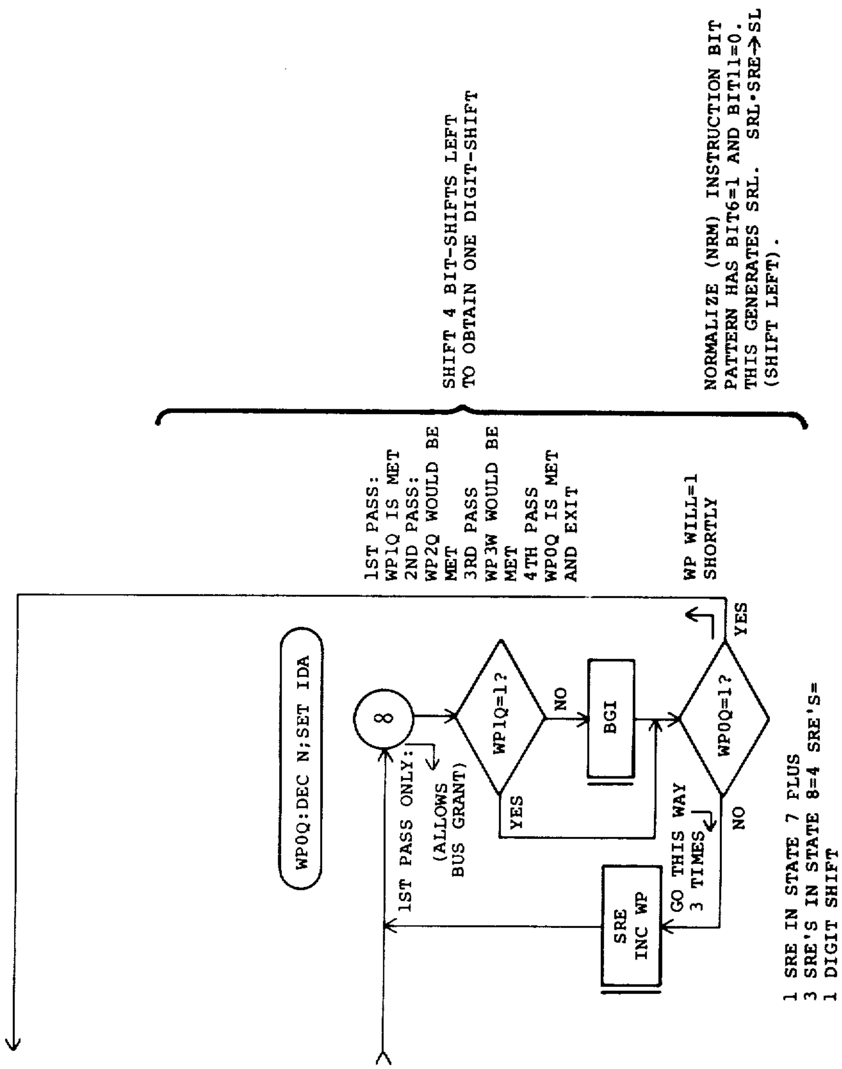
Figure 119F:
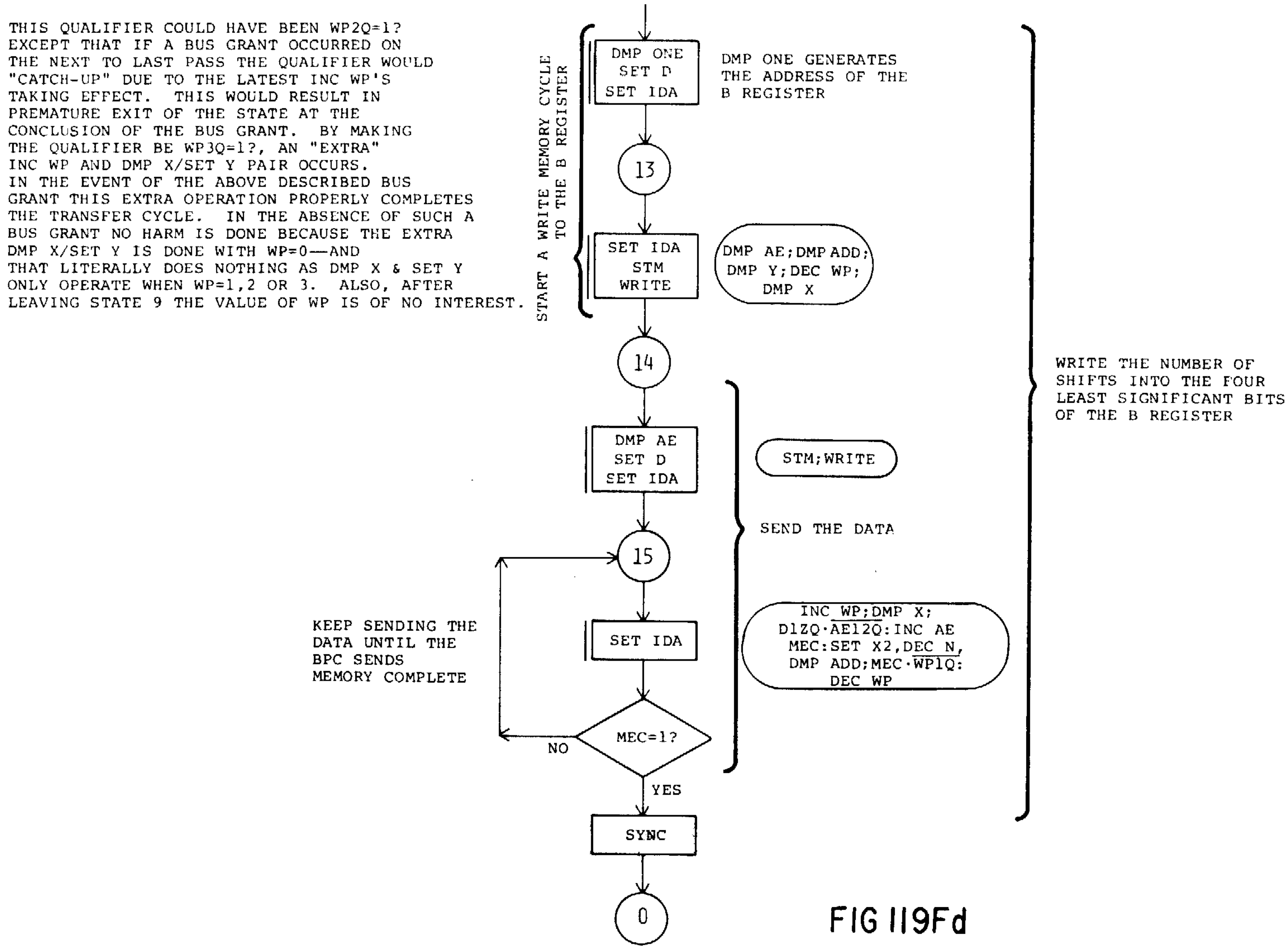
Figure 119G:
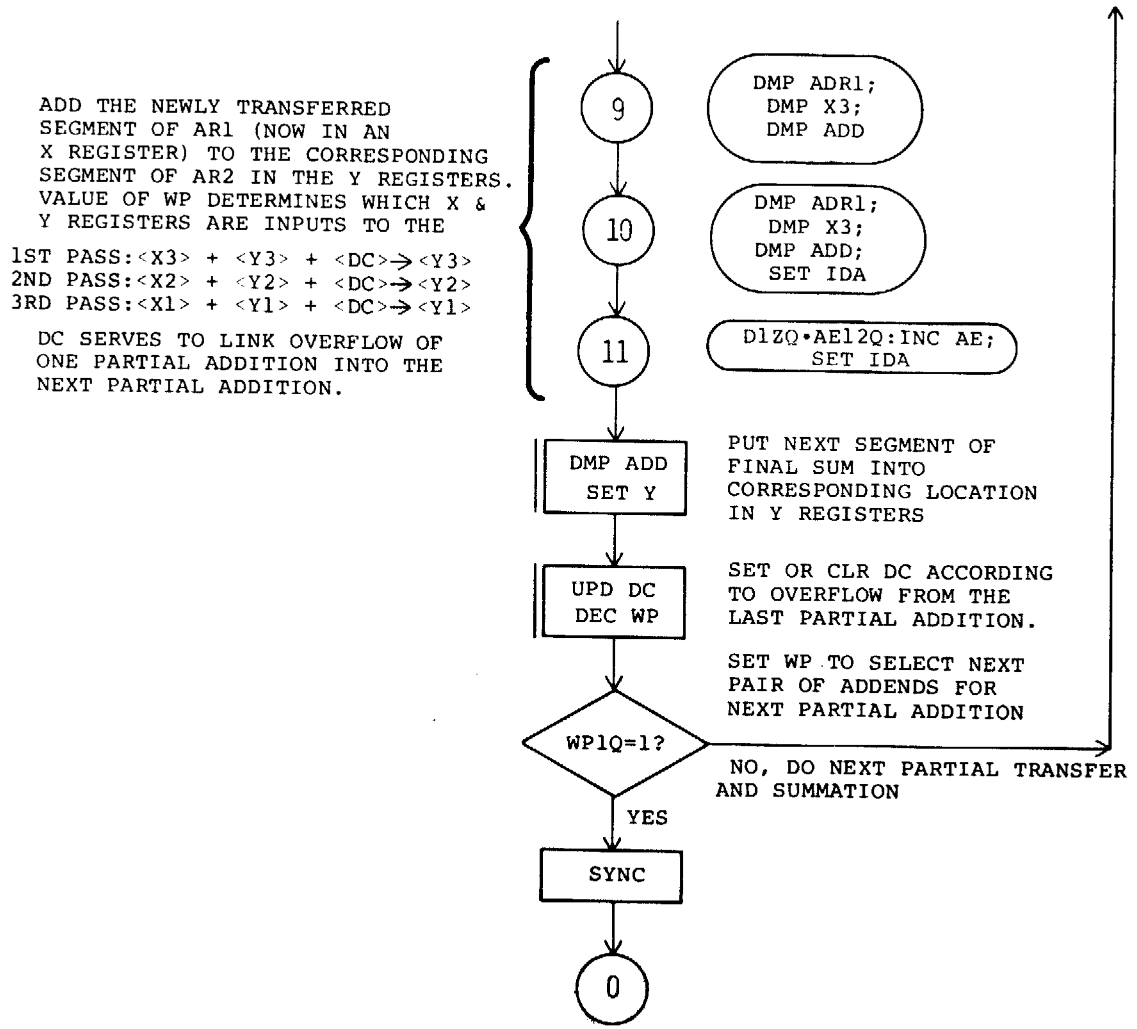
Figure 119H:
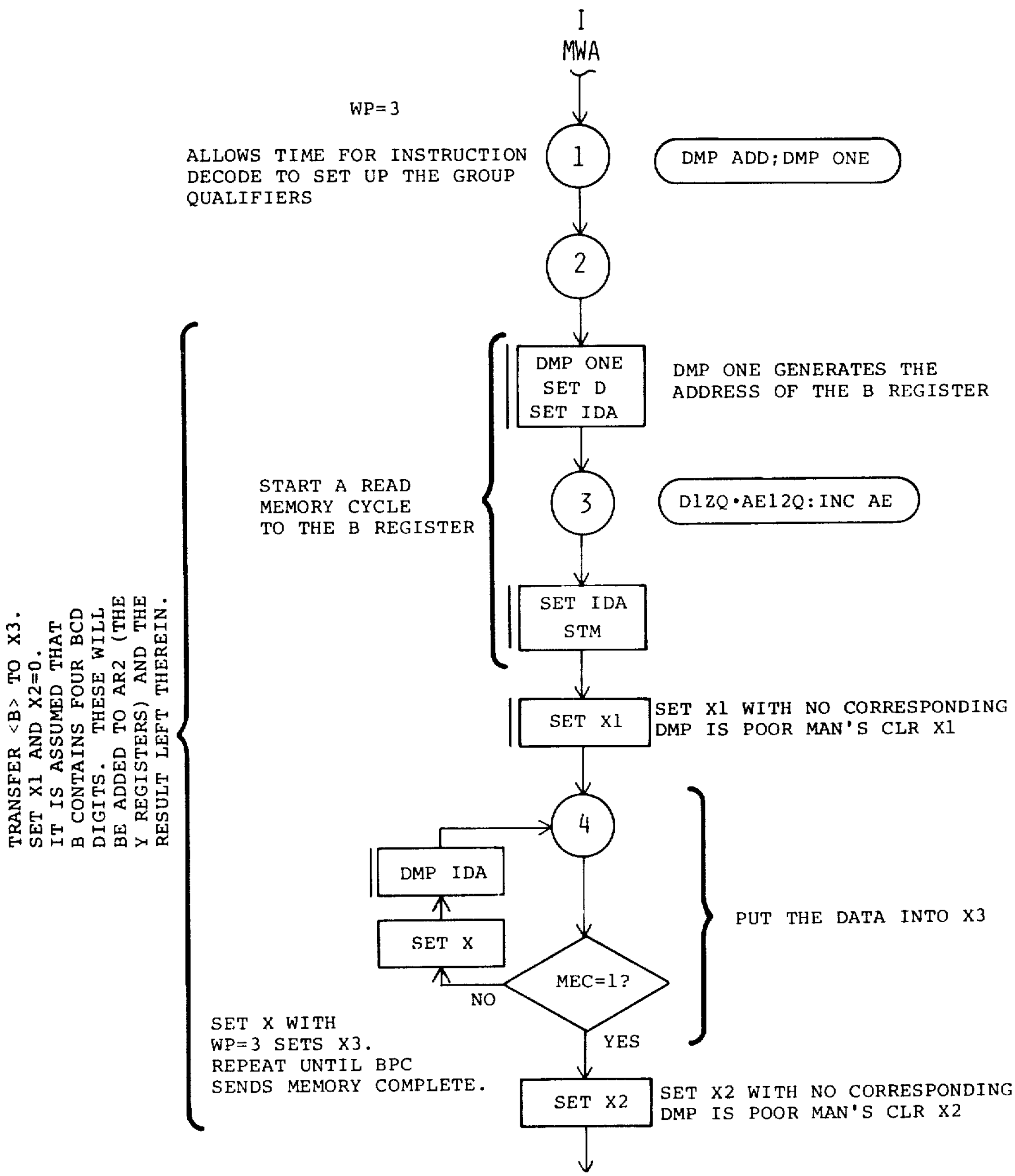
Figure 119H:
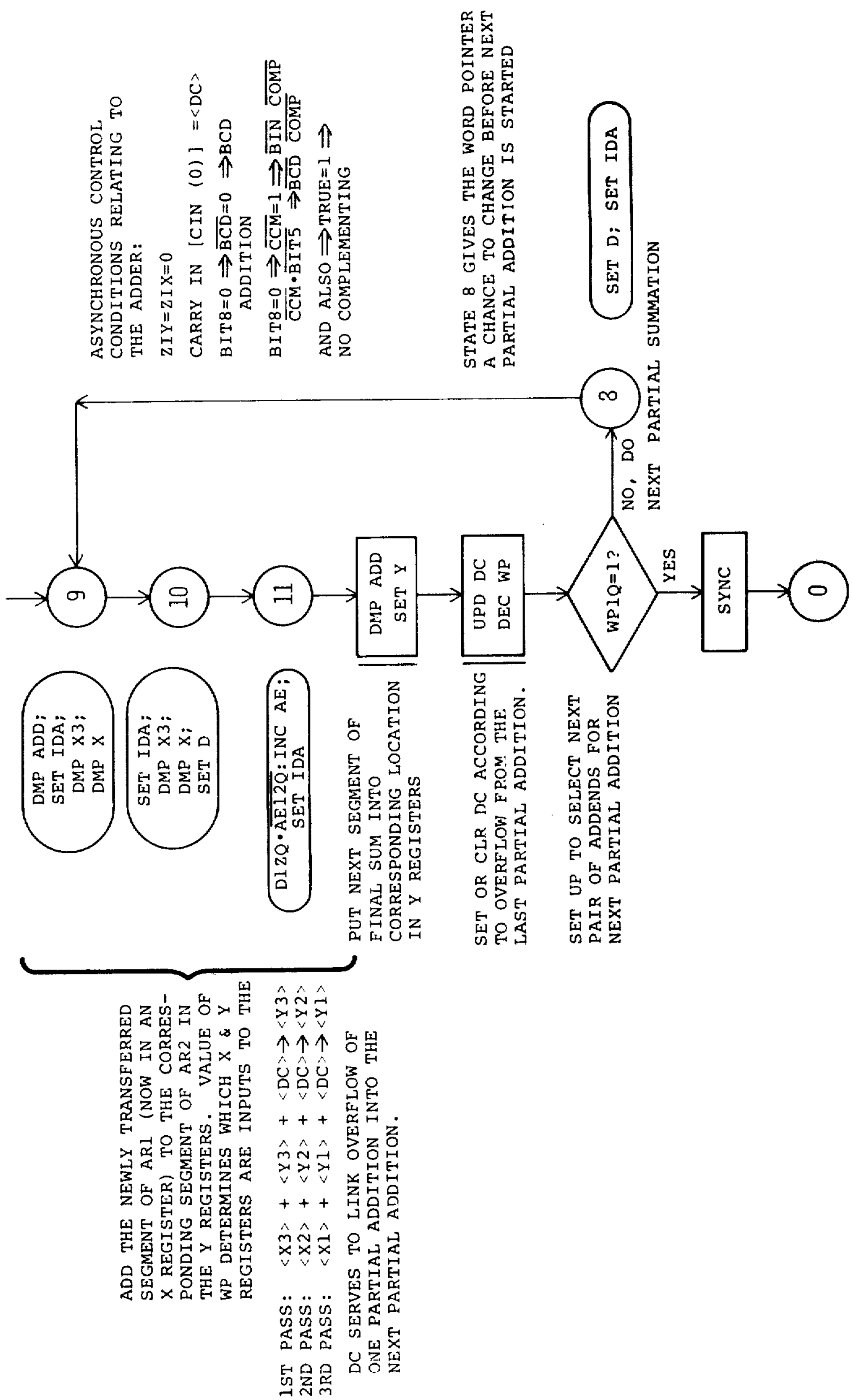
Figure 119I:
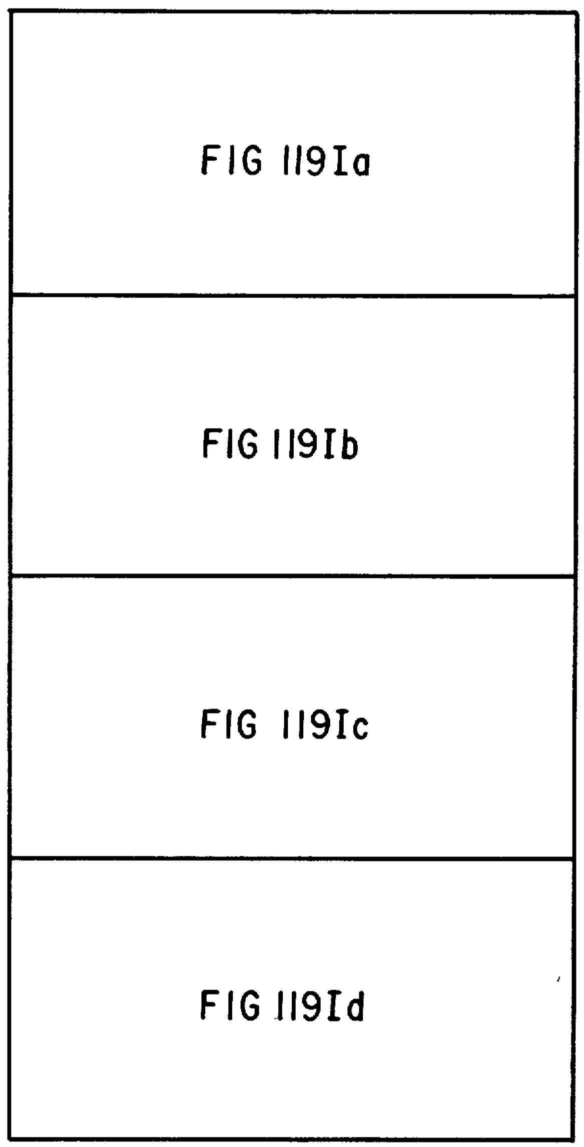
Figure 119J:
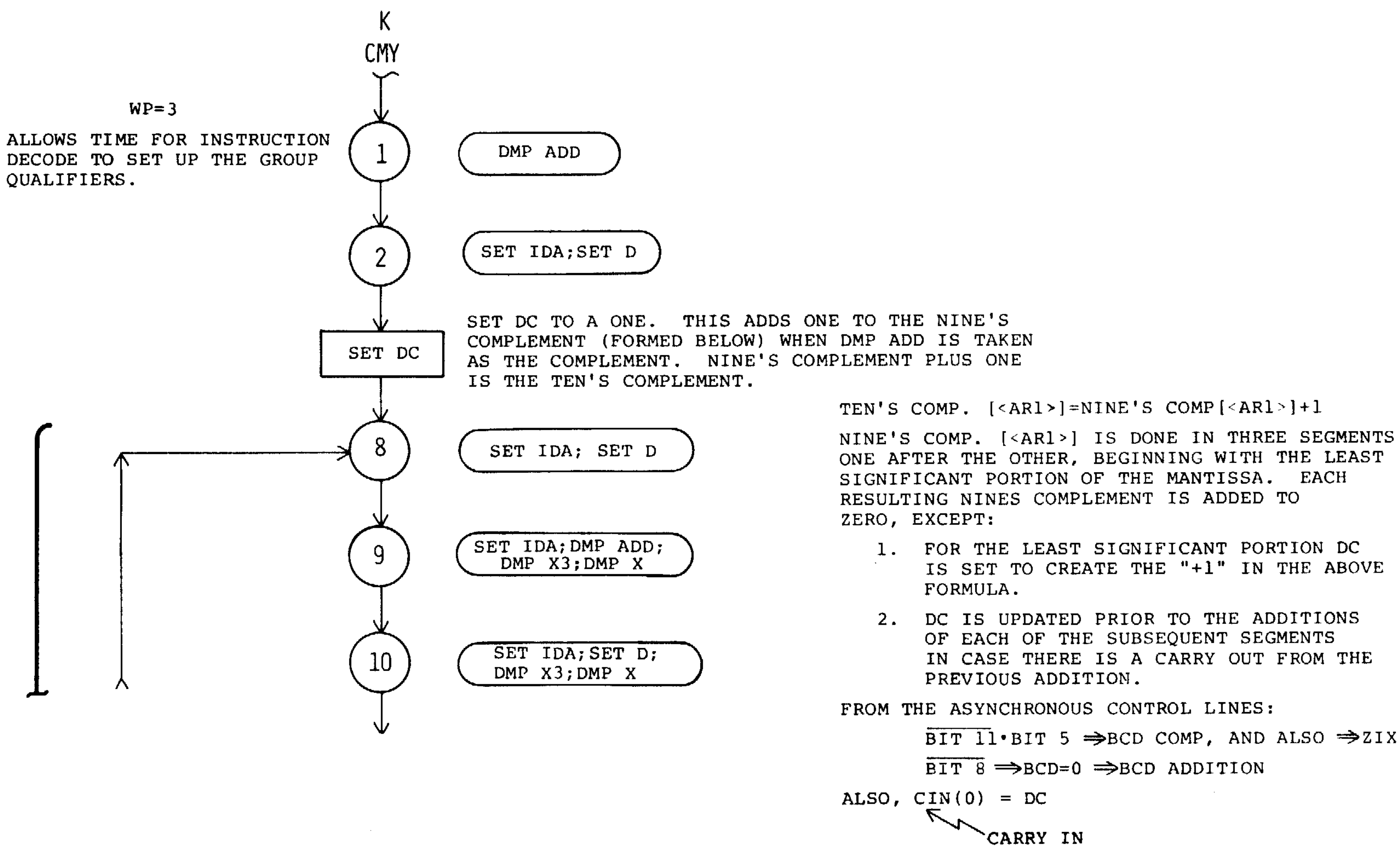
Figure 119J:
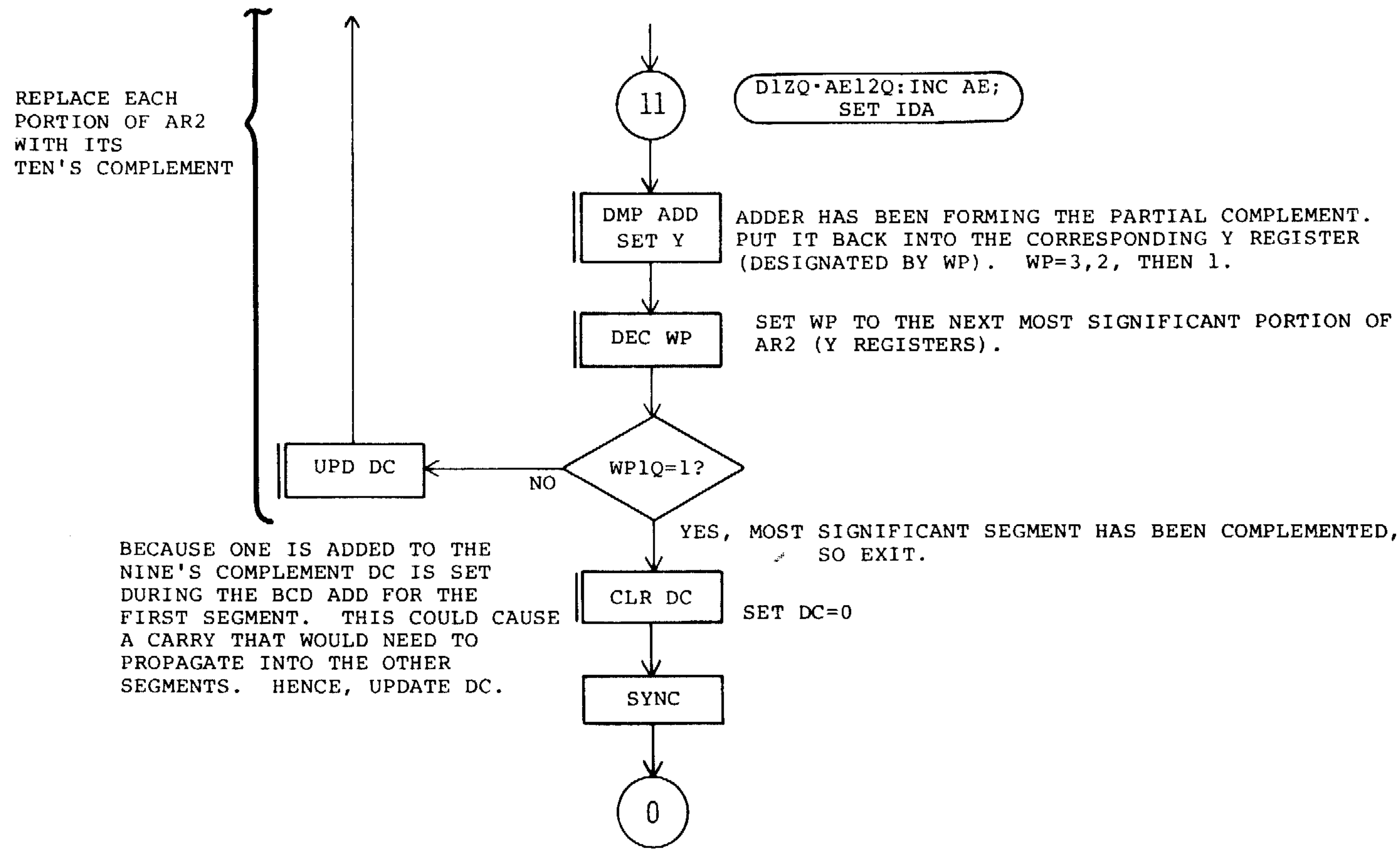
Figure 119K:
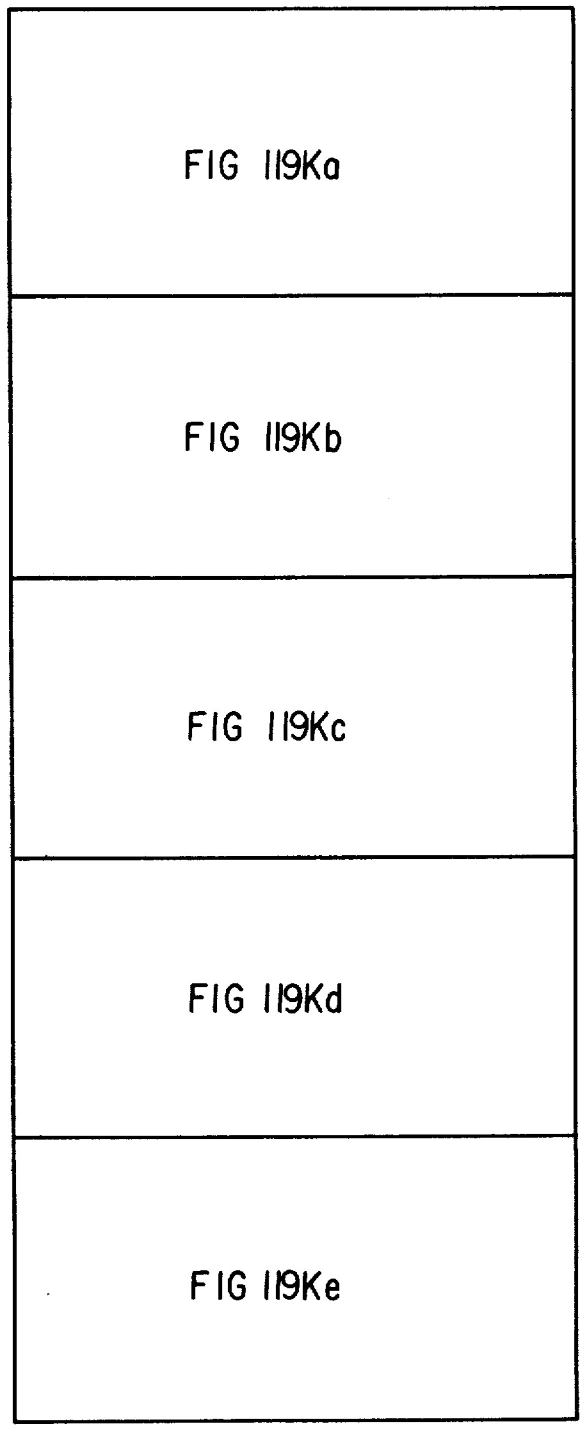
Figure 119K:
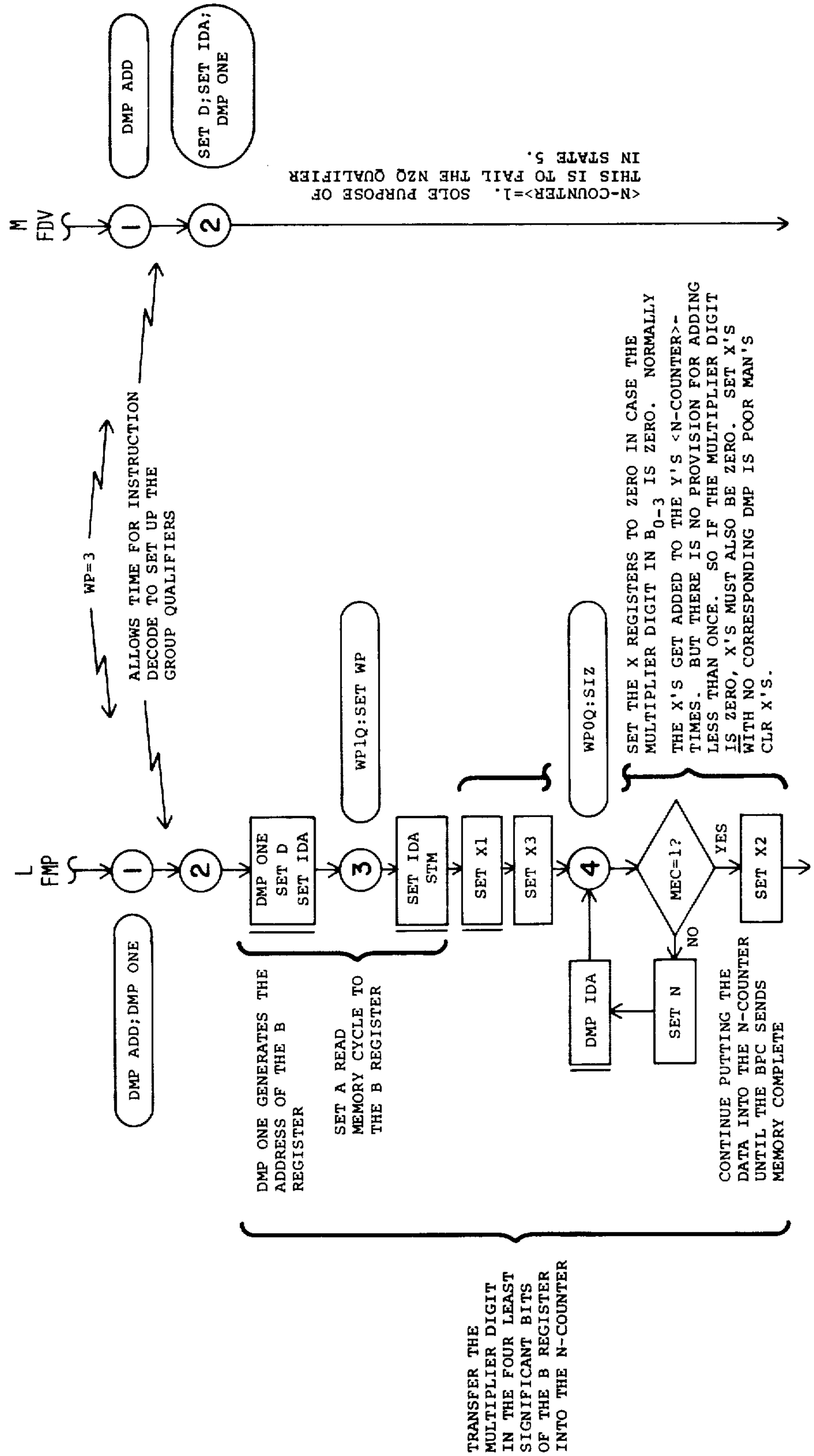
Figure 19K:
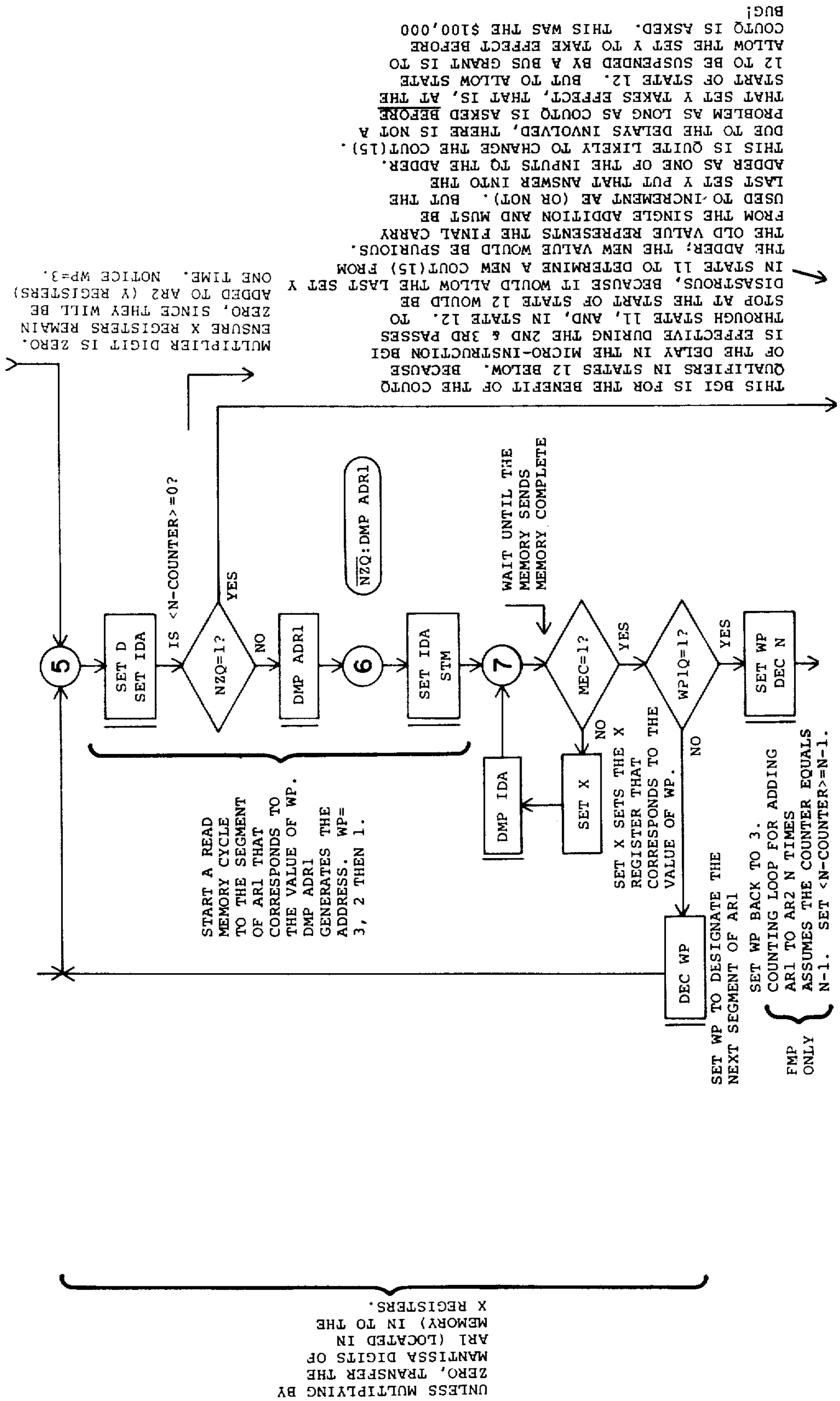
Figure 119K:
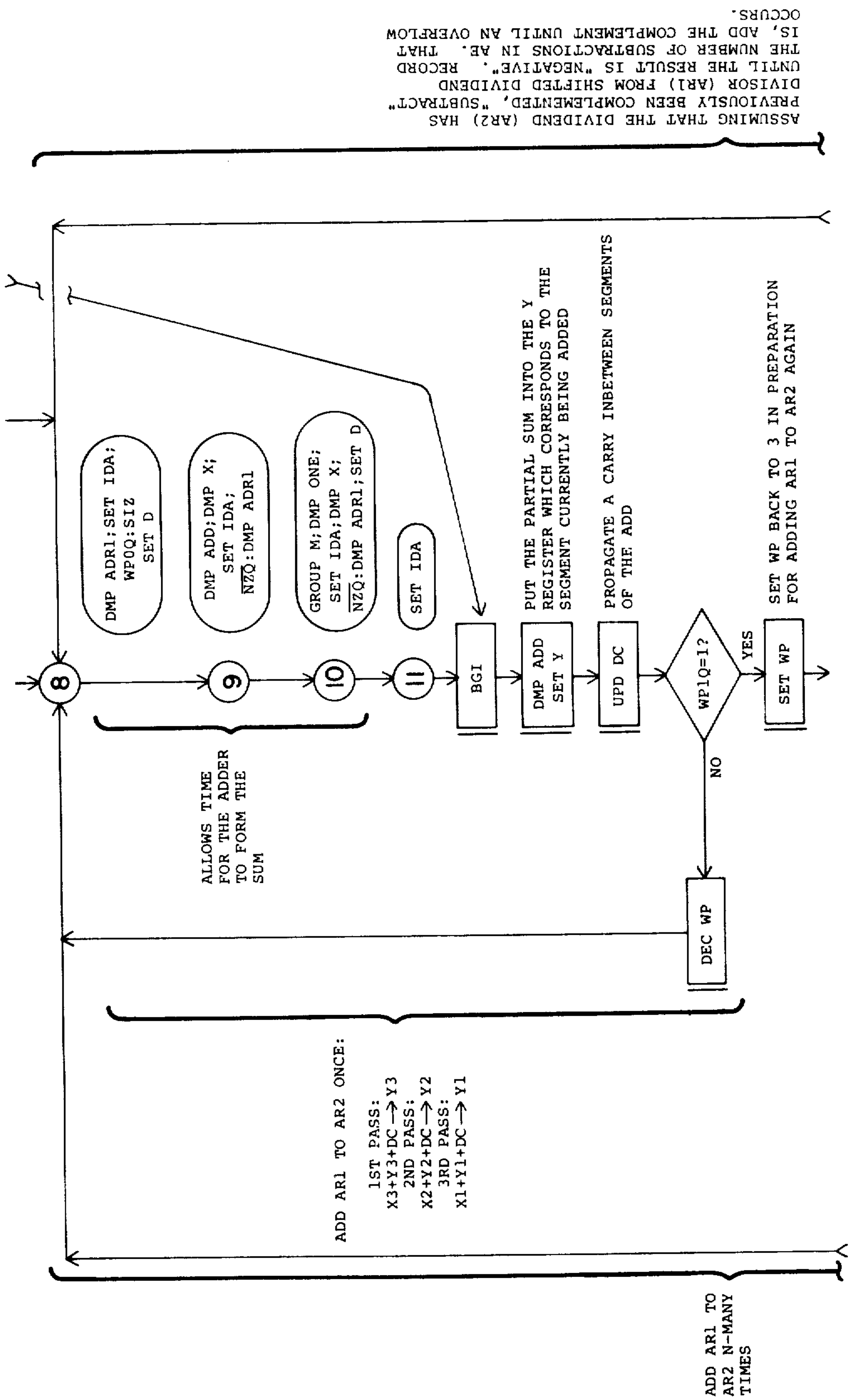
Figure 119K:
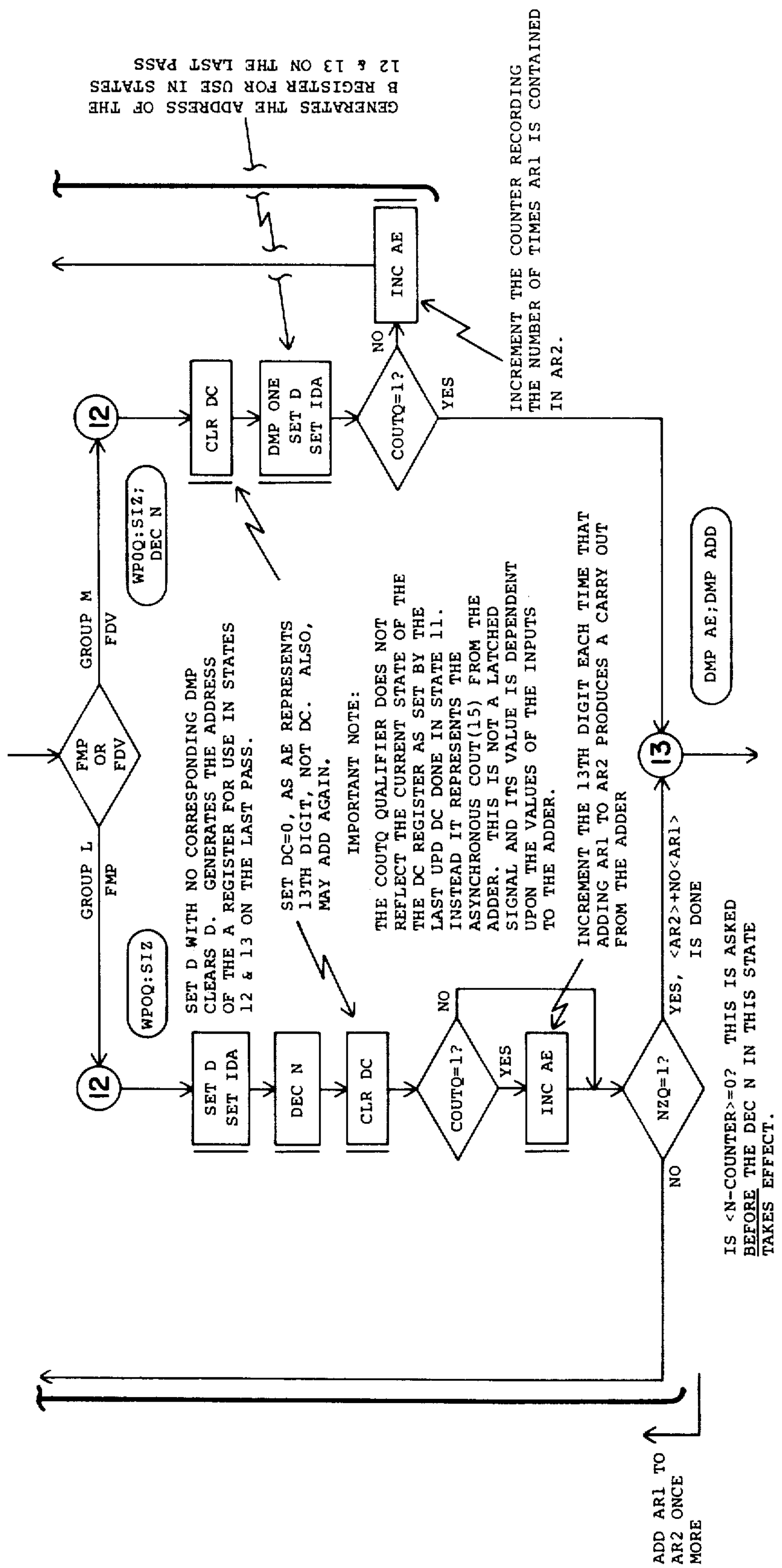
Figure 119K:
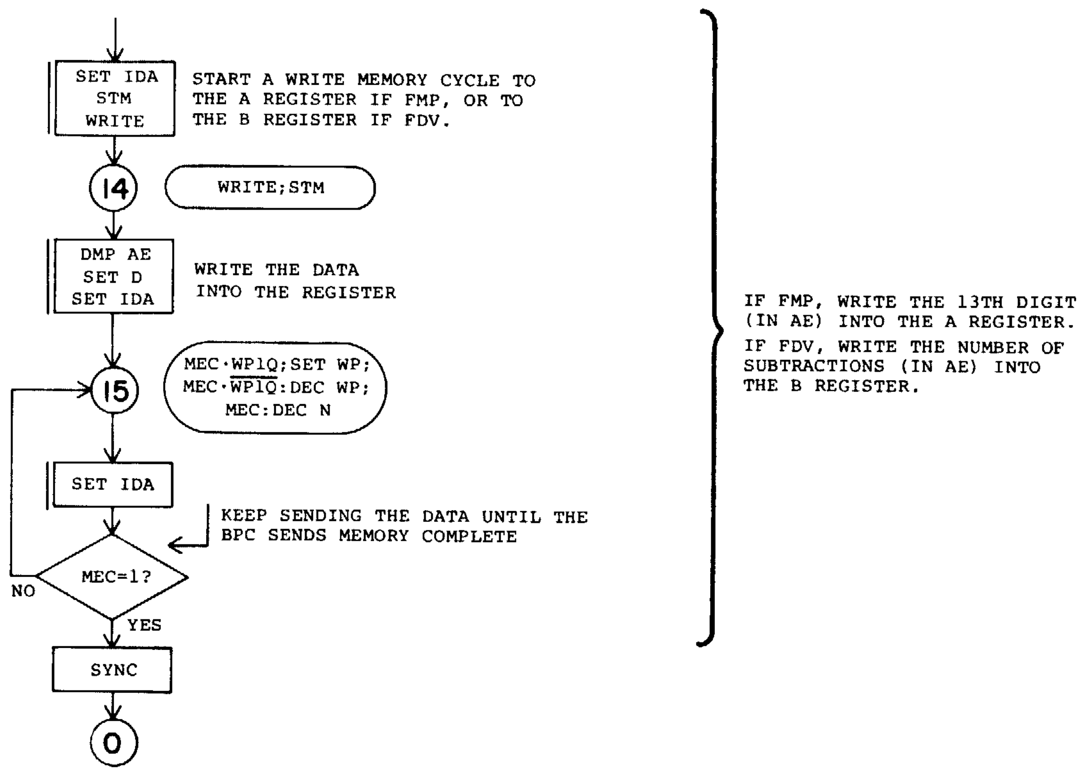
Figure 119L:
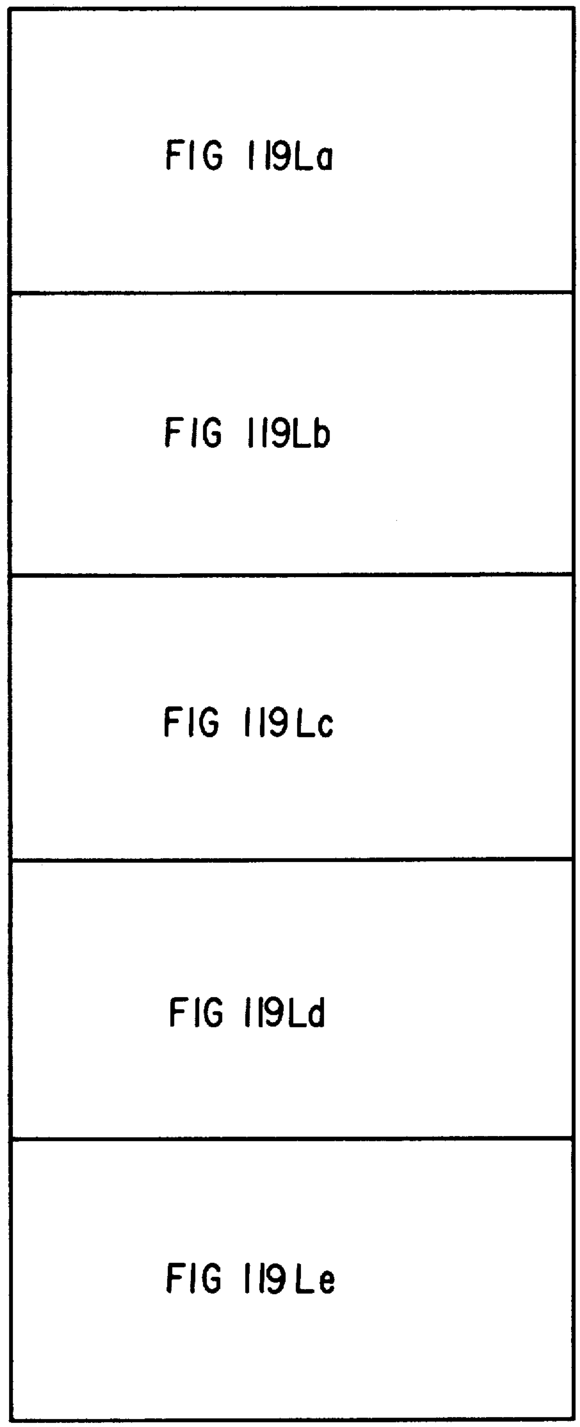
Figure 119L:
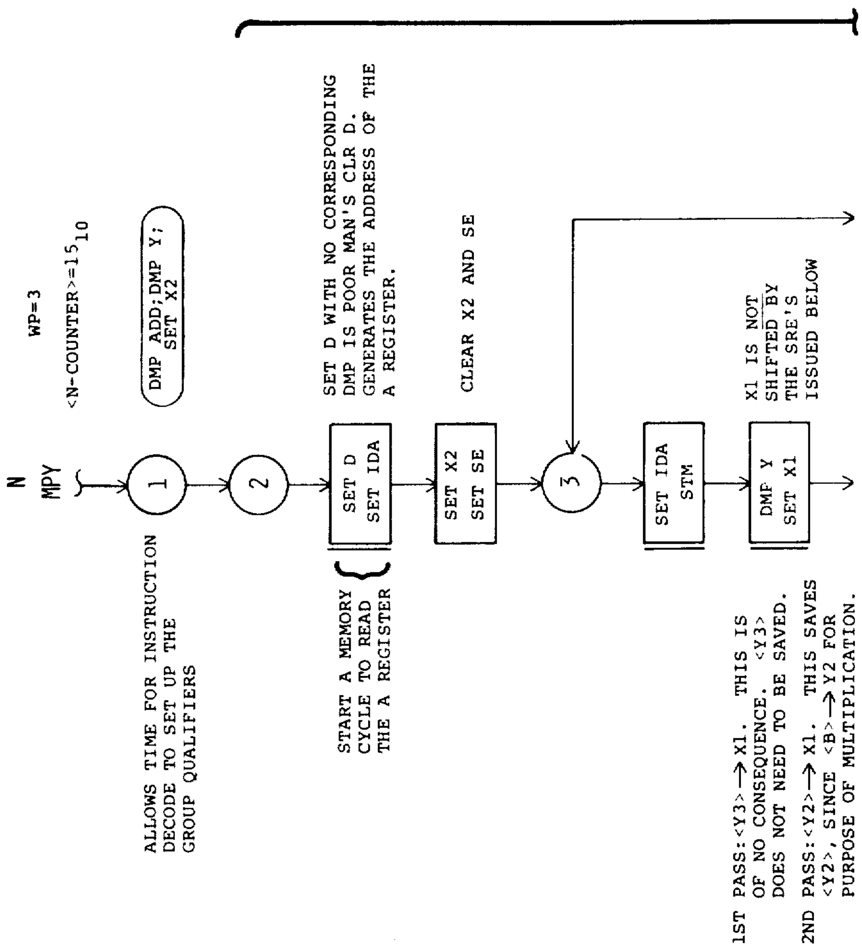
Figure 119L:
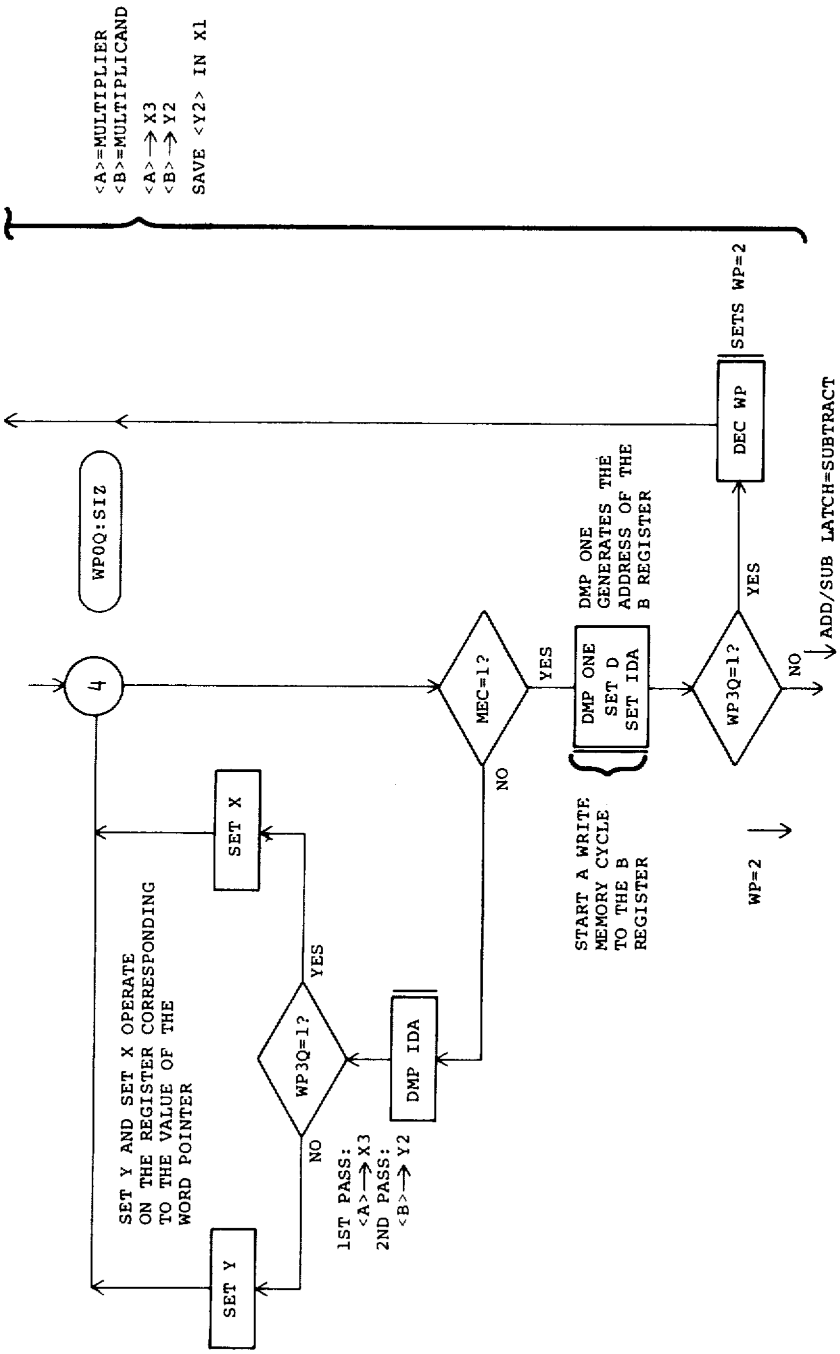
Figure 119L:
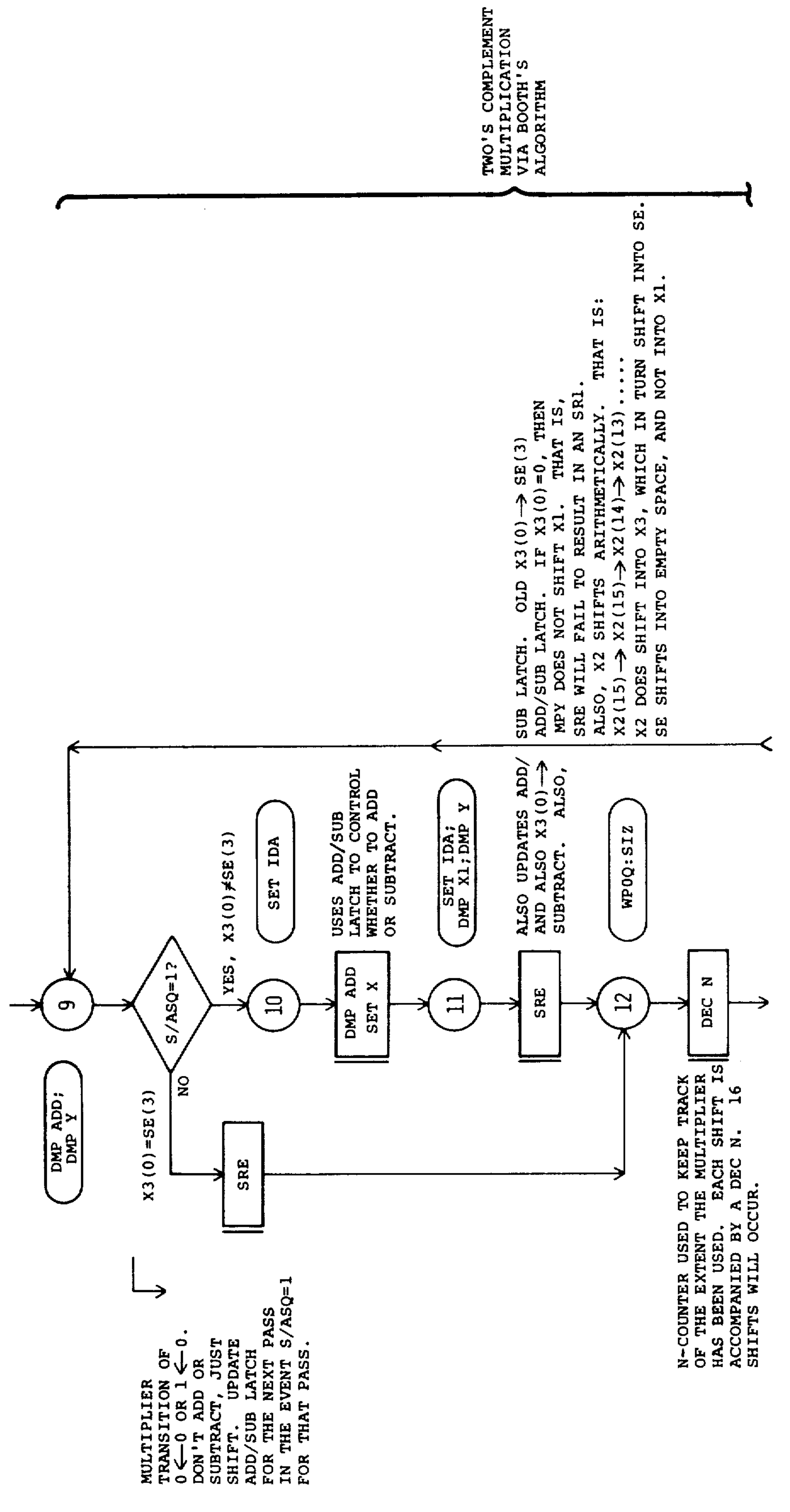
Figure 119L:
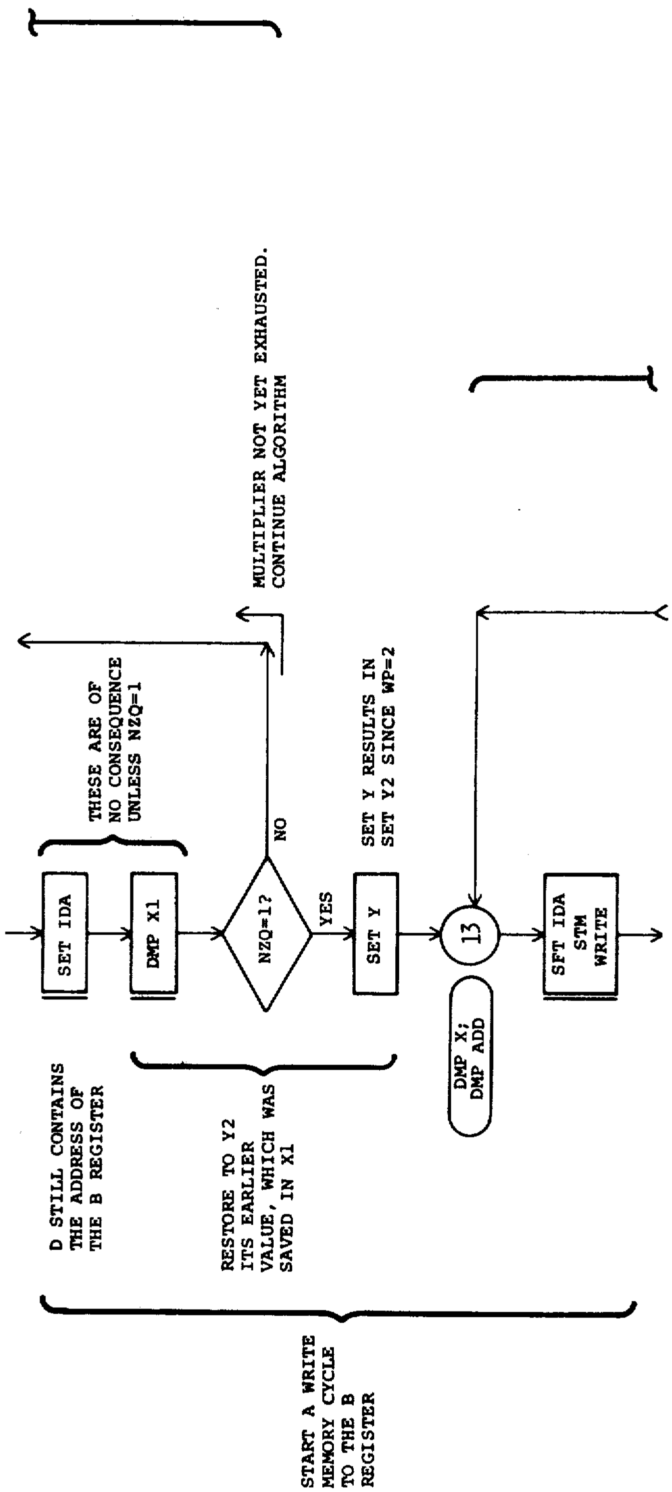
Figure 119L:
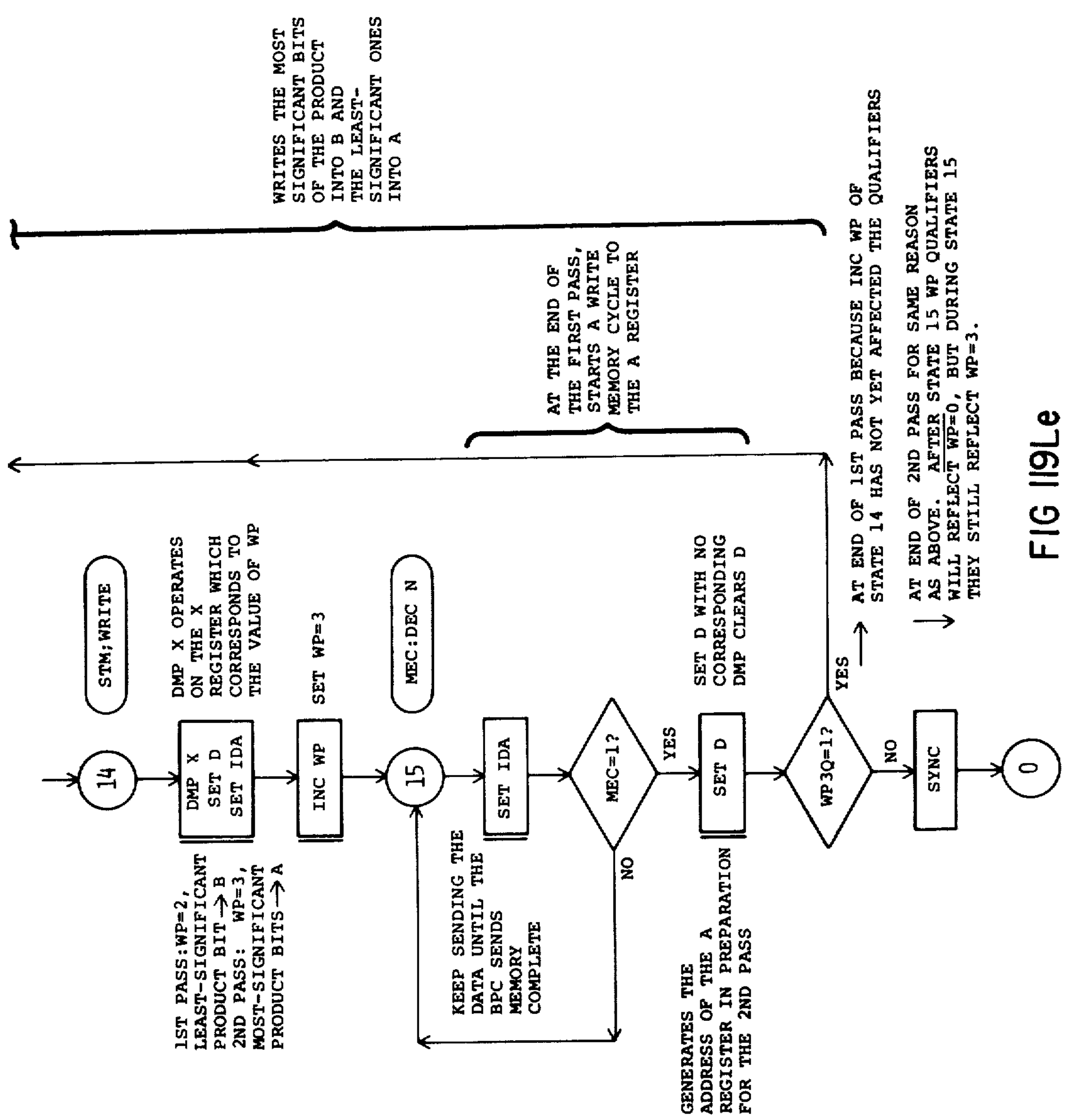
Figure 119M:
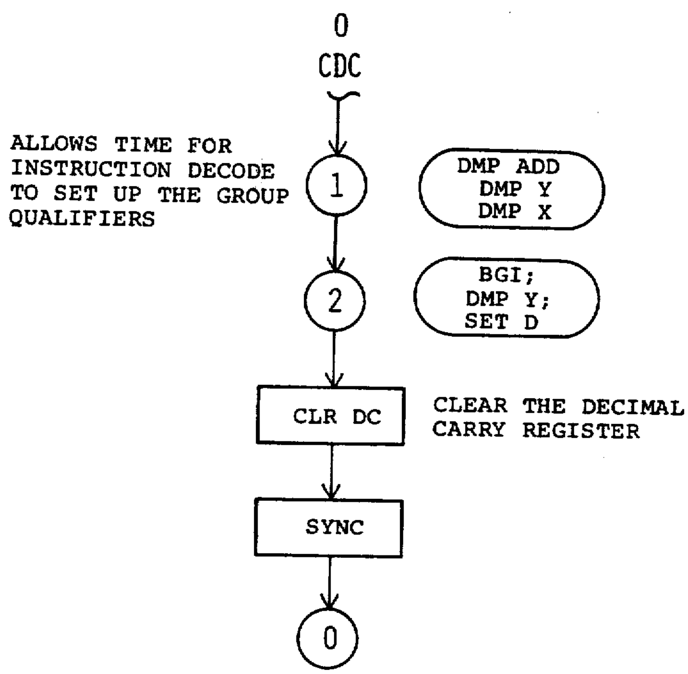
Figure 119N:
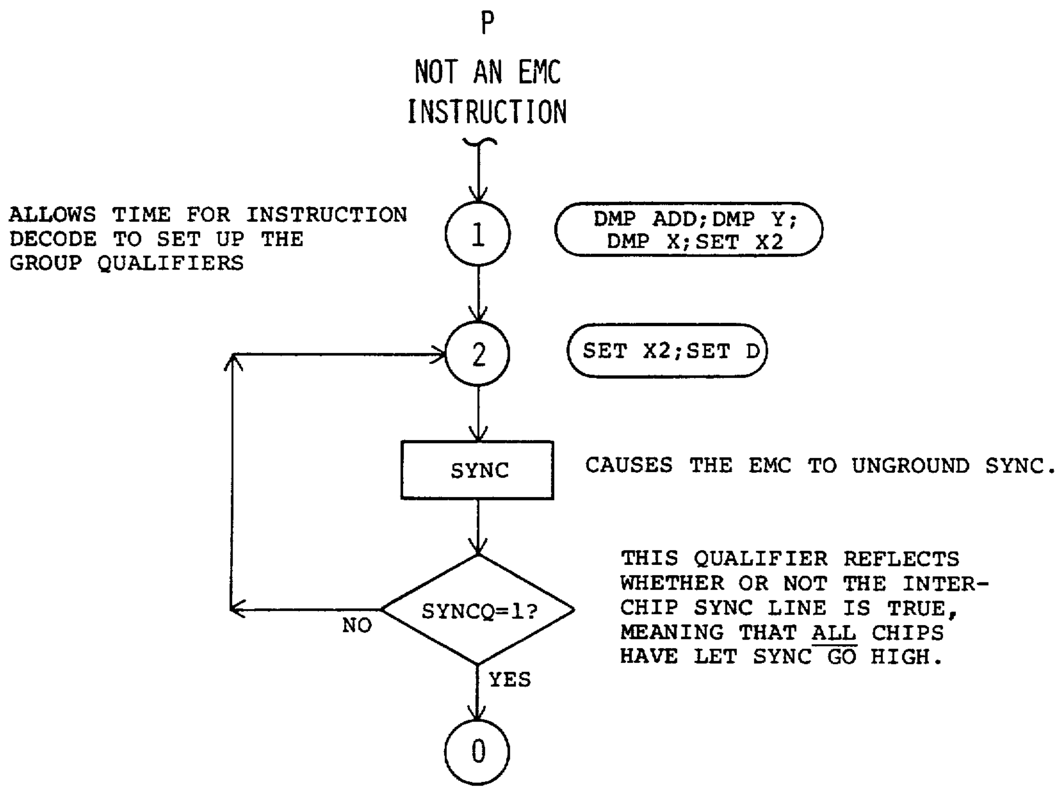

FIGS. 117A*a*–*b*, 117B*a*–*b* and 117C explain the conventions used in FIGS. 119A–N.

Figure 118:
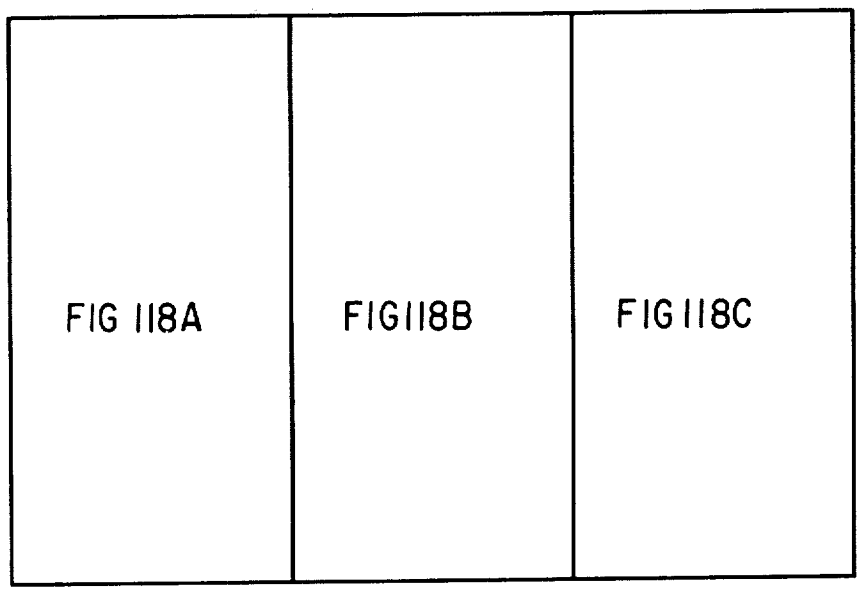
Figure 118A:
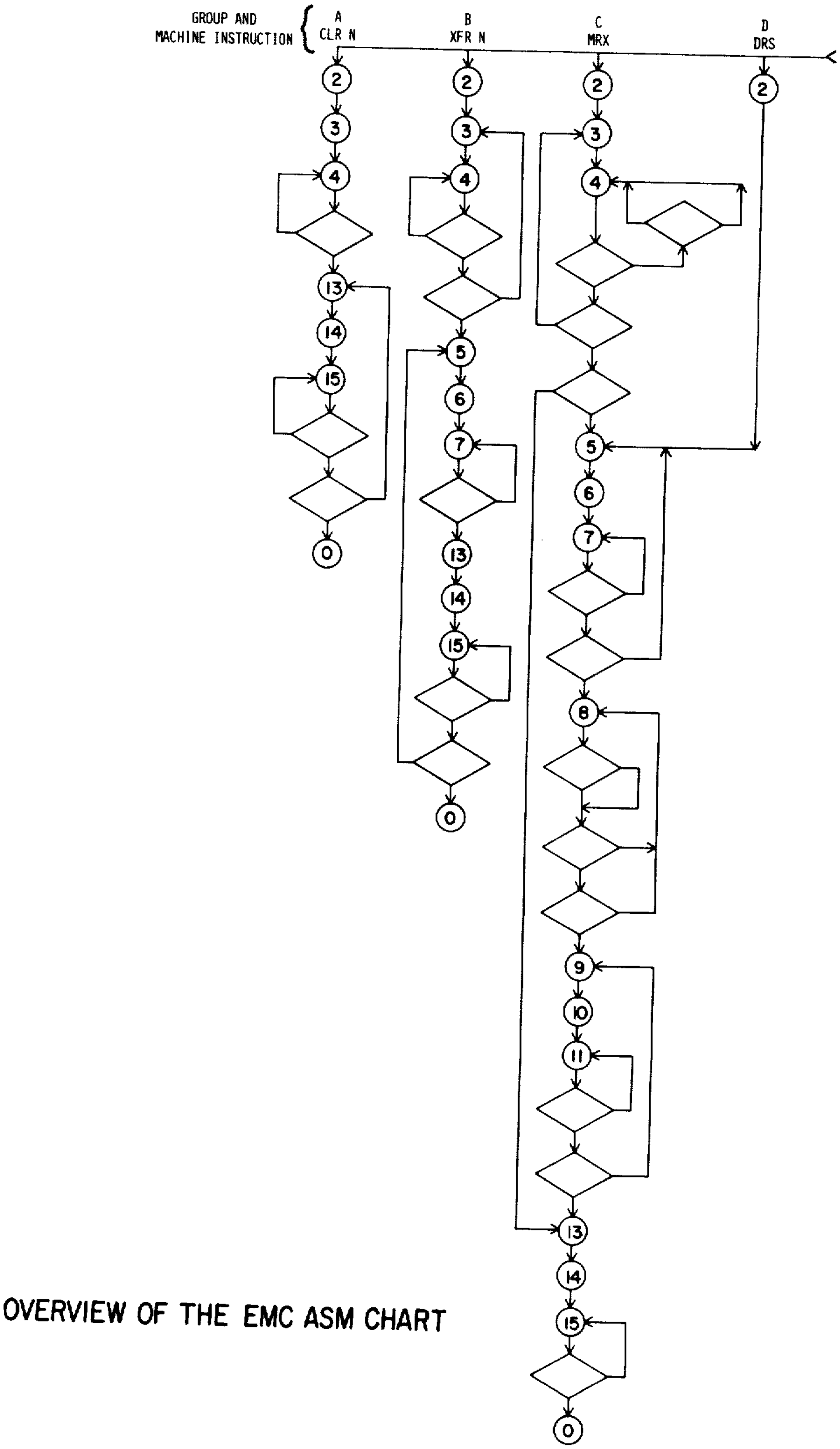
Figure 118B:
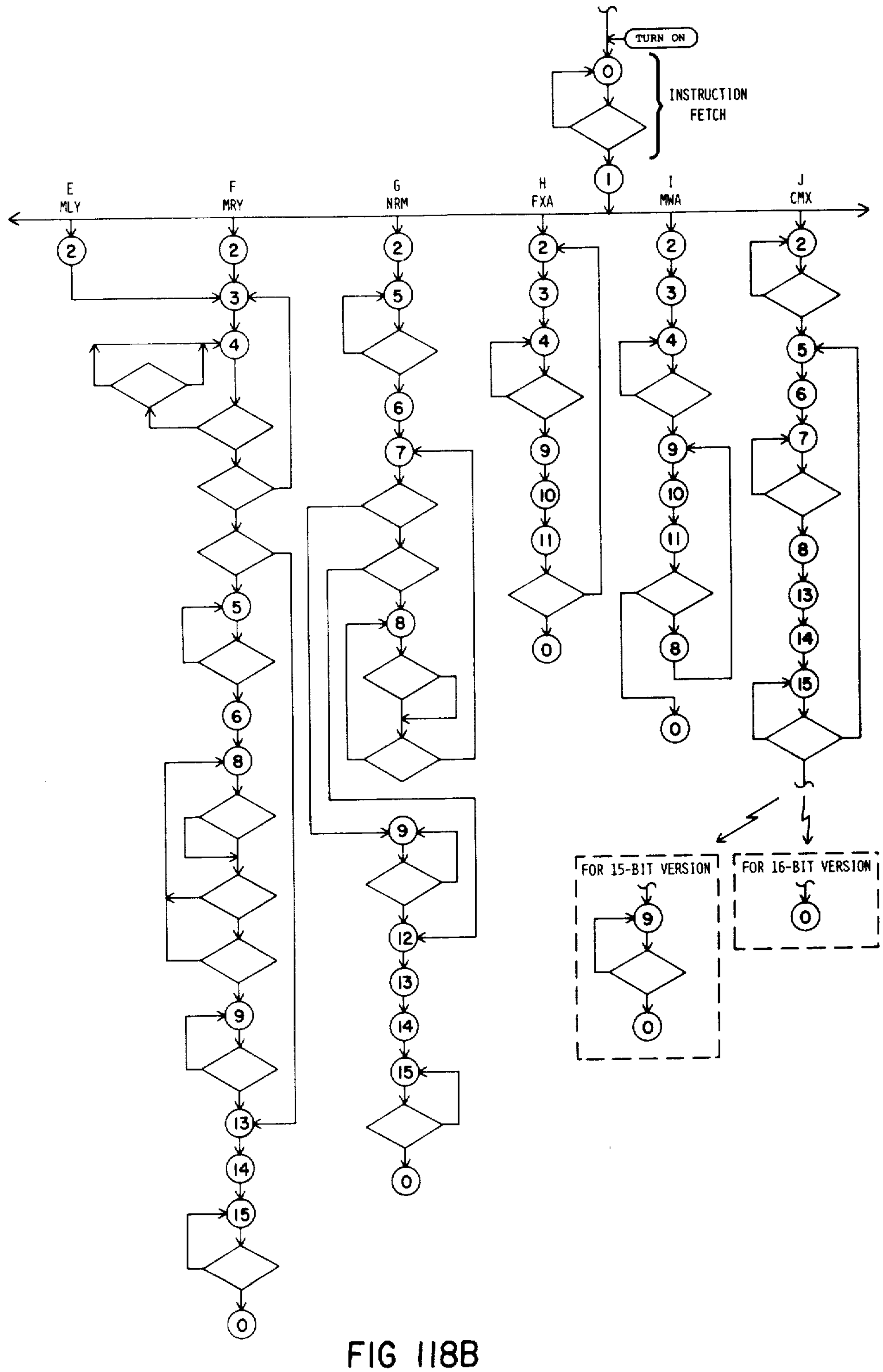
Figure 118C:
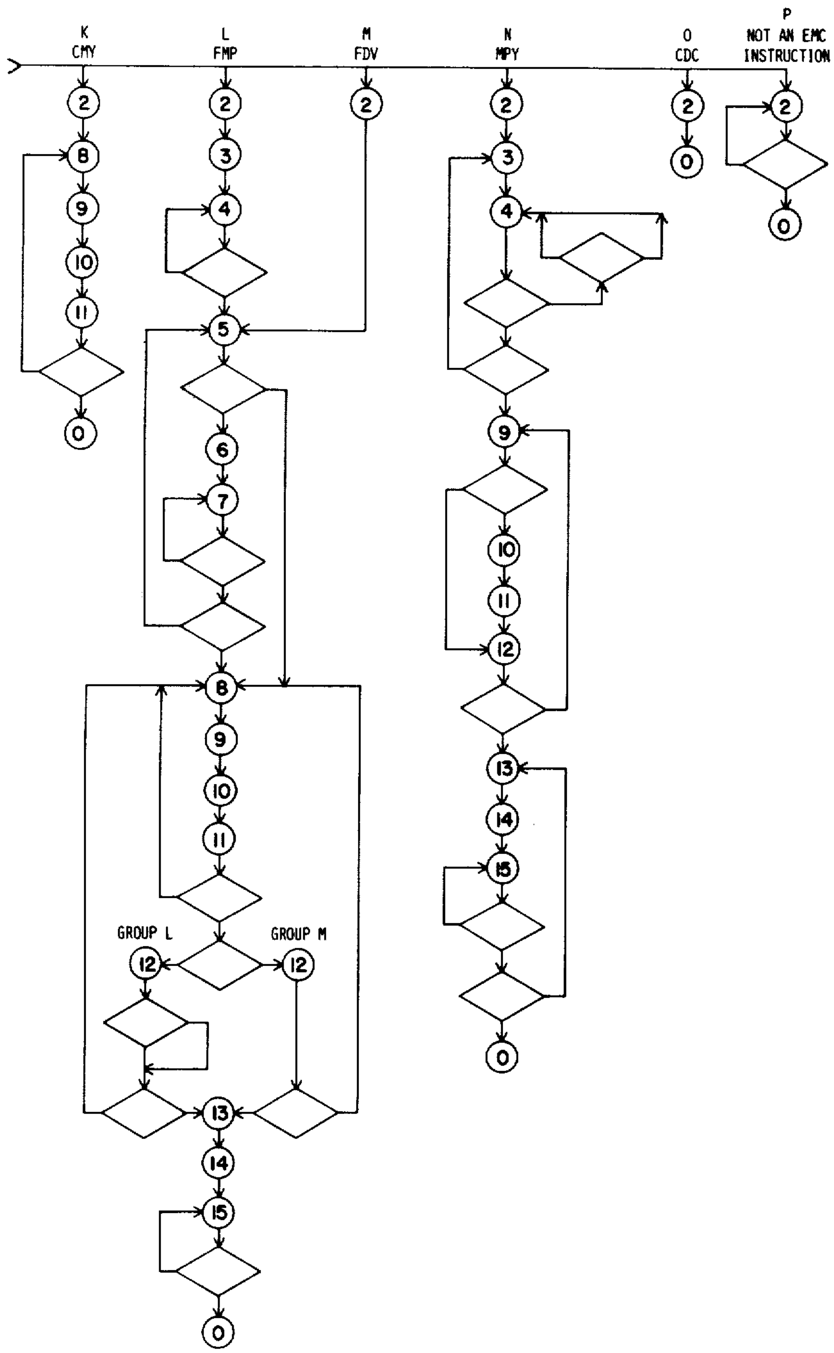

FIG. 118 shows the relationship of FIGS. 118A–C which constitute a flow chart overview summarizing the information presented in FIGS. 119A*a*–*b*, 119B*a*–*b*, 119C (showing relationship of 119C*a*–*d*), 119D (showing relationship of 119D*a*–*f*), 119E (showing relationship of 119E*a*–*f*), 119F (showing relationship of 119F*a*–*d*), 119G*a*–*b*, 119H*a*–*b*, 119I (showing relationship of 119I*a*–*d*), 119J*a*–*b*, 119K (showing relationship of 119K*a*–*e*), 119L (showing relationship of 119L*a*–*e*), 119M and 119N.

FIGS. 119A*a*–*b*, 119B*a*–*b*, 119C (showing relationship of 119C*a*–*d*), 119D (showing relationship of 119D*a*–*f*), 119E (showing relationship of 119E*a*–*f*), 119F (showing relationship of 119F*a*–*d*), 119G*a*–*b*, 119H*a*–*b*, 119I (showing relationship of 119I*a*–*d*), 119J*a*–*b*, 119K (showing relationship of 119K*a*–*e*), 119L (showing relationship of 119L*a*–*e*), 119M and 119N.

Figure 120A:
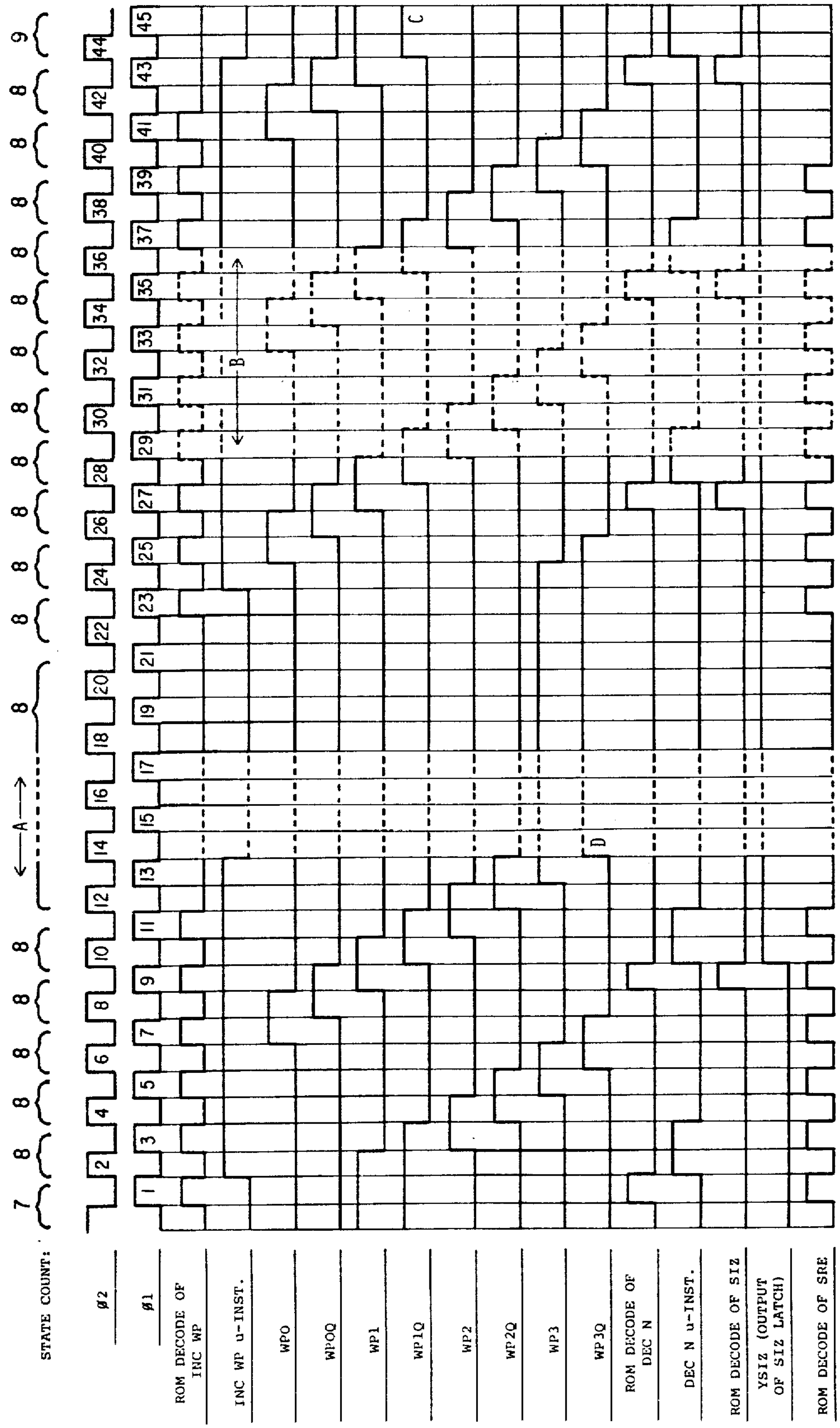
Figure 120B:
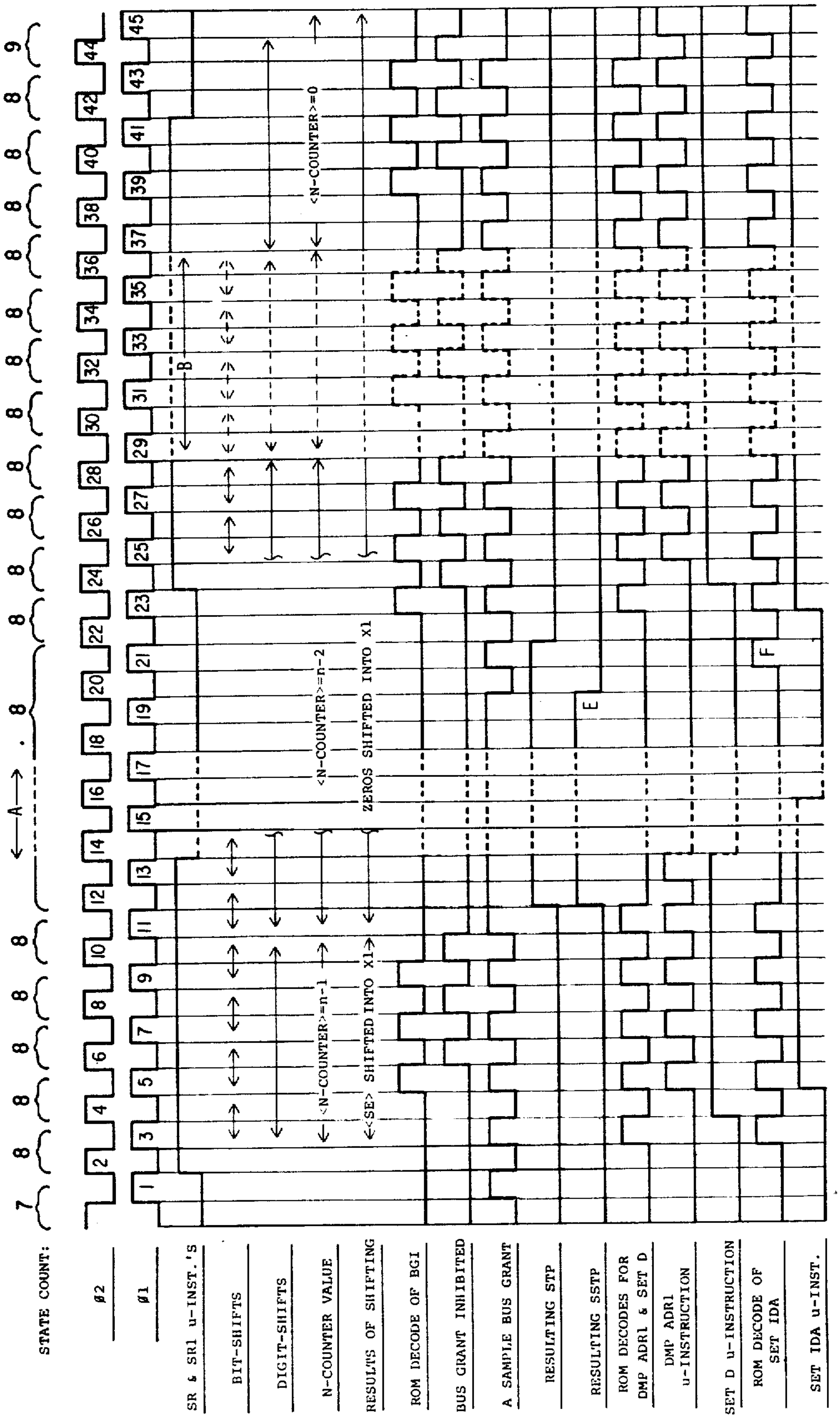

FIGS. 120A–C are a waveform diagram illustrating the timing relationships that exist during execution of the MRX and DRS machine instructions of FIG. 119A performed by the EMC of FIG. 43.

Figure 121D:
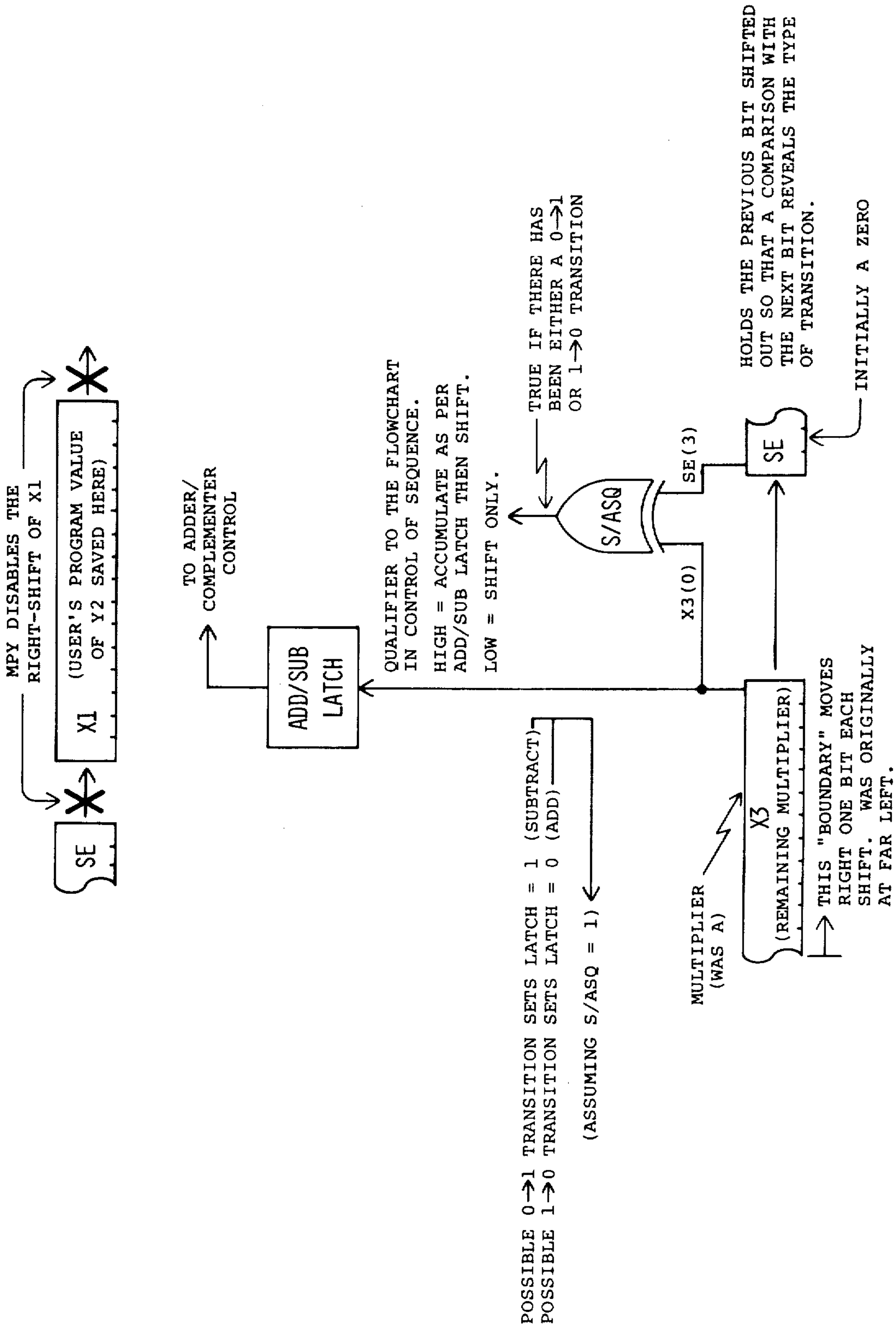

FIGS. 121A, 121B*a*–*b*, 121C and 121D*a*–*b* are a diagram explaining the internal operation of the MPY machine instruction of FIG. 119L performed by the EMC of FIG. 43.

Figure 122:
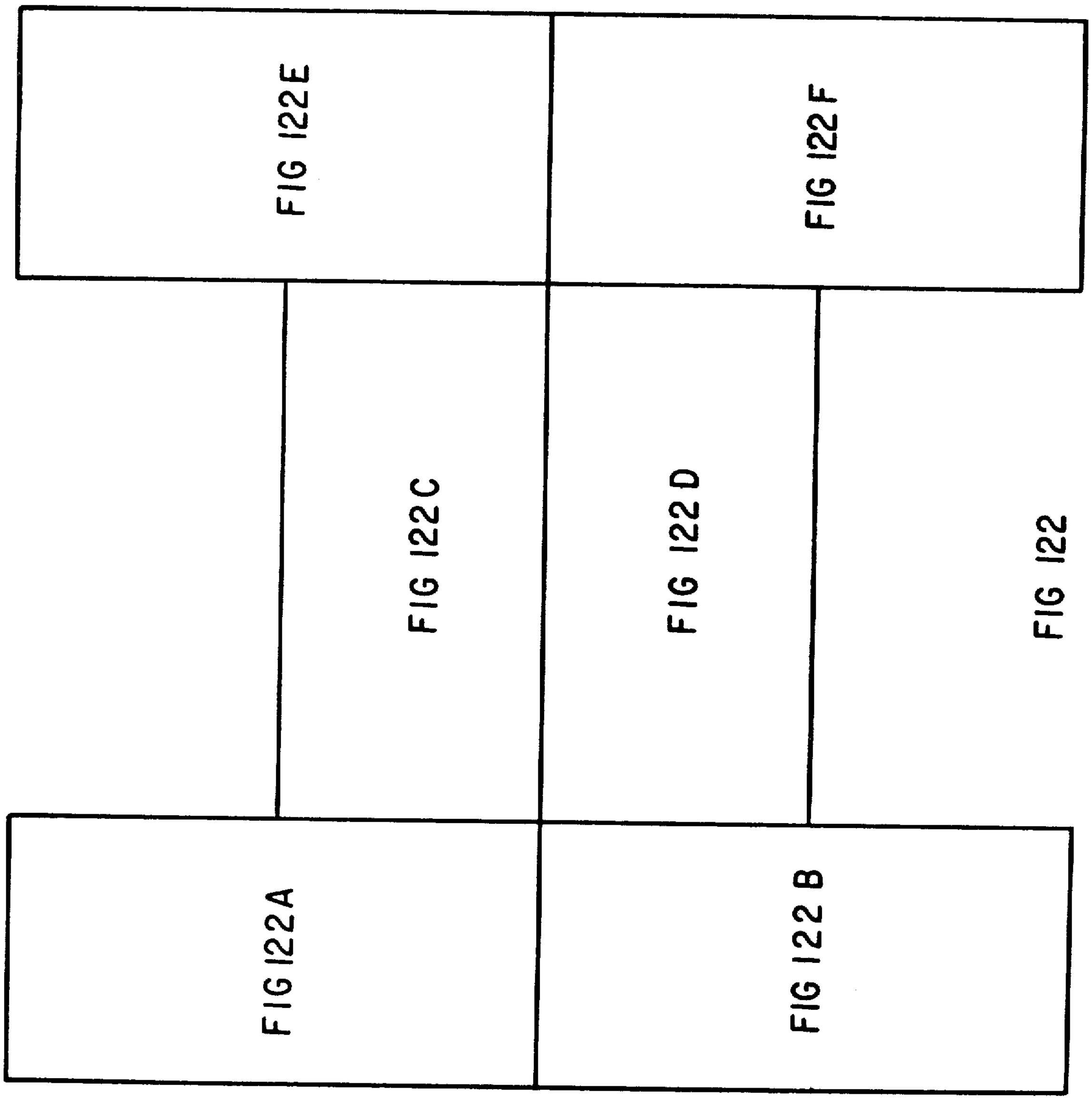
Figure 122A:
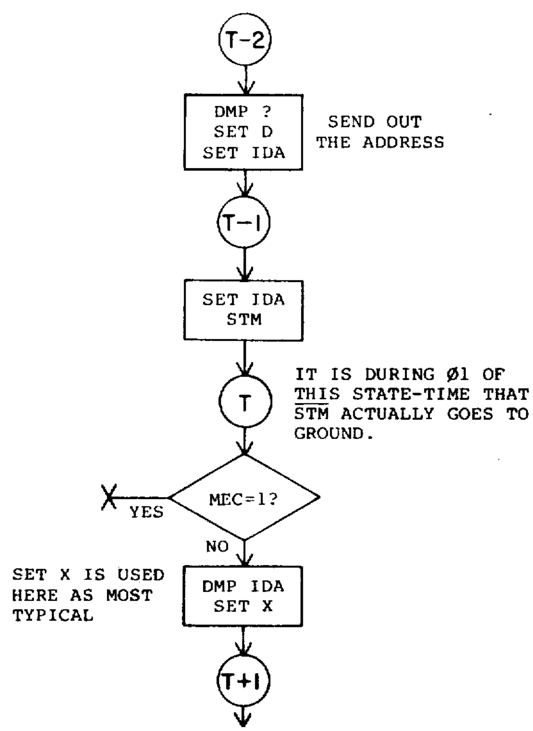
Figure 122:
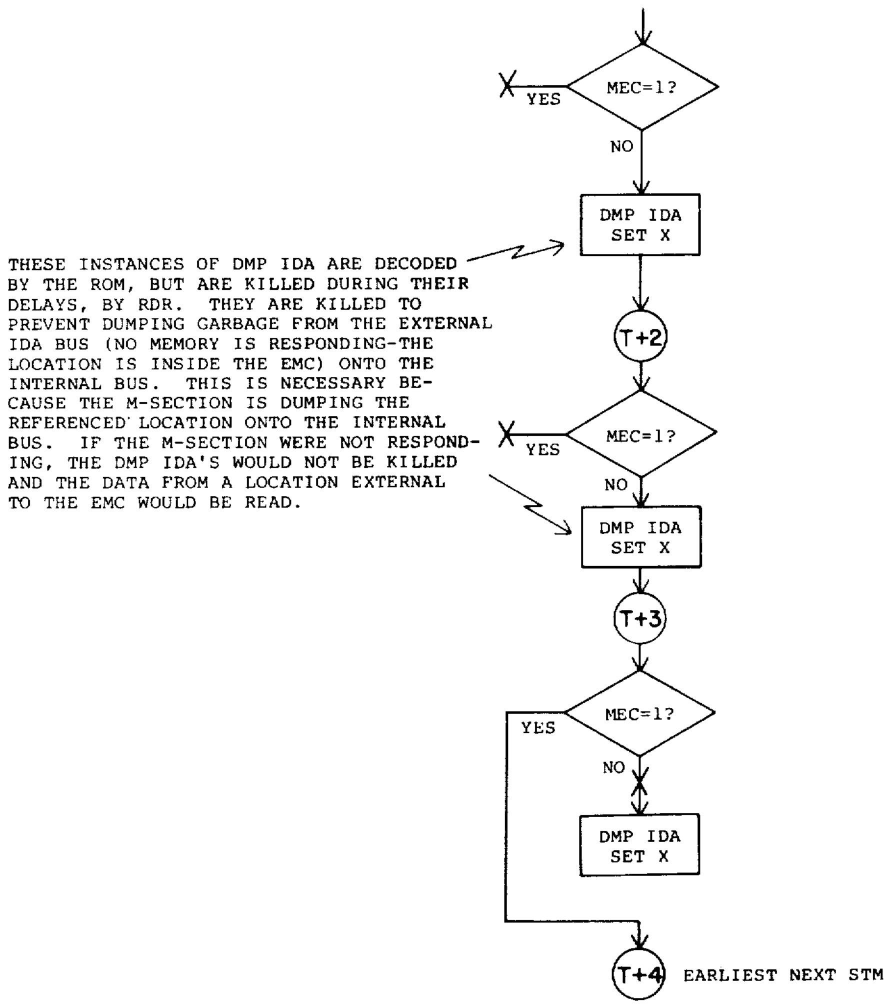
Figure 122:
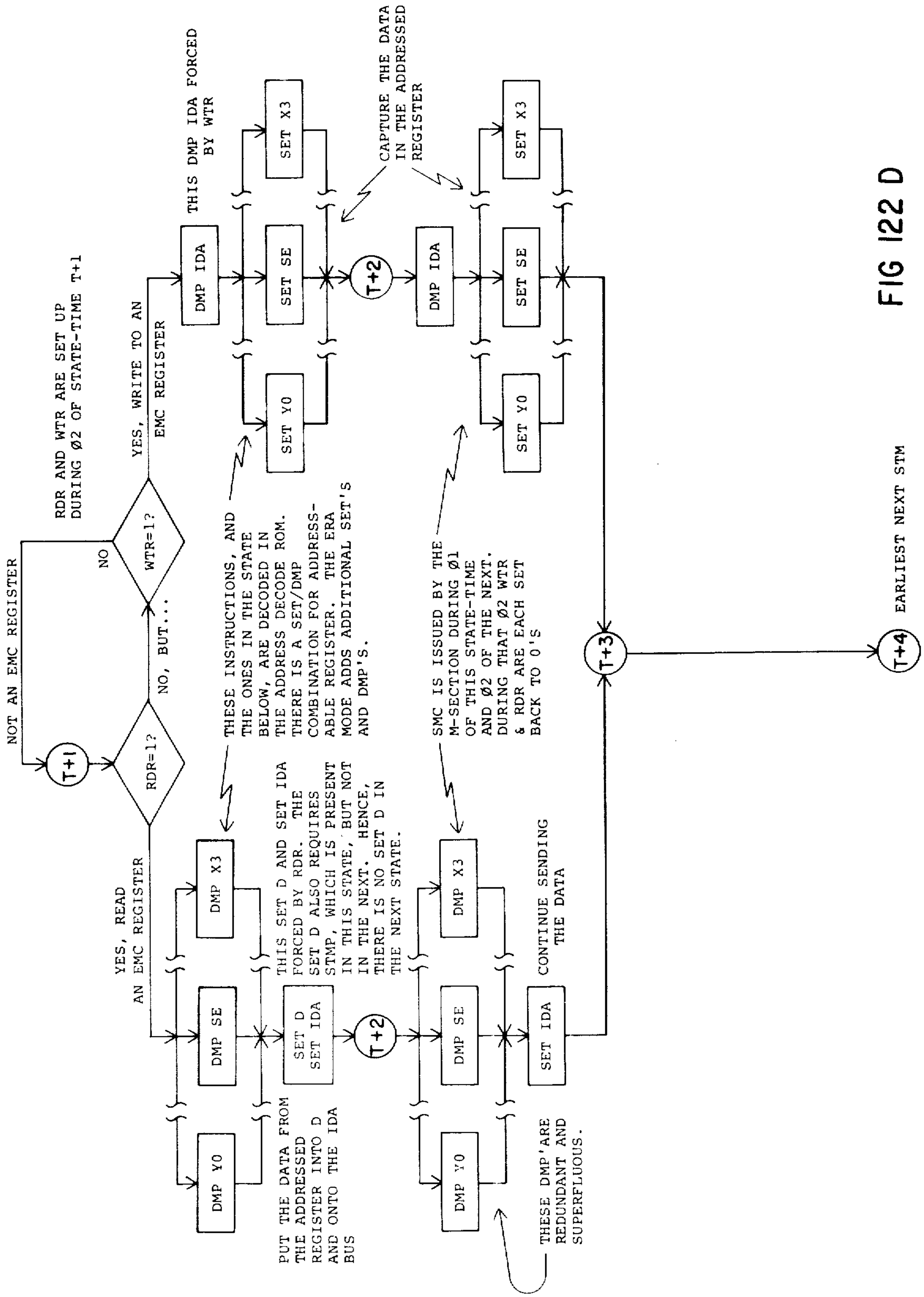
Figure 122:
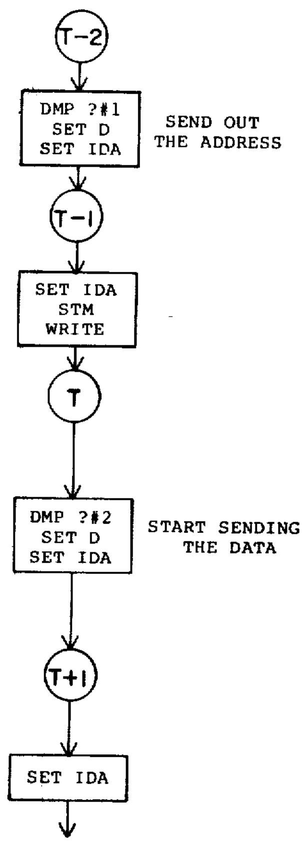
Figure 122:
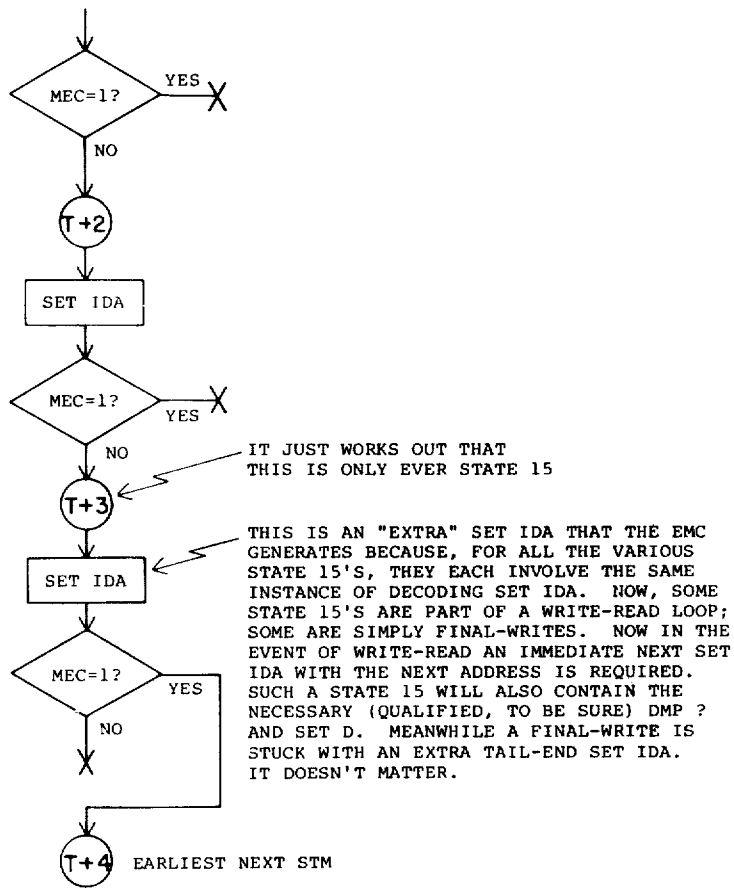

FIG. 122 is a chart showing the relationship of FIGS. 122A–F which constitute a flow chart describing the operation of the M-section located within the EMC of FIG. 43.

FIG. 123 explains the conventions used in FIGS. 124A–127B.

Figure 124A:
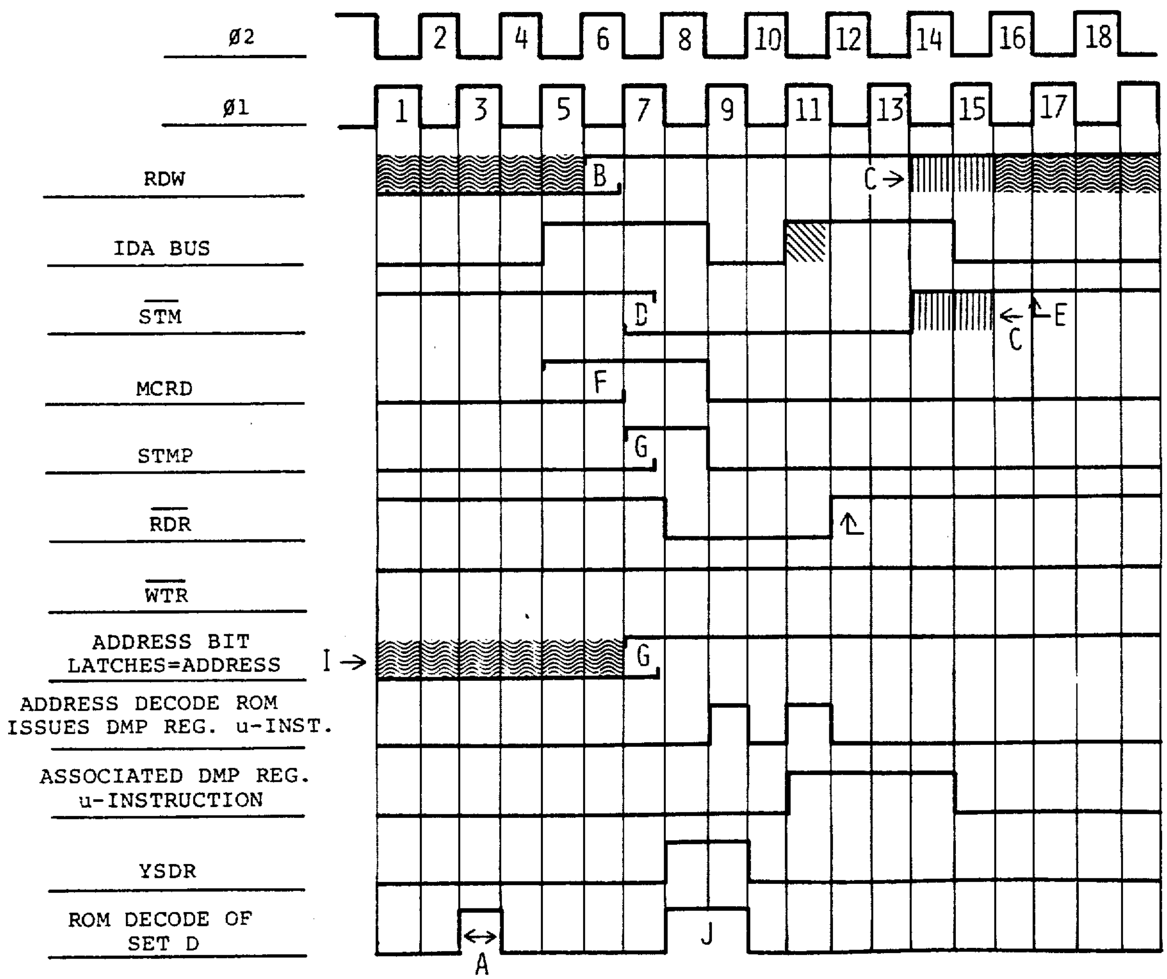
Figure 124B:
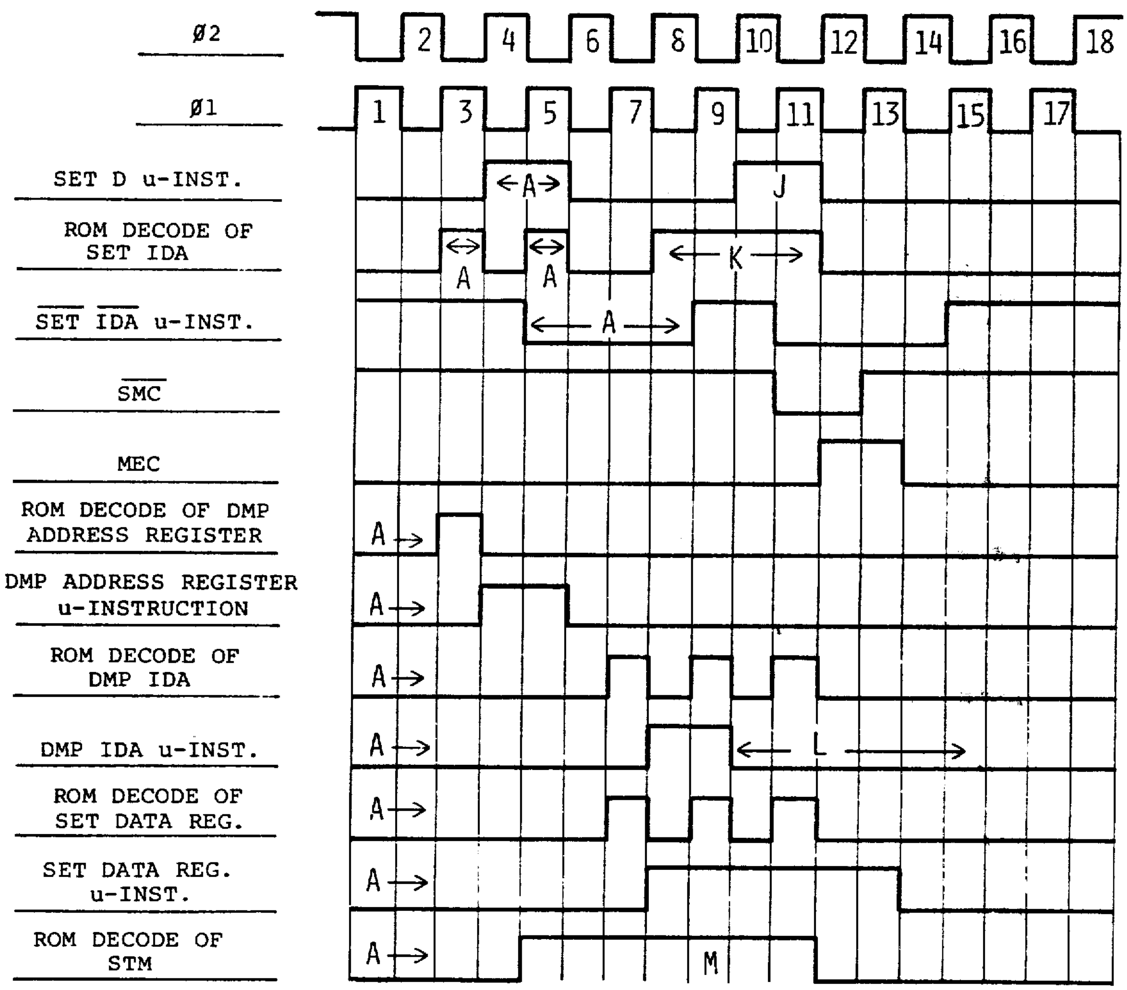

FIGS. 124A–C are a waveform diagram illustrating a read memory cycle directed to a register within the EMC of FIG. 43.

Figure 125A:
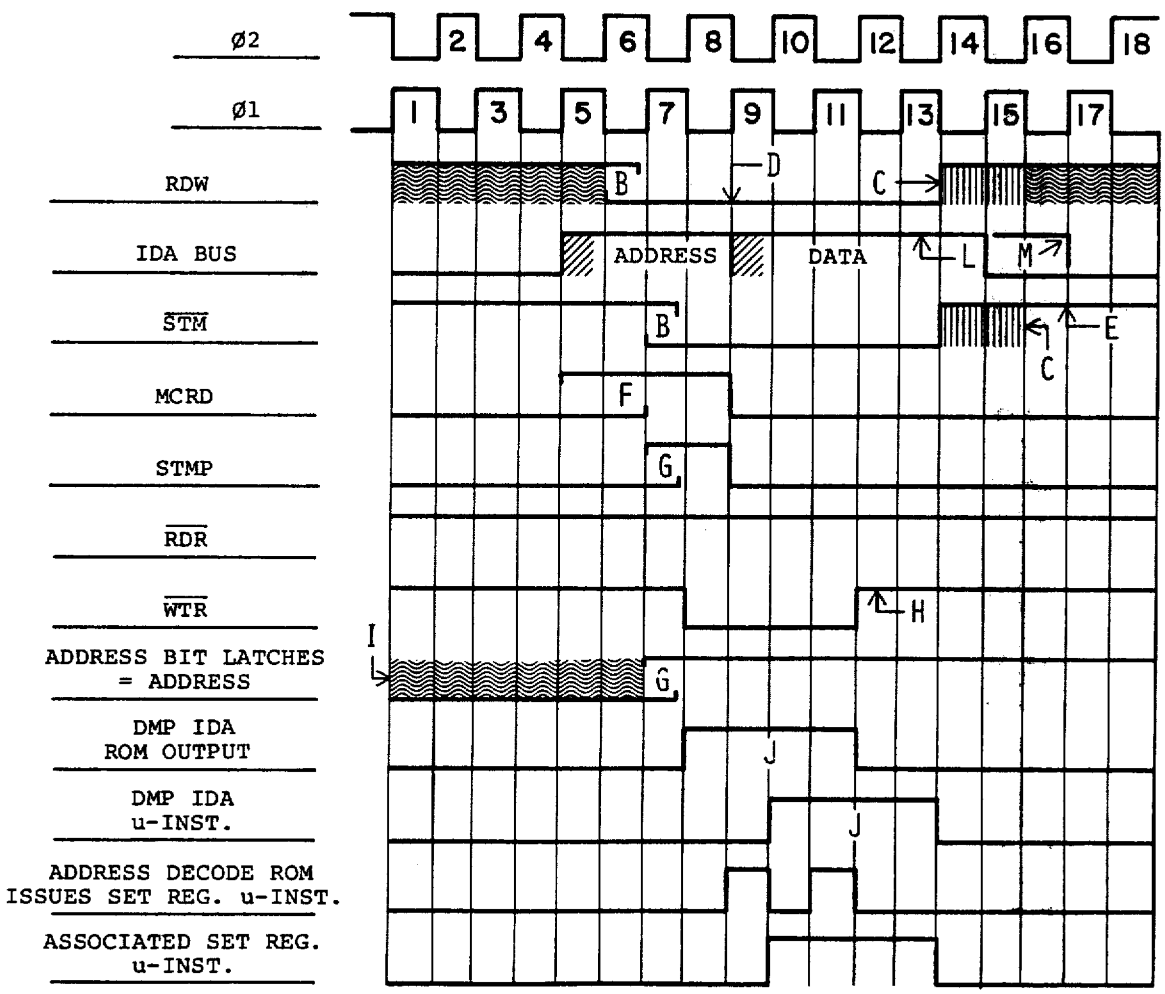
Figure 125B:
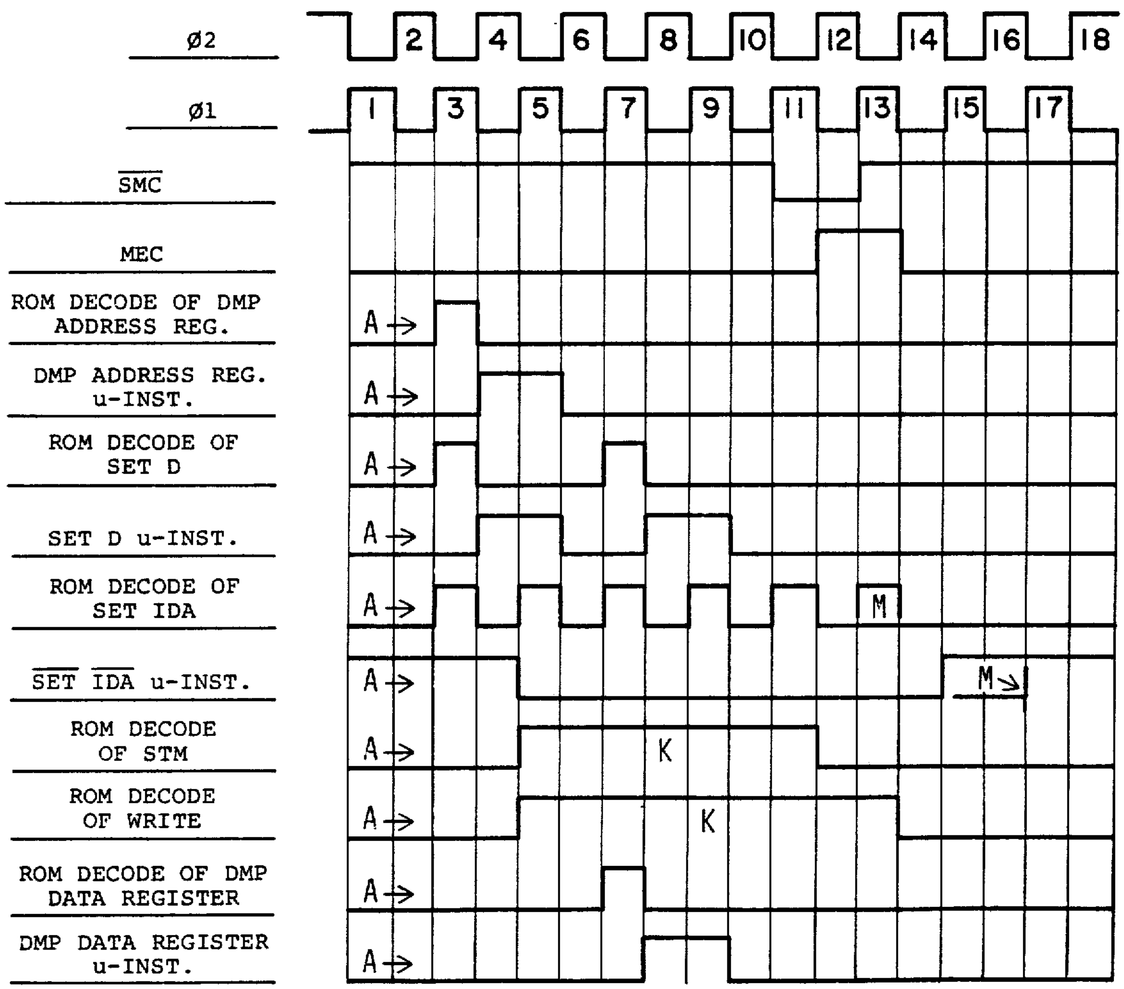

FIGS. 125A–C are a waveform diagram illustrating a write memory cycle directed to a register within the EMC of FIG. 43.

Figure 126A:
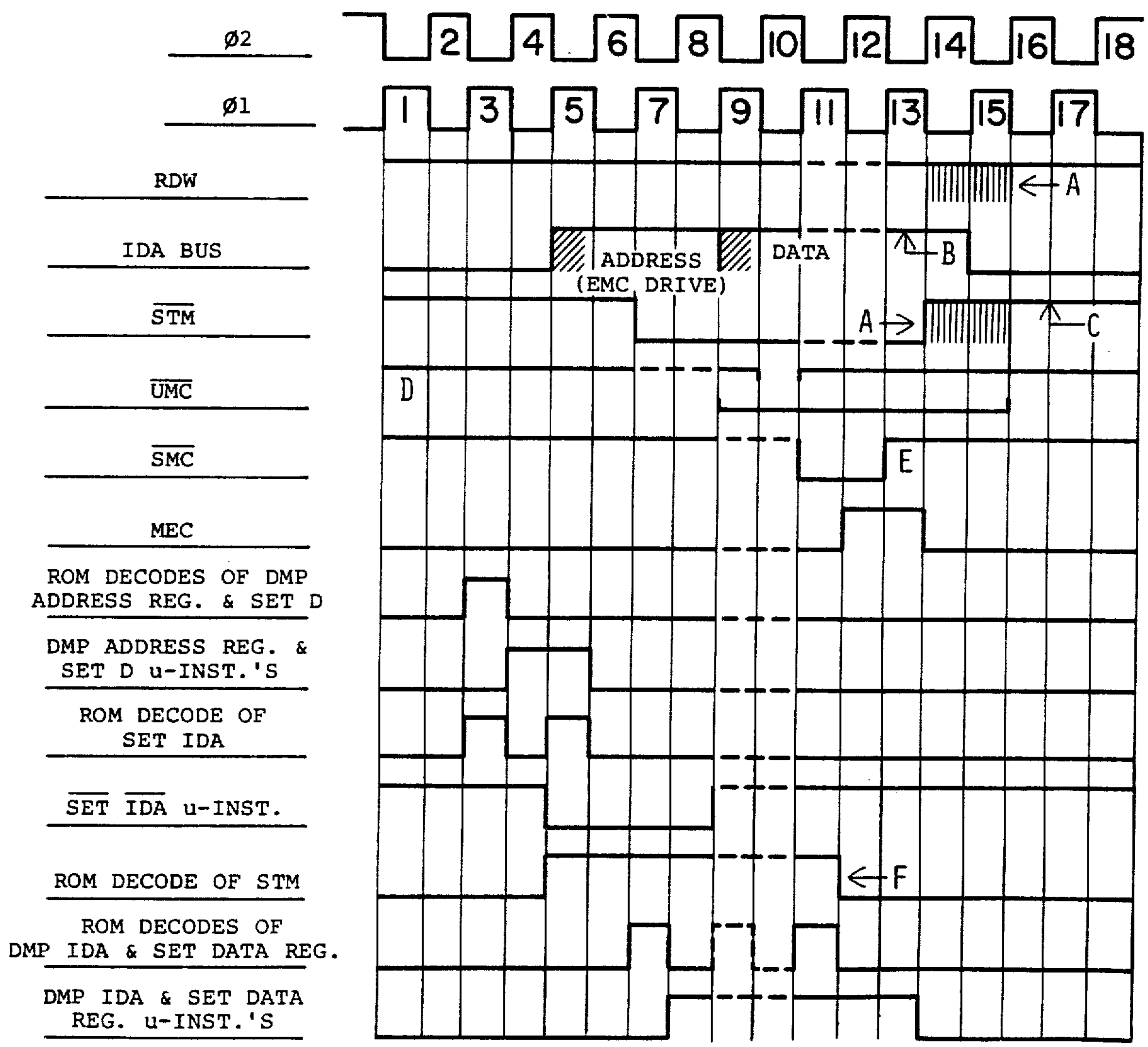

FIGS. 126A–B are a waveform diagram illustrating a read memory cycle originating within the EMC of FIG. 43.

Figure 127A:
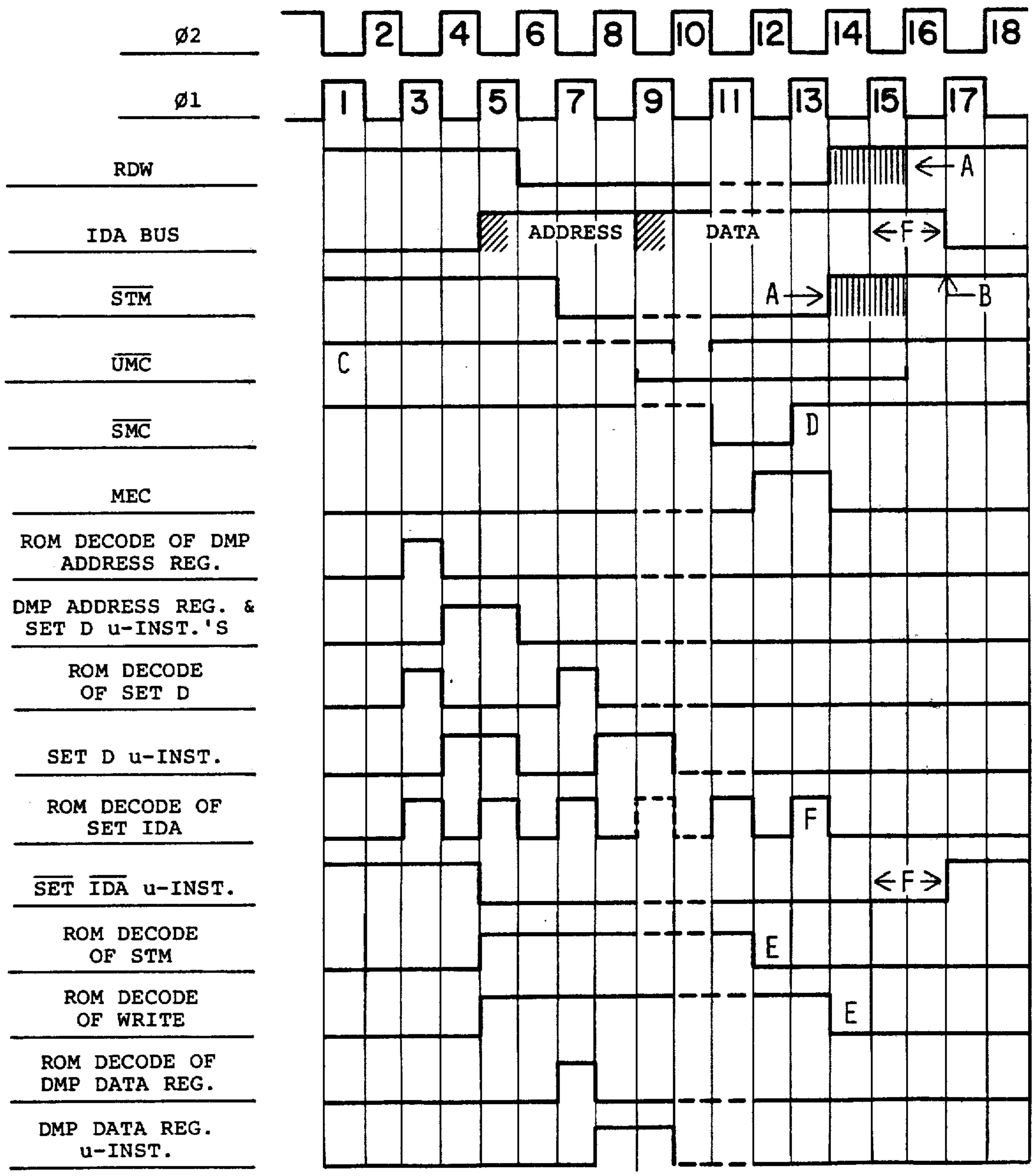

FIGS. 127A–B are a waveform diagram illustrating a write memory cycle originating within the EMC of FIG. 43.

Figure 128:
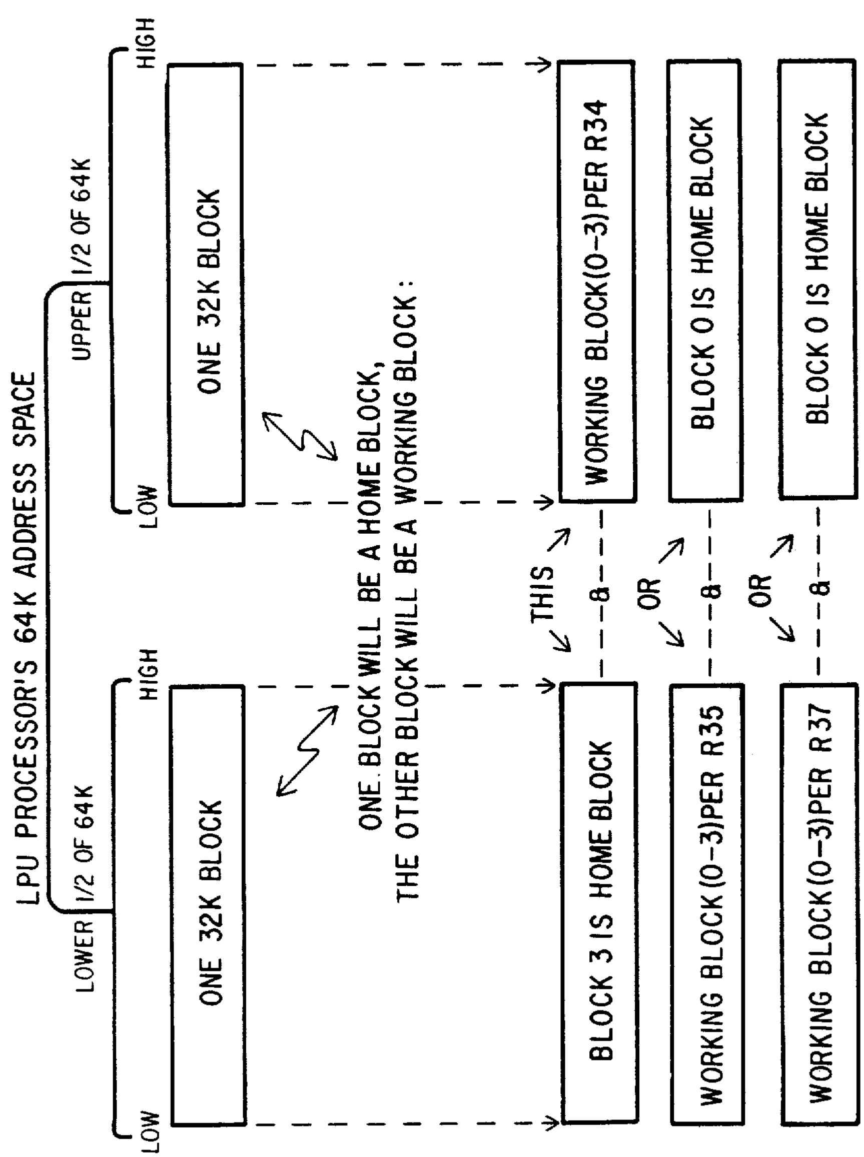

FIG. 128 is a diagram illustrating the fundamental relationship between blocks of address space and the memory address extension scheme.

FIG. 129 is a tabular diagram illustrating simplified memory address extension operation.

Figure 130:
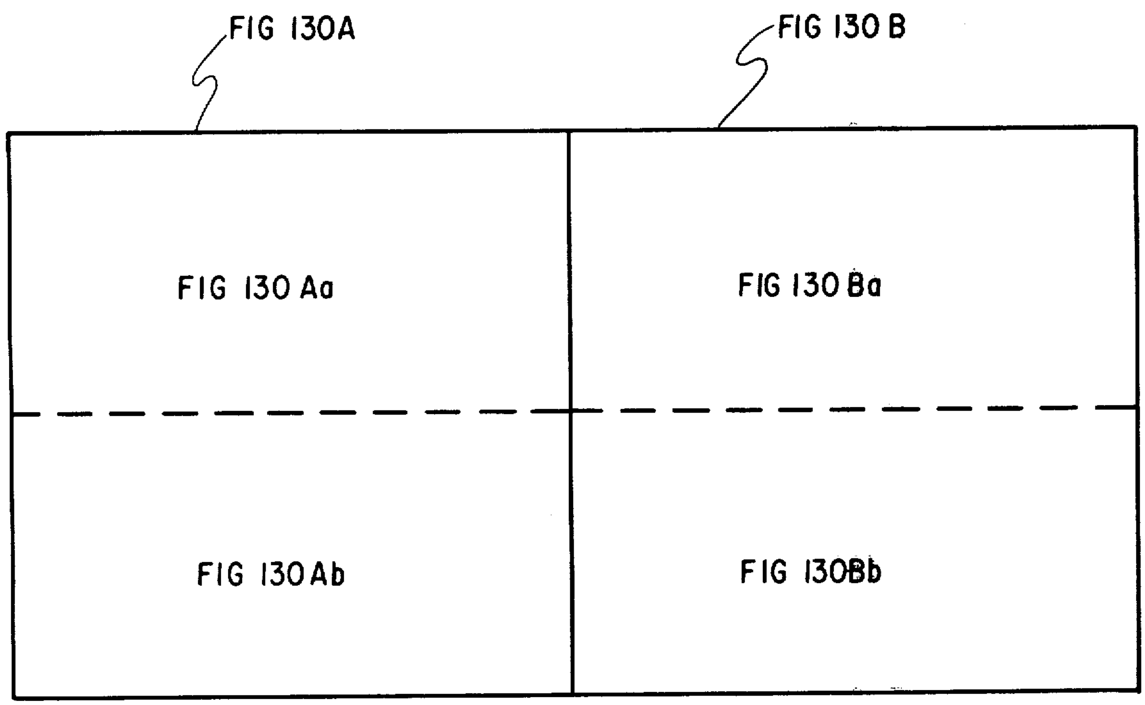
Figure 130A:
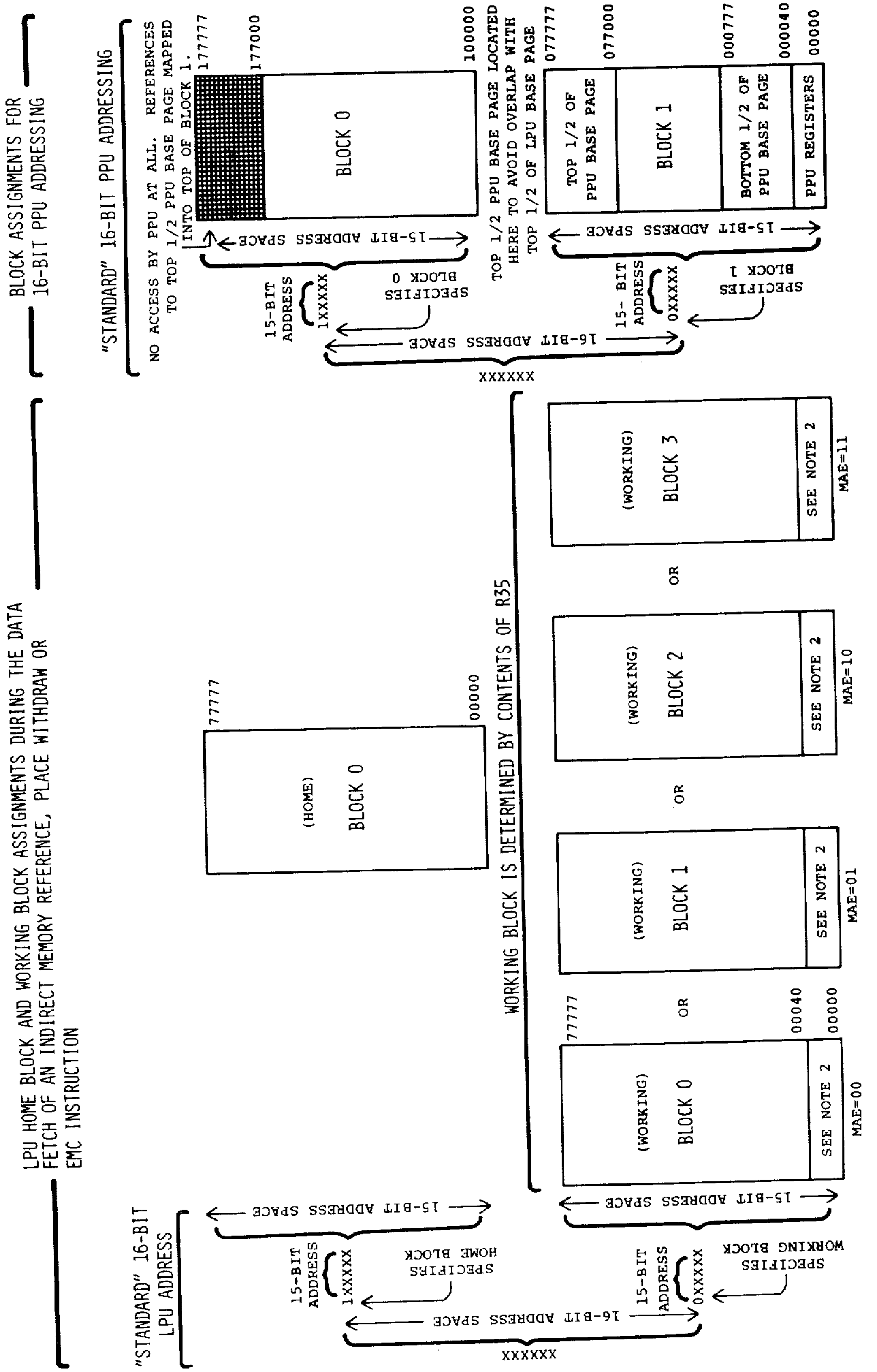
Figure 130B:
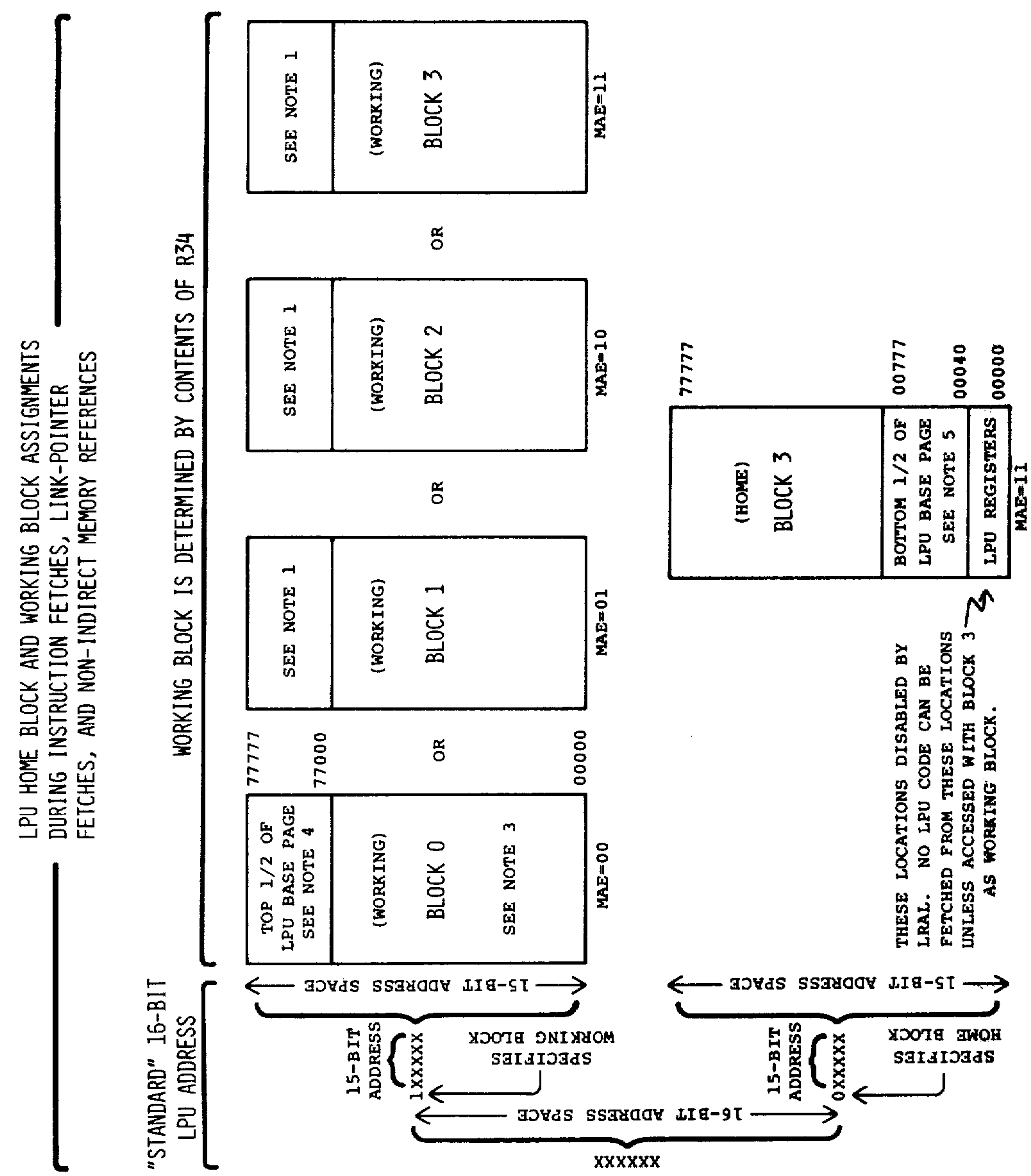
Figure 130B:
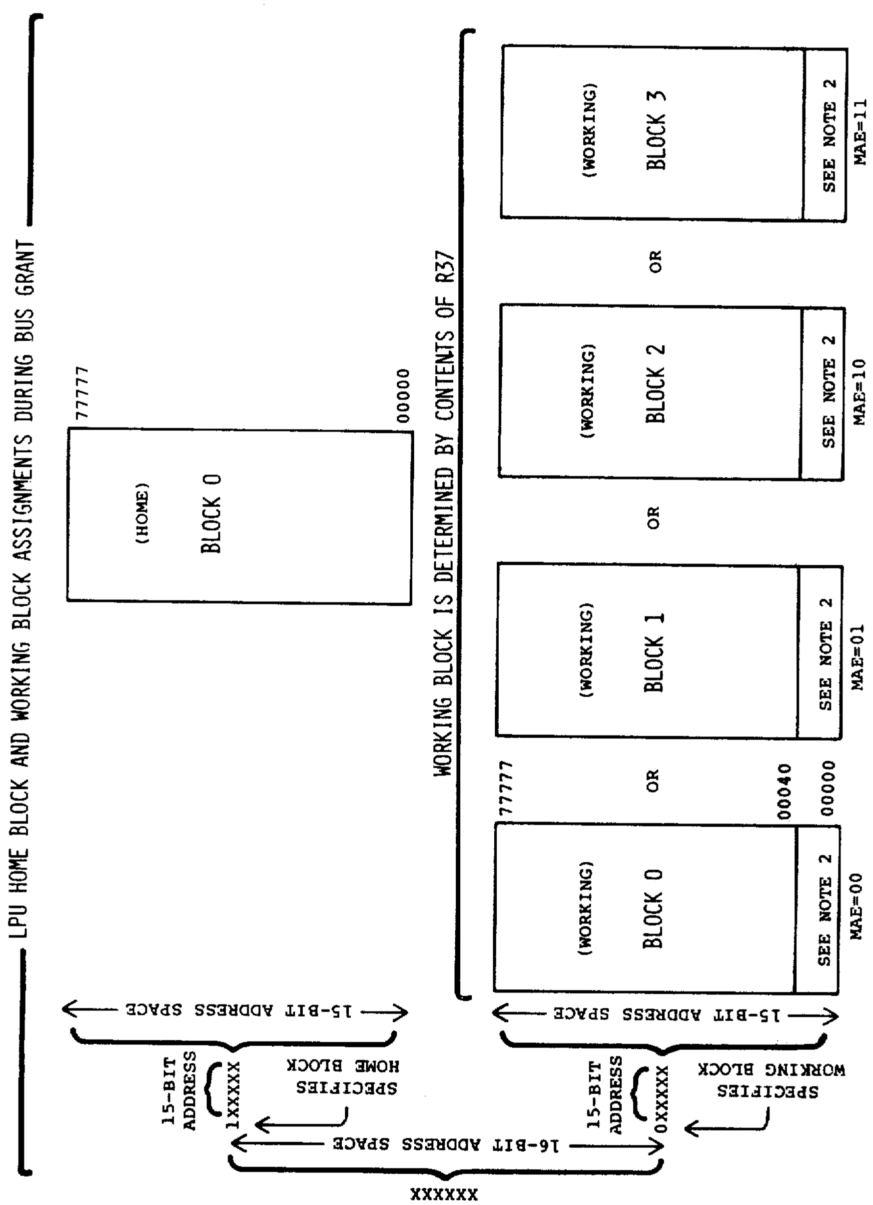

FIG. 130 is a chart showing the relationship of FIGS. 130A*a*–*b* and 130B*a*–*b* showing a detailed diagram illustrating the relationships of blocks of address space and the memory address extension scheme.

Figure 131:
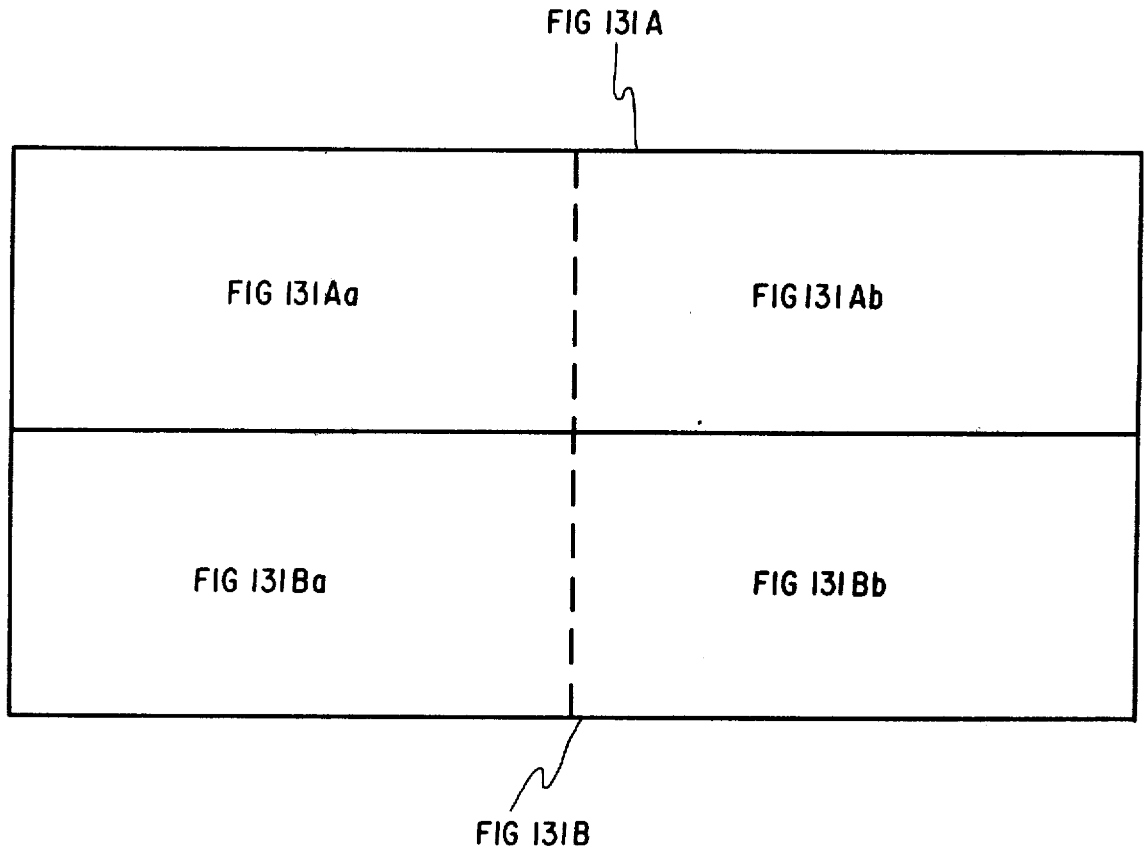
Figure 131A:
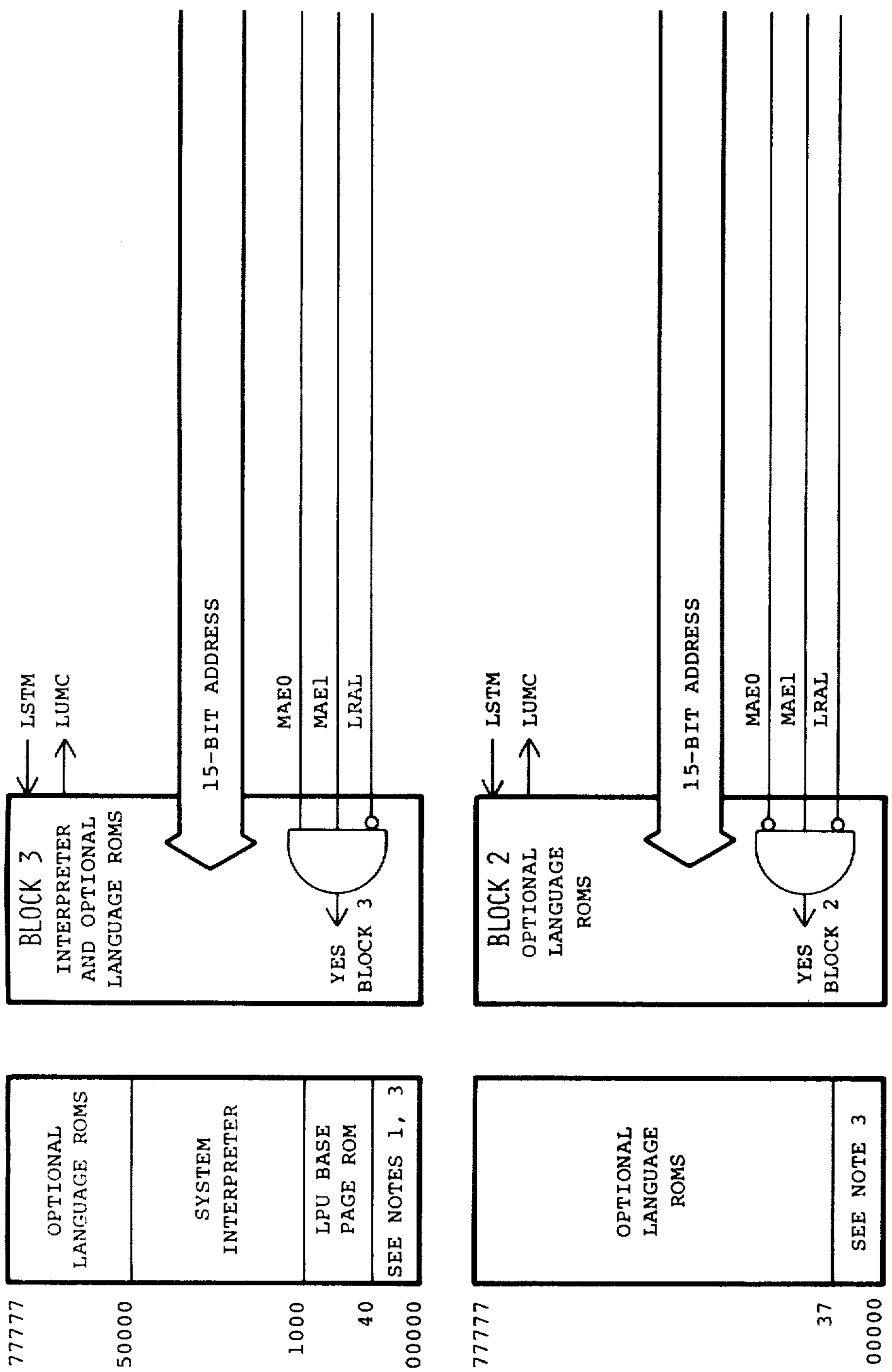
Figure 131A:
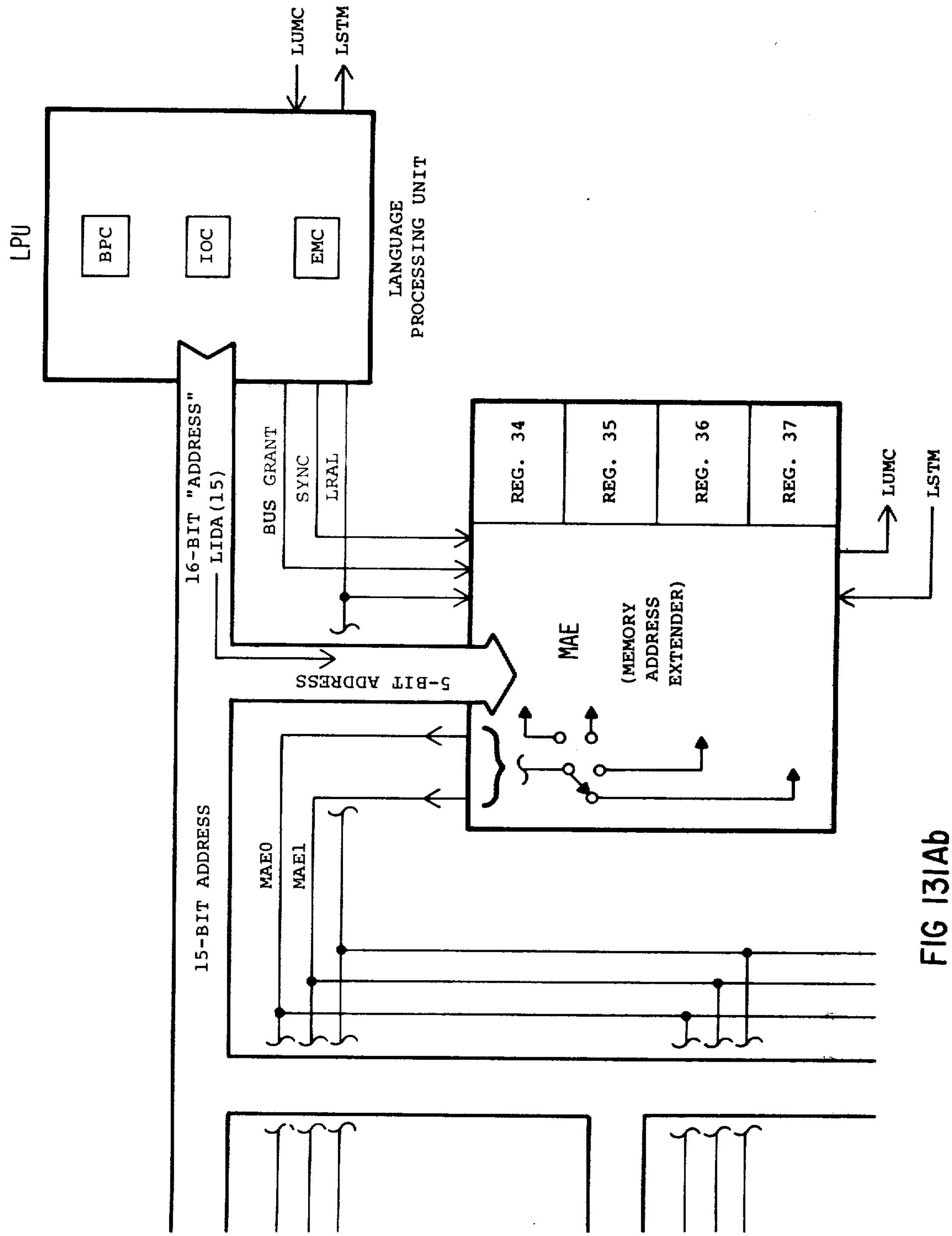
Figure 131B:
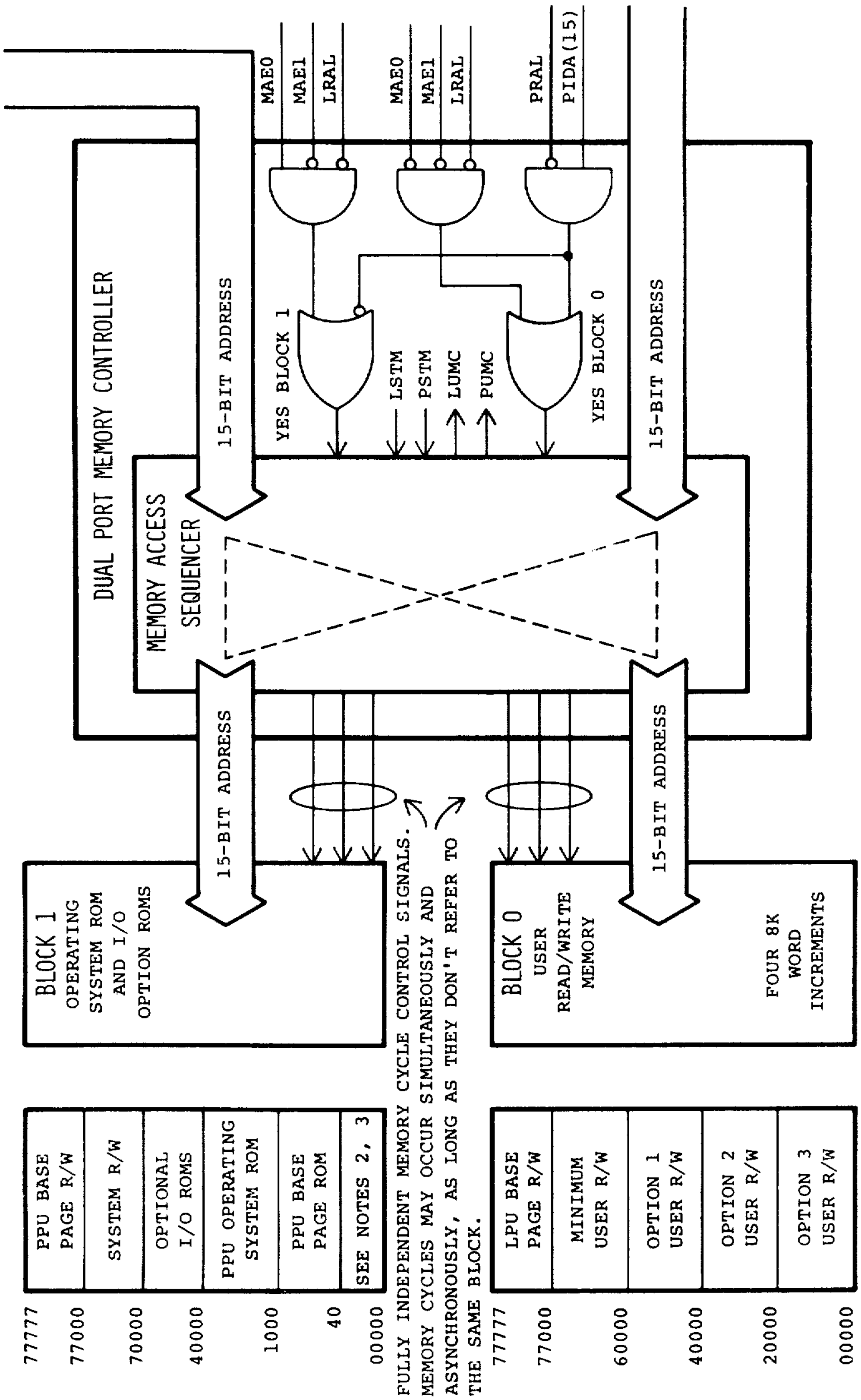

FIG. 131 is a chart showing the relationship of FIGS. 131A*a*–*b* and 131B*a*–*b* which are a simplified hardware block diagram illustrating the structure required to perform memory address extension operation.

Figure 132:
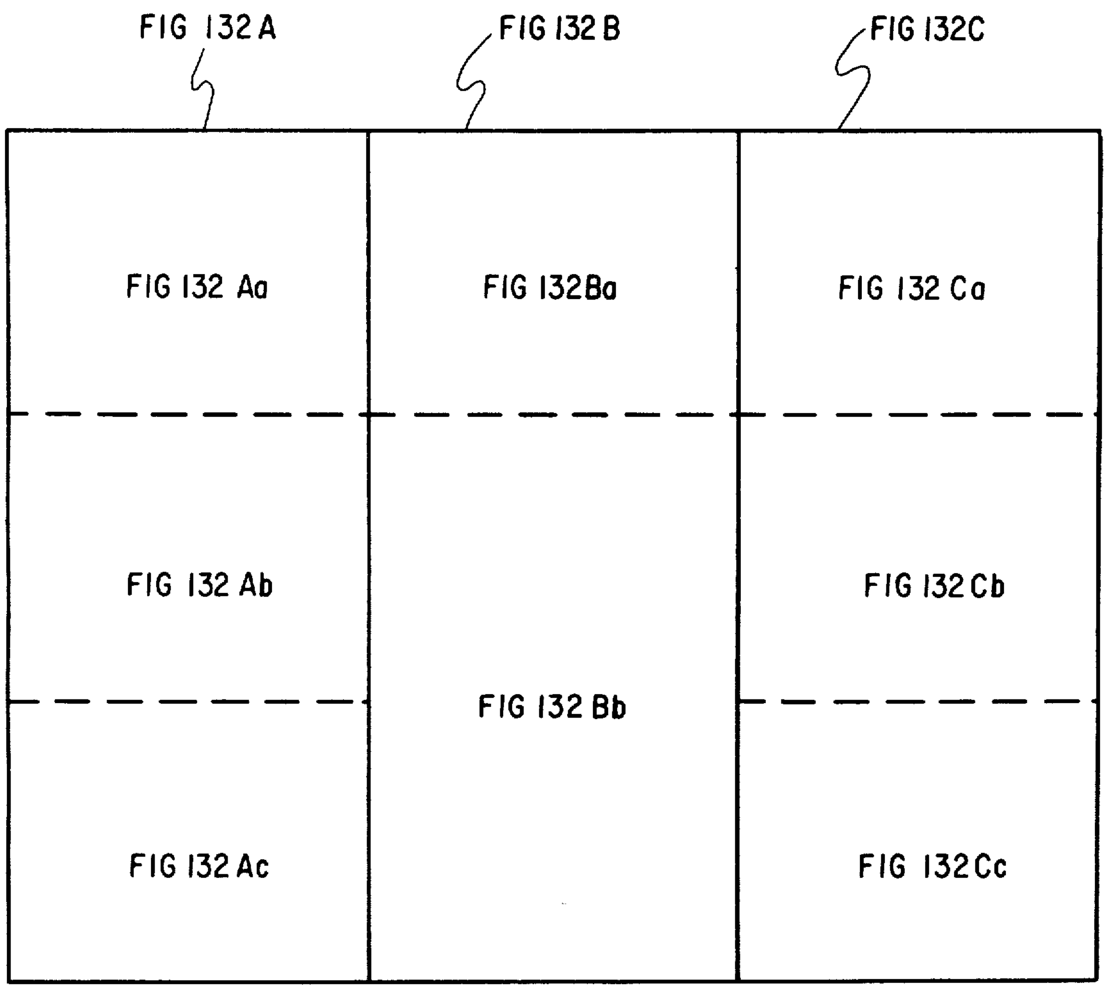
Figure 132A:
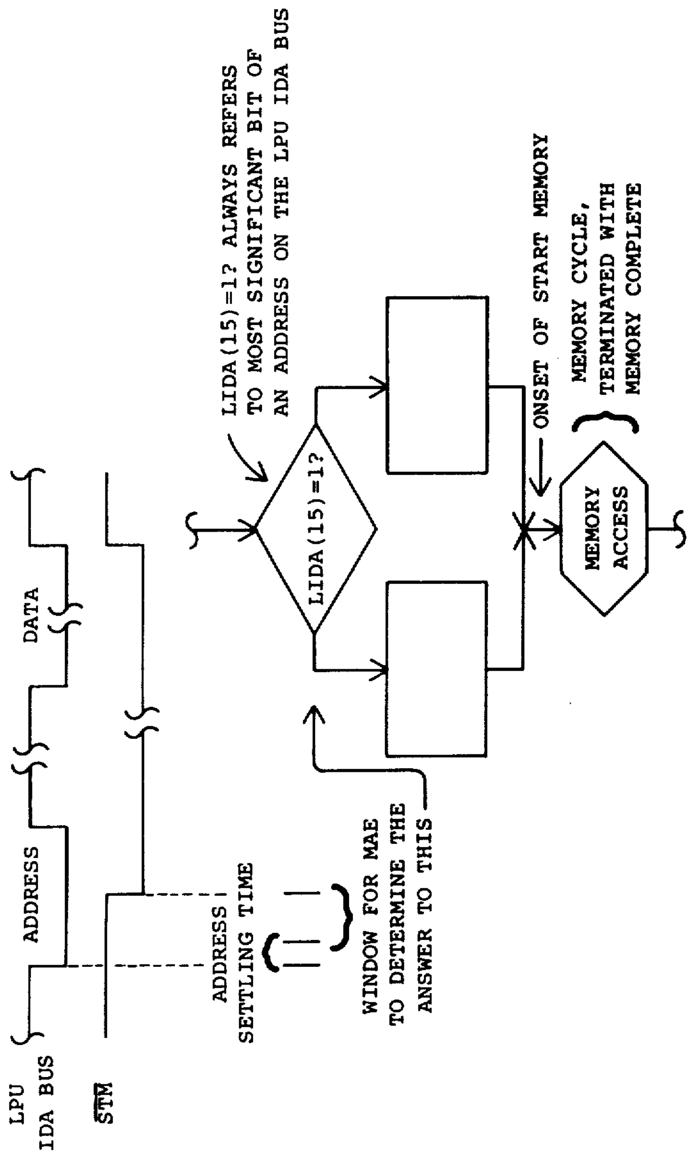
Figure 132A:
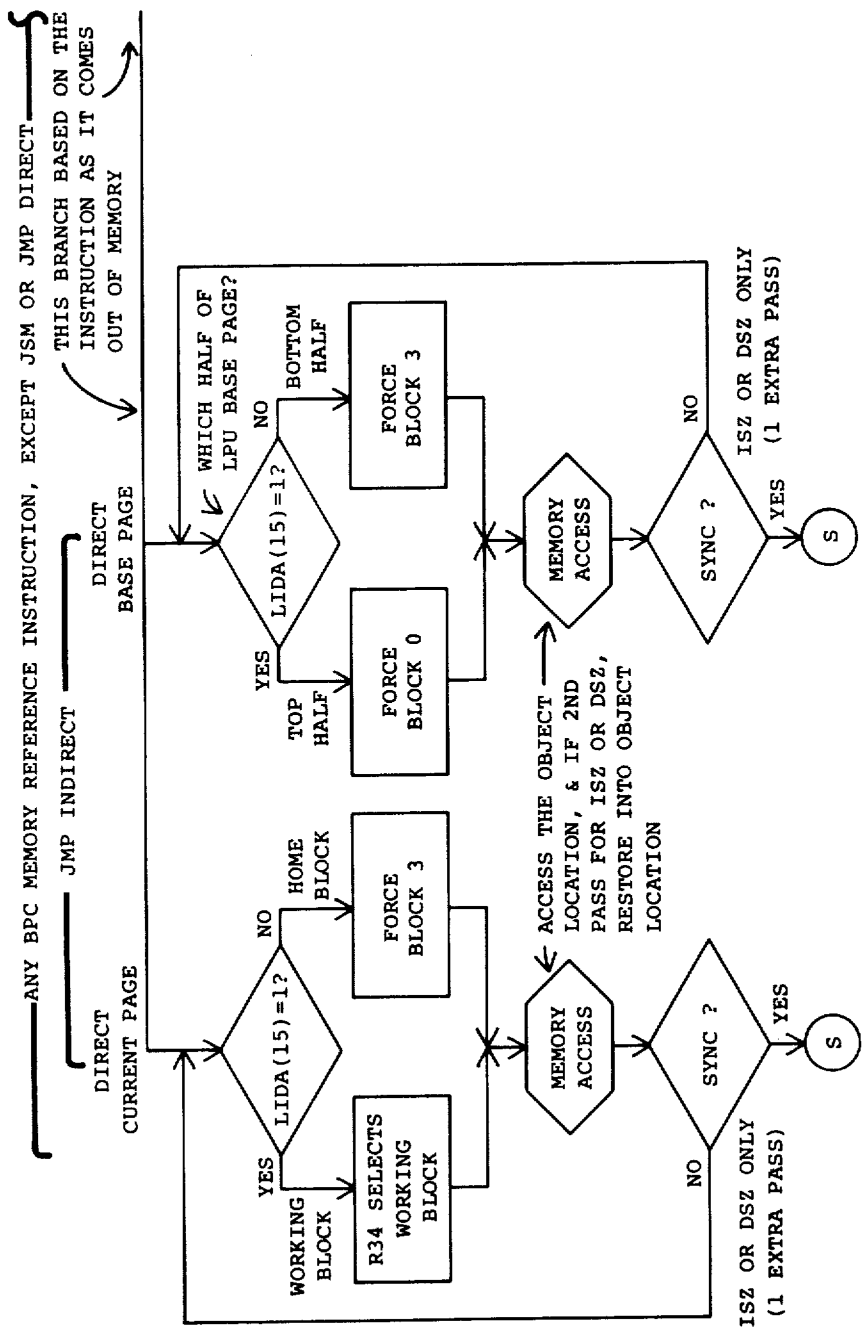
Figure 132B:
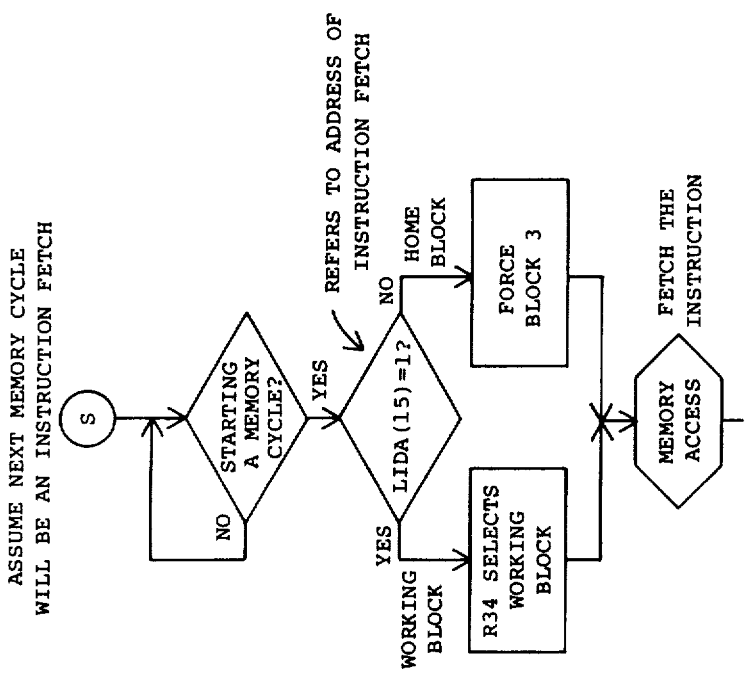
Figure 132:
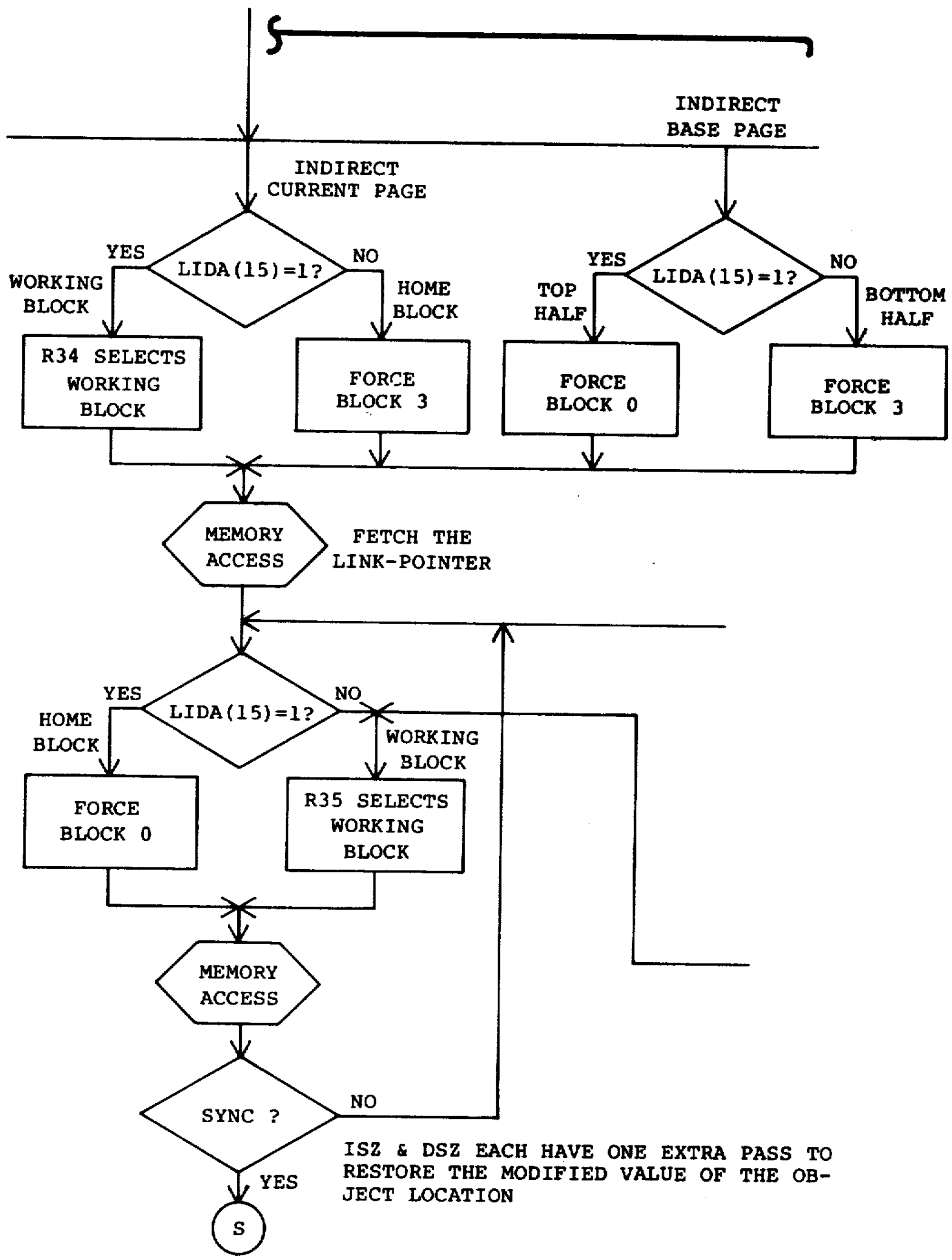
Figure 132C:
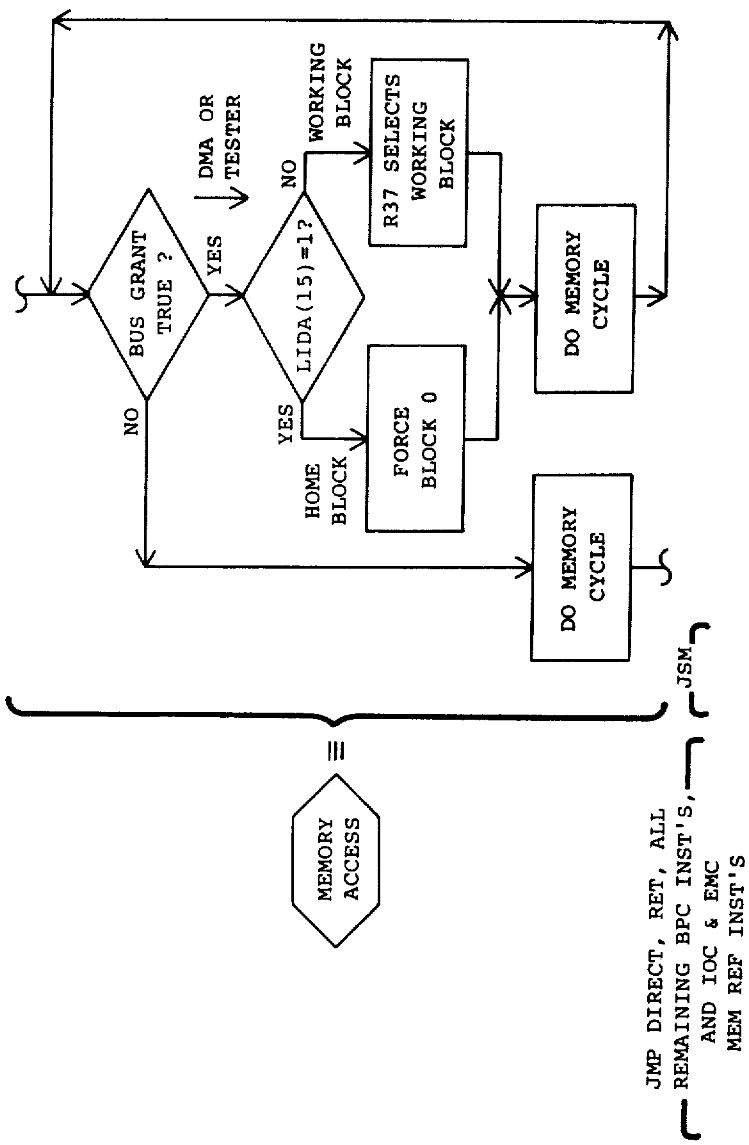
Figure 132C:
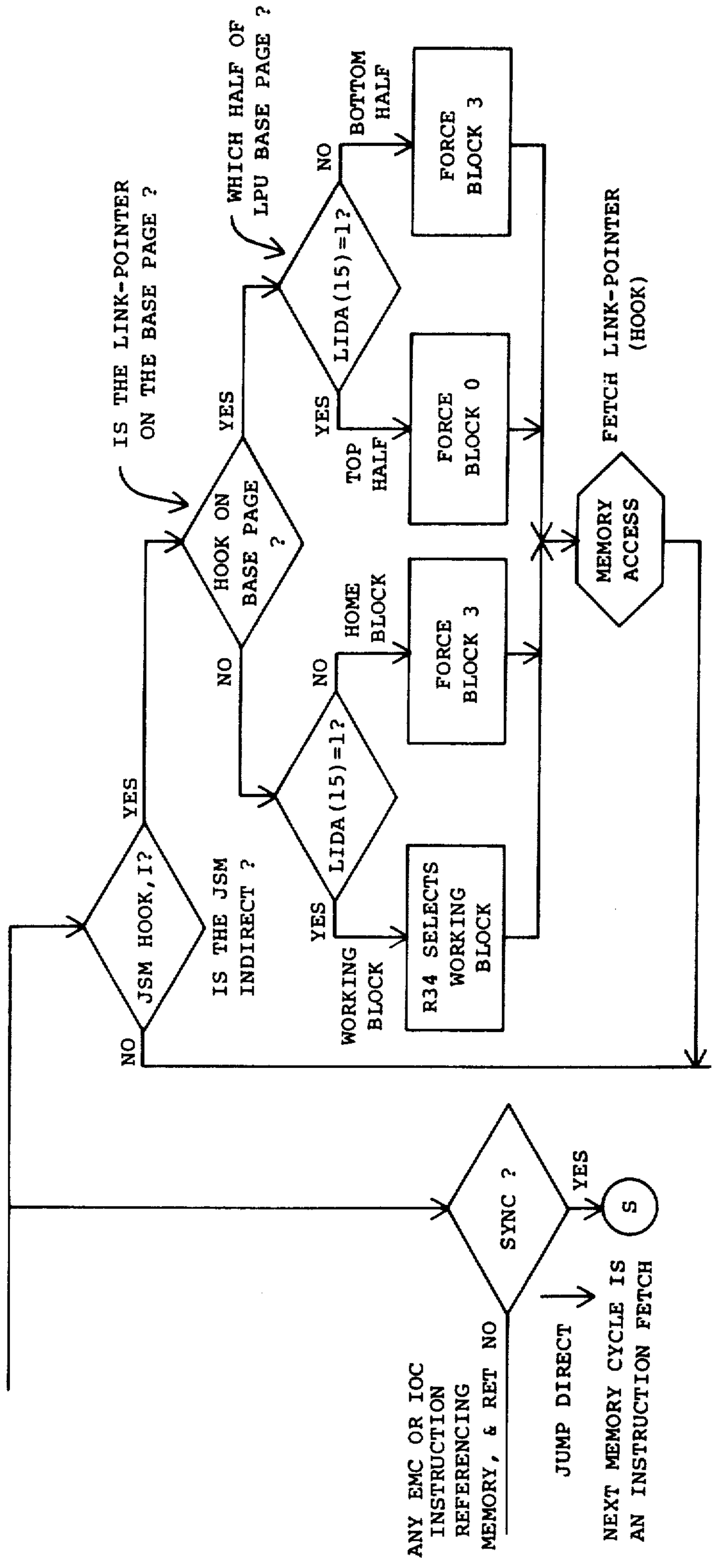

FIG. 132 is a chart showing the relationship of FIGS. 132A*a*–*c*, 132B*a*–*b* and 132C*a*–*c* which are a flow chart illustrating the details of memory address extension operation.

FIGS. 133A–B constitute a block diagram of the memory address extender of FIG. 43.

Figure 133:
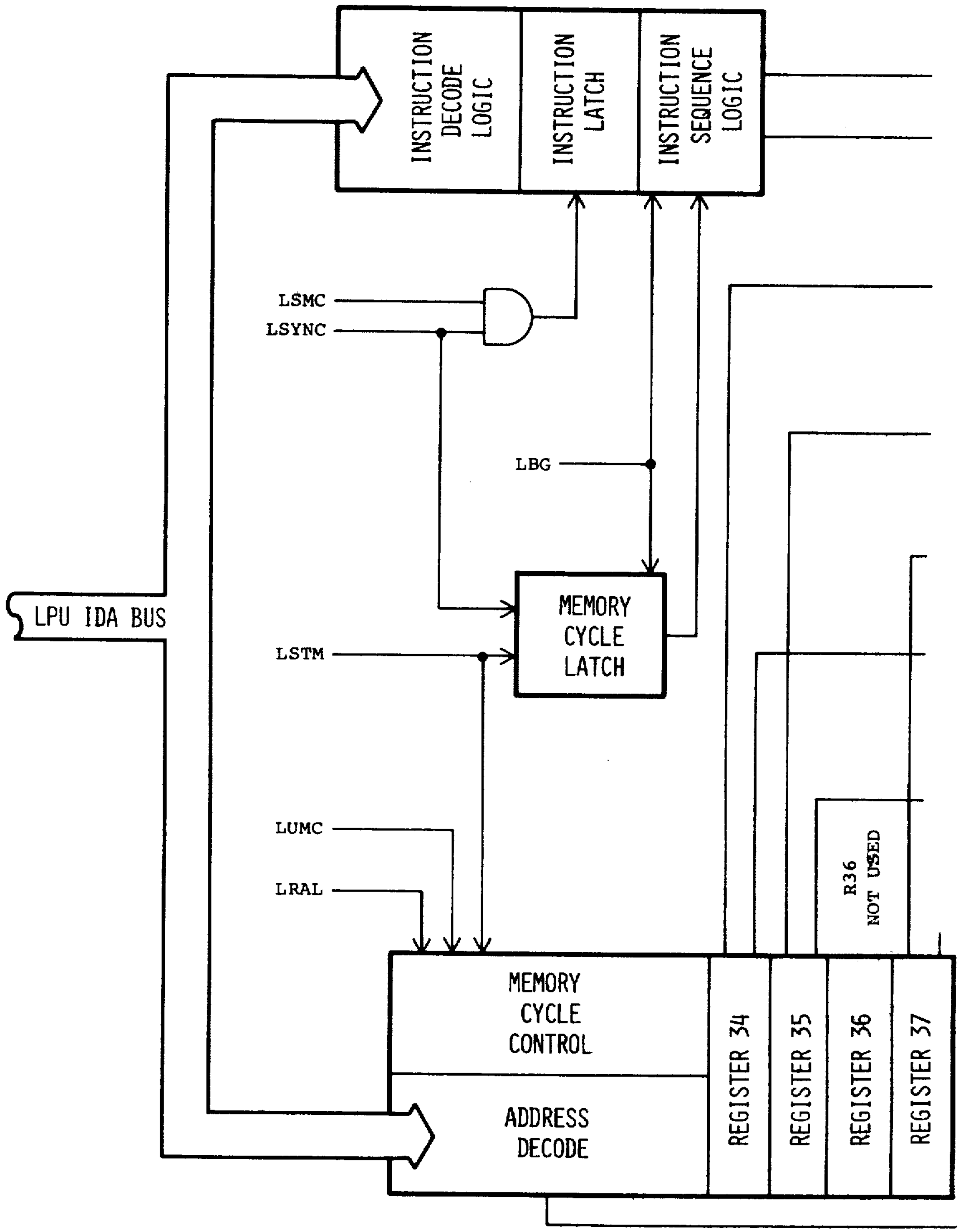
Figure 134:
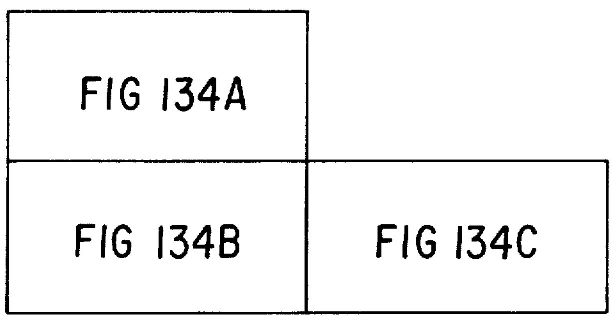
Figure 134A:
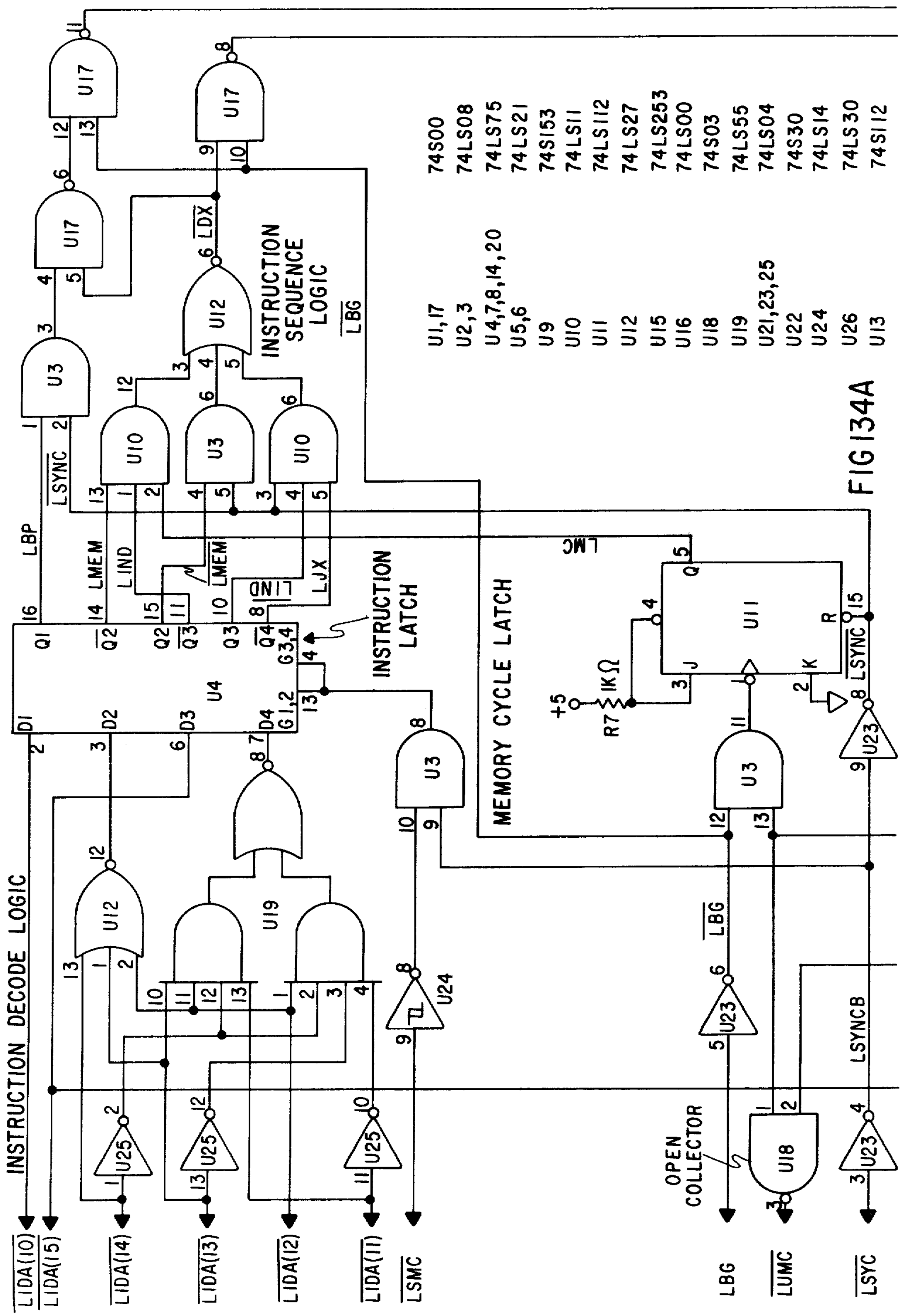
Figure 134B:
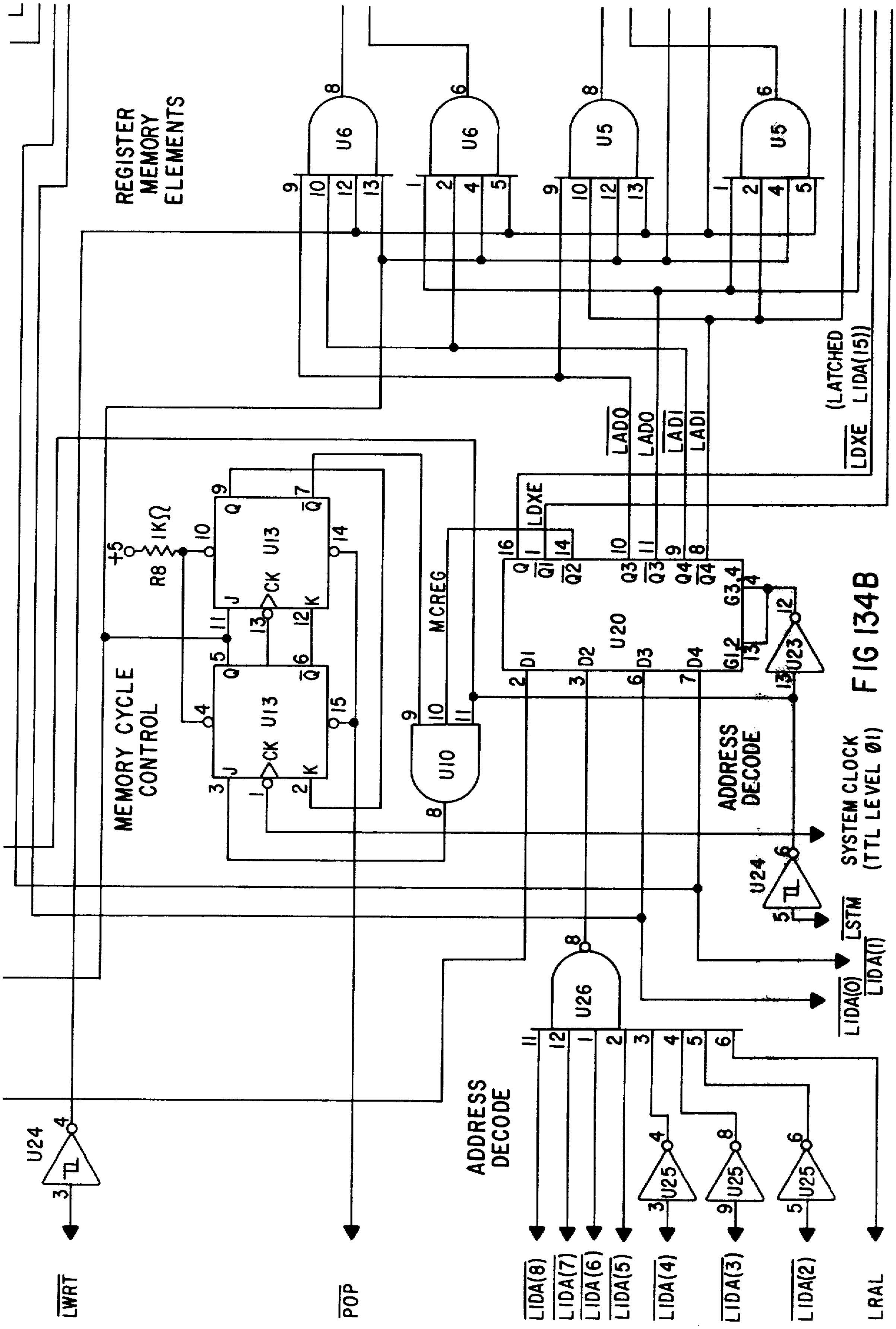
Figure 134C:
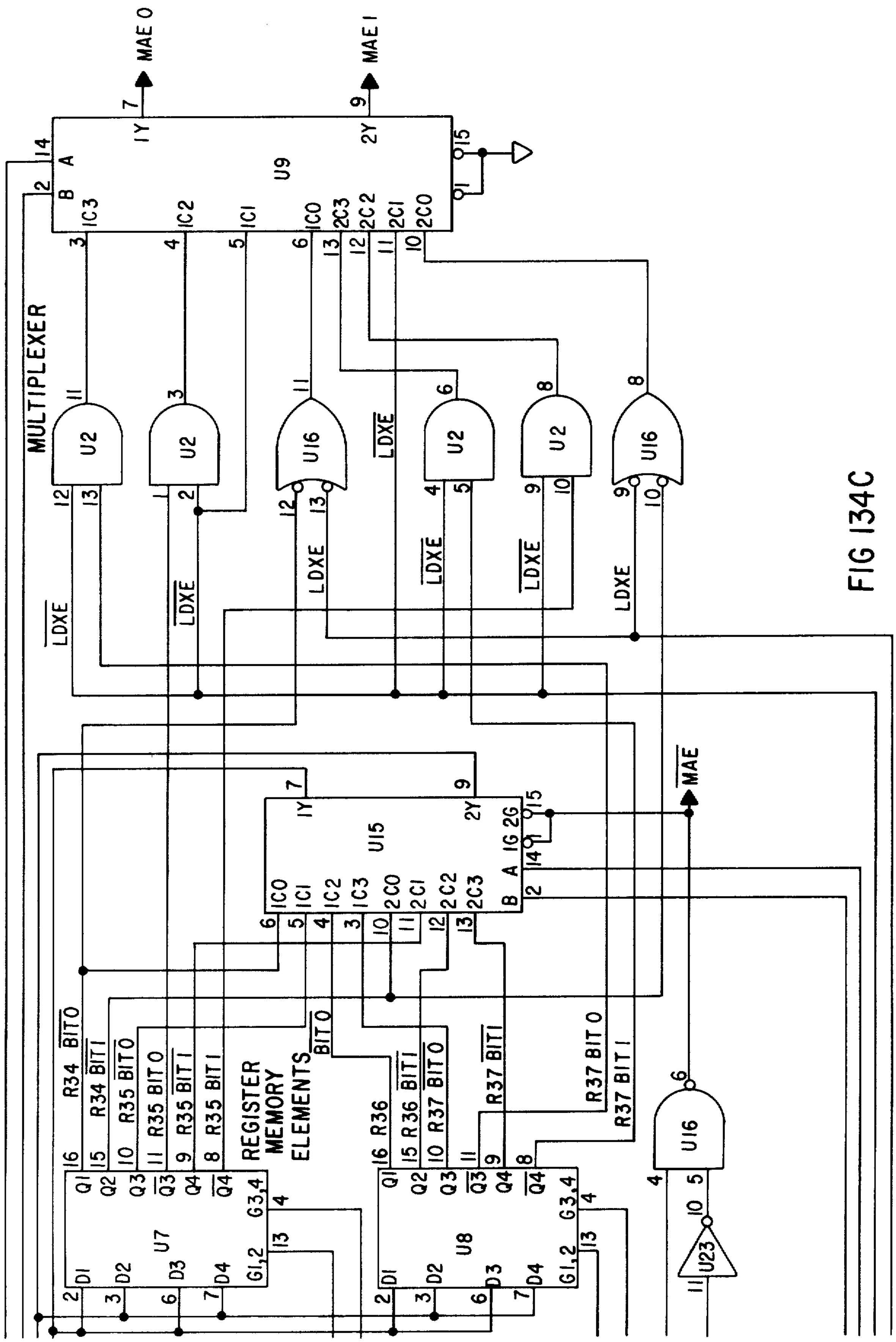

FIG. 134' is a chart showing the relationship of FIGS. 134A–C which are a schematic diagram of the memory address extender of FIGS. 133A–B.

Figure 135A:
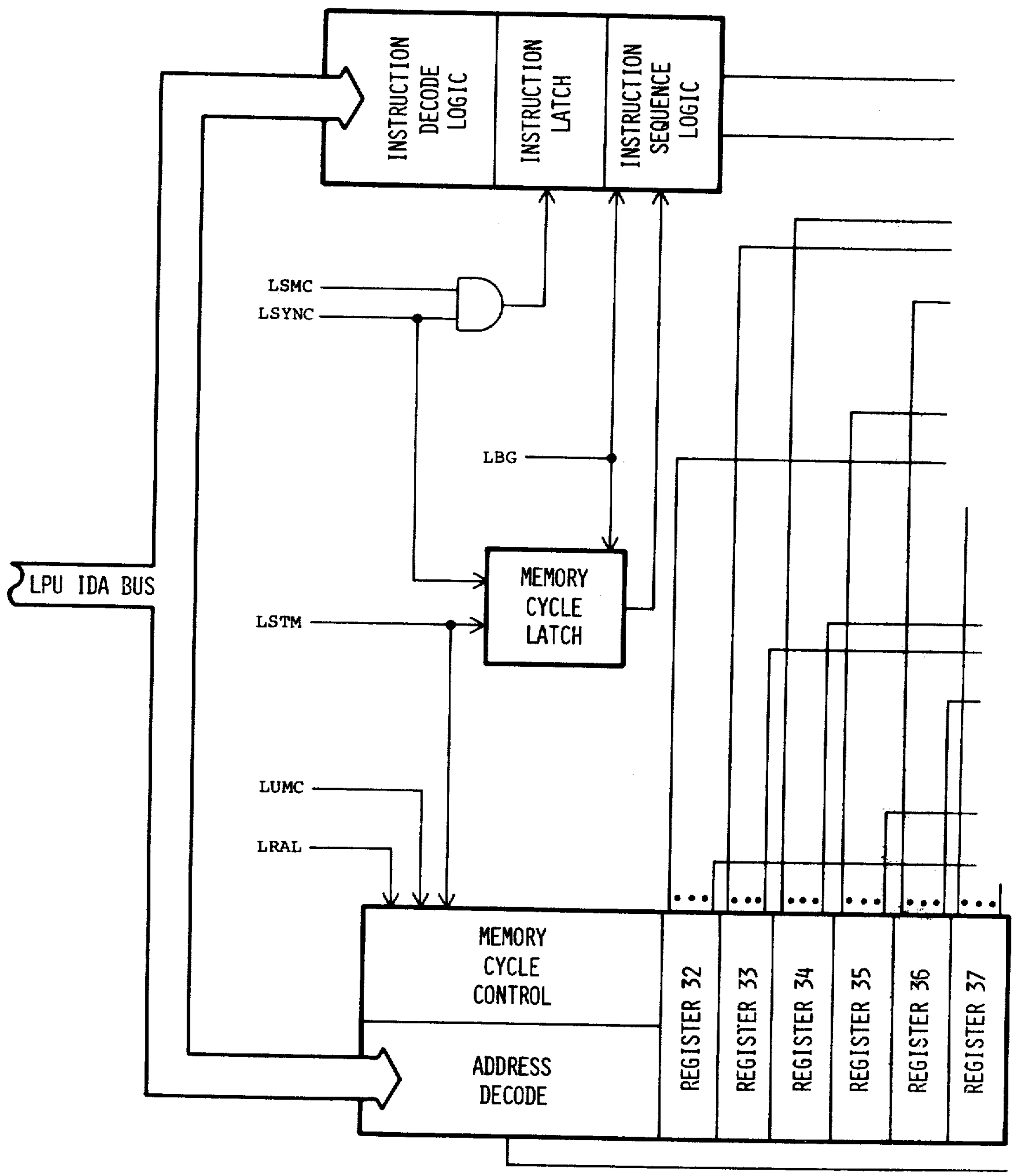
Figure 135B:
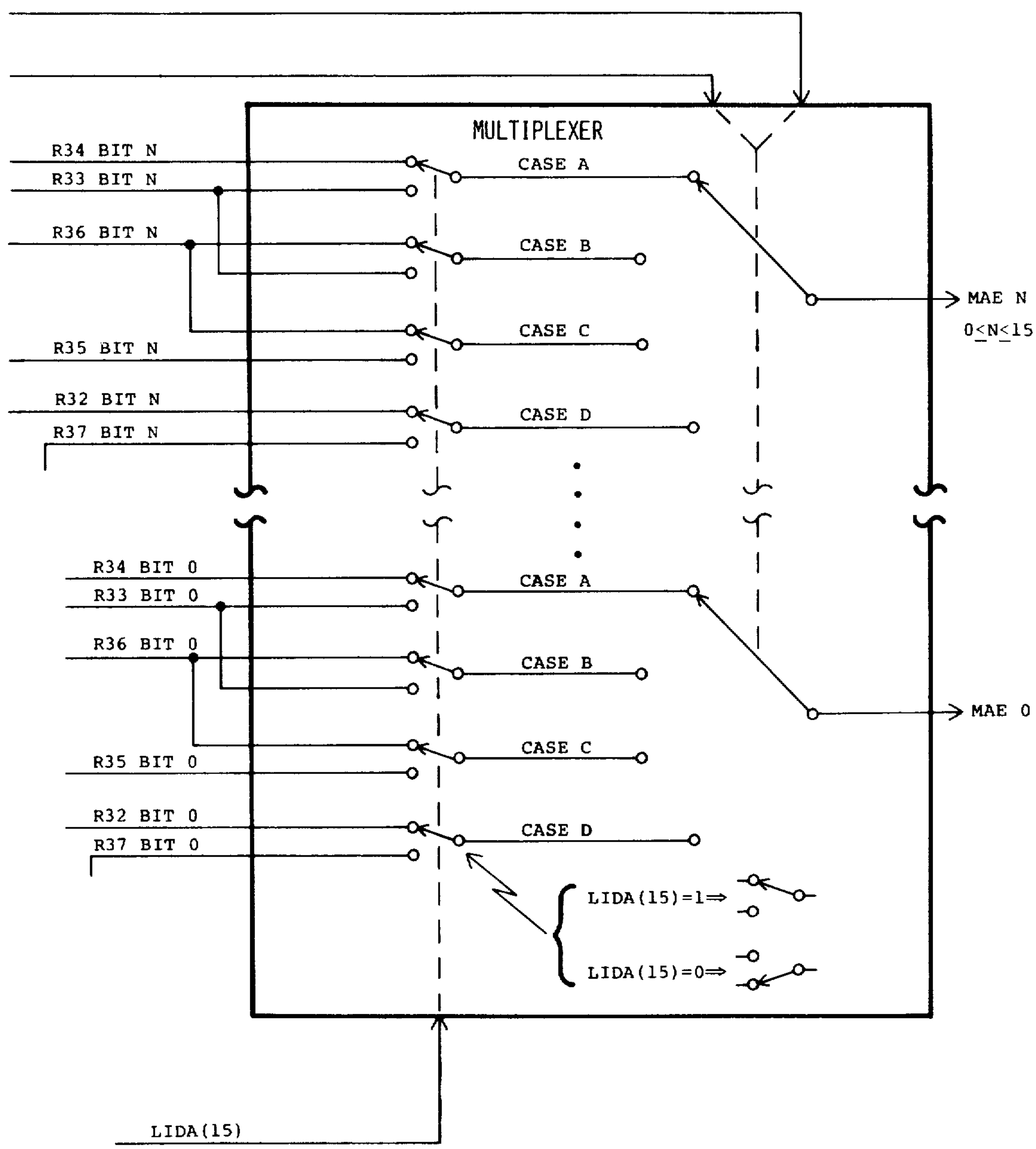

FIGS. 135A-B constitute a block diagram illustrating a generalized memory address extender.

Figure 136:
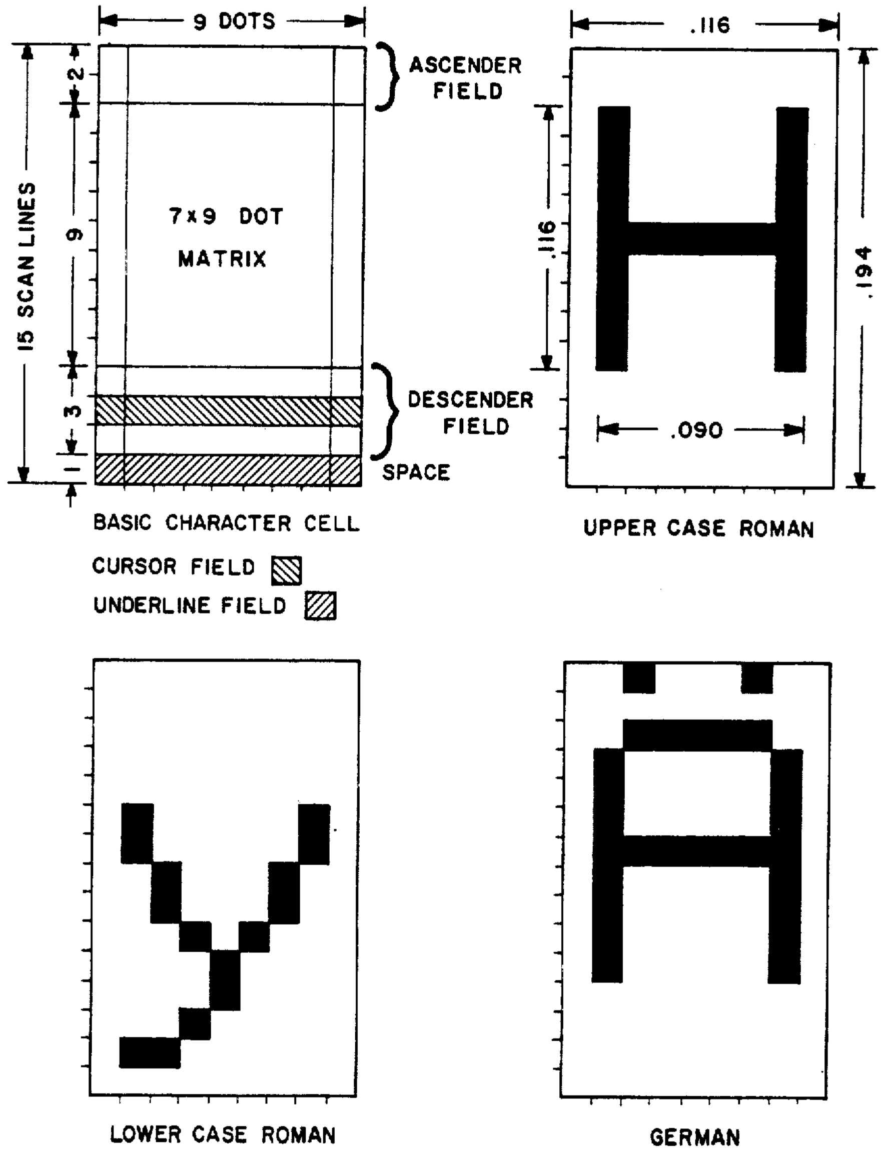

FIG. 136 is a diagram illustrating the placement of various characters within the CRT character matrix.

Figure 137:
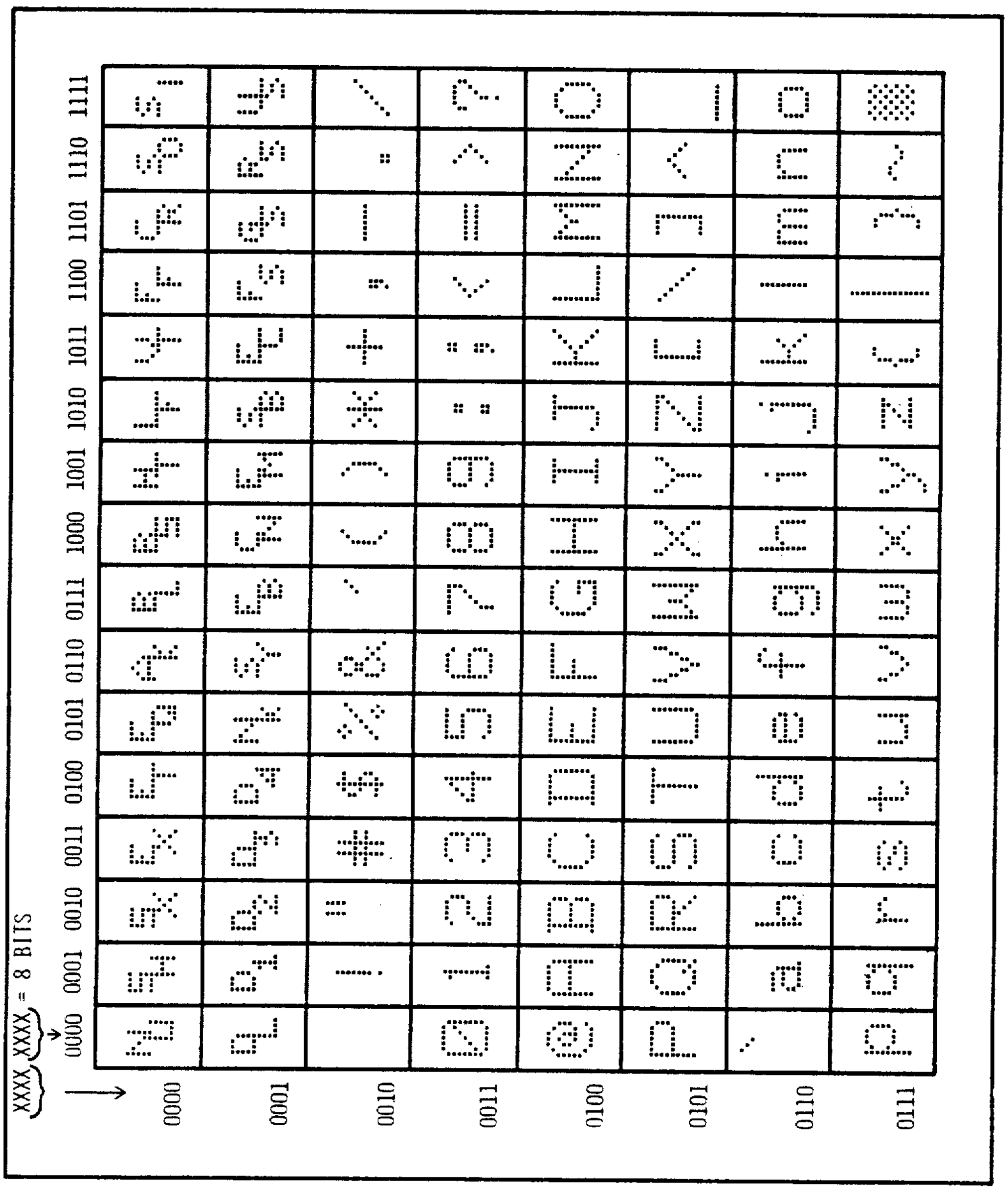

FIG. 137 is a diagram illustrating the primary ASCII character set that may be displayed on the CRT of the calculator of FIG. 1.

FIG. 138 is a tabular diagram listing the correspondence between the various ASCII control codes/characters and their occurrence as left or right bytes in a memory word.

Figure 139:
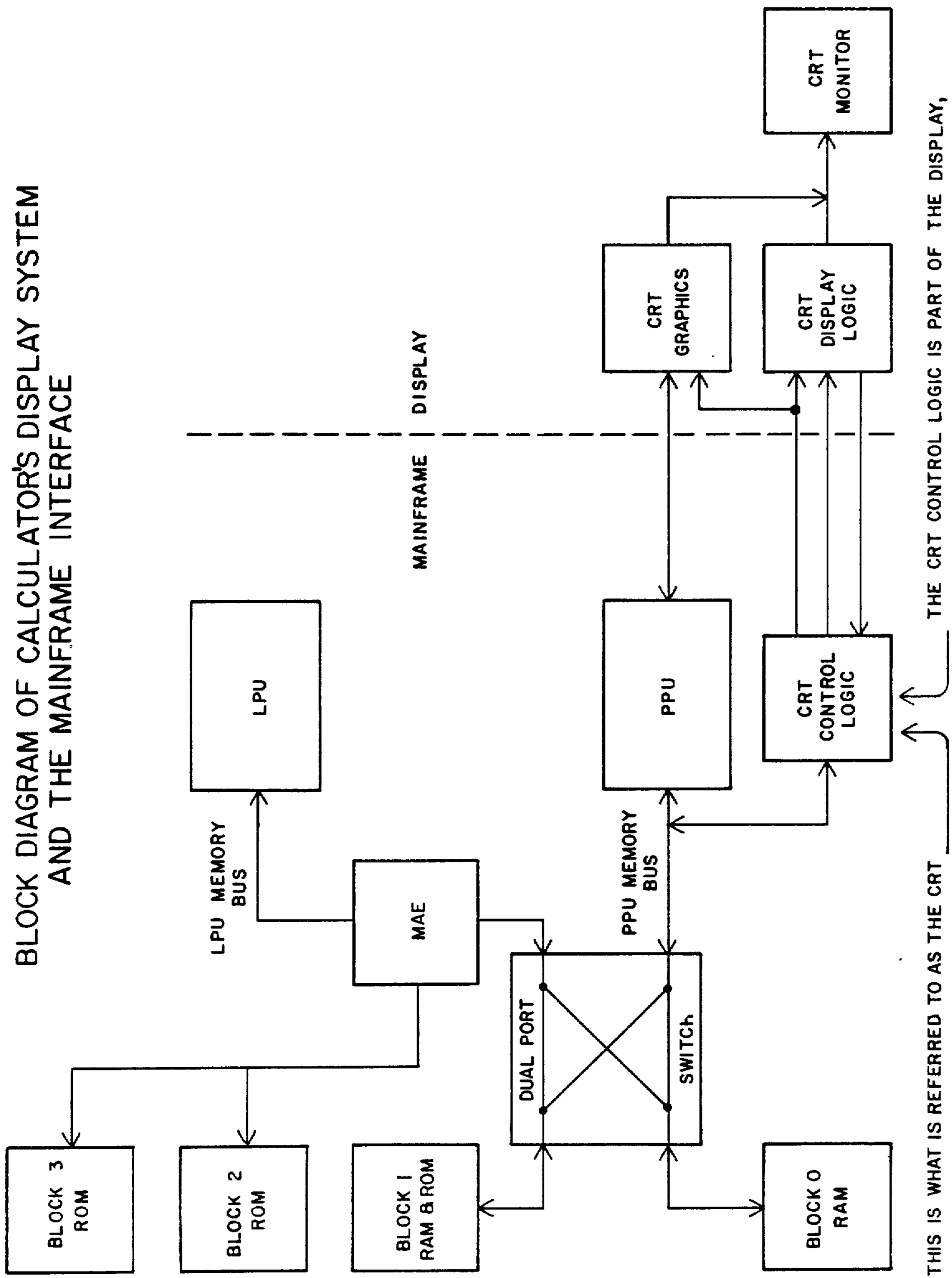

FIG. 139 is an overall block diagram of the calculator display system and its interface to the calculator mainframe.

Figure 140:
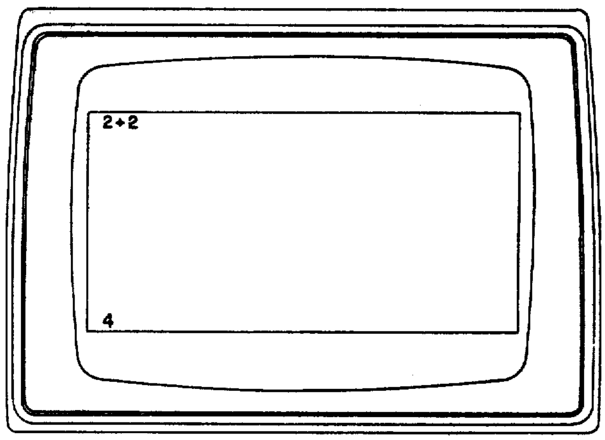

FIG. 140 is a diagram illustrating a normal alphanumeric mode display and its associated memory data pattern.

FIGS. 141A-D are a detailed block diagram of the alphanumeric portion of the calculator display system.

Figure 141A:
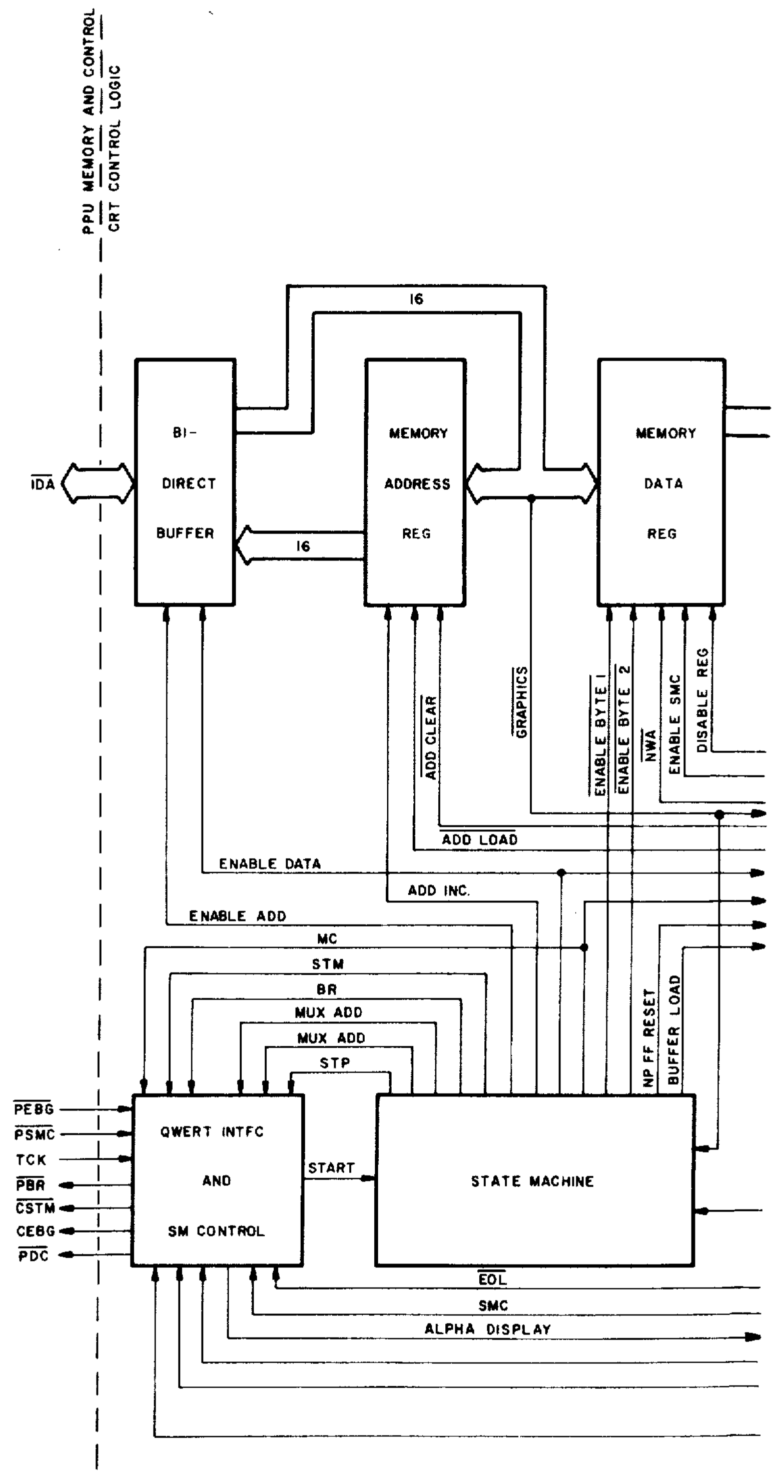
Figure 141B:
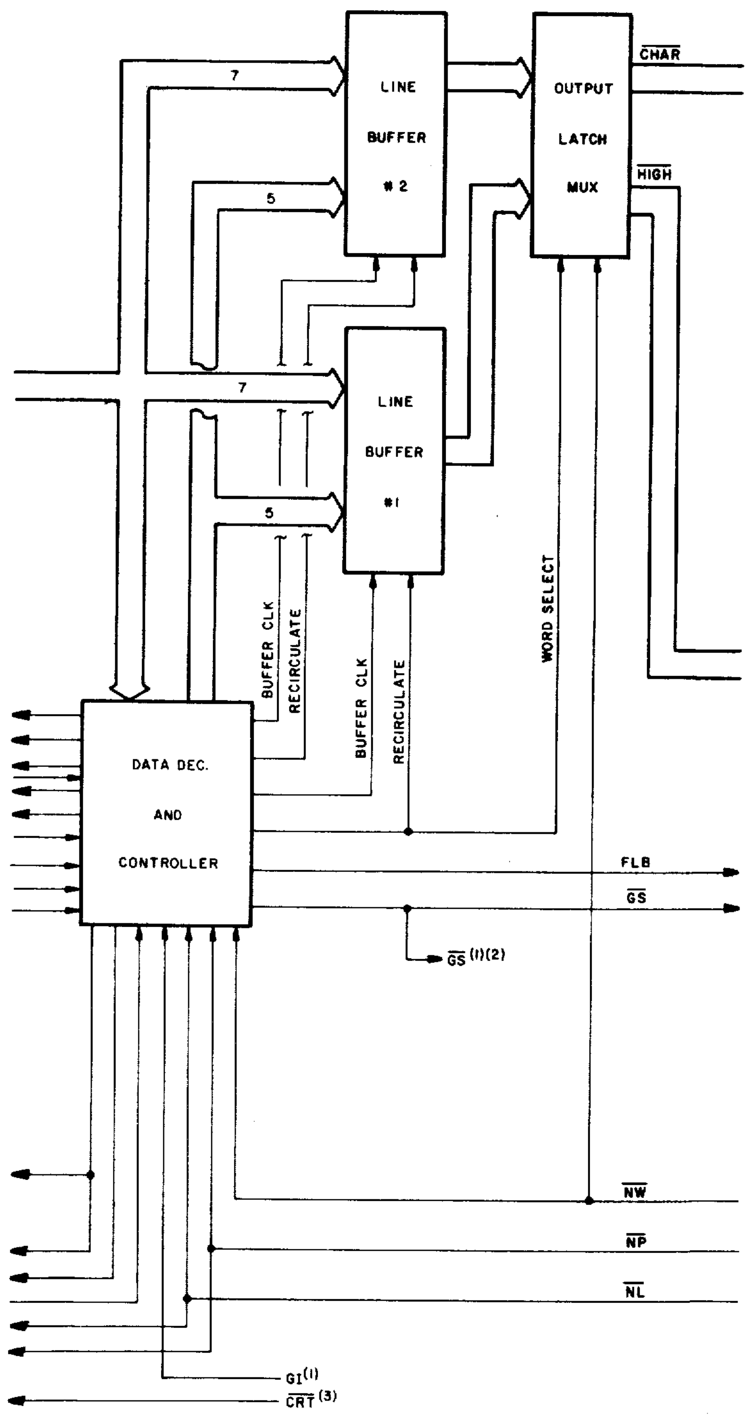
Figure 142:
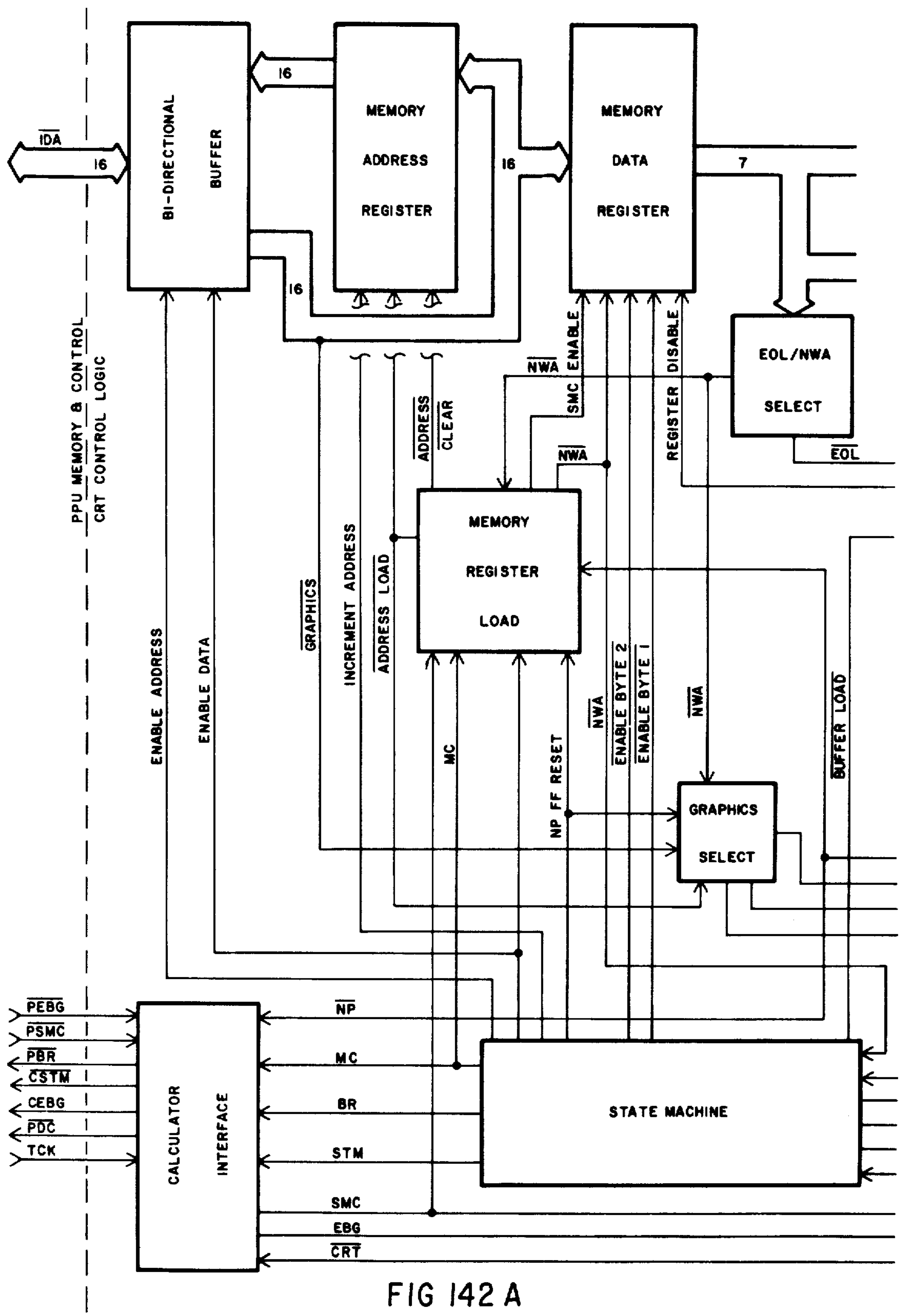
Figure 142B:
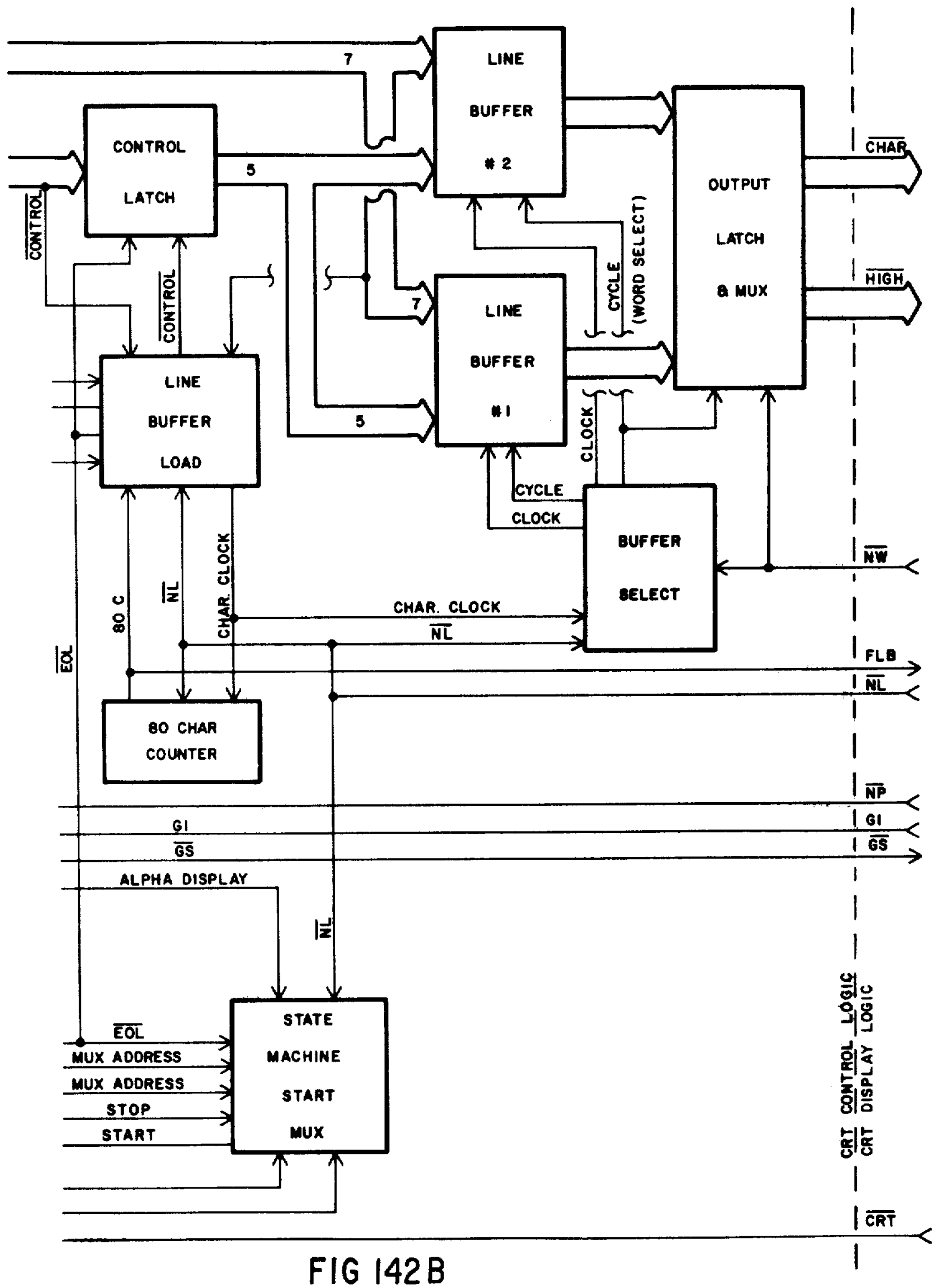

FIGS. 142A-B constitute a detailed block diagram of the CRT control logic of FIGS. 141A-B.

FIG. 143 is a tabular diagram illustrating the bit pattern associated with the state machine of FIG. 142.

Figure 144:
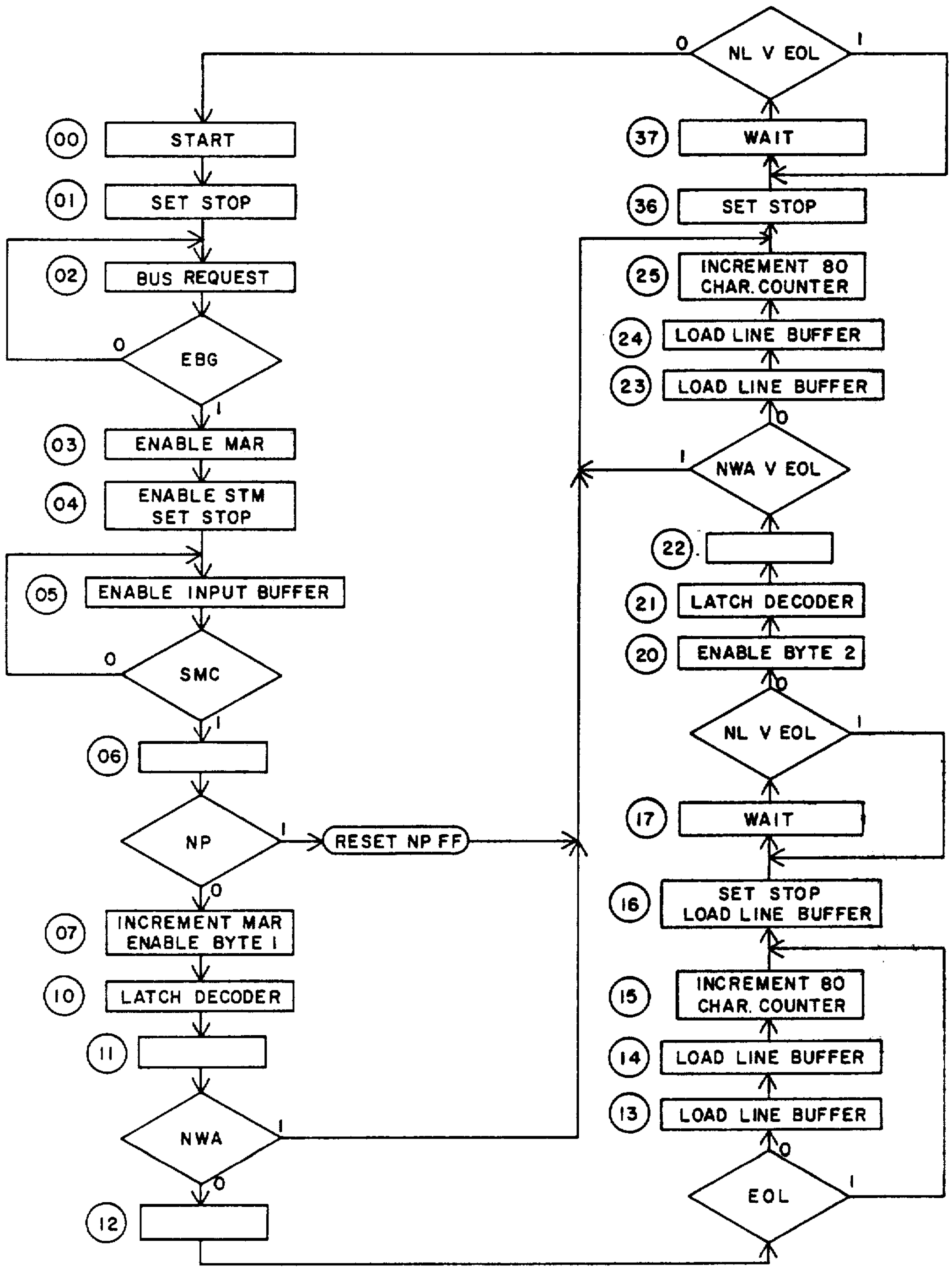

FIG. 144 is a flow chart describing the operation of the state machine of FIG. 142.

Figure 145:
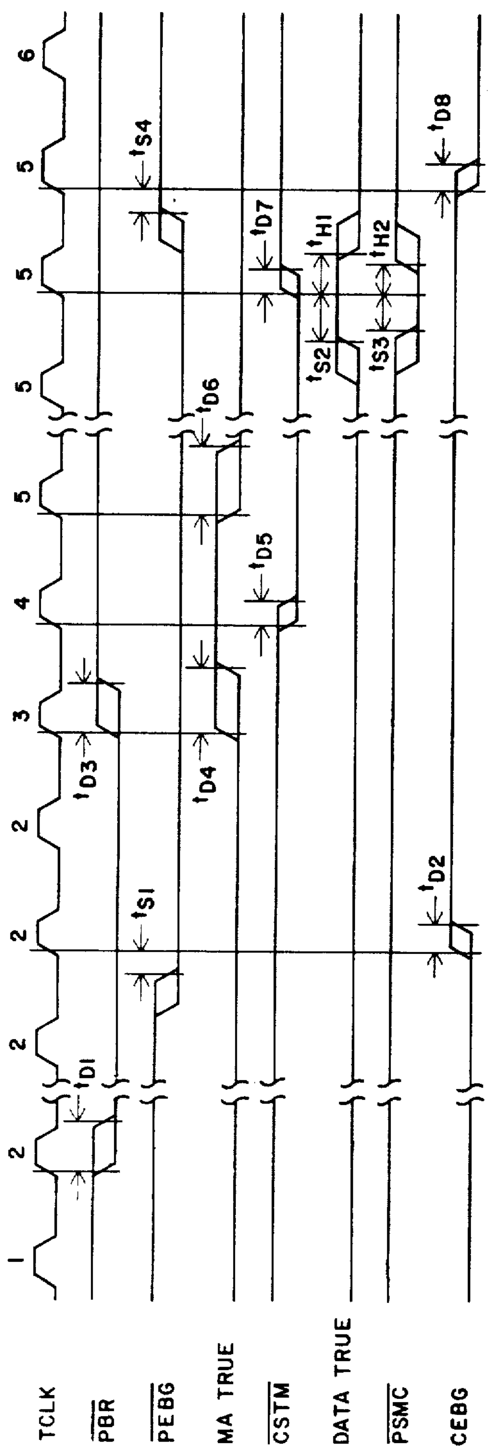

FIG. 145 is a waveform diagram illustrating a read memory cycle as performed by the CRT memory access port of FIG. 43.

Figure 146:
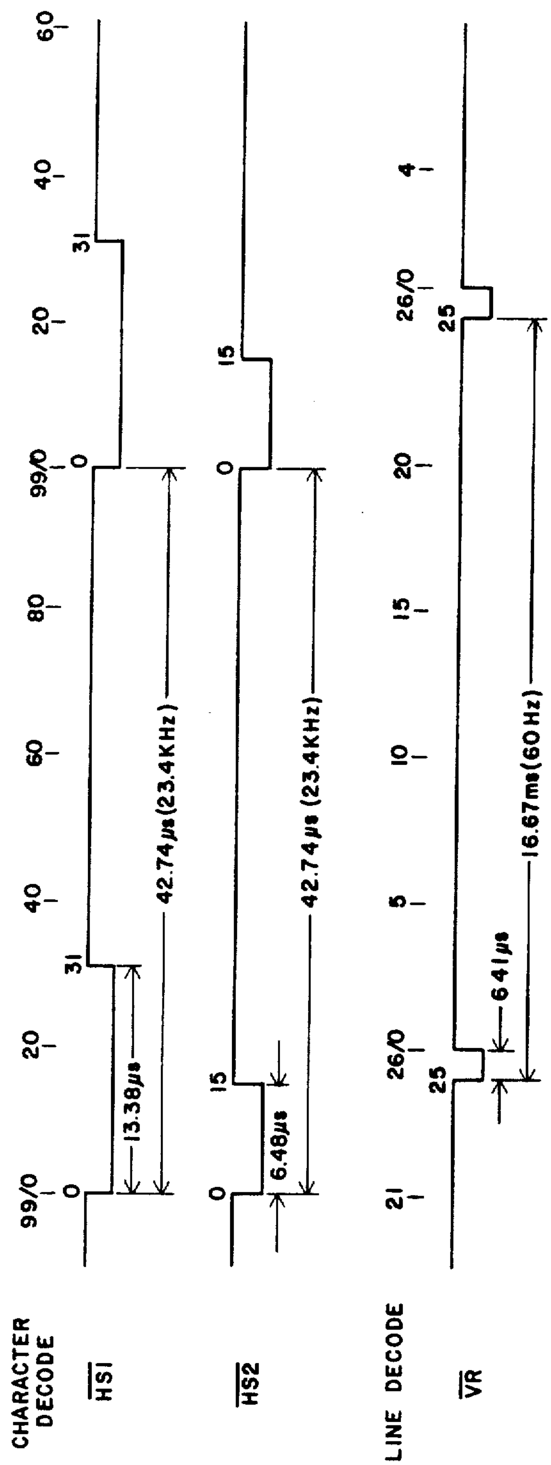

FIG. 146 is a waveform diagram illustrating the CRT monitor drive signals.

Figure 141C:
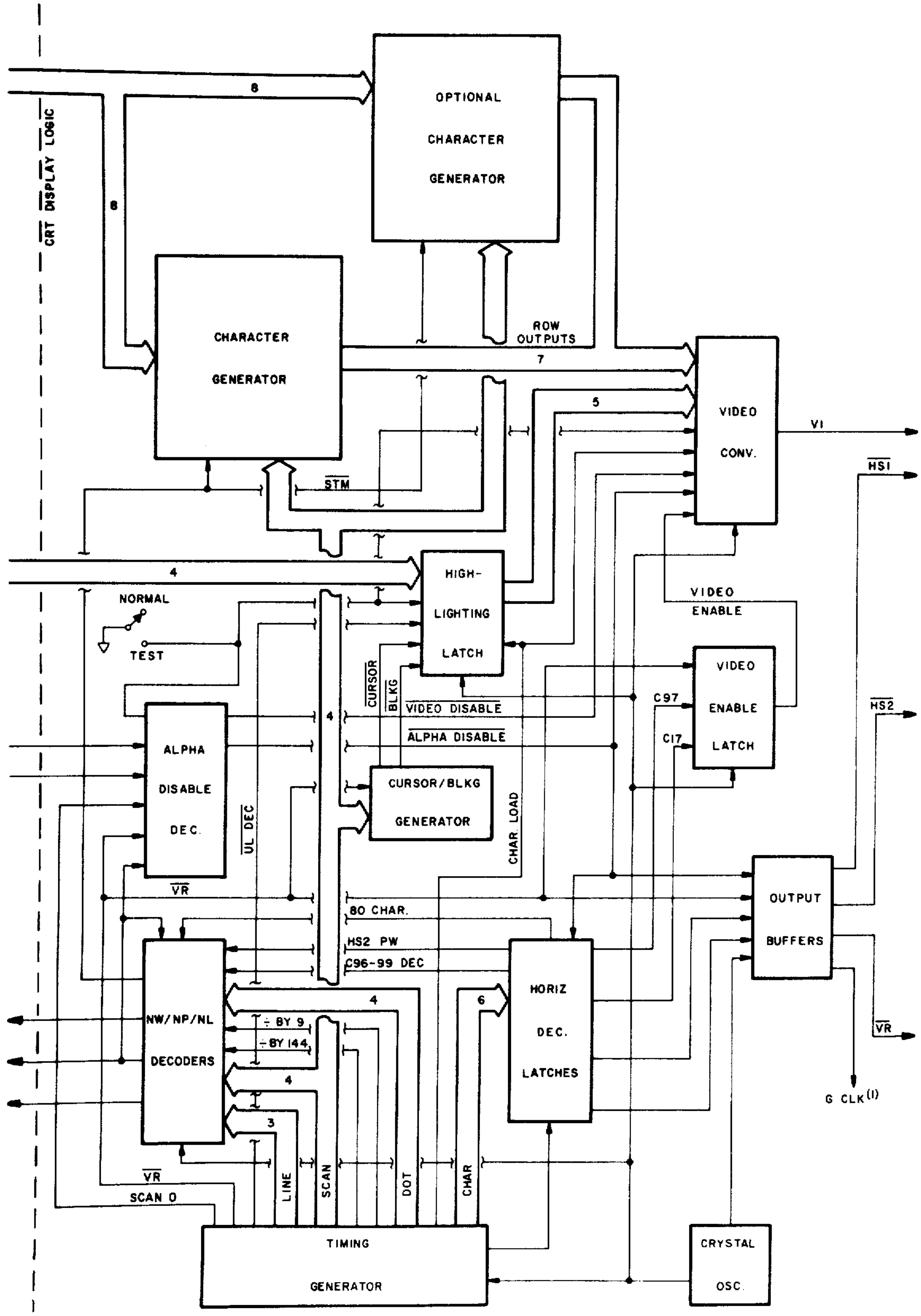
Figure 147:
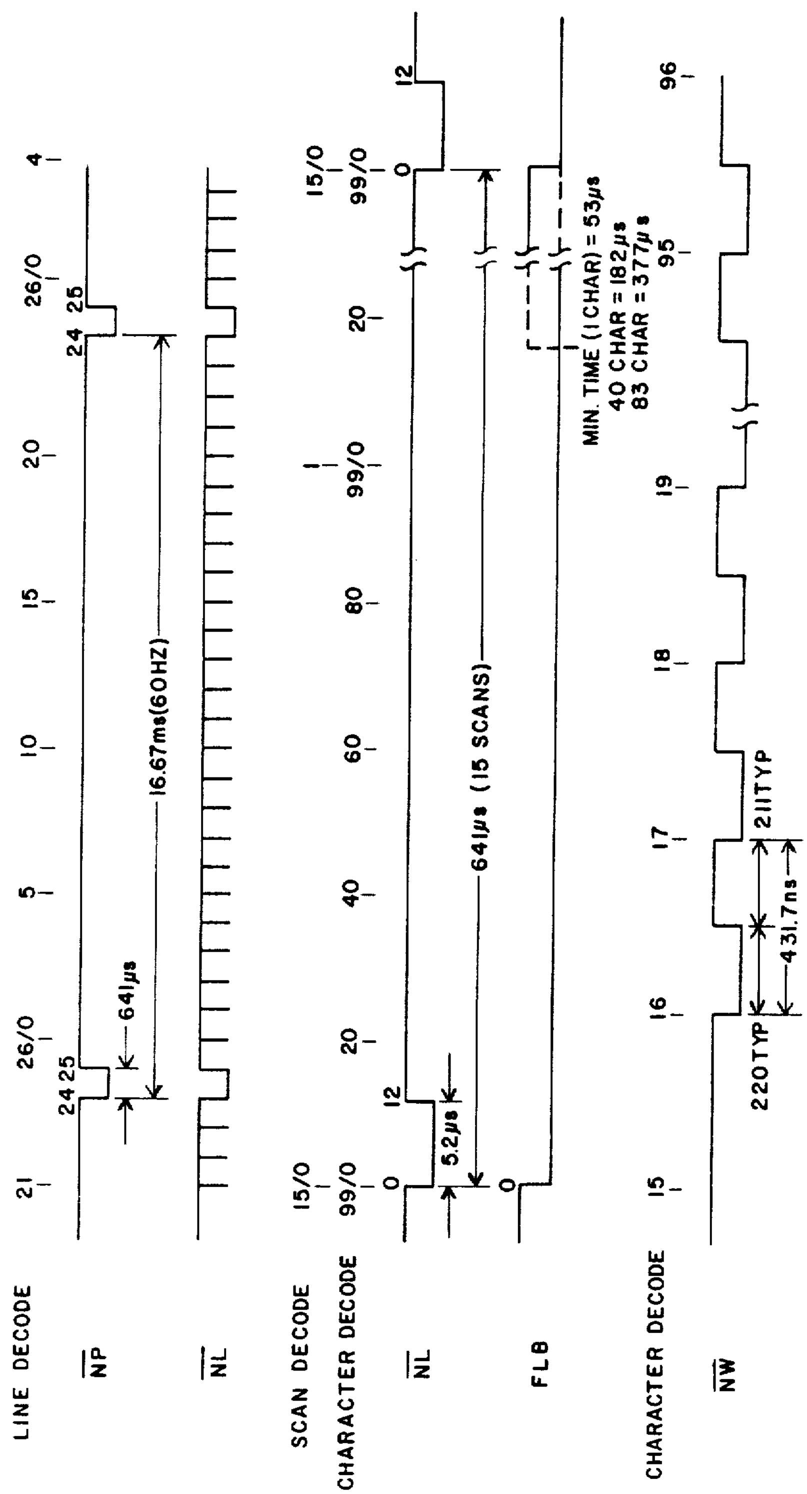

FIG. 147 is a waveform diagram illustrating the relationship between the signals of the control logic of FIGS. 141A-B and the display logic of FIG. 141C.

Figure 148:
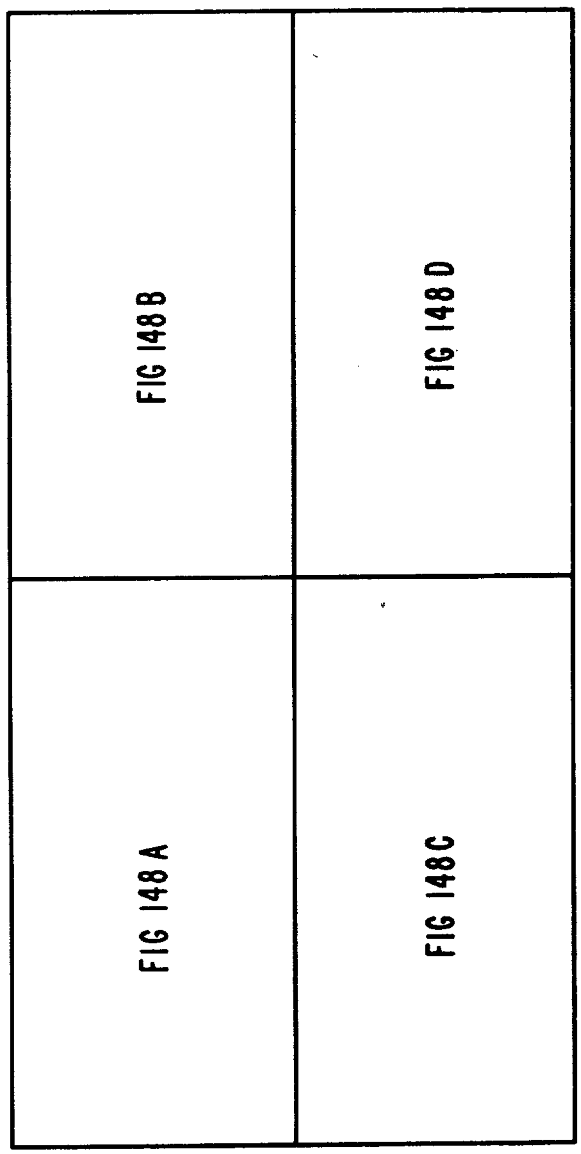
Figure 148A:
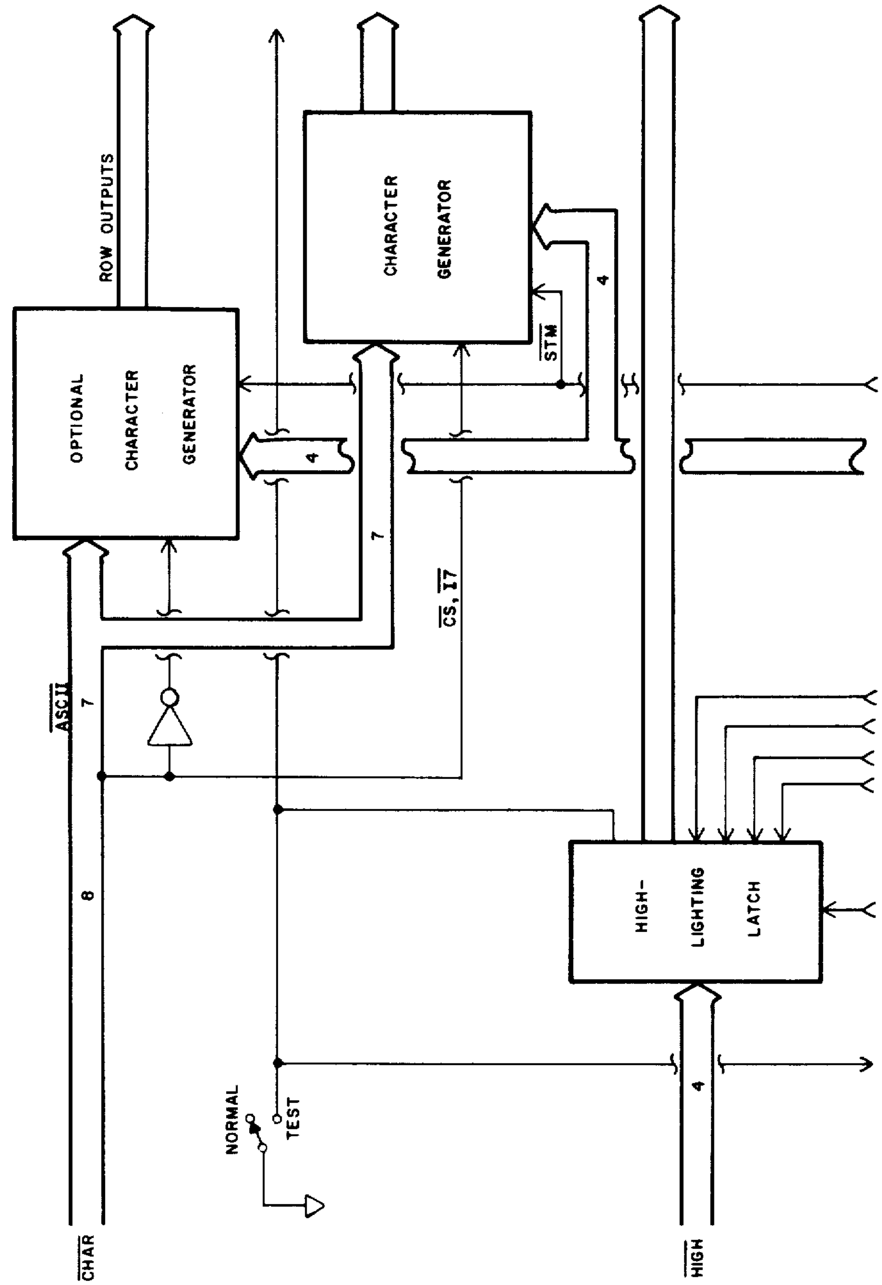
Figure 148:
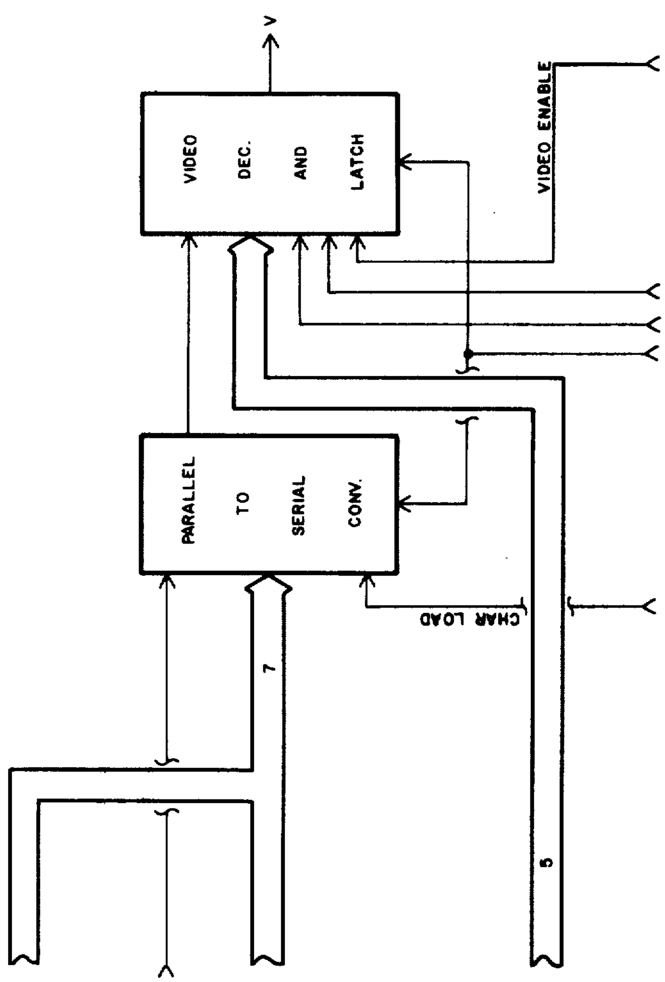
Figure 148C:
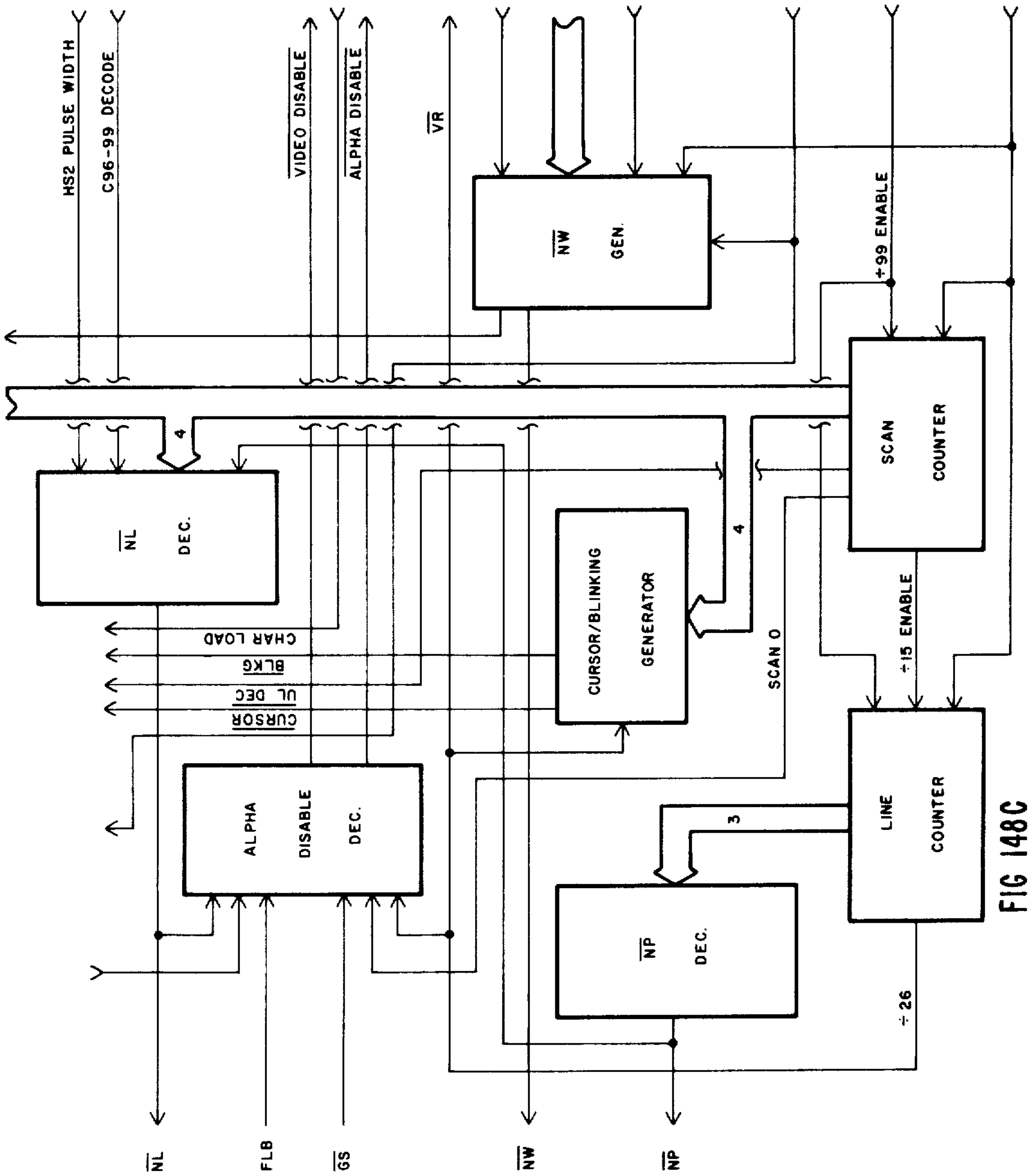
Figure 148D:
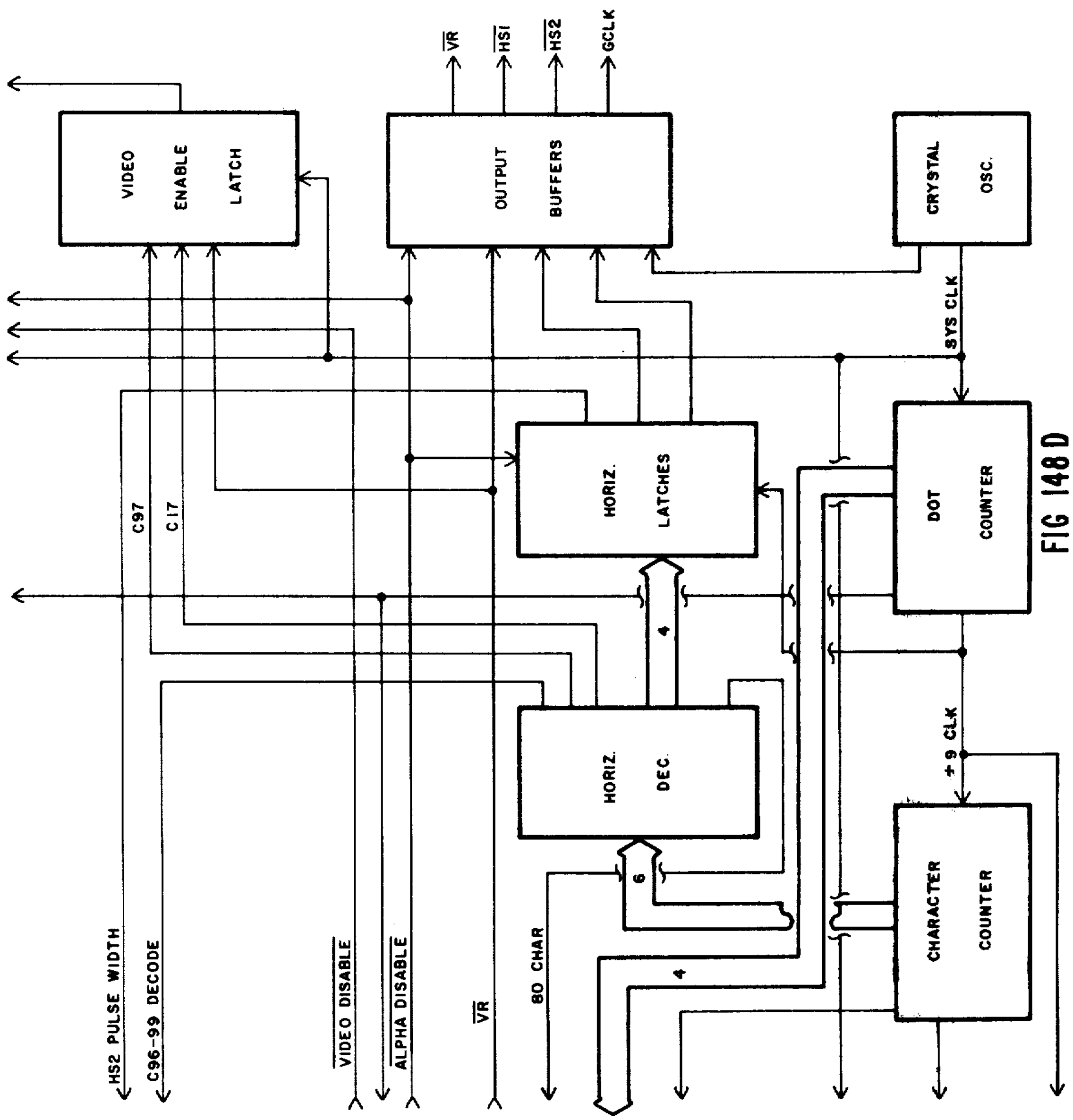

FIG. 148 is a chart showing the relationship of FIGS. 148A-D which constitute a detailed block diagram of the display logic of FIG. 141C.

Figure 149:
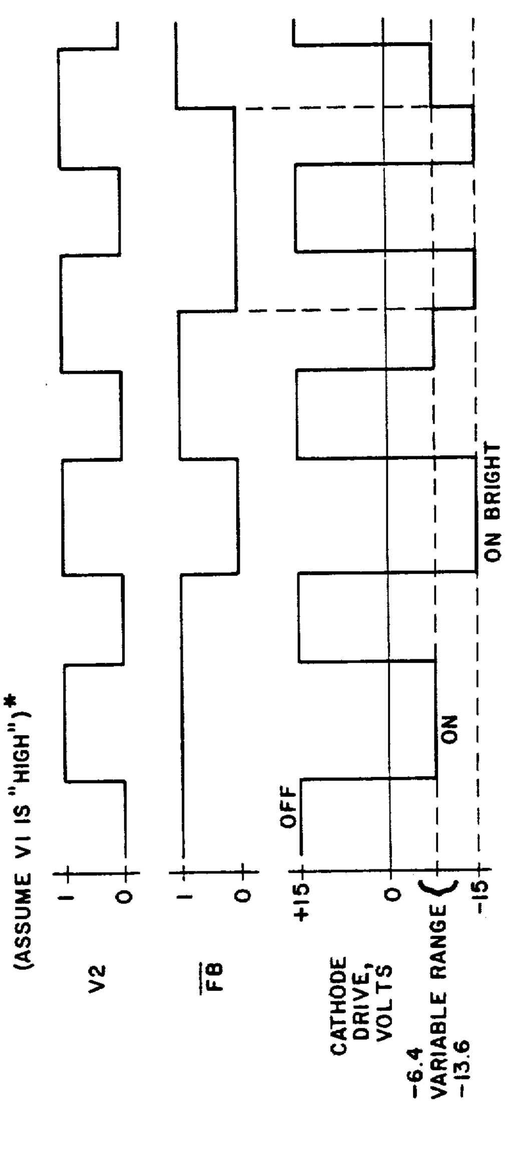

FIG. 149 is a waveform diagram illustrating the video waveforms associated with the calculator CRT.

Figure 150:
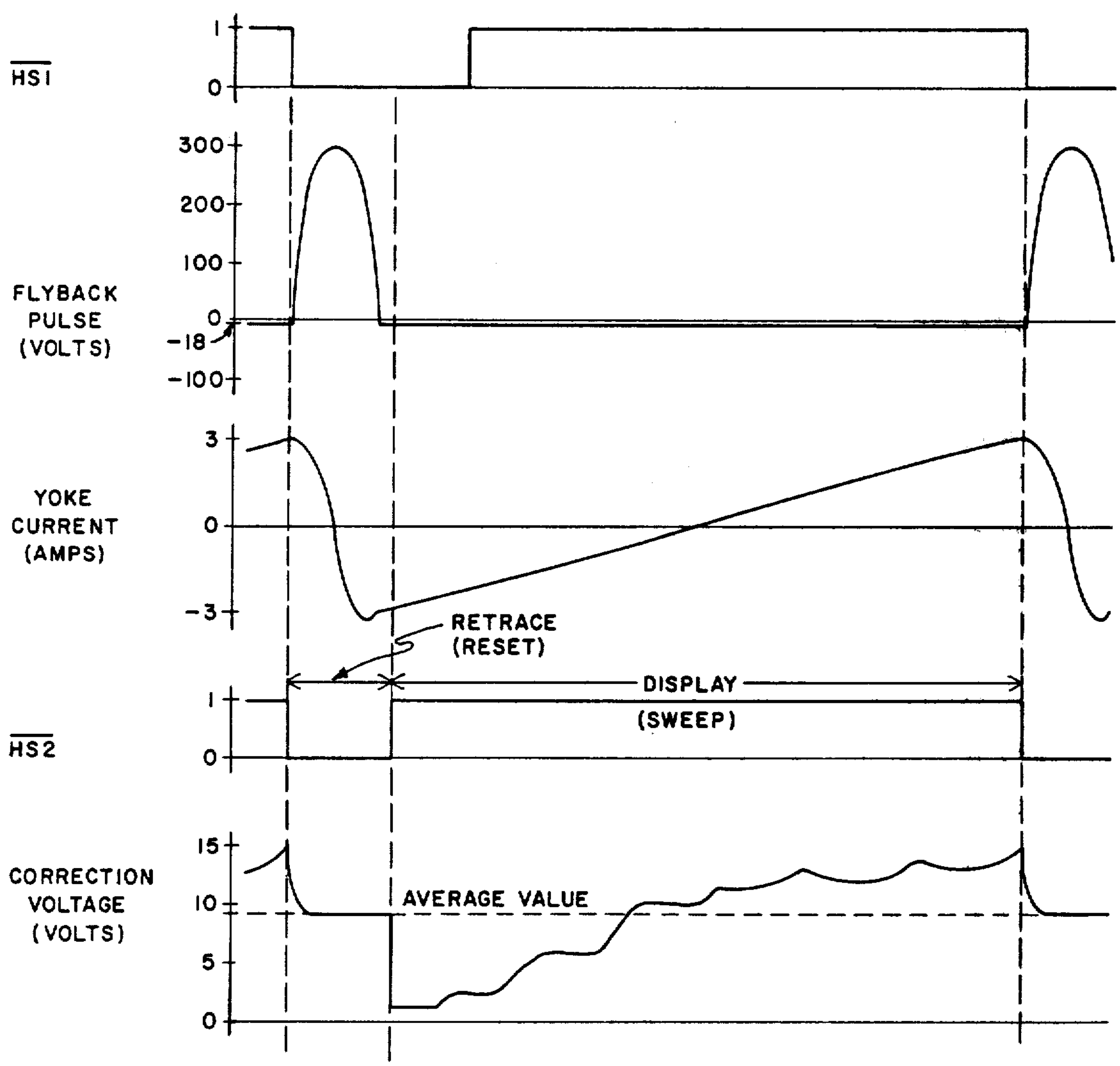

FIG. 150 is a waveform diagram illustrating the horizontal sweep signals associated with the calculator CRT.

Figure 141D:
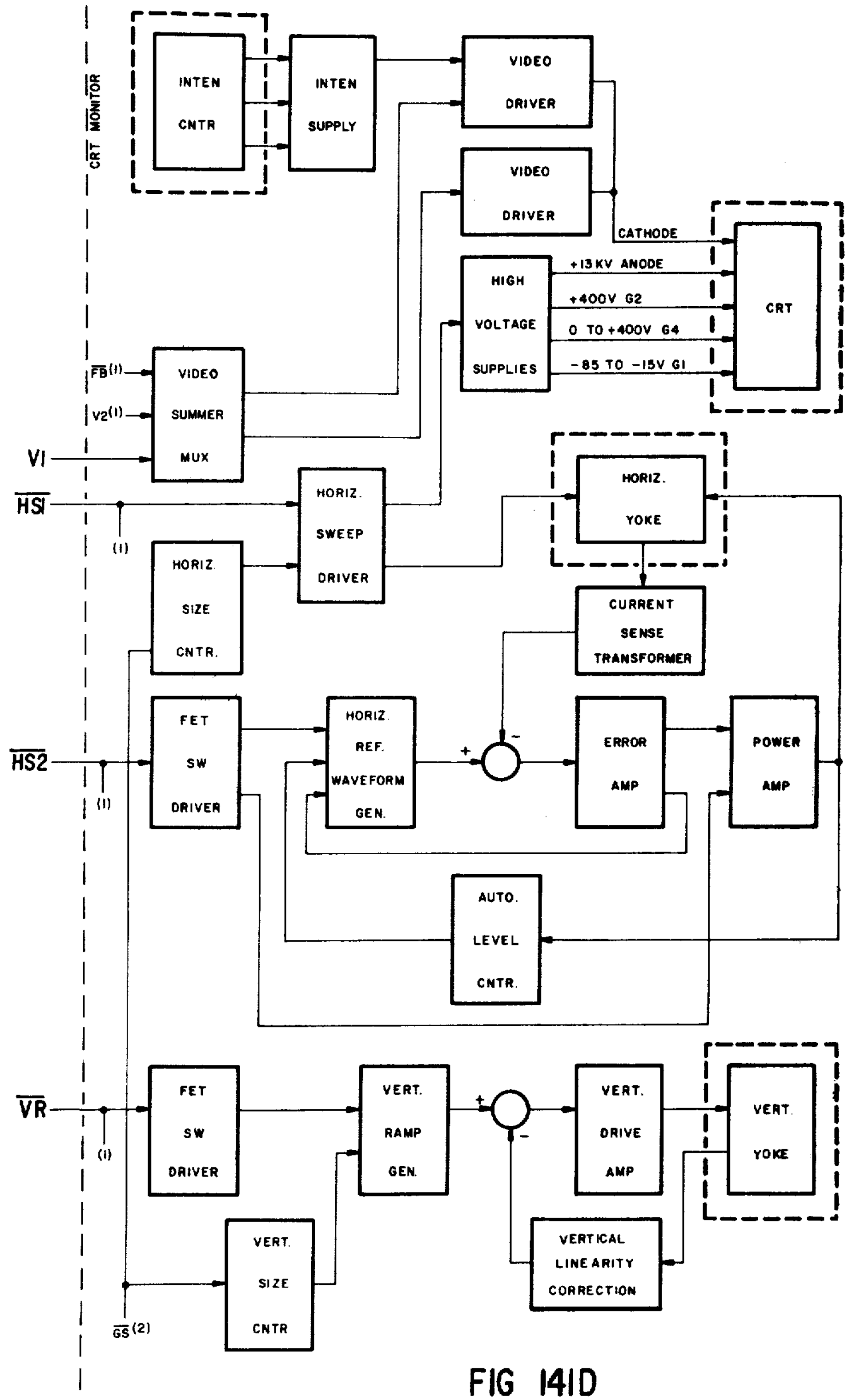
Figure 151:
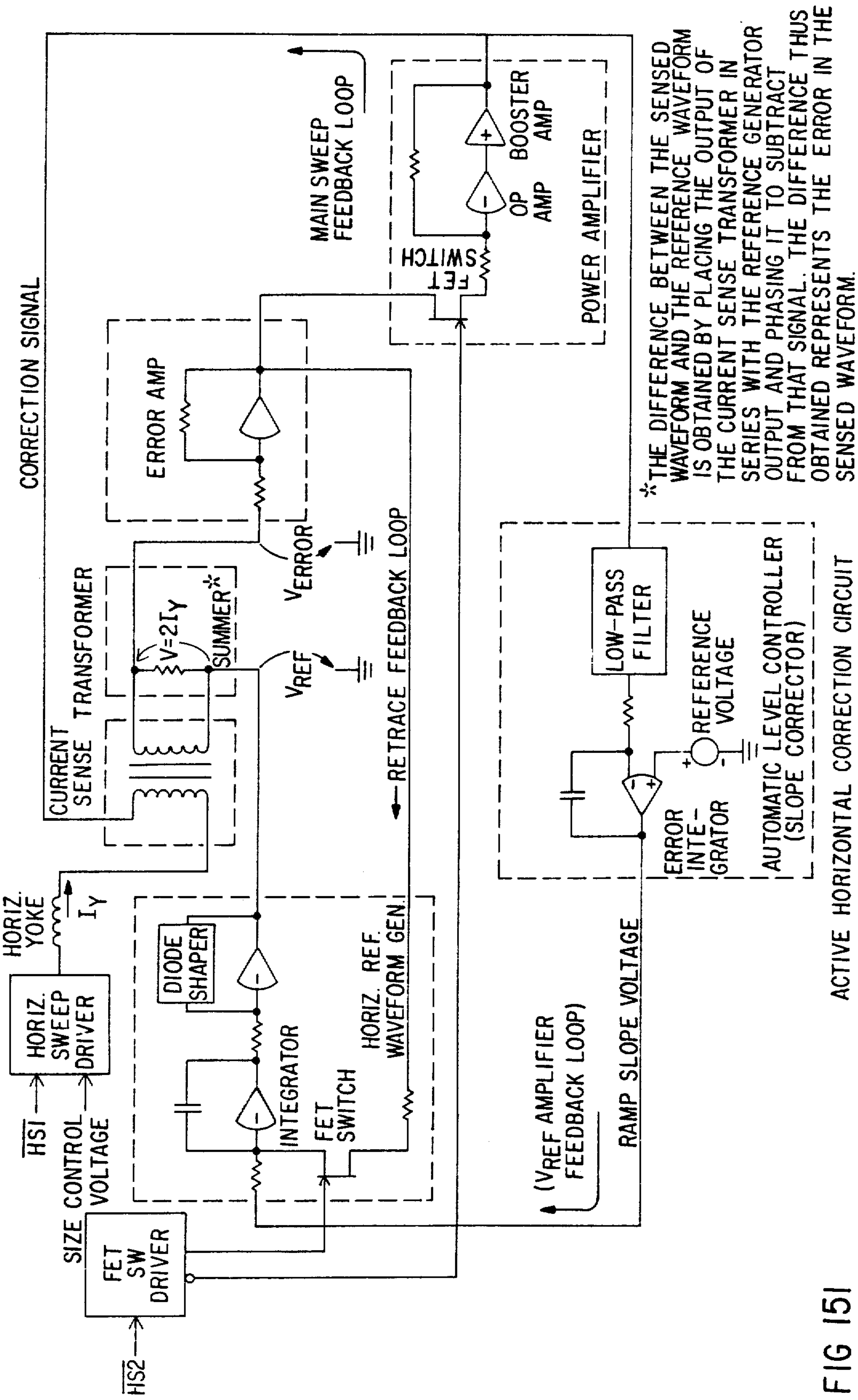

FIG. 151 is a simplified schematic diagram of the horizontal active linearity correction circuit incorporated within the CRT monitor if FIG. 141D.

Figure 152:
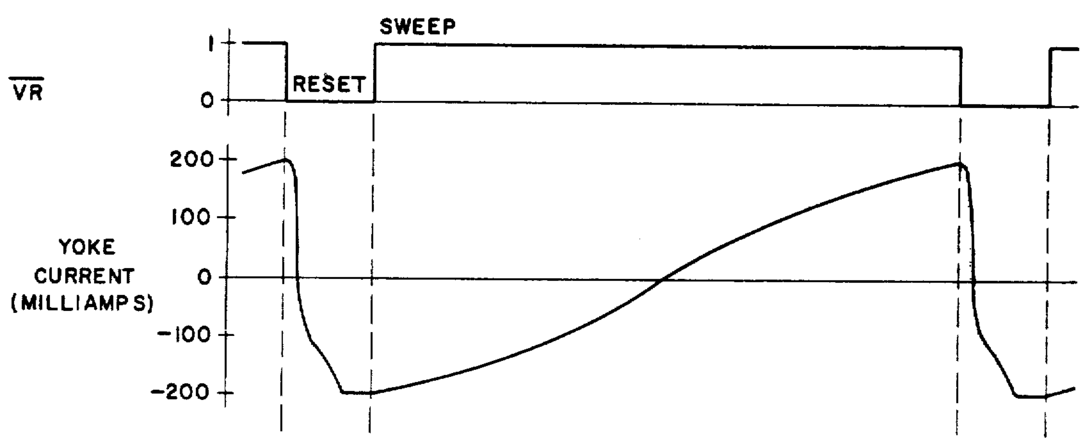

FIG. 152 is a waveform diagram illustrating the vertical sweep associated with the calculator CRT.

FIGS. 153A-G are a tabular diagram illustrating the properties of the pseudo instructions of the assembler.

FIG. 154 is a diagram illustrating the format of the object code tape produced by the assembler.

FIGS. 155A-B are a tabular diagram illustrating a general type of optimization performed by the optimizer.

FIGS. 156A-C are a tabular diagram illustrating an optional type of optimization performed by the optimizer.

FIGS. 157A-B are a tabular diagram illustrating a range type of optimization performed by the optimizer.

FIGS. 158A-F are a tabular diagram illustrating a compound type of optimization performed by the optimizer.

FIG. 159 is a memory map of block 1 of the memory of FIG. 43.

FIG. 160 is a diagram illustrating the structure of a process control block.

Figure 161:
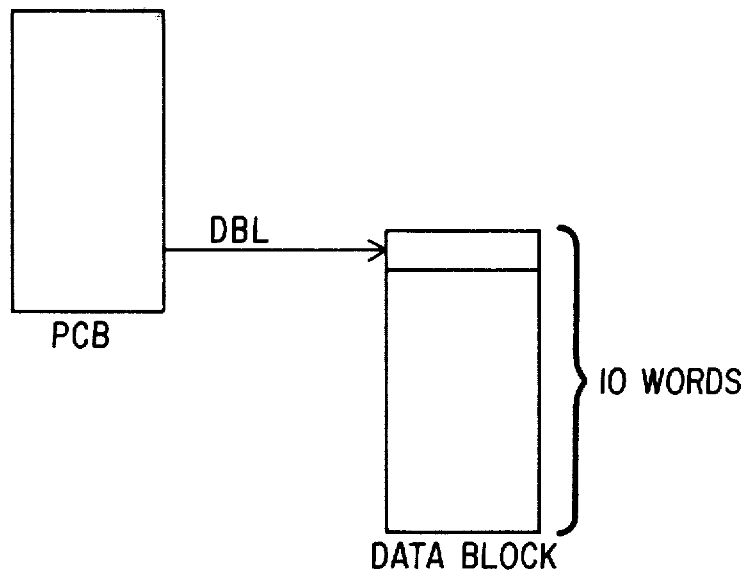

FIG. 161 is a diagram illustrating the relationship between a process control block and a data block.

Figure 162:
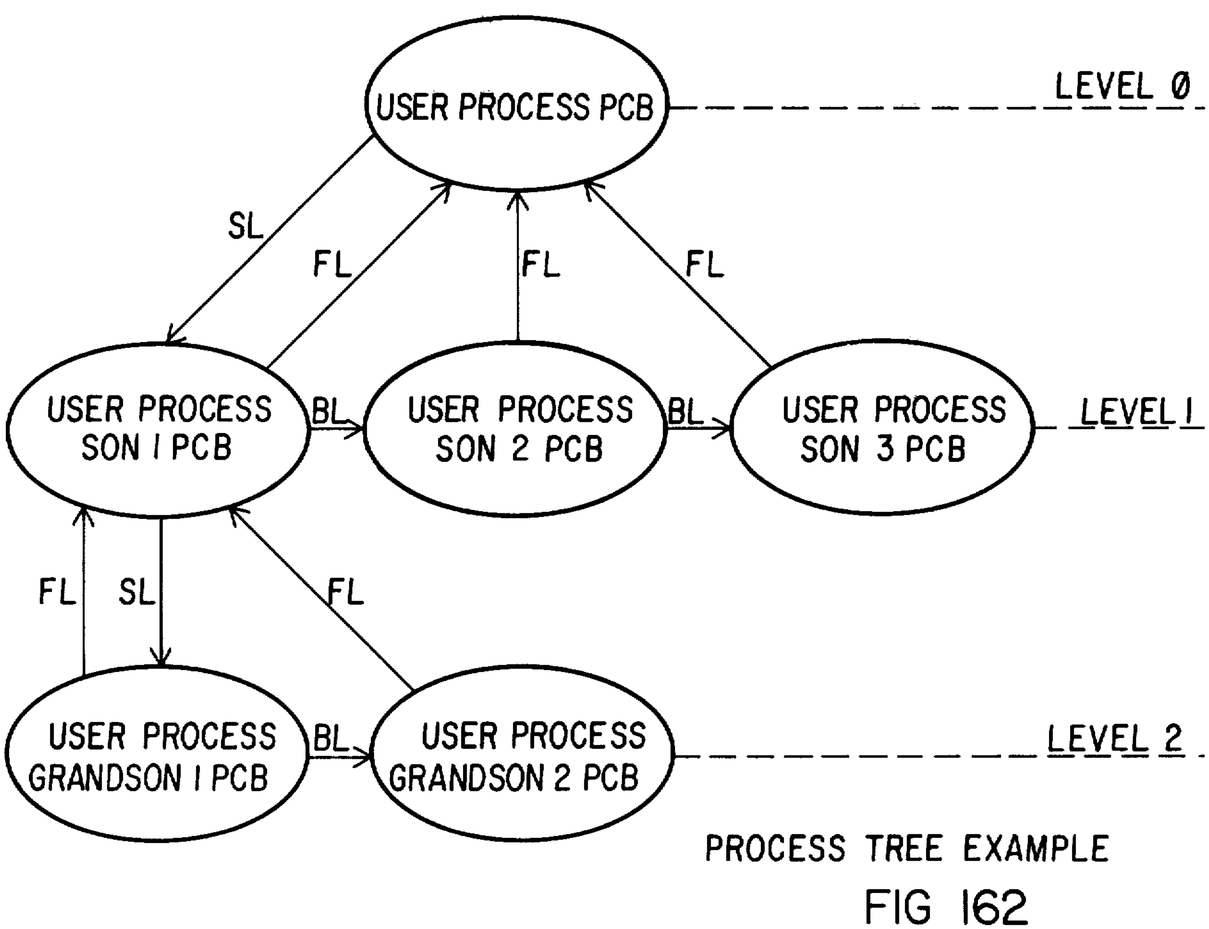

FIG. 162 is a tree diagram illustrating the use of processes.

Figure 163:
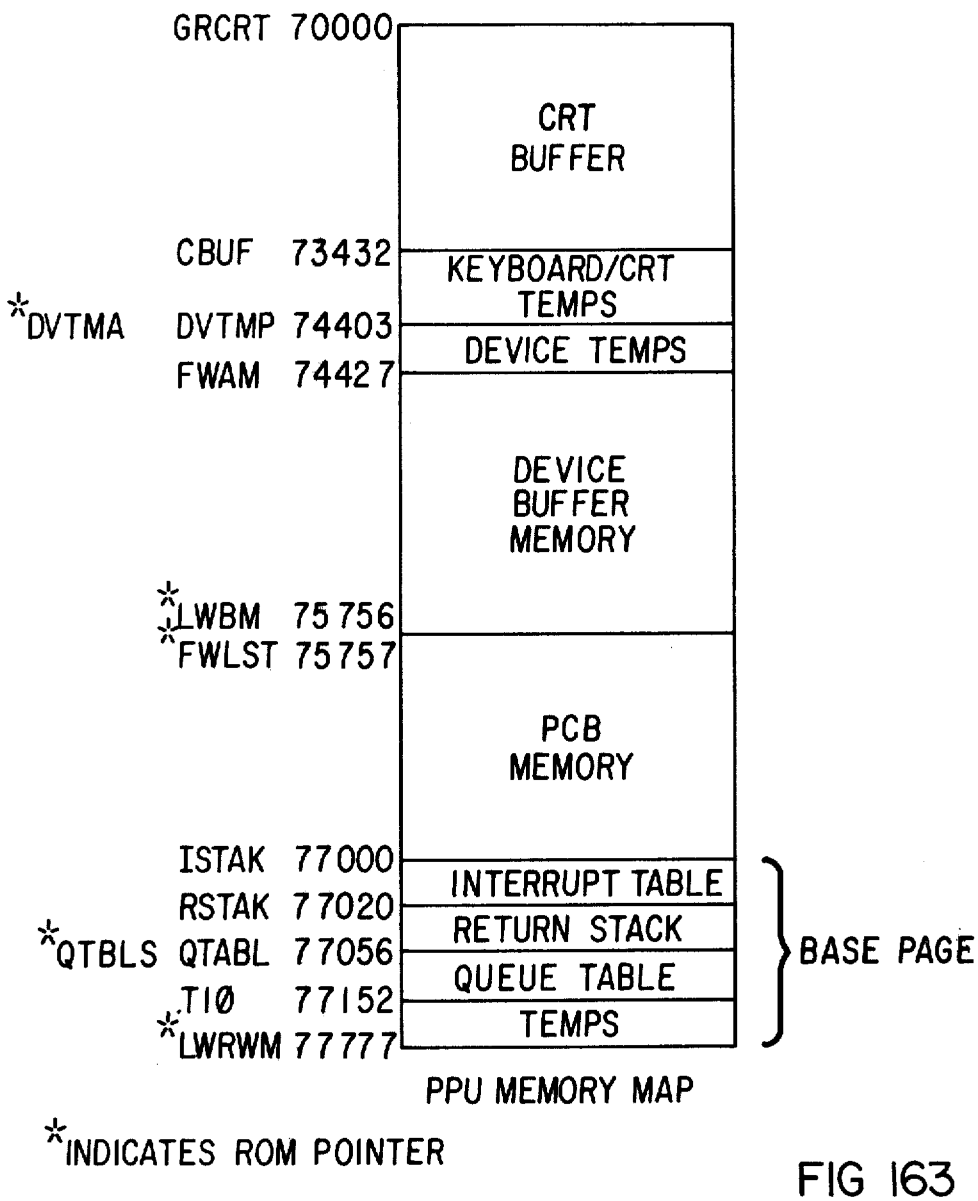

FIG. 163 is a memory map of memory managed by the PPU of FIG. 43.

Figure 164:
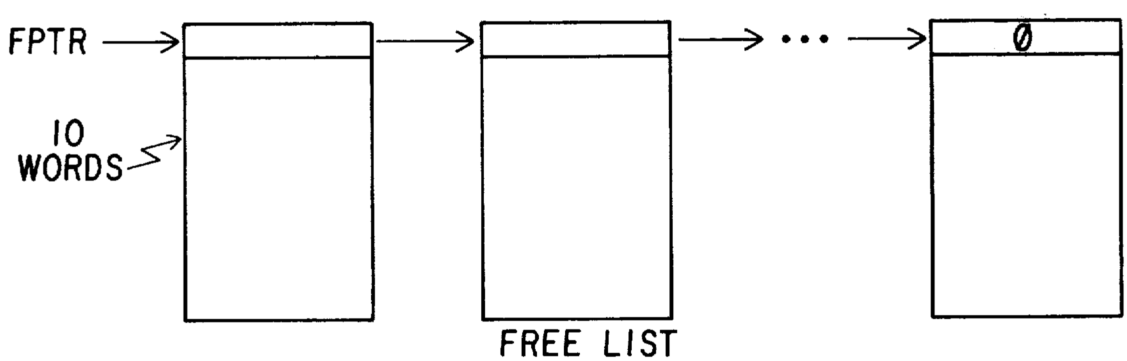

FIG. 164 is a diagram illustrating the structure of the process control block memory free list.

Figure 165:
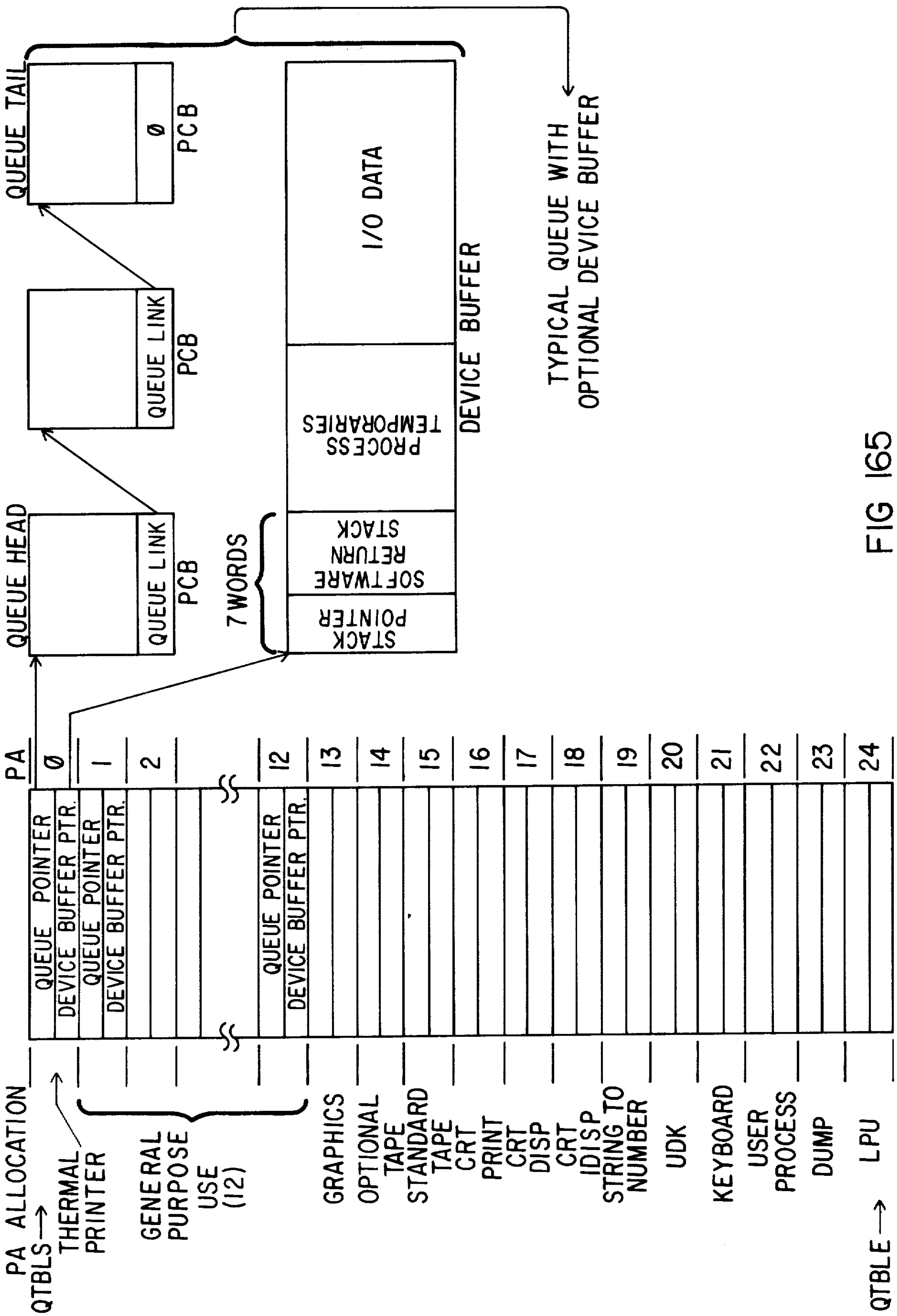

FIG. 165 is a memory diagram illustrating the queue table managed by the PPU of FIG. 43.

Figure 166:
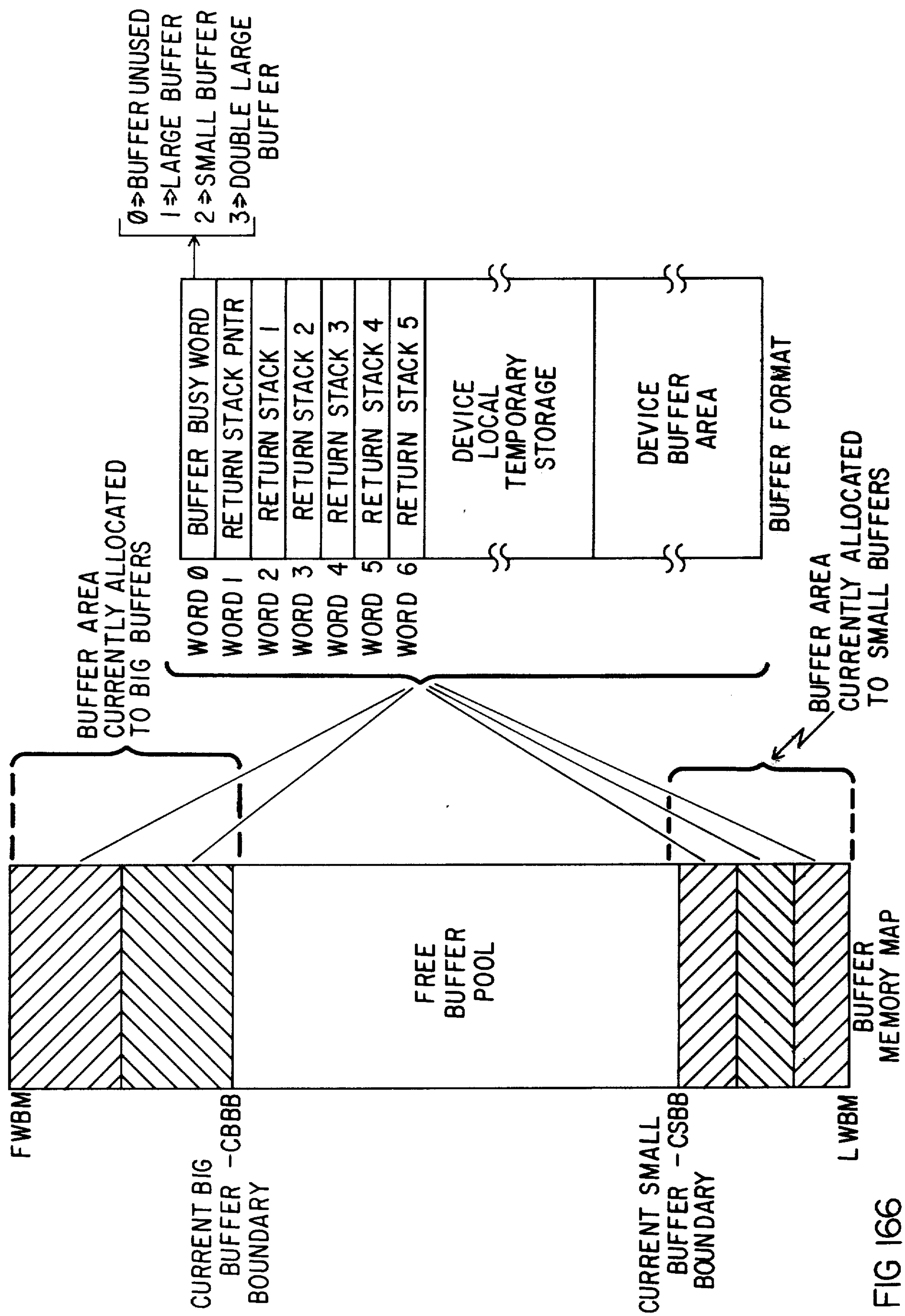

FIG. 166 is a memory diagram illustrating the management of buffers by the PPU of FIG. 43.

Figures 167, 168:
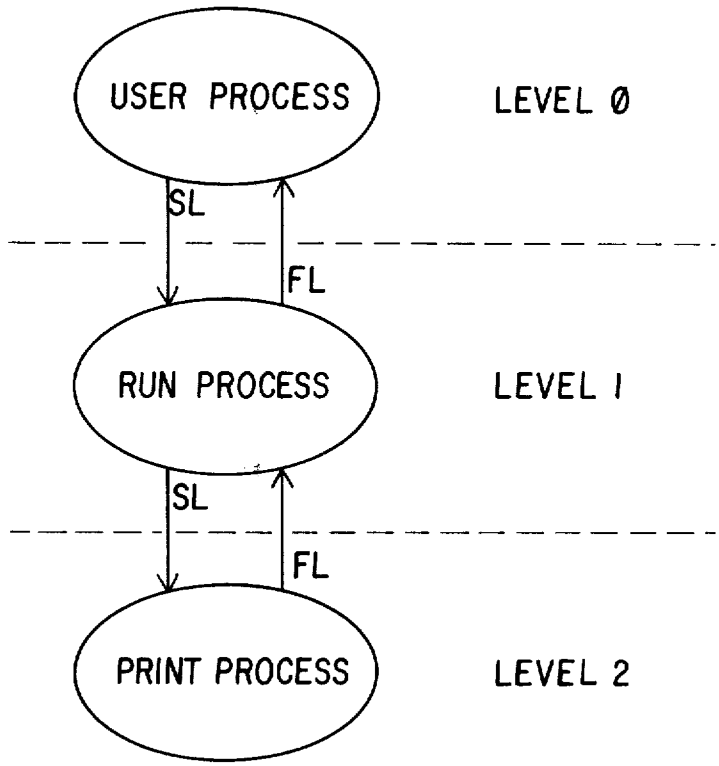

FIG. 167 is a tree diagram illustrating a typical application of PPU processes.

FIG. 168 is a diagram illustrating communication between the LPU and PPU of FIG. 43.

Figure 169:
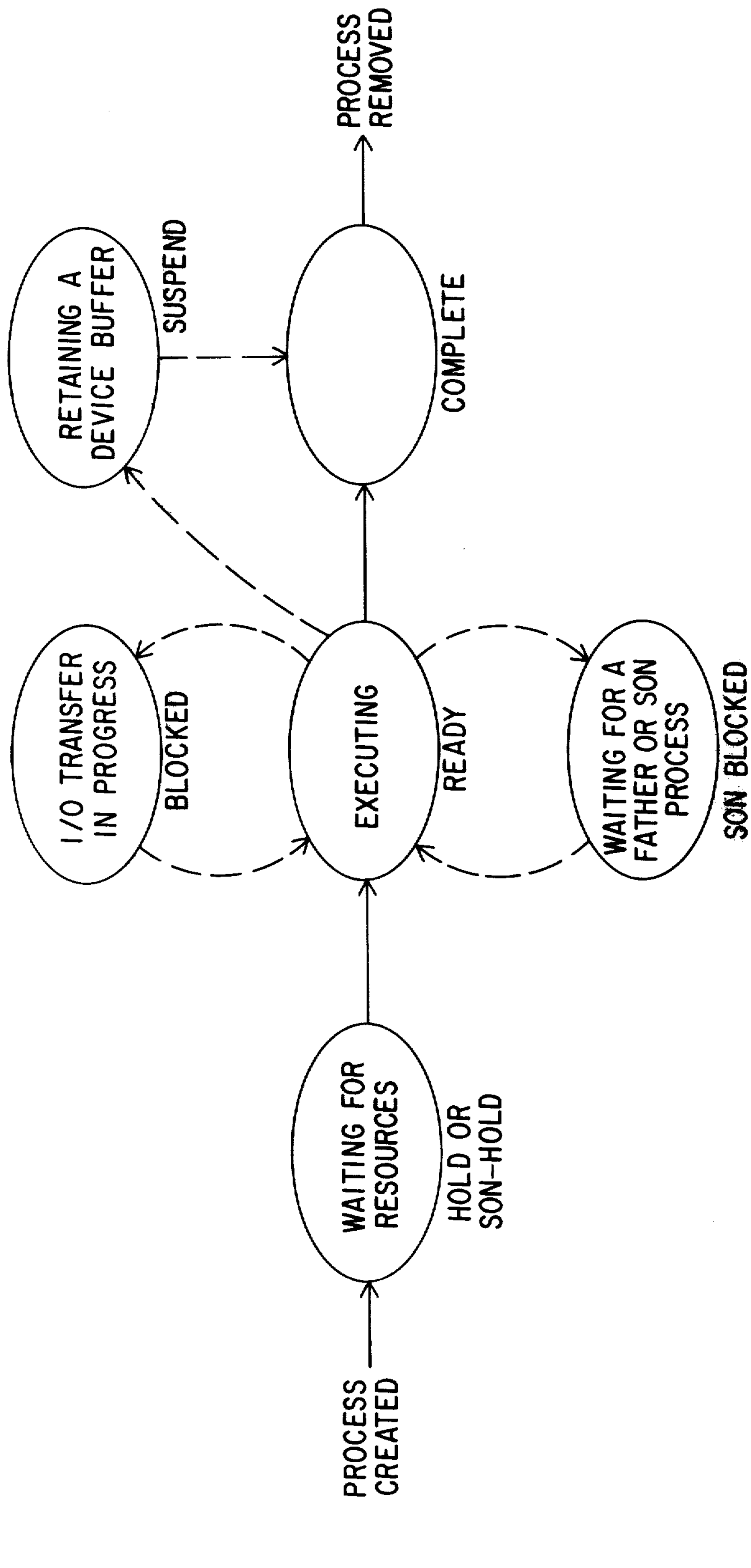

FIG. 169 is a tree diagram illustrating the various states in the career of a process.

Figure 170:
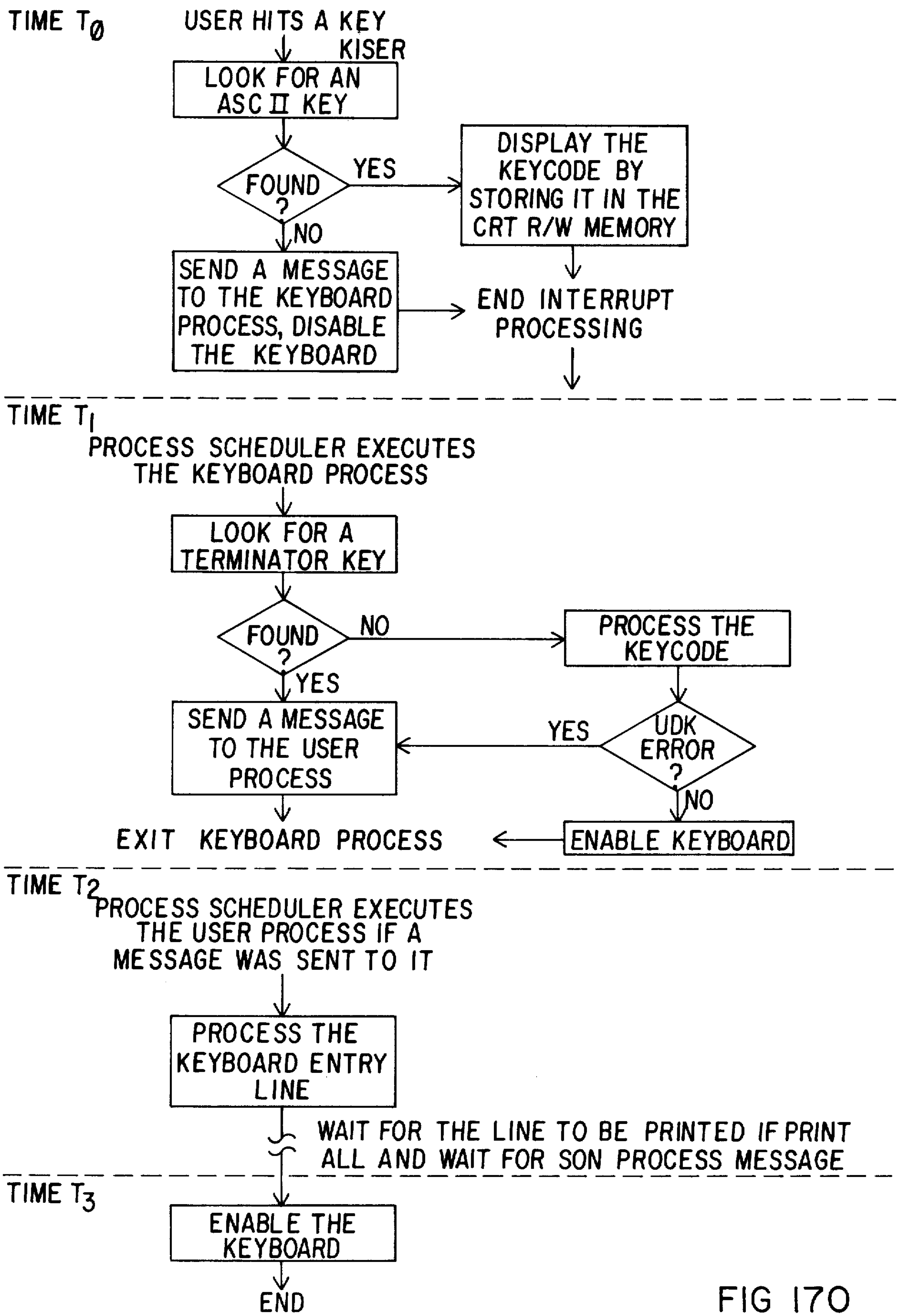

FIG. 170 is a series of flow charts illustrating operation of the PPU of FIG. 43 in connection with key entries.

Figure 171:
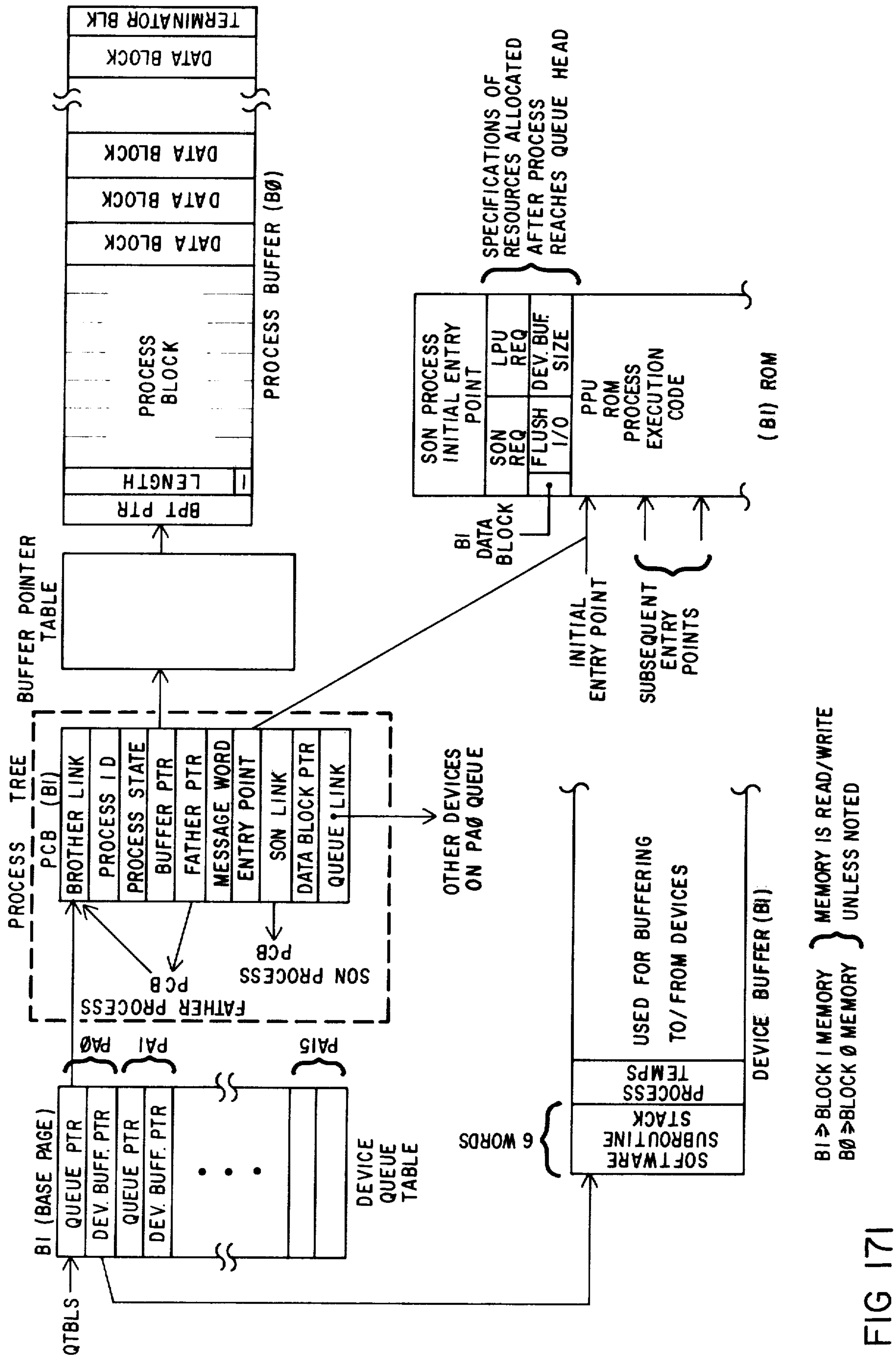

FIG. 171 is a diagram illustrating the structure of the process control mechanism of the PPU of FIG. 43.

Figure 172:
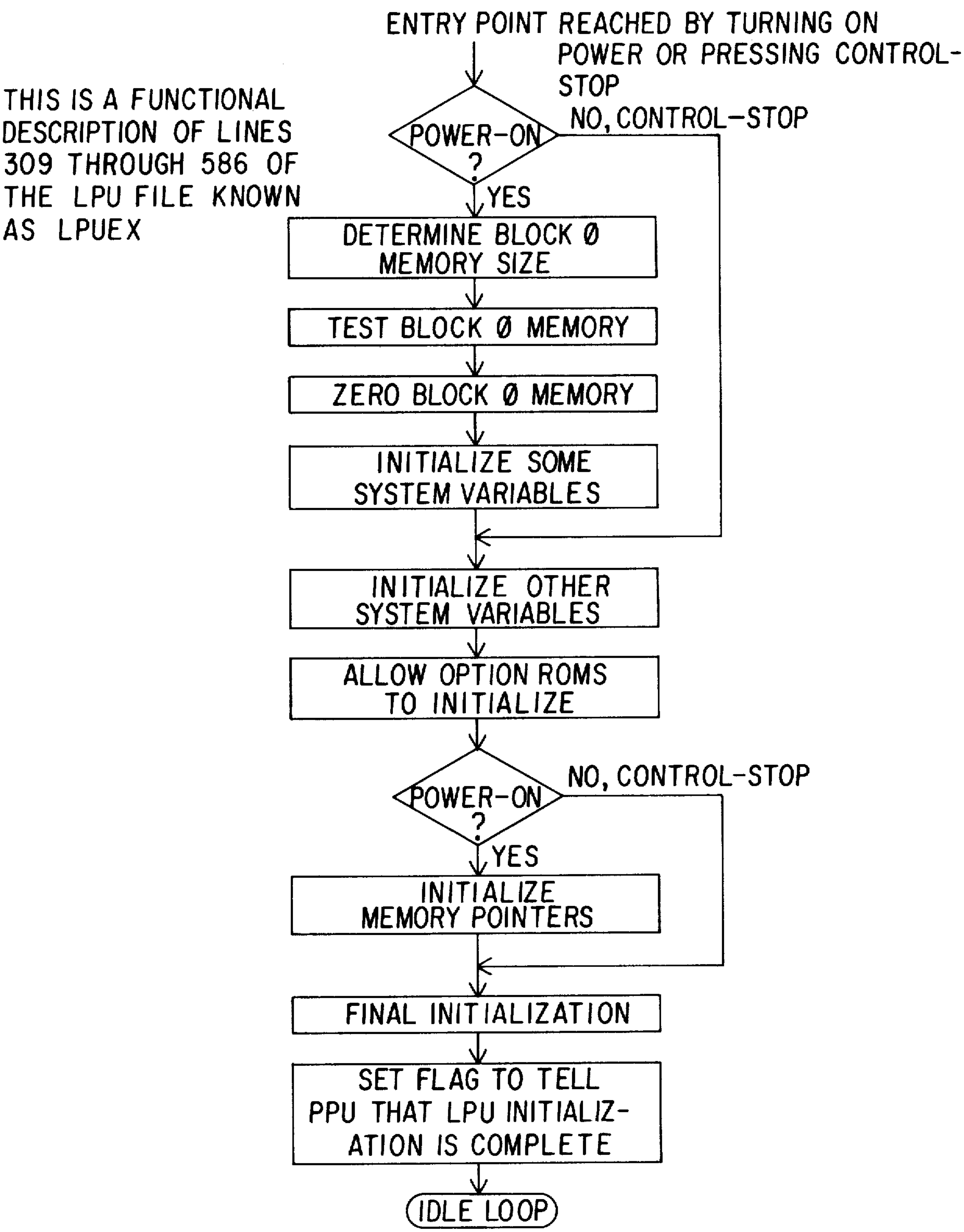

FIG. 172 is a flow chart of a portion of LPU code referred to as LPUEX.

Figure 173:
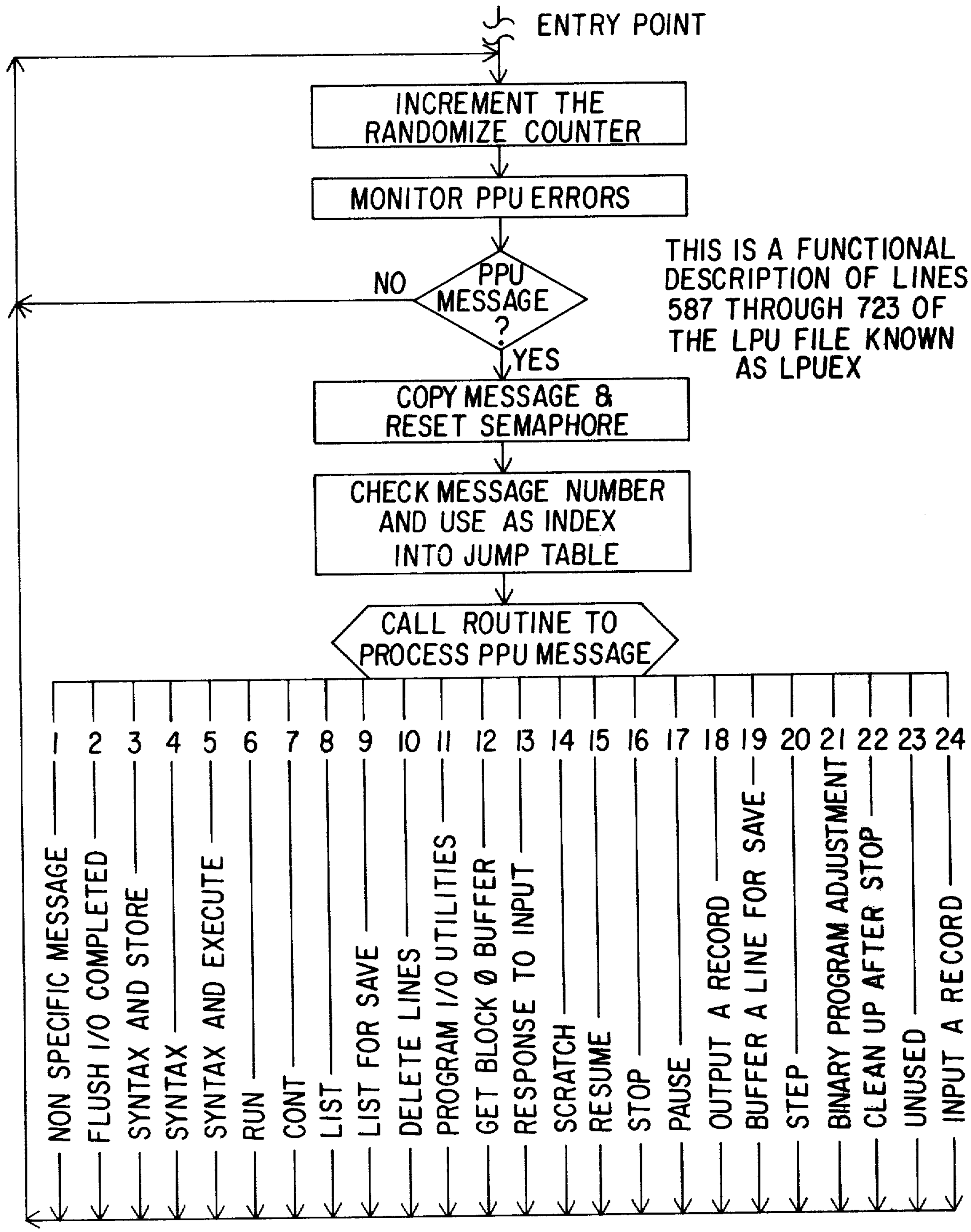

FIG. 173 is a flow chart of another portion of LPU code referred to as LPUEX.

Figure 174:
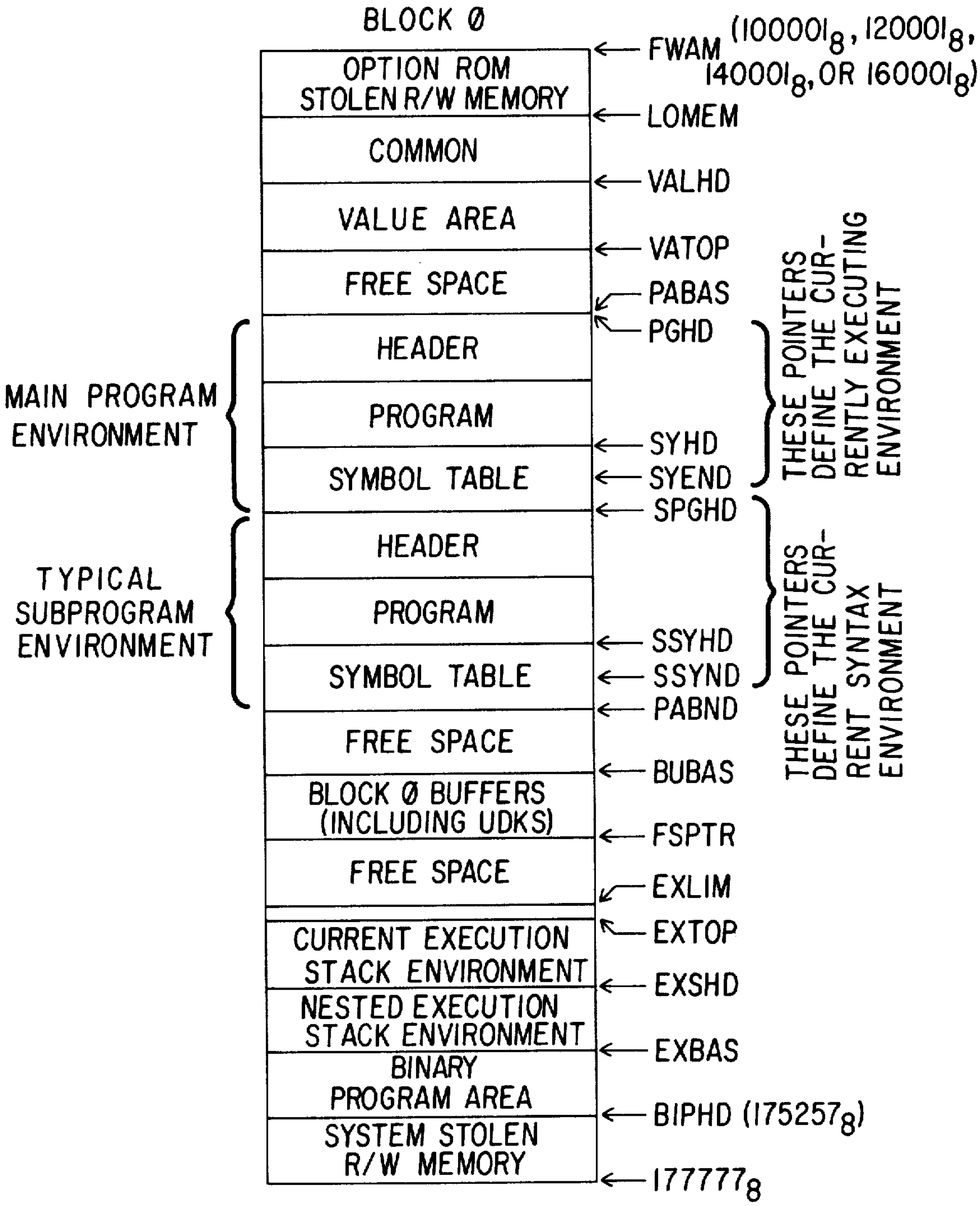

FIG. 174 is a memory map of block $\phi$ of FIG. 43.

Figure 175:
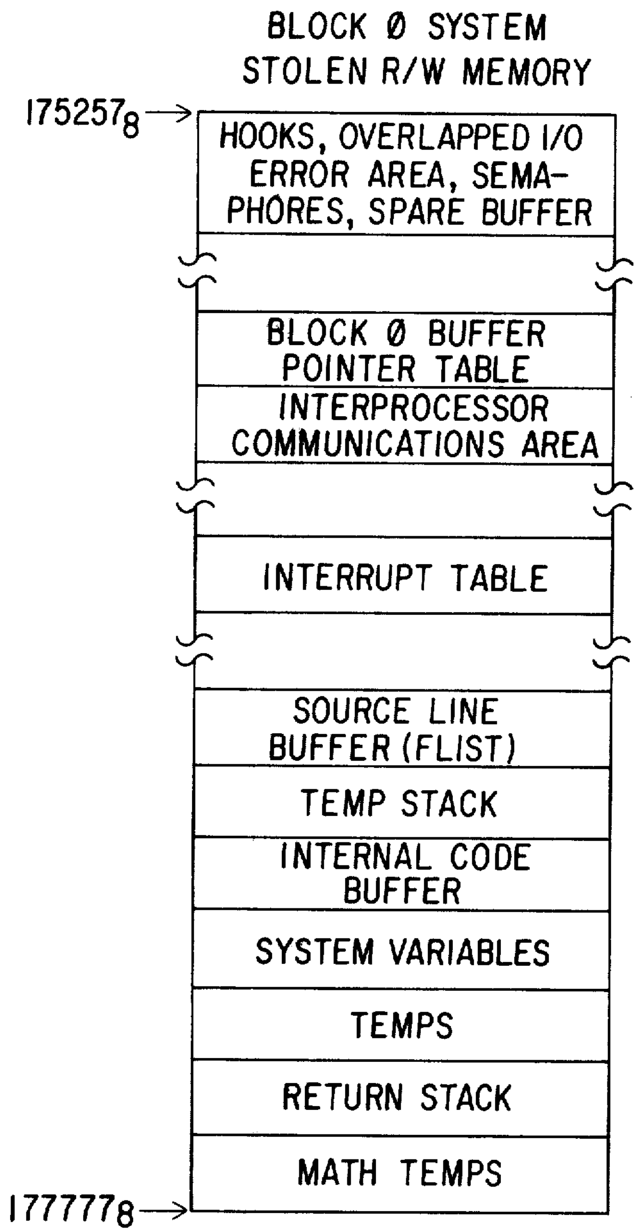

FIG. 175 is a memory map of stolen read-write memory in block $\phi$.

Figure 176:
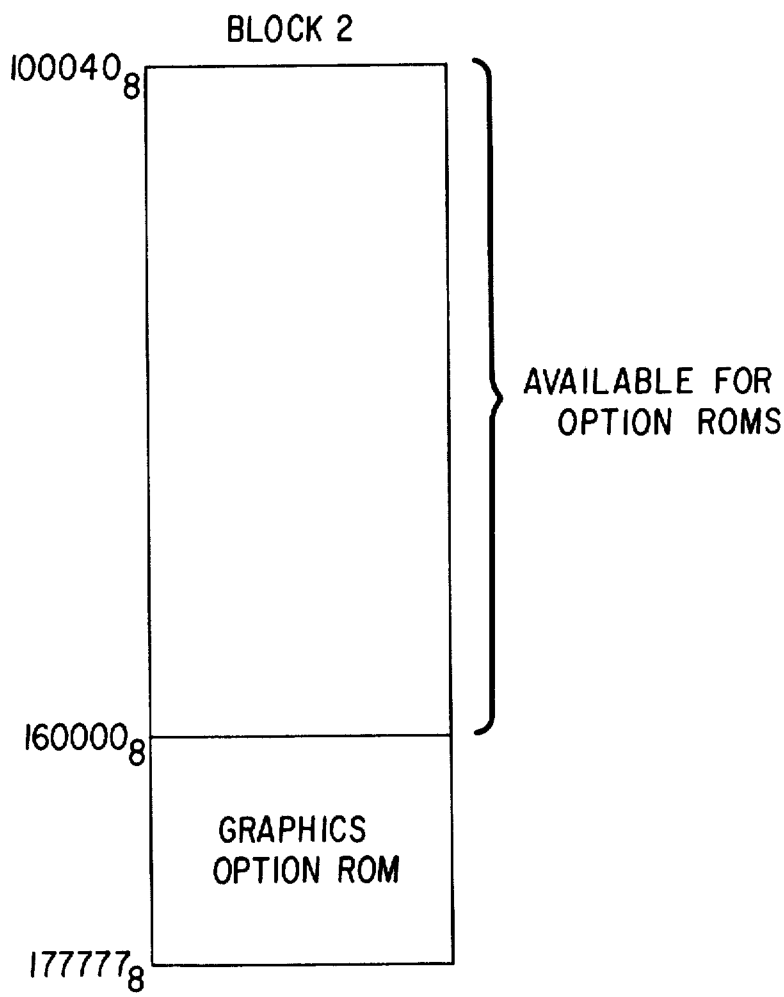

FIG. 176 is a memory map of block 2 of FIG. 43.

Figure 177:
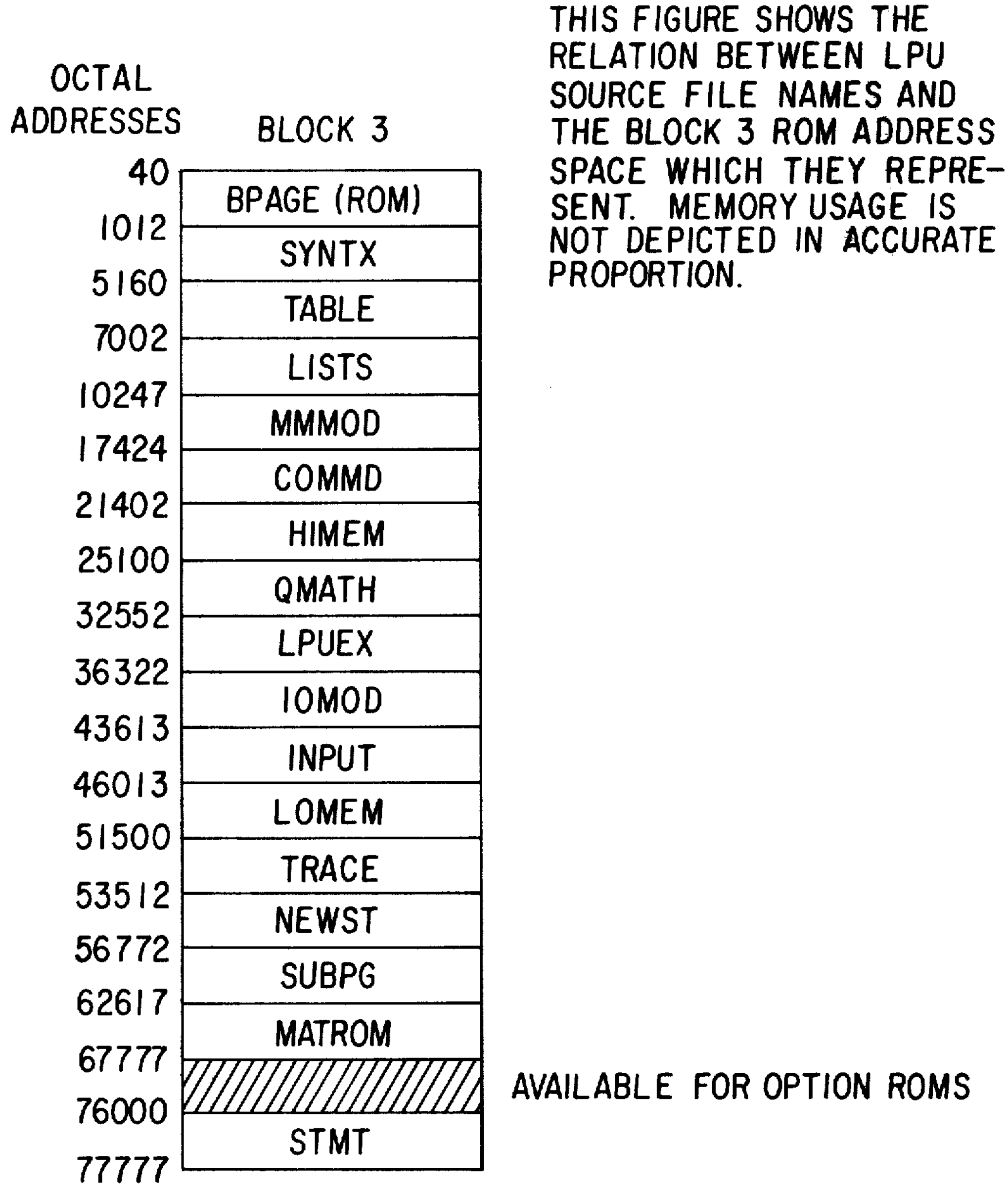

FIG. 177 is a memory map of block 3 of FIG. 43.

Figure 178:
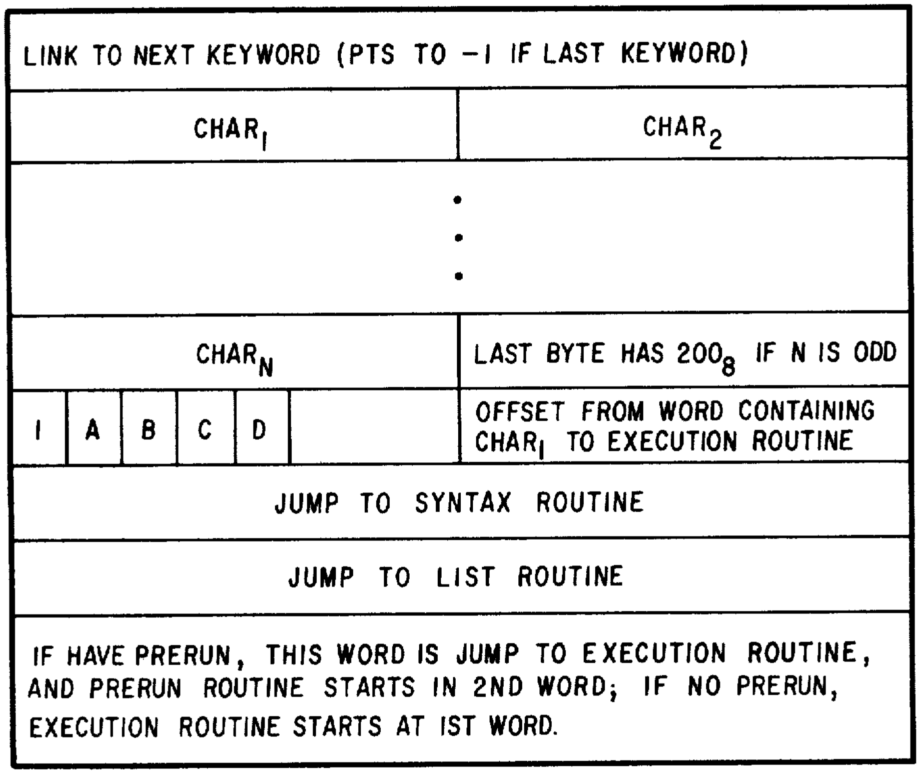

FIG. 178 is a diagram illustrating the primary keyword format used in syntaxing statements.

FIG. 179 is a series of diagrams illustrating the various internal formats for lines of user programming.

Figure 180:
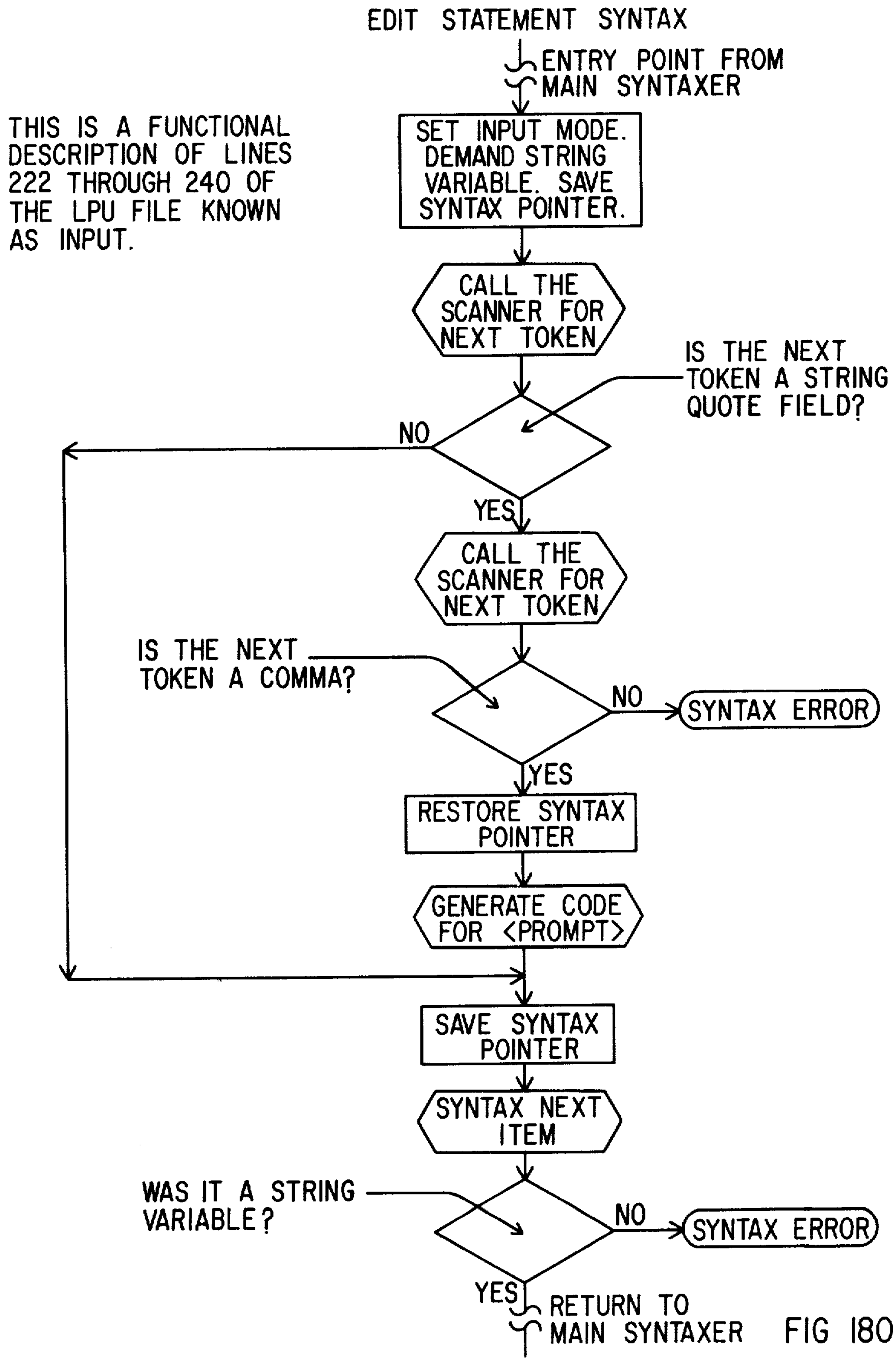

FIG. 180 is a simplified flow chart illustrating the method used to check the syntax of an EDIT statement.

Figure 181:
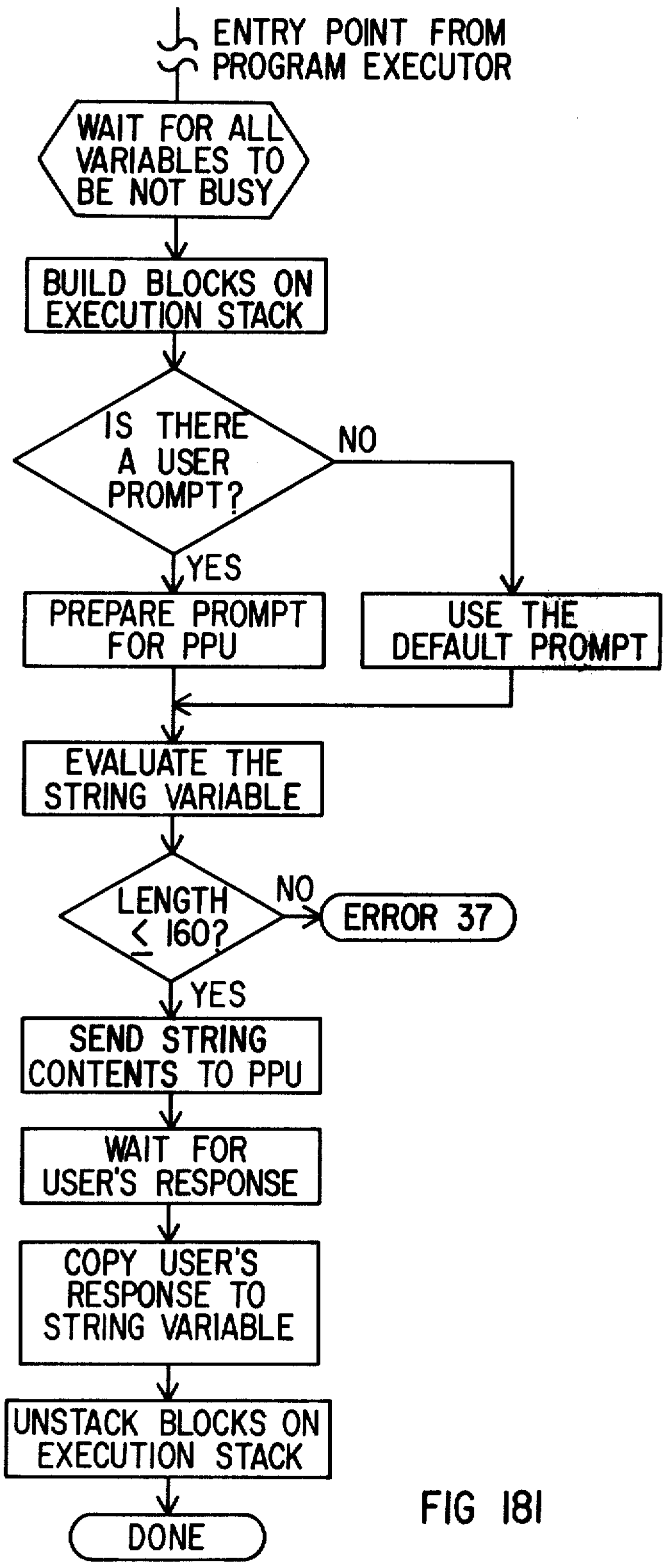

FIG. 181 is a simplified flow chart illustrating the method used to execute the EDIT statement.

Figure 182:
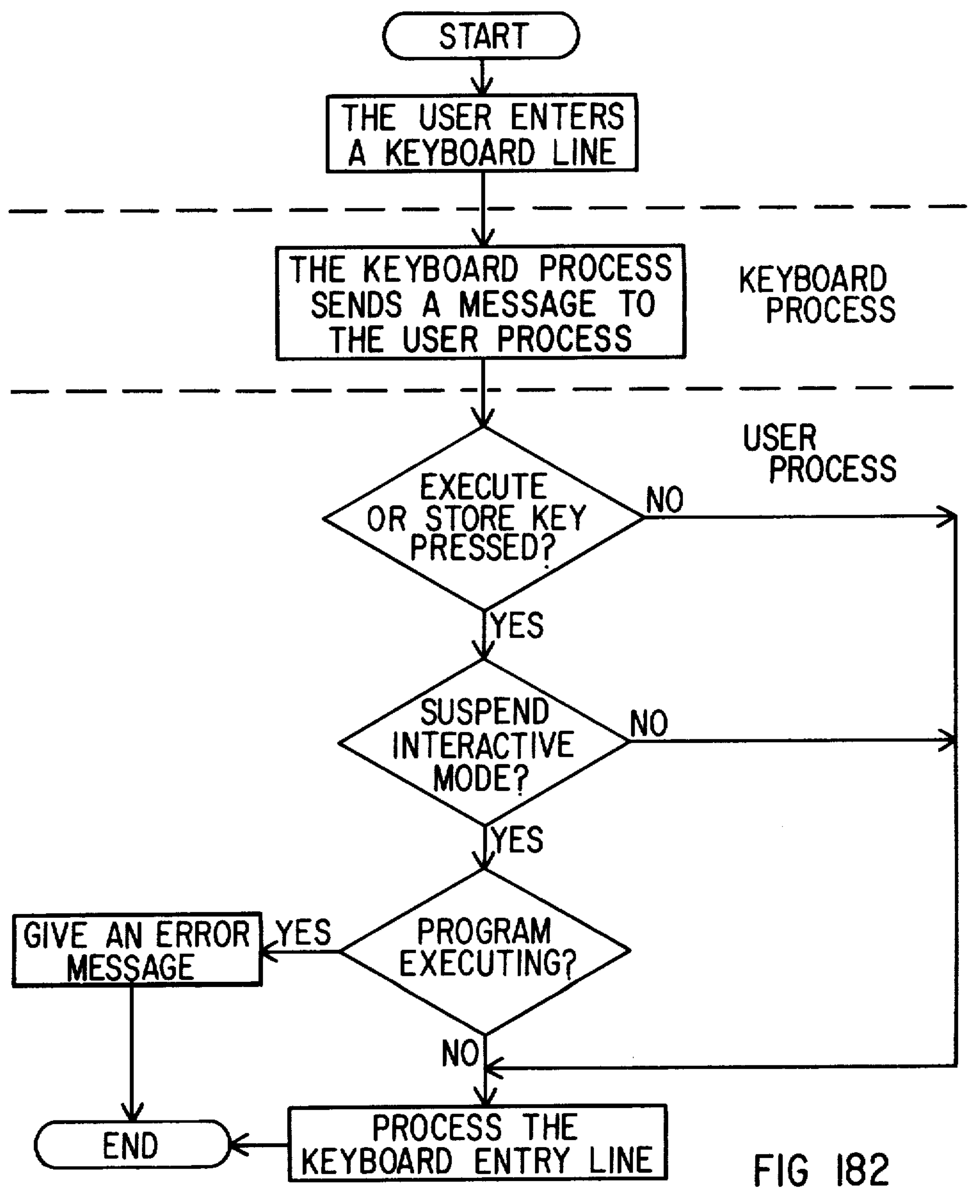

FIG. 182 is a flow chart illustrating suspension of the interactive mode.

FIG. 183 is a diagram illustrating the internal coding format for expressions.

FIG. 184 is a diagram illustrating the internal format for the symbol table.

Figure 185:
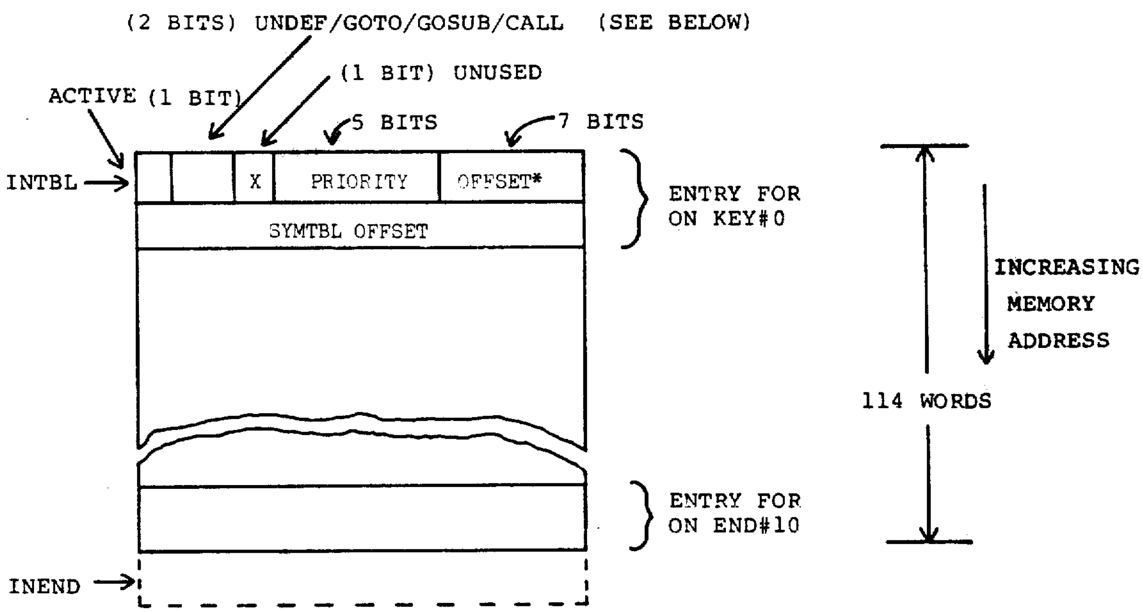

FIG. 185 is a diagram illustrating the internal format of the pseudo interrupt table.

Figure 186:
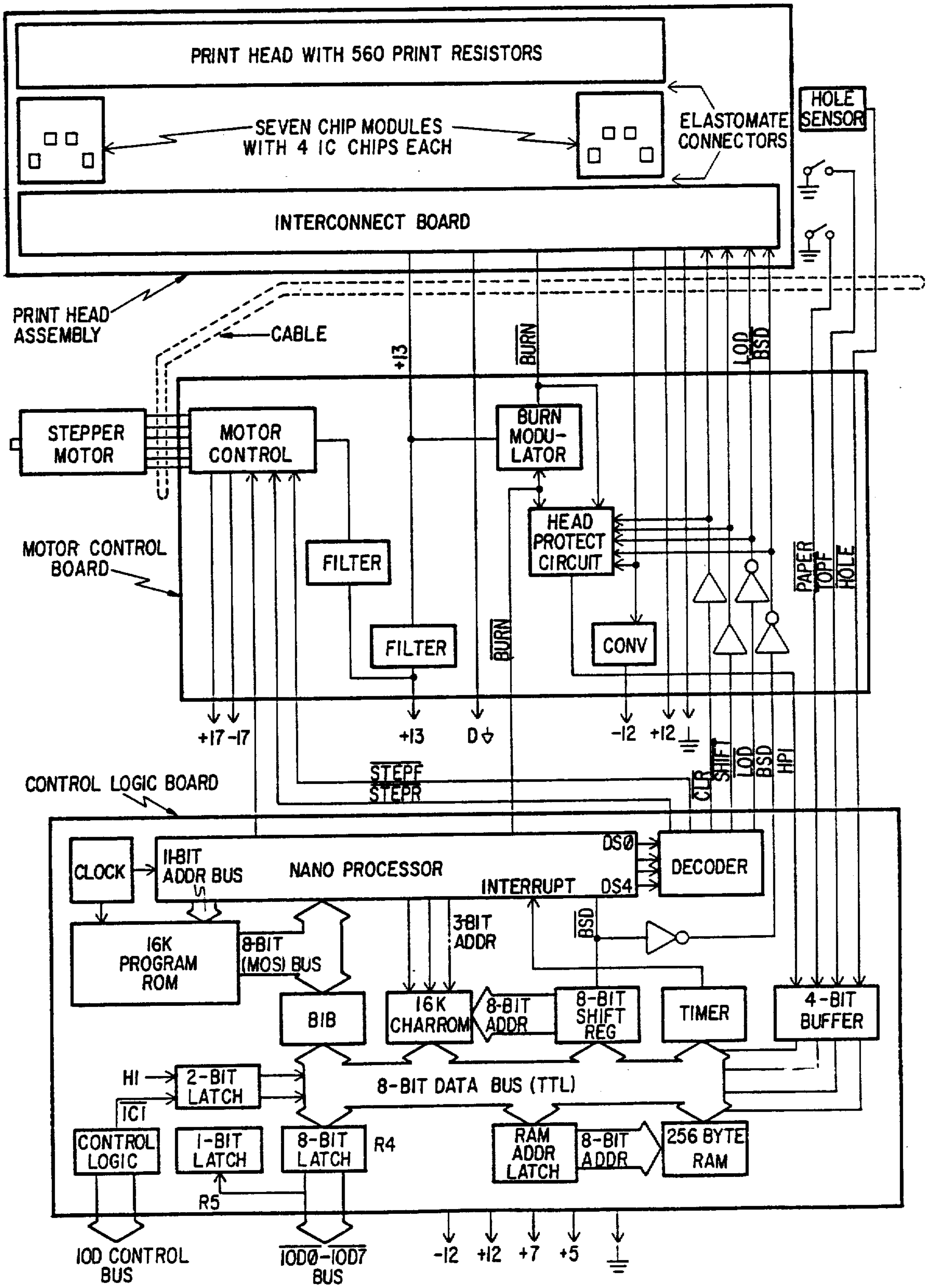

FIG. 186 is a block diagram of the hardware of the internal thermal printer in the calculator of FIG. 1.

Figure 187A:
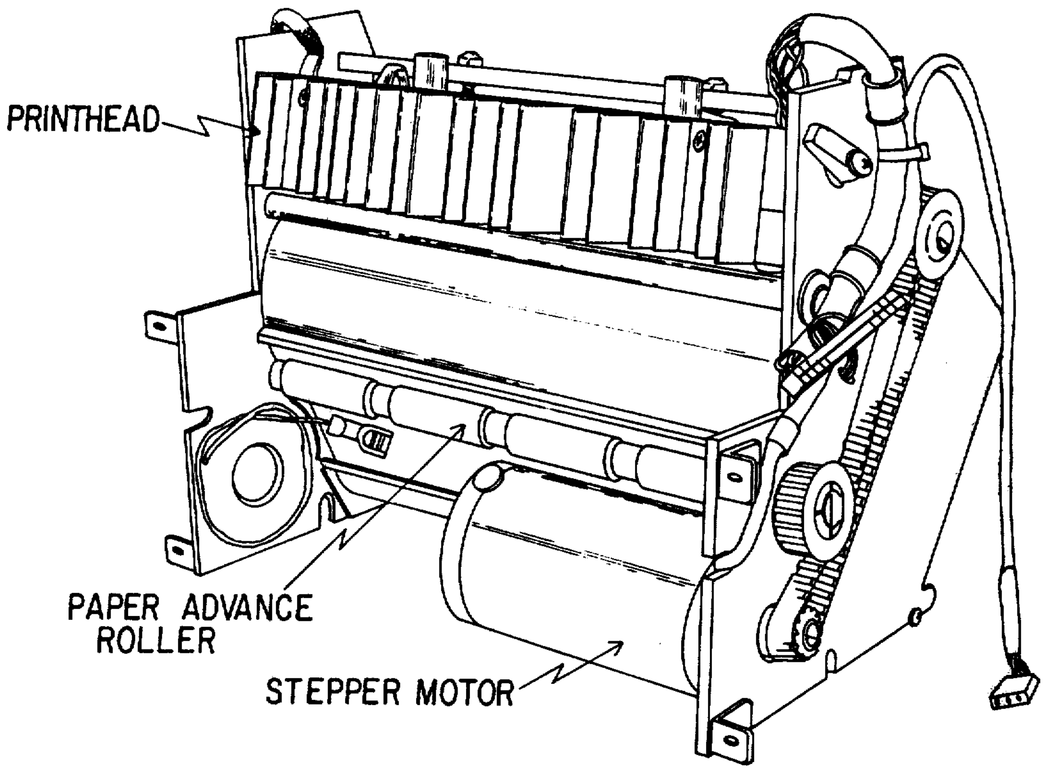
Figure 187B:
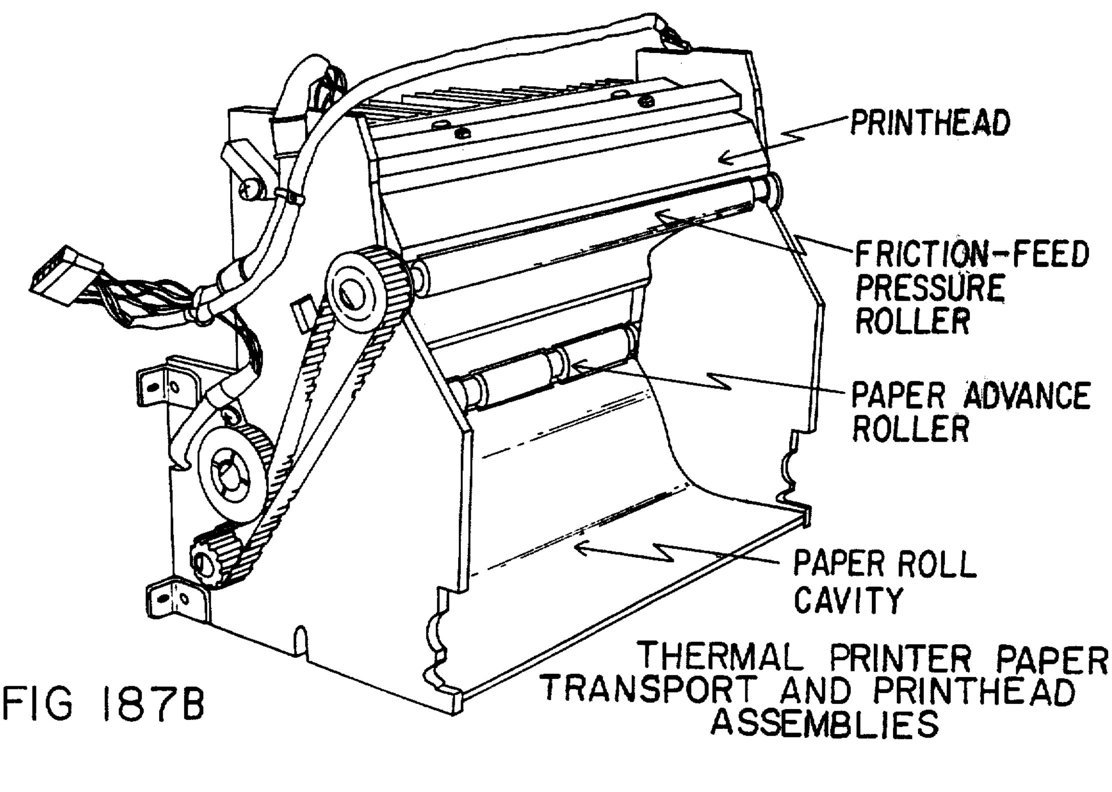

FIGS. 187A-B are front and rear perspective views of the print head and paper transport mechanism of the internal thermal printer in the calculator of FIG. 1.

Figure 188:
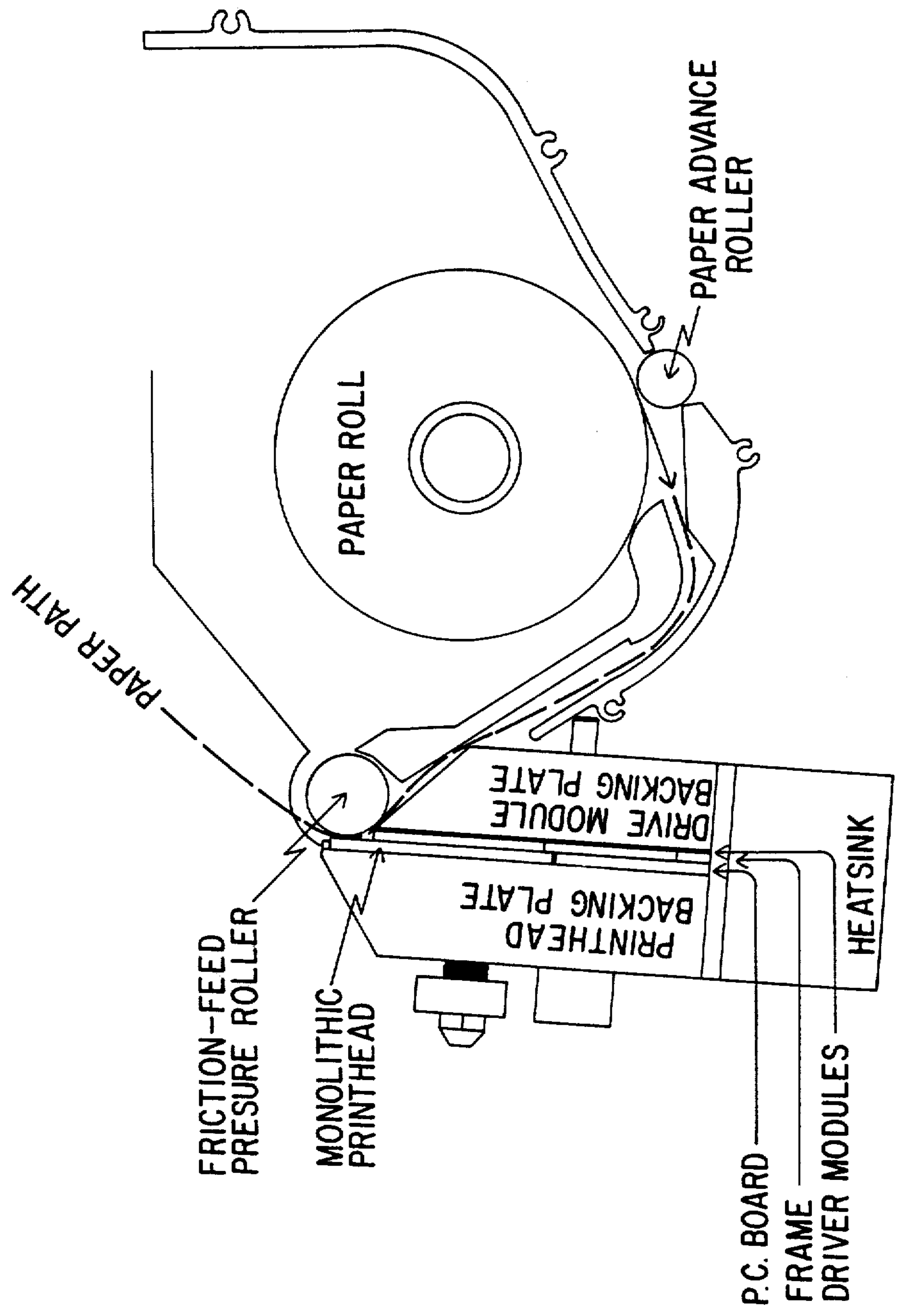

FIG. 188 is a sectional view of the print head and paper transport mechanism of the internal thermal printer in the calculator of FIG. 1.

Figure 189:
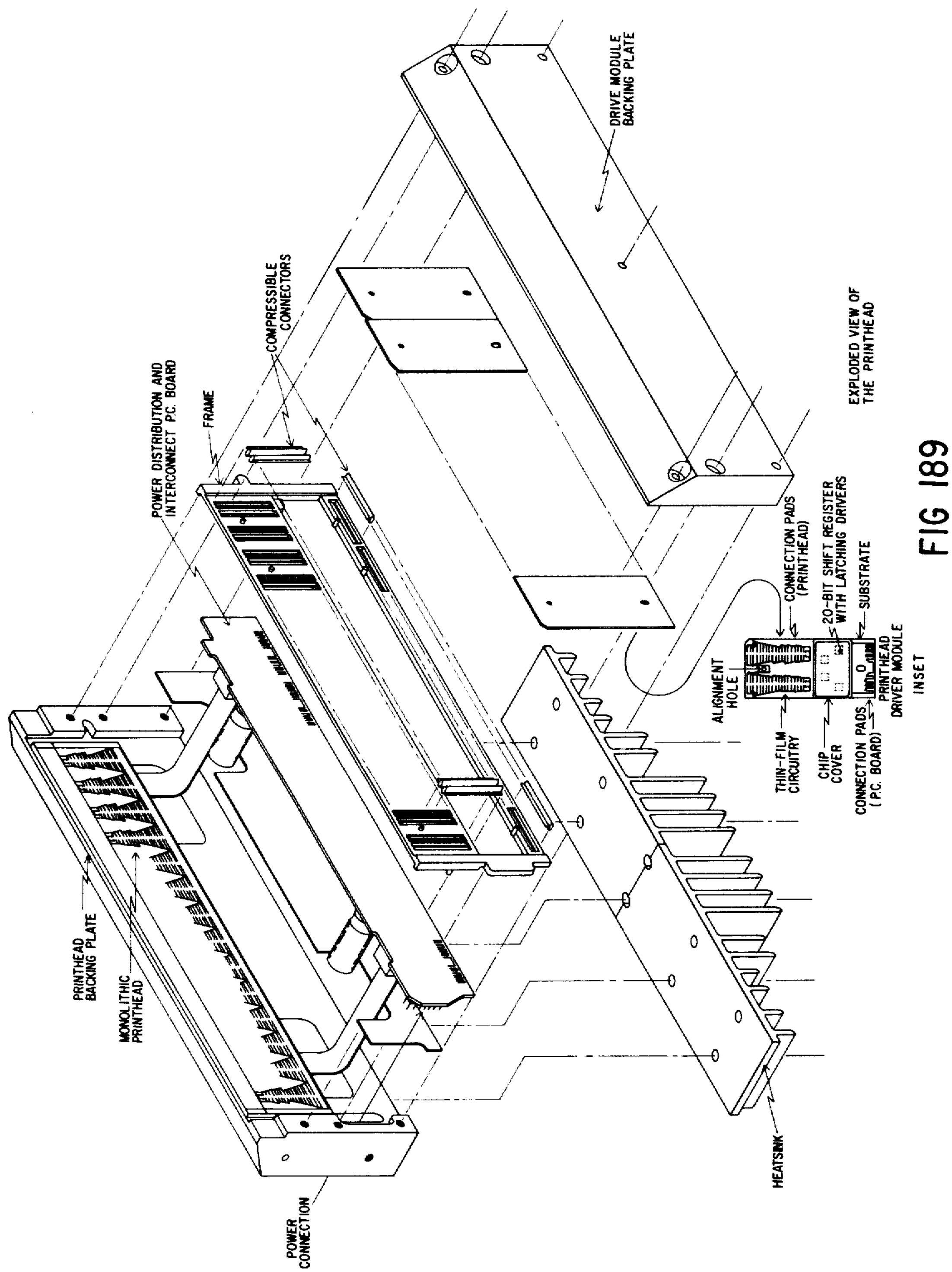

FIG. 189 is an assembly diagram illustrating the means by which the print head and its driver circuitry are interconnected.

Figure 190:
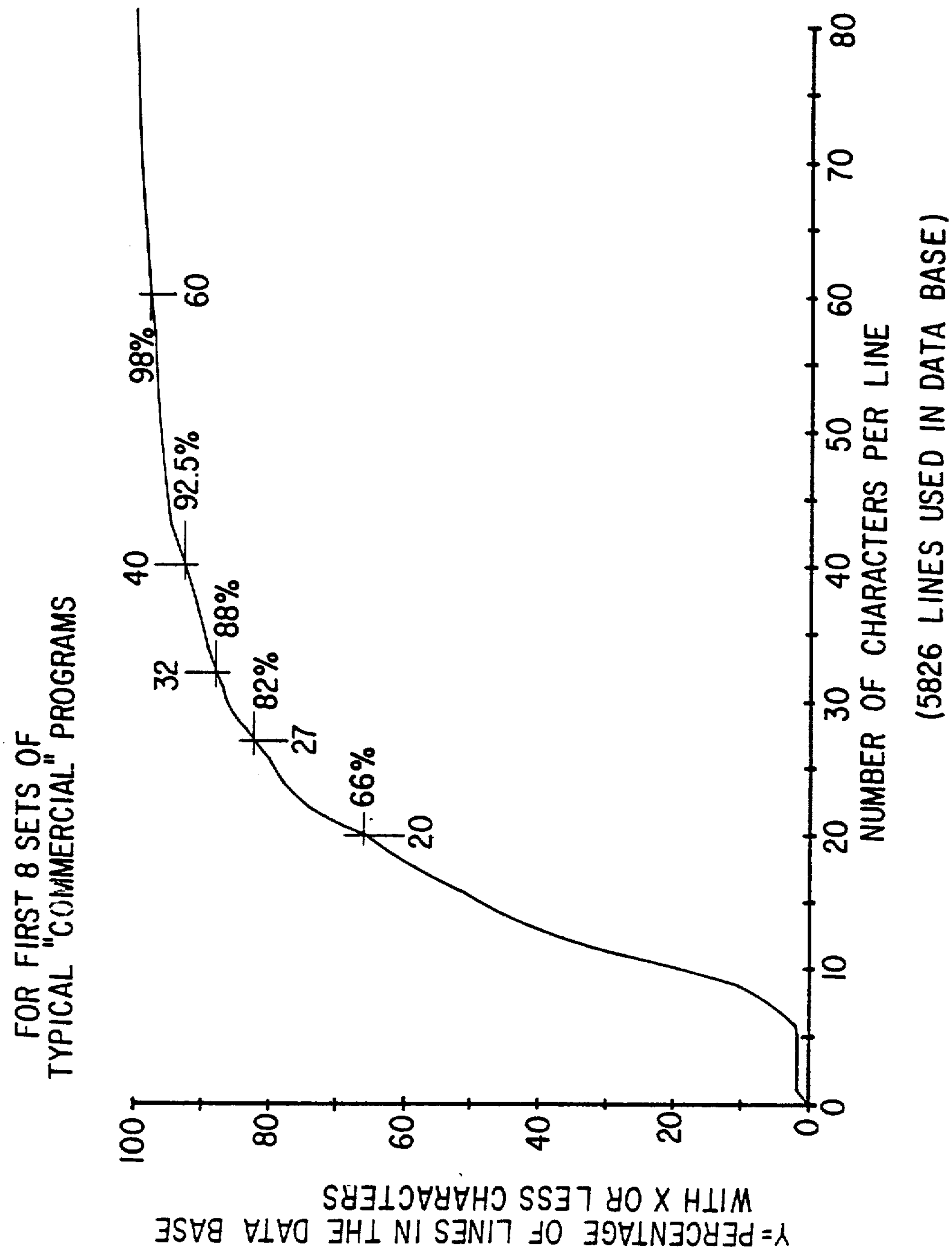

FIG. 190 is a graph representing the typical percentage of printed lines of information as a function of the number of characters per line.

Figure 191:
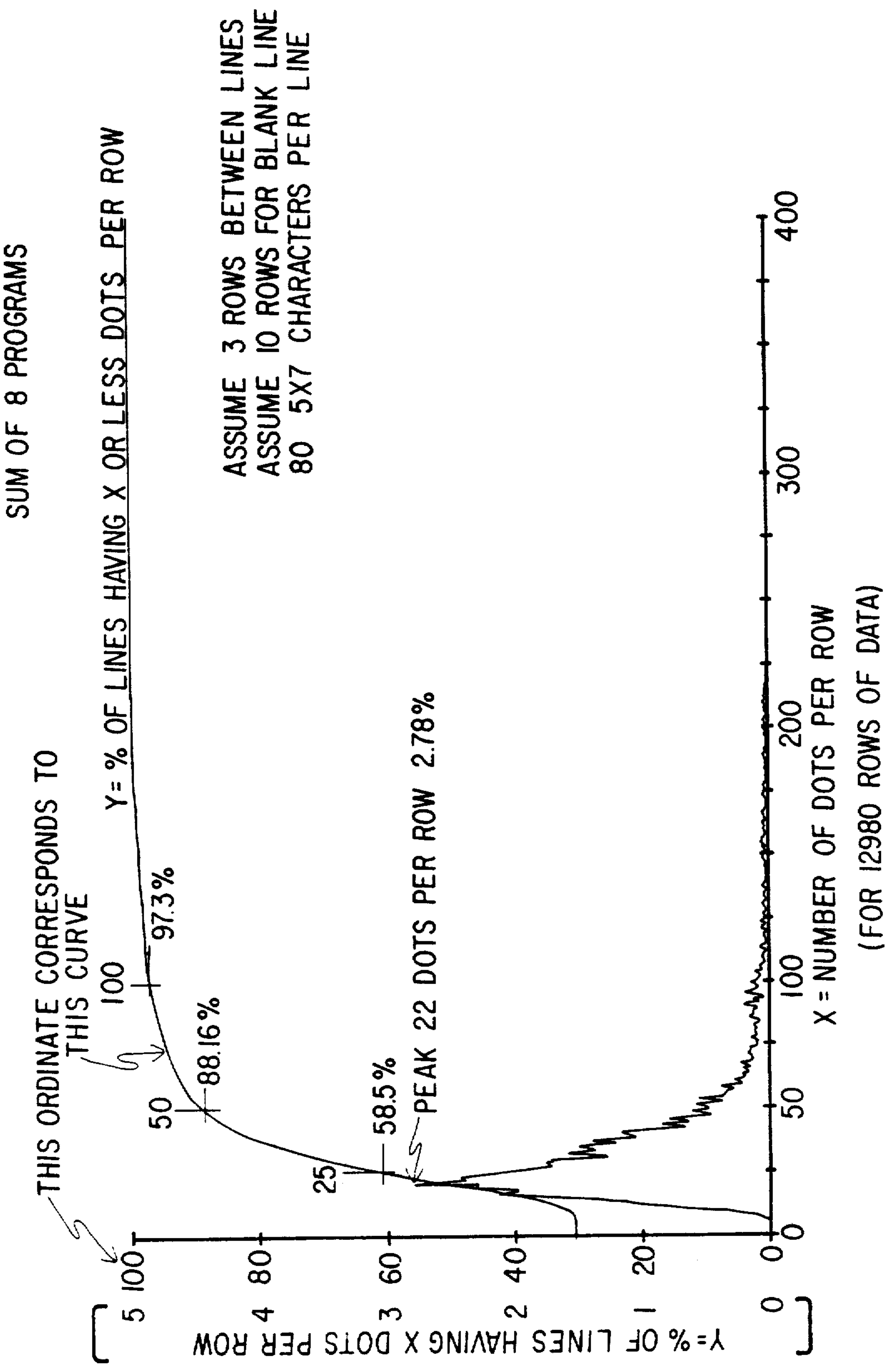

FIG. 191 is a graph representing the number of energized print resistors corresponding to the information in the graph of FIG. 190, assuming the $5\times7$ character font of the internal thermal printer in the calculator of FIG. 1.

Figure 192A:
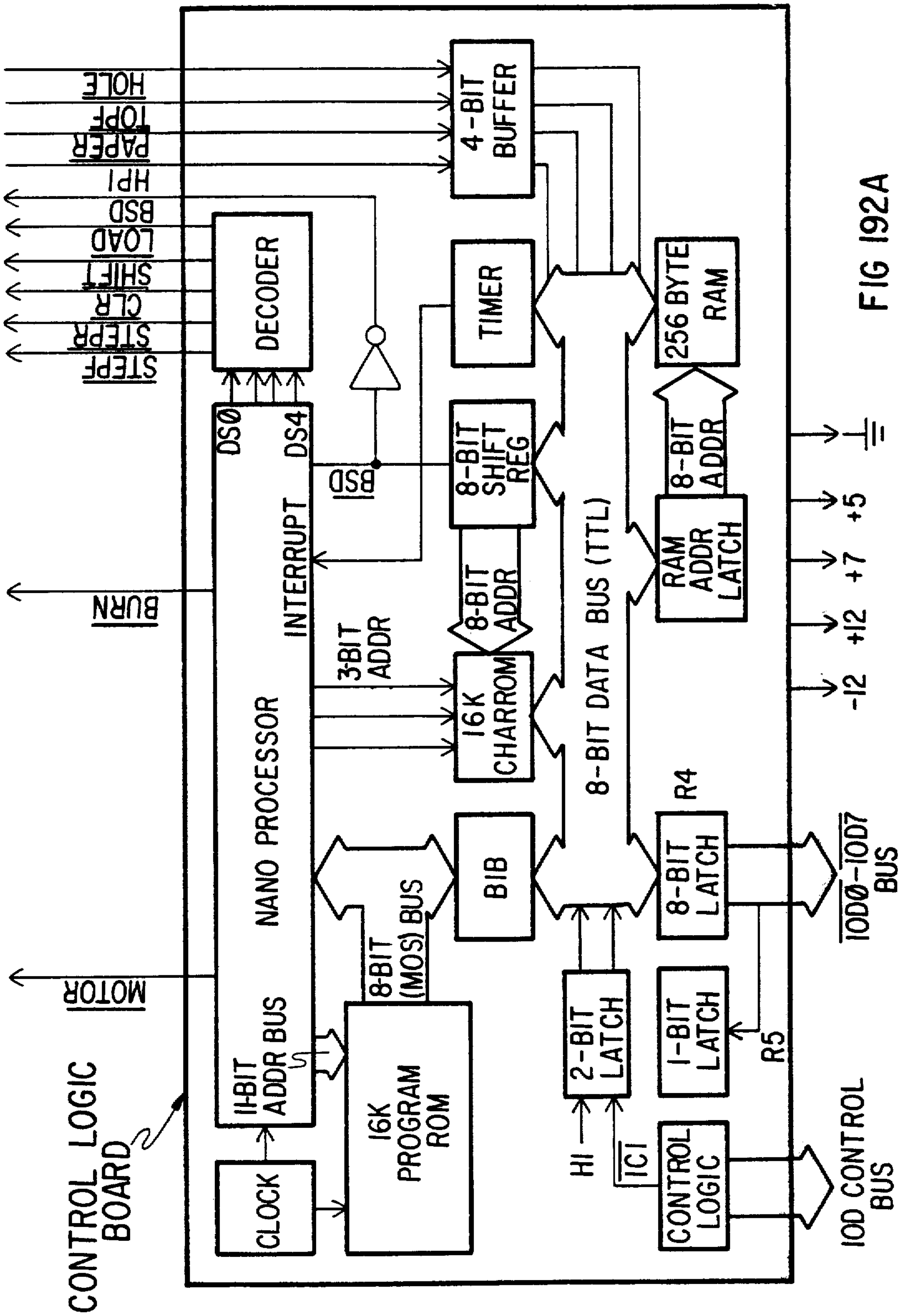
Figure 192B:
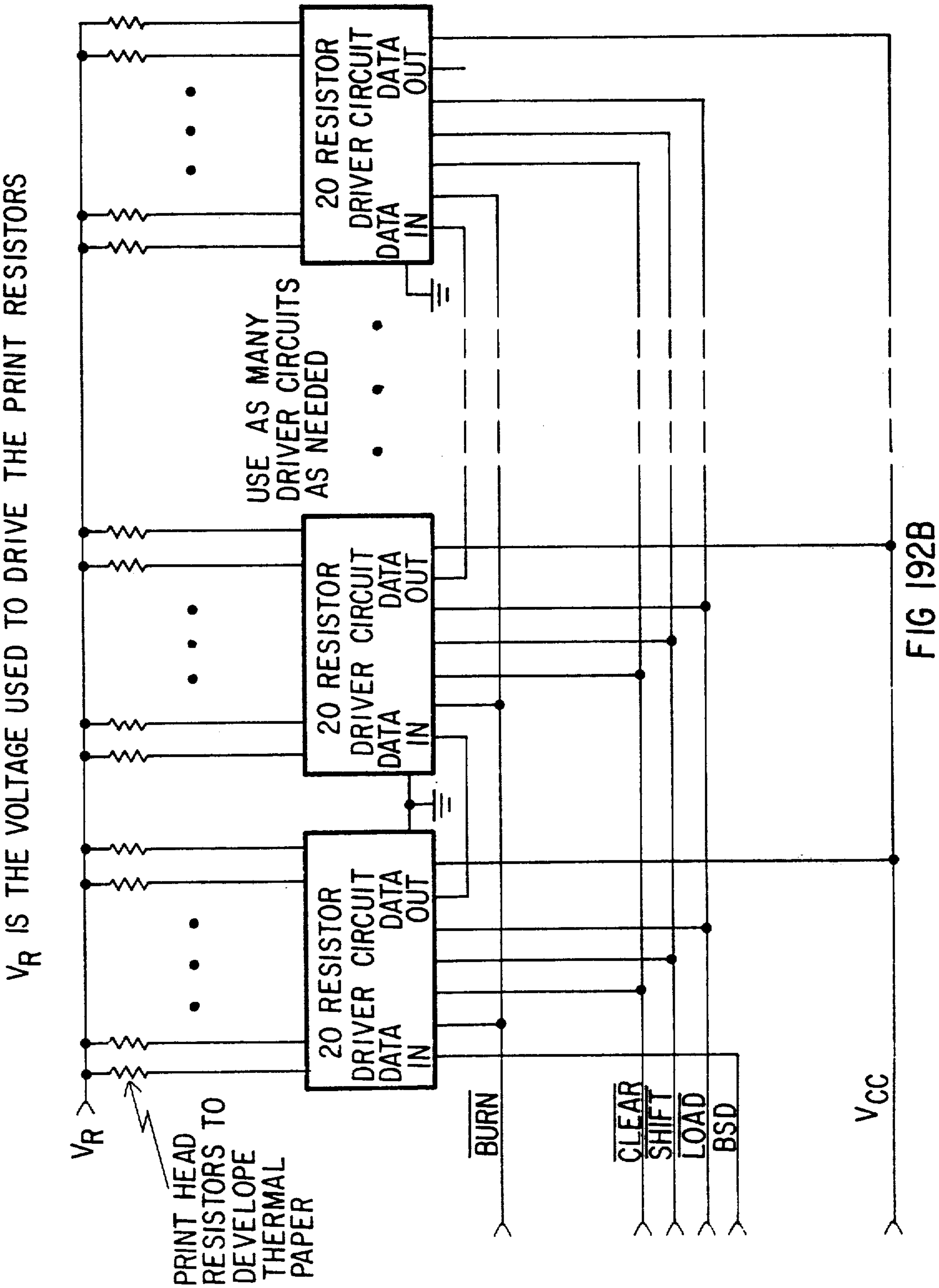

FIGS. 192A-B are a block diagram illustrating a generalized structure for selectively energizing the thermal print elements of a thermal printer.

Figure 193:
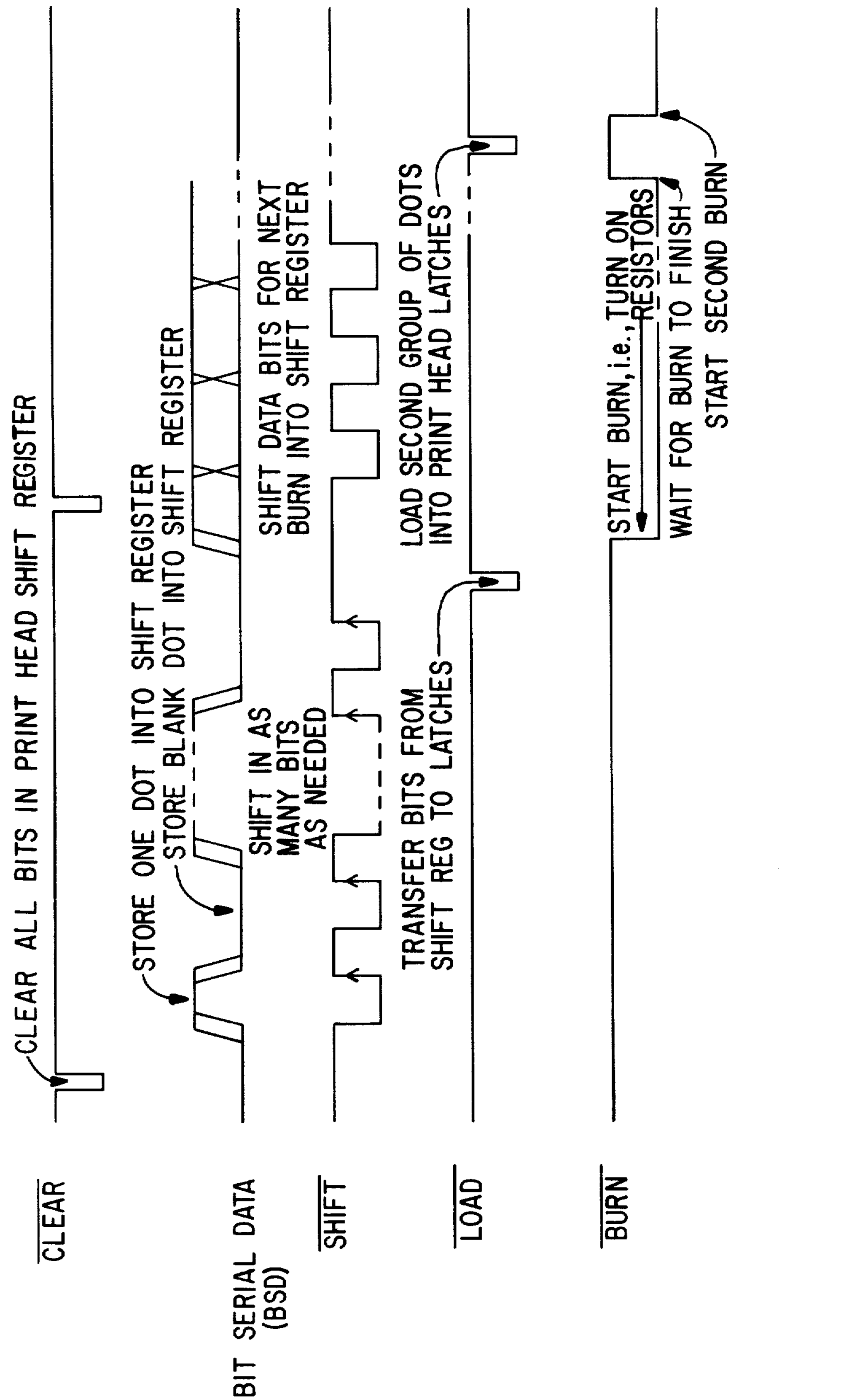

FIG. 193 is a waveform diagram illustrating the timing relationships between various signals of FIGS. 192A-B.

Figure 194:
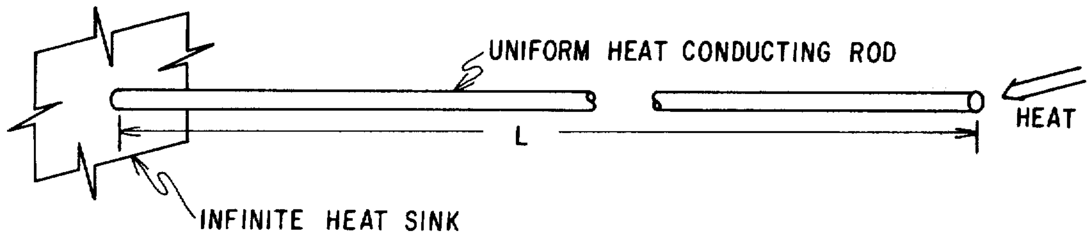
Figure 195:
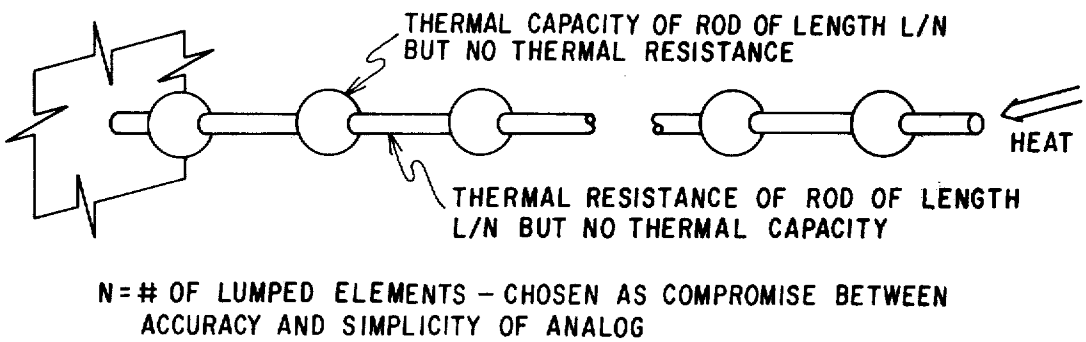

FIGS. 194 and 195 are diagrams illustrating a mode for transforming a continuous heat transfer system to its lumped analog.

Figure 196:
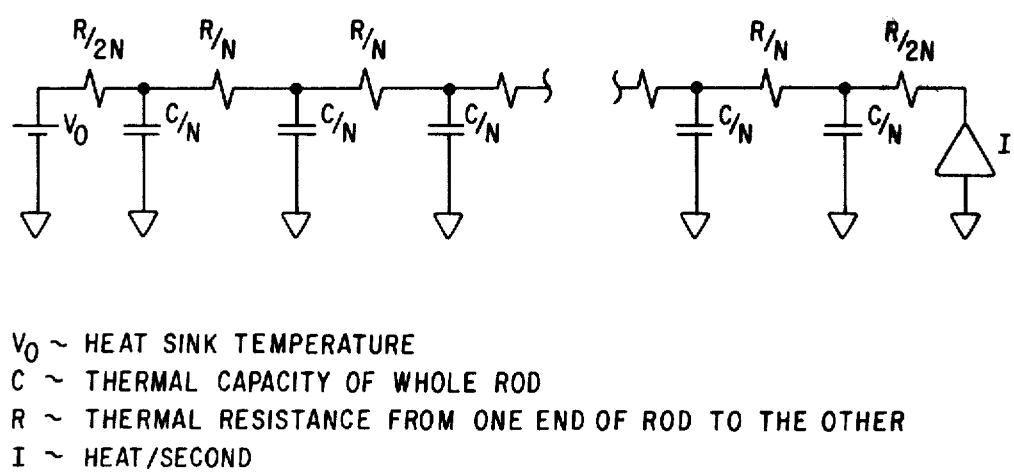

FIG. 196 is a diagram illustrating an electrical analog for the model of FIG. 195.

Figure 197:
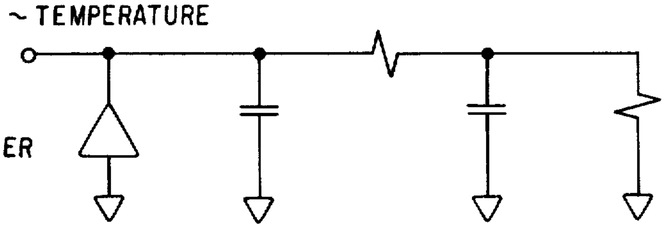

FIG. 197 is a schematic diagram of a circuit that represents a practical implementation of the electrical analog of FIG. 196.

Figure 198:
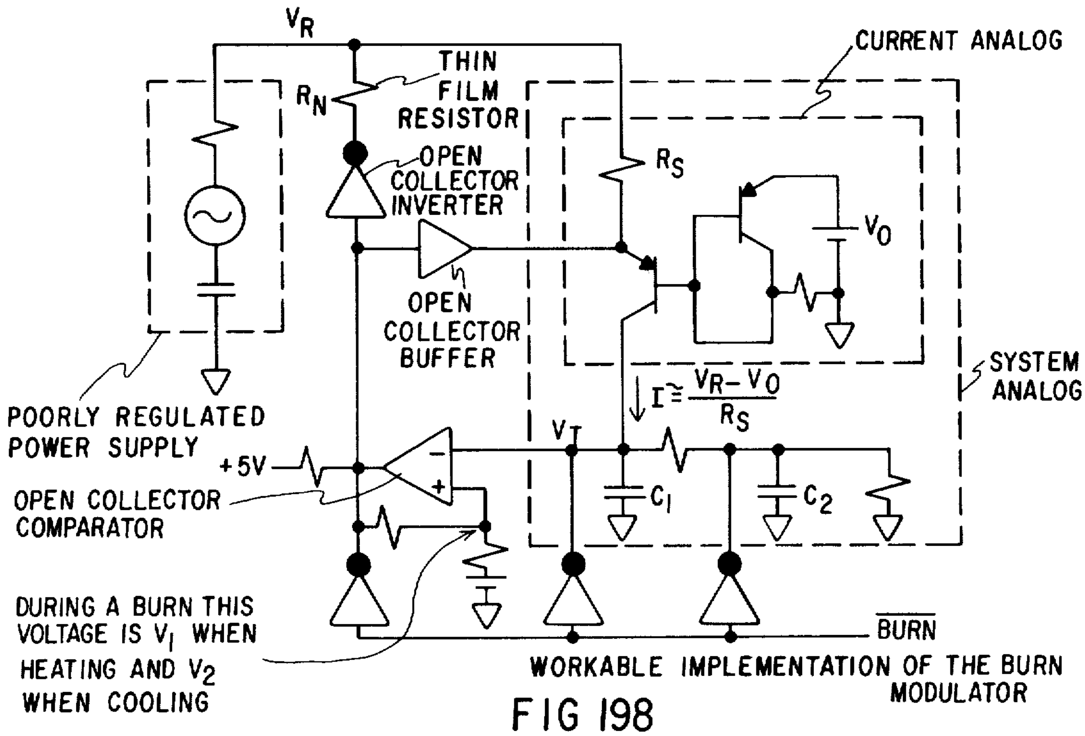

FIG. 198 is a schematic diagram of a thermal print head drive circuit employing duty cycle modulation in concert with an electrical analog that models print head temperature.

Figure 199:
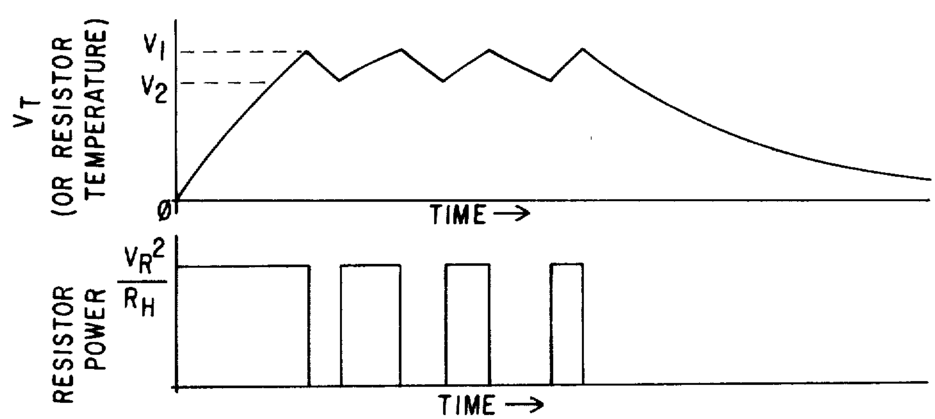

FIG. 199 is waveform diagram illustrating the operation of the circuit of FIG. 198.

Figure 200:
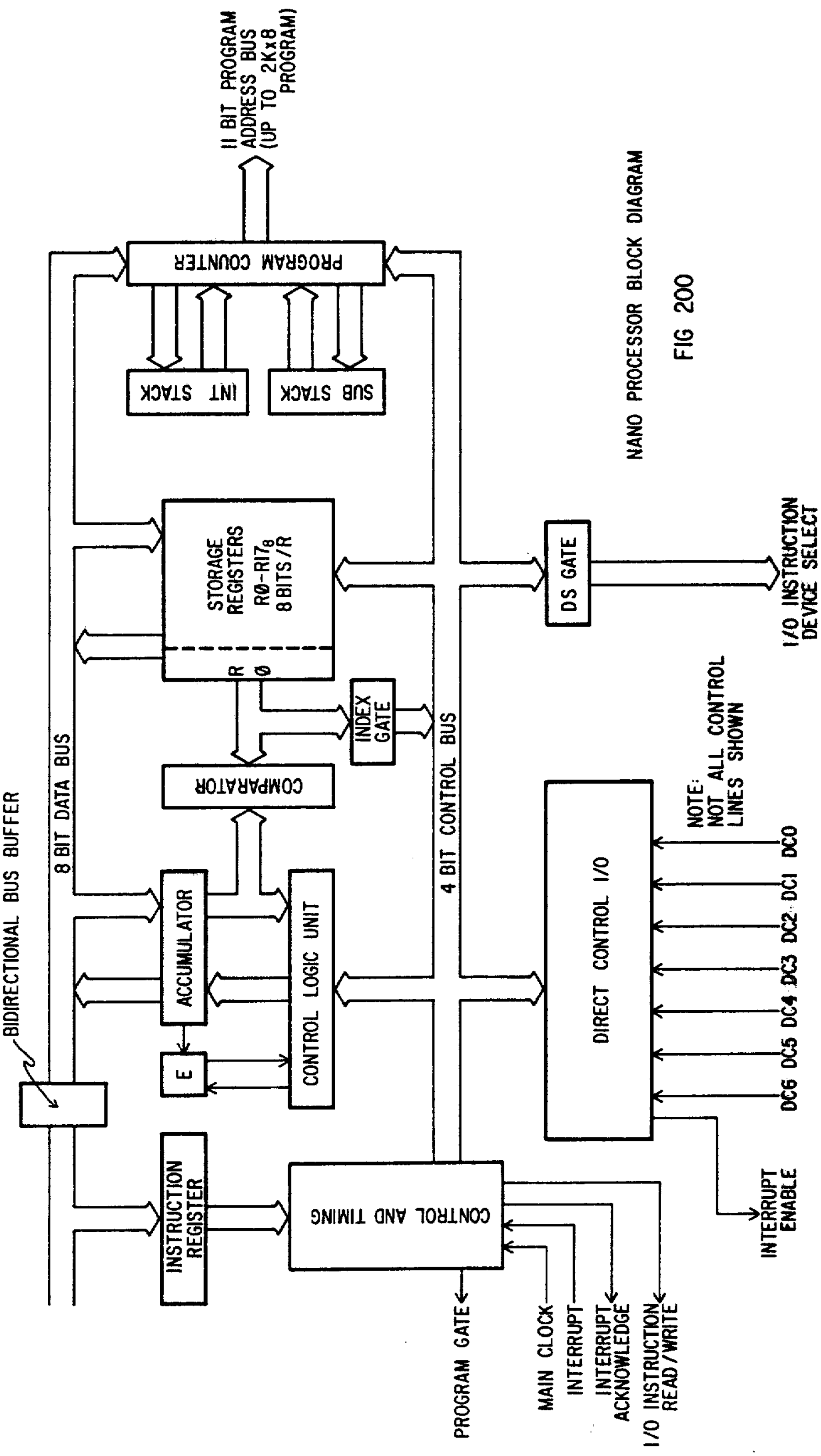

FIG. 200 is a block diagram of the nano processor employed in the internal thermal printer of FIG. 186.

Figure 201:
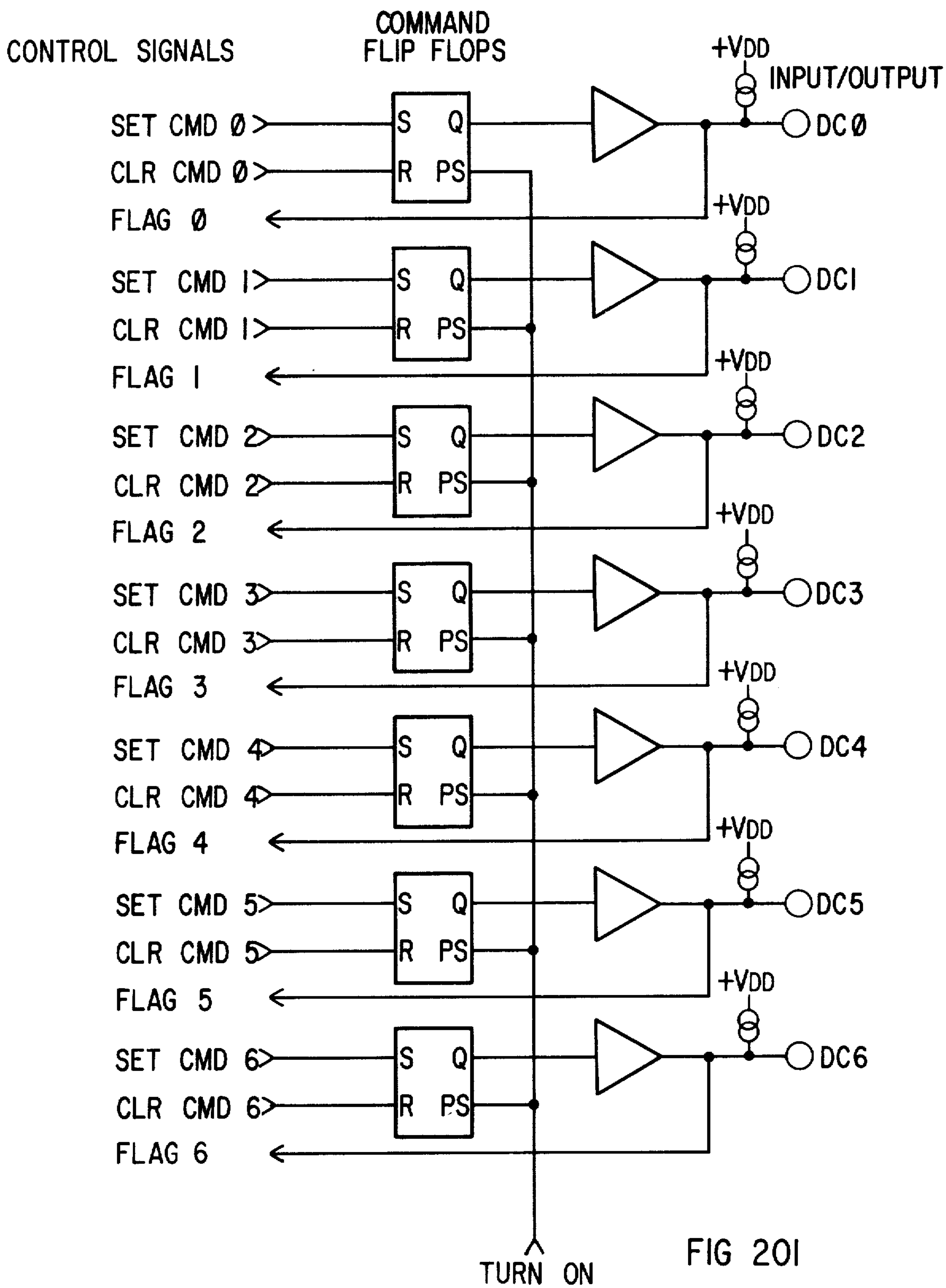

FIG. 201 is a block diagram illustrating the structure of the direct control lines of the nano processor of FIG. 200.

Figure 202:
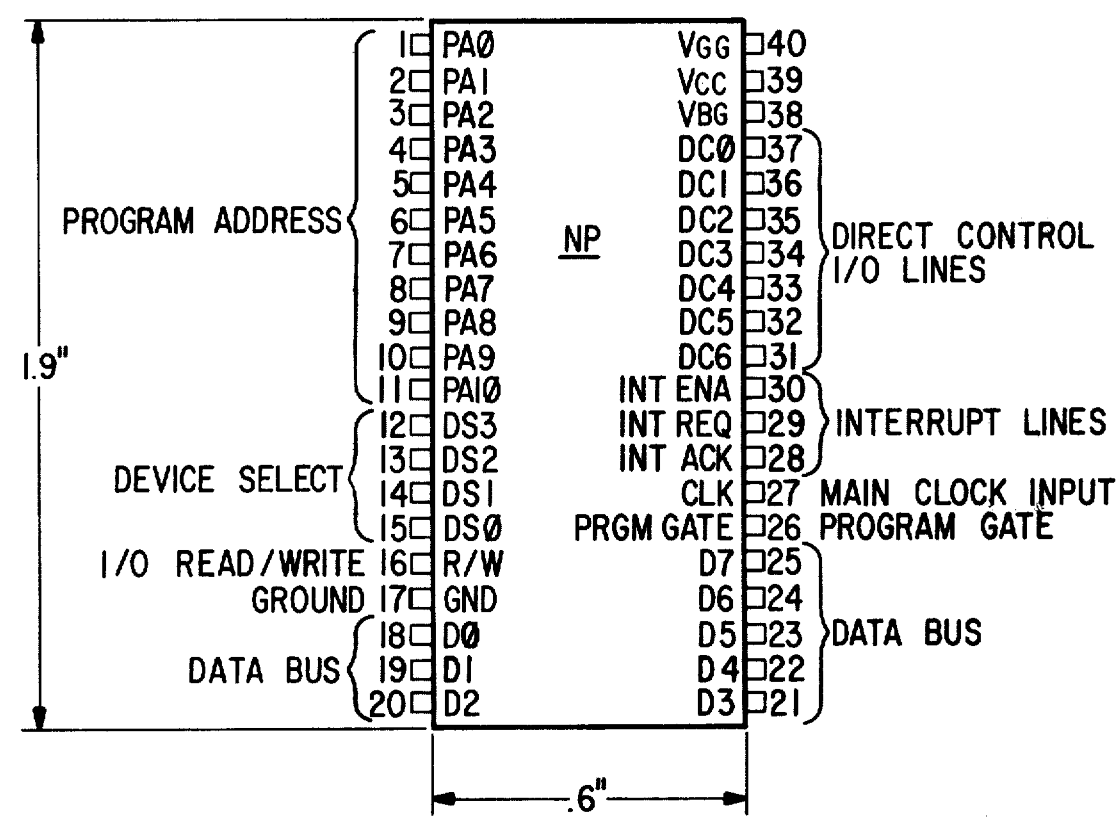

FIG. 202 is a diagram illustrating the signal lines and their general classification associated with the nano processor of FIG. 200.

Figure 203:
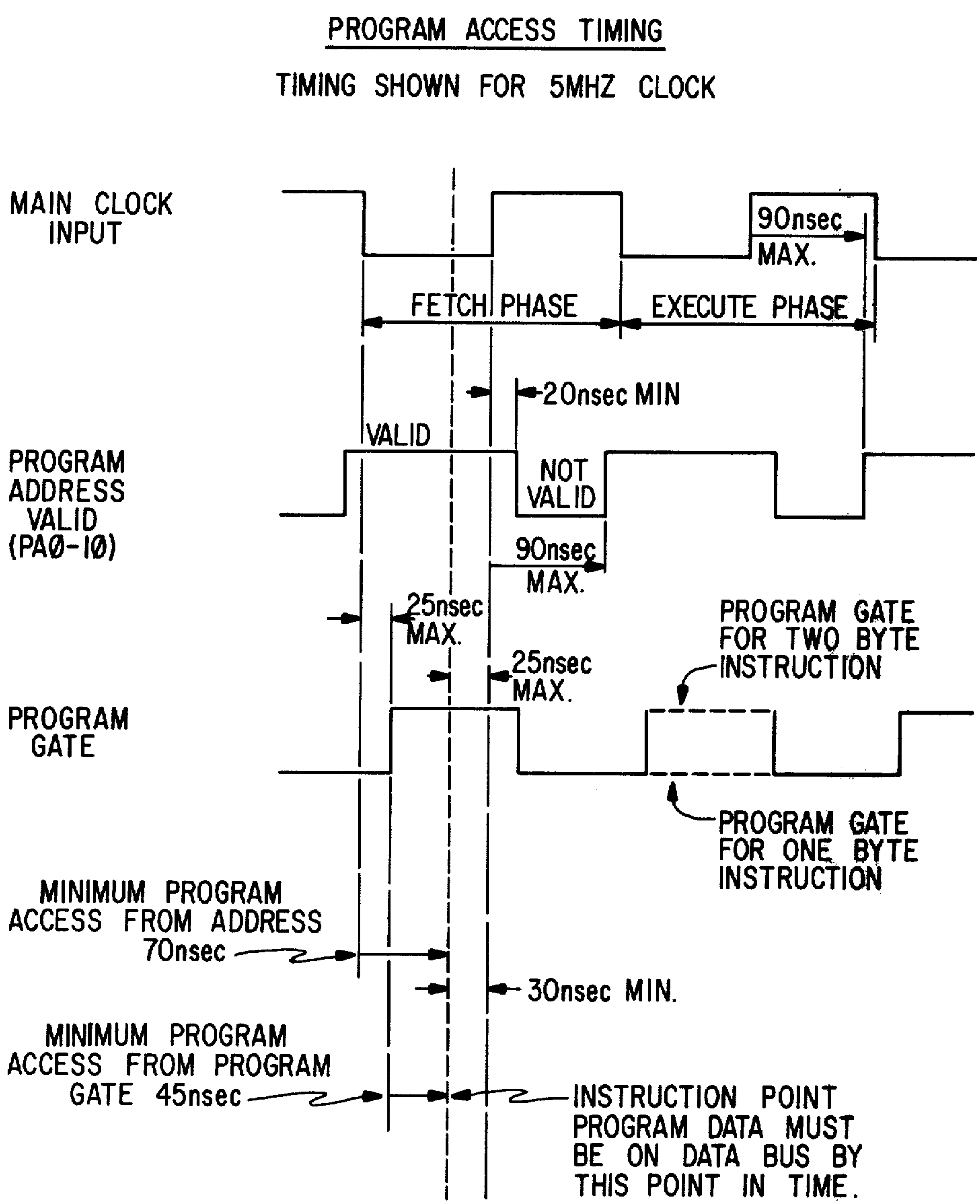

FIG. 203 is a waveform diagram illustrating program access timing for the nano processor of FIG. 200.

Figure 204:
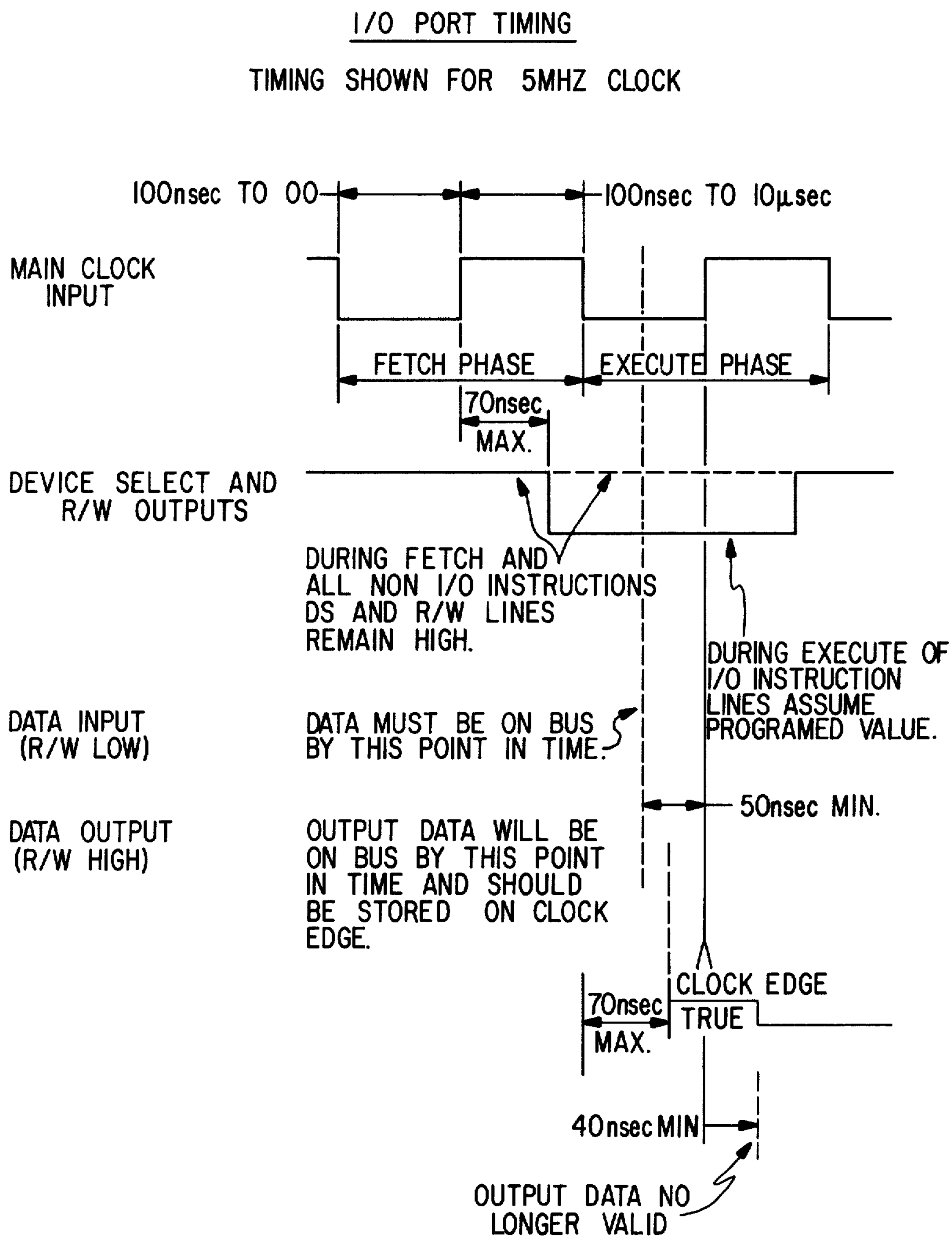

FIG. 204 is a waveform diagram illustrating I/O port timing for the nano processor of FIG. 200.

Figure 205:
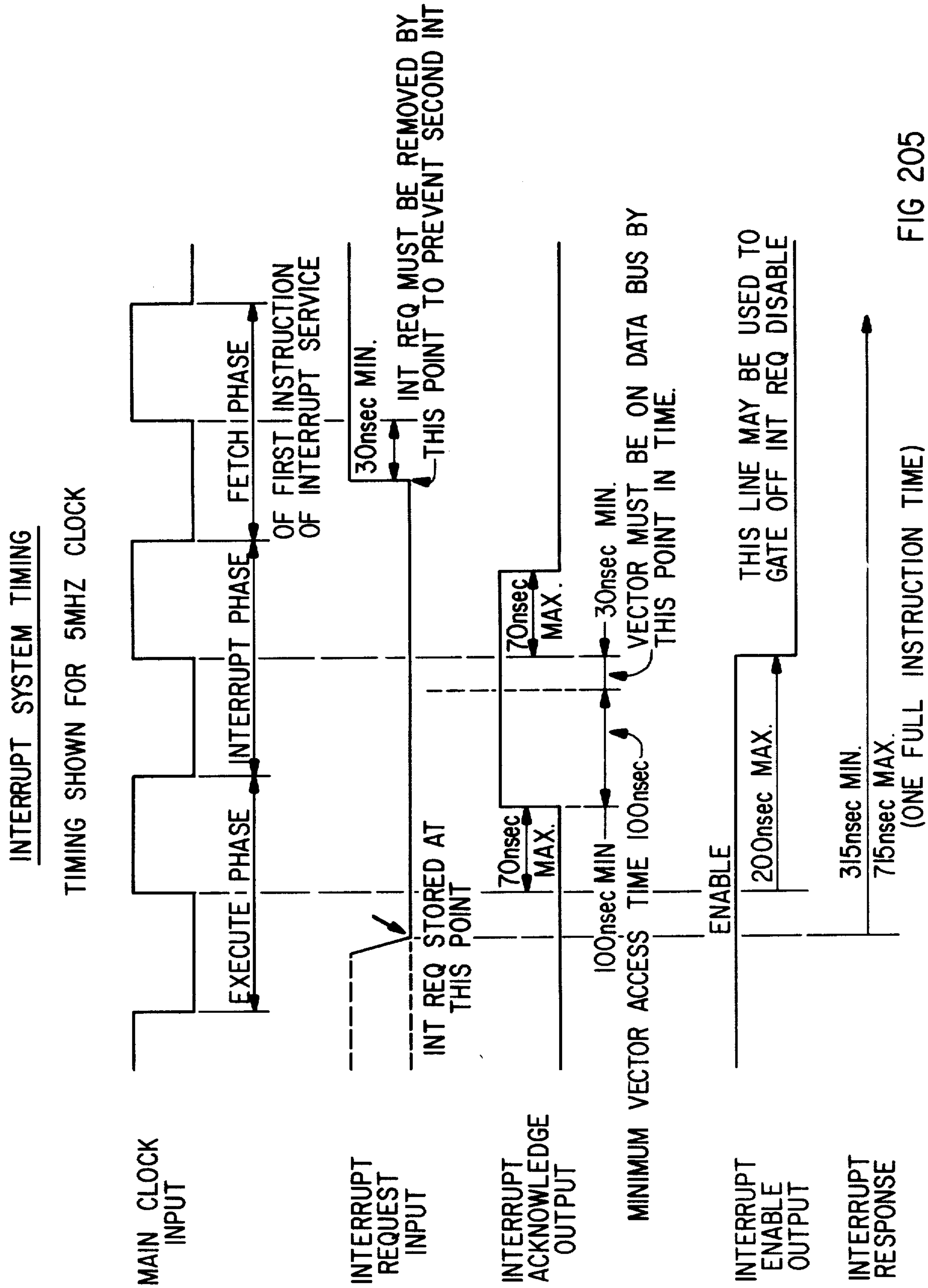

FIG. 205 is a waveform diagram illustrating interrupt system timing for the nano processor of FIG. 200.

Figure 206:
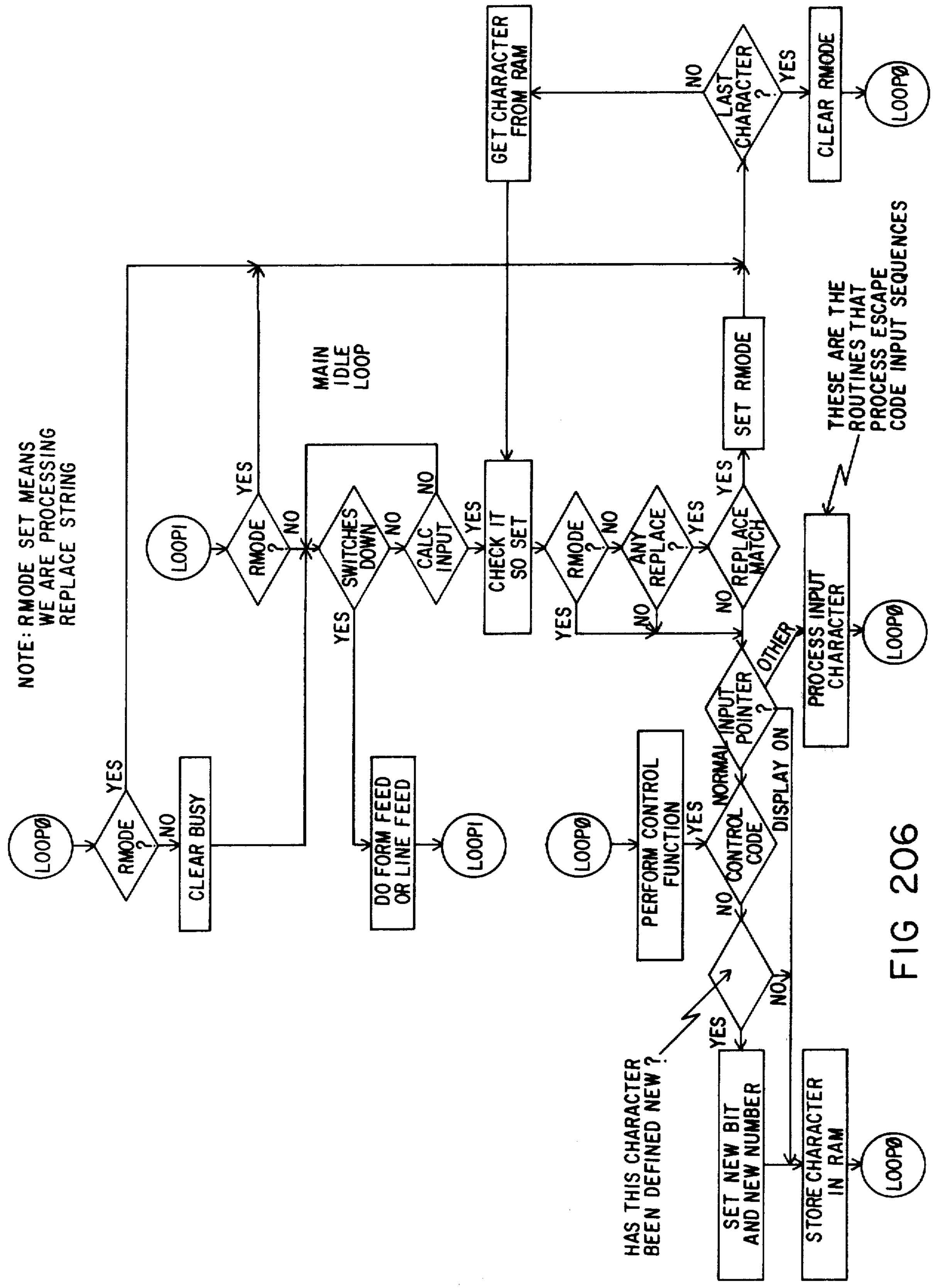

FIG. 206 is a flow chart overview of the program executed by the nano processor during operation of the internal thermal printer in the calculator of FIG. 1.

Figure 207:
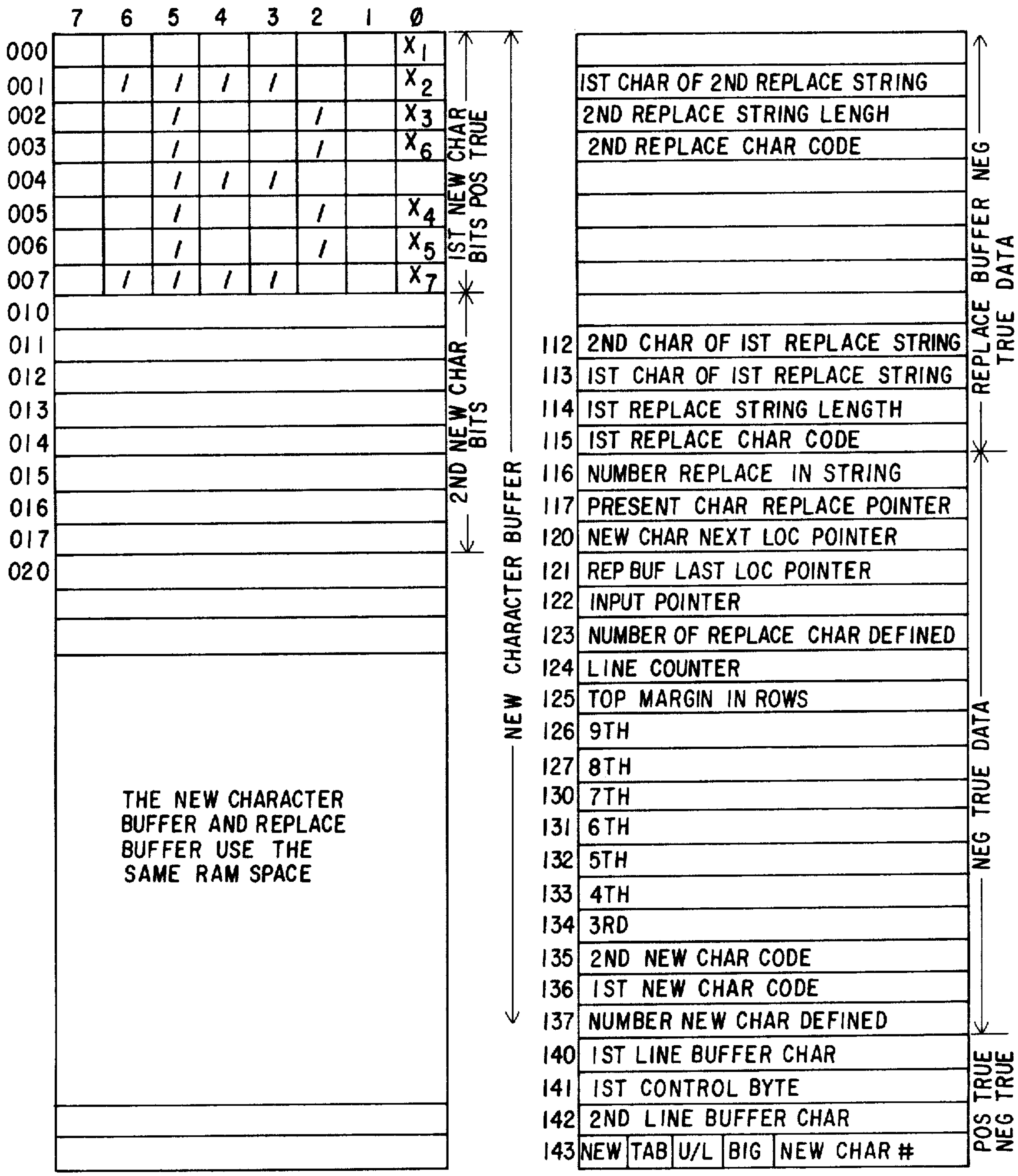

FIG. 207 is a memory map of the random access memory in the internal thermal printer.

Figure 208:
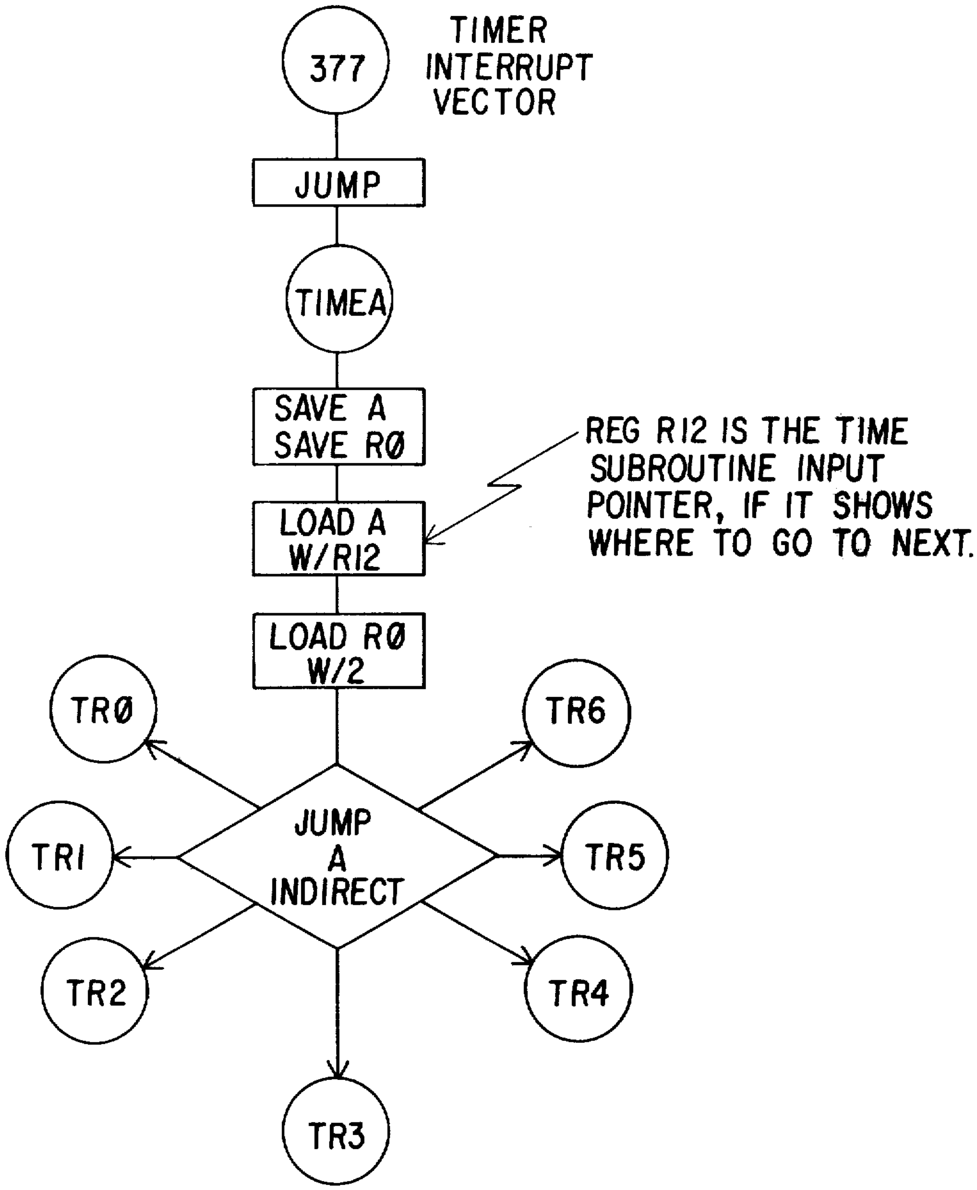

FIG. 208 is a simplified flow chart illustrating the operation of the time interrupt vector employed in connection with operation of the nano processor of FIG. 200.

FIG. 209 is a state diagram of the time interrupt service routine employed in connection with operation of the nano processor of FIG. 200.

Figure 210:
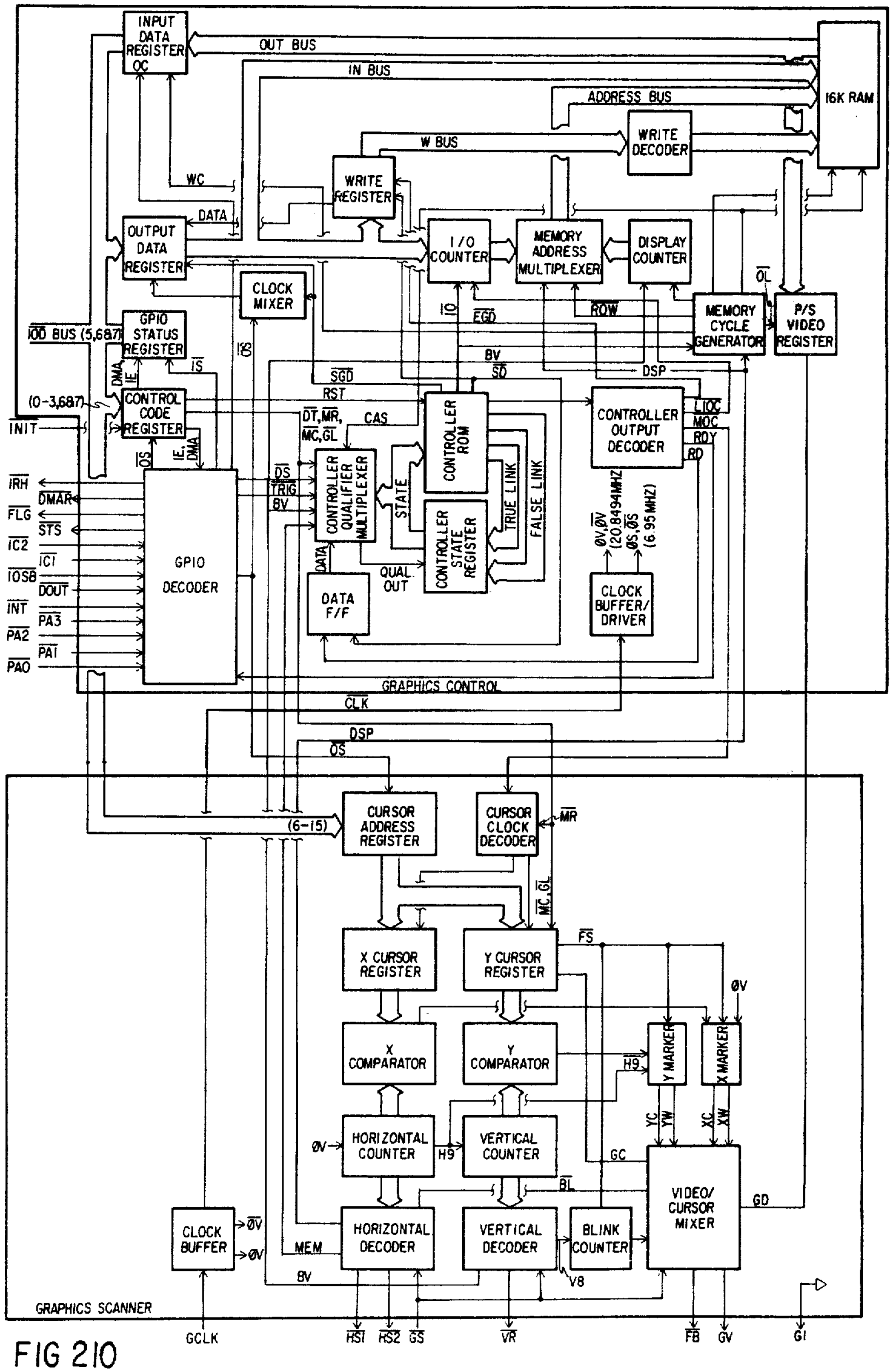

FIG. 210 is a detailed block diagram of the CRT graphics hardware.

Figure 211:
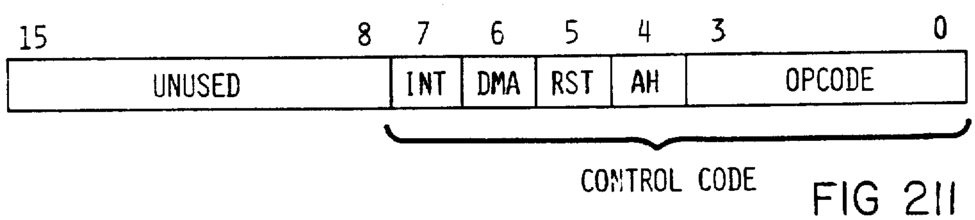

FIG. 211 is a diagram illustrating the format of a control word used by the calculator mainframe for controlling the CRT graphics hardware of FIG. 210.

Figure 212:
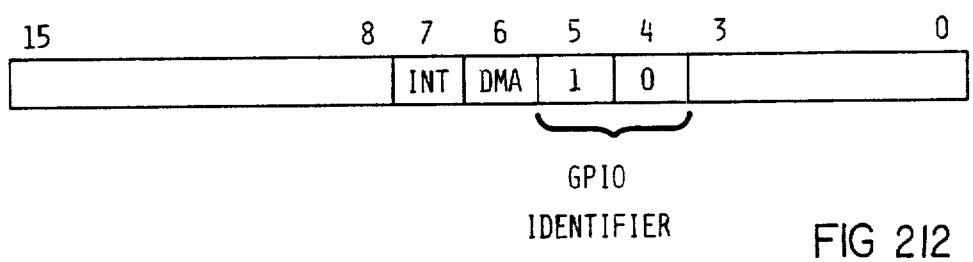

FIG. 212 is a diagram illustrating the format of a status word generated and sent to the calculator mainframe by the CRT graphics hardware of FIG. 210.

Figure 213:
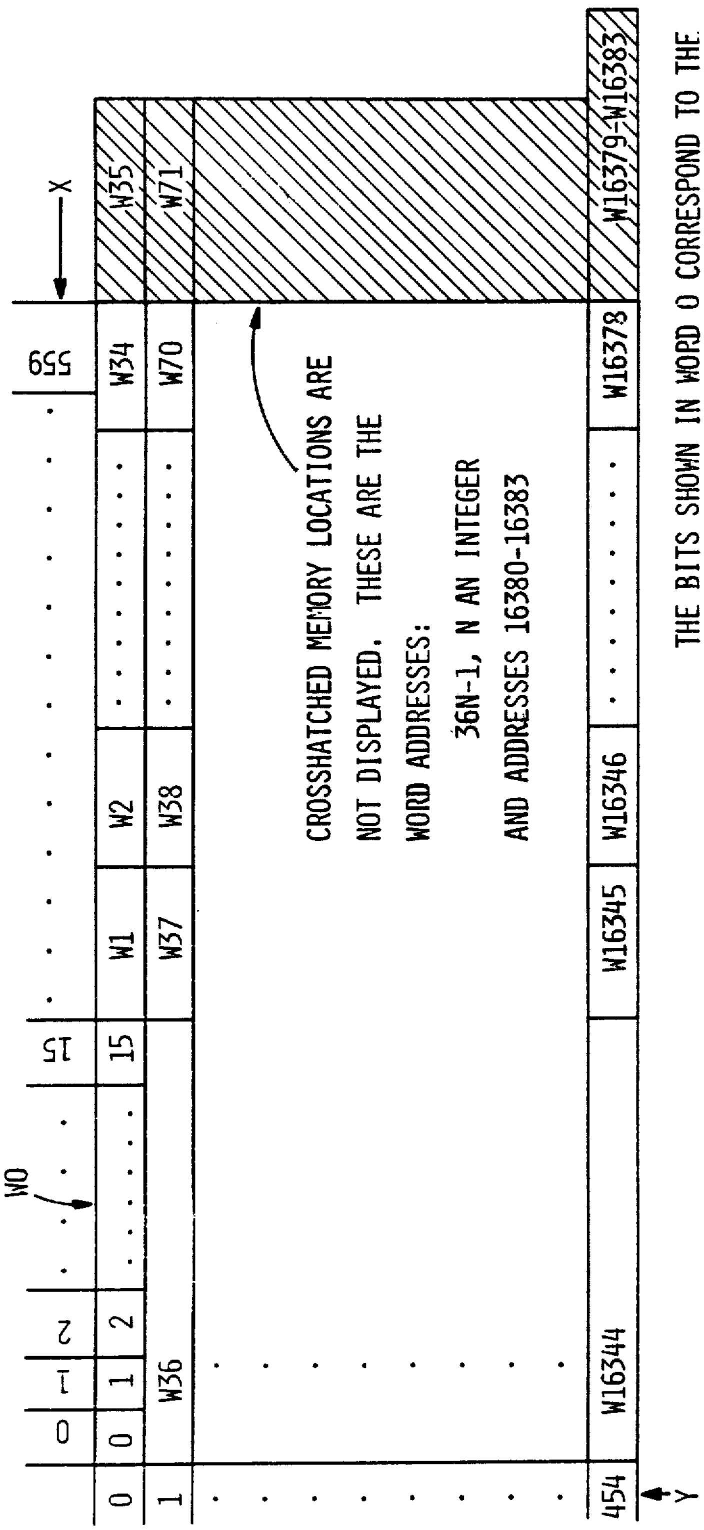

FIG. 213 is a diagram illustrating the addressing conventions used in addressing the local memory of the graphics portion of the CRT in the calculator of FIG. 1.

Figure 214:
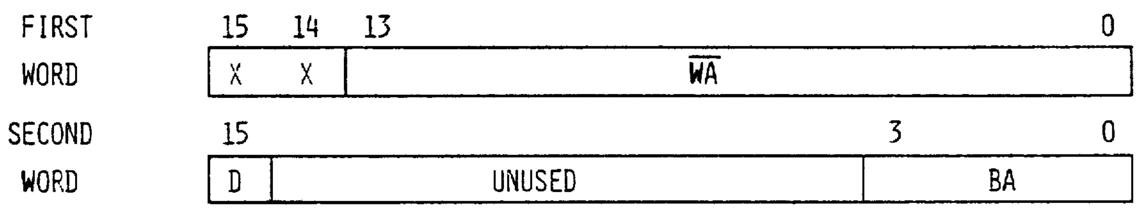

FIG. 214 is a diagram illustrating a way of communicating with the local memory of the graphics portion of the CRT in the calculator of FIG. 1.

Figure 215:
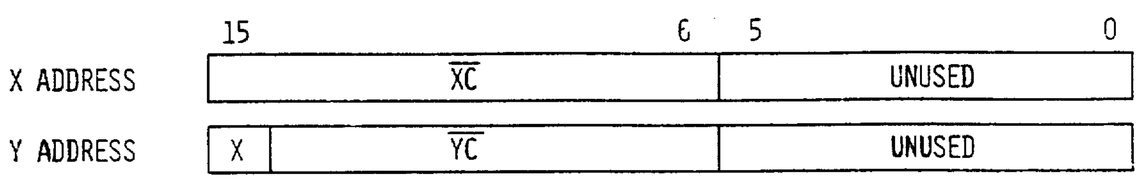

FIG. 215 is a diagram illustrating the way in which the location of the CRT graphics cursor is specified.

DESCRIPTION OF THE PREFERRED EMBODIMENT

GENERAL DESCRIPTION

Referring to FIG. 1, there is shown a programmable calculator including a keyboard unit 2 for entering programs, data, and for otherwise controlling the machine, and also including a CRT-monitor 4 which can be operated in an alphanumeric mode or in a graphics mode. In the alphanumeric mode the CRT presents 25 lines of 80 characters each, for the purpose of displaying commands given to the calculator by the operator via the keyboard, results or error messages in response to such commands, program listings, input data, error messages generated by the calculator in response to errors during program execution, formatted alphanumeric results generated by the program execution, and the results of computations executed from the keyboard.

The CRT can also be operated in a graphics mode wherein the display presentation consists of any pattern of dots within a rectangle of 560 dots wide by 455 dots high, as shown in FIG. 5. When operated in the graphics mode, in a manner to be described later, each dot can be independently controlled by the user's program in a manner analogous to plotting, as to whether it is illuminated (on) or not (off). This allows the user to plot graphs or represent drawings of figures on the CRT screen. It is also possible to cause the internal thermal printer 10 to reproduce exactly, dot for dot, the image presented on the CRT during graphics mode operation.

The calculator also includes magnetic tape cartridge transport 6 and 12 for the storage and retrieval of information stored in the user's read-write memory portion of the calculator memory. (That area of memory is occasionally referred to as the user's R/W or user's RWM.) Such information can be stored on one or more external tape cartridges 7. Information to be written onto tape is grouped by the calculator into files (whose arbitrary names are chosen by the user) of appropriate yet arbitrary length at the time the tape is actually written. Information about the file structure of a particular tape is also recorded on that tape itself in a special file called the directory. The information in the directory makes possible file-oriented information retrieval from the tape. For example, the user can request that the information in the directory be displayed or printed in tabular form so that he may learn the names, sizes and types of the files on that tape, and then, for example, instruct the calculator to read one of those files into its memory. The file-by-name aspects of tape cartridge operation just discussed are a subset of a larger mass-storage capability of the calculator. The same file-by-name philosophy of information storage and retrieval is implemented for all mass-storage devices, for example, moving head discs. The operating system of the calculator is so devised that one unified set of mass-storage I/O commands works for all different types of mass-storage devices, thus enhancing the ease of use of the mass-storage system. The tape transports 6 and 12 are identical in their operational capabilities.

Also shown in FIG. 1 is an internal thermal printer 10. The printer prints 80 characters per line; each character is formed as a 5 by 7 dot matrix located in a 7 by 12 dot field. Thus, the line is of a length equivalent to 560 dots (field width times number of characters is 7 times 80=560). Unlike printers intended to print only alphanumeric information, wherein the space between characters never contains printed information, the calculator's printer has a printhead with 560 equally space print-resistors manufactured on a single substrate. This capability to print an unbroken equally spaced row of dots is fundamental to the calculator's ability to do a dot-for-dot transfer to the thermal printer of a graphics mode CRT image. Additional important capabilities of the printer include: the ability to print a full 128 character ASCII character set, which is always available; the ability to print one among a plurality of optional and supplemental character sets that are provided in the form of ROM internal to the printer; the ability of the printer to allow the user to define a plurality of character dot patterns of his own choice; the ability of the printer to physically back the paper up one line (after it has been printed) and overstrike (i.e., reprint) any or all of the characters in the line with the characters of a second line; the ability of the printer to print characters that are 150% high or that are underlined, or both; the ability of the printer to change the vertical spacing between lines; and the ability of the printer to set, clear, and skip to horizontal tabs.

Referring now to FIGS. 1, 2, and 3, there are shown the locations of plug-in ROM drawers 8 and 14. As shown in FIG. 4, each drawer 20 can contain as many as eight ROM packages 22. Each ROM package can, in turn, contain as many as eight permanently mounted 1K by 16-bit ROM's. Each ROM is a complete IC chip which decodes entire 16-bit addresses and responds, on its own, to read memory cycles addressed to it. Since each ROM IC chip decodes its own address, the position of a chip in a ROM package is of no real consequence. Likewise, the positions of the various ROM packages in the ROM drawer is of no logical concern with respect to the architecture of the memory. (ROM packages are keyed to the ROM drawer, but this is for mainly human factors reasons.) Manufacturing considerations and compatible options are among the things that determine which particular ROM chips are included in the various ROM packages.

ROM packages are specific to a given ROM drawer, however. The two ROM drawers serve logically different functions within the dual-processor and memory address extension architectures of the calculator. The architectures of dual processor usage and memory address extension are discussed in detail later. In general terms, the difference involves the distinction between code that is executed by one element of the processor called the PPU 28, and code that is executed by another element of the processor called the LPU 30, as shown in FIG. 43. A given section of code is written for execution by one or the other of these processor elements, but never both. ROM drawer 14 contains main system and option ROM's for execution by the PPU, and has generally to do with the management of I/O related tasks. ROM drawer 8 contains main system and option ROM's for execution by the LPU. In general, the LPU handles syntaxing and computational tasks. The exact relationship between the LPU and PPU is complicated, and will be the subject of much later discussion. But in simple terms, the LPU instructs the PPU to handle the I/O engendered by executing statements from the keyboard or running programs originated by the user. In addition, each processor can request the other to perform some task. The PPU can request perhaps a dozen such things from the LPU, while the LPU can make less than half a dozen different types of requests of the PPU. But the most commonly occurring interaction between the two processors is the one already mentioned: PPU managed I/O at the behest of the LPU.

The calculator embodies a unique memory address extension scheme wherein the amount of memory in the calculator exceeds the amount that can ordinarily be addressed by either processor (the LPU or the PPU). This additional memory space is not gained by the mere expedient of conjoining the two address spaces of those two processors; it is instead a means whereby a single processor can access as many as sixty-four 32K word blocks of read/write or read-only memory.

FIG. 2 illustrates the manner in which the external peripherals are connected to the calculator. The free end of the peripheral's I/O cable terminates in an interface card 17, which plugs into any one of four I/O slots 16 at the rear of the calculator. The four I/O slots are electrically identical and any peripheral can be plugged into any slot. If four slots are insufficient an I/O expander can be supplied to increase the number of available slots. The I/O expander plugs into one of the slots at the rear of the calculator and reproduces that slot several times by means of connectors wired in parallel. Among the types of external peripherals that can be interfaced to the calculator are included magnetic discs, X-Y plotters, printers, typewriters, photoreaders, paper tape punches, digitizers, BCD-compatible data gathering instruments such as digital voltmeters, frequency synthesizers, and network analyzers, and a universal interface bus (sometimes referred to as the HP-IB) for interfacing to most instrumentation compatible with IEEE Standard 488.

USE OF THE DISPLAY

A notational convention has been adopted in this document to avoid a potential source of confusion between references to the numbered lines in the CRT (line number one through number twenty-five), and the reference numerals associated with the various figures. References to the numbered lines of the display will be preceeded by the symbol "#". Thus, ". . . the keyboard-entry line 58 . . . " refers the reader to reference numeral 58, whereas, ". . . lines #23 and #24 are the keyboard entry area 58 . . . " identify which numbered lines of the display comprise reference numeral 58.

The display 4 and keyboard 2 are the user's interactive link with the calculator. They operate together very closely; almost every key-depression on the keyboard is immediately reflected in some way on the display. The locations of the keys referred to in the following discussion of the display are shown in FIG. 8.

Display operation within the alpha mode comprises two distinct sub-modes; these are the normal user-interactive sub-mode, and the program-edit/entry sub-mode. FIG. 6 illustrates the normal user-interactive sub-mode and FIG. 7 illustrates the program-edit/entry sub-mode.

There follows now a description of the normal user-interactive sub-mode.

The user-interactive sub-mode is called "normal" because the machine turns on in this sub-mode. Also, during use of the program-edit/entry sub-mode, the calculator will revert to the normal sub-mode for any operation the user initiates which is not directly concerned with program-edit/entry.

Before describing what the user-interactive sub-mode of the display is, it is worthwhile to describe what it is not. Conventional CRT displays, as implemented in most computer systems, are "paper-less teletypes". They provide a running record, line after line, of what the user has keyed in, and what the computer response is. Interspersed with this is the user's computed output, printed back to the display by the user's program. The cursor can be moved anywhere in the display, and the user's keyed-in input and the computer's output begin wherever the cursor is. An important aspect of this manner of operation is that user-interaction is mixed with computer (user-program) output.

The display for the calculator can be operated in a somewhat similar way, if desired, by pressing and latching the PRINT ALL key. But in either case the display is divided by the calculator's operating system into two major areas: the "print" area 56, and the user-interaction area 58, as shown in FIG. 6.

The top 20 lines 56 of the display are allocated to the print area. This area, is, in fact, a "paperless printer". It is accessible to the user mainly through the use of the PRINT or PRINT USING statements. The output generated by these statements is directed to the display when the system-printer is defined to be the display. The system sets this sub-mode at power-on, or the user may set it at anytime by executing PRINTER IS 16. The "16" in this statement is a pseudo-select code, in that there is no genuine hardware peripheral address of 16. Instead, the operating system itself interprets this as an instruction to direct the printed output to the display. In the alpha mode of operation the display does not actually use a peripheral address as other I/O devices do. The display represents the contents of a portion of memory of fixed size called the display buffer. The display buffer is large enough to contain at least 40 full lines of 80 characters each. Use of this buffer is efficient, and if the lines are short, more than 40 lines can be contained in the buffer. In such a case the 20 lines at the top of the display are effectively a window on the contents of the display buffer. The contents of the display can be made to scroll through the contents of the display buffer.

The printed (i.e., printed to the CRT) output begins in the top line (i.e., line #1) if the display is clear, and thereafter proceeds line-by-line down the display. If more than 20 lines are printed, the display scrolls up for each new line after the 20th, with the new line added at the bottom, appearing in line #20. The top lines, during this scrolling, disappear from the screen, but may or may not remain within the display buffer. How many lines remain in the buffer is determined by the number of characters in the lines, both visible and non-visible. A total of 3,552 characters of storage is available. There is an overhead of 9 characters for each line. There can be up to 40 lines of a full 80 characters each, or as many as 355 lines of one character each. The user can scroll the portion of the buffer area to be displayed up and down by use of the ↑, ↓, ROLL ↑, and ROLL ↓ keys. The ↑ and ↓ keys scroll one line for each depression. These keys can also be further depressed against second-force springs, which will cause their respective operations to be repeated rapidly. The ROLL ↑ and ROLL ↓ keys cause scrolling by ten lines for each depression.

In attempting to estimate how many lines remain in the buffer, the user is cautioned that more than actually visible characters may count. For example, PRINT A will cause the output of a 20 character field even though it may require only a few visible characters to represent A; the remainder are blanks. Every such outputted blank counts in the character count of the display buffer. However, the remaining 60 blanks following this generated 20-character field are generated by the display hardware itself, following the End-of-Line (EOL) character after the printed 20-character field. The EOL character is present somewhere on every line, and is included in the 9-character overhead per line mentioned earlier.

New printed output to the display's print area is added on below the last line in the buffer, causing the display to scroll up. This is added after the last line in the buffer, which may not be visible if the user himself has scrolled the visible area. The CLEAR key completely clears the display buffer, so that subsequent displayed lines begin at the top of the display screen, and the beginning of the display buffer.

The generated output from CAT (part of the mass-storage system) and LIST (to be described later) is directed to whatever device is presently defined to be the system printer. Therefore, listed programs may appear in the print area of the display. The listed lines in the display follow the same rules as for printed lines to the display. The number of lines in the buffer is dependent on their length, and they can be scrolled through with the display control keys ↑, ↓, ROLL ↑, and ROLL ↓.

An important point about the implementation of the print area is that the cursor cannot be placed in this area; the cursor has no part in the displaying of information in this area.

As previously mentioned, the total display screen can display 25 lines of 80 characters each, of which the top 20 lines are the print area. The remaining lines are the keyboard-interaction area.

The 21st line of the display is always blank, to provide a separation between the two areas.

The 22nd line's contents are controlled by the user's program via the DISP statement, or via the prompt parameter of the INPUT, LINPUT, or EDIT statement (to be described later). In this line the user's program may display messages, prompts, and data. If a DISP statement is used with a semicolon terminating its associated data list, and a prompt in a INPUT, LINPUT, or EDIT statement follows, the prompt will be concatenated to the DISP display. However, a prompt terminates the addition of information into line #22; i.e., only one prompt may be displayed.

The next two lines (#23 and #24) are the actual keyboard-entry area 58. This is two lines long to handle the 160-character line allowed in programs. The cursor is a blinking underline beneath the location where the next character will be entered. When keys other than control keys are pressed, (i.e., keys having a display character associated with them) the associated character will immediately be displayed in these lines at the location of the cursor, and the cursor will be advanced. The cursor will automatically wrap-around from the 80th character of the 1st keyboard line (line #23) to the 1st character of the 2nd line (line #24).

The cursor can be moved around in these two lines, over displayed characters (including blanks actually keyed in with the space bar), by use of the → and ← cursor-control keys. If the → key is pressed to drive the cursor to the right, when it reaches the right end of the keyed-in characters, it will wrap around to the 1st character of line #23. Conversely, if the ← key moves the cursor to the left-end of line #23, on the next depression it will wrap-around to the last keyed-in character, whether it is in the 1st or 2nd keyboard-lines. Both of these keys may be repeated rapidly by additional depression against second-force springs.

The ↑ and ↓ keys do not control the cursor; they affect the display presented in the print area as previously described.

If the HOME key in the display-control keyblock 44 is pressed, the cursor will immediately be positioned at the 1st character of the 1st keyboard-line (line #23). If the CLR→END key is pressed, the input line will be cleared from the present cursor position on to the end of the keyed-in line.

Keying a line into lines #23 and #24 of the display causes no immediate action other than its appearance in the display. What happens to process this keyed-in line is determined by the control key which is pressed after the line is keyed in:

a. If the EXECUTE key is pressed, most commands, statements, and expressions will be executed immediately, provided they do not include a program line number (if a line number is mistakenly included, the error message IMPROPER EXPRESSION will be displayed in line #25 of the display). If an expression is submitted (it may involve only constants, or constants and variables or just variables) it will be evaluated, and the results displayed in line #25.

If a command is executed which involves use of a system resource (such as a peripheral) which is busy with other tasks (probably invoked by a running program), the message SYSTEM BUSY will be displayed in the 25th line of the display and the command will be ignored. For pure computational (calculator) tasks, the system is able to compute and display resuls even though a program is running and the system is otherwise busy.

b. If the STORE key is pressed, the line will be compiled as a program line, and if there is no error, it will be stored as part of the program presently in memory, following the normal program-entry rules. This may be done in most cases even though the program in memory is executing at the time. The most likely cause for not being able to store a line (error 42) is that the line to be stored would change or delete a line which is busy. This arises, for example, when a line invokes a multi-line user-definable function. Execution of the line starts execution of the function, which is really composed of other lines in the program. The invoking line is incomplete (i.e., busy) until the function is complete. When a line is in this state (busy), changing or deleting it would be disastrous.

The ability to store program lines while a program is running is of obvious value in that it allows the user to key in a new program (at line numbers outside the range of line numbers in the running program) while the old program is executing. If the capability is used to change an executing program, the user should not be surprised if unexpected results occur.

The preceeding discussion of STORE and EXECUTE in connection with the keyboard-entry lines has mentioned the 25th line of the display several times. Its function is to display error messages, and in the case of the execution of expressions (keyboard calculator use) to display the results. There is occasionally a conflict between these two uses; a running program may generate an error message at about the same time a user attempts to execute an expression. The last use invoked is the one that remains visible.

There is also several status indicators which can appear in the right part of the 25th line:

a RUN indicator.

When a program is running, the 80th character of line #25 is displayed as a solid lighted rectangle.

b. TYPWTR mode indicator.

If the TYPWTR key is pressed, the word TYPWTR appears just to the left of the RUN indicator. This indicates the keyboard is in the typewriter-mode (described later). If TYPWTR is pressed when on, it goes off. This display also indicates program-controlled activation/deactivation of the "typewriter-mode".

c. SPACE DEPENDENT mode indicator.

If CNTRL-TYPWTR are pressed (together, but in that order), the words SPACE DEPENDENT appear just to the left of the RUN indicator (cancelling TYPWTR and typewriter-mode if on). This indicates that the space-dependent mode of syntaxing program lines (described later) is in effect.

There follows now a description of the program-edit/entry sub-mode.

The program-edit/entry sub-mode of the display, as shown in FIG. 7, is activated by the command:

EDIT LINE[<line i.d.>[,<line no. increment>]]

where:

<line i.d.>may be a line number or a label, and:

<line no. increment>may be only an integer constant.

The default value of <line no. increment> is 1φ, and the default of <line i.d.> is the first program line.

If a label is specified for <line i.d.>, and that label is not present in the program in memory, an error message is given.

If a line number is specified for <line i.d.>, and that line number is not found, the line with the next higher line number is used.

The command EDIT LINE is present on user-definable key $k_{13}$ as a print-aid (the user-definable keys and print-aids are described later).

When the EDIT Line command is executed the entire 25-line presentation of the display is altered. The program-line specified for editing is placed in the middle of the display screen, line #12; or if it is a long line (greater than 80 characters), in lines #12 and #13. These two lines become a keyboard-entry area 66, and the cursor is placed at the right end of the program line(s)—immediately to the right of the last character of the statement.

Line #14 of the display is reserved for any error messages which may occur.

Lines #11 and #15, just above and below the lines just described, are blank. If there are program lines before the line to be edited (in line #12), they are listed in lines #10, #9, #8, #7, and #6 of the display. The top five lines are blank. If there are program lines after the line to be edited, they are listed in lines #16, #17, #18, #19, and #20. Lines #6 through #10 and lines #16 through #20 are truncated to 80 characters; program lines in these positions that require two lines to display are limited to a single line of visibility.

Thus, up to ten 80-character lines and one 160-character line of the program may appear in the display as a valid current listing of that portion of the program.

These editing keys:

| | | | |
|---|---|---|---|
| ← | DEL CHR | DEL LN | CLEAR LINE |
| → | INS CHR | INS LN | CLR → END |

may be used to change the line in the entry area 66. However, the cursor cannot be moved out of that two-line area.

The ← and → keys move the cursor left and right in the line. If they would drive the cursor beyond the limits of the line, it wraps-around; i.e., if the cursor is at the right end of the line and → is pressed, the cursor appears at the left-most character of the line, and vice versa for the ← key.

The cursor's current position determines where changes will take place. If keys are pressed, their characters will replace the existing characters of the line in the position indicated by the cursor. If the DEL CHR key is pressed, the character at the cursor is deleted, and all characters to the right are moved left one position. If the INS CHR key is pressed, the character at the cursor is switched to inverse video to indicate the location of the insert cursor. If a key is pressed after INS CHR, it will replace the character at the insert cursor position, and the insert cursor and its character and all characters to the right of it will be moved one position to the right. The insert mode will remain on, and further characters can be inserted. The insert mode may be cancelled by pressing INS CHR again or by moving the cursor itself with ← or →.

After the line as been modified, pressing STORE will cause it to be compiled and stored in the program, (replacing the old line if the line number was unchanged). If there is a syntax error, the line will remain in the keyboard-entry area 66, the cursor will be placed at the location where the error was detected, and an appropriate error message will appear in line #14. The line can be corrected and STORE'd again. When the altered line is accepted and stored, the entire display will scroll up one line; the top line will disappear, the four previous lines will move up, the newly-stored line will appear as the line just above the keyboard-entry line 66, the next line will be in keyboard-entry lines, the bottom four lines will move up, and the next line of program will be in the bottom line. If there are no currently existing subsequent lines of programming, their place will be taken by blanks.

If the INS LN is pressed, the line in the keyboard-entry lines will be moved down to just below the keyboard-entry lines, the four lines below it will move down, and the bottom line will disappear. A program line number, one greater than that of the bottom line of the top group of five lines, will appear in the keyboard-entry area 66 with only the cursor appearing to the right of it. Pressing subsequent keys will create a new line with the new program line number. Thus, the new line will be inserted ahead of the line in the keyboard-entry lines when INS LN is pressed. The user can key in the new line. When STORE is pressed, it will be syntaxed, and if correct, will be stored in the program. The top five lines will "scroll up" (the top line disappears), the new line will be at the bottom of this block. Another line number, one greater, will appear in the keyboard-entry lines, ready for insertion of another line. This can be repeated until the new line number would be the same as the next old line of the program (i.e., the top line of the bottom five lines). At this point, the insert line mode is cancelled and a warning to that affect appears in the error-message line. The insert line mode may be cancelled at any time by pressing the INS LN key again, or by scrolling with the ↑ or ↓ keys.

The DEL LN key deletes the program line shown in the keyboard-entry area; displayed lines #16 through #20 scroll up one line, with the old displayed line #16 becoming the new line in the keyboard-entry area 66.

The INS LN and DEL LN keys described above function in the program-edit/entry sub-mode only.

The entire set of lines presented in the EDIT LINE sub-mode can be scrolled by use of the ↑, ↓, ROLL ↑ and ROLL ↓ keys. Their function is similar to that in the normal display sub-mode. If the ↑ or ↓ key is pressed the lines in the display will scroll up or down one line at a time; the center line will be a keyboard-entry line, accompanied by five lines above and five lines below it. If ↑ or ↓ are pressed harder against the second-force springs, they will be repeated rapidly, and the program will scroll rapidly up or down through the display. If the ROLL ↑ or ROLL ↓ keys are pressed, the scroll up or down will occur in jumps of five lines at a time. Thus on ROLL ↑, the bottom line in the display will appear in the keyboard-entry line, and the top line for ROLL ↓.

If the CLEAR LINE key is pressed while in the EDIT LINE sub-mode, the keyboard-entry lines 66 and line #14 will be cleared, and the cursor will appear at the left of line #12. However, this does not in any way affect the actual stored program. In this condition, any line may be keyed-in exactly the same way as in the normal display sub-mode. However, execution of any command or pressing any control key except STORE will cancel the EDIT LINE sub-mode, and the display will revert to the normal sub-mode.

Thus, at all times the EDIT LINE sub-mode, the display will show the program as it is actually stored—with one exception. If the line in the keyboard-entry lines has been changed, with CLEAR or by editing with other keys, the display does not represent what is stored in the actual program until STORE is pressed.

Program lines can be entered and stored in the normal display sub-mode by keying the line (including the line number) into the keyboard-entry lines and pressing STORE. However, the program-edit/entry sub-mode is more convenient if a number of lines are to be entered, in that line numbers are generated automatically, and that the program is available for inspection through scrolling.

To do this, the user executes the EDIT LINE command (with line number and increment, or taking the default values) with no program present in the machine. For the first line, only the line number appears in the keyboard-entry lines 66, with the cursor. As lines are stored, they scroll up through lines #6 through #10 of the display (which are initially blank if no program is current in the machine), and, the next program line number is generated. These five lines of most recent programming appearing in the display give the user a constant reference as to where he is in his program. He may exit this sub-mode at any time by pressing STOP, which causes the display to revert to the normal display sub-mode.

The user is warned that after a program is listed in the normal sub-mode, with the listing appearing in the print area of the display, such a listing may not continue to reflect the actual stored program. If the user changes or adds a line in the program (by keying it into the keyboard line and storing it) the program listing shown in the print area 56 is not changed; he must relist it to obtain a correct listing. Contrasted to this, in the program-edit/entry sub-mode, when STORE is depressed, the lines in the display are changed (if necessary) to reflect what is actually stored.

USE OF THE KEYBOARD

Referring now to FIG. 8, the keyboard comprises seven general classes of keys: the display control keys 44 (already explained); the user-definable keys 24 (hereafter referred to as UDK's); the general ASCII character entry keys 52; the numeric key-pad 54; the calculator control keys 50; the typing function keys 48; and the edit/system function keys 46.

The following explains the EXECUTE and STORE keys.

EXECUTE key

The EXECUTE key is used to signal the calculator that statements or commands previously keyed in are now ready for immediate execution: RUN <line i.d.>; CONT <line i.d.>; etc. Most programmable statements can be executed if the line number is omitted. An expression may be evaluated by typing it in and pressing EXECUTE. Several expressions may be separated by commas or semicolons, and then executed. The result is the same as if they were treated as a <list> on a DISP statement. In this case there is an "implied display", but the result(s) appear in line #25, rather than in the display-line (line #22) of the display.

STORE key

The STORE key is used to cause a program line in the keyboard-entry lines (of either the normal or program-edit/entry sub-modes) to be syntaxed and stored in program memory. A line number must precede every line to be processed by STORE.

The following explains the calculator control keys 50.

This group of keys allow the user to directly control operation of the machine.

RUN key

The RUN key is an "immediate-execute" key. That is, the action which it causes takes place immediately without the need to press any other key.

The RUN key causes the program currently stored in memory to begin execution at the lowest existing line number. All variables, file references and subroutine return pointers are cleared. If the display was in the grogram-edit/entry sub-mode, it will revert to the normal display sub-mode. If there already is a currently executing program, it will not be disturbed, but an error message will be displayed.

If the user wishes to begin execution at a specific line (rather than the lowest line number) he may key in, by use of the character entry keys 52 and numeric keys 54, RUN <line i.d.> and press the EXECUTE key. The <line i.d.> may be a <line no.> or a <label>, and must exist in the main program, and not in a subroutine.

CONT key

The CONT key is an immediate-execute key which causes the program to resume execution from wherever it was previously PAUSE'd, (i.e. halted by a PAUSE keystroke external to the program, or by a PAUSE statement within the program) or from the beginning if it had not been previously PAUSE'd. All variables, file references and subroutine return pointers are left unchanged.

If the program is halted waiting for data to be supplied for an INPUT or LINPUT or EDIT statement, CONT is used to signal that one or more data items have been entered in the input buffer (i.e., the keyboard-interactive line 58), and that they should be submitted as input data.

If the user wishes to resume execution at a specific line, he may key CONT <line i.d.> into the keyboard-line (using key-groups 52 and 54) and press EXECUTE.

The <line i.d.> must exist either in the current subprogram or in the main program, or else an error results.

PAUSE key

PAUSE is an orderly suspension of program execution which can be resumed without any effect on overall results. PAUSE causes program execution to halt at the end of the line presently being executed. If the PAUSE key itself is pressed the next program line will be displayed in line #25 of the display. The PAUSE key is an immediate execute key, and as such, cannot be part of a line to be stored. If a PAUSE statement is to be stored in a program it must be keyed in character-by-character. A PAUSE statement encountered in a program does not cause line #25 to display the next program line to be executed upon resumption of program execution, as does the PAUSE key.

Any output generated into buffers and awaiting processing will be retained, and actual output processing will continue (i.e., PAUSE stops further program execution), but not I/O processing required to satisfy previous program execution.

Execution can be resumed with the STEP or CONT keys, or by executing the CONT <line i.d.> command.

STOP key

STOP is an immediate-execute key which causes the program to halt, and may result in lost input or output, if the program is running in OVERLAP mode (the OVERLAP mode is described later).

Program execution cannot be resumed as though nothing had happened. All data values are retained, but all program-execution temporaries (subroutine return pointers, FOR/NEXT conditions, etc.) have been cancelled, and the program-pointer is reset to the first line of the program. If CONT is pressed, execution will begin at the first line; it will be as though the program had not been RUN (except that all data values are retained). If STEP is pressed, the result is quite different than CONT (because the STEP will not be following a PAUSE) in this one case. STEP is treated as RUN-PAUSE for the first line (cancelling all data values) and the normal CONT-like function from then on (PAUSE has effectively been executed).

CONTROL-STOP key combination

CONTROL and STOP, when pressed together (but in that order) are used to reset the machine. An existing program will be preserved if it is not executing. If there is a program executing when CONTROL-STOP is pressed, the program may or may not be preserved. Any pending or executing I/O activity will terminate immediately.

CONTROL-STOP must always be considered as a potentially abortive termination of all machine activity; i.e., just short of turning the power off and back on. Every attempt is made to preserve programs and data, but nothing can be guaranteed or assumed. The purpose of this function is to reset the machine if it becomes "hung up" or "gets lost" because of a system or I/O malfunction.

STEP key

STEP is an immediate execute key which causes the isolated execution of the next line of a program. This is generally achieved by having STEP perform a CONT followed immediately by a PAUSE. STEP can be used only by pressing the STEP key; keying the separate letters followed by an EXECUTE will result either in a syntax error or in an attempt by the calculator to treat the resulting "STEP" as a variable name.

To use STEP the program must not be already executing. This condition exists in these situations. First, the program might never have been started after it was entered. In that case STEP causes a RUN immediately followed by a PAUSE. Secondly, the program might already have been started but have been halted with a PAUSE. In this case STEP causes a CONT immediately followed by a PAUSE. Lastly, the program might have been started and then halted with STOP. In that case STEP starts the program over with RUN followed immediately with PAUSE.

STEP may also be used within a line to signal that the response to an INPUT, EDIT, or LINPUT is ready.

PRINT ALL key

PRINT ALL is a mechanically latching key; that is, press to set, press to release.

When latched, PRINT ALL causes all information resulting from keyboard entries, DISP statements, error messages, trace messages, and calculations executed from the keyboard to be copied on the print-all device. The print-all device is defaulted to the display's print area at turn on, and may be changed to any other print-device by the PRINT ALL IS command (described later).

It was mentioned in the description of the display modes that the display's print area could function much as a "paperless teletype" or conventional CRT computer terminal. With PRINT ALL pressed, and both PRINTER IS and PRINT ALL IS directed to the display (pseudo-device 16), the display's print area displays a sequential log of all user operations and all computed results.

AUTO ST key

The AUTO ST (auto-start) key is also mechanically latching key, in the same manner as the PRINT ALL key.

When AUTO ST is latched down, the machine will execute the command

```
LOAD "AUTOST",1φ,1φ
```

automatically when power is turned on (or when power comes back on after a power failure). The LOAD statement is a mass-storage system command and is described later.)

The user can use this capability to reactivate the machine by providing a program called "AUTOST" on the tape in the primary tape transport called "T 15", (reference numeral 6 in FIG. 1). This program can be written by the user to provide any function he desires, such as loading keys, subroutines, etc. This program must be put on the tape with a STORE command and given the name "AUTOST". The LOAD and STORE statements are discussed in the section dealing with the mass storage system.

The following explains the user-definable keys 24.

This group of keys, marked $k_0$ through $k_{15}$, provide a variety of useful capabilities to the user. There are 4 major areas: predefined print-aids for frequently-used commands and operations; user-definable print-aids; user keyboard-interrupt of executing programs; and last, control of special features of the CRT display.

Physically, there are 16 keys labeled $k_0$ to $k_{15}$. In addition, they may be shifted by pressing the SHIFT key and then a UDK to obtain, respectively, $k_{16}$ through $k_{31}$.

User-definable print-aids

One purpose of user-definable print-aids is to allow the user to define frequently used operations on a UDK so that they can be performed by a single keystroke. The other major use is to allow the user, as he needs them, to define frequently used words, phrases, parts of statements, or whole statements, as typing-aids. Once established, these phrases, etc., corresponding to the typing-aids are entered into the keyboard-entry area of the display at a single keystroke, with the cursor in the next character position after the entry. The entry may be edited, etc., just as if the user had keyed it in character-by-character. If EXECUTE or STORE is made part of the UDK's definition then the associated phrases, etc., will also then be EXECUTE'd or STORE'd.

The definition of UDK's for either of the above functions (immediate-execution operations, or simple print-aids) is the same kind of process. Which variety is obtained is determined by the keys entered in defining the UDK.

Defining and/or editing UDK's

The method for defining, replacing, or altering any UDK as an immediate-operation key or print-aid is to:

a. Type EDIT b. Press the desired UDK ($k_0$ through $k_{31}$)

or to:

a. Type EDITKEY <n> b. Press EXECUTE

Both operations are equivalent.

During the EDITKEY operation, the display switches to a special presentation which is unique to the EDITKEY operation, but is similar to the program-edit/entry sub-mode, and is depicted in FIGS. 9, 10, and 11.

The word KEY followed by the number of the UDK being edited or defined is displayed in the top line of the display. If the UDK is undefined, the cursor will appear in the middle line of the display, waiting for a key definition to be entered.

If the UDK is presently defined, a display of that definition will appear in the middle line (line #13), and possible lines above that, depending on the exact definition. The cursor will initially appear in the middle line immediately after the last character (keycode) in the definition), but its subsequent location will depend upon subsequent editing operations.

The definition of a UDK, as stored, is a string of bytes which are the keycodes from the keyboard itself. When (in normal keyboard sub-mode, not UDK edit/entry sub-mode) the UDK is pressed, these keycodes (which are the definition of the UDK) are submitted sequentially to the keyboard-input routine as though they came from the keyboard itself by the user's pressing that key-sequence. So the user can, effectively, press many keys in rapid sequence by pressing a single defined UDK. In fact, each UDK can contain up to 70 other keycodes.

Using this generalized definition of what UDK's as print-aids do, their use can be broadened from just "printable" (alphanumeric) keys to almost every key on the keyboard. In fact, there are only six keys which cannot somehow be enetered as a part of any UDK definition. These are:

1. TYPWTR
2. PRINT ALL
3. AUTO ST
4. REPEAT
5. SHIFT LOCK
6. STOP

Additionally, the UDK itself may not be used in its own definition. This would invoke an endless recursion. During the definition of a UDK, if the UDK itself is pressed, the "definition phase" is terminated, and causes the definition to be stored.

The STOP key may be used at any time to abort the editing of the key, without storing anything.

The character-editing keys:

1. →
2. ←
3. DEL CHR
4. INS CHR can be entered as part of a UDK definition. This implemented, during EDITKEY operation only, by pressing CONTROL and the respective one of those four keys. Simply pressing these keys themselves causes their actual editing function to take place.

Many of the keys on the keyboard do not have a directly-printable character which can be displayed to indicate their presence. The alphabetic numeric and punctuation keys (printable characters) can be displayed directly. But, keys such as RECALL, STEP, STORE, etc. cannot. To represent these keys, a mnemonic keyword is displayed on a separate line.

These mnemonics are:

NON-ASCII KEY IDENTIFIERS

| KEYS: | MNEMONICS: |
|---|---|
| TAB | -Tab |
| TAB SET | -Tab set |
| TAB CLR | -Tab clear |
| DEL CHR | -Delete character |
| DEL LN | -Delete line |
| RECALL | -Recall |
| STEP | -Step |
| INS CHR | -Insert character |
| INS LN | -Insert line |
| ROLL ↑ | -Roll up |
| ↑ | -Up arrow |
| ROLL ↓ | -Roll down |
| ← | -Left arrow |
| HOME | -Home |
| → | -Right arrow |
| CLEAR | -Clear |
| ↓ | -Down arrow |
| CLR → END | -Clear to end |
| BACK SPACE | -Left arrow |
| STORE | -Store |
| CONT | -Continue |
| EXECUTE | -Execute |
| PAUSE | -Pause |
| RUN | -Run |
| CLEAR LINE | -Clear line |
| RES | -Result |
| $K_n$ | -Key <n> |
| CONTROL/$K_0$ | -Control inverse video |
| CONTROL/$K_1$ | -Control blinking |
| CONTROL/$K_2$ | -Control underline |
| CONTROL/$K_3$ | -Control protected field |
| CONTROL/$K_4$ THRU $K_{31}$ | Undefined |

Each mnemonic has a hyphen in front of it, and is written primarily in lower case letters. These are to help distinguish the appearance of these mnemonics from what it would normally be by actually keying the same words in character-by-character.

As these keys are pressed as part of a UDK definition, the previous parts will scroll up in the display, and the mnemonic for the key just pressed will appear on the line just above the cursor, with the cursor in the entry area ready for another key.

If ← is used to move the cursor back into the previously defined area, the display will scroll down; but it will do so by one line for each mnemonic, with the cursor under the hyphen of the mnemonic. If a different key is pressed, the entire mnemonic will change. The user cannot change individual characters of these mnemonics, since they stand for single characters (keycodes), and it is a single keycode which is being changed. The mnemonic is only a convenient way to show what that keycode is.

The scrolling up and down when → or ← are pressed may be unexpected, as that is associated normally with ↑ and ↓, not → and ←. But, it must be recognized that: the mnemonics are on individual lines for convenience and visibility in the display; that they represent a left-to-right sequence of characters (keycodes); and that it is this sequence of characters that the cursor is moving through. When ordinary printable characters are entered, they are displayed along a line, as expected, and can be stepped through with the cursor, a character at a time.

As mentioned, all keys on the keyboard (with noted exceptions) can be a part of a UDK definition. This includes keys such as RUN, PAUSE, STEP, etc., which, when pressed from the keyboard, in normal sub-mode, cause an immediate action. When these actions are invoked by these keys within a UDK when it is executed, they terminate the UDK function, since they tell the machine to perform some other function. Thus, while these keys can be entered in a UDK definition, only one such key can appear in a UDK, and it terminates the UDK definition; i.e., it must be the last key.

These special terminator keys are:

| | |
|---|---|
| -STORE | -RUN |
| -CONTINUE | -PAUSE |
| -EXECUTE | -STEP |
| -INSERT LINE | -DELETE LINE |

Additionally, if the UDK is to be used while the machine is in the program-edit/entry sub-mode (i.e., while entering or editing program lines in the EDIT LINE sub-mode) there are additional restrictions in that the keys

—↑
—↓
—ROLL ↑
—ROLL ↓ will cause the program-display to scroll up or down (changing the line being edited), and these will terminate UDK execution. If other keycodes follow those keys in the UDK, they are not processed.

Listing UDK's

Individual keys may be listed by:

1. Typing LIST
2. Pressing the UDK or:

1. Typing LIST KEY <n>(0<n<31)
2. Pressing EXECUTE or:

1. Typing LIST KEY #<sc>, <n> (<sc> is a select code)
2. Pressing EXECUTE

The first two methods cause the key to be listed on the default print device (defined by PRINTER IS). The last method lists to the specified device, rather than to the default print device.

All UDK's are collectively listed by:

1. Typing LISTKEY
2. Pressing EXECUTE or:

1. Typing LISTKEY #<sc>
2. Pressing EXECUTE

Scratching UDK's

Individual keys may be scratched (made undefined) by:

1. Typing SCRATCH
2. Pressing the UDK or:

1. Typing SCRATCH KEY <n> (0<n<31)
2. Pressing EXECUTE

All UDK's are collectively scratched by:

1. Typing SCRATCH KEY
2. Pressing EXECUTE

Predefined commands and keywords

When the system is turned on, or when SCRATCHA is executed, some of the UDK's are predefined by the system, as indicated by the label beneath them on the keyboard bezel. See FIG. 8. The purpose is to provide frequently-used functions or keywords for user convenience. However, the user may, at any time, change the definition of part or all of these predefined UDK's, as he desires.

Recalling how UDK's are defined as user print-aids, where almost any key may be entered on the UDK, including control keys such as CONT and EXECUTE, FIG. 12 shows the listings of the 31 UDK's as they appear just after turn-on. $K_6$ through $K_{15}$ have pre-definitions, as shown by FIG. 12. The remaining UDK's are undefined at turn-on.

Keyboard-interrupt of programs by UDK's

In addition to their use as print-aids and immediate-execute functions related to keyboard operations, frequently-used data entries, etc., the UDK's can be used to directly affect the operation of a running program. This is done by the user's incorporating ON KEY # declaratives, and their associated routines, into the program (the syntax for this is decribed later).

When an ON KEY# declaration for a key occurs, the function of the declared UDK becomes the activation of the ON KEY# operation, and any print-aid or immediate-execute function is suspended. The print-aid definition is not lost, and in fact, print-aid definitions may be keyed-in, edited, listed, stored or loaded from mass-storage (with STORE KEY and LOAD KEY) even though ON KEY# is active. But, if the UDK is (physically) pressd alone, the system first checks if an ON KEY# declaration for that key# (i.e., for that UDK) is active. If it is, the interrupt occurs. The nature of the interrupt is an automatic branch to some special part of the program, regardless of wherein the program the line counter currently points. A multi-level priority scheme allows assignment of priorities to the interrupts caused by the UDK's so that some UDK's can interrupt other in-progress UDK's, but not vice versa. If there is no ON KEY# active, the print-aid definition (if one exists) is carried out. Whenever a program containing an ON KEY# is not actually running, the ON KEY# is deactivated, and the print-aid definition is again available.

The physical pressing of a UDK is necessary to activate the ON KEY# interrupt. It cannot be activated indirectly by the appearance of the key in during the use of a print-aid on another key which "calls" the first key; only the print-aid definition will be used.

Suppose, for example, that these UDK print-aid definitions were in effect:

| KEYϕ | Key1 |
|---|---|
| 123$K_1$ | 456 |

Also suppose that ON KEY#1 has occurred during a running program.

Pressing $K_0$ causes the entry of 123456 in the display. The ON KEY#1 is not activated.

Pressing $K_1$ activates ON KEY#1; the print-aid 456 is not used.

Display special functions

The display is capable of generating several special functions. They are:

a. Inverse video (unlit characters within a lighted character-rectangle)
b. Blinking
c. Underline These are modes of display operation which are turned on and off by pressing CONTROL and specific UDK's:

| | |
|---|---|
| CONTROL $K_0$ | - Inverse Video |
| CONTROL $K_1$ | - Blinking |
| CONTROL $K_2$ | - Underline |

These are toggling functions; once the mode is activated, all subsequent characters are subject to that mode until it is terminated by another use of the CONTROL $K_n$.

Any combination of such modes can be established. For example, a character can be inverse-video and blinking and the following character be underline and blinking.

All of the above modes are cleared by:

a. CLEAR LINE key
b. CLEAR key
c. CLR→END key
d. End-of-line (For each line in the keyboard entry area. EOL does not terminate these modes when they appear in the print area of the display.)

The mode-setting display special-function keys (CONTROL $K_n$) generate special bytes among data to be displayed which, when encountered by the display hardware cause the special-functions (blinking, underline, etc.) to be activated. FIG. 13 lists the octal values the bytes must have for the various combinations of features.

These special-function bytes occupy one character-position in strings (and will thus affect string length) but will not appear in the apparent length as displayed. For example:

Let $K_2^c$ denote the combination CONTROL $K_2$, pressed together in that order. Then AB$K_2^c$CD (length=5)

is displayed as:

AB$\underline{CD}$ which has an apparent length of 4 characters.

When strings which contain display special-function bytes are PRINT'ed to devices other than the display, quite different and unexpected results may occur. The special-function bytes have values $>200_8$ (i.e., eight-bit codes wherein the most-significant bit is set). These may cause various special device-dependent actions, or they may be stripped to 7-bits and displayed as printable ASCII characters, or they may be ignored.

The alphanumeric keyboard

The largest section of the keyboard is devoted to the generation of printable alphanumeric characters and the punctuation symbols needed for writing programs. Imbedded in this keyboard function, and the associated display and internal thermal-printer operation, is the problem of handling alternate character-sets, foreign-language character-sets, the keying-in, displaying and printing of programs, and the handling of printer special functions such as backspace and underline.

The layout of the alphanumeric/punctuation-symbol portion 52 of the keyboard (i.e., the "typewriter" portion) follows the IBM Selectric typewriter as a de facto standard. For foregin-language keyboards, the IBM Selectric is also followed as a de facto standard. In general, all foreign-language options to the Selectric can also be provided as an option for the calculator keyboard. This will be described in detail below.

A serious problem in the provision of many foreign-language keyboards is that several of the punctuation characters required for correct program-syntax are removed in the foreign-language options. The most important of these are the square-brackets [ and ]. The alphanumeric/punctuation-symbol part of the keyboard has been designed to allow the foreign-language options compatible with the Selectric, and at the same time maintain all characters necesary for program-entry. Further, the display and internal thermal-printer also make available foreign-language optional character sets indentical to the keyboard and at the same time maintain the symbols for correct program-listing.

The machine may be equipped with one foreign-language character-set option which will equip it with the necessary key-caps and character-generators for the keyboard and display. The internal thermal printer can also be equipped with a corresponding character-generator ROM.

The numeric-key pad 54 duplicates keys appearing in the typewriter-keyboard area 52. This extra set of keys 54 is used to maintain the necessary keys/characters for program entry. This allows the typewriter-keyboard to be altered to follow the Selectric foreign-language layouts without the concern for loss of essential programming characters. In particular, the [ and ] are always available by shifting the ( and ) keys in the numeric keypad.

The foreign-language options that are defined for the keyboard are shown in FIG. 14.

The ASCII symbols in the heading of FIG. 14 are the keycap symbols which appear on the standard keyboard, and that will be changed if a different symbol appears in that column for any one of the different foreign keyboards. At the same time, the character-generator for the keyboard and display will reflect the option-set. Also, when any foreign-language option is installed, the top row of the standard keyboard (the digits with their shifted punctuation symbols) will be moved to the number-pad keys. This will retain all required programming keys. Then the foreign keys can be redefined in the typwriter keyboard area.

In addition, the option-keyboard definition will allow definition of the keyboard as a "French" keyboard. On it, a number of the alphabetic characters are relocated, and this can be implemented by alteration of the keyboard character-ROM and moving the keycaps.

Also, provision has been made for the definition and inclusion of foreign character-sets such as Katakana and Cyrillic alphabets. These are accessed as "alternate" character sets by the ASCII-definitions Shift-In and Shift-Out ($S_I$ and $S_O$, obtained by pressing CONTROL O and CONTROL N, respectively).

The mixture of printing devices (the display, internal thermal-printer, and external printers) causes considerable difficulty in defining character-handling and control to obtain the same printed result on all devices. The internal devices, particularly the display, have many special features not accessible other than through the keyboard and executing programs. It was deemed desirable to include these features, at some expense in terms of non-uniformity in handling them with other printing and display devices. The display special-functions (inverse video, underline, and blinking) have already been mentioned. Underlining, as a frequently-used function, will perhaps cause the most confusion, and will serve as good example for the purpose of discussion.

For the display, the user would enter

A$K_2^c$B (A CONTROL-$K_2$ B)

to display

A$\underline{B}$.

If this same sequence is printed to the internal thermal-printer, the same result will !be obtained: A$\underline{B}$.

However, if this same character-stream is sent to an external printer, what happens is very device-dependent, because it is usually unknown what the byte $K_2^c$ ($204_8$)

will cause the device to do.

The normal procedure on impact printers for underlining is to send:

AB$^b$s_(A B backspace_)

which will print as

AB

However, many display terminals will replace rather than overstrike when backspace is used. When this occurs, the result is A_ (_replaced the B).

The user must recognize the device-dependencies of the print-devices on the system and program to generate byte-sequences tailored to the device in use. Particular care is required to translate from internal-display generation to obtain similar results on external displays or printers. However, there is considerable similarity between functions of the internal display and the internal thermal printer.

The ASCII control codes which may cause some confusion between devices and various means of display are:

| | |
|---|---|
| BACKSPACE | Replace or overstrike (device dependent) the preceding character. |
| LINE FEED | Advance to the next line, no carriage-return. |
| FORM FEED | Advances to the top of the next form, clear display print area. |
| CARRIAGE RETURN | Replace or overstrike (device dependent) starting at the first character of the current line. |
| SHIFT OUT | Switch to the alternate character set. |
| SHIFT IN | Switch to the standard character set. |

These control-codes may be "seen" in two modes of operation; implied display and program editing. Consider the following:

1. A program line exists: 100 A$="$A^L$FB" (A line feed B)
2. Listing the line gives: 100 A$="$A_B$"
   That is, listing causes the execution of control-codes as they are encountered.
3. PRINT A$ EXECUTE gives: $A_B$
   That is, outputting control-codes during a normal output (printing) operation causes them to be executed as they are encountered.
4. A$ EXECUTE gives: $A^L$FB (in line #25 of the display)
   That is, an implifed display causes control-codes to be displayed rather than executed.
5. EDIT LINE 100 A="$A^L$FB"
   That is, program listings appearing in the EDIT sub-mode cause control-codes to be displayed.

The internal thermal-printer, even though it is a non-impact printer, will recognize the specific pattern backspace-underline, and will do what is effectively an "overstrike". In addition, the thermal-printer will recognize the display special-function for underline.

The user is provided with the capability to store any arbitrary 8-bit byte as a character in a string with the CHR$ function (explained later). These can include the display special-function bytes. When a string containing these special bytes is sent to the display, the bytes will control the special-functions; as though they had been entered using CONTROL-$K_n$.

FIG. 13 shows the relationship between the decimal value of the argument of the CHR$ function and the resulting special function in the display.

Notice that each of the 16 possible combinations can be produced by 8 different argument-values.

This capability may be used directly by the user to generate special-function control of the display by program-generated strings, rather than by physically keying in the control codes with CONTROL-$K_n$. However, strings generated for other purposes which contain these codes will also control the display if printed to it.

The internal thermal printer reacts to a subset of the entries in FIG. 13. These are:

First line-values 128 to 143: the result is that the values which control underlining (UL) will be acted on. All others will be ignored.

Second line-values 144 to 159: these will all be ignored, and no character-space will be generated in their place.

Remaining lines-values 160 to 255: these will cause the printing of characters from the alternate character set—whatever happens to be installed. These alternate characters are also accessible with the normal $S_O/S_I$ sequence.

The following explains the typing function keys 48.

The keys TAB SET, TAB CLEAR, and TAB are used to control the position of the cursor in the keyboard-interactive line of display whenever the display is in the alpha mode.

Any number of tabs may be set by moving the cursor to the appropriate position by spacing, and pressing the TAB SET key.

When the TAB key is pressed, the cursor is advanced (to the right) to the first tab setting. If it moves across characters already keyed in, they are unchanged. If there have been no characters keyed in, the intervening character positions across which the cursor passes are filled with spaces. If no tab settings are defined, the cursor is moved to the 160th character-position (right-most end of line #24). All intervening characters are made blanks, so that the cursor can be moved with → or ← to any position on either line, which, it will be recalled, cannot be done if nothing has been keyed in; spaces are characters.

Individual tabs can be cleared by using the TAB key to reach the position to be cleared, and then pressing the TAB CLEAR key. All tabs are cleared at power-on, by CONTROL-STOP, or by executing SCRATCHA.

The TYPWTR key has been mentioned previously in describing the display formats. When pressed, the word TYPWTR appears in the right of the bottom line of the interactive display. If pressed again, the word disappears. When the word is present it indicates that the alphanumeric portion of the keyboard is in the "typwriter" mode. When not in the typwriter mode, the keyboard is much like a teletype keyboard in that, when the SHIFT key is not pressed, all letters are capitals and the top row is numeric digits. When the SHIFT key is pressed, the letters revert to lower-case, and the top row becomes the punctuation symbols (and the upper symbols on all other keys). This means that the letters are inverted from the normal typewriter operation; this is a situation very confusing to typists (but very normal to programmers who have used teletypes and many computer CRT terminals).

When the typewriter mode is activated (as signalled by the word TYPWTR), the keyboard is switched to operate like a typewriter. The letters are lower-case when unSHIFT'ed and all other symbols are the bottom symbol. When SHIFT'ed, the letters are all capitals, and the upper symbol is on all other keys.

The reason that the typewriter mode is indicated by the display of TYPWTR rather than a mechanically locking key (like PRINT ALL and AUTO ST) is that the typewriter mode can also be activated by a program statement, as well as the key TYPWTR. The syntax of the statements controlling this are:

```
TYPEWRITER ON
```

and:

```
TYPEWRITER OFF
```

They can be executed from the keyboard, or as part of the program. When these commands activate or deactivate the typewriter mode, the word TYPWTR appears or disappears from the display.

When CONTROl-TYPWTR are pressed (together, CONTROL first), the words SPACE DEPENDENT appears in the right of the bottom display line. If CONTROL-TYPWTR is pressed again, SPACE DEPENDENT disappears.

Also, TYPWTR and SPACE DEPENDENT are mutually exclusive, if one is activated while the other is set, the new will cancel the old.

The SPACE DEPENDENT mode controls the syntaxing of program lines. Normally, all variable names must begin with a capital letter; subsequent characters are lower-case letter or digits. In this normal syntaxing mode, the entry of program lines is independent of spaces, and variables may have names which are like keywords (such as READ, PRINT, etc.). Such variable names are distinguished from keywords in that they are actually entered as Read, Print, etc.

In the SPACE DEPENDENT MODE, variable names may be typed in as all capital letters (a physical convenience in typing!). To make the syntax non-ambiguous, the syntaxer (in this mode) requires that:

1. Keywords (READ, PRINT, etc.) must be separated by spaces from the remainder of the statement.
2. If the spelling of a variable name is the same as a keyword, it cannot appear first in a statement. In general, like spellings should be avoided.

In any case, the variables, while they may be accepted with all capital-letters in the SPACE DEPENDENT mode, are converted internally to their normal spelling: capital followed by lower-case. When the program is listed, it will show this altered spelling.

Also, when the program is SAVE'd, it will have the altered spelling. If the SPACE DEPENDENT mode is set when GET or LINK are executed, the program loaded from mass-storage will be syntaxed in the SPACE DEPENDENT mode. If the program-file was generated by a SAVE, there should be no problem. However, if the program-file was generated some other way, (e.g., written by another program), it may cause trouble is SPACE DEPENDENT rules are not followed.

RECALL key

Any keyboard entry (followed by STORE, EXECUTE or CONT) will be stored in a "recall" buffer. It can be recalled to the keyboard-entry line by pressing the RECALL key.

In fact, when stored in the recall buffer, the entry is pushed onto the top of a stack of previous recall entries. A fixed amount of storage is available; the addition of a new entry to the top of the stack may cause the loss of one or more entries at the bottom of the stack.

The entries on the stack (from the top down) may be recalled successively by repeated depressions of RECALL. Successive entries coming "back up" may be recalled by pressing SHIFT-RECALL.

In addition, when EDIT <string> is executed, the original value of the string is placed in the top of the recall buffer.

Commands and Statements

An instruction to the calculator that can only be EXECUTE'd from the keyboard but not STORED'd in a program is called a command. In contrast, a statement can always be STORE'd, and most of them can be EXECUTE'd, also.

There now follow some commands useful in programming the calculator.

AUTO Command

The AUTO command allows program lines to be numbered automatically as lines are stored.

Its syntax is:

```
AUTO <line number>[,<increment value>]
```

Examples:

```
AUTO

AUTO 50

AUTO 10,5
```

If no parameters are specified, numbering begins with 10 and is incremented by 10. The beginning line number must be a positive integer. The increment value must be a positive integer.

After AUTO is executed the initial line number appears at the left of line #23 (keyboard entry line) of the display. The line to be stored is then keyed in, thus completing the line. STORE is then pressed, the next line number appears, and the process continues. This mode is in effect until EXECUTE is pressed.

LIST Command

The LIST command outputs a listing of all or part of the program lines in memory in order from lowest numbered to highest numbered line.

Its syntax is:

```
LIST# <select code<[,<HP-IB buss address>]
  [;<line i.d.>[,<line i.d.>]]

LIST [<line i.d.>[,<line i.d.>]]
```

The optional select code with option bus address specifies a device other that the standard printer where the listing is to be output; the select code is an integer in the range 16 and 0 through 12.

If no line number is specified, the entire collection of programming present in the calculator (mainline plus any subprograms) is listed.

If one line number is specified, the listing begins with that line. If it is not a line in memory, the listing begins with the next highest numbered line that is.

If two line numbers are specified, that block of lines, including beginning and ending lines, is listed.

LISTKEY Command

The LISTKEY command causes print-aid definitions of UDK's to be listed.

Its syntax is:

LISTKEY# <select code>[<HP-IB bus address>[;key number>]

LISTKEY [<key number>]

If no parameters are included, the definitions of all UDK's are listed on the printer-is device.

The select code specifies a device other than the standard printer on which the listing is to be output. It is an integer in the range 16 and 0 through 12.

The key number is an integer from 0 through 31, inclusive.

A third syntax lists the definition of a single key on the standard printer:

LIST $K_n$

REN Command

The REN (renumber) command allows the program in memory to be renumbered.

Its syntax is:

REN [<line number>[,<increment value>]]

Examples:

REN

REN50

REN20,5

If no parameters are specified, the new numbering will begin with 10 and be incremented by 10.

The beginning line number and increment value must be integers.

SCRATCH Command

The SCRATCH command and its variations erase selected items from memory:

| | |
|---|---|
| SCRATCH | Erases program and data pointers. |
| SCRATCHP | Erases program, binary routines, variables and the files table. |
| SCRATCHA | Erases the entire memory. |
| SCRATCHV | Erases all variables |
| SCRATCH | Erases all UDK definitions including their pre |
| KEY | defined typing aid definitions. |
| SCRATCH $K_n$ | Erases the indicated UDK typing aid definition. |

DEL Command

The DEL command is used to delete lines or sections of a program.

The syntax is:

DEL <line i.d.>[,<line i.d.>]

Examples:

DEL50

DEL Sub, Subend

If only the first <line i.d.> is specified, only that line is deleted.

If two <line i.d.>'s are specified, all lines in that segment are deleted, inclusive.

To delete an entire program, but save variables, DEL 1, 9999 can be executed.

To delete a SUB or DEFFN statement, the entire subprogram must be deleted.

SUSPEND INTERACTIVE Statement

Unlike many calculators, the present calculator's display is not blanked during the execution of a program. In fact, during the execution of a program the calculator responds to keys pressed on the keyboard, and displays the results of computations, just as if no program were running. This capability is called the interactive mode, and it is normally established at turn-on, after CONTROL-STOP, and SCRATCHA.

Most commands and statements can be EXECUTE'd during the interactive mode, with some obvious exceptions such as RUN (redundant), CONT and SCRATCH commands. In fact, variables used in the currently executing program can be accessed and their values inspected or changed. The program itself can even be altered while it is running, although this may have unpredictable results regarding its current execution if not done with care.

There are instances, however, where a programmer may wish to disable the interactive mode, in order to guarantee certain aspects of program operation. He may wish, for example, to ensure that the printer output is uncontaminated by the results of the calculations of passers-by.

The interactive mode is suspended by executing the SUSPEND INTERACTIVE statement.

Its syntax is:

SUSPEND INTERACTIVE

Once executed (either as a statement or as a command) the calculator will refuse to EXECUTE or STORE anything keyed in at the keyboard. An attempt to do will result in the message "PROGRAM EXECUTING". Responses to INPUT, LINPUT and EDIT statements may still be made, however, and if the program halts the keyboard is again available for use. The halt may be a result of any conditions that normally result in a halt; i.e., errors, programmed STOP's and PAUSE's, and including pressing STOP and PAUSE on the keyboard.

Suspending the interactive mode does not interfere with ON KEY# interrupts.

RESUME INTERACTIVE Statement

The RESUME INTERACTIVE statement re-enables the interactive mode, after it has been suspended.

The syntax is:

RESUME INTERACTIVE

THE CALCULATOR'S VERSION OF BASIC

A major objective of the calculator's language is ANSI compatibility, in that any valid ANSI BASIC program will execute correctly on the calculator. However, the calculator's version of BASIC includes many language enhancements.

Variables and Constants

There are four types of variables:

A. Full Precision Numeric (REAL)
B. Short Precision Numeric
C. Integer Numeric
D. Strings There are four statements used for explicit declaration of these types of variables: REAL, SHORT, INTEGER, and DIM, respectively. All undeclared variables are REAL by default. String variables are allowed only in the DIM statement. Strings, as a type, are specified implicitly by the presence of a dollar-sign ($) following the last character of the name.

For example:

```
DIM A(10,6), B$(100)

INTEGER B,C,D(5)

SHORT Q
```

Numeric variable means may have 1 to 15 characters. The first character must always be a capital letter. Following characters, if any, must be either lower case letters, digits, or the underscore. No other characters are allowed. If the calculator is operating in the space dependent mode, variable names may consist entirely of upper case characters, if desired.

Any name may be used simultaneously for simple numeric, simple strings, numeric array, and string array variables. The definition of the language makes each use non-ambiguous.

The range of REAL numeric values which can be entered, store, or output, is −9.99999999999×10 ^ 99 through −1×10 ^ −99, 0, 1×10 ^ −99 through 9.99999999999×10 ^ 99. However, the range of calculations is from −9.99999999999×10 ^ 511 through −1×10 ^ −511, 0, 1×9.99999999999×10 ^ −511 through 9.99999999999×10 ^ 511.

Short precision variables have a range of −9.99999×10 ^ 63 through −10 ^ −63, 0, 10 ^ −63 through 9.99999×10 ^ 63, with 6-digit precision.

Integer values allowed are −32768 through 32767.

The extended calculation range for REAL variables is useful for calculations which have intermediate results outside of the storage range, but which have final results within the storage range.

For instance:

(9.2×10 ^ 23×8.6×10 ^ 80)/(1×10 ^ 24)

When the first two values are multiplied the result is:

(7.912×10 ^ 104)

This intermediate result cannot be stored, but the final result, 7.912×10 ^ 80, can.

The length of a numeric constant is limited only by the length of the line containing it. However, its range is ultimately subject to the same restrictions as apply to REAL variables. Constants are internally represented in the full precision format, and long constants are truncated to 12 digits of precision.

Operators

An operator performs a mathematical, logical, or relational operation on one or two values. For instance, the minus sign in A−B is a binary operator that results in subtraction of the values; the minus sign in −A is a unary operator indicating that A is to be negated.

A legal combination of one or more operands with one or more operators forms an expression. The operands that appear in an expression can be constants, variable function invocations, or other expressions enclosed in parentheses.

Operators may be divided into types depending on the kind of operation performed. The main types are Arithmetic, Relational, and Logical (or Boolean) operators.

The Arithmetic Operators are:

| | | |
|---|---|---|
| + | Add (or if unary, no operation) | A + B or +A |
| − | Subtract (or if unary, negate) | A − B or −A |
| * | Multiply | A * B |
| / | Divide | A/B |
| or ** | Exponentiate | A ∧ B or A**B (A raised to the Bth power) |
| DIV | Integer Divide | A DIV B |
| MOD | | A MOD B ( A − B* INT(A/B) ) |

(**is converted internally to ∧)

In an expression, the Arithmetic Operators cause an arithmetic operation resulting in a single numeric value.

The operator '/' always specifies floating point divide; the operator 'DIV' specifies integer division, which is defined as SGN(A/B)*INT(ABS(A/B)).

The Relational Operators are:

| | | |
|---|---|---|
| = | Equal to | A = B |
| < | Less Than | A < B |
| > | Greater Than | A > B |
| <= | Less Than or Equal to | A <= B |
| >= | Greater Than or Equal To | A >= B |
| <> | Not Equal To | A <> B |
| # | Not Equal To | A # B |

may be entered for Not Equal, but is converted to <> internally.

When Relational Operators are evaluated in an expression they return the value 1 if the relation is found to be true, or the value 0 if the relation is false. For instance, A=B is evaluated as 1 if A and B are equal in value, and as 0 if they are unequal. All 12 digits of precision are used in equality checks.

The four Logical Operators, AND, OR, EXOR, and NOT are useful for evaluating Boolean expressions. Any value other than zero (false) is evaluated as true. The result of a logical operation is either 0 or 1.

| OPERATION | SYNTAX | TRUTH TABLE | | |
|---|---|---|---|---|
| | | A | B | A — B |
| AND | <exp> AND <exp> | F | F | 0 |
| | | F | T | 0 |
| | | T | F | 0 |
| | | T | T | 1 |
| | | A | B | A OR B |
| OR | <exp> OR <exp> | F | F | 0 |
| | | F | T | 1 |
| | | T | F | 1 |
| | | T | T | 1 |
| | | A | B | A EXOR B |
| EXOR | <exp> EXOR <exp> | F | F | 0 |
| | | F | T | 1 |
| | | T | F | 1 |
| | | T | T | 0 |
| | | A | | NOT A |

-continued

| OPERATION | SYNTAX | TRUTH TABLE | |
|---|---|---|---|
| NOT | NOT <exp> | F | 1 |
| | | T | 0 |

Functions

The built-in numeric Functions for the calculator are:

| | |
|---|---|
| ABS <operand> | Returns the absolute value of the operand. |
| ACS <operand> | Returns the principal value of the arccosine of the operand in current angular units. |
| ASN <operand> | Returns the principal value of the arcsine of the operand in current angular units. |
| ATN <operand> | Returns the arctangent of the operand in current angular units. |
| COL <array operand> | Returns the number of columns in the specified matrix. |
| COS <operand> | Returns the cosine of the operand in current angular units. |
| DET | Returns the determinant of the most recently inverted matrix. |
| DET <array> or DET (< array >) | Returns the determinant of the matrix specified. |
| DOT (<array operand>, <array operand>) | Returns the inner product of the specified vectors. |
| DROUND (<operand 1>, <operand 2>) | Returns operand 1 rounded to the number of digits specified by operand 2. |
| ERRL | Returns the line number of the most recent program execution error. |
| ERRN | Returns the error number of the most recent program execution error. |
| EXP <operand> | Returns the Naperian e raised to the specified power. |
| FRACT <operand> | Returns the fractional part of the operand. |
| INT <operand> | Returns the largest integer less than or equal to the operand. |
| LEN <string operand> | See 'String Variables'. |
| LGT <operand> | Returns the base 10 (common) logarithm of the operand. |
| LOG <operand> | Returns the natural logarithm of the operand. |
| MAX (<num exp>, . . . , <num exp>) | Returns the maximum value in the list of expressions. |
| MIN (<num exp>, . . . , <num exp>) | Returns the minimum value in the list of expressions. |
| PI | Returns the value 3.14159265360. |
| POS (<string operand>, <string operand>) | See 'String Variables'. |
| PROUND (<operand 1>, <operand 2>) | Returns operand 1 rounded to the power of 10 position specified by operand 2. |

RES

The RES (result) function returns the result of the last numeric computation that was executed from the keyboard. RES can be used as part of a program; however its definition remains unchanged. It still returns the value of the last keyboard computation. That value can change during program execution if a keyboard computation is performed during the execution of the program.

| | |
|---|---|
| RND | Returns a pseudo-random number in a standard sequence of numbers >0 and <1 (see RANDOMIZE statement). |
| ROW <array> | Returns the number of rows in the specified matrix. |
| SGN <operand> | Returns −1 if the operand is negative, 0 if the operand is 0, and 1 if the operand is positive. |
| SIN <operand> | Returns the sine of the operand in current angular units. |
| SQR <operand> | Returns the square root of the operand. |

-continued

| | |
|---|---|
| TAN <operand> | Returns the tangent of the operand in current angular units. |
| TYP <operand> | Returns the type of the next data item in the specified file. |
| VAL <string operand> | See 'String Variables'. |

Expressions

An expression is a combination of variables, constants and functions. An expression is evaluated by replacing each variable with its value, evaluating any function calls, and performing the operations indicated by the operators. The order in which operations are performed is determined by the hierarchy of operators:

^(or**) (Highest)

NOT, Unary −, Unary +

*,/,MOD,DIV

+,−(Binary)

& (String Concatenate)

Relational (=, <,>, <=,>=, <> [or #])

AND

OR, EXOR (Lowest)

In evaluating an expression the operator at the highest level is performed first, followed by any other operators in the hierarchy shown above. If operators are at the same level, the order is from left to right. Parentheses can be used to override this order. Operations enclosed in parentheses are performed before any operations outside the parentheses. When parentheses are nested, operations within the innermost pair are performed first.

For instance:

```
 5+6*7 =5+42 = 47
 14/7*6/4=2*6/4 = 12/4 = 3
If A=1, B=2, C=3, D=3.14, E=0
Then:
A + B*C        = A + 6 = 7
A*B + C        = 2 + C = 5
A + B - C      = 3 - 3 = 0
(A+B)*C        = 3*C = 9
B^(-B)^C       = B^(-2)^C = .25^C = 1/64 or .015625
```

Assigning A Label To A Statement

Using program line numbers as labels for statements can become confusing and lead to programming errors. The calculator provides a facility for assigning an alphanumeric label to a statement, and using that alphanumeric name in referencing that statement.

An alphanumeric name has the same format as a variable name; that is, it consists of an uppercase letter, followed by lowercase letters, digits, or the underscore character '_'. The label is placed between the line number and the start of the statement. It is separated from the statement by a colon.

Examples:

```
10  Label: INPUT A,B

20  Loop: If A>B THEN STOP
```

An alphanumeric label may be used in place of a line number anywhere in a program.

Example:

```
50  GO TO LOOP

60  RESTORE Number_data

70  Number_data: DATA 1,2,3,4,5

80  IF Y=B1 THEN Label
```

Line 50 is equivalent to '50 GO TO 20'; line 60 is equivalent to '60 RESTORE 70'; line 80 is equivalent to '80 IF Y=B1 THEN 10'.

Every program line must have a line number in addition to any alphanumeric label it may have.

Remarks and Comments

It is often desirable to insert notes and messages within a program. Such data as the name and purpose of the program, how to use it, how certain parts of the program work, and expected results, are useful information to have present in the program.

The Calculator's BASIC provides two ways of inserting comments into a program:

1. The REMark statement, and
2. The use of the exclamation mark (!)

The word REMARK is abbreviated to REM for typing convenience, and the message itself can contain any printing characters on the keyboard.

Example REM Statements:

```
10 REM . . . THIS IS A REMARK

20 REM - - - This Program Computes The SIN
  Function

30 REM
```

The exclamation mark enables comments to be put on the same line as a statement. Anything which follows an exclamation point is printed with any program listing, but ignored by BASIC and does not affect program execution. Any printable character may follow the exclamation point, including another exclamation point.

Example !-Comments:

```
10 LET A = B**2   ! Set A equal to the value of B squared
20 PRINT A        ! Print the value of A
30                ! The remaining statements compute
                    the SIN function
```

Messages in REMARK statements are referred to as remarks; those after the exclamation mark are referred to as comments.

DEG Statement

The DEG (degree) statement is used to set degrees as the unit for arguments of trigonometric functions. A degree is 1/360th of a circle.

The syntax is:

```
DEG
```

RAD Statement

The RAD (radian) statement is used to set radians as the unit for arguments of trigonometric functions. There are $2\pi$ radians in a circle.

The syntax is:

```
RAD
```

GRAD Statement

The GRAD statement is used to set grads as the unit for arguments of trigonometric functions. A grad is 1/400th of a circle.

The syntax is:

```
GRAD
```

LET Statement

The purpose of the LET statement is to assign a value to a variable. A LET statement can be either a string LET, or a numeric LET, depending on whether the variable whose value is being changed is a string or numeric variable. More than one simple variable or array element value can be altered at a time, within a single LET statement.

| Valid Examples: | Explanation: |
|---|---|
| 10 LET A = B | Alters value of A to the value of B |

-continued

| | |
|---|---|
| 20 LET A$ = B$ | Alters value of A$ to the value of B$ |
| 30 LET R = SIN(T) ^ 2 + COS(T) ^ 2 | Assigns R the value of the expression shown |
| 40 LET X(I) = Y ^ 2 | Ith element of array X set to Y 2 |
| 50 LET X$(I) = " " | X$(I) set to null string |
| 70 LET X = (A = B) | X is either 1 or 0 depending on whether A = B or A < >B. |
| 80 LET M = N = B + 3 | Value of M and N set to the value of B + 3 |
| Invalid Examples: | Explanation: |
| 10 LET X = X$ | Cannot assign string value to numeric variable |
| 20 LET X$ = X | Cannot assign numeric value to string value |
| 30 LET X(*) = 1 | Can only alter one element at a time |

For each numeric variable being assigned of type SHORT or INTEGER, the expression on the right-hand side is converted, with rounding, to the proper type before being stored.

In multiple assignment statements to array elements, the subscripts are evaluated before the right side expression is evaluated or any results are stored.

For Example:

```
10 I=1

20 (A(I)=I=2
```

results in the value 2 being stored into the element A(1).

The conflict between multiple assignment and relational test for equality is always resolved in favor of multiple assignment.

Example:

| | |
|---|---|
| 10 A = B = C | Multiple assignment |
| 20 A = B = (C = D) | Assigns A and B the value of 0 or 1 |
| 30 A = B$ = C$ | Assigns A the value of 0 or 1 |
| 40 B$ = C$ = D$ | Multiple assignment |
| 50 A = (B = C) = D | Assigns A the value 0 or 1 |
| 60 B$ = A = B | Invalid |

The LET statement is the most used statement in the BASIC language; as a convenience, the keyword LET may be omitted. This is the only statement in the BASIC language where the leading keyword may be omitted. A LET statement with the keyword LET omitted is known as an implicit LET statement. Except for the missing keyword LET, an implicit LET statement is exactly like an explicit or regular LET statement.

Example:

```
10 A=B

11 A$=B$="123"

20 R=SIN(T) ^ 2+COS(T) ^ 2

50 X(I)=Y ^ 2

60 X$(I)=" "

70 X=(A=B)
```

Input Statement

Some way is needed for getting information into and out of the program. One way these are accomplished is with the INPUT and PRINT statements of BASIC.

The INPUT statement allows the input of data into a program from the keyboard.

Example:

```
10 INPUT A

20 INPUT C,D,S$

30 INPUT I,A(I),A$(J),J$[2,4]

40 INPUT "NAME",A$,"AGE",A

50 INPUT A(*)
```

(The example assumes the arrays are already defined.)

The items in the list following the keyword INPUT must be simple numeric variables, entire arrays specified by <label>(*) or <label>$(*), array element reference, or string variables. Each variable may be preceded by a single quote field followed by a comma, which will be displayed as a prompt for that variable.

An INPUT causes the variables in the list to be assigned, in order, the numeric expression or string constant (quoted or unquoted) supplied in the input-reply during the operation of the program. Numeric expressions and string constants in the input-reply are separated by commas. When the INPUT statement is encountered in the program, the prompt, if any, for the first variable is displayed. If no prompt is present, the input prompt character "?" is displayed. Execution of the program is suspended until the list has been satisfied. In order to satisfy the INPUT statement, the values to be assigned to each variable in the list are typed in, separated by commas. CONT or STEP is then pressed.

If the number of items in the input-reply exceeds the number of variables in the input list, the excess items will be ignored. If the input-reply contains fewer items than the input list, the supplied prompt or the "?" will be displayed for the remaining unmatched variables which may then be entered, followed by CONT or STEP.

The type of datum in the input-reply must correspond to the type of variable to which it is to be assigned; that is, numeric expressions must be supplied as input for numeric variables, and string constants must be supplied for string variables. Any numeric expression within range may be assigned to any numeric variable. If the types do not match, an error message will be printed, the prompt remains, and the input-reply can be edited and re-submitted.

Any subscripts in the variable list are evaluated after values have been assigned to the variables preceding them (that is, to the left of them) in the variable list. INPUT statements are programmable only.

LINPUT Statement

The LINPUT statement allows the inputting of any combination of characters from the keyboard and assigning them to a string variable.

Example:

```
10 LINPUT A$[1,40]

20 LINPUT "Type in Report Heading",C$[1,132]
```

Only one string variable is allowed in each LINPUT statement. A prompt may precede the string variable. When the LINPUT state is encountered the prompt, if any, is displayed. When the response has been entered, pressing CONT or STEP causes it to be accepted. The exact contents of the keyboard entry area, including leading and trailing blanks up to the cursor, are then assigned to the string variable according to the rules of string assignment. If the keyboard entry area is empty (null), the null string will be assigned to the string variable.

The LINPUT statement is programmable only; it cannot be executed from the keyboard.

READ Statement

It is also possible to supply data to a program from within the program itself. This is accomplished via the interaction of the READ, DATA, and RESTORE statments of BASIC.

The purpose of the READ statement is to transfer data from a DATA statement to a variable within a program. READ is programmable only.

| Example: | Explanation: |
|---|---|
| 10 READ A | Reads a new value for A |
| 20 READ A,A$,A(I) | Reads new values for A, A$, and A(I) |
| 30 READ A(*) | Reads new values for array A |

DATA Statement

The DATA statement holds the values to be transferred to a variable by the READ statement.

| Example: | Explanation: |
|---|---|
| 10 DATA 10 | Holds one numeric value of 10, or one string value of "10". |
| 20 DATA 10, "ABC" | Holds one string value, "ABC". |
| 30 DATA 10, "ABC" | Holds one numeric value of 10 and one string value of "ABC", or, two string Values of "10" and "ABC". |

DATA statements are non-executable and may appear as any line written in a program. Any reference to a DATA statement, except by a RESTORE statement, is a reference to the first executable statement following the DATA statement. Only constants, numeric or string, may appear in a DATA statement. Any data is legal for a string variable; only numeric constant data is legal for numeric variable. The following are examples of invalid data for numeric variables:

| Invalid Examples: | Explanation: |
|---|---|
| 10 DATA 10 + 20 | 10 + 20 is an expression |
| 20 DATA A | A is not a numeric constant |

The elements of the various DATA statements in a main program are linked together to form a data list which acts conceptually as one DATA statement. Each subprogram also forms its own equivalent DATA statement. Within the mainline and within each subprogram, data values are transferred starting with the first value of the first DATA statement through the last value of the first DATA statement, and continuing in order of the DATA statements, until the last value of the last DATA statement has been transferred. Afterwards, any further READ's will result in end-of-data errors. The type of a variable and the type of the constant in the DATA statement must match. As in an input-reply, the data values for string variables may be quoted or unquoted strings. DATA statements are programmable only.

Example:

10 DATA 53, HELLO, Goodbye !This Is A Comment contains three data items, 53, "HELLO" and "Goodbye".

20 DATA 53, HELLO, Goodbye, "!This Is Not A Comment" contains four data items: the same three as above, plus the string constant "!This Is Not A Comment".

Example:

Assume

```
10 DATA 10

20 DATA 20

30 DATA 30
```

After

```
100 READ A,B,C
```

the variable values will be

A=10, B=20 and C=30.

If

```
110 READ D
```

is then executed, an end-of-data error will occur.

Assume

```
10 DATA 10,20,30,"X"

20 DATA 40,50,60
```

After

```
100 READ A

200 READ B,C,D$

300 READ E
```

the variable values will be

A=10, B=20, C=30, D$="X" and E=40.

Assume:

```
10 DATA "1.0E20"
```

Then

```
100 READ A
```

will cause an incompatible type error because variable A is numeric while "1.0E20" is a string constant.

Assume:

```
10 DATA 1.0E20,1.0E20
```

Then

```
100 READ A,A$
```

is legal and the variable values will be
A=1.OE20, A$="1.OE20"

RESTORE Statement

In its simplest form, the RESTORE statement starts the reading of the subsequent data values for READ statements back at the first value of the first DATA statement within the current program segment (main-line or subprogram).

Example:

Assume

```
10 DATA 10,20

20 DATA 30,40
```

After

```
100 READ A,B,C,D

200 RESTORE

300 READ X,Y,Z
```

the variable values will be

A=10, B=20, C=30, D=40

X=10, Y=20, Z=30

The next level of control starts reading values at the first value of a particular DATA statement, (again within the current program segment) as specified by a line number of label parameter in the RESTORE statement.

Example:

Assume

```
10 DATA 10,20

20 DATA 30,40

30 DATA 50,60
```

After

```
100 READ A,B,C

200 RESTORE 20

300 READ D
```

the variable values will be
A=10, B=20, C=30 and D=30

After

```
400 READ A

500 RESTORE 10

600 READ B
```

the variable values will be

A=40 and B=10

Notice that

```
500 RESTORE 10
```

is equivalent to

```
500 RESTORE
```

since statement 10 is the first DATA statement in the program. If the specified line does not exist or is not a DATA statement, the next following DATA statement (if any) is accessed. RESTORE statements are programmable only.

EDIT Statement

A statement for altering the stored value of a string variable from a display of the present value is included.

The syntax is:

EDIT[<prompt>],<string variable name> where <string variable name> may be any string variable.

When this command is encountered, the present value of the variable will be displayed in the input area 58 of the CRT, the <prompt> displayed in line #22, and the LINPUT routine will be entered.

The display value may be cleared, and a new value keyed in, and submitted as input with CONT or STEP. If the CONT or STEP is pressed without the displayed value being changed, no alteration of the stored value will result. The result is then exactly the same as if the LINPUT statement had been executed.

Alternatively, the displayed current value may be edited in any way using the regular editing functions of the machine. Depression of CONT or STEP will cause this edited value to be accepted as the new value, which will be stored. EDIT statements are programmable only.

FIXED Statement

The FIXED statement established a fixed-point format for printing and displaying numbers.

The syntax is:

FIXED <num exp>

The <num exp> is rounded to an integer and specifies the number of digits presented to the right of the decimal point. That integer must be $0 \leqq n \leqq 12$. Numbers output under the FIXED-point format are also rounded to that number of digits. A specification of FIXED 0 does not output a decimal point.

Under some conditions the format will temporarily revert to a FLOAT n specification, where n= the number of significant digits in the number being output. First, this will happen if the number of digits exceed the space available for their presentation. Numbers are present in a 20-character field, and space must be allocated for a sign, decimal point, and trailing blank for separation from the next field. This means a maximum 17 digits can be output. Reversion is possible if the number of digits to the left of the decimal point plus the specified number of places in the FIXED statement add to 18 or more. Secondly, if the absolute value of the number is $>10^{12}$ it is output in a floating point format.

FLOAT Statement

The FLOAT statement establishes a floating-point format for printing and displaying numbers.

The syntax is:

FLOAT <num exp>

The <num exp> is rounded to an integer and specifies the number of digits presented to the right of the decimal point. That integer must be $0 \leqq n \leqq 11$.

The calculator's floating point number format is:

SD.DDDDDDDDDDDESXXꝒ(S=sign, D,X=digit, Ꝓ=blank)

STANDARD Statement

The STANDARD statement establishes a format for printing and displaying numbers wherein the calculator chooses an appropriate FIXED or FLOAT specification, as determined by the rules listed below.

The syntax is:

STANDARD

The rules are:

1. Any number whose absolute value is $1<|X|<10^{12}$ is output in fixed-point, showing all significant digits.
2. Any number whose absolute value is less than one is output in fixed point if it can be represented exactly with twelve or less digits to the right of the decimal point.
3. All other numbers are represented in FLOAT 11.

All numbers are output into a 20character field, which includes at least one blank for separation, and a leading blank or minus for the sign. The STANDARD format is set at power-on, after RUN, and after SCRATCHA.

PRINT Statement

The PRINT statement is used to output results of the program. The data to be printed is specified in a print list following the keyword PRINT.

Example:

| | |
|---|---|
| 10 PRINT | Prints a blank line |
| 20 PRINT A;B | Prints the value of A, followed by the value of B |
| 30 PRINT A*B/53 | Prints the value of the expression A*B/53 |
| 40 PRINT "HELLO";B$ | Prints HELLO followed by the value of B$ |
| 50 PRINT A(*);B,C, | Prints the entire array A, followed by the values of B and C |

The items in a print list may be any legal numeric or string expressions. Multi-line user defined functions are not allowed (directly or indirectly). Commas and semicolons are used as delimiters of expressions within the print list. Each output line is divided into fields of 20 spaces each; the last field on a line may have fewer than 20 spaces. The default output line is 80 characters wide, and so has 4 fields of 20 spaces each. (Line width can be changed with the PRINTER IS statement described below.) When a comma follows a print-item, the next item is printed at the start of the next field. Each immediately following comma causes an entire field to be skipped. When a semi-colon follows a print-item, the next item is printed immediately after the preceding item. If the output list is terminated by a comma or a semi-colon, the next PRINT statement begins on the same line. Otherwise, the next PRINT statement begins on a new line. A list item is never split across two lines.

A numeric-value is psinted with one trailing blank. If the number is negative, a leading minus sign is printed. If the number is positive a leading blank is printed.

Example:

Suppose A=PI (π), B=2.89746152E56, C$="Calculator Ꝓ"

```
10 PRINT A; SIN(A)
20 PRINT "HELLO" & C$; "B="; B,
30 PRINT "COS A =",COS(2*A)
```

prints the following output:

```
3.1415926536 ϕ
HELLOCalculatorB=2.897461520ϕϕϕE+56
        COS A=  1
```

There are several control functions which can be used in a print list to modify the output format. These include:

TAB(X)

The print position is moved to the column specified by X, where X is any numeric expression and which is rounded to the nearest integer upon evaluation. If the rounded result is less than 1, a default valve of 1 is supplied and execution resumes. If the rounded result is greater than the number of columns, the result is Xnew=Xold−width * INT((Xold−l)/Width). If the Xnew is less than the current print position a new line is generated. The print position is then moved to the column indicated by the result. Default print positions are numbered 1 through 80.

SPA(X)

Blanks are printed for the number of spaces indicated by the numeric expression X, evaluated as above, beginning at the current print position. If the number of spaces will not fit on the current line, the next print item starts at the beginning of the next line.

LIN(X)

As many lines are specified by the numeric expression X are skipped.

If X>0 then 1 carriage return, X line feed(s)
X=0 then 1 carriage return
X<0 then X line feed(s)

PAGE

Causes an ASCII FF (octal 14) to be output. Additional PRINT example:

Assume value of A and C$ as above, and SHORT I,A. Then

```
10   FOR I=0 TO 1 STEP 1/3
20   PRINT "COS(";I*A;")=";SPA(5);COS(A*I)
30   NEXT I
```

prints

```
COS(ϕ)=  1
COS(1.ϕ4719561947)=  0.5ϕϕϕϕ1672923
COS(2.ϕ9439123894)=  −0.499996654147
COS(3.14158685841)= −1
```

One can delete the trailing spaces after numerics, or otherwise overcome default print conventions, with the 'PRINT USING' statement.

PRINTER IS Statement

The PRINTER IS statement allows overriding the use of the 80 character CRT as the standard printer for the system.

Examples:

```
10   PRINTER IS 0
20   PRINTER IS 7,11
30   PRINTER IS 7, WIDTH 132
40   PRINTER IS 7,11,WIDTH 64
```

The first expression specifies the select code to be used for the standard printer.

The optional second expression specifies the HP-IB bus address of the standard printer and is present only if an HP-IB interface is being used. The WIDTH function specifies the line length of the standard printer in characters. The default at turn-on is 80, and the valid range is 20 to 260.

PRINT ALL IS Statement

The PRINT ALL IS statement allows overriding of the use of the 80 character CRT as the print-all printer.

Example:

```
10   PRINT ALL IS 0
20   PRINT ALL IS 7,11
```

The first expression specifies the select code to be used for the print-all printer.

The second expression specifies the HP-IB bus address of the print-all printer and is present only if an HP-IB interface is being used. The WIDTH field is assumed to be 80 characters.

Print USING and IMAGE

PRINT USING/IMAGE provides the user the capability of generating printed output with total control of the format.

As with the PRINT statement, the character-stream generated as the output is directed to the system-printer. This is the print-area of the display at power-on, but may be directed to any device on any select code by the PRINTER IS statement. The device to which the output is directed must be a character-serial device (such as a printer, paper tape punch, etc.). The internal thermal-printer is at select code 0.

Associated with the PRINTER IS statement is an optional WIDTH specification. This optional specification is included to aid the user in controlling output from the simpler PRINT statement; its primary function is to allow printing to a 132-character wide printer. In connection with PRINT USING/IMAGE the user is given the capability to generate any length of output character-stream (to be described later), but the PRINTER IS "WIDTH" declaration has several indirect affects on PRINT USING/IMAGE.

The affect of printer WIDTH on PRINT USING comes about because the WIDTH declaration controls the selection of the size of buffer used internally into which the output character-stream is stored before transmission to the print device. (Also, Overlapped I/O can require that more than one PRINT USING buffer exists at one time.) Buffer size has two effects:

1. The maximum numeric field specified in an image statement cannot exceed the WIDTH specification of the printer. The conversion from internal numeric values to the output character-stream cannot be stopped in the middle to allow buffer-dumping. So, the buffer (indirectly selected by WIDTH) must be large enough to hold the biggest numeric output field. The buffer-selection is limited to two sizes:
   a. 80 characters for any WIDTH specification of 80 or less.
   b. 260 characters for any WIDTH greater than 80.
2. The buffer size restriction does not directly affect the size of strings which can be output. The outputting of a string is suspended in the middle if the string is longer than the buffer, so that the buffer can be dumped to the print device. However, buffer size affects how often this must be done in printing long strings. If all strings to be printed are short (80 characters or less), a short buffer (WIDTH 80 or less) is adequate. If most strings to be printed are long, a larger buffer is advantageous. However, large buffers consume the memory-space available for device buffers (from the internal system's R/W) more rapidly than do small ones (by 2:1) and thus the total number of buffers is limited. If only a limited number of I/O devices are active, this is of little concern. However, if several mass-memory devices are active (each requiring a good-sized buffer) the limitation on the number of buffers may affect I/O performance. In this case, a short PRINT USING buffer may actually improve overall performance, but slightly degrade PRINT USING performance. The syntax of PRINT USING and IMAGE is:

```
PRINT USING <string expression>[;<print using
   list>]
```

or is:

```
PRINT USING <line i.d.>[;<print using list>]
```

IMAGE <image strings>

<string expression> is any valid string expression, including multi-line string functions. When evaluated at run-time, this string must be a valid <image string> (described in following paragraphs). It should be mentioned that if the <string expression> is text enclosed in quotes, it is not possible to imbed another text item in quotes in the <image strip>:

PRINT USING "10X, "LABEL"" is NOT allowed.

<print using list> follows the same general rules as <print list> except that the print functions LIN, SPA, TAB, and PAGE are not allowed. Either semi-colons or commas may be used to delimit items in the list, but both are only delimiters, and have no effect on the reuslting printout, which is controlled entirely by the IMAGE.

It is also worth cautioning that a multi-line function must not be invoked by any expression in the list, either directly or indirectly.

Every item in the print using list must be matched with an image specification of the appropriate kind, either numeric or string. In particular, text enclosed in quotes as an item in the list must be matched by a string image specification. <line i.d.> is either a label or line number referring to an IMAGE statement. <image string> is a collection of "image specifications" separated by "image delimiters". In general, an "image specification" defines how a single item in the <print using list> to be output.

Image Specifications

There are 3 types of image specifications:

1. Literal specification

It is made up of:

a. X Output one blank; nX for outputting n blanks.

b. literal A collection of char's enclosed in quote marks.

Examples:

10X

"Label"

3X, "Label", 4X

Furthermore, the literal specifications without delimiters may be imbedded within any other image specification (examples are included in discussions of other image specifications).

2. String specification

It is made up of the symbol A, or of nA for replication. The "extent" of a string specification is determined by the number of A's between "image delimiters". Each specification applies to one string item in the <print using list>. Each string item must be matched by a string specification.

The number of A's within one image specification determines the maximum number of characters from the string item in the list which can be output. If the number of characters in the item exceeds the number of A's in the image specification, it will be truncated on the right; i.e., the left-most n characters will be output. If the number of characters in the string item is less than the extent of the string image, blanks will be appended on the right; i.e., the string is left-justified in the specified field.

Examples:

String item: "1234567"

| IMAGE | OUTPUT |
|---|---|
| AAAA | 1234 |
| 4A | 1234 |
| 2A2A | 1234 |
| 7A | 1234567 |
| 10A | 1234567ƀƀƀ |
| 4AX4A | 1234ƀ567ƀ |
| 3A"X"4A | 123X4567 |
| 2AX"$"5A | 12ƀ$34567 |
| "$"X4A | $ƀ1234 |

Note:
We use "ƀ" to mean a blank.

3. Numeric Specification

Each numeric item in the list must be matched by a numeric image specification. A numeric image specification may contain the following symbols:

A. "digit-symbol" Output a digit or a (specified) "fill" character.

Replicators are allowed on each.

(i) D Output a digit except for leading zeros to the left of the radix point, which are replaced by a blank fill character.

(ii) Z Output a digit, filling in all leading zeros to the left of the radix point with a zero fill character. Always generates non-blank output for each Z.

(iii) * Same as Z, except the fill character is an asterisk. Mixing digit-symbols within a single numeric image must adhere to the following rules:

(a)-To the right of the radix point, only the digit-symbol D is allowed.

(b)-To the left of the radix point, any digit-symbol can be used, but they cannot be mixed (other than exception 3). That is, if Z used, allmust be Z, if *, all must be *, etc.

(c)-The first digit-symbol to the left of the radix point can be a Z, regardless of what the other symbols are.

| Examples: | Numeric item #1 | 123.456 |
|---|---|---|
| | Numeric item #2 | .789 |
| Image: | #1 Output | #2 Output |
| DDDD.DD | ƀ123.46 | ƀƀƀƀ.79 |
| 4D.3D | ƀ123.456 | ƀƀƀƀ.789 |
| 4Z.2D | φ123.46 | φφφφ.79 |
| 4*.3D | *123.456 | ****.789 |
| 3*Z.2D | *123.46 | ***φ.79 |

More examples will follow the descriptions of the other numeric image symbols.

B. "sign-symbol" Controls the output of the sign characters. Only one sign-symbol can appear in a numeric image. The sign symbols are:

(i) S Output a sign; "+" if the number is positive, "−" if the number is negative.

(ii) M Output a "−" if the number is negative, a blank if positive. The sign-characters generated by the sign-symbols in an image may "float", or remain fixed exactly in the position specified, depending on how they are used. In this respect, they obey the same rules as literals text in quotes), and their behavior will be described later in discussing "floating" fields.

C. "radix-symbol" Controls the output of the character used for marking the radix-point. In the United States, this is customarily the decimal point ".". In Europe, this is frequently the comma ",". Only one radix-symbol can appear in a numeric image. The "radix-symbols" are:

(i) . Output a decimal-point for indicating radix-point position.

(ii) R Output a comma for indicating the radix-point position. The radix-character will occupy the exact position in the field specified by the position of the radix-symbol in the image.

D. "separator-symbols" These symbols control the generation of commas (U.S.) or periods (Europe) frequently used to break large numbers into "groups-of-three" for additional readability. The symbols are:

(i) C Output a comma"," as a digit-separator.

(ii) P Output a period "." as a digit-separator.

The digit-separator symbol is only output if a digit of the number has already been output (i.e., a digit to the left of the separator-symbol). Furthermore, a digit-symbol must precede the separator-symbol in the image. If the digit-symbol is a Z, generating leading-zeros on the number, these leading-zeros are considered as digits of the number in decisions to generate or not-generate digit-separator symbols.

Examples:

Numeric Value: 12345.67

| Image | Output |
| --- | --- |
| DDDDD.DD | 12345.67 |
| DDCDDD.DD | 12,345.67 |
| 2DC3D.2D | 12,345.67 |
| 2DP3DR2D | 12.345,67 |

Numeric Value: 12.34

| | |
| --- | --- |
| 4Z.2D | ϕϕ12.34 |
| ZCZZZ.2D | ϕ,ϕ12.34 |

E. E Output number in scientific notation. The magnitude of the number is output by the image specification preceding the E in the image. The E always causes the output of the power-of-ten into a four-character field:

| | |
| --- | --- |
| ESDD | where:<br>S = sign of exponent<br>D = exponent value |

Examples:

Numeric Value: 1234.56

| Image | Output |
| --- | --- |
| D.DDDE | 1.235E+03 |
| DD.DDE | 12.35E+02 |

Numeric Value: 0.012345

| | |
| --- | --- |
| .DDDDE | .1235E−01 |

-continued

| | |
| --- | --- |
| D.DDDE | 1.235E−02 |

If the number to be output is negative there must be a sign symbol in the image specification or an overflow will occur.

Floating Fields

A sign-symbol (S or M), an X specification or a literal (text in quotes) that precedes all digit-symbols will "float" past blanks to the leftmost digit of the number, or to the radix-symbol, whichever is leftmost. However, floating literal fields must not generate output exceeding the printer width spec.

If the sign-symbol, X specification or literal is imbedded within the digit-symbols (i.e., there are one or more digit-symbols to the left) the field (sign or literal) will not float; it will occupy the character-position(s) exactly as specified in the image.

Examples:

| Image | Numeric Value #1 = −17<br>#1 Output | Numeric Value #2 = +17<br>#2 Output |
| --- | --- | --- |
| M4D | ƀƀ-17 | ƀƀƀ17 |
| M4Z | −ϕϕ17 | ƀϕϕ17 |
| M4* | −**17 | ƀ**17 |
| S4D | ƀƀ-17 | ƀƀ+17 |
| "T"4D | ƀT-17 | ƀƀT17 |
| DMDD | ƀ-17 | ƀƀ17 |
| DDMD | ƀ1-7 | ƀ1ƀ7 |
| DDDDS | ƀƀ17− | ƀƀ17+ |
| SXDDD | ƀ-ƀ17 | ƀ+ƀ17 |

Numeric Value: 25.36

| Image | Output |
| --- | --- |
| "("4D.2D")" | ƀƀ(25.36) |
| "("4Z.2D")" | (ϕϕ25.36) |
| "(3*Z.2D")" | (**25.36) |
| "DM"4D.2D | ƀƀDM25.36 |
| "DM"2D.2D | DM25.36 |
| 4D.2D"CR" | ƀƀ25.36CR |
| "("3D"Q"D.2D")" | ƀƀ(2Q5.36) |
| "("2D"Q"2D.2D")" | ƀƀ(Q25.36) |

Image Specification Delimiters

Delimiters between image specifications define the "extent" of a particular image; separating one from the other. The delimiter symbols are:

1. , Delimiter only, causes no specific output.
2. / Delimiter between images, and causes output of CR/LF, starting a new line for succeeding output. Used to generate multi-line output with a single PRINT USING/IMAGE.
3. @ Delimiter between images, and causes output of a "top-of-form", starting a new "page" of output.

/ and @ may also be used as an image themselves; i.e., they may be separated from other images by the comma-delimiter (this may improve "readability" of an IMAGE).

Only the / delimiter may be replaced directly.

Replication

Unless specifically forbidden, all image-symbols may be replicated by placing the replicator-number (in the range 1 to 32767) directly in front of the symbol. Image symbols which cannot be replicated are:

(1) S (2) M
(3).
(4) R
(5) C
(6) P
(7) E
(8) ,
(9) @
(10) K

In addition to direct replication of iamge-symbols, an entire image-specification, or group of image-specifications can be relicated by enclosing it in parentheses and preceding the left parenthesis by the replication-number.

Examples:

```
3(K)
DD.D,6(DDD.DD)

D.D,2(DDD.DD), 3(D.DDD)

D,4(4X,DD.DD,"Label",3X)

4Z.D,4(2X,4*Z.D,(2X,D))

4("Label1",2X,D,"Label2",2X,DD)
```

By this mode of replication, the @ (which is a delimiter or image-specification) may be replicated.

Example:

```
"End of text",2(@)
```

Parenthesization for replication may be nested up to 4 levels.

Carriage-Control Symbols

Normally, when the <print using list> has been exhausted (i.e., all items output), a CR/LF (new line) is output. This can be altered by the use of a carriage-control symbol, which must be the first item in the image.

The symbols are:

(1) # Suppresses both CR and LF
(2) + Suppresses LF only
(3) – Suppresses CR only The carriage-control symbol controls what happens after the entire print list has been processed. Any intermediate CR/LF generated by the presence of / is unaffected.

IMAGE Re-Scan

The <image string> will be re-scanned from the beginning if all the image-specifications are exhausted before the <print using list> is all processed. No CR/LF will be output when the re-scan takes place unless the last image-specification is a /.

Overflow of Fields

As mentioned in discussion of the A specification, if the string item to be output is longer than the number of characters in the string-image, no overflow condition arises. The specified n characters are output, the remainder are ignored.

If a numeric item requires more digits than specified in the numeric-image, an overflow condition is generated. When this occurs, the output generated up to that point (preceding items) is output to the print-device, followed by CR/LF to start a new line. The overflow item is then output in STANDARD format, followed by the image-specification which causes the overflow. This is followed by CR/LF (so that the overflow item and image-specification are on a line by themselves). Processing of the <print using list> then resumes with the next item in the <print using list>.

An important factor to be recognized in connection with the overflow condition is associated with use of the "implicit sign" (no S or M) on a numeric image-specification. If the numeric item to be printed can be negative, the image-specification must contain enough digit-symbols to the left of the radix-point to allow a position for the minus sign. Since no + is generated for positive numbers, this is not true for positive items. If space is not allowed for the minus sign, the overflow condition arises, and the special overflow output will be generated.

Examples of overflow:

| Overflow Condition | Image | List Item |
|---|---|---|
| 1. too many digits | 3D | 1234 |
| 2. no room for sign | 3D | −100 |
| 3. E symbol & neg. # | D.DE | −1 |
| 4. Exponent overflow | .DDE | 1E99 |
| 5. Exponent underflow | DD.DE | 1E−99 |

Compact Output

The single symbol K defines an entire image-specification. This is the only image-specification which can apply to either numeric or string data-items. If the list-item is a string, the entire string (current length) is output. If the string contains leading or trailing blanks, these blanks are output. However, no additional blanks are output. The number of characters output is exactly the current length of the string-item. If the list-item is a numeric, it is output in STANDARD format, except that no leading or trailing blanks are output.

DISP Statement

The DISP statement causes the specified data to be displayed in line #22 of the CRT.

The syntax is:

```
DISP <data list>
```

Items in a display list be legal numeric or string expressions, entire numeric or string arrays, TAB, SPA, or text in a quote field, separated by commas or semicolons. The comma or semicolon delimiters operate the same as in the PRINT statement.

WAIT Statement

The WAIT statement causes a time delay at its location in the program's execution.

The syntax is:

```
WAIT <num exp>
```

where the <num exp> specifies the number of milliseconds delayed before program execution continues. The maximum value of the <num exp> is 32767 which causes a delay of about 33 seconds.

PAUSE Statement

When a PAUSE statement is executed in a program or the PAUSE key is pressed on the keyboard, the program halts execution. Any ongoing I/O is completed before the PAUSE becomes effective.

the execution of a CONT will resume program execution.

The syntax of a PAUSE statement is:

PAUSE

More information concerning PAUSE Is included in the discussion of the keyboard.

STOP and END Statements

The STOP and END statements ae used to terminate the execution of a program. A STOP statement may appear anywhere in a program. Although an END statement may appear anywhere except as part of an IF...THEN, it is suggested that the END statement be placed only at the end of the program.

Example:

```
10 LET A=1
20 LET B=2
30 LET C=A*B+2
40 PRINT C
50 END
```

The execution of both statements is identical, and causes the program to cease execution.

GOTO and ON...GOTO Statements

Two statements are provided for unconditional branching, the GOTO and Computed GOTO. Both statements override the normal sequential order of statement execution by transferring control to a specified statement. If the statement to which control is to transfer is not an executable statement, control transfers to the first executable statement following that statement; otherwise control is transferred to the indicated statement.

Examples:

| | |
|---|---|
| 100 GOTO 10 | Transfers control to statement 10 |
| 110 GO TO L | Transfers control to statement labeled L |
| 120 ON A*B GOTO 60,50,75 | The expression A*B is evaluated and rounded to the nearest integer. If the resulting value is 1, control is transferred to statement 60, if the value is 2, control is transferred to statement 50, if the value is 3, control is transferred to statement 75. If the value of the expression is less than 1 or greater than the number of items in the label list, an error is reported. |

GOSUB and RETURN Statements

A block of statements which can be used by many parts of the program may be written and accessed by the GOSUB statement.

Example:

```
10 LET A-1
20 GOSUB P
30 If A>5 THEN 600
40 LET A=A+1
50 GO TO 20
400 P: PRINT A;
410 FOR I=1 TO 5
420 PRINT A*1;
430 NEXT I
440 PRINT ""
450 RETURN
600 FOR A=6 TO 9
610 GOSUB 400
620 NEXT A
```

Resulting output:

```
1 1 2 3 4 5
2 2 4 6 6 10
3 3 6 9 1 22 15
4 4 8 12 16 20
5 5 10 15 20 25
6 6 12 18 24 30
7 7 14 21 28 35
8 8 16 24 32 40
9 9 18 27 36 45
```

The GOSUB statement transfers control to the specified statement. The RETURN statement returns control to the statement immediately following the GOSUB statement.

ON...GOSUB Statement

Like the ON...GOTO statement, the ON...GOSUB statement specifies transmer to one of a number of line numbers or labels.

Example:

```
10 ON X+Y/3 GOSUB 100,500,300,40,X
```

The expression is evaluated and rounded to the nearest integer. If the resulting value is 1, the control is transferred to statement 100; if the value is 2, control is transferred to statement 500, etc.

If the expression evaluates to less than 1, or to greater than the number of labels specified, an error occurs. Upon execution of a RETURN statement, control returns to the statement following the ON...GOSUB statement.

Example:

```
10   FOR X=1 TO 3
20   ON X GOSUB 200,300,T
30   NEXT X
100  REM .. Control will reach here only when the
     FOR loop
110  REM .. is finished
120  STOP
200  PRINT X; SIN(X);
210  RETURN
300  PRINT X;X ^ 2,COS( X);
310  RETURN
400  T: PRINT X;X ^ 3;TAN(X);
410  RETURN
```

A transfer to another subroutine may occur within the block of statements constituting a subroutine.

Example:

```
10   READ X
20   ON SGN(X)+2 GOSUB 100,200,300
30   GOTO 10
100  PRINT"X negative";
120  PRINT X;
130  X=-X
140  GOSUB 320
150  X=-X
160  RETURN
200  PRINT"X=O"
220  STOP
300  PRINT "X positive";
310  PRINT X;
320  LET Y=SQR(X)
330  LET X=Y  Y
340  PRINT X;
350  RETURN
```

In this example, the subroutine at line 100 transfers control to a subroutine at line 320. When the RETURN at line 350 is executed, control will resume at line 150. But when control is transferred to the subroutine at line 300 through the statement at line 20, the RETURN at line 350 returns control to the statement at line 30.

Programs may nest a large number (determined by available memory) at GOSUB's without executing a RETURN. If more RETURN's than GOSUB's are executed, an error results.

IF THEN STATEMENTS

Conditional statements are used to test specific conditions and specify program action depending on the test result. The conditon tested is a numeric expression that is considered true if the value is not zero, false if the value is zero. Conditional statements are always introduced by an IF statement. The form of an IF statement may be either of the following:

```
IF<num expression>THEN<label>
IF<num expression>THEN<statement>
```

Examples:

```
20  IF A=B THEN 10
30  IF A-B+C THEN A=B
40  IF A THEN PRINT B
```

The expression following the IF is evaluated, and if true, the program transfers control to the label following the THEN, or executes the statement following the THEN.

All executable BASIC statements are allowed in the THEN part of the IF statement, with the following exceptions:

FOR statement
NEXT statement
IF statement
END statement
SUBEND statement

The following statement types are not allowed in the THEN part because they are declaratory statements, not executable statements:

COM statement
DIM statement
OPTION BASE statement
DEF statement
FNEND statement
SUB statement
SHORT statement
INTEGER statement
REAL statement
DATA statement
IMAGE statement
REM statement
Comments

FOR/NEXT Statements

The FOR and the NEXT statements provide the means for easily repeated execution of a section of program. The FOR statement is used to delimit the beginning of the group of statements to be executed repeatedly. The FOR statement is also used to determine how many times the group of statements is to be executed. The NEXT statement is used to delimit the end of the group of statements to be repeatedly executed. The group of statements bracketed by the FOR statement and the corresponding NEXT statement are linked together by the FOR variable. The FOR variable must be a single numeric variable; string variables and array elements cannot be FOR varibles. When the FOR loop is first executed, the FOR variable is set to an initial value. The FOR variable is then tested against a terminal value. If the value of the FOR variable is beyond the terminal value, the FOR loop is bypassed. Otherwise, the FOR loop is executed. At the bottom of the FOR loop the FOR variable is modified by a STEP value and control is transferred back to the beginning of the FOR loop, at which point the termination test is performed. If the value of the FOR variable is beyond the terminal value, the FOR loop is then exited by executing the next line following the NEXT, otherwise the whole sequence repeats until the terminal condition is met.

A typical FOR statement is

```
10 FOR I=1 to N STEP 10
```

Here the FOR variable is I, the initial value is 1. After each execution of the FOR loop, the FOR variable I is incremented by the STEP value 10. When I becomes greater than the value of N, execution of the FOR loop ends. If N should be less than 1, the FOR loop will not execute at all. The corresponding NEXT statement is

```
100 NEXT I
```

Another FOR statement is

```
10 FOR J=N TO 1 STEP -1
```

Here, the FOR variable is being decremented, so execution of the FOR loop ceases when the FOR variable J becomes less than 1. Execution of the FOR loop will not occur if N is less than 1. The corresponding NEXT statement is

```
100 NEXT J
```

The initial value, final value and STEP value can be any valid numeric expression. When the FOR loop is first encountered during program execution, the initial value, final value and STEP value are calculated and the calculated values used throughout the execution of the FOR loop.

Example:

Assume X=1, Y=10 and Z=1. The following FOR loop will execute 10 times, not 20 times.

```
100 FOR I=X TO Y STEP Z

110 Y=20

120 NEXT I
```

The STEP value may be omitted, in which case it is assumed to be 1.

```
100 FOR I=1 TO 10 STEP 1
```

is equivalent to

```
100 FOR I=1 TO 10
```

It is possible to have more than one FOR loop in a program. If this is the case, the FOR loops must either be disjointed or completely embedded one within the other.

The following is an example of the two disjoint FOR loops.

```
:----->10 for I=1 to 10
:         20 A(I)=0
:----->30 NEXT I
:----->40 for I=2 to 10
:         50 A(I)=A(I-1)+1
:----->60 NEXT I
```

When FOR loops are disjoint, the same variable may be used as the FOR variable. Each use of the same variable in the different FOR loops is independent of the other use of the variable as a FOR variable.

The following is an example of an embedded FOR loop.

```
:---------->10 for I=1 to 10
:      :----->20 for J=1 to 10
:      :         30 A(I,J)=0
:      :----->40 NEXT J
:---------->50 NEXT I
```

When FOR loops are embedded one within the other, different FOR variables must be used. The J FOR loop here is embedded within the I FOR loop.

FOR loops that overlap are not permitted. The following is an example of an overlapping FOR loop.

```
:---------->10 for I=1 to 10
:      :=====>20 for J=1 to 10
:      :         30 A(I)=A(I)+1
:---------->40 NEXT I
       :         50 A(J)=A(J)+1
       :=====> 60 NEXT J
```

The J FOR loop begins inside the I FOR loop but ends outside the I FOR loop, so the J FOR loop overlaps the I FOR loop.

As long as the FOR loops do not overlap, as many FOR loops as needed, either disjoint or embedded to any level, can appear in a program.

Execution of a FOR loop need not end with the NEXT statement. The FOR loop can be terminated by branching out of the FOR loop. The value of the FOR variable is always accessible both inside and outside the FOR loop. Unlike the initial, final and STEP values, the FOR variable may be altered.

For example, the following loop is terminated prematurely by setting the FOR variable X to 11 when A(X-)<0.

```
10 FOR X=1 to 10
20 IF A(X)<0 THEN GOTO 50

30 A(X)=A(X)+1

40 GOTO 60

50 X=11

60 NEXT X
```

Carelessness in altering the FOR variable may cause and endless loop to occur. The following is an example of a FOR loop that will never end.

```
10 FOR X=1 TO 10

20 X=1

30 NEXT X
```

X is always reset to 1 in statement 20, so the loop will never be exited.

Subprograms and Parameters

A subprogram is a group of one or more statements that performs a certain task under the control of the calling program segment. The main program and each subprogram are known as program segments. The program segment which program control is in is known as the current environment.

A subprogram enables repetition of an operation many times, while substituting different values each time the subprogram is called. Subprograms may be called at almost any point in a program, and are convenient and easy to use. Subprograms also give greater structure and independence to a program.

There are two types of subprograms. The multi-line function subprogram is designed to return a value to the calling program and is used like system functions such as SIN or CHR$. It is defined using the DEFFN statement. Tge second type is the subroutine subprogram. A subroutine is designed to perform a specific task. It is defined using the SUB statement.

Values are passed between a subprogram and the calling program using parameter lists.

The formal parameter list used in defining the subprogram variables includes non-subscripted numeric and string variable names, array identifiers and, except in the case of single-line function subprograms, file numbers in the form: #<integer>. Parameters must be separated by commas.

Numeric type—REAL, SHORT, INTEGER—may be declared in a formal parameter list by placing the type word before a parameter. For example:

```
270 SUB X(A,B$, INTEGER C(*),D,SHORT
    E,F,#3,G)
```

Type words are cumulative as in the COM statement. The array C and D, are declared as integer precision; E and F are short precision.

The variables appearing in the formal parameter list of a subroutine are formal variables. That is:

A. No temporary storage is allocated for the values of these variables by the subprogram—they use the storage of the accompanying parameter in the <parameter list>.

B. They may be the same variable-names used in the main program or other subprograms, and are independent of those other variables. That is, they are "dummy" parameters.

All variables used in a subprogram that are not part of the formal parameter list and are not in common, are "local" to the subroutine. In other words, they may not be accessed from any other program segment, including the main program; local variables are accessible only in their own host environment. These variables can be declared in DIM, REAL, INTEGER, or SHORT statement, the format being the same as in the main program with the exception that array dimensions and string length declarations may be numeric expressions (since these statements allocate memory dynamically).

For example:

```
100 SUB Lum(I,J,K)

200 DIM A(I,J), C$(J)
```

These allocation statements may appear anywhere within the subprogram.

During entry of the declaration statement the syntax is checked and the variables declared are entered into the symbol table. When the subroutine is executed, execution of these statements causes the necessary value-storage for all local variables to be allocated. When the subroutine execution is terminated by a SUBEXIT or SUBEND statement, the value-storage allocated for the "local" variables is concelled, returning the read/write memory to the pool of available memory. From this, it is apparent that:

A. Local variable storage is strictly temporary in nature, and is for use only during the execution of the subroutine.

B. No variable appearing as a formal parameter of the subroutine may appear in any declaration statement in the body of the subprogram.

C. Local variables cannot be used to "hold-over" computed values from one activation of a subroutine until the next activation. The same storage area may not be allocated; even if it is, it will be initialized to numeric zeros or null strings.

The pass parameter list used in referencing the subprogram may include numeric and string variable names, array identifiers, numeric expressions and, except in the case of single-line function subprograms, file numbers in the form: #<integer>.

Parameters must be separated by commas. All variables in the pass parameter list must be defined within the calling program. That is, strings and arrays must have been dimensioned, either implicitly or explicitly.

When a subprogram is called, each formal parameter is assigned the value of the pass parameter which is in the corresponding position in the pass parameter list. The parameter lists must have the same number of parameters; the parameters must match as to numeric-type or string, nonsubscripted or array.

Parameters are passed either by reference or by value. When a parameter is passed by reference, the corresponding formal parameter shares the same memory area with the pass parameter, therefore, changing the value of the variable in the subprogram will change the value of the variable in the calling program. Passing parameters by reference allows the subprogram to "return" a new value of a parameter. A calling parameter may be passed by reference if it is a nonsubscripted variable or an entire array. Elements of arrays, either numeric or string, may not serve as return parameters; neither may substrings. Those passed by reference must match exactly, otherwise an error occurs; no conversion is made.

When a parameter is passed by value, the variable defined by the corresponding formal parameter is assigned the value of the pass parameter and given temporary storage space in memory. Numeric expressions are always passed by value. Enclosing a pass parameter in parentheses causes it to be passed by value, rather than by reference. Passing by value prevents the value of a calling program variable from being changed within a subprogram.

Any parameters passed by value will be converted, if necessary, to the numeric type—REAL, SHORT, INTEGER—of the corresponding parameter in the formal parameter list.

Subroutine Subprograms

A subroutine subprogram allows repetition of a series of operations many times using different values. A subroutine subprogram performs a specific task. It consists of one or more statements following a SUB statement, which is the first statement in a subroutine subprogram.

Its syntax is:

```
SUB<subprogram name>[(<formal parameter
  list>)]
```

The subprogram name must be a valid name, in accordance with the rules for naming variables.

The last line in a subroutine subprogram is a SUBEND statement, which returns control back to the calling program.

The subroutine subprogram is accessed and its values supplied, with the CALL statement.

The syntax is:

```
CALL <subprogram name>[(<pass parameter
  list>)]
```

The items allowed in the <pass parameter list> are dependent on the accompanying parameter in the <formal parameter list> of the subroutine definition.

A. When the <formal parameter list> item is a non-subscripted numeric variable, the calling parameter may be any numeric expression.

B. When the <formal parameter list> item is a non-subscripted string variable, the calling parameter may be any string expression.

C. When the <formal parameter list> item is an <array operand> (signifying an entire array as a parameter), the calling parameter must also be an <array operand>, and it must specify an array of the same type (numeric/string) as the definition parameter.

D. When the <formal parameter list> item is a #<integers>, the passed <num exp> in the corresponding actual parameter is rounded and passed to the subprogram. If the file is actually opened in the subprogram, it is closed on return from the subprogram; otherwise, the file is left in the same state as it was when the subprogram was entered.

Subroutine subprograms may be called recursively. The depth of nesting is limited only by the actual memory available for stacking each call.

Programming within subroutine subprograms is unrestricted—any statements defined within the main machine, or by any installed option may be used.

Any subroutine subrograms (as well as multi-line functions) must occur after the end of the main program. Entry of such subprograms has the restriction that their SUB or DEF FN statements may be added only at the end of the current set of line numbers. That statement, once entered, may be edited (as long as it remains a SUB statement or a DEF FN statement), but it can be deleted only if the entire subprogram for which it is the head is deleted in the same delete command.

Each time a program in memory with subprograms is SAVE'd, its subroutine and multi-line function subprograms will be SAVE'd with it, unless the user specifies line-number limits which exclude the subprograms.

The SUBEXIT statement is used to transfer control back to the calling program before SUBEND is executed.

There are certain aspects which must be discussed when dealing with multiple-line functions and subroutine subprograms.

Values may also be passed to such a program with a COM statement. The list of items in the subprogram's COM statement may be a subset of the main program's COM statement; that is, it must match from the beginning up to some point.

A variable can't be an item in a subprogram COM statement if it is a formal parameter.

Subprograms may also have any variable allocation statements; DIM, REAL, SHORT, and INTEGER. However, the variables declared may not be in the subprogram COM statement or the formal parameter list.

Within subprogram variable allocation statements, array dimensions and string lengths may be specified with a numeric expression because storage for them is dynamically allocated; that is, it is temporary.

All variable names in a subprogram are independent of variables with the same name in other program segments.

File numbers can be passed to a subprogram in the parameter list. (Information concerning file numbers and there use in the mass storage system is presented elsewhere.)

For example:

```
10 ASSIGN # TO "Data"

20 CALL Routine (#1)

.

.

.

250 SUB Routine (#3)

.

.
```

File numbers may also be implicitly defined in the calling program from a subprogram.

For example:

```
100 CALL X(#4)

.

.

.

320 SUB X(#2)

330 ASSIGN #2 TO "Pay"
```

When control returns to the calling program, #4 will still be assigned to the file Pay.

A file may also be implicitly buffered in this manner:

```
100 CALL Data(#4)

.

.

.

320 SUB Data(#2)

330 ASSIGN #2 TO "Pay"

340 BUFFER #2
```

When control returns to the calling program, #4 will still be assigned to Pay and it will be buffered.

If a file is actually opened in a subprogram and hadn't been passed as a parameter, it is automatically closed upon return to the calling program.

When entering a subprogram the following occur:

1. READ—DATA pointers are reset for the subprogram.
2. Any file assignments that are not passed are cleared.
3. RAD, STANDARD, and OPTION BASE φ are the modes defaulted to.
4. Any ON KEY, ON END or ON ERROR associated with a GOTO or GOSUB is no longer active; however ON KEY# interrupts are logged.

Upon return to the main program, all of the above are restored to their previous state.

There are two ways to enter a new subprogram into the calculator. It must either replace an existing subprogram or come after all other subprograms.

Single-Line Functions

If a numeric or string function is relatively simple, it is convenient to define it as a single-line function. This type of program segment is actually a part of the calling program and is defined with a DEFFN statement as shown below.

To define a numeric function:

```
DEFFN<subprogram name>[(<formal parameter
  list>)]=<num exp>
```

To define a string function:

```
DEFFN<subprogram name>$[(<formal
  parameter list>)]=string exp>
```

The expression may include both passed parameters as well as other variables, just as for the multi-line function subprogram. Once the function is defined, it is used by referencing it and supplying values with:

```
FN<subprogram name>[(<pass parameter list>)]
```

for a numeric function, or:

```
FN<subprogram name>$[(<pass parameter
  list>)]
```

for a string function.

When invoked, the function is evaluated; its value is returned as the value for the referencing syntax. A single-line function may not recursively reference itself in its own definition.

Single-line functions are local to the program segment is which they are defined. That is, such functions are defined only in their host environment, and are undefined in all others.

A single-line function may appear anywhere within a main program or any multi-line or subroutine subprogram.

Single-line user definable function are not considered to be subprograms. The main reason for this is that they cannot allocate local variables, even though they may possess formal parameters. A program segment and a function within it are really the same environment, and what would otherwise be a local variable in the function is no different than that same variable being used in the calling program segment.

Multiple-Line Function Subprograms

The multiple-line function subprogram is also used to define a numeric or string function and return a value to the calling program. The first line of a numeric multiple-line function subprogram is as shown below.

For numeric functions:

```
DEFFN<subprogram name>[(<formal parameter
  list>)]
```

For string functions:

```
DEFFN<subprogram name>$[(<formal
  parameter list>)]
```

The subprogram name must be a valid name, in accordance with the rules for varible names.

The last line in a multiple-line function subprogram is:

```
FNEND
```

The value to be returned to the calling program as the value of the function is specified by:

```
RETURN<num exp>
```

or

```
RETURN<string exp>
```

The RETURN statement causes control to be transferred back to the calling program where the subprogram was referenced and supplied values with:

```
FN<subprogram neme>[(<pass parameter lists>)]
```

or

```
FN<subprogram name>$[(<pass parameter
  list>)]
```

There may be more than one RETURN statement in a subprogram, but only one will be executed each time the subprogram is executed.

References to multiple-line function subprograms are not allowed in output statements.

If a single-line and multiple-line function are both defined with the same name and that name is referenced, the single-line function will be the one accessed if it is defined in the calling program, otherwise it will be the multiple-line function. A multiple-line function must occur after the main program.

COMMON Statements

The COM statement dimensions and reserves memory space for simple and array variables in a "common" memory area, allowing values to be passed to subprograms or or to other programs.

Its syntax is:

```
COM <item>[,<item>,...]
```

Examples:

```
260 COM H(3,2),J(1,2,3),K$[56]

270 COM B(3,2),C(1,2,3),D$(2,3)[56],INTEGER
  E(4,4)
```

280 COM SHORT G,H(2,5),REAL I,J(5,4)

The items in the list of a main program COM statement may be any of:

simple numeric numeric array (<subscripts>)

Note: In this syntax and the next the innermost set of brackets are required as part of the syntax. The outermost denotes optionality.

simple string [[<number of characters>]]

string array (<subscripts>[[<number of characters>]]

The number of characters specifies maximum string length and is an integer; 18 is the default length if it is omitted.

The rules for common statements are:

A. Multiple COM statements may be used—they may occur anywhere in the program.

B. COM statements can be edited like other statements.

C. The common area will be initialized to numeric zeros and null strings when it is first allocated.

D. Data types of other than string variables are specified by using the keyword REAL, INTEGER, or SHORT preceding groups of those variables. Type REAL is assumed at the beginning of the COM statement and after occurrences of string variables.

For example:

COM X, INTEGER A,B$,C SHORT D,E, REAL F includes REAL's X,C,F, INTEGER A, and SHORT D,E.

The COM statement can also be used in a subprogram. The syntax is generally the same as that used in the main program and the COM statement can appear anywhere within the subprogram. However, the common list must agree with the main program, variable by variable, in type, dimensionality and length. Subprogram COM statements may reference entire numeric or string arrays with the array (*) notation. Subprogram COM must not be larger than the main program COM; it may be shorter, however.

ON KEY# Statement

The syntax of the ON KEY# statement is:

ON KEY# num exp [, num exp] GOTO line i.d.

ON KEY# num exp[, num exp] GOSUB line i.d.

ON key# num exp [, num exp] CALL subprogram name

The first num exp represents the key number (0-31). The second num exp represents an optional priority (1-15). If not specified, a default of 1 is assumed. A priority of 1 is the lowest priority.

Depression of a UDK for which an ON KEY# has been executed results in an "interrupt" to the program.

If multiple ON KEY# definitions have the same priority level, the definition with the highest key-number will have the highest priority within that priority level. The preceding sentence has meaning only when two ON KEY# interrupts at the same priority level are "pending". ON KEY# interrupts are serviced only at the conclusion of executing each current line of programming. After a UDK is pressed, but before its interrupt is achieved, that interrupt is said to be pending. Now, it is possible for a line of programming to take a substantial length of time. If during such alone line, two UDK's with the same interrupt priority are pressed, they will both be pending at the conclusion of the line. What is meant is that the UDK with the highest key-number will be the one whose interrupt will be achieved; the other interrupt is logged and achieved in accordance with the overall priority scheme. Under no circumstances can a UDK of a given priority interrupt an ongoing interrupt at that same priority level.

OFF KEY# Statement

An ON KEY# condition may be cancelled by using the statement OFF KEY#, whose syntax is:

OFF KEY# <num exp> (<num exp> represents a UDK (O-31))

This also cancels any pending interrupt for that UDK.

DIM Statement

The DIM statement is used to explicitly declare the number of dimensions an array has, and the number of elements in each dimension. The array may be either a string array or a numeric array. An array may have as many as 6 dimensions. The DIM statement is non-executable and may appear anywhere in a program. All references to the DIM statement are interpreted as a reference to the next executable statement that follows the DIM statement. The DIM statement specifies the maximum number of elements the array may have. This is an important limitation that will affect the REDIM statement. BASIC assumes that the lower bound of a dimension is 0 unless otherwise specified.

| Examples | Explanation |
|---|---|
| 10 DIM A(100) | Declares vector A of 101 elements. |
| 15 DIM B(3,2), C(2) | Declares a 4 by 3 matrix B and a vector of 3 elements |
| 20 DIM A$(2,2) [10] | Declares a 2 by 2 string array whose elements are each 10 characters long. |

The number of elements in an array is determined by subtracting the lower bound from the upper bound of a dimension, and then adding one. The sum is then multiplied by the number of dimensions. The resulting product of this operation is the total number of elements. An array may not have more than 32,767 elements in any single dimension. However, in practice the number of elements in an array is always limited to less than this by the amount of read/write memory available.

It is possible to specify the lower bound of all arrays as 1 by using the OPTION BASE statement in the program. If this statement appears in the program, all dimensions of all arrays are assumed to have the specified lower bound. The OPTION BASE statement must precede all allocation statements DIM, COM, REAL, SHORT, and INTEGER). Allowable bases are 0 and 1. Base changes affect string arrays as well as numeric arrays. Thus:

-The lower limit of an array subscript is assumed to be zero unless specified in an OPTION BASE or DIM statement.

-The limit on the maximum range of a subscript is 32,767 elements.

-The number of subscripts allowed is 6; i.e., up to 6 dimensional arrays.

-The uses of arrays include string variables in the same way that they include numeric variables. The only limitation is that every element of a string array is defined to have the same maximum character length. However, each element is a complete string, and carries a current length which may be equal to or less than the declared length.

| Examples | Explanation |
|---|---|
| 10 OPTION BASE 1 | Declares that all arrays will have a lower bound of 1. |
| 20 DIM A(15),B(4) | Declares a vector A with 15 elements, and a vector B with 4 elements. |

Numeric arrays may also be declared as type INTERER, SHORT, or REAL. This is accomplished by supplying the array name along with its dimensions in a type declaration statement.

| Examples: | Explanation: |
|---|---|
| 10 INTEGER A(10),B(4,4) | Declares an INTEGER vector A with 11 elements and INTEGER matrix B with 25 elements. |
| 20 SHORT C(20) | Declares a SHORT vector C with 21 elements. |

An array which appears in a type declaration statement may not appear in a DIM statement, and vice versa. Arrays which appear in a DIM statement are the default type, REAL.

The calculator will allow specifying an arbitrary base for each dimension of an array. The format for a single dimension array is:

```
<array name> (<lower bound>:<upper
  bound>)
```

The array has <upper bound> − <lower bound> + 1 elements. Both <upper bound> and <lower bound> may be arbitrary integers, except that:

```
−32768<lower bound>upper bound≦32767
```

Example:

```
10   DIM A(−5:10,10,−10:1),B(3,3,3,3)
```

The A array has 3 dimensions, with 16 elements in the first dimension, 11 elements in the second dimension, and 10 elements in the third dimension, for a total of 1760 elements. The B array has 4 dimensions, each of which has 4 elements, for a total of 256 elements.

REDIM Statement

The REDIM statement is an executable statement used to dynamically alter the number of elements in a dimension of an array. The REDIM statement cannot change the number of dimensions an array has. The REDIM statement cannot increase the total number of elements in an array beyond the maximum number of elements specified in the DIM statement or Type Declaration statement, or, if the array was implicitly declared, beyond the default maximum number of elements. The REDIM statement specifies new upper and/or lower bounds for each dimension.

In the following examples assume:

```
10   DIM A(100),B(20,20)
20   I9=15
30   J9=7
```

| Valid Examples: | Explanation: |
|---|---|
| 100 REDIM A(I9) | Changes vector A from A(0:100) to A(0:15). |
| 200 REDIM B(I9,J9) | Changes matrix B from B(0:20,0:20) to B(0:15,0:7). |
| 300 REDIM A(I9/3),B(30,5) | Changes vector A to A(0:5) and matrix B to B(0:30,0:5). |
| Invalid Examples: | Explanation: |
| 600 REDIM B(I9,30) | Would cause matrix B to have 496 elements, 55 more than originally specified in the DIM statement. |
| 500 REDIM A(I9,6) | Changes A from a vector to a matrix. |

BASIC will allow specification of a new lower bound, as well as a new upper bound, for each dimension of an array.

Example:

```
10   DIM A(5),B(−5:1,26)
20   REDIM A(3),B(N,−1:N+1)
```

If a lower bound is not specified, the default bound of 0 or 1 (depending on the option base) is used.

String Variables

The string handling functions are so important to many applications, and are so interrelated with all functions of the calculator, that they are implemented as part of the basic machine.

Every string variable has associated with it two lengths; these are its maximum length and its current length. The maximum length specifies how long the string value stored in the variable can be. Any attempt to store a string value longer than the maximum length will result either in right truncation of the value or in an error. The current length is the length of the string value that is actually stored in the string variable. The current length can range from zero (the null string) to a value equal to the maximum length. The maximum length is used only to set a limit on the current length and is a method of conserving data space. All string manipulation is done using the current length, not the maximum length.

1. Maximum string length may be no longer than 32,767 characters. This length limit also applies to each element of a string array.
2. The declaration of string length is accomplished in a COM or DIM statement.

For simple strings, a value enclosed in brackets following the string name, designates the length of the string. That is:

```
DIM A$[30]
```

declares a simple string variable, A$, to have maximum length 30 characters.

The default length for strings of undeclared length is 18 characters.

The Calculator's BASIC allows string arrays as well as numeric arrays. This section discusses string arrays; numeric arrays are discussed elsewhere. An array can be declared explicitly in a COM or DIM statement, or implicitly by using the array in an executable BASIC statement. Any string array that is implicitly declared is also assumed to have elements with the default maximum length of 18 characters. Declaring an array explicitly in a DIM statement is needed whenever the default dimension sizes are insufficient, or excessive.

To declare string arrays, array dimensions are followed by an optional string length, enclosed in brackets.

Examples:

```
COM A$(3)[10],B$(4,5)[20],C$(6,7,8),D$[5]
```

Establishes:

- -A one-dimensional string array, A$, with each element having length 10 characters.
- -A two-dimensional string array, B$, with each element a string of length 20.
- -A three-dimensional string array, C$, with each element a string of length 18.
- -A simple string variable, D$, of length 5.

Any reference to an element of a string array must incude the same number of subscripts as established in the declaration (DIM or COM) for that string. Thus, using the strings declared in the previous example:

-Any use of array A$ must include one subscript.

```
A$(2)="ABC"
A$(3)[7]="1234"
```

-Any reference to array B$ must include 2 subscripts.

```
B$(3,4)=""
```

-Any reference to array C$ must include 3 subscripts.

```
C$(1,1,1)=A$(2)
```

-Any reference to D$ can have no subscript.

```
D$="X"
```

The same name may be used for both a simple string variable and a string array variable. As with numeric variables, whether one is referencing an array or a simple variable is determined by the existence of subscripts following the name.

Substring specification is indicated by the inclusion of parameters enclosed in brackets following the array name (and subscripts, if present). Substrings may be specified in any of three ways:

A. With one parameter indicating the substring from the specified character to the end.

B. With two parameters separated by a comma, indicating the substring beginning and ending characters, inclusive.

C. With two parameters separated by a semicolon, indicating the beginning character and the number of characters.

Examples:

-E$[5] specifies the substring from (and including) the 5th character to the end. If

```
E$="123456789"
```

then

```
E$[5] is "56789"
```

-E$[3,5] specifies the substring beginning with the 3rd character and ending with the 5th character. In the example above

```
E$[3,5] is "345"
```

-E$[3;5] is the substring beginning with the third character, 5 characters long. In the example above

```
E$[3;5] is "34567"
```

-B$(2,3)[3,5] is the third to fifth character substring of the (2,3) element of the string array B$ -C$(1,2,3)[3;5] is the 5 character substring beginning at the 3rd character, of the (1,2,3) element of the string array C$ The string concatenation operator is the ampersand symbol "&".

The syntax is:

```
<string 1> & <string 2>
```

where <string 1> and <string 2> are string constants, string functions, string variables, or substrings of string variables.

During execution, <string 2> is concatenated on the right to <string 1>. If the variable into which this is stored is a substring, or if the declared length of the storage variable is inadequate to hold the total string formed by the concatenation, the result is truncated on the right (that is, the first N characters are stored), or else an error results, depending upon the exact circumstances.

A number of functions that operate on string variables are now described.

CHR$ Function

The generation of any 8-bit pattern (whether of printing or non-printing characters) for use as a string character can be accomplished with the function CHR$ (<num exp>).

For example:

```
A$=CHR$(48)
```

causes A$ to be defined as a 1-character string (with length properly set) containing an octal value of 60 (the ASCII 0).

This form can generate only one character in the string, but it can be used syntactically in exactly the same way as a one-character string literal enclosed in full quotes. That is:

CHR$(48) and "0"

are interchangeable in any string expression.

NUM Function

The inverse of the CHR$ function is the NUM function.

For example:

A=NUM(<string expression>)

will store in A the decimal equivalent of the eight bit representation of the first character of the string expression.

For example:

NUM("X") is 88

VAL Function

The VAL function returns a decimal number whose value is that which is represented by a string expression.

The value function is implemented syntactically as follows:

VAL (<string exp>)

For example:

VAL ("1.234E3')

would return the number 1234

VAL$ Function

The inverse function of VAL is VAL$ (<num exp>). It returns a string with the current print representation of the evaluated expression.

For example, if the print format is FLOAT 3, then

VAL$(120)

is "1.200E+02".

LEN Function

The LEN function returns the number of characters in a string expression.

Syntax for the function is:

LEN <string expression>

The current length of the string is returned, which is not necessarily equal to the length defined in the DIM statement.

For example, if:

DIM A$[32]

and

A$="FANCY BASIC"

then both

LEN("FANCY BASIC")

LEN (A$)

would return the value 11 because the current length is 11 characters.

LEN(A$[7] would designate the substring "BASIC", and would return a length of 5, because the length of A$ beginning at postion 7 is 5.

When string arrays are used with the LEN function, subscripts are required to indicate which string in the array is being designated.

For example:

if

DIM C$(2,2,2)[20]

and

C$(2,1,1)="PROGRAM"

then (LEN C$(2,1,1)) will return the value 7 because the string currently consists of 7 characters.

POS Function

The POS function determines the position of a substring within a string.

The syntax is:

POS (string (<string exp>, <string exp>)

If the second string is a substring of the first, the value of the function is the position of the beginning character of the second string within the first. If the second string is not a substring of the first string or if the second string is the null srring, the value of the function is zero. Also, if the first string is the null string, the value of the function is zero.

| | |
|---|---|
| If | DIM A$(32) |
| and | A$ = "FANCY BASIC!!!" |
| then | POS(A$,"BASIC") |

returns the value 7 because the word BASIC begins in the 7th position of the string.

| | |
|---|---|
| Similarly, if | DIM M$(10) |
| and | B$ = "BASIC" |
| then | POS(A$,B$) |

returns the value 7 because B$ appears in A$ beginning in position 7.

TRIM$ Function

The TRIM$ function eliminates all leading and trailing blanks, but retains all embedded blanks, in string or substring.

The syntax is:

TRIM$<string exp>

For example:

| | |
|---|---|
| If | A$ = "bbbbbABC" |

-continued

| | |
|---|---|
| then | PRINT "X"A$ |
| would result in: | XƀƀƀƀƀABC |
| Whereas | PRINT "X";TRIM$(A$) |
| would result in: | X A B C |
| If | |
| | A$ = TRIM$(A$) |

(where ƀ indicates a blank)

is executed, A$ now equals the previous A$ without any leading blanks and its current length is changed from 8 to 3.

As in the previously discussed string functions, any use of TRIM$ with string arrays requires the inclusion of appropriate subscripts.

RPT$ Function

The RPT$ function causes a specified string expression to be repeated an indicated number of times.

The syntax is:

```
RPT$(<string>, <num exp>)
```

where num exp> =0. (If num exp=0, the null string is indicated)

For example:

```
If  A$="ABCD"

then PRINT RPT$(A$,3) would print:
  ABCDABCDABCD
```

Similarly

```
If  B$=RPT$(A$,2)
```

is executed

```
then  B$="ABCDABCD"
```

REV$ Function

The REV$ function returns a string whose characters are in reverse order from those of a specified string.

The syntax is:

```
REV$<string exp>
```

For example:

```
If  A$="ABCDEFG"

and  B$=REV$(A$)

then  PRINT B$ will print: GFEDCBA
```

LWC$ Function

The LWC$ function returns the lowercase representation of the specified <string exp> without otherwise altering the original<string>. This function allows strings to be compared without regard to upper or lowercase.

The syntax is:

```
LWC$<string exp>
```

UPC$ Function

The UPC$ function is the inverse of the LWC$ function. It returns the uppercase representation of the specified <string exp> without otherwise altering the original <string exp>. Like the LWC$ function, the UPC$ function allows strings to be compared without regard to upper or lowercase.

The syntax is:

```
UPC$<string exp>
```

Referencing Numeric Arrays

A numeric array may be referenced either in various MAT statements or in various non-MAT statements. In a MAT-type statement, subscripts are generally not allowed since MAT statements reference the entire arrray. In non-MAT statements, subscripts must always be used. (Some exceptions such as SUM (A), DET (A), etc., are discussed later.) The number of subscripts must match the number of dimensions in the array. The subscripts may be any valid numeric expression.

Array Arithmetic Statements

Array arithmetic is defined for all four of the normal arithmetic operations: add, subtract, multiply, and divide. The operations are defined for numeric arrays only.

For arithmetic operations the entries in a numeric array (1,2. . . ,6 dimensions) are treated as an ordered collection of scalar quantities, rather than as the coefficients of a system of simultaneous equations as are the genuine matrix operations. In the arithmetic context, all operations are performed on the arrays element-by-element, on corresponding elements of the array operands.

The array-arithmetic statements will allow only one operation per statement; they cannot be combined in expressions.

The syntax of these statements can be any of three forms:

```
MAT<array res> = <array
  op> <+,-,.,/> <array op>

MAT<array res> =(<num
  exp>)<+,-,*,/> <array op>

MAT<array res> = <array
  op> <+,-,*,/>(<num exp>)
```

where <array res> ("array-result") and <array op> ("array-operand") each take the form:

```
<array name>
```

where <array name> is any valid name established either by an explicit array declaration, or implicitly for use.

When any of the first form of the arithmetic statements are used, both of the array operands must have the same form (same number of dimensions) and the current number of elements in each dimension must be the same.

The result array must be of the same form as the array operand(s), and must be large enough that it can be redimensioned to the same dimensions as the current dimensions of the operand(s).

The syntax for actual multiplication of matrices is:

```
MAT<array res> = <array op>* <array op>
```

The restrictions on this are that the number of columns in the first matrix must equal the number of rows in the second matrix. Also the matrix to the left of the replacement operator must not appear to the right of that operator.

The results of executing an array-arithmetic statement depends on which of the three forms of the statement is involved.

1. For the first form, involving two arrays of the same form and size as operands, the specified arithmetic operation is performd, element-by-element on corresponding elements of the two arrays (where . represents multiplication). The result is stored in the corresponding element of the result array. Thus, a typical example:

```
MAT A=B+C
```

would cause

```
A(I)=B(I)+C(I)
```

for all I up to the current size of the arrays B and C, which must be the same size.

For two dimensional arrays Value, Price, and Number:

```
MAT Value=Price.Number
```

would cause

```
Value(I,J)=Price(I.J)*Number(I,J)
```

for all I up to the number of rows in the array, and for all J up to the number of columns, assuming that Price and Number have the same lower and upper boundaries in both dimensions. Otherwise, a constant offset would be added to Number to make the elements track. Notice that the multiply operation is quite different from the multiply performed by a matrix multiply (*) statement. The result array is re-dimmed to the same current dimensions as the array operands when the operation is complete.

2. For the second form, which has a numeric expression as the first operand, and an array as the second, the specified arithmetic operations will be performed using the value of the numeric expression as the fixed first operand, and one-by-one, each element of the array which is the second operand. The result is stored into corresponding elements of the result array. The result array is redimmed to the same current dimensions as the array operand after the operation is complete.

3. For the third form of the statement, which has an array as the first operand, and a numeric expression as the second operand, the specified arithmetic operation is carried out using the elements of the array, element-by-element, as the first operand, and the fixed value of the numeric expression as the second operand. The result is stored into the corresponding element of the result array. The result array is re-dimmed to the current size of the array operand on completion of execution of the statement.

Obviously the results from add and multiply are the same for either of the last two forms (assuming the same array and numeric expression, of course). But the results of subtract and divide are different. With both forms available, any desired operation can be carried out.

Array Relational Statements

Array relational statements are defined for determining the relationship between the elements of two arrays, or for testing the elements of one array.

Array relational operations may be applied to numeric arrays only. The result array must be numeric since the result of each relational operation is 0 or 1.

The syntax of these statements can be any of the three forms:

```
MAT<array result>=<array operand><rel
  op><array operand >

MAT<array result>=(<num exp>)<rel op
  ><array operand>

MAT<array result>=<array operand><rel
  op>(<num exp>)
```

where <array result> and <array operand> are defined the same as for array arithmetic statements. The <rel op> can be one of the 6 regularly-defined relational operators:

= <> or # < > <= >=

The requirements for form an size of <array result> and <array operand> are the same as for the array arithmetic statements previously described.

The results of executing and array-relational statement depends on which of the three forms of the statement is involved:

1. For the first form, involving two arrays of the same form and size as operands, the specified relational operator is applied element-by-element to the corresponding elements of the two arrays. The result (which is 1 or 0 depending on the true/false result of the relational test) is stored in the corresponding element of the result array.

For example:

```
MAT A=B>C
```

would cause

```
A(I)=  if the corresponding element of B is greater
  than the corresponding element of C

      =0  otherwise
```

for all elements of the arrays B and C, which must the the same size (have the same number of elements in each dimension). Obviously, the result array is a "logical"array containing only 1's or 0's reflecting the relationship between the elements of the two operand arrays. The result array is re-dimensioned to the current size of the operand array at completion of execution.

2. For the second form, which has a numeric expression as the first operand and an array as the second operand, the value of the numeric expression is compared element-by-element to each element of the array. The resulting 1/0, depending on the true/false result, is stored in the corresponding element of the result array.

3. The third form, which has an array as the first operand, and a numeric expression as the second operand, is similar to the second form. The second and third forms are variants of the same operation.

Functional Operations On Numeric Arrays

Array functional statements provide the capability of applying a function to each element of an array, element-by-element. The meaning of "function", in this context, is an operation which accepts a single numeric value as "input", and returns a single numeric value as a result.

The syntax of the array-function statement is:

```
MAT<array result> = <function> <array
  operand>
```

or

```
MAT<array result> = >function >(<array
  operand>)
```

where <array result> and <array operand> have the same meaning as in the definition of array-arithmetic and array-relational statements, and <function> is a pre-defined system-function of a single numeric argument, such as SIN, COS, TAN, SQR, etc.

During execution of the array-function statement, the function specified is applied to the array, element-by-element, and the generated result is placed in the corresponding element of the result array. The result array is re-dimmed to the current size of the argument-array at completion.

Transposition of Matrices

The MAT . . . TRN . . . operator causes the specified matrix to be transposed, that is, the rows in the matrix becomes columns, and the columns become rows.

For matrix transposition:

A. The result matrix must be dimensioned large enough to contain the transposed rows and columns.

B. The result matrix will be redimensioned during the matrix transposition process.

C. The result matrix cannot be the same as the operand matrix.

Syntax for MAT . . . TRN . . . is:

```
MAT<array result> = TRN<array operand>
```

where the <array operand> designates the original matrix and the <array result> specifies the destination matrix.

Determinant of a Matrix

The DET function with a parameter causes the determinant of the specified matrix to be generated.

The syntax is:

```
DET<array name>
```

Since this function works by performing a matrix inversion operation, additional work space is used by the calculator during the operation and must be taken into consideration by the user.

The function DET with no parameters is defined to be the determinant of the last inverted matrix. Matrix inversion is described below.

For example:

```
A=DET
```

Inversion of Matrices

The MAT . . . INV . . . operator generates the inverse of the matrix specified.

The syntax is:

```
MAT<array result> = INV<array operand>
```

where the array operand is inverted to give the array result.

Rules converning matrix inversion are:

A. Only square matrices can be inverted.

B. Singular (or near singular) matrix inversion gives no error.

C. Additional temporary storage is used by the calculator during matrix inversion operations and therefore should be allowed for by the user.

D. The destination matrix must be dimensioned at least as large as the original matrix. The destination matrix will be redimensioned during the matrix inversion operation.

DOT Products

The DOT function, when specified with the two vectors, will generate the inner product of the vectors.

For example:

If the following two arrays are given,

```
A=(1,2,3)      B=(4,5,6)
```

The DOT function will multiply the first element of the A array with the first element of the B array and add the result to the product of the second element of the A array and the second element of the B array and so on.

```
PRINT DOT (A,B)
```

will print the dot product of the arrays (32).

Array Utility Operations

Various utility operations on arrays are defined. Some of these operations generate results which are of a different form (number of dimensions) than the operand array. The descriptions of these operations follow below.

Array Element-Summation

This function causes all elements of the array operand to be summed up to a single numeric value.

The syntax of this function is:

```
SUM <array operand>
```

or

```
SUM (<array operand>)
```

where <array operand> is as defined for previous array statements.

Column-Sum/Row-Sum Operations

Column-sum and row-sum operations are defined for 2-dimensional arrays only. The result array is a single-dimension array.

The syntax of these statements is:

```
MAT <array name 1> =CSUM<array name2>
```

or MAT<array name 1>=CSUM(<array name2>)

and

MAT <array name1>=RSUM<array name 2> or MAT<array name 1>=RSUM(<array name2>)

where <array name1> is the name of a 1-dimensional array, and <array name2> is the name of a 2-dimensional array.

During execution of the CSUM or RSUM statement, the elements of a column or row of the array specified by <array name2> are summed up to a single numeric value. This value is stored in the element of <array name1> corresponding to the column or row number of <array name2>. This is repeated for each column or row of the array. At completion, the current dimension of <array name1> is set to the current number of columns or rows of <array name2>.

For the CSUM/RSUM operation, the definition of row and column is that the first subscript of a two-dimensional array is the row subscript, and the second subscript is the column subscript. These are the conventional matrix definitions.

If <array name2> is not a two-dimensional array, or <array name2> is not one-dimensional, an error will be generated at execution time. <Array name1> must be dimensioned large enough to allow re-dimming to the number of rows (for RSUM) or columns (for CSUM) as <array name2>, or an execution-time error will be generated.

Array Initialization

A statement to initialize an array by storing a specified constant value in every element is defined. The operation may be applied to numeric arrays only.

The syntax is:

MAT <array operand>=(<num exp>)

During execution, the numeric expression is evaluated, and the result is stored in every element of the array as it is currently dimensioned. An error occurs if the array does not have a value area allocated; that is, this statement cannot be used to implicitly declare the existence of the specified array. In fact, no MAT statement can implicitly declare an array.

MAT READ Statement

The MAT READ statement is a single statement enabling an entire collection of data to be read from the DATA statements in the program and assigned to the consecutive elements of an array, in the conventional row/colymn order; that is, the right-most subscript varies fastest.

The syntax is:

MAT READ<array name>[(<redim spec>[,<redim spec>]. . . )][,<array name>, . . . ]

MAT INPUT Statement

The MAT INPUT statement is a single statement enabling an entire collection of data to be assigned to an array from the keyboard.

The syntax is:

MAT INPUT<array name>[(<redim spec>],<redim spec>][, <array name>, . . . ]

If no dimensions are previously are previously specified for the matrix, an error occurs. Inputs fill the array in row/column order; that is, the right-most subscript varies fastest.

MAT PRINT Statement

The MAT PRINT statement provides a convenient single statement to print an entire matrix row by row. Each row starts a new line, and if all elements in a row will not fit in one line, the elements overflow into additional lines with each row separated by a blank line.

The syntax is:

MAT PRINT<array name>[, <array name>, . . . ]

or

MAT PRINT <array name>[;<array name>; . . . ]

The <array name> items may be separated by a comma or a semicolon, which causes either use of the standard 20 character field, or close packing, respectively. The difference resides in the manner of printing the sequential elements of the arrays; not in the manner the arrays follow each other. There is always a double space between arrays.

MAT ZER Statement

The MAT ZER statement sets each element in an array equal to 0.

The syntax is:

MAT <array name>=ZER[<redim spec>[,<redim spec>]. . . ]

If <redim spec> parameters are included, the array is redimensioned during the MAT ZER process.

For example:

MAT A=ZER (1:5,2:8)

would redimension the original matrix A to be A(5,7), with the rows numbered 1 through 5, and the columns numbered 2 through 8.

The matrix would then look like:

| | 2 | 3 | 4 | 5 | 6 | 7 | 8 ← Column # |
|---|---|---|---|---|---|---|---|
| Row # → 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |

Since arrays can be dimensioned with up to 6 dimensions, the MAT ZER statement can have up to 6 <redim spec> parameters.

MAT CON Statement

The MAT CON statement sets each element in an array equal to 1.

The syntax is:

MAT <array name>=CON[<redim spec>[,<redim spec>]. . . ]

Redimensioning is identical to that of MAT ZER.

MAT IDN Statement

The MAT IDN statement creates an identity matrix in which all elements are zero except for a principal diagonal containing ones.

The MAT IDN statement can be used only on a square matrix, or upon a matrix that has been dimensioned to be square.

The syntax is:

```
MAT <array name> = IDN
                 = IDN (<redim spec>,<redim spec>)
```

Redimensioning is the same as in MAT ZER, except that only two <redim spec> parameters are allowed.

ROW/COL Functions

For two dimensional arrays, ROW and COL functions are defined as follows:

```
ROW <array operand>

or ROW (<array operand>)

COL <array operand>

or COL (<array operand>)
```

For matrices these functions return the number of rows in the array in the first case and columns in the second case. For these functions. one dimensional arrays are treated as 1 by n arrays. For arrays of greater than two dimensions these functions return the number of elements in the next right most subscript for the ROW function. and the number of elements in the right most subscript for the COL function.

Philopsophy of the Mass-Storage Sub-System

The mass-storage sub-system is designed to control all mass-storage device: tape cartridges, small floppy discs, large discs, etc. The statements of the sub-system are as device-independent as possible so that programs can utilize different storage devices with a minimum of change in the program.

The working unit of storage is the "file". Files are given names assigned by the user. The user is not directly involved in where data is stored on any device; he references it "by name", and the sub-system takes care of the rest. This is accomplished by use of a director in which all pertinent information about the file is maintained. Each storage medium used, whether tape cartridge, floppy diskette, disc cartridge, disc pack, etc., carries its own directory. Within any one storage medium there cannot exist two files with the same name, but on different media the same file-name can be reused.

File Specifiers

In every statement which requires that the user specify a specific file, a <file spec> will be used. The same definition is used for all occurrences.

The role of a file specifier is two-fold:

1. It specifies a particular file "by name".
2. It specifies where that file is located—the particular mass-storage device/unit within whose medium the file is mounted.

In statements invoking the mass storage sub-system the <file spec> itself must be present; it is not defaulted in any case. Within the <file spec> however, the device/unit specifier is optional, and if not present, default values are taken.

The <file spec> appears in a statement as a <string expression> which can take many forms: a simple string variable, an element of a string array, a substring of either of these, concatenated strings or substrings, and string literals (text) enclosed in quotes ("), etc.

The syntax is:

```
<file spec>::=<file name>[:<unit spec>]
```

where:

```
<file name>::=1-6 characters (bytes) which may
  have any value except:
```

| | |
|---|---|
| (null) | (value ϕ) |
| " (quote) | (value $34_{10}$, $42_8$) |
| : (colon) | (value $58_{10}$, $72_8$) |
| (rubout) | (value $255_{10}$, $377_8$) |

and:

```
<unit spec>::=<device type>[<select
  code>[,<controller addr/floppy unit
  code>[,<unit code>]]]
```

where

| | | |
|---|---|---|
| <device type>: : = | T | (tape cartridge) |
| | F | (floppy disc) |
| | other single letter | (specifiers for devices yet to be) interfaced) |
| <select code>: : = <num expr> | | 1 ≦ 15 |
| <controller addr>: : = <num expr> | | 0 ≦ 7 |
| <unit code>: : = <num expr> | | 0 ≦ 7 |
| <floppy unit code>: : = <num expr> | | 0≦ 4 |
| These are typical <file spec> examples: | | |
| "JACK" | "JACK:F5" | "JACK:T14" |
| A$ = "JACK" | B$ = ":T14" | use A$&B$ |

When the calculator is turned on, or SCRATCHA is executed, the default <unit spec> is set to :T15, which is the primary tape cartridge transport. All <file spec>'s which do not include a <unit spec> will be defaulted to :T15.

If the user desires to change this default, it can be done with the command:

```
MASS STORAGE IS :<unit spec>
```

This will change the <unit spec > default to whatever the user specifies.

This has special advantage for programs which use only one mass-storage device. All <file spec>'s can omit the <unit spec>, forcing use of the default, which can be set to any device with this command.

In addition to total default of the <unit spec>, the user can default only the <select code>, <controller addr>, <unit code>, etc.

<select code> defaults as follows:

```
:T  defaults to :T15

:F  defaults to :F8
```

<controller addr>, <unit code>, <floppy unit> always default to $\phi$.

Example:

:F5 defaults to :F5,$\phi$

If <file spec> is specified in a statement as a string variable name, element of a string array, etc., (i.e., anything but a string literal (text in quotes)), when the run-time value is determined, it must follow the rules set down above. For string literals, proper syntax is checked at the time the statement is entered.

File Structure

There are 6 types of files. They are:

| | |
|---|---|
| 1. Program Files | (created by a STORE command) |
| 2. Data Files | (created by CREATE OR SAVE OR RESAVE) |
| 3. Key Files | (created by STORE KEY) |
| 4. Storeall Files | (created by STOREALL) |
| 5. Binary program Files | (created by STOREBIN) |
| 6. Binary Data | (Reserved type - cannot be created in the basic machine without specially supplied option ROM's) |

Of the six file-types, the user has complete control over only DATA files. All of the others are created and used by specific commands associated with that file type.

For example:

KEY files are created and used by STOREKEY/-LOADKEY, and any attempt to access these files by other commands is rejected.

By a definition common in the computer industry, a file is a collection of storage units called "records". Records are the smallest units of randomly-addressable storage.

In dealing with DATA files in the mass-storage subsystem, a user becomes involved with three kinds of records:

1. Physical record: This is the minimum-addressable unit of storage which is handled by the mass-storage device hardware. For all devices which can be handled by the mass-storage sub-system, this is 256 bytes. However, in general, the user is totally isolated from dealing with physical records.
2. Defined records: This is the size of record which the user decides (from the requirements of his problem) that he wants to deal with as a record. This can be any size from 4 to 32767 bytes. However, all records of a file are this size; it is not possible to have a file consisting of different size defined records. The user sets up a file, specifying the number of records and their defined size, with the CREATE command which will be discussed later.
3. Logical records: This record is strictly a user-level concept. In any one application, the user will usually be dealing with a group of his data items which constitute the block of data with which he is dealing logically. For example, in a payroll application, all of the data items for one employee (name, address, social security number, etc.) constitute a logical record. Knowing the number and type of all data items in this logical record, the user can determine the number of bytes of storage required. This is the length of his logical record. If he wants to use random access to these logical records, he must make his defined record large enough to hold a logical record. This is because the defined record is the unit which he can address randomly.

To determine the length of his logical record, the user must know the type of each data item, the maximum length of all strings, how many of each, and the number of bytes of storage required.

The following data applies in these computations:

| TYPE | LENGTH |
|---|---|
| Full Precision (Real) number | 8 bytes |
| Split Precision number | 4 bytes |
| Integer numbers | 4 bytes |
| String | Current length +4 bytes |

For arrays, each element requires the storage specified above.

The string storage indicated above applies when the entire string can be stored within a defined record. This condition is required for random mode (described in detail below), but is not required for serial mode. In serial mode the string will be decomposed into parts: a first part; none, one or more middle parts; and a last part (described in detail below). Each such part will require an additional 4 bytes.

The operations of the mass-storage sub-system deal in defined records. The sub-system handles the mapping of those into the physical records in the particular storage medium. The user determines the nature of his logical records by how he programs and handles his data.

Creating Data Files

The user can directly create a data file by using the CREATE statement. The syntax is:

CREATE<file spec>,<no. of records>[,<record length>]

where:

<file spec> is as previously defined;

<no. of records> is a <num expr> which is rounded to an integer and must be in the range $1 \leq n \leq 32767$; <record length> is a <numb expr> which is rounded to an integer and must be $4 \leq r \leq 32767$, and specifies the length of each record in bytes. The default value of r is 256 bytes.

During the process of actually setting up the file on the mass-storage medium, the sub-system will search for the first sufficiently large contiguous collection of physical records which is available. It will "erase" any old contents of these records by writing defined records with an EOF (End-Of-File) in the first data position of each record. It will then enter the file name, starting location, number of records, length of records and type of file (Data) into the directory.

Also a data file is created implicitly by the SAVE statement (described later). The number of records is the amount required to store the listed program (using serial PRINT #'s for strings, one per line) with a defined record length of 256 bytes. If the user desires, he may use this file as a regular data file (as if set up by CREATE); it is a normal data file in every way.

File Protection

Once created, any file (regardless of type) may be "protected". The statement to do this is:

PROTECT<file spec>, <protect key> where:

<protect key> is any <string exp>. The first 6 characters will be encoded, additional characters will be ignored. Protection, as implemented, is not intended as an ultimate in file-security. It is designed to prevent accidental purging of the file (see PURGE, to be described next), or to prevent some unwarranted access to the data (see ASSIGN, to be described later). A file already protected cannot be protected again.

Purging Files

Any file on a mass-storage medium can be purged from the medium by the PURGE command. The syntax is:

PURGE<file spec<[, >protect key>]

The <protect key> must be provided if, and only if, the file was protected. It must exactly match the key used to protect the file.

Files on tape cartridges (units T14 or T15) receive only limited protection. Only a single bit is maintained to indicate the file is protected or not-protected. Any <protect key > will be accepted. This low-level of protection is provided only as a reminder/safeguard to prevent accidental purging of file. For a small storage medium such as a tape cartridge, the only real protection is personal possession and control of the cartridge.

Using Data Files

There are several fundamental concepts upon which the mass-storage sub-system statements are based. Understanding these will enable the user to accurately and methodically handle his data storage/retrieval operations.

1. Before any operation can be carried out on a data file, that file must be assigned (opened) by the user. This process of assignment associates a data file "by name" with a file number (called channel) number by some people). In the calculator's mass-storage sub-system up to 1ϕ such declarations can be active at a time, allowing simultaneous access up to 1ϕ files. If the use of a particular file is completed as a program runs, (so that the file number is no longer busy) another file may be assigned to that number.
2. All accesses to a data file are controlled by a "pointer". Internal to the sub-system, an actual pointer is maintained which "points to" some location in the calculator memory (an area of memory which is the current device buffer for the particular storage device). Conceptually, the user can conceive of the pointer pointing to an actual storage location within the file itself.

Figure 15:
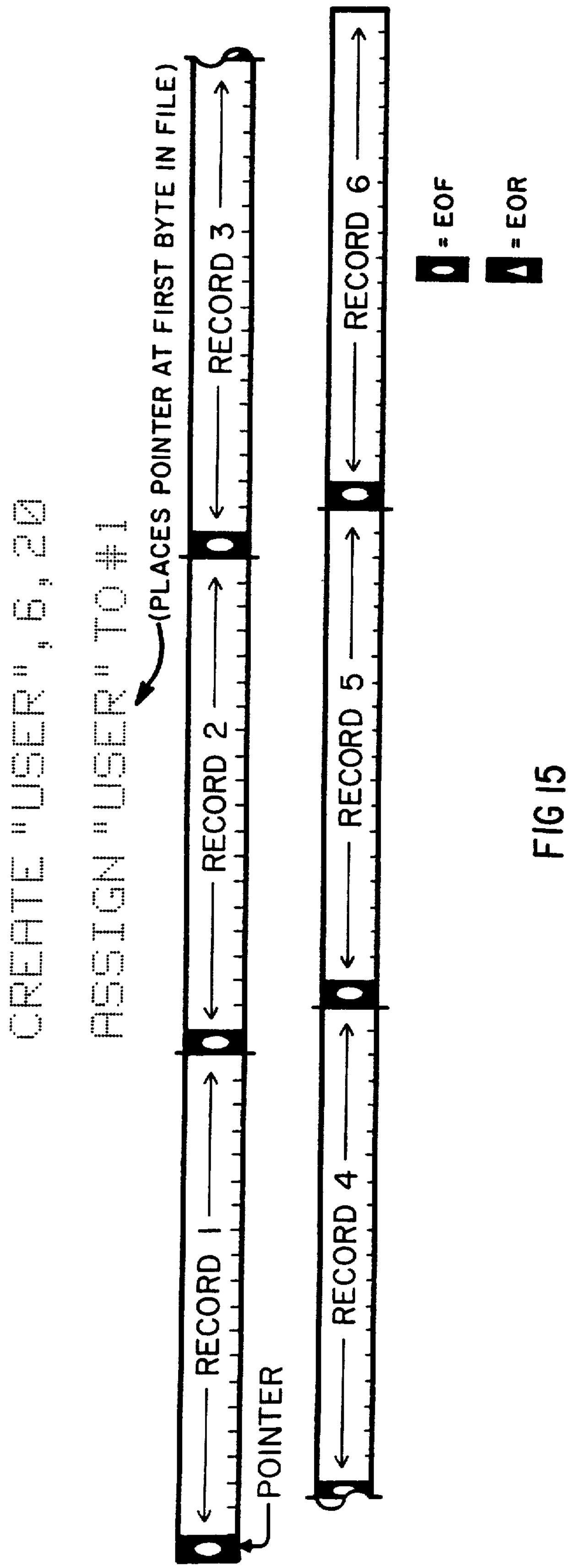

Once the file is created, n records each r bytes long, the user can conceive of the files as a continuous collection of nxr storage locations. Pictorially, this might be visualized, for example, as a file with 6 records each 20 bytes long, as shown in FIG. 15. At any point in time, the pointer is pointing at one of these bytes.

The following paragraphs describe the various statements for data-handling mainly in terms of what use is made of the pointer, and what happens to it.

There are two primary modes of access to data files which are called serial and random. Data transfers to or from storage always occur in one of these modes. The distinction between these modes is mainly in how the pointer is controlled and used. In general, serial operations are characterized by the property that they only move the pointer forward in the file; they cannot set it to any specific location. Random operations allow setting the pointer before it is moved forward as data is transferred. The random mode cannot set the pointer to any given byte; it can only set it to the first byte of a defined record.

Further ramifications and details of serial and random mode operations will be discussed in connection with specific statements in the paragraphs that follow.

The ASSIGN statement is used to set up the relationship between a "file-by-name" and a file number, as described earlier.

The syntax is:

ASSIGN<file spec>TO#<file no>[,<ret var>[,<protect key>]]

or

ASSIGN #<file no>TO<file spec>[, <ret var>[,<protect key>]]

where:

<file spec> is an previously defined.

<file no> is a num exp which is rounded to an integer and must lie in the range $1 \leqq f \leqq 1\phi$.

<ret var> is any numeric variable into which a "status" value may be returned, if desired.

<protect key> is as defined previously.

The assignment of files to file numbers need not be in any sequence. The user may select any file number in any order, so long as it is $1 \leqq f \leqq 1\phi$.

The return variable indicates whether the assignments is successfully completed, or if not, some indication as to why. The values returned are:

ϕ—File available, assignment completed.

1—No such file found.

2—File found, but it is of wrong type or is protected and the user provided no (or the wrong) <protect key>.

If the user does not provide a <ret var>, and if the file is not successfully assigned, an error will occur. But if the user does provide a <ret var>, no error will occur; it is up to the user to test the <ret var>.

Each ASSIGN causes an access to the directory of the specified device. Information needed by the sub-system about the file is extracted from the directory and entered into a files table which contains the correspondence between file names and assigned numbers. If a <file spec> which is an asterisk (*) is used, the associated files table entry will be cancelled.

A file number may be passed as a parameter of a subroutine by preceding the parameter with a #. For file numbers which are passed, the file table entry is available in the subroutine. The user may assign unpassed numbers with ASSIGN statements in the subroutine. These assignments are local to the subroutine, and will be cancelled on exit from the subroutine.

At the time an ASSIGN is executed, the pointer is initialized to point to the first data item (of the first record) of the file.

Storing data on data files can take place in two modes: serial or random. As mentioned previously, these differ mainly in how they manage the pointer.

However, before discussing individual commands, there is a common construct in both commands which can be described in one place.

The data to be stored is specified in a list of expressions very similar to the <print list> for DISP, PRINT, and PRINT USING statements. There are two differences from those <print list>'s:

1. Print functions (TAB, SPA, LIN, TYP) are not allowed.

2. The output-function END may be the only item, or the last item of <print list>. The purpose of this function will be discussed later. END will be considered to be a part of the <print list>. The execution of a data-print statement causes the items of the <print list> to be evaluated. The following rules apply:

1. If the item is an expression which involves a function of an operator, the result will be a real value. This is true even if all variables involved in the evaluation have been declared of type other than real.
2. If the item is a variable name only, or an array specifier only, (i.e., involving no function or operator), the data stored will be of the type of the variable.

Serial Print

The serial data-print statement syntax is:

```
PRINT#<file no>;<print list>
```

where:

<file no> and <print list> are as defined previously.

When this command is executed, the <file no> expression is evaluated and rounded to an integer. This associates with the appropriate file through the file table set up to be an ASSIGN.

The items of the <print list> are evaluated according to the rules previously stated.

The data will then be stored into the internal system buffer associated with that device, beginning at the present pointer location. The pointer will be "carried along" item-by-item until all items have been transferred. The pointer is then set to the next available storage location and a special marker called an End-Of-Record (EOR) marker will be stored at that location. If the function END is at the end of the <print list> this EOR marker will be changed to an End-Of-File (EOF) marker (the same EOF mentioned in connection with the CREATE statement).

Note that output data is moved to the buffer, but not necessarily written to the actual storage device. When this buffer fills (thus completing a physical record) the physical record will actually be written to the device. This is done to provide a considerable speed advantage and, in the case of the tape cartridge, to significantly reduce the physical wear-and-tear on the tape. However, if the system is stopped for any reason in an abortive way (CNTRL-STOP or power failure) the buffer contents may not get written when the user thought they had been. This can be changed if the user desires (see CHECK READ, to be described later).

The critical feature of serial PRINT# is that the defined record boundaries are invisible to the user. For example, consider a file with six defined records (the user can totally ignore the existence of physical records) as shown in FIG. 15.

Figure 16:
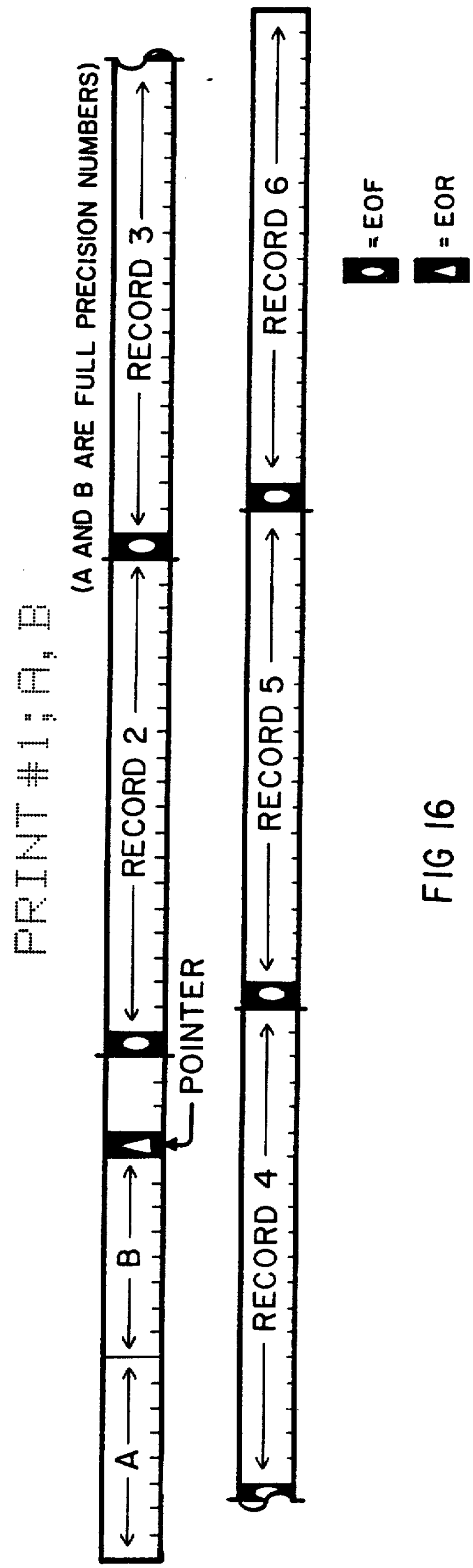

Referring now to FIG. 16, notice that the data has overwritten the first EOR (transfer begins at the pointer, regardless of what is there!) and that an EOR has been placed immediately after B, and the pointer points to it. The A and B values took 8 bytes each, the EOR is in the 17th, and 3 empty bytes remain in record 1.

Figure 17:
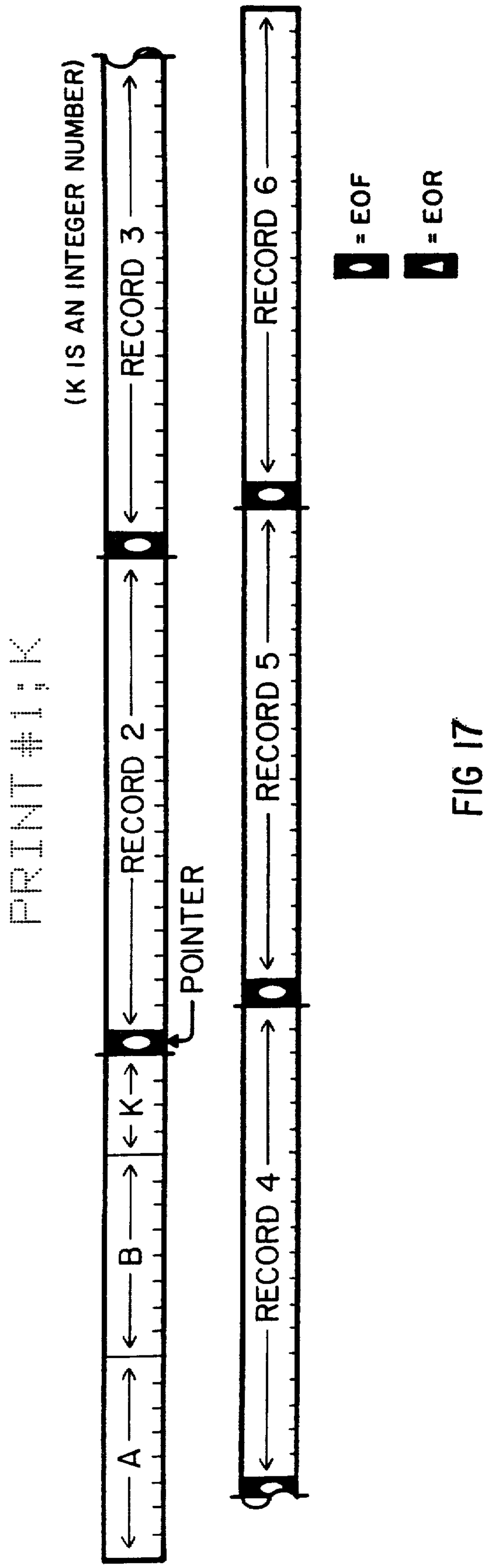

Referring now to FIG. 17, the EOR has been overwritten, the integer K exactly fills the defined record. When the <print list> data exactly fills the defined record, an EOR is not written into the next record. However, the pointer points at the first location of the next record.

Figure 18:
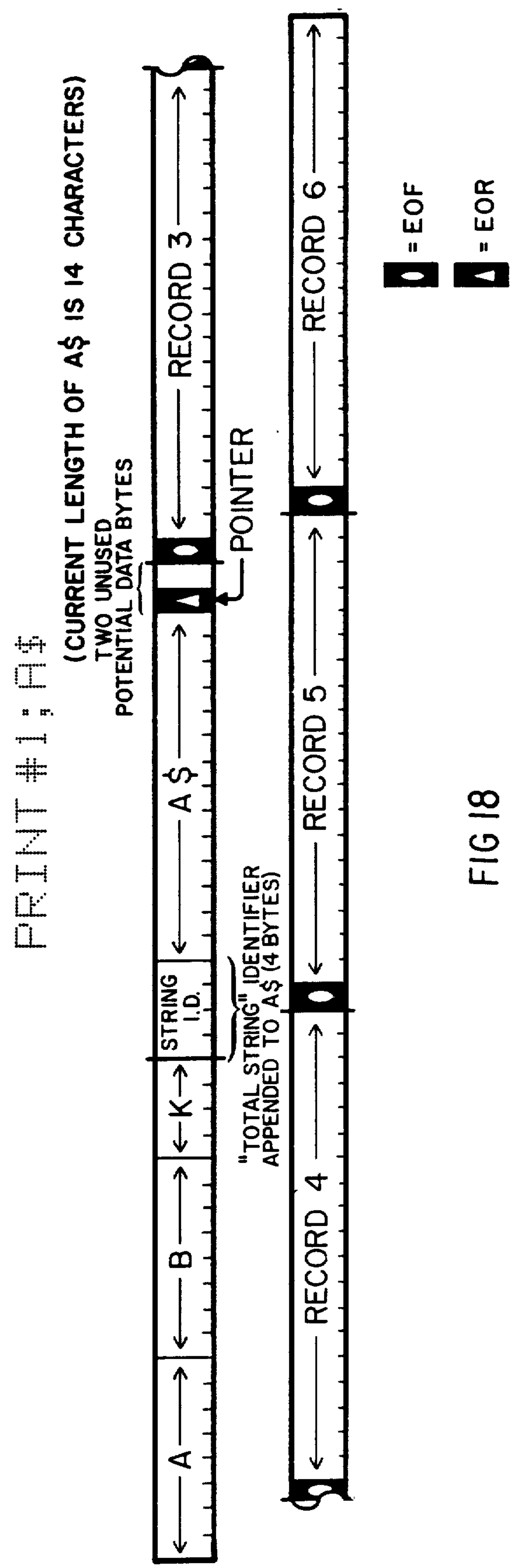

Referring now to FIG. 18, the writing of A$ took 18 bytes (14+4); the EOR is the 19th byte. Notice that the relevant length is A$'s current length, not its maximum length. 2 unused data bytes remain in record 2.

Figure 19:
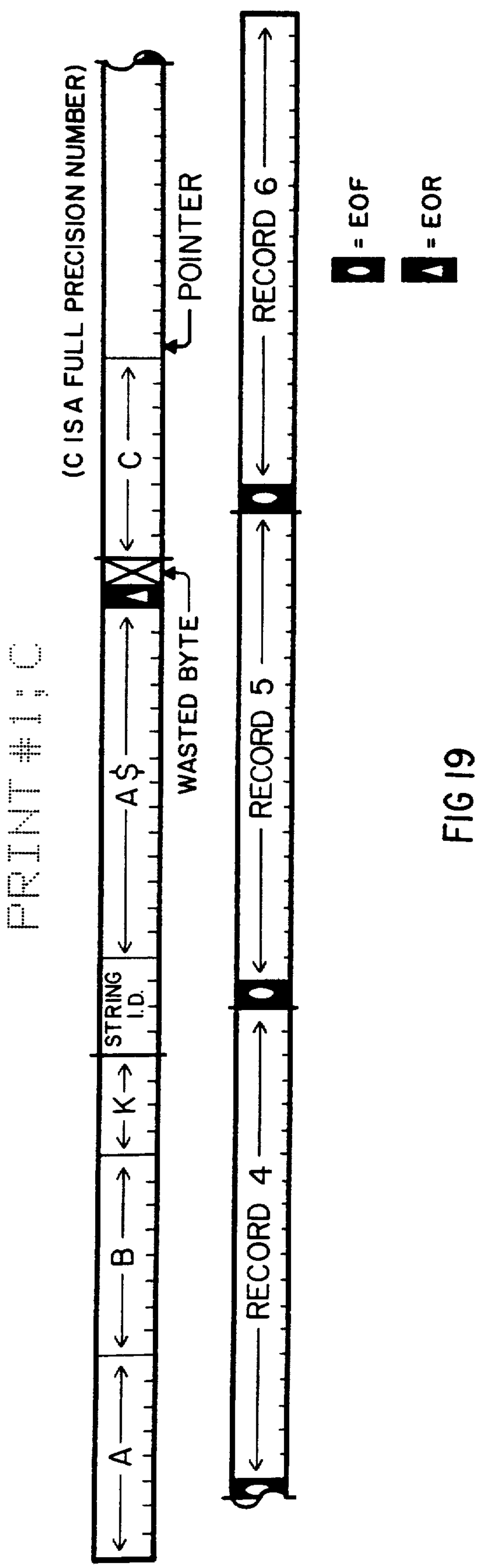

Referring now to FIG. 19, writing C requires 8 bytes, but only 2 are available in record 2. The writing of numeric values will not cross defined record boundaries. The pointer is moved forward to the beginning of record 3, and writing goes from there. 12 available bytes remain in record 3.

Figure 20:
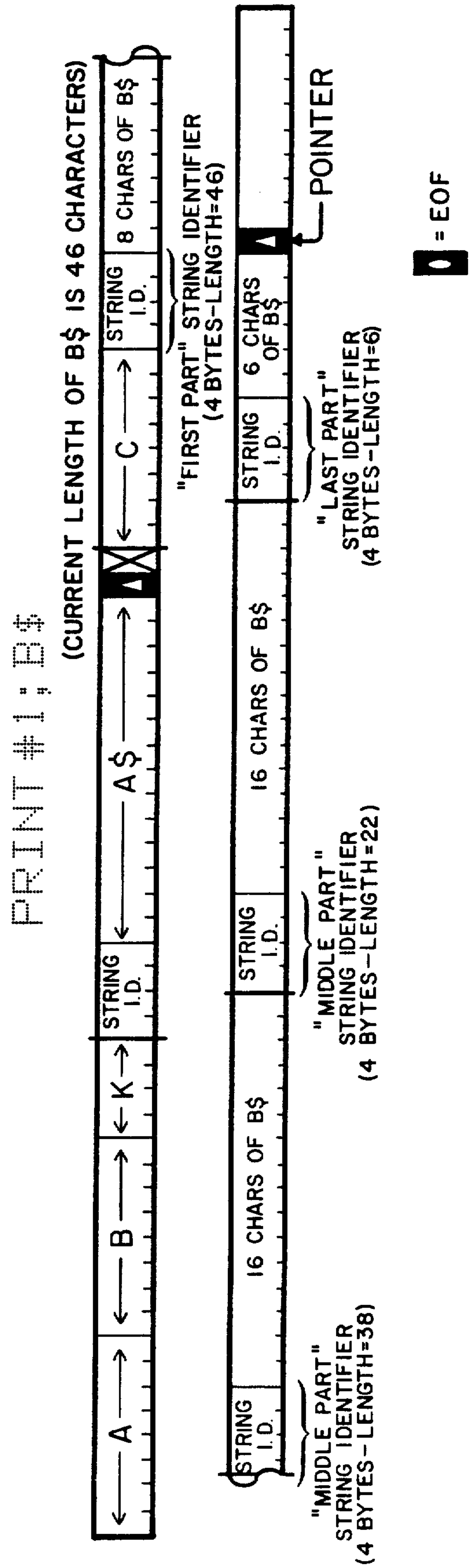

Referring now to FIG. 20, the string B$ is broken up into parts that will fit into whole records and parts of records. There are 3 types of such "part-strings":

A. First part
   Fills remainder of defined record; its associated length in its identifier is the total length of the string.

B. Middle part
   There may be none, one, or more middle parts. Each fills an entire defined record. Their indicated length is the number of characters remaining (i.e. to the end of the entire string).

C. Last part
   There is only one last part. It must be the first data item in the defined record. Its length is also the number of remaining characters.

Serial PRINT# can store any string, regardless of defined record length, if the total storage in the file is adequate. The shorter the defined record is, the more loss there is for "middle part" identifiers. This capability to store long strings in records of any defined length is an important property of serial PRINT#.

If the print-list item is an "array identifier", that is, an item of the form <array name>(*), the entire array (as currently dimensioned) is stored. The transfer is item-by-item, as individual data items of the type of the array. It is not done as a unit with an special array identification. The transfer proceeds, by cycling the right most subscript most rapidly, advancing to the left, so that (if there are two or more dimensions) the left most subscript cycles slowest. Items thus stored can be retrieved by reading them either as arrays, or item-by-item into simple variables (to be described further in the READ# description).

The important characteristics of serial PRINT# are imbedded in its use and handling of the pointer:

A. The pointer is "taken where it is" whenever a serial PRINT# execution begins.
B. The pointer is advanced through the file, item-by-item, and at completion is left pointing to the next available storage space.
C. An EOR (or EOF if END is on the <print list>) is always written at the pointer location, which makes all following data items in that record inaccessible.

If an attempt is made to store more data than the storage capacity of the file remaining from the pointer on to the end of the last record of the file, and End-Of-File condition is generated (see the description of ON END# for what happens on the End-Of-File condition). This EOF is generated by the controlling firmware; it notices that the number of defined records required has exceeded the number of available defined records associated with the file. However, until the End-Of-File is encountered, data will be transferred, item-by-item; all data (including parts of strings) up to the one item (or part of string) which causes the "overflow" will be stored. This last, and all following items, will not be stored. The user has no direct way to know where in the <print list> this happened.

Random Print

The random print statement syntax is:

PRINT#<file no>, <rec no>; <print list > where:

<file no> and <print list> are as defined for the serial PRINT# statement and:

<rec no> is a <num exp> which is rounded to an integer and must be r≧1.

The general function of random PRINT# is similar to the serial PRINT#. The first difference involves management of the pointer. Before data storage begins, the pointer is set to the beginning of the specified defined record.. After the pointer is set, data transfer and pointer advances proceed as in serial print. However, the pointer and data-transfers are never allowed to go past the defined-record boundary. If this should happen because the <print list> specifies more data than can be stored in a single defined record, an End-Of-Record condition is generated (see the description of ON END# for what happens for an EOR condition). This "stay within the specified record" situation is particularly important in the use of random PRINT# for arrays and large strings; they must be confined to the record. This implies that all strings are written as total strings; the first, middle, and last-part breakdown will never occur. All data items will be moved to the record, item-by-item, up to the one which causes the "overflow" beyond the record boundary. It, and all following items will not be stored. The user has no direct way to know where in the <print list> this occurred.

After each transfer of data with a random PRINT#, an EOR (or EOF if END is present) will be placed at the location of the pointer. If the <print list> specifies a quantity of data which exactly fills the defined record, no EOR (or EOF) will be written; the system does not require that a space be reserved for the EOR mark.

Once a random PRINT# has been executed, it can be followed by serial PRINT#'s, which use the pointer wherever it is, crossing record boundaries, etc., as just described for serial PRINT#. Other than placement of the pointer by the random PRINT#, there is no special relationship between them.

Once a random PRINT# has been executed into a specified defined record, all of any previously written data that lies beyond the EOR or EOF in that record is inaccessible. This is not dependent on the amount of old data in the file or on the amount of data transferred by the PRINT#. In fact, a file can be cleared of all old data by executing PRINT#F,R for each record in the file (which places an EOR in the first storage location), or by executing PRINT#F,R:END (which places an EOF instead).

If the specified record number is greater than the number of defined records in the file, no data will be transferred, and an End-Of-File condition will be generated (see the description of ON END# for what happens on an End-Of-File condition).

Reading Data

Reading data from data files can take place in two modes: serial or random. These differ mainly in the ways they use and manage the pointer and are very similar to the ways the PRINT# commands handle the pointer.

A part of both serial and random read-data commands is the <read list>, which specifies what data is to read. The <read list> differs materially from <print list> in the following ways:

1. Only variables are allowed; no expressions may appear. The variable may be a simple numeric or string variable, an element of an array (either numeric or string), or an entire array specified by an item of the form <array name>(*). For string items, a substring may be specified. For arrays, the number of items in the array as it is currently dimensioned will be read.
2. The function keyword END used on the end of <print list> is not allowed.
3. For each item in the <read list>, (including the item-by-item elements in an array) the read routine must find at the pointer location, a stored data item of the proper kind, numeric or string. However, for a numeric item, the type (real, short, or integer) is not of consequence. For all numeric types, the read routines will make the necessary conversions from the stored data type to the type of the variable in the <read list>. However, if a stored item is a string, and the <read list> item is numeric (or vice versa), a data-error will result and the read operation will be aborted. All data-items up to that point will have been transferred, but the user has no direct way to know exactly for which item the error occurred.

This conversion of data items has interesting uses. The user may store a sequence of n numeric items of any type in any order by any sequence of PRINT# statements with any number of items in the various <print lists>. He may then read them all back into a single numeric array of any type which is currently dimensioned to contain n elements. Or, he may store a single numeric array containing n elements (obviously all of the same type) and then read them back into any type of numeric variable, singly or otherwise, or back into an array or arrays of different type.

A sequence of single strings can be stored and read back into a string array, or vice versa.

The numeric conversions are subject to numeric-conversion overflow, particularly in converting real and split precision numbers to integers.

When an overflow occurs this warning message will (regardless of what device is the PRINT-ALL device) be dislayed on the next line of the print area 56 of the CRT:

OVERFLOW IN LINE nnnn

The overflow default value will be stored in the variable, and execution will continue. This is a warning message, and will not appear in non-CRT PRINT-All output, nor is it subject to "trapping" with the ON ERROR declarative.

Serial Read

The serial read statement syntax is:

READ# <file no>; <read list> where:

<file no> is as defined for the PRINT# statements.

and:

<read list> is as just previously defined.

Execution of the serial READ# causes the next data item (as determined by the current pointer location, wherever that is) to be checked for agreement-in-kind (numeric or string) with the next item in the <read list>. If they are not the same, a data-error is generated. If they are the same, the data from the file is transferred to the specified variable. If they are numeric, but of different type (real, split, integer) the appropriate type conversion takes place. If a real number of split precision number is too big for conversion to an integer number an overflow condition occurs; the default overflow value is stored, a non-abortive (warning) message is generated, and transfer continues.

If the stored data-item is a string and the <read list> item is a string which is dimensioned shorter than the stored string, not transfer will take place. An error will result, the pointer remains at the string data-item, and the execution is aborted.

Figure 21:
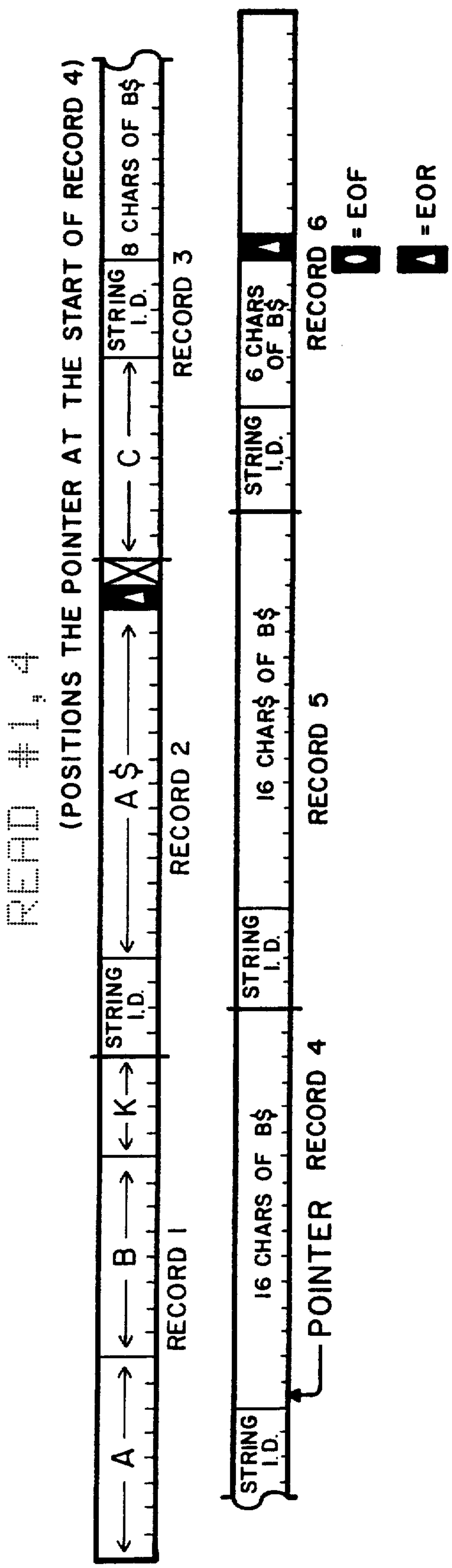

As will be discussed later for random-read, the pointer can be placed at the beginning of any defined record with a random READ# statement. With the pointer so placed, data transfer can be initiated with a serial READ# statement which takes the pointer "where it is". Recall the example file of FIG. 20 generated in our discussion of serial print:

Referring to FIG. 21, the pointer of that file could be placed at the beginning of record #4 by:

READ#1,4 (see random read)

Then executing

READ#1;C$ would transfer, (beginning at the middle-part in record #4) the remainder of the string (assuming C$ is large enough to hold it) through and including the last part in record #6. This is only part of the original string B$, but transfer without error or special note would occur. If the user did not want this to occur, he could make a special test before executing the serial read (see the TYP function). This kind of "partial string"n read could occur also from record #5 and #6 in the example. The length of the string is the actual number of characters transferred.

As each item is transferred, the pointer is advanced, item-by-item. Before each item is transferred, the read routine checks the pointer location to see what kind of item is stored there. If next there is executed READ#1,1 (sets pointer to first record)

READ#1;A,B,K,C$ the pointer is left at the next storage location, which happens to be an EOR in the example. If now there is executed

READ#1;C the read routine checks the location of the pointer and finds an EOR instead of actual data. For serial READ# this has a special meaning: go to the next defined record, set the pointer to the first storage location and try again. The read routine will find the numeric at the beginning of record #3. Data transfer will occur, leaving the pointer at the beginning of B$.

If then there should now be executed

READ#1;B$ the total string will be transferred. The pointer will be set to the next location, which is the EOR in record #6.

If any further serial READ#'s are attempted, the EOR would cause the "skip to next record". In this case that is record #7, which does not exist. That would cause an End-Of-File condition to occur.

The "skip to the next record" procedure for serial READ# explains why all old data after an EOR is inaccessible by the user.

If the serial PRINT# read routine finds an EOF mark at the pointer when it attempts to transfer data (of any type) an END-Of-File condition occurs. The EOF may be one placed by the user with the word END as part of a <print list>, or it may be the EOF placed in the first storage location of each defined record when the CREATE command set up the file.

The important characteristic of the serial READ# (and serial PRINT#) is that defined record boundaries are ignored. Thus the entire file appears as one large storage area. Without using random commands, the user can access data in the file only serially from the beginning. Direct (random) access to the nth item is not possible; it can be reached only by reading over the (n−1) items in front of it. However, many applications process files serially, and in these instances serial-mode operations are ideally suited for that use, and are the simplest possible structure.

Random Read

The random read statement syntax is:

READ# <file no>, <rec no>; <read list> where all of the parameters are as previously defined.

The distinguishig characteristics of the random read are:

1. The pointer is placed at the first storage location of the specified record. After the pointer is placed, execution proceeds as for serial read except for condition (2).
2. The random read transfer is limited to the single specified record. If the number of items specified in the read list causes the pointer to go past the record boundary, or an EOR or EOF mark is encountered, an End-Of-File condition occurs (see ON END# for what happens then).

In the handling of strings the random read routine could encounter a total string (record 2 of the example), a first-part (record 3, after C) a middle-part (records 4 or 5), or a last-part (record 6). In each case, if the <read list> is otherwise correct, the part-of-a-string will be transferred with no error or warning, as if it were an entire string. If the user wishes to prevent this, he can make sepcial tests before the actual data-read statement (see TYP).

As random read executes, data transfers to the variable occur item-by-item, and the pointer moves ahead item-by-item. If an error (wrong kind of data, etc.), EOR or EOF occurs, the transfer and statement are aborted at that point, and the pointer is left set at the item involved in the error.

An interesting point is illustrated by the example file. Although the items written to it by the PRINT# statements have been "labeled" with the names of the variables in the <print list> which stored them, this has been done only for the sake of explanation. On the actual storage medium, there is no indication of the variable name. Each item is only marked to identify its type: real, split, integer, total string, etc. When reading back the data, it can be brought in as any valid variable name.

End-Of-Record and End-Of-File Conditions

In the description of PRINT# and READ# it was pointed out that various events can cause an End-Of-Record or End-Of-File condition. Note that this has been generally described as a condition and not as an error. What is to happen is up to the user. His control is exercised through use of the ON END# declarative statement.

In order to fully understand the events and conditions which are involved, there is a basic concept involved with READ# and PRINT# which should be clearly in mind. The user usually views READ# and PRINT# statements as "in line code" with one entry and one exit. This is, as:

preceding statement

READ# following statement with no other "route out" except the next statement. In fact, a quite different situation is true. There are three possible exists from every READ# and PRINT#, as shown:

READ# or PRINT#

1. Normal
   Operation completed successfully
2. Error Exit—
   a. Wrong kind of data
   b. String too long
   c. Numeric overflow in type conversion
   d. etc.
3. End-Of-Record or End-Of-File Until the user realizes this, and plans his programs accordingly, unexpected and hard-to-explain (or find) happenings will plague him.

There is little to be said about the "normal" exit; it is the one expected and easily understood.

The "error" exit is usually that: an error which is generally accepted as an abortive termination of the program. This may be trapped with the ON ERROR declarative, but there is usually very little that can be done to recover.

The End-Of-File or End-Of-Record condition may or may not be symptomatic of an error. If it is an End-Of-Record condition caused by attempting to read or write more data than a defined record can contain in the random mode, then it is an error. It comes unexpectedly, and results from the data structure not matching what the program (user) expected. In this case, an End-Of-Record condition should be an abortive error, terminating program execution. If the user makes no declaration to prevent it (ON END$\pi$), this is what will happen.

If a user builds a serial file by a succession of serial PRINT# operations with the same <print list>, he can visualize them as a succession of logical records, and which may have nc particular relationship with defined records. In using the file, he accesses the data with a succession of serial READ# statements with a <read list> reflecting his logical records. Again, defined records are of no concern. Perhaps in processing his file he chooses not to keep track of how many logical records are in it. In the file itself, the last data item of the last logical record he wrote will be followed by an EOR mark (or an EOF if he placed it there). When he reads through his file, record-by-record, he will finally try to read the non-existent record following his last ac ual record. If he has placed an EOF there, and End-Oi-File condition arises. If there is an EOR there, this signals "skip to the next defined record" (since he is reading serially). What is in this next record, which has never been used, is an EOF; resulting again in an END-Of-File condition. If the user could "trap" this condition, and stop it from being an abortive error, he would have a convenient way to find the end of his file without having to bother keeping track of where it is.

This capability to trap the End-Of-Record/End-Of-File condition (they cannot be distinguished) is provided by the ON END# statement, whose syntax is:

ON END#<file no>GOTO/GOSUB<line i.d.> or

ON END#<file no>CALL<subname>

This statement is a declarative: it establishes a response to the stated condition, which remains in effect until changed by another declarative, for the <file no> specified. Once set up, an End-Of-Record or End-Of-File condition arising in the execution of any READ# or PRINT# to that <file no> will cause a GOTO, GOSUB or CALL, as specified.

If a GOSUB or CALL is specified, the processing routine cannot be interrupted by a subsequent ON KEY# condition.

If multiple ON END# statements are pending (in a manner analogous to ON KEY#), the condition specifying the highest file number has priority when the currently executing program line is concluded. However, since execution of an ON END# statement forces serial I/O on that file number, such a situation is extremely rare. It is theoretically possible if operation is begun in the overlapped mode, and several operations to the various files are "stacked" before the ON END# declarative is executed.

The ON END# declarative for any <file no> can be changed at any time by executing a new ON END# with the same <file no>. But unless the declarative is to be changed, ON END# should be executed only once; it shoud not be put inside a loop.

The ON END# declarative for a <file no> can be cancelled by executing the OFF END# declarative whose syntax is:

OFF END#<file no>

This cancels any previous ON END# for that file, and causes return to a condition as if ON END# had not been executed.

The use of ON END# as described previously allows the user to avoid the work of keeping track of how many records are in his file. If he takes the trouble to count records, and execute READ# statements only up to the last record (and then not try to read another because he knows there isn't data there) he will never do anything to cause an End-Of-File condition.

Since ON END# substitutes for this extra work of counting records and controlling the sub-system more methodically, as might be expected, there is a price to be paid for using this capability. If ON END# is not in use, both the error-exit and EOF/EOR-exit for READ# and PRINT# can be treated internally by the sub-system as abortive errors. When this is true, the sub-system can allow operation in OVERLAP mode (discussed elsewhere); wherein I/O is "stacked-up" (buffered) and execution of the program proceeds on ahead.

However, if ON-END# has been executed for some <file no>, the EOF/EOR-exit is not an error, but a branch to another part of the program. Thus, until the result of executing every READ# or PRINT# to that <file no> is completed, and it is known whether an EOF/EOR condition occurred, execution can not go on. So, use of ON END# to any file must force non-OVERLAP for all operations to that <file no> only. The sub-system automatically forces this, even though the user desires OVERLAP. He can achieve OVERLAP by taking the trouble to count records and fully control the system so that he does not need ON END#.

Verifying Correctness of Storage Operation

In some applications, the user may be quite concerned about the validity of the record operations to some of all of his mass-storage devices. Quite flexible conrol of this is provided by various versions of a CHECK READ statement. This statement will force a read-after-write verification of some or all mass-storage recording.

While this verifies that recorded data on the medium is correct, a considerable price is paid:

1. All recording (writing) operations are seriously slowed down. In the case of the cartridge tape, it must back up across the record and read it back. For rotating media (floppies and disc) the readback involves waiting a full revolution after each write to be able to read. Each type of storage device has its own particular penalty, but in general, the writing operation takes an order of magnitude more time.
2. In some cases, the verify operation is somewhat self-defeating in the sense that it materially increases wear of the medium. For cartridge tape, verify causes 3 passes rather than one per operation. For a floppy disk, each record operation requires a full revolution, where without verification all 30 records in a track could be written in two or three revolutions; a difference of as much as 10 or 15 to one!. For high speed discs with flying heads, the extra wear is insignificant.

There are two versions of the CHECK READ statements.

The syntaxes are:

```
CHECK READ
CHECK READ OFF
```

and

```
CHECK READ#<file no>
CHECK READ OFF#<file no>
```

where <file no> is as previously defined.

The first version (with no parameter) causes all mass-storage record operations to be check-read. This includes STORE, SAVE, PRINT#, etc., to all devices.

The second version causes check-reading of only PRINT# to the specified <file no>.

Each version has a companion "off" command which turns off the specified check-read operation.

An auxiliary function of CHECK READ is to force immediate-record after each PRINT# operation, to be discussed next.

Immediate-Record

During the normal functioning of the mass-storage sub-system, a buffer is set up within the I/O sub-system for each mass-storage device. This buffer is the size of one physical record (256 bytes), and all information recorded to or read from that device (data, programs, everything) goes through this buffer. The sub-system will maintain this buffer, and keep it allocated to that device for as long as it can, rather than allocating and then de-allocating it after each operation. Only when there is need for that read/write memory for other purposes (buffers, for other devices, etc.) will a buffer be de-allocated.

This method of buffer allocation allows the possibility for some remarkable improvements in performance. For example, consider the following program:

```
1ϕ  CREATE "DATA", 1ϕ,256
2ϕ  ASSIGN"DATA"TO#1
3ϕ  - Compute X
      .
1ϕϕ PRINT#1;X
11ϕ GOTO 3ϕ
```

which computes a single value, stores it away on the default mass-storage device, and keeps this up until the file is full. Since X is real, it will require 8 bytes, and each record can contain 32 values; 320 for the entire file.

Consider operation for buffer allocation/de-allocation with each execution of PRINT#. A total of 320 recording operations are required on the medium.

Next, consider allocation/de-allocation only if necessary. In the same example, assume that a fixed buffer stays allocated. For each PRINT#, the value needs only to move to the buffer, and when it is full, actually be recorded. In the example, this occurs only ten times for 320 values; a reduction in storage-device operations of 32 to 1.

There are two obvious advantages:

1. The time required is proportional to the number of actual record operations.
2. The wear of the medium is reduced as the number of operations is reduced.

In both of these areas, improvements of the order of 10 or 20 are quite normal.

However, there is a price to be paid. Between recording operations, there is data accumulating in the device buffer which, theoretically has been "written", but may actually be lost in case of power failure, tape malfunction, etc. There can never be more than one physical (256 byte) record per device so jeopardized. But, in some applications, the user may not be willing to take such risks. A most obvious possibility is for data read from instruments whenever a new X comes in, say, every 30 minutes. This means that it would take 16 hours to accumulate a full record. The potential for loss due to power failure is, of course, proportional to the actual time by the clock that the data is kept in the buffer.

In order to allow the user to control this situation, an additional function has been added to CHECK READ described in the previous section. When CHECK READ is "on" for any particular <file no>'s, it also causes an immediate-record of the device buffer after every PRINT# operation to those particular <file no>'s.

User Controlled Mass-Storage Buffering

The device buffer associated with a particular mass-storage device (as described in previous sections) can materially improve performance if all READ#/PRINT# operations in the program are from/to a single file on that device. Notice that this was the situation in the example program; there were repeated PRINT# operations to a single file.

A slightly different example will illustrate the opposite case:

```
4ϕ ASSIGN"FILE1" TO #1

5ϕ ASSIGN"FILE2" to #2

6ϕ READ#1;A

        .

        .

        .

Compute new B using A

        .

        .

        .

1ϕϕ PRINT#2;B

11ϕGOTO6ϕ
```

The single device buffer now provides no performance improvement at all. Before B can be put into the buffer in its proper position (at the pointer), the buffer must be loaded by reading the appropriate record from file #2. This is because the buffer contains the record from file #1 from which A was extracted. Upon going back to line 6ϕ, the buffer (with the new value of B added) must be written out before the appropriate record from file #1 can be loaded to get another A, and so on. Every READ#/PRINT# requires reloading or writing the buffer; there is no performance improvement.

To obtain any performance improvement where more than one file on a device is active, it is necessary to associate a buffer with the <file no> rather than with the device. This is an additional buffer besides the device buffer; the device buffer is an imbedded part of the functioning of the I/O system, and cannot be affected by the user.

To provide this extra capability to the user desiring high-performance mass-storage operations, the BUFFER statement is implemented.

Its syntax is:

```
BUFFER #<file no>
```

where <file no> is as defined previously.

When executed, the BUFFER statement obtains a 268 byte buffer from the user's main read/write memory, and permanently associates it with the specified <file no>. During READ# and WRITE# operations to that <file no>, transfers occur between the file buffer and the device buffer. Both buffers are monitored by sub-system and changed if and only if it is necessary. A file buffer may be declared for any, none, or all −file no>'s active in a program.

Buffer assignments are cancelled by any operation which cancels or alters the entry in the files table for that −file no>. Reassigning a different file to a <file no> will cancel any existing buffer assignment.

The function of CHECK READ#, which forces immediate-write, and BUFFER#, which attempts to minimize the number of write operations, are contradictory if both are declared for the same <file no>. An arbitrary assignment of priority between these declarations has been made and implemented in the subsystem. For either case:

```
CHECK READ#n

BUFFER #n
```

or

```
BUFFER #n

CHECK READ #n
```

The same conditions prevail:

1. The BUFFER condition is deemed pre-dominate, and writing will occur only when the buffer is full, or it is necessary for other reasons (program ends, etc.).
2. When the buffer is written, it will be check-read. Thus CHECK READ# in this context means "verify", but does not mean immediate-write.

Data Kind/Type Checking

As mentioned in connection with random READ# encountering middle-parts or last-parts of a string, the user is provided with the capability to determine this in advance, if he wants to. This is implemented by a function whose syntax is:

```
TYP(<typ file no>)
```

where

```
<typ file no>::=<file no>  (used with serial)
               −<file no>  (used with random)
```

TYP is a function (like SIN, COS, etc.) which may be used like a variable in any valid <num exp>.

When executed TYP will cause the checking of the type/kind of the data-item present at the pointer location for the specified <file no>. The type/kind will be returned as a numeric value according to the following scheme:

1=Real number
2=Total string
3=End-Of-File (EOF)
4=End-Of-Record (EOR) (See following discussion)
5=Integer number
6=Short precision number
7=Not used
8=First part of string
9=Middle part of string
10=Last part of string In connection with the returned value of 4 (for an EOR), there is an unusual situation concerning serial READ# operations in that EOR is invisible to the user; i.e., it causes a "skip to the next record", and not an End-Of-Record condition. In this mode, if a user were to do a serial READ#, he would obtain the next data-item (if there is one) and not the EOR. Therefore, for serial mode use, the TYP function should return the type of this data-item and not the EOR. This is possible by the use of the positive <file no> as parameter. When this is done, the value 4 for an EOR will not be returned. Instead, the TYP function will "skip to the next record" and return the type of the data-item found there, exactly as serial READ# would do. The pointer will be moved to the data-item which is reported by the TYP function.

If a negative sign is used on the <file no> argument of TYP, code 4 will be returned when on EOR is encountered. This corresponds to use of TYP with random mode.

The TYP function is an unusual function in that it invokes an I/O operation which may require reading a record from the mass-storage device (depending on the contents of the device or file buffer at that time). For this reason, a TYP function cannot be invoked, directly or indirectly, as part of an expression in an output list on a PRINT# statement. This can unexpectedly cause a "deadlock" in I/O operations: operation number 1 cannot be completed until operation number 2 is completed, but number 2 cannot be carried out until number 1 is done. This situation cannot be checked for at the time program lines are entered; it is a run-time condition which is monitored by the operating system. If it occurs, the output command which caused it will be terminated with an abortive error. This situation may also arise with the invoking of multi-line functions in expressions, and is discussed further elsewhere.

Copying Files

The user is provided with the capability to copy any file, regardless of what type it is. He can copy into another file (with a different name) on the same mass-storage device. Or, he may copy into a file (with the same name or a different name) on another mass-storage device.

The syntax of the statement is:

```
COPY<file spec>TO <file spec>[,<protect
  key>]
```

where <file spec> is as defined previously, (specifying <file name> and <unit specifier>) and <protect key> is also as previously defined. The <protect key> must be present and match if the source file is protected. When this statement is executed, a new file will be created (exactly as CREATE would do) with exactly the same size (in physical records) as the original file. There cannot be a file with the new file name already existent on the destination device. If there is, the statement execution will be aborted. All records of the old file are copied into the new file without alteration, regardless of file type, whether data, program, keys, binary, etc. The directory entry of the new file exactly reproduces that of the old file (except possibly for a different name) so that defined record size number of records, protection key, etc., pertain to the new file exactly as they did for the old file.

Copying is accomplished physical-record by physical-record (256 bytes each). It will perform at extremely high speed for copying from one device to another, but it will cause extreme "seeking back-and-forth" activity when copying on the same device. In many cases, when several mass-storage units are available, a two-pass copy between devices may be advantageous for copying large files: copy the old file to a new one on another device, then copy that back onto the first device.

Rewinding Tape

Rewinding a tape cartridge before removal from the tape drive is recommended. It is also frequently useful (primarily in serial processing) to rewind the tape during operation. This is accomplished by the statement:

```
REWIND <unit specifier>
```

If the <unit specifier> is not specified, the default mass-storage unit is taken.

If REWIND is directed at any device except the primary (or secondary if installed) tape cartridge drive, it is ignored without generating an error.

Remaining Files

Renaming files is self-explanatory.

The syntax is:

```
RENAME <old file spec>TO<new file
  spec>[,<protect key>]
```

The protect key is only required if the original file was protected.

SAVE Statement

The SAVE statement causes the creation of a data file into which a program or part of a program will be stored in source form. The lines of the program are stored in string-data format, one string per line. Programs affected by SAVE are the mainline and any subprograms currently in memory.

Since the created file is a data file, written in normal data format, it can be read by other programs as data and modified and rewritten as data. It contains no special markers distinguishing it from a regular data file.

The syntax for the SAVE statement is:

```
SAVE <file spec>[,<line i.d.>[,<line i.d.>]]
```

If no <line i.d.>'s are specified, all current lines of programming are Save'd. If a single <line i.d.> is specified, all lines from that point are SAVE'd. If a range of line is specified, only those line numbers included in the specified range will be SAVE'd.

RE-SAVE Statement

The RE-SAVE statement causes the existing file having the specified name to be purged, and the mainline and subprograms currently in the calculator to be SAVE'd.

The syntax for the RE-SAVE statement is:

RE-SAVE <file spec>[,<protect key>][,<line i.d.>[,<line i.d.>]]

GET Statement

The GET Statement or command will read the specified data file, expecting to find a succession of strings. These strings will be loaded one at a time into the input buffer, syntax checked, and stored as a compiled program.

Usually, the file to be used by GET will have been created by a SAVE. Since the file is a normal data file, it can also be created by any program which writes string-data in the form of a valid program line for the calculator.

The syntax for GET is:

GET <file spec>[,<line i.d.>[,<line i.d.>]]

The first <line i.d.>, if present, will cause the new line numbers to begin at that <line i.d.> value. The second <line i.d.> parameter, if present, will cause an automatic RUN at the line number specified.

If a label is specified, the line number associated with the label will be found after the GET (or LINK) instruction actually occurs.

LINK Statement

The LINK statement, like the GET statement, will read the specified data file into the calculator memory. The LINK statement does this while retaining the values of all existing variables.

Syntax for the LINK command is:

LINK <file spec>[,<line i.d.>[,<line i.d.>]]

As in the GET statment, the first <line i.d.> value, if present, will cause the incoming lines to begin at that specified line number. Previously existing lines with lower line numbers are retained, those after are replaced with the incoming lines. If a second <line i.d.> parameter is present, program execution will continue at the line number specified in the second <line i.d.> parameter.

STORE Statement

When executed, the STORE statement will cause the creation of a special "program" file by the name specified in the <file spec>. The size of this file will be the number of records required to hold the word-for-word internal form of the program, the symbol table, and any binaries currently in memory.

The syntax is:

STORE <file spec>

RE-STORE Statement

The RE-STORE statement causes the existing file having the specified name to be purged and the programming currently in the calculator memory to be STORE'd.

The syntax is:

RE-STORE <file spec>[,<protect key>]

LOAD Statement

When executed, the LOAD statement will expect to find a special "program" file. The program (if any) in memory at that time will be totally replaced with the file contents, and all of the previous programming will be destroyed. All data values in common, however, are preserved.

The syntax is:

LOAD <file spec>[,<line i.d.>]

If the optional line number parameter is specified an automatic RUN will be executed at the line number specified.

STOREBIN Statement

When STOREBIN statement is executed, it will cause the creation of a special file into which any binary programs resident in the machine will be written.

The syntax is:

STOREBIN <file spec>

LOADBIN Statement

When the LOADBIN statement is executed, loading will begin at the end of any binary program resident in the machine; adding this new binary program onto those already present. In this process, the command recognition and syntax tables for the new binary will be properly linked to existing binaries.

The syntax is:

LOADBIN <file spec>

STOREALL Statement

The STOREALL statement or command is used to store everything currently in the calculator's memory; that is, all programs, variables, keys and binaries currently resident in memory at the time STOREALL is executed.

The syntax is:

STOREALL <file spec>

LOADALL Statement

The LOADALL statement causes an implied SCRATCHA and then loads information previously stored by a STOREALL statement. LOADALL restores the complete memory to the state it was when STOREALL was executed.

The syntax is:

LOADALL <file spec>

STOREKEY Statement

The STOREKEY statement stores all UDK typing aid definitions into a special key file.

The syntax is:

STOREKEY <file spec>

LOADKEY Statement

The LOADKEY statement loads UDK definitions from a file created by a STOREKEY statement. Mainline programs and subprograms are not affected by a LOADKEY operation.

The syntax is:

LOADKEY <file spec>

INITIALIZE Statement

The INITIALIZE statement enables an unused mass storage medium to be used by establishing physical records and main and spare directories. A used medium may also be re-initialized; in the process, it is cleared of all information it contains.

The syntax is:

INITIALIZE: <unit spec>[,<interleave factor>]

The <unit spec> is never defaulted to an unsupplied value; it must be supplied.

The option <interleave factor> can be supplied only for initialization of floppies; its default value is 7.

INITIALIZE causes some device dependent responses.

An INITIALIZE operation formats the tape cartridge by actually writing physical records onto the tape. A floppy disc is given a test with several different data patterns written into each record.

CAT Statements

The CAT statements provides a means to print a catalog of the information.

The catalog includes file names, types, and various specifications.

The syntax is:

CAT ["[<sel cat spec>] <unit spec>"[,<num exp>]]

or CAT #<select code>[,<HP-IB addr>]

[;"[<sel cat spec>]<unit spec>"[,<num exp>]]

Both syntaxes involve an optional <sel cat spec> and an optional <num exp>. The <sel cat spec> is a selective catalog specifier. If it is supplied then only files (on the specified device) whose name begins with (or match) the <sel cat spec> are included in the catalog. If the value of the <num exp> is a 1, the heading of the catalog is omitted.

The heading has this format:

NAME PRO TYPE REC/FILE BYTES/-REC ADDRESS

<unit spec> <#of usuable tracks>

The body of the catalog contains the following information:

| | |
|---|---|
| NAME: | Information is stored on the tape. |
| PRO: | An asterisk in this column designates a protected file. |
| TYPE: | Coded as follows:<br>PROG for a program file<br>DATA for a data file |

-continued

| | |
|---|---|
| | KEYS for a KEY file<br>ALL for a STOREALL file<br>BPRG for a binary program file<br>BDAT for a binary data file |
| REC/FILE | The number of defined records used to contain the information. It is determined internally except in the case of a CREATE specified file. |
| BYTES/REC | Except in the case of a file specified by CREATE 256 is standard. |
| ADDRESS | STARTING ADDRESS is the physical record number on which the file begins. See the individual device manuals for information. |

Overlap and Serial Mode Operation

When power is turned on or during SCRATCHA the calculator is initialized to the serial mode. When the calculator executes a program in serial mode the execution of a program statement is not begun until the previous statement has been completely executed, including any I/O operations associated with it.

The calculator is put into overlap mode by executing the OVERLAP statement. While in overlap mode the calculator will try to execute the program and resulting I/O processes concurrently, such that overall program execution is accomplished in a smaller period of time than if these operations were executed serially. This concurrency includes the LPU and PPU executing concurrently; it also includes the resulting I/O processes executing concurrently with each other.

When a program is executing in overlap mode the LPU simply initiates the I/O process. Then, if possible, it will execute the next program statement before the I/O process has completed.

Overlapping of program execution and output operation is enhanced by buffering. When the LPU executes an output statement, such as a PRINT statement, it will attempt to move all output data from the value area to a temporary buffer, which is dynamically allocated by a memory manager. If the data can be buffered, the LPU considers the output operation complete and continues program execution. The responsibility of the actual formatting and transferring of the data to the device is left with the PPU.

The LPU must wait for certain I/O processes to complete before executing the next program statement. For example, the GET statement must be executed serially, since the GET statement might specify and store the next program statement to be executed.

There are other situations, dependent upon the particular program, in which the LPU must suspend program execution until an I/O operation has completed. This situation might arise during the execution of an output operation; for example, during a PRINT statement. If the PRINT output list contained a string or array variable whose value could not be copied into a temporary buffer (due to unavailability of memory) then the variable would be marked in the value area as being "output busy". Any subsequent program execution which attempted to change or use this variable would result in suspension of program execution. When the PPU is eventually able to execute the PRINT process it will copy the value of the variable into a device buffer and then remove the "output busy" condition from the variable so that the LPU can resume program execution. A similar situation can occur with an input operation such as a READ# statement. When the LPU initiates the execution of a statement it will mark any variables in the READ# variable list as "input busy". The PPU will remove the "busy" condition on each variable as it inputs the variable from a mass storage device and stores it in the value area.

I/O processes can execute in the PPU concurrently due to the relative slowness of the actual I/O device transfers. The PPU will initiate a device transfer, and then while the transfer is in progress via interrupt or DMA control, be able to execute I/O processes associated with other devices.

Overlapped operation can theoretically result in an increase in program execution speed of a factor of up to nearly n+1, where n is the number of I/O devices which are concurrently active. This ideal maximum speed will occur when all overlapped operations are of equal time duration, and the program is structured such that these operations are executed concurrently. FIG. 22 shows such an ideal situation as 2n sequential serial mode operations, each of indicated duration. The total program execution speed is $nx+n.(x/n)=(n+1)x$ seconds.

FIG. 23 shows this same hypothetical ideal program running in overlap mode. The program is structured such that n+1 operations are executing simultaneously. The program execution time in this case is x seconds. This is an increase in speed by a factor of $$\frac{(n+1)x}{x} = n + 1 \text{ times.}$$

This ideal situation can never be reached due to the following physical limitations.

1. The PPU cannot begin an I/O transfer until the LPU has done a certain amount of execution.
2. There is a certain amount of LPU and PPU execution time which is needed to control overlap mode. This time must be added to the total program execution time.
3. It is impossible to structure a program such that the overlapped operations are of equal length in time and such that they all begin and end simultaneously.

In spite of the inability to achieve perfect overlapping, significant increases in program execution speed can be achieved by invoking the overlapped mode.

Setting the Serial Mode

When the calculator is initialized by either turning the power on or by use of the SCRATCHA command, it is put in the serial mode. When a program is executed, it will then execute statements in the serial mode. A keyboard command or a program statement can also be used to put the calculator into the serial mode.

The syntax is:

```
SERIAL
```

Certain operating conditions force the serial mode. See the next section.

Setting the Overlap Mode

The calculator is put into the overlap mode by use of a keyboard command or a program statement.

The syntax is:

```
OVERLAP
```

Certain operating conditions cause reversion to the serial mode. These are:

1. PRINT# and READ# are executed serially if there is an ON END # pending for the specified file.
2. Keyboard commands are always executed in the overlapped mode, except as noted above.
3. When one of the various TRACE statements is executed the calculator goes into the serial mode and remembers the previous mode. When a NORMAL statement is executed the previous mode is restored. During the time that the machine is in the serial mode due to a trace statement, the mode cannot be switched by the OVERLAP statement.

ENABLE Statement

The syntax of the ENABLE statement is simply:

```
ENABLE
```

This statement permits processing of pseudo-interrupts generated by ON KEY#. An implied ENABLE statement is executed at Power-Up, Reset, SCRATCHA, SCRATCH, SCRATCHP, SCRATCHV, and RUN.

DISABLE Statement

The syntax of the DISABLE statement is simply:

```
DISABLE
```

This statement inhibits processing of pseudo-interrupts until an ENABLE statement is executed. Interrupting conditions are recorded, but not processed.

The RANDOMIZE Statement

The RANDOMIZE statement provides the means of setting the seed of the internal random number generator associated with the RND function.

The syntax is:

```
RANDOMIZE [<num exp>]
```

If the optional parameter is omitted, one of 116 different starting positions of the random number generator is automatically selected by the operating system. If the parameter is present the seed is set to the value of the <num exp>.

Example:

```
100 RANDOMIZE
120 ON INT(3*RND) + 1 GOTO, 200,300,400
```

BEEP Statement

The BEEP statement outputs an audible tone lasting approximately 120 msec.

The syntax is:

```
BEEP
```

The circuit that generates the BEEP-tone is re-triggerable. This means that of two consecutive BEEP statement, the second will absorb 99% of the first. To generate long BEEP's, one must resort to BEEP statements embedded in loops, or BEEP's interspersed with WAIT statements.

SECURE Statement

The SECURE statement prevents selected program lines from being listed; an asterisk appears after the line number replacing the line in the listing.

The syntax is:

SECURE [<line i.d.>[,<line i.d.>]]

If no line identifiers are specified, the entire program is secured.

If one line identifier is specified, that particular line is secured.

If two line identifiers are specified, the program segment, including the two lines, is secured.

SECURE'd programs can be STORE'd and LOAD'ed but not SAVE'd. SECURE'd programs can be TRACE'd, but aside from the line numbers, information about any SECURE'd lines is suppressed.

ON ERROR Statement

A means for testing for the occurrences of recoverable errors, and programming (by the user, in BASIC) of desired recovery procedures is implemented. This is accomplished by means of a declarative statement which establishes the line number of a routine to be executed if any error occurs. The transfer is made after execution of the line in which the error occurs is complete or terminated.

The syntax of this statement is:

ON ERROR GO TO <line i.d.>

ON ERROR GOSUB <line i.d.>

ON ERROR CALL <subprogram name>

The semantics of this statement are:

1. When a run-time error occurs, execution transfers to the specified location in the manner of GOTO, GOSUB, or CALL. A CALL may not pass parameters, however.
2. The normal error message is generated, but the display routine is not entered.
3. The function ERRN is available to return the error number of the most recent error; ERRL returns the line number at which this error occurred; ERRM$ returns the most recent error message.

In the routine at the specified location, the user may test either or both of the functions and execute any error recovery procedure he desires. Or, he may execute a "DISP ERRM$" statement which will cause the machine to display the error message. Or, he may ignore the error by executing a return (if GOSUB or CALL was specified in the ON ERROR command), which will cause a return to the next statement after the one where the error occurred.

The ON ERROR Statement is a declarative, establishing what should happen if any error occurs. It need be executed only once to set up the condition before errors occur. A new (different) ON ERROR condition can be established at any time by executing another ON ERROR statement, which cancels the previous one. The effect of this cancellation is that only one ON ERROR statement (condition) is effective at any one time. If no ON ERROR statement is executed in a program, the regular error process will occur, generating an error message, and causing the machine to halt. Any ON ERROR conditions retained in the machine are cancelled when CONTROL-STOP, SCRATCHA, SCRATCH, SCRATCHP, SCRATCHV, or RUN program is executed.

It is possible to program into an endless loop if the recovery routine is not properly implemented. However, this is avoidable with proper programming, and can be stopped if it occurs by depressing the PAUSE or STOP key.

If the ON ERROR statement contains a GOSUB or CALL, then when an error occurs, the pseudo interrupt system priority is set to the highest possible level and remains at that level until a RETURN is executed. Any ON KEY# pseudo interrupt is merely logged and not performed. ON END# operation remains unaffected however. If a GOTO is used, the priority will be unchanged.

OFF ERROR Statement

The OFF ERROR statement cancels any previously established ON ERROR condition. When OFF ERROR is executed in a program the calculator returns to the regular error process; generating an error message and causing the machine to halt if an error encountered. If an OFF ERROR statement is executed, and no ON ERROR statement has been executed, the OFF ERROR statement has no effect.

DEFAULT ON and DEFAULT OFF Statements

Certain arithmetic errors are considered as either fatal or non-fatal, depending upon the state of a flag which is accessible to the user. This flag is controlled by the DEFAULT ON and DEFAULT OFF statements.

If a DEFAULT ON statement is executed, the following arithmetic errors do not result in an error message and halt. Instead, the default value shown is used in the expression, and processing continues with no error indication. If the DEFAULT OFF statement is executed, these errors are fatal; an error message is output, and processing halts. An implied DEFAULT OFF is done at power-on. (RUN does not change the status of DEFAULT ON or DEFAULT OFF.)

| Error | Default Value |
|---|---|
| SHORT Overflow | + or −9.99999E63 |
| INTEGER Overflow | 32767 or −32768 |
| Full Precision Final Overflow | + or −9.99999999999E599 |
| Full Prec. Intermediate Overflow | + or −9.99999999999E511 |
| TAN(N*PI/2),N Odd | 9.99999999999E511 |
| LGT or LOG of Zero | −9.99999999999E511 |
| Zero to Negative Power | 9.99999999999E511 |
| Division by Zero | + or −9.99999999999E511 |
| X MOD Y (Y = 0) | φ |

Philosophy of User Run-Time Aids

The user is provided with extensive diagnostics and messages in the entry of programs so far as the syntax of individual statements is concerned. But in most instances, the really time-consuming part of programming a specific task does not reside in those activities. The testing and validation of the program (i.e., determining that it does what it is supposed to do, and then correcting and re-testing) consumes far more time than the syntax and typographical error problems. The logic of programs is most often the source of programming errors; not the incorrect entry of specific program statements. Run-time de-bug aids are intended to provide real help in this area.

The philosophy which is followed in the aids implemented is:

1. Provide flexible and meaningful ways to follow the logic-flow of the program; i.e., the order in which statements are executed.
2. Provide flexible means for validating computed results at all stages of program execution.
3. Do not require alterations to, or editing of, the program in a way which will require the use of more read/write memory than normal program execution (without tracing) would require.
4. Provide the means for obtaining only needed information; that is, do not inundate the user with information, most of which may not be needed. This allows him to concentrate on the area he desires, and not have to sift important information from trivia.
5. Make tracing commands simple and straightforward, not requiring extensive conditional specification to extract important information. Frequently, the logic errors of the program are such that the user does not know enough about what is going wrong to be able to specify correct elaborate conditional tracing. This is particularly true when the logic of program execution is controlled by computational values. (which is most often the case!) so that logic and computation are inseparably combined, and errors in either may yield entirely unanticipated actions.

The various TRACE commands are also statements, and may be programmed. Their use as commands, given from the keyboard (not in the program) will not increase the requirements for read/write memory for the program, or if included in the program, will not increase read/write memory requirements when they are executed.

TRACE Command

The TRACE command, with certain arguments, or no arguments, will cause program logic flow to be traced by printing information on the system printer.

The syntax is:

```
TRACE

TRACE<line i.d.>

TRACE<line i.d.<line i.d.>
```

When executed, the first TRACE command shown above causes the printout of all non-sequential line number changes. Thus, for example IF-THEN, GOTO, GOSUB, CALL, and RETURN statements can cause tracing printout; and the IF-THEN only when the test is true, and the THEN transfer is executed. The majority of statements in the program will cause no output.

The printout (or CRT display output) will be:

```
TRACE FROM <line#> TO <line#>
```

Thus, the only printout which will occur will indicate alterations in the line-by-line flow of execution. This delivers the essential information,reduces the amount of printout (saving both time and paper) and does not obscure the essential information with trivia.

The actual tracing process is controlled by several internal flags. The first flag indicates whether the conditions (line number range) for tracing to actually occur have been satisfied. The second flag indicates that a trace command with line number parameters has been executed, and line number conditions for actual tracing to occur should be checked.

When the first form of the command (or it may be programmed statement) is executed, the first flat is set, and the second flag is cleared. This indicates that actual tracing is to occur, and that there is no need to check line numbers to turn tracing on and off. After the execution of each line of the program, these flags are checked. With the flags set as specified, there will occur tracing printout on non-sequential transfers, but there will not occur checking of line numbers to turn tracing on or off.

In the second and third forms of the command, the first flag will be cleared, and the second flag will be set. After execution of each line of the program, this flag condition causes no tracing, but line numbers will be checked to see if the first flag should be changed.

When the current line number agrees with the first <line i.d.> parameter, the first flag will be set to initiate actual tracing. When the current line agrees with the second <line i.d.> parameter (if one is given), the first flag will be turned off, to cause tracing to cease.

With the flag mechanism outlined, logic tracing can be suspended at any time by giving the command in the second form, with a <line i.d.> parameter that is a line which does not appear in the program being executed. However, execution of the program will be somewhat slowed, because checking will occur at the end of each line to see if tracing should be initiated.

Tracing can be totally suspended by execution of a NORMAl command (or programmed statement), which will clear both flags, and suspend the end-of-line check.

The TRACE command forces the calculator into the SERIAL mode.

NORMAL Command

A command or programmed statement to suspend all tracing (both logic and computational which is yet to be described is defined.

The syntax is:

```
NORMAL
```

No parameters are required or allowed.

When executed, this command (or statement) will cause all tracing of any sort to be suspended, and will cause a master trace flag to be cleared, which will suspend all end-of-line checks. There is a significant reduction in execution speed when this master flag is set, since it causes numerous extra operations after the execution of every line. Regardless of whether that line causes any special action or not, it is still necessary to check after every line to see if any tracing actions should occur. Obviously, programs should be executed in the NORMAL mode whenever possible.

Effectively, a NORMAL command is also executed whenever SCRATCH or SCRATCHA are executed; these commands not only clear the program but also all special execution conditions associated with that program, of which tracing is a part.

TRACE WAIT Statement

The Trace wait statement may also be programmed. The syntax is

```
TRACE WAIT <non exp>
```

where <num exp> when evaluated, specifies a delay period in milliseconds (similar to the WAIT statement).

The TRACE WAIT statement, when executed, will cause a delay of the specified time after each tracing printout (either logic or variable trace). it will not affect regular programmed printing. There will be a delay only when TRACE printing occurs; otherwise, execution will proceed at normal speeds. The purpose is to provide the user the opportunity (if he desires) to follow program listings as the execution is traced, and to stop at any desired trace line.

TRACE PAUSE

The following statement may be used as a tracing aid, also:

```
TRACE PAUSE <line i.d.,>[,<num exp>]
```

When only the first argument is given, program execution will be halted when the specified line number is encountered; the specified line will not be executed. When <num> is specified, it is evaluated and rounded. This number is interpreted as a count, and the stop will occur just before the specified line is executed the N-th time, as specified by the count.

TRACE PAUSE produces an orderly suspension of the calculator's activity, which may afterwards be resumed with CONT.

TRACE VARIABLES

TRACE followed by arguments which are variable names (rather than the numerics which are line numbers as in logic tracing) will cause the value of those variables to be printed out as a trace each time the value is changed for any reason.

The syntax is:

```
TRACE VARIABLES <variable list>
```

where <variable list> is a list of simple (non-subscripted) variable names, either numeric or string, or an <array name> (either numeric or string) followed by the dimension specifier, (*). The list may contain from 1 to 5 items, separated by commas.

When executed (either as a keyboard command or as a programmed statement), the system will print the value of any specified variable any time that its value is changed. That will occur when:

A. It appears on the left of the = sign in any arithmetic assignment statement.

B. When it appears as an item in the list of an INPUT, READ, EDIT, LINPUT or READπ statement.

Each printout will consist of the line number of the statement where the change in the variable occurred, the name of the variable followed by an equal sign, and the new value of the variable. In the case of an array item, the value of the subscripts at the time will also be printed following the value.

For example:

```
TRACE VARIABLES A(*)
```

would causes (typically) the printout:

```
TRACE IN LINE 100 A(3,5) = 12.345
```

when A(I,J,) (For I=3, J=5) appears on the left in line 100.

Each time this command or statement is executed, it cancels previous declarations; i.e., only the last one in effect. The command is cancelled by SCRATCH, SCRATCHA, or by the execution of the NORMAl command.

TRACE ALL VARIABLES

A second form of variable-tracing is also available. The syntax is:

```
TRACE ALL VARIABLES
```

or

```
TRACE ALL VARIABLES <line i.d.,>,<line
  i.d.,>
```

When the first form of this command is executed it causes all variables to be traced.

When the second form (with <line i.d.> parameters) is executed, it causes tracing of all variables to begin when the first line number is executed, and to cease when the second line number specified is executed.

This function, similar to the logic-flow tracing, is controlled by two flags (not the same as logic flags). The first flag is set and the second is reset when the first version of the command (or statement) is executed. When the flags are in this state, tracing of variables is forced after the execution of each line of the program.

When the second form of the command is executed, the first flag is reset and the second flag is set. With this flag condition, after the execution of each line, a check is made on the line number so see if there is agreement with either <line i.d.> parameter. If agreement occurs with the first <line i.d.> parameter, the first flat is set, which will initiate actual variable tracing printout. If agreement is with the second line parameter, the first flag is reset, suspending variable tracing. However, any time that the second flag is set, checking must occur at the end of every line to see if the line being executed should cause a change in tracing. This can cause a material change in execution speed.

Because of the role of these flags, this command can be "turned off" by executing the second form of the command with a first line number parameter (begin tracing) which is a line which will never be executed by the program. However, end-of-line checking will continue for line numbers.

The TRACE ALL VARIABLES command can be completely cancelled by execution of a NORMAL command, and is also cancelled by SCRATCH or SCRATCHA.

Printout from the TRACE ALL VARIABLES command is controlled by the TRACE WAIT command in the same way as logic-flow tracing. That is, after each statement that causes a trace printout (not programmed printing), a WAIT is executed to allow time for user intervention.

Comprehensive Tracing

One final version of the TRACE command is implemented.

The syntax is:

```
TRACE ALL
```

When executed, this command or statement wll have the same effect as executing both TRACE (trace all program logic) and TRACE ALL VARIABLES (trace all computations).

TRACE ALL is cancelled by SCRATCH, SCRATCHA, or by execution of NORMAL.

The volume of trace printout is generally high, but this command provides a good "final alternative" for the programmer who has not been able to isolate his problem with selective tracing.

USE OF THE INTERNAL PRINTER

General Description

The calculator's internal printer 10 is a thermal printer/plotter using rolled thermal printer paper stored internally in a bucket. Printing and plotting are done under the control of a small processor within the printer. The paper is advanced by a bi-directional friction drive. During certain printing operations the paper is temporarily advanced in the reverse direction. This will automatically be done by the printer to accomplish printing of characters having certain features specified by the user. However, the user has no direct means to cause the printer to back up one or more lines after a line of text has been printed. While re-registration on a properly adjusted printer is quite good, no means have been provided to rewind the printer paper on the roll and thereby avoid a paper jam.

The printer can receive data from either of two sources: the calculator's read/write memory; or, the optional read/write memory installed for the graphics option in the CRT. In non-graphics mode operation, data is sent to the printer from a PPU managed device buffer in block 1 (reference numeral 38 in FIG. 43) in response to activity originating either at the keyboard or in a program. Such activity can be either printing of alpha characters or plotting. (Not all plotting is graphics mode operation; plotting can also be done in the non-graphics mode. The graphics mode is a particular way to plot.) But for a graphics dot-for-dot dump, the PPU reads the data (dot pattern) from the local memory in the CRT, (reference numeral 70 in FIG. 43) and sends it to the printer. In either case the printer behaves simply as a peripheral with select code 0, there is no direct hardware connection between the printer and the CRT. These two modes of operation are called the alphanumeric mode and the graphics mode.

Alphanumeric Printing Performance

In the alphanumeric mode the printer prints up to 80 characters per line. The rate is 3 to 8 lines per second, depending upon the number of characters to be printed. Referring to FIG. 24, the character font is formed from a $5\times7$ dot matrix of 0.027 cm (0.0106") squre dots on 0.033 cm (0.013") centers. The $5\times7$ dot matrix font is contained within a field 7 dots wide and 11 or 12 dots high. (This variable characteristic of printer operation is effected by a parameter called "number of rows per line". Its effect is explained elsewhere.) The upper row is intended for special marks, such as umlauts. The second row is normally blank. The next 7 rows make up the basic $5\times7$ field within which most characters are contained. The upper two of the three lowest rows are intended for portions of lower case letters that descend below the apparent base line. The lowest row is intended for underlining. There is normally one blank column on each side of the basic $5\times7$ matrix.

A line of a alphanumeric information printed by the thermal printer normally consists of $5\times7$ dot characters positioned within adjacent $7\times12$ dot fields. Similarly, two consecutive lines of text consists of two rows of $7>12$ dot fields. It is best to thick of these fields, (which are in some way sprinkled with dots), as the fundamental units of printer activity. It is a good deal more difficult to simply consider the characters in isolation.

The character set contains 128 standard ASCII characters, including the upper and lower case English alphabet, standard math symbols, and punctuation marks. (FIGS. 25 through 29 show the various character sets.) Each machine can have a ROM-implemented alternate character set consisting of 96 additional printing characters. The content of the alternate set depends upon the keyboard configuration of the calculator in which the printer is installed. Printers installed in calculators with foreign keyboards will include an alternate character set corresponding to the foreign characters on the keyboard.

There are two ways to access the alternate characters. One way is with the SHIFT OUT mechanism (described further, below). With that method the alternate characters may be accessed using standard 7-bit ASCII codes, (octal 040–177). A second method is to consider the 96 alternate characters as part of the "upper half" of an expanded-to-256 character set. This approach employs 8-bit codes whose most-significant bit is set, (octal 200–377). However, only the upper 96 of the upper 128 can be alternate characters; the bottom 32 are (by general industry agreement) allocated to control codes (as opposed to printable characters). The printer has a fixed pair of responses to any of these "upper-half control codes"; they are used as an additional means to cause underlining.

In addition to the main and alternate character sets, the user can also create a limited number of new characters by defining the requied dot pattern, using unique methods described below. A full $7\times8$ matrix is available for each new character. Certain symmetric characters can be made 12 dots high. Also, any character in the main character set, and any character in the alternate character set, can be replaced by a string of other characters. The string of replacement characters may include newly defined characters. A local memory-space within the printer is shared for new character bit-patterns and string replacements; a total of 77 bytes is available. Each new character bit pattern requies eight bytes; string replacements require two bytes plus one for each character in the string. Any combination of new characters and replacement is possible as long as the memory requirement does not exceed 77 bytes; i.e., a maximum string length of 75 characters, or a maximum of nine characters having redefined dot matrices, or numerous combinations involving each operation.

Two forms of characters highlighting are implemented, underlining and oversize characters. The oversize characters are of standard width but are 50% higher than normal (0.30 cm instead of 0.20 cm for standard capital characters).

Plotting Performance

The printer plots in two modes: alphanumeric and graphics. To perform a graphics CRT dump the calculator must be equipped with the graphics option. The matrix available for CRT dump plotting is $560\times455$ dots on 0.033 cm (0.013") centers which gives a $18.5\times15$ cm ($7.28''\times5.91''$) plot field. The plot is a dot-for-dot copy of the CRT image, slightly smaller in size. Plotting speed range from 0.38 cm/sec to 2.5 cm/sec, depending upon the number of resistor burns required.

Thermal Paper

The printer uses thermal paper in a roll configuration stored in an internal bucket. The roll diameter is 3.5' (approx. 200 feet of standard caliper thermal paper). Two widths are standard, 8.5 inches and 21 cm. The 21 cm paper requires a special spacer to left justify the roll in the paper bucket. The width of the print field is 18.48 cm (7.28") with a 1.90 cm (0.75"0 left margin. The right margin is 1.19 cm (0.47") for the 8.5"wide paper and 162 cm (0.24") for the 21 cm width. Perforated paper is available. The 8.5" paper is perforated at 11" intervals, and the 21 cm paper at 29.70 cm intervals.

The printer incorporates three user convenience features to arrange the print field on the paper. The location of the perforation in perforated paper is determined by sensing a small hole in the paper. A top margin command allows the user to begin printing at a specified distance below the perforation. The line spacing is also user controllable. The bottom margin is fixed at 0.79 to 1.19 cm (0.31 to 0.47 in). A horizontal tab command allows convenient columnar data arrangements.

Manual Controls

Two momentary contact switches are used to control paper movement through the printer. One switch turns on the paper feed motor and feeds one line at a time until released. This is used to load or advance paper. The other switch initiates a sequence which automatically advances the paper past perforations to the top-of-the-page print position. If no sense hole is detected, the paper will advance 30.49 cm (12.0").

Paper loading is automatic. The removable gravity-close printer door is opened to insert the paper roll. Loading is accomplished by pushing the paper feed button for several seconds until paper appears at the tear-off window. Paper advance speed is 9.2 cm/sec. The printer automatically advances an extra 1.5" to make sure the paper has been loaded under the print resistors.

The printer is automatically disabled when approximately 1.5" of paper remain in the machine. Only the paper advance switch will operate when an out-of-paper condition is sensed.

Print-head and Speed

The print-head represents a significant advance in thermal printer technology. The print-head itself is a 7.5 inch long single substrate containing all 560 print-head resistors. They are made with the thin-film technology, which promises higher yield and greater uniformity of printed dots.

Seven other substrates are mechanically connected to the print-head. Each of the seven contains four chips; each chip contains a 20-bit shift register with latches and print resistor drivers. The substrates are connected in series to make a 560 bit shift register that drives the print-head. Over 1000 mechanical connections are involved in the print-head assembly. However, when it's all assembled, the printer control electronics drives the print-head with just 14 wires.

Because of power limitations, a maximum of 62 dots on a row can be burned at one time. It really doesn't matter which 62 they are. As previous dots in the row are being burned, the control electronics shifts the next segment of the dot pattern for the row into the shift register. The dots needed are counted, and the shifting-in stops at 62 dots. Then those dots are shifted into position, latched, and then burned. That takes some number of milliseconds according to the following correspondence: no dots, no burn; 1–15 dots, 6 msec; 16–31 dots, 7 msec; 32–47 dots, 7.5 msec; 48 or more dots, 8 msec. This variation compensates for the IR drop in the conductors in series with the current passing through the print resistors. If the row is not yet complete, as the old dots are burned the next group of dots are shifted in (up to 62 of them) and positioned. They they are latched and burned. This process continues at full speed until all the dots of the row have been burned. This can take as many as 10 burn-times. Print resistor cool-off from the last burn occurs during the delay of two to three milliseconds required for the paper to begin moving after the stimulus to advance the paper is given. That stimulus is given immediately at the end of the last burn-time for the row. For standard size characters, the stepping motor is advanced two steps. That requires 7.5 msec. Because of thermal inertia in the print-head, the next burn-time can begin one millisecond before the end of 7.5 msec step-time. This results in an overall end-of-row to start-of-row time of 6.5 msec for standard height characters.

It is obvious from this discussion that the number of lines of complete characters per second that the printer can produce depends upon the specific text to be printed. The range is 3 to 8 lines of characters per second.

The above description employs the technique of overlapping of burn-times and step-times to achieve faster yet quiet printing.

When printing or plotting with a thermal printer/-plotter on heat sensitive paper it is necessary to turn on heating elements (resistors) to develop or "burn" the paper to form a mark (dot). A series of these dots in a two dimensional matrix forms a symbol (character). Each horizontal row is burned separately with the paper moved to the next row, with a stepper motor, between burn sequences. This is normally done as shown in FIG. 37A. Stepping between rows needs to be done as fast as possible to get high printing speeds. The overlapped technique to be described is a way to get equivalent shorter stepping times to allow higher printing speeds.

In the past, the stepping time between rows of dots has been decreased by driving the stepper motor very hard (i.e., high current) or by using a large high torque motor. This has the disadvantage of producing high accelerations in the paper drive system which produces high audible noise. Also it requires high power current drivers for the stepper motor.

It was observed that the resistor elements in the print-head actually take one to two msec to heat up to the developing temperature. It was also observed that the current in the stepper motor actually takes on the order of one msec to get up to the operating value, and also that due to the compliance and inertia in the mechanical system the paper does not start moving for several msec after the motor has been instructed to move.

The technique is to overlap the burn and step signals as shown in FIG. 37B, which gives an equivalent shorter step time. The concept of overlapping could also be applied to devices using motors other than stepper motors.

An extension of the technique is shown in FIG. 37C. The extended technique is to take advantage of the fact that it may take longer to get the paper moving than it does for the print resistor to fall below the temperature required to develop the paper. In such a case it is possible to overlap the start of the paper motion with the end of the burn, resulting in an additional savings in time.

This technique allows higher speed printing or plotting with thermal printers and plotters without requiring higher accelerations and therefore, without increased audible noise in the paper drive mechanism.

Controlling the Printer

The printer is a byte-oriented device. The hardware interface for the printer to the internal I/0 data bus 68 of -continued

| Pressing CONTROL with these keys: | Produces these Control Codes: | | |
|---|---|---|---|
| J | LINE FEED | $12_8$ | $L_F$ |
| L | FORM FEED | $14_8$ | $F_F$ |
| M | CARRIAGE RETURN | $15_8$ | $C_R$ |
| N | SHIFT OUT | $16_8$ | $S_O$ |
| O | SHIFT IN | $17_8$ | $S_I$ |
| [ | ESCAPE | $33_8$ | $E_C$ |

The comparative results of sending certain of these control codes to the printer, and to the various portions of the display, are shown below.

| CONTROL CODE | ACTION: CRT 57 AND 58 | ACTION: CRT PRINT AREA 56 | ACTION: INTERNAL PRINTER 10 |
|---|---|---|---|
| Bell | Beep | Beep | Nothing |
| BS | Back up and replace | Back up and replace | Back up and replace |
| LF | Nothing | Generate line feed only | Generate line feed only |
| FF | Clear display line | Clear print area | Search for top-of-form |
| CR | Clear display line | Replace current line | Print; roll back 1 line |
| SO | Alternate char. set | Alternate char. set | Alternate char. set |
| SI | Standard char. set | Standard char. set | Standard char. set |

FIG. 43 is for 16-bit words; the printer receives its bytes as the least significant halves of consecutive words sent to select code 0.

By the above method, the printer is sent a sequence of consecutive bytes. In the alphanumeric mode, the majority of these are implemented as printable ASCII characters to be printed whenever one of the following occurs:

1. The character "line-feed" is received.
2. The character combination "carriage-return" followed consecutively by a character other than "line-feed".
3. An eighty-first printable character is received. The first eighty characters are printed as a line and the eighty-first becomes the first character of a new line, which is then terminated by any of these four means.
4. A horizontal tab is received and no tab is set to the right of the current print position.

A subset of the ASCII character set are the so called "control codes". These are the first $37_8$ ASII values, and represent actions to be performed rather than individual characters to printed.

Strings of characters containing control codes can be obtained either by pressing and holding CONTROL (which suppresses all but the lower 5 bits of the ASCII code) and then pressing various particular keys on the keyboard, or, by use of the CHR$ function. In some instances the calculator's controlling firmware generates some control codes and appends them to the sequence of characters sent to the printer. For example, a simple PRINT statement automatically generates the accompanying carriage-return line-feed. In other circumstances, however, the user must sometimes undertake to supply the control codes himself.

The control codes responded to by the printer, and the keyboard keys that accompany CONTROL, are shown below:

| Pressing CONTROL with these keys: | Produces these Control Codes: | | |
|---|---|---|---|
| H | BACKSPACE | $10_8$ | $B_S$ |
| I | HORIZONTAL TAB | $11_8$ | $H_T$ |

The printer responds to backspace underline combinations in a particular way. When a backspace is received the internal pointer in the printer (specifying where the next character is to be printed) is moved leftward one space. The character occupying that space is left unchanged. This is repeated for as many additional backspaces as may be received. If a carriage-return is now received, the left portion of the line is printed, but any characters to the right of the pointer remain unprinted.

If, after the pointer is moved left with backspace, (but before the line is printed), additional characters are set to the printer, they will be accepted as part of the line, with each character moving the pointer right one space, in the normal fashion. However, for such character, the new character will replace the previous character at that position, unless the new character is an underline, in which case the previous character is retained and underlined.

(The above replace/underline rule is actually true for all printer operations; not merely for characters following backspaces. At the start of each new line, the printer initializes its internal buffer to all blanks and sets the pointer to the far left. It then uses the above rule in accepting characters.)

There are three general ways to control the printer. The first way has already been mentioned. It consists of sending the printer (select code 0) consecutive bytes of printable characters. Printing of the sequence is then caused by any of the previously mentioned termination mechanisms. (Termination by sending control codes is part of the second way to control the printer.) This first method of controlling the printer applies to the alphanumeric mode of operation.

The second way to control the printer is by sending it control codes. The printer's responses to these codes are many and varied. Most of the control codes, such as backspace, carriage-return, and line-feed, cause a simple immediate action. There are, however, two control codes that cause extended action.

A. Shift-Out causes the standard ASCII character set to be replaced by a ROM-controlled optional character set. This replacement remains in effect until either the printer is reset (by means described below), or until a Shift-In is received. A reset or Shift-In restores the standard ASCII character set. The thirty-two control codes are not affected by a Shift-Out. Shift-Out and Shift-In affect only alphanumeric printing.

B. Escape sequences are used to give the printer its more versatile features. These include the ability to specify the number of rows per line, institute character highlighting, define new printer characters, and define replacement strings of characters for individual characters. An escape sequence is the control code ESCAPE ($33_8$) followed by other characters that identify the particular escape sequence being invoked, and by possibly still other characters that provide particular data about how to implement that particular escape sequence. Escape sequences are always understood as belonging to the primary character set; that is, no escape sequence can be differentiated from another escape sequence on the basis of the same ASCII codes concurrent with differing Shift-In/Out conditions.

Some of the escape sequences affect alphanumeric printing. One escape sequence allows plotting, whether used in either the graphics or alphanumeric mode. The properties of the various sequences constitute the bulk of the remaining information about the use of the printer.

The third way to control the printer is with "special control bytes". These are bytes that would otherwise be control codes (octal 0–37) except whose most-significant bit is set. Normal ASCII characters are only 7-bit codes that are right-justified in the 8-bit byte.

The special control byte mechanism is limited to controlling underlining. The CHR$ function can be used to generate a byte of the following form:

100XX1XX (X = either 1 or 0)

Special control bytes are limited to use with a alphanumeric printing.

There follows now a description of the various escape sequences implemented by the printer.

Set Vertical Spacing

This escape sequence allows the specification of the number of 1/77th inch rows from base line to base line for consecutive lines of printing. The sequence is:

$E_c$&ldddS

"Escape Ampersand lower-case el octal digits upper-case Es"

The d's represent one to three octal digits that specify the number of rows; ddd may range from one through 126, inclusive. The default value of this parameter assumed at reset or turn-on is 12 (decimal).

Varying the value of the vertical spacing can have a pronounced effect upon the appearance and readability of the printed output. If the number of rows per line is 11 (decimal) or less, the normally blank ascender row 72 in FIG. 24 is deleted; otherwise it is present. Other than that, no other changes in character shape result from changes in the number of rows per line. (BIG (150% high) characters have their underlining moved up slightly to line up with underlining for standard height characters, but that always happens and is unaffected by the number of rows per line.) That is, except for the presence or absence of the blank ascender row 72, the basic shape of the character is neither stretched nor compressed to conform to the number of rows per line. The basic purpose of this parameter is to provide additional space between lines for readability, especially when BIG characters are printed.

The value of the number of rows per line parameter is taken into account at the beginning of printing a line; it is not the case that the line is printed and then some extra number of row-advances occur. The number of rows per line specifies how many rows down from the baseline of the previous line of printing that the new baseline lies. This means, for instance, that if the number of rows per line is high, that the printer will advance down many rows before beginning to print.

Varying the number of rows per line can give rise to some interesting complications. Since the character's shape is fixed (except as mentioned above) the normal height of a BIG character will occupy a predictable number of rows (and therefore steps of the motor) within the line. (Each row equals two steps for standard height; three for BIG ones.) For purposes of this type of comparison, the "rows" in "number of rows per line" is two steps. If the character height (in steps) is greater than the height of the line (in steps) the printer will first have to back the paper up before beginning to print the line. This can cause the new characters to overlap previously printed ones.

The above description embodies a technique that allows the printer to overstrike a previously printed character; i.e., to actually reprint over a previously printed character with a second burn cycle. Due to the absence of the means to re-roll the paper on the roll this particular application of this technique is limited to overstriking a character in the line currently being printed.

Thermal printers often use stepper motors which can be made to step to the next position quickly and wait there. Steppers motors can be driven forward or backwards by changing only the sequence in which th coils of the motor are activated.

Therefore, to overstrike it is necessary to back the stepper motor up to the original position; however, because of the friction in the system and the compliance in the drive system, the motor must be backed up several extra steps and then forward to the correct position.

An extension of the backward and then forward stepping scheme is to do it at the beginning of the line to allow printing lines with any spacing (that is, any rows-per-line spacing).

To do this it is necessary to calculate the number of rows to step by subtracting the number of rows needed to print the current line from the defined number of rows per line. If the answer is negative then it is necessary to back up that number (plus some extra rows to allow for the compliance in the drive system) and then move forward the extra rows to end up on the desired row. If the answer is positive then it is necessary to step forward that many steps to get to the new starting position.

Overstriking the characters in a line is then easily accomplished by suppressing the line feed in the character stream and giving only a carriage return instead. Then the characters with which the overstriking will be done are sent and printed.

Set Top Margin

When perforated paper is used the top margin is normally set to approximately ½ inch. That value can be altered with the following escape sequence:

$E_c$&ldddT

"Escape Ampersand lower-case el octal digits upper-case Tee"

The d's represent one to three octal digits that specify the number of 1/77th inch rows below the perforation comprising the margin. This margin is created only if perforated paper is in use (the printer detects this via a sense hole in the paper), and if the top margin is not set to zero. A value of zero causes no advances past the perforation. In such a case, the paper advance from the bottom line of the previous page might leave the paper in such a position that the next line is printed on top of the perforation.

The default value of the top margin parameter, at turn-on or after a reset escape sequence, is 36.

When perforated paper is in use and the top margin is not zero, the printer will automatically maintain a bottom margin. Otherwise the concept of a bottom margin is ignored.

Setting Tabs

An escape sequence to set a horizontal tab can be included in a sequence of characters sent to the printer. The tab will be set at the number of printable character positions (to the right of the start of the line) that the escape sequence corresponds to (assuming it were printable). Setting tabs allows the printer to tab, in the usual manner, in response to tabs (CONTROL I's) in the print list of a PRINT statement. If, when a tab occurs, there are no tabs set in the printer, or are no set tabs remaining, a carriage-return line-feed occurs. Tabs may be set at any or all character positions within the character line.

The escape sequence is:

$E_c$1

"Escape one"

Two anomalies are associated with using horizontal tabs in conjunction with string replacement. See the discussion for string replacement.

The TAB(X) function that may appear in the print list of a PRINT statement does not generate a genuine tabulate (CONTROL I) in the output character stream. Instead it produces some number of spaces, based on the difference between the argument of the TAB(X) function and where the main system thinks the current print position is. The TAB(X) function is primarily intended for use with simple-minded printers.

Its risky to commingle TAB(X) with the various control capabilities of the internal thermal printer. The mechanism that keeps track of the current print position for TAB(X) cannot remain well informed if the printer receives CONTROL I's (tabs), or string replacement escape sequences.

Clearing Tabs

No means is provided for clearing individual tabs, but all tabs set may be cleared with the escape sequence:

$E_c$3

"Escape three"

Underlining With Escape Sequences

The printer can be instructed to underline all subsequent text with the escape sequence:

$E_c$&dD

"Escape Ampersand lower-case dee upper-case Dee"

Note that in this escape sequence the lower-case d represents itself as a letter, and does not represent a digit. The upper-case D may alternatively by any of these other upper-case letters: E, F, G, L, M, N, O. The underlining will remain in effect until the printer is further instructed to cease underlining by any of reset, a special control byte, or by an appropriate escape sequence.

All underlining lines up at a given distance below the baseline, regardless of whether standard size or BIG characters are being underlined.

Escape Sequence to Cease Underlining

In addition to the reset escape sequence and the various special control bytes, the following escape sequence will cause the printer to cease underlining:

$E_c$&d@

"Escape Ampersand lower-case dee at"

Note that in this escape sequence the lower-case d represents itself as a letter, and does not represent a digit. The @ may alternatively be replaced by any of these upper-case letters: A, B, C, H, I, J, K.

BIG Characters

BIG (150% high) characters can be selected with the following escape sequence:

$E_c$&k1S

"Escape Ampersand lower-case kay one upper-case Es"

Subsequent characters received by the printer are printed as BIG characters until the escape sequence to terminate BIG characters is received, or reset is received.

Cessation of BIG Characters

The escape sequence to cease printing BIG characters is:

$E_c$&kϕS

"Escape Ampersand lower-case kay zero upper-case Es"

New Character Definition

An escape sequence has been defined to allow any of the 128 ASCII character codes, and any of the 96 alternate character codes, to be replaced by a nearly arbitrary dot pattern. The most inclusive form of this escape sequence is:

$E_c$&ndddcdddpdddqdddrdddsdddtdddudddvdddW

"Escape Ampersand lower-case en digits lower-case see digits lower-case pea digits lower-case queue digits lower-case are digits lower case es digits lower-case tee digits lower-case you digits lower-case vee digits upper-case Double-You"

If an ASCII control code (octal 0–37) or if one of the "upper half control codes" (Octal 200–237) is redefined, its normal action (function) remains unchanged; only under circumstances where the symbol standing for that control code is to be printed (rather than its function performed) does the change appear. That occurs only in the display control codes mode, described later. The other ASCII character codes correspond to normal printable characters. If one of them is redefined, the change is apparent each time that character code is used.

77 bytes of R/W memory are reserved for new character definition and replacement of a character by a string of characters (discussed below). Each definition of a new dot pattern for a new character uses 8 bytes of memory. Thus, a maximum of 9 new characters can be defined at any one time. With 9 characters redefined, a tenth or later redefinition merely replaces the current ninth definition.

An elaborated version of this escape sequence is shown in FIG. 30, along with its application to the dot matrix being defined. Referring now to that Figure, there is shown a means to employ otherwise unused bits in the bytes that defined the row patterns. These bits are the control bits 74. The scheme depicted also allows a byte (the p-byte), which is outside the scope of the basic 5×7 matrix, to be used repeatedly in a plurality of alternate positions, as determined by the control bits. It also allows two other bytes (the q-byte and the r-byte) to each be used singly in either its normal position or in an associated alternate position, according to the control bits.

By means described in FIG. 30 many useful characters can be printed in a 7×12 field, even though they were encoded in a field of only 8×8 bits.

The scheme just described employs two separate techniques: user definable characters within the character set implemented by the printer; and the ability to define a printed character (whether in ROM by a product designer, or in R/W by the ultimate user) in a manner allowing selective printing of more dots in the character than there are bits in the bytes of the corresponding definition.

There now follows a general discussion of the concepts used to implement the user definable character technique. (The specific means of implementation is given elsewhere.)

Getting information out of a computing device is frequently a problem when one is limited to a small set of symbols (characters) to convey the information. This technique allows the user to expand his character set almost to any number of different characters.

In the past the only way to expand a printing or displaying character set was to:

1. For impact devices, to change the printing device; e.g., character chain, character wheel, character ball (IBM typewriter), etc. This required manual intervention.
2. For matrix display or print devices, to change the character ROM which described how to display or print the given character. Again, this required manual intervention and demanded the expense of additional ROM's.

With regard to #2 above, there could be additional character ROM's within the display or printer, coupled with the means for the user to switch between them. Both the printer 10 and CRT 14 employ this method. But a disadvantage is that the device still limits the user to a fixed set. Even if the user bears the cost for larger or additional ROM's, the ROM's still might not contain the desired characters. There could even be additional external ROM's available to the user to enable the display or print device to represent alternate characters. But again the disadvantages are having only a limited fixed set of characters and the cost of the ROM's.

This technique is to have Random Access Read Write Memory (RAM) in the matrix display or print device, along with the control logic necessary to allow the user to "program" any symbolic reprsentation he wants, within the limits of the display/print device. The user sends ASCII character codes (via an escape sequence) to the output device to instruct it how it is to represent the symbol. Of course most of the "standard" characters would still be represented in ROM(s).

The RAM can be partitioned any way which is feasible for the output device. For example, for a line printer which prints an entire line one row at a time, the memory could be partitioned as shown in FIG. 31.

The user then decides which characters he wants to redefine (all ASCII character codes are assigned, so some must be re-defined) and how he wants them displayed/printed. He then sends a series of ASCII codes to the output device to "program" the new character dot patterns. For example, he could use the escape code sequence shown in FIG. 30.

The display or print device scans the data input stream to look for the "character redefine delimiter $E_c$&n" shown in FIG. 30, and then processes the data following it. Once one or more characters have been redefined, the display or print device must thereafter scan each data input stream to see if each character code received is one that has had a new dot matrix defined for it. When a match has been found the display or print device must then get the redefined dot matrix information from the RAM, instead of getting the normal dot matrix information from the ROM. Specifically how the printer 10 implements this scheme is explained in a later section concerning the internal operation of the printer.

The advantage of this technique is that it allows a user to specify the particular characters to be defined and the exact dot matrix pattern for each. He does not have to have additional character ROM's containing many character dot matrices he does not need. This can also be implemented, with no user intervention, by having the computing device sending the data stream automatically send the redefinition strings when needed. Of course, a given character code could be redefined many times in any given instance of generating output.

There now follows a general description of the concepts used within the printer to implement the technique of expanding a character's dot matrix cell beyond its memory storage cell size.

In any kind of matrix printing or displaying device, where the symbols or characters are printed or displayed with a matrix of dots, it is necessary to have some sort of way to describe how the symbols should look. That is, to specify the dot patterns to be used to represent the necessary characters. This is normally done using a ROM which has stored in it the dot patterns for all the necessary characters. A problem that arises is how to utilize the given ROM space efficiently. This technique is a way of coding the ROM to obtain greater benefit from the storage space available.

In the past, special sized ROM's have been made to give just the number of bits of storage necessary to describe the needed dot matrices. That is, for n characters to be described with a 5×7 dot matrix, a (5×7×n)-bit ROM would be used, or for 7×9 dot matrix, a (7×9×n)-bit ROM would be used. This has the inherent disadvantage of "hard-to-generate" addresses for each character's row or column. Also, one could not get extended character representation with descender or ascender dots; that is, dots below or above the regular cell size.

If one wanted to generate character dot matrices with descenders and/or ascenders, he would have to specify a ROM size big enough to include all extensions; for example, a (5×9×n)-bit ROM for a 5×7 matrix with two descenders.

This technique is a way of coding the bits in "standard" size ROM's to represent a character cell size (matrix) larger than the actual cell size in the ROM.

For example, for a 5×7 character matrix with descenders and/or ascenders, one can obtain numerous additional character descriptions by adding one additional row and one additional column to the ROM matrix as shown in FIG. 32.

In the standard ASCII ROMAN character set, it was noted that the only characters which need descenders are the lower-case characters, "gjpqy,;", and also that each should not reach the full character height in the field. Therefore, in this application of the technique, flags $X_2$ and $X_3$ are used to indicate whether their associated data words are to be printed at the position shown (refer to FIGS. 30 and 32), or at the two positions just below the normal character (as descenders). Also, it was observed that the best representation for "j" required the data bits of word 2 to be printed at the normal location of word 2, as well as something else at its associated descender position. Thus a "j" is eight bits high. In a similar manner, the character ";" requires the data bits of word 3 to be printed at its normal location, as well as something else at its associated descender position. However, the flag mechanisms for $X_2$ and $X_3$ merely select exclusively alternate positions for their respective data bits, and are therefore inappropriate here. If word 2 is to be printed at its regular position, then some additional mechanism is required to create the extra word in the associated descender position. A similar situation exists for word 3. Therefore, the required extra pattern is encoded in word 1 (which would otherwise be unused). Then flags $X_6$ and $X_7$ indicate whether word 1 (at address n) is to be printed at descender positions #1, or #2, or neither (refer to FIG. 24).

In a similar manner the meanings of the other flag bits have been assigned for this particular application. Also, an 8-bit wide ROM was used to allow defining the dots on either side of the character. Refer to FIG. 30.

FIG. 33 shows examples of the application of the technique. (It should be noted that in the actual ROM of the printer a Gray code row addressing sequence was used, rather than a binary code. This allowed changing fewer bits when switching between rows. Encoding in RAM does not employ a Gray Code.) In FIG. 33 only the "one" bits are shown; blanks represent zeros. The examples are shown in positive true logic, however, this technique could be implemented in negative true logic as well.

FIGS. 34 and 35 show an additional application of the technique to a 7×9 character matrix, with 3 rows of ascenders and 4 rows of descenders, in a 8×12 ROM space.

The twelve flag bits $x_1$ through $x_{12}$ have the following meaning:

| | |
|---|---|
| $x_1$, $x_2$, $x_3$ | Place bytes 1, 2 or 3 at this location respectively. |
| $x_4$, $x_5$, $x_6$ | Place bytes 4, 5 or 6 at the 1st, 2nd or 3rd row descender position respectively. |
| $x_7$, $x_8$, $x_9$ | Place byte 1 at the 1st, 2nd or 3rd row descender position respectively. |
| $x_{10}$, $x_{11}$, $x_{12}$ | Place bytes 1, 2 or 3 at the 4th, 3rd or 2nd row descender position respectively. |

This is, of course, only one of many different ways to define what the meaning of the flag bits are.

The advantage of this technique is a saving in character ROM space. By using a few of the bits of a ROM as flags to indicate how the data in the ROM is to be interpreted, and one or more words in the ROM as extra data words, one can save considerable space in the ROM.

In the present application of this technique for a 5×7 character matrix, it was possible to define a character cell size of 7×12=84 bits with an 8×8=64 bits ROM space, which is a saving of 24%. In the example shown for a 7×9 character matrix, one could define a character cell size of 7×16=112 bits with an 8×12=96 bits ROM space, which is a savings of about 14%.

Normally, to implement a 5×7 cell size, one would use an 8×16 ROM cell, which is twice the size used here (50% savings). In the 7×9 example one would normally use an 8×16 ROM cell which is 33.3% larger than needed (25% savings).

String Replacement of Individual Characters

An escape sequence has been provided to allow any of the 256 8-bit character codes to correspond to a sequence of characters. The sequence can consist of standard characters, alternate characters, or characters of redefined dot pattern. A plurality of characters can be so replaced, up to the limit imposed by R/W memory available in the printer.

A total of 77 bytes of R/W memory is available for both dot pattern redefinition and string replacement. Each string replacement requires 2 bytes of overhead, plus an additional byte for each character in the string. The maximum string length for replacement (assuming no other replacements or character dot pattern redefinitions) is 75 characters. Additional attempts at replacement are ignored, except for the escape sequences' being printed as they are received.

The string replacement escape sequence is:

$E_c$&odddcdddL<string>

"Escape Ampersand lower-case oh digits lower-case see digits upper-case El and then the string"

The d's represent zero to three octal digits. The digits immediately preceding the lower-case c are the octal character code for the character to be replaced by the string. The digits immediately preceding the upper-case L specify the number of characters in the string, in octal. The <string> is exactly the characters that will replace the identified character.

If a character has both a redefined bit pattern and a replacement string, the string replacement takes precedence over the bit pattern redefinition.

Two anomalies are associated with string replacement and horizontal tab. First, if tab (CONTROL I) is contained in a replacement string and no tabs are set, the printer will keep searching for a tab, feeding paper as it goes. CONTROL STOP must be pressed to abort this.

The second anomaly arises when "tab" is the character immediately following the actual definition of a replacement string by an escape sequence. The tab is ignored.

Plotting With The Printer

Whether for the alphanumeric mode, or for the graphics mode, plotting with the printer is accomplished with the same escape sequence. The difference lies in the source of the data being plotted, and in the amount of work the user experiences in formatting the data for plotting. In the graphics mode, the user is equipped with optional BASIC language statements and special memory features for the CRT, that enable him to easily plot or draw on the CRT, in convenient units. A DUMP GRAPHICS statement (described elsewhere) causes automatic employment of the plotting escape sequence. To plot in the alpha-numeric mode, however, the user himself, typically by means of a program, must undertake to scale and format his data for repeated use with the escape sequence. The DUMP GRAPHICS statement is not an instruction to the printer, per se, and the printer, as a printer, cannot tell the difference between the two methods of plotting.

The escape sequence for plotting is:

$E_c$?<seventy bytes>

"Escape Question Mark next 70 bytes"

The seventy bytes define the 560 dots printed for that row. The paper is automatically advanced one row, regardless of the number of rows per line that is currently in effect.

FIG. 36 illustrates alphanumeric mode plotting of a sine curve.

Display Control Codes Mode

A means is provided to help de-bug programs that invoke the more advanced (and therefore more error-prone) features of printer operation. This is done by putting the printer into a mode wherein it prints the identifiers (mnemonics) associated with the various control codes, rather than performing their functions. Normally printable characters are still printed. In this way the printer prints a record of the sequences of bytes it has received. This eliminates the guesswork in deciding why the printed output came out a certain way; i.e., it records what the program actually sent to the printer.

The escape sequence is:

$E_c$Y

"Escape upper-case Wye"

During this mode a carriage-return sent to the printer will have its mnemonic printed, which is then followed by an actual carriage-return and line-feed. But no other control codes result in their functions being performed, until the escape sequence to terminate the display control code mode is received. (That sequence is even printed as it is received.) That termination sequence (described further, below) is also the only escape sequence that is recognized as an escape sequence, and that has its function performed.

During the display control codes mode it is quite possible for a byte-stream that results in an 80-character (or less) line to have far more than 80 bytes in the stream. In such a case the printer itself invokes the 81st character rule, and supplies its own carriage-return and line-feed. Mnemonics for those are not inserted into the printed output, however; they are simply performed. Printing of the stream of input bytes continues on the next line; no input characters are lost and unprinted.

The display control codes mode is terminated by the escape sequence:

$E_c$Z

"Escape upper-case Zee"

Not even the escape sequence to reset the printer ("Escape E") will terminate the display control codes mode. The only other ways to accomplish this termination are by turning the calculator off and then on, and by a CONTROL STOP.

Resetting the Printer

The escape sequence to reset the printer is:

$E_c$E

"Escape upper-case E"

This sequence causes all parameters and optional modes of operation to revert to their default (turn-on) conditions. The only such condition not affected is the existence of the display control codes mode.

The reset escape sequence will also cause any characters in the stream sent to the printer, since the last actual burning of a line but prior to the reset, to remain unprinted; such characters are permanently lost. However, a reset does not interfere with the orderly completion of a previously initiated line of printing.

USING THE GRAPHICS OPTION

The Graphics Option

Information contained in this section on graphics specifically concerns the CRT in particular as the graphics display unit, and concerns other external display or plotting units in general. For more specific information about a particular external display or plotting device one should refer to its operating manual.

The Graphics option for the calculator consists of a plug-in Graphics ROM and 16K words of local CRT Read/Write Memory.

The ROM is installed in one of the open slots in the ROM drawer 8 on the right side of the calculator.

The optional Graphics ROM enables the calculator to plot on the CRT and various external plotter peripherals. This provides CRT graphic solutions or hard copy illustrations of problems solved by the calculator. In addition, the Graphics ROM provides a means to label a plot and to draw axes with or without tic marks. A digitizing and cursor control feature allows retrieval of numeric data from a plot or graphic display. The Graphics ROM also provides the means within the calculator's BASIC language to perform a dot-for-dot graphics mode dump from the CRT to the internal printer.

The Graphics ROM automatically decreases the available user memory by 92 bytes. This is generally not a concern unless the calculator is expected to handle a large program or large data base.

The 16K words of local READ/Write memory that is installed in the CRT does not constitute a general purpose increase in the available user memory; it primarily provides a storage location for the data producing the graphics display on the CRT. It is not part of the block-structured memory available to the LPU and PPU via memory reference instructions. The local memory is treated as an internal peripheral by the calculator's operating system. There is an additional use of the CRT's memory. (The optional Mass-Storage ROM provides a graphics load statement, GLOAD, and a graphic store statement, GSTORE. The statements allow the storage and retreival of data stored in an integer array. The array is stored in the local memory of the CRT.)

CRT Graphics Specifications

The calculator's CRT display has a different raster for each of its two modes: alphanumeric and graphics. Normally the CRT operates in the alphanumeric mode; without the Graphics ROM and the hardware for the local memory in the CRT, that is the only mode available.

When the Graphics ROM and the extra hardware are installed the graphics mode can be selected.

FIG. 5 shows the approximate relative sizes and positions of the alphanumeric raster 76 and graphics raster 78.

The horizontal and vertical resolution of the graphics raster is approximately 0.04 cm, with 560 usable dots in the horizontal direction and 455 usable dots in the vertical direction.

Straight lines can be generated at about 150 cm per second, and curved lines at some what slower speeds. The computation time needed to produce curved lines (e.g., sine function) will further decrease the apparent line generation speed.

CRT Graphics Memory Select Code

The select code of the local R/W memory in the CRT for the graphics option is set to 13 and cannot be changed. The I/O backplane traps all select codes except 1-12; referring to FIG. 2, it does not allow a select code of O or 13-15 to appear at any of the I/O slots 16 at the rear of the calculator. An interface 17 which is set to respond to select code 13 will not interfere with normal system operation; it will simply lie dormant because it will never see its select code.

Throughout the section on graphics some new terms and mnenomics will be used to describe a particular operation or syntax. In many cases a term or mnemonic is used before a complete definition can conveniently be given. For those cases, the following provides enough information to make such terms meaningful without giving complete details of each, as that is inappropriate at this time. The terms and mnemonics to be defined are: hard-clip, soft-clip, GDU's, UDU's and metric. Having a basic definition of these will aid in understanding the rest of the section concerning graphics.

Plotting Space

Plotting devices have physically-imposed "hard-clip" limits (e.g., the CRT's screen size and a flat-bed plotter's platen size) that restrict beam or pen movement. The maximum hard-clip limits and the resulting plotting area size depends upon the plotting device used. As will be seen later, the hard-clip limits can be made smaller (e.g., to fit a piece of paper) in response to statements or commands executed by the calculator, and on some plotters, by manual adjustment. The default for hard-clip limits is generally the maximum available area. However, whether the current area is the default size, or some specified size, it is still referred to as the area within the hard-clip limits.

Another set of limits that restrict"pen movement" (i.e., writing to a graphics device, whether with a pen, electron beam, or whatever) is the area within the "soft-clip" limits. The soft-clip limits are defaulted to the hard-clip limits, but can be altered under calculator control. The soft-clip limits restrict line generation when the User-Defined Units (UDU's) mode is set, but not when the Graphic Display Units (GDU's) is set. As will be seen later, this capability is very useful.

Unit-of-Measure Modes

There are three unit-of-measure modes that can be selected under calculator control: Graphic Display Units (GDU's), User Definable Units (UDU's), and Metric Units.

Most of the syntaxes given in this description interpret their parameters according to the most recent mode set; other syntaxes interpret their parameters in a particular one of the three modes.

A GDU is defined as one percent of the length of the shortest side of the space bounded by the hard-clip limits. Thus, the short side is 100 GDU's long, and the length of the long side is 100 times the ratio of the long to short dimensions. The GDU mode allows plotter-space access on a percent-of-full-scale basis.

The length of the short side of all plotting devices is 100 GDU's but the length of the long side is device dependent. For the CRT the length of the long side is about 123.13 GDU's, which is the length/height aspect ratio times the height of 100 GDU's (559/454*100=123.13).

In the UDU mode the units are those used within the user's application. Functions which operate in the UDU mode can have values for the arguments directly in user units. Several functions are provided to allow definition of the units of measure for a particular application.

The unit of measure in the METRIC unit mode is the millimeter. This mode is implemented as a special case of UDU's, such that a plotting maneuver executed in this mode will generate a result (on the plotting area) physically scaled to millimeters. This mode is useful where correspondence with physically measurable objects is desirable, as in drafting applications. In some devices (e.g., the CRT) METRIC units are only approximate.

A program written to plot or draw lines on a plotting device must include some set-up operations to initialize the plotter and define the plotting area. The statements discussed next provide sufficient flexibility to accomodate most plotting applications.

PLOTTER IS Statement

The PLOTTER IS statement is used to specify the type of device to which plotter operations will be directed. Syntax:

PLOTTER IS [<select code>,]>plotter i.d.>
[,<step size>[,<# of pens>[,<pen inc>[,<pen select>]]]]

The <select code> is optional. If present it specifies the select code of the intended plotter, and maybe a compound quantity consisting of the actual select code followed by an optional comma and an HPIB location. If absent, a default select code is assumed, based on what particular <plotter i.d.> is specified.

The <plotter i.d.> can be a literal or string expression whose value is any of:

"GRAPHICS" (defaults <select code> to 13)

"9872A" (default <select code> to 7,5)

"INCREMENTAL" (defaults <select code> to 5)

"GRAPHICS" selects the CRT as the plotting medium. "9872A" selects the Hewlett-Packard 9872A Plotter as the plotting device. "INCREMENTAL" specifies incremental plotters such as manufactured by Calcomp.

The optional parameters following <plotter i.d.> are used only when "INCREMENTAL" is specified.

If no PLOTTER IS statement is executed before the first plotting statement is encountered (i.e., a statement causing activity on the plotter) the following PLOTTER IS statement is assumed:

PLOTTER IS 13, "GRAPHICS"

The PLOTTER IS statement sets the following additional conditions when executed:

1. Sets the UDU mode and establishes user units that are identical in length to GDU's. Subsequent line generation is then subject to soft-clipping, even though it is "done in GDU's".
2. Reads hardware-set "hard-clip" limits and then defaults CLIP, LIMIT, and LOCATE to the hard-clip limit values.
3. Clears the local memory of the CRT (same as a GCLEAR).
4. Selects pen one and lifts the pen.
5. Selects line type one (length = 4% or 4 GDU's).
6. Selects a standardized character size (3.3 GDU's high and 1.9 GDU's wide, the same as a standard 7×9 CRT character).
7. Selects label-origin one (described elsewhere).
8. Sets labeling direction as left-to-right, with an angle or slope of zero.
9. Clears any error conditions.
10. Clears the character count associated with any previous LABEL statements ending with a semicolon.

These conditions can be altered as necessary by executing one or more of various Graphics ROM statements, with the proper parameters, from the keyboard or from within a program.

PLOTTER . . . IS OFF Statement

A means is provided to "deactivate" a plotting device. Statements that cause activity on the designated plotting device are executed normally, except that no output to the plotter is transmitted.

The syntax is:

PLOTTER <select code> IS OFF

PLOTTER . . . IS ON Statement

A means is provided to "undo" a PLOTTER . . . IS OFF Statement.

Its syntax is:

PLOTTER <select code> IS ON

This statement merely removes an imposed "off" condition, and does not perform any initialization, such as is performed by the PLOTTER IS statement.

GRAPHICS Statement

The GRAPHICS statement is used to control the mode of the CRT display. The GRAPHICS statement causes the CRT to display the graphics raster.

Syntax:

GRAPHICS

The CRT will remain in the graphics raster display mode until either an EXIT GRAPHICS statement is executed, or some situation requiring the alpha mode display occurs, such as an error, typing in a line, pressing RECALL, etc.

Note that it is not necessary to execute a GRAPHICS statement to transmit plotted data to the local memory of the CRT. That is necessary only to actually display the resulting plot. That is, plotting to the CRT, and having the CRT display the plot are two separate actions. One could plot to the CRT and then do a CRT-Printer dump, without even actually displaying the plot on the screen.

EXIT GRAPHICS

The EXIT GRAPHICS statements is used to return the CRT to the alpha raster display mode.

Syntax:

EXIT GRAPHICS

GCLEAR Statement

The GCLEAR statement clears the CRT of previously plotted data, by clearing the local memory in the CRT. For the 9872A Plotter, this would be equivalent to lifting the pen, moving it to the home position, and then changing the paper. This statement neither sets nor resets default parameters associated with any other statements.

Syntax:

GCLEAR <mm of paper>

The optional parameter is device dependent, and is intended to declare an amount that the paper should be advanced. This is associated with strip plotters that used rolled paper.

DUMP GRAPHICS Statement

The DUMP GRAPHICS statement causes a dot-for-dot transfer of the image of the graphics mode display raster to the internal thermal printer. It is not necessary for the graphics mode raster to actually be displayed at the time the DUMP GRAPHICS is performed. FIG. 38 is an example of a program that plots on the CRT and then does a CRT-Printer dump.

Syntax:

```
DUMP GRAPHICS [<lower bound>[,<upper
  bound>]]
```

The two optional parameters allow restricting the dump to any horizontal segment of the graphics raster. The bounds are expressed in current user units. If the bounds are omitted the entire raster is dumped. That is, the <lower bound> is defaulted to the last line of the raster, and the <upper bound> to the first line of the raster.

LIMIT Statement

The LIMIT Statement allows the user to further restrict the available plotting area by making reductions in the hard-clip limits. This statement overrides any previously-set or defaulted hard-clip values.

Syntax:

```
LIMIT [<Xmin>,<Xmax>,<Ymin>,<Ymax>]
```

The units are always millimeters, with the origin (point 0,0) at the lower-left physical limits of the plotting device. The upper-right limit values for the CRT are 184.47 and 149.82. (These are actually the values for the thermal printer. The size of the graphics raster is subject to variation due to environmental factors and internal adjustment. The size of a CRT to printer dump is considerably more stable.)

The first two parameters specify the left and right boundaries that restrict pen movement. The second two parameters specify the lower and upper boundaries that restrict pen movement. Nothing can be printed or drawn outside this area. Thus, LIMIT affects the physical length of a GDU.

Executing the LIMIT statement without parameters automatically specifies the physical (i.e., maximum size) hard-clip limits, and allows digitizing of lower-left and upper-right corners. Refer to the DIGITIZE statement, discussed in a subsequent section.

The LIMIT statement is the software equivalent of manually setting the graph limits on the 9872A Plotter.

It is convenient to define the following reference points, using the values supplied by the LIMIT statement.

$P_1$=(Xmin, Ymin)

$P_2$=(Xmax, Ymax)

Now, the thing that differentiates Xmin from Xmax is their order of appearance in the LIMIT statement, not their relative size or sign. Hence, it is possible for Xmin to be specified as greater than Xmax. A similar situation exists for Ymin and Ymax. Thus, one may say that $P_2$ lies in any direction from $P_1$.

The relative direction of $P_2$ from $P_1$ determines whether the plot is reflected or not, and if so, how, according to the correspondence listed below.

$P_2$ is above and to the right of $P_1$:
  The plot is not reflected; up/down and left/right relationships are unchanged.

$P_2$ is above and to the left of $P_1$:
  The plot is reflected about the Y axis; up/down relationships are unchanged, but left/right relationships are reversed.

$P_2$ is below and to the left of $P_1$:
  The plot is reflected about the identity line Y=X. Both up/down and left/right relationships are reversed.

$P_2$ is below and to the right of $P_1$:
  The plot is reflected about the X axis; up/down relationships are reversed, but left/right relationships are unchanged.

LOCATE Statement

The LOCATE statement defines the area on the plotter which will be scaled by SCALE or will be filled by SHOW. This statement also sets or resets the soft-clip limits. The resulting soft-clip limits can later be overridden by the CLIP or UNCLIP statements.

The main function of the LOCATE statement is to set the stage for a subsequent SCALE or SHOW statement. The establishment of soft-clip limits by LOCATE is a convenience feature which may not be appropriate in some applications. In those cases the CLIP statement can be used to cause the desired result.

Syntax:

```
LOCATE
  [<Xmin>,<Xmax>,<Ymin>,<Ymax>]
```

The units are always in Graphic Display Units (GDU's) with their origin (point 0,0) at the point $P_1$ mentioned in the LIMIT statement.

The first two parameters specify the left and right boundary limits, and the last two parameters specify the lower and upper boundary limits.

Executing the LOCATE statement without parameters allows specifying the LOCATE-area by digitizing the corners. Refer to the DIGITIZE statement.

It is convenient to define the following points, based on the values supplied in the LOCATE statement.

$L_1$=(Xmin, Ymin)

$L_2$=(Xmax, Ymax)

The concept of the points $L_1$ and $L_2$ are of use in connection with the SHOW statement, discussed in a subsequent section.

The SCALE and SHOW statements give the area specified by LOCATE user definable units of measure. The SCALE and SHOW statements act on this area in two very different ways as can be seen in the next two sections:

SCALE Statement

The SCALE statement defines minimum and maximum values of X and Y to correspond to the plotting area specified by the LOCATE statement. This allows specification of user selected units of plotting.

Syntax:

```
SCALE <Xmin>,<Xmax>,<Ymin>,<Ymax>
```

This statement automatically sets the User Definable Units (UDU's) mode.

The first two parameters specify user values to represent the left and right boundaries of the area specified by the LOCATE statement. The last two parameters specify user values to represent the lower and upper LOCATE-boundaries.

For example, the first two parameters of the scale statement could specify the left edge of the plotting area as −20 and the right edge as 30. This has the effect of dividing the horizontal plotting distance into 50 units (30−(−20)=50). The last two parameters could specify different values and therefore a different scale or unit for the vertical direction. These units can be used to represent distance, volume, time, or whatever specific units the problem requires. The scaling factors for the X and Y directions are completely independent of each other. Thus, plots are stretched or shrunk in the X and Y direction independently to fit the plotting area (anisotropic scaling). Note that this is not the case with the SHOW statement.

The SCALE statement can be used to locate the origin (point 0,0) on or off the plotting area. FIG. 39 illustrates a SCALE'd plotting space.

The SCALE statement can cause the resulting plot to be reflected, if the mapping of the SCALE statement's (Xmin, Ymin) onto the LOCATE statement's $L_1$, and similar mapping of (Xmax, Ymax) onto $L_2$, result in reversals in the sense of up/down or left/right. This is similar to the possible reflections in connection with the LIMIT statement.

SHOW Statement

The SHOW statement defines an isotropic rectangle that is proportionately stretched or shrunk so that the specified area will fit in the plotting area defined by default or LOCATE. This effectively scales the plotting area specified by LOCATE, and in fact, the SHOW operation could be done with a SCALE statement. SHOW does it automatically, however.

Syntax:

```
SHOW <Xmin>,<Xmax>,<Ymin>,<Ymax>
```

The first two parameters specify the minimum acceptable upper and lower bounds for the X direction, and the last two parameters specify the minimum acceptable bounds for the Y direction.

The main difference between a SCALE statement and a SHOW statement is this. In a SCALE statement it is possible (and indeed often desirable) for the physical length of a unit-distance along the X axis to be different from the physical length of a unit-distance along the Y axis. In the SCALE statement the desired excursion along each axis is mapped onto the available LOCATE-region, and the lengths of the unit-distances are independently determined as a result.

For a SHOW statement, however, an additional requirement is added. That requirement is that the resulting physical length of a unit-distance along the X axis equal the resulting physical length of a unit-distance along the Y axis. Thus, the X and Y dimensions are each proportionately scaled until both excursions are contained within the LOCATE region. Thus, a circle will always be circular, and a square square, when plotted in an area scaled by the SHOW statement.

The SHOW statement does this even though the LOCATE region may not be proportional in height and width to the height and width of the desired SHOW region. In such a case, the LOCATE region will extend beyond the SHOW region in one dimension or the other. The excess will appear evenly divided in each extreme of the affected dimension, i.e., the physical center of the LOCATE region and the physical center of the SHOW region are co-incident. FIG. 40 illustrates a plotting space whose units have been determined by a SHOW statement.

CLIP Statement

The CLIP statement redefines the soft-clip limits. This allows the soft-clip limits to be changed from their values set by a LIMIT or PLOTTER IS statement. Soft-clipping affects lines plotted in user-defined units, (i.e., subsequent to a SETUU statement) but has no effect on lines plotted in GDU's (i.e., subsequent to a SETGU statement).

Syntax:

```
CLIP [<Xmin>,<Xmax>,<Ymin>,<Ymax>]
```

The parameters are interpreted as either the user units established by a SCALE or SHOW statement, or as GDU's (affected by LIMIT).

The first two parameters specify the left and right boundaries, and the last two parameters specify the lower and upper boundaries, of the clipping area.

Lines plotted using UDU's from inside this area to points outside the clip boundary extend no farther than the boundary. Lines outside the CLIP limits will not be drawn, (except when drawn in GDU's, subsequent to a SETGU).

Executing the CLIP statement without parameters allows specifying the soft-clip area by digitizing the lower-left and upper-right corners. Refer to the DIGITIZE statement.

The soft-clip limits can be turned off (by UNCLIP) or may be set beyond the hard-clip limit. In either of these cases and in the case of plotting commands subsequent to a SETGU, only the hard-clip limits are used.

Executing a PLOTTER IS or LIMIT statement will default values of various parameters, including the soft-clip limits.

UNCLIP Statement

The UNCLIP statement sets the soft-clip limits equal to the hard-clip limits. This allows the positioning of the pen anywhere in the display space defined by the LIMIT statement.

Syntax:

```
UNCLIP
```

The soft-clip limits are set to their default values by executing a PLOTTER IS or LIMIT statement. SCALE and SHOW do not affect the clipping limits.

MSCALE Statement

The MSCALE statement sets millimeters as the user units and locates the position of the origin. This mode is very useful where correspondence with physically measurable objects is desirable, as in drafting applications. In some devices (e.g., the CRT), metric units are only approximate.

Syntax:

```
MSCALE <X-offset>,<Y-offset>
```

MSCALE specifies that current units are millimeters, and that the origin is offset from $L_1$ of the LOCATE statement by the specified amount (in millimeters). The resulting origin need not be inside the hard-clip limits.

SETGU Statement

This statement establishes a mode wherein the unit of measurement for plotting statements is the GDU.

Syntax:

```
SETGU
```

One of the main uses for GDU's is in connection with the LOCATE statement, which positions the active plotting space within the hard-clip limits. Since a GDU is one percent of full scale along the physically shortest axis, its actual length is quite device dependent. For just that reason GDU's provide an immediate and easy way to supply coordinates to locate things within the plotting space. That is, it is usually easy to estimate in GDU's where some labeling should go; it is not always easy in user-units.

SETUU Statement

This statement establishes a mode wherein the unit of measurement for plotting statements is a user-determined unit.

Syntax:

```
SETUU
```

At initialization (by PLOTTER IS or LIMIT) the user-unit-in-use is chosen such that it equals GDU's. A subsequent MSCALE, SCALE or SHOW statement sets the user unit to its desired length.

RATIO Function

The graphics option supplies a function, whose name is RATIO, which has no arguments, but which returns the ratio of the possible excursion along the X axis divided by the possible excursion along the Y axis, as allowed by the hard-clip limits.

PENUP Statment

The PENUP statement lifts the pen on a plotter, and "turns the beam off" for subsequent lines drawn on the CRT.

Syntax:

```
PENUP
```

On plotting devices with actual pens (e.g., the 9872A Plotter) this statement lifts the pen so it can be moved without drawing a line.

On the CRT this statement turns off line generation. If the pen is moved (with the pen up) its new location will not be apparent on the CRT, but the pen's coordinate values can be found by executing the WHERE statement (described further, below).

The up or down status of the pen can be automatically controlled by using the DRAW or MOVE statement, or by PLOT statements using an optional pen control parameter.

PEN Statement

The PEN statement allows the selection of any one of the pens found on the plotting device.

Syntax:

```
PEN <pen number>
```

The <pen number> is an integer value in the range −1 to 4.

Specifying pen zero causes a device-dependent response. On some devices, but not on the CRT, it selects a "blank" pen (i.e., one that does not draw); on the 9872A plotter it returns all pens to their holders.

On multi-pen devices, values 1 through 4 select one of four pens (say, for different colors).

On the CRT, zero or any positive pen number turns on line generation. A negative pen number on the CRT selects an "eraser"; a line redrawn with this pen will be erased along with the intersecting points of any intersecting lines. Note: Due to the method used to generate lines on the CRT, all of a line may not be erased unless it is exactly retraced (with the eraser) over its entire length. This is most likely to occur on lines other than horizontal or vertical lines. Also, the eraser will not completely erase lines drawn with a LINETYPE (discussed later) of 9 or 10. Such lines have tic marks; the tics are not erased by the eraser.

LINETYPE Statement

The LINETYPE statement selects one of several solid or dashed line types for plotting.

Syntax:

```
LINETYPE <i.d. number>[,<length>]
```

The <i.d. number> parameter (an integer value of 1 through 10) selects one of the ten line types, as shown in FIG. 41. The default linetype is one, but only as a result of the PLOTTER IS statement. No default type is associated with LINETYPE.

The <length> parameter specifies, in GDU's, the length of the repetitive pattern of the dashed lines. The default length is 4 GDU's.

FIG. 41 shows line type paterns for the CRT that have been dumped to the printer.

PLOT Statement

The PLOT statement provides data plotting with optional pen control.

Syntax:

```
PLOT <X>,<Y>[,<pen control>]
```

The X and Y parameters are interpreted according to the current units mode, and represent an absolute displacement from the origin. That is, X and Y do not represent incremental motion of the pen; they are genuine Cartesian coordinates.

The optional pen-control parameter specifies various up or down pen motions. The <pen control> is interpreted as follows:

Odd = Drop pen
Even = Lift pen
+ = Do odd/even pen change after movement to (X,Y)
− = Do odd/even pen change before movement to (X,Y)
(0 is interpreted as even and positive)

Examples:

| | |
|---|---|
| +1 or no parameter | Move or draw, then drop pen |
| 2 or 0 | Move or draw, then lift pen |
| −2 | Lift pen, then move |
| −1 | Drop pen, then draw |

PLOT is the preferred command for plotting automatically-generated data, because the pen's up or down status can be placed under direct numerical control of the data generation process. This is in contrast with the DRAW and MOVE statements mentioned below. Those statements provide only a subset of the capability provided by PLOT. Further, MOVE and DRAW each provide only a type of pen-up or pen-down control that is seldom the only kind needed. Each must therefore be used in conjunction with the other, based on the result of some test. With PLOT, the logical expression that is the test can be made into the pen-control parameter.

Pen motion will be clipped as described for the CLIP statement.

When plotting in UDU's PLOT commands will be affected by both the hard-clip and soft-clip limits (refer to the CLIP and LIMIT statements).

When plotting in GDU's, only the hard-clip limits are used. This allows data plotted in UDU's to be clipped at the soft-clip boundary, but allows labels or other lines to be positioned between the soft-clip and hard-clip boundries. Such lines can be plotted in GDU's. Labels are always drawn in GDU's and the user need not switch to GDU's just for their sake.

MOVE Statement.

The MOVE statement lifts the pen and then moves it to the absolute (Cartesian) coordinates (X,Y). This statement provides an easy way of moving the pen (without drawing a line) regardless of whether the pen is already down.

With UDU's line generation is restricted to the area enclosed by both the hard-clip and soft-clip limits. But in GDU's line generation is restricted only by the hard-clip limits.

Syntax:

```
MOVE <X>,<Y>
```

The X and Y parameters are interpreted as units of whichever type is currently in use.

MOVE X, Y is equivalent to PLOT X, Y, −2 (refer to the PLOT statement).

DRAW Statement

The DRAW statement drops the pen and then moves it to the absolute (Cartesian) coordinates (X,Y). This statement provides an easy way of drawing a line from the current pen location to a new location, without regard to whether the pen is already up or down.

Syntax:

```
DRAW <X>,<Y>
```

The X and Y parameters are interpreted as units of whichever type is currently in use.

DRAW X, Y is equivalent to PLOT X, Y, −1 (refer to the PLOT statement).

Pen motion will be clipped as described under the CLIP statement.

When plotting in UDU's, DRAW commands will be affected by both the hard-clip and soft-clip limits (refer to the CLIP and LIMIT statements). But when plotting in GDU's, only the hard-clip limits are used. This allows data plotted in UDU's to be clipped at the soft-clip boundary, yet allows labels or other lines to be positioned between the soft-clip and hard-clip boundaries.

RPLOT Statement

The RPLOT statement provides a relative plotting capability (with optional pen control) that is referenced to the last point plotted absolutely.

Syntax:

```
RPLOT <X>,<Y>[,<pen control>]
```

The RPLOT interprets the X and Y parameters as current units relative to a "local" origin. The local origin is the last point addressed by an absolute PLOT, MOVE, DRAW, or by an incremental plot (IPLOT). This local coordinate system may also be rotated about the local origin (relative to the master coordinate system) by means of the plot direction (PDIR) statement.

The RPLOT pen movement is restricted by the hard-clip and soft-clip limits in the same way as the PLOT statement is.

IPLOT Statement

The IPLOT statement provides an incremental plotting capability with optional pen control.

Syntax:

```
IPLOT <X inc>,<Y inc>[,<pen control>]
```

IPLOT has all the characteristics of RPLOT, except that the coordinates are interpreted as incremental data. The local origin is reset with each new position of the pen.

PDIR Statement

The PDIR statement sets the angle of rotation of the local coordinate system for relative and incremental plotting.

Syntax:

```
PDIR <angle>

or

PDIR <run>,<rise>
```

The interpretation depends on the number of parameters.

If only one parameter is supplied, it is assumed to be an angle, in current angle units (DEG, RAD, or GRAD). The angle is counterclockwise, from a horizontal line extending through the local origin, to the X axis of the rotated local corroinate system.

If two parameters are supplied, the angle used is that which corresponds to the slope obtained by dividing the rise by the run.

The parameter <angle> is intended for use in situations involving isotropic scaling, such as is found with the SHOW statement, plotting in GDU's etc. On the other hand, SCALE statements generally result in anisotropic situations. In order to express the desired rotation as an angle derived from some relationship of variables plotted in UDU's, one would need to know the relative physical lengths of a unit length in each axis. It was precisely to avoid this inconvenience that SCALE was devised. Hence, <rise> and <run> in UDU's is allowed as an alternative way to specify the desired amount of rotation. The difference is made clear in the following example.

A rotation of 45 degrees is always just that, if <angle> is specified to be 45 degrees. But a rotation of <1>,<1> (i.e., a slope of one) is 45 degrees if and only if a unit length along the X axis physically equals a unit length along the Y axis. If, for instance, a unit length along the X axis is the same measured length (with a ruler) as two unit lengths along the Y axis, then a slope of one corresponds to an angle of 26.57 degrees.

AXES Statement

The AXES statement draws a pair of axes, with optional (and linearly spaced) tic-marks.

Syntax:

AXES [<X tic interval>,<Y tic interval<[,>X intersection>,<Y intersection>[,<X major count<,>Y major count>[,<major-tic size>]]]]

The X and Y tick interval parameter values are interpreted in current units. The signs are ignored. Tic marks are omitted entirely if these parameters are omitted.

The AXES statement generates an X axis passing through <Y intersection> and a Y axis passing through <X intersection>, assuming that these values are on or within the soft-clip limits. The axes will extend across, but be contained within the soft-clipping area. The default value for X and Y intersection is 0,0.

The X and Y major counts are unitless integer values which specify the number of minor tic intervals contained within their respective major tic intervals. The tic marks are positioned along each axis such that a major tic-mark falls on the intersection of the axes. (It is possible that the intersection of the axes is not within the plotting space. Such a condition is not an error. In fact, that is how an unwanted axis is suppressed if only one axis is to be drawn. In such case the intersection is moved along the desired axis, until the undesired axis vanishes.) Tic marks may or may not coincide with the edge of the clipping boundary. The sign of each major count parameter is ignored and the default for each is one (i.e., make all tic major tics with no minor tics in between).

Both major and minor tic marks are symmetric about the axes. The <major-tic size> specifies (in GDU's) the length of a major tic mark (end to end). The length of a minor tic is half the length of a major tic. The default size of the major tic mark is 2 GDU's. Both the minor and major tic-marks are clipped at the clipping limits.

Axes and tic-marks are drawn using the current line type (refer to the LINETYPE statement).

GRID Statement

The GRID statement can be used as an alternative to AXES when a full grid is desired.

Syntax:

GRID [<X tic interval>,<Y tic interval>[,<X intersection>,<Y intersection>[,<X major count>,<Y major count>[,<minor tic size>]]]]

The parameters are the same as for the AXES statement, except that the last parameter specifies, in GDU's, the length of a minor tic mark.

The major tic-marks are drawn as horizontal and vertical lines clear across the soft-clip area. Cross tics are drawn at the intersections of each of the minor tic intervals. The length of the cross is specified by the last (seventh) parameter. The default value is one GDU.

FRAME Statement

The FRAME statement draws a box around the current clipping area. Subsequent to a SETUU that area is determined by the soft-clip limits. Subsequent to a SETGU it is determined by the hard-clip limits.

Syntax:

FRAME

The box is drawn using the current pen and line-type. The pen is positioned at the lower left corner of the frame after the operation is complete.

LABEL and LABEL USING Statements

The LABEL and LABEL USING statements are very similar to the PRINT and PRINT USING statements except that <output list> is directed to the current plotter as a label.

Syntax:

LABEL <output list> or

LABEL USING <image specifier>;<output list>

LABEL and LABEL USING follow the same formatting rules as PRINT and PRINT USING except that such a label will be terminated by an ASCII end-of-test (decimal 3), whereas PRINT and PRINT USING are unaffected by end-of-text.

The position and rotatin of a label is controlled both by the pen position and by the LORG and LDIR statements. The size and aspect ratio of the characters in the label are controlled by the CSIZE statement. Those statements are discussed shortly.

The length of an unformatted label defaults to a multiple of twenty characters, just as for a PRINT field. For example, LABEl 1,2 will separate the 1 from the 2 by 18 trailing blanks plus a leading blank in front of the 2. Leading blanks in front of the 1 and 2 are for signs. Following the 2 will be another 18 traling blanks. This is shown below:

b1bbbbbbbbbbbbbbbbbbb2bbbbbbbbbbbbbbbbbb

Labels will probably not be located as planned if they are not first formatted. Refer to the description of PRINT and PRINT USING for formatting information.

LORG Statement

The LORG (label origin) statement sets the "label origin" position. That determines how a subsequent label will be placed relative to the current pen location.

Syntax:

LORG <origin position>

The parameter can be an integer value between one and nine. If an LORG statement is not executed, the default origin position is one.

Referring to FIG. 42, each <origin position> number shows the initial position of the pen relative to labels when LORG has been executed with that number as its parameter. The pen positions are shown as if the label's position were fixed, though in reality the pen position is the fixed reference point.

If the label is rotated by the letter direction statement (see LDIR), the relationship remains relative to the rotated label.

CSIZE Statement

The CSIZE (character size) statement specifies the size and aspect ratio of the individual symbols of a label.

The CSIZE statement uses up to two parameters. If these parameters are omitted specific default values are used.

Syntax:

CSIZE height[,aspect ratio]

The height parameter is specified in GDU's. The default valve is about 3.3 GDU's, and arises as a result of a LIMIT or PLOTTER IS statement.

The aspect ratio parameter specifies the character-cell aspect ratio,defined as width divided by height. Thus, the width of a character-cell is defined as the height times the aspect ratio. The default value is 9/15=0.6.

LDIR Statement

The LDIR (label direction) statement specifies the angle at which a label is printed.

Syntax:

LDIR <angle> or

LDIR <run>,<rise>

The interpretation depends on the number of parameters.

If only one parameter is supplied, it is assumed to be the counterclockwise angle in current angular units (degrees, radians or grads) from the normal (horizontal) X axis. Thus, left to right lettering has an angle of zero degrees.

If two parameters are given, the angle used is that which corresponds to the slope produced by dividing <rise> by <run>. Those two parameters are specified in user units. The comments in the discussion of the PDIR statement about <rise> and <run> are also applicable here.

Introduction to the Digitizing Capability

Digitizing is the process of obtaining the coordinates of a point by maneuvering a movable cursor over the point and then inquiring about the coordinates of the cursor. Digitizing can be regarded as the reverse of plotting. To plot a graph, one plots selected points, obtaining their coordinates from some rule of correspondence. In digitizing the graph, the graph itself represents the rule of correspondence; digitizing recovers the coordinates of each point digitized.

The Graphics option provides the user with three different cursors for use on the CRT. For the 9872A, the pen position is the only cursor available. It is used whenever a cursor is required, regardless of which of the three different types would be in use on the CRT, if the CRT were the designated plotter. Of the three types available on the CRT, two of these are available for digitizing. (The two do not represent separate entities. Internally there is only one digitizing cursor, but it may be depicted in two ways.) One of these is a pair of lines, one vertical, one horizontal, with both extending clear across the screen. The intersection denotes the location to be digitized. The other digitizing cursor is a small flashing cross. The third type of cursor is not used for digitizing. Instead, it is used in lettering information onto a plot, in direct response to keys pressed on the keyboard. This cursor is indistinguishable from the normal cursor seen in the alphanumeric mode of CRT operation; it is a flashing underline. This indicates where the next key pressed will cause its symbol to be drawn.

For all three types of cursors, and for all plotting devices, "the cursor" and "the pen" are different conceptual entities. The cursor can always be positioned independently of the pen. For instance, plotting commands do not affect the location of the cursor.

This is true, even when the physical pen of the 9872A is the only means to represent the position of the plotting pen or the digitizing cursor. In the case of the 9872A, the physical pen moves and represents the digitizing cursor whenever the cursor would be visible if the plotting device were the CRT. Likewise, the physical pen represents the plotting pen (PLOT, MOVE, etc.) after a plotting operation. Once the physical pen on the plotter begins to represent one of these two different conceptual entities ("the pen" or "the cursor") it continues to do so until it needs to change.

With regard to digitizing (on the CRT), a POINTER statement allows selection of one of the two types of digitizing cursors, specifies an initial cursor position, and makes the cursor visible.

The DIGITIZE statement also makes the cursor visible. Subsequent to a DIGITIZE statement the cursor can be positioned with the cursor control keys of the keyboard. Once the cursor is positioned, any of a special collection of keys can be pressed to signal the calculator that the cursor location is to be supplied to some variables designated by the DIGITIZE statement. The cursor then disappears from the screen (regardless of how it got there, whether from POINTER or DIGITIZE). A subsequent DIGITIZE will cause the cursor to reappear in its most recent position and further digitizing can proceed.

To letter, the cursor may be pre-positioned (most probably with a POINTER statement), and then followed by a subsequent LETTER statement. Alternatively, pre-positioning can be dispensed with, since under the auspices of a LETTER statement the cursor control keys also control the position of the lettering cursor. The LETTER statement automatically selects the lettering cursor. Once the cursor is positioned, any typing keys that are struck (i.e., pressing keys that have printable symbols associated with them) are lettered as they are pressed. The CSIZE statement controls their size, and the LDIR statement their direction. Lettering is terminated by the exact same collection of keys that terminate digitizing.

POINTER Statement

The POINTER statement selects one of the two types of digitizing cursors, makes the cursor visible, and moves it to a specified absolute position.

Syntax:

POINTER <X value>,<Y value>[,<cursor type>]

The cursor will remain visible until either a subsequent DIGITIZE statement is satisfied or until a LETTER statement is satisfied. No cursor of any type will be visible after either case. Terminating the GRAPHICS mode will also make the cursor visible (along with all graphics information on the CRT), but the display will return as it was if the GRAPHICS mode is re-established.

The X and Y values are specified in current units. If the pointer is positioned outside the hard-clip limits the cursor is turned off.

The cursor-type parameter is an integer that specifies one of two types of cursors, according to whether it is even or odd. The odd-type is the full-screen crossed-lines. The even-type is the small flashing cross.

Once a cursor type is selected, it is the type used by all other statements that use the cursor. If the optional <cursor type> is omitted, the odd-type cursor is taken as the default cursor type.

CURSOR Statement

The CURSOR statement returns the cursor's coordinate and status information to the specified variables.

Syntax:

CURSOR <abscissa variable>,<ordinate variable>[,<string variable>]

The X and Y coordinate values are returned to the <abscissa variable> and <ordinate variable> respectively. The values are in current units. The <string variable> receives a returned pen status which is equal to one if the pen is down and zero if the pen is up.

The main difference between the CURSOR statement and the DIGITIZE statement (described next) is that the CURSOR statement does not halt a running program, display the cursor, and allow it to be manually positioned, as does the DIGITIZE statement. The CURSOR statement simply takes the current cursor coordinates and returns them to the specified variables. The cursor is not made visible, nor can it be repositioned.

DIGITIZE Statement

The DIGITIZE statement stops the program (if one is running), displays the cursor, and allows it to be manually repositioned. The cursor may be repositioned until either CONT or any UDK is pressed. At that time the cursor's coordinates (in current units) are assigned to the first two variables specified in the DIGITIZE statement. The third variable, if specified, is assigned pen status information; a $\phi$ means the pen is up, and a 1 means the pen is down.

Syntax:

DIGITIZE <abscissa variable>,<ordinate variable>[,<string variable>]

STOP may also be used to terminate the DIGITIZE statement. It is an abortive termination, however, and all the normal attributes of STOP (such as resetting the program line counter) accompany its use. As for the normal ways to satisfy the DIGITIZE statement, the calculator remembers whether or not it was running a program, and will resume it or not, based on that fact alone. Pressing CONT to satisfy a DIGITIZE statement EXECUTE'd from the keyboard will not cause a dormant program in the calculator to begin execution.

The cursor will appear in the position to which it was last moved. To maneuver the cursor, one presses SHIFT, or not, in conjunction with any of the →,←, ↑, or ↓ keys, as needed. The shifted keys move the cursor a distance of one dot on the CRT, and one NPU on a plotter. (An NPU is a Nominal Plotter Unit, and is a device dependent quantity, based upon the device's inherent resolution and step size.) The unshifted keys move the cursor one character cell distance (character height for up/down motion, character width for left/right motion). Character cell size is determined by the CSIZE statement.

Pressing HOME will return the cursor to the lower left corner of the plotting space.

An implicit DIGITIZE statement occurs whenever any of LIMIT, LOCATE, or CLIP is employed without parameters. In such a case the cursor is used to supply coordinate values to those statements. The current cursor type (or the default type if no type has yet been specified) will appear at the lower left hard-clip boundary. The cursor may then be maneuvered, and the entry made in the usual manner. The cursor then appears at the upper right hand-clip boundary. The cursor may then be maneuvered, and the entry made. After that entry the cursor vanishes, since a DIGITIZE statement (albeit an implicit one) has been satisfied.

WHERE Statement

The WHERE statement returns the coordinate values (in current units) of the most recent point plotted by any of PLOT, MOVE, or DRAW. If that point is outside the clipping limits the value will not be the same as the current pen position (which cannot move outside the clipping limits).

Syntax:

WHERE <abscissa variable>,<ordinate variable>[,<string variable>]

The optional third parameter receives pen status information in the same manner as DIGITIZE and CURSOR.

LETTER Statement

The LETTER statement allows manual labeling of plots on the device designated as the plotter.

Syntax:

LETTER

The lettering cursor will appear at the most recent position occupied by the digitizing cursor. The lettering cursor can then be moved by any of the techniques applicable to moving the cursor under the auspices of the DIGITIZE statement. Once the starting position of the label is reached the label is created by pressing the keys representing the desired characters. As each key is pressed the associated character is drawn, and the cursor is advanced to the position to be occupied by the next character. Character size is as specified by CSIZE. LDIR affects the direction (angle) in which the label is drawn, similar to the LABEL statement. The LETTER statement is terminated in the same manner as the DIGITIZE statement is terminated.

A DIGITIZE statement subsequent to a LETTER statement will have its digitizing cursor in the most previous location occupied by the lettering cursor.

THE INTERNAL ARCHITECTURE OF THE CALCULATOR

The internal operation of the calculator is illustrated by the block diagram of FIG. 43. The major elements of the diagram are the two processors called the Language Processor Unit (LPU) 30 and the Peripheral Processor Unit (PPU) 28, the Memory Address Extender (MAE) 32 with its associated four 32K word blocks of memory (Block 0 through Block 3) 36, 38, 40, and 42. Also associated with memory are the dual port memory controller 34 and the CRT Memory Access Port 26.

The main purpose of the LPU is to execute the user's program. To do this it executes a BASIC interpreter encoded in ROM located in blocks 2 and 3 of memory. The user's program is stored in R/W in block 0. The main function of the PPU is to perform I/O and certain other activities. A communications protocol involving shared memory is the basis of LPU/PPU communication.

The LPU and PPU are each processors that, in isolation, can command 16-bit memory address spaces. The PPU does in fact have access to such a 64K word portion of memory; i.e., block 0 and block 1. Assembly language coding for the PPU can, in fact, ignore the Memory Address Extension scheme altogether, and simply consider the designations of block 0 and block 1 as an artificial (but necessary) distinction between the two halves of its memory space. For the LPU, however, the 64K address space is split into parts of equal size (32K words) and logically distributed among blocks of memory, the sum of whose address space is far in excess of that of the processor. In the scheme embodied by the MAE the LPU can also access the same memory that the PPU does. This gives rise to the need for the Dual Port Memory Controller, whose function is to resolve conflicts arising when the LPU and PPU try simultaneously to access the same block of memory.

The CRT Memory Access Port is a device that can access memory on behalf of the CRT. It is not connected with the Graphics option; the Graphics option receives its data through PPU-controlled I/O. The CRT Memory Access Port provides ongoing access to the information stored in the system-managed CRT buffer in Block 0. The alphanumeric display is formed on the basis of that information, which must be re-read each time the CRT screen is to be refreshed.

Neither the LPU nor the PPU are homogeneous monolithic entities. Each is composed of smaller functional units which are LSI chips.

Among these units are a BPC 60, IOC 62, and for the LPU only, an EMC 64. The BPC's used in the LPU and PPU are of identical design. So are the IOC's. The main functions of a BPC are to fetch instructions from memory, execute most instructions that reference memory, execute various instructions that perform bit-manipulation, and to accomplish program branching. Thus, the BPC's are relatively general purpose devices, and each serves more or less the same general function in the LPU and PPU. The main functions of the IOC are to provide a framework for I/O and to provide certain instructions for manipulating firmware stacks. The reason the PPU has an IOC is to obtain both those capabilities. The LPU, however, does not do I/O, and contains an IOC merely to obtain the use of the stack instructions. The main function of the EMC is to perform BCD arithmetic. That is strictly an LPU activity; therefore the PPU is not equipped with an EMC. The detailed attributes of the various units comprising the LPU and PPU are discussed in the next section.

Also shown in FIG. 43 is the PPU-managed I/O Data Bus 68 and the various peripherals that are normally permanently connected to it. The manner in which I/O is accomplished is discussed in the section below concerning the IOC. The notion of a select code as the address of a peripheral will be fully explained at that time. At this point, however, it is appropriate to point out that, in general, two peripherals cannot have the same select code. But the keyboard and the internal thermal printer both have select code O. This is a special case that doesn't cause any problems because the keyboard is strictly an input device, and the printer is strictly an output device.

There now follows a description of the LPU hardware. Since the hardware description of the PPU is a subset of the LPU hardware description, the PPU will not be described separately. Neglecting for the moment the fact that the IOC's are put to different uses, the hardware attributes of the LPU and the PPU are the same, except that the PPU has no EMC.

HARDWARE DESCRIPTION OF THE LPU

The LPU 30 consists of seven integrated circuits mounted on a ceramic substrate. Of these, three are N-channel MOS LSI chips. The remaining four chips are entirely bi-polar and serve as buffers to connect the LSI circuitry of the other chips to circuitry external to the substrate. Because the processor is an assemblage of components mounted on a substrate, it is often referred to as the "hybrid", "hybrid micro-processor", or simply as the "processor". FIG. 44 illustrates the manner in which the processor is physically connected to external circuitry.

FIGS. 45 and 46 are simplified block diagrams of the LPU and PPU, respectively. The LSI chips are the Binary Processor Chip (BPC), Input-Output Controller (IOC), and for the LPU only, the Extended Math Chip (EMC). All of the processing capability of the processor resides in those three chips; except for inversion the four Bi-Directional Interface Buffers (BIB's) are logically powerless. The three LSI chips communicate among themselves, and also with the outside world, via a collection of control signals and a 16-bit bus called the IDA Bus (IDA stands for Instruction/Data/Address). The processor uses 16-bit addressing for a maximum memory size of 64K words, and implements a single level of indirect addressing.

The IDA Bus is buffered as it leaves the hybrid, but the control signals are not. The BIB's are grouped together to buffer the IDA Bus in a way that allows it to perform two different functions. Each BIB can buffer eight bits of the IDA Bus. Two BIB's are grouped together to connect the IDA Bus to the external memory; those BIB's are called the Memory BIB's. The remaining two BIB's are grouped together to connect the IDA Bus to the IOD Bus. The IOD Bus (I/O Data Bus) is the data bus that serves peripheral devices. Accordingly, the BIB's connecting the IDA Bus with the IOD Bus are called the Peripheral BIB's. The Memory BIB's are enabled by a circuit (external to the hybrid) which detects memory traffic on the IDA Bus. The Peripheral BIB's are controlled by the IOC as the various types of input-output operations are performed.

FIG. 47 illustrates the nature of the BIB's. Each bit of the IDA Bus is buffered in both directions by tri-state buffers controlled by non-overlapping buffer enable signals.

The term "memory" will be used to refer to any addressable memory location, regardless of whether that location is physically within the hybrid micro-processor, or external to it. The term "external memory" refers to memory that is not physically within the hybrid. The term "register" refers to various storage locations within the hybrid micro-processor itself. These registers range in size from 1 to 16 bits. Most of the registers are 16 bit registers. The term "addressable register" refers to a register within one of the LSI chips that responds as memory when addressed. Most registers are not addressable. In most of the discussions that follow the context clarifies whether or not a register is addressable, so that it has been deemed unnecessary to explicitly differentiate between addressable and non-addressable registers. Those registers that are addressable are included in the meaning of the term "memory". The term "memory cycle" refers to a read or write operation involving a memory location.

The first 32 (decimal) memory addresses do not refer to external memory. Instead, these addresses (0–$37_8$) are reserved to designate addressable registers within the micro-processor. FIG. 48 lists these registers.

Most of the traffic on the IDA Bus has to do with memory. Both address of memory locations, and the contents of those locations (data and machine-instructions) are transmitted over the same 16-bit bi-directional bus (i.e., the IDA Bus). Further, memory can be physically distributed along the Bus. Each of the three chips in the processor contains registers which are addressable, and addressable memory also exists external to the processor.

A memory cycle involves some control lines as well as the IDA Bus. Start Memory ($\overline{STM}$) is used to initiate a memory cycle by identifying the contents of the IDA Bus as an address. Either one of two memory complete signals is used to identify the conclusion of a memory cycle. These are Unsychronized Memory Complete ($\overline{UMC}$) and Synchronized Memory Complete ($\overline{SMC}$). A line called Read/Write (RDW) specifies the direction of data movement; out of or into memory, respectively.

Each element in the system decodes the addresses for which it contains addressable memory. To initiate a memory cycle, an element of the processor puts the address of the desired location on the IDA Bus, sets the Read/Write line, and gives Start Memory. Then, elsewhere in the system the address is decoded and recognized, and that agency begins to function as memory. It is part of the system definition that whatever is on the IDA Bus when a Start Memory is given is an address of a memory (or register) location.

Referring to FIGS. 49 and 50, here is a complete description of the entire process: An originator originates a memory cycle by putting the address on the IDA Bus, setting the Read/Write line, and giving a Start Memory. The respondent identifies itself as containing the object location of the memory cycle, and handles the data. If the originator is a sender (write) it puts and holds the data on the IDA Bus until the respondent acknowledges receipt by sending a Memory Complete signal. If the originator is a receiver (read) the respondent obtains and puts the data onto the IDA Bus and then sends Memory Complete. The originator then has one clock time to capture the data; no additional acknowledgement is involved.

The IOC generates a signal called $\overline{BYTE}$ that affects memory operation. $\overline{BYTE}$ signifies that a memory cycle is to involve a left-half or right-half of a word rather than the entire word. The IOC is the only entity that is allowed to generate $\overline{BYTE}$, which is used during the execution of certain IOC machine-instructions (the place- and withdraw-byte instructions).

During a read memory cycle the memory can supply the entire word regardless of the status of the $\overline{BYTE}$ line; the IOC will automatically extract the desired byte from the supplied word. However, during a write memory cycle the memory must merge the transmitted byte with the existing other half of the word (which is already in a memory). The transmitted byte will be sent as the left-half or right-half of a word (that is, on the upper eight bits or on the lower eight bits of the IDA Bus), as is appropriate for whichever byte it is supposed to be. The IOC supplies a separate signal ($\overline{BL}$—Byte Left Not) to the memory. $\overline{BL}$ is a steady state signal valid for the duration of the memory cycle.

When acting as memory themselves, none of the BPC, IOC, or EMC utilize the $\overline{BYTE}$ line during a write memory cycle. This means that a byte can be read from a register in any of those chips, but that only entire words can be written to those registers.

Among the several service functions performed by the BPC, for the IOC and EMC, is the generation of a signal called RAL (Register Access Line). This occurs whenever an address on the IDA Bus is within the range reserved for register designation. RAL functions to prevent the external memory from responding to any memory cycle having such an address.

The next several sections involve references to some of the machine-instructions implemented by the processor. This seems unavoidable, since something has to be explained first, even though it is likely to reference material not yet explained. If the context does not make the function of an instruction clear, refer to one of the condensed summaries in FIGS. 67, 68, 69, and 70.

There now follows a functional description of the BPC 60.

The BPC has two main functions. The first is to fetch machine-instructions from memory for itself, the IOC, and for the EMC. A fetched instruction may pertain to one or more of those chips. A chip that is not associated with a fetched instruction simply ignores that instruction. The second main function of the BPC is to execute the 56 instructions in it own repertoire. These instructions include general purpose register and memory reference instructions, branching instructions, bit manipulation instructions, and some binary arithmetic instructions. Most of the BPC's instructions involve one of the two accumulator registers: A and B.

There are four addressable registers within the BPC, and they have the following functions: The A and B registers are used as accumulator registers for arithmetic operations, and also as source or destination locations for most BPC machine-instructions referencing memory. The R register is an indirect pointer into an area of read/write memory designated to store return addresses associated with nests of subroutines encountered during program execution. The P register contains the program counter; its value is the address of the memory location from which the next machine-instruction will be fetched.

Upon the completion of each instruction the program counter (P register) has been incremented by one, except for the instructions JMP, JSM, RET, and SKIP instructions whose SKIP condition has been met. For those instructions the value of P will depend on the activity of the particular instruction.

Indirect Addressing

Indirect addressing is a technique in which an instruction that references memory treats the first one or more references as an intermediate step in referencing the final destination. An intermediate reference yields the address of the next location to be referenced. When an intermediate location can point to yet another intermediate location, such addressing is termed multi-level indirect addressing. The BPC implements single-level indirect addressing for all memory references except those of a single special case. That special case occurs during an interrupt. Indirect addressing is not a property of the memory; it is property of the chips that use the memory. Any chip that is to implement instructions employing indirect addressing must contain a special gear works for that purpose.

To indicate indirect addressing for a memory reference instruction, bit 15 of that particular memory reference instruction will be set. During execution, the contents of the referenced location will be read, and its entire 16-bit contents treated as the address of the final destination to be read from or written into.

Memory Reference Instructions & Page Addressing

Machine-instructions fetched from memory are 16-bit instructions. Some of those bits represent the particular type to which the particular instruction belongs. Other bits differentiate the instruction from others of the same type. If a BPC machine-instruction is one that involves reading from, storing into, or otherwise manipulating the contents of a memory location, it is said to be a memory reference instruction. Load into A (LDA), Store from B (STB), and Jump (JMP) are examples. There are 14 memory reference instructions and they each contain bits to represent the address of the location that is to be referenced by the instruction. Only ten bits are devoted indicating the address to be referenced. Those ten bits represent one of $1024_{10}$ locations on either the base page or the current page of memory. An additional bit in the machine-instruction indicates which. As far as the processor is concerned, its base page is always a particular, non-changing, range of addresses, exactly $1024_{10}$ in number. A memory reference machine-instruction fetched from any location in memory (i.e., from any value of the program counter) may directly reference (that is, need not use indirect addressing) any location on the base page.

The base page addresses are $000000_8$–$000777_8$ and $177000_8$–$177777_8$. FIG. 51 depicts the base page.

There are two types of current pages. Each type is also $1024_{10}$ consecutive words in length. Except for base page references, a memory reference machine-instruction can directly reference only locations that are on the same current page as it; that is, locations that are within the page containing the current value of the program counter (P). (Off-page references that are not base page references must be made using indirect addressing.) Thus the value of P determines the particular collection of addresses that are the current page at any given time. This is done in one of two distinct ways, and the particular way is determined by whether the signal called RELA is grounded or not. If RELA is ungrounded, the BPC is said to address memory in the "relative" mode. If RELA is grounded it is said to operate in the "absolute" mode. Both the BPC in the LPU and the BPC in the PPU operate in the relative addressing mode.

During the execution of each memory reference machine-instruction the BPC forms a full 16-bit address based on the ten bits of address contained within the instruction. How the supplied ten bits are manipulated before becoming part of the actual address, and how the remaining six bits are supplied, depends upon whether the instruction calls for a base page reference or not, and upon whether the addressing mode is relative or absolute. The differences are determined primarily by the two different definitions of the current page; one for each mode of addressing. The description for absolute addressing will be omitted, since that mode of addressing is not used. Base page addressing is the same in either mode.

In relative addressing there are as many possible current pages as there are values of the program counter. In the relative addressing mode a current page is the $512_{10}$ consecutive locations prior (that is, having lower valued addresses) to the current location (value of P), and the $511_{10}$ consecutive locations following the current location.

Base Page Addressing

All memory reference machine-instructions include a 10-bit field that specifies the location referenced by the instruction. What goes in this field is a displacement from some reference location, as an actual complete address has too many bits in it to fit in the instruction. This 10-bit field is bit 0 through bit 9. Bit 10 tells whether the reference location is on the base page, or someplace else. Bit 10 is called the B/C bit, as it alone is used to indicate base page references. Bit 10 will be a zero if the reference is to the base page, and a one if otherwise (current page).

It is the responsibility of the assembler to control the B/C bit at the time the machine-instruction is assembled. It does this easily enough by determining if the address of the operand (or its "value") of an instruction is in the range of $177{,}000_8$ through $177{,}777_8$, or, 0 through $777_8$. If it is, then it is a base page reference and B/C is made a zero for that instruction.

If bit 10 is zero for a memory reference instruction (base page reference), the 10-bit field is sufficient to indicate completely which of the 1024 locations on the base page is to be referenced. There are two ways to describe the rule that is the correspondence between bit patterns in the 10-bit field, and the locations that are the base page: (1) the least significant 10 bits of the "real address" (i.e., $177{,}000_8$ through $777_8$) are put into the 10-bit field, bit for bit; (2) as a displacement between $+777_8$ and $-1000_8$ about 0, with bit 9 being the sign.

The 32 register addresses are considered to be a part of the base page.

Instructions on any page can make references to any location on the base page without using indirect addressing. This is because the B/C bit designates whether the 10-bit field in the instruction refers to the base page or to the current page. If B/C is a zero (B), the BPC automatically assumes the upper bits are all zeros, and thus the 10-bit field refers to the base page. If B/C is a one (C), the top bits are taken for what they are, and the current page is referenced (whichever it is).

Current Page Addressing

Current page addressing refers to memory reference instructions which reference a location which is not on the base page. The same 10-bit field of the machine-instruction is involved, but the B/C bit is a one (C). Now, since there are more than 1024 locations that are not the base page, the 10-bit field by itself, is not enough to completely specify the exact location involved.

FIG. 52 illustrates relative addressing. Relative current page addressing is done much the same way as base page addressing. The 10-bit field in the memory reference instructions is encoded with a displacement relative to the current location.

Bit 9 (the 10th, and most significant bit of the 10) is a sign bit. If is is a zero, then the displacement is positive, and bits 0–8 are taken at face value. It bit 9 is a one, a displacement is negative. Bits 0–8 have been complemented and then incremented (two's complement) before being placed in the field. To get the absolute value of the displacement, simply complement them again, and increment, ignoring bit 9.

Indirect addressing allows page changes because the object of an indirect reference is always taken as a full 16-bit address. Indirect addressing is the method used for an instruction on a given page to either reference a memory location on another page (LDA, STA, etc.), or, to jump (JMP or JSM) to a location on another page.

Subroutines

The processor implements subroutines in the following way. The JSM memory reference instruction is used to cause a jump (change in value of P) to the start of the subroutine. Also as part of the JSM, the BPC saves the value of P that corresponds to the word of programming that is the JSM. That value is saved in a section of read/write memory called the return stack.

The return stack is a group of contiguous locations, whose starting-address-less-one was initially stored in the R register (in the BPC). Thus, R is an indirect pointer. What a JSM does is to increment the value in R and then use that new value as the address at which to store the value of P that is to be saved. Once this activity is complete, P is actually set to the address of the first word of the subroutine and its execution commences.

A subroutine is terminated with a RET n instruction. The essence of this instruction is to read the location that R points at, set P to that value plus n, and then decrement R. The most common return is a RET 1. Different values of n permit different returns corresponding to error or other special conditions. For instance, interrupt service routines are terminated with a RET 0.

Subroutines can be nested as deep as the size of the return stack will allow. The subroutines themselves can be either in ROM or read/write memory.

Flags

The BPC is capable of branching based on the condition of each of four signals externally supplied to the chip. These signals are Decimal Carry (DC), Halt (HLT), Flag (FLG), and Status (STS). In the LPU the EMC acts as a source for Decimal Carry, which represents an overflow condition during certain arithmetic operations performed by the EMC. There is no EMC in the PPU and the DC signal in the PPU is controlled by the CRT. It is used to indicate the duration of CRT retrace.

Bus Requests and Interrupts

Bus Request and Interrupt are two protocols that involve inter-chip communication. Bus Request ($\overline{BR}$) provides a way for a chip in the processor, or even a device external to the processor, to request unfettered use of the IDA Bus. A signal called Bus Grant (BG) is generated if all chips and any other interested entities agree to do so. The requesting agency can use the IDA Bus for whatever purpose it wants, (typically to do memory cycles). During the time that Bus Grant is in effect all chips suspend their activity. Bus Grants can be given even in the middle of the execution of an instruction. Because of this, the chips do not grant bus requests indiscriminately. Furthermore, a Bus Grant not requested by the IOC is used by the IOC to create Extended Bus Grant (EXBG), which is routed from chip to chip in a definite order; chips or other entities not at the top of the chain can exercise the right not to pass along the signal. This allows a Bus Request from the IOC to have a higher priority than any entity further down the chain. Even if both are requesting the bus, the IOC can "steal" EXBG by not passing it along. Further down the chain from the IOC, BG serves to indicate only that the bus is being granted to somebody; a particular requesting device must wait until it sees EXBG before it can use the bus.

The Bus Request protocol includes these additional considerations: Any entity on the bus may ground GB as long as BG is not already being given. This allows any entity anywhere in the chain to protect its own access to the bus against all agencies. Further, the BPC itself refuses to issue a BG as long as any memory cycle is in progress.

FIG. 53 illustrates the usage of the Bus Request, Bus Grant, and Extended Bus Grant protocol.

Following is a description of how the inter-chip mechanism for interrupt acts. During an instruction fetch a line called Interrupt ($\overline{INT}$) can signal the other chips that the IOC has agreed to allow an interrupt requested by a peripheral. The management of this decision is complicated and its description occurs during the description of the IOC. However, once the decision is made, the IOC signals the BPC with $\overline{INT}$. This has to occur during a certain period of time ending with the end of the instruction fetch. (A signal called SYNC identifies the instruction fetch.)

What the chips in the system must do when an interrupt occurs is abort the execution of the instruction just fetched (it will be fetched again, later). Then the BPC executes the instruction JSM $10_8$ indirect. Register address $10_8$ is located in the IOC, and is the Interrupt Vector register (IV). That register is a pointer into a stack of addresses of the starting locations for the various interrupt service routines. These routines handle the traffic needed by the interrupting peripheral. A special mechanism in the IOC sets the bottom four bits of IV to correspond to the particular peripheral that requested the interrupt. Thus IV points to different service routines, according to which peripheral interrupted.

In any event, the JSM $10_8$ indirect causes the value of P for the aborted instruction to be saved on the return stack. A RET 0 at the end of the service routine results in that very instruction being fetched over again, at the conclusion of the service routine.

There now follows a functional description of the IOC 62.

The IOC has two main functions. One is to manage the transfer of information between the processor and external peripheral devices. This is done by providing capabilities classified as Standard I/O, Interrupt, and Direct Memory Access (DMA). The second main function is to provide machine-instructions allowing software management of stacks in Read/Write Memory.

To implement these tasks the IOC contains a number of addressable registers. The function of each will be discussed as the various topics of IOC operation are covered.

General Information About I/O

The IOC allows up to 16 peripheral devices to be present at one time. Each peripheral device is connected to the IOD Bus, Peripheral Address Bus, and the various control signals necessary for that particular device's operation. Individual I/O operations (exchanges of single words) occur between the processor and one peripheral at a time, although Interrupt and DMA modes of operation can cause automatic interleaving of individual operations. A select code transmitted by the Peripheral Address Bus ($\overline{PAB0}$-$\overline{PAB3}$) identifies which of the 16 devices is the object of an individual I/O operation.

In addition, the peripheral interface is the source of the Flag and Status bits for the BPC instructions SFS, SFC, SSS, and SSC. Since there can be many interfaces, but only one each of Flag and Status, only the interface addressed by the select code is allowed to ground these lines. Their logic is such that if the addressed peripheral is not present on the I/O Bus, Status and Flag are logically false.

$\overline{IC1}$ and $\overline{IC2}$ are two control lines that are sent to each peripheral interface by the IOC. The state of these two lines during the non-DMA transfer of information can be decoded to mean something by the interface. Just what 'something' will be is subject to agreement between the firmware designer and the interface designer; it can be anything they want, and might not be the same for different interfaces. These two lines act as a four position mode switch on the interface, controlled by the IOC during an I/O operation.

I/O Bus Cycles

There are no specific machine-instructions for which the IOC responds by doing I/O operations. That is, there is no single "output instruction", and no single "input instruction". The real workhorse of I/O is a thing called an I/O Bus Cycle. An I/O Bus Cycle is an exchange of a word between the IDA Bus and IOD Bus, via the Peripheral BIB's. The exchange is not of the handshake variety. I/O Bus Cycles are termed read or write I/O Bus Cycles, depending upon whether information is being read from, or written to, a peripheral.

Each of the three modes of I/O operation (Standard I/O, Interrupt, and DMA) utilize I/O Bus Cycles. After examining how an I/O Bus Cycle works, the explanation of the various modes of I/O will amount to showing different ways to initiate I/O Bus Cycles.

For example, during Standard I/O operation, an I/O Bus Cycle is initiated by a reference to one of R4 through R7 in the IOC. One way that can be done is with a BPC memory reference instruction; for instance, STA R4 (for a write cycle), or LDA R4 (for a read cycle).

The IOC includes a register called the Peripheral Address Register (PA) which is used in establishing the select code currently in use. The peripheral address is established by storing the desired select code into PA with an ordinary memory reference instruction. The bottom four bits of this register are brought out of the IOC as $\overline{PAB0}$ through $\overline{PAB3}$. Each peripheral interface decodes $\overline{PAB0}$–$\overline{PAB3}$ and thus determines if it is the addressed interface.

Consider a write I/O Bus Cycle as illustrated in FIG. 54. This is initiated with a reference to one of R4–R7. The IOC sees this as an address between 4 and 7 on the IDA Bus while $\overline{STM}$ is low. The Read line is low to denote a write operation. The IOC enables the Peripheral BIB's and specifies the direction. It also sets the control lines $\overline{IC1}$ and $\overline{IC2}$, according to which of R4 through R7 was referenced. Meanwhile, the BPC has put the word that is to be written onto the IDA Bus. Because both the Memory BIB's and Peripheral BIB's are enabled, that word is felt at all peripheral interfaces. The interface that is addressed uses $\overline{DOUT}$ to understand it's to read something, and uses $\overline{IOSB}$ as a strobe for doing it. After $\overline{IOSB}$ is given, a IOC gives [Synchronized] Memory Complete ($\overline{SMC}$) and the process terminates. The BPC has written a word to the interface whose select code matched the number in the PA register.

A read I/O Bus Cycle is similar, as shown in FIG. 55. Here the BPC expects to receive a word from the addressed peripheral interface. Read, $\overline{DOUT}$ and $\overline{BE}$ are different because the data is now moving in the other direction.

In either case, the critical signals $\overline{SMC}$ and $\overline{IOSB}$ are given by the IOC, and their timing is fixed. There can be no delays due to something's not being ready, nor is there any handshake between the interface and the IOC.

It is the responsibility of the firmware not to initiate an I/O Bus Cycle involving a device that is not ready. To do so will result in lost data, and there will be no warning that this has happened.

Standard I/O)

Standard I/O is I/O that has been explicitly programmed by the system programmer, using explicit assembly language coding. Standard I/O involves three activities:

1. Setting the peripheral address
2. Investigating the status of the peripheral
3. Initiating an I/O Bus Cycle A peripheral is selected as the addressed peripheral by storing its octal select code into a 4-bit register called PA (Peripheral Address—address $11_8$). Only the four least significant bits are used to represent the select code.

The addressed peripheral is allowed to control the Flag and Status lines. (That is, it is up to the interface to not ground Flag or Status unless it is the adddressed interface.) These lines have an electrical logic such that when floating they appear false (clear, or not set) for SFS, SFC, SSS, and SSC.

The basic idea (and it can be done in a variety of ways) is to use sufficient checks of Flag and Status before and amongst the I/O Bus Cycles such that there is no possibility of initiating an I/O Bus Cycle to a device that is not ready to handle it. One way to do this with Standard I/O is to precede every I/O Bus Cycle with the appropriate checks.

An I/O Bus Cycle occurs once each time one of R4–R7 ($4_8$–$7_8$) is accessed as memory. An instruction that "puts" something into R4–R7 results in an output (write) I/O Bus Cycle. Conversely, an instruction that "gets" something from R4–R7 results in an input (read) I/O Bus Cycle. However, there are no R4 through R7. The use of address 4–7 is just a device to get an I/O Bus Cycle started; they do not correspond to actual physical registers in the IOC.

Consider the following hypothetical case, (specially invented for purposes of illustration). Suppose it is desired to write a driver for a paper tape punch that upon a single word command can output 50 feedframes for leader. The routine is to have two entry points; one for outputting a single word of data, and one for causing the leader. Also, the punch sets the status line if it gets low on tape. Prior to calling the driver, the main program is to put the word to be outputted into DATA, and the select code of the punch in PUNSC. Such a driver is shown below.

```
PUNCH  JSM  SETUP    SET SELECT CODE, CHECK AVAILABILITY
       LDA  DATA     GET OUTPUT DATA WORD
```

-continued

| | | | | |
|---|---|---|---|---|
| 3. | | STA | R4 | OUTPUT THE DATA (IC1 = 0, IC2 = 0) |
| 4. | | RET | 1 | RETURN TO MAIN PROGRAM |
| 5. | LEADR | JSM | SETUP | SET SELECT CODE, CHECK AVAILABILITY |
| 6. | | STB | R5 | OUTPUT LEADER ( IC1 = 1, IC2 = 0) |
| 7. | | RET | 1 | RETURN TO MAIN PROGRAM |
| 8. | SETUP | LDA | PUNSC | GET SELECT CODE |
| 9. | | STA | PA | PUT IT INOT PERIPHERAL ADDRESS REG |
| 10. | | SFC | * | WAIT IF PUNCH NOT AVAILABLE |
| 11. | | SSS | BXCRS | SKIP IF PUNCH OUT OF TAPE |
| 12. | | RET | 1 | OK, DO OUTPUT OPERATION |
| 13. | BXCRS | : | | HANDLE THE OUT OF TAPE SITUATION |
| | | : | | |
| | | : | | |
| 14. | PUNSC | NOP | | TAPE PUNCH SELECT CODE |
| 15. | DATA | NOP | | OUTPUT DATA WORD |

Lines 1 and 5 invoke lines 8 through 12. Lines 8 and 9 set the select code, and line 10 checks for presence and availability (both must be "yes", or, at the interface the Flag will be false). Line 11 checks for the out-of-tape condition; it is the responsibility of the punch-interface combination to set Status high when the tape supply is low and the punch is addressed by PA. The routine is BXCRS handles the out-of-tape condition.

Lines 2 and 3 punch a word of data onto the tape. Line 3 causes a "write" (output) I/O Bus Cycle. The contents of (in this case) A are written to the addressed peripheral. Because it is R4 that is referenced, IC1 and IC2 are both zeros. The interface understands an output I/O Bus Cycle with IC1 and IC2 both zeros to be a command to punch the supplied word.

Line 6 gives the command to punch leader. Because it is a write operation referencing R5, and output I/O Bus Cycle is done with IC1=1 and IC2=0. In this instance the contents of B is sent to the punch (assume that it is ignored, however). The interface understands an output I/O Bus Cycle with IC1=1 and IC2=0 as the command to generate leader.

The 16-bit word transmitted from B need not be ignored. The punch might use it as the number of feed-frames to punch. A more general approach would be for the interface to recognize that IC1=1 and IC2=0 signifies that the accompanying word is to be decoded to determine the instruction/control information. The possibilities are numerous.

Other Possibilities

By now it is possible to recognize LDB R4 as an input operation where a word is read from the addressed peripheral and placed into B. But what about the other memory reference instructions? What, for instance, does ADA R4 do, or a CPA R4, or an ISZ R4, or even a LDB R4,I? Not all of these possibilities have every day uses, but they each work in a logically straight-forward manner.

An ADA R4 will read a word of data from the addressed peripheral, and then add it to the contents of A, leaving the result in A.

A CPA R4 will read a word of data from the addressed peripheral, and then compare that with the existing contents of A. The BPC will skip the next instruction if the two are unequal.

An ISZ R4 is an input/increment-and-skip/output instruction. It reads a word of data from the addressed peripheral and increments the resulting value. If the sum is zero, the next instruction is skipped. But in any case, the incremented value is written back to the same peripheral it came from. The interface sees a read I/O Bus Cycle followed a very short time later by a write I/O Bus Cycle.

An LDB R4,I does the obvious thing. A word of data is read from the addressed peripheral. Once the data is read it is treated exactly as if it had come from regular memory, and the action proceeds just as for any other Load B-Indirect.

The Interrupt System

The idea behind interrupt is that for certain kinds of peripheral activity, the processor can go about other business once the I/O activity is initiated, leaving the bulk of the I/O activity to an interrupt service routine. When the peripheral is ready to handle another ration of data (it might be a single byte or a whole string of words) it requests an interrupt. When the processor grants the interrupt, the program segment currently being executed is automatically suspended, and there is an automatic JSM to an interrupt service routine that corresponds to the device that interrupted. The service routine uses Standard I/O to accomplish its task. A RET O,P terminates the activity of the service routine and causes resumption of the suspended program.

The interrupt system allows even an interrupt service routine to be interrupted, and is therefore a multi-level interrupt system. It has a priority scheme to determine whether to grant or ignore an interrupt request.

The IOC allows two levels of interrupt, and has an accompanying two levels of priority. Priority is determined by select coce; select codes 0–$7_8$ are the lower level (priority level 1), and select codes $10_8$–$17_8$ are the higher level (priority level 2). Level 2 devices have priority over level 1 devices; that is, a disc drive operating at level 2 could interrupt a plotter operating at level 1, but not vice versa. Within a priority level all devices are of "equal" priority, and operation is of a first-come-first-served basis; a level 1 device cannot be interrupted by another level 1 device, but only by a level 2 device. However, priorities are not equal in the case of simultaneous requests by two or more devices on the same level. In such an instance the device with the higher numbered select code has priority. With no interrupt service routine in progress, any interrupt will be granted.

Devices request an interrupt by grounding one of two interrupt request lines ($\overline{IRL}$ and $\overline{IRH}$—one for each priority level). The IOC determines the requesting select code by means of an interrupt poll, to be described in the next paragraph. If the IOC grants the interrupt, it saves on an internal stack the existing select code located in PA, puts the interrupting select code in PA, and does a JUSM-Indirect through an interrupt table to get to the interrupt service routine.

An interrupt poll is a special I/O Bus Cycle to determine which interface(s) is (are) requesting an interrupt. An interrupt poll is restricted to one level of priority at a time, and is done only when the IOC is prepared to grant an interrupt for that level.

The interfaces distinguish an Interrupt Poll Bus Cycle from an ordinary I/O Bus Cycle through the $\overline{INT}$ line being low. Also, during this Bus Cycle $\overline{PAB3}$ specifies which priority level the poll is for. An interface that is requesting an interrupt on the level being polled responds by grounding the nth I/O Data line of the I/O Bus, where n equals the device's select code modulo eight. If more than one device is requesting an interrupt, the one with the higher select code will have priority.

The IOC has a three-deep, first-in/last-out, hardware stack. The top of the stack is the Peripheral Address register (PA-$11_8$). The stack is deep enough to hold the select code in use prior to any interrupts, plus the select codes for two levels of interrupt. When an interrupt is granted, the IOC automatically pushes the select code of the interrupting device (as determined by the interrupt poll) onto the stack. Thus the previous select code-in-use is saved, and the new select code-in-use becomes the one of the interrupting device.

It is the responsibility of the firmware to maintain an interrupt table of 16 consecutive words, starting at some Read/Write Memory address whose four least-significant bits are zeros. The words in the interrupt table are set to the starting addresses of the various interrupt service routines for use with the 16 different select codes. When a peripheral is allowed to interrupt, its select code is used to determine which interrupt service routine to JSM to. The interrupt service routine then handles the I/O operations needed by the interrupting device.

The firmware must also store the address of the first word of the interrupt table in the IV register (Interrupt Vector register, address $10_8$, located in the IOC). Those contents will merge with the select code to produce the address of the appropriate table entry. Referring to FIG. 56, a two-level indirect jump is used to arrive at the interrupt service routine. This happens automatically because the BPC generates a JSM IV, I as part of what it does during an interrupt. The IOC forces the BPC to do two consecutive "first-level" indirect accesses; it doesn't matter to the BPC whether bit 15 of IV is set or not. The IOC keeps the INT line grounded long enough to force the BPC to treat the contents of IV itself as an indirect address. This causes the BPC to read the next address (the one in the interrupt table) and treat its contents as the destination address, just as in multi-level indirect addressing. Thus, the JSM through the interrupt table is always a two-level process as shown in FIG. 56 regardless of whether bit 15 of IV is set or not. Bit 15 of IV becomes simply an address bit, helping indicate where in memory the interrupt table is located.

After the interrupt poll is complete the select code of the interrupting device is made to be the four least-significant bits of the IV register. Thus, IV now points at the word in the Interrupt Table which corresponds to the appropriate interrupt service routine. All that is needed now is a JSM IV, I, and the interrupt service routine will be under way. This is accomplished by the BPC as summarized below.

The IOC inspects the interrupt requests $\overline{IRL}$ and $\overline{IRH}$ during the time Sync is given. Based on the priority of the interrupt requests, and the priority of any interrupt in progress, the IOC decides whether or not to grant an interrupt. If it decides to allow an interrupt it immediately pulls INT to ground, and also begins an interrupt poll.

The grounding of $\overline{INT}$ serves three purposes: It allows the interfaces to identify the forthcoming I/O Bus Cycle as an interrupt poll; it causes any other chips in the system, except the BPC, to abort their instruction decode process (which by this time is in progress) and return their idle states; and it causes the BPC to abort its instruction decode and execute a JSM $10_8$, I instead.

The IOC uses the results of the interrupt poll to form the interrupt vector, which is then used by the JSM $10_8$, I. It also pushes the new select code onto the peripheral address stack, and puts itself into a configuration where all interrupt requests except those of higher priority will be ignored.

The majority of the interrupt activity described so far is accomplished automatically by the hardware. All the firmware has been responsible for has been the IV register, the maintenance of the interrupt table, and (probably) the initiation of the particular peripheral operation involved (plotting a point, backspace, finding a file, etc.). Such operations (initiated through a command given by simple programmed I/O) may involve many subsequent I/O Bus Cycles, done at odd time-intervals, and requested by the peripheral through an interrupt. It is the responsibility of the interrupt service routine to handle the I/O activity required by the peripheral without upsetting the routine that was interrupted.

It's difficult to say specific things about interrupt service routines in general; much depends upon the particulars of the host software system. The next few paragraphs examine some generalities relating to interrupt service routines, and sketch some examples.

The first observation is on the number of service routines. In general, there is not one service routine for each select code, or even for each peripheral. The usual case is collections of routines that perform related functions within the needs of a certain class of peripheral activity; each class of of activity has its own collection.

For instance, it is unlikely that there would be a single interrupt service routine for a disc. On the customer's level there are many commands in the disc's operating system. On the firmware level there are a series of routines that perform 'fundamental units' of activity, where each 'fundamental unit' involves some amount of I/O. Most commands in the user's disc operating system are made up of a series of these 'fundamental units' of activity. 'Fundamental units' of activity for the disc are things like: moving the head to a given track, reading a given sector from a track into such and such a buffer, and writing from such and such a buffer into a given sector. It is these types of activity that are most likely to have corresponding interrupt service routines.

Let's sketch a hypothetical example. Assume a fairly involved disc user's command is to be performed, one requiring reading the directory on the disc to determine the location of certain file on the disc, and then loading that file into memory. The kind of thing that happens here is to move the head to the start of the directory, read through the information in the directory sector by sector until the information about the desired file is found, moving the head to the file's location, reading its header, reading its first sector, etc., etc.

Each service routine is told or already knows which service routine follows it for the particular high level task at hand, and, if it has a choice based on the way events turn out (error condition, etc.), it knows how to handle that, too. As each new step in the sequence requiring a different interrupt service routine is reached, the concluding routine changes the appropriate entry of the interrupt table to the starting address of the next service routine. In this way a versatile collection of interrupt service routines can serve may purposes.

As another example of this, consider a tape cartridge whose internal architecture was of variable length files composed of fixed length records. Such a cartridge would resemble a disc from the user's point of view, and it is possible that some of the disc interrupt service routines would work for the cartridge, also.

And lastly, consider the case of formatted output to line printers, punches, teletypes and CRT's. Some of these devices may differ slightly in their mainline firmware drivers, but there is an excellent chance that they could use the same general purpose interrupt service routine(s).

At the beginning of an I/O operation involving interrupt the mainline firmware sets up any intial conditions that are required (e.g., selecting a buffer and setting a word count or a value of a pointer). The mainline firmware also selects the interrupt service routine by modifying an entry in the interrupt table. It also gives the first I/O Bus Cycle, which wakes up the peripheral and gets things going. After this first I/O Bus Cycle the mainline firmware can go on about its other business.

Some questions need to be answered: "How does a peripheral know if it is supposed to interrupt, or operate in some other mode?" (A Low-cost calculator using the identical peripheral might not use interrupt, or, on a given calculator a peripheral may use interrupt sometimes but not others); "How can the calculator proceed with other activity when it has essentially passed over unfinished business; might not things run amuck?"; and lastly, "How does the peripheral know when to stop interrupting, especially in the case of an output operation where an arbitrary amount of information is transmitted?"

As for how a peripheral knows whether to use interrupt of simple I/O, there are several possibilites; it might never use interrupt; it might always use interrupt, it might use interrupt always with one mainframe but not with another, due to different interface cards; it might have an interface card that knows what calculator it's in, and thus use interrupt or not; or, it might have an interface that allows the calculator to tell the peripheral when to begin using the interrupt system, and when to stop.

The last possibility could work like this: The initial I/O Bus Cycle given by the mainline firmware could reference, say, R5. This would be understood by the interface as a command to interrupt as soon as the device is ready to handle the next ration of data. A scheme like this allows I/O statements referencing R4 free for simple, non-interrupt operation.

The calculator could be almost anywhere in its internal coding when an interrupt is granted. Since the code is suspended with a JSM, it is obvious that the way to get back to the right spot with a RET O,P. But it won't do any good to come back if the items in memory related to the routine are not the same. The interrupt service routine must save and later restore any memory location that will be directly or indirectly disturbed by the activity of the service routine. This could include the extend and overflow registers of the BPC, decimal carry and shift-extend of the EMC, and possibly CB and DB of the IOC.

The main system software must be designed with interrupt in mind to take full advantage of the interrupt system. This generally involves an entirely different approach to I/O than in less sophisticated machines where there is no interrupt capability. The following example illustrates the sort of approach used with interrupt systems.

Consider the following program segment:

```
50      PRINTUSING 100;A,B,C,D$
55      X = (A + B + C)/3
60      D$ = "Y"
        :
        :
        :
100     IMAGE 3(6D . 5D),20A
```

The PRINTUSING statement of line 50 is to be done under interrupt. Basically the idea is that once the firmware that executes the PRINTUSING statement has gotten things started, the calculator can begin to execute the next line in the program. In this example it is safe to immediately execute line 55, as it will not affect the on-going process of line 50. But line 60 is another matter. Whether or not it is safe to execute line 60 depends upon how the main system works.

If sufficient memory is available, the usual solution to this problem is to save the values of A, B, C and D$ in a buffer. This allows program execution to continue; in particular, line 60 can be executed in turn, even though the activity associated with line 50 may not yet have been completed. This means of carrying out that activity is to set an interrupt service routine in place, with pointers to the buffer to be outputted. Then the printer interface is instructed to request that the data be sent to it. The printer then interupts each time it is ready for more data.

In some cases the peripheral and the corresponding firmware may each know in advance how many items are involved, and each just ceases I/O activity when everything is done.

In the case of arbitrary length transfers, or transfers controlled by one agency, however, some agency has to decide when the activity is complete, and notify the other agency. For most output operations, and for input operations involving dumb peripherals, the mechanism for this is in the firmware. What the peripheral will do is interrupt as soon as it is available following the exchange of some data, even if the previous exchange was the "last" one (which the peripheral didn't know). It will do this, unless the interrupt mode in the interface is shut off before it has the chance to interrupt again.

For interrupt protocol reasons the peripheral will, while requesting an interrupt, keep its Interrupt Request line active until it gets a (data) I/O Bus Cycle for that device. (It has to be this way because this is the only way a device requesting an interrupt can determine that it has been granted an interrupt. The mere doing of an interrupt poll for that level is not enough; a device on the same level but with a higher select code may be the winner. Nor can an interface tell if it is the winner by looking at the PA lines; the only signal usable as a strobe for that is given before they are set up). The consequences of this are that once the interrupt is granted the interrupt service routine cannot decline to exchange more data and terminate itself by simply executing only a RET O,P. To do so would leave the interface thinking it never got recognized (no data I/O Bus Cycle), while the IOC thinks the interrupt is over. So on the next instruction fetch the interrupt is granted again! (Assuming the priority situation has not changed.)

So, unless the device is sophisticated enough to know, by itself, not to interrupt after the last exchange, the firmware must disestablish the interrupt mode within the peripheral. This is easy enough to do, and could be done by taking advantage of the ability to set $\overline{IC1}$ and $\overline{IC2}$ during an I/O Bus Cycle (i.e., STA R5 or STA R6, perhaps with a special code in A). So the result is a different (and perhaps an extra) trailing I/O Bus Cycle to put the interrupt mode of the peripheral to sleep.

The last things done by an interrupt service routine are to: (if necessary) shut off the interrupt mode of the interface; restore any saved values; and to execute a RET O,P.

The RET O part acts to return to the routine that was interrupted, so that its execution will continue. The P acts to pop the peripheral address stack and adjust the IOC's internal indicator of what priority level of interrupt is in progress. By popping the peripheral address stack, PA is set back to whatever it was prior to the most recent interrupt.

The entire interrupt system can be turned off by a DIR instruction. After this instruction is given the IOC will refuse to grant any interrupts whatsoever, until the interrupt system is turned back on with the instruction EIR. While the IOC won't grant any interrupts, the RET O,P works as usual so that interrupt service routines may be safely terminated, even while the interrupt system is turned off.

Direct Memory Access

Direct Memory Access is a means to exchange entire collections of data between memory and peripherals. Such a collection must be a series of consecutive memory locations. Once started, the process is mostly automatic; it is done under control of hardware in the IOC, and regulated by the interface.

The DMA process can transfer data in two ways: single words are transferred one at a time, on a cycle-steal basis; strings of words can be transferred consecutively in a burst mode. In either instance data is transferred one word at a time. To transfer a word, a peripheral signals the IOC, which then requests control of the IDA Bus with $\overline{BR}$. That results in an external halt in all other system activity on the Bus for the duration of the peripheral's request for DMA service. Herein lies the difference between burst mode and cycle-steal operation; in cycle-steal operation the peripheral ceases to request service after one word is transferred, and requests service again when ready, while in the burst mode the request is held to allow a series of high-speed consecutive transfers to occur.

During a DMA transfer of a collection of data the IOC knows the next memory location involved, whether input or output, which select code, (and possibly) whether or not the transfer of the entire collection is complete. This information is in registers in the IOC, which are set up by the firmware before the peripheral is told to begin DMA activity.

Actual transfers are initiated at the request of the interface. To request a DMA transfer a device grounds the DMA Request line ($\overline{DMAR}$). Since there is only one channel of DMA hardware, and one DMA Request line, only one peripheral at a time may use DMA. A situation where two or more devices compete for the DMA channel must be resolved by the firmware, and it is absolutely forbidden for two or more devices to ground $\overline{DMAR}$ at the same time. (A data request for DMA is not like an interrupt request; there is no priority scheme, and no means for the hardware to select, identify and notify an interface as the winner of a race for DMA service.) Furthermore, a device must not begin requesting DMA transfers on its own; it must wait until instructed to do so by the firmware.

The DMA process is altogether independent of the operation of standard I/O and of the interrupt system, and except for theft of the IDA Bus for memory cycles, does not interfere with them in any way.

DMA transfers as described above are referred to as the DMA Mode. The DMA Mode can be disabled by assembly language machine instructions in two ways: by a DDR (Disable Data Request), or by a PCM (Pulse Count Mode, which is described later). A DDR causes the IOC to simply ignore requests for DMA service; no more, no less. The instruction DMA (DMA Mode) causes the IOC to resume DMA Mode operation; DMA cancels DDR, and vice versa. DMA also cancels PCM, and vice versa. Also, DDR cancels PCM, and vice versa.

Also, the IOC turns on as if it has just been given a DDR. DDR (along with DIR) is useful during system initializiation (or possible error recovery) routines, where it is unsafe to allow any system activity to proceed until the system is properly initialized (or restarted).

There are several registers that must be set up prior to the onset of DMA activity. These are shown below:

| NAME | ADDRESS | MEANING |
|---|---|---|
| DMAPA | (=13) | DMA Peripheral Address |
| DMAMA | (=14) | DMA Memory Address |
| DMAC | (=15) | DMA Count |
| DMAD | — | DMA Direction |

The four least significant bits of DMAPA specify the select code which is to be the peripheral side of the DMA activity. During an I/O Bus Cycle given in response to a DMA data request, the content of the PAB lines will be determined by the four least significant bits of DMAPA, rather than by the PA register.

DMAC can, if desired, be set to $n-1$, where n is the number of words to be transferred. During each transfer the count in DMAC is decremented. During the last transfer the IOC automatically generates signals which the interface can use to recognize the last transfer. In the case of a transfer of unknown size, DMAC should be set to a very large count, to thwart the automatic termination mechanism. In such cases it is up to the peripheral to identify the last transfer.

DMAMA is set to the address of the first word in the block to be transferred. This is the lowest numbered address; after each transfer DMAMA is automatically incremented by the IOC. A separate one-bit register (DMAD) exists to specify the direction of the transfer; DMAD is controlled by its own set and clear machine instructions, and is not addressable.

Once the control registers are set up, a "start DMA" command is given to the interface through standard programmed I/O. The "start DMA" command is an output I/O Bus Cycle with a particular combination of $\overline{IC1}$, $\overline{IC2}$, (and perhaps) a particular bit pattern in the transmitted word. The patterns themselves are subject to agreement between the firmware designer and the interface designer. Sophisticated peripherals using DMA in both directions will have two start commands, one for input and one for output. It's also possible that other information could be encoded in the start command (the number of words to be transferred, for instance).

The interface exerts $\overline{DMAR}$ low whenever it is ready to exchange a word of data. When $\overline{DMAR}$ goes low the IOC requests control of the IDA Bus. When granted the Bus, the IOC initiates an I/O Bus Cycle with the PA lines controlled by DMA Peripheral Address, and does a memory cycle. (The order of these two operations depends upon the direction of the transfer.)

Next the IOC increments DMA Memory Address and decrements DMA Count.

The processor employs an automatic DMA termination indicator that involves $\overline{IC2}$. Automatic termination is usuable only when the collection size is known in advance, and is based on the count in DMAC going negative.

Recall that at the start of the operation DMAC is set to $n-1$, where n is the size of the transfer in words. During the transfer of the nth word, the IOC will signal the interface by temporarily exerting $\overline{IC2}$ high during the I/O Bus Cycle for that exchange. The interface can detect this and cease DMA operations.

For DMA transfers of unknown size, the peripheral determines when the transfer is complete, and flags or interrupts the processor.

The Pulse Count Mode is a means of using the DMA hardware to acknowledge, but do nothing about, some number of DMA requests. The Pulse Count Mode is initiated by a PCM, and resembles the DMA Mode, but without the memory cycle. The activities of the registers DMAPA, DMAC, DMAMA, and DMAD remain as described for DMA Mode operation. The only difference is that no data is exchanged with memory; no memory cycle is given. (The IOC even requests the IDA Bus, but when granted it, releases it without doing the memory cycle.)

A dummy I/O Bus Cycle is given, and DMAC decremented. Also, the automatic termination mechanism still functions; in fact, that is the object of the entire operation. The Pulse Count Mode is intended for applications like the following: Suppose it were desired to move a tape cartridge a known member of files. The firmware puts the appropriate number into DMAC, gives PCM, and instructs the transport to begin moving. The transport would give a DMA Request each time it encounters a file header. In this way the DMA hardware and the automatic termination mechanism count the number of files for the cartridge PCM cancels DMA and DDR. Both DMA and DDR cancel PCM.

The pulse count apparatus exists within the processor, but is not employed in the present calculator.

Stack Operations

A stack is a series of consecutive memory locations. A stack is treated as a unit of memory having a single 'depository' into which or from which all information in the stack must pass in a first-in, last-out, order. The depository is the 'top of the stack'. A stack that can contain one hundred words of information is one hundred words 'deep'.

Consider a 100 word stack containing one entry. That entry would be 'on top of the stack' and the remaining 99 words 'below' the top of the stack would be 'empty'. Suppose a second entry is made. Then this latest entry is on top of the stack, the first entry is just below it, and 98 empty words below that.

Data is removed from a stack in a way that is the reverse of the way it is put in: the top of the stack is deleted and the entries below 'move up' one location, with the entry formerly one below the top of the stack now becoming the new top of the stack.

Physically, a stack can be implemented in hardware or in firmware. In a genuine hardware stack all the entries actually move from their present locations to the next one, and, they all do it at the same time as a single operation. Obviously, this requires a considerable amount of interconnection between the locations in the stack.

A stack that is implemented in firmware is simply a series of consecutive memory locations, accessed indirectly through a pointer. Instead of the entries in the stack changing their physical locations in the memory during additions and deletions, the value of the pointer is incremented or decremented.

The IOC implements some assembly language stack manipulation instructions. Two registers are provided as a stack pointers; C and D. There are eight place and withdraw instructions for putting things into stacks and getting them out. Furthermore, the place and withdraw instructions can handle full 16-bit words, or pack 8-bit bytes in words of a stack. And last, there are provisions for automatic incrementing and decrementing of the stack pointer registers, C and D.

The mnemonics for the place and withdraw instructions are easy to decipher. All place instructions begin with P, and all withdraw instructions begin with W. The next character is a W or B, for word or byte, respectively. The next character is either a C or D, depending upon which stack pointer is to be used. There are eight combinations, and each is a legitimate instruction.

A PWD A,I reads as follows: place the entire word of A into the stack pointed to by D, and increment the pointer before the operation. The instruction WWC B,D is read: withdraw an entire word from the stack pointed to by C, put the word into B, and decrement the stack pointer D after the operation.

The place and withdraw instructions outwardly resemble the memory reference instructions of the BPC: a mnemonic followed by an operand that is understood as an address, followed by an optional 'behavior modifier', The range of values that the operand may have is restricted, however. The value of the operand must be between 0 and 7, inclusive. Thus, the place and withdraw instructions can place from, or, withdraw into, the first eight registers. These are A, B, P, R, and R4 through R7. Therefore, the place and instructions can initiate I/O Bus Cycles; they can do I/O.

The place and withdraw instructions automatically change the value of the stack pointer each time the stack is accessed. In the source text an increment or decrement is specified by including a ,I or a ,D respectively, after the operand.

Regardless of which of ,I or ,D is specified, a place instruction will do the increment or decrement of the pointer prior to the actual place operation. Contrariwise, the withdraw instructions do the increment or decrement after actual withdraw operation. The reason for this is that it always leaves the stack with the pointer pointing at the new 'top-of-the-stack', and allows intermixing of place and withdraw instructions without adjustment of the pointer.

Because the stack in memory is composed of words, rather than bytes, some means are required to extend the addressing of the pointer registers to include designation of bytes within the addressed word.

Left-right indication of bytes is accomplished with a signal called $\overline{BL}$. $\overline{BL}$ (Byte Left Not) is in turn controlled by bit 0 of either the C or D registers, as shown in FIG. 57. Sixteen-bit addressing is maintained by providing an additional one-bit register for use with each stack pointer register. The non-addressable registers are called CB (C Block) and DB (D Block). They are designated "block" because, as the most-significant bit of the word pointer value, they divide the address space into two halves, or "blocks". It is unfortunate that this terminology was chosen (it was done before the MAE was developed). Do not confuse these "blocks" with blocks 0 through block 3 of the Memory Address Extensioon scheme.

FIG. 57 shows how CB is used with C for place-byte and withdraw-byte operations that use the C register as the stack pointer. For such operations that use the D register instead, DB acts as the most-significant bit of the address, and bit 0 of D controls $\overline{BL}$.

During the automatic increment or decrement to the pointer register, CB and DB function as most-significant 17th bits for their respective registers. An advantage of having the bit that designated the byte be the least-significant bit is simplification of the process of arithmetic computation upon byte-addresses.

The CB and DB registers can be set to their initial values by machine-instructions for setting and clearing each register. For instance, DBU (D Block Upper) sets the DB register; CBL (C Block Lower) clears the CB register.

During the execution of a program the current values of CB and DB can be obtained by reading the contents of the DMAPA Register ($13_8$). While the four least-significant bits are the select code of a DMA-related peripheral, bit 15 reflects CB and bit 14 reflects DB. A one stands for upper, while a zero means lower. See FIG. 48. Note that CB and DB cannot be altered by writing into register $13_8$; such alteration must be done by using the machine-instructions mentioned in the previous paragraph. If, for instance, an interrupt service routine involves the use of place or withdraw byte instructions, the service routine would need to save and later restore the initial values of whichever block-pointers were used (CB & DB), as well as set them up for use within the routine itself.

The place-byte instructions cannot be used to place bytes into the registers within the BPC, EMC, and IOC. The reason for this is that these chips do not utilize the $\overline{BYTE}$ line during references to their internal registers.

The $\overline{BYTE}$ line is a signal supplied by the IOC for use by any interested memory entity. The $\overline{BYTE}$ line indicates that whatever is being transferred to or from memory is a byte (8 bits) and that $\overline{BL}$ indicates right or left half. During a write memory cycle it is up to the memory to merge the byte in question with its companion byte in the addressed word.

In the case of a withdraw-byte the memory can supply the full 16-bit word (that is, ignore the $\overline{BYTE}$ line). The IOC will extract the proper byte from the full word and store it as the right-half of the referenced register; the left-half of the referenced register is cleared. In the case of a place-byte, however, the IOC copies the entire referenced register into an internal working register (W), and outputs its right-half as either the upper or lower byte (according to bit 15 of the address) in a full 16-bit word. The full word is transmitted to the memory, and the "other" byte is all zeros. Thus, in this case the memory must utilize the $\overline{BYTE}$ line.

The consequence of the above is that any byte-oriented stacks to be managed using the place instructions must not include registers in any of the BPC, EMC, or IOC; that is, C and D must not assume any value between 0 and $37_8$ inclusive for a place-byte instruction.

There now follows a functional description of the EMC 64.

The Extended Math Chip (EMC) provides 15 instructions. Eleven of these operate on BCD-coded three-word mantissa data. Two operate on blocks of data of from 1 to 16 words. One is binary multiply and one clears the Decimal Carry (DC) register.

Unless specified otherwise, the contents of the registers A, B, SE and DC are not changed by the execution of any of the EMC's instructions.

A number of notational devices are employed in describing the operation of the EMC.

The symbols <. . . .> denote a reference to the actual contents of the named location. For instance:

$$<A> + <HOOK> \rightarrow A$$

represents the instruction ADA HOOK.

$A_{0-3}$ and $B_{0-3}$ denote the four least significant bit-positions of the A and B registers, respectively. Similarly, $A_{4-15}$ denotes the 12 most-significant bit-positions of the A register. And by the previous convention, $<A_{0-3}>$ represents the bit pattern contained in the four least-significant bit-position of A.

AR1 is the label of the four-word arithmetic register located in R/W memory, locations $177770_8$ through $177773_8$. The assembler (described later) pre-defines the symbol AR1 as address $177770_8$.

AR2 is the label of a four-word arithmetic accumulator register located within the EMC, and occupying register addresses $20_8$ through $23_8$. The assembler predefines the symbol AR2 as address $20_8$.

SE is the label for the four-bit shift-extended register, located within the EMC. Although SE is addressable, and can be read from, and stored into, its primary use is as internal intermediate storage during those EMC instructions that read something from, or put something into, $A_{0-3}$. The assembler predefines SE as $24_8$.

DC is the mnemonic for the one-bit decimal-carry register located within the EMC. DC is set by the carry ouput of the decimal adder. Sometimes, in the schematic illustrations of what the EMC instructions do, DC is shown as being part of the actual computation, as well as being a repository for overflow. In such cases the initial value of DC affects the result. However, DC will usually be zero at the beginning of such an instruction. The firmware sees to that by various means.

DC does not have a register address. Instead, it is the object of the BPC instructions SDS and SDC (Skip if Decimal Carry Set and Skip if Decimal Carry Clear), and the EMC instruction CDC (Clear Decimal Carry).

It takes a special mechanism to handle BCD numbers. Done in firmware alone, such a mechanism would be slow and cumbersome. The EMC supplies some useful operations on portions of BCD floating-point numbers. This trims the mechanism in size, and speeds it up significantly.

The EMC can perform operations on twelve-digit, BCD-encoded, floating-point numbers. Such numbers occupy four words of memory, and the various parts of a number are put into specific portions of the four words, as shown in FIG. 58. The exponent and mantissa signs ($E_s$ and $M_3$, respectively) are encoded as 0/1 for positive and negative, respectively. All of the digits $D_1$ through $D_{12}$ are encoded in BCD, while the exponent is a 10-bit signed two's complement number. A decimal point is assumed to be between $D_1$ and $D_2$. $D_1$ is the most significant digit, and $D_{12}$ is the least significant digit.

Except for immediate results within the individual arithmetic operations, $D_1$ will never be zero unless the entire number is zero. Sometimes, after each individual arithmetic operation the answer needs to be normalized; that is, the digits of the answer shifted towards $D_1$ until $D_1$ is no longer zero. The exponent then needs to be adjusted to reflect the change.

The "empty" field of bits 1-5 in the exponent word is for possible future use in systems that allow different types of variables besides the full-precision real number which the present floating-point format accomodates. In such systems the "empty" field could contain a "type" identifier, or some other information.

An important consideration concerning BCD arithmetic, as implemented by the processor, is that mantissas are represented in a sign-magnitude format. Ten's complements are used by the firmware in the computational processes, but only as an intermediate step. Furthermore, it is done in such a way that the automatic generation of the correct sign of a sum does not occur. There is also the frequent need to re-complement an answer.

AR2 frequently functions as an accumulator for EMC operations on BCD numbers, much like the A and B registers are accumulators for the instructions ADA and ADB.

The one-bit Decimal Carry register (DC), located in the EMC, serves as an indicator of overflow for BCD operations performed by the EMC.

Referring to FIG. 60 for example, DC is set to a one or zero, depending upon the respective occurrence or absence of a carry from the addition of the two $D_1$'s. Since the mantissas are represented in sign-magnitude form (with the sign in the exponent word rather than part of what gets added), DC represents overflow for 12-digit mantissa additions.

Notice also that DC is part of the addition, in the $D_{12}$ position. Although this feature is seldom taken advantage of, it has potential use with multiple precision floating point arithmetic.

There are three instructions that have to do only with DC. These are SDS (Skip if Decimal Carry Set) and SDC (Skip if Decimal Carry Clear) in the BPC instruction set, and CDC (Clear Decimal Carry) in the EMC instruction set.

The addition of the ten's complement of a number is used in lieu of a subtraction mechanism. If the signs of two numbers to be summed are different, one of the numbers is complemented (it doesn't really matter which one), before the addition.

The ten's complement of a 12-digit decimal integer X is:

$$\overline{X} = 10^{12} - X$$

The ten's complement of a floating point number has the same exponent as the original number. The mantissa m of a floating point number fits the requirement:

$$0 \leq m 10 \text{ (assuming the decimal point after } D_1)$$

Therefore the complement of the mantissa alone is:

$$\overline{m} = 10 - m$$

Accordingly, all that is necessary to complement a floating point number is to complement the mantissa. It is immaterial whether the mantissa is treated as a 12-digit integer, or as a number between zero and ten; the same sequence of digits results.

The EMC provides two instructions for doing ten's complements: CMX for AR1 and CMY for AR2. The only difference between these two instructions is that each operates upon a different "AR" register. What they do is replace each BCD digit, in the mantissa of the referenced register, with its appropriate digit of the complement. CMX and CMY leave the exponent word completely alone. This means that the sign of the mantissa, and the entire exponent are left unchanged in a ten's complement by CMX and CMY.

If a mantissa of zero is complemented, the entire mantissa remains zero, and DC is not set, as might be expected. DC is always set to zero by CMX and CMY.

Here is the rule used for doing decimal summations with ten's complements and the EMC instruction set:

If the signs of the numbers are the same, simply add them and leave the signs alone. If the signs are different, complement one of the numbers, then add. If the result is accompanied by overflow, drop the overflow digit (DC). If overflow does not accompany the result, complement the answer. Ensure that the result is assigned the sign of the addend having the larger absolute value.

Specific procedures for implementing floating-point addition and subtraction vary widely. One thing that is fairly standard in this, however: To subtract, the software simply changes the sign of the subtrahend and proceeds as in addition. The addition routine is capable of handling all possibilities of signs and relative absolute values on two addends.

Another common practice is firmware checking of each addend for equality to zero. If either of the addends is zero, then the other addend is promptly taken as the answer.

Referring to FIG. 59, addition can proceed only when the exponents of the two addends are the same. If they are not the same to start out with, they are made the same by shifting one of the mantissas an amount equal to the exponent difference.

This difference is easily found by subtracting the (algebraically) smaller exponent from the larger one. If the difference is eleven or less, it is possible to offset the mantissa of the number with the smaller exponent.

When offsetting the mantissas for addition, the mantissa with the (algebraically) larger exponent is left alone, and the mantissa with the (algebraically) smaller exponent is the one that is right-shifted.

As can be seen from FIG. 59, a shift of twelve or more digits would result in a mantissa of all zeros. The firmware detects the conditon of an exponent difference greater than eleven, and simply takes the number with the larger exponent as the answer.

The EMC provides an n-many mantissa right-shift instruction for each of AR1 and AR2. These are MRX and MRY, respectively.

For each instruction, the number of digits to be shifted is assumed to be in the B register. Zero's are shifted into $D_1$, and all but the last of the $D_{12}$'s is lost; it is saved in A, for round-off after the addition. Also, DC is set to zero in anticipation of the forthcoming addition activity. MRX and MRY do not necesarily shift in a zero on the first shift; on the first shift $<A_{0-3}>$ is what is shifted in. Subsequent shifts do shift in zero. During offsets in preparation for floating-point addition, the firmware ensure that $<A_{0-3}>=0$, however.

Referring to FIG. 60, the instruction FXA is used to add the mantissas of AR1 and AR2 after any necessary offset has been previously induced. FXA knows nothing of signs, complements, or exponents; it is strictly a postive-integer-addition process. The result is placed into the mantissa portion of AR2, within the EMC.

The reason for including DC itself in the addition of the $D_{12}$'s is that it would be useful if FXA were used to add mantissas having more than 12 digits. In this way DC could function like the E register of the BPC.

If the signs of the original numbers were different, an overflow (DC=1) means that the resulting AR2 need not be complemented, and DC is to be ignored. Contrariwise, a resulting DC of 0 means the resulting AR2 must be complemented, after which DC can be ignored.

There are still other possible situations. Suppose the signs were the same, and DC ended up a 1. In such a case DC represents a digit of 1 to the left of $D_1$; AR2 plus Dc constitute a 13 digit answer. What is required now is a one-digit right shift of AR2, shifting a 1 into $D_1$. MRY is the basis for this operation. Such a shift must also be accompanied by an increment (and test for overflow) of the AR2 exponent.

The situation described in the previous paragraph cannot occur if the original numbers had opposing signs. (Opposing signs diminish the absolute value of the sum, rather than increasing it.) The case of opposing signs has its own difficulty, however.

The raw result of an arithmetic operation might not be floating-point number that fits the standard form. It might have a leading DC needing to be incorporated into the number, as we have seen. Another possible deviation is a resulting $D_1$ of zero (and no overflow). There could also be several zero-digits as left-most digits of the mantissa.

Such a situation is resolved by the NRM instruction. It shifts AR2 left until $D_1$ is non-zero. The number of shifts is left as a binary number in the B register. The maximum number of shifts NRM will perform is 12. If NRM must do all 12 shifts, AR2 must have been zero. This is indicated by count of 12 in B, and well as by result of 1 in DC. For all other shift-counts, NMR leaves DC=0.

The firmware must complete the normalization process as follows: The resulting number of shifts (in B) is subtracted from the AR2 exponent, and the resulting tested for underflow.

Rounding

The EMC does not have an instruction to automatically round a result. It is the firmware's responsibility to determine when to round, and there are various approaches to this problem. However, once the decision is made to round AR2 up (one count in $D_{12}$), the easiest way to do this is to set B to $000001_8$, and execute an MWA. This is in every respect the same as setting AR1 to one, and then doing an FXA, except that it is easier.

After rounding, AR2 must be checked for overflow, and if necessary, right-shifted with the exponent incremented and tested for overflow.

Floating-Point Multiplication

This section will illustrate the function of the FMP instruction (fast multiply) as it is used in floating-point multiplications. This is pursued through the use of an example, assuming four-digit integers instead of twelve-digit ones, in order to reduce the amount of symbolism in the example.

This works well since the exponents have only to do with the exponent of the preliminary answer (that is, possibly non-normal answer); the sequence of mantissa digits in the answer is determined solely by the digit-sequence of the multiplier and multiplicand. Therefore, we can treat the mantissas as integers during the actual multiply process.

This sign of the product is, of course, determined in advance by inspection of the signs of the original factors.

Assume that the two mantissas to be multiplied are:

Multiplicand = A B C D

Multiplier = W X Y Z

One symbolic way to indicate how this multiplication is done is shown in FIG. 61.

Consider how $Z_{ov}\,Z_1\,Z_2\,Z_3\,Z_4$ is found (this is where FMP is used). It is really ABCD added to itself Z-times. Similarly, $Y_{ov}\,Y_1\,Y_2\,Y_3\,Y_4$ is ABCD added to itself Y-times. Prior to adding line 1 to line 2, line 1 is shifted one digit to the right (including $Z_{ov}$-it goes into the new $Z_1$). This allows line 2 to have ten times the weight of line 1. The resulting summation is shifted once to the right and added to line 3, and so on. These shifts are illustrated by the right-most zeros in lines 2, 3 and 4.

With regard to how FMP generates a partial product, consider Z (ABCD). AR2 is cleared and AR1 loaded with ABCD. $B_{0-3}$ contains Z. Now FMP is given. AR1 and AR2 are added together Z-times, producing Z(ABCD) in AR2. The digit $Z_{ov}$ ends up $A_{0-3}$. It can be anything from a zero to an eight. Notice that the mantissa right-shifts MRX and MRY each shift $<A_{0-3}>$ into $D_1$. So the right-shifting of the partial product also takes care of retaining its overflow digit.

Now consider $Y_{ov}\,Y_1\,Y_2\,Y_3\,Y_4$. Generally speaking, this is not found separately and then added to $Z_{ov}\,Z_1\,Z_2\,Z_3$. Instead, ABCD is merely added to $Z_{ov}Z_1\,Z_2\,Z_3$ Y-times. This both increases speed and saves memory, compared to saving partial products before summation, and with no undue loss of accuracy. As before, the overflow digit $Y_{ov}$ is left in $A_{0-3}$. And so it goes, AR2 is shifted right one more time, making $Y_{ov}$ the left-most digit of the partial products as summed to date. $B_{0-3}$ is made to contain X, and FMP is given a third time.

There are a number of minor points in conclusion. First, at each step of partial product summation a significant digit of the actual product is lost due to the shift. This can't be helped. In general, the product of two 12 digits numbers has 24 digits of precision, but the EMC is limited to 12, so the bottom 12 digits are thrown away.

These digits can be inspected, however. The MRY used to shift AR2 puts the lost digit into $A_{0-3}$. This provides an easy way for a rounding mechanism to check on those digits as they are tossed out. Indeed, the rounding routine will need to save the last digit thrown out, for use in rounding in the event the last use of FMP produces no overflow digit.

Lastly, notice that it is possible to put WXYZ into the B register of the BPC at the very start of the process, and simply shift B right with an SBR 4 in-between uses of FMP; FMP uses only $<B_{0-3}>$ as the number of times to add AR1 to AR2.

Floating-Point BCD Division

In floating-point BCD division, as in multiplication, the sign and exponent of the intermediate answer can be determined in advance. The EMC provides an instruction FDV to aid in such division.

Suppose it was wished to divide as in the problem shown in FIG. 62.

The desired end is to divide as a series of subtractions. However, one must resist the folly of subtracting 15 from 480 thirty-two times! Instead, look at line (4), and note that there are three 150's in 480. Subtract them out and then find how many 15's s are in the difference, and so forth.

Indeed, 150 can be subtracted three times, leaving a remainder of 30, and that 15 can be subtracted from 30 two times. Now, since subtracting 150 three times is the same as subtracting 15 thirty times (after all, $150\times3=15\times30$), there must be $(30+2)$ 15's in 480. So the answer is 32.

The division algorithm for using the FDV instruction uses just a scheme. Following are some points to keep in mind.

The digit sequence of the quotient is determined solely by the digit sequences of the mantissas ot the dividend and the divisor. The mantissas are always normalized to begin with, and the exponents do not enter into the actual division activity. Thus, the above example illustrates (in a three digit machine) the division of any number whose mantissa is 4.80 by any other number whose mantissa is 1.50:

$$4.80\times10^3/1.5\times10^{-2}=3.20\times10^5$$

Just as for the previous operations examined, it is convenient to ignore the alleged decimal point between $D_1$ and $D_2$, and consider the mantissas to be 12-digit integers.

The divisor will be in AR1 (memory outside the EMC) and the dividend in AR2 (accumulator registers with the EMC). The basic activity is to subtract AR1 from AR2 until AR2 gets smaller than AR1. The number of subtractions required for that to occur is the next digit of the quotient. Then AR2 is shifted left and the process is repeated until either a zero remainder occurs, or sufficient digits have been calculated, whichever occurs first. The quotient digits are merged, one at a time, into a complete quotient held in R/W memory. This is the firmware's reponsibility, and it alone determines where in R/W the quotient is kept.

Now:

1. $D_1$ of the quotient might be zero (suppose AR1 is greater than the original AR2). In that case, accept the zero and shift as described below.
2. The number of subtractions will always be nine or fewer. This is because $D_1$ of AR1 can't be zero.
3. If (1) occurs, or, after successful application of (2), it is necessary to do something that corresponds to changing the 150 to 15 and getting ready to subtract it from 30 (the remainder). Now for various reasons it is inconvenient to change the 150. Instead, shift the 30 left and make it 300. This obtains the same result, however.
4. If (1) occurs for $D_1$ of the quotient, it can't also occur for $D_2$. The basic reason for this is that $D_1$ of AR2 can't initially be zero. After $D_1$, "zero" quotient-digits can occur for several digits in a row, however. But because 00— can't occur, it is always sufficient to compute 13 digits (assuming no extra digit for rounding, and counting a leading zero as one of the 13).
5. Consider a (1)-like situation for either $D_1$ or some other digit of the quotient. The necessary shift (via MLY) moves the left-most digit of AR2 into A. This digit cannot be ignored when subtracting AR1. Indeed, there is now a 13-digit dividend; A followed by AR2. FDV knows nothing of 13 digit arithmetic; the software's use of FDV will have to make up the difference.

The FDV Instruction

FDV is used to accomplish the equivalent of automatically repreated subtraction of AR1 from AR2, until AR2 becomes smaller than AR1. It does this by adding AR1 to AR2 until overflow occurs. This assumes that AR2 has been complemented prior to the execution of FDV.

In the explanation that follows, it was deemed convenient to describe floating-point division in terms of subtractions, rather than additions to a complement. Subtractions that are really complement-additions are designated as "subtractions".

FDV returns the number of sucessfull "subtractions" as a binary number (same as BCD) in $B_{0-3}$; $B_{4-15}$ are returned as zero.

In general, after an application of FDV it is necessary to patch-up AR2 before shifting and and using FDV again. This because AR2 retains the result of the first unsuccessful "subtraction". What is done is to de-complement AR2 and add AR1 back one time, so as to undo the effect of the unsuccessful "subtraction". Then AR2 is shifted, and then complemented. AR1 remains untouched throughout the entire process.

There is one case where AR2 does not need to be adjusted. This is when the result in AR2 is zero. This means that the divisor is contained within the dividend exactly an integral number of times. This produces an eventual zero remainder (the result in AR2). Such an event generates a perfect quotient.

Now, in the event of a perfect quotient the number returned in $B_{0-3}$ is one count too small. (Normally, overflow is associated with the first unsuccessful "subtraction" because the answer should really be negative. But it just so happens that the generation of a result of zero—which is basically still a successful "subtraction''—is accompanied by overflow.) So the loop that employs FDV has constantly got to be on the look-out for a perfect quotient. This is desirable for another reason. Once a perfect quotient has been discovered, it is undesirable to proceed with further division activity.

Another aspect of FDV to be aware of is the way it returns quotient digits into B. Each digit is placed into $B_{0-3}$, and $B_{4-15}$ are cleared. This means one can't simply shift B left in-between the extraction of four consecutive quotient digits, and then store B into the sequence of words used to receive the answer. Instead, the sequence of digits has to be individually stored in the answer as they are found; B cannot be used as temporary storage for a group of quotient digits.

Referring to FIG. 63, there is one last difficulty. This is the business of the dividend frequently being 13 digits; A followed by AR2.

A series of FDV's can be used to "subtract" a 12-digit AR1 from a 13-digit A-followed-by-AR2.

Suppose there is a complemented 13-digit number in A and AR2, as shown in FIG. 63.

When FDV is given it adds the 12 digits of AR1 and the 12 digits of AR2 together until an overflow occurs. (FDV does not set DC, however.) Now if FDV were a 13-digit operation the carry from AR2 would be used to increment A. Also, there is nothing wrong with the resulting digit sequence in AR2. The digits simly "turnover" and keep going. But after each FDV the software has to "increment A and detect when it goes from nine to ten". When the digit in A goes from nine to ten there is "real overflow" of the 13 digit number.

Here is the solution to this difficulty. Each use of FDV adds AR1 and AR2 (into AR2) until AR2 overflows. When this happens what is done is to increment A and add again with FDV if A is less than ten—no adjustment is made to the digit sequence in AR2—none is needed. But, the digit sequence of AR2 reflects the "subtraction" that produces the overflow. The number returned to B is less than that. AR2 and $<B_{0-3}>$ are out of step, so to speak.

What is required is the total number of possible "subtractions" of AR1 from A conjoined with AR2. That number is obtained by summing the values of $<B>+1$ for all uses of FDV, except the last one, during the 12-from-13-digit "subtractions". The resulting digit sequence in AR2, when the 12-from-13-digit "subtraction" is entirely completed, is like always, the result of an overflow, which in this case is undesired. So as before, if there is no perfect quotient, AR2 will be de-complemented and AR1 added to it. The previous FDV needs to contribute only $<B_{0-3}>$ to the sum of the latest quotient digit, not $<B_{0-3}>+1$.

Referring now to FIG. 64, if for example, there were three uses of FDV for a certain quotient digit of a 12-from-13-digit "subtraction", the (non-perfect) quotient digit would be formed as shown.

Referring also to FIG. 65, if the same general situation produced a perfect quotient on the nth digit, then for the same reason as before, the last "subtraction" does not count.

As a matter of implementation, it is tedious to check if A has been incremented to ten. One can always tell in advance, from each new and uncomplemented value that is shifted into A, how many overflows out of AR2 would be required if one were to increment and test on A. The easiest thing to do is to put that number of needed FDV's into A as a count to be either incremented or decremented to zero. Then each use of FDV for a 12-from-13-digit subtraction updates A until A is zero.

In the sample division routine of FIG. 66, the value returned to $B_{0-3}$ is always incremented by one immediately after it is returned. The increment will later be taken out as the quotient digit is stored in its final destination, provided that it should be taken out. It is easier to always do the increment and then test for when to take it out, rather than to test for when to put it in.

The rule for use of FDV in FIG. 66 is this:

1. Always increment the value returned to $B_{0-3}$.
2. First check for multiple FDV's as a part of a 12-from-13-digit subtraction. If so, loop immediately, performing no other tests or activities.
3. When a quotient digit has been found, check to see if the quotient is now a perfect quotient. If so, exit the division loop without removing the last increment. Save the last digit found as part of the answer.
4. If the quotient is not a perfect quotient, decrement the value of the last quotient digit found, and save it as part of the answer.

The test for a perfect quotient is simple, although not super-short: if AR2 is zero the divisor has subtracted out evenly from the dividend.

The sample routine shown does not include the testing for and handling of these things:

1. signs
2. division by zero
3. division into zero
4. exponents
5. overflow
6. rounding All of these areas are handled by additional code segments not part of the division loop proper.

Machine Instructions

This section, in conjunction with FIGS. 67, 68, 69, and 70, explains the nature of the machine-instruction sets of each of the BPC, IOC, and EMC. The aforementioned figures illustrate the forms the various instructions may take in the source coding, as well as indicate the functions of the individual instructions. In particular, FIG. 67 depicts the conventionsl used in describing the instructions. Regarding the BPC and IOC instruction sets, FIGS. 68 and 69 serve primarily in an illustrative capacity. The EMC instructions, however, are sufficiently complicated in their operational properties that FIG. 70 should be considered as their primary description.

FIG. 71 illustrates the bit patterns corresponding to the instructions, and that are produced by the assmembler.

BPC Memory Reference Group

Each of the 14 memory reference instructions performs some operation based upon the contents of a referenced memory location. Unless the reference is to a location on the base page, it must be on the same current page as the instruction. The assembler determines which type of page-reference is used, and sets the B/C bit (bit 10) of the instruction accordingly. The least ten significant bits of the address of the referenced location are enclosed in bits 0–9 of the instruction. A memory reference may be indirect. In the source this is indicated with a ,I after the operand. This is assembled by making bit 15 of the instruction be a one.

LDA m[,I]

Load A from m. The A register is loaded with the contents of the addressed memory location.

LDB m[,I]

Load B from m. The B register is loaded with the contents of the addressed memory location.

CPA m[,I]

Compare the contents of m with the contents of A; skip if unequal. The two 16-bit words are compared bit by bit. If they differ, the next instruction is skipped, otherwise it is executed next.

CPB m [,I]

Compare the contents of m with the contents of B; skip if unequal. The two 16-bit words are compared bit by bit. If they differ, the next instruction is skipped, otherwise it is executed next.

ADA m [,I]

Add the contents of m to A. The contents of the addressed memory location are added to those of A. The binary sum remains in A while the contents of m remain unchanged. If a carry occurs from bit 15 the E register is set to a one, otherwise, E is left unchanged. If an overflow occurs the OV register is set to a one, otherwise the OV register is left unchanged. The overflow condition occurs if there is a carry from either bits 14 or 15, but not both together.

ADB m [,I]

Add the contents of m to B. Otherwise identical to ADA.

STA m [,I]

Store the contents of A in m. The contents of the A register are stored into the addressed memory location, whose previous contents are lost.

STB m [,I]

Store the contents of B in m. The contents of the B register are stored into the addressed memory location, whose previous contents are lost.

JSM m [,I]

Jump to subroutine. JSM permits jumping to subroutines in either ROM or R/W memory. The value of the pointer in the return stack register (R) is incremented by one and the value of P (the location of the JSM) is stored in R ,I. Program execution resumes at m.

JMP m [,I]

Jump to m. Program execution continues at location m.

ISZ m [,I]

Increment m; skip if zero. ISZ adds one to the contents of the referenced location, and writes the sum into that location. If the sum is zero, the next instruction is skipped. ISZ does not alter the contents of E and OV.

DSZ m [,I]

Decrement m; skip if zero. DSZ subtracts one from the contents of the referenced location, and writes the difference into that location. If the difference is zero, the next instruction is skipped. DSZ does not alter the contents of E and OV.

AND m [,I]

Logical 'and' of A and m. The contents of A and m are and'ed, bit by bit, and the result is left in A.

IOR m [,I]

Inclusive 'or' of A and m. The contents of A and m are or'ed, bit by bit, and the result is left in A. The inclusive or is the "ordinary or" operation.

The following instruction is not, in the strictest sense, a memory reference instruction. It is included here for the sake of continuity.

RET n [,P]

Return. The R register is a pointer into a stack of words in R/W memory containing the addresses of previous subroutine calls. A read R occurs. That produces the address (P) of the latest JSM that occurred. The BPC then jumps to address P+n, and R is decremented. The value of n may range from −32 to 31, inclusive. The value of n is encoded into bits 0 through 5 of the instructions as a 6 bit, two's complement, binary number.

The ordinary, everyday garden variety return is RET 1.

If a P is present, it "pops" the interrupt system of the 10C. Two things occur when this happens: first, the peripheral address stack is popped, and second, the interrupt grant network is "decremented".

The peripheral address stack is a genuine hardware stack in the IOC, 4 bits wide, and three levels deep. On the top of this stack is the current select code for I/O operations. Select codes are stacked as interrupts occur during I/O operations. A RET O ,P at the end of an interrupt service routine puts the select code of the interrupted device back on the top of the stack.

The interrupt grant network keeps track of which interrupt priority level is currently in use. From this it determines whether or not to grant an interrupt request. A RET O ,P at the end of an interrupt service routine causes the interrupt grant network to change the current interrupt priority level to the next lower level (unless it is already at the lowest level).

Shift-Rotate Group

The shift-rotate instructions perform re-arrangements of the bits of the A and B registers. Each shift-rotate instruction includes a four-bit field in which the shift or rotate amount is encoded. The number to be encoded in the field is represented by n. In the source test n may range from 1 to 16, inclusive. The four-bit field (bits 0 through 3) will contain the binary code for n − 1.

AAR n

Arithmetic right shift of A. The A register is shifted right n places with the sign bit (bit 15) filling all vacated bit positions; the n + 1 most significant bit becomes equal to the sign bit.

ABR n

Arithmetic right shift of B. The B register is shifted right n places with the sign bit (bit 15) filling all vacated bit positions; the n+1 most significant bits become equal to the sign bit.

SAR n

Shift A right. The A register is shifted right n places with all vacated bit positions cleared; the n most bits become zeros.

SBR n

Shift B right. The B register is shifted right n places with all vacated bit positions cleared; the n most significant bits become zeros.

SAL n

Shift A left. The A register is shifted left n places; the n least significant bits become zeros.

SBL n

Shift B left. The B register is shifted left n places; the n least significant bits become zeros.

RAR n

Rotate A right. The A register is rotated right n places, with bits 0 rotating into bit 15.

RBR n

Rotate B right. The B register is rotated right n places, with bit 0 rotating into bit 15.

Alter & Skip Groups

The alter-skip instructions each contain a six bit field which allows a relative branch of any of 64 locations. The distance of the branch is represented by a displacement, n; n may be within the range of −32 to 31, inclusive.

The arguments for the instructions of this group are shown as *±n, or, m. The "*" instructs the assembler to replace * with the current value of the program location counter (P register). An argument of n by itself will generally cause an error. Internally, the assembler subtracts the current value of * from the argument as part of the evaluation process. So *±n-* is simply ±n, and m-* becomes a relative displacement rather than an actual address. This business of subtracting * was done to allow symbols and addresses (these are m's) as arguments. Thus it is possible to write SZA HOOK. All that is required is that HOOK be within the allowable skip distance of the instruction.

Bits 0 through 5 are coded with the value of n (or m-*) as follows. If the value is positive or zero, bit 5 is zero, and bits 0 through 4 receive the straight binary code for the value of n. If the value is negative, bit 5 is a 1, and bits 0 through 4 receive a complemented and incremented binary code.

| For n or m−* = | bits 5-0 | meaning: |
|---|---|---|
| −32 | 100000 | if skip, next instruction is *−32 |
| −7 | 111001 | if skip, next instruction is *−7 |
| −1 | 111111 | if skip, next instruction is *−1 |
| 0 | 000000 | if skip, repeat this instruction |
| 1 | 000001 | do next instruction, regardless |
| 7 | 000111 | if skip, next instruction is *+7 |
| 31 | 011111 | if skip, next instruction is *+31 |

All instructions in the alter-skip group have the "skip" properties outlined above. Some of the instructions also have an optional "alter" property. This is where the general instruction form "skip if <some one-bit condition>" is supplemented with the ability to alter the state of the bit mentioned in the condition. The alteration is to either set the bit, or clear it. If specified, the alteration is done after the condition is tested, never before.

To indicate in a source statement that an instruction includes the alter option, and to specify whether to clear or to set the tested bit, a comma-C or comma-S follows *±n/m. The C indicates clearing the bit, while an S indicates setting the bit.

The "alter" information is encoded into the 16 bit instruction word with 2 bits. For such instructions, bit 7 is called the H/$\overline{H}$ (Hold/Don't Hold) bit, and bit 6 is the C/S (Clear/Set) bit. If bit 7 is a zero (specifying H) the "alter" option is not active; neither S nor C followed n in the source statement of the instruction, and the tested bit is left unchanged. If bit 7 is a 1 (specifying H), then "alter" option is active, and bit 6 specifies whether it is S or C.

SZA *±n/m

Skip if A zero. If all 16 bits of the A register are zero, skip the amount indicated by n, or, to m.

SZB *±n/m

Skip if B zero. If all 16 bits of the B register are zero, skip the amount indicated by n, or, to m.

RZA *±n/m

Skip if A not zero. If any of the 16 bits of the A register are set, skip the amount indicated by n, or, to m.

RZB *±n/m

Skip if B not zero. If any of the 16 bits of the B register are set, skip the amount indicated by n, or, to m.

SIA *±n/m

Skip if A zero, and then increment A. The A register is tested, and then incremented by one. If all 16 bits of A were zero before the increment, skip the amount indicated by n, or, to m. SIA does not affect the contents of E or OV.

SIB *±n/m

Skip if B zero, and then increment B. The B register is tested, and then incremented by one. If all 16 bits of B were zero before the increment, skip the amount indicated by n, or, to m. SIB does not affect the contents of E or OV.

RIA *±n/m

Skip if A not zero, and then increment A. The A register is tested, and then incremented by one. If any bits of A were one before the increment, skip the amount indicated by n, or, to m. RIA does not affect the contents of E or OV.

RIB •±n/m

Skip if B not zero, and then increment B. The B register is tested, and then incremented by one. If any bits of B were one before the increment, skip the amount indicated by n, or, to m. RIB does not affect the contents of E or OV.

In connection with the next four instructions, Flag and Status are controlled by the peripheral interface addressed by the current select code. The select code is the number that is stored in the register named PA, located in the IOC. Both Status and Flag originated such that when a missing interface is addressed Status and Flag will appear to be false, or not set.

SFS •±n/m

Skip if Flag line set. If the Flag line is true, skip the amount indicated by n, or, to m.

SCF •±n/m

Skip if Flag line clear. If the Flag line is false, skip the amount indicated by n, or, to m.

SSS •±n/m

Skip if Status line set. If the Status line is true, skip the amount indicated by n, or, to m.

SSC •±n/m

Skip if Status line clear. If the Status line is false, skip the amount indicated by n, or, to m.

SDS •±n/m

Skip if the Decimal Carry set. In the LPU Decimal Carry (DC) is a one-bit register in the EMC. It is controlled by the EMC, but connected to the decimal carry input of the BPC. If DC is clear, skip the amount indicated by n, or, to m. In the PPU the DC input to the BPC is controlled by the CRT hardware, and represents retrace.

SHS •±n/m

Skip if Halt line set. If the Halt line is true, skip the amount indicated by n, or, to m.

SHC •±n/m

Skip if Halt line clear. If the Halt line is false, skip the amount indicated by n, or, to m.

SLA •±n/m[,S/,C]

Skip if the least significant bit of A is zero. If the least significant bit (bit 0) of the A register is a zero, skip the amount indicated by n, or, to m. If either S or C is present, bit 0 is altered accordingly after the test.

SLB •±n/m[,S/,C]

Skip if the least significant bit of B is zero. If the least significant bit (bit 0) of the B register is a zero, skip the amount indicated by n, or, to m. If either S or C is present, bit 0 is altered accordingly after the test.

RLA •±n/m[,S/,C]

Skip if the least significant bit of A is non-zero. If the least significant bit (bit 0) of the A register is a one, skip the amount indicated by n, or, to m. If either S or C is present, bit 0 is altered accordingly after the test.

RLB •±n/m[,S/,C]

Skip if the least significant bit of B is non-zero. If the least significant bit (bit 0) of the B register is a one, skip the amount indicated by n, or, to m. If either S or C is present, bit 0 is altered accordingly after the test.

SAP •±n/m[,S/,C]

Skip if A positive. If the sign bit (bit 15) of the A register is a zero, skip the amount indicated by n, or, to m. If either S or C is present, bit 15 is altered accordingly after the test.

SBP •±n/m[,S/,C]

Skip if B is positive. If the sign bit (bit 15) of the B register is a zero, skip the amount indicated by n, or, to m. If either S or C is present, bit 15 is altered accordingly after the test.

SAM •±n/m[,S/,C)

Skip if A minus. If the sign bit (bit 15) of the A register is a one, skip the amount indicated by n, or, to m. If either S or C is present, bit 15 is altered accordingly after the test.

SBM •±n/m[,S/,C]

Skip if B minus. If the sign bit (bit 15) of the B register is a one, skip the amount indicated by n, or, to m. If either S or C is present, bit 15 is altered accordingly after the test.

SOS •±n/m[,S/,C]

Skip if overflow set. If the one-bit overflow register (OV) is set, skip the amount indicated, by n, or, to m. If either S or C is present, the OV register is altered accordingly after the test.

SOC •±n/m[,S/,C]

Skip if overflow clear. If the one-bit overflow register is clear, skip the amount indicated by n, or, to m. If either S or C is present, the OV register is altered accordingly after the test.

SES •±n/m[,S/,C]

Skip if extend set. If the extend register (E) is set, skip the amount indicated by n, or, to m. If either S or C is present, E is altered accordingly after the test.

SEC •±n/m[,S/,C]

Skip if extent clear. If the extent register (E) is clear, skip the amount indicated by n, or, to m. If either S or C is present, E is altered accordingly after the test.

BPC Complement-Execute Group

CMA

Complement A. The A register is replaced by its one's (bit by bit) complement.

CMB

Complement B. The B register is replaced by its one's (bit by bit) complement.

TCA

Two's complement A. The A register is replaced by its one's (bit by bit) complement, and then incremented by one. The E and OV registers are updated according to the results of the increment, in the same fashion as for the ADA instruction.

TCB

Two's complement B. The B register is replaced by its one's (bit by bit) complement, and then incremented by one. The E and OV registers are updated according to the results of the increment, in the same fashion as for the ADB instruction.

EXE $0 \leq m \leq 37_8$ [,I]

Execute register m. The contents of any register can be treated as the current instruction, and executed in the normal manner. The register is left unchanged unless the instruction code causes it to be altered. The next instruction executed will be the one whose address is one greater than the address of the EXE m, unless the code in m causes a branch.

Indirect addressing is allowed. An EXE m,I causes the contents of m to be taken as the address of the place in memory whose contents are to be executed; this can be anywhere in memory, and need not be another register.

IOC Stack Group

The stack group manages first-in, last-out firmware stacks. The "place" instructions put a word or byte into a stack pointed at by C or D. (C and D are registers in the IOC; addresses $16_8$ and $17_8$, respectively.) The item that is placed in reg. 0–7. The "withdraw" instructions remove a word or a byte from a stack pointed at by C or D. The removed item is written into reg. 0–7.

By the end of each place or withdraw instruction the stack pointer is either incremented or decremented, as specified by the optional I or D, respectively. In the absence of either an I or a D, the assembler defaults to I for place instructions, and D for withdraw instructions.

Place instructions increment or decrement the stack pointer prior to the placement, and withdraw instructions do it after the withdrawal. In this way the pointer is always left pointing at the top of the stack, and back-to-back combinations of place then withdraw instructions or withdraw then place instructions, handle the same datum (provided the same pointer is used).

The least significant bit of the pointer register indicates left or right half (1=left, 0=right). Full 16-bit addressing is maintained by a most-significant bit (for each pointer register) in the form of the CB and DB registers. The C and CB registers, and D and DB registers, act as 17-bit registers during the automatic increment or decrement to the pointer registers.

The values of C and D for place-byte instructions must not be the address of any internal register for the BPC, EMC, or IOC. The place and withdraw instructions can also initiate I/O operations, so they are also listed under the I/O group.

PWC reg. 0–7 [,I/,D]

Place the entire word of reg. into the stack pointed at by C.

PWD reg. 0–7 [,I/,D]

Place the entire word of reg. into the stack pointed at by D.

PBC reg. 0–7 [,I/,D]

Place the right half of reg. into the stack pointed at by C.

PBD reg. 0–7 [,I/,D]

Place the right half of reg. into the stack pointed at by D.

WWC reg. 0–7 [,I/,D]

Withdraw an entire word from the stack pointed at by C, and put it into reg.

WWD reg. 0–7 [,I/,D]

Withdraw an entire word from the stack pointed at by D, and put it into reg.

WBC reg. 0–7 [,I/,D]

Withdraw a byte from the stack pointed at by C, and put it into the right half of reg.

WBD reg. 0–7 [,I/,D]

Withdraw a byte from the stack pointed at by D, and put it into the right half of reg.

CBL

Set the CB register to a zero. This specifies the lower block of memory pointed at by C and CB.

CBU

Set the CB register to a one. This specifies the upper block of memory pointed at by C and CB.

DBL

Set the DB register to a zero. This specifies the lower block of memory pointed at by D and DB.

DBU

Set the DB register to a one. This specifies the upper block of memory pointed at by D and DB.

IOC I/O Group

The states of $\overline{IC1}$ and $\overline{IC2}$ during the I/O Bus Cycles initiated by the instructions below depend upon which register is the operand of the instruction:

| | $\overline{IC1}$ | $\overline{IC2}$ |
|---|---|---|
| R4 | 1 | 1 |
| R5 | 1 | 0 |
| R6 | 0 | 1 |
| R7 | 0 | 0 |
| mem. ref. inst. | | reg. 4-7 [ ,I] |

Initiate an I/O Bus Cycle. Memory reference instructions 'reading' from reg. cause input I/O Bus Cycles; those 'writing' to reg. cause output I/O Bus Cycles. In either case the exchange is between A or B and the interface addressed by the PA register (Peripheral Address Register—$11_8$); reg. 4-7 do not really exist as physical registers within any chip on the IDA Bus.

stack inst.    reg. 4-7 [,I/,D]

Initiate an I/O Bus Cycle. Place instructions 'read' from reg., therefore they cause input I/O Bus Cycles. Withdraw instructions 'write' into reg., therefore they cause output I/O Bus Cycles. In either case the exchange is between the addressed stack location and the interface addressed by PA.

IOC Interrupt Group

EIR

Enable the interrupt system. This instruction cancels DIR.

DIR

Disable the interrupt system. This instruction cancels EIR.

IOC DMA Group

SDO

Set DMA outwards. This instructon specifies the read-from-memory, write-to-peripheral, direction for DMA transfers.

SDI

Set DMA inwards. This instruction specifies the read-from-peripheral, write-to-memory, direction for DMA transfers.

DMA

Enable the DMA Mode. This instruction cancels PCM and DDR.

PCM

Enable the Pulse Count Mode. This instruction cancels DMA and DDR.

DDR

Disable Data Request. This instruction cancels the DMA Mode and the PUlse Count Mode.

EMC Four-Word Group

CLR N

Clear N words. This instruction clears N consecutive words, beginning with location <A>. $1 \leqq N \leqq 16_{10}$.

XFR N

Transfer N words. This instruction transfers the N consecutive words beginning at location <A> to those beginning at <B>. $1 \leqq N \leqq 16_{10}$.

EMC Mantissa Shift Group

MRX

Mantissa right shift of AR1 r-times, $r = <B_{0-3}>$, and $0 \leqq r \leqq 17_8 = 15_{10}$.

MRY

Mantissa right shift of AR2 $<B_{0-3}>$-times. Otherwise identical to MRX.

MLY

Mantissa left shift of AR2 one time. At the conclusion of the operation SE equals $<A_{0-3}>$.

DRS

Mantissa right shift of AR1 one time. At the conclusion of the operation SE equals $<A_{0-3}>$.

NRM

Normalize AR2. The mantissa digits of AR2 are shifted left until $D_1 \neq 0$. If the original $D_1$ is non-zero, no shifts occur. If twelve shifts occur, then AR2 equals zero, and no further shifts are done. The number of shifts is stored as a binary number in B.

EMC Arithmetic Group

CMX

Ten's complement of AR1. The mantissa of AR1 is replaced with its ten's complement, and DC is set to zero.

CMY

Ten's complement of AR2. The mantissa of AR2 is replaced with its ten's complement, and DC is set to zero.

CDC

Clear Decimal Carry. Clears the DC register; $0 \rightarrow DC$.

FXA

Fixed-point addition. The mantissas of AR1 and AR2 are added together, along with DC (as a $D_{12}$-digit), and the result is placed in AR2. If an overflow occurs, DC is set to one, otherwise DC is set to zero at the completion of the addition.

During the addition the exponents are not considered, and are left strictly alone. The signs are also left completely alone.

MWA

Mantissa Word Add. <B> is taken as four BCD digits, and added, as $D_9$ through $D_{12}$, to AR2. DC is also added in as a $D_{12}$. The result is left in AR2. If an overflow occurs, DC is set to one, otherwise, DC is set to zero at the completion of the addition.

During the addition the exponents are not considered, and are left strictly alone, as are the signs. MWA is intended primarily for use in rounding routines.

FMP

Fast multiply. The mantissas of AR1 and AR2 are added together (along with DC as $D_{12}$) $<B_{0-3}>$-times; the result accumulates in AR2.

The repeated additions are likely to cause some unknown number of overflows to occur. The number of overflows that occurs is returned in $A_{0-3}$.

FMP is used repeatedly to accumulate partial products during BCD multiplication. FMP operates strictly upon mantissa portions; signs and exponents are left strictly alone.

MPY

Binary Multiply Using Booth's Algorithm. The (binary) signed two's complement contents of the A and B registers are multiplied together. The thirty-two bit product is also a signed two's complement number, and is stored back into A and B. B receives the sign and most-significant bits, and A the least-significant bits.

FDV

Fast Divide. The mantissas of AR1 and AR2 are added together until the first decimal overflow occurs. The result of these additions accumulates into AR2. The number of additions without overflow (n) is placed into B.

FDV is used in floating-point division to find the quotient digits of a division. In general, more than one application of FCV is needed to find each digit of the quotient.

As with the other BCD instructions, the signs and exponents of AR1 and AR2 are left strictly alone.

Internal Description of the BPC

The details of the BPC may be understood with reference to the block diagram of FIG. 72. The majority of activity within the BPC is controlled by a ROM. This is a programmed logic array whose input qualifiers are a 4-bit state-count, group, miscellaneous, and input-output qualifiers. From the ROM are decoded micro-instructions. Each machine-instruction that the BPC executes, and the BPC's response to memory cycles directed at its addressable registers, is a complex series of micro-instructions. This activity is represented by the flow charts depicted in FIGS. 73 through 76.

Referring again to FIG. 72, changes in the state-count correspond to the step-by-step sequence of activity shown in the flow charts. The State-Counter has a natural sequence that was chosen by computer simulation to reduce the complexity of the necessary number of non-sequential transitions. When a section of the flow chart requires a non-sequential transition it decodes a special micro-instruction whose purpose is to override the natural sequence and produce the desired alteration in the state-count.

The Group Qualifiers are generated by Instruction Decode. The Group Qualifiers represent the instruction that has been fetched and that must now be executed.

The Input-Output Qualifiers are controlled by the M-Section. Those qualifiers are used in decoding micro-instructions, and in flow chart branching, that are dependent upon or have to do with input and output of the BPC.

The $\overline{\text{IDB}}$ Bus is the internal BPC representation of the IDA Bus. To conserve power, this bus is used dynamically; it is precharged on phase two, and is available for data transmission only during phase one. (Phase one—$\phi 1$, and phase two—$\phi 2$, are two complementary non-overlapping clocks that are required by most elements in the system.) Data on the $\overline{\text{IDB}}$ Bus is transmitted in negative true form; a logical one is encoded on a given line of the bus by grounding that line.

The main means of inter-register communication within the BPC is via the $\overline{\text{IDB}}$ Bus and the various set and dump micro-instructions. For instance, a SET I loads the I Register with the contents of the $\overline{\text{IDB}}$ Bus. A DMP IDA places the contents of the IDA Bus onto the $\overline{\text{IDB}}$ Bus. A simultaneous DMP IDA and SET I loads the I Register with the word encoded on the IDA Bus. As a further instance, that very activity is part of what is decoded from the ROM at the conclusion of a memory cycle that is an instruction fetch. FIGS. 86 and 87 illustate the waveforms associated with the start-up sequence and an instruction fetch.

Once the instruction is in the I Register, the bit pattern of the instruction is felt by Instruction Decode. Aside from the afore-mentioned Group Qualifiers, Instruction Decode generates two other groups of signals. One of these are control lines that go to the Flag Multiplexer to determine which, if any, of the external flag lines is involved in the execution of the current machine-instruction. The remaining group of signals are called the Asynchronous Control Lines. These are signals that, unlike micro-instructions, are steady-state signals present the entire time that the machine-instruction is in the I Register. The Asynchronous Control Lines are used to determine the various modes in which much of the remaining hardware will operate during the execution of the machine-instruction. For example, the S Register is capable of several types of shifting operations, and the micro-instruction that causes S to shift (SSE) means only that S should now shift one time. The exact nature of the particular type of shift to be done corresponds to the type of shift machine-instruction in the I Register. This in turn affects Instruction Decode and the Asynchronous Control Lines, which in turn affect the circuitry called S Register Shift Control. It is that circuity that determines the particular type of shift operation that S will perform when an SSE is given.

In a similar way the Asynchronous Control Lines affect the nature of the operation of the Arithmetic-Logic Unit (ALU), the Skip Matrix, and the A and B registers.

The least four bits of the I Register are a binary decrementer and CTQ Qualifier network. This circuitry is used in conjunction with machine-instructions that involve shift operations. Such machine-instructions have the number of shifts to be performed encoded in their least four bits. When such an instruction is in the I Register, the least four bits are decremented once for each shift that is performed. The CTQ Qualifier indicates when the last shift has been performed.

The A and B Registers are primarily involved in machine-instructions that; read to or write from, memory; do binary arithmetic; shift; or, branch. Machine-instructions that simply read from, or, write to, memory, are relatively easily executed, as the main activity consists of dumping or setting the A or B Register. The arithmetic instructions involve the ALU.

The ALU has three inputs. One is the $\overline{ZAB}$ Bus. This bus can transmit either zero, the A Register, or the B Register. The choice is determined by the Asynchronous Control Lines. The input from the $\overline{ZAB}$ Bus can be understood in its true, or in its complemented form. The second input to the ALU is the S Register. The remaining input is a carry-in signal.

The ALU can perform three basic operations: logical and, logical inclusive or, and binary addition. The choice is determined by the Asynchronous Control lines.

Whatever operation to be performed is done between the complemented or uncomplemented contents of the $\overline{ZAB}$ Bus, and the contents of the S Register. The output of the ALU is available through the DMP ALU micro-instruction, as well as through lines representing the carry-out from the 14th and 15th bits of the result. These carry-outs are used to determine whether or not to set the one-bit Extend and Overflow Registers.

The R Register is the return stack pointer for the RET machine-instruction.

The P Register is the program counter. Associated with it are several other pieces of circuitry used for incrementing the program counter, as well as for forming complete 16-bit addresses for memory cycles needed in the execution of memory reference or skip machine-instructions. These other pieces of circuitry are the T Register, the P-Adder Input, P-Adder Control, and the P-Adder.

The P-Adder mechanism can operate in one of three modes. These modes are established by micro-instructions rather than by the Asynchronous Control Lines. In the memory reference machine-instruction mode (established for the duration of the ADM micro-instruction) the T Register will contain a duplicate copy of the memory reference machine-instruction being executed. thus the 10-bit address field of the machine-instruction and the base page bit (bit 10), as well as top 6 bits of the program counter, are all available to the adder mechanism. In accordance with the rules for either relative or absolute addressing (as determined by RELA) the P-Adder Input and P-Adder operate to produce the correct full 16-bit address needed for the associated memory cycle.

The ADS micro-instruction establishes a mode wherein only the least five bits of a skip machine-instruction are combined with the program counter to produce a new value for the program counter.

In the absence of either an ADM or ADS micro-instruction the P-Adder mechanism defaults to an increment-P mode. In this mode the value of P+1 is continuously being formed. This is the typical way in which the value of the program counter is changed at the end of non-branching machine-instructions.

The output of the P-Adder mechanism is available to the $\overline{IDB}$ Bus through the DMP PAD micro-instruction.

The D Register is used to drive the IDA Bus through the SET IDA micro-instruction. Because of limitations on transistor device sizes and the large capacitances possible on the IDA Bus, two consecutive SET IDA's are required to ensure that the IDA Bus properly represents the desired data.

The BPC has special circuitry to detect a machine-instruction that requires an indirect memory cycle. This circuitry generates a qualifier (IND) used in the ROM. Flow-charting corresponding to a machine-instruction that can do indirect addressing has special activity to handle the occurrence of an indirect reference.

In the event of an interrupt request generated by the IOC the BPC aborts the execution of the machine-instruction just fetched, and without incrementing the program counter, executes the following machine-instruction instead: JMP $10_8$, I. Register $10_8$ is the Interrupt Vector Register (IV) in the IOC. This is part of the means by which vectored interrupt is implemented. FIG. 88 illustrates interrupt operation.

In the event that an addressable register within the BPC is the object of a memory cycle, whether the memory cycle is originated by the BPC itself, or by an agency external to the BPC, a BPC Register Detection and Address Latch circuit detects that fact (by the value of the address) and latches the address, and also latches whether the operation is a read or a write. The result of this action is two-fold: First, it supplies qualifier information to the ROM so that micro-instructions necessary to the completion of the memory cycle may be issued. Secondly, it initiates action within the M-Section that aids in the handling of the various memory cycle control signals.

FIGS. 78 through 89 are waveforms that illustrate the various memory cycles that can occur, in various operational contexts. FIG. 77 explains the notational conventions used in those waveforms.

The BPC can interrupt the execution of a machine-instruction to allow some other agency to use the IDA Bus. The BPC will do this whenever Bus Request ($\overline{BR}$) is active, and the BPC is not in the middle of a memory cycle. When these conditions are met, the BPC issues a signal called Bus Grant (BG) to inform the requesting agency that the IDA Bus is available, and the BPC also generates an internal signal called Stop (STP) that halts the operation of the decrementer in the I Register, and halts the change of the ROM state-counter. In addition, STP inhibits the decoding from the ROM of all but those micro-instructions needed to respond to memory cycles under the control of the M-Section. STP and BP are given until the requesting agency signals that its use of the IDA Bus is over by releasing $\overline{BR}$. This capability is the basis of Direct Memory Access, as implemented by the IOC. FIG. 89 illustrates the operation of Bus Request and Bus Grant.

Internal Description of the IOC

The IOC may be understood with reference to the block diagram of FIG. 90. A DMP IDA micro-instruction provides communication from the IDA Bus to the internal $\overline{IDC}$ Bus in the IOC. A SET IDA micro-instruction provides communication from the IOC to the IDA Bus; SET IDA drives the IDA Bus according to the contents of the O Register, which in turn is set with a SET O micro-instruction.

As in the BPC, an Address Decode section and associated latches detect the appearance of an IOC-related register address. Such an event results in the address being latched and sent to the Bus Control ROM as qualifier information.

There are two main ROMs in the IOC. These are the Bus Control ROM and the Instruction Control ROM. The Bus Control ROM is responsible for generating and responding to activity between the IOC and the IDA and $\overline{IOD}$ busses. This class of activity consists of memory cycles, I/O Bus cycles, interrupt polls, interrupt requests, and requests for DMA. The Instruction Control ROM is responsible for recognizing fetched IOC machine-instructions, and for implementing the algorithms that accomplish those instructions. Frequently, the Bus Control ROM will undertake activity on behalf of the Instruction Control ROM. These two ROMs are physically merged, and share a common set of decodable micro-instructions.

Figure 92:
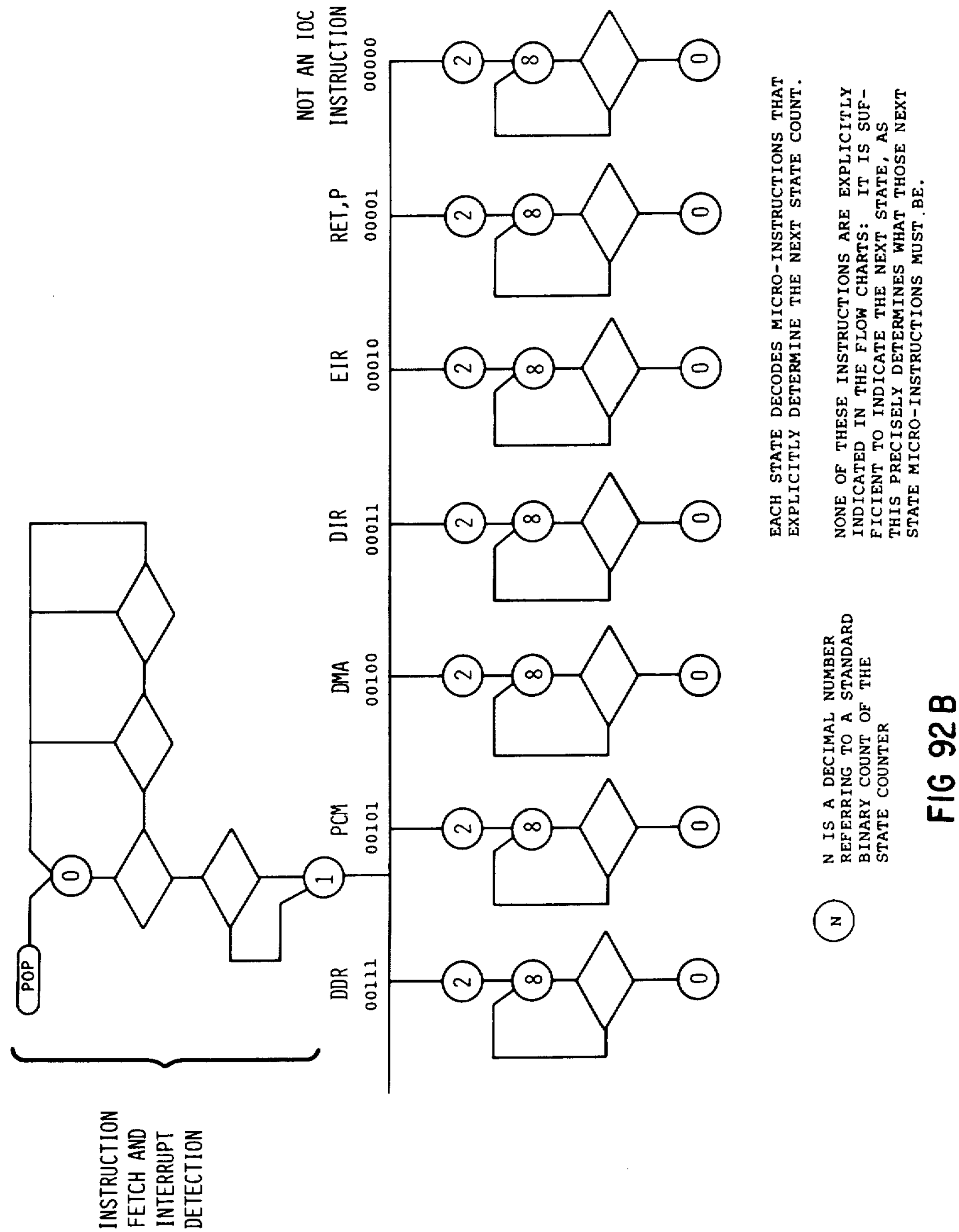

However, each of the two ROMs has its own state-counter. For each ROM, the next state is explicitly decoded by each current state. FIGS. 92 and 93 are flow charts depicting Instruction Controller activity. FIGS. 94 and 95 are flow charts depicting Bus Controller activity. FIG. 91 explains the conventions used in the flow charts.

The I Register serves a function similar to that of the I Register of the BPC. It serves as a repository to hold the fetched machine-instruction and to supply that instruction to Instruction Decode. Instruction Decode generates Asynchronous Control Lines that are similar in function to those of the BPC. Instruction Decode also generates Instruction Qualifiers that represent the machine-instruction to the ROM mechanism.

The W Register is used primarily in conjuction with the execution of the place and withdraw machine-instructions. Each such instruction requires two memory cycles; one to get the data from the source, and one to transmit it to the destination. W serves as a place to hold the data in between those memory cycles.

The DMP W function is complex, and is implemented by a DMP W and Crossover Network. If the place or withdraw operation is for the entire word, the crossover function is not employed, and the pairs of singls OLB, DLB, and, OMB, DMB, work together to implement a standard 16-bit DMP W. However, a byte oriented place or withdraw instruction involves the dumping of only a single byte of W onto the $\overline{IDC}$ Bus. This is done in the following combinations: least-significant byte of W to most-significant half of the $\overline{IDC}$ Bus; and, most-significant byte of W to least-significant half of the $\overline{IDC}$ Bus. The exact mode of operation during a DMP W is determined by W Register Control on the basis of the Asynchronous Control Lines from Instruction Decode.

Another use of W occurs during an interrupt. During an interrupt poll the response of the requesting peripheral (s) is loaded into the least-significant half of W. These eight bits represent the eight peripherals on the currently active (or enabled) level of interrupt. Each peripheral requesting interrupt service during the poll will have a one in its corresponding bit. This eight-bit pattern is fed to a Select Code Priority Resolver and 3 LSB Interrupt Vector Generator. That circuitry identifies the highest numbered select code requesting service (should there be more than one) and generates the three least-significant bits of binary code that correspond to that peripheral's select code. The next most-significant bit corresponds to the level at which the interrupt is being granted, and it is available from the interrupt circuitry in the form of the signal $\overline{PHIR}$.

The interrupt vector is made up of the three least-significant bits from W, as encoded by the priority resolver, the bit corresponding to $\overline{PHIR}$, and the 12 bits contained in the Interrupt Vector Register (IV). Thus, when an interrupt is granted the complete interrupt vector is placed on the $\overline{IDC}$ Bus by simultaneously giving the following micro-instructions: EPR, DMP ISC, UIG, and DMP IV.

The C and D Registers are the pointer registers used for place and withdraw operations. These registers operate in conjunction with the one-bit registers CB and DB (respectivey) to provide word-oriented or byte-oriented addresses into the firmware-managed stacks. Each of the C and D registers is equipped with a 16-bit increment and decrement network for changing the value of the pointer. A means is also included for updating CB and DB, as if they were 17th bits. Whether to increment or decrement is controlled by the Asynchronous Control Lines.

The DMA Memory Address (DMAMA) and DMA Count (DMAC) Registers are similar to the C and D Registers, except that DMAMA always increments, and that DMAC always decrements. These two registers are used in conjunction to identify the destination or source address in memory of each DMA transfer, and to keep a count of the number of such transfers so far.

Two separate mechanisms are provided for the storage of peripheral select codes. The DMAPA Register is a four-bit register used to contain the select code of any peripheral that is engaged in DMA.

The other mechanism is a three-level stack, also four bits wide, whose uppermost level is the Peripheral Address Register (PA). It is in this stack that peripheral select codes for both standard I/O and interrupt I/O are kept. The stack is managed by the interrupt circuitry.

The Peripheral Address Lines (PA Lines) reflect either the contents of DMAPA or PA, depending upon whether or not the associated I/O Bus cycles are for DMA or not, respectively. This selection is controlled by the DMA circuitry, and is implemented by the Peripheral Address Bus Controller.

Three latches control whether or not the Interrupt System is active or disabled, whether or not the DMA Mode is active or disabled, and, whether or not the Pulse Count Mode is active or disabled. Those latches are respectively controlled by these machine-instructions; EIR and DIR for the Interrupt System, and, DMA, PCM, and DDR for DMA-type operations.

The interrupt circuitry is controlled by a two-bit state-counter and ROM. The state-counter is used to represent the level of interrupt currently in use. Requests for interrupt are converted into qualifiers for the ROM of the interrupt controller. If the interrupt request can be granted, the approved request is then represented by a change in state of that ROM, as well as by instructions decoded from that ROM and sent to the Interrupt Grant Network. This circuitry generates the $\overline{INT}$ signal used to cause an interrupt of the BPC, and, generates an INTQ qualifier that represents the occurrence of an interrupt to the main ROM mechanism in the IOC so that an interrupt poll can be initiated.

The DMA circuitry is similar in its method of control. It has a ROM controlled by a three-bit state-counter.

FIGS. 97 through 115 are waveforms illustrating IOC activity in its various modes of operation. FIG. 96 explains the convention used in the waveforms.

FIG. 116 depicts the internal block diagram of the EMC. The micro-instructions SET IDA and DMP IDA are the communication link between the external IDA bus and the internal $\overline{IDM}$ bus. Instructions are fetched by the BPC and placed on the IDA Bus. All chips connected to the bus decode them and then react accordingly.

Figure 121D:
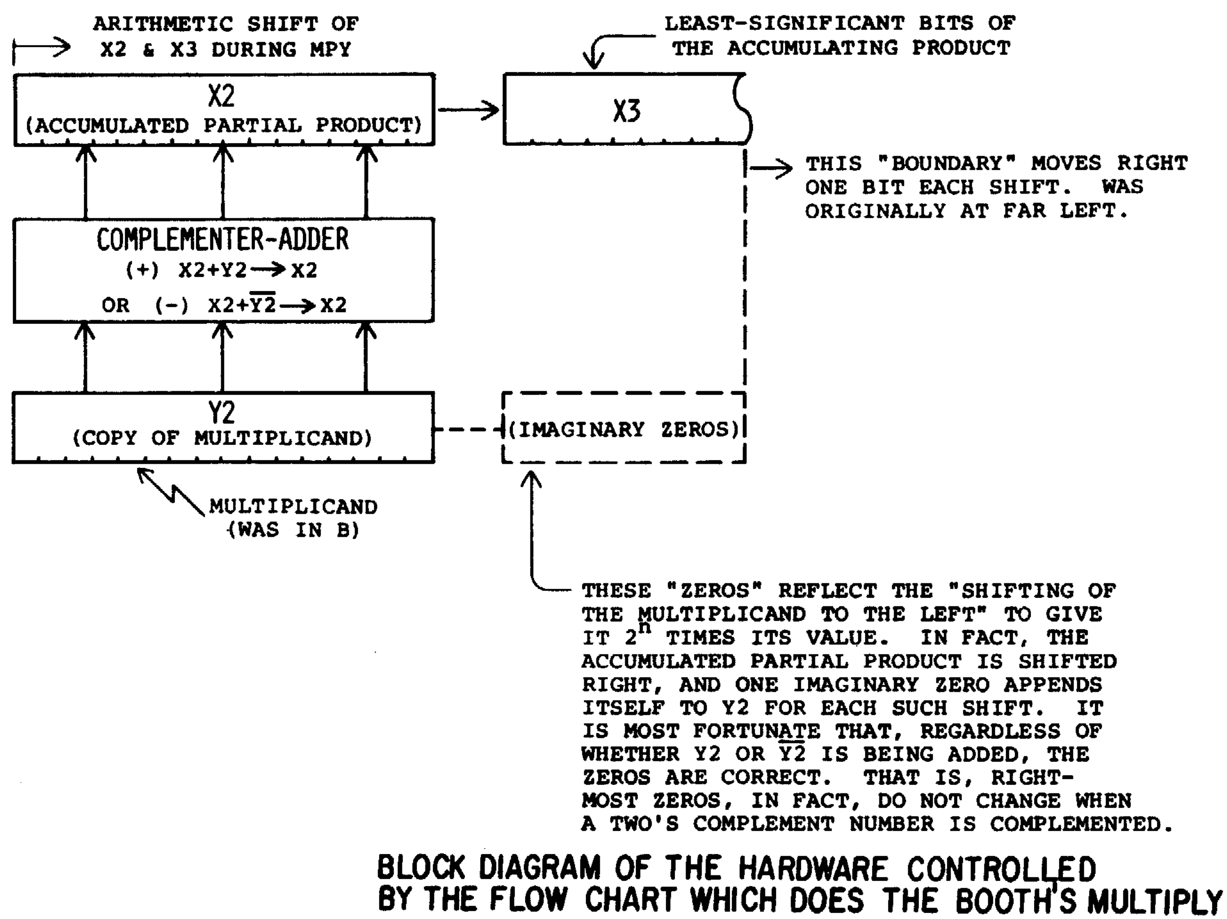

If a fetched instruction is not an EMC instruction, or if an interrupt request is made, the EMC ignores the instruction. Upon completion of an instruction by another chip or upon completion of an interrupt, the EMC examines the next fetched instruction. If the instruction is an EMC instruction, it is executed and data affected by it are transferred via the IDA bus. At the appropriate point during the execution of the instruction, SYNC is given to indicate to other chips that the EMC has finished using the IDA Bus, and consequently, to treat the next item that appears on the IDA Bus as an instruction. FIGS. 118 and 119 are flow charts detailing the manner in which the EMC executes its machine-instruction. FIG. 117 explains the conventions used in the flow charts. FIG. 120 provides additional sequence information concerning the operation of the MRX and DRS machine-instructions. FIG. 121 provides additional information concerning the operation of the MPY machine-instruction.

The Word Pointer Shift Register points to the register to be affected by the DMPX/SETX or DMPY/SETY micro-instructions and simultaneously specifies the registers to be bussed to the Adder. It is also employed as a counter in some instructions.

Once data is on the $\overline{IDM}$ Bus, it can then be loaded into one of several registers by issuing the appropriate micro-instruction. The data paths between IDM and the X and Y registers can be controlled in two ways. One way is by issuing an explicit micro-instruction, e.g., SET Y2 would set the Y2 Register with the data on $\overline{IDM}$. Another way of accomplishing the same thing would be to issue a SET Y with the Word Pointer equalling two.

The X Registers are used for all shifting operations: the direction of the shift is instruction dependent.

The Shift Extend Register is a four-bit addressable register used to hold a digit to be shifted into the X register, or to hold one that has been shifted out of X.

The Arithmetic Extend Register is a four-bit addressable (read-only) register used to accumulate a decimal digit for the FMP and FDV instructions and serves as a number-of-shifts accumulator in the NRM instruction.

The N Counter is used: to indicate the number of words involved in the CLR and XRF instructions; to indicate the number of shifts in MRX, MRY, MLY and DRS; to contain the multiplier digit in FMP; and as a loop counter in MPY.

The Adder is capable of either binary or BCD addition. The complementer is capable of forming either the one's or nine's complement of the Y Register inputs. A carry-in signal is available from three sources for generating two's or ten's complement arithmetic.

The Decimal Carry Register is a one-bit register that can hold the carry-out of the Adder. ADR1 is the address of the AR1 operand; its two least significant bits are determined by the word pointer, e.g., WPϕ implies 00, WP1 implies 01, etc.

Miscellaneous hardware enhances the execution of the two's complement binary multiply instruction (MPY), as shown in FIG. 121.

The M-Section of the EMC is responsible for EMC responses to memory cycles which are directed to it by outside agencies. (Memory cycles originated by the EMC are all handled by the section of flow charting responsible.) The EMC M-Section is similar to that of the BPC, except that in the EMC the generation of the appropriate SET or DUMP micro-instructions is under the control of a separate ROM. That ROM is the Address Decode ROM. It supplies SET or DUMP micro-instructions based upon the address latched by the Register Detection/Address Latch circuit, and based on whether the memory cycle is a read or a write memory cycle. FIG. 122 is a flow chart relating such memory cycles to M-Section activity.

FIGS. 124 through 127 are waveforms describing the timing sequences of the various memory cycles that the EMC can become involved in. FIG. 123 explains the conventions used in the waveforms.

MEMORY ADDRESS EXTENSION

General Considerations

Referring to FIGS. 43 and 131, the calculator has a memory address space of 128K words; yet each processor has the inherent ability to address only a 64K memory. On the surface, it might seem that since 64K+64K=128K, each processor handles half the memory. One must not be deceived by that ztempting but simplistic idea.

Instead, the address space is divided into four 32K word blocks. The number of possible blocks is 64K. The number is limited only by the number of different integers that can be stored in a 16-bit register. However, the size of each block is restricted to 32K words. The LPU's 64K address space is divided by the Memory Address Extender (MAE) into two 32K "block spaces", as shown in FIG. 128. The PPU's 64K address space is also partitioned, although not by the MAE. A good portion of the explanation of the MAE revolves around explaining what circumstances determine which two of the four blocks represent the 64K address space of the LPU.

The processors themselves, in terms of their internal architecture and operation, know absolutely nothing of the memory address extension scheme. Regardless of how many blocks are implemented, they each understand only their own individual 64K address spaces. The MAE employs a sophisticated technique to fool the LPU by switching blocks of memory "out from underneath" the LPU as it runs; it is typical for a memory reference instruction (e.g., LDA HOOK) to be fetched from one block while HOOK itself is in a different block. Such an instance requires automatic block switching during the execution of the instruction.

The general description of how it is done is this. The MAE embodies a set of conventions describing under what circumstances the processor will be "connected" to each block. The conventions have to do with what kind of instruction is being executed, and with the contents of some additional 2-bit registers in the MAE itself (R34, R35, and R37—each is named for its octal address). The contents of these registers are controlled exclusively by the system programmer. Thus the programmer can predict exactly, and to a large extent control, the behavior of the MAE. The conventions embodied in the MAE were chosen to be useful ones; it is an encumbrance upon the system programmer to learn them and put them to use.

One further bit of clarificaton. The memory address extension scheme is performed only for the LPU. The address space for the PPU is exactly 64K. It just so happens that the bottom half of that 64K space (the lower numbered addresses) is the same physical memory space as the LPU calls block 1, and that the upper half of the PPU's address space is the same as block 0. It wouldn't have to be this way. The function of the MAE is, in principle, altogether separate from the notion of having the processors share memory. If the calculator had only the LPU it would still (presumably) have the MAE. Or, the PPU could have addressed its own private memory, i.e., a single 64K parcel with no connection at all to the LPU. As it is, it is for convenience that the 64K addressed by the PPU overlaps the 128K addressed by the LPU; the LPU system programmer has to think in terms of blocks, the PPU system programmer calls his memory space block 1 and block 0 only for ease in communicaton with his LPU counterpart.

Also, the problems arising from both processors trying, at the same time to access block 0 or block 1, and the subsequent need for a dual-port memory controller, [these problems] are not part of the memory address extension scheme.

Basic Principles

The description of the memory address extension scheme requires the concepts of home block and working block. A home block (and there is more than one kind) is a particular block that is always the accessed block whenever certain specific conditions are met. The various home block designations are fixed, and cannot be changed. A working block is a block that is designated by the contents of registers 34 through 37, in the MAE. If, during an LPU access of memory, a home block is not being accessed, then a working block is; there are no other choices. Now, the circumstances that determine which home block is in use also determine which of registers 34–37 shall pick the working block. If register 34 is to determine the working block, then the contents of register 34 are taken as the binary equivalent of that block-number. (Register 34 will have previously been loaded with the desired number.)

Now a given block, say, block 3, can be a home block under some circumstances, but a working block in others. The key to understanding this scheme is to avoid thinking that a particular block is always a home block. Rather, certain circumstances always designate particular blocks as home blocks. However, those same blocks can also be designated, or accessed as working blocks, in other ways, too.

As an example, block 3 is the home block for instruction fetches, and R34 designates the working block for instruction fetches. In other words, the programmer can execute code in block 3 by accessing it as home block, or, execute code out of any other block (for which its contents make sense to do so) by setting R34 to its block number and accessing that code as working-block code.

There must now be explained the mechanism used to distinguish between home block designations and working block designations. It is done with the most-significant bit of address for the designated location. For example, during instruction fetches a one in bit 15 of the address (upper half of the address space) indicates a fetch from a working block. A zero in bit 15 of the address indicates home block (block 3, in this instance). Notice that using the most-significant bit as a "block designator" effectively removes it from the address space of the designated block. (No address bit can do double duty in an address space. The most-significant bit effectively picks which block. The remaining bits pick where in that block. The most-significant bit cannot be used over again to pick which half of the block. Hence, only 15 bits are available for addressing within a block.) Hence the blocks themselves are only 15-bit address spaces (32K).

Notice that in the example just given the scheme is compatible with a standard assembler for a 16-bit address space. What it amounts to is a programmer imposed partition of the 64K address space into two independent 32K spaces called blocks. The assembler and the processor don't know anything about blocks; the mechanism is implicit in the way the code is arranged, in conjunction with the attributes of the MAE.

Sometimes a one in the most-significant bit denotes home block, rather than working block. But not for instruction fetches; they are always done as described above.

There are three general sets of circumstances which determine both: (1) What block is the home block, and (2) What register determines the working block. (Broadly speaking, these three categories are instruction fetches, indirect reference, and bus requests.) FIGS. 129 and 130 are summaries of how and under what circumstances the various home block assignments are made. They also show the accompanying addressing scheme. In addition, both figures show the location of the various page segments.

Base Page Considerations

Recall that, in the addressing space of the processor, the base page is separated into two halves, which we may refer to as the upper-half and the lower-half. The lower-half is the lowest numbered $512_{10}$ or $1000_8$ addresses, and as such, all of the addresses of the lower-half of the base page have a zero in bit 15. The upper-half of the base page is the $512_{10}$ or $1000_8$ highest numbered addresses, and they all have a one in bit 15.

One immediate consequence of this, in view of the fact that bit 15 of an address distinguishes between home block and working blocks, is that automatically base page addresses are split between the home block and working blocks. But before taking a closer look at the implications of this, it will be helpful to take a closer look at the notion of the base page itself.

In terms of the service rendered the processor by the memory, it is impossible to assign functional meaning to the notion of a page, much less to the notion of a base page. By that statement is meant that if one were to listen to the nature of the communication between the processor and memory (i.e., memory cycles) one would never suspect the existence of the notion of pages. Pages are a device that has meaning only in describing fundamental limitations on the memory addressing information necessarily contained within the bit patterns of memory reference instructions. It is important to understand this. It means, for instance, that if (by some possible magic) a memory reference instructions comprising 16 bits could also have 16 bits of addressing contained within it, that there would be no need of pages. It also means that there is nothing special about a memory cycle done to a location on the base page; there is no special hardware in the memory to implement either the notion of pages, or, in particular, the base page. To be sure, there is something special about a memory reference instruction bit pattern that specifies a base page reference, but that is a (mere?) convention that the programmer, assembler, and BPC know about. In short, the base page is an idea that makes sense only under certain conditions, and it does not have a special physical embodiment in the memory. The conditions for which the idea of base page makes sense are those concerned with the 14 memory reference instructions implemented by the BPC; if it weren't for them, there would be no pages at all. It is true that internally the BPC does something special to make a base page reference. But after it has finally done it, the result looks just like another memory cycle.

Recall the claim that there were three different general circumstances surrounding home and working block designations. By understanding when it makes sense to worry about base page references as something special, and when to consider a base page access as just another memory cycle, it is possible to dispense with analyzing how the base page ineracts with MAE operation in all but one of those three general circumstances.

That single general circumstance is the one concerned with "instruction fetches, link-pointer fetches (for indirect addressing), and most current page non-indirect memory references,"as shown in FIG. 130. That situation is now considered below.

MAE Operation

To begin with, the MAE listens to Sync so that it can tell when a memory cycle is being done as an instruction fetch. It needs to know this because instruction fetches are done with a particular kind of block allocation. Furthermore, the MAE needs to listen to the bit pattern of the actual fetched instruction so it can tell what kind it is; some instructions involve subsequent memory cycles requiring a different block allocation. An example is an indirect reference by a memory reference instruction.

Upon reflection, it is clear that as far as the BPC is concerned, the only instructions that are affected by the memory address extension scheme are the memory reference instructions; they are the only ones that require memory cycles during their execution. (For now, ignore 10C or EMC instructions that reference memory. They will be covered later.) At the time such an instruction is fetched, the MAE notices if the reference is indirect or not, and also if the reference is to the base page or to the current page. This information is all available as part of the instruction bit pattern. While current page references are almost always taken from the same block as the instruction was fetched from, indirect references can access final destination locations that are in any block; just which block is determined by the contents of register 35 and a different block allocation scheme. The appearance of a base page reference in an instruction also makes a difference.

It was mentioned above that current page references for memory reference instructions are almost always made to the same block as the instruction was fetched from. The following paragraphs explain that statement.

. The MAE does not force a current page reference to be made to the same block as it originated in. But it is rare for it to be otherwise. First, the MAE decides on working or home block for the reference location based on the MSB of the address sent by the BPC. There is only one case where the MSB of that address will not match the MSB of the address from which the memory reference instruction having said current page reference was fetched from. That case occurs during relative addressing (which the calculator does use) whenever the value of P is such that part of the current page has a zero for its address-MSB, and part has a one. That is, whenever the current page is split across the junction of the home block and the working block. In such a case, a current page reference could occur even though the instruction was fetched from one block and references a location in the other. This could easily happen if one were to write code that would span the junction of the two blocks. To do that would be unusual, although it would work.

The situation doesn't arise with absolute addressing, first because the calculator doesn't use it, and even if it did, the block boundaries would all fall on page boundaries, thus preventing any splitting or a page by the block junction.

Hence, except for the unusual case noted, which is never expected to happen, current page references for memory reference instructions are always fetched from the same block as the instruction.

FIG. 130 shows that for instruction fetches, block 3 is the home block and is designated by a zero in bit 15 of the address of the instruction to be fetched; a one designates working block per R34. Now, since this home block is in the bottom half of the processor's 64K address space, it must also contain those addresses that are the lower-address portion of the LPU's base page. And indeed, that is where that part of the LPU's base page is physically located. But notice what happens if the working block is designated. That block (whichever one it is) contains the address space for the upper-address portion of the LPU's base page, since all working block addresses have a one in bit 15. Such an address can refer to any of three physical locations. But there can be but one physical instance of that part of the base page; the MAE resolves this by forcing a top-half-of-LPU-base-page address to result in an access to block 0. This leaves some "empty" spots in the other working blocks (however, this turns out to be potential problem only for code written for block 2).

Thus, the MAE interferes with the basic block allocation scheme to make there be but one physical base page, the parts of which are in two blocks, even though the addressing scheme implies the possible existence of multiple "upper-halves". Since current page references are usually made to the block they originated on, that leaves only indirect reference to be explained.

To begin with, indirect memory references always involve two memory cycles. This is because the processor does not have multi-level indirect addressing; it has only single level indirect addressing. The first of these two memory cycles is done to read the value of a link-pointer word, whose contents are the final destination address. The reading of the link-pointer itself is done as described for non-indirect references; that is, it is either on the current page or the base page. If it is on the base page, it comes from there; if it is on the current page, it is read from there, which is almost always on the same block as the instruction was fetched from.

However, once the link-pointer is in hand, the situation changes. The MAE knows that this is the state of affairs, and switches the block allocation scheme for the next memory cycle, which is the cycle to access the final destination location. For that access, the home block will be block 0, and it's designated with a one in bit 15 of the contents of the link-pointer. A zero designates working block via R35. There are things that follow from doing it this way. First, with regard to why block 0 is the home block and is designated with a one in bit 15: This ensures that references to the upper half of the base page (which is Read/Write Memory) end up in that physical portion of memory which is indeed the base page. This follows from the notion of "home block". Next, it allows the programmer to use a conveniently located collection of link-pointers to reference data which is located in an arbitrarily chosen block. He simply sets R35 in advance. Notice, though, that if he wants to reference the lower half of the base page, he must ensure that R35 selects block 3; recall the discussion about the meaning of "base page". A base page indirect memory reference merely means the link-pointer is on the base page; it is assumed that the contents of the link-pointer word can address (directly and completely) any location in the 64K address space. With such unrestricted addressing the notion of base page loses its functional necessity, as described earlier.

At this point it is clear that code being executed from any block can indirectly reference data in any other block. All that is required is that the link-pointer have a zero in bit 15 and that R35 be previously set to the block of the final destination, if that destination is in a working block; or, if the destination is in the home block (block 0), that the link-pointer have a one bit 15.

Consideration of indirect references invoked a second block allocation scheme; it is also depicted in FIG. 130. According to the figure, place and withdraw instructions, as well as EMC instructions that reference memory, all access memory under that same new allocation. It was convenient, for both the hardware design and the anticipated needs of the programmer, to do it that way. There are no other special considerations concerning IOC and EMC instructions.

These facts summarize instruction fetches:

1. The MAE knows which memory cycles are instruction fetches.
2. If the address of the instruction (value of P) has a zero in bit 15, it is fetched, from block 3, which is the home block.
3. If there is a one in bit 15, R34's contents determine which block is fetched from, using the obvious binary correspondence.

These facts summarize references to memory occurring during the execution of instructions:

1. The MAE knows what kind of instruction has been fetched.
2. If an instruction is not a BPC memory reference instruction its associated memory accesses are done thusly:
   a. Home block is block 0.
   b. Working block is determined by R35.
   c. Bit 15=1 implies home block, bit 15=0 implies working block.
3. If an instruction is a BPC memory reference instruction its associated memory accesses are done thusly:
   a. Current page non-indirect references are almost always made to the same block the instruction was fetched from.
   b. Base page non-indirect references are made to the particular part of the base page specified.
   c. Block 3 contains the lower-half of the base page and block 0 has the upper-half, regardless of which working block is specified.
   d. For indirect references the link-pointer is accessed according to whether it is on the current page or base page, as described above, but the access to the final destination location is made according to the block allocation rules for IOC and EMC instructions.

These facts summarize memory access during a bus grant:

1. The MAE remembers which block allocation scheme was suspended in order to do the bus grant, and will correctly restore the suspended mode when the activity is completed.
2. During a bus grant:
   a. Home block is block 0.
   b. Working block is determined by R37.
   c. Bit 15=1 implies home block, bit 15=0 implies working block.

The LPU invokes the bus grant conventions only when the tester (a hardware apparatus, for controlling the processor) is active. The LPU does not do any DMA, but if it did, that too would be done under the R37 block allocation scheme.

These relationships are schematically indicated in FIGS. 130 and 132. FIG. 132 allows one to "compute" the MAE's response to any memory cycle, provided one has some foreknowledge about what sequence of memory cycles will occur as a result of executing any particular instruction.

Some Special Considerations

There are a number of special considerations that one should keep in mind. The first of these concerns the addresses of registers: 0–$37_8$. Whenever any part of the processor-system addresses a location whose address falls within the range 0–$37_8$, inclusive, the BPC generates a signal called RAL. This line is used by the main memory so as to prevent itself from responding; this allows the physical locations of those addresses to be distributed throughout the system. Now, the BPC knows nothing of the memory address extension scheme, and generates RAL any time an address of 0–$37_8$ is on the bus. This causes no problem with R34-type block allocations, as in those cases the addressing space occupied by the registers maps into the home block; and for any block allocation there is only ever one home block.

But for register references via indirect addressing, or by the IOC or EMC, some wasted physical memory locations result because it is the working block that has the address space of the registers. So those locations, in each block, are unaccessable. A similar condition exists for R37-type block allocations.

A second consideration involves assembler operation and working-block instruction fetches from the top half-page of block 2. Any current page type reference needed by such an instruction would (unless the assembler were somehow prevented from doing so) be formed as a base page reference because of the range of address involved. A base page reference would, of course, access the top half-page of block 0, not block 2, as intended. The various assemblers could be modified to allow selective suppression of base page references, and this would completely solve the problem. But as it is, this is not a problem for code fetched from working blocks other than block 2, because:

1. Block 0 has the top-half of the LPU's base page, anyway.
2. Block 1 has the top-half of the PPU's base page, and LPU would never executer code from there.

3. Any code in block 3 can be executed as code from the home block, which of course, it is. However, even if for some reason it is necessary to make block 3 also be the working block, code written for that can be assembled as if it were for the home block. If block 3 is both the working and home block, then the instruction fetched from, or the current page reference made to, location 1XXXXX is physically identical with the instruction fetched from or the current page reference made to location 0XXXXX.

Another solution to this problem would be to assemble block 2 code destined for the upper portions of the block as if it were to be loaded into the lower-half of the 64K address space, instead of the upper-half. That is, pretend it is going to be home block code, but load it into the working block, instead. With this scheme, however, one must watch out for current page references to the bottom half-page; now they will end up as base page references.

But between the two ways to assemble block 2 code, (as working block or home block, upper-half or lower-half of the processor's 64K address space) one will probably always work, as it is unlikely that anyone will ever assemble an entire 32K chunk of code at one time.

Comments On Branching

Most of the remarks to this point pertain to the memory cycles of instructions that manipulate memory as their main function; that is, instruction fetches and all the various forms of memory reference such as LDA Hook, [I]. But the subject of branching deserves its own remarks, too.

The easiest case is so simple as to almost be deceptive. Consider JMP HOOK, where HOOK is on either the base page or the current page. FIG. 132 shows that the MAE virtually ignores a "jump-direct". According to conventional wisdom a jump-direct uses a memory reference instruction, but strictly speaking, a direct jump ought not to be so called. The reason is that for any direct JMP, whether current page or base page, the BPC does not do a memory cycle as part of the execution of that JMP. Instead, a process that is wholly internal to the BPC simply changes the value of the P register; and that change is reflected solely as a new address for the next instruction fetch. So no MAE action is required.

JMP-indirect is another matter, however. It is a genuine memory reference instruction, requiring an intermediate memory cycle. In the event that the link-pointer is on the base page, the MAE ensures that it is reached properly; block 0 or block 3 will be correctly accessed in the same way as is any linkpointer for a memory reference instruction. Current page link-pointers for JMP are accessed (as are all current page link-pointers) under the same block allocation scheme as instruction fetches and current page non-indirect references. Either way, the difference is that once the value of the link-pointer is in hand, rather than there being yet another intermediate memory cycle as with other memory reference instructions, that value is used to change P. As before, the direct effect of that is felt only at the next instruction fetch.

JSM is handled in a manner that is altogether analogous to JMP, with the following extra consideration: The return stack is automatically located in block 0 as long as the most-significant bit of the R register is set. Now, there are a variety of reasons why the MSB of R must be set, some having to do only with the BPC and IOC. Proper MAE operation requires it, also. Anyhow, the last act of any JSM is to (force block 0 and) store onto the return stack.

The RET machine-instruction requires on intermediate memory cycle to read the top of the return stack. The MAE will direct this read to block 0 as long as the MSB of R is set.

There is but one general topic left for discussion: inter-block branching. A brief review of intra-block branching is perhaps in order first.

To begin with, direct JMP's and JSM's within the current page are handled without much ado. Their intermediate memory cycles, if any are required, will (almost always) come from the block in use. To assemble such a branch, one merely assumes that the home block and the working-block-in-use constitute a 64K address space, and one then uses any of the processor and assembler supplied techniques.

Direct JMP's and JSM's to the base page are equally easy to make. To assemble one of those, simply ensure that the operand of the instruction is a base page address.

Off-page branching (to other than the base page) within a block requires indirect addressing. The link-pointer will (almost always) be fetched from the block containing the branching instructions, while the MSB of the link-pointer must re-designate that particular block.

It is in the possibilities of indirect addressing that block-to-block branching becomes a reality. Code executing in the home block can branch, via an indirect address, to any location in any block. The way this is done is by setting R34 to designate the destination block. The MSB of the link-pointer is set, and its lower 15 bits are loaded with the destination address within the working block. Then the indirect branch itself is done. One must not change R34 while still executing code within the working block! JMP'ing and JSM'ing from the working block to the home block is done by having the MSB of the link-pointer be a zero with the lower 15 bits designating the destination address within the home block.

RET's of JSM's pretty much take care of themselves, as long as the JSM is done in any one of the cases mentioned to this point.

The thing that is difficult to do is branch from one working block to another. This requires the use of a utility routine on the home block. The point of origin for the jump must first inform the utility routine of the destination block number, and of the destination address in that block. The point of origin branches to the utility, and then the utility branches to the desired final destination. This home block utility can get complicated if it is to handle JSM's. In that case the utility has to manage a firmware stack of values from R34. Such a stack is a necessary adjunct to the R register and its return stack. Returns would be made by passing parameters to the utility, JMP's ing to it; and letting it do the RET.

Description of MAE Hardware

Referring to FIG. 133, the hardware to implement the Memory Address Extension scheme is grouped into the major blocks shown.

The instruction decode logic is set up to respond to the bit patterns of the following types of BPC instructions.

| | |
|---|---|
| 1. Base page / $\overline{\text{Base page}}$ | (LIDA(10) = 0/1) |
| 2. Indirect / $\overline{\text{Indirect}}$ | (LIDA(15) = 1/0) |
| 3. BPC memory reference group instruction | $\overline{\text{(LIDA(14) . LIDA(13) . LIDA(12)}}$ = 0) |
| 4. BPC JMP or JSM instruction | (LIDA(11) . $\overline{\text{LIDA(12)}}$ . LIDA(13) . $\overline{\text{LIDA(14)}}$ = 1 or |
| | $\overline{\text{LIDA(11)}}$ . LIDA(12) . LIDA(13) . $\overline{\text{LIDA(14)}}$ = 1) |

The result of decoding the instruction is saved in the instruction latch only when LSMC and LSYC are both true.

The memory cycle latch is used to indicate how many memory cycles have occurred since the instruction fetch; three distinct states are recognized:

| | |
|---|---|
| 1. Instruction Fetch | ≡ LSYNC is true and Memory Cycle Latch is false |
| 2. BPC Direct Data Access, Link Pointer Fetch, First IOC or EMC Data Access | ≡ LSYNC is false and Memory Cycle Latch is false |
| 3. Indirect Data Access, Subsequent IOC or EMC Data Access | ≡ LSYNC is false and Memory Cycle Latch is true |

In reference to the memory address extension algorithm shown in FIG. 132, the latched instruction selects a "branch" to follow, and the memory cycle latch controls the progression "along" a branch from one memory access (shown in hexagonal boxes) to the next.

Referring again to FIG. 133, the instruction sequence logic sets up the multiplexer inputs corresponding to cases I, II, or III, based on the instruction and memory cycle latch state.

The LBG (Bus Grant) line is true when activity not affecting instruction execution is happening, e.g. DMA transfers or external test hardware action. When LBG is true the memory cycle latch is suspended and case V is set up as the multiplexer input.

FIG. 134A shows the schematic of the actual implementation of the instruction decode logic, instruction latch, instruction sequence logic, and components used in this assembly of the calculator.

The multiplexer is set up for case I, II, or III, or V by the instruction sequence logic. LIDA(15) is used to select between a home block and a working block. In FIG. 134C, U9 corresponds to the 2pole (2 bit), 4 position (cases) switch of FIG. 133 and U2 with part of U16 function as the 8 pole, 2 position switch.

The 4 registers of FIG. 133 function as read/write memory. They operate with the same timing as any processor register, and function independently of the block selection circuits. The address decode block allows the memory cycle control to activate only when an address in the range $34_8$ through $37_8$ is present on the IDA bus. In FIG. 134B, components U25, U26 decode the address and U20 holds the decoded address for one complete memory cycle. Component U20 also holds the state of LIDA(15), LIDA(1) and LIDA(0) for one complete memory cycle. Components U10, U13 form the memory cycle control. In FIG. 134C, components U7, U8 are the actual memory storage, and U6, U15 control the reading out of or writing into a register from the IDA bus.

The 4-block (2 bit) memory address extension hardware was designed for economy of space and component count. This hardware is a subset of the general address extension scheme in FIG. 135. By expanding each register to up to 16 bits, any number of blocks up to 65536 can be accessed. This reqires more bits (poles) in the multiplexer, but no additional cases (positions). In addition, the concept of a fixed home block is not necessary to this scheme (although) it does make the scheme easier to describe). By replacing the fixed block selection with the contents of a (new) register, additional addressing flexibility becomes available.

This memory address extension scheme is applicable to processors with an organization and instruction set similar to that of the BPC. (Such machines are commonly called "accumulator oriented" or "register oriented".)

DESCRIPTION OF THE DISLAY

General Description

The calculator's display is a dual raster scan CRT display. A 12" high resolution magnetic deflection CRT is used to provide adequate viewing area for high quality alphanumeric and graphic information. Up to 25 lines of 80 characters can be displayed at one time from a standard 128 character ASCII character set. A foreign character set can be added, as an option, to allow the user to display either French, Spanish, German, or Katakana. Other languages are also possible. Three methods of highlighting information are available to the user. They are inverse video, underlining, and blinking. Any or all of these functions can be changed on a character by character basis.

The viewing area for 25 lines of 80 characters, called the alpha raster, is approximately 9.3"×4.8", as shown in FIG. 3. This permits a matrix of 720×375 dots to be displayed. High resolution raster graphics can be added to the display as an option. In the graphics mode of operation, the viewing area, called the graphics raster, is approximately 7.9"×6.5" as shown in FIG. 5. This permits a matrix of 560 ×455 dots to be displayed. The graphics raster is a separate independent raster that is switched into operation when the dislay is in the Graphics Mode; hence the name dual raster scan. The dual raster scan capability allowed the size and aspect ratio of each raster to be chosen to optimize the quality and capability of the display for the function the user wishes to perform, and to achieve compatibility with the internal thermal printer/plotter.

Display Specifications

Display characteristics
  Scanning method:
    Noninterlace Raster Scan
  Refresh Rate:
    60Hz at all times
  Alpha Raster Size:
    W=9.3" H=4.84"
  Graphics Raster Size:
    W=7.9" H=6.4"

CRT:
 12" diagonal, P31 phosphor (yellow-green)
 Screen Brightness:
 Adjustable from 12 ft-L to 30 ft-L
 Screen Resolution:
 0.013" Alpha 0.014 Graphics
 Raster Distortion:
 <1% of full scale (horizontal)

Display Information (Alpha)
 Screen Capacity:
 2000 characters, 25 lines of 80 characters
 Standard Character Set:
 128 ASCII characters
 Character Font:
 7×9 in a 9×5 matrix
 Character Size:
 W=0.98" H=123" (7×9 character)
 Highlighting Capability:
 Inverse video, blinking, and underline Interface to Main frame (Alpha)
 Refresh Memory:
 Part of the calculator memory (4K bytes)
 Program Line Listing:
 Dependent on line length: approximately 160 20-character lines (8 pages) can be stored in the refresh memory.
 Split Screen: Top 20 lines used as a printer, bottom 4 as a interactive display.

General
 Power:
 Alpha only=50 watts. Alpha and Graphics=70 watts
 Dimensions:
 W=13.5" H=9.7" L=12"
 Weight: approximately 23 lbs.
 Operating Temperature:
 0° to +45° C.
 Safety:
 Implosion protection provided by a T-Band and a bonded implosion panel Optional Character Sets
 Languages:
 French, German, Spanish and Katakana
 Character Codes:
 Follow the basic ANSI Standard Graphics
 Matrix size:
 560×455 for 254,800 addressable points
 Memory:
 16K words of R/W Memory
 Resolution:
 0.014" center to center
 Cursor:
 Full screen or blinking crosshair in Graphics Mode, blinking underline in letter mode.
 Character Editing:
 Overstrike in letter mode
 Commands:
 Uses standard plotter commands
 Display Speed: 150 inches/sec.
 Printer Dump:
 Direct dump to internal printer/plotter

Display Quality

A considerable emphasis has been placed on optimizing the design to achieve a high quality display. To achieve high quality in a CRT display requires the optimization of many parameters. Some of the most important include character size and legibility, brightness, resolution, contrast, glare, focus, position distortion, and stability. Display quality was one of the major reasons for adding the dual raster scan capability. The Alpha Raster is tailored to display 80 adequately spaced characters per line, while using the maximum width possible without introducing excessive distortion due to nonuniformity in the CRT screen. A 7×9 character font in a 9×15 cell was chosen because this matrix is sufficient to generate aesthetically pleasing characters. The extra rows in the cell are used for spaces, ascenders that are needed for some of the European characters, and descenders that are used in some of the lower case Roman characters. FIG. 136 shows the character cell and a few examples of the characters. FIGS. 137 and 138 depict the entire standard ASCII character set, including the control characters.

The graphics raster displays the same high quality characters, but is limited to 62 per line. The graphics raster increases the resolution in the vertical dimension to maximize the percentage of screen area that can be used.

Brightness, contrast, spot size, and focus are four interdependent parameters that must be optimized in a high quality display. To achieve this required the selection of a high resolution tube, and the determination of grid voltages to give the best overall display. Using a high efficiency phosphor helped reduce the spot size by lowering the beam current required for a given brightness level. Improvement in contrast was achieved by using an implosion panel with 61% transmission. To achieve uniform brightness in both horizontal and vertical lines required the design of a high speed video circuit.

Uniform character size over the entire screen is difficult to achieve in CRT displays. Nonlinear current drives must be supplied to the yoke because the faceplate is not spherical. To achieve a more accurate current waveform, an active correction technique was employed in the display. The yoke current is compared to a reference current, generated by a diode function generator, and corrected when a difference occurs. With this scheme, an important factor greater than two was achieved in the position distortion.

Since visible motion on a display is quite annoying, it was decided to refresh the display at 60Hz even when the line frequency is 50Hz to minimize flicker. Sufficient magnetic shielding has been added to eliminate interference due to internal sources within the calculator, as well as from reasonable external magnetic fields.

Basic Architecture and Layout

A block diagram of the calculator's display system and its interface to the mainframe is shown in FIG. 139. (Notice the changes in terminology introduced by FIG. 139, as compared to FIG. 43). There are two interfaces to the PPU. The standard alphanumeric circuitry interfaces to the PPU Memory Bus, while the optional graphics circuitry interfaces to the Internal I/O Bus. The hardware for the display system can be described with four modules. Three of these modules, the Display Logic, the Monitor and the graphics hardware are located in the display itself, while the Control Logic is located in the mainframe. Interface connections to the mainframe are located in both legs of the display case. The alpha interface is located in the left leg, and the graphics interface is located in the right leg. Power is supplied by the mainframe's power supply, and is brought up through both legs.

The Alpha portion of the display has been designed as an integral part of the calculator to achieve high performance at a low cost. The advantage of this decision is an efficient implementation, utilizing the advantage of the mainframe peripheral processor, to minimize hardware, and maximize flexibility and capability through software control.

The refresh memory for the display is contained in Block 1 memory, which is the PPU memory. The data is accessed by technique called "Memory Cycle Stealing". This must occur on a regular basis to keep the display alive. The advantages of sharing memory with the PPU are a lower overall memory cost, a simplified controller in the display system, and a display format that is completely under the control of the PPU software. Therefore, different ROMs could be developed in the future that could tailor the display format to specific applications; e.g., form filling.

The interface and operation of the Graphics option to the display is discussed in a separate section.

Alpha Display Interface

The Control Logic for the display interfaces to the PPU Memory Busas shown in FIG. 139. To refresh the display, the Control Logic performs read memory cycles which obtain data. The read memory cycle is initiated by giving a bus request signal ($\overline{PBR}$). When the PPU is finished with its current memory cycle, it will halt and issue an external bus grant signal ($\overline{PEBG}$). When the Control Logic receives this signal, it will put an address on the PPU memory bus and initiate a signal to start a memory cycle ($\overline{PSTM}$). When the memory cycle is complete and the data is on the memory bus, the PPU will issue a synchronous memory complete signal ($\overline{PSMC}$). The Control Logic will latch the data and release the bus. The PPU will start up again from where it left off, with the only effect being the time delay of one memory cycle.

Since it is possible that several devices may want the use of the bus, the $\overline{PEBG}$ signal is handled by using a "daisy chain" interface. The PPU itself uses the $\overline{PEBG}$ signal during DMA and has the highest priority, followed by the display. Each device using this signal must have the capability of passing it on in the event that a lower priority device is the one requesting the bus. In the Control Logic, this signal is called CEBG.

Addresses 70000$_8$ to 74116$_8$ of Block 1 read/write memory are reserved for data to be displayed. This is enough space to store one full display with a different feature set for each character. Efficient allocation of memory allows 4 pages of average basic statements to be stored in the display buffer. This was made possible by not requiring storage of blanks to the right of information displayed.

The Control Logic latches 16 bit words read from memory and decodes two 8 bit bytes for each word. The following functions can be interpreted:

| 7 | 6 | 5 | 4 | 3 | 2 | 1 | 0 | ←Bit # within the byte |
|---|---|---|---|---|---|---|---|---|
| 0 | X | X | X | X | X | X | X | Data |
| 1 | 0 | 0 | 0 | 0 | 0 | 0 | 0 | Clear all feature latches |
| 1 | 0 | X | X | X | X | X | 0/1 | Clear/set the cursor latch |
| 1 | 0 | X | X | X | X | 0/1 | X | Clear/set the inverse video latch |
| 1 | 0 | X | X | X | 0/1 | X | X | Clear/set the blinking latch |
| 1 | 0 | X | X | 0/1 | X | X | X | Clear/set the underline latch |
| 1 | 0 | X | 0/1 | X | X | X | X | Clear/set the foreign char. set latch |
| 1 | 1 | X | X | X | X | X | 1 | End of line command (EOL) |
| 1 | 1 | X | X | X | X | X | 0 | New word address command (NWA) |

Data bytes consist of a seven bit ASCII code and a high order zero, and will be interpreted as the corresponding ASCII code unless the foreign character set has previously been chosen.

The feature bits are latched and held until another feature byte occurs to change the state.

The EOL command fills the remainder of the current line buffer with blanks. The next data byte will be the first character of the next line.

During normal operation, the Control Logic will read the data at address 70000$_8$, complement it, and use that as the address for the first character to be displayed. From that point on the address will be incremented by one for each new data word. The NWA command indicates that the contents of the next address should be interpreted as the complement of the address for the next data word. The address should then be incremented from that new point.

In addition to being the pointer of the first word of a page, $70000_8$ is also used to choose between the alpha mode and the graphics mode. If the high order bit is a zero, and the graphics hardware is installed, then the display will be in the graphics mode.

An example of an alpha mode data pattern is shown in FIG. 140.

The Display's Effect on the Mainframe

Due to the nature of the display's mode of data retrieval, there is an effect on the performance of the mainframe. Since it is necessary for the display to access memory on a regular basis, it uses memory cycles which might have been used by the PPU for other operations. This will inevitably slow down the PPU. The PPU can execute about 1,000,000 memory cycles per second. The display must read at least one word for every two lines of characters (two blank lines), and doesn't need to read more than 82 words per line of characters (a feature byte and a character byte in every word with a new word address). Assuming that a character line is 40 words in length (80 characters or partial lines with features), the display will require 40 memory cycles/line$\times$25 lines/page$\times$60 pages/sec., or 60,000 memory cycles/sec. This would reduce the PPU to the use of 910,000 memory cycles/sec. This is a 9.0% increase in execution time. These memory cycles may also indirectly slow the LPU by temporarily holding the dual port in an inconvenient position, but that result is probably negligable.

Over a short term(less than 637 $\mu$sec) the display will be accessing memory to fill a single line of characters. This rate is 158,000 memory cycles per sec., which increases PPU execution time by 23% (PPU allowed 763,000 memory cycles per second). However, as soon as the line is complete, memory access drops to zero until the next line needs to be refreshed.

A conflict occurs when some peripheral device, such as a disc, attempts a burst mode DMA where efficiency of the device depends upon a data transfer rate close to the maximum. The problem arises when the display requires a sufficient number of memory cycles to complete a character line in less than 637 μsec while at the same time a disc requires data at a rate determined by the rotating speed of the disc. If the display is allowed memory cycles in such a DMA burst, a disc location could be past the head when the data finally arrives. Similarly, if the display is shut off from memory cycles during the burst, the analog scanning of the display could have started displaying a line before the digital circuitry has completely finished processing to change positions on the display. To avoid this and allow for efficient use of disc systems, if the display is deprived of enough memory cycles so that it cannot fill a character line by the time that line starts to be scanned on the display, then the remainder of the video output for that page will be blanked. Video will be resumed at the beginning of the next time the display is refreshed. Therefore, it is possible that the display could be blank for about 0.3 seconds if a DMA occurred which read 64K bytes of memory at once. A longer blanked period could occur if smaller DMA's occurred regularly after the start of each refresh cycle. It is clear that during a burst mode DMA, the mainframe will direct most of it's activities to the DMA and may temporarily blank the display.

Control Logic Theory of Operation

This section contains the theory of operation for the standard alphanumeric display. This includes the Control Logic, Display Logic, Monitor Circuitry, shown in FIG. 139. A detailed composite block diagram which shows the interconnection of these modules is shown in FIG. 141. The Graphics option is discussed in a separate section.

The Control Logic is the interface between the mainframe and the display. It reads memory, processes the data, and holds it in a format that the display can use. Each byte of a data word represents either a combination of features to be set or cleared, an ASCII character, or a control code for the display. As each byte gets processed, the data is placed into a 12 bit word. The first 7 bits contain the ASCII code for the displayed character. The last 5 bits indicate if any of the highlighting should be applied to this character. These feature bits are latched by the Control Logic and applied to every character until the latches are cleared. A control byte is decoded by the Control Logic and will fill the remainder of a line buffer with blanks (EOL) or change the pointer for the next word in memory (NWA).

Definition of Signals to the Control Logic:

$\overline{\text{IDA}}$—The 16 bit memory bus between the PPU and the Dual Port Switch $\overline{\text{PEBG}}$—PPU External Bus Grant (originates at PPU)

$\overline{\text{PSDMC}}$—PPU Synchronous Memory Complete (originates at PPU)

$\overline{\text{PBR}}$—PPU Bus Request (originates at the display)

$\overline{\text{CSTM}}$—CRT Start Memory (originates at the display)

CEBG—CRT External Bus Grant (originates at the display)

$\overline{\text{PDC}}$—Status signal which indicates when the display is not doing memory cycles $\overline{\text{CHAR}}$—7 bit internal bus between the Control Logic and the Display Logic for ASCII character codes.

$\overline{\text{HIGH}}$—5 bit internal bus between the Control Logic and the Display Logic for highlighting features $\overline{\text{NW}}$—New character request by the Display Logic $\overline{\text{NL}}$—New Line request by the Display Logic $\overline{\text{NP}}$—New page request by the Display Logic FLB—Full line buffer GI—Graphics inhibit $\overline{\text{GS}}$—Graphics select $\overline{\text{CRT}}$—Signal used to sense if the display assembly is plugged in.

An expanded Control Logic Block Diagram is shown in FIG. 142. A brief definition of each of the blocks is given below.

State Machine—Contains 32×16 Bit Prom to control the operations of loading data and processing the results. (Its bit pattern is shown in FIG. 143).

Calculator Interface—Contains circuitry to buffer control signals to the PPU.

Bi-Directional Buffer—Buffers the IDA Bus to the Control Logic.

Memory Address Register—Register which contains address of memory to be accessed.

Memory Data Register—Latch to hold data retrieved from memory.

Memory Register Load—Circuitry to enable the loading of the memory address register or the Memory Data Register.

Line Buffers #1 & #2—Two 80×12 bit shift registers containing 7 bit ASCII characters and 5 bits for features. There are two so one can be loaded by the Control Logic while the other is being read by the Display Logic.

Buffer Select—Selects which line buffer is to be loaded while the other buffer is being read. Changes with $\overline{\text{NL}}$ signal.

Output Latch/MUX—Multiplexes the two 80 character buffer outputs and holds the data until the next $\overline{\text{NW}}$.

Feature Latch—Latches feature bits to be combined with character data in the line buffers.

Line Buffer Load—Provides clocks to load the line buffer.

80 Char. Counter—Counts the clocks created by the line buffer load to determine if the current line buffer is full. Produces FLB and stops the state machine until $\overline{\text{NL}}$ occurs.

EOL/NWA Select—Decodes control bytes for end of line (EOL) and new word address NWA).

Graphics Select—Turns on the graphics circuitry and turns off the Alpha-Numeric circuitry in the display. Done upon user command if the Graphics option is present.

State Machine Start MUX—Selects 1 of 4 signals, depending upon the state location of the state machine, that must be true before the state machine will start up again.

FIG. 143 shows the state number, or input address, to the state machine, and the 16 bit output for each state. FIG. 144 is a flow chart showing the sequences of states for the different control and data words read from memory. FIG. 145 is a timing diagram for the Display memory cycle.

Before starting a discussion of the flow chart, one potential source of confusion should be explained. It will be noticed that a command to stop and wait for EBG is given before a BR is given. The reason for this is that the STOP Command goes to the K input of the STOP FF and is not executed until the next state. Therefore, a BR will be issued and the state machine will stop in state $2_8$ to wait for EBG. This same situation will be found in the flow chart every time the state machine must be stopped.

State $0_8$:

When the calculator is initialized or reset, the Control Logic will go the "START".

State $1_8$:

A Memory cycle is initiated when the Control Logic asks the PPU for use of the IDA Bus ($\overline{PBR}$). After the request is made, the control logic waits for External Bus Grant from the PPU ($\overline{PEBG}$). When $\overline{PEBG}$ is received, the Control Logic will continue to the next step. If in later stages of the flow chart, $\overline{PEBG}$ is received (not having been requested by the Control Logic) CEBG will be given so that the daisy chain may be continued.

State $3_8$:

At this point the Control Logic has control of the IDA BUS. It will point the Bi-Directional Buffer out to enable the memory to be addressed; Start Memory is pulled ($\overline{PSTM}$) to allow the Memory cycle to begin, The buffer is then turned around to allow the data from memory to return. The Control Logic waits for the memory cycle to be completed ($\overline{PSMC}$). If $\overline{PSMC}$ occurs at some other time in the flow chart, it is ignored.

State $6_8$:

Next, the Control Logic recalls if the previous word contained a NWA, or if $\overline{NP}$ had occurred since the last word. If either conditions is met, the present word is a pointer for the Control Logic to jump to. It is therefore loaded into the MAR, the Pointer Flag is cleared, and the State Machine goes back to request the Bus again. If this isn't the case then the data needs to be displayed and is loaded into the MDR to be processed. The MAR is incremented to the next Address, and the high order byte is enabled to determine what should be done.

State $11_8$:

The Control Logic determines whether or not this byte is a NWA. If it is, the next word in memory is a pointer word. The second byte of the current word is ignored, the pointer flag is set, and the Control Logic requests the IDA Bus to obtain the pointer word. If the byte being tested is not a NWA, it is then tested to see if it is an EOL. If it is, blanks will be loaded into the remainder of the line buffer until the 80 character counter signals that the buffer is full. At this time, the state machine will stop in state $17_8$, and will remain there until a $\overline{NL}$ signal comes from the Display Logic to switch line buffers. At that time the second byte of the word will be processed. If the byte being tested is not an EOL, it is either a control byte to set or clear feature bits, or a data byte. In the former case the byte is latched in the feature latches. In the latter case the byte is loaded into the line counter, and the 80 character counter is incremented by 1. State $15_8$ is an unused state and is jumped over by the state machine.

State $17_8$:

A check is made to see if the line buffer is full. If it is (i.e., 80 characters have been loaded), then the Control Logic will wait until a NL signal comes from the Display Logic. The NL signal will clear the 80 character counter, switch the buffer select to load the next line buffer, and start the state machine. If the buffer is not full (or if it was full and was cleared by a NL) the second byte will be enabled and processed just the same as the first byte.

State $20_8$:

States $20_8$ to $24_8$, $36_8$, and $37_8$, process the second byte in the same manner that states $7_8$ to $14_8$, $16_8$, and $17_8$, process the first byte. States $25_8$ to $35_8$ are unused states, and are jumped over by the state machine.

Outputting Data to the Display Logic

The processing described in the previous section formats the data contained in Memory into 12-bit words which can be easily decoded. These words are stored in groups of 80 in one of two line buffers. The purpose of having two line buffers is to provide the Display Logic with one full line of characters to display while the Control Logic is loading the next line of 80 characters into the other buffer. This means that the Control Logic is actually one line ahead of the display. When the Control Logic as entered 80 characters into a line buffer, it waits for the Display Logic to indicate that it is ready for a new line ($\overline{NL}$). The Control Logic provides the Display Logic with the newly filled Line Buffer and starts to refill the used Line Buffer with new data. This occurs for each character line on the display. As the Control Logic completes each line it signals the Display Logic that there is a full Line Buffer (FLB). The Display Logic cannot wait for a new line once one has bee requested, or the data will not be displayed in the correct position on the screen. So if FLB is not true when NL occurs, the Display Logic will blank the video for the remainder of the page. This is done because the Control Logic and Display Logic will not be synchronized until the beginning of the new page. The signals NP and NL are both used to synchronize the Control Logic with the Display Logic. The line Buffer must be filled in 632 usec. This figure comes from the time it takes to display 15 scans that make up 1 character line. For each scan all 80 words in the buffer are read 15 times before the buffer gets refilled. The signal that shifts the line buffer is new word ($\overline{NW}$).

Display Logic Theory of Operation

The Display Logic generates all the necessary timing signals required to display the data received from the Control Logic on the CRT. This function can be divided into three categories.

Timing Generator: The Display Logic contains a 20.8494 MHz crystal oscillator and a divider circuit that divides this frequency down to 1.87 Hz. This is done in 6 stages as follows: Dot Counter ÷ by 9, Character Counter ÷ by 99, Scan Counter ÷ by 15, Line Counter ÷ 26, Cursor Generator ÷ by 16, and Blinking Generator ÷ by 2.

Decoder Circuitry: Signals from the timing generator are used to generate several control signals used in the Monitor, the Control Logic, and the Display Logic. Horizontal and vertical sync signals are generated for the Monitor. The Control Logic receives signals used to reset the Memory address Register, start loading a line buffer, and clock data words out of the line buffers to be sent to the Display Logic. Internal signals include: enable video, character generator scan selection and start memory, enable underline, enable cursor, etc.

ASCII to Video Converter: The Display Logic receives a 12-bit word from the Control Logic (a 7-bit character and 5 highlighting bits) and converts this information into a video signal that is sent to the Monitor.

There are 4 signals going fron the Display Logic to the Monitor. They are Horizontal Sync 1 ($\overline{HS1}$), Horizontal Sync 2 ($\overline{HS2}$), Vertical Retrace ($\overline{VR}$), and Video 1 (V1). HS2 is the normal horizontal drive signal used to control the start of horizontal retrace and the turn-on of the yoke drive transistor to deflect the beam to the right edge of the screen. $\overline{HS2}$ is a pulse used by the horizontal waveform reference generator to control its activity during horizontal retrace. $\overline{VR}$ is a pulse that resets the vertical ramp generator and causes the beam to move to the top of the screen. V1 is the high speed video line which carries 20.8494 MHz (48ns) video information to the video amplifier. FIG. 146 shows the period and pulse widths of the horizontal and vertical signals.

The Display Logic receives a 12-bit word from the Control Logic, which contains a 7 bit character and 5 highlighting bits. This 12 bit word is defined as follows:

| Bit | Mnemonic | Function |
|---|---|---|
| ϕ–6 | 1ϕ–6 | 7-Bit Character Code |
| 7 | CS | Character Set Select |
| 8 | CUR | Cursor |
| 9 | IV | Inverse Video |
| 10 | B | Blinking |
| 11 | UL | Underline |

The Display Logic receives 2 control signals from the Control Logic: Full Line Buffer (FLB) and Graphic Select ($\overline{GS}$).

FLB: This signal will be high when the Display Logic switches line buffers, provided the Control Logic has been able to get enough memory cycles to fill the buffer. If this signal is low, indicating that a long burst mode DMA has taken place, the Display Logic will turn off the video for the remainder of the frame. At the start of a new frame the Display Logic will check this signal again to see if the video should be turned off. See FIG. 147 for the relationship of this signal with $\overline{NL}$.

$\overline{GS}$: If graphics selected, all four monitor signals will be pulled high. Three of the signals ($\overline{HS1}$, $\overline{HS2}$, & $\overline{VR}$) are open collector signals which will be controlled by the graphics outputs. The video signals from the Display Logic and the Graphics are fed to an AND gate in the Monitor, so pulling V1 high allows the graphics signal V2 to control the video.

The display sends 3 control signals to the Control Logic: New Page ($\overline{NP}$), New LINE ($\overline{NL}$), and New Word ($\overline{NW}$).

$\overline{NP}$: This signal causes the Memory Address Register to be reset to 70000$_8$. Therefore, the next line buffer will be filled with the 1st line of information needed to start a new frame. This signal is also sent to the PPU via the DC input.

$\overline{NL}$: When the Control Logic sees this signal, it knows that the Display Logic is switching buffers, and that it is time to start loading the other buffer.

$\overline{NW}$: This signal is used to clock the data, out of the 80 character shift-register, to be sent to the Display Logic. FIG. 147 shows the relationship of the interface signals between the Donor Logic and the Display Logic.

Display Logic Block Diagram

The Display Logic Block Diagram is shown in FIG. 148. A description of the operation of each of the blocks is given below:

Crystal Oscillator: A 20.8494 MHz oscillator is used for the display system clock. The video circuits and the timing generator are clocked directly from this oscillator. A buffered output goes to the graphics boards where it is also used for a system clock.

Dot Counter: Divides the system clock by 9 (2.32 MHz), which determines the rate at which characters are needed. Outputs from the Dot Counter are used by the $\overline{NW}$ Generator to control the duration of $\overline{NW}$. In a similar manner, the Dot Counter also controls the duration of $\overline{STM}$, which is generated by the Character Generator. The ÷9 output is used to clock the remainder of the counters in the timing generator, and to clock other low frequency circuits in the Display Logic.

Character Counter: Divides the character rate by 99 to determine the horizontal scan rate (23.4 KHz); 80 counts occur during the display of 80 characters, and 19 counts occur during horizontal retrace. The outputs from this counter are used as inputs to the horizontal decoder to generate HS1 and HS2.

Scan Counter: Divides the horizontal scan rate by 15 to generate the line rate (1.56 KHz). The outputs from this counter are used for the row select inputs to the character generator. In addition certain scans are decoded for the following purposes:

Scan 0: $\overline{NL}$ enable, CLR enable in the Alpha Disable Decoder

Scan 12: $\overline{CUR}$ enable

Scan 14: $\overline{UL}$ enable

Line Counter: Divides the line rate by 26 to generate the frame rate (60 Hz); 25 counts occur during the display of 25 lines, and 1 count occurs during vertical retrace. The $\overline{VR}$ signal is used to disable the video, clock the cursor generator, clear the alpha disable flip flop, and reset the vertical sweep. The outputs from the line counter are also used to generate the $\overline{NP}$ signal.

Cursor/Blinking Generator: Generates the 3.75 Hz cursor blinking signal and the 1.87 Hz character blinking signals.

Horizontal Decoder: Decodes the outputs of the character counter to generate the J and K inputs to the Horizontal Latches and the Video Enable Latch.

Horizontal Latches: Latches $\overline{HS1}$ and $\overline{HS2}$ to be sent to the Monitor.

Output Buffers: Open collector buffers for $\overline{HS1}$, $\overline{HS2}$, $\overline{VR}$, and GCLK.

Video Enable Latch: Disables the video output during horizontal and vertical retrace.

$\overline{NP}$ Decoder: Generates the $\overline{NP}$ signal from the Line Counter outputs.

$\overline{NL}$ Decoder: Generates the $\overline{NL}$ signal, which occurs once for every line except during $\overline{NP}$. It has been defined to occur at scan 0 and from character 0 to 12.

$\overline{NW}$ Decoder: Generates 80 clock signals for every scan at a 2.32 MHz rate. These clock signals are precisely shaped to meet the line buffer timing requirements, the character generator access time, and the character generator $\overline{STM}$ timing requirements.

Alpha Disable Decoder: This circuit will disable the Monitor signals on the Display Logic if the $\overline{GS}$ line is true. When $\overline{GS}$ goes false the Alpha Raster will be restored. This circuit will disable the video output only if FLB is not true when $\overline{NL}$ comes along. This means that the Control Logic was unable to fill a line buffer before the Display Logic needed it. The video will be restored at the start of the next frame if the Control Logic is able to fill a line buffer.

Highlighting Decoder & Latch: The feature bits from the Control Logic are combined with the Cursor/Blinking Generator output signals and the underline scan position information, and latched on a character-by-character basis. It is combined with the video information from the character generator.

Character Generator: This is a 16K-bit NMOSII ROM organized as 2K×8. The lower 4 address bits are used for row select. The upper 7 address bits are used as inputs for a 7-bit ASCII code for selection of 128 characters.

Optional Character Generator: Used when additional characters are required. At least 3 optional foreign character set ROMs can be provided (German, French, & Spanish).

Parallel to Serial Converter: Latches 9 bits of information for a character row (7 from the Character Generator and 2 ground inputs for spaces) at 2.32 MHz rate, and outputs this information serially at a 20.849 MHz rate.

Video Decoder and Latch: Combines the video output from the Parallel to Serial Converter with the highlighting feature information at a 20.849 MHz rate, and latches the result for output to the Video Driver in the Monitor.

Video Driver Description

The video driver is basically an inverting level shifter which provides the large (20–30 V p-p) voltage swings required at the cathode of the CRT to turn the electron beam on and off.

Video data comes from both the alphanumeric and the optional graphics sections in the form of the V1 and V2 data inputs respectively. An additional control input, $\overline{FB}$, originates at the graphics section and is used to allow selection of two levels of brightness for displayed dots. Because the graphics section is optional, the logic senses of all of the inputs are such that unused inputs are held high; pull-up resistors on the two graphics inputs insure proper operation of the circuit in the absence of graphics boards.

Two cathode drivers with a common output provide the two levels of brightness. One drive can provide an "ON" level from 31 6V to −13, variable by the user through the use of an external knob which controls the output of the intensity V supply. The other driver has its "ON" level fixed at the −15Vsupply. This latter supply gives a brighter dot since more negative values of cathode drive voltage result in more brightness. Both of the drivers use an "OFF" level of +15V.

The two cathode drivers are controlled by the summer/multiplexer circuit at the input of the video section. This part of the circuit "AND's" together the two video inputs (V1 and V2) and sends the result to the proper driver, depending upon the value of the control input, $\overline{FB}$. The logic sense of $\overline{FB}$ is such that a "HIGH" level selects the user-variable, lower-brightness driver. (See the waveform example in FIG. 149).

Horizontal Sweeper Description

The horizontal sweeper provides current in a modified ramp waveform to the horizontal deflection yoke, which sweeps the CRT electron beam in horizontal scan lines.

Inputs to the horizontal sweeper are the two horizontal sync signals, $\overline{HS1}$ and $\overline{HS2}$, and the mode control line, $\overline{GS}$. (Refer to FIG. 141D). Both of the sync inputs are "wire-OR-ed" from corresponding open-collector outputs of the alphanumerics and graphics sections. The $\overline{GS}$ control line is "$\overline{\text{Graphics Select}}$", which originates at the Control Logic board and determines whether the monitor will be displaying in graphics mode or alphanumerics mode. The horizontal sweeper uses this information to change between the two horizontal widths used for the corresponding rasters.

The sweep driver circuit is similar to the resonant sweep circuits which are widely used in consumer television sets. This is done because of the power savings achieved, compared to other sweep schemes. (The sweep is called "resonant" because the yoke current is made to resonant in two tuned LC circuits, the yoke being the "L" in the tuned circuits). The horizontal size control circuit provides power to the sweep driver and controls the yoke current amplitude, and hence the horizontal width, by the voltage it supplies. The size control circuit uses $\overline{GS}$ to select the proper size control voltage for the alpha and graphics modes. The $\overline{HS1}$ input to the sweep driver synchronizes its operation by initiating retrace. (Refer to the waveforms in FIG. 150).

As a result of the resonant sweep design, retrace gives a high voltage pulse (approximately 300V) which is easily used as the input voltage for the high voltage transformer (commonly called a flyback transformer). The high voltages necessary to operate the CRT are derived from this transformer, specifically: +12KV for the anode, +400V for the focus grid (G4), and variable −15V to −85V for the control grid (G1).

The horizontal sweeper differs from most resonant sweep schemes in that it employs active linearity correction: Most resonant sweep circuits correct for nonlinearities with passive components. Active linearity correction allows the use of the two different raster frequencies for the alpha and graphics rasters, because the correction is frequency independent.

The heart of the active correction circuit is a unique reference signal generator which supplies an ideal waveform to which the actual current waveform can be compared and corrected.

The active linearity correction scheme involves two unique techniques in the generation of the yoke current waveform. One of these techniques concerns the manner in which the reference waveform is generated. The other technique concerns a means to minimize the dynamic range required in the error correction power amplifier.

Referring to FIG. 151, the Horizontal Reference Waveform Generator responds to two different input conditions. The first of these conditions corresponds to the generation of the modified ramp (i.e., non-retrace) used as a reference. This is done by integrating a DC voltage from the Automatic Level Controller. The resulting ramp is given smoothly rounded points of inflecton at the start and at the end of the ramp. That compensates for the lack of concentricity of the source of the electron beam with the inner surface of the faceplate. During this time the retrace feedback path is open, and the Horizontal Reference Waveform Generator is responding only to the output of the Automatic Level Controller. (This is in fact a feedback path in itself, but is part of the dynamic range minimization technique, and is discussed shortly). However, to accomplish retrace, the retrace feedback path is activated by turning on a FET switch. The signal occurring on the feedback path is sufficiently large to swamp out the ramp slope voltage from the Automatic Level Controller. This causes the Reference generator to track the retrace occurring naturally in the Horizontal Sweep Driver. (The actual waveform during retace is of little concern). This is advantageous because, while it is easy to create an idealized and fast retrace in the reference generator, it is not easy to force the yoke current to follow that idealized shape. To maintain the active linearity correction during retrace would create large error signals that would saturate the error correction amplifier. That would create difficulties at the start of the next sweep. This method of preventing saturation of the Error Amplifier allows that amplifier to be designed with higher gain than would otherwise be possible. The higher gain results in improved error correction. This is in contrast with the usual practice (in the context of using active linearity correction) of resetting the integrator by either shorting out the capacitor with a switch, or by supplying a high-amplitude pulse of opposite pollarity to the entire integrator, etc. Any of these usual techniques involves the problem of what to do with a saturated error amplifier. It is precisely this problem that is avoided by the scheme embodied in the present display circuitry.

Again referring to FIG. 151, the second technique is to control the amplitude of the horizontal reference waveform by adjusting the input level to the integrator. That adjustment occurs as the DC ramp slope voltage varies in such a way as to keep the output of the Power Amplifier in the center of its dynamic range. The Automatic Level Controller generates the ramp slope voltage. It uses a low-pass filter to extract the DC level. An Error Integrator minimizes the error voltage between the filter output and a reference voltage, by varying the ramp slope voltage.

The automatic level-controlling circuit adjusts the slope of the ramp produced by the integrator. That minimizes the amplitude of the correction signal required to linearize the resonant sweep. Previous schemes rely on some sort of correlation between the input voltage to the sawtooth generator and the input voltage to the resonant sweep circuit. Those schemes must provide sufficient dynamic range in the correction amplifier so that offsets caused by errors in the correlation do not cause saturation or limiting in the correction amplifier output. The advantages of the slope corrector are that it automatically compensates for component drift of all kinds to provide the optimum ramp slope, and hence does not require as much dynamic range of the correction circuit. (Any additional dynamic range results in more power consumption during operation).

The waveform of the actual yoke current is supplied by a current-sensing transformer in series with the horizontal yoke. (See FIG. 141 D.) This signal is compared with the reference waveform, and the difference is amplified by the error amplifier. During the display portion of a sweep cycle, the Power Amplifier uses this error signal to put out a correction voltage to correct the yoke current; during the retrace portion of a scan cycle, however, the error input to the Power Amplifier is disabled by the FET switch driver to prevent saturation of the amplifier. The switch driver, which receives its synchronization information from $\overline{\text{HS2}}$, also closes a feedback path from the error amp to the reference generator during retrace. This feedback path provides the integrator-resetting function of the Horizontal Reference Waveform Generator by inputting the amplified error signal through a high-gain input with the proper phasing to correct the reference signal so it matches the sensed signal.

The slope of the ramp produced by the integrator during the sweep mode is determined by the ramp slope voltage, which is a DC input supplied by the Automatic Level Controller (Slope Corrector) circuit. The slope correction circuit takes the correction signal, (the output of the Power Amplifier) and extracts the DC component by use of a low-pass filter. This DC offset is compared to a reference signal and the error is integrated and fed back to correct the Horizontal Reference Generator. The Slope Corrector insures that the Power Amplifier is operating in the center of its dynamic range, which condition is met when the average slope of the resonant sweeper matches that of the reference generator. (As previously mentioned, the yoke current amplitude is determined by the horizontal size control circuit).

Vertical Driver Description

The vertical driver circuit provides current to the vertical yoke, also in a modified ramp waveform, to scan the picture from top to bottom.

The vertical driver circuit uses the $\overline{\text{VR}}$ signal to synchronize the vertical retrace, and the same $\overline{\text{GS}}$ mode signal as employed by the horizontal sweeper to adjust for alphanumerics or graphics raster size. The $\overline{\text{VR}}$ signal is "wire-OR-ed" from open-collector outputs on the alphanumeric and optional graphics display boards.

The vertical ramp generator supplies a linear ramp voltage whose slope is determined by the vertical size control. The vertical size control selects the ramp slope, and hence the vertical size of the displayed raster (depending on the state of the $\overline{\text{GS}}$ mode control). Synchronization of the ramp generator is accomplished by a FET switch driver, which resets the ramp when the $\overline{\text{VR}}$ signal is "LOW". Refer to FIG. 152.

The drive amplifier uses the ramp generator output as a reference, and employs feedback to control the current through the vertical yoke. This yoke current is sensed in the linearity correction circuit, which also applies the proper corrections to compensate for tube non-linearities. The corrected output signal and the ramp generator signal are compared at the input of the drive amplifier, and the drive amplifier minimizes the difference by supplying the proper current to the yoke.

THE ASSEMBLER

General Information

The assembler translates symbolic source language instructions into an object program executable by the processor. The source language provides mnemonic codes for specifying machine operations, (machine-instructions) and for directing the assembler (Pseudo-instructions). The assembler also provides symbolic addressing. "The assembler" is any of several different computer programs, some running on Hewlett-Packard 2100 series computers, some on Hewlett-Packard 3000 series computers. The attributes of these different programs are all similar; herein is described an assembler named ASMA. ASMA is a DOS-M or RTE based program; DOS-M and RTE are disc operating systems for Hewlett-Packard 2100 series computers. Generally speaking, the capabilities of the 3000-based assembler (named XABPC2B—for Cross Assembler BPC II B version) are much the same as those of ASMA, except that some of ASMA's pseudo instructions do not exist in the 3000 version. Also, the details of the "control statements" may differ. Generally, however, the two assemblers overlap about 95%; they are alike far more than they are different.

The processor used in the calculator exists in two versions; the version used in the calculator are described in this patent document as utilizing 16-bit addressing, and, a 15-bit addressing version used by Hewlett-Packard in other calculators. ASMA can assemble code for either processor, and the operation of some of the pseudo instructions to be described varies according to the type of processor being assembled for. XABPC2B is strictly a 16-bit addressing assembler.

The assembled program is always "absolute" in the sense that it is not "relocatable"; the assembly assigns symbols definite bit patterns during assembly. If a piece of executable code is to be moved from one location to another, the usual case it that it must be modified to reflect the change in origin, and re-assembled. Assemblies must be self-contained: no external references (externals), entry points, or detached subroutines are possible.

With non-relocatability firmly in mind, we assign another meaning to the word absolute. The BPC has two modes of addressing: absolute and relative. Absolute addressing is a scheme with fixed page boundaries, and 1024 words per page. Relative addressing centers the page on the current value of the program location counter (P) in the BPC; the page boundaries change as P changes. The BPC operates in the absolute or relative addressing mode, depending upon the external grounding of a pin on the chip (RELA). It is expected that the two types of addressing will not be mixed.

The assembler can assemble code for either absolute or relative addressing. This is controlled with the control statement at the begining of the source text.

For 2100-based systems the original source of a program will usually be paper tape or punched cards, although it is possible with DOS-M to create a source file on the disc directly from the system tele-printer. The assembler accepts paper tape, punched cards, magnetic tape and disc source files as input. Standard DOS-M provides disc source files, while source files are available with RTE systems that have a file manager.

For 3000-based systems the source of assembly is created by SPASM. SPASM is a high-level system programming language, described in a subsequent section. The source is kept on a disc file; no intermediate external version of the source (such as paper or magnetic tape) is created unless that is specifically desired. The 3000-based version of the assembler then reads its source directly from these files.

Assembler output is of two types: a listing and the non-relocatable binary. The listing can be generated on any "list device" in the system, but the binary should by punched on a punch device. The 2100-based version of ASMA does not have the ability to store the binary in the job-binary-area of the disc. Furthermore, it is unadvisable to write the binary to a standard tape transport with the idea of later use. DOS-M does not correctly handle non-relocatable binary, even when it is just "in transit".

A basic binary loader is required to load the binary output into the processor. The format of the binary output is shown in FIG. 154.

Instruction Format

An assembly language source statement consists of a label, an operation code, an operand, and comments. The label is used when needed as a reference by other statements. The operation code may be a mnemonic representing a machine-operation or an instruction to the assembly concerning the task of assembly itself. An operand may be an expression consisting of an alphanumeric symbol, a number, a special character, or any of these combined by arithmetic operations. Indicators may be appended to the operand to specify certain functions, such as indirect addressing. The comments portions of the statement is optional.

The field of the source statement appear in the following order:

Label Opcode Operand Comments

One or more spaces separate the fields of a statement. An end-of-statement mark terminates the entire statement. On paper tape these marks are "return" and "line feed". A single space following the end-of-statement mark from the previous source statement is the null field indicator for the label field.

The characters that may appear in a statement are these:

A through Z (and various other valid label characters)
ϕ through 9
. (period)
* (asterisk)
+ (plus)
− (minus)
, (comma)
(space)

Any other ASCII characters may appear in the Comments field.

The letters A through Z, the numbers 0 through 9, the period, and certain other characters, may be used in an alphanumeric symbol. In the first position the label field, an asterisk indicates a comment; in the operand field, it represents the value of the program location counter in arithmetic address expressions. The comma separates an expression and an indicator in the operand field.

Spaces separate fields of a statement. Within a field they may be used freely when following +, −, or , .

The maximum length of a statement varies, but is at most 80 characters.

The label field identifies the statement and may be used as a reference by other statements in the program. (That is, the label is a place holder for the address of a word that is used by other statements that concern, or operate on, that word).

The field starts in position one of the statement; the first position following an end-of-statement mark for the preceding statement. It is terminated by a space. A space in position one is the null field indicator for the label field; the statement is unlabeled.

A label is symbolic. It may have one to five characters consisting of A through Z, 0 through 9, and the symbols shown immediately below. The first character must be non-numeric. A label of more than five characters could be used, but the assembler flags this condition as an error and truncates the label to the left-most five characters.

| | | | |
|---|---|---|---|
| A-Z | ! | / | $ |
| 0-9 | " | ? | % |
| . (period) | # | @ | & |

Each label must be unique within the program segment to be assembled; two or more statements may not have the same symbolic name.

An asterisk in position one indicates that the entire statement is a comment. Positions 2 through the end of the statement are available for use. An asterisk wihin the label field is illegal in any position other than one.

The operation code defines an operation to be performed by the processor or by the assembler. The opcode field follows the label field and is separated from it by at least one space. If there is no label, the operation code may begin anywhere after position one. The opcode field is terminated by a space immediately following an operation code. Operation codes are organized in the following categories:

Machine Operation Codes

- BPC
  - Memory Reference
  - Shift-Rotate
  - Alter-Skip
  - Return-Complement-Execute
- IOC
  - I/O Control
  - Stack Operations
  - Interrupt
  - DMA
- EMC
  - Four-Word Operation
  - Mantissa-Shift
  - Arithmetic
- Pseudo Operation Codes
  - Assembler control
  - Address and symbol definition
  - Constant definition
  - Storage allocation
  - Assembly Listing Control The meaning and format of the operand field depend on the type of operation code used in the source statement. The field follows the opcode field and is separated from it by at least one space. It is terminated by a space except when the space follows <,>, <+>, <−> or, if there are no comments, by an end-of-statement mark.

The operand field may contain an expression consisting of one of the following:

- Single symbolic term
- Single numeric term
- Asterisk
- Combination of symbolic terms, and the asterisk joined by the arithmetic operators + and −

An expression may sometimes by followed by a commma and an indicator.

The operands for certain instructions consists of a series of terms separated by commas.

A symbolic term may be one of five characters consisting of A through Z, 0 through 9, or the other label characters. The first character must be non-numeric .

Unless a symbol is pre-defined by the assembler, a symbol used in the operand field must be defined elsewhere in the program in one of the following ways:

- As a label in the label field of a machine operation.
- As a label in the label field of a BSS, ASC, DEC, OCT, DEF, ABS, EQU, or REP pseudo operation.

The assembler assigns a value to a symbol when it appears in one of the above fields of a statement.

The symbols that are pre-defined by the assembler are shown in FIG. 48. The memory address extension registers R34, R35 and R37 are not predefined. With the exception of AR1, all of these symbols refer to registers within the various elements of the system. The address of AR1 depends upon whether the assembly is for a 15-bit or a 16-bit processor.

The one-bit registers, E (Extend) and OV (Binary Overflow), are located within the BPC. The one-bit register, DC (Decimal Carry—BCD overflow), is located within the EMC. These registers are not addressable; they are accessed through dedicated instructions. Therefore, their names are not pre-defined by ASMA.

A symbolic term may be preceded by a plus or minus sign. If preceded by a plus or no sign, the symbol refers to its associated value. If preceded by a minus sign, the symbol to the two's complement of its associated value. A symbolic operand with leading minus sign designating negation may be used only with the ABS pseudo operation.

A numeric term may be decimal or octal. A decimal number is represented by one to five digits within the range ±32767. An octal number is represented by one to six octal digits followed by the letter B; (0 to 177777B).

If a numeric is preceded by a plus or no sign, the binary equivalent of the number is used in the object code. If preceded by minus sign the two's complement of the binary equivalent is used. A negative numeric operand may be used only with RET, DEC, OCT, and ABS pseudo operations. The maximum value of a numeric operand depends on the type of machine- or pseudo-instruction.

An asterisk in the operand field refers to the value in the program location counter at the time the source program statement is encountered.

The asterisk, symbols, and numbers may be joined by the arithemetic operators + and − to form arithmetic address expressions. The assembler evaluates an expression and produces a value in the objectcode.

An expression consisting of a single term has the value of that term. An expression consisting of more than one term is reduced to a single value. In expressions containing more than one operator, evaluation of the expression proceeds from left to right. The algebraic expression $A-(B-C+5)$ must be represented in the operand field as $A-B+C-5$. Parentheses are not permitted in expressions for the grouping of terms.

The processor provides an indirect addressing capability for memory reference instructions. The operand portion of an indirect instruction contains an address of another location rather than an actual operand. Only an initial indirect reference is possible; the first address accessed indirectly contains a 16-bit destination address. Indirect addressing provides a simplified method of address modifications as well as allowing access to any memory location. The assembler allows specification of indirect addressing by appending a comma and the letter I to any memory reference operand. Also, the actual operand of the instruction may be given in a DEF pseudo operation.

The processor provides a capability which allows the memory reference instructions to address either the "current page" or the "base page". The assembler detects all instructions in which the operands refer to the base page; specific notation defining an operand as a base page reference is not required in the source program. Any memory reference instruction, regardless of where in memory it is stored, can reference an address on the base page. Things not located on the base page are located on one of many different current pages. A direct reference to a location not on the base page is possible only if the instruction making the reference is on the same (current) page as the referenced location.

The comment field allows the programmer to transcribe notes that will be included with the source language coding on the list output produced by the assembler. The comment field follows the operand field, and is separated from it by at least one space. Source originally written in SPASM is saved as comments in the SPASM-generated assembly language source.

The comment field is terminated by the end-of-statement mark, or by indirect means within DOS-M or the assembler itself. See the discussion in the next section.

In a program listing generated by ASMA, statements consisting entirely of comments begin in position 27. Other statements begin in position 21. (The numbering assumes the first position is named 1.) This shifts the comment to the right so that label field column in the listing produced by the assembler is free of anything except labels and errors. This makes it easier to look for and find a label in the listing.

In a program listing generated by XABPC2B, statements consisting entirely of comments (which includes the SPASM source) are shifted right and begin in column 55. They may be 72 characters long. This separates the SPASM source from the SPASM-generated assembly language source, thereby enhancing the readability of the listing.

The maximum length of a statement that is not a comment is 80 characters. Comment statements are limited to 74 characters for ASMA, and 72 for XABPC2B.

Punched cards limit the length of a statement to what can be put on a single card; there is no continuation-card mechanism. This limits a statement to 80 characters, the end of the card acts as an end-of-statement mark.

The assembler can read the source text directly from paper tape; the same restrictions on length apply.

Characters beyond the limits are ignored, and not printed on the listing.

Assembler Pseudo-Instructions

The pseudo instructions (listed in FIG. 153) control the assembler, as well as specify various types of constants, blocks of memory, and labels used in the program. Pseudo instructions also control the listing.

Assembler Control

The assembler control pseudo instructions establish and alter the contents of the program location counter, and terminate assembly processing. Labels may be used but they are ignored by the assembler.

```
ORG  m
```

The ORG statement defines the origin (initial value of the program counter) of a program, or the origins of subsequent sections of programming.

Generally, a program begins with an ORG statement. (The Control Statement, the HED instruction, and comments may appear prior to the ORG statement.) An ORG statement must precede any machine-instructions. The operand, m, must be a decimal or octal integer specifying the initial setting of the program location counter.

ORG statements may be used elsewhere in the program to define starting addresses for portions of the object code; the operand field, m, may be any expression. Symbols in the operand must be previously defined. All instructions following an ORG are assembled at consecutive addresses starting with the value of the operand. For 15-bit assemblies the maximum value of the operand is 77777B. The value of the operand is not restricted with 16-bit assemblies.

```
ORR
```

ORR is an automatic reset of the value of the assembler's program location counter. Its action is described below.

The assembler traps the very first value given to the program location counter (by the first ORG in the program). Thereafter, as the value of the program location counter is incremented from that initial value by "natural consumption" of address space (any in-line code except ORG's), a duplicate copy of the current value of the program location counter is maintained. An ORG subsequent to the first one causes the duplicate value to be saved, and theupdating mechanism to be turned off.

An ORG the program location counter to be re-set to its earlier value (that of the duplicate), and also re-invokes the mechanism for maintaining the duplicate, so that the process can be repeated for other ORG-ORR pairs.

The IFN and IFX pseudo instructions cause the inclusion of instructions in a program provided that either an "N" or "Z", respectively, is specified as a parameter in the control statement. The IFN or IFZ instruction preceeds the set of statements that are to be included. The pseudo instruction XIF serves as a terminator. If XIF is omitted, END acts as a terminator to both the set of statements and the entire assembly.

```
IFN
 .
 .
XIF
```

All source language statements appearing between the IFN and the XIF pseudo-instructions are included in the program if the character "N" is specified in the ASMB control statement.

```
IFZ
 .
 .
XIF
```

All source language statements appearing between IFZ and XIF pseudo-instructions are included in the program if the character "Z" is specified in the ASMB control statement.

When the particular letter is not included on the control statement, the related set of statements appears on the assembler output listing, but are not assembled.

Any number of IFN-XIF and IFZ-XIF sets may appear in a program; however, they may not overlap. An IFZ or IFN intervening an IFZ or IFN and the XIF terminator results in a diagnostic being issued during assembly; the second pseudo-instruction is ignored.

Both IFN-XIF and IFZ-XIF pseudo-instructions may be used in the program; however, only one type will be selected in a single assembly. If both characters "N" and "Z" appear in the control statement, the character which is listed last will determine the set of coding that is to be included in the program.

The REP pseudo-instructions causes the repetition of the statementimmediately following it a specified number of times.

```
REP  n
```

The statement following the REP in the source program is repeated n times. The n may be an expression. Comment lines (indicated by an asterisk in character position 1) are not repeated by REP. If a comment follows a REP instruction, the comment is ignored and the instruction following the comment is repeated.

A label specified in the REP pseudo instruction is assigned to the first repetition of the statement. A label cannot be part of the instruction to be repeated; it would result in a doubly defined symbol error.

```
END
```

The end statement terminates the program; it marks the physical end of the source language statements.

The label field of the END statement is ignored.

Address and Symbol Definition

The pseudo operations in this group assign a value or a word location to symbol which is used as an operand elsewhere in the program.

```
, DEF   m [,I ]
```

The address definitions (DEF) statement generates one word of memory as a 15-bit or 16-bit address which may be used as the object of an indirect address found elsewhere in the source program. The symbol appearing in the label is that which is referenced; it appears in the operand field of a memory reference instruction.

The operand field of the DEF statement may be any positive expression.

The expression in the operand field may itself be indirect and make reference to another DEF statement elsewhere in the source program. The ,I causes the assembler to set the 16th bit of the generated word. This feature is not illegial in 16-bit assemblies, although it really only makes sense to do it in 15-bit assemblies.

```
ABS     m
```

The ABS statement defines a 16-bit value to be stored at the location represented by the label. The operand field, m, may be any expression or single symbol.

```
EQU     m
```

The EQU pseudo operation assigns to a symbol a value other than the one normally assigned by the program value represented by the operand field. The operand field may contain any expression. The value of the operand may not be negative. Symbols appearing in the operand must be previously defined in the source program.

The EQU instruction may be used to symbolically equate two locations in memory; or it may be used to give a value to a symbol. The EQU statement does not result in a machine-instruction.

Constant Definition

The pseudo instructions in this class enter a string of one or more constant values into consecutive words of the object program. The statements may be named by labels; this allows other program statements to refer to the strings of words generated by them.

ASC     n, <2n characters>

ASC converts a string of 2n alphanumeric characters in ASC11 code into n consecutive words. One character is right justified in each eight bits; the most significant bit is zero. n may be any expression resulting in an unsigned decimal value in the range 1 through 28. Symbols used in an expression must be previously defined. Anything in the operand field following 2n characters is treated as comments. If less than 2n characters are detected before the end-of-statement mark, the remaining characters are assumed to be spaces, and are stored as such. The label represents the address of the first two characters.

DEC     $d_1$ $[,d_2,\ldots,d_n]$

The DEC statement records a string of decimal constants into consecutive words. The constants must be integers. If no sign is specified, positive is assumed. The decimal number is converted to its two's complement binary equivalent by the assembler. The label, if given, serves as the address of the first word occupied by the constant.

The decimal integer must fall within the following range: +32768 to 32767, including zero. Absolute values of 32769 or greater result in an error. Avoid +32768. It results in the same binary result as for −32768; namely100000. Each decimal integer appears as one binary word with the sign bit as the most significant bit.

OCT     $0_1$ $[,0_2,\ldots,0_n]$

The OCT statement stores one or more octal constants in consecutive words of the object program. Each constant consists of one of six octal digits (0 to 177777). If no sign is given, the sign is assumed to be positive. If the sign is negative, the two's complement of the binary equivalent is stored. The constants are separated by commas; the last constant is terminated by a space. If less than six digits are indicated for a constant, the data is right justified in the word. A label, if used, acts as the address of the first constant in the string. The letter B must not be used after the constant in the operand field.

Storage Allocation

The storage allocation statement (BSS) reserves a block of memory for data or for a work area.

BSS m

The BSS pseudo operation advances the program location counter according to the value of the operand. The operand field may contain any expression that results in a positive integer. Symbols, if used, must be previously defined in the program. The label, if given, is the name assigned to the storage area and represents the address of the first word. The initial content of the area set aside by the statement is unaltered by the loader.

Assembly Listing Control

Assembly listing control pseudo-instructions allow the user to control the assembly listing output during the assembly process.

UNL

The UNL statement suppresses output from the assembly listing, beginning with the UNL pseudo-instruction and continuing for all instructions and comments until either an LST or END pseudo-instruction is encountered. Diagnostic messages for error encountered by the assembler will be printed, however. The source statement sequence numbers (printed in columns 1–4 of the source program listing) are incremented for the instructions skipped.

LST

The LST pseudo-instruction causes the source program listing, terminated by a UNL, to be resumed.

A UNL following a UNL, a LST follwoing a LST, and a LST not preceded by a UNL are not considered errors by the assembler.

SUP

The SUP pseudo-instruction suppresses the output of additional code lines from the source program listing. Certain pseudo instructions generate more than one in the listing. These additional lines are suppressed by a SUP instruction until a UNS or the END pseudo instruction is encountered. SUP will suppress additional lines in the following pseudo instructions:

ASC OCT DEC

UNS

The UNS pseudo-instruction causes the printing of additional listing lines, terminated by a SUP, to be resumed.

A SUP preceded by another SUP, UNS preceded by UNS, or UNS not preceded by a SUP are not considered errors by the assembler.

SKP

The SKP pseudo-instruction causes the source program listing to skip to the top of the next page. The SKP instrucion is not listed, but the source statement sequence number is incremented for the SKP.

SPC n

The SPC pseudo-instruction causes the source program listing to include a specified number of blank lines. The list output skips n blank lines, or to the bottom of the page, whichever occurs first. The n may be any absolute expression. The SPC instruction itself is not listed, but the source statement sequence number is incremented.

HED <heading>

The HED pseudo-instruction allows the programmer to specify a heading to be printed at the top of each page of the source program listing.

The heading, m, (a string of up to 56 ASC11 characters), is printed at the top of each page of the source program listing following the occurrence of the HED pseudo instruction. If HED is encountered before the ORG at the beginning of a program, the heading will be used on the first page of the source program listing. A HED instruction placed elsewhere in the program causes a skip to the top of the next page.

The heading specified in the HED pseudo instrucion will be used on every page until it is changed by a succeeding instruction.

The source statement containing the HED will not be listed, but source statement sequence number will be incremented.

The Control Statement

The control statement specifies whether to assemble for 15-bit or 16-bit processors, and specifies the output to be produced by the assembler.

ASMB,$P_1$, $P_2$,---,$P_n$

Minor (and generally insignificant) differences exist, between the various versions of the assembler, with respect to the control statement. The description that follows (for ASMA) is representative.

"ASMB," is entered in positions 1 through 5. Following the comma are one or more parameters, in any order, which define the output to be produced. The parameters may be any legal combination of the following, starting in position 6:

- F Fifteen-bit: The assembler assembles for processors that utilize 15-bit addressing.
- S Sixteen-bit: The assembler assembles for processors that utilize 16-bit addressing.
- A Absolute: The assembler assembles for fixed-page addressing; the 10-bit address fields for memory reference instructions are generated according to the absolute addressing scheme.
- R Relative: The assembler assembles for relative-page addressing; the 10-bit address fields for memory reference instructions are generated according to the relative addressing scheme.
- B Binary Output: The non-relocatable object program (which is either absolute or relative) is punched on the punch device.
- L Program Listing: A program listing is produced on the list device. The listing is annotated with diagnostics, should errors be detected in the program during assembly.

T Symbol Table Listing: A listing of the symbol table generated by the assembler is produced. This listing precedes a program listing, regardless of the order of the respective parameters. The symbol table listing occurs in the order the symbols are defined, beginning with pre-defined symbols. Do not confuse this listing with the cross reference. This listing if produced by the assembler; the cross reference is produced by a separate program, callable by the assembler, and also as a stand alone program by the user.

N Include sets of instructions following the IFN pseudo instruction.

Z Include sets of instructions following the IFZ pseudo instruction.

C Begin the cross reference program ( a separate program) immediately after assembly.

The first statement of a program must be a control statement; also; no other control statements are allowed in the program. The next statement required before assembly can proceed in an ORG statement. However, HED and comment statements can occur between the control statement and the first ORG statement. But no other types of statements may precede the first ORG. The last statement must be an END statement.

Binary Output

As shown in FIG. 154, binary output tape consists of a series of records; each record has the format shown below. Records vary in length, but are a maximum of $67_{10}$ words long.

During the second pass of assembly, the object binary is accumulated in a buffer. The contents of the buffer will become a record on the output tape. A record is punched when the buffer gets full, or when it is necessary to begin a new record. Instructions like ORG and BSS always cause the accumulated previous record to be punched (unless the buffer was empty), and a new record started.

SPASM AND THE OPTIMIZER

SPASM is a high-level language which is intended to aid software development code written for the processors (LPU and PPU). If features language constructs which are useful in achieving structured programming techniques. Arithmetic and logical expressions, and high-level statements (IF, CALL, GOTO, computed GOTO, DO-WHILE, and DO-UNTIL) are features which significantly reduce the time required to write programs and make them easier to debug, read and update. In addition, assembly language is allowed to ensure the programmer complete control of the code being written.

SPASM source language statements are translated into equivalent processor assembly language statements by an HP-3000 computer program. These can then be run through a cross-assembler on the HP-3000, or run through ASMA on HP-2100 series equipment. The syntax of the SPASM language is described in an expanded version of Bacchus Normal Form (BNF) notation as follows below.

Syntax

BNF DESCRIPTION OF SPASM

<statement>::=<SPASM statement>|<restricted text>

<SPASM statement>::=<IF statement>|<LET statement>|<CALL statement>|<RETURN STATEMENT>|<DECLARATION statement>|<COPY statement>|GOTO statement>|<Computed GO TO statement>|<DO while statement>|<DO END>|<DO UNTIL statement>|<empty>

<IF statement>::=IF <expression><relational operator><expression>THEN <SPASM statement>ELSE <SPASM statement>IFEND <LET statement>::=LET >expression>|<expression>

<CALL statement>::=CALL <LABEL><parameter pass>|CALL <LABEL><parameter pass>, <BPC RETURN parameter>|CALL $<LABEL><parameter pass>|CALL $<LABEL><parameter pass>,<BPC RETURN parameter>

<RETURN statement>::=RETURN <BPC RETURN paratmeter>

<DECLARATION statement>::=DECLARATIONS, <type>

<COPY statement>::=COPY <MASS MEMORY DATA file name>|:SAMCOPY <MASS MEMORYDATA file name>

<GO TO statement>::=GO TO <LABEL><parameter pass>|GO TO $<LABEL><parameter pass>

<computed GO TO statement>::=CGOTO <expression>, <LIST>

<DO while statement>::=DOWHILE <expression>|DOWHILE <expression><relational operator<>expression>

<DO END>::=DOEND

<DO UNTIL statement>::=DO UNTIL <expression>|DO UNTIL <expression><relational operator><expression>

<parameter pass>::=(<expression>)|(<expression>, <expression)|<empty>

<type>::=SAM temporaries, <List>|LABEL, <letter><letter><digit><digit><digit>|TABEL, <string>

<string>::=<concatentate>|<string>, <concatenate>

<concatenate>::=<code>+<code>

<code>::=<letter>|<number>|<number>-B|−<number>

<restrict text>::=<BPC instruction set>|<assembly language comments>

<relational operators>::=.LT.|.GT.|.GE.|.LE.|.EQ.|.NE.

<list>::=<LABEL>|<LABEL>,<LIST>

<number>::=<digit>|<digit><number>

<digit>:: = ϕ1|2|3|4|5|6|7|8|9

<LABEL>::=<first>|<first><next>

<first>::=<letter>|.

<next>::=<char>|<char><char>|<char><char><char>|<char><char><char><char>

<char>::=<digit>|<letters>

<letter>::=A|B|C|D|E|F|G|H|I|J|K|L|M|N|O|P|Q|R|S|T|U|V|W|X|Y|Z|

<expression>::=<term>|<expression<+<term>|<expression>−<term>|$ <expression>|(<expression>)|<expression>=<expression>

<term>::=<factor>|<term>*<factor<

<factor>::=<primary>|<factor><shiftoperator><digit>|<factor><mem ref><primary>

<primary> ::= <operand> | <sign> <operand>
<sign> ::= − | .NT. | $
<operand> ::= <LABEL> | <subscripted LABEL>
<shift operator> ::= .RR. | .SL. | .SR. | .AR.
<mem ref> ::= .OR. | .AN. | .XR.
<empty> ::= (a character string of zero length; i.e., nothing)

Semantics

The SPASM source language statement consists of a label, the SPASM statement, and comments. Labels are used when the statement is to be referenced. If a label is used, a colon must be placed at the end of the label. All labels that are used must follow the rules outlined in the label field section of the assembler discussion. The next field is the SPASM statement field. The different types of statements that can be used will be discussed later. The third fieldis an optional comment field. If a comment is to be used, the "<" symbol must precede the comment. The total length of the SPASM source language statement can not exceed 72 characters.

As earlier mentioned, assembly language statements may be used instead of theSPASM source language statements. An assembly language statement could be confused for a SPASM statement if either the first four characters in a statement were identical to the first four letters of a SPASM keyword, or if the assembly statement contained either the ":" or "=" symbols. Therefore, to distinguish the assembly language statement from the spasm statement a "#" symbol must precede the assembly statement.

In general, SPASM statements work the same way as their counterparts do in Basic, Fortran or SPL. (SPL stands for System Programming Language, and was developed by Hewlett-Packard for use with 3000-series computers. Manuals for SPL are in the public domain. SPASM is a adaption of SPL.) All operands used must follow the general rules outlined in the operand field section of the assembler discussion. However, subscribed operands are also allowed.

In generating assembly language code from SPASM statements, it often happens that the generated code produces intermediate results that need to be temporarily stored, until a subsequent section of code is executed. SPASM generates code to store these temporary results. These SPASM temporaries are defaulted SAM1, SAM2, SAM3, SAM4, SAM5. SPASM temporaries can be changed using the DECLARATION statement. Also, in generating assembly language for the SPASM IF THEN/ELSE, DOWHILE, and DOUNTIL, SPASM generates high level labels to reference certain generated code. The first label used is "HL1". For each label needed thereafter, the numeric value used in the label is increased by 1 and concatenated with the "HL". Th SPASM-generated high level label can also be changed using the DECLARATION statement.

SPASM expressions are written just as in the Basic language, and are evaluated by the reverse-Polish-generator method. Addition, subtraction, multiplication, and division are provided. Shift and rotate functions, and logical functions are also provided. The single operand functions that can be used are unary minus (two's complement), not (one's complement), and indirect. Indirect addressing is indicated by placing the "$" symbol in front of the operand.

The various SPASM statements are each discussed briefly below.

The SPASM LET statement is used to change the value of a variable. The expression is evaluated by the compare-priorities assigned by the reverse polish method. The keyword "LET" is not necessary in the SPASM LET statement.

The SPASM IF statement must contain a corresponding THEN, ELSE and IFEND. The expression following the 'IF' is evaluated and if true, control transfers to the statment following 'THEN'; if false, control transfers to the statement following 'ELSE'. The 'ELSE' section can be left blank if not needed. The 'IFEND' statement is used to declare the end of the IF statement.

The SPASM CALL statement is used to invoke a subroutine. The subroutine is begun at the statement which the CALL label specifies. Two parameters may be passed to the subroutine. The first parameter is loaded into the B-register and the second parameter is loaded into the A-register. A return papameter may also be specified.

The SPASM RETURN statement causes an exit from a subprogram to be executed. The RETURN parameter specifies which statement is to be executed next.

The SPASM GOTO statement is used to transfer control to a specified statement. The next line executed is the statement which the GOTO specifies. Two parameters may also be passed with the GOTO. As with the CALL, the parameters are passed through the B and A registers, respectively.

The SPASM CGOTO statement is used to transfer control to a specified statement, depending on the value of the expression. The expression is first evaluated and then the jump is made to the respective label.

SPASM DOWHILE and DOUNTIL statements are constructs which allow the programmer to repeatedly execute a section of his program. The DO WHILE statement allows the programmer to repeatedly execute a statement as long as a specified condition is true. The condition is always evaluated and tested before executing the loop statement. The DO UNTIL statement allows the programmer to repeatedly execute a statement umtil a specified condition is true. The condition is evaluated and checked after each execution of the statement. The DOEND statement is used to declare the end of the DO-construct.

There are three types of SPASM DECLARATION statements. The SAM declaration is used to rename the temporary operands generated by SPASM. The LABEL declaration is used to rename the high level labels generated by SPASM. The TABLE declaration is used to concatenate strings. Letters, decimal numbers, and octal numbers may be concatenated.

There are two types of SPASM copy statements ":SAMCOPY" and "COPY". If :SAMCOPY is used, the copied file will be subjected to the SPASM language and expanded accordingly. The COPY statement is used to open a file and copy it directly into the SPASM output file.

The HP-3φφφ computer program which expands the spasm source language statements into the re ective assembly language statements is called "SPASTIC". SPASTIC resides on the HP-3φφφ disc system in the PUB.SYS account. To run the Spastic program two output files must first be created. The SPASTIC output file is where the generated code is to be put. SPASM statements are written out into the file as comments. The SPASTIC output file must be an ASCII file with a fixed record length of 4ϕ words. As intermediate output file must be created to be able to use the optimizer program, which will be discussed later. This file contains the line number, opcode identifier, and label of all newly generated assembly language. The intermediate file must be an ASCII file with a fixed record length of 2ϕ words.

SPASTIC was written in the HP-3ϕϕϕ Systems Programming Language. A listing of the program is shown in the Appendix.

We claim:

1. An electronic calculator comprising:

keyboard input means for entering alphanumeric program and data information, including string variables, into the calculator;

processing means for executing alphanumeric programs;

memory means for storing routines and subroutines of instructions to be selectively performed by the calculator and for storing a program and data, including a string variable, entered into the calculator; and display means for displaying at least one line of alphanumeric program and data information;

said keyboard input means including means for entering a string variable modification statement into the calculator specifying a string variable, stored in said memory means, to be modified and further including program execution control means for controlling the execution of a program stored in said memory means, and editing means for enabling the user to alter alphanumeric information displayed by said display means;

said processing means being responsive to a string variable modification statement encountered during execution of a program stored in said memory means for interrupting execution of that program and for causing the value of the specified string variable stored in said memory means to be displayed on said display means, and being further responsive to selective actuation by the user of said editing means for selectively altering the displayed value of the string variable, and being further responsive to actuation of said program execution control means following alteration of the value of the string variable for replacing the value of the string variable stored in said memory means with the altered value and for resuming execution of the program at the point at which interruption occurred.

2. An electronic calculator as in claim 1 wherein said display means including a keyboard entry area for displaying certain alphanumeric information and wherein the value of the specified string variable is displayed in said keyboard entry area for selective alteration by the user.

* * * * *

UNITED STATES PATENT AND TRADEMARK OFFICE

CERTIFICATE OF CORRECTION

PATENT NO. : 4,180,854 Page 1 of 9

DATED : December 25, 1979

INVENTOR(S) : Jack M. Walden et al

It is certified that error appears in the above-identified patent and that said Letters Patent are hereby corrected as shown below:

Column 5, line 59, "68 A-C" should be --68 A-D--;

Column 8, line 23, "Fig. 119A" should be --Fig. 119D--;

Column 17, line 62, "a RUN" should be --a. RUN--;

Column 23, line 55, "The" should be --(The--;

Column 24, line 58, "definition)" should be --definition--;

Column 25, line 7, "enetered" should be --entered--;

Column 27, line 9, "(0<n<31)" should be --(0≤n≤31)--;

Column 27, line 32, "(0<n<31)" should be --(0≤n≤31)--;

Column 28, line 7, "wherein" should be --where in--;

Column 29, line 42, "foregin" should be --foreign--;

Column 30, line 55, "will!" should be --will--;

Column 38, line 23, "∧)" should be --∧.)--;

Column 48, line 56, "0≦n≦12" should be --0≤n≤12--;

Column 49, line 15, "0≦n≦11" should be --0≤n≤11--;

Column 49, line 40, "20character" should be --20-character--;

Column 50, line 9, "psinted" should be --printed--;

UNITED STATES PATENT AND TRADEMARK OFFICE
CERTIFICATE OF CORRECTION

PATENT NO. : 4,180,854

DATED : December 25, 1979

INVENTOR(S) : Jack M. Walden et al

It is certified that error appears in the above-identified patent and that said Letters Patent are hereby corrected as shown below:

Column 53, line 10, "<image strip>" should be --<image string>--;

Column 53, line 19, "reuslting" should be --resulting--;

Column 53, line 32, after ">" insert --is--;

Column 54, line 42, "allmust" should be --all must--;

Column 54, line 68, " text in" should be --(text in--;

Column 57, line 10, "iamge" should be --image--;

Column 61, between lines 55 & 56, "LET X=Y Y" should be --LET X=Y^Y--;

Column 61, line 68, "at" should be --of--;

Column 65, line 20, "Tge" should be --The--;

Column 66, line 8, "concelled" should be --cancelled--;

Column 67, line 47, "subrograms" should be --subprograms--;

Column 69, line 37, after "=" insert --<--;

Column 69, line 63, "function" should be --functions--;

Column 70, line 37, "neme" should be --name--;

Column 73, line 60, "lower bound>upper bound≤" should be --lower bound ≤ upper bound≤--;

UNITED STATES PATENT AND TRADEMARK OFFICE

CERTIFICATE OF CORRECTION

PATENT NO. : 4,180,854

DATED : December 25, 1979

INVENTOR(S) : Jack M. Walden et al

It is certified that error appears in the above-identified patent and that said Letters Patent are hereby corrected as shown below:

Column 73, line 64, "10:1" should be --10:-1--;

Column 74, line 20, "19" should be --I9--;

Column 78, line 37, "srring" should be --string--;

Column 80, line 14, "arrray" should be --array--;

Column 83, line 34, "becomes" should be --become--;

Column 84, line 11, "converning" should be --concerning--;

Column 85, line 56, "colymn" should be --column--;

Column 86, line 4, delete second occurrence "are previously";

Column 88, line 37, "1≦15" should be --1≤15--;

Column 88, line 38, "0≦7" should be --0≤7--;

Column 88, line 39, "0≦7" should be --0≤7--;

Column 88, line 40, "0≦4" should be --0≤4--;

Column 90, line 43, "≦ r≦ " should be -- ≤r≤--.

Column 90, line 45, "≦n≦" should be --≤n≤--;

Column 92, line 29, "≦f≦" should be --≤f≤--;

Column 92, line 35, "≦f≦" should be --≤f≤--;

UNITED STATES PATENT AND TRADEMARK OFFICE
CERTIFICATE OF CORRECTION

PATENT NO. : 4,180,854 — Page 4 of 9

DATED : December 25, 1979

INVENTOR(S) : Jack M. Walden et al

It is certified that error appears in the above-identified patent and that said Letters Patent are hereby corrected as shown below:

Column 95, line 26, "≧" should be --≥--;

Column 97, line 23, "of" should be --or--;

Column 97, line 30, "not" should be --no--;

Column 97, line 54, after ""partial string"" delete "n";

Column 98, line 50, "distinguishig" should be --distinguishing--;

Column 100, line 2, "(ON END$\pi$)" should be --(ON END#)--;

Column 104, line 16, "WRITE" should be --PRINT--;

Column 106, line 42, "Remaining Files" should be --Renaming Files--;

Column 106, line 68, "Save'd" should be --SAVE'd--;

Column 107, line 49, "statment" should be --statement--;

Column 116, line 5, "flat" should be --flag--;

Column 116, line 31, "NORMAl" should be --NORMAL--;

Column 116, line 64, "wait" should be --WAIT--;

Column 117, line 52, "$\pi$" should be --#--;

Column 118, line 4, "NORMAl" should be --NORMAL--;

UNITED STATES PATENT AND TRADEMARK OFFICE

CERTIFICATE OF CORRECTION

PATENT NO. : 4,180,854 — Page 5 of 9

DATED : December 25, 1979

INVENTOR(S) : Jack M. Walden et al

It is certified that error appears in the above-identified patent and that said Letters Patent are hereby corrected as shown below:

Column 118, line 35, "flat" should be --flag--;

Column 118, line 67, "wll" should be --will--;

Column 120, line 2, "7>12" should be --7X12--;

Column 120, line 2, "thick" should be -- think --.

Column 120, line 36, "requied" should be --required--;

Column 120, line 46, "requies" should be --requires--;

Column 121, line 6, "3.5'" should be --3.5"--;

Column 121, line 11, "(0.75"0 left" should be --(.75") left--;

Column 126, line 41, "th" should be --the--;

Column 126, line 57, "number" should be --amount--;

Column 130, line 16, "reprsentation" should be --representation--;

Column 144, line 33, "paterns" should be --patterns--;

Column 146, line 44, "corroinate" should be --coordinate--;

Column 148, line 22, "rotatin" should be --rotation--;

Column 148, line 32, "traling" should be --trailing--;

Column 148, line 34, "b1bbbbbbbbbbbbbbbbbb2bbbbbbbbbbbbbbbbb" should be --ƀ1ƀƀƀƀƀƀƀƀƀƀƀƀƀƀƀƀƀƀ2ƀƀƀƀƀƀƀƀƀƀƀƀƀƀƀƀƀƀ--;

Column 120, line 2, "thick" should be --think--;

UNITED STATES PATENT AND TRADEMARK OFFICE
CERTIFICATE OF CORRECTION

PATENT NO. : 4,180,854

DATED : December 25, 1979

INVENTOR(S) : Jack M. Walden et al

It is certified that error appears in the above-identified patent and that said Letters Patent are hereby corrected as shown below:

Column 154, line 26, "Instruction/Data/Address" should be --Instruction/Data/Address--;

Column 155, line 19, "Unsychronized" should be --Unsynchronized--;

Column 156, line 6, "Register Access Line" should be --Register Access Line--;

Column 166, line 6, "INT" should be --$\overline{INT}$--;

Column 167, line 10, "may" should be --many--;

Column 175, line 12, "$M_3$" should be --$M_s$--;

Column 176, line 10, "$0\leqq m10$" should be --$0\leq m<10$--;

Column 179, line 40, "ot" should be --of--;

Column 182, line 37, "conventionsl" should be --conventions--;

Column 185, line 8, after "most" insert --significant--;

Column 186, line 26, "H" should be --$\overline{H}$--;

Column 189, line 28, "$0\leqq m\leqq 37_8$" should be --$0\leq m\leq 37_8$--;

Column 191, line 68, "PUlse" should be --Pulse--;

Column 192, line 6, "$1\leqq N\leqq 16_{10}$" should be --$1\leq N\leq 16_{10}$--;

Column 192, line 12, "$1\leqq N\leqq 16_{10}$" should be --$1\leq N\leq 16_{10}$--;

UNITED STATES PATENT AND TRADEMARK OFFICE

CERTIFICATE OF CORRECTION

PATENT NO. : 4,180,854

DATED : December 25, 1979

INVENTOR(S) : Jack M. Walden et al

It is certified that error appears in the above-identified patent and that said Letters Patent are hereby corrected as shown below:

Column 192, line 19, "$0 \leqq r \leqq 17_8$" should be --$0 \leq r \leq 17_8$--;

Column 194, line 11, "of" should be --to--;

Column 194, line 33, "illustate" should be --illustrate--;

Column 194, line 58, "circuity" should be --circuitry--;

Column 195, line 49, "thus" should be --Thus--;

Column 197, line 32, "conjuction" should be --conjunction--;

Column 197, line 42, "singls" should be --signals--;

Column 198, line 12, "respectivey" should be --respectively--;

Column 203, line 44, "10C" should be --IOC--;

Column 208, line 60, "JMP's ing" should be --JMP'ing--;

Column 210, line 44, "FIG. 3" should be --FIG. 5--;

Column 211, line 15, "9X5" should be --9X15--;

Column 211, line 17, "W=0.98" H=123"" should be --W=.098" H=.123"--;

Column 212, line 44, "important" should be --improvement--;

Column 213, line 38, "Busas" should be --Bus as--;

Column 215, line 62, "PSDMC" should be --$\overline{PSMC}$--;

UNITED STATES PATENT AND TRADEMARK OFFICE

CERTIFICATE OF CORRECTION

PATENT NO. : 4,180,854

DATED : December 25, 1979

INVENTOR(S) : Jack M. Walden et al

It is certified that error appears in the above-identified patent and that said Letters Patent are hereby corrected as shown below:

Column 217, line 13, "the" should be --to--;

Column 218, line 31, "as" should be --has--;

Column 219, line 39, "10" should be --1Ø--;

Column 220, line 7, "Donor" should be --Control--;

Column 221, line 58, after "intensity" delete "V";

Column 223, line 30, "pollarity" should be --polarity--;

Column 225, line 25, "assembly" should be --assembler--;

Column 226, line 15, "assembly" should be --assembler--;

Column 227, line 19, "wihin" should be --within--;

Column 228, line 52, "objectcode" should be --object code--;

Column 230, line 37, "theupdating" should be --the updating--;

Column 231, line 12, after "intervening" insert --between--;

Column 231, line 64, "illegial" should be --illegal--;

Column 232, line 51, "+" should be -- - --;

Column 233, line 40, "follwoing" should be --following--;

Column 233, line 48, after "one" insert --line--;

UNITED STATES PATENT AND TRADEMARK OFFICE

CERTIFICATE OF CORRECTION

PATENT NO. : 4,180,854

DATED : December 25, 1979

INVENTOR(S) : Jack M. Walden et al

It is certified that error appears in the above-identified patent and that said Letters Patent are hereby corrected as shown below:

Column 236, line 66, "*<factor<" should be --*<factor>--;

Column 237, line 6, ".XR." should be --.XR.--;

Column 237, line 19, "fieldis" should be --field is--;

Column 238, line 9, "statment" should be --statement--;

Column 238, line 19, "papameter" should be --parameter--;

Column 238, line 43, "umtil" should be --until--;

Column 240, line 24, "including" should be --includes--;

Signed and Sealed this

*Twentieth* Day of *September 1983*

[SEAL]

*Attest:*

GERALD J. MOSSINGHOFF

*Attesting Officer* *Commissioner of Patents and Trademarks*